US012810539B2

(12) United States Patent
Dessero et al.

(10) Patent No.: US 12,810,539 B2
(45) Date of Patent: Nov. 24, 2026

(54) METHODS FOR TIME OF DAY ADJUSTMENTS FOR ENVIRONMENTS AND ENVIRONMENT PRESENTATION DURING COMMUNICATION SESSIONS

(71) Applicant: Apple Inc., Cupertino, CA (US)

(72) Inventors: James M. Dessero, Morgan Hill, CA (US); Jeffrey S. Allen, San Jose, CA (US); Michael A. Dunkley, Sunnyvale, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 18/473,260

(22) Filed: Sep. 24, 2023

(65) Prior Publication Data

US 2024/0104836 A1 Mar. 28, 2024

Related U.S. Application Data

(60) Provisional application No. 63/506,133, filed on Jun. 4, 2023, provisional application No. 63/506,127, filed (Continued)

(51) Int. Cl.

*G06F 3/04815* (2022.01)
*G06F 3/0482* (2013.01)

(Continued)

(52) U.S. Cl.

CPC ........ *G06T 15/506* (2013.01); *G06F 3/04815* (2013.01); *G06F 3/04847* (2013.01);

(Continued)

(58) Field of Classification Search

CPC ....... G06T 15/506; G06T 15/04; G06T 15/20; G06T 15/50; G06T 19/20; G06T 2200/24;

(Continued)

(56) References Cited

U.S. PATENT DOCUMENTS

| | | | |
|---|---|---|---|
| 5,015,188 A | 5/1991 | Pellosie et al. |
| 5,422,812 A | 6/1995 | Knoll et al. |

(Continued)

FOREIGN PATENT DOCUMENTS

| | | |
|---|---|---|
| CA | 3033344 A1 | 2/2018 |
| CN | 102298493 A | 12/2011 |

(Continued)

OTHER PUBLICATIONS

Corrected Notice of Allowability received for U.S. Appl. No. 17/479,791, mailed on May 19, 2023, 2 pages.

(Continued)

*Primary Examiner* — Kent W Chang
*Assistant Examiner* — Karl Duc Truong
(74) *Attorney, Agent, or Firm* — Kubota & Basol LLP

(57) ABSTRACT

In some embodiments, a computer system applies a time of day setting to a virtual environment. In some embodiments, the time of day setting is updated based on an event. In some embodiments, a computer system displays content in an expanded display mode. In some embodiments, computer systems join a communication session while maintaining display of respective environments. In some embodiments, a computer system moves a portal based on user movement. In some embodiments, computer systems share a virtual environment. Computer systems can display media with simulated lighting. Computer systems can share an environment. In some embodiments, a computer system selects a position relative to content. A computer system can present representations of communication session participants based on content. A computer system can present user interfaces to control visual appearances of an environment including media. Computer systems can change an appearance of an environment based on environmental modes.

57 Claims, 215 Drawing Sheets

Related U.S. Application Data on Jun. 4, 2023, provisional application No. 63/502,407, filed on May 15, 2023, provisional application No. 63/377,020, filed on Sep. 24, 2022.

(51) Int. Cl.

| | |
|---|---|
| ***G06F 3/04842*** | (2022.01) |
| ***G06F 3/04847*** | (2022.01) |
| ***G06T 15/04*** | (2011.01) |
| ***G06T 15/20*** | (2011.01) |
| ***G06T 15/50*** | (2011.01) |
| ***G06T 19/20*** | (2011.01) |
| *G06F 1/16* | (2006.01) |
| *G06F 3/01* | (2006.01) |

(52) U.S. Cl.

CPC .............. *G06T 15/04* (2013.01); *G06T 15/20* (2013.01); *G06T 15/50* (2013.01); *G06T 19/20* (2013.01); *G06F 1/163* (2013.01); *G06F 1/1686* (2013.01); *G06F 3/011* (2013.01); *G06F 3/0482* (2013.01); *G06F 3/04842* (2013.01); *G06T 2200/24* (2013.01); *G06T 2219/2016* (2013.01)

(58) Field of Classification Search

CPC ......... G06T 2219/2016; G06F 3/04815; G06F 3/04847; G06F 1/163; G06F 1/1686; G06F 3/011; G06F 3/0482; G06F 3/04842

See application file for complete search history.

(56) References Cited

U.S. PATENT DOCUMENTS

| | | | |
|---|---|---|---|
| 5,483,261 | A | 1/1996 | Yasutake |
| 5,488,204 | A | 1/1996 | Mead et al. |
| 5,515,488 | A | 5/1996 | Hoppe et al. |
| 5,524,195 | A | 6/1996 | Clanton et al. |
| 5,610,828 | A | 3/1997 | Kodosky et al. |
| 5,731,805 | A | 3/1998 | Tognazzini et al. |
| 5,737,553 | A | 4/1998 | Bartok |
| 5,740,440 | A | 4/1998 | West |
| 5,751,287 | A | 5/1998 | Hahn et al. |
| 5,758,122 | A | 5/1998 | Corda et al. |
| 5,794,178 | A | 8/1998 | Caid et al. |
| 5,809,267 | A | 9/1998 | Moran et al. |
| 5,825,352 | A | 10/1998 | Bisset et al. |
| 5,835,079 | A | 11/1998 | Shieh |
| 5,877,766 | A | 3/1999 | Bates et al. |
| 5,880,411 | A | 3/1999 | Gillespie et al. |
| 5,900,849 | A | 5/1999 | Gallery |
| 5,933,143 | A | 8/1999 | Kobayashi |
| 5,990,886 | A | 11/1999 | Serdy et al. |
| 6,061,060 | A | 5/2000 | Berry et al. |
| 6,078,310 | A | 6/2000 | Tognazzini |
| 6,108,004 | A | 8/2000 | Medl |
| 6,112,015 | A | 8/2000 | Planas et al. |
| 6,167,433 | A | 12/2000 | Maples et al. |
| 6,188,391 | B1 | 2/2001 | Seely et al. |
| 6,295,069 | B1 | 9/2001 | Shirur |
| 6,310,610 | B1 | 10/2001 | Beaton et al. |
| 6,323,846 | B1 | 11/2001 | Westerman et al. |
| 6,426,745 | B1 | 7/2002 | Isaacs et al. |
| 6,456,296 | B1 | 9/2002 | Cataudella et al. |
| 6,570,557 | B1 | 5/2003 | Westerman et al. |
| 6,584,465 | B1 | 6/2003 | Zhu et al. |
| 6,677,932 | B1 | 1/2004 | Westerman |
| 6,690,387 | B2 | 2/2004 | Zimmerman et al. |
| 6,714,201 | B1 | 3/2004 | Grinstein et al. |
| 6,750,873 | B1 | 6/2004 | Bernardini et al. |
| 6,756,997 | B1 | 6/2004 | Ward et al. |
| 7,015,894 | B2 | 3/2006 | Morohoshi |
| 7,035,903 | B1 | 4/2006 | Baldonado |
| 7,046,927 | B2 | 5/2006 | Dalton et al. |
| 7,096,120 | B2 | 8/2006 | Hull |
| 7,134,130 | B1 | 11/2006 | Thomas |
| 7,137,074 | B1 | 11/2006 | Newton et al. |
| 7,184,064 | B2 | 2/2007 | Zimmerman et al. |
| 7,230,629 | B2 | 6/2007 | Reynolds et al. |
| 7,298,370 | B1 | 11/2007 | Middler et al. |
| 7,580,576 | B2 | 8/2009 | Wang et al. |
| 7,614,008 | B2 | 11/2009 | Ording |
| 7,633,076 | B2 | 12/2009 | Huppi et al. |
| 7,634,718 | B2 | 12/2009 | Nakajima |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,706,579 | B2 | 4/2010 | Oijer |
| 7,721,226 | B2 | 5/2010 | Barabe et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,341,541 | B2 | 12/2012 | Holecek et al. |
| 8,381,135 | B2 | 2/2013 | Hotelling et al. |
| 8,436,872 | B2 | 5/2013 | Wright et al. |
| 8,479,122 | B2 | 7/2013 | Hotelling et al. |
| 8,593,558 | B2 | 11/2013 | Gardiner et al. |
| 8,724,856 | B1 | 5/2014 | King |
| 8,730,156 | B2 | 5/2014 | Weising et al. |
| 8,767,045 | B2 | 7/2014 | Kitazato et al. |
| 8,793,620 | B2 | 7/2014 | Stafford |
| 8,793,729 | B2 | 7/2014 | Adimatyam et al. |
| 8,803,873 | B2 | 8/2014 | Yoo et al. |
| 8,805,690 | B1 | 8/2014 | Lebeau et al. |
| 8,866,880 | B2 | 10/2014 | Tan et al. |
| 8,896,632 | B2 | 11/2014 | Macdougall et al. |
| 8,947,323 | B1 | 2/2015 | Raffle et al. |
| 8,970,478 | B2 | 3/2015 | Johansson |
| 8,970,629 | B2 | 3/2015 | Kim et al. |
| 8,994,718 | B2 | 3/2015 | Latta et al. |
| 9,108,109 | B2 | 8/2015 | Pare et al. |
| 9,158,115 | B1 | 10/2015 | Worley et al. |
| 9,164,975 | B2 | 10/2015 | Milewski et al. |
| 9,183,672 | B1 | 11/2015 | Hickman et al. |
| 9,185,062 | B1 | 11/2015 | Yang et al. |
| 9,189,611 | B2 | 11/2015 | Wssingbo |
| 9,196,072 | B2 | 11/2015 | Oh et al. |
| 9,214,137 | B2 | 12/2015 | Bala et al. |
| 9,222,787 | B2 | 12/2015 | Blumenberg et al. |
| 9,230,368 | B2 | 1/2016 | Keane et al. |
| 9,237,334 | B2 | 1/2016 | Cheng et al. |
| 9,241,149 | B2 | 1/2016 | Redmann |
| 9,245,388 | B2 | 1/2016 | Poulos et al. |
| 9,293,118 | B2 | 3/2016 | Matsui |
| 9,294,757 | B1 | 3/2016 | Lewis et al. |
| 9,298,334 | B1 | 3/2016 | Zimmerman et al. |
| 9,316,827 | B2 | 4/2016 | Lindley et al. |
| 9,348,458 | B2 | 5/2016 | Hotelling et al. |
| 9,383,189 | B2 | 7/2016 | Bridges et al. |
| 9,384,594 | B2 | 7/2016 | Maciocci et al. |
| 9,396,580 | B1 | 7/2016 | Nowrouzezahrai et al. |
| 9,400,559 | B2 | 7/2016 | Latta et al. |
| 9,426,193 | B2 | 8/2016 | Goodman |
| 9,436,357 | B2 | 9/2016 | Pallakoff et al. |
| 9,437,047 | B2 | 9/2016 | Chang et al. |
| 9,448,635 | B2 | 9/2016 | Macdougall et al. |
| 9,448,687 | B1 | 9/2016 | Mckenzie et al. |
| 9,465,479 | B2 | 10/2016 | Cho et al. |
| 9,491,374 | B1 | 11/2016 | Avrahami et al. |
| 9,519,371 | B2 | 12/2016 | Nishida |
| 9,544,257 | B2 | 1/2017 | Ogundokun et al. |
| 9,563,331 | B2 | 2/2017 | Poulos et al. |
| 9,588,651 | B1 | 3/2017 | Buchanan et al. |
| 9,612,722 | B2 | 4/2017 | Miller et al. |
| 9,619,105 | B1 | 4/2017 | Dal Mutto |
| 9,619,519 | B1 | 4/2017 | Dorner |
| 9,672,588 | B1 | 6/2017 | Doucette et al. |
| 9,681,112 | B2 | 6/2017 | Son |
| 9,684,372 | B2 | 6/2017 | Xun et al. |
| 9,704,230 | B2 | 7/2017 | Hofmann et al. |

(56) References Cited

U.S. PATENT DOCUMENTS 9,778,814 B2 10/2017 Ambrus et al.
9,779,512 B2 10/2017 Tomlin et al.
9,829,708 B1 11/2017 Asada
9,851,866 B2 12/2017 Goossens et al.
9,864,498 B2 1/2018 Olsson et al.
9,870,130 B2 1/2018 Schubert et al.
9,886,087 B1 2/2018 Wald et al.
9,911,232 B2 3/2018 Shapira et al.
9,933,833 B2 4/2018 Tu et al.
9,933,937 B2 4/2018 Lemay et al.
9,934,614 B2 4/2018 Ramsby et al.
9,952,042 B2 4/2018 Abovitz et al.
10,026,209 B1 7/2018 Dagley et al.
10,049,460 B2 8/2018 Romano et al.
10,101,803 B2 10/2018 Faaborg et al.
10,139,985 B2 11/2018 Mildrew et al.
10,163,198 B2 12/2018 Rochford et al.
10,175,483 B2 1/2019 Salter et al.
10,186,086 B2 1/2019 Giraldi et al.
10,192,347 B2 1/2019 Bui et al.
10,203,762 B2 2/2019 Bradski et al.
10,203,764 B2 2/2019 Katz et al.
10,210,664 B1 * 2/2019 Chaturvedi ........ G06Q 30/0643
10,303,427 B2 5/2019 Shintani et al.
10,307,671 B2 6/2019 Barney et al.
10,318,034 B1 6/2019 Hauenstein et al.
10,331,205 B2 6/2019 Kim et al.
10,339,721 B1 7/2019 Dascola et al.
10,353,532 B1 7/2019 Holz et al.
10,373,381 B2 8/2019 Nuernberger et al.
10,401,958 B2 9/2019 Peana et al.
10,424,124 B2 9/2019 Takahashi
10,431,216 B1 10/2019 Lemon et al.
10,448,189 B2 10/2019 Link
10,484,641 B2 11/2019 Zhou et al.
10,488,941 B2 11/2019 Lam et al.
10,499,044 B1 12/2019 Giokaris et al.
10,530,731 B1 1/2020 Wu et al.
10,534,439 B2 1/2020 Raffa et al.
10,540,005 B2 1/2020 Yoon et al.
10,545,584 B2 1/2020 Tome et al.
10,564,714 B2 2/2020 Marggraff et al.
10,565,448 B2 2/2020 Bell et al.
10,565,761 B2 2/2020 Deluca et al.
10,573,067 B1 2/2020 Naik et al.
10,630,803 B2 4/2020 Hwang et al.
10,642,368 B2 5/2020 Chen
10,645,332 B2 5/2020 Zhang
10,664,043 B2 5/2020 Ikuta et al.
10,664,048 B2 5/2020 Cieplinski et al.
10,671,241 B1 6/2020 Jia et al.
10,671,243 B2 6/2020 Ryu et al.
10,678,403 B2 6/2020 Duarte et al.
10,691,216 B2 6/2020 Geisner et al.
10,698,562 B1 6/2020 Zhou et al.
10,699,488 B1 6/2020 Terrano
10,701,661 B1 6/2020 Coelho et al.
10,708,965 B1 7/2020 Subramanian et al.
10,712,900 B2 7/2020 Osman et al.
10,732,721 B1 8/2020 Clements
10,754,434 B2 8/2020 Hall et al.
10,762,716 B1 9/2020 Paul et al.
10,768,421 B1 9/2020 Rosenberg et al.
10,768,693 B2 9/2020 Powderly et al.
10,776,933 B2 9/2020 Faulkner
10,846,864 B2 11/2020 Kim et al.
10,852,814 B1 12/2020 Caron et al.
10,877,645 B2 12/2020 Lee et al.
10,885,701 B1 * 1/2021 Patel ....................... A63F 13/57
10,922,744 B1 2/2021 Mahajan
10,929,099 B2 2/2021 Querze et al.
10,936,148 B1 3/2021 Merkl et al.
10,956,724 B1 3/2021 Terrano
10,983,663 B2 4/2021 Iglesias
11,003,308 B1 5/2021 Dryer et al.
11,017,611 B1 * 5/2021 Mount .................. G06V 20/20
11,023,035 B1 6/2021 Atlas et al.
11,055,920 B1 7/2021 Bramwell et al.
11,079,995 B1 8/2021 Hulbert et al.
11,082,463 B2 8/2021 Felman
11,095,857 B1 8/2021 Krol et al.
11,126,850 B1 9/2021 Ichim et al.
11,132,162 B2 9/2021 Bar-Zeev et al.
11,132,840 B2 9/2021 Sarangdhar et al.
11,138,798 B2 10/2021 Paul et al.
11,146,909 B1 10/2021 Pinto et al.
11,175,791 B1 11/2021 Patnaikuni et al.
11,176,755 B1 11/2021 Tichenor et al.
11,182,964 B2 11/2021 Palangie et al.
11,200,742 B1 12/2021 Post et al.
11,204,678 B1 12/2021 Baker et al.
11,232,643 B1 1/2022 Stevens et al.
11,243,734 B2 2/2022 Boissière et al.
11,249,556 B1 2/2022 Schwarz et al.
11,262,885 B1 3/2022 Burckel
11,266,919 B2 3/2022 Bear et al.
11,294,475 B1 4/2022 Pinchon et al.
11,307,653 B1 4/2022 Qian et al.
11,343,420 B1 5/2022 Herz et al.
11,347,319 B2 5/2022 Goel et al.
11,348,300 B2 5/2022 Zimmermann et al.
11,348,316 B2 5/2022 Burns et al.
11,379,033 B2 7/2022 O'Hern et al.
11,380,323 B2 7/2022 Shin et al.
11,382,611 B1 7/2022 Westling et al.
11,406,896 B1 8/2022 Cheung et al.
11,409,363 B2 8/2022 Chen et al.
11,416,080 B2 8/2022 Heo et al.
11,432,095 B1 8/2022 Satongar et al.
11,496,571 B2 11/2022 Berliner et al.
11,500,510 B2 11/2022 Tokuchi et al.
11,531,402 B1 12/2022 Stolzenberg
11,531,459 B2 12/2022 Poupyrev et al.
11,557,102 B2 1/2023 Palangie et al.
11,567,625 B2 1/2023 Faulkner et al.
11,599,239 B2 3/2023 Rockel et al.
11,604,080 B2 3/2023 Paoletti et al.
11,615,596 B2 3/2023 Faulkner et al.
11,641,460 B1 5/2023 Geusz et al.
11,669,155 B2 6/2023 Bowman et al.
11,682,180 B1 * 6/2023 Willkie .................. G06V 10/44
345/633
11,689,632 B2 6/2023 Raisher et al.
11,730,226 B2 8/2023 Stolarz et al.
11,743,215 B1 8/2023 Murillo et al.
11,762,457 B1 9/2023 Ikkai et al.
11,762,473 B2 9/2023 Cipoletta et al.
11,768,544 B2 9/2023 Schwarz et al.
11,768,546 B1 9/2023 Poulos et al.
11,842,454 B1 12/2023 Lin et al.
11,847,748 B2 12/2023 Liu et al.
11,861,056 B2 1/2024 Burns et al.
11,861,136 B1 1/2024 Faulkner et al.
11,868,582 B2 1/2024 Kim et al.
11,875,013 B2 1/2024 Lemay et al.
11,875,162 B2 1/2024 Garstenauer et al.
11,886,643 B2 1/2024 Irie et al.
11,899,845 B2 2/2024 Chung et al.
11,909,453 B2 2/2024 Javaudin et al.
11,914,759 B2 2/2024 Klein et al.
11,922,588 B2 3/2024 Fillhardt et al.
11,928,263 B2 3/2024 Jung et al.
11,934,569 B2 3/2024 Pastrana Vicente et al.
11,948,263 B1 4/2024 Rudman et al.
11,954,242 B2 4/2024 Dascola et al.
11,972,092 B2 4/2024 Zurmoehle et al.
11,983,326 B2 5/2024 Lacey
11,988,832 B2 5/2024 Singh et al.
11,989,965 B2 5/2024 Tarighat Mehrabani
11,995,301 B2 5/2024 Hylak et al.
12,020,387 B2 6/2024 Maharaja
12,023,579 B2 7/2024 Azmandian et al.
12,032,803 B2 7/2024 Pastrana Vicente et al.
12,062,127 B2 8/2024 Park et al.

(56) References Cited

U.S. PATENT DOCUMENTS 12,099,653 B2 9/2024 Chawda et al.
12,099,695 B1 9/2024 Smith et al.
12,112,011 B2 10/2024 Smith et al.
12,113,948 B1 10/2024 Smith et al.
12,118,200 B1 10/2024 Shutzberg et al.
12,154,236 B1 11/2024 Herman et al.
12,182,325 B2 12/2024 Calderone et al.
12,236,546 B1 2/2025 Lipton
12,254,127 B2 3/2025 Burns et al.
12,321,515 B2 6/2025 Calderone et al.
12,394,167 B1 8/2025 Scully et al.
12,408,804 B2 9/2025 Schneider et al.
2001/0047250 A1 11/2001 Schuller et al.
2002/0015024 A1 2/2002 Westerman et al.
2002/0024675 A1 2/2002 Foxlin
2002/0030692 A1 3/2002 Griesert
2002/0044152 A1 4/2002 Abbott et al.
2002/0065778 A1 5/2002 Bouet et al.
2003/0038754 A1 2/2003 Goldstein et al.
2003/0151611 A1 8/2003 Turpin et al.
2003/0222924 A1 12/2003 Baron
2004/0059784 A1 3/2004 Caughey
2004/0104806 A1 6/2004 Yui et al.
2004/0230912 A1 11/2004 Clow et al.
2004/0243926 A1 12/2004 Trenbeath et al.
2005/0044510 A1 2/2005 Yi
2005/0062738 A1 3/2005 Handley et al.
2005/0073136 A1 4/2005 Larsson et al.
2005/0100210 A1 5/2005 Rice et al.
2005/0138572 A1 6/2005 Good et al.
2005/0144570 A1 6/2005 Loverin et al.
2005/0144571 A1 6/2005 Loverin et al.
2005/0175218 A1 8/2005 Vertegaal et al.
2005/0190059 A1 9/2005 Wehrenberg
2005/0198143 A1 9/2005 Moody et al.
2005/0216866 A1 9/2005 Rosen et al.
2005/0231532 A1 10/2005 Suzuki et al.
2005/0248299 A1 11/2005 Chemel et al.
2006/0017692 A1 1/2006 Wehrenberg et al.
2006/0028400 A1 2/2006 Lapstun et al.
2006/0033724 A1 2/2006 Chaudhri et al.
2006/0034590 A1 2/2006 Teramoto
2006/0080702 A1 4/2006 Diez et al.
2006/0156228 A1 7/2006 Gallo et al.
2006/0197753 A1 9/2006 Hotelling
2006/0256083 A1 11/2006 Rosenberg
2006/0283214 A1 12/2006 Donadon et al.
2007/0172112 A1 7/2007 Paley et al.
2007/0259716 A1 11/2007 Mattice et al.
2008/0132249 A1 6/2008 Hamilton
2008/0181502 A1 7/2008 Yang
2008/0186255 A1 8/2008 Cohen et al.
2008/0211771 A1 9/2008 Richardson
2008/0222710 A1 9/2008 Blagsvedt et al.
2008/0310707 A1 12/2008 Kansal et al.
2009/0037844 A1 2/2009 Kim et al.
2009/0049408 A1 2/2009 Naaman et al.
2009/0064035 A1 3/2009 Shibata et al.
2009/0146779 A1 6/2009 Kumar et al.
2009/0146961 A1 6/2009 Cheung et al.
2009/0164219 A1 6/2009 Yeung et al.
2009/0231356 A1 9/2009 Barnes et al.
2009/0254843 A1 10/2009 Van et al.
2009/0319181 A1 12/2009 Khosravy et al.
2009/0326810 A1 12/2009 Callaghan et al.
2010/0097375 A1 4/2010 Tadaishi et al.
2010/0115459 A1 5/2010 Kinnunen et al.
2010/0150526 A1 6/2010 Rose et al.
2010/0177049 A1 7/2010 Levy et al.
2010/0185949 A1 7/2010 Jaeger
2010/0188503 A1 7/2010 Tsai et al.
2010/0188572 A1 7/2010 Card
2010/0208033 A1 8/2010 Edge et al.
2010/0269145 A1 10/2010 Ingrassia et al.
2010/0293504 A1 11/2010 Hachiya
2010/0302245 A1 12/2010 Best
2010/0328432 A1 12/2010 Tanaka
2010/0332196 A1 12/2010 Fisker et al.
2011/0018895 A1 1/2011 Buzyn et al.
2011/0018896 A1 1/2011 Buzyn et al.
2011/0029185 A1 2/2011 Aoki et al.
2011/0032365 A1 2/2011 Yett
2011/0066981 A1 3/2011 Chmielewski et al.
2011/0098029 A1 4/2011 Rhoads et al.
2011/0142321 A1 6/2011 Huffman
2011/0156879 A1 6/2011 Matsushita et al.
2011/0164163 A1 7/2011 Bilbrey et al.
2011/0169927 A1 7/2011 Mages et al.
2011/0175932 A1 7/2011 Yu et al.
2011/0216060 A1 9/2011 Weising et al.
2011/0243448 A1 10/2011 Kawabuchi et al.
2011/0254865 A1 10/2011 Yee et al.
2011/0289691 A1 12/2011 Laflèche et al.
2011/0304557 A1 12/2011 Wilburn et al.
2011/0310001 A1 12/2011 Madau et al.
2011/0320969 A1 12/2011 Hwang et al.
2012/0038751 A1 2/2012 Yuan et al.
2012/0066638 A1 3/2012 Ohri
2012/0075496 A1 3/2012 Akifusa et al.
2012/0086624 A1 4/2012 Thompson et al.
2012/0113223 A1 5/2012 Hilliges et al.
2012/0124525 A1 5/2012 Kang
2012/0131631 A1 5/2012 Bhogal et al.
2012/0151416 A1 6/2012 Bell et al.
2012/0170089 A1 7/2012 Kim et al.
2012/0170840 A1 7/2012 Caruso et al.
2012/0184372 A1 7/2012 Laarakkers et al.
2012/0194547 A1 8/2012 Johnson et al.
2012/0218395 A1 8/2012 Andersen et al.
2012/0223885 A1 9/2012 Perez
2012/0249416 A1 10/2012 Maciocci et al.
2012/0249741 A1 10/2012 Maciocci et al.
2012/0256956 A1 10/2012 Kasahara
2012/0256967 A1 10/2012 Baldwin et al.
2012/0257035 A1 10/2012 Larsen
2012/0272179 A1 10/2012 Stafford
2012/0290401 A1 11/2012 Neven
2012/0304087 A1 11/2012 Walkin et al.
2013/0010062 A1 1/2013 Redmann
2013/0027860 A1 1/2013 Masaki et al.
2013/0088516 A1 4/2013 Ota et al.
2013/0093727 A1 4/2013 Eriksson et al.
2013/0127850 A1 5/2013 Bindon
2013/0147820 A1 6/2013 Kalai et al.
2013/0148850 A1 6/2013 Matsuda et al.
2013/0169533 A1 7/2013 Jahnke
2013/0190044 A1 7/2013 Kulas
2013/0191160 A1 7/2013 Oran
2013/0207963 A1 8/2013 Stirbu et al.
2013/0211843 A1 8/2013 Clarkson
2013/0212470 A1 8/2013 Karunamuni et al.
2013/0222227 A1 8/2013 Johansson et al.
2013/0222410 A1 8/2013 Kameyama et al.
2013/0229345 A1 9/2013 Day et al.
2013/0232430 A1 * 9/2013 Reitan .................... G09G 3/003 715/765
2013/0246955 A1 9/2013 Schwesig et al.
2013/0249922 A1 9/2013 Hachiya
2013/0263016 A1 10/2013 Lehtiniemi et al.
2013/0265227 A1 10/2013 Julian
2013/0271397 A1 10/2013 Hildreth et al.
2013/0278501 A1 10/2013 Bulzacki
2013/0286004 A1 10/2013 Mcculloch et al.
2013/0293456 A1 11/2013 Son et al.
2013/0300648 A1 11/2013 Kim et al.
2013/0300654 A1 11/2013 Seki
2013/0307945 A1 11/2013 Cheng et al.
2013/0321462 A1 12/2013 Salter et al.
2013/0325326 A1 12/2013 Blumenberg et al.
2013/0326341 A1 12/2013 Nonaka
2013/0326364 A1 12/2013 Latta et al.
2013/0328925 A1 12/2013 Latta et al.
2013/0332890 A1 12/2013 Ramic et al.
2013/0335301 A1 12/2013 Wong et al.

(56) References Cited

U.S. PATENT DOCUMENTS

| | | | |
|---|---|---|---|
| 2013/0342564 | A1 | 12/2013 | Kinnebrew et al. |
| 2013/0342570 | A1 | 12/2013 | Kinnebrew et al. |
| 2013/0345975 | A1 | 12/2013 | Vulcano et al. |
| 2014/0002338 | A1 | 1/2014 | Raffa et al. |
| 2014/0002444 | A1 | 1/2014 | Bennett et al. |
| 2014/0024324 | A1 | 1/2014 | Mumick |
| 2014/0028548 | A1 | 1/2014 | Bychkov et al. |
| 2014/0040832 | A1 | 2/2014 | Regelous |
| 2014/0049462 | A1 | 2/2014 | Weinberger et al. |
| 2014/0063058 | A1 | 3/2014 | Fialho et al. |
| 2014/0068692 | A1 | 3/2014 | Archibong et al. |
| 2014/0071241 | A1 | 3/2014 | Yang et al. |
| 2014/0075361 | A1 | 3/2014 | Reynolds et al. |
| 2014/0078176 | A1 | 3/2014 | Kim et al. |
| 2014/0092018 | A1 | 4/2014 | Geithner |
| 2014/0104206 | A1 | 4/2014 | Anderson |
| 2014/0108942 | A1 | 4/2014 | Freeman et al. |
| 2014/0114845 | A1 | 4/2014 | Rogers et al. |
| 2014/0125584 | A1 | 5/2014 | Xun et al. |
| 2014/0125585 | A1 | 5/2014 | Song et al. |
| 2014/0126782 | A1 | 5/2014 | Takai et al. |
| 2014/0129990 | A1 | 5/2014 | Xin et al. |
| 2014/0132499 | A1 | 5/2014 | Schwesinger et al. |
| 2014/0132633 | A1* | 5/2014 | Fekete .................. G06Q 50/01 345/634 |
| 2014/0139426 | A1 | 5/2014 | Kryze et al. |
| 2014/0164928 | A1 | 6/2014 | Kim |
| 2014/0168267 | A1 | 6/2014 | Kim et al. |
| 2014/0168453 | A1 | 6/2014 | Shoemake et al. |
| 2014/0181683 | A1 | 6/2014 | Lim et al. |
| 2014/0198017 | A1 | 7/2014 | Lamb et al. |
| 2014/0232639 | A1 | 8/2014 | Hayashi et al. |
| 2014/0237366 | A1 | 8/2014 | Poulos et al. |
| 2014/0247208 | A1 | 9/2014 | Henderek et al. |
| 2014/0247210 | A1 | 9/2014 | Henderek et al. |
| 2014/0258942 | A1 | 9/2014 | Kutliroff et al. |
| 2014/0267046 | A1 | 9/2014 | Ellsworth et al. |
| 2014/0267400 | A1 | 9/2014 | Mabbutt et al. |
| 2014/0268054 | A1 | 9/2014 | Olsson et al. |
| 2014/0282272 | A1 | 9/2014 | Kies et al. |
| 2014/0285641 | A1 | 9/2014 | Kato et al. |
| 2014/0298273 | A1 | 10/2014 | Blackstone et al. |
| 2014/0304612 | A1 | 10/2014 | Collin |
| 2014/0320404 | A1 | 10/2014 | Kasahara |
| 2014/0331187 | A1 | 11/2014 | Hicks et al. |
| 2014/0333666 | A1 | 11/2014 | Poulos et al. |
| 2014/0347391 | A1 | 11/2014 | Keane et al. |
| 2014/0351727 | A1 | 11/2014 | Danton et al. |
| 2014/0351753 | A1 | 11/2014 | Shin et al. |
| 2014/0362111 | A1 | 12/2014 | Kim |
| 2014/0363074 | A1 | 12/2014 | Dolfing et al. |
| 2014/0368537 | A1 | 12/2014 | Salter et al. |
| 2014/0368620 | A1 | 12/2014 | Li et al. |
| 2014/0372957 | A1 | 12/2014 | Keane et al. |
| 2014/0375541 | A1 | 12/2014 | Nister et al. |
| 2014/0375683 | A1 | 12/2014 | Salter et al. |
| 2015/0009118 | A1 | 1/2015 | Thomas et al. |
| 2015/0035822 | A1 | 2/2015 | Arsan et al. |
| 2015/0035832 | A1 | 2/2015 | Sugden et al. |
| 2015/0042679 | A1 | 2/2015 | Järvenpää |
| 2015/0058718 | A1 | 2/2015 | Kim et al. |
| 2015/0067580 | A1 | 3/2015 | Um et al. |
| 2015/0077335 | A1 | 3/2015 | Taguchi et al. |
| 2015/0082180 | A1 | 3/2015 | Ames et al. |
| 2015/0095844 | A1 | 4/2015 | Cho et al. |
| 2015/0121466 | A1 | 4/2015 | Brands et al. |
| 2015/0123890 | A1 | 5/2015 | Kapur et al. |
| 2015/0123901 | A1 | 5/2015 | Schwesinger et al. |
| 2015/0128075 | A1 | 5/2015 | Kempinski |
| 2015/0131850 | A1 | 5/2015 | Qvarfordt |
| 2015/0135108 | A1 | 5/2015 | Pope et al. |
| 2015/0145887 | A1 | 5/2015 | Forutanpour et al. |
| 2015/0149929 | A1 | 5/2015 | Shepherd et al. |
| 2015/0149961 | A1 | 5/2015 | Karakotsios |
| 2015/0153833 | A1 | 6/2015 | Pinault et al. |
| 2015/0169506 | A1 | 6/2015 | Leventhal et al. |
| 2015/0177937 | A1 | 6/2015 | Poletto et al. |
| 2015/0187093 | A1 | 7/2015 | Chu et al. |
| 2015/0193982 | A1 | 7/2015 | Mihelich et al. |
| 2015/0199081 | A1 | 7/2015 | Wheeler |
| 2015/0205106 | A1 | 7/2015 | Norden |
| 2015/0212576 | A1 | 7/2015 | Ambrus et al. |
| 2015/0221132 | A1 | 8/2015 | Kruglick |
| 2015/0227285 | A1 | 8/2015 | Lee et al. |
| 2015/0242095 | A1 | 8/2015 | Sonnenberg |
| 2015/0253957 | A1 | 9/2015 | Crocker |
| 2015/0254905 | A1 | 9/2015 | Ramsby et al. |
| 2015/0255067 | A1 | 9/2015 | White et al. |
| 2015/0262428 | A1 | 9/2015 | Tatzgern et al. |
| 2015/0277699 | A1* | 10/2015 | Algreatly .............. G06F 3/0304 715/850 |
| 2015/0287403 | A1 | 10/2015 | Holzer Zaslansky et al. |
| 2015/0312561 | A1* | 10/2015 | Hoof ................ H04N 21/41407 348/46 |
| 2015/0317831 | A1 | 11/2015 | Ebstyne et al. |
| 2015/0317832 | A1 | 11/2015 | Ebstyne et al. |
| 2015/0331240 | A1 | 11/2015 | Poulos et al. |
| 2015/0331576 | A1 | 11/2015 | Piya et al. |
| 2015/0332091 | A1 | 11/2015 | Kim et al. |
| 2015/0350141 | A1 | 12/2015 | Yang et al. |
| 2015/0370323 | A1 | 12/2015 | Cieplinski et al. |
| 2015/0370404 | A1 | 12/2015 | Hu et al. |
| 2015/0381974 | A1 | 12/2015 | Hoffman et al. |
| 2016/0012642 | A1 | 1/2016 | Lee et al. |
| 2016/0015470 | A1 | 1/2016 | Border |
| 2016/0018898 | A1 | 1/2016 | Tu et al. |
| 2016/0018900 | A1 | 1/2016 | Tu et al. |
| 2016/0025971 | A1 | 1/2016 | Crow et al. |
| 2016/0026243 | A1 | 1/2016 | Bertram et al. |
| 2016/0026253 | A1 | 1/2016 | Bradski et al. |
| 2016/0028961 | A1 | 1/2016 | Thurairatnam |
| 2016/0041391 | A1 | 2/2016 | Van et al. |
| 2016/0050642 | A1 | 2/2016 | Brown et al. |
| 2016/0062636 | A1 | 3/2016 | Jung et al. |
| 2016/0085301 | A1 | 3/2016 | Lopez |
| 2016/0093108 | A1 | 3/2016 | Mao et al. |
| 2016/0098093 | A1 | 4/2016 | Cheon et al. |
| 2016/0098094 | A1 | 4/2016 | Minkkinen |
| 2016/0098972 | A1 | 4/2016 | Feit et al. |
| 2016/0127690 | A1 | 5/2016 | Kaehler et al. |
| 2016/0133044 | A1 | 5/2016 | Lynch |
| 2016/0133052 | A1 | 5/2016 | Choi et al. |
| 2016/0171304 | A1 | 6/2016 | Golding et al. |
| 2016/0179191 | A1 | 6/2016 | Kim et al. |
| 2016/0179336 | A1 | 6/2016 | Ambrus et al. |
| 2016/0188181 | A1 | 6/2016 | Smith |
| 2016/0189426 | A1 | 6/2016 | Thomas et al. |
| 2016/0193104 | A1 | 7/2016 | Du |
| 2016/0196692 | A1 | 7/2016 | Kjallstrom et al. |
| 2016/0210784 | A1 | 7/2016 | Ramsby et al. |
| 2016/0216768 | A1 | 7/2016 | Goetz et al. |
| 2016/0224122 | A1 | 8/2016 | Dietz et al. |
| 2016/0225012 | A1 | 8/2016 | Ha et al. |
| 2016/0225164 | A1 | 8/2016 | Tomlin et al. |
| 2016/0227267 | A1 | 8/2016 | Tsurutani et al. |
| 2016/0239165 | A1 | 8/2016 | Chen et al. |
| 2016/0253063 | A1 | 9/2016 | Critchlow |
| 2016/0253821 | A1 | 9/2016 | Romano et al. |
| 2016/0275702 | A1 | 9/2016 | Reynolds et al. |
| 2016/0279516 | A1 | 9/2016 | Gupta et al. |
| 2016/0291922 | A1 | 10/2016 | Montgomerie et al. |
| 2016/0306434 | A1 | 10/2016 | Ferrin |
| 2016/0309081 | A1 | 10/2016 | Frahm et al. |
| 2016/0313890 | A1 | 10/2016 | Walline et al. |
| 2016/0334940 | A1 | 11/2016 | Kandadai et al. |
| 2016/0349063 | A1 | 12/2016 | Maurer et al. |
| 2016/0350973 | A1 | 12/2016 | Shapira et al. |
| 2016/0357266 | A1 | 12/2016 | Patel et al. |
| 2016/0363774 | A1 | 12/2016 | Kawasima |
| 2016/0370858 | A1 | 12/2016 | Leppänen et al. |
| 2016/0373647 | A1 | 12/2016 | García Morate et al. |
| 2016/0373714 | A1 | 12/2016 | Lee et al. |
| 2016/0379409 | A1 | 12/2016 | Gavriliuc et al. |
| 2017/0032568 | A1 | 2/2017 | Gharpure et al. |

(56) References Cited

U.S. PATENT DOCUMENTS

| | | | |
|---|---|---|---|
| 2017/0038829 | A1 | 2/2017 | Lanier et al. |
| 2017/0038837 | A1 | 2/2017 | Faaborg et al. |
| 2017/0038849 | A1 | 2/2017 | Hwang |
| 2017/0039770 | A1 | 2/2017 | Lanier et al. |
| 2017/0046872 | A1 | 2/2017 | Geselowitz et al. |
| 2017/0052393 | A1 | 2/2017 | Kweon |
| 2017/0052595 | A1 | 2/2017 | Poulos et al. |
| 2017/0053383 | A1 | 2/2017 | Heo |
| 2017/0060230 | A1 | 3/2017 | Faaborg et al. |
| 2017/0061694 | A1 | 3/2017 | Giraldi et al. |
| 2017/0090566 | A1 | 3/2017 | George-Svahn et al. |
| 2017/0109930 | A1 | 4/2017 | Holzer et al. |
| 2017/0115728 | A1 | 4/2017 | Park et al. |
| 2017/0123487 | A1 | 5/2017 | Hazra et al. |
| 2017/0131964 | A1 | 5/2017 | Baek et al. |
| 2017/0132694 | A1 | 5/2017 | Damy |
| 2017/0132822 | A1 | 5/2017 | Marschke et al. |
| 2017/0146801 | A1 | 5/2017 | Stempora |
| 2017/0147180 | A1 | 5/2017 | Yoon et al. |
| 2017/0148339 | A1 | 5/2017 | Van Curen et al. |
| 2017/0153866 | A1 | 6/2017 | Grinberg et al. |
| 2017/0154326 | A1 | 6/2017 | Jo et al. |
| 2017/0162177 | A1 | 6/2017 | Lebeck et al. |
| 2017/0169616 | A1 | 6/2017 | Wiley et al. |
| 2017/0178392 | A1 | 6/2017 | Zuccarino et al. |
| 2017/0206691 | A1 | 7/2017 | Harrises et al. |
| 2017/0206692 | A1 | 7/2017 | Sheaffer et al. |
| 2017/0212583 | A1 | 7/2017 | Krasadakis |
| 2017/0213388 | A1 | 7/2017 | Margolis et al. |
| 2017/0214782 | A1 | 7/2017 | Brinda |
| 2017/0221264 | A1 | 8/2017 | Perry |
| 2017/0228130 | A1 | 8/2017 | Palmaro |
| 2017/0236332 | A1 | 8/2017 | Kipman et al. |
| 2017/0243352 | A1 | 8/2017 | Kutliroff et al. |
| 2017/0251143 | A1 | 8/2017 | Peruch et al. |
| 2017/0256096 | A1 | 9/2017 | Faaborg et al. |
| 2017/0270715 | A1 | 9/2017 | Lindsay et al. |
| 2017/0285737 | A1 | 10/2017 | Khalid et al. |
| 2017/0287215 | A1 | 10/2017 | Lalonde et al. |
| 2017/0287225 | A1 | 10/2017 | Powderly et al. |
| 2017/0302903 | A1 | 10/2017 | Ng et al. |
| 2017/0308163 | A1 | 10/2017 | Cieplinski et al. |
| 2017/0315715 | A1 | 11/2017 | Fujita et al. |
| 2017/0326457 | A1 | 11/2017 | Tilton et al. |
| 2017/0344223 | A1 | 11/2017 | Holzer et al. |
| 2017/0351094 | A1 | 12/2017 | Poulos et al. |
| 2017/0357389 | A1 | 12/2017 | Fleizach et al. |
| 2017/0357390 | A1 | 12/2017 | Alonso Ruiz et al. |
| 2017/0358141 | A1 | 12/2017 | Stafford et al. |
| 2017/0364198 | A1 | 12/2017 | Yoganandan et al. |
| 2018/0005433 | A1 | 1/2018 | Kohler et al. |
| 2018/0024681 | A1 | 1/2018 | Bernstein et al. |
| 2018/0045963 | A1 | 2/2018 | Hoover et al. |
| 2018/0046363 | A1* | 2/2018 | Miller .................... G06F 3/012 |
| 2018/0075658 | A1 | 3/2018 | Lanier et al. |
| 2018/0077383 | A1 | 3/2018 | Akao et al. |
| 2018/0081519 | A1 | 3/2018 | Kim |
| 2018/0084287 | A1 | 3/2018 | Shimura |
| 2018/0088787 | A1 | 3/2018 | Bereza et al. |
| 2018/0095542 | A1 | 4/2018 | Mallinson |
| 2018/0095634 | A1 | 4/2018 | Alexander |
| 2018/0095635 | A1 | 4/2018 | Valdivia et al. |
| 2018/0095636 | A1 | 4/2018 | Valdivia et al. |
| 2018/0095649 | A1 | 4/2018 | Valdivia et al. |
| 2018/0101223 | A1 | 4/2018 | Ishihara et al. |
| 2018/0103209 | A1 | 4/2018 | Fischler et al. |
| 2018/0114364 | A1 | 4/2018 | Mcphee et al. |
| 2018/0120944 | A1 | 5/2018 | Wang et al. |
| 2018/0122043 | A1 | 5/2018 | Energin et al. |
| 2018/0122138 | A1 | 5/2018 | Piya et al. |
| 2018/0130255 | A1 | 5/2018 | Hazeghi et al. |
| 2018/0136815 | A1 | 5/2018 | Tomizuka et al. |
| 2018/0143693 | A1 | 5/2018 | Calabrese et al. |
| 2018/0150204 | A1 | 5/2018 | Macgillivray |
| 2018/0150997 | A1 | 5/2018 | Austin |
| 2018/0157332 | A1 | 6/2018 | Nie |
| 2018/0158222 | A1 | 6/2018 | Hayashi |
| 2018/0165853 | A1 | 6/2018 | Inagi et al. |
| 2018/0173404 | A1 | 6/2018 | Smith |
| 2018/0181199 | A1 | 6/2018 | Harvey et al. |
| 2018/0181272 | A1 | 6/2018 | Olsson et al. |
| 2018/0183986 | A1 | 6/2018 | Smith et al. |
| 2018/0188048 | A1 | 7/2018 | Ding et al. |
| 2018/0188802 | A1 | 7/2018 | Okumura |
| 2018/0190003 | A1 | 7/2018 | Upadhyay et al. |
| 2018/0197336 | A1 | 7/2018 | Rochford et al. |
| 2018/0197341 | A1 | 7/2018 | Loberg et al. |
| 2018/0210628 | A1 | 7/2018 | Mcphee et al. |
| 2018/0218214 | A1 | 8/2018 | Pestun et al. |
| 2018/0220195 | A1 | 8/2018 | Panchaksharaiah et al. |
| 2018/0239144 | A1 | 8/2018 | Woods et al. |
| 2018/0247449 | A1 | 8/2018 | Park et al. |
| 2018/0275753 | A1 | 9/2018 | Publicover et al. |
| 2018/0286126 | A1 | 10/2018 | Schwarz et al. |
| 2018/0288206 | A1 | 10/2018 | Stimpson et al. |
| 2018/0300023 | A1 | 10/2018 | Hein |
| 2018/0300952 | A1 | 10/2018 | Evans et al. |
| 2018/0302687 | A1 | 10/2018 | Bhattacharjee et al. |
| 2018/0315248 | A1 | 11/2018 | Bastov et al. |
| 2018/0330544 | A1 | 11/2018 | Corso et al. |
| 2018/0330550 | A1 | 11/2018 | Takahashi |
| 2018/0348010 | A1 | 12/2018 | Coleman et al. |
| 2018/0348861 | A1 | 12/2018 | Uscinski et al. |
| 2018/0348986 | A1 | 12/2018 | Sawaki |
| 2018/0350099 | A1 | 12/2018 | Yerkes et al. |
| 2018/0350119 | A1 | 12/2018 | Kocharlakota et al. |
| 2018/0352374 | A1 | 12/2018 | Ball et al. |
| 2019/0005055 | A1 | 1/2019 | Andrew et al. |
| 2019/0012060 | A1 | 1/2019 | Moore et al. |
| 2019/0018479 | A1 | 1/2019 | Minami |
| 2019/0018498 | A1 | 1/2019 | West et al. |
| 2019/0034076 | A1 | 1/2019 | Vinayak et al. |
| 2019/0037137 | A1 | 1/2019 | Toksvig et al. |
| 2019/0043259 | A1 | 2/2019 | Wang et al. |
| 2019/0050062 | A1 | 2/2019 | Chen et al. |
| 2019/0056785 | A1 | 2/2019 | Suk |
| 2019/0065027 | A1 | 2/2019 | Hauenstein et al. |
| 2019/0073109 | A1 | 3/2019 | Zhang et al. |
| 2019/0080572 | A1 | 3/2019 | Kim et al. |
| 2019/0088149 | A1 | 3/2019 | Fink et al. |
| 2019/0094963 | A1 | 3/2019 | Nijs |
| 2019/0094979 | A1 | 3/2019 | Hall et al. |
| 2019/0096134 | A1 | 3/2019 | Amacker et al. |
| 2019/0101991 | A1 | 4/2019 | Brennan |
| 2019/0102953 | A1 | 4/2019 | Lindsay et al. |
| 2019/0130622 | A1 | 5/2019 | Hoover et al. |
| 2019/0130633 | A1 | 5/2019 | Haddad et al. |
| 2019/0130733 | A1 | 5/2019 | Hodge |
| 2019/0138183 | A1 | 5/2019 | Rosas et al. |
| 2019/0146128 | A1 | 5/2019 | Cao et al. |
| 2019/0155495 | A1 | 5/2019 | Klein et al. |
| 2019/0164340 | A1 | 5/2019 | Pejic et al. |
| 2019/0172261 | A1 | 6/2019 | Alt et al. |
| 2019/0172262 | A1 | 6/2019 | Mchugh et al. |
| 2019/0180504 | A1 | 6/2019 | Pomerantz et al. |
| 2019/0188895 | A1 | 6/2019 | Miller et al. |
| 2019/0188918 | A1 | 6/2019 | Brewer et al. |
| 2019/0204906 | A1 | 7/2019 | Ross et al. |
| 2019/0212827 | A1 | 7/2019 | Kin et al. |
| 2019/0213389 | A1 | 7/2019 | Peruch et al. |
| 2019/0227763 | A1 | 7/2019 | Kaufthal |
| 2019/0228503 | A1 | 7/2019 | Tokuchi |
| 2019/0228589 | A1 | 7/2019 | Dascola et al. |
| 2019/0238818 | A1 | 8/2019 | Held et al. |
| 2019/0244434 | A1* | 8/2019 | Pahud .................... G06F 3/012 |
| 2019/0251884 | A1 | 8/2019 | Burns et al. |
| 2019/0258365 | A1 | 8/2019 | Zurmoehle et al. |
| 2019/0265828 | A1 | 8/2019 | Hauenstein et al. |
| 2019/0266774 | A1 | 8/2019 | Sommerlade et al. |
| 2019/0277651 | A1 | 9/2019 | Ruikar |
| 2019/0278432 | A1 | 9/2019 | Bennett et al. |
| 2019/0279407 | A1 | 9/2019 | Mchugh et al. |
| 2019/0287307 | A1* | 9/2019 | Rogers .................... G06T 15/08 |
| 2019/0294312 | A1 | 9/2019 | Rohrbacher |

(56) References Cited

U.S. PATENT DOCUMENTS

2019/0302977 A1 10/2019 Pendergast et al.
2019/0310757 A1* 10/2019 Lee ........................ H04N 7/157
2019/0311547 A1 10/2019 Ohmori
2019/0324529 A1 10/2019 Stellmach et al.
2019/0325654 A1 10/2019 Stisser et al.
2019/0332244 A1 10/2019 Beszteri et al.
2019/0332250 A1 10/2019 Lee et al.
2019/0333278 A1 10/2019 Palangie et al.
2019/0340816 A1 11/2019 Rogers
2019/0340832 A1 11/2019 Srinivasan et al.
2019/0346678 A1 11/2019 Nocham
2019/0346922 A1 11/2019 Young et al.
2019/0349575 A1 11/2019 Knepper et al.
2019/0354259 A1 11/2019 Park
2019/0361521 A1 11/2019 Stellmach et al.
2019/0362557 A1 11/2019 Lacey et al.
2019/0362560 A1 11/2019 Choi et al.
2019/0369569 A1 12/2019 Olsen et al.
2019/0370492 A1 12/2019 Falchuk et al.
2019/0371072 A1 12/2019 Lindberg et al.
2019/0371279 A1 12/2019 Mak
2019/0377487 A1 12/2019 Bailey et al.
2019/0379765 A1 12/2019 Fajt et al.
2019/0384406 A1 12/2019 Smith et al.
2019/0392830 A1 12/2019 Abdollahian
2020/0004401 A1 1/2020 Hwang et al.
2020/0005539 A1 1/2020 Hwang et al.
2020/0012341 A1 1/2020 Stellmach et al.
2020/0020157 A1 1/2020 Powers et al.
2020/0026349 A1 1/2020 Fontanel et al.
2020/0026922 A1 1/2020 Pekelny et al.
2020/0038120 A1 2/2020 Ziraknejad et al.
2020/0043243 A1 2/2020 Bhushan et al.
2020/0045249 A1 2/2020 Francois et al.
2020/0048825 A1 2/2020 Schultz et al.
2020/0051527 A1 2/2020 Ngo
2020/0073521 A1 3/2020 Peebler et al.
2020/0081526 A1 3/2020 Walker et al.
2020/0082602 A1 3/2020 Jones
2020/0089314 A1 3/2020 Poupyrev et al.
2020/0092537 A1 3/2020 Sutter et al.
2020/0097077 A1 3/2020 Nguyen et al.
2020/0098140 A1 3/2020 Jagnow et al.
2020/0098173 A1 3/2020 Mccall
2020/0099989 A1 3/2020 Niemirska et al.
2020/0106965 A1 4/2020 Malia et al.
2020/0112711 A1 4/2020 Enriquez et al.
2020/0117213 A1 4/2020 Tian et al.
2020/0126291 A1 4/2020 Nguyen et al.
2020/0126301 A1 4/2020 Kim et al.
2020/0128227 A1 4/2020 Chavez et al.
2020/0128232 A1 4/2020 Hwang et al.
2020/0129850 A1 4/2020 Ohashi
2020/0135141 A1 4/2020 Day et al.
2020/0159017 A1 5/2020 Lin et al.
2020/0201444 A1 6/2020 Stoyles et al.
2020/0214682 A1 7/2020 Zaslavsky et al.
2020/0218074 A1 7/2020 Hoover et al.
2020/0225735 A1 7/2020 Schwarz
2020/0225746 A1 7/2020 Bar-Zeev et al.
2020/0225747 A1 7/2020 Bar-Zeev et al.
2020/0225830 A1 7/2020 Tang et al.
2020/0226814 A1 7/2020 Tang et al.
2020/0226823 A1 7/2020 Stachniak et al.
2020/0242844 A1 7/2020 Bae et al.
2020/0257245 A1 8/2020 Linville et al.
2020/0257484 A1 8/2020 Qian et al.
2020/0267326 A1 8/2020 Mm
2020/0272303 A1 8/2020 Jia et al.
2020/0285314 A1 9/2020 Cieplinski et al.
2020/0286299 A1 9/2020 Wang et al.
2020/0318955 A1 10/2020 Sharapov et al.
2020/0319704 A1 10/2020 Kathuria et al.
2020/0322178 A1 10/2020 Wang et al.
2020/0322575 A1 10/2020 Valli
2020/0328913 A1 10/2020 Wyas et al.
2020/0356221 A1 11/2020 Behzadi et al.
2020/0357184 A1 11/2020 Paul et al.
2020/0357374 A1 11/2020 Verweij et al.
2020/0363867 A1 11/2020 Azimi et al.
2020/0371602 A1 11/2020 Kanda
2020/0371673 A1 11/2020 Faulkner
2020/0379626 A1 12/2020 Guyomard et al.
2020/0387214 A1 12/2020 Ravasz et al.
2020/0387228 A1 12/2020 Ravasz et al.
2020/0387287 A1 12/2020 Ravasz et al.
2020/0401687 A1 12/2020 Mak
2020/0410960 A1 12/2020 Saito et al.
2020/0412862 A1 12/2020 Oh et al.
2021/0011556 A1 1/2021 Atlas et al.
2021/0019036 A1 1/2021 Wang et al.
2021/0034163 A1 2/2021 Goel et al.
2021/0034319 A1 2/2021 Wang et al.
2021/0049826 A1 2/2021 Takahashi
2021/0055789 A1 2/2021 Tsai et al.
2021/0056748 A1 2/2021 Pritchett
2021/0067418 A1 3/2021 Ely et al.
2021/0074062 A1 3/2021 Madonna et al.
2021/0090222 A1 3/2021 Lee et al.
2021/0090337 A1 3/2021 Ravasz et al.
2021/0090348 A1 3/2021 Croxford et al.
2021/0096726 A1* 4/2021 Faulkner ................. G06F 3/013
2021/0097766 A1 4/2021 Palangie et al.
2021/0097776 A1 4/2021 Faulkner et al.
2021/0102820 A1 4/2021 Le et al.
2021/0103333 A1 4/2021 Cieplinski et al.
2021/0125414 A1 4/2021 Berkebile
2021/0132687 A1 5/2021 Luo et al.
2021/0134069 A1 5/2021 Sorrento
2021/0134248 A1 5/2021 Wan et al.
2021/0142552 A1 5/2021 Kimura et al.
2021/0158624 A1 5/2021 Moon et al.
2021/0165484 A1 6/2021 Suguhara et al.
2021/0165923 A1 6/2021 Johnston
2021/0166437 A1 6/2021 Legendre et al.
2021/0173340 A1 6/2021 Kim
2021/0173536 A1 6/2021 Kondo
2021/0191600 A1 6/2021 Lemay et al.
2021/0225043 A1 7/2021 Tang et al.
2021/0227601 A1 7/2021 Eom et al.
2021/0241483 A1 8/2021 Dryer et al.
2021/0248674 A1 8/2021 Ogunbunmi
2021/0272367 A1 9/2021 Richter
2021/0272537 A1* 9/2021 Mak ....................... G06V 20/20
2021/0279957 A1 9/2021 Eder et al.
2021/0279967 A1 9/2021 Gernoth et al.
2021/0286502 A1 9/2021 Lemay et al.
2021/0287439 A1 9/2021 Goodrich et al.
2021/0295592 A1 9/2021 Von Cramon
2021/0295602 A1 9/2021 Scapel et al.
2021/0303074 A1 9/2021 Vanblon et al.
2021/0303107 A1 9/2021 Pla I Conesa et al.
2021/0312684 A1 10/2021 Zimmermann et al.
2021/0312713 A1 10/2021 Peri et al.
2021/0312717 A1 10/2021 Mao
2021/0319617 A1 10/2021 Ahn et al.
2021/0326094 A1 10/2021 Buerli et al.
2021/0327140 A1 10/2021 Rothkopf et al.
2021/0331069 A1 10/2021 Gustafson et al.
2021/0333864 A1 10/2021 Harvey et al.
2021/0339134 A1 11/2021 Knoppert
2021/0350564 A1 11/2021 Peuhkurinen et al.
2021/0350604 A1 11/2021 Pejsa et al.
2021/0350634 A1 11/2021 Major et al.
2021/0352172 A1 11/2021 Kim et al.
2021/0358294 A1 11/2021 Parashar et al.
2021/0365108 A1 11/2021 Burns et al.
2021/0366440 A1 11/2021 Burns et al.
2021/0368136 A1 11/2021 Chalmers et al.
2021/0374221 A1 12/2021 Markhasin et al.
2021/0375022 A1 12/2021 Lee et al.
2021/0383097 A1 12/2021 Guerard et al.
2021/0400744 A1 12/2021 Chen et al.
2021/0402306 A1 12/2021 Huang

(56) References Cited

U.S. PATENT DOCUMENTS

| | | | |
|---|---|---|---|
| 2021/0405760 | A1 | 12/2021 | Schoen |
| 2022/0011577 | A1 | 1/2022 | Lawver et al. |
| 2022/0011855 | A1 | 1/2022 | Hazra et al. |
| 2022/0012002 | A1 | 1/2022 | Bar-zeev et al. |
| 2022/0027115 | A1 | 1/2022 | Haapoja et al. |
| 2022/0028108 | A1 | 1/2022 | Haapoja et al. |
| 2022/0030197 | A1 | 1/2022 | Ishimoto |
| 2022/0070241 | A1 | 3/2022 | Yerli |
| 2022/0076496 | A1 | 3/2022 | Palangie et al. |
| 2022/0083145 | A1 | 3/2022 | Matsunaga et al. |
| 2022/0083197 | A1 | 3/2022 | Rockel et al. |
| 2022/0084279 | A1 | 3/2022 | Lindmeier et al. |
| 2022/0086203 | A1 | 3/2022 | Morris et al. |
| 2022/0086205 | A1 | 3/2022 | Lebeau et al. |
| 2022/0091722 | A1 | 3/2022 | Faulkner et al. |
| 2022/0091723 | A1 | 3/2022 | Faulkner et al. |
| 2022/0092862 | A1 | 3/2022 | Faulkner et al. |
| 2022/0100265 | A1 | 3/2022 | Kies et al. |
| 2022/0100270 | A1 | 3/2022 | Pastrana Vicente et al. |
| 2022/0101593 | A1 | 3/2022 | Rockel et al. |
| 2022/0101612 | A1 | 3/2022 | Palangie et al. |
| 2022/0121275 | A1 | 4/2022 | Balaji et al. |
| 2022/0121344 | A1 | 4/2022 | Pastrana Vicente et al. |
| 2022/0122303 | A1 | 4/2022 | Sasikumar et al. |
| 2022/0124286 | A1 | 4/2022 | Punwani et al. |
| 2022/0130107 | A1 | 4/2022 | Lindh |
| 2022/0130126 | A1 | 4/2022 | Delgado et al. |
| 2022/0137701 | A1 | 5/2022 | Bowman et al. |
| 2022/0137705 | A1 | 5/2022 | Hashimoto et al. |
| 2022/0148257 | A1 | 5/2022 | Boubekeur et al. |
| 2022/0155853 | A1 | 5/2022 | Fan et al. |
| 2022/0155863 | A1 | 5/2022 | Wang et al. |
| 2022/0155909 | A1 | 5/2022 | Kawashima et al. |
| 2022/0157029 | A1 | 5/2022 | Horita et al. |
| 2022/0157083 | A1 | 5/2022 | Jandhyala et al. |
| 2022/0165013 | A1 | 5/2022 | Velez et al. |
| 2022/0179503 | A1 | 6/2022 | Timonen et al. |
| 2022/0191570 | A1 | 6/2022 | Reid et al. |
| 2022/0197403 | A1 | 6/2022 | Hughes et al. |
| 2022/0198755 | A1 | 6/2022 | Pinchon |
| 2022/0206298 | A1 | 6/2022 | Goodman |
| 2022/0207840 | A1 | 6/2022 | Cansizoglu et al. |
| 2022/0214743 | A1 | 7/2022 | Dascola et al. |
| 2022/0221976 | A1 | 7/2022 | Agarwal et al. |
| 2022/0229524 | A1 | 7/2022 | Mckenzie et al. |
| 2022/0229534 | A1 | 7/2022 | Terre et al. |
| 2022/0232191 | A1 | 7/2022 | Kawakami et al. |
| 2022/0236801 | A1 | 7/2022 | Serbanati et al. |
| 2022/0239718 | A1 | 7/2022 | Song et al. |
| 2022/0244536 | A1 | 8/2022 | Sha et al. |
| 2022/0245888 | A1 | 8/2022 | Singh et al. |
| 2022/0253125 | A1 | 8/2022 | Wallen et al. |
| 2022/0253136 | A1 | 8/2022 | Holder et al. |
| 2022/0253194 | A1 | 8/2022 | Berliner et al. |
| 2022/0255995 | A1 | 8/2022 | Berliner et al. |
| 2022/0277533 | A1 | 9/2022 | Park |
| 2022/0279303 | A1 | 9/2022 | Marculescu et al. |
| 2022/0286488 | A1 | 9/2022 | Berliner et al. |
| 2022/0287676 | A1 | 9/2022 | Steines et al. |
| 2022/0291808 | A1 | 9/2022 | Stevens et al. |
| 2022/0292783 | A1 | 9/2022 | Jayaram et al. |
| 2022/0292784 | A1 | 9/2022 | Jayaram et al. |
| 2022/0292785 | A1 | 9/2022 | Jayaram et al. |
| 2022/0295032 | A1 | 9/2022 | Jayaram et al. |
| 2022/0295040 | A1 | 9/2022 | Jayaram et al. |
| 2022/0295139 | A1 | 9/2022 | Jayaram et al. |
| 2022/0301264 | A1 | 9/2022 | O'Leary et al. |
| 2022/0303680 | A1 | 9/2022 | Ahmed et al. |
| 2022/0311950 | A1 | 9/2022 | Ith et al. |
| 2022/0317776 | A1 | 10/2022 | Sundstrom et al. |
| 2022/0319134 | A1 | 10/2022 | Rodrigues et al. |
| 2022/0319453 | A1 | 10/2022 | Llull et al. |
| 2022/0326837 | A1 | 10/2022 | Dessero et al. |
| 2022/0335697 | A1 | 10/2022 | Harding et al. |
| 2022/0350463 | A1 | 11/2022 | Walkin et al. |
| 2022/0365595 | A1 | 11/2022 | Cieplinski et al. |
| 2022/0365740 | A1 | 11/2022 | Chang et al. |
| 2022/0374136 | A1 | 11/2022 | Chang et al. |
| 2022/0382385 | A1 | 12/2022 | Chen et al. |
| 2022/0383592 | A1 | 12/2022 | Hare et al. |
| 2022/0391158 | A1 | 12/2022 | Lemmens et al. |
| 2022/0392169 | A1 | 12/2022 | Simpson et al. |
| 2022/0397962 | A1 | 12/2022 | Goel et al. |
| 2022/0408164 | A1 | 12/2022 | Lee et al. |
| 2022/0413691 | A1 | 12/2022 | Becker et al. |
| 2022/0414975 | A1 | 12/2022 | Becker et al. |
| 2022/0414999 | A1 | 12/2022 | Ravasz et al. |
| 2022/0415094 | A1 | 12/2022 | Kim et al. |
| 2023/0007335 | A1 | 1/2023 | Gupta et al. |
| 2023/0008537 | A1 | 1/2023 | Henderson et al. |
| 2023/0009683 | A1 | 1/2023 | Biran et al. |
| 2023/0021861 | A1 | 1/2023 | Fujiwara et al. |
| 2023/0027040 | A1 | 1/2023 | Wang et al. |
| 2023/0030699 | A1 | 2/2023 | Zion et al. |
| 2023/0031832 | A1 | 2/2023 | Lipton et al. |
| 2023/0032545 | A1 | 2/2023 | Mindlin et al. |
| 2023/0032771 | A1 | 2/2023 | Zion et al. |
| 2023/0068660 | A1 | 3/2023 | Brent et al. |
| 2023/0074080 | A1 | 3/2023 | Miller et al. |
| 2023/0076326 | A1 | 3/2023 | Xu et al. |
| 2023/0086766 | A1 | 3/2023 | Olwal et al. |
| 2023/0092282 | A1 | 3/2023 | Boesel et al. |
| 2023/0092874 | A1 | 3/2023 | Krivoruchko et al. |
| 2023/0093979 | A1 | 3/2023 | Stauber et al. |
| 2023/0094522 | A1 | 3/2023 | Stauber et al. |
| 2023/0100610 | A1 | 3/2023 | Pastrana Vicente et al. |
| 2023/0100689 | A1 | 3/2023 | Chiu et al. |
| 2023/0103161 | A1 | 3/2023 | Li et al. |
| 2023/0114080 | A1 | 4/2023 | Yang et al. |
| 2023/0119162 | A1 | 4/2023 | Lipton et al. |
| 2023/0120052 | A1 | 4/2023 | Wallen et al. |
| 2023/0130520 | A1 | 4/2023 | Kaptelinin |
| 2023/0152889 | A1 | 5/2023 | Cieplinski et al. |
| 2023/0152935 | A1 | 5/2023 | Mckenzie et al. |
| 2023/0154122 | A1 | 5/2023 | Dascola et al. |
| 2023/0163987 | A1 | 5/2023 | Young et al. |
| 2023/0168745 | A1 | 6/2023 | Yoda |
| 2023/0176806 | A1 | 6/2023 | Chen et al. |
| 2023/0206572 | A1 | 6/2023 | Pazmino et al. |
| 2023/0206921 | A1 | 6/2023 | Edelsburg et al. |
| 2023/0221833 | A1 | 7/2023 | Holder et al. |
| 2023/0236660 | A1 | 7/2023 | Kundu |
| 2023/0244857 | A1 | 8/2023 | Weiss et al. |
| 2023/0259265 | A1 | 8/2023 | Krivoruchko et al. |
| 2023/0260240 | A1 | 8/2023 | Jayaram et al. |
| 2023/0266859 | A1 | 8/2023 | Day et al. |
| 2023/0273706 | A1 | 8/2023 | Smith et al. |
| 2023/0274504 | A1 | 8/2023 | Ren et al. |
| 2023/0290042 | A1 | 9/2023 | Casella et al. |
| 2023/0308610 | A1 | 9/2023 | Henderson et al. |
| 2023/0308630 | A1 | 9/2023 | Delgado |
| 2023/0314801 | A1 | 10/2023 | Bove et al. |
| 2023/0315270 | A1 | 10/2023 | Hylak et al. |
| 2023/0315385 | A1 | 10/2023 | Akmal et al. |
| 2023/0316634 | A1 | 10/2023 | Chiu et al. |
| 2023/0316658 | A1 | 10/2023 | Smith et al. |
| 2023/0325003 | A1 | 10/2023 | Gitter et al. |
| 2023/0325004 | A1 | 10/2023 | Burns et al. |
| 2023/0325046 | A1 | 10/2023 | De Almeida E De Vincenzo et al. |
| 2023/0333646 | A1 | 10/2023 | Pastrana Vicente et al. |
| 2023/0334808 | A1 | 10/2023 | Sundstrom et al. |
| 2023/0341932 | A1 | 10/2023 | Silva et al. |
| 2023/0343049 | A1 | 10/2023 | Boesel et al. |
| 2023/0350537 | A1 | 11/2023 | Hylak et al. |
| 2023/0350539 | A1 | 11/2023 | Owen et al. |
| 2023/0351702 | A1 | 11/2023 | Tan et al. |
| 2023/0353398 | A1 | 11/2023 | White |
| 2023/0359199 | A1 | 11/2023 | Adachi et al. |
| 2023/0368475 | A1 | 11/2023 | Chan et al. |
| 2023/0377259 | A1 | 11/2023 | Becker et al. |
| 2023/0377268 | A1 | 11/2023 | Hopkins et al. |
| 2023/0377295 | A1 | 11/2023 | Angevine et al. |
| 2023/0377299 | A1 | 11/2023 | Becker et al. |

(56) References Cited

U.S. PATENT DOCUMENTS

2023/0377300 A1 11/2023 Becker et al.
2023/0384907 A1 11/2023 Boesel et al.
2023/0385532 A1 11/2023 Mcveigh et al.
2023/0388357 A1 11/2023 Faulkner et al.
2023/0394755 A1 12/2023 Negoita et al.
2023/0396854 A1 12/2023 Sanders et al.
2023/0400958 A1 12/2023 Morrison et al.
2024/0012530 A1 1/2024 Lin et al.
2024/0037886 A1 2/2024 Chiu et al.
2024/0062279 A1 2/2024 Scully et al.
2024/0070948 A1 2/2024 Bradley et al.
2024/0086031 A1 3/2024 Palangie et al.
2024/0086032 A1 3/2024 Palangie et al.
2024/0087256 A1 3/2024 Hylak et al.
2024/0094863 A1 3/2024 Smith et al.
2024/0094866 A1 3/2024 Lemay et al.
2024/0094882 A1 3/2024 Brewer et al.
2024/0095984 A1 3/2024 Ren et al.
2024/0102821 A1 3/2024 Vallet et al.
2024/0103616 A1 3/2024 Yerkes et al.
2024/0103636 A1 3/2024 Lindmeier et al.
2024/0103676 A1 3/2024 Pastrana Vicente et al.
2024/0103681 A1 3/2024 Broughton et al.
2024/0103684 A1 3/2024 Yu et al.
2024/0103685 A1 3/2024 Pazmino et al.
2024/0103686 A1 3/2024 Pazmino et al.
2024/0103687 A1 3/2024 Pastrana Vicente et al.
2024/0103701 A1 3/2024 Pastrana Vicente et al.
2024/0103704 A1 3/2024 Pastrana Vicente et al.
2024/0103707 A1 3/2024 Henderson et al.
2024/0103716 A1 3/2024 Pastrana Vicente et al.
2024/0103803 A1 3/2024 Krivoruchko et al.
2024/0104843 A1 3/2024 Mckenzie et al.
2024/0104870 A1 3/2024 Fuste Lleixa et al.
2024/0104873 A1 3/2024 Pastrana Vicente et al.
2024/0104875 A1 3/2024 Couche et al.
2024/0104876 A1 3/2024 Couche et al.
2024/0104877 A1 3/2024 Henderson et al.
2024/0111479 A1 4/2024 Paul
2024/0119682 A1 4/2024 Rudman et al.
2024/0126362 A1 4/2024 Burns et al.
2024/0135612 A1 4/2024 Hold-geoffroy et al.
2024/0152245 A1 5/2024 Broughton et al.
2024/0152256 A1 5/2024 Dascola et al.
2024/0185514 A1 6/2024 Singh et al.
2024/0192764 A1 6/2024 Dascola et al.
2024/0193892 A1 6/2024 Lutter et al.
2024/0200967 A1 6/2024 Arroyo et al.
2024/0203066 A1 6/2024 Kawashima et al.
2024/0205509 A1 6/2024 Kim et al.
2024/0221273 A1 7/2024 Dusseau et al.
2024/0221291 A1 7/2024 Henderson et al.
2024/0233097 A1 7/2024 Ngo et al.
2024/0233288 A1 7/2024 Stauber et al.
2024/0256032 A1 8/2024 Holder et al.
2024/0265656 A1 8/2024 Victor-faichney et al.
2024/0265796 A1 8/2024 Ippadi Veerabhadre Gowda et al.
2024/0272722 A1 8/2024 Gitter et al.
2024/0272782 A1 8/2024 Pastrana Vicente et al.
2024/0273838 A1 8/2024 Palangie et al.
2024/0281108 A1 8/2024 Krivoruchko et al.
2024/0281109 A1 8/2024 Manjunath et al.
2024/0291953 A1 8/2024 Cerra et al.
2024/0297919 A1 9/2024 Berliner et al.
2024/0302948 A1 9/2024 Hylak et al.
2024/0310971 A1 9/2024 Kawashima et al.
2024/0329797 A1 10/2024 Hylak et al.
2024/0338104 A1 10/2024 Salter et al.
2024/0338921 A1 10/2024 Burgner et al.
2024/0361832 A1 10/2024 Calderone et al.
2024/0361833 A1 10/2024 Calderone et al.
2024/0361835 A1 10/2024 Hylak et al.
2024/0361901 A1 10/2024 Ravasz et al.
2024/0393876 A1 11/2024 Chawda et al.
2024/0402800 A1 12/2024 Shutzberg et al.
2024/0402821 A1 12/2024 Meyer et al.
2024/0403080 A1 12/2024 Laurita et al.
2024/0404206 A1 12/2024 Chiu et al.
2024/0404207 A1 12/2024 Laurita et al.
2024/0404232 A1 12/2024 Rockwell et al.
2024/0404233 A1 12/2024 Boesel et al.
2024/0411444 A1 12/2024 Shutzberg et al.
2024/0420435 A1 12/2024 Gitter et al.
2024/0428488 A1 12/2024 Ren et al.
2025/0005855 A1 1/2025 Holder et al.
2025/0005864 A1 1/2025 Dessero et al.
2025/0008057 A1 1/2025 Chiu et al.
2025/0013343 A1 1/2025 Smith et al.
2025/0013344 A1 1/2025 Smith et al.
2025/0024008 A1 1/2025 Cerra et al.
2025/0028423 A1 1/2025 Dessero et al.
2025/0029319 A1 1/2025 Boesel et al.
2025/0029328 A1 1/2025 Smith et al.
2025/0031002 A1 1/2025 Hawkins et al.
2025/0036253 A1 1/2025 Stauber et al.
2025/0036255 A1 1/2025 Pastrana Vicente et al.
2025/0069328 A1 2/2025 Herscher et al.
2025/0077060 A1 3/2025 Becker et al.
2025/0077066 A1 3/2025 Lutter
2025/0078420 A1 3/2025 Dessero et al.
2025/0078429 A1 3/2025 Dascola et al.
2025/0103132 A1 3/2025 Rickwald et al.
2025/0104335 A1 3/2025 Huang et al.
2025/0104367 A1 3/2025 Huang et al.
2025/0106581 A1 3/2025 Lutter et al.
2025/0106582 A1 3/2025 Lutter et al.
2025/0110605 A1 4/2025 Huang et al.
2025/0111472 A1 4/2025 Lutter et al.
2025/0111605 A1 4/2025 Huang et al.
2025/0111622 A1 4/2025 Stern et al.
2025/0111626 A1 4/2025 Deliz Centeno et al.
2025/0117079 A1 4/2025 Chiu et al.
2025/0118038 A1 4/2025 Sorrentino et al.
2025/0130707 A1 4/2025 Stauber et al.
2025/0156031 A1 5/2025 Holder et al.
2025/0157136 A1 5/2025 Lindmeier et al.
2025/0165069 A1 5/2025 Calderone et al.
2025/0199656 A1 6/2025 Lipton et al.
2025/0200901 A1 6/2025 Ren et al.
2025/0209744 A1 6/2025 Piemonte et al.
2025/0209753 A1 6/2025 Piemonte et al.
2025/0224811 A1 7/2025 Lindmeier et al.
2025/0232541 A1 7/2025 Chand et al.
2025/0258577 A1 8/2025 Palangie et al.
2025/0278134 A1 9/2025 Pastrana Vicente et al.
2025/0278166 A1 9/2025 Mckenzie et al.
2025/0278907 A1 9/2025 Pazmino et al.
2025/0284344 A1 9/2025 Sundstrom et al.

FOREIGN PATENT DOCUMENTS

CN 104714771 A 6/2015
CN 104981681 A 10/2015
CN 105264461 A 1/2016
CN 105264478 A 1/2016
CN 106575149 A 4/2017
CN 106990838 A 7/2017
CN 108519818 A 9/2018
CN 108563335 A 9/2018
CN 108633307 A 10/2018
CN 110413171 A 11/2019
CN 110476142 A 11/2019
CN 110543230 A 12/2019
CN 110673718 A 1/2020
CN 110830786 A 2/2020
CN 111033572 A 4/2020
CN 111213183 A 5/2020
CN 111488056 A 8/2020
CN 111580652 A 8/2020
CN 111641843 A 9/2020
CN 111913565 A 11/2020
CN 112068757 A 12/2020
CN 113168737 A 7/2021
CN 109491508 B 8/2022

(56) References Cited

FOREIGN PATENT DOCUMENTS

| | | | |
|---|---|---|---|
| CN | 115309271 | A | 11/2022 |
| CN | 116132905 | A | 5/2023 |
| CN | 117043722 | A | 11/2023 |
| CN | 117857981 | A | 4/2024 |
| CN | 118102204 | A | 5/2024 |
| DE | 102016125811 | A1 | 11/2017 |
| DE | 102020101675 | A1 | 7/2020 |
| DE | 102020128536 | A1 | 5/2021 |
| EP | 0816983 | A2 | 1/1998 |
| EP | 1530115 | A2 | 5/2005 |
| EP | 1562021 | A1 | 8/2005 |
| EP | 2393056 | A1 | 12/2011 |
| EP | 2458486 | A1 | 5/2012 |
| EP | 2551763 | A1 | 1/2013 |
| EP | 2741175 | A2 | 6/2014 |
| EP | 2893297 | A1 | 7/2015 |
| EP | 2947545 | A1 | 11/2015 |
| EP | 3088997 | A1 | 11/2016 |
| EP | 3118722 | A1 | 1/2017 |
| EP | 3249497 | A1 | 11/2017 |
| EP | 3306444 | A1 | 4/2018 |
| EP | 3316075 | A1 | 5/2018 |
| EP | 3336805 | A1 | 6/2018 |
| EP | 3451135 | A1 | 3/2019 |
| EP | 3503101 | A1 | 6/2019 |
| EP | 3506151 | A1 | 7/2019 |
| EP | 3570144 | A1 | 11/2019 |
| EP | 3588255 | A1 | 1/2020 |
| EP | 3654147 | A1 | 5/2020 |
| EP | 4155867 | A1 | 3/2023 |
| EP | 3688726 | B1 | 8/2023 |
| GB | 2540791 | A | 2/2017 |
| JP | H06-4596 | A | 1/1994 |
| JP | H10-51711 | A | 2/1998 |
| JP | H10-78845 | A | 3/1998 |
| JP | H11289555 | A | 10/1999 |
| JP | 2000163031 | A | 6/2000 |
| JP | 2002342033 | A | 11/2002 |
| JP | 2004510239 | A | 4/2004 |
| JP | 2005-215144 | A | 8/2005 |
| JP | 2005-333524 | A | 12/2005 |
| JP | 2006004093 | A | 1/2006 |
| JP | 2006-107048 | A | 4/2006 |
| JP | 2006-146803 | A | 6/2006 |
| JP | 2006-295236 | A | 10/2006 |
| JP | 2011-203880 | A | 10/2011 |
| JP | 2012-234550 | A | 11/2012 |
| JP | 2013-196158 | A | 9/2013 |
| JP | 2013178639 | A | 9/2013 |
| JP | 2013-254358 | A | 12/2013 |
| JP | 2013-257716 | A | 12/2013 |
| JP | 2014-21565 | A | 2/2014 |
| JP | 2014-59840 | A | 4/2014 |
| JP | 2014-71663 | A | 4/2014 |
| JP | 2014-99184 | A | 5/2014 |
| JP | 2014-514652 | A | 6/2014 |
| JP | 2014514653 | A | 6/2014 |
| JP | 2015-56173 | A | 3/2015 |
| JP | 2015-515040 | A | 5/2015 |
| JP | 2015-118332 | A | 6/2015 |
| JP | 2015222565 | A | 12/2015 |
| JP | 2016-96513 | A | 5/2016 |
| JP | 2016-194744 | A | 11/2016 |
| JP | 2017-27206 | A | 2/2017 |
| JP | 2017-58528 | A | 3/2017 |
| JP | 2017126009 | A | 7/2017 |
| JP | 2017525002 | A | 8/2017 |
| JP | 2017531221 | A | 10/2017 |
| JP | 2018-5516 | A | 1/2018 |
| JP | 2018-5517 | A | 1/2018 |
| JP | 2018-41477 | A | 3/2018 |
| JP | 2018514005 | A | 5/2018 |
| JP | 2018088118 | A | 6/2018 |
| JP | 2018101019 | A | 6/2018 |
| JP | 2018-106499 | A | 7/2018 |
| JP | 6438869 | B2 | 12/2018 |
| JP | 2019-40333 | A | 3/2019 |
| JP | 2019515361 | A | 6/2019 |
| JP | 2019-169154 | A | 10/2019 |
| JP | 2019-175449 | A | 10/2019 |
| JP | 2019527881 | A | 10/2019 |
| JP | 2019532382 | A | 11/2019 |
| JP | 2019-536131 | A | 12/2019 |
| JP | 2020503595 | A | 1/2020 |
| JP | 2020086913 | A | 6/2020 |
| JP | 2022-53334 | A | 4/2022 |
| JP | 2022175629 | A | 11/2022 |
| JP | 2023052278 | A | 4/2023 |
| KR | 20110017236 | A | 2/2011 |
| KR | 20110128487 | A | 11/2011 |
| KR | 20140097654 | A | 8/2014 |
| KR | 10-2016-0012139 | A | 2/2016 |
| KR | 20170027240 | A | 3/2017 |
| KR | 20180102171 | A | 9/2018 |
| KR | 10-2019-0100957 | A | 8/2019 |
| KR | 20200010296 | A | 1/2020 |
| KR | 20200035103 | A | 4/2020 |
| KR | 20200110788 | A | 9/2020 |
| KR | 20200135496 | A | 12/2020 |
| KR | 20210083016 | A | 7/2021 |
| KR | 20210123530 | A | 10/2021 |
| WO | 2010/026519 | A1 | 3/2010 |
| WO | 2011/008638 | A1 | 1/2011 |
| WO | 2012/145180 | A1 | 10/2012 |
| WO | 2013/169849 | A2 | 11/2013 |
| WO | 2013184447 | A2 | 12/2013 |
| WO | 2014/105276 | A1 | 7/2014 |
| WO | 2014190106 | A1 | 11/2014 |
| WO | 2014/203301 | A1 | 12/2014 |
| WO | 2015130150 | A1 | 9/2015 |
| WO | 2015/195216 | A1 | 12/2015 |
| WO | 2015192117 | A1 | 12/2015 |
| WO | 2016014877 | A1 | 1/2016 |
| WO | 2016118344 | A1 | 7/2016 |
| WO | 2016126522 | A1 | 8/2016 |
| WO | 2017024142 | A1 | 2/2017 |
| WO | 2017/088487 | A1 | 6/2017 |
| WO | 2018005557 | A1 | 1/2018 |
| WO | 2018/046957 | A2 | 3/2018 |
| WO | 2018090060 | A1 | 5/2018 |
| WO | 2018106299 | A1 | 6/2018 |
| WO | 2018116556 | A1 | 6/2018 |
| WO | 2018125428 | A1 | 7/2018 |
| WO | 2018/175735 | A1 | 9/2018 |
| WO | 2018213801 | A1 | 11/2018 |
| WO | 2019067902 | A1 | 4/2019 |
| WO | 2019074771 | A1 | 4/2019 |
| WO | 2019/142560 | A1 | 7/2019 |
| WO | 2019152286 | A2 | 8/2019 |
| WO | 2019172678 | A1 | 9/2019 |
| WO | 2019/217163 | A1 | 11/2019 |
| WO | 2019213111 | A1 | 11/2019 |
| WO | 2020/066682 | A1 | 4/2020 |
| WO | 2020105349 | A1 | 5/2020 |
| WO | 2020121483 | A1 | 6/2020 |
| WO | 2020179027 | A1 | 9/2020 |
| WO | 2020247256 | A1 | 12/2020 |
| WO | 2021061349 | A1 | 4/2021 |
| WO | 2021061351 | A1 | 4/2021 |
| WO | 2021133053 | A1 | 7/2021 |
| WO | 2021/173839 | A1 | 9/2021 |
| WO | 2021/202783 | A1 | 10/2021 |
| WO | 2021203856 | A1 | 10/2021 |
| WO | 2022/066399 | A1 | 3/2022 |
| WO | 2022/066535 | A2 | 3/2022 |
| WO | 2022055821 | A1 | 3/2022 |
| WO | 2022067075 | A1 | 3/2022 |
| WO | 2022067343 | A2 | 3/2022 |
| WO | 2022072187 | A2 | 4/2022 |
| WO | 2022/146936 | A1 | 7/2022 |
| WO | 2022/146938 | A1 | 7/2022 |
| WO | 2022/147146 | A1 | 7/2022 |
| WO | 2022192040 | A1 | 9/2022 |
| WO | 2022204664 | A1 | 9/2022 |

(56) References Cited

FOREIGN PATENT DOCUMENTS

| | | | |
|---|---|---|---|
| WO | 2022208797 | A1 | 10/2022 |
| WO | 2022225795 | A1 | 10/2022 |
| WO | 2023043646 | A1 | 3/2023 |
| WO | 2023096940 | A2 | 6/2023 |
| WO | 2023/141535 | A1 | 7/2023 |
| WO | 2024064373 | A1 | 3/2024 |

OTHER PUBLICATIONS

Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
Corrected Notice of Allowability received for U.S. Appl. No. 17/935,095, mailed on Oct. 18, 2024, 3 pages.
European Search Report received for European Patent Application No. 21801378.7, mailed on Jul. 10, 2024, 5 pages.
Extended European Search Report received for European Patent Application No. 24159868.9, mailed on Oct. 9, 2024, 13 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24179830.5, mailed on Nov. 5, 2024, 11 pages.
Final Office Action received for U.S. Appl. No. 14/531,874, mailed on Nov. 4, 2016, 10 pages.
Final Office Action received for U.S. Appl. No. 15/644,639, mailed on Sep. 19, 2019, 12 pages.
Final Office Action received for U.S. Appl. No. 17/202,034, mailed on May 4, 2023, 41 pages.
Final Office Action received for U.S. Appl. No. 17/202,034, mailed on Nov. 4, 2024, 50 pages.
Final Office Action received for U.S. Appl. No. 17/816,314, mailed on Jan. 20, 2023, 11 pages.
Final Office Action received for U.S. Appl. No. 17/935,095, mailed on Dec. 29, 2023, 15 pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
International Search Report received for PCT Application No. PCT/US2023/060052, mailed on May 24, 2023, 6 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/071518, mailed on Feb. 25, 2022, 7 pages.
International Search Report received for PCT Patent Application No. PCT/US2022/076985, mailed on Feb. 20, 2023, 5 pages.
International Search Report received for PCT Patent Application No. PCT/US2023/074793, mailed on Feb. 6, 2024, 6 pages.
International Search Report received for PCT Patent Application No. PCT/US2024/026102, mailed on Aug. 26, 2024, 5 pages.
Letter Restarting Period for Response received for U.S. Appl. No. 15/644,639, mailed on Sep. 28, 2018, 8 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.
Non-Final Office Action received for U.S. Appl. No. 17/816,314, mailed on Jul. 6, 2023, 10 pages.
Non-Final Office Action received for U.S. Appl. No. 17/816,314, mailed on Sep. 23, 2022, 10 pages.
Non-Final Office Action received for U.S. Appl. No. 17/935,095, mailed on Jun. 22, 2023, 15 pages.
Non-Final Office Action received for U.S. Appl. No. 18/154,697, mailed on Nov. 24, 2023, 10 pages.
Non-Final Office Action received for U.S. Appl. No. 18/322,469, mailed on Nov. 15, 2024, 34 pages.
Non-Final Office Action received for U.S. Appl. No. 18/336,770, mailed on Jun. 5, 2024, 12 pages.
Non-Final Office Action received for U.S. Appl. No. 18/473,196, mailed on Aug. 16, 2024, 21 pages.
Notice of Allowance received for U.S. Appl. No. 18/154,757, mailed on Aug. 26, 2024, 12 pages.
Notice of Allowance received for U.S. Appl. No. 14/531,874, mailed on Mar. 28, 2017, 9 pages.
Notice of Allowance received for U.S. Appl. No. 15/644,639, mailed on Jan. 16, 2020, 16 pages.
Notice of Allowance received for U.S. Appl. No. 16/881,599, mailed on Dec. 17, 2021, 7 pages.
Notice of Allowance received for U.S. Appl. No. 17/123,000, mailed on May 27, 2022, 8 pages.
Notice of Allowance received for U.S. Appl. No. 17/123,000, mailed on Sep. 19, 2022, 7 pages.
Notice of Allowance received for U.S. Appl. No. 17/448,875, mailed on Jul. 12, 2024, 8 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/816,314, mailed on Jan. 4, 2024, 6 pages.
Notice of Allowance received for U.S. Appl. No. 17/932,999, mailed on Sep. 12, 2024, 9 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Notice of Allowance received for U.S. Appl. No. 18/515,188, mailed on Nov. 27, 2024, 9 pages.
Notice of Allowance received for U.S. Appl. No. 18/336,770, mailed on Nov. 29, 2024, 9 pages.
Supplemental Notice of Allowance received for U.S. Appl. No. 14/531,874, mailed on Jul. 26, 2017, 5 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Fatima et al., "Eye Movement Based Human Computer Interaction", 3rd International Conference On Recent Advances In Information Technology (RAIT), Mar. 3, 2016, pp. 489-494.

(56) References Cited

OTHER PUBLICATIONS

Grey Melissa, “Comcast's New X2 Platform Moves your DVR Recordings from the Box to the Cloud”, Engadget, Available online at: <http://www.engadget.com/2013/06/11/comcast-x2-platform/>, Jun. 11, 2013, 15 pages.
Pfeuffer et al., “Gaze and Touch Interaction on Tablets”, UIST '16, Tokyo, Japan, ACM, Oct. 16-19, 2016, pp. 301-311.
Schenk et al., “SPOCK: A Smooth Pursuit Oculomotor Control Kit”, CHI'16 Extended Abstracts, San Jose, CA, USA, ACM, May 7-12, 2016, pp. 2681-2687.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Yamada Yoshihiro, “How to Generate a Modal Window with ModalPopup Control”, Available online at: <http://web.archive.org/web/20210920015801/https://atmarkit.itmedia.co.jp/fdotnet/dotnettips/580aspajaxmodalpopup/aspajaxmodalpopup.html> [Search Date Aug. 22, 2023], Sep. 20, 2021, 8 pages (1 page of English Abstract and 7 pages of Official Copy).
AquaSnap Window Manager: dock, snap, tile, organize [online], Nurgo Software, Available online at: <https://www.nurgo-software.com/products/aquasnap>, [retrieved on Jun. 27, 2023], 5 pages.
Corrected Notice of Allowability received for U.S. Appl. No. 17/448,875, mailed on Apr. 24, 2024, 4 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
Home | Virtual Desktop [online], Virtual Desktop, Available online at: <https://www.vrdesktop.net>, [retrieved on Jun. 29, 2023], 4 pages.
International Search Report received for PCT Application No. PCT/US2022/076603, mailed on Jan. 9, 2023, 4 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/050948, mailed on Mar. 4, 2022, 6 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Notice of Allowance received for U.S. Appl. No. 17/448,875, mailed on Apr. 17, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/421,675, mailed on Apr. 11, 2024, 9 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).

(56) References Cited

OTHER PUBLICATIONS

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and The Engineering Reality of Virtual Reality, 2016, 6 pages.
Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Notice of Allowance received for U.S. Appl. No. 18/473,262, mailed on Jun. 10, 2025, 9 pages.
Adding Environments, Available online at: https://manual.keyshot.com/manual/environments/adding-environments/, [retrieved on Jun. 9, 2023], 2 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: < https://www.youtube.com/watch?v=ecBKo_h3Pug>, [retrieved on Sep. 1, 2022], Feb. 22, 2019, 3 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Open Source Voxel Editor for Windows, Mac, Linux, iOS, and Android, Goxel [online]. Goxel by Guillaume Chereau, Available Online at: <URL: https://goxel.xyz/>, [retrieved on Apr. 25, 2024], 2024, 3 pages.
Pop 2 3D Scanner (Infrared Light | Precision 0.05mm), Revpoint [online]. Revopoint 3D, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Reality Scan, Unreal Engine [online], [retrieved on Jun. 14, 2024]. Retrieved from the Internet: <URL: https://www.unrealengine.com/en-US/realityscan>, 11 pages.
RealityScan Available Now | Capture the World and Create Your Own, YouTube [online]. YouTube, Dec. 1, 2022 [retrieved on Jun. 14, 2024]. Retrieved from the Internet: <URL: https://www.youtube.com/watch?v=fXLOMOWWBJQ>, 2 pages.
ShareVOX, Phoria [online]. Phoria PTY LTD, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
VR Design Best Practices, LeapMotion, Aug. 29, 2015, 31 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Berard Francois, "A Study on Two-Dimensional Scrolling with Head Motion", Clips-Imag Technical Report. France, Ref: < TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Bermejo et al., "Exploring Button Designs for Mid-air Interaction in Virtual Reality: A Hexa-metric Evaluation of Key Representations

(56) References Cited

OTHER PUBLICATIONS and Multi-modal Cues", Proceedings of the ACM on Human-Computer Interaction, vol. 5, No. EICS, Article 194, May 27, 2021, 26 pages.
Capturing Reality, "Data Sheet RealityCapture Tarasque 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality,"RealityCapture tutorial: Complete model in PPI", Youtube, https://www.youtube.com/watch?v=tw6wNNEbH_M, Oct. 14, 2021, 2 pages.
Cas and Chary XR, "Oculus Go & Your Phone As 2nd Controller!!—An Inexpensive Way To Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Didehkhorshid et al., "Text Input in Virtual Reality Using a Tracked Drawing Tablet", HCII 2020, LNCS 12428, 2020, pp. 314-329.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat,"I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Headmaster Introduction,"If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Huang et al., "Proxy-Based Security Audit System for Remote Desktop Access", Computer Communications And Networks, ICCCN 2009. Proceedings of 18th International Conference On, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Kim et al., "Pseudo-haptic Button for Improving User Experience of Mid-air Interaction in VR", International Journal of Human-Computer Studies, vol. 168, No. 102907, Aug. 9, 2022, 11 pages.
Kim et al., "Virtual Object Sizes for Efficient and Convenient Mid-air Manipulation", The Visual Computer, vol. 38, No. 9, Jul. 1, 2022, pp. 3463-3474.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lee et al., "A Multi-Touch Three Dimensional Touch-Sensitive Tablet", CHI'85 Proceedings, Apr. 1985, pp. 21-25.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
Lor Cas,"Reality Capture: Exporting Mesh", Youtube, https://www.youtube.com/watch?v=PdvTRa2B_s0, Dec. 10, 2020, 2 pages.
Macmostvideo,"A Beginner's Guide to Selecting Items On Your Mac (#1566)", Bibliographic Information, Jan. 4, 2018, Retrieved from <URL:https://www.youtube.com/watch?v=a6MDAuh7MOQ&ab_channel=macmostvideo/>, [retrieved on Feb. 19, 2025], Most relevant passage of the video is 00:10 to 00:30, 2 pages.
Medeiros et al., "Promoting Reality Awareness in Virtual Reality through Proxemics", IEEE Virtual Reality and 3D User Interfaces (VR), Mar. 27-Apr. 1, 2021, 11 pages.
Mendes et al., "Mid-Air Interactions Above Stereoscopic Interactive Tables", IEEE Symposium on 3D User Interfaces (3DUI), Mar. 29-30, 2014, pp. 3-10.
Metalnwood,"Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Nunez Angulo et al., "Manual for the Design of Didactic Units in Augmented Reality Using the Cospaces EDU Application", 2020, 75 pages.
Pfeuffer et al., "Gaze+touch vs. Touch: What's the Trade-off When Using Gaze to Extend Touch to Remote Displays?", Advances In Databases And Information Systems, Aug. 30, 2015, pp. 349-367.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Rubine Dean, "Combining Gestures and Direct Manipulation", CHI'92, May 3-7, 1992, pp. 659-660.
Rubine Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, repositUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from: <https://www.google.com/url?sa=t&source=web&rct=j&opi=89978449&url=https://online-journals.

(56) References Cited

OTHER PUBLICATIONS org/index.php/i-jim/article/download/5552/4029/19224&ved=2ahUKEwj-w86vga-HAxUJJDQIHYMNDNw4HhAWegQILhAB&usg=AOvVaw3HR1t7v8Rx7osc1lp0UfOh>, DOI: <httpdx.doi.org/10.3991/ijim.v10i3.5552>, Retrieved on Dec. 26, 2024, 2016, 5 pages.

Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.

Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.

Yue et al., "Optimal Region Selection for Stereoscopic Video Subtitle Insertion", IEEE Transactions on Circuits and Systems for Video Technology, vol. 28, No. 11, Nov. 2018, 13 pages.

Zhuang et al., "Distributed Architecture for 3D Graphics Rendering in Collaborative System", Computer and Modernization, Issue 4, 2017, 5 pages (1 page of English Abstract and 4 pages of Official Copy).

Supplemental Notice of Allowability received for U.S. Appl. No. 18/473,261, mailed on Sep. 30, 2025, 2 pages.

Notice of Allowance received for U.S. Appl. No. 18/473,261, mailed on Jan. 30, 2026, 5 pages.

Restriction Requirement received for U.S. Appl. No. 18/473,259, mailed on Oct. 30, 2025, 7 pages.

Notice of Allowance received for U.S. Appl. No. 18/473,262, mailed on Oct. 7, 2025, 8 pages.

Notice of Allowance received for U.S. Appl. No. 18/473,261, mailed on Sep. 23, 2025, 9 pages.

* cited by examiner

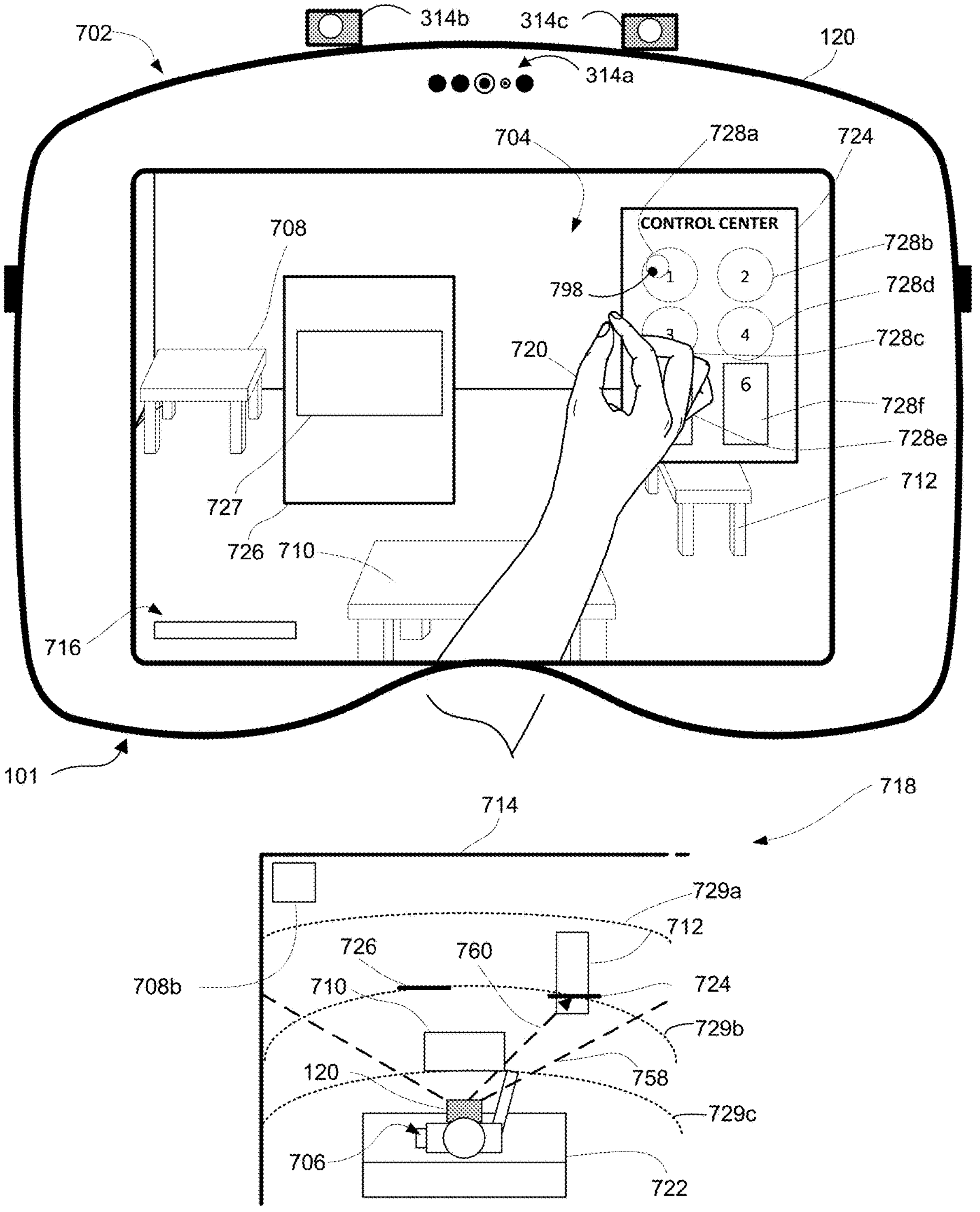
FIG. 7A1

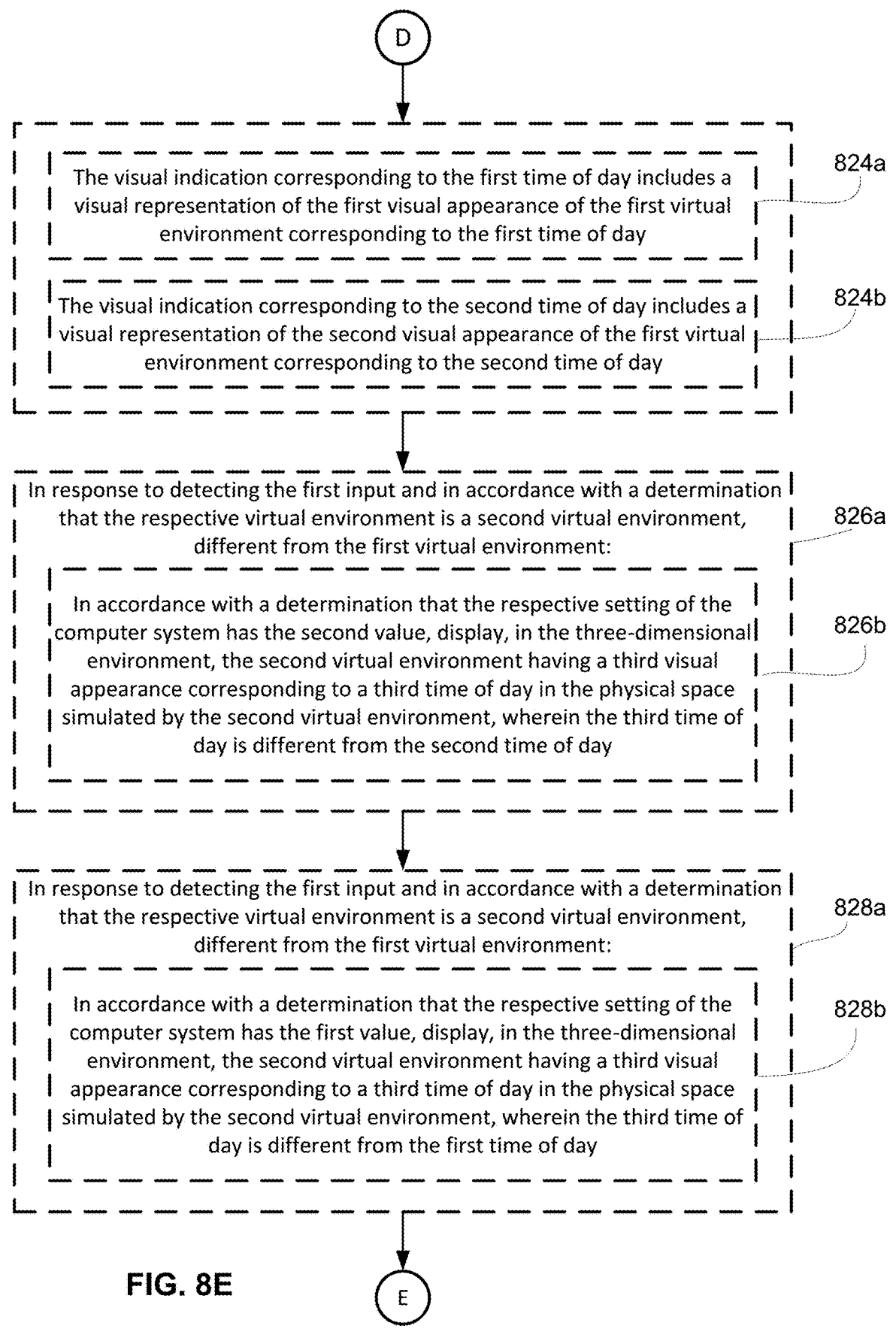

D

The visual indication corresponding to the first time of day includes a visual representation of the first visual appearance of the first virtual environment corresponding to the first time of day 824a The visual indication corresponding to the second time of day includes a visual representation of the second visual appearance of the first virtual environment corresponding to the second time of day 824b In response to detecting the first input and in accordance with a determination that the respective virtual environment is a second virtual environment, different from the first virtual environment: 826a In accordance with a determination that the respective setting of the computer system has the second value, display, in the three-dimensional environment, the second virtual environment having a third visual appearance corresponding to a third time of day in the physical space simulated by the second virtual environment, wherein the third time of day is different from the second time of day 826b In response to detecting the first input and in accordance with a determination that the respective virtual environment is a second virtual environment, different from the first virtual environment: 828a In accordance with a determination that the respective setting of the computer system has the first value, display, in the three-dimensional environment, the second virtual environment having a third visual appearance corresponding to a third time of day in the physical space simulated by the second virtual environment, wherein the third time of day is different from the first time of day 828b

FIG. 8E

E

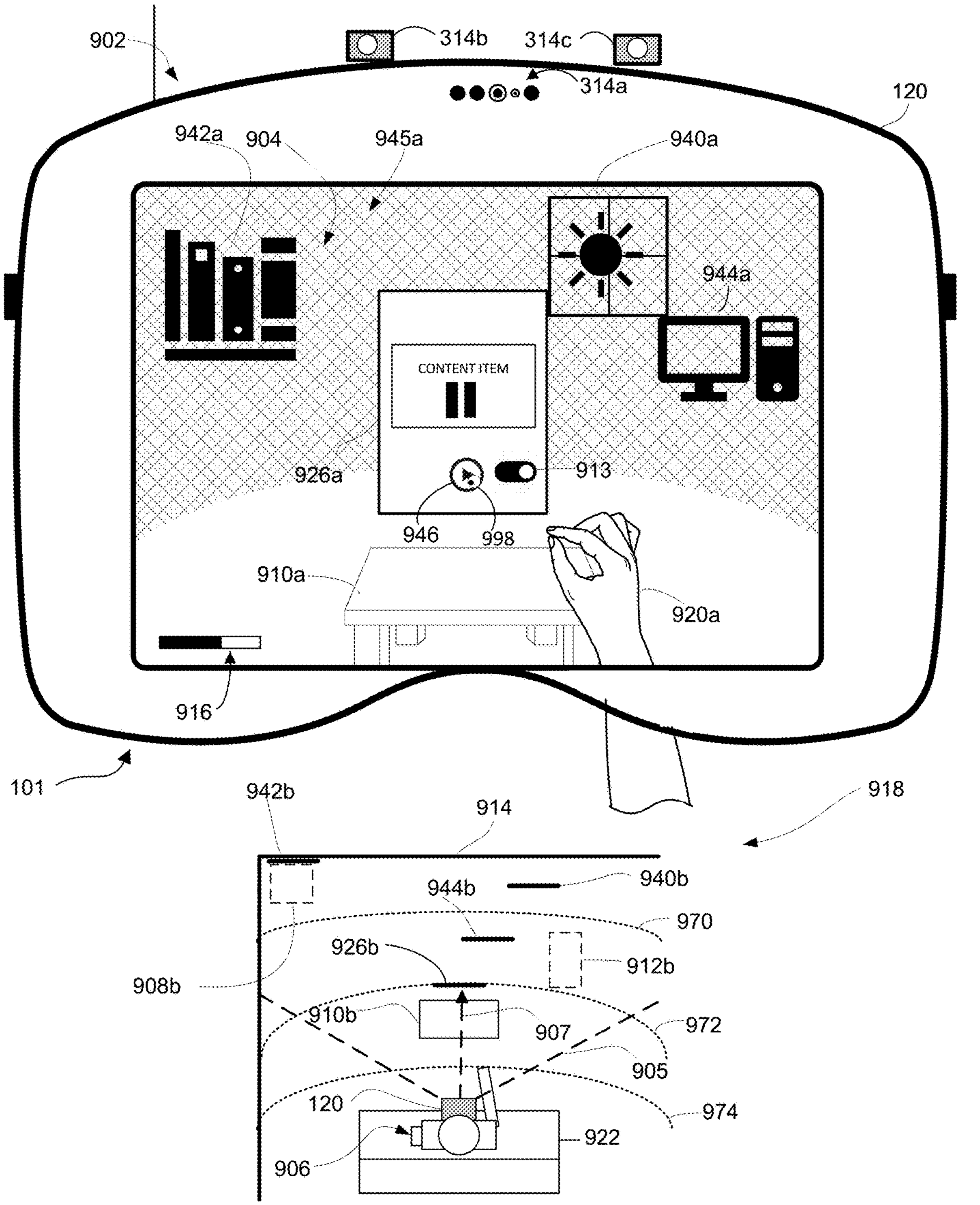
FIG. 9A1

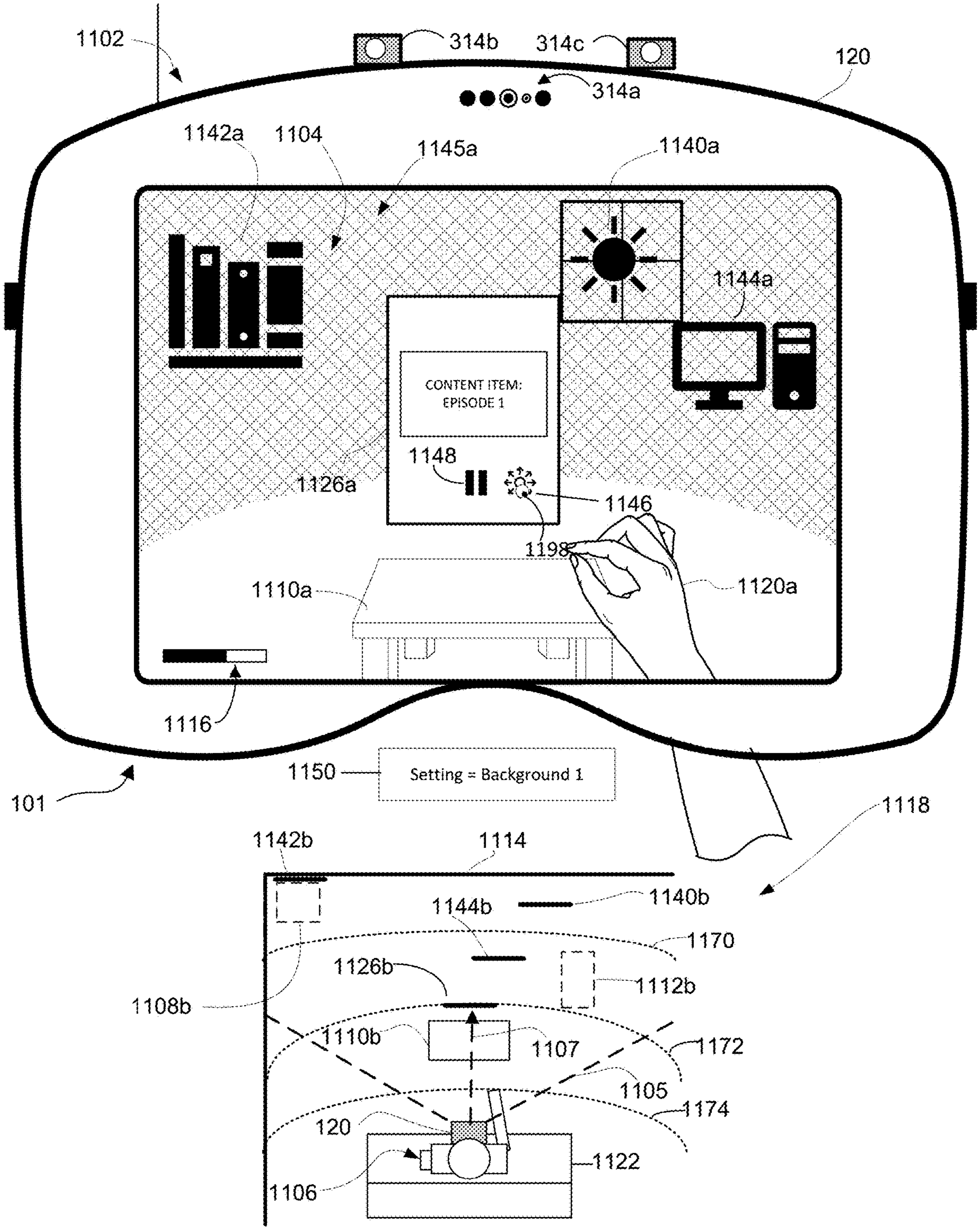
FIG. 11A1

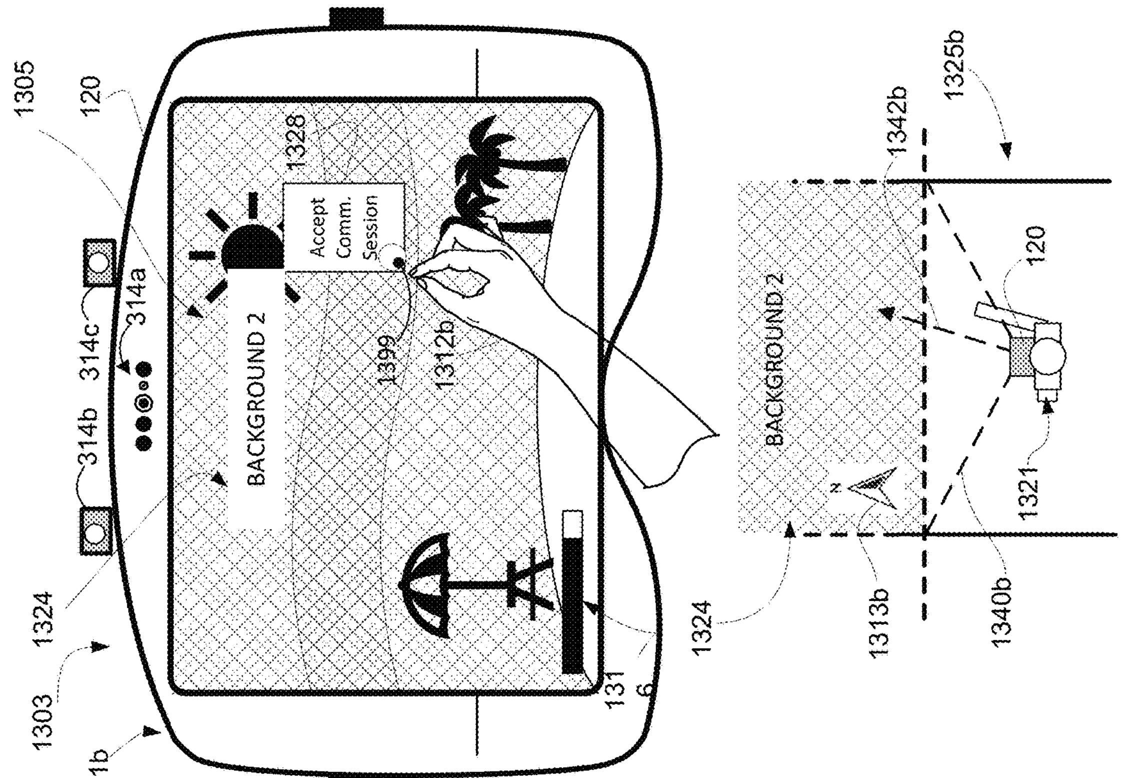
FIG. 13B1
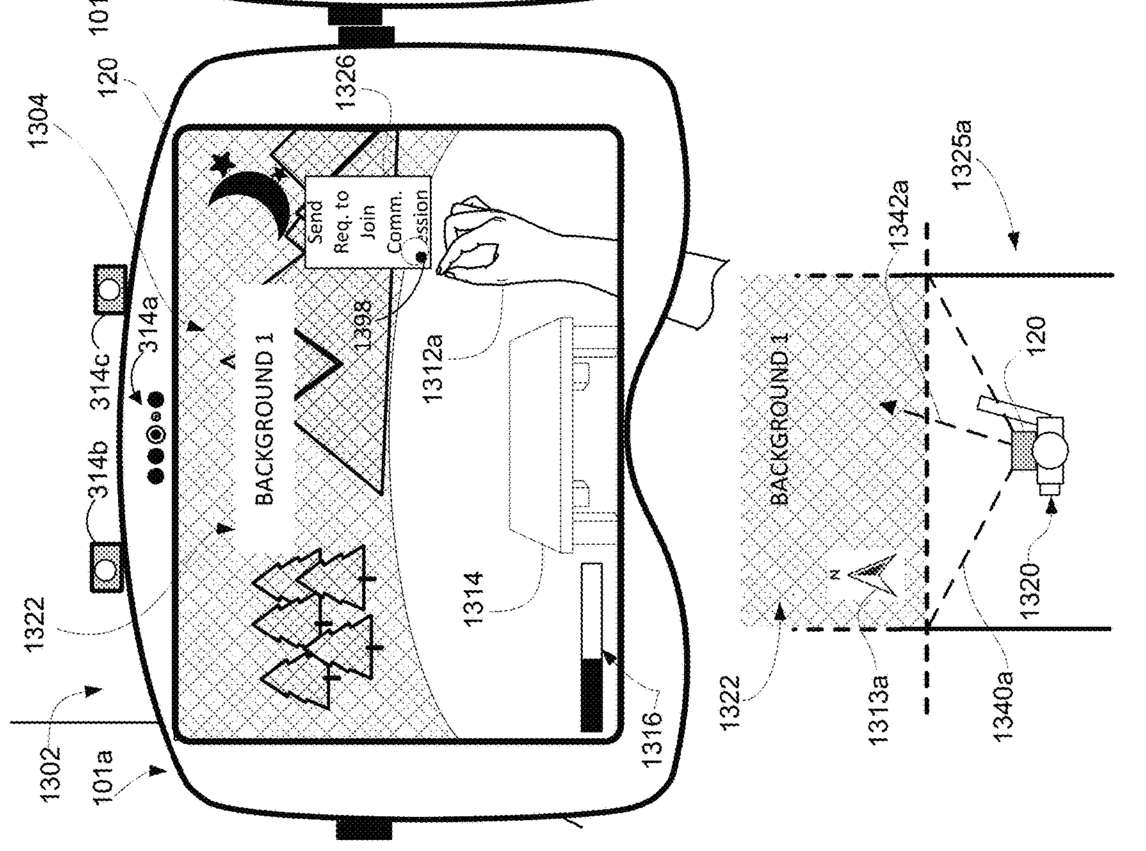
FIG. 13A1

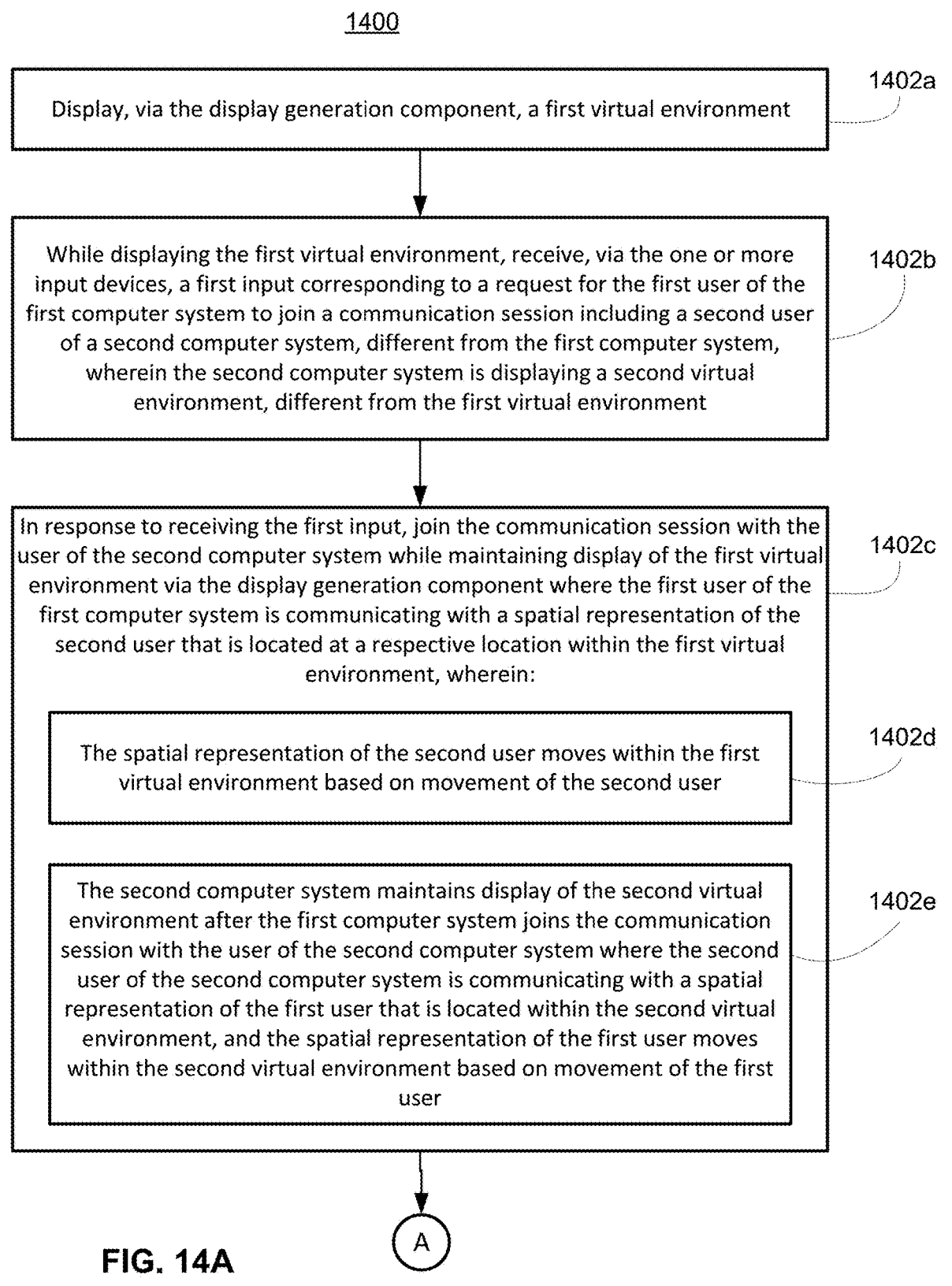

1400

1402a: Display, via the display generation component, a first virtual environment 1402b: While displaying the first virtual environment, receive, via the one or more input devices, a first input corresponding to a request for the first user of the first computer system to join a communication session including a second user of a second computer system, different from the first computer system, wherein the second computer system is displaying a second virtual environment, different from the first virtual environment 1402c: In response to receiving the first input, join the communication session with the user of the second computer system while maintaining display of the first virtual environment via the display generation component where the first user of the first computer system is communicating with a spatial representation of the second user that is located at a respective location within the first virtual environment, wherein:

1402d: The spatial representation of the second user moves within the first virtual environment based on movement of the second user 1402e: The second computer system maintains display of the second virtual environment after the first computer system joins the communication session with the user of the second computer system where the second user of the second computer system is communicating with a spatial representation of the first user that is located within the second virtual environment, and the spatial representation of the first user moves within the second virtual environment based on movement of the first user (A)

FIG. 14A

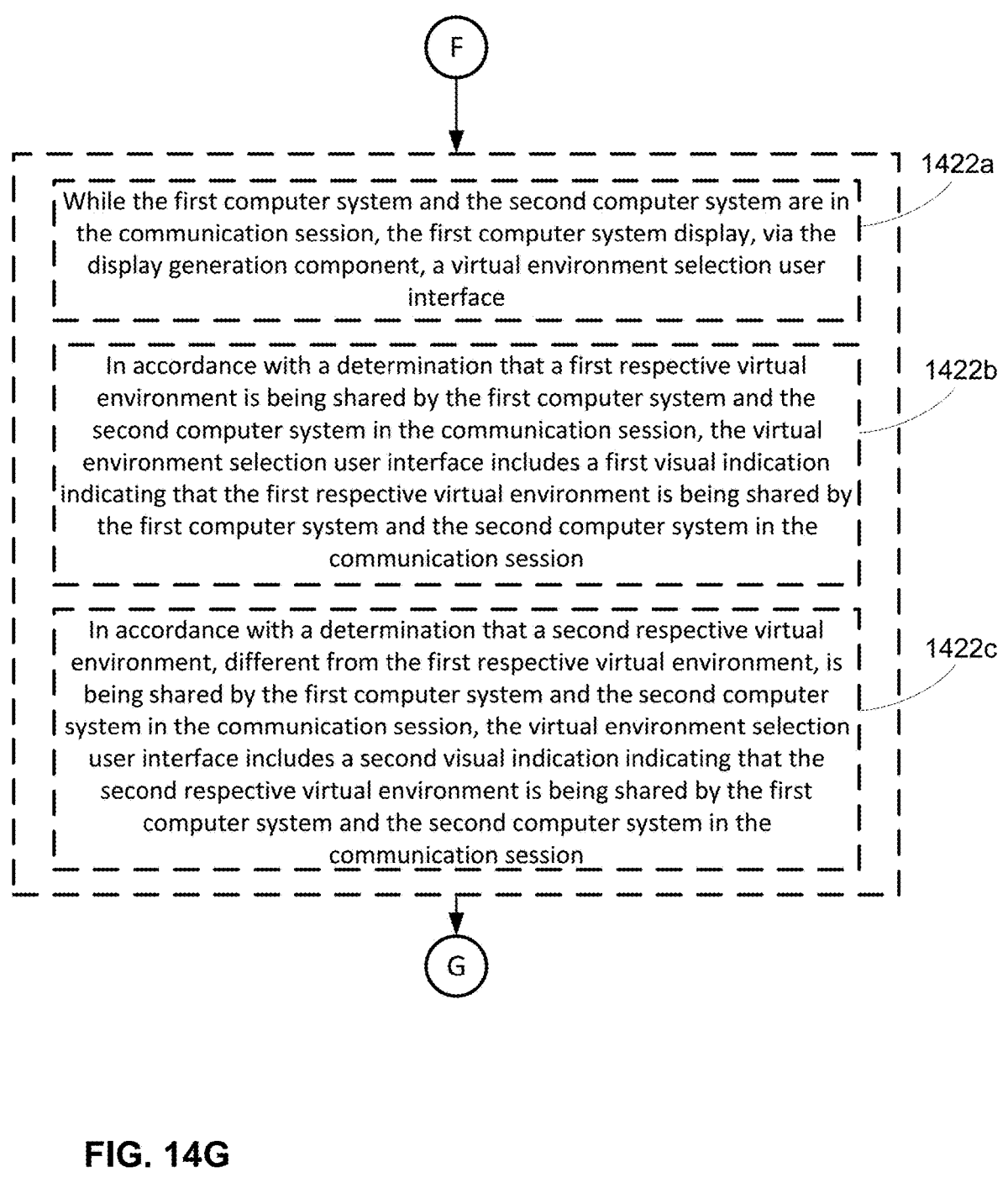

F

1422a

While the first computer system and the second computer system are in the communication session, the first computer system display, via the display generation component, a virtual environment selection user interface 1422b In accordance with a determination that a first respective virtual environment is being shared by the first computer system and the second computer system in the communication session, the virtual environment selection user interface includes a first visual indication indicating that the first respective virtual environment is being shared by the first computer system and the second computer system in the communication session 1422c In accordance with a determination that a second respective virtual environment, different from the first respective virtual environment, is being shared by the first computer system and the second computer system in the communication session, the virtual environment selection user interface includes a second visual indication indicating that the second respective virtual environment is being shared by the first computer system and the second computer system in the communication session

G

FIG. 14G

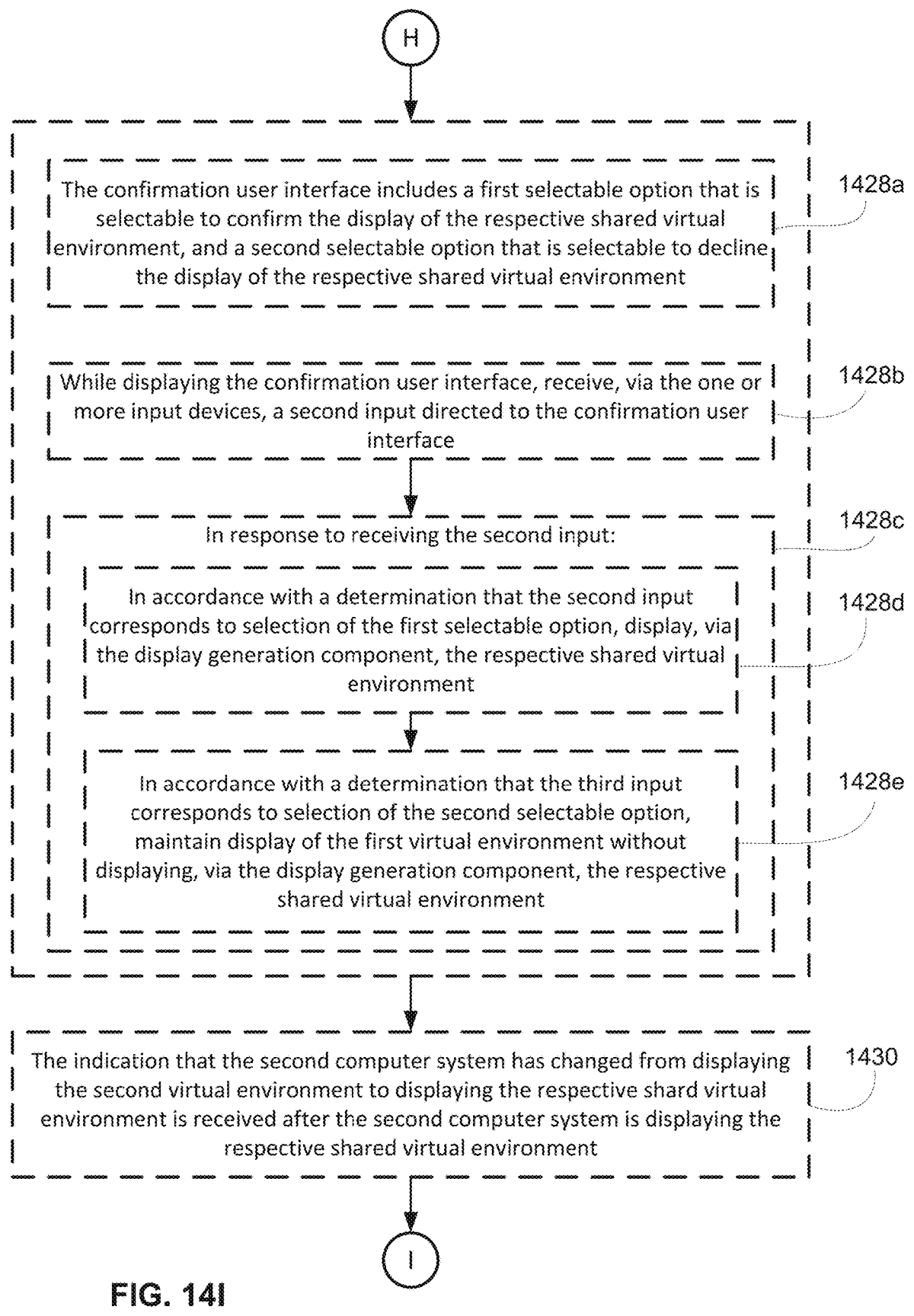

H

The confirmation user interface includes a first selectable option that is selectable to confirm the display of the respective shared virtual environment, and a second selectable option that is selectable to decline the display of the respective shared virtual environment 1428a While displaying the confirmation user interface, receive, via the one or more input devices, a second input directed to the confirmation user interface 1428b In response to receiving the second input:

1428c

In accordance with a determination that the second input corresponds to selection of the first selectable option, display, via the display generation component, the respective shared virtual environment 1428d In accordance with a determination that the third input corresponds to selection of the second selectable option, maintain display of the first virtual environment without displaying, via the display generation component, the respective shared virtual environment 1428e The indication that the second computer system has changed from displaying the second virtual environment to displaying the respective shard virtual environment is received after the second computer system is displaying the respective shared virtual environment

1430

I

FIG. 14I

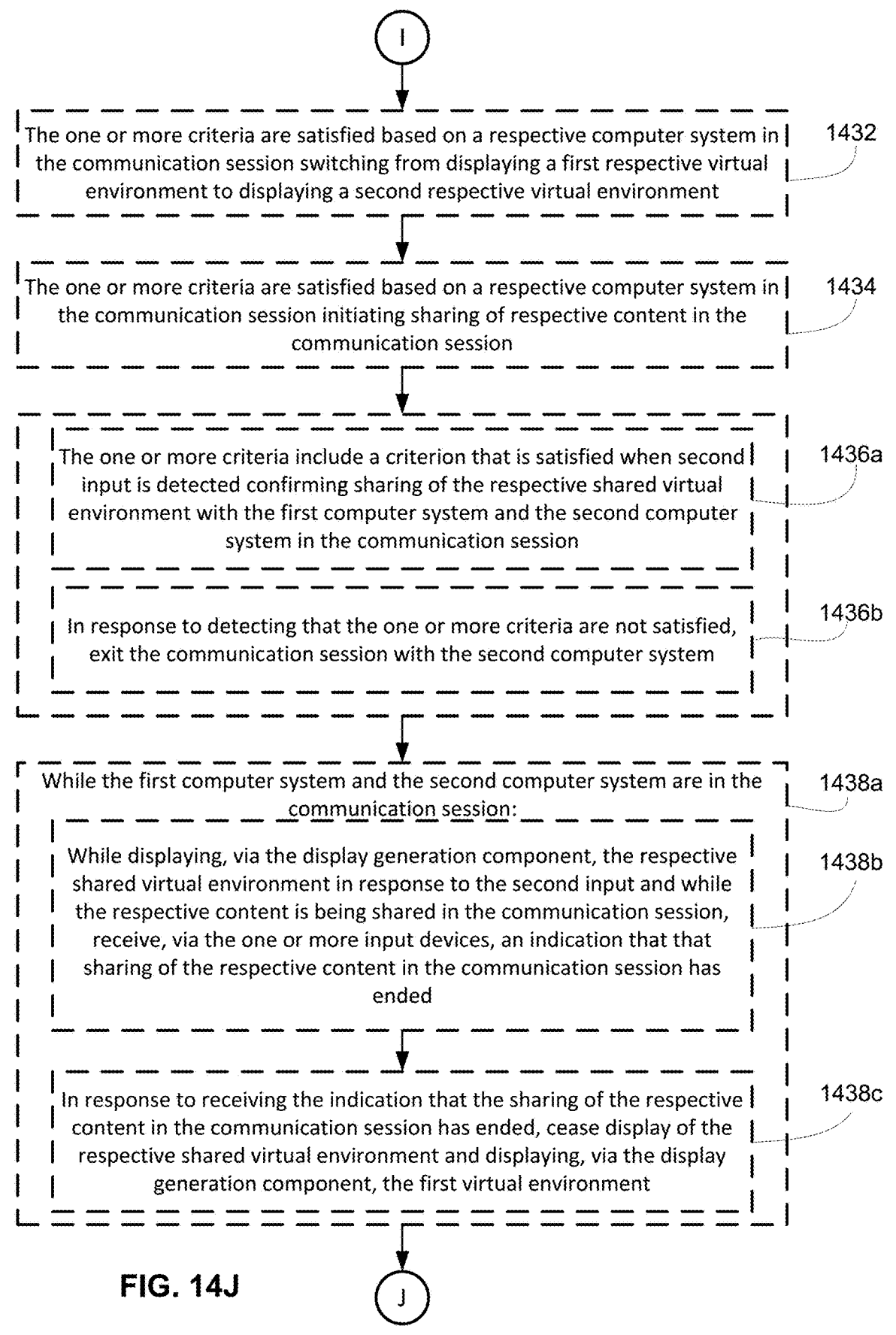

I

The one or more criteria are satisfied based on a respective computer system in the communication session switching from displaying a first respective virtual environment to displaying a second respective virtual environment 1432

The one or more criteria are satisfied based on a respective computer system in the communication session initiating sharing of respective content in the communication session 1434

The one or more criteria include a criterion that is satisfied when second input is detected confirming sharing of the respective shared virtual environment with the first computer system and the second computer system in the communication session 1436a In response to detecting that the one or more criteria are not satisfied, exit the communication session with the second computer system 1436b While the first computer system and the second computer system are in the communication session: 1438a While displaying, via the display generation component, the respective shared virtual environment in response to the second input and while the respective content is being shared in the communication session, receive, via the one or more input devices, an indication that that sharing of the respective content in the communication session has ended 1438b In response to receiving the indication that the sharing of the respective content in the communication session has ended, cease display of the respective shared virtual environment and displaying, via the display generation component, the first virtual environment 1438c

FIG. 14J

J

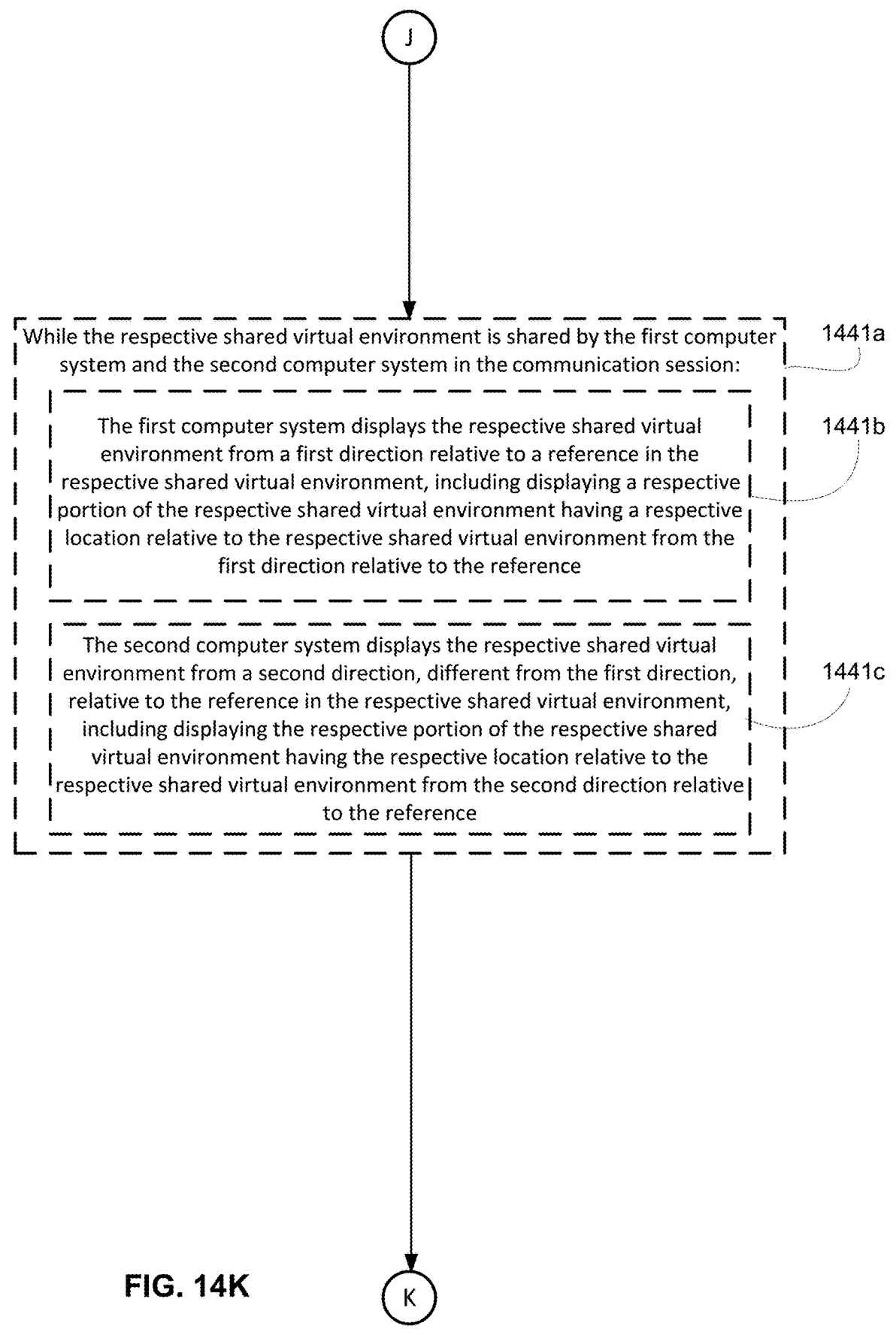

J

While the respective shared virtual environment is shared by the first computer system and the second computer system in the communication session: 1441a The first computer system displays the respective shared virtual environment from a first direction relative to a reference in the respective shared virtual environment, including displaying a respective portion of the respective shared virtual environment having a respective location relative to the respective shared virtual environment from the first direction relative to the reference 1441b The second computer system displays the respective shared virtual environment from a second direction, different from the first direction, relative to the reference in the respective shared virtual environment, including displaying the respective portion of the respective shared virtual environment having the respective location relative to the respective shared virtual environment from the second direction relative to the reference 1441c

FIG. 14K

K

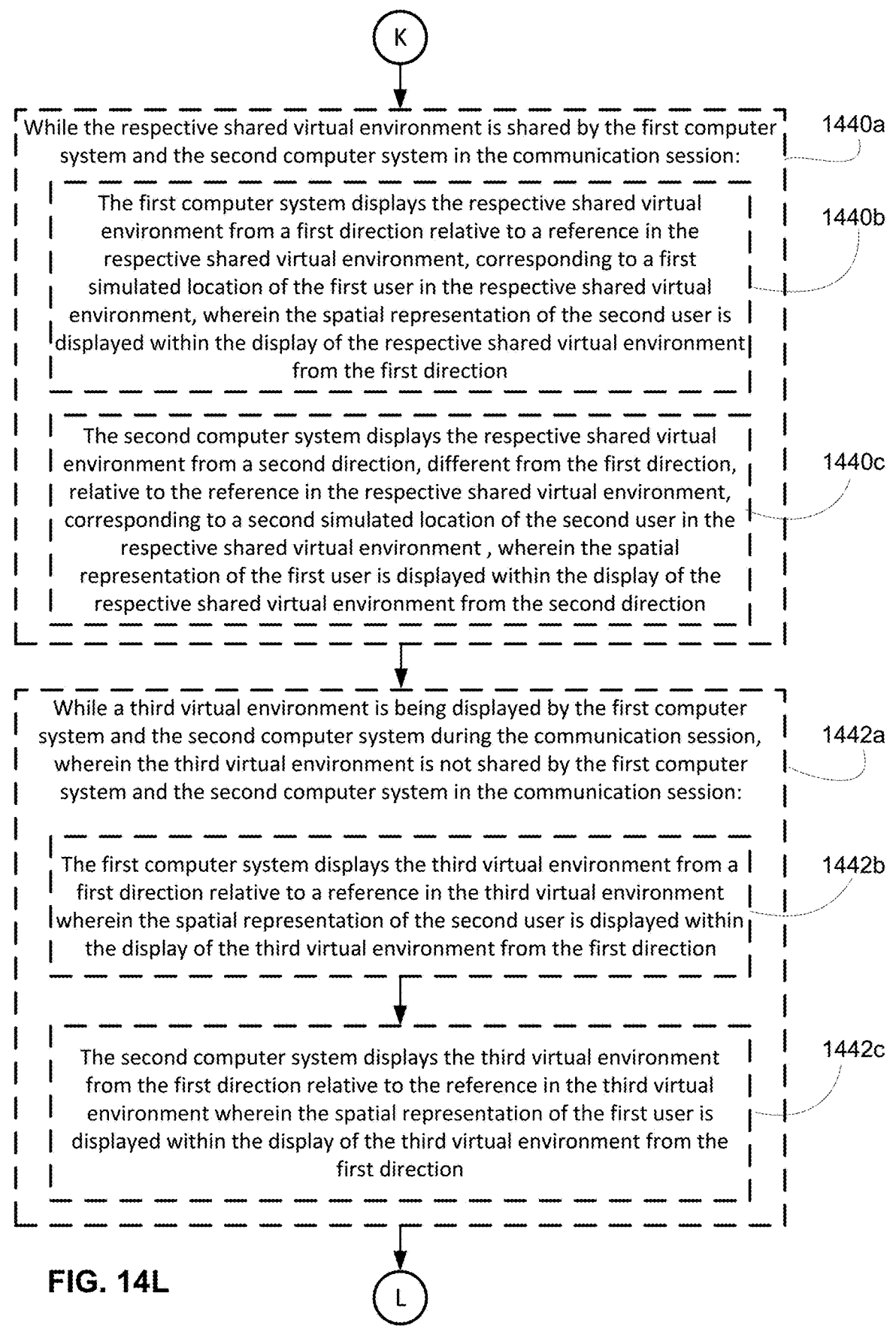

K

While the respective shared virtual environment is shared by the first computer system and the second computer system in the communication session: 1440a The first computer system displays the respective shared virtual environment from a first direction relative to a reference in the respective shared virtual environment, corresponding to a first simulated location of the first user in the respective shared virtual environment, wherein the spatial representation of the second user is displayed within the display of the respective shared virtual environment from the first direction 1440b The second computer system displays the respective shared virtual environment from a second direction, different from the first direction, relative to the reference in the respective shared virtual environment, corresponding to a second simulated location of the second user in the respective shared virtual environment , wherein the spatial representation of the first user is displayed within the display of the respective shared virtual environment from the second direction 1440c While a third virtual environment is being displayed by the first computer system and the second computer system during the communication session, wherein the third virtual environment is not shared by the first computer system and the second computer system in the communication session: 1442a The first computer system displays the third virtual environment from a first direction relative to a reference in the third virtual environment wherein the spatial representation of the second user is displayed within the display of the third virtual environment from the first direction 1442b The second computer system displays the third virtual environment from the first direction relative to the reference in the third virtual environment wherein the spatial representation of the first user is displayed within the display of the third virtual environment from the first direction 1442c

FIG. 14L

L

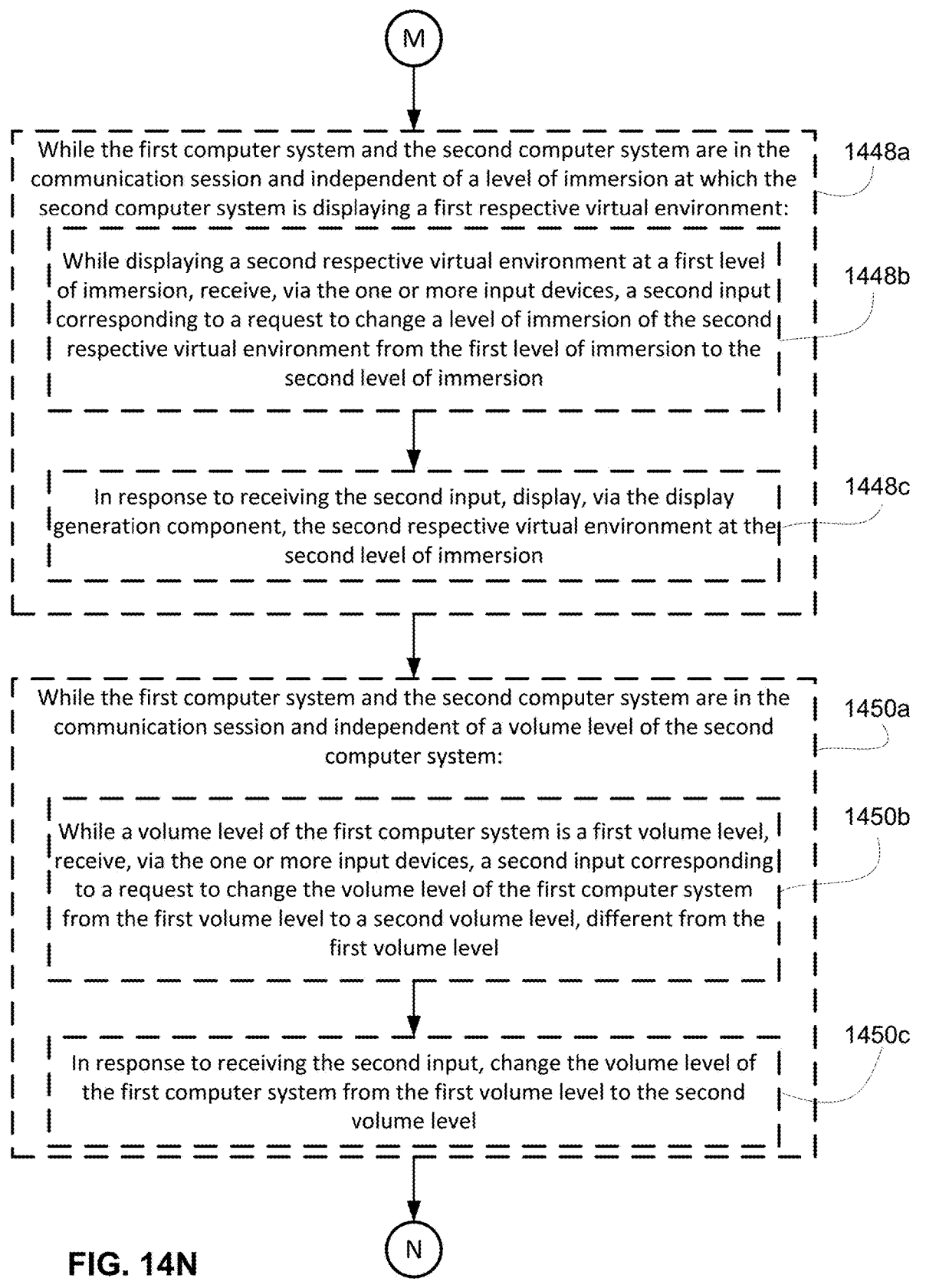

M

While the first computer system and the second computer system are in the communication session and independent of a level of immersion at which the second computer system is displaying a first respective virtual environment: 1448a While displaying a second respective virtual environment at a first level of immersion, receive, via the one or more input devices, a second input corresponding to a request to change a level of immersion of the second respective virtual environment from the first level of immersion to the second level of immersion 1448b In response to receiving the second input, display, via the display generation component, the second respective virtual environment at the second level of immersion 1448c While the first computer system and the second computer system are in the communication session and independent of a volume level of the second computer system: 1450a While a volume level of the first computer system is a first volume level, receive, via the one or more input devices, a second input corresponding to a request to change the volume level of the first computer system from the first volume level to a second volume level, different from the first volume level 1450b In response to receiving the second input, change the volume level of the first computer system from the first volume level to the second volume level 1450c

N

FIG. 14N

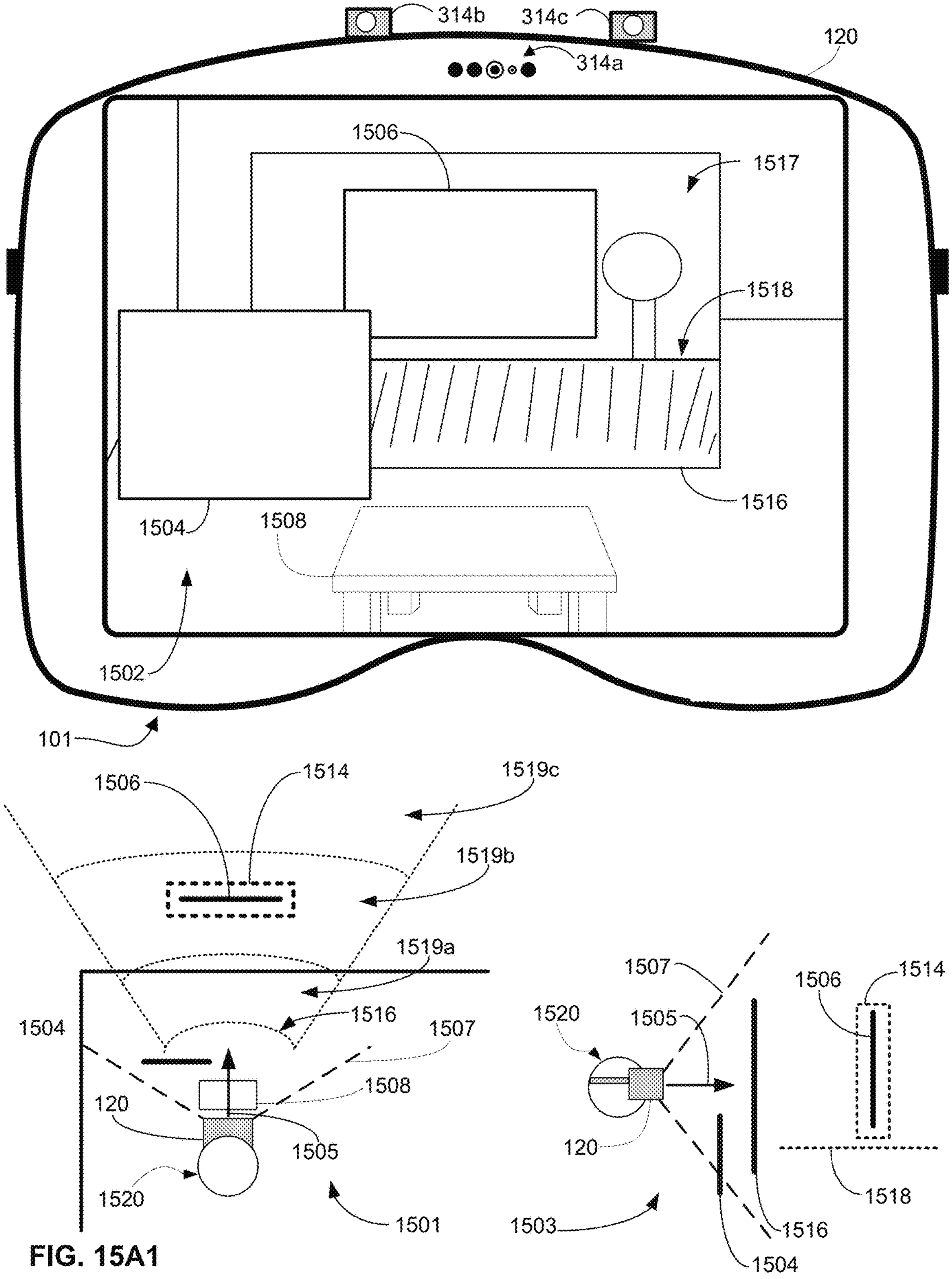
FIG. 15A1

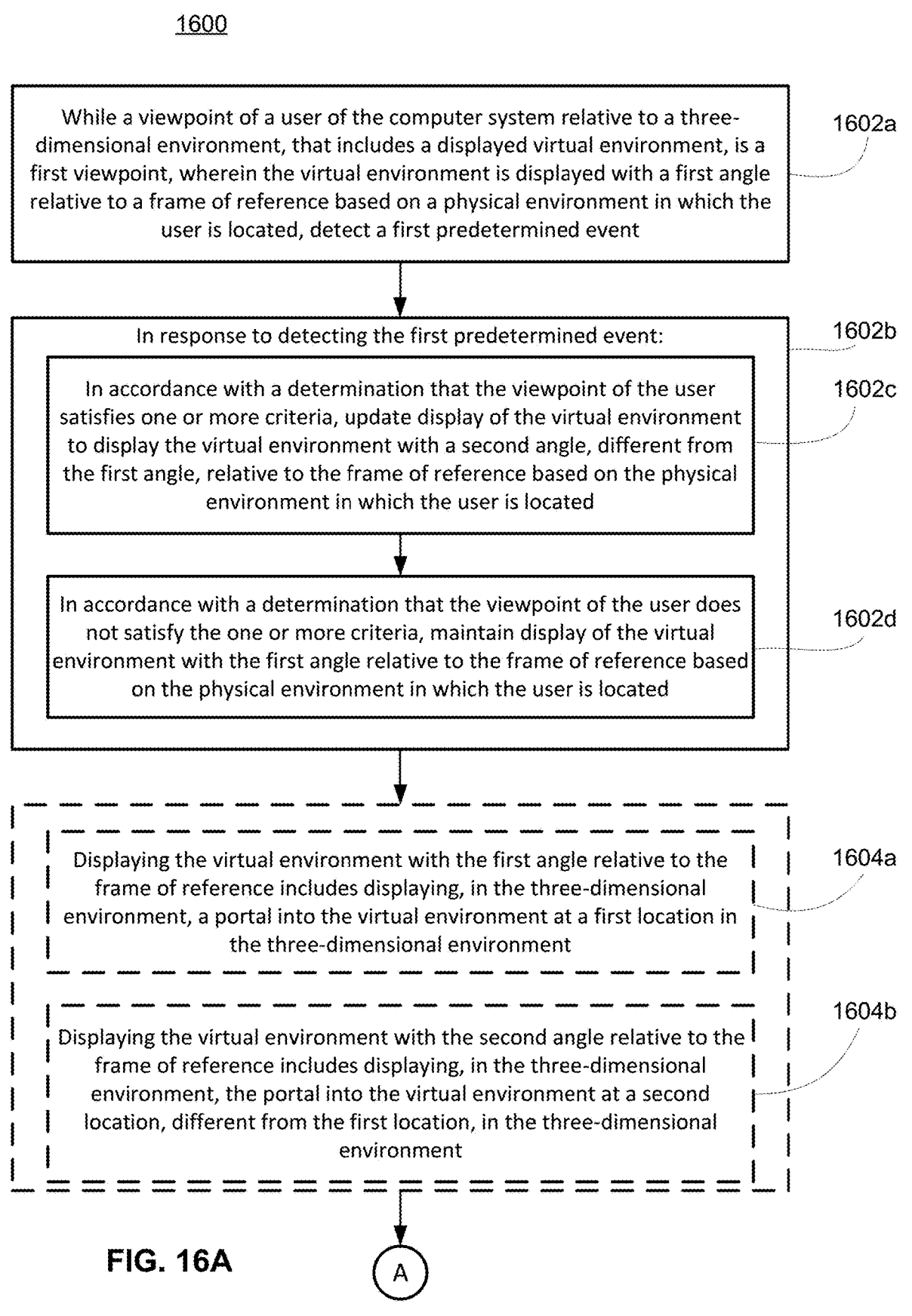

1600

While a viewpoint of a user of the computer system relative to a three-dimensional environment, that includes a displayed virtual environment, is a first viewpoint, wherein the virtual environment is displayed with a first angle relative to a frame of reference based on a physical environment in which the user is located, detect a first predetermined event (1602a)

In response to detecting the first predetermined event: (1602b)

In accordance with a determination that the viewpoint of the user satisfies one or more criteria, update display of the virtual environment to display the virtual environment with a second angle, different from the first angle, relative to the frame of reference based on the physical environment in which the user is located (1602c)

In accordance with a determination that the viewpoint of the user does not satisfy the one or more criteria, maintain display of the virtual environment with the first angle relative to the frame of reference based on the physical environment in which the user is located (1602d)

Displaying the virtual environment with the first angle relative to the frame of reference includes displaying, in the three-dimensional environment, a portal into the virtual environment at a first location in the three-dimensional environment (1604a)

Displaying the virtual environment with the second angle relative to the frame of reference includes displaying, in the three-dimensional environment, the portal into the virtual environment at a second location, different from the first location, in the three-dimensional environment (1604b)

A

FIG. 16A

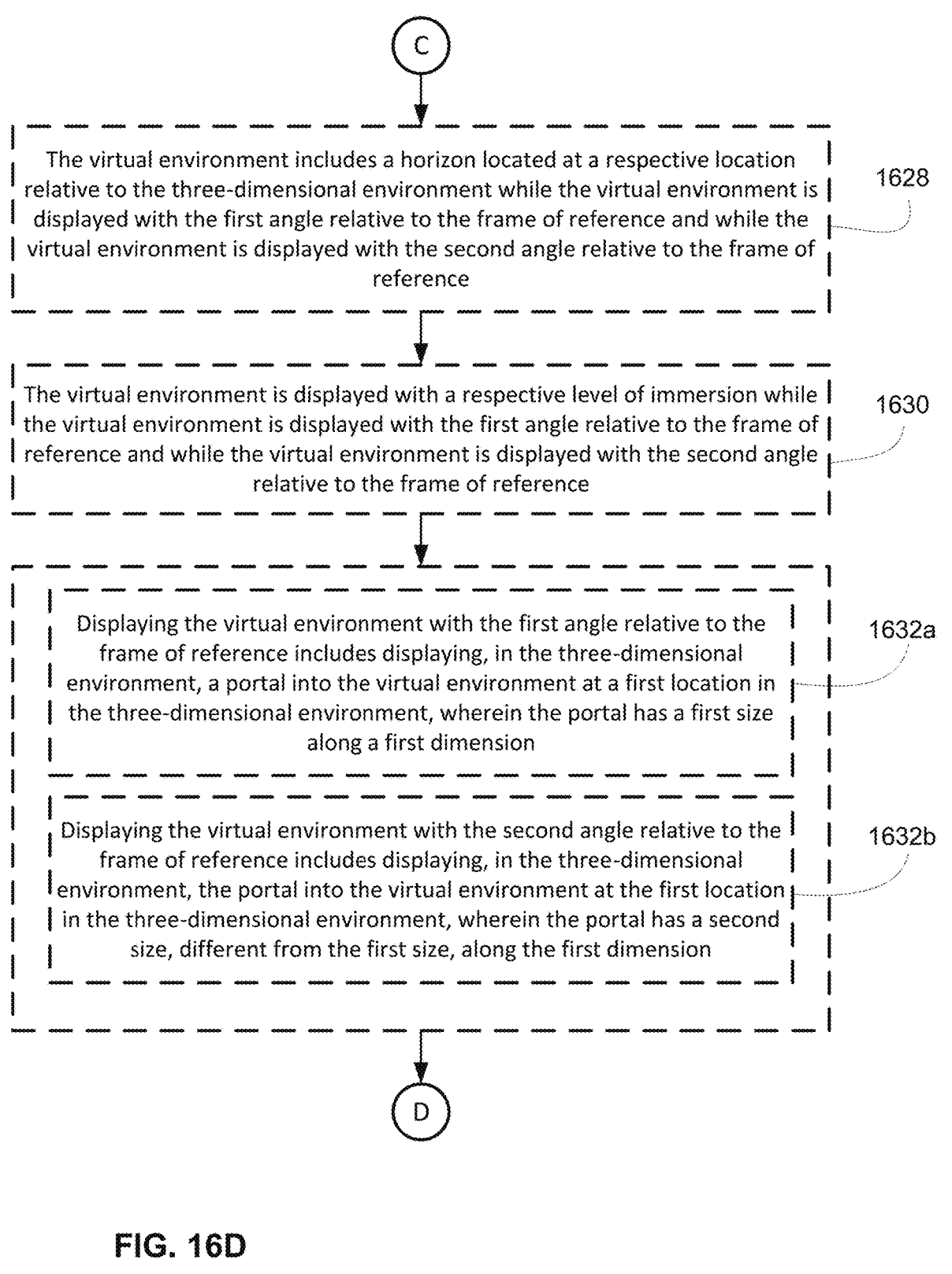

C

1628 — The virtual environment includes a horizon located at a respective location relative to the three-dimensional environment while the virtual environment is displayed with the first angle relative to the frame of reference and while the virtual environment is displayed with the second angle relative to the frame of reference 1630 — The virtual environment is displayed with a respective level of immersion while the virtual environment is displayed with the first angle relative to the frame of reference and while the virtual environment is displayed with the second angle relative to the frame of reference 1632a — Displaying the virtual environment with the first angle relative to the frame of reference includes displaying, in the three-dimensional environment, a portal into the virtual environment at a first location in the three-dimensional environment, wherein the portal has a first size along a first dimension 1632b — Displaying the virtual environment with the second angle relative to the frame of reference includes displaying, in the three-dimensional environment, the portal into the virtual environment at the first location in the three-dimensional environment, wherein the portal has a second size, different from the first size, along the first dimension

D

FIG. 16D

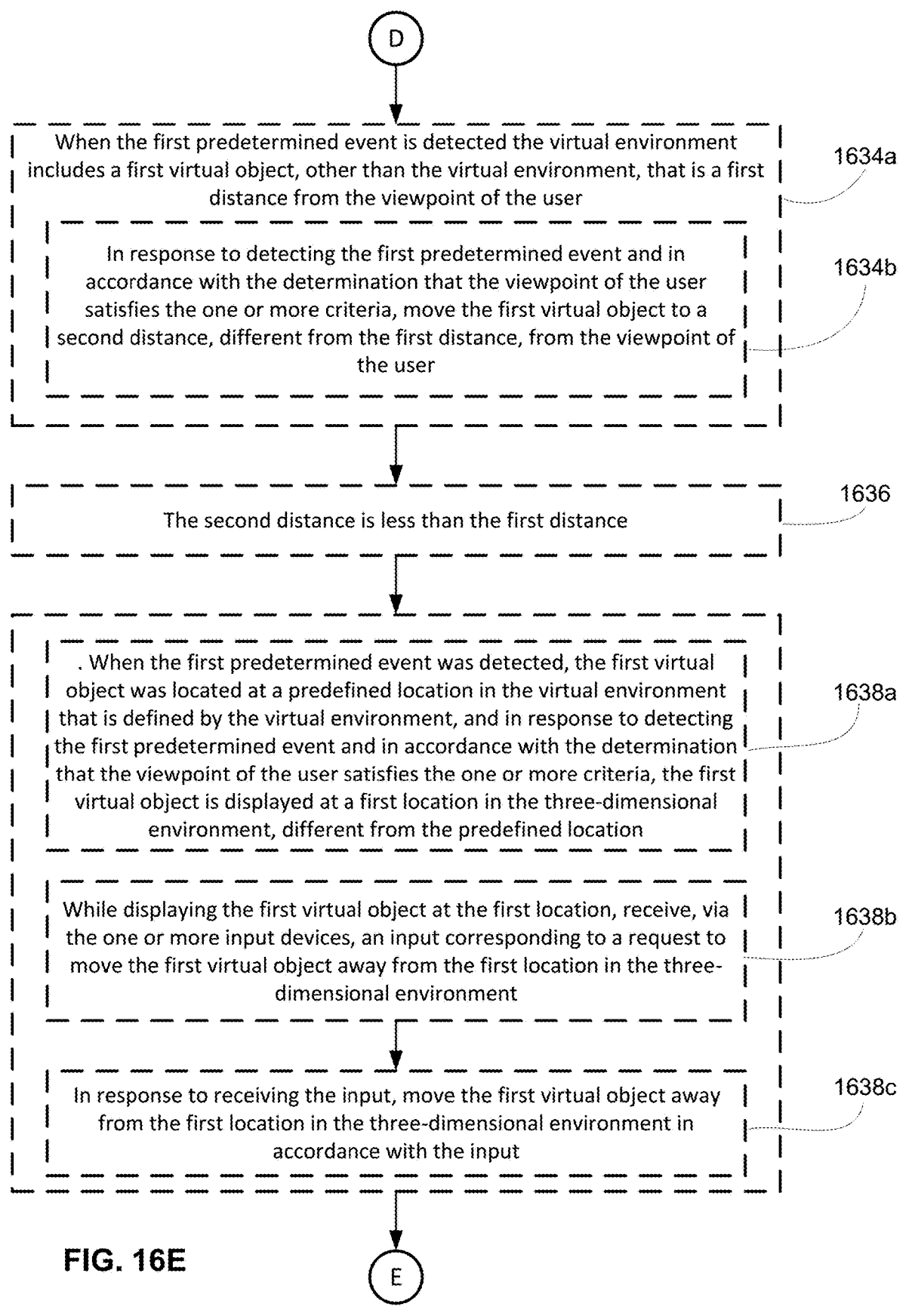

D

1634a: When the first predetermined event is detected the virtual environment includes a first virtual object, other than the virtual environment, that is a first distance from the viewpoint of the user 1634b: In response to detecting the first predetermined event and in accordance with the determination that the viewpoint of the user satisfies the one or more criteria, move the first virtual object to a second distance, different from the first distance, from the viewpoint of the user 1636: The second distance is less than the first distance 1638a: . When the first predetermined event was detected, the first virtual object was located at a predefined location in the virtual environment that is defined by the virtual environment, and in response to detecting the first predetermined event and in accordance with the determination that the viewpoint of the user satisfies the one or more criteria, the first virtual object is displayed at a first location in the three-dimensional environment, different from the predefined location 1638b: While displaying the first virtual object at the first location, receive, via the one or more input devices, an input corresponding to a request to move the first virtual object away from the first location in the three-dimensional environment 1638c: In response to receiving the input, move the first virtual object away from the first location in the three-dimensional environment in accordance with the input

FIG. 16E

E

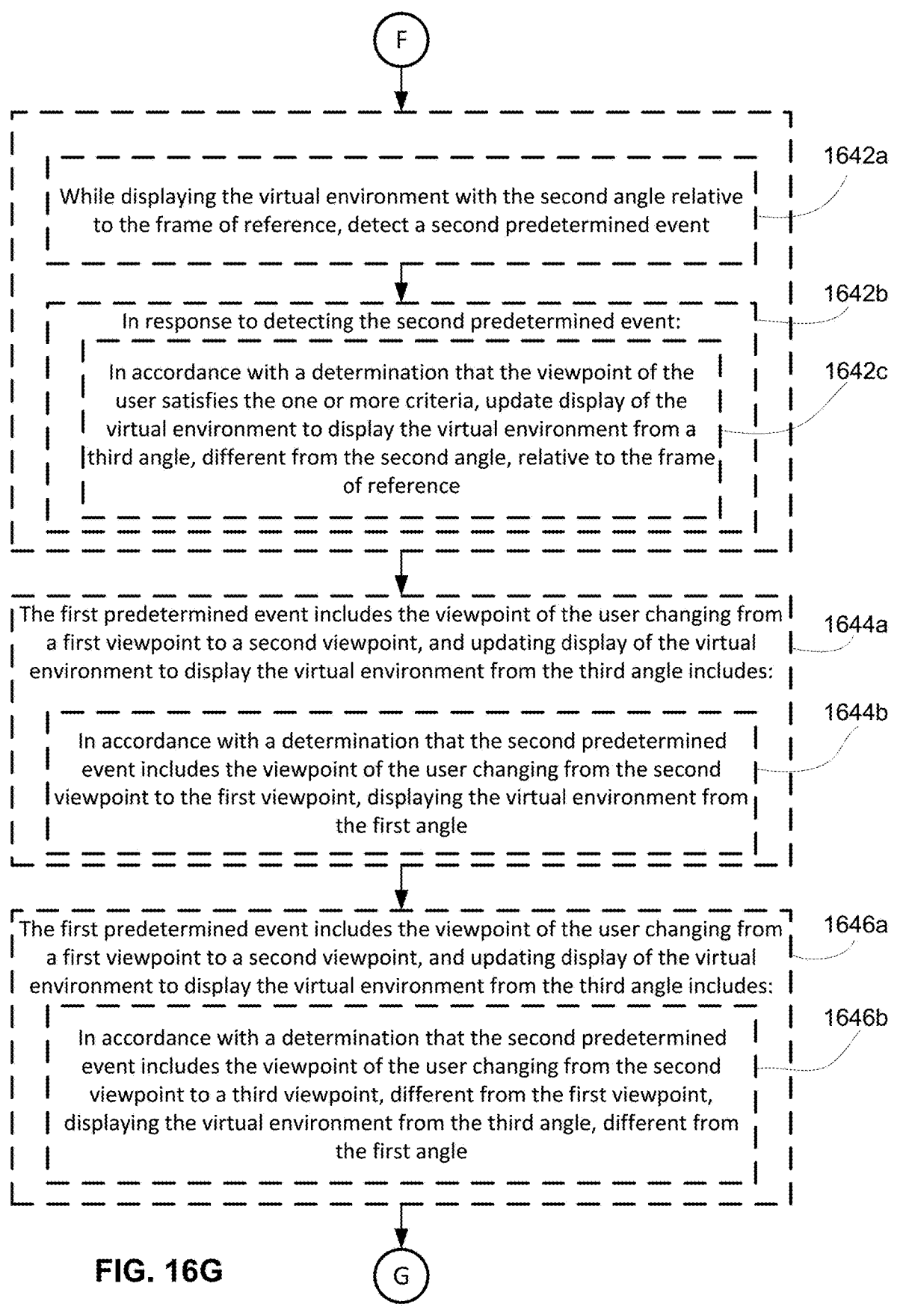

F

1642a: While displaying the virtual environment with the second angle relative to the frame of reference, detect a second predetermined event 1642b: In response to detecting the second predetermined event:

1642c: In accordance with a determination that the viewpoint of the user satisfies the one or more criteria, update display of the virtual environment to display the virtual environment from a third angle, different from the second angle, relative to the frame of reference 1644a: The first predetermined event includes the viewpoint of the user changing from a first viewpoint to a second viewpoint, and updating display of the virtual environment to display the virtual environment from the third angle includes:

1644b: In accordance with a determination that the second predetermined event includes the viewpoint of the user changing from the second viewpoint to the first viewpoint, displaying the virtual environment from the first angle 1646a: The first predetermined event includes the viewpoint of the user changing from a first viewpoint to a second viewpoint, and updating display of the virtual environment to display the virtual environment from the third angle includes:

1646b: In accordance with a determination that the second predetermined event includes the viewpoint of the user changing from the second viewpoint to a third viewpoint, different from the first viewpoint, displaying the virtual environment from the third angle, different from the first angle

FIG. 16G

G

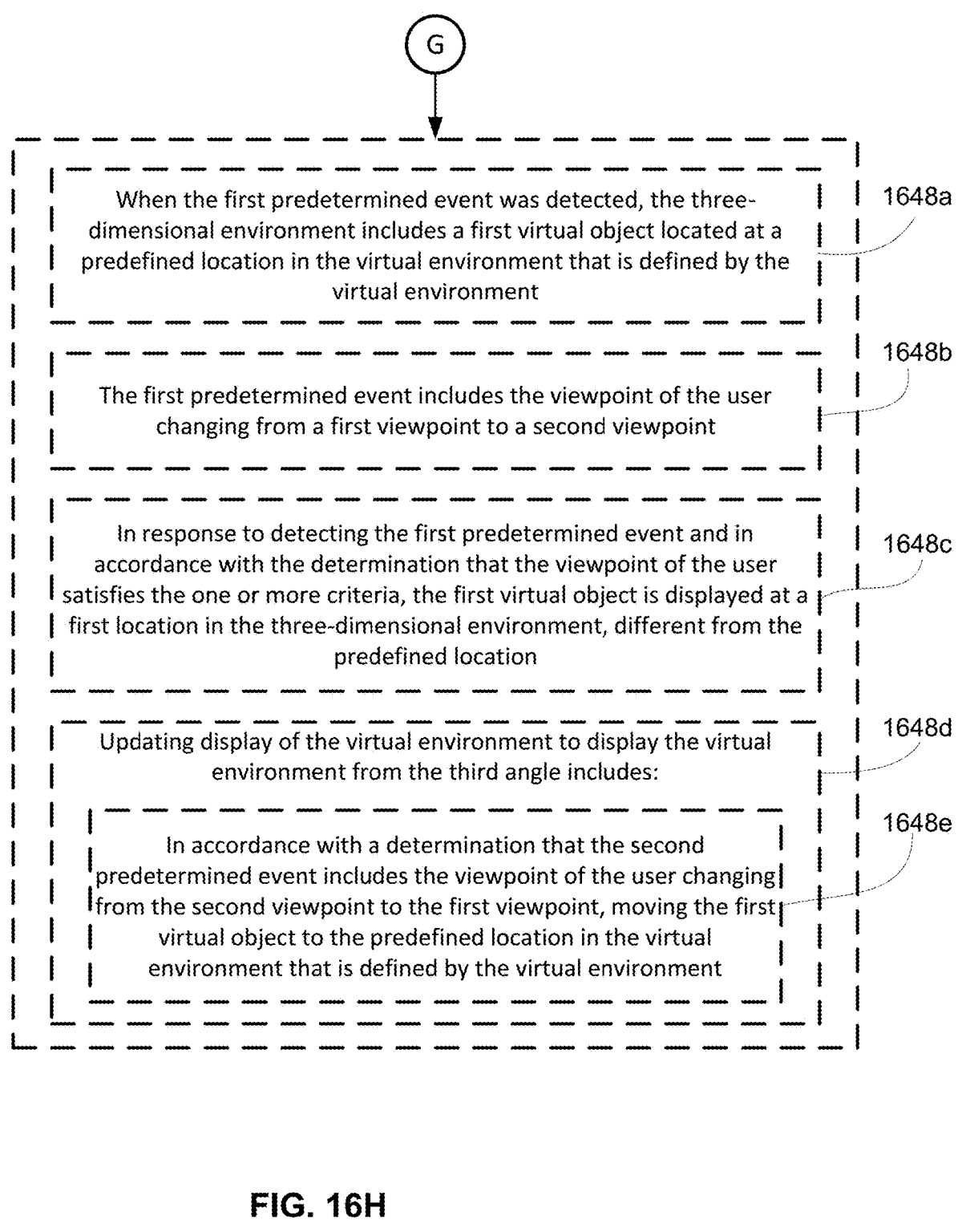

G

1648a: When the first predetermined event was detected, the three-dimensional environment includes a first virtual object located at a predefined location in the virtual environment that is defined by the virtual environment 1648b: The first predetermined event includes the viewpoint of the user changing from a first viewpoint to a second viewpoint 1648c: In response to detecting the first predetermined event and in accordance with the determination that the viewpoint of the user satisfies the one or more criteria, the first virtual object is displayed at a first location in the three-dimensional environment, different from the predefined location 1648d: Updating display of the virtual environment to display the virtual environment from the third angle includes:

1648e: In accordance with a determination that the second predetermined event includes the viewpoint of the user changing from the second viewpoint to the first viewpoint, moving the first virtual object to the predefined location in the virtual environment that is defined by the virtual environment

FIG. 16H

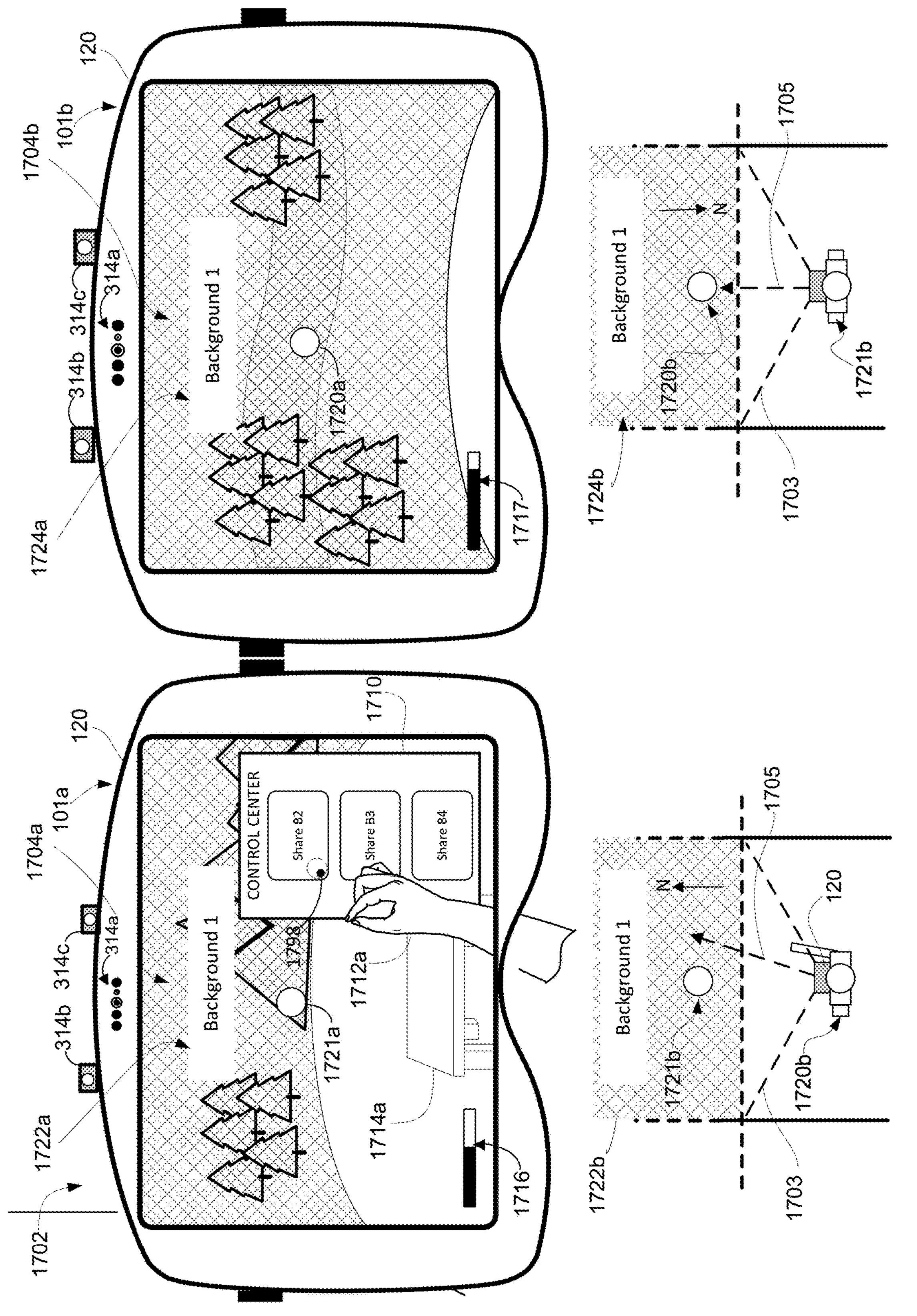
FIG. 17A1

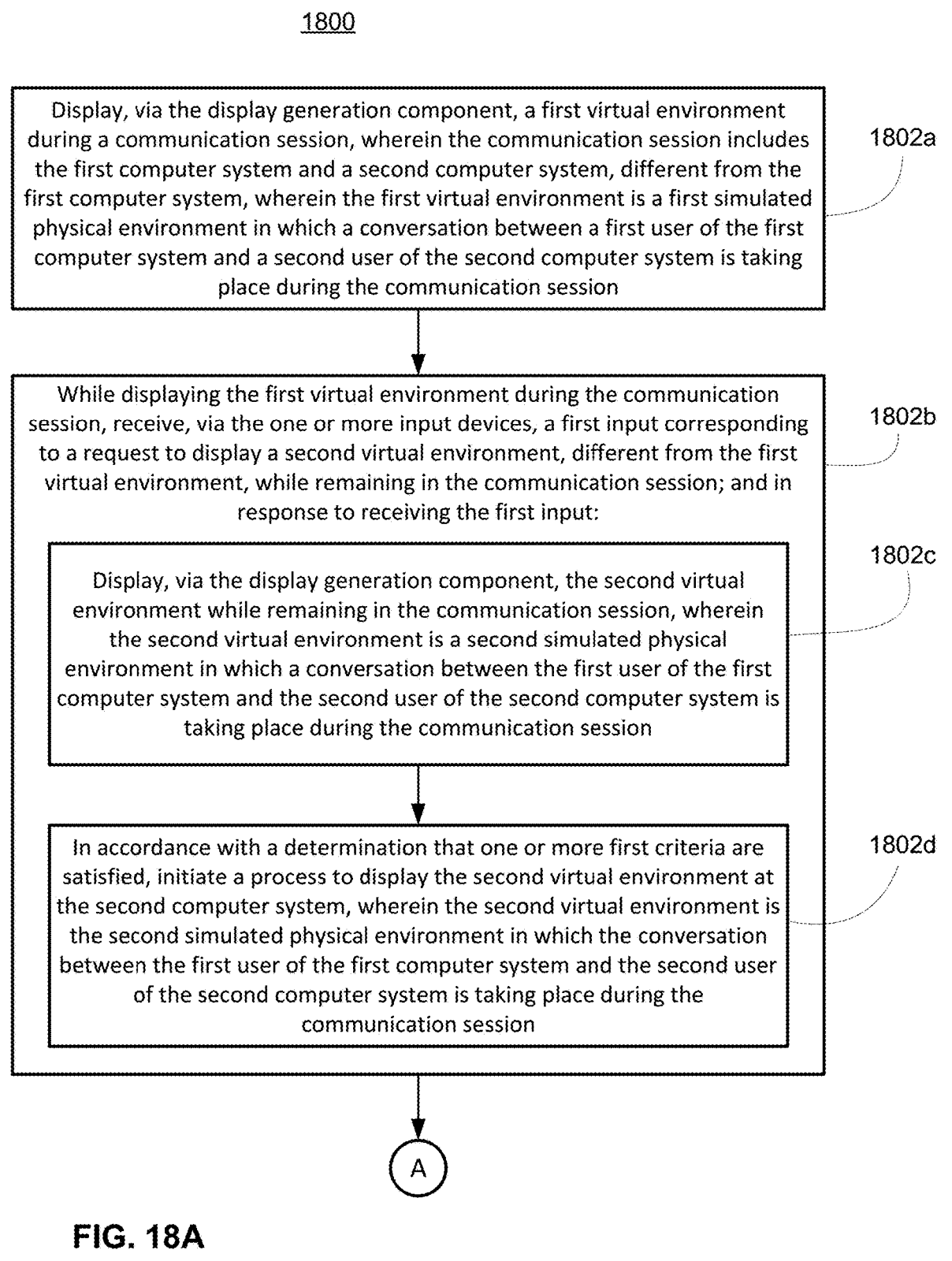

1800

Display, via the display generation component, a first virtual environment during a communication session, wherein the communication session includes the first computer system and a second computer system, different from the first computer system, wherein the first virtual environment is a first simulated physical environment in which a conversation between a first user of the first computer system and a second user of the second computer system is taking place during the communication session 1802a While displaying the first virtual environment during the communication session, receive, via the one or more input devices, a first input corresponding to a request to display a second virtual environment, different from the first virtual environment, while remaining in the communication session; and in response to receiving the first input: 1802b Display, via the display generation component, the second virtual environment while remaining in the communication session, wherein the second virtual environment is a second simulated physical environment in which a conversation between the first user of the first computer system and the second user of the second computer system is taking place during the communication session 1802c In accordance with a determination that one or more first criteria are satisfied, initiate a process to display the second virtual environment at the second computer system, wherein the second virtual environment is the second simulated physical environment in which the conversation between the first user of the first computer system and the second user of the second computer system is taking place during the communication session 1802d

A

FIG. 18A

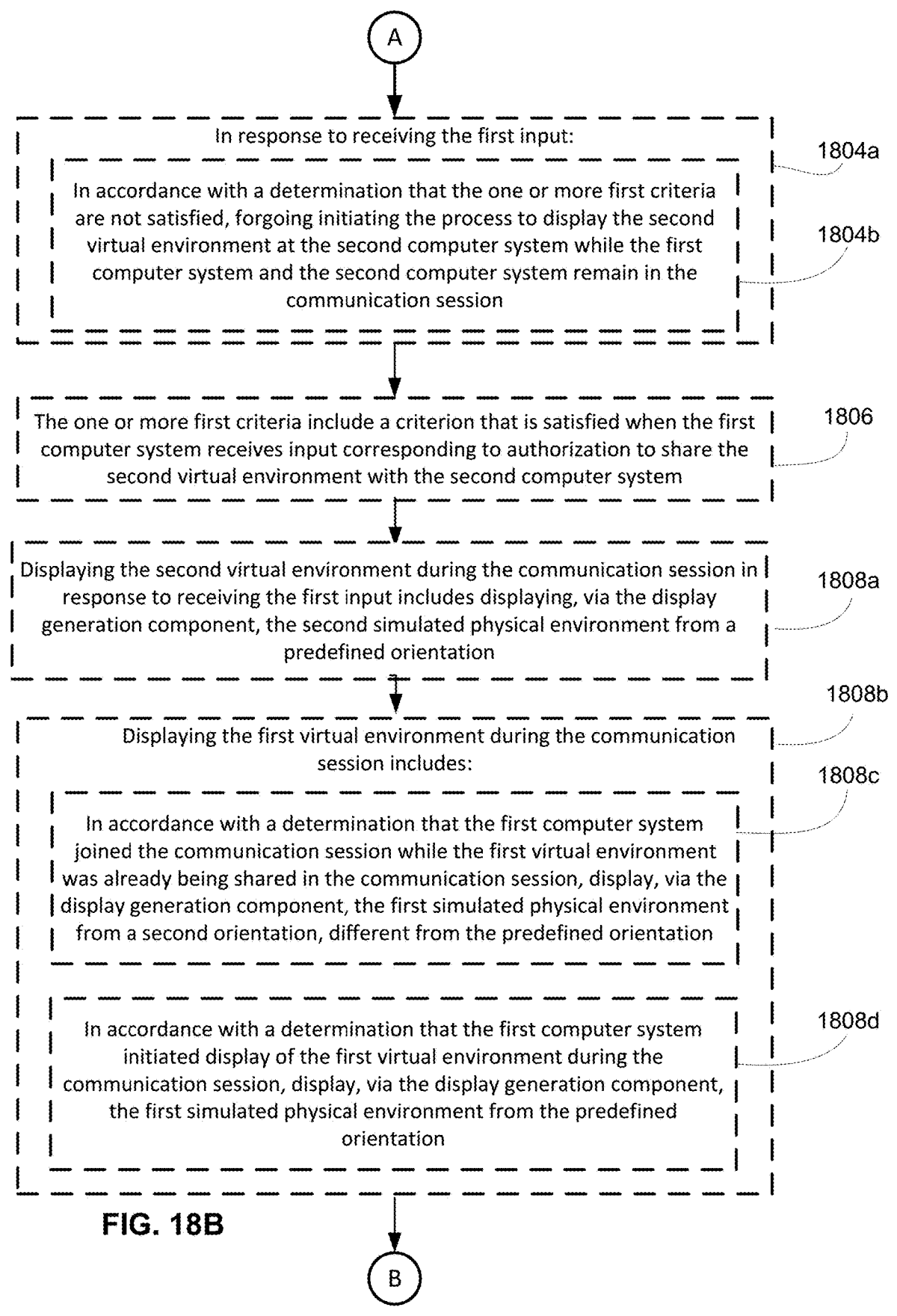

A

In response to receiving the first input: (1804a)

In accordance with a determination that the one or more first criteria are not satisfied, forgoing initiating the process to display the second virtual environment at the second computer system while the first computer system and the second computer system remain in the communication session (1804b)

The one or more first criteria include a criterion that is satisfied when the first computer system receives input corresponding to authorization to share the second virtual environment with the second computer system (1806)

Displaying the second virtual environment during the communication session in response to receiving the first input includes displaying, via the display generation component, the second simulated physical environment from a predefined orientation (1808a)

Displaying the first virtual environment during the communication session includes: (1808b)

In accordance with a determination that the first computer system joined the communication session while the first virtual environment was already being shared in the communication session, display, via the display generation component, the first simulated physical environment from a second orientation, different from the predefined orientation (1808c)

In accordance with a determination that the first computer system initiated display of the first virtual environment during the communication session, display, via the display generation component, the first simulated physical environment from the predefined orientation (1808d)

FIG. 18B

B

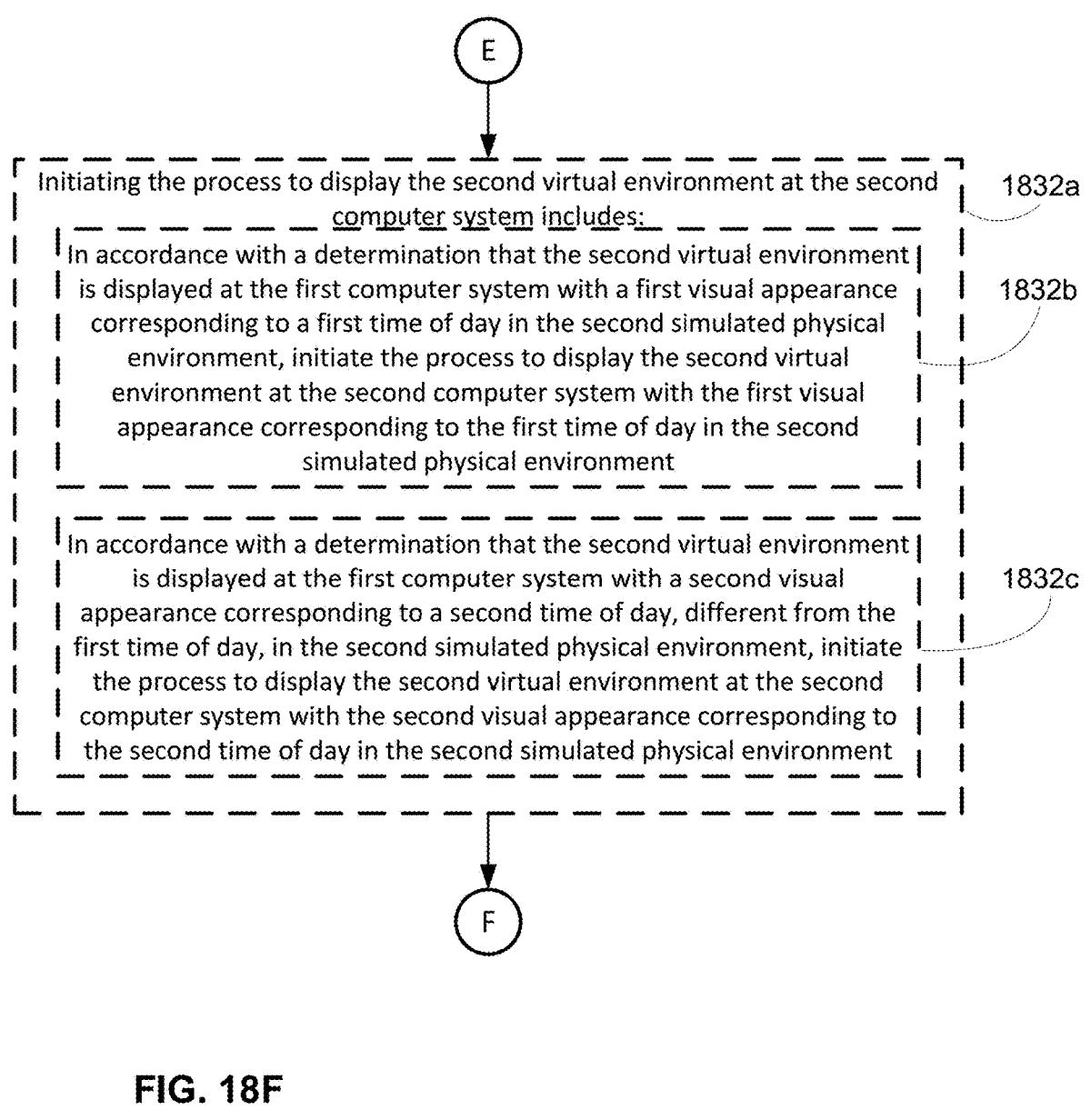

E

Initiating the process to display the second virtual environment at the second computer system includes: 1832a In accordance with a determination that the second virtual environment is displayed at the first computer system with a first visual appearance corresponding to a first time of day in the second simulated physical environment, initiate the process to display the second virtual environment at the second computer system with the first visual appearance corresponding to the first time of day in the second simulated physical environment 1832b In accordance with a determination that the second virtual environment is displayed at the first computer system with a second visual appearance corresponding to a second time of day, different from the first time of day, in the second simulated physical environment, initiate the process to display the second virtual environment at the second computer system with the second visual appearance corresponding to the second time of day in the second simulated physical environment 1832c

F

FIG. 18F

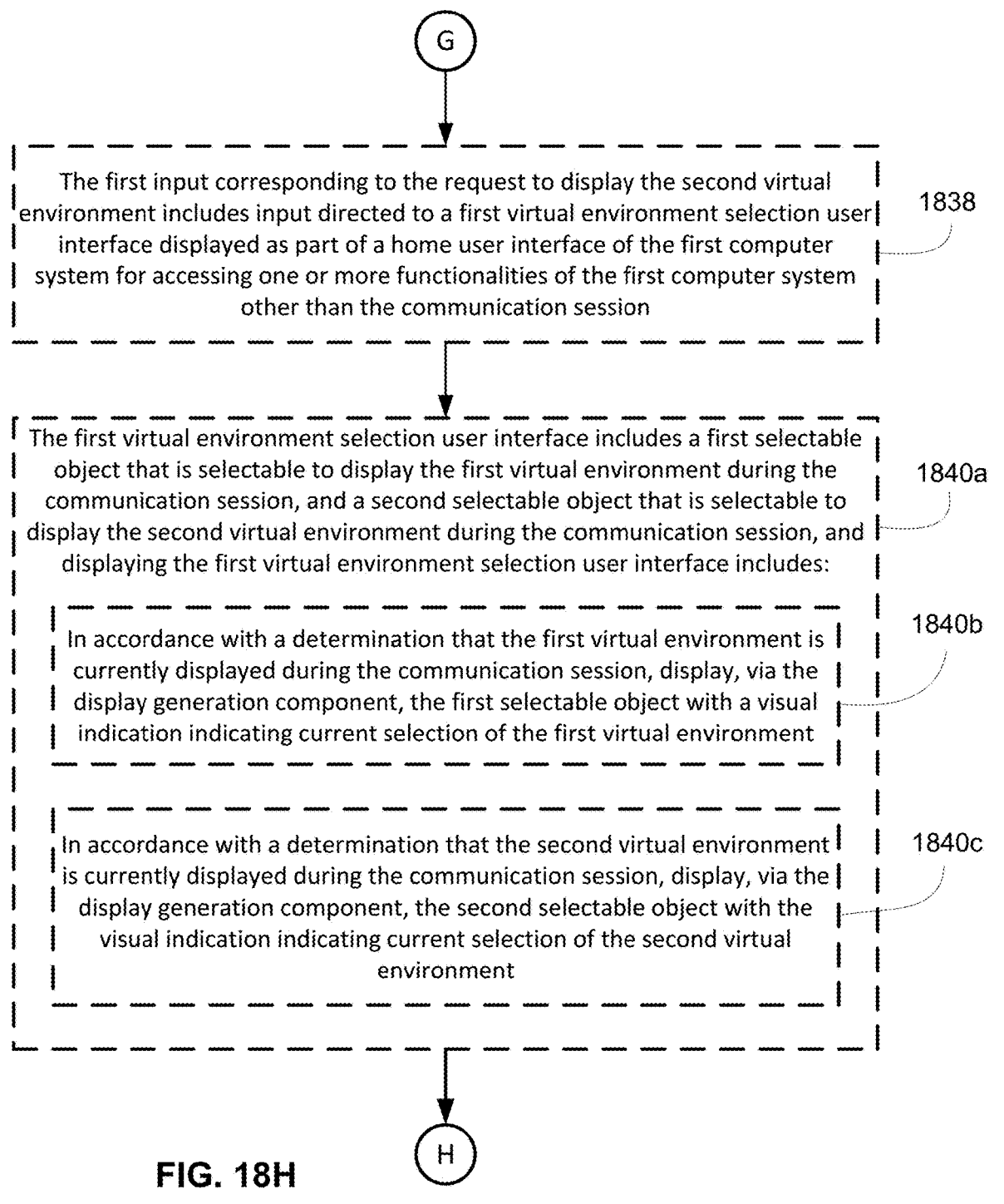

G

The first input corresponding to the request to display the second virtual environment includes input directed to a first virtual environment selection user interface displayed as part of a home user interface of the first computer system for accessing one or more functionalities of the first computer system other than the communication session 1838

The first virtual environment selection user interface includes a first selectable object that is selectable to display the first virtual environment during the communication session, and a second selectable object that is selectable to display the second virtual environment during the communication session, and displaying the first virtual environment selection user interface includes: 1840a In accordance with a determination that the first virtual environment is currently displayed during the communication session, display, via the display generation component, the first selectable object with a visual indication indicating current selection of the first virtual environment 1840b In accordance with a determination that the second virtual environment is currently displayed during the communication session, display, via the display generation component, the second selectable object with the visual indication indicating current selection of the second virtual environment 1840c

H

FIG. 18H

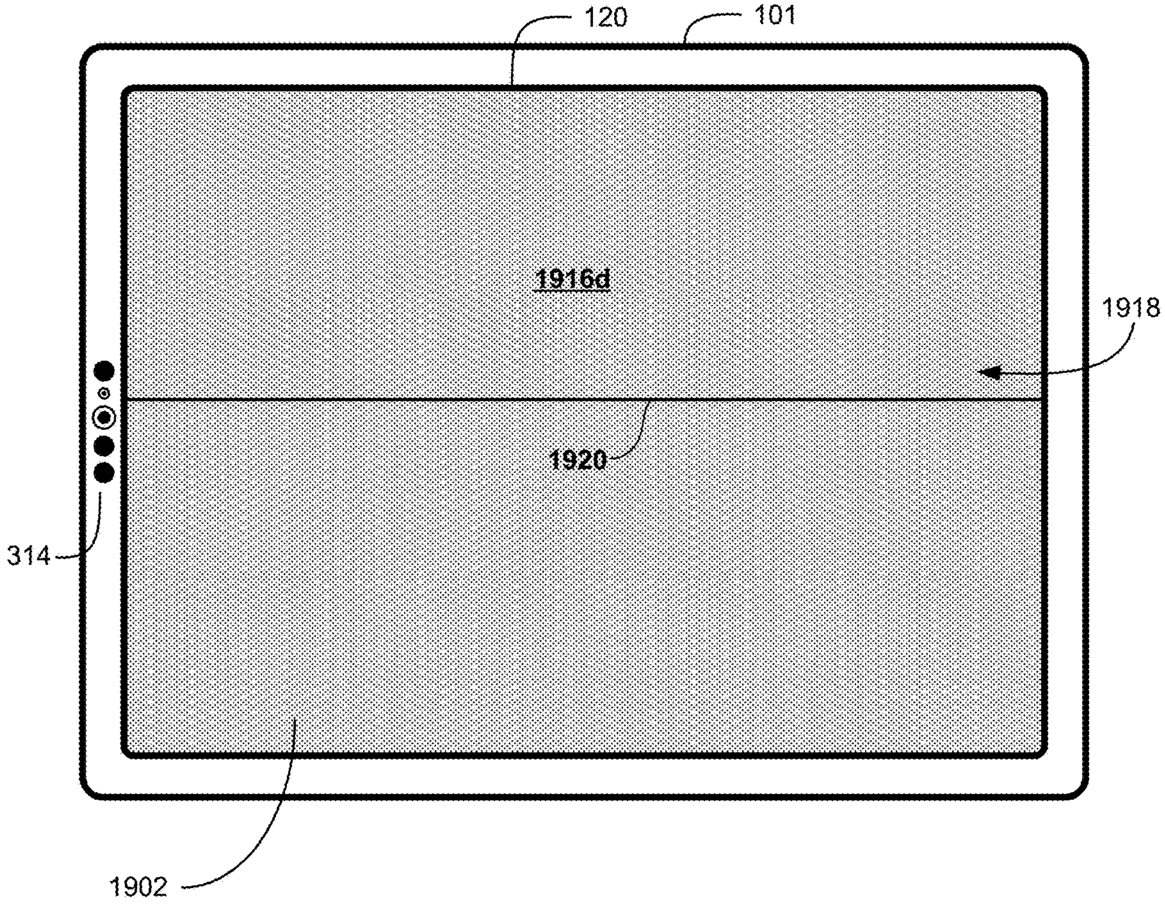
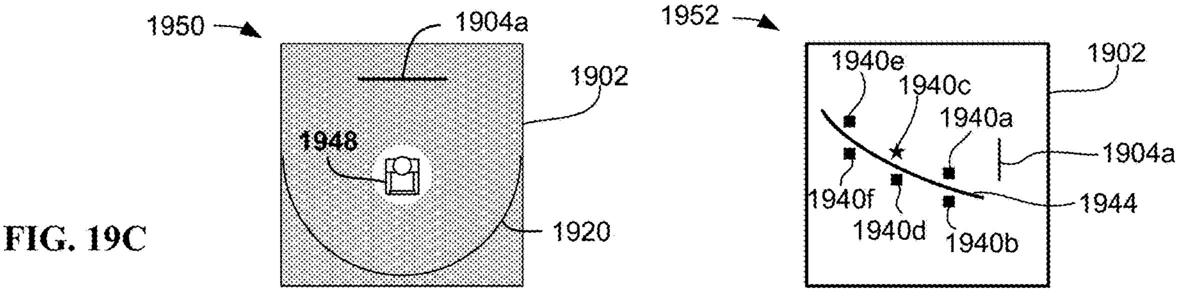
FIG. 19C

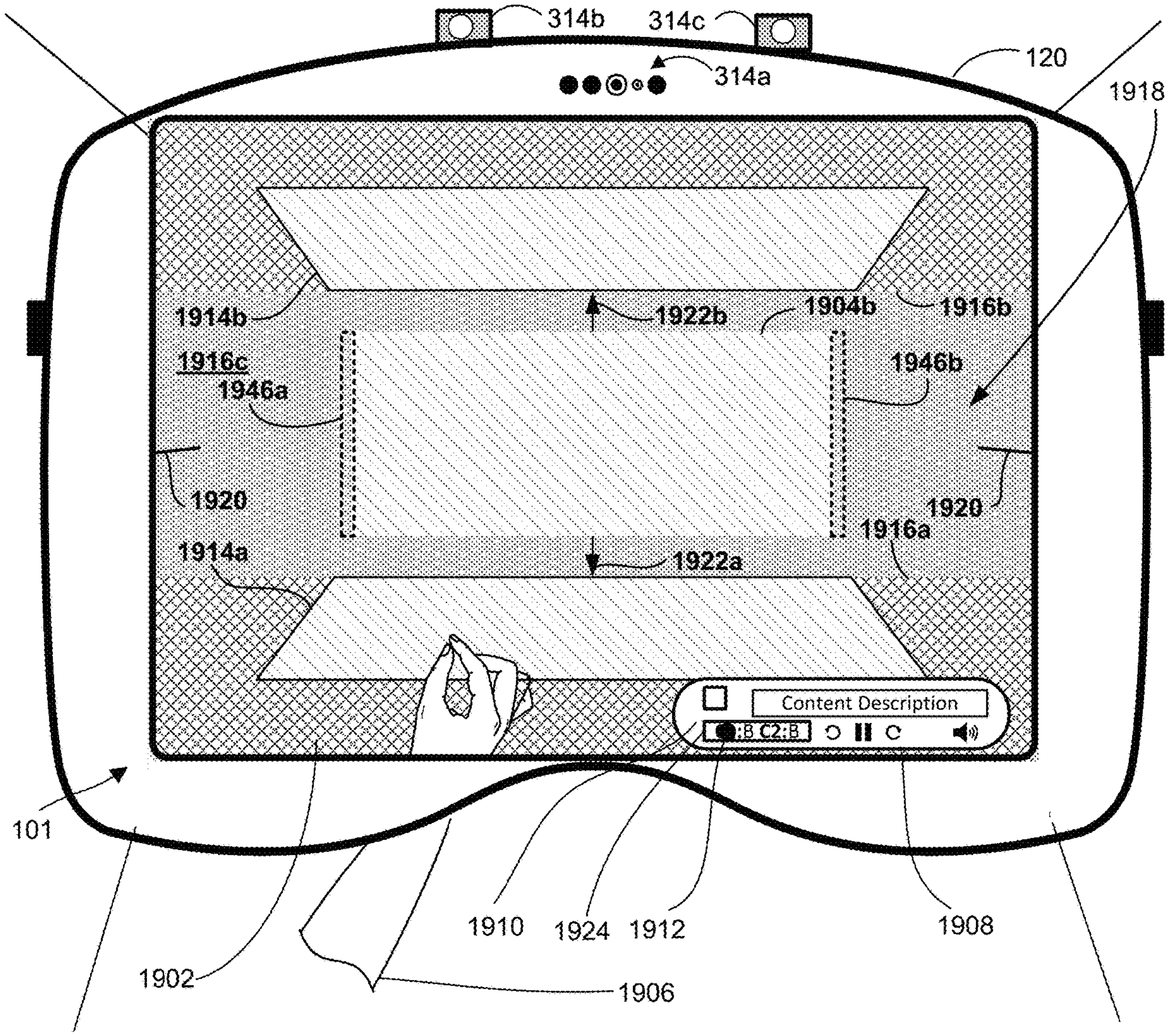
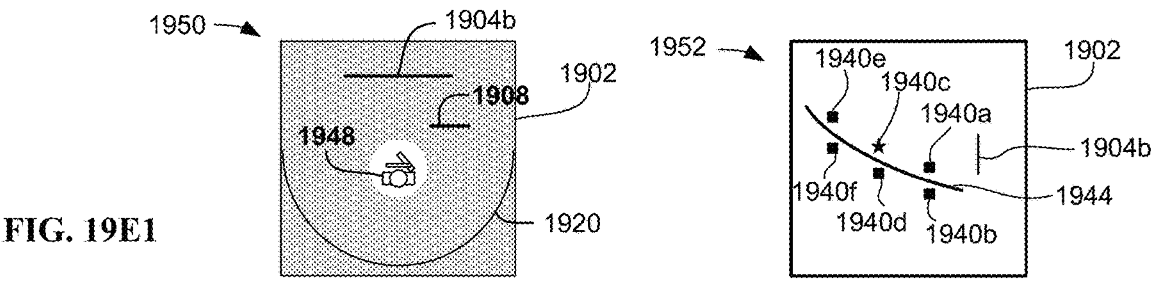
FIG. 19E1

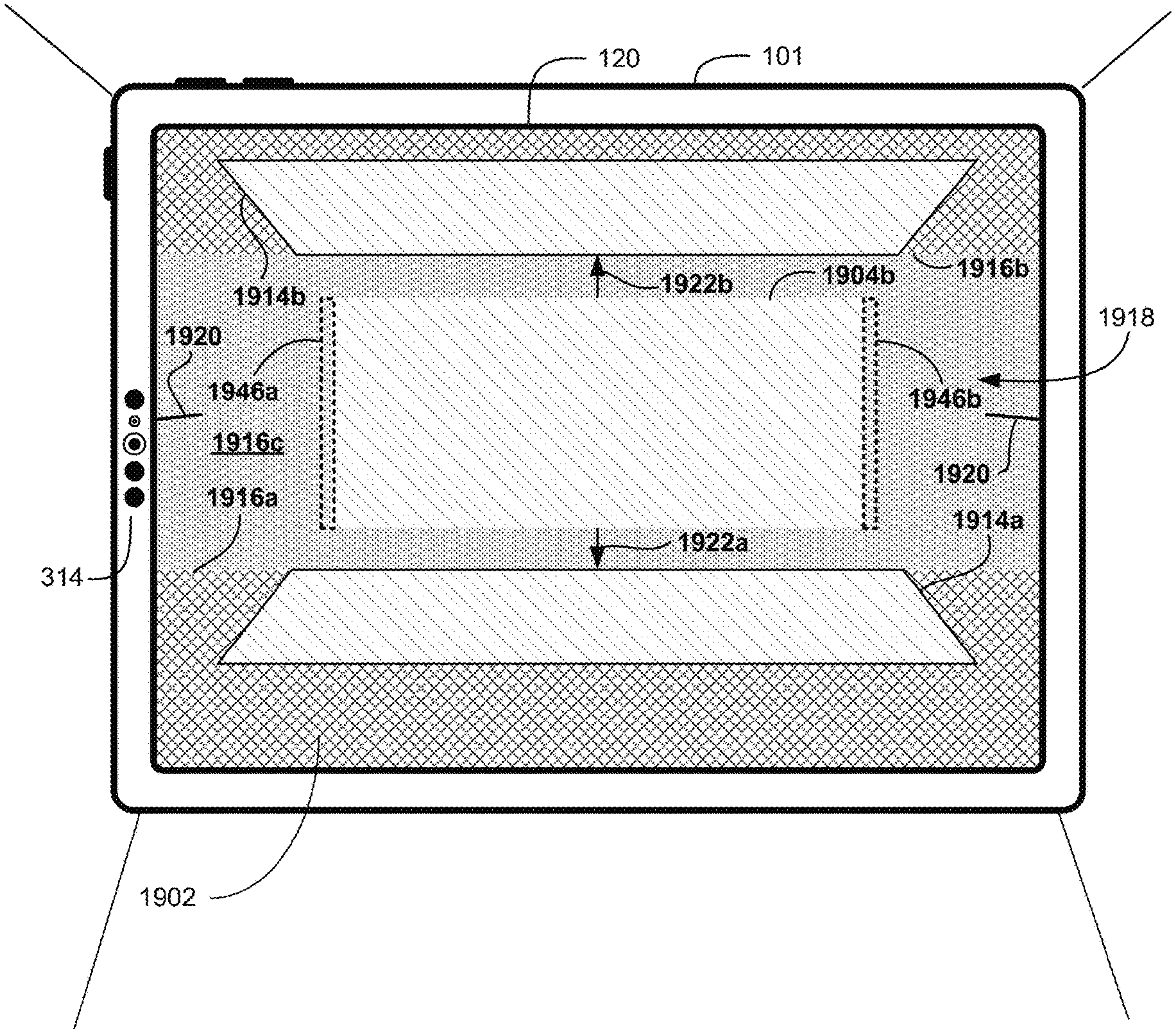
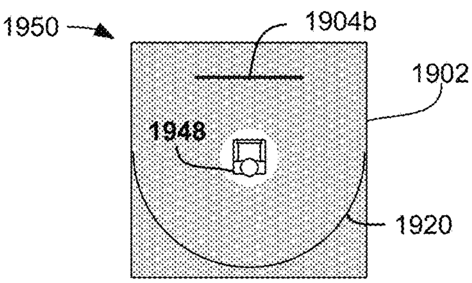
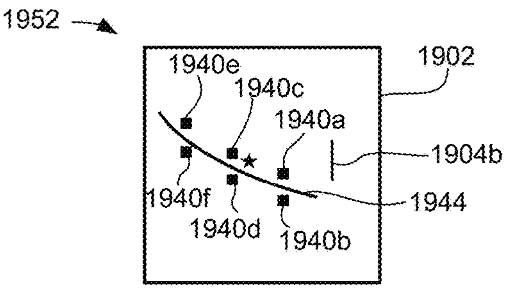
FIG. 19I

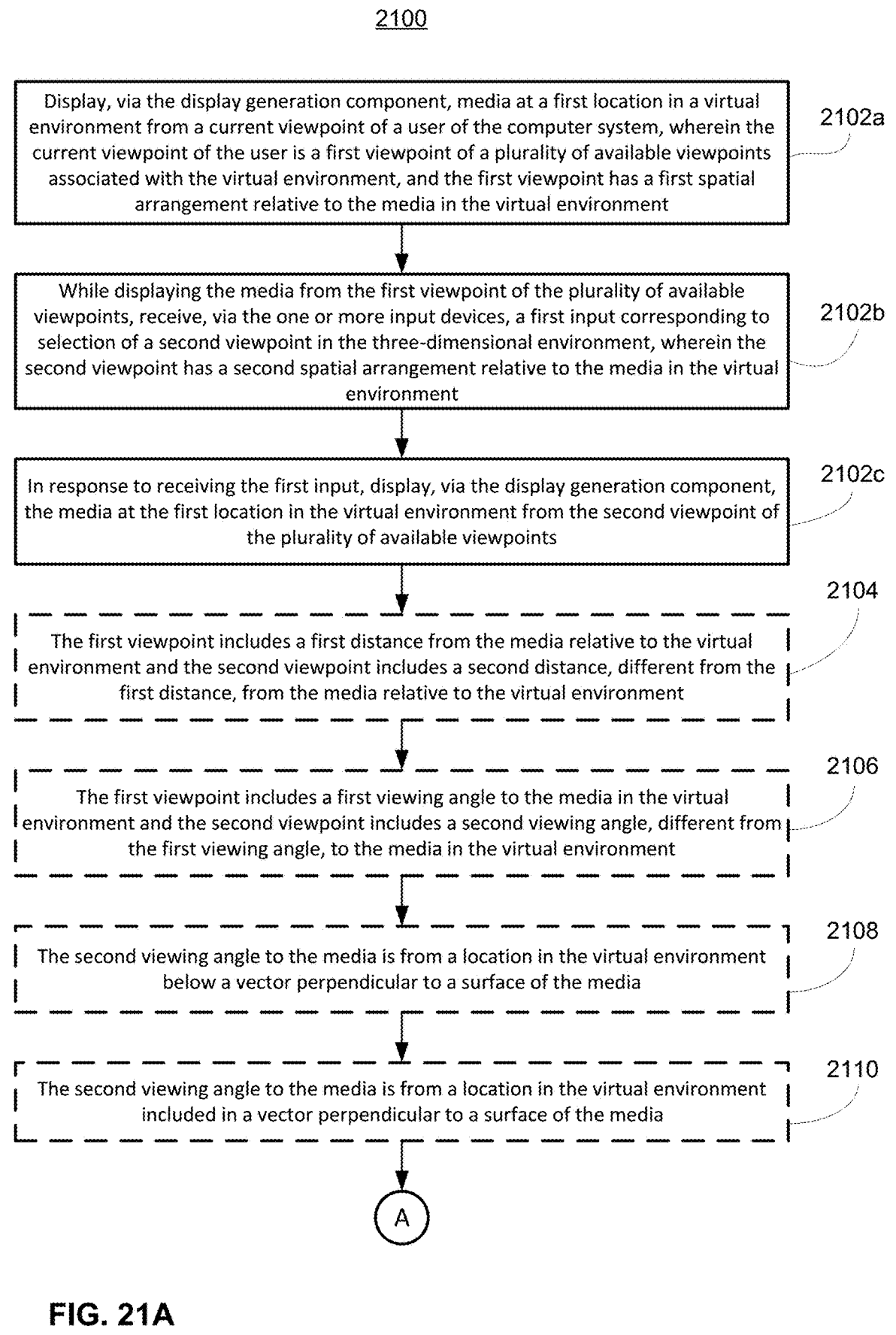

2100

Display, via the display generation component, media at a first location in a virtual environment from a current viewpoint of a user of the computer system, wherein the current viewpoint of the user is a first viewpoint of a plurality of available viewpoints associated with the virtual environment, and the first viewpoint has a first spatial arrangement relative to the media in the virtual environment 2102a While displaying the media from the first viewpoint of the plurality of available viewpoints, receive, via the one or more input devices, a first input corresponding to selection of a second viewpoint in the three-dimensional environment, wherein the second viewpoint has a second spatial arrangement relative to the media in the virtual environment 2102b In response to receiving the first input, display, via the display generation component, the media at the first location in the virtual environment from the second viewpoint of the plurality of available viewpoints 2102c The first viewpoint includes a first distance from the media relative to the virtual environment and the second viewpoint includes a second distance, different from the first distance, from the media relative to the virtual environment 2104

The first viewpoint includes a first viewing angle to the media in the virtual environment and the second viewpoint includes a second viewing angle, different from the first viewing angle, to the media in the virtual environment 2106

The second viewing angle to the media is from a location in the virtual environment below a vector perpendicular to a surface of the media 2108

The second viewing angle to the media is from a location in the virtual environment included in a vector perpendicular to a surface of the media 2110

A

FIG. 21A

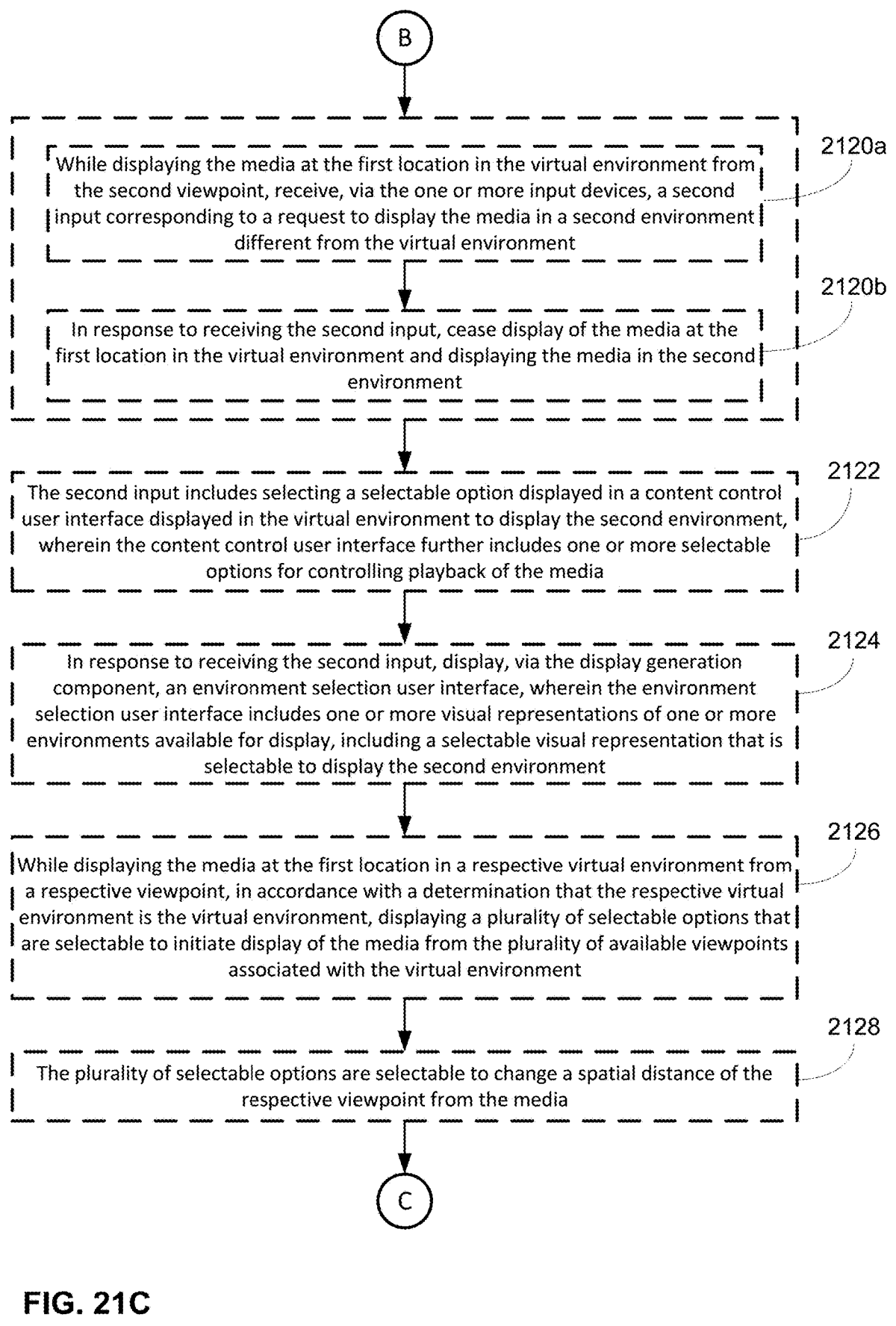

B

2120a: While displaying the media at the first location in the virtual environment from the second viewpoint, receive, via the one or more input devices, a second input corresponding to a request to display the media in a second environment different from the virtual environment 2120b: In response to receiving the second input, cease display of the media at the first location in the virtual environment and displaying the media in the second environment 2122: The second input includes selecting a selectable option displayed in a content control user interface displayed in the virtual environment to display the second environment, wherein the content control user interface further includes one or more selectable options for controlling playback of the media 2124: In response to receiving the second input, display, via the display generation component, an environment selection user interface, wherein the environment selection user interface includes one or more visual representations of one or more environments available for display, including a selectable visual representation that is selectable to display the second environment 2126: While displaying the media at the first location in a respective virtual environment from a respective viewpoint, in accordance with a determination that the respective virtual environment is the virtual environment, displaying a plurality of selectable options that are selectable to initiate display of the media from the plurality of available viewpoints associated with the virtual environment 2128: The plurality of selectable options are selectable to change a spatial distance of the respective viewpoint from the media

C

FIG. 21C

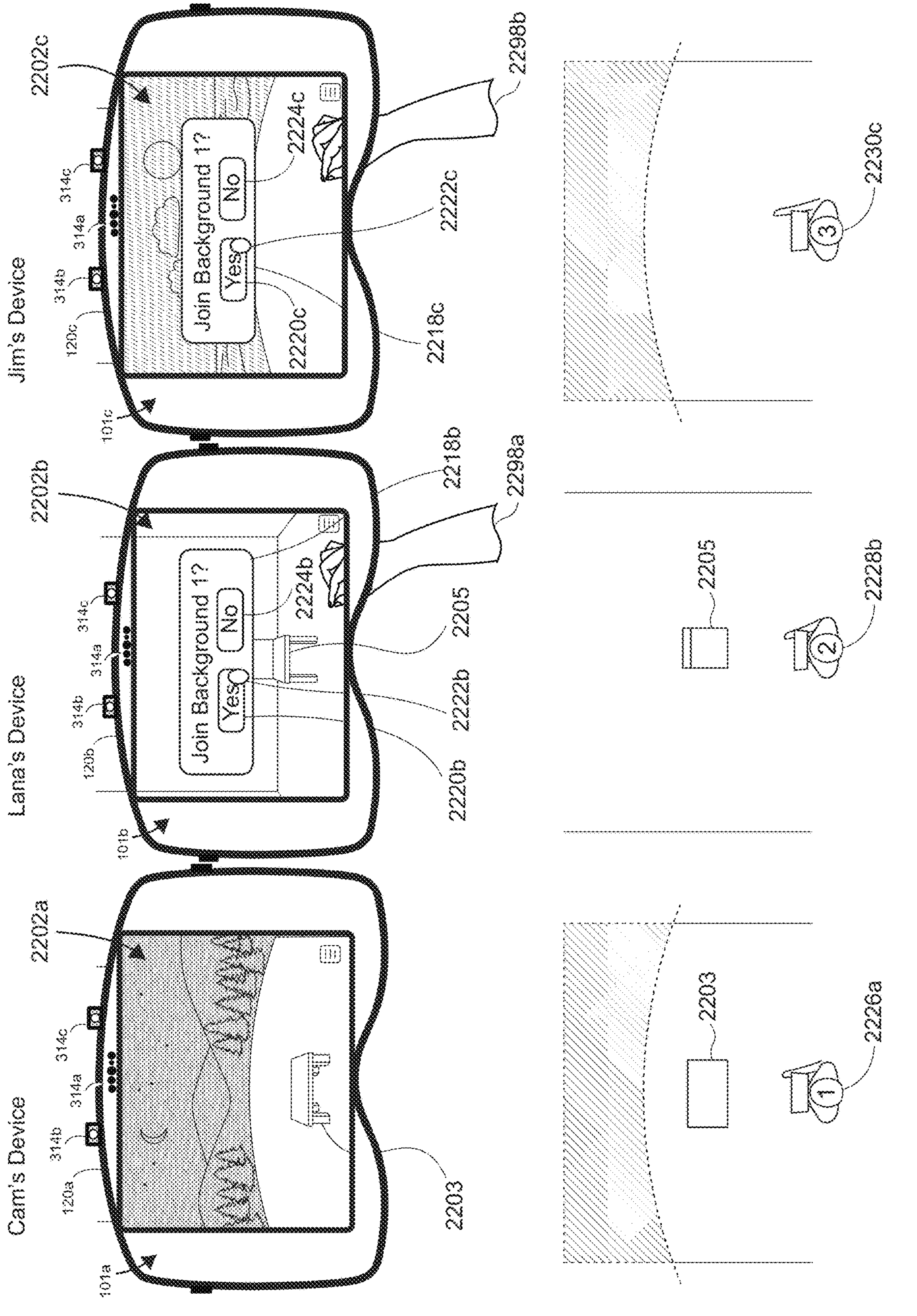
FIG. 22B1

2300

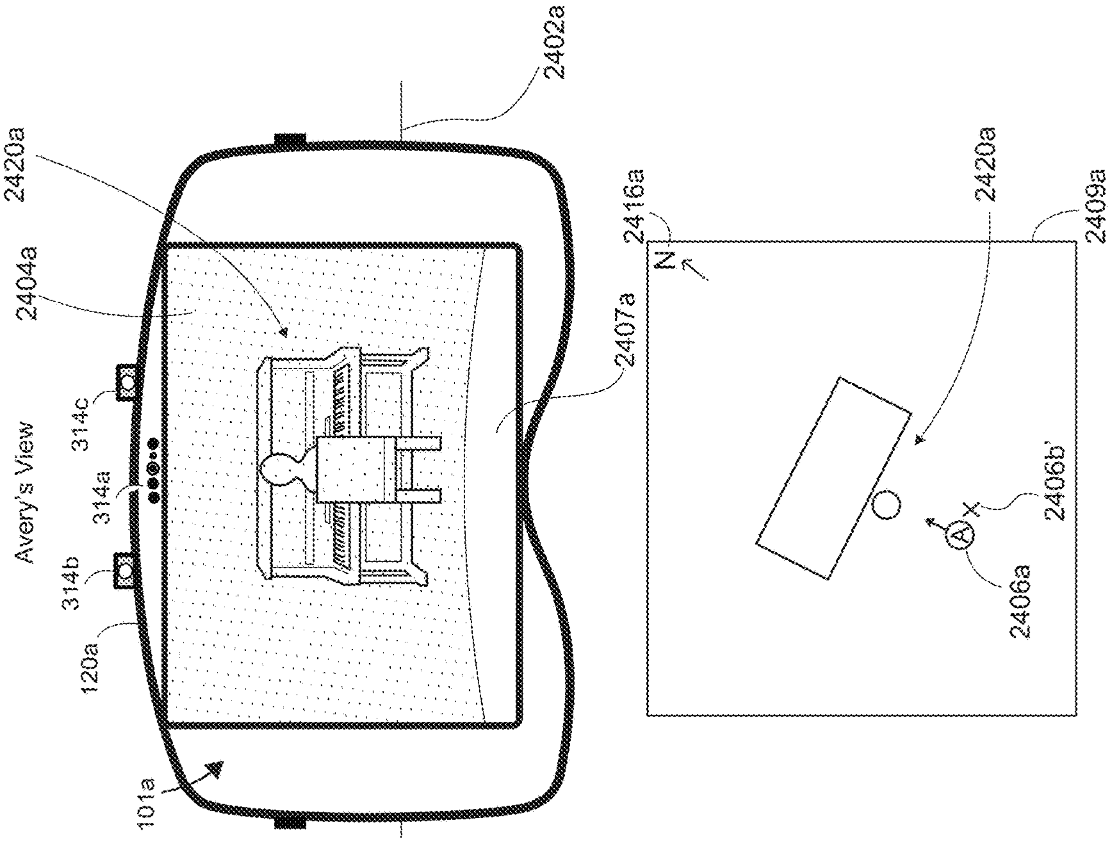
FIG. 24F1

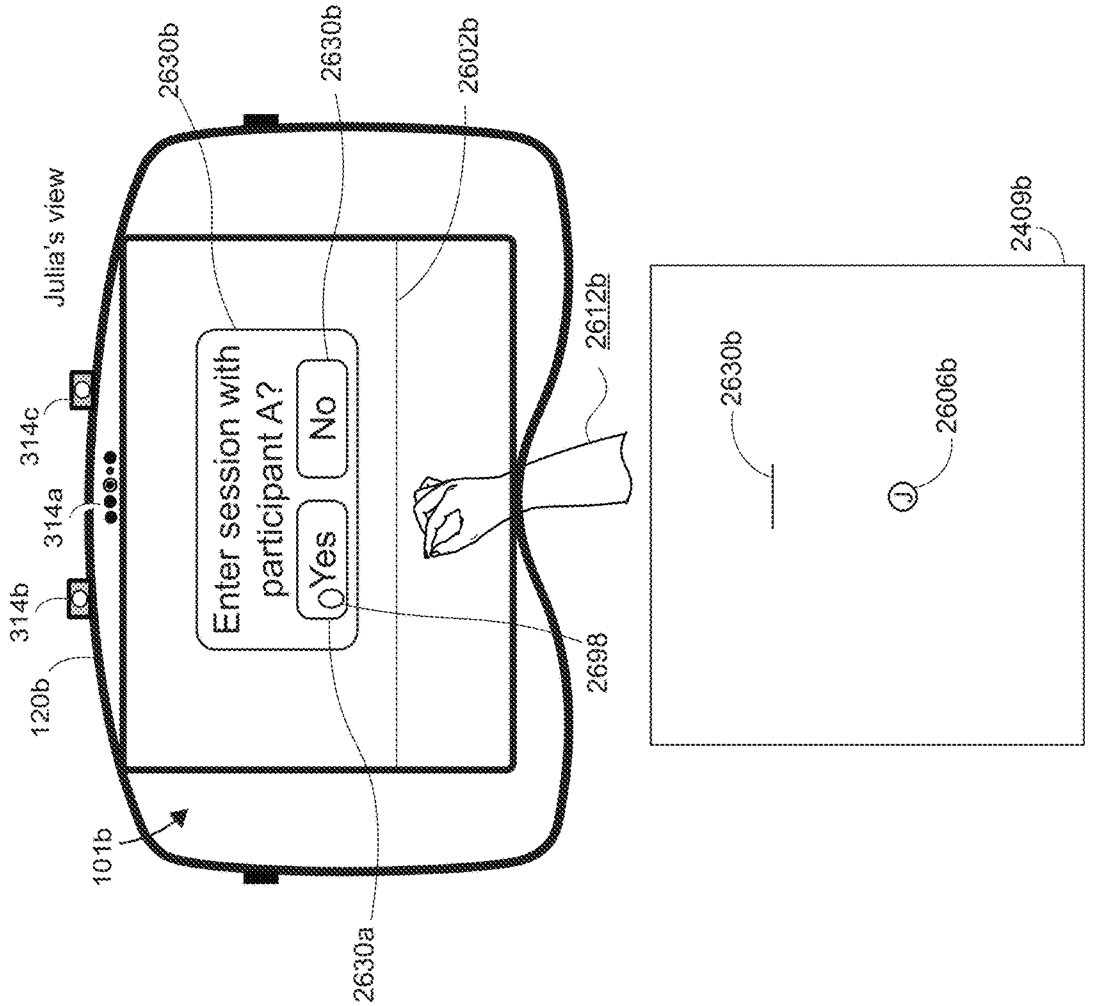
FIG. 26A1

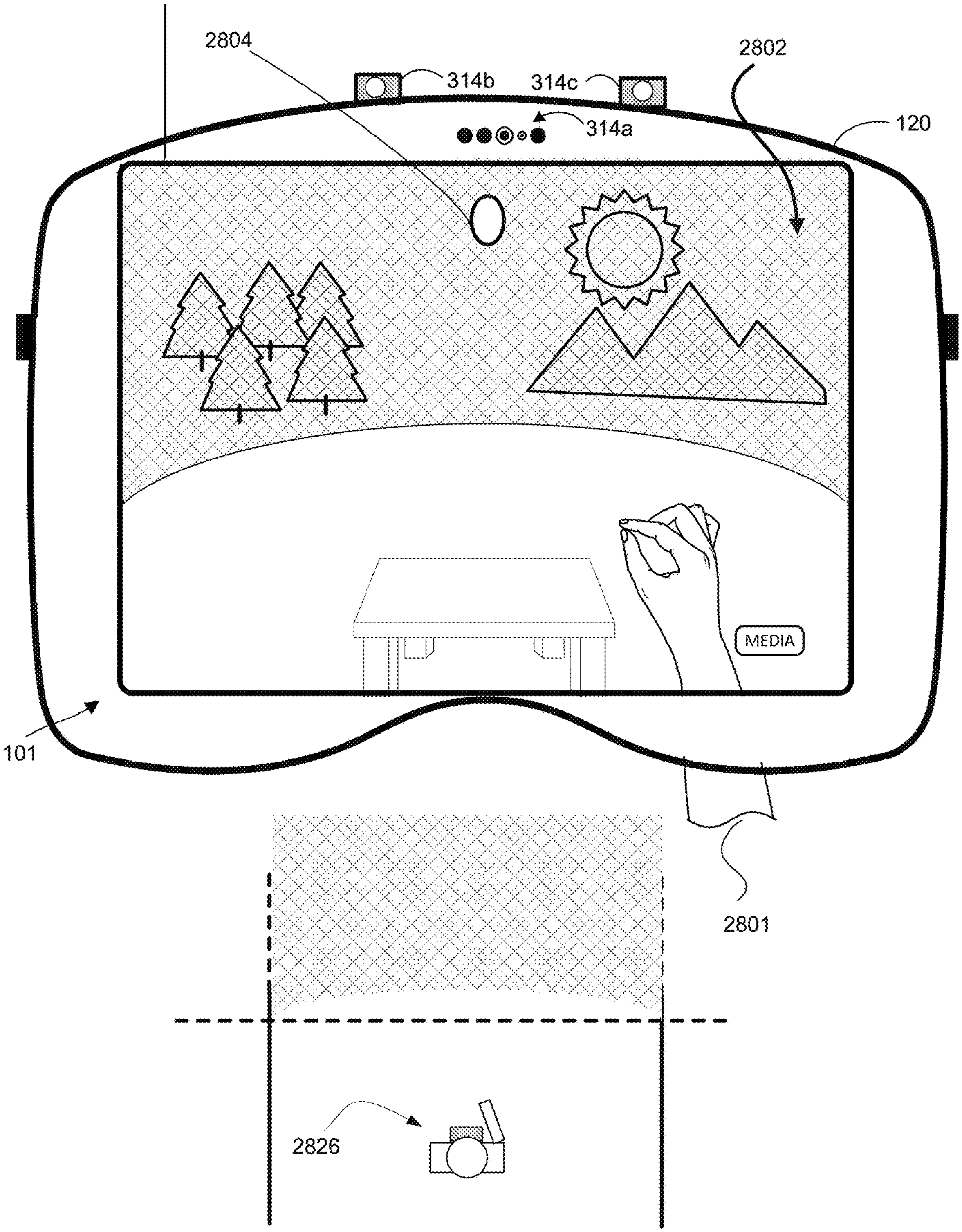
FIG. 28A1

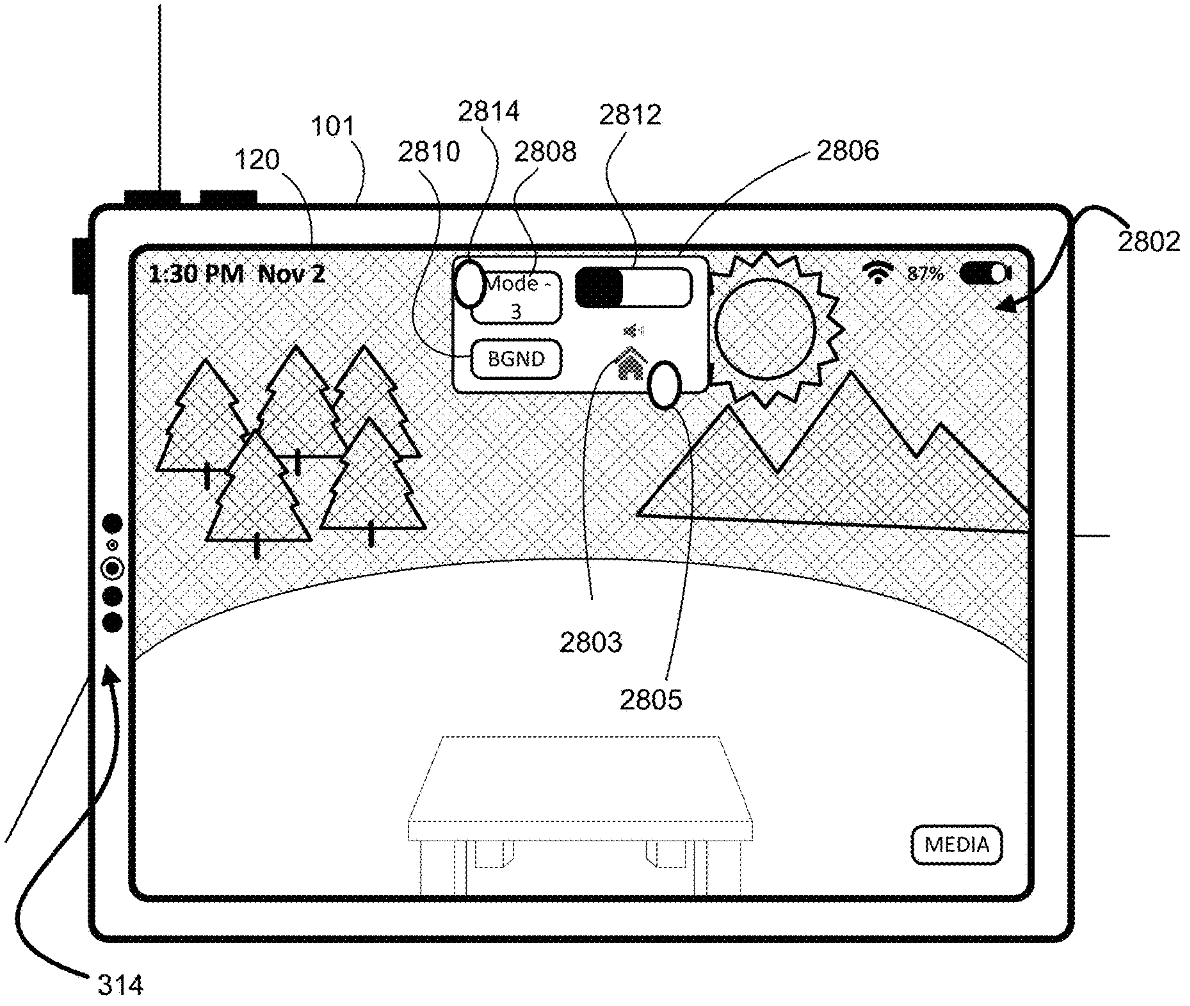
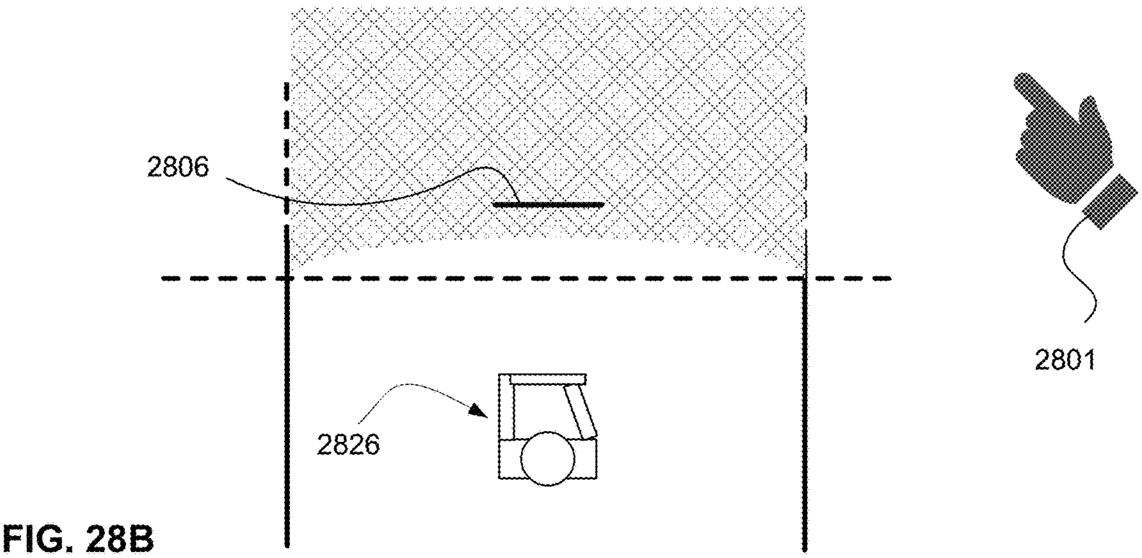
FIG. 28B

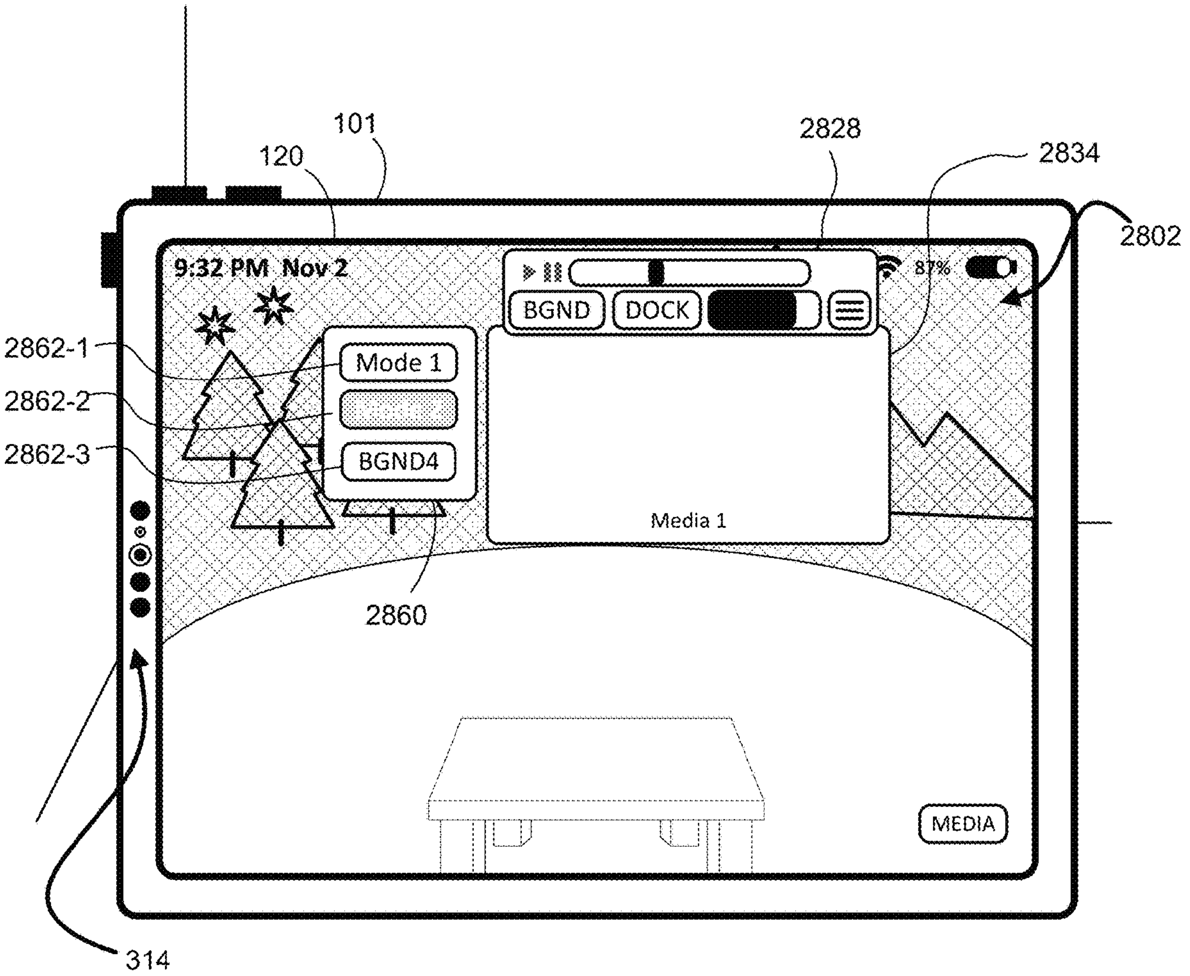
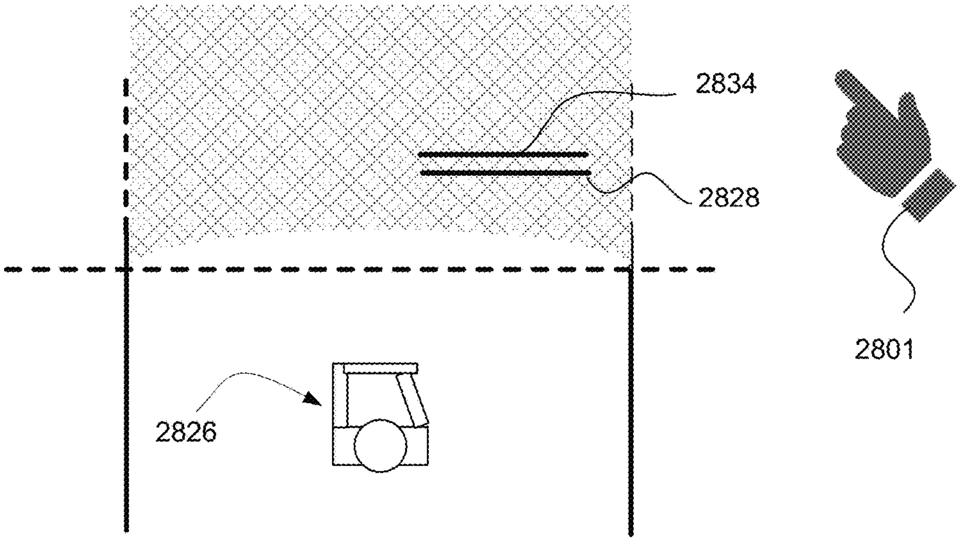
FIG. 28P

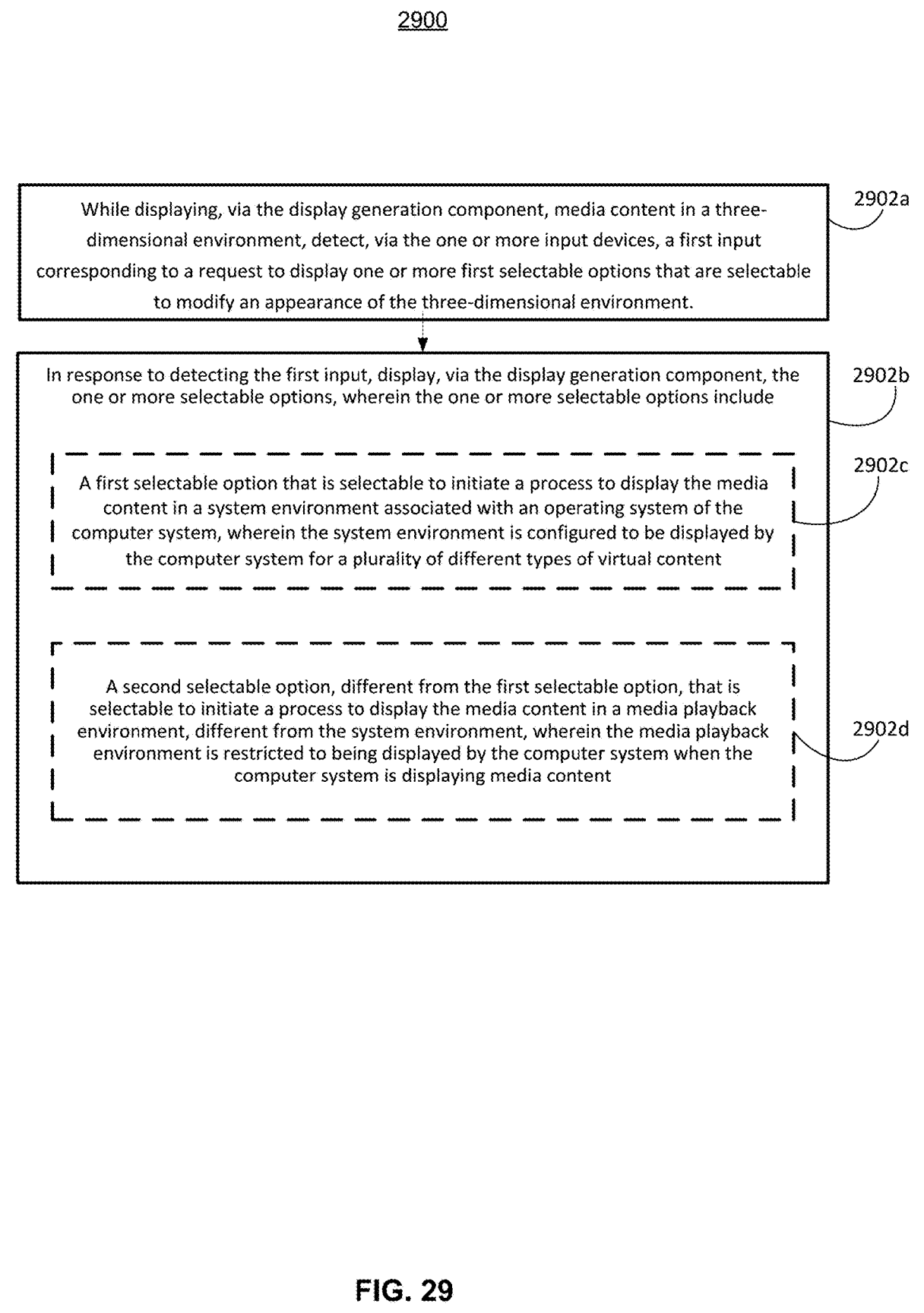

2900

2902a: While displaying, via the display generation component, media content in a three-dimensional environment, detect, via the one or more input devices, a first input corresponding to a request to display one or more first selectable options that are selectable to modify an appearance of the three-dimensional environment.

2902b: In response to detecting the first input, display, via the display generation component, the one or more selectable options, wherein the one or more selectable options include 2902c: A first selectable option that is selectable to initiate a process to display the media content in a system environment associated with an operating system of the computer system, wherein the system environment is configured to be displayed by the computer system for a plurality of different types of virtual content 2902d: A second selectable option, different from the first selectable option, that is selectable to initiate a process to display the media content in a media playback environment, different from the system environment, wherein the media playback environment is restricted to being displayed by the computer system when the computer system is displaying media content

FIG. 29

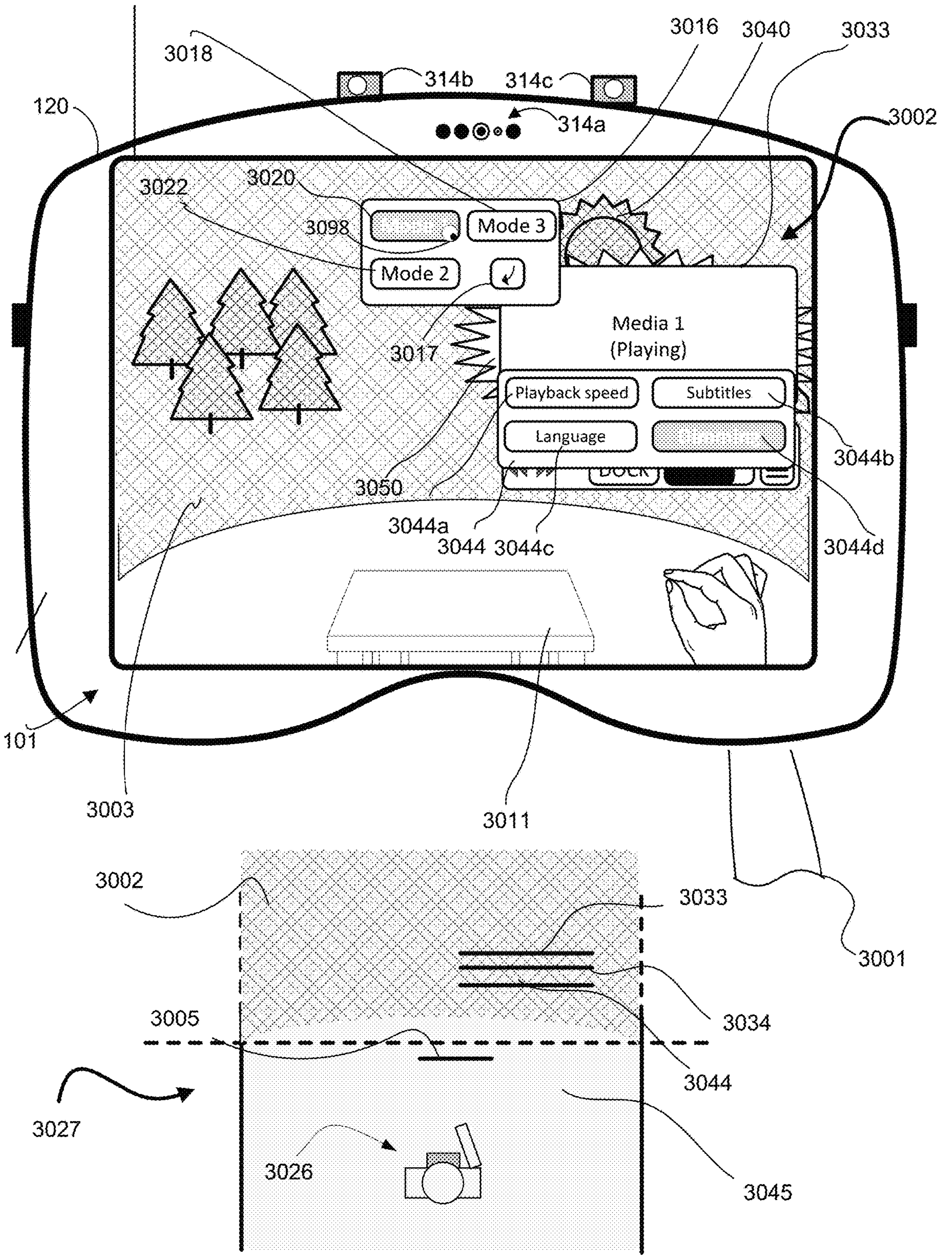
FIG. 30G1

METHODS FOR TIME OF DAY ADJUSTMENTS FOR ENVIRONMENTS AND ENVIRONMENT PRESENTATION DURING COMMUNICATION SESSIONS

CROSS-REFERENCE TO RELATED APPLICATIONS

This application claims the benefit of U.S. Provisional Application No. 63/377,020, filed Sep. 24, 2022, U.S. Provisional Application No. 63/502,407, filed May 15, 2023, U.S. Provisional Application No. 63/506,127, filed Jun. 4, 2023, and U.S. Provisional Application No. 63/506,133, filed Jun. 4, 2023, the contents of which are herein incorporated by reference in their entireties for all purposes.

TECHNICAL FIELD

The present disclosure relates generally to computer systems that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for interacting with environments that include at least some virtual elements (e.g., applications, augmented reality environments, mixed reality environments, and virtual reality environments) are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. In addition, these methods take longer than necessary, thereby wasting energy of the computer system. This latter consideration is particularly important in battery-operated devices.

Accordingly, there is a need for computer systems with improved methods and interfaces for providing computer-generated experiences to users that make interaction with the computer systems more efficient and intuitive for a user. Such methods and interfaces optionally complement or replace conventional methods for providing extended reality experiences to users. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for interacting with a three-dimensional environment. Such methods and interfaces may complement or replace conventional methods for interacting with a three-dimensional environment. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system selectively determines and applies a time of day setting to a respective virtual environment based on a system setting in accordance with some embodiments. In some embodiments, a computer system updates a time of day setting to nighttime for a virtual environment based on detecting an event associated with auto-dimming in accordance with some embodiments. In some embodiments, a computer system displays a content item in an expanded display mode (e.g., full screen) in accordance with some embodiments. In some embodiments, a computer system joins a communication session with a second computer system while maintaining display of their respective virtual environments in accordance with some embodiments. In some embodiments, a computer system selectively moves a portal into a virtual environment based on user movement in accordance with some embodiments. In some embodiments, a first computer system and a second computer system selectively share a virtual environment during a communication session in accordance with some embodiments. In some embodiments, a computer system displays media in a virtual three-dimensional environment with a simulated lighting effect in accordance with some embodiments. In some embodiments, a computer system displays media in a virtual environment from a viewpoint of a plurality of available viewpoints in the virtual environment in accordance with some embodiments. In some embodiments, a computer system and a second computer system initiate sharing of a virtual environment in accordance with some embodiments. In some embodiments, a computer system selects a position relative to shared content in accordance with some embodiments. In some embodiments, a computer system presents representations of participants of a communication session based on parameters associated with shared content in accordance with some embodiments. In some embodiments, a computer system presents user interfaces for controlling a visual appearance of a three-dimensional environment including media content, in accordance with some embodiments. In some embodiments, a computer system changes a visual appearance of a three-dimensional environment in accordance with an environmental mode, in accordance with some embodiments.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8K is a flowchart illustrating an exemplary method of selectively determining and applying a time of day setting to a respective virtual environment based on a system setting in accordance with some embodiments.

FIGS. 16A-16H is a flowchart illustrating a method of joining a communication session with a second computer system while maintaining display of their respective virtual environments in accordance with some embodiments.

FIGS. 18A-18I is a flowchart illustrating a method of selective sharing a virtual environment during a communication session in accordance with some embodiments.

FIGS. 19A-19K illustrate examples of a computer system displaying media in a virtual environment with a simulated lighting effect from viewpoints of a plurality of available viewpoints in the virtual environment in accordance with some embodiments.

FIGS. 21A-21E is a flowchart illustrating a method of displaying media in a virtual environment from a viewpoint of a plurality of available viewpoints in the virtual environment in accordance with some embodiments.

FIG. 29 is a flowchart for illustrating a method of presenting user interfaces and controls associated with media content displayed within three-dimensional environments in accordance with some embodiments.

DESCRIPTION OF EMBODIMENTS

The present disclosure relates to user interfaces for providing an extended reality (XR) experience to a user, in accordance with some embodiments.

The systems, methods, and GUIs described herein improve user interface interactions with virtual/augmented reality environments in multiple ways.

In some embodiments, a computer system selectively determines and applies a time of day setting to a respective virtual environment based on a system setting in accordance with some embodiments. In some embodiments, a computer system updates a time of day setting to nighttime for a virtual environment based on detecting an event associated with auto-dimming in accordance with some embodiments. In some embodiments, a computer system displays a content item in an expanded display mode (e.g., full screen) in accordance with some embodiments. In some embodiments, a computer system joins a communication session with a second computer system while maintaining display of their respective virtual environments in accordance with some embodiments. In some embodiments, a computer system selectively moves a portal into a virtual environment based on user movement in accordance with some embodiments. In some embodiments, a first computer system and a second computer system selective share a virtual environment during a communication session in accordance with some embodiments. In some embodiments, a computer system displays media in a virtual three-dimensional environment with a simulated lighting effect in accordance with some embodiments. In some embodiments, a computer system displays media in a virtual environment from a viewpoint of a plurality of available viewpoints in the virtual environment in accordance with some embodiments. In some embodiments, a computer system and a second computer system initiate sharing of a virtual environment in accordance with some embodiments. In some embodiments, a computer system selects a position relative to shared content in accordance with some embodiments. In some embodiments, a computer system presents representations of participants of a communication session based on parameters associated with shared content in accordance with some embodiments. In some embodiments, a computer system presents user interfaces for controlling a visual appearance of a three-dimensional environment including media content, in accordance with some embodiments. In some embodiments, a computer system changes a visual appearance of a three-dimensional environment in accordance with an environmental mode, in accordance with some embodiments.

Figure 23:
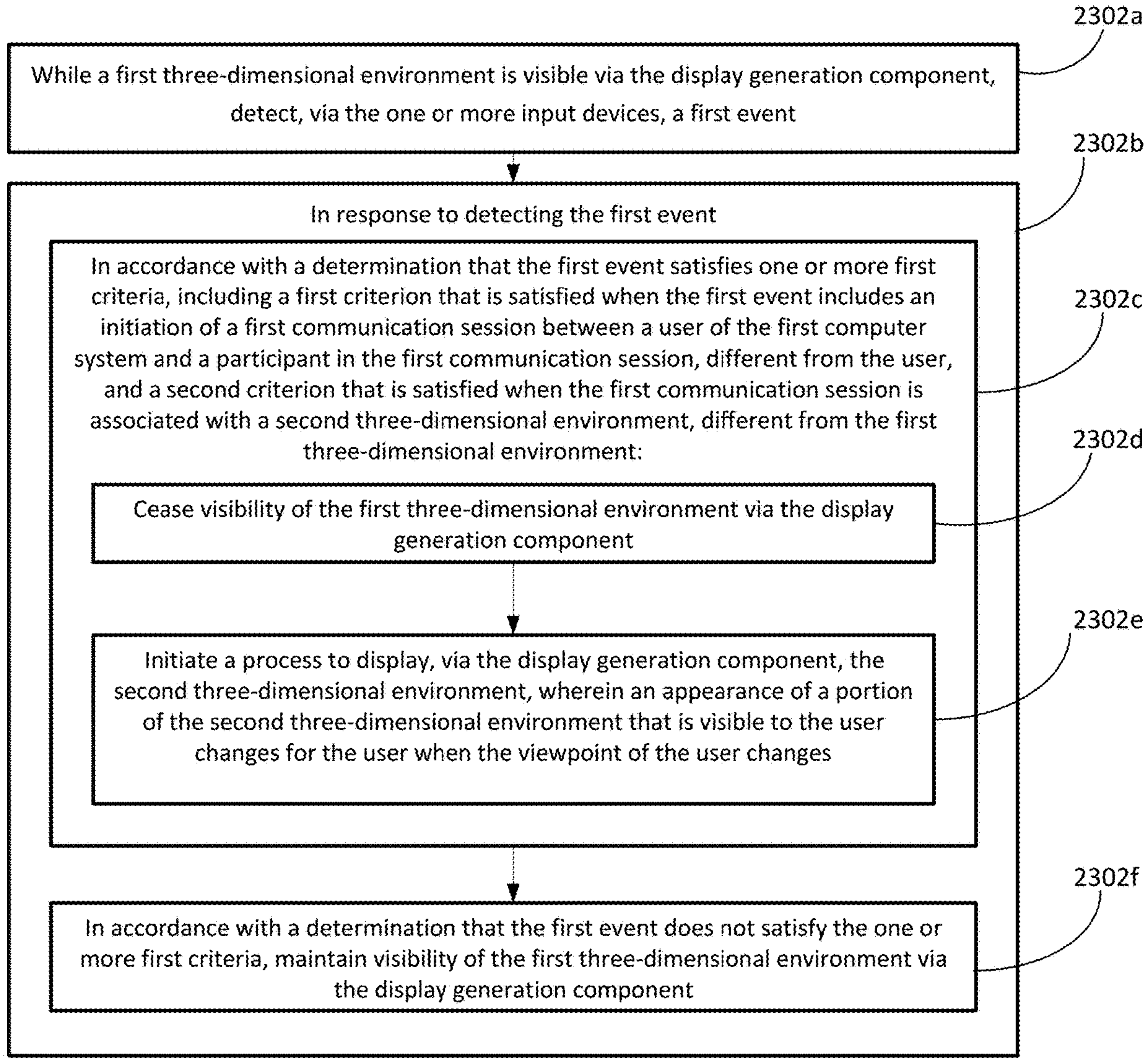
FIG. 23 is a flowchart for illustrating a method of facilitating sharing of a virtual three-dimensional environment in accordance with some embodiments.
Figure 24A:
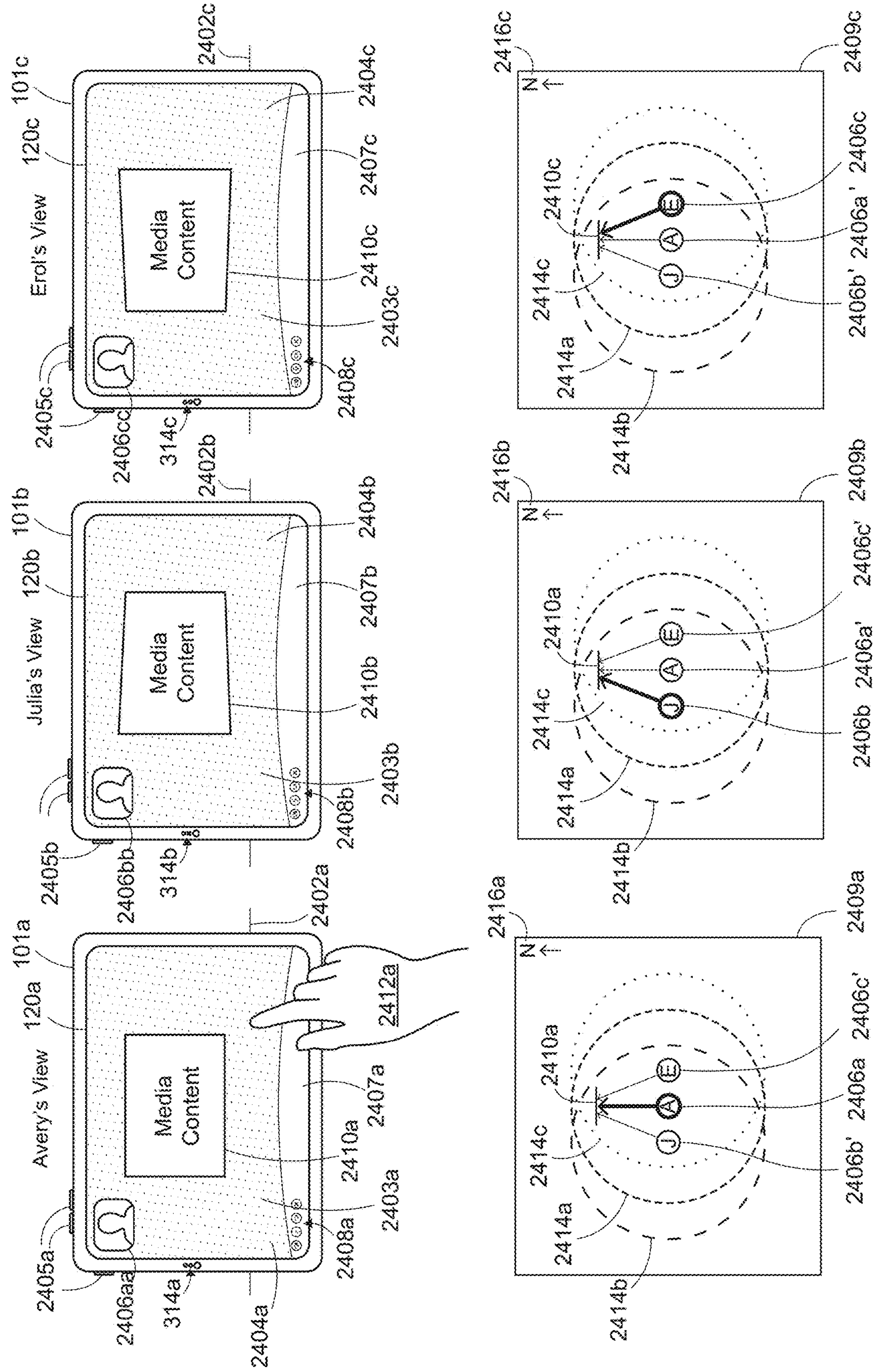
Figure 27:
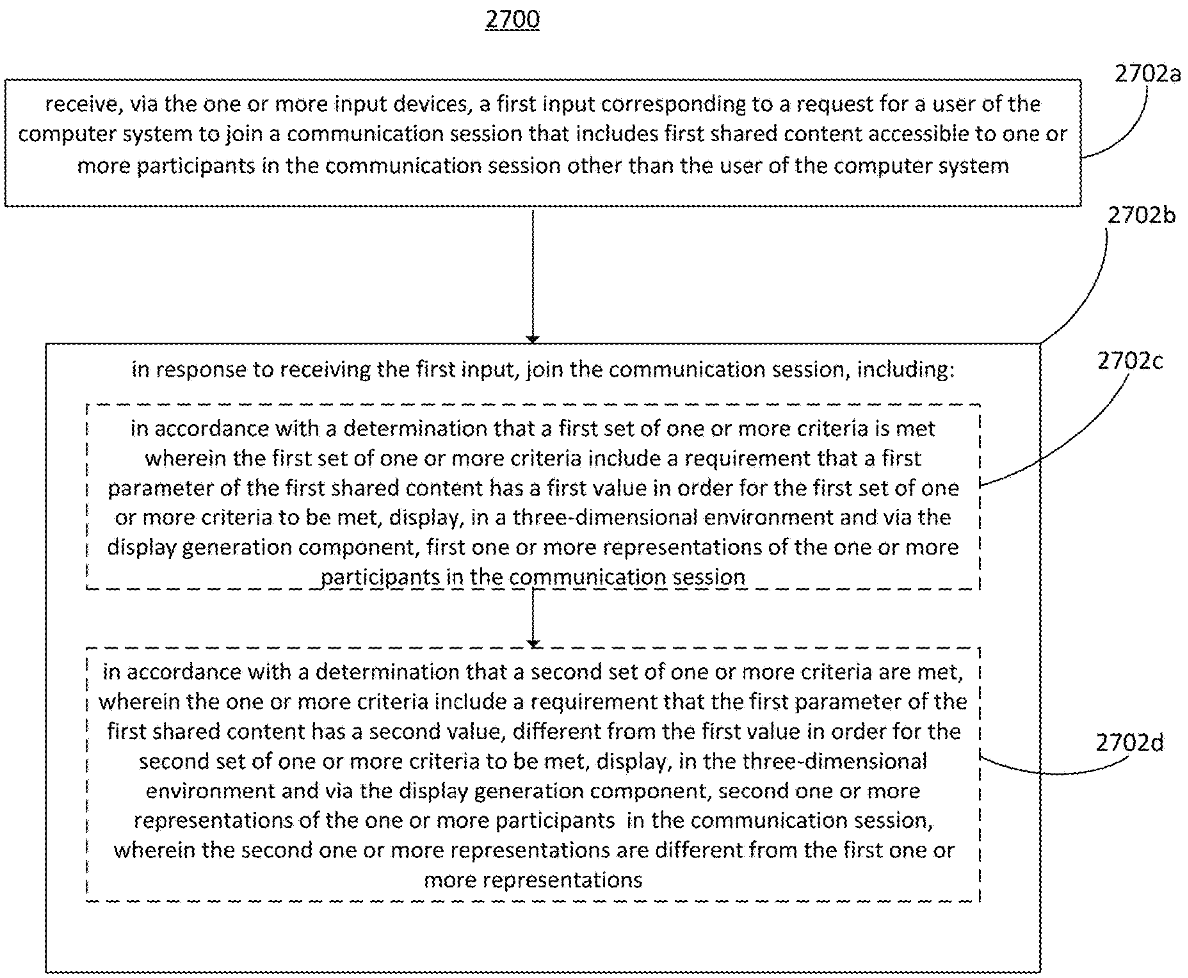
FIG. 27 is a flowchart for illustrating a method of presenting representations of participants of a real-time communication session based on parameters associated with shared content in accordance with some embodiments.
Figure 28A:
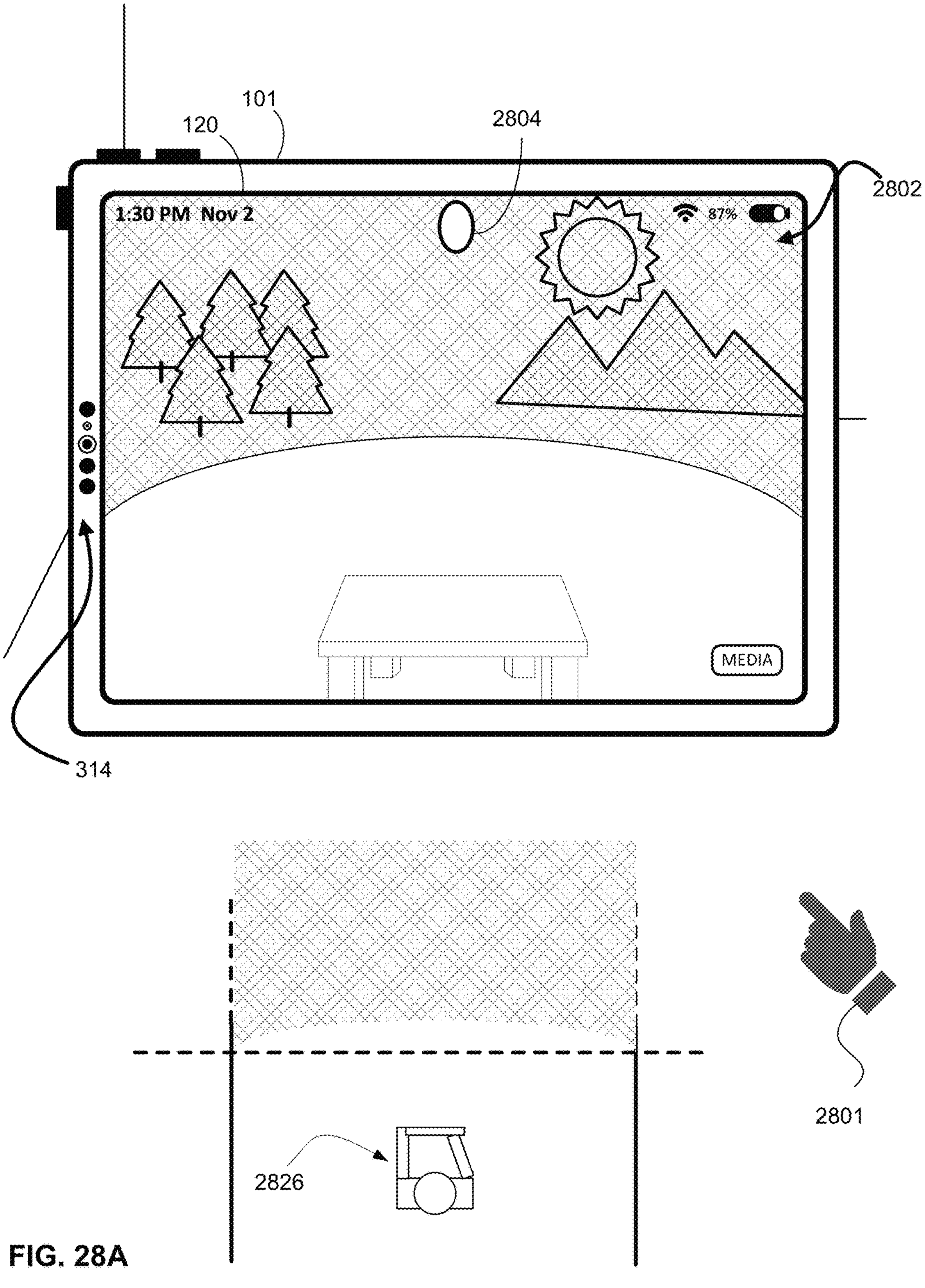
FIGS. 28A-28U illustrate examples of a computer system presenting user interfaces and controls associated with media content displayed within three-dimensional environments in accordance with some embodiments.
Figure 30A:
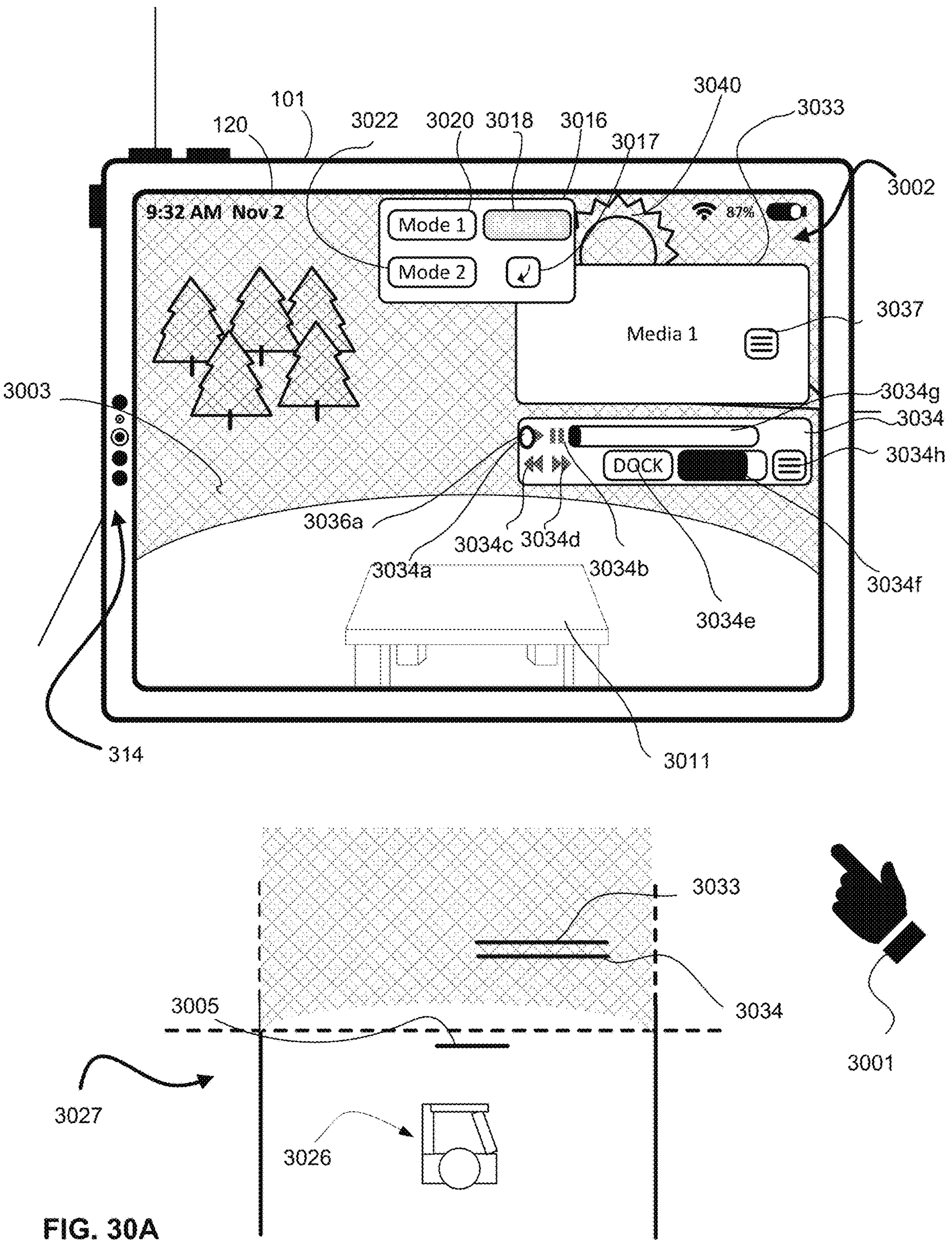
FIGS. 30A-30O illustrate examples of a computer system changing a visual appearance of a three-dimensional environment in accordance with an environmental mode associated with media content in accordance with some embodiments
Figure 30B:
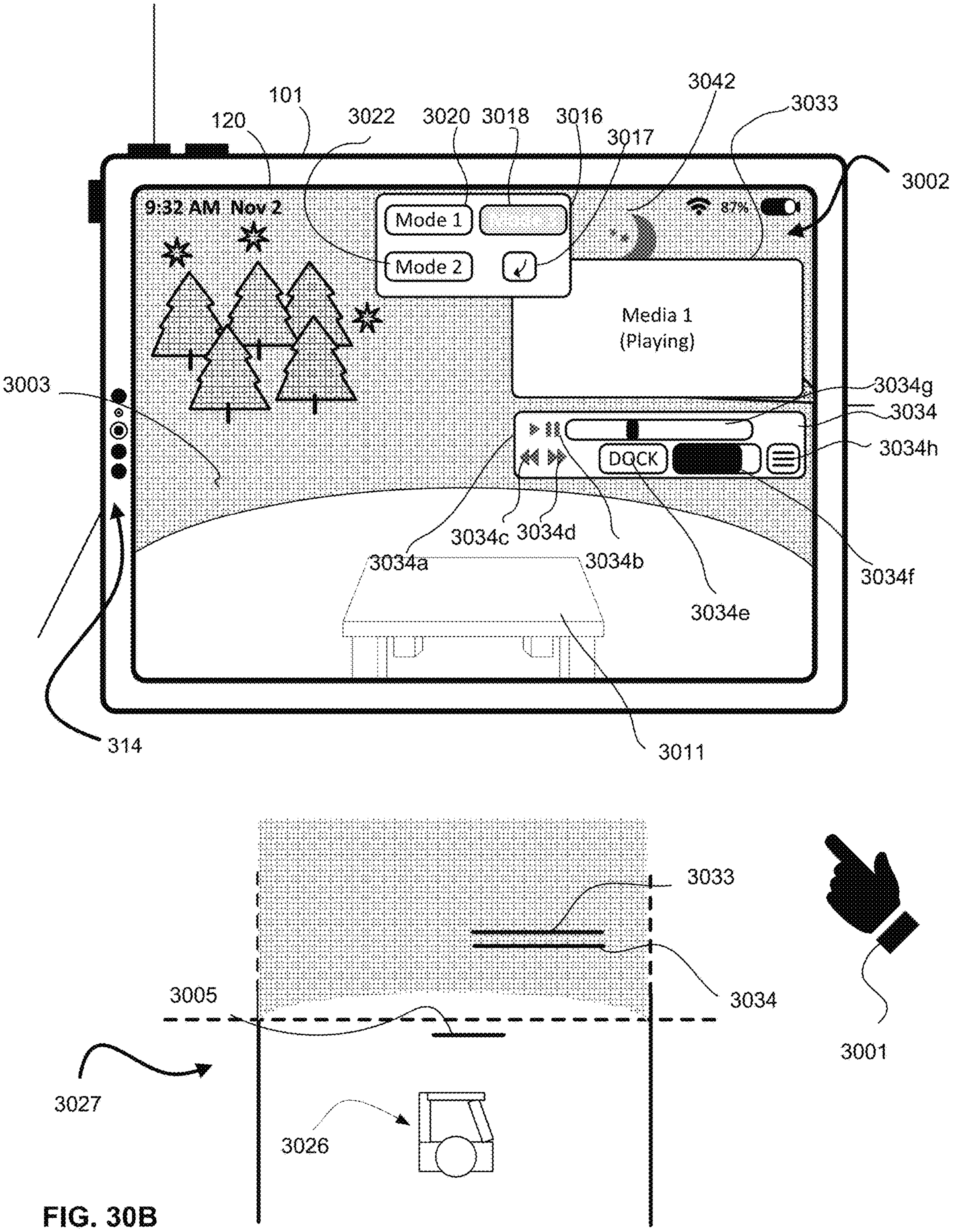
Figures 1, 30B:
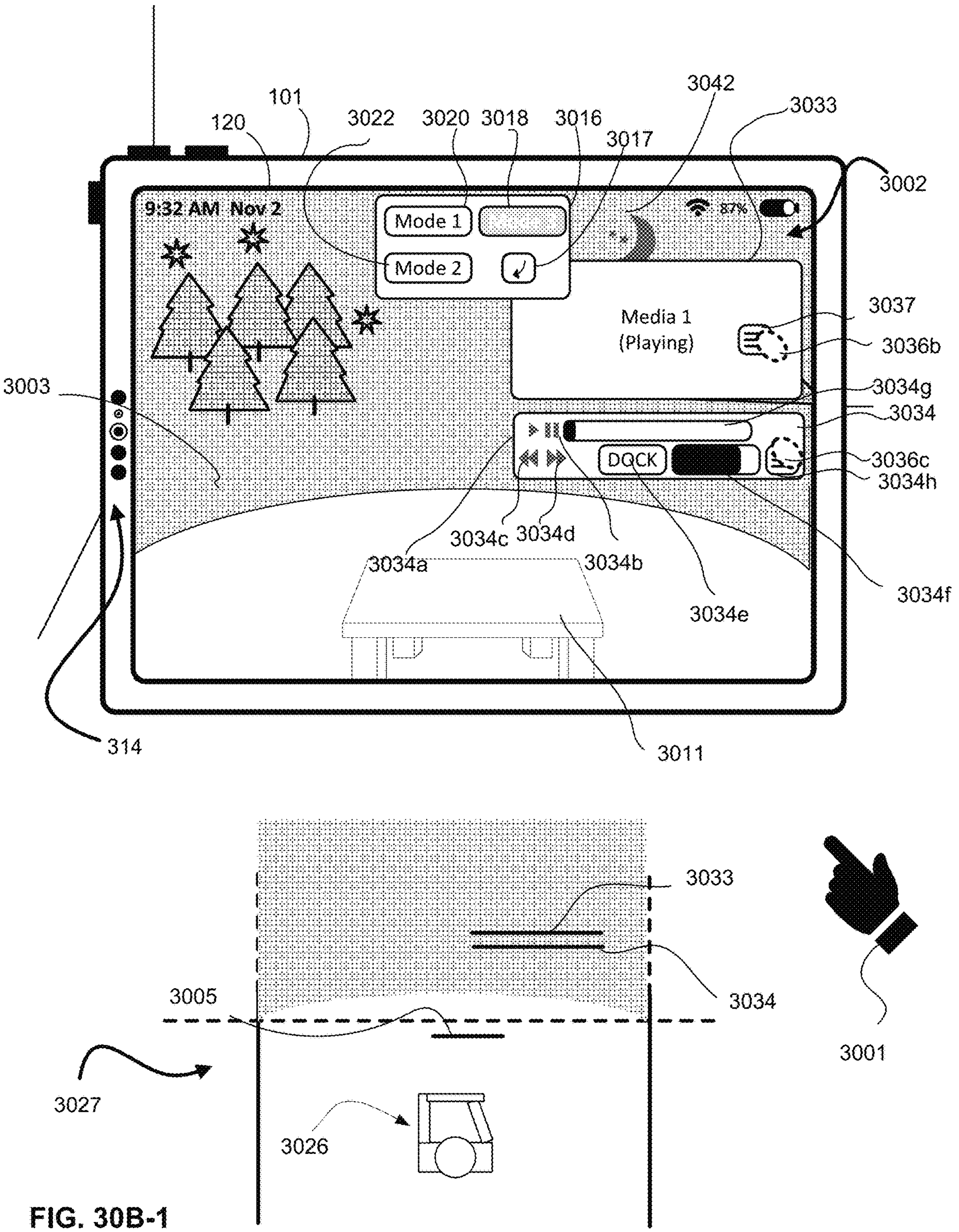
Figures 2, 30B:
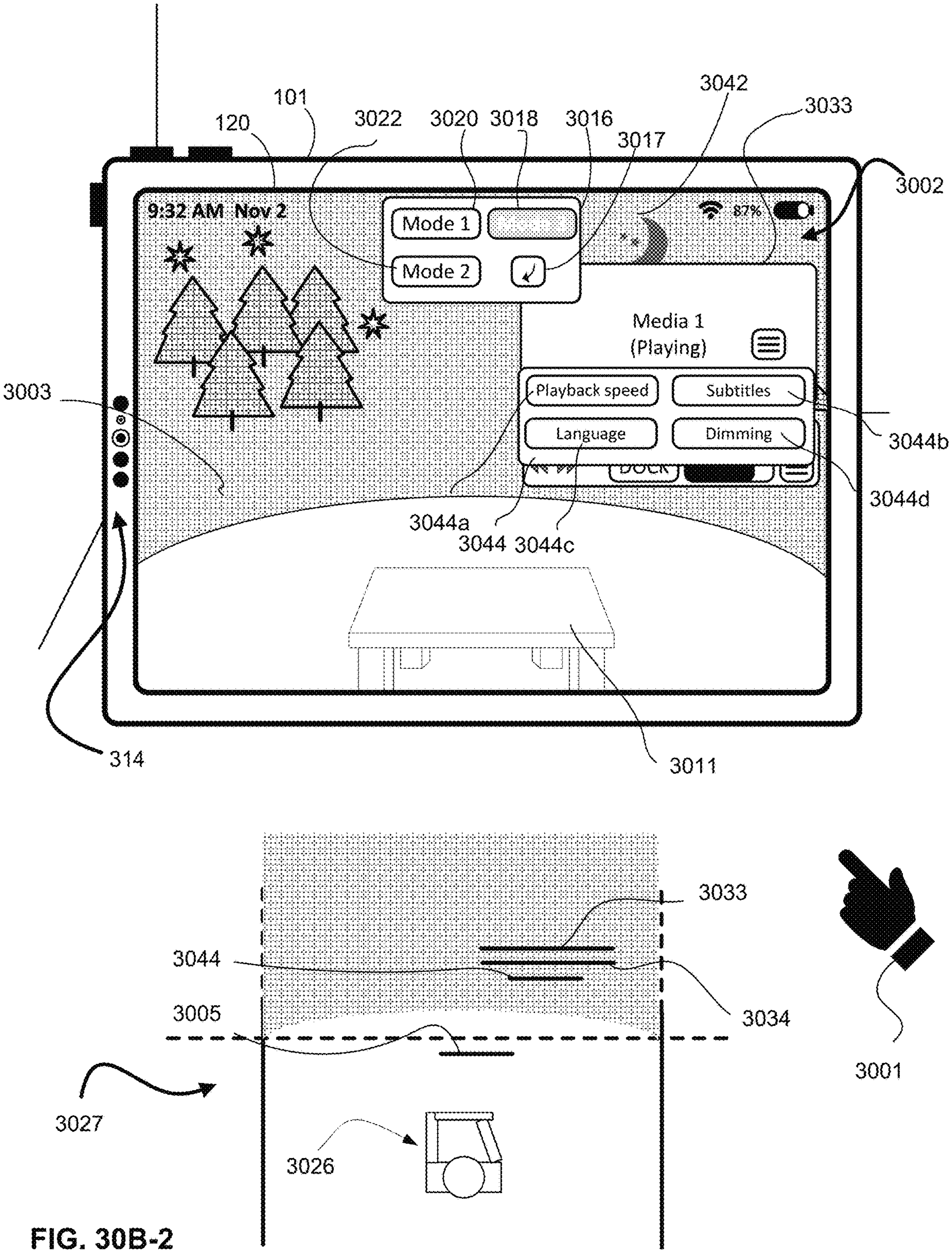
Figure 30O:
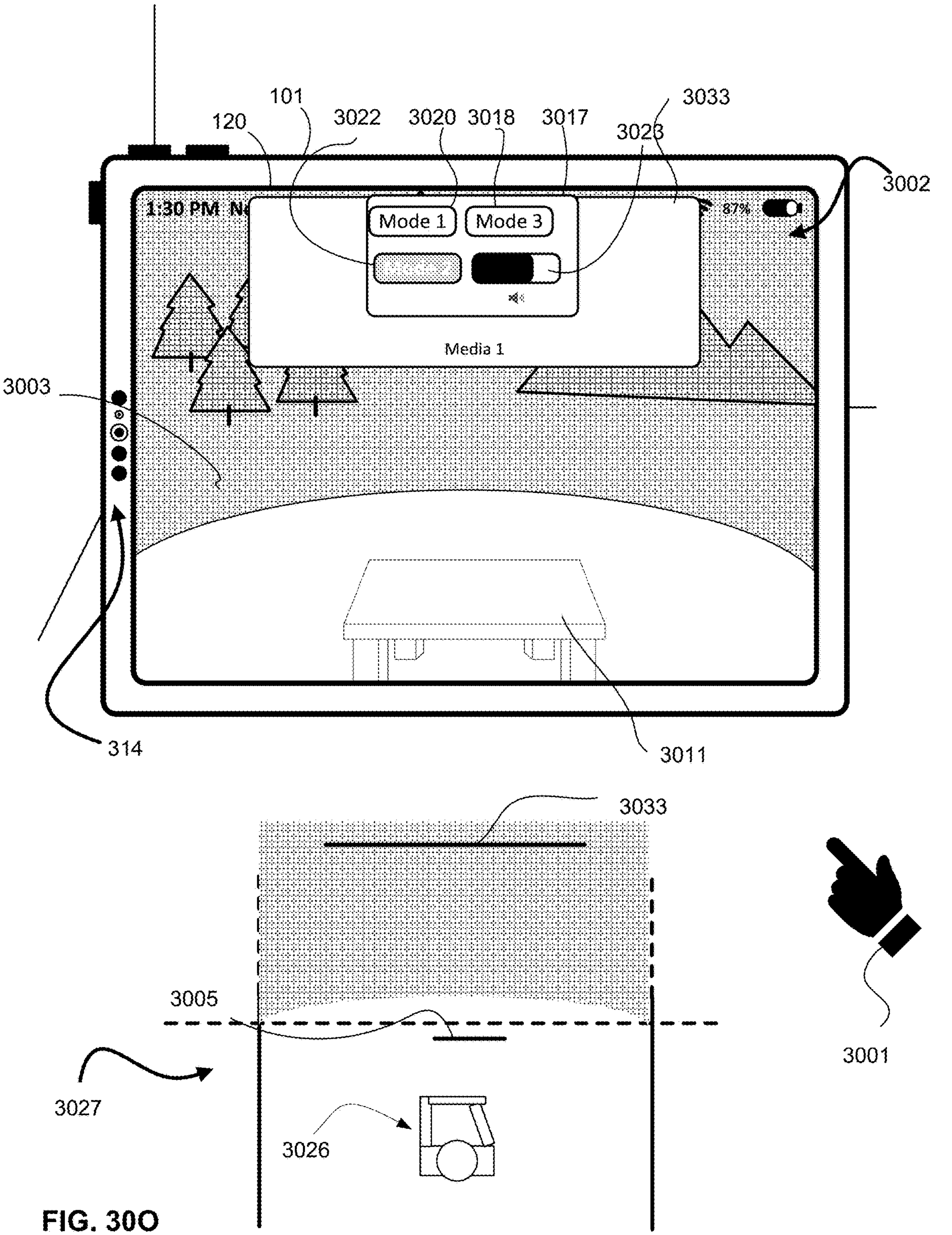
Figure 31:
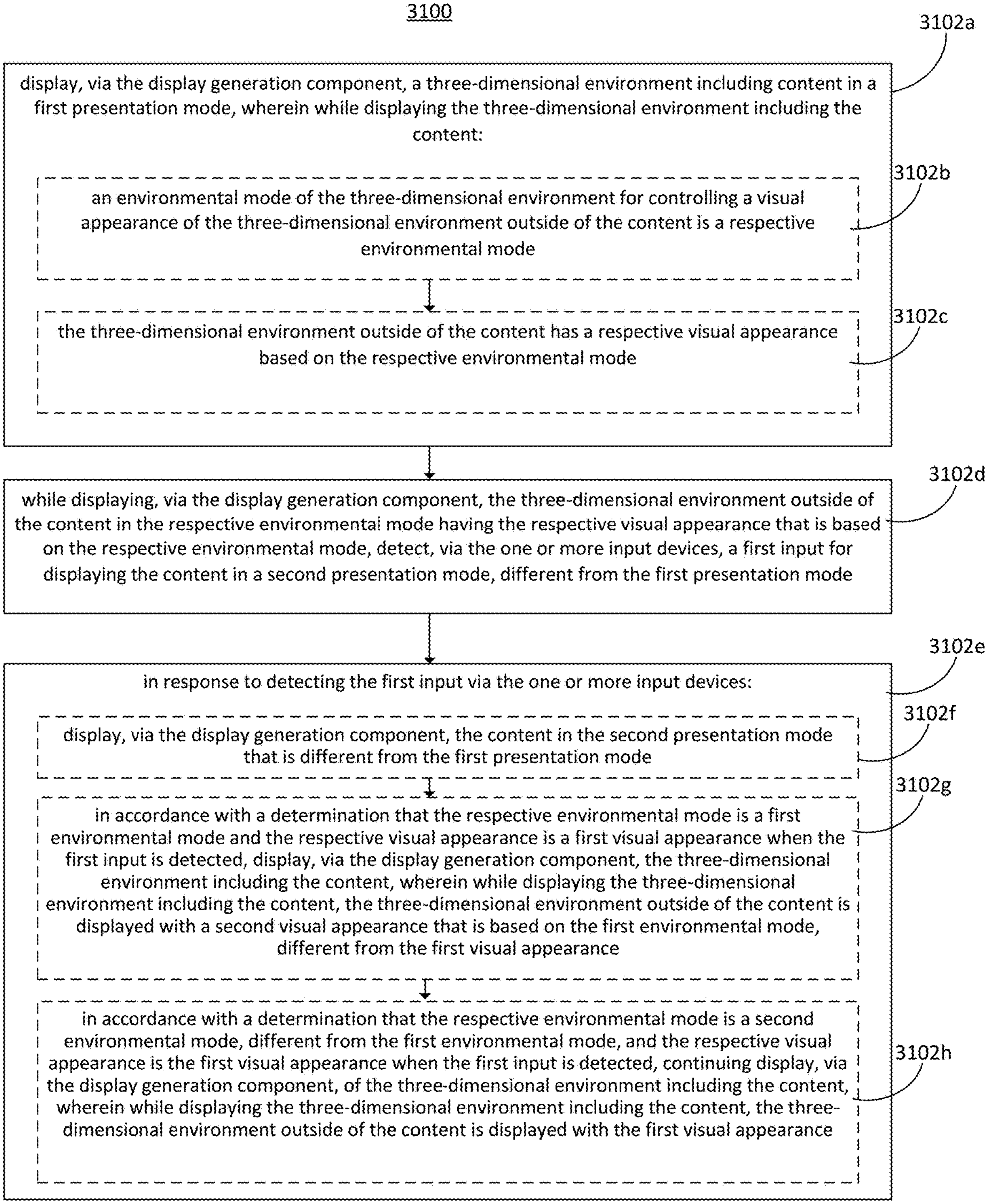
FIG. 31 is a flowchart for illustrating a method of changing a visual appearance of a three-dimensional environment in accordance with an environmental mode associated with media content in accordance with some embodiments.

FIGS. 1A-6 provide a description of example computer systems for providing XR experiences to users (such as described below with respect to methods 800, 1000, 1200, 1400, 1600, 1800, 2000, 2100, 2300, 2500, 2700, 2900, and/or 3100). FIGS. 7A-7F illustrate examples of a computer system selectively determining and applying a time of day setting to a respective virtual environment based on a system setting in accordance with some embodiments. FIGS. 8A-8K is a flowchart illustrating an exemplary method of selectively determining and applying a time of day setting to a respective virtual environment based on a system setting in accordance with some embodiments. The user interfaces in FIGS. 7A-7F are used to illustrate the processes in FIGS. 8A-8K. FIGS. 9A-9F illustrate examples of a computer system updating a time of day setting to nighttime for a virtual environment based on detecting an event associated with auto-dimming in accordance with some embodiments. FIGS. 10A-10H is a flowchart illustrating a method of updating a time of day setting to nighttime for a virtual environment based on detecting an event associated with auto-dimming in accordance with some embodiments. The user interfaces in FIGS. 9A-9F are used to illustrate the processes in FIGS. 10A-10H. FIGS. 11A-11I illustrate example techniques for displaying a content item in an expanded display mode (e.g., full screen) in accordance with some embodiments. FIGS. 12A-12E is a flow diagram of methods of displaying a content item in an expanded display mode (e.g., full screen) in accordance with various embodiments. The user interfaces in FIGS. 11A-11I are used to illustrate the processes in FIGS. 12A-12E. FIGS. 13A-13H illustrate example techniques for joining a communication session with a second computer system while maintaining display of their respective virtual environments in accordance with some embodiments. FIGS. 14A-14Q is a flow diagram of methods of joining a communication session with a second computer system while maintaining display of their respective virtual environments in accordance with various embodiments. The user interfaces in FIGS. 13A-13H are used to illustrate the processes in FIGS. 14A-14Q. FIGS. 15A-15G illustrate example techniques for selectively moving a portal into a virtual environment based on user movement in accordance with some embodiments. FIGS. 16A-16H is a flow diagram of methods of selectively moving a portal into a virtual environment based on user movement in accordance with various embodiments. The user interfaces in FIGS. 15A-15G are used to illustrate the processes in FIGS. 16A-16H. FIGS. 17A-17G illustrate example techniques for selective sharing a virtual environment during a communication session in accordance with some embodiments. FIGS. 18A-18I is a flow diagram of methods of selective sharing a virtual environment during a communication session in accordance with various embodiments. The user interfaces in FIGS. 17A-17G are used to illustrate the processes in FIGS. 18A-18I. FIGS. 19A-19K illustrate examples of a computer system displaying media in a virtual environment with a simulated lighting effect from viewpoints of a plurality of available viewpoints in the virtual environment in accordance with some embodiments. FIGS. 20A-20F is a flowchart illustrating a method of displaying media in a virtual three-dimensional environment with a simulated lighting effect in accordance with some embodiments. The user interfaces of FIGS. 19A-19K are used to illustrate the processes in FIGS. 20A-20F. FIGS. 21A-21E is a flowchart illustrating a method of displaying media in a virtual environment from a viewpoint of a plurality of available viewpoints in the virtual environment in accordance with some embodiments. The user interfaces of FIGS. 19A-19K are used to illustrate the processes in FIGS. 21A-21E. FIGS. 22A-22L illustrate examples of a computer system facilitating sharing of a virtual three-dimensional environment in accordance with some embodiments. FIG. 23 is a flowchart for illustrating a method of facilitating sharing of a virtual three-dimensional environment in accordance with some embodiments. The user interfaces in FIGS. 22A-22L are used to illustrate the processes in FIG. 23. FIGS. 24A-24F1 illustrate examples of a computer system facilitating sharing of a virtual three-dimensional environment in accordance with some embodiments. FIG. 25 is a flowchart for illustrating a method 2500 of facilitating sharing of a virtual three-dimensional environment in accordance with some embodiments. The user interfaces in FIGS. 24A-24F1 are used to illustrate the processes in FIG. 25. FIGS. 26A-26G illustrate examples of a computer system presenting representations of participants of a real-time communication session based on parameters associated with shared content in accordance with some embodiments. FIG. 27 is a flowchart for illustrating a method of facilitating sharing of a virtual three-dimensional environment in accordance with some embodiments. The user interfaces in FIGS. 26A-26G are used to illustrate the processes in FIG. 27. FIGS. 28A-28U illustrate examples of a computer system presenting user interfaces and controls associated with media content displayed within three-dimensional environments in accordance with some embodiments. FIG. 29 is a flowchart for illustrating a method of presenting user interfaces and controls associated with media content displayed within three-dimensional environments in accordance with some embodiments. The user interfaces in FIGS. 28A-28U are used to illustrate the processes in FIG. 29. FIGS. 30A-30O illustrate examples of a computer system changing a visual appearance of a three-dimensional environment in accordance with an environmental mode associated with media content in accordance with some embodiments. FIG. 31 is a flowchart for illustrating a method of changing a visual appearance of a three-dimensional environment in accordance with an environmental mode associated with media content in accordance with some embodiments. The user interfaces in FIGS. 30A-30O are used to illustrate the processes in FIG. 31.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less-precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Figure 1A:
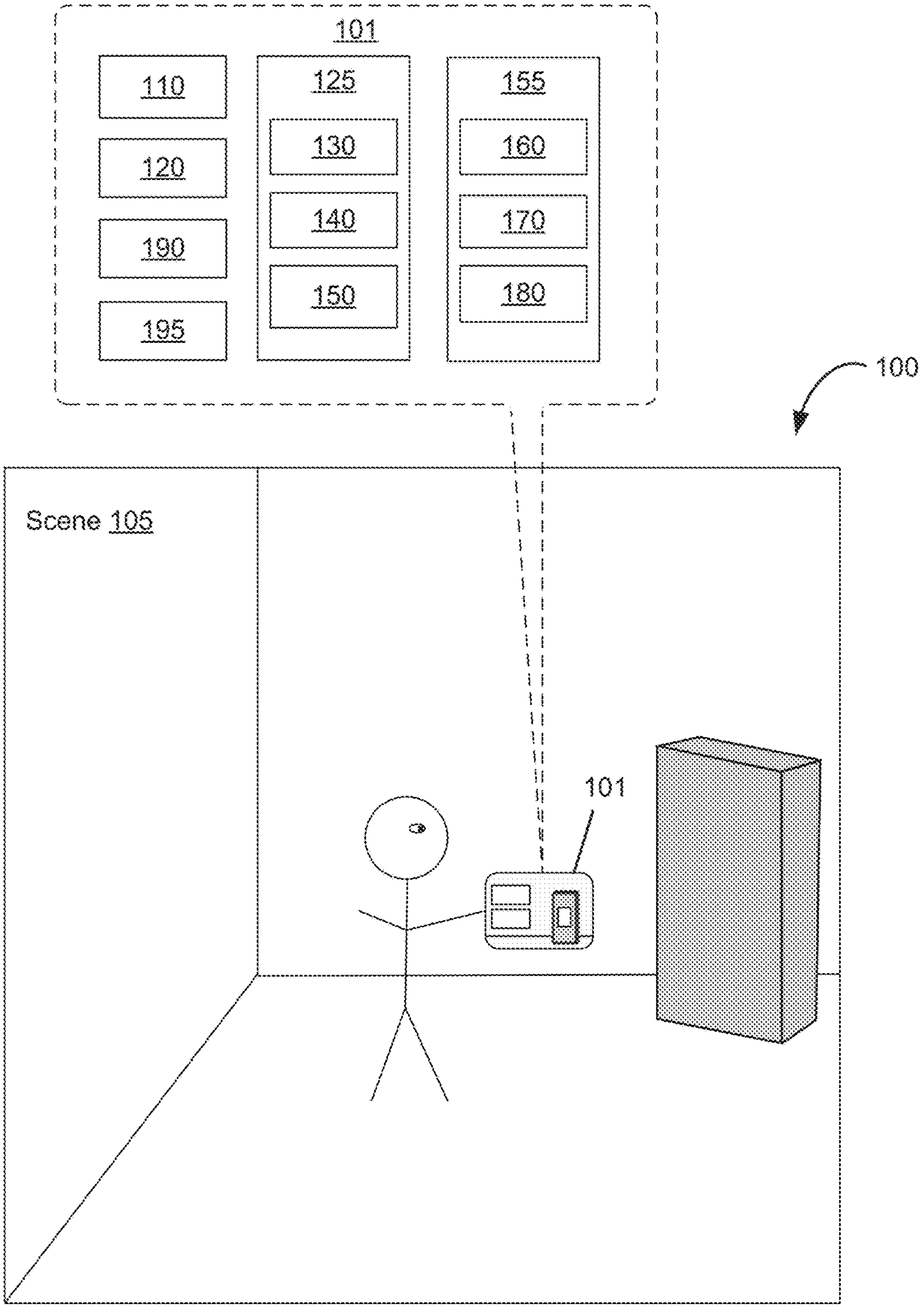
FIG. 1A is a block diagram illustrating an operating environment of a computer system for providing XR experiences in accordance with some embodiments.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing an XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUD s), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touch-screen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides an XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
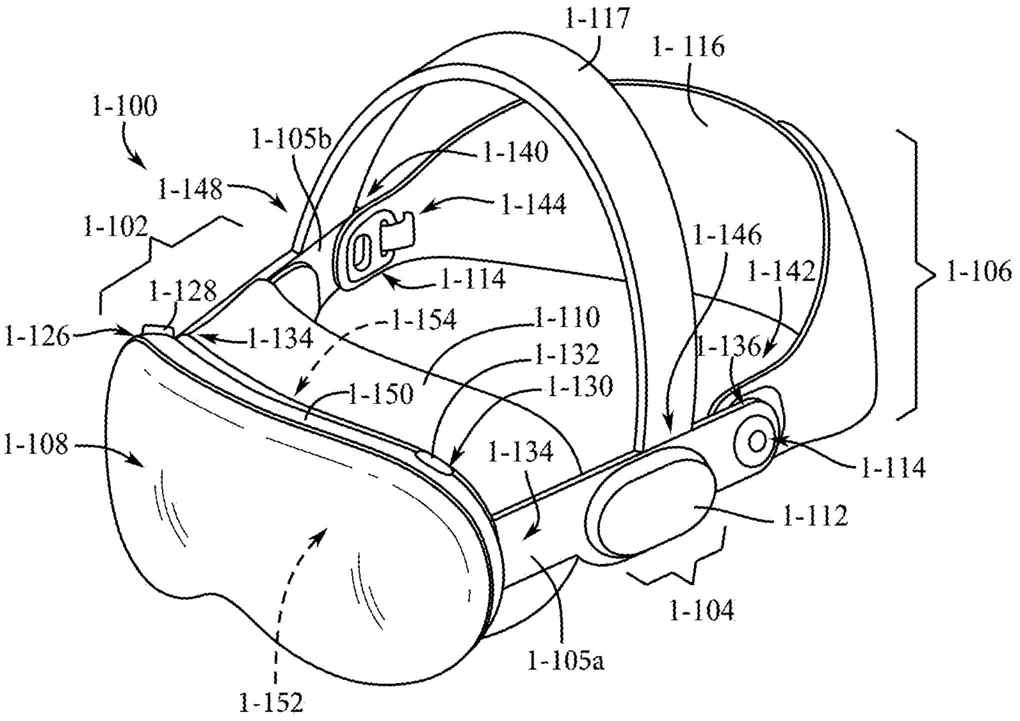
FIGS. 1B-1P are examples of a computer system for providing XR experiences in the operating environment of FIG. 1A.
Figure 1C:
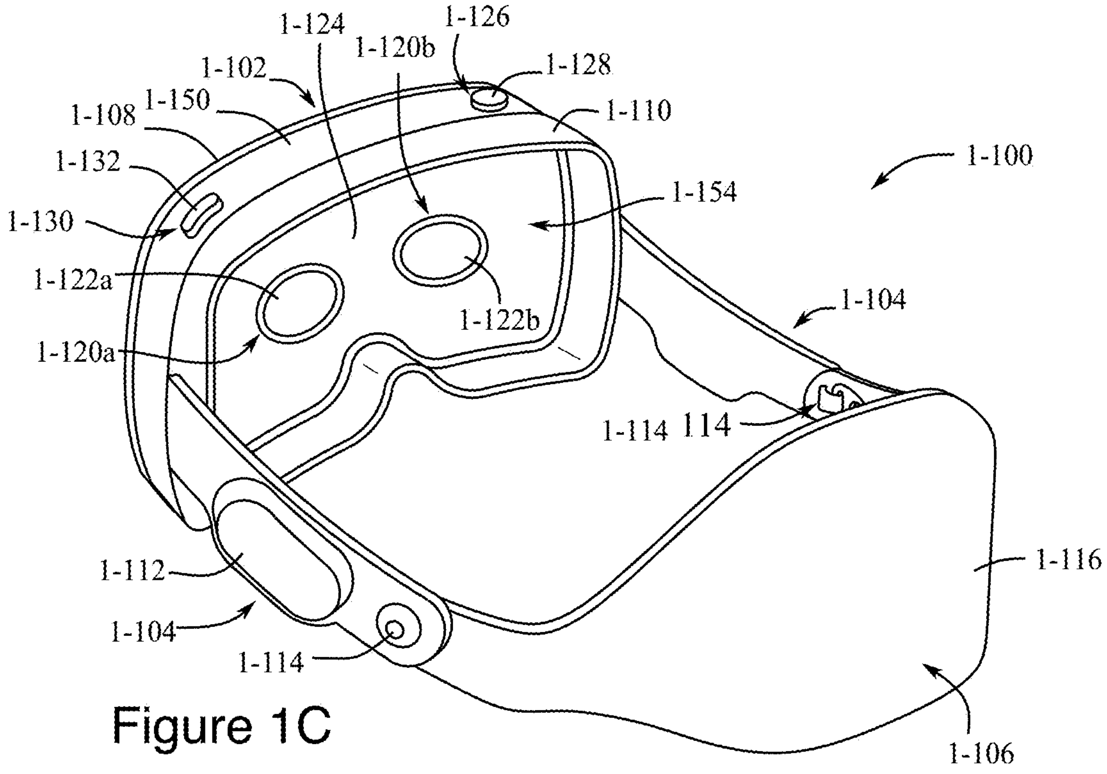
FIGS. 24A-24F1 illustrate examples of a computer system positioning viewpoints of communication session participants relative to shared content in accordance with some embodiments.
Figure 1D:
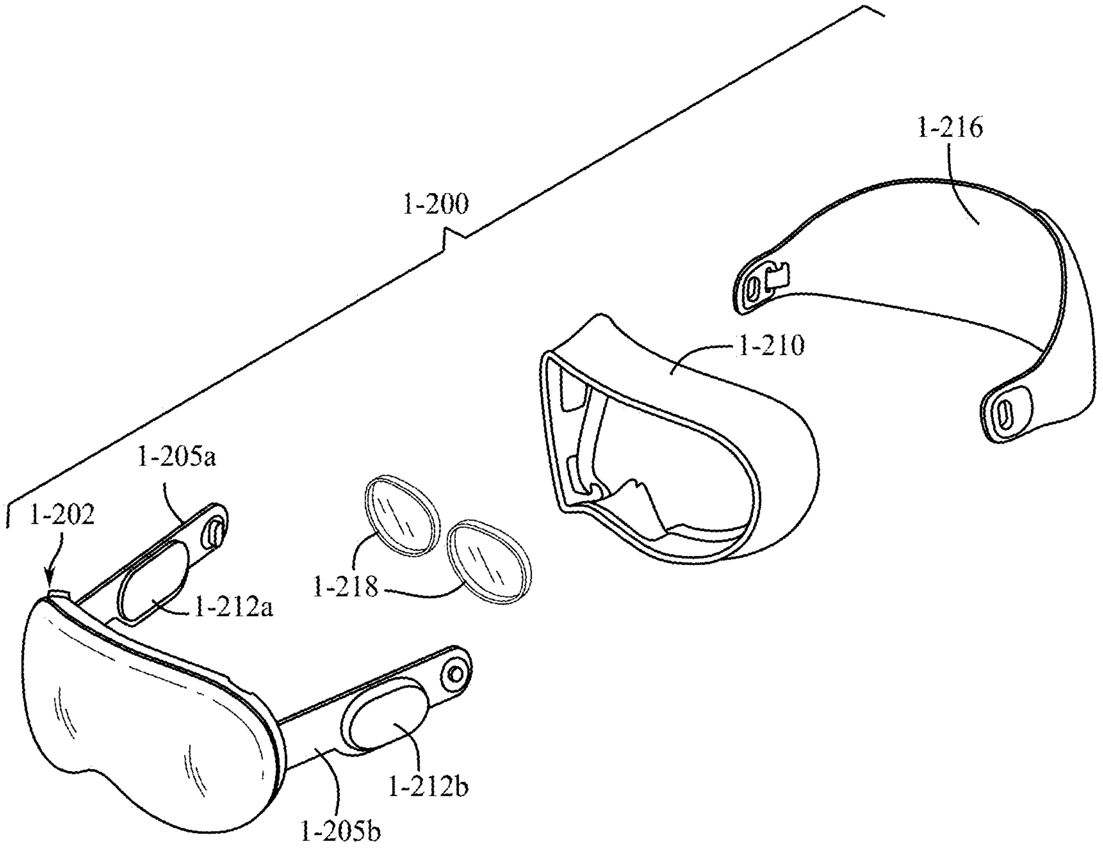
Figure 1E:
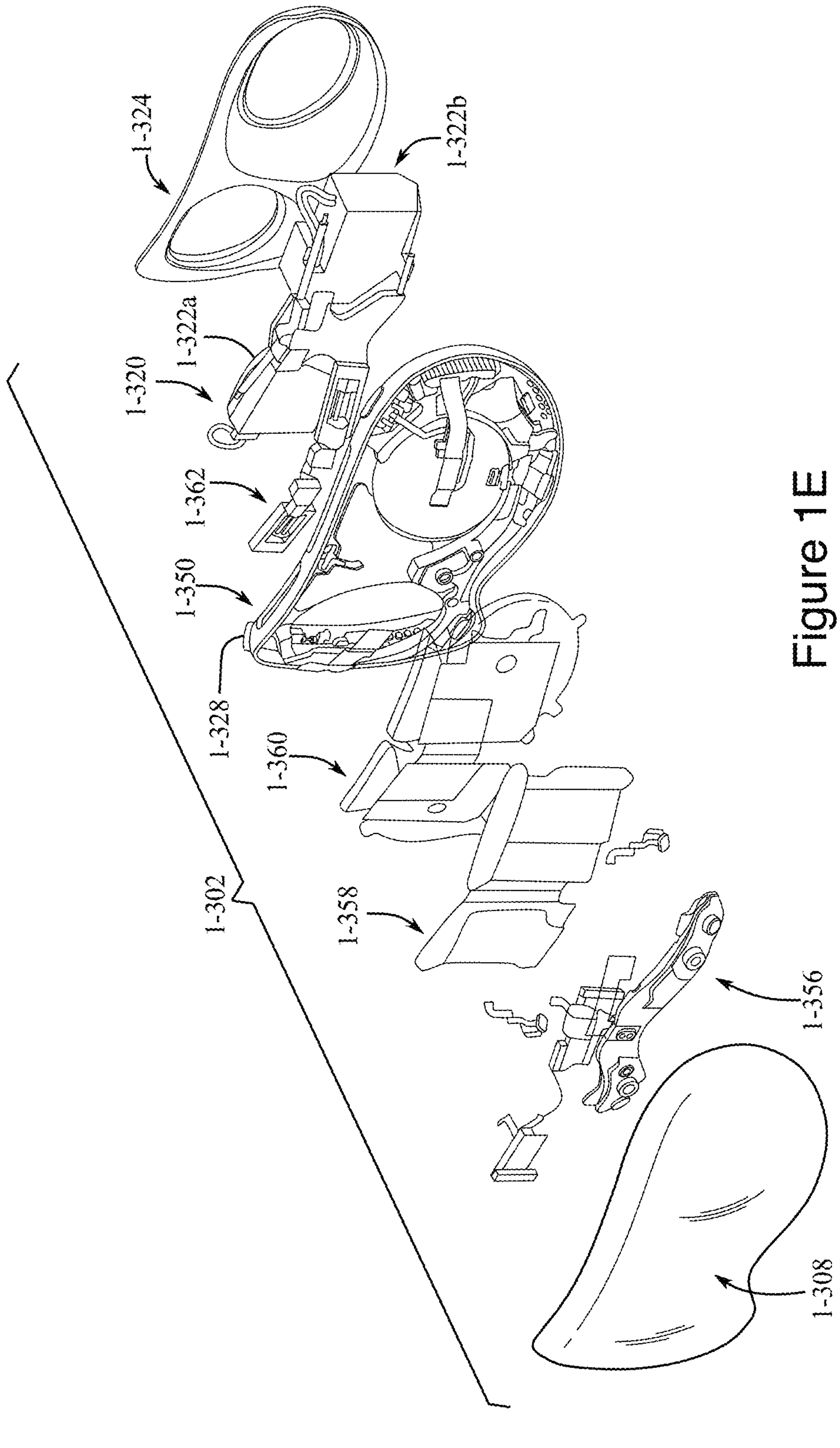
Figure 1F:
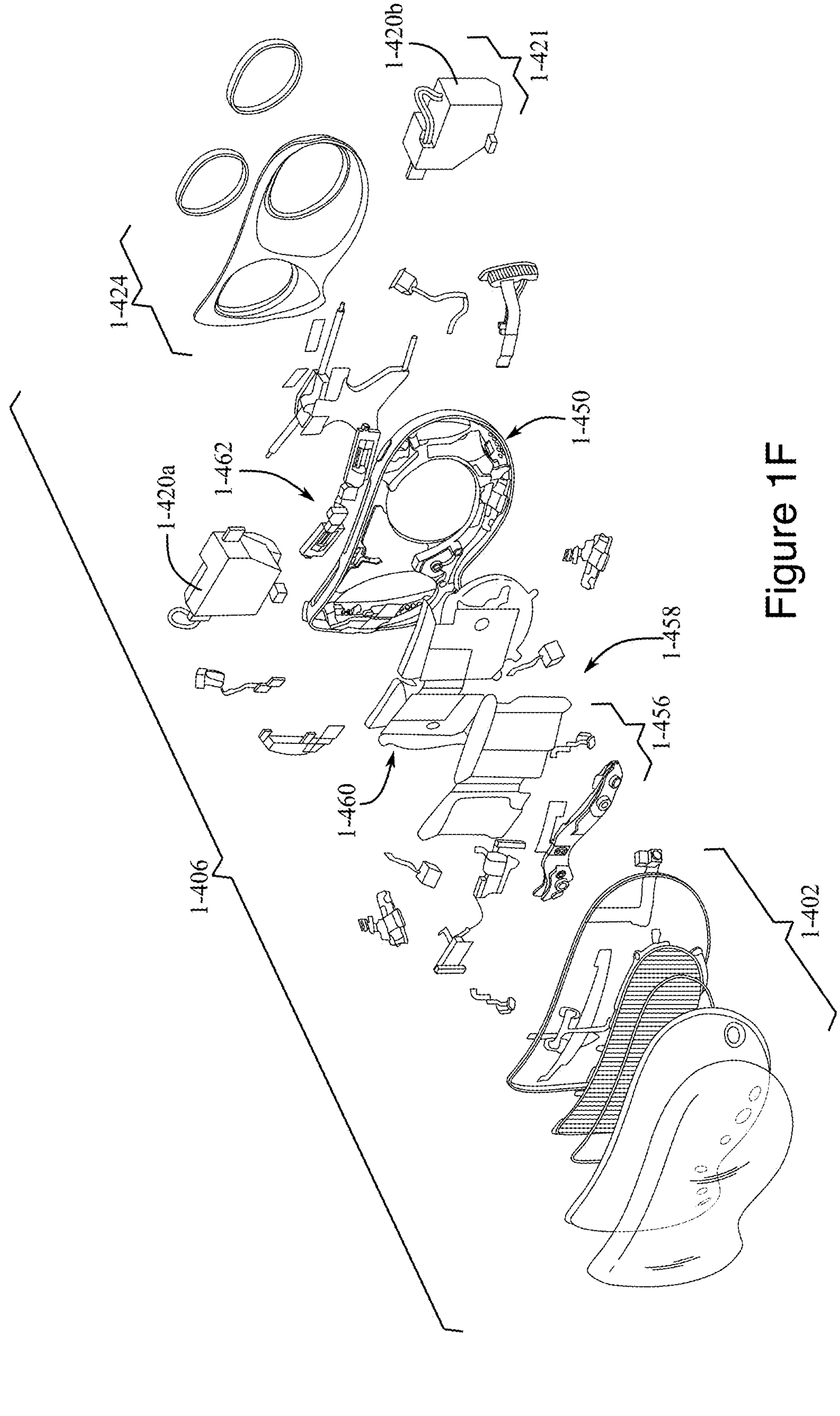
Figure 1G:
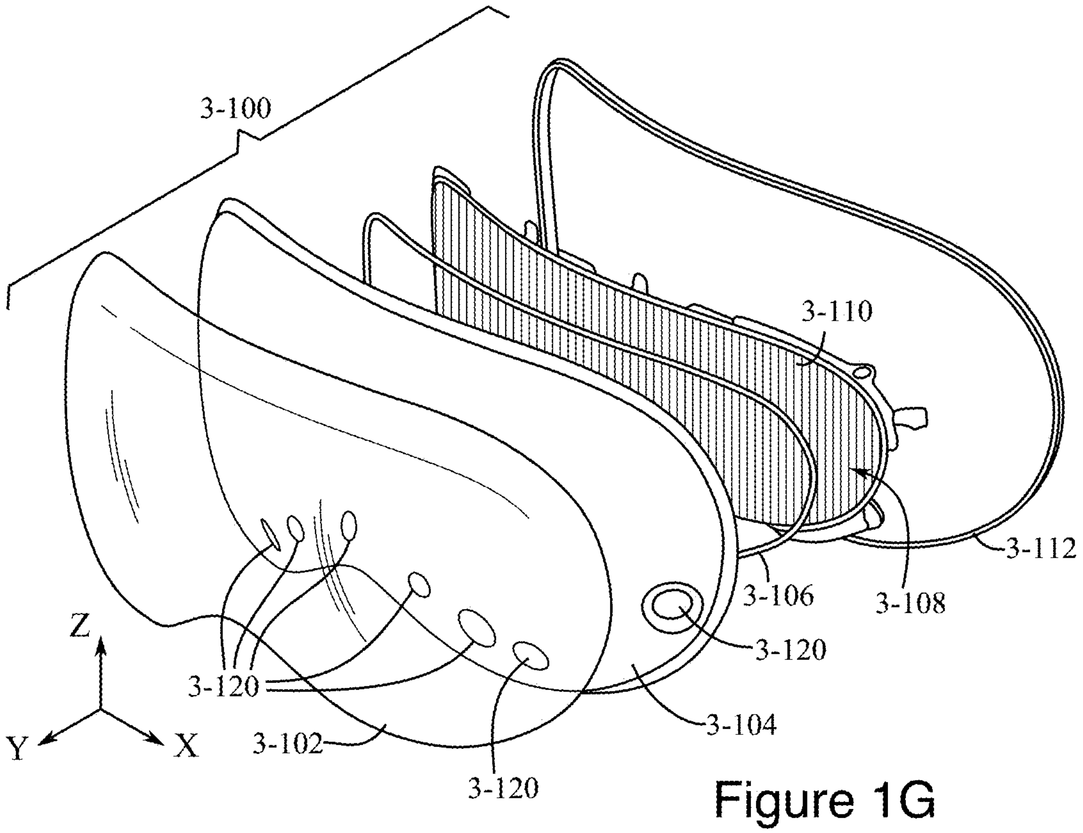
Figure 1H:
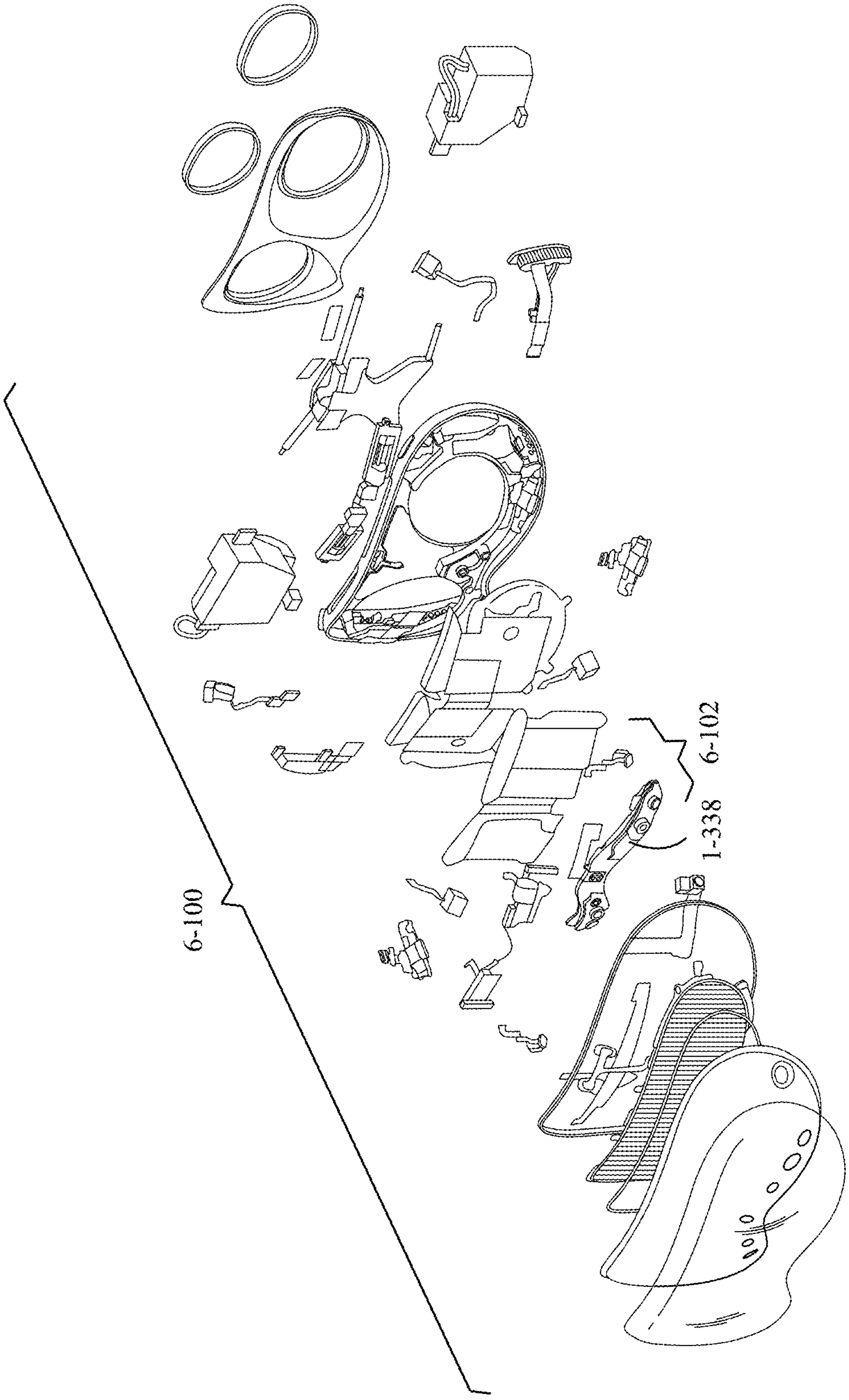
Figure 1I:
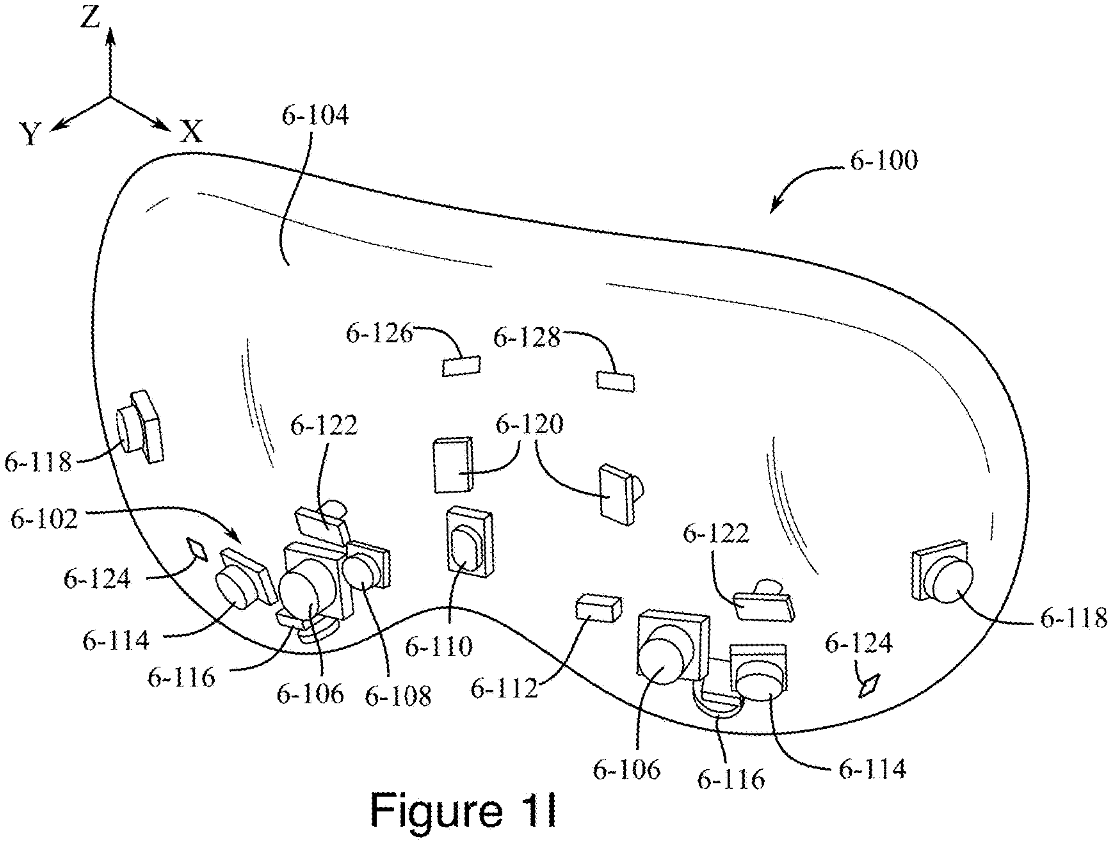
Figure 1J:
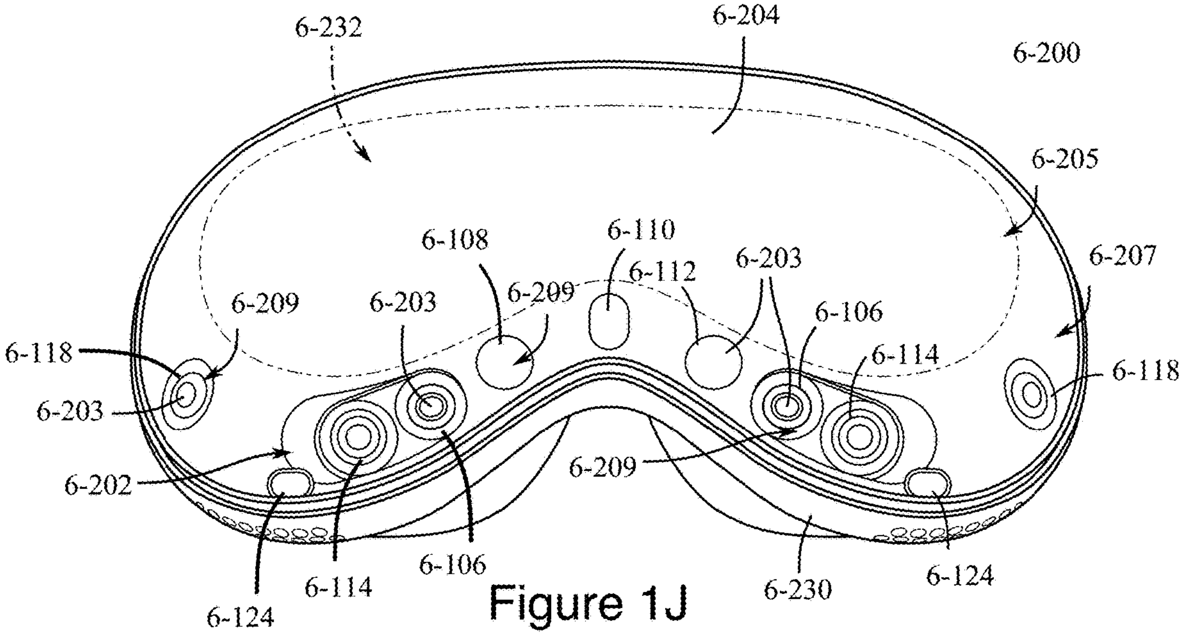
Figure 1K:
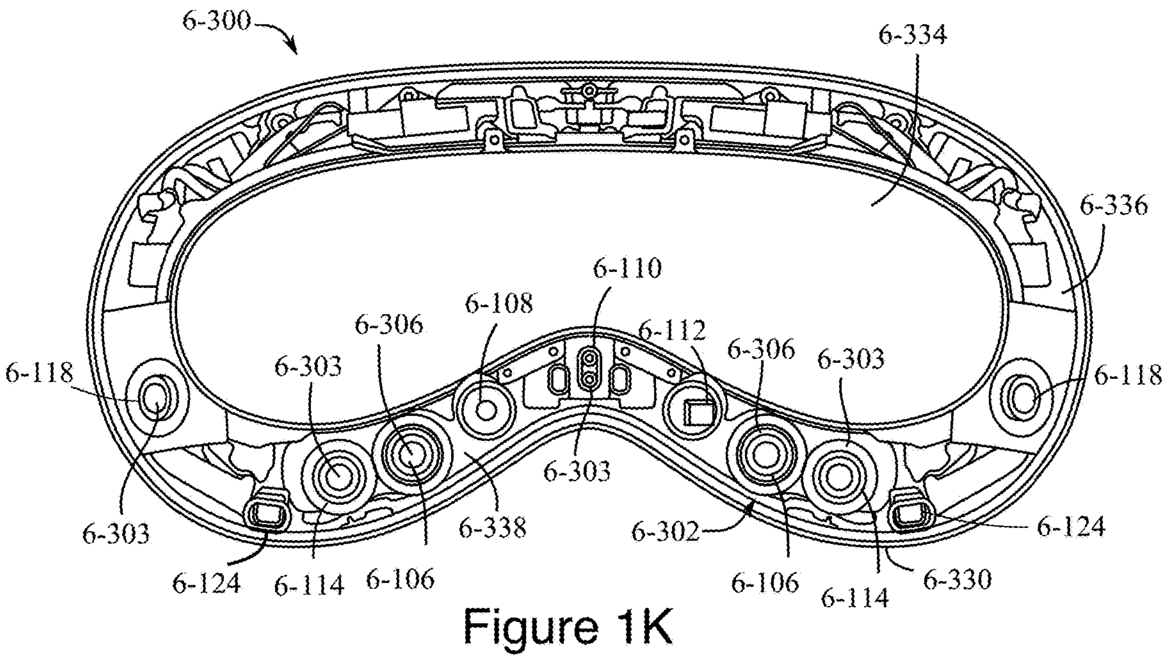
Figure 1L:
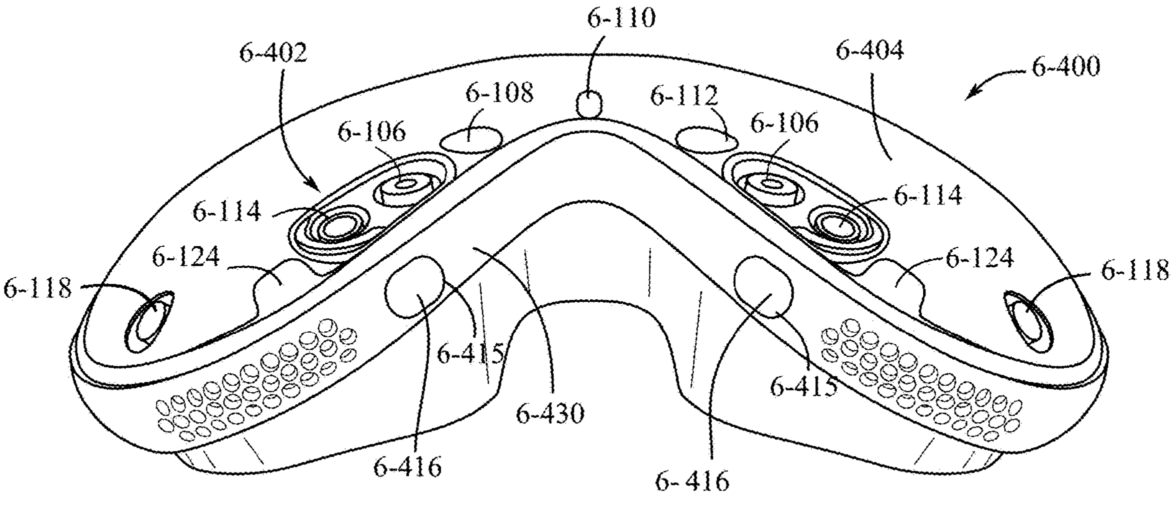
Figure 1M:
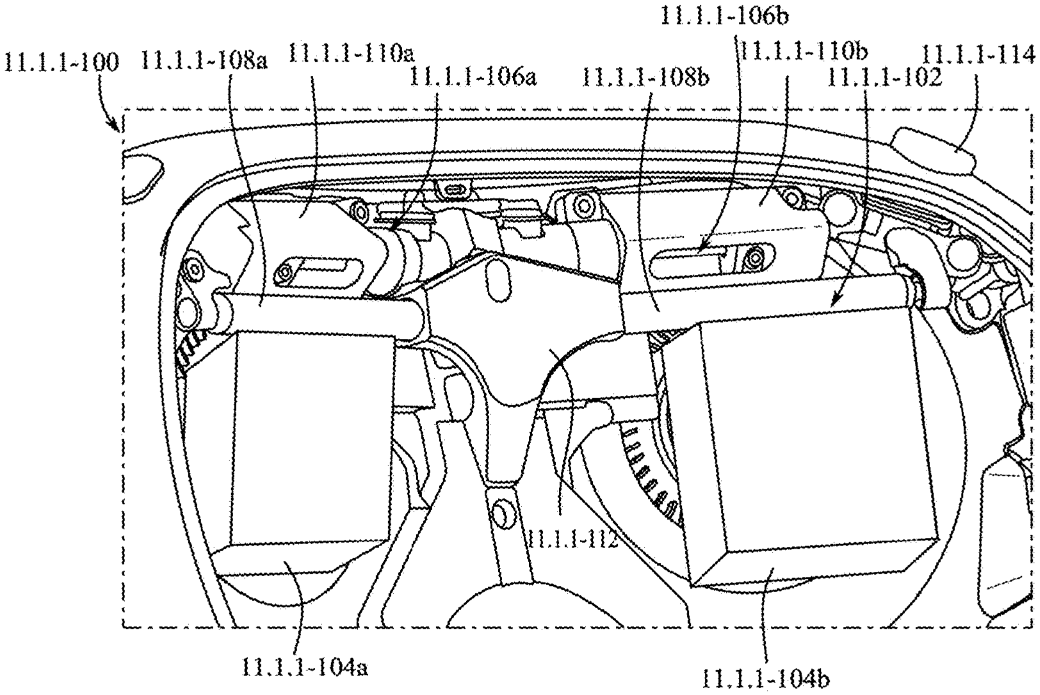
Figure 1N:
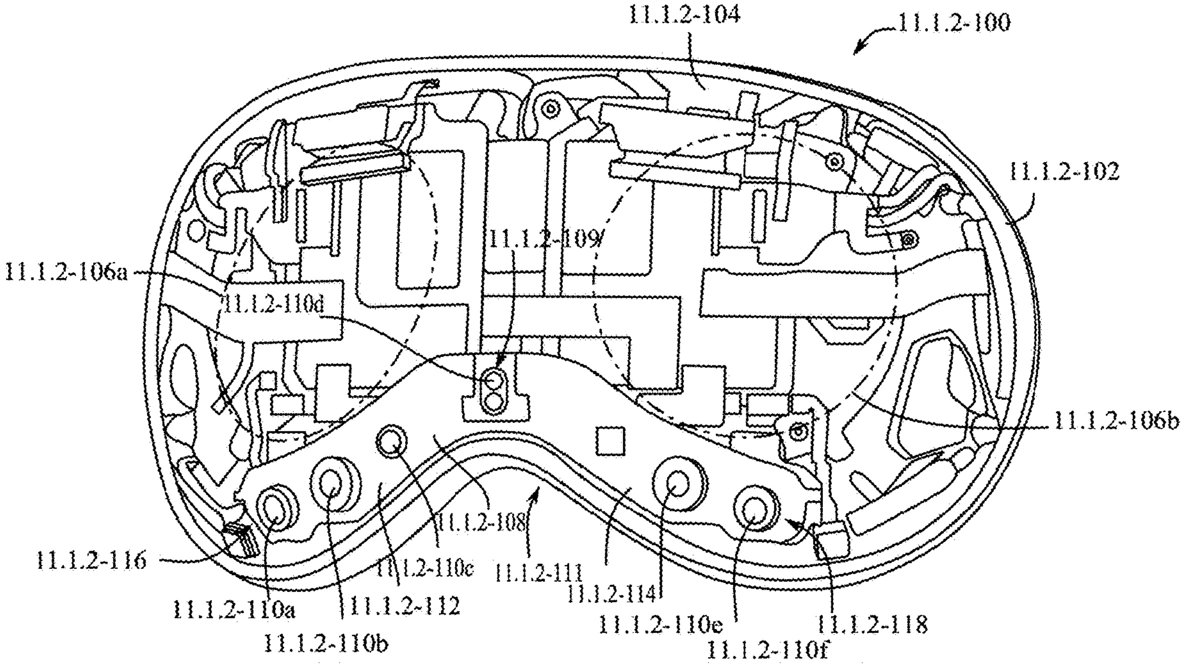
Figure 1O:
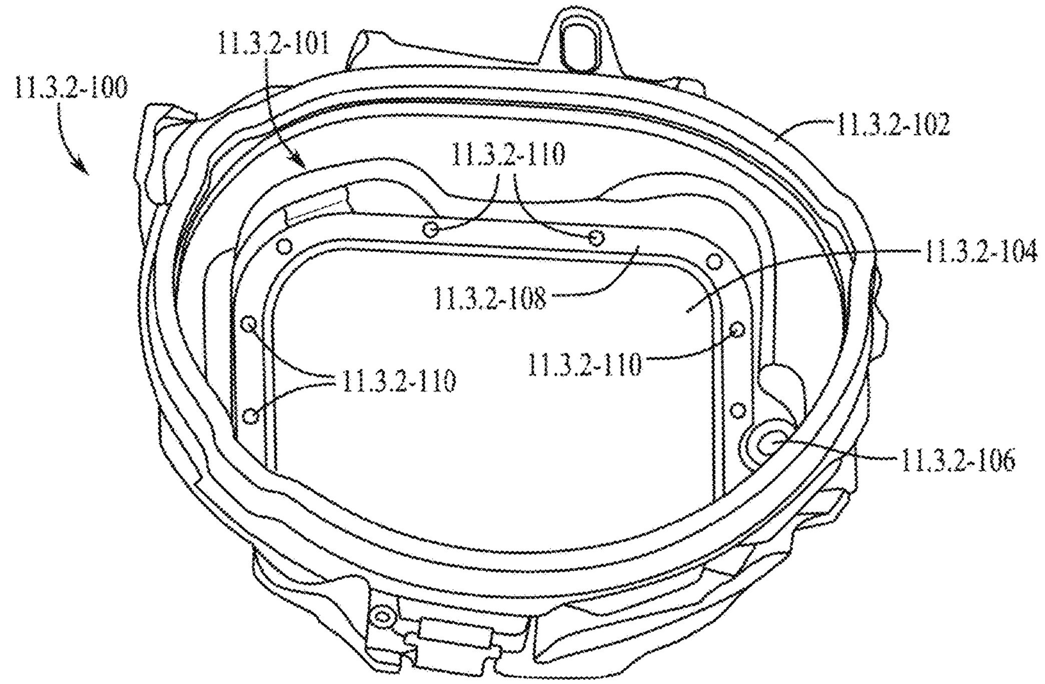
Figure 1P:
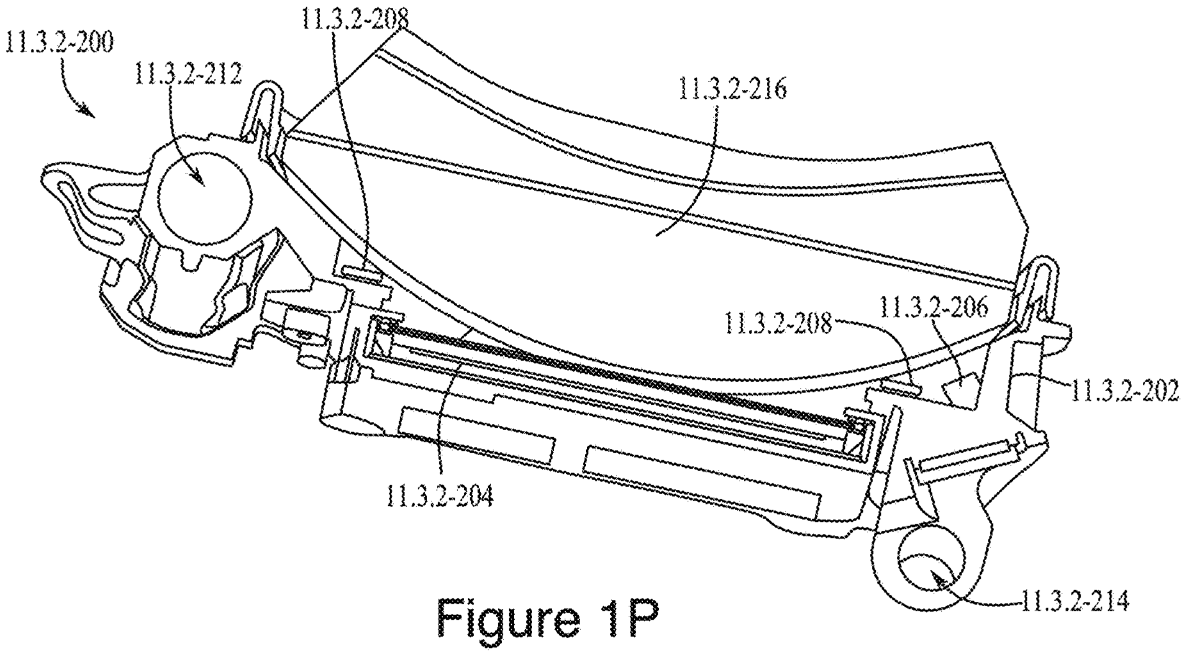

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120*a*, 1-120*b* and/or first and second optical modules 11.1.1-104*a* and 11.1.1-104*b*) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120*a*, 1-120*b* and/or first and second optical modules 11.1.1-104*a* and 11.1.1-104*b*), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120*a*, 1-120*b* and/or first and second optical modules 11.1.1-104*a* and 11.1.1-104*b*).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105*a*, 1-105*b* of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105*a* including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105*b* including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105*a* and the second electronic strap 1-105*b*. The straps 1-105*a-b* and band 1-116 can be coupled via connection mechanisms or assemblies 1-114. In at least one example, the second band 1-117 includes a first end 1-146 coupled to the first electronic strap 1-105*a* between the first proximal end 1-134 and the first distal end 1-136 and a second end 1-148 coupled to the second electronic strap 1-105*b* between the second proximal end 1-138 and the second distal end 1-140.

In at least one example, the first and second electronic straps 1-105*a-b* include plastic, metal, or other structural materials forming the shape the substantially rigid straps 1-105*a-b*. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105*a-b* can define internal strap volumes and include one or more electronic components disposed in the internal strap volumes. In one example, as shown in FIG. 1B, the first electronic strap 1-105*a* can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120*a*, 1-120*b* disposed at or in the rearward facing second opening 1-154 defined by the housing 1-150 and/or disposed in the internal volume of the housing 1-150 and configured to project light through the second opening 1-154. In at least one example, each display assembly 1-120*a-b* can include respective display screens 1-122*a*, 1-122*b* configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122*a-b* can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120*a-b*. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205*a*, 1-205*b*. The first securement strap 1-205*a* can include a first electronic component 1-212*a* and the second securement strap 1-205*b* can include a second electronic component 1-212*b*. In at least one example, the first and second straps 1-205*a-b* can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205*a-b* can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322*a*, 1-322*b* disposed between the frame 1-350 and the curtain assembly 1-324.

In at least one example, the display unit 1-306 can also include a motor assembly 1-362 configured as an adjustment mechanism for adjusting the positions of the display screens 1-322*a-b* of the display assembly 1-320 relative to the frame 1-350. In at least one example, the display assembly 1-320 is mechanically coupled to the motor assembly 1-362, with at least one motor for each display screen 1-322*a-b*, such that the motors can translate the display screens 1-322*a-b* to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322*a-b*.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420*a*, 1-420*b* of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-

109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 1O illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 1O can be replicated in another (e.g., second) optical module disposed with the HMD to interact (e.g., project light and capture images) of another eye of the user.

Any of the features, components, and/or parts, including the arrangements and configurations thereof shown in FIG. 1O can be included, either alone or in any combination, in any of the other examples of devices, features, components, and parts shown in FIG. 1P or otherwise described herein. Likewise, any of the features, components, and/or parts, including the arrangements and configurations thereof shown and described with reference to FIG. 1P or otherwise described herein can be included, either alone or in any combination, in the example of the devices, features, components, and parts shown in FIG. 1O.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
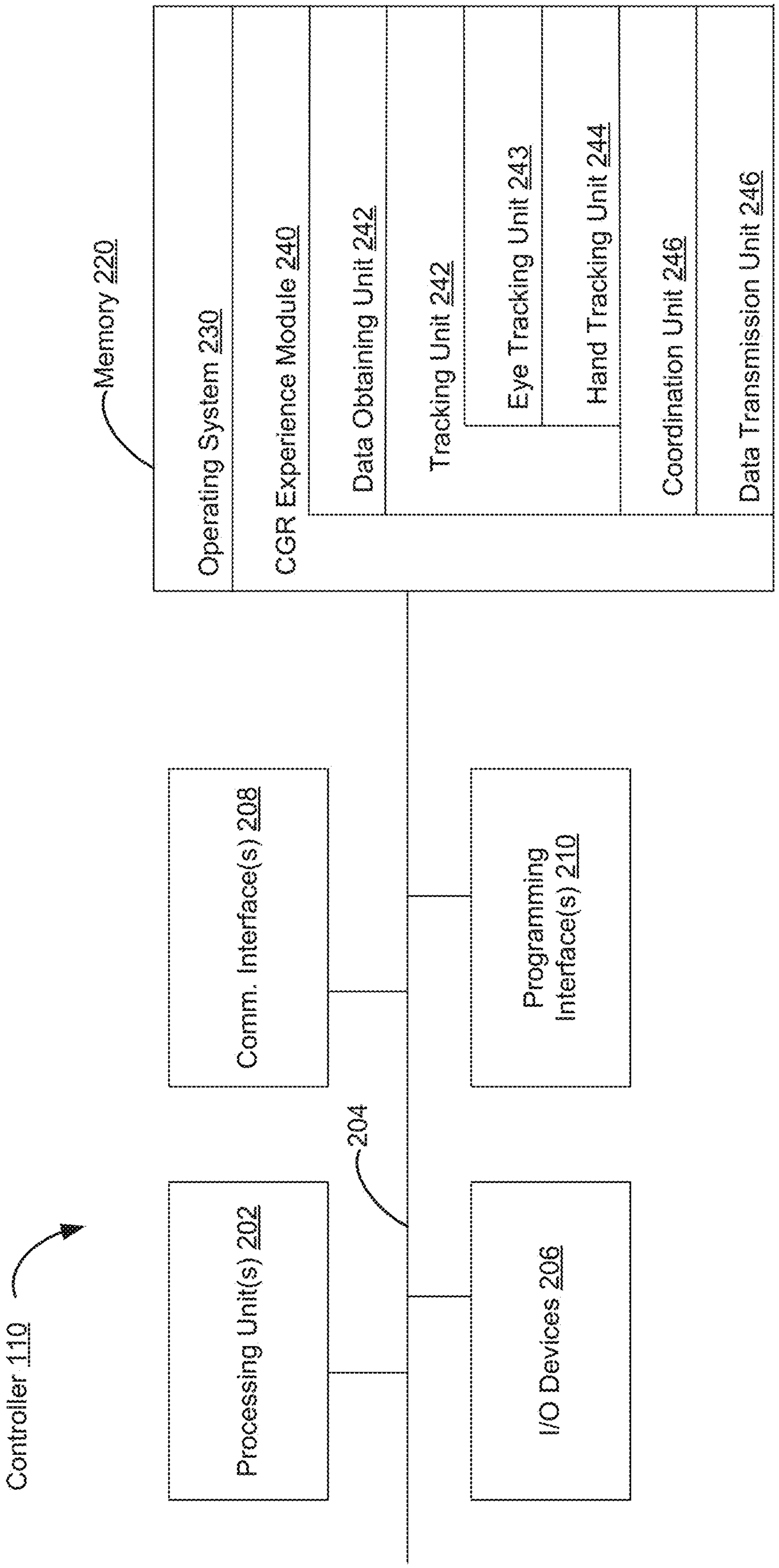
FIG. 2 is a block diagram illustrating a controller of a computer system that is configured to manage and coordinate a XR experience for the user in accordance with some embodiments.

FIG. 2 is a block diagram of an example of the controller 110 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
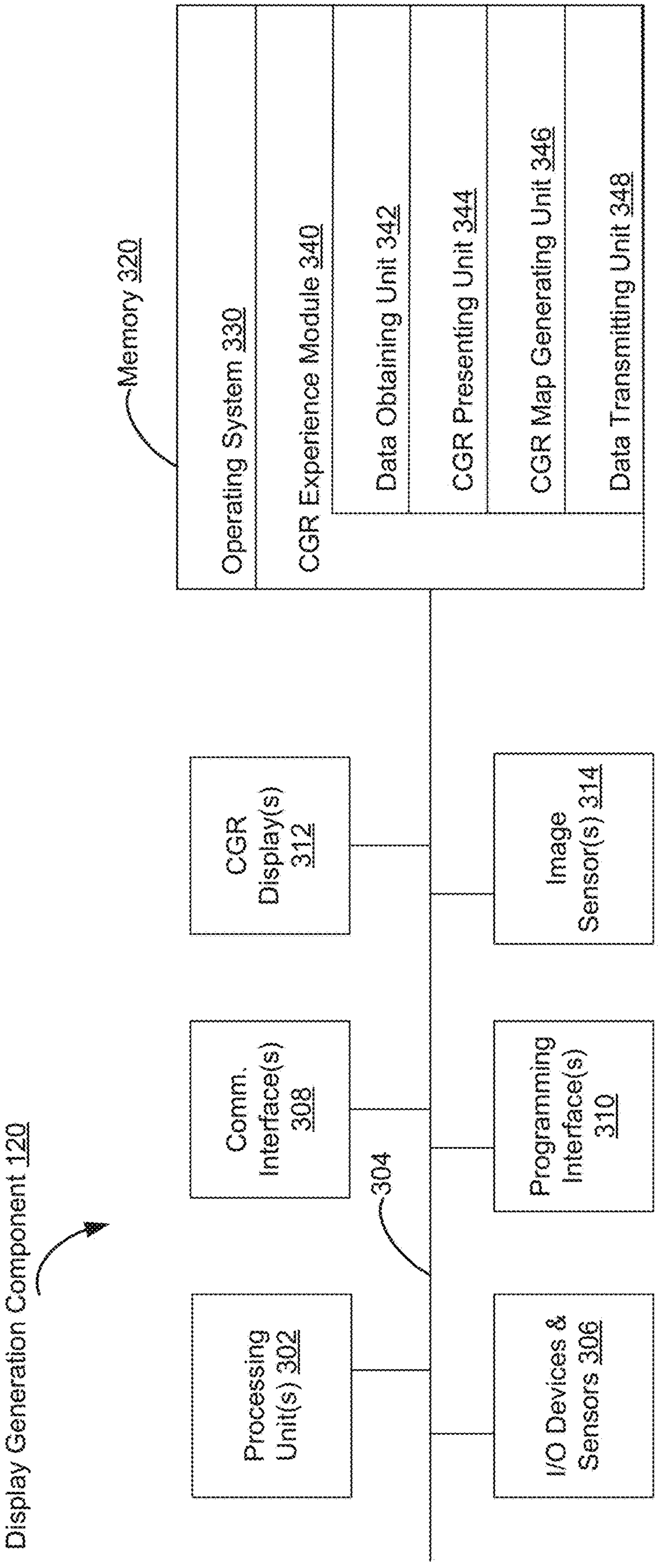
FIG. 3 is a block diagram illustrating a display generation component of a computer system that is configured to provide a visual component of the XR experience to the user in accordance with some embodiments.

FIG. 3 is a block diagram of an example of the display generation component 120 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 4:
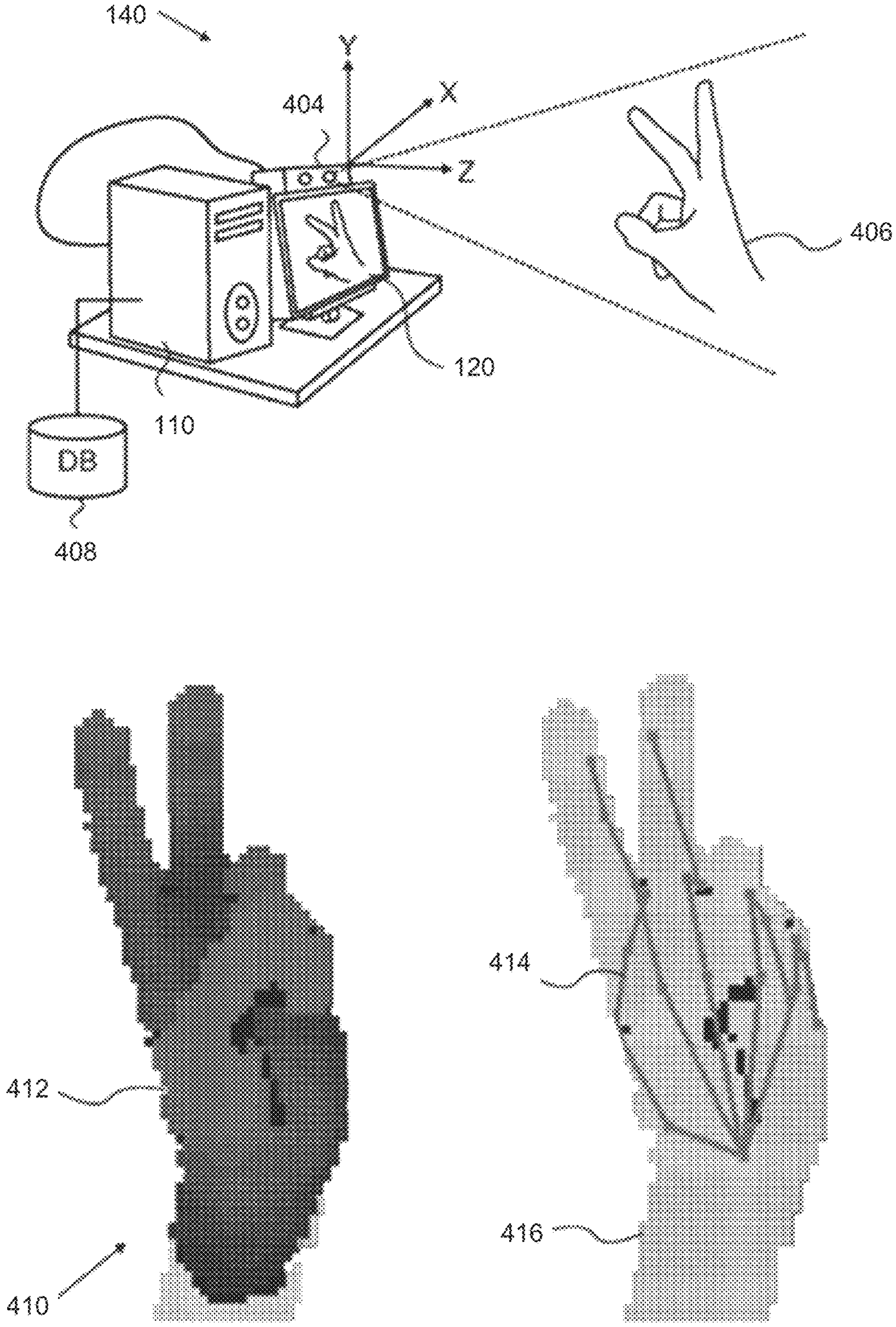
FIG. 4 is a block diagram illustrating a hand tracking unit of a computer system that is configured to capture gesture inputs of the user in accordance with some embodiments.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand. In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) or part(s) of the user's hand) for interacting with an XR environment (e.g., a virtual or mixed-reality environment), in accordance with some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in accordance with some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture (e.g., an air drag gesture or an air swipe gesture) includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand. In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag (e.g., an air drag gesture or an air swipe gesture) could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in accordance with some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in accordance with some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in accordance with some embodiments.

Figure 5:
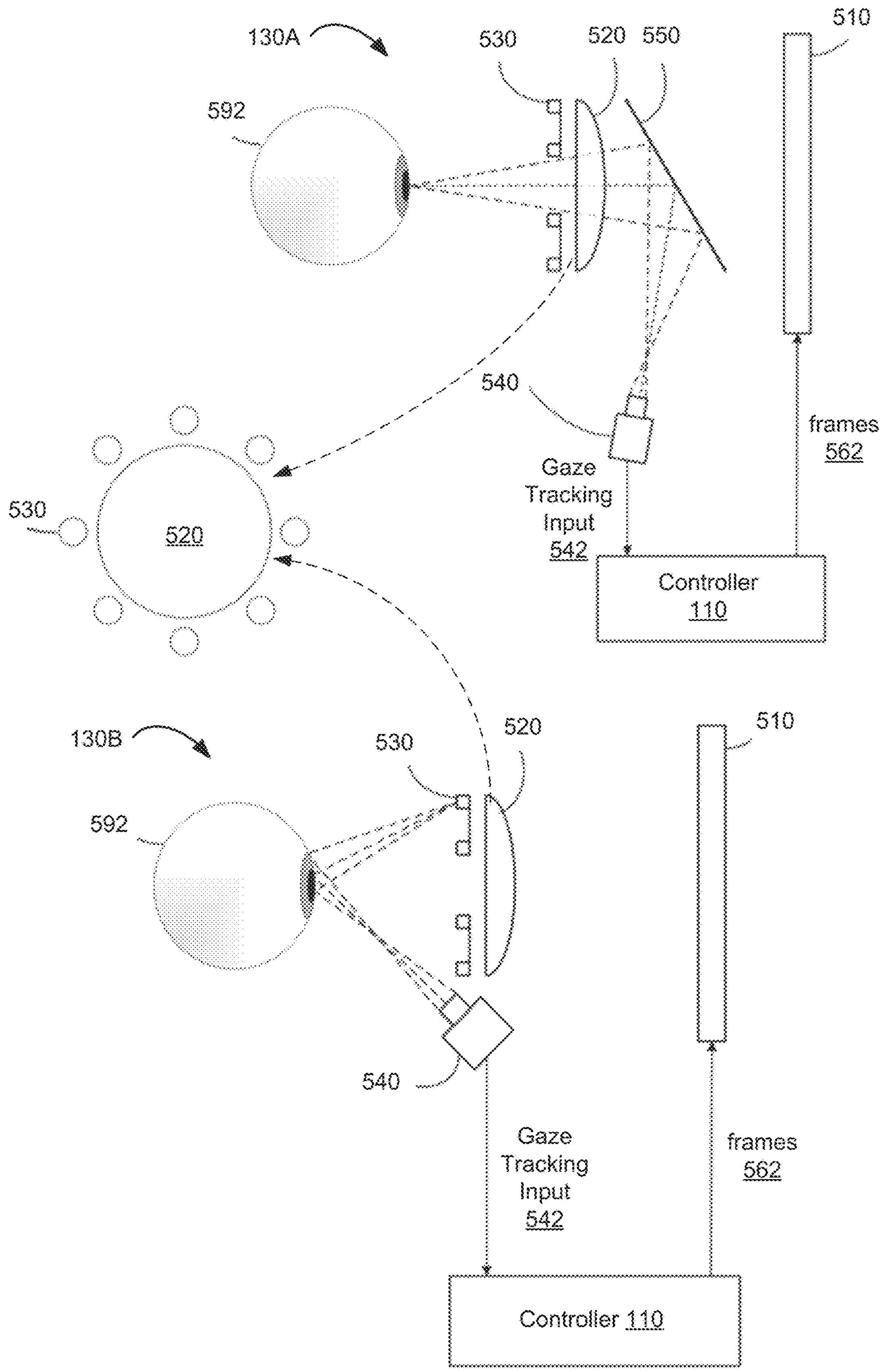
FIG. 5 is a block diagram illustrating an eye tracking unit of a computer system that is configured to capture gaze inputs of the user in accordance with some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in accordance with some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs), mounted in a wearable housing. The light sources emit light (e.g., IR or NIR light) towards the user's eye(s) 592. In some embodiments, the light sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of illumination sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
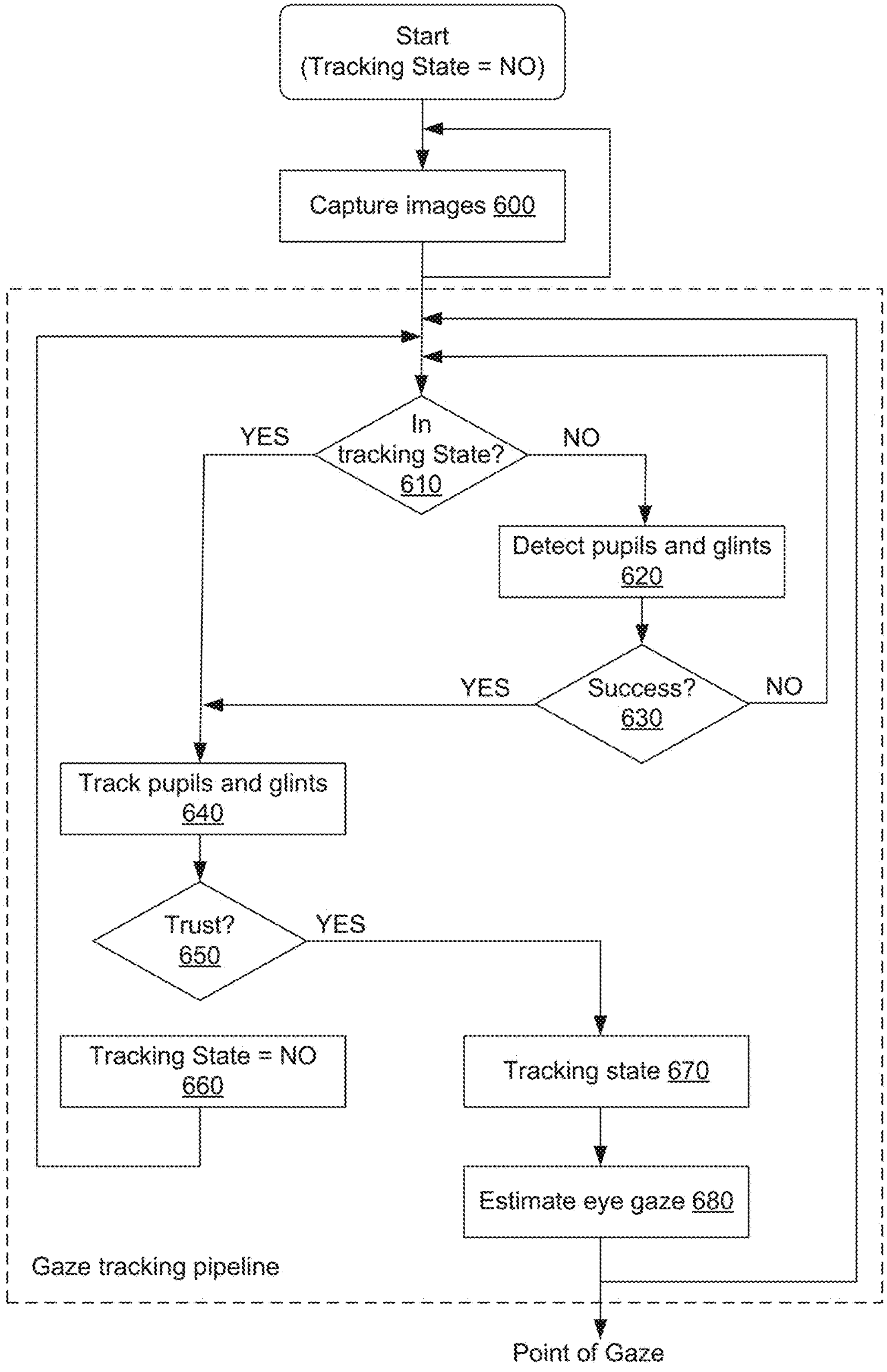
FIG. 6 is a flow diagram illustrating a glint-assisted gaze tracking pipeline in accordance with some embodiments.

FIG. 6 illustrates a glint-assisted gaze tracking pipeline, in accordance with some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., position of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as portable multifunction device or a head-mounted device, with a display generation component, one or more input devices, and (optionally) one or cameras.

FIGS. 7A-7F illustrate examples of a computer system selectively determining and applying a time of day setting to a respective virtual environment based on a system setting in accordance with some embodiments.

Figure 7A:
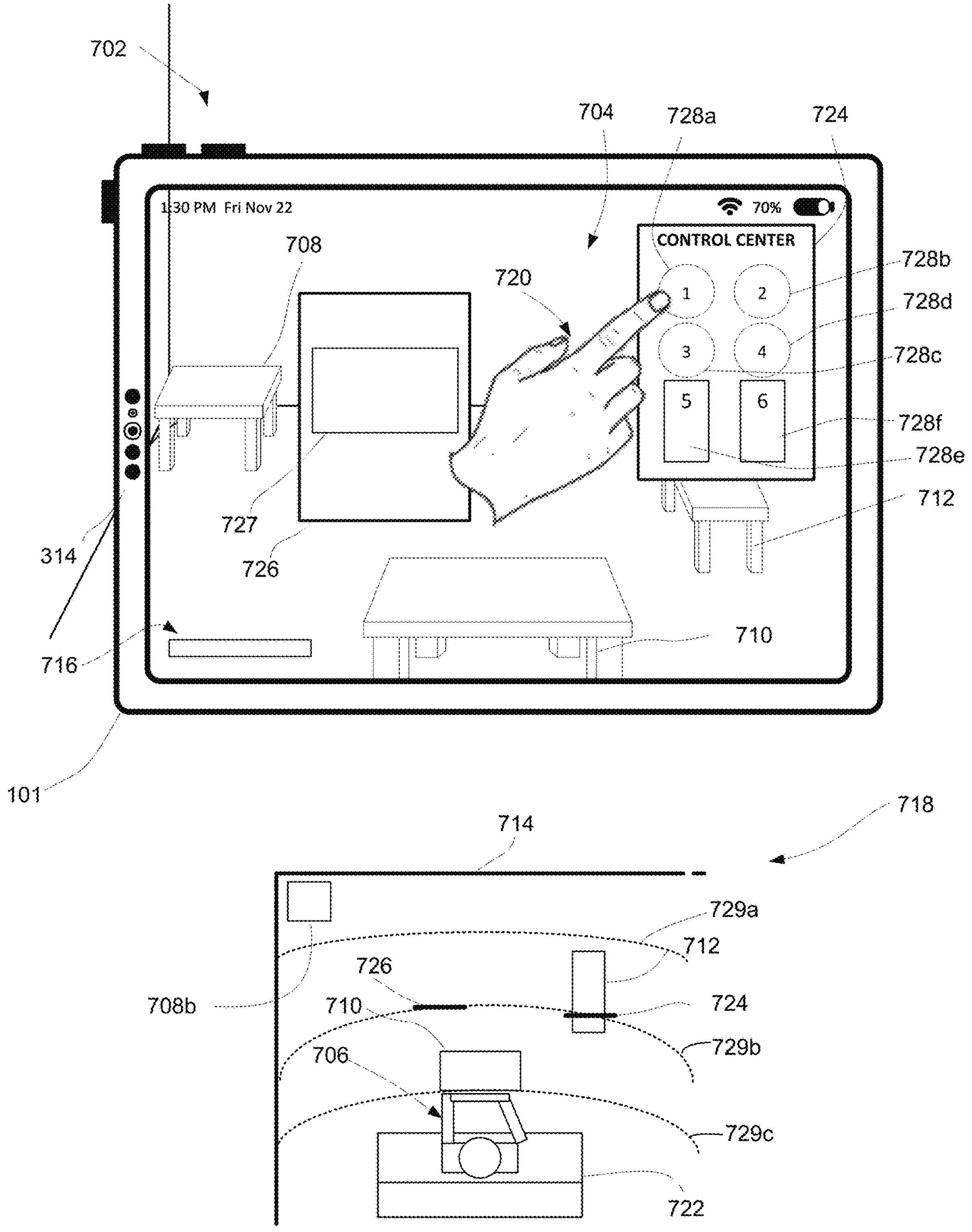
FIGS. 7A-7F illustrate examples of a computer system selectively determining and applying a time of day setting to a respective virtual environment based on a system setting in accordance with some embodiments.

FIG. 7A illustrates a computer system 101 displaying, via a display generation component (e.g., display generation component 120 of FIG. 1), a three-dimensional environment 704 from a viewpoint of the user 706 illustrated in the overhead view 718 (e.g., facing the far wall 714 of the physical environment in which computer system 101 is located). The overhead view 718 also illustrates zone boundaries 729*a*-729*c* in the three-dimensional environment 704, as will be described later.

As described above with reference to FIGS. 1-6, the computer system 101 optionally includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 7A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 704 or portions of the physical environment are visible via the display generation component 120 of computer system 101. For example, three-dimensional environment 704 includes portions of the walls, the ceiling, and the floor in the physical environment of user 706. Three-dimensional environment 704 also includes corner table 708, coffee table 710, and side table 712, which are real-world physical objects that are located in the real-world environment 702 of user 706 as shown in respective locations in the overhead view 718. For example, corner table 708 is located between a first zone boundary 729*a* and the far wall 714. Side table 712 is located between the first zone boundary 729*a* and the third zone boundary 729*c*. Coffee table 710 is located between second zone boundary 729*b* and the third zone boundary 729*c*

In FIG. 7A, three-dimensional environment 704 also includes an application user interface, such as video application user interface 726 that is used to display video content 727. In some embodiments, video application user interface 726 is a different type of application such as a messaging user interface, or a content browsing user interface. In some embodiments, the three-dimensional environment 704 include three-dimensional objects displayed such as a virtual television, a virtual clock, a virtual alarm, a virtual speaker system, virtual artwork, and/or a virtual environment (e.g., as will be describe later), or any other virtual objects displayed by computer system 101 that is not included in the physical environment of the computer system 101. As shown in the overhead view 718, the video application user interface 726 is located along the second zone boundary 729*b*.

In FIG. 7A, the three-dimensional environment 704 also includes control center user interface 724 (e.g., a system user interface and/or a first user interface of the control center user interface). As shown in the overhead view 718, the control center user interface 724 is located along the second zone boundary 729*b*. In some embodiments, the control center user interface 724 includes a virtual environment selection user interface element 728*a* (illustrated as element "1"), a focus mode control user interface element 728*b* (illustrated as element "2"), an auto-dim user interface element 728*c* (illustrated as element "3"), a volume control user interface element 728*d* (illustrated as element "4"), an immersion slider user interface element 728*e* (illustrated as element "5"), and a brightness slider user interface element 728*f* (illustrated as element "6"). As further illustrated in the three-dimensional environment 704, an immersion level indicator 716 is displayed at the bottom-left portion of the three-dimensional environment 704. As shown, the level of immersion is currently at 0% immersion. Levels of immersion are described in more detail with reference to method 800.

FIG. 7A1 illustrates similar and/or the same concepts as those shown in FIG. 7A (with many of the same reference numbers). It is understood that unless indicated below, elements shown in FIG. 7A1 that have the same reference numbers as elements shown in FIGS. 7A-7F have one or more or all of the same characteristics. FIG. 7A1 includes computer system 101, which includes (or is the same as) display generation component 120. In some embodiments, computer system 101 and display generation component 120 have one or more of the characteristics of computer system 101 shown in FIGS. 7A-7F and display generation component 120 shown in FIGS. 1 and 3, respectively, and in some embodiments, computer system 101 and display generation component 120 shown in FIGS. 7A-7F have one or more of the characteristics of computer system 101 and display generation component 120 shown in FIG. 7A1.

In FIG. 7A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 7A-7F.

In FIG. 7A1, display generation component 120 is illustrated as displaying content that optionally corresponds to the content that is described as being displayed and/or visible via display generation component 120 with reference to FIGS. 7A-7F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 7A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 7A1. Because display generation component 120 is optionally a head-mounted device, the field of view of display generation component 120 is optionally the same as or similar to the field of view of the user.

In FIG. 7A1, the user is depicted as performing an air pinch gesture (e.g., with hand 720 while attention of the user is directed to option 728*a*, as indicated by gaze point 798) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 7A-7F.

In some embodiments, computer system 101 responds to user inputs as described with reference to FIGS. 7A-7F.

In the example of FIG. 7A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 7A-7F and/or described with reference to the corresponding method(s) are optionally implemented on computer system 101 and display generation unit 120 in a manner similar or analogous to that shown in FIG. 7A1.

Figure 7B:
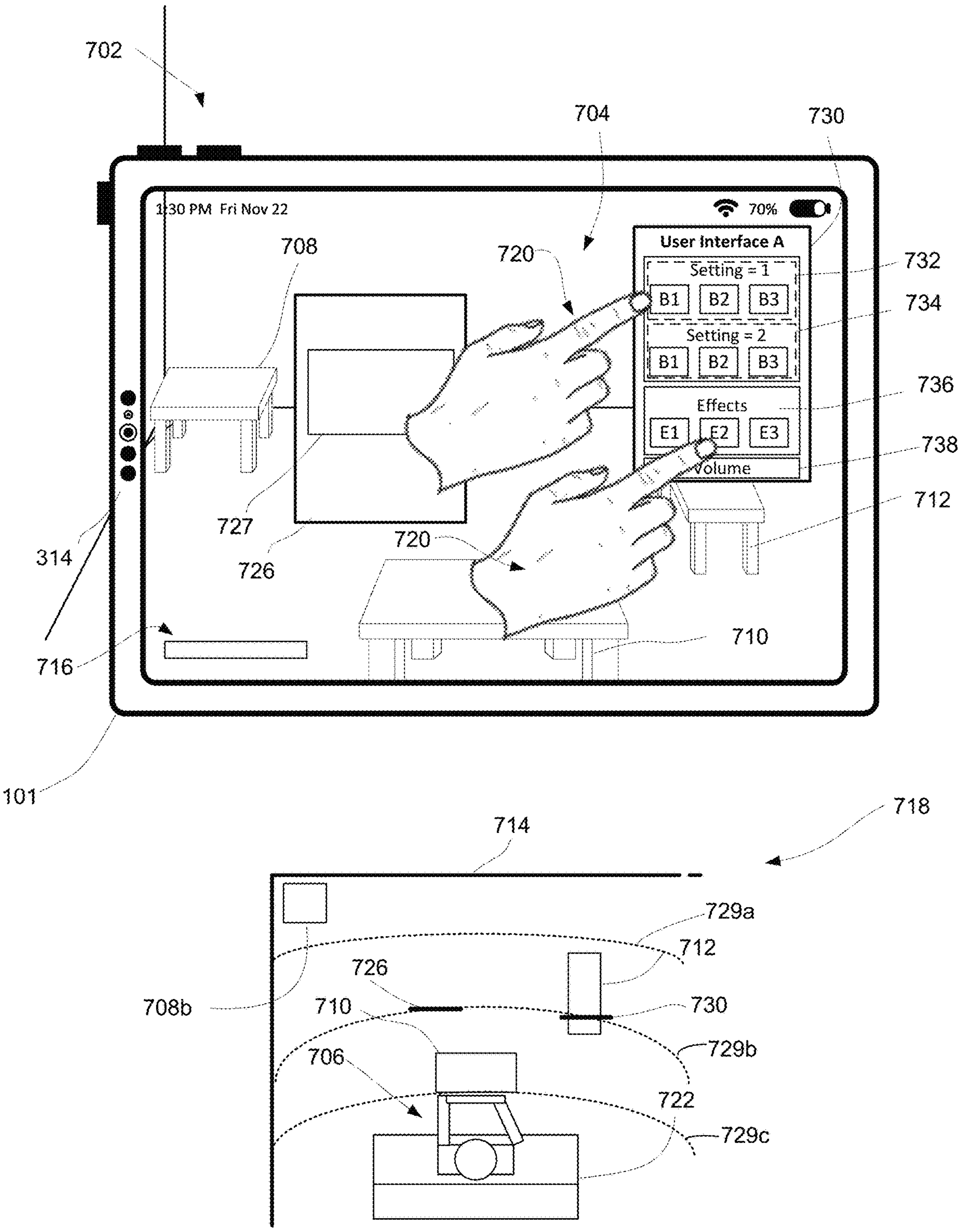

As illustrated in the overhead view 718, the user 706 is shown sitting on a couch 722 while interacting with the computer system 101. While interacting with the computer system 101, in FIG. 7A, computer system 101 detects a selection input from hand 720 of the user directed to the virtual environment selection user interface element 728*a* displayed in the control center user interface 724. For example, the first computer system 101 is configured to detect a selection input via tap or hand air gesture such as pointing or pinching that is directed at interface element 728*a*. In response to selecting the virtual environment selection user interface element 728*a*, computer system 101 displays an environment selection user interface 730 in the three-dimensional environment 704, as shown in FIG. 7B. For example, the computer system 101 updates the three-dimensional environment 704 and replaces the control center user interface 724 with the environment selection user interface 730.

As shown in FIG. 7B, the environment selection user interface 730 includes a first time of day setting interface 732 and/or a second time of day setting interface 734. The computer system 101 displays the first time of day setting interface 732 or the second time of day setting interface 734 depending on a respective setting of the computer system. For example, if the respective setting of the computer system is set to a first value, the first time of day setting interface 732 is optionally displayed. If the respective setting of the computer system is set to a second value, the second time of day setting interface 734 is optionally displayed. In some embodiments, the first value and the second value respectively correspond to different lighting characteristics for the respective virtual environment such as a light mode or dark mode. In some embodiments, if the respective setting is not set to a specific value, the first time of day setting interface 732 and the second time of day setting interface 734 are both displayed.

In some embodiments, the first time of day setting interface 732 corresponds to a light mode (e.g., morning time when it is partly cloudy and sunny, or afternoon time when it is clear and sunny). The first time of day setting interface 730 in FIG. 7B includes selectable options for selecting a respective virtual environment for display with the first time of day setting applied to it. For example, first time of day setting interface 730 includes selectable options B1, B2, and B3. In one example, B1 corresponds to a virtual environment of a beach scene which optionally includes virtual elements such as the beach, palm trees, and/or an umbrella. In another example, B2 corresponds to a virtual environment of a mountain scene which optionally includes virtual elements such as a mountain range, trees, animals, and/or skiers. In another example, B3 corresponds to a virtual environment of a park which optionally includes a playground, a basketball court, and/or a barbeque pit. Accordingly, at the first time of day setting interface 732, a selection of one of the selectable options (e.g., B1, B2, or B3) corresponding to a respective virtual environment will optionally result in a light mode applied to the selected respective virtual environment.

In some embodiments, the second time of day setting interface 734 corresponds to a dark mode (e.g., evening time when it is dark and the sun has set). The second time of day setting interface 734 in FIG. 7B includes selectable options for selecting a respective virtual environment for display with the second time of day setting applied to it. For example, second time of day setting interface 734 includes selectable options B1, B2, and B3. As noted above, B1 optionally corresponds to a virtual environment of a beach scene, B2 optionally corresponds to a mountain scene, and B3 optionally corresponds to park environment. At the second time of day setting interface 734, a selection of one of the selectable options (e.g., B1, B2, or B3) corresponding to a respective virtual environment will optionally result in a dark mode applied to the selected respective virtual environment.

In some embodiments, the environment selection user interface 730 includes an atmospheric effects interface 736. The display of the atmospheric effects interface 736 is optionally independent of whether the respective setting of the computer system 101 has the first value or the second value. As shown in FIG. 7B, atmospheric effects interface 736 includes selectable options E1, E2, and E3. In some embodiments, a request to display an atmospheric effect (e.g., selecting E1, E2, or E3) causes computer system 101 to modify one or more visual characteristics of the physical environment visible in three-dimensional environment 702 such that it appears as if the physical environment is enhanced via color and/or exposure adjustments, as described in more detail with reference to method 800. In some embodiments, applying the atmospheric effect to the physical environment modifies one or more visual characteristics of the physical environment such that it appears as if the physical environment is located at a different time, place, and/or condition (e.g., morning lighting instead of afternoon lighting, or sunny instead of overcast). In some embodiments, applying the atmospheric effect to the physical environment modifies the physical environment to appear dimly lit, and/or humid.

Figure 7C:
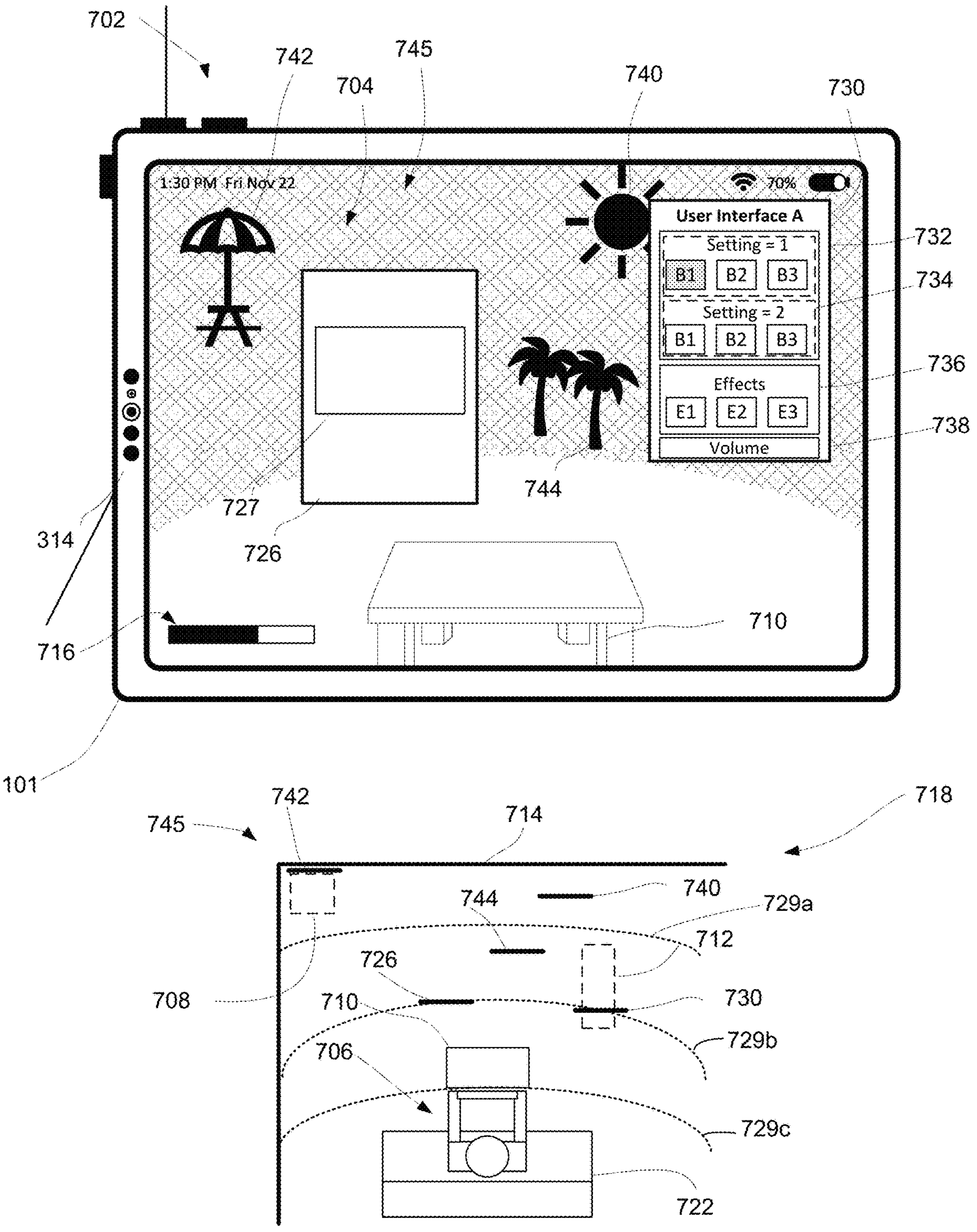

As further shown in FIG. 7B, the computer system 101 is configured to detect a selection input from hand 720 of the user directed to selectable option B1 from the first time of day setting interface 732 which initiates the display of a virtual environment of a beach scene with the first time of day setting applied to the environment. In response to detecting selection of selectable option B1 from the first time of day setting interface 732, a virtual environment of the beach scene is displayed in the three-dimensional environment 704, as shown in FIG. 7C. In particular, the computer system 101 updates the three-dimensional environment 704 to include the beach scene virtual environment 745 with a visual appearance corresponding to the first time of day setting corresponding to light mode.

As shown in FIG. 7C, the first time of day setting interface 730 remains displayed in the three-dimensional environment 704 and the selectable option B1 is shaded to indicate that the virtual environment 745 corresponding to B1 is currently displayed. As shown, virtual environment 745 includes a virtual sun 740, a virtual table and umbrella 742, and virtual trees 744. Because the first time of day setting is applied to the virtual environment 745, the virtual environment 745 corresponds to a light mode simulated time of the day, which includes a visual appearance that corresponds to a sunny and bright environment in the simulated physical space of the beach scene. As further shown in the three-dimensional environment 704 in FIG. 7C, the virtual environment 745 is displayed at partial immersion (e.g., as described in more detail with reference to method 800). For example, increasing the immersion level optionally causes more of the virtual environment 745 to be displayed, replacing and/or obscuring more of the physical environment, and reducing the immersion level optionally causes less of the virtual environment to be displayed, revealing portions of the physical environment that were previously not displayed and/or obscured. As shown in immersion level indicator 716, the shading in the immersion level indicator 716 indicates that the immersion level of the virtual environment 745 is approximately at 60% immersion.

As shown in the overhead view 718, at the immersion level for virtual environment 745 displayed in FIG. 7C, the virtual environment 745 optionally extends from the second zone boundary 729*b* to the far wall 714 in three-dimensional environment 704. As illustrated in FIG. 7C, a representation of the virtual sun 740 is located between the first zone boundary 729*a* and the far wall 714, a representation of the virtual table and umbrella 742 is located between the first zone boundary 729*a* and the far wall 714, and representations of the virtual trees 744 are located between the first zone boundary 729*a* and the second zone boundary 729*b*. As further illustrated in FIG. 7C, the video application user interface 726 and the environment selection user interface 730 are located along the second zone boundary 729*b*. As shown in FIG. 7C, the real-world physical objects remain at their prior locations in three-dimensional environment 704. For example as noted previously, corner table 708 is located between the first zone boundary 729*a* and the far wall 714, side table 712 is located between the first zone boundary 729*a* and the third zone boundary 729*c*, coffee table 710 is located between second zone boundary 729*b* and the third zone boundary 729*c*, and couch 722 is located between the third zone boundary 729*c* and a back wall.

Figure 7D:
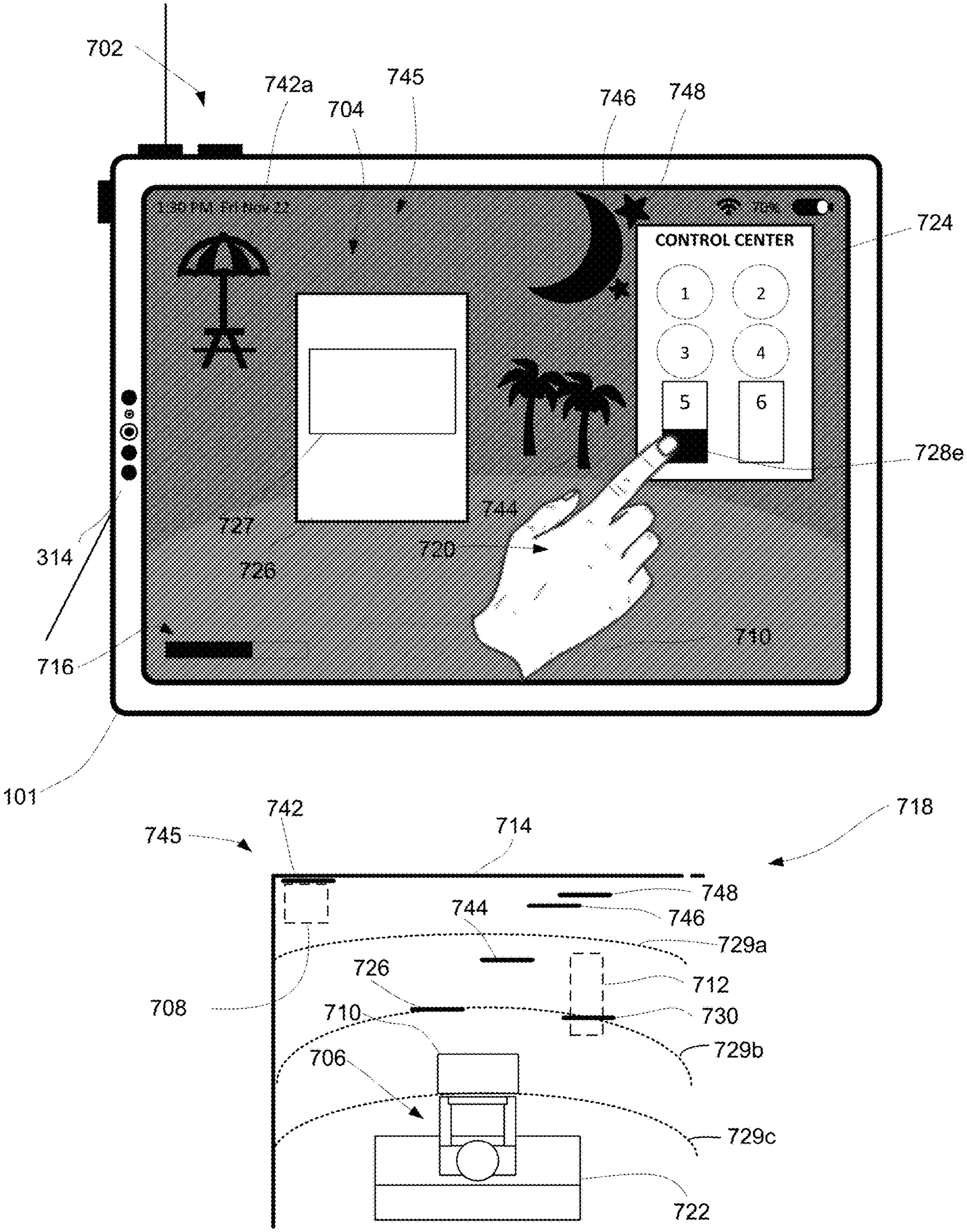

FIG. 7D illustrates computer system 101 displaying a three-dimensional environment 704 which includes virtual environment 745 with the second time of day setting applied to the virtual environment 745. As shown in FIG. 7D, in response to detecting input selecting option B1 from the second time of day setting interface 734 in FIG. 7B, the computer system 101 displays the beach scene virtual environment with a visual appearance corresponding to the second time of day setting corresponding to dark mode. As shown in FIG. 7D, virtual environment 745 includes a virtual moon 746, virtual stars 748, a virtual table and umbrella 742, and virtual trees 744. Because the second time of day setting is applied to the virtual environment 745, the virtual environment 745 has a visual appearance that corresponds to a night mode simulated time of the day in the simulated physical space of the beach scene (e.g., a dark beach environment having a visual appearance corresponding to a time of day that is darker than the time of day of the beach environment corresponding to the light mode).

As further illustrated in the three-dimensional environment 704 in FIG. 7D, the second time of day setting for the virtual environment 745 also causes computer system 101 to change the visual appearance of one or more portions of the real-world environment 702 that are visible in the three-dimensional environment 704 (e.g., reducing their visual prominence making them appear darker). For example, as shown in the three-dimensional environment 704 in FIG. 7D, portions of three-dimensional environment 702 that are not obstructed by the virtual environment 745, such as a portion of the floor and the coffee table 710, are displayed darker, more blurry and/or with less color when virtual environment 745 with the second time of day setting is displayed (as compared to when virtual environment 745 with the first time of day setting is displayed, as shown in FIG. 7C). In some embodiments, second time of day setting does not cause the computer system 101 to change the visual appearance of virtual content that is not part of the virtual environment. For example, the computer system does not change the appearance of applications such as the video application user interface 726. As further shown in the three-dimensional environment 704 in FIG. 7D, the virtual environment 745 is displayed at the same level of immersion as compared to the virtual environment 745 displayed with the first time of day setting shown in FIG. 7C. In particular, as shown in immersion level indicator 716, the shading in the immersion level indicator 716 indicates that the immersion level of the virtual environment 745 is still approximately 60% immersion.

Figure 7E:
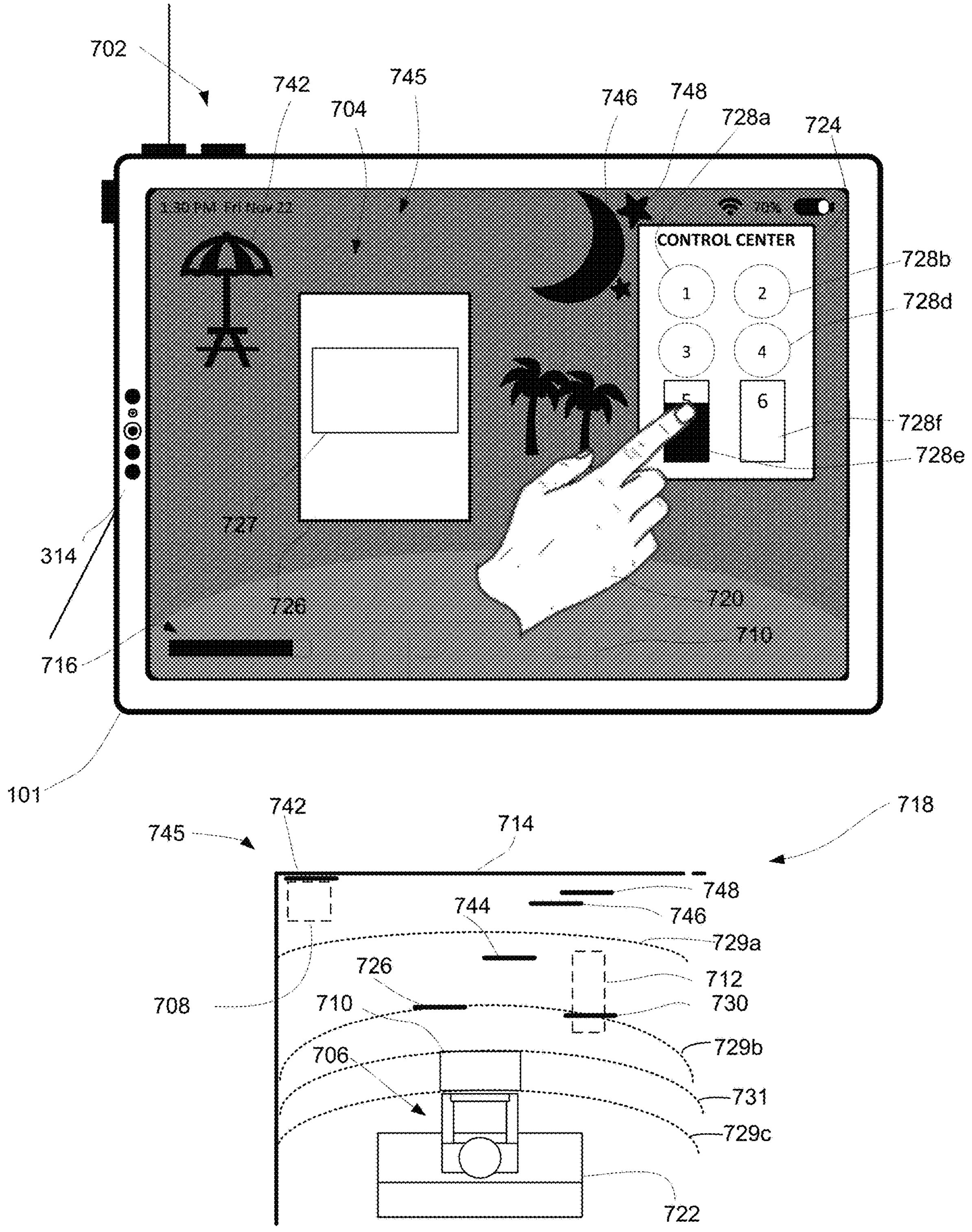

As shown in the overhead view 718 in FIG. 7D, a representation of the virtual moon 746 and virtual stars 748 are located between the first zone boundary 729*a* and the far wall 714. The remaining elements remain in the same locations they had in FIG. 7C. As further illustrated in the three-dimensional environment 704, the control center user interface 724 is optionally displayed to allow the user to select one or more of the selectable elements from the control center user interface 724. For example, the computer system 101 detects a selection input from hand 720 of the user directed to immersion slider user face element 728*e* (illustrated as element "5") to increase the level of immersion which is shown in FIG. 7E. In some embodiments, the selection input is a pinching and/or dragging of the immersion slider user face element 728*e* to increase the level of immersion.

FIG. 7E illustrates the virtual environment 745 in FIG. 7D with an increase in the level of immersion in response to the input detected in FIG. 7D from hand 720. In particular, as shown in immersion level indicator 716, the shading in the immersion level indicator 716 indicates that the immersion level of the virtual environment 745 has increased to approximately 90% immersion. The increase in immersion causes computer system 101 to display more of the virtual environment 745, replacing and/or obscuring more of the physical environment. For example, as shown in FIG. 7E, the increase in immersion obscures an additional portion of the floor. As shown in the overhead view 718, at 90% immersion, the virtual environment 745 extends from the zone boundary 731*b* to the far wall 714.

Figure 7F:
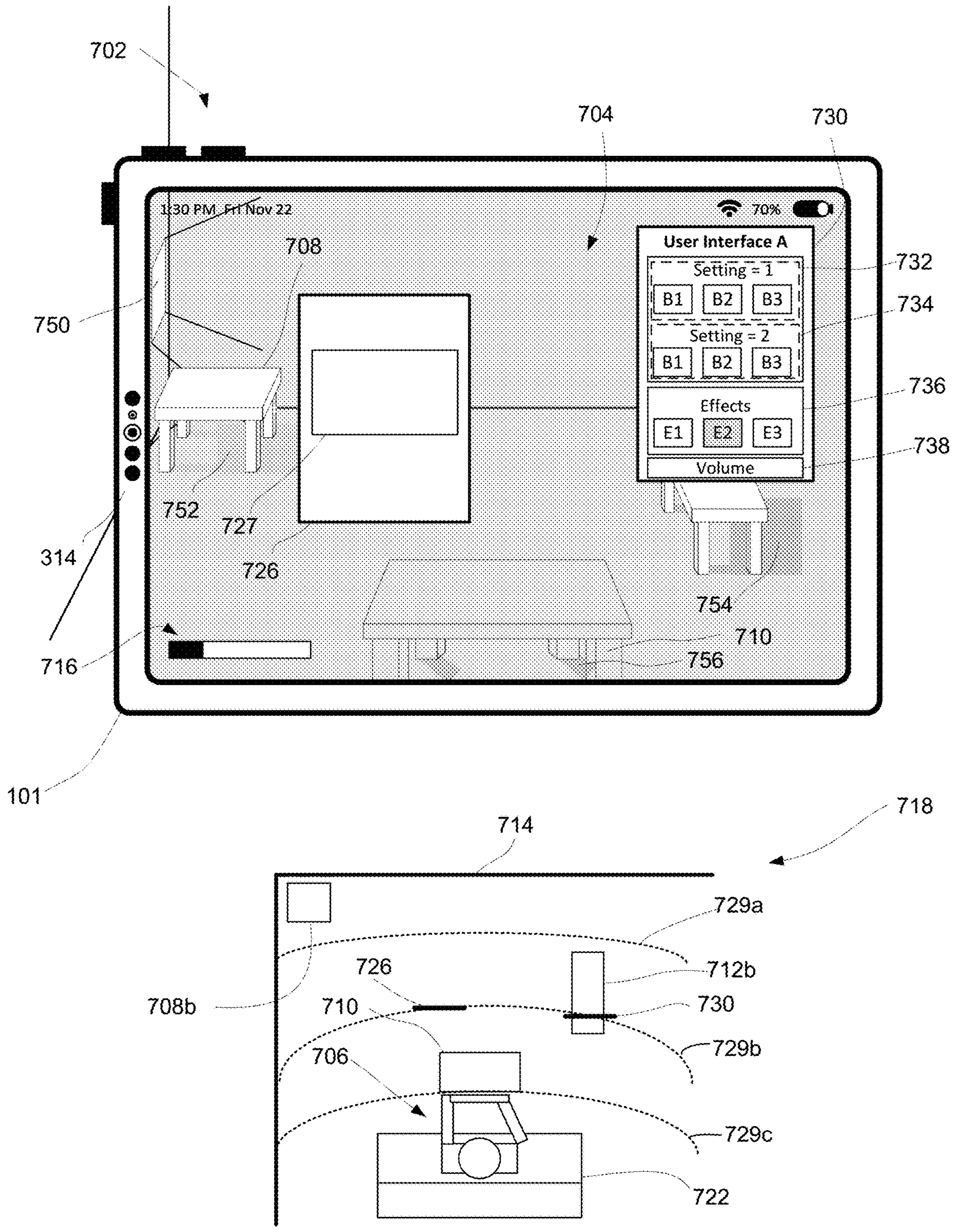
Figure 8A:
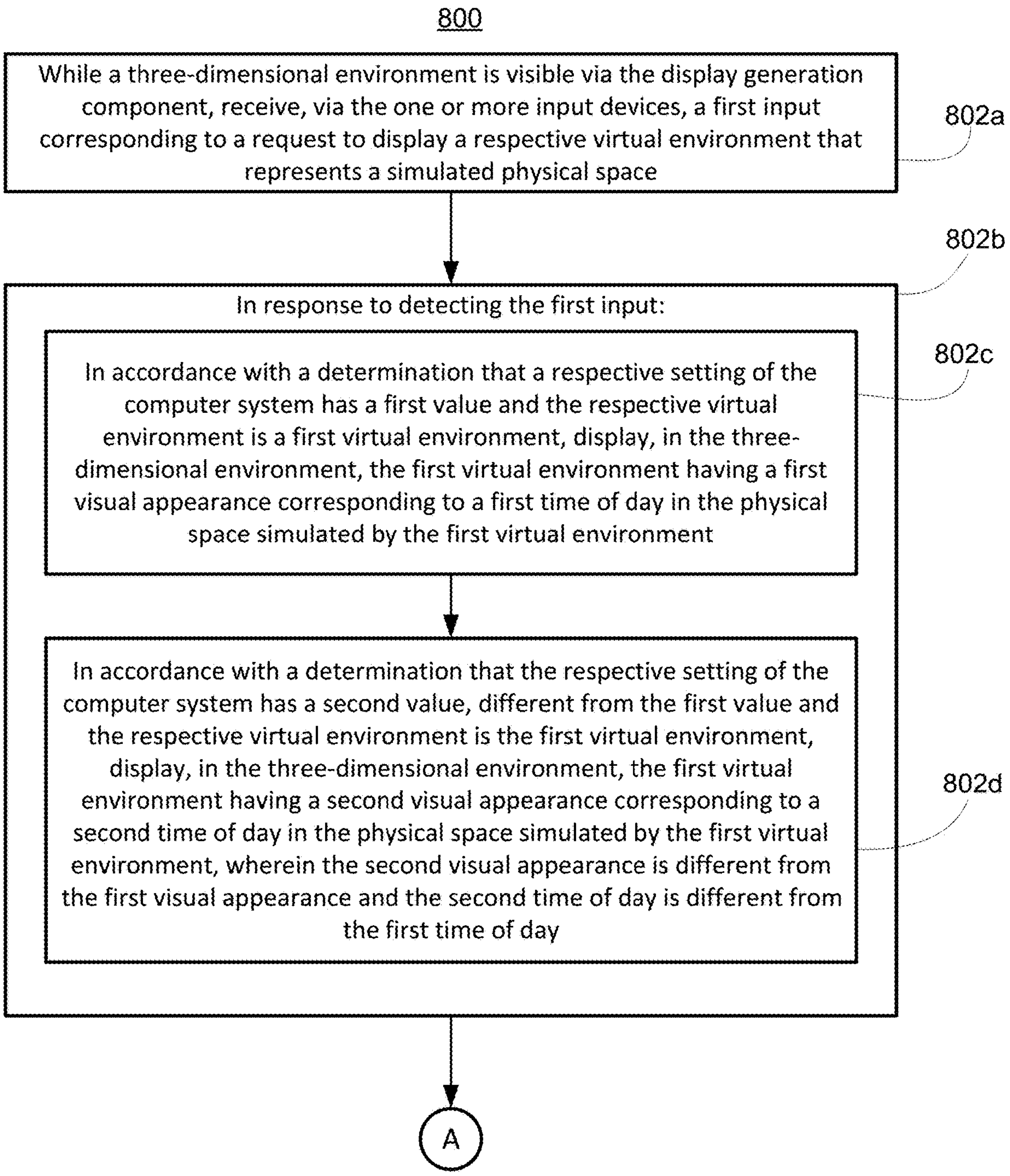
Figure 8B:
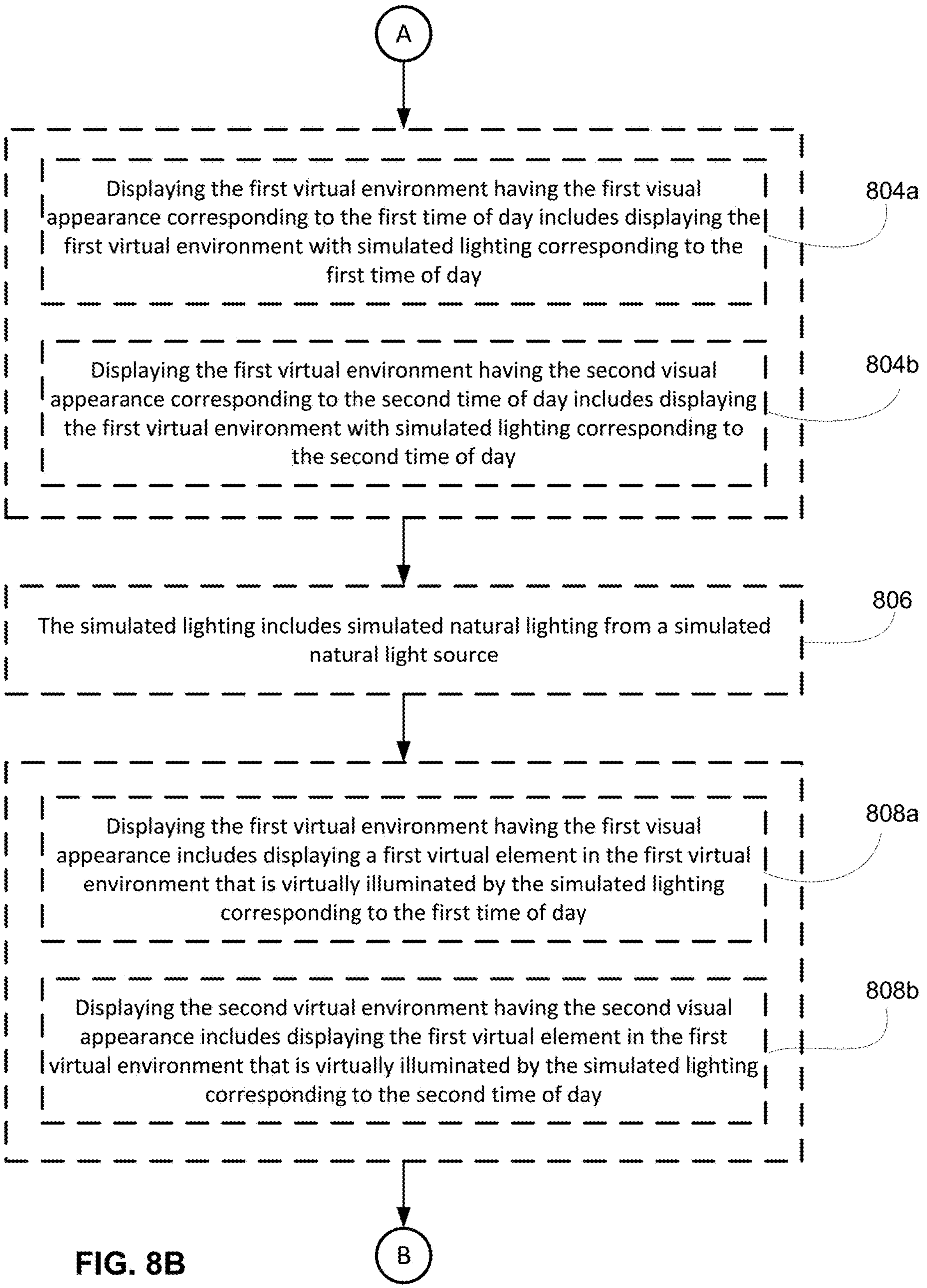
Figure 8C:
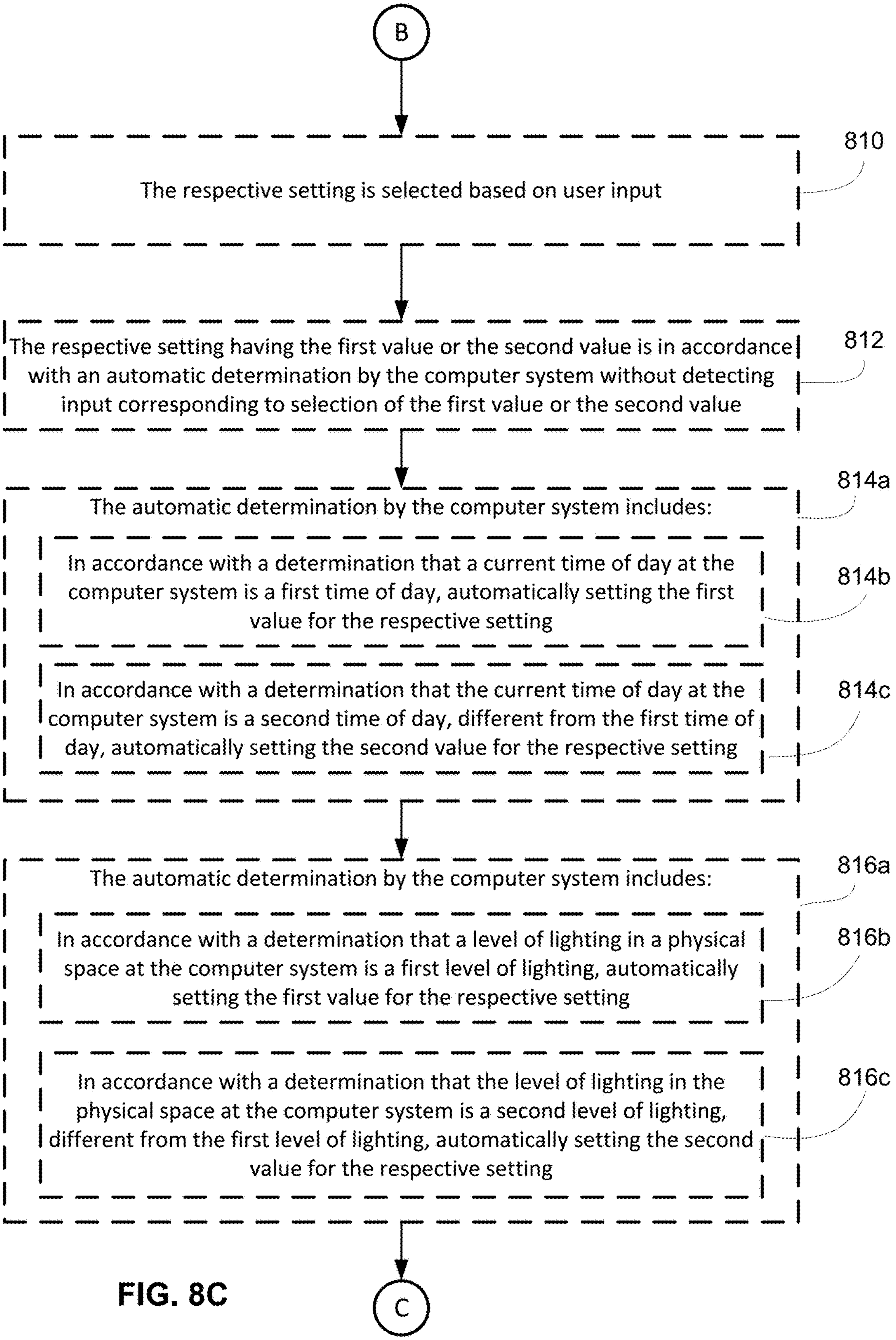
Figure 8D:
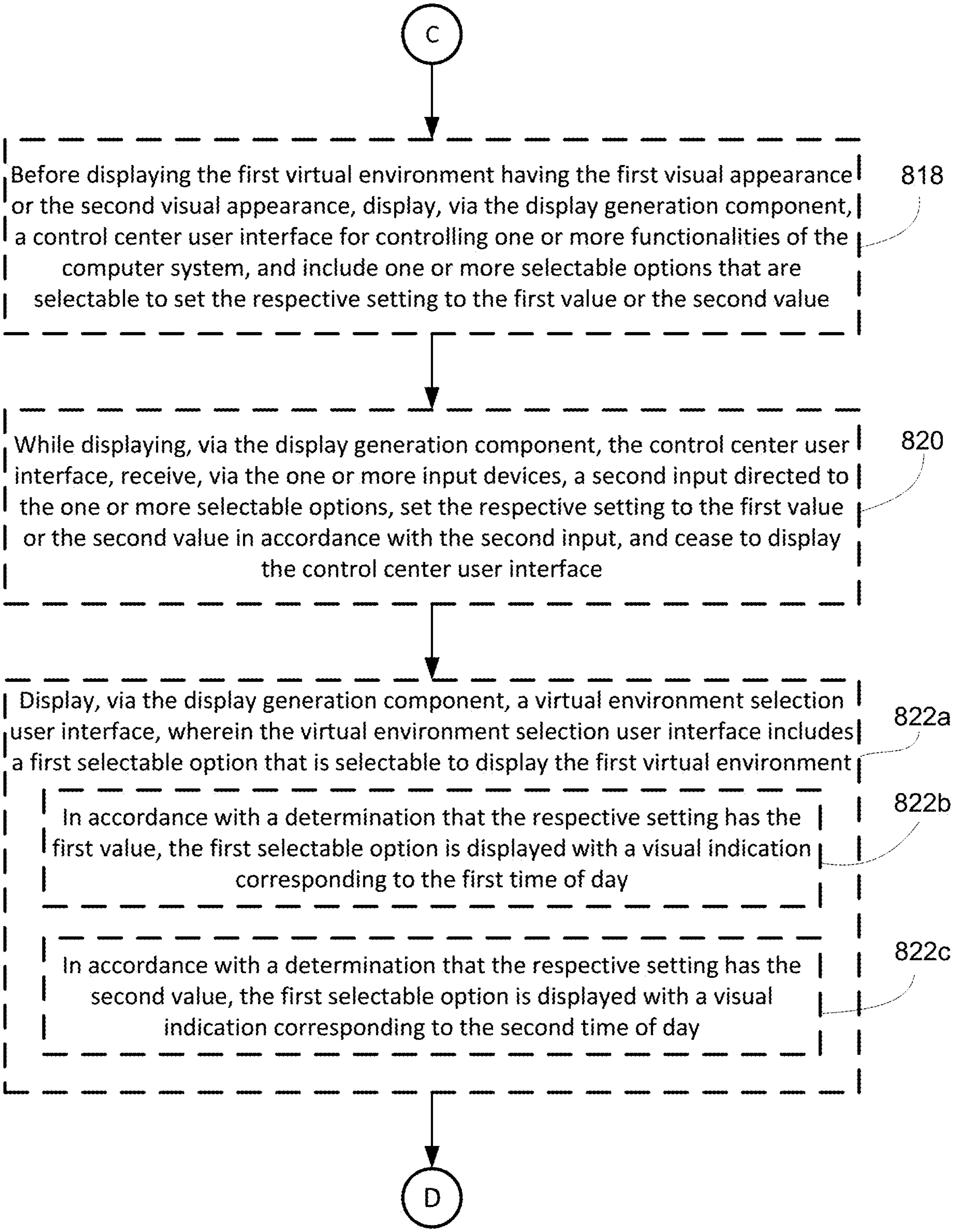
Figure 8F:
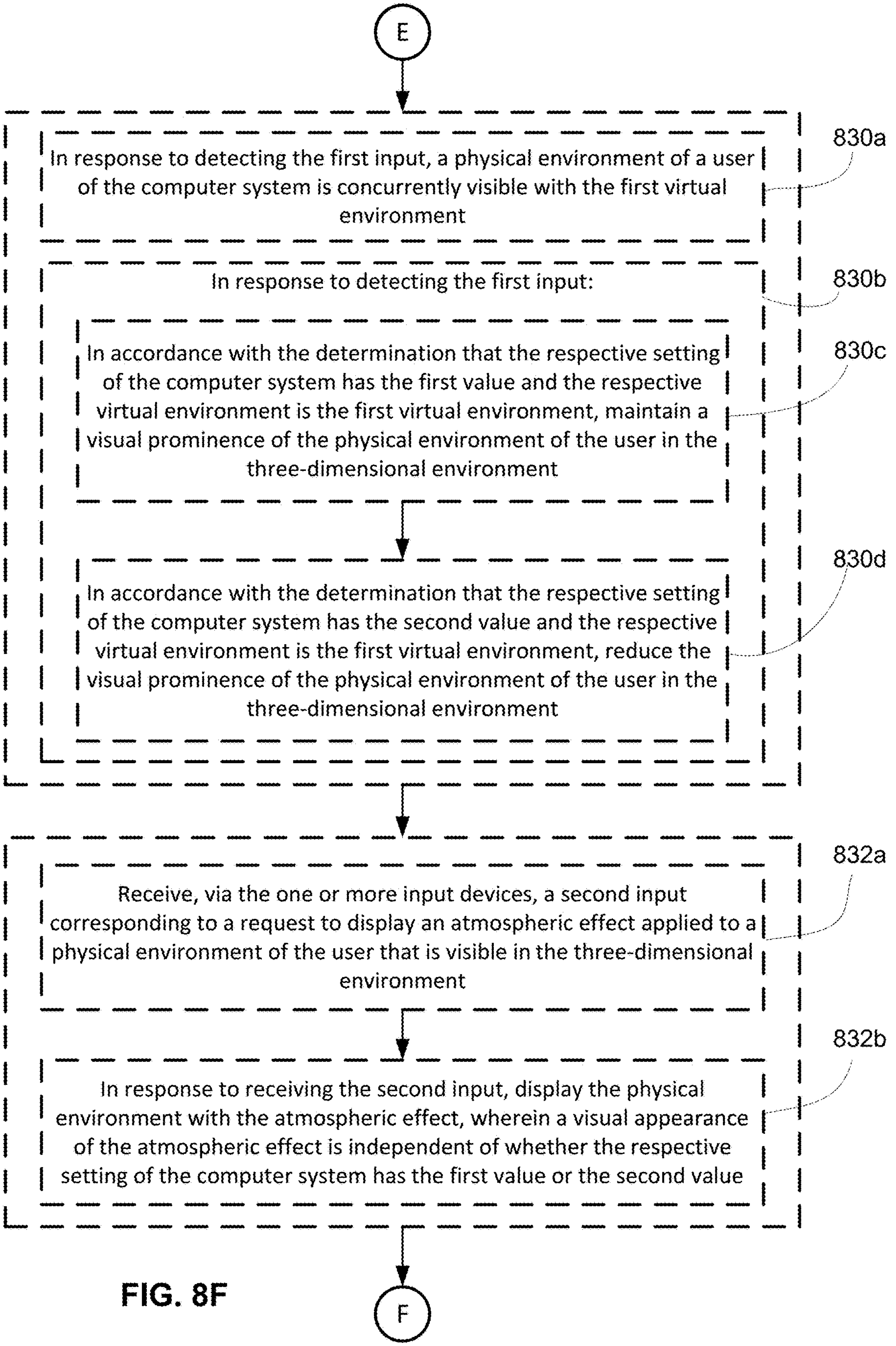
Figure 8G:
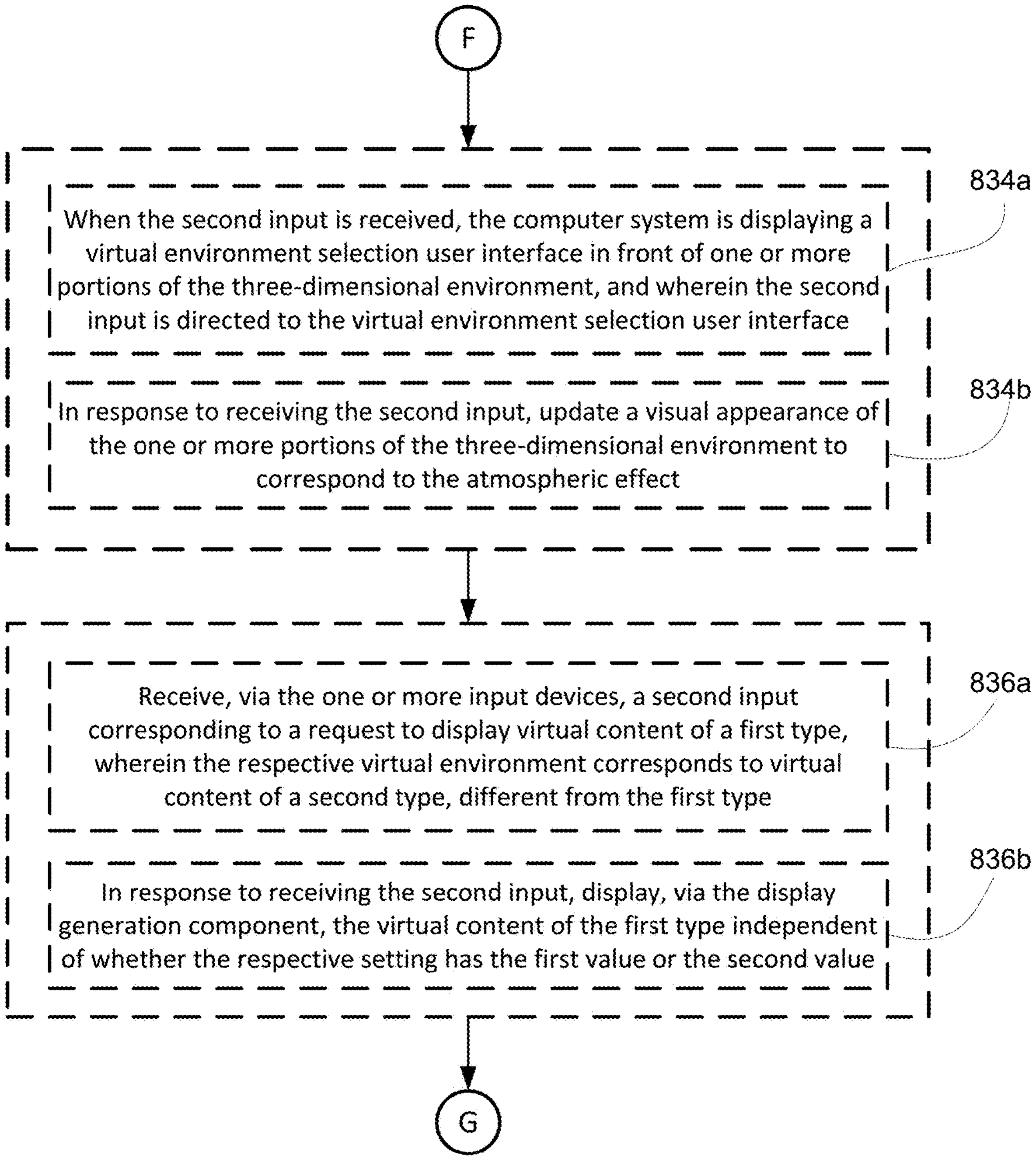
Figure 8H:
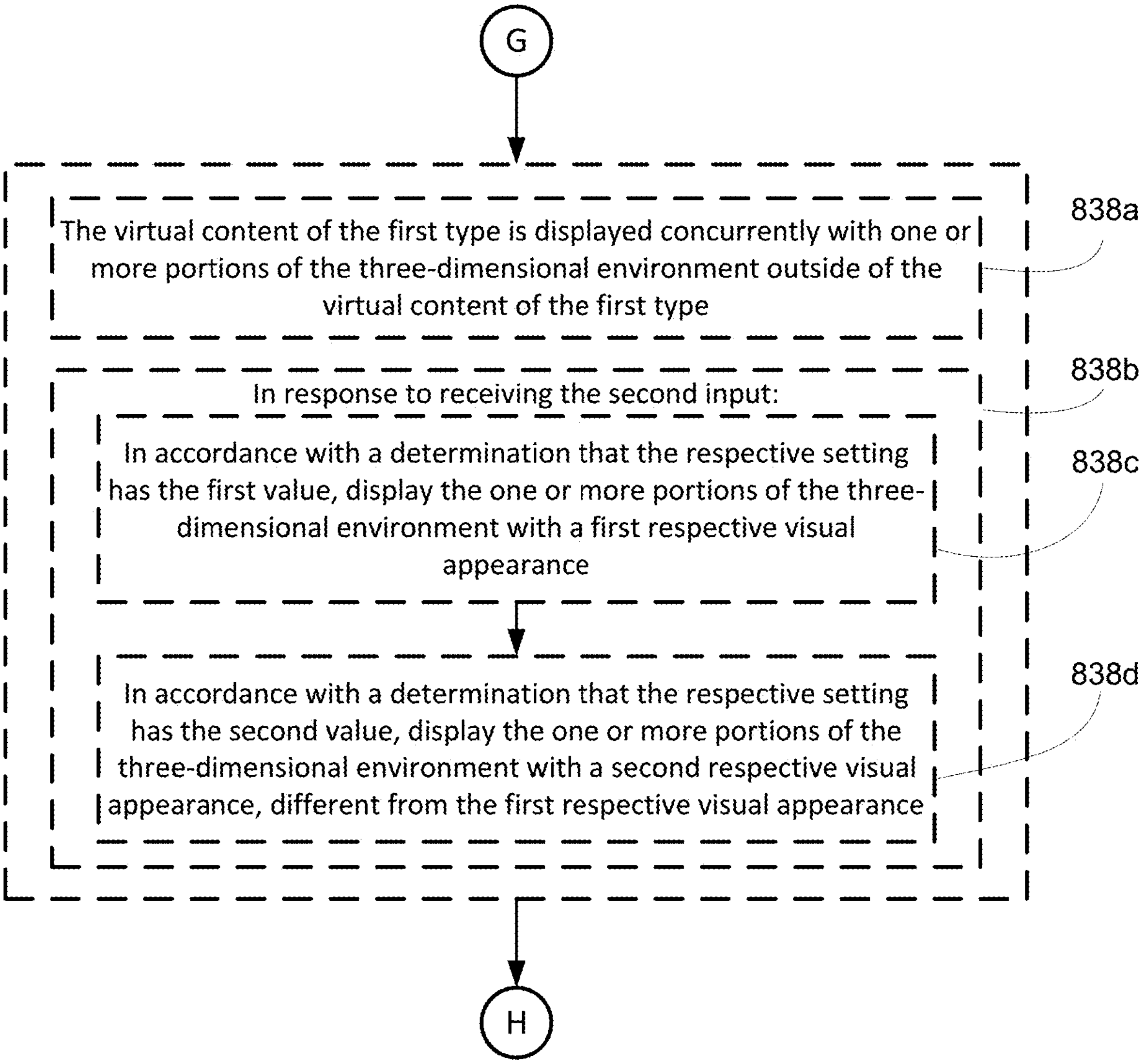
Figure 8I:
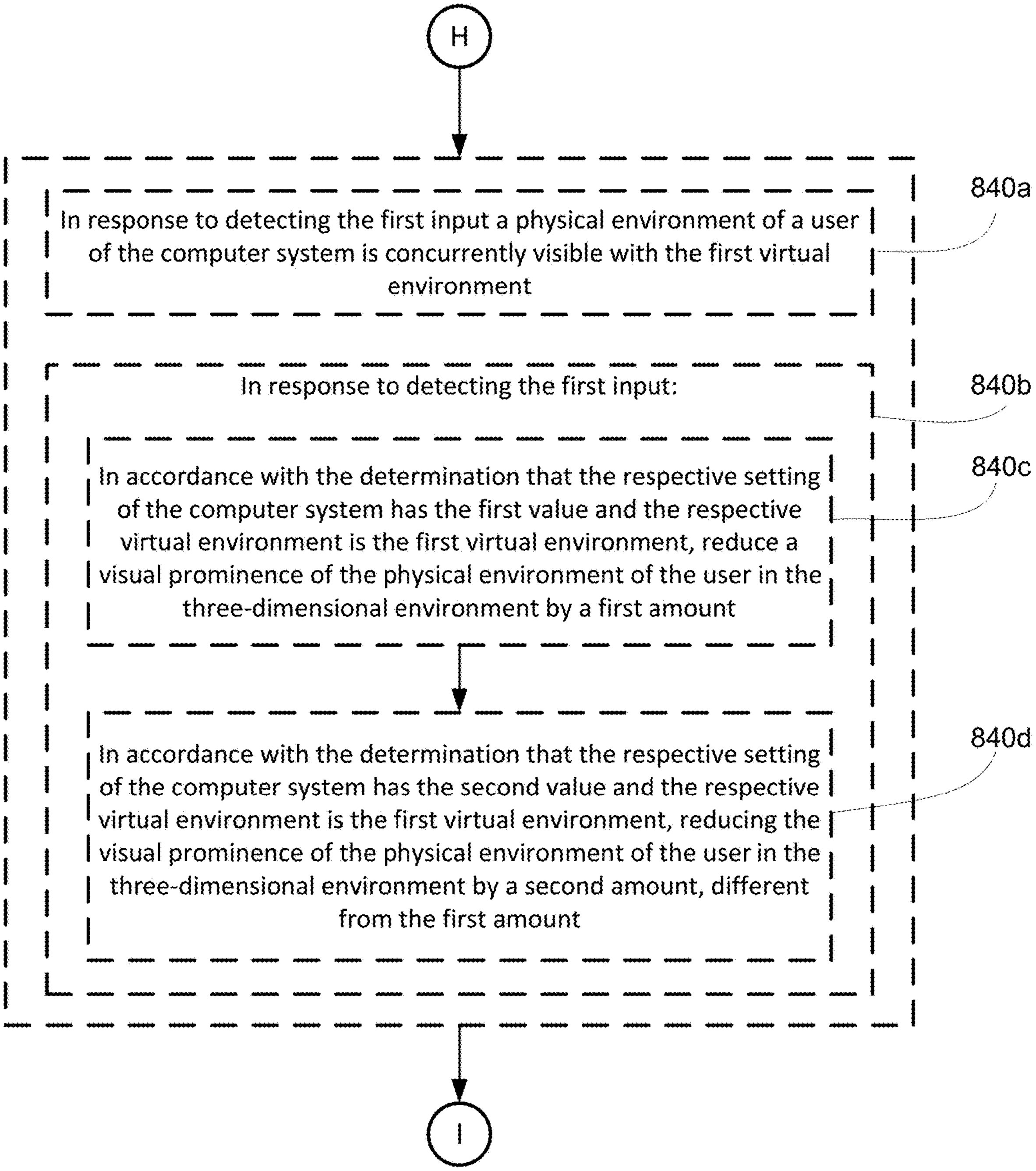
Figure 8J:
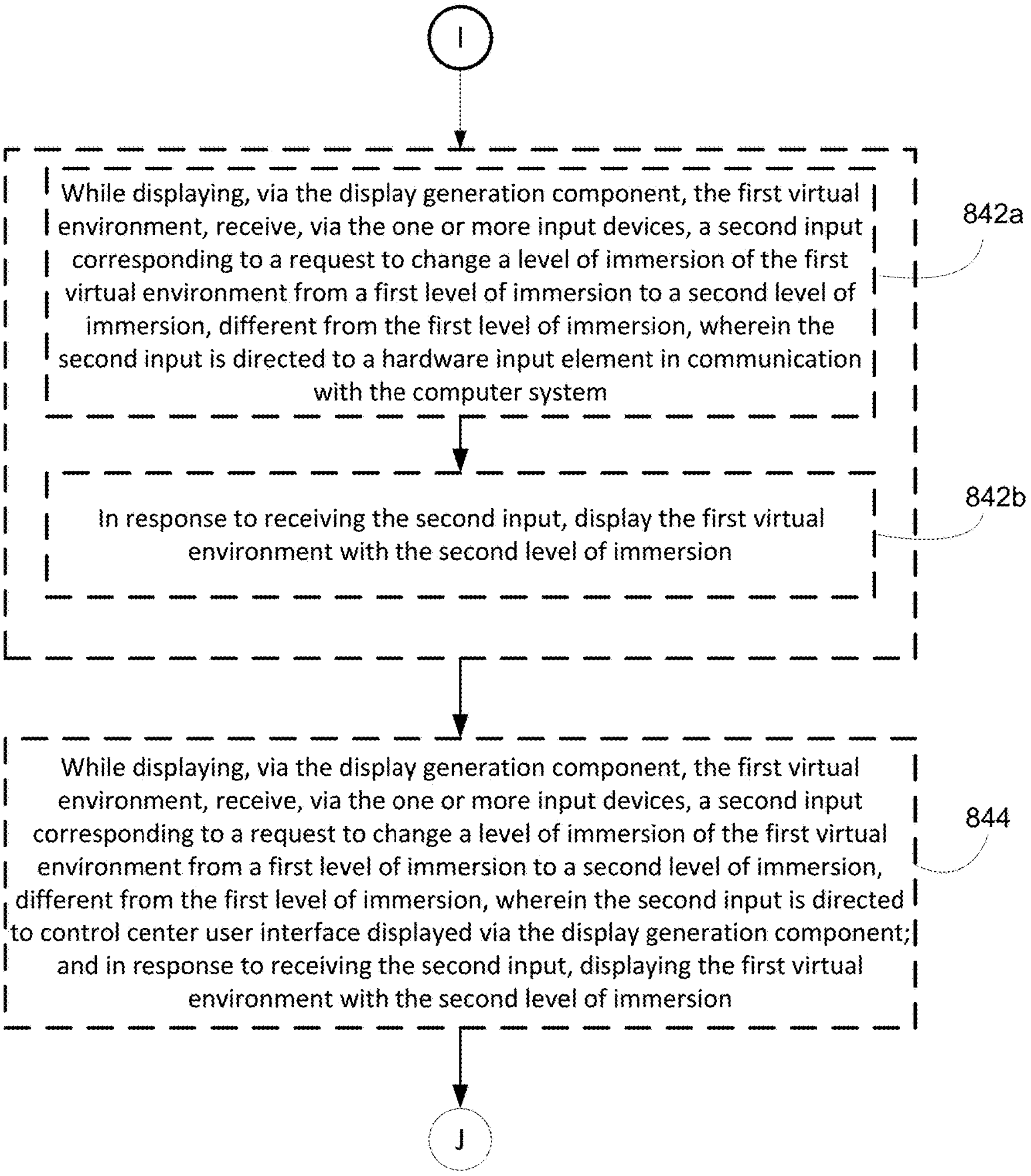
Figure 8K:
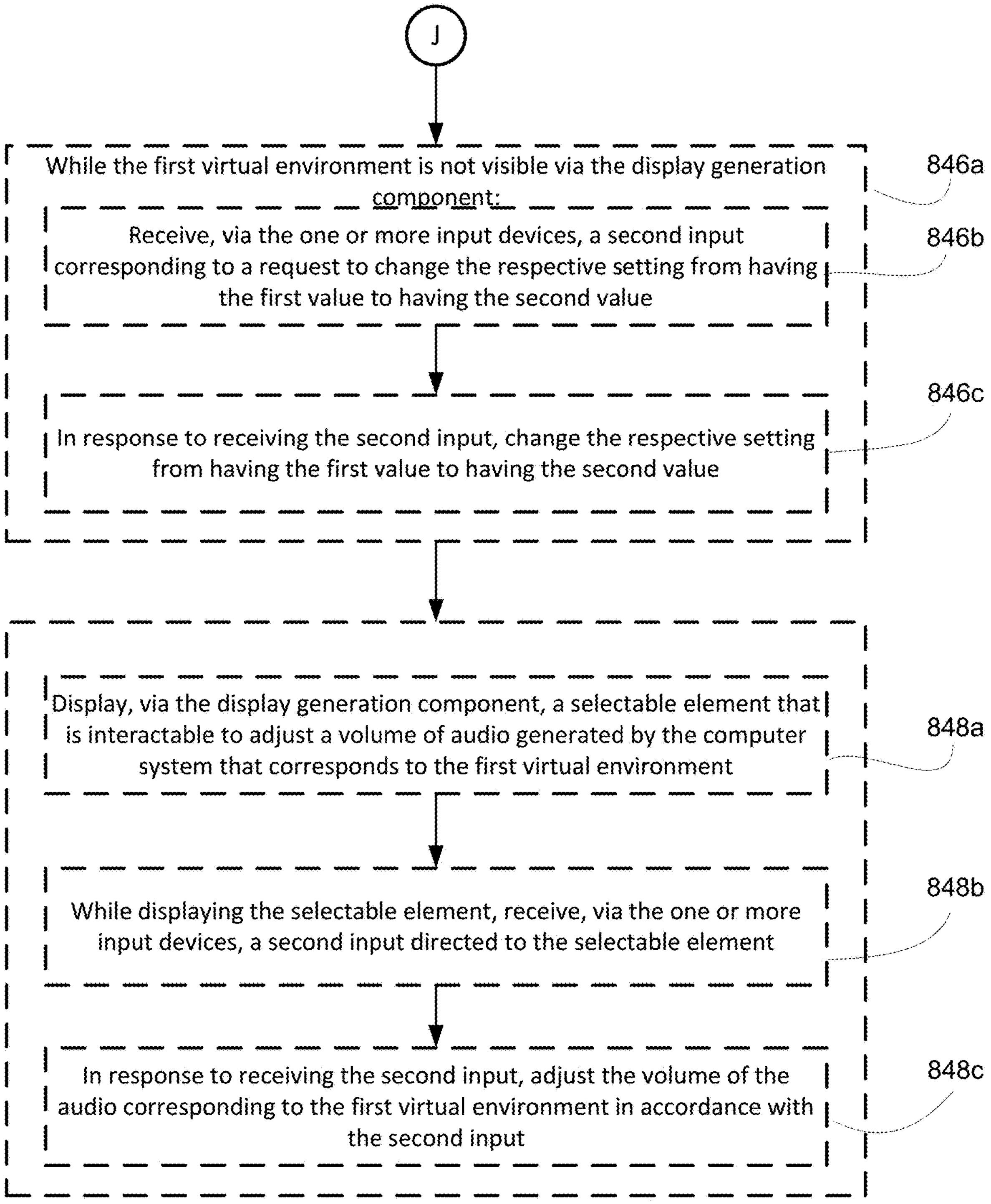

FIG. 7F illustrates three-dimensional environment 704 in response the computer system 101 detecting input to select an atmospheric effect option from the environment selection user interface 730 shown in FIG. 7B. Referring to FIG. 7B, the computer system 101 detects selection input from a hand 720 of the user directed to selectable option E2 which applies the corresponding atmospheric effect to the three-dimensional environment 704. In response to the selection, as shown in FIG. 7F, visual characteristics of the physical environment are enhanced and/or changed; for example, simulated lighting is displayed as entering through virtual window 750, which optionally causes more ambient light to exist in the three-dimensional environment 704 (as compared to the amount of ambient light in the physical environment), and therefore increased corresponding lighting effects. For example, the simulated lighting entering through virtual window 750 in FIG. 7F causes various shadows to be virtually cast over various real-world objects in the physical environment, where such shadows did not exist previously.

As shown, the simulated lighting entering through the virtual window 750 causes the corner table 708 to virtually cast a simulated shadow 752, the side table 712 to virtually cast a simulated shadow 754, and coffee table 710 to virtually cast a simulated shadow 756. Additional details about applying atmospheric effects to three-dimensional environment 704 are described with reference to method 800.

FIGS. 8A-8K is a flowchart illustrating an exemplary method of selectively determining and applying a time of day setting to a respective virtual environment based on a system setting in accordance with some embodiments. In some embodiments, the method 800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 800 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 800 are, optionally, combined and/or the order of some operations is, optionally, changed.

In some embodiments, method 800 is performed at computer system in communication with a display generation component and one or more input devices. For example, a mobile device (e.g., a tablet, a smartphone, a media player, or a wearable device), or a computer or other electronic device. In some embodiments, the display generation component is a display integrated with the electronic device (optionally a touch screen display), external display such as a monitor, projector, television, and/or a hardware component (optionally integrated or external) for projecting a user interface or causing a user interface to be visible to one or more users. In some embodiments, the one or more input devices include an electronic device or component capable of receiving a user input (e.g., capturing a user input, detecting a user input) and transmitting information associated with the user input to the computer system. Examples of input devices include a touch screen, mouse (e.g., external), trackpad (optionally integrated or external), touchpad (optionally integrated or external), remote control device (e.g., external), another mobile device (e.g., separate from the computer system), a handheld device (e.g., external), a controller (e.g., external), a camera, a depth sensor, an eye tracking device, and/or a motion sensor (e.g., a hand tracking device, a hand motion sensor). In some embodiments, the computer system is in communication with a hand tracking device (e.g., one or more cameras, depth sensors, proximity sensors, and/or touch sensors (e.g., a touch screen, or trackpad)). In some embodiments, the hand tracking device is a wearable device, such as a smart glove. In some embodiments, the hand tracking device is a handheld input device, such as a remote control or stylus.

In some embodiments, while a three-dimensional environment (e.g., an environment that corresponds to a physical environment surrounding the display generation component; in some embodiments, the three-dimensional environment has one or more of the characteristics of the three-dimensional environments of methods 1000, 1200, 1400, 1600 and/or 1800. In some embodiments, the three-dimensional environment is generated, displayed, or otherwise caused to be viewable by the computer system (e.g., an extended reality (XR) environment such as a virtual reality (VR) environment, a mixed reality (MR) environment, and/or an augmented reality (AR) environment). In some embodiments, the physical environment is visible through a transparent portion of the display generation component (e.g., true or real passthrough). In some embodiments, a representation of the physical environment is displayed in the three-dimensional environment via the display generation component (e.g., virtual or video passthrough).) is visible via the display generation component, such as environment 704 in FIG. 7B, the computer system receives (802*a*), via the one or more input devices, a first input, such as from hand 720 in FIG. 7B (e.g., tap or hand air gesture in space such as air pointing or air pinching at an icon or other selectable option in an augmented reality (AR) or virtual reality (VR) environment to launch and/or display a virtual environment; or an input using an interface controller in an AR or VR environment to provide input to select an icon or other selectable option to launch and/or display the virtual environment, such as the respective virtual environment described later). In some embodiments, the first input includes a hand of a user of the computer system performing a pinch air gesture in which the index finger and thumb of the hand of the user come together and touch while attention of the user is directed to the icon or selectable option. In some embodiments, the first user input is an attention-only and/or gaze-only input (e.g., not including input from one or more portions of the user other than those portions providing the attention input).

In some embodiments, the first input corresponds to a request to display a respective virtual environment that represents a simulated physical space, such as a request to display Background 1 in FIG. 7B (e.g., the respective virtual environment optionally has one or more of the characteristics of the virtual environments of methods 1000, 1200, 1400, 1600 and/or 1800). In some embodiments, the respective virtual environment is a simulated three-dimensional environment that is displayed in the three-dimensional environment, optionally instead of the representations of the physical environment (e.g., full immersion) or optionally concurrently with the representation of the physical environment (e.g., partial immersion). Some examples of a virtual environment include a lake environment, a mountain environment, a sunset scene, a sunrise scene, a nighttime environment, a grassland environment, and/or a concert scene. In some embodiments, a virtual environment is based on a real physical location, such as a museum, and/or an aquarium. In some embodiments, a virtual environment is an artist-designed location. Thus, displaying a virtual environment in the three-dimensional environment optionally provides the user with a virtual experience as if the user is physically located in the virtual environment.

In some embodiments, in response to detecting the first input (802*b*), in accordance with a determination that a respective setting of the computer system has a first value and the respective virtual environment is a first virtual environment (e.g., the respective setting includes a setting that corresponds to and/or defines a time of the day of the first virtual environment, and the first value optionally corresponds to a daytime or morning time when it is sunny and bright), the computer system displays (802*c*), in the three-dimensional environment, the first virtual environment having a first visual appearance (e.g., a first size in the three-dimensional environment, a first brightness, a first opacity, a first level of clarity (or blurriness) and/or a first level of immersion) corresponding to a first time of day in the physical space simulated by the first virtual environment, such as the time of day of virtual environment 745 in FIG. 7C (e.g., the first time of day optionally corresponds to a simulated time of the day such as light mode (e.g., 10:00 AM in the morning when it is partly cloudy and sunny, or 3:00 PM in the afternoon when it is clear and sunny.)). For example, the first virtual environment at the first time of day optionally includes a first brightness, a first opacity, a first level of clarity (or blurriness), and/or a first amount of virtual objects (e.g., rainbows, sunlight rays, and/or birds flying).

In some embodiments, in accordance with a determination that the respective setting of the computer system has a second value (e.g., the second value optionally corresponds to a dark mode when it is dark and the sun has set), different from the first value (e.g., the first value and the second value are optionally associated with different time of day characteristics (e.g., light mode or dark mode) and the respective virtual environment is the first virtual environment, the computer system displays (802*d*), in the three-dimensional environment, the first virtual environment having a second visual appearance corresponding to a second time of day in the physical space simulated by the first virtual environment (e.g., the second time of day optionally corresponds to a simulated time of the day such as a dark mode (e.g., 11:00 PM in the evening when the sun has set and the moon and stars are shining in the sky)), wherein the second visual appearance is different from the first visual appearance and the second time of day is different from the first time of day, such as the time of day of environment 745 in FIG. 7D. For example, the second visual appearance optionally corresponds to a second size in the three-dimensional environment, a second brightness (or second darkness), a second opacity, a second level of clarity (or blurriness) and/or a second level of immersion. In some embodiments, the second visual appearance corresponding to the second time of day is associated with a darker visual appearance than the first visual appearance corresponding to the first time of day. In some embodiments, the second visual appearance corresponding to the second time of day is associated with a second amount of virtual objects in the first virtual environment that correspond to a darker visual appearance (e.g., moon and stars shining in the sky). Thus, the first value and the second value are optionally associated with different lighting characteristics for the first virtual environment. For example, the first value is optionally associated with a brighter (e.g., more intensity) and/or lighter display value than the second value. Further, the first virtual environment corresponding to the second value optionally includes more virtual objects or less virtual objects than the first virtual environment corresponding to first value. As such, the respective setting at the first value (or the second value) optionally involves lighting characteristics applied to virtual objects of the first virtual environment, optionally in addition to controlling other features of the first virtual environment, such as an amount of virtual objects displayed in the first virtual environment. Automatically selecting a time of day (e.g., a first time of day or a second time of day) for a virtual environment based on a setting of the computer system provides a more realistic and immersive user experience, reduces the number of inputs needed to select a time of day to apply to the virtual environment, and simplifies user interaction with the computer system.

In some embodiments, displaying the first virtual environment having the first visual appearance corresponding to the first time of day (e.g., the first time of day optionally corresponds to a simulated time of the day such as light mode) includes displaying the first virtual environment with simulated lighting corresponding to the first time of day (804*a*), such as the daytime simulated lighting of environment 745 in FIG. 7C. In some embodiments, the simulated lighting corresponding to the first time of day influences the brightness level of the first virtual environment including virtual elements in the virtual environment. In some embodiments, the simulated lighting is from light sources such as a light bulb, torch, lighter, lamp, candles, matches, the sun, and/or laser. The simulated lighting from the noted light sources optionally includes a respective intensity which is adjusted to correspond to the first time of day.

In some embodiments, displaying the first virtual environment having the second visual appearance corresponding to the second time of day includes displaying the first virtual environment with simulated lighting corresponding to the second time of day (804*b*), such as the daytime simulated lighting of environment 745 in FIG. 7D. In some embodiments, the simulated lighting corresponding to the second time of day influences the brightness level and is optionally from light sources such as a light bulb, torch, lighter, lamp, candles, matches, the moon and/or laser. The simulated lighting from the noted light sources optionally includes a respective intensity which is adjusted to correspond to the second time of day. Displaying the first virtual environment with simulated lighting reduces the number of inputs needed to adjust the lighting in the virtual environment, and simplifies user interaction with the computer system.

In some embodiments, the simulated lighting includes simulated natural lighting from a simulated natural light source (806), such as the simulated sun in FIG. 7C. In some embodiments, the simulated natural lighting is optionally from a natural light source such as sun, moon, stars, volcano, fires, jellyfish, fireflies, glowworms or other simulated natural light source corresponding to the respective time of day. Displaying the first virtual environment with simulated lighting that includes simulated natural lighting reduces the number of inputs needed to adjust the lighting in the virtual environment to include natural light sources and simplifies user interaction with the computer system.

In some embodiments, displaying the first virtual environment having the first visual appearance includes displaying a first virtual element (e.g., a virtual palm tree, a virtual picnic table, or a virtual umbrella) in the first virtual environment that is virtually illuminated by the simulated lighting corresponding to the first time of day (808*a*) (e.g., sun), such as the simulated sun illuminating the umbrella in FIG. 7C, and displaying the second virtual environment having the second visual appearance includes displaying the first virtual element in the first virtual environment that is virtually illuminated by the simulated lighting corresponding to the second time of day (808*b*) (e.g., moon and/or stars), such as the simulated moon illuminating the umbrella in FIG. 7D. For example, the first virtual environment optionally includes a beach scene which optionally includes virtual elements such as the beach, palm trees, and/or an umbrella. The first virtual element is optionally a virtual palm tree which is optionally virtually illuminated by the simulated sun for the first time of day. For the second time of day, the same virtual palm tree is optionally illuminated by the simulated moon and stars. Displaying the same elements in the virtual environment with simulated lighting corresponding to different times of day provides a more consistent presentation of the virtual environment since the same elements are illuminated by the simulated lighting, thereby reducing errors in interaction and simplifying user interaction with the computer system.

In some embodiments, the respective setting is selected based on user input (810), such as if user 706 in FIG. 7C sets the time of day setting for environment 745 (e.g., the input optionally includes a hand of a user performing a pinch air gesture, a tap on a touchpad, a click on a touchpad, and/or a selection of one or more buttons on a handheld controller). In some embodiments, the three-dimensional environment includes a control center user interface that optionally includes the first selectable element corresponding to light mode time of day characteristics and the second selectable element corresponding dark mode time of day characteristics. For example, a user of the computer system is optionally able to switch from light mode to dark mode or from dark mode to light mode depending on their personal preference via the control center user interface. In another example, a user of the computer system is optionally able to change a text size, change a volume output setting, and or change a Wi-Fi setting via the controller center use interface. Allowing a user of the first computer system to manually select time-of-day characteristics corresponding to light mode and dark mode enables efficient access to change the time of day characteristics of the virtual environment, thereby improving user-device interaction.

In some embodiments, the respective setting having the first value (e.g., light mode) or the second value (e.g., dark mode) is in accordance with an automatic determination by the computer system without detecting input corresponding to selection of the first value or the second value (812), such as if computer system 101 automatically sets the time of day setting for environment 745 in FIG. 7C. In some embodiments, the automatic determination of the first value or the second value to apply to the respective setting is automatically determined based on satisfying a criterion such as the current weather conditions at the computer system or the current time of day at the electronic device. In some embodiments, the automatic value of the respective setting changes depending on the location of the electronic device, because the current weather conditions optionally change depending on a location (e.g., sunny weather in Los Angeles, cloudy and rainy in Seattle) of the computer device and/or because the current time of day depends on the location of the electronic device and/or different time zone (e.g., a current time in Los Angeles is 3 pm while in Hawaii it would be 12 pm). For example, if it is 9 am at the computer system, the first value is optionally applied. If the current weather is dark and rainy, the second value is optionally applied. If it is 8 pm at the computer system and the computer system is located in Alaska during the summer where the current weather is bright and sunny, the first value is optionally applied. In some embodiments, if it is 11 pm at the computer system (independent of the weather), the second value is optionally applied. In some embodiments, if the weather is bright and sunny at the computer system (independent of the time), the first value is optionally applied. Automatically determining a first value or second value to apply to the respective setting reduces the number of inputs needed to select a respective value (e.g., time of day) to apply, thereby reducing errors in interaction with the computer system.

In some embodiments, the automatic determination by the computer system includes (814*a*), in accordance with a determination that a current time of day at the computer system is a first time of day, automatically setting the first value (e.g., light mode) for the respective setting (814*b*), and in accordance with a determination that the current time of day at the computer system is a second time of day, different from the first time of day, automatically setting the second value (e.g., dark mode) for the respective setting (814*c*). In some embodiments, the automatic determination of the first value or the second value to apply to the respective setting is automatically determined based on the current time when the request to display a respective virtual environment is initiated and/or while the respective virtual environment is already displayed (e.g., the respective virtual environment automatically switches between the different times of day if it is already displayed). For example, if the current time of day is between 6 AM and 5 PM, the first value is optionally automatically applied. In another example, if the current time of day is between 5 PM and 6 AM, the second value is optionally automatically applied. Automatically determining a first value or second value to apply to the respective setting based on a current time of day reduces the number of inputs needed to select a respective value (e.g., time of day) to apply, thereby reducing errors in interaction with the computer system.

In some embodiments, the automatic determination by the computer system includes (816*a*), in accordance with a determination that a level of lighting in a physical space (e.g., a physical environment surrounding the computer system and/or user such as living room where the computer system is present) at the computer system is a first level of lighting, automatically setting the first value (e.g., light mode) for the respective setting (816*b*), such as if the lighting in the space of computer system 101 in FIG. 7C was the first level, and in accordance with a determination that the level of lighting in the physical space at the computer system is a second level of lighting, different from the first level of lighting, automatically setting the second value (e.g., dark mode) for the respective setting (816*c*), such as if the lighting in the space of computer system 101 in FIG. 7C was the second level. In some embodiments, the automatic determination of the first value or the second value to apply to the respective setting is automatically determined based on the level of lighting in the environment where the computer system and/or user is present such as a living room, a bedroom, a garage, an office, and/or a park location. In some embodiments, a level of lighting can be measured in lux which is a measurement of light intensity. For example, at an outdoor location during daylight, the level of light can range between approximately 10,000 lux and 25,000 lux. At an outdoor location during nighttime, the level of lighting can be about 20 lux and 50 lux. For example, if the computer system is at a location where the level of lighting is between 51 lux and 100,000 lux, the first value is automatically applied (and/or if the level of lighting is greater than a threshold of 5, 10, 25, 50, 100, 200, 500 or 1000 lux). In another example, if the computer system is at a location where the level of lighting is between 0 lux and 50 lux, the second value is automatically applied (and/or if the level of lighting is less than a threshold of 5, 10, 25, 50, 100, 200, 500 or 1000 lux). In another example, if the computer system is located at a park where it is sunny and bright, the first value is automatically applied. In another example, if the computer system is located in a garage where it is dark, the second value is automatically applied. Automatically determining a first value or second value to apply to the respective setting based on a level of lighting in the room reduces the number of inputs needed to select a respective value (e.g., time of day) to apply to match the lighting in a respective environment where the computer system is located, thereby reducing errors in interaction with the computer system.

In some embodiments, before displaying the first virtual environment having the first visual appearance or the second visual appearance, the computer system displays (818), via the display generation component, a control center user interface (e.g., as described with reference to step(s) 810) for controlling one or more functionalities of the computer system, and including one or more selectable options that are selectable to set the respective setting to the first value (e.g., light mode) or the second value (e.g., dark mode), such as described with reference to step(s) 810, such as control center 730 in FIG. 7C. For example, if a first selectable option is selected in the control center, the virtual environment would optionally include a beach scene with light mode time of day lighting characteristics. In another example, if a second selectable option in the control center is selected, the virtual environment would optionally include the beach scene with dark mode time of day lighting characteristics. Allowing a user of the first computer system to manually select time-of-day characteristics in a control center user interface enables seamless and efficient accessibility to change the time of day characteristics of a respective virtual environment, thereby improving user-device interaction.

In some embodiments, while displaying, via the display generation component, the control center user interface, the computer system receives (820), via the one or more input devices, a second input directed to the one or more selectable options, such as input directed to control center 730 in FIG. 7B (e.g., the one or more selectable options are optionally an icon and/or thumbnail which can correspond to the first value or the second value, virtual environments, immersion levels, atmospheric effects, and/or to a volume intensity levels. In some embodiments, the selection input includes an air pinch gesture detected while attention of the user is directed to the relevant selectable option, a click on a touch-sensitive surface, and/or a mouse click), setting the respective setting to the first value or the second value in accordance with the second input, and ceasing to display the control center user interface, such as shown in FIGS. 7C and 7D (e.g., while continuing to display the respective virtual environment). In some embodiments, the control center user interface optionally includes one or more selectable options directed to different time of day characteristics and/or atmospheric effects. For example, if the first value corresponding to light mode time of day characteristics is selected, the light mode time of day characteristics are optionally applied to the respective virtual environment and the control center user interface ceases being displayed in the three-dimensional environment. In some embodiments, the control center user interface ceases to be displayed after a specified threshold (e.g., 0 second, 1 second, 2 seconds, 4 seconds, 6 seconds, 8 seconds, 10 seconds, 20 seconds, or 40 seconds) after the second input is received. In some embodiments, the control center user interface gradually fades away (e.g., from low transparency to maximum transparency) until the control center user interface is no longer visible in the three-dimensional environment. Ceasing to display the control center user interface after a selection of the first value or the second value enhances the virtual experience of the user by removing elements in the three-dimensional environment that may block select portions of the respective virtual environment, thereby improving user-device interaction.

In some embodiments, the computer system displays (822*a*), via the display generation component, a virtual environment selection user interface, wherein the virtual environment selection user interface includes a first selectable option that is selectable to display the first virtual environment, such as user interface 730 in FIG. 7B (e.g., a beach environment, a mountain environment, park environment, a city environment, and/or an amusement park environment). In some embodiments, in accordance with a determination that the respective setting has the first value (e.g., light mode), the first selectable option is displayed with a visual indication corresponding to the first time of day (822*b*) (e.g., an icon representing the first virtual environment and corresponding first time of day), such as options B1-B3 in FIG. 7B, and in accordance with a determination that the respective setting has the second value (e.g., dark mode), the first selectable option is displayed with a visual indication corresponding to the second time of day (822*c*) (e.g., an icon representing the first virtual environment and corresponding second time of day), such as options B1-B3 in FIG. 7B. In some embodiments, the three-dimensional environment includes a virtual environment selection user interface that includes one or more selectable options corresponding to virtual environments that are selectable to display. For example, the virtual environments that are selectable for display optionally includes different types of virtual environments such as a beach, a mountain environment, a city environment, and/or an amusement park environment. In some embodiments, the selectable options displayed in the virtual environment selection user interface are displayed with respective visual indications such as an icon that represents the respective virtual environment (e.g., an image of the scene of the virtual environment) and corresponding first time of day and/or the second time of day. In some embodiments, an icon representing a respective virtual environment includes an image of the respective virtual scene with a corresponding time of day appearance applied to the image. For example, a first icon representing a city environment includes a partial image of the city at nighttime corresponding to a second time of day (e.g., dark mode). In another example, a second icon representing a city environment includes a partial image of the city at daytime corresponding to a first time of day (e.g., light mode). In some embodiments, the icon is unique and provides an indication that the selectable option corresponds to a respective virtual environment and a corresponding first time of day and/or the second time of day. Displaying selectable option of a respective virtual environment and a visual indication corresponding to a first time of day or a second time of day in a virtual environment selection user interface clearly conveys the characteristics of the virtual environment that will be displayed if the corresponding selectable option is selected, thereby reducing errors in interaction with the computer system.

In some embodiments, the visual indication corresponding to the first time of day includes a visual representation of the first visual appearance of the first virtual environment corresponding to the first time of day (824*a*) (e.g., a thumbnail of the first virtual environment corresponding to the first time of day, such as a preview of a portion of the first virtual environment at the first time of day), such as if user interface 730 in FIG. 7B included such a preview. In some embodiments, the visual representation the first visual appearance of the first virtual environment corresponding to the first time of day is a thumbnail that provides a preview of first virtual environment corresponding to the first time of day. For example, the virtual environment selection user interface optionally includes a selectable option corresponding to a park environment and a thumbnail of the park environment with a light mode applied the park environment. For example, the thumbnail of the park environment optionally shows a preview of the park which includes a sun shining brightly.

In some embodiments, the visual indication corresponding to the second time of day includes a visual representation of the second visual appearance of the first virtual environment corresponding to the second time of day (824*b*) (e.g., a thumbnail of the first virtual environment corresponding to the second time of day, such as a preview of a portion of the first virtual environment at the second time of day), such as if user interface 730 in FIG. 7B included such a preview. In some embodiments, the visual representation the second visual appearance of the first virtual environment corresponding to the second time of day is a thumbnail that provides a preview of first virtual environment corresponding to the second time of day. Displaying selectable option of a respective virtual environment and a visual representation corresponding to a first time of day and/or a second time of day in a virtual environment selection user interface clearly conveys the characteristics of the virtual environment that will be displayed if the corresponding selectable option is selected, thereby reducing errors in interaction with the computer system.

In some embodiments, in response to detecting the first input and in accordance with a determination that the respective virtual environment is a second virtual environment, different from the first virtual environment (826*a*), in accordance with a determination that the respective setting of the computer system has the second value (e.g., dark mode), the computer system displays (826*b*), in the three-dimensional environment, the second virtual environment having a third visual appearance corresponding to a third time of day in the physical space simulated by the second virtual environment, wherein the third time of day is different from the second time of day, such as different times of day being simulated for different virtual environments 745 in the dark mode. In some embodiments, the third visual appearance optionally corresponds to different nighttime times of day such as dusk, midnight, and predawn. In some embodiments, the third visual appearance optionally corresponds to a third size in the three-dimensional environment, a third brightness (or third darkness), a third opacity, a third level of clarity (or blurriness) and/or a third level of immersion. In some embodiments, the third visual appearance corresponding to the third time of day is associated with a darker and/or lighter visual appearance than the first visual appearance corresponding to the first time of day and/or the second visual appearance corresponding to the second time of day. In some embodiments, the third visual appearance corresponding to the third time of day is associated with a third amount of virtual objects in the second virtual environment that correspond to a darker visual appearance (e.g., moon and stars shining in the sky). Enabling the display of a second virtual environment having a third visual appearance corresponding to a third time of day allows for appropriate times of day in different virtual environments, thereby avoiding the virtual environment disrupting the remainder of what is displayed in the user interface.

In some embodiments, in response to detecting the first input and in accordance with a determination that the respective virtual environment is a second virtual environment, different from the first virtual environment (828*a*), in accordance with a determination that the respective setting of the computer system has the first value (e.g., light mode), the computer system displays (828*b*), in the three-dimensional environment, the second virtual environment having a third visual appearance corresponding to a third time of day in the physical space simulated by the second virtual environment, wherein the third time of day is different from the first time of day, such as different times of day being simulated for different virtual environments 745 in the light mode. In some embodiments, the third visual appearance optionally corresponds to different daytime times of day such as morning, afternoon, and early evening. In some embodiments, the third visual appearance optionally corresponds to a third size in the three-dimensional environment, a third brightness (or third darkness), a third opacity, a third level of clarity (or blurriness) and/or a third level of immersion. In some embodiments, the third visual appearance corresponding to the third time of day is associated with a lighter and/or a darker visual appearance than the first visual appearance corresponding to the first time of day and/or the second visual appearance corresponding to the second time of day. In some embodiments, the third visual appearance corresponding to the third time of day is associated with a third amount of virtual objects in the second virtual environment that correspond to a darker visual appearance (e.g., moon and stars shining in the sky). Enabling the display of a second virtual environment having a third visual appearance corresponding to a third time of day allows for appropriate times of day in different virtual environments, thereby avoiding the virtual environment disrupting the remainder of what is displayed in the user interface.

In some embodiments, in response to detecting the first input, a physical environment of a user of the computer system is concurrently visible with the first virtual environment (830*a*) (e.g., in the three-dimensional environment that is visible via the display generation component), such as the portion of the physical environment visible in FIG. 7D. In some embodiments, in response to detecting the first input (830*b*), in accordance with the determination that the respective setting of the computer system has the first value (e.g., light mode) and the respective virtual environment is the first virtual environment, the computer system maintains (830*c*) a visual prominence of the physical environment of the user in the three-dimensional environment, such as the prominence of the physical environment in FIG. 7C. In some embodiments, in accordance with the determination that the respective setting of the computer system has the second value (e.g., dark mode) and the respective virtual environment is the first virtual environment, the computer system reduces (830*d*) the visual prominence of the physical environment of the user in the three-dimensional environment, such as the prominence of the physical environment in FIG. 7D. In some embodiments, reducing the visual prominence of the physical environment of the user in the three-dimensional environment optionally includes reducing a brightness, an opacity, and/or clarity of the portions of the physical environment that are visible outside of the first virtual environment in the three-dimensional environment. For example, the first virtual environment is optionally concurrently visible with the physical environment which optionally includes a coffee table. If the respective setting of the computer system has the second value, the visual prominence of the coffee table is optionally reduced. Selectively reducing or maintaining the visual prominence of the physical environment in the three-dimensional environment based on the setting of the computer system reduces the number of inputs needed to change the visual prominence, and simplifies user interaction with the computer system.

In some embodiments, the computer system receives (832), via the one or more input devices, a second input corresponding to a request to display an atmospheric effect applied to a physical environment of the user that is visible in the three-dimensional environment (e.g., as described with reference to step(s) 820 and step(s) 822, the second input is optionally a selection from the control center user interface and/or the virtual environment selection user interface), such as an input directed to E1-E3 in FIG. 7B. In some embodiments, in response to receiving the second input, the computer system displays (832*b*) the physical environment with the atmospheric effect, wherein a visual appearance of the atmospheric effect is independent of whether the respective setting of the computer system has the first value or the second value, such as shown in FIG. 7F. In some embodiments, a request to display an atmospheric effect modifies one or more visual characteristics of the physical environment such that it appears as if the physical environment is enhanced via color and/or exposure adjustments. In some embodiments, applying the atmospheric effect to the physical environment modifies one or more visual characteristics of the physical environment such that it appears as if the physical environment is located at a different time, place, and/or condition (e.g., morning lighting instead of afternoon lighting, or sunny instead of overcast). In some embodiments, applying the atmospheric effect to the physical environment modifies the physical environment to appear dimly lit, and/or humid. Displaying the physical environment with a selected atmospheric effect provides a quick and efficient way of providing an immersive experience while maintaining visibility of the physical environment, therefore facilitating interaction between the user and the physical environment, and simplifies user interaction with the computer system.

In some embodiments, when the second input is received (e.g., as described with reference to step(s) 822, the second input is optionally a selection from the virtual environment selection user interface), the computer system is displaying a virtual environment selection user interface in front of one or more portions of the three-dimensional environment, and wherein the second input is directed to the virtual environment selection user interface (834*a*), such as shown in FIG. 7B. In some embodiments, in response to receiving the second input, the computer system updates (834*b*) a visual appearance of the one or more portions of the three-dimensional environment to correspond to the atmospheric effect, such as shown in FIG. 7F. In some embodiments, the three-dimensional environment includes a virtual environment selection user interface that optionally includes one or more elements directed to one or more atmospheric effects. For example, if a first element directed to a first atmospheric effect is selected, the first element is optionally highlighted and/or includes a visual indication that indicates that the first atmospheric effect is selected, and the portions of the environment displayed behind and/or surround the virtual environment selection user interface are updated to be displayed with the selected atmospheric effect. Updating the one or more portions of the three-dimensional environment to correspond to the selected atmospheric effect provides a quick and efficient way for the user to determine which atmospheric effect is currently applied to the physical environment, thus reducing the number of inputs needed to determine which atmospheric effect is selected, and thereby simplifying user interaction with the computer system.

In some embodiments, the computer system receives (836*a*), via the one or more input devices, a second input corresponding to a request to display virtual content of a first type (e.g., the respective virtual environment is generated by a first application at the computer system), wherein the respective virtual environment corresponds to virtual content of a second type (e.g., the respective virtual environment is generated by a second application at the computer system), different from the first type. In some embodiments, in response to receiving the second input, the computer system displays (836*b*), via the display generation component, the virtual content of the first type independent of whether the respective setting has the first value or the second value, such as the display of user interface 726 in FIGS. 7C-7D. In some embodiments, the virtual content of a first type is optionally a video application or any other application that includes three-dimensional content. In some embodiments, the visual appearance with which the virtual content of the first type is displayed is independent of the first value the second value. For example, if the virtual content of a first type is a video player application, the respective time of day setting (e.g., a light mode and/or a dark mode) is optionally not applied to the content being displayed by the video player application. In some embodiments, in response to input corresponding to a request to display respective virtual content (e.g., a virtual environment), if the respective virtual content is of the first type, the respective virtual content is displayed in a light mode or a dark mode (e.g., as described with reference to step(s) 802) independent of whether the respective time of day setting has the first value or the second value (e.g., the light mode or the dark mode selection is defined by the respective virtual content). In some embodiments, if the respective virtual content is of the second type, the respective virtual content is displayed in a light mode or a dark mode (e.g., as described with reference to step(s) 802) depending whether the respective time of day setting has the first value or the second value (e.g., as described with reference to step(s) 802). Displaying the virtual content of the first type independent of whether the respective setting has the first value or the second value ensures that the time of day setting is not applied when not appropriate, reducing the need for inputs to correct such application, and thereby simplifying user interaction with the computer system.

In some embodiments, the virtual content of the first type is displayed concurrently with one or more portions of the three-dimensional environment outside of the virtual content of the first type (838*a*) (e.g., portions of the physical environment and/or the respective virtual environment), such as shown outside of user interface 726 in FIGS. 7C-7D. In some embodiments, in response to receiving the second input (838*b*), in accordance with a determination that the respective setting has the first value (e.g., light mode), the computer system displays (838*c*) the one or more portions of the three-dimensional environment with a first respective visual appearance, such as the appearance of portions outside of user interface 726 in FIG. 7C. In some embodiments, in accordance with a determination that the respective setting has the second value (e.g., dark mode), the computer system displays (838*d*) the one or more portions of the three-dimensional environment with a second respective visual appearance, different from the first respective visual appearance, such as the appearance of portions outside of user interface 726 in FIG. 7D. In some embodiments, the virtual content of a first type is optionally a video application or any other application that includes three-dimensional content where the selection of the first value and/or second value does not change the visual appearance of the virtual content of a first type. For example, the three-dimensional environment includes a video application for displaying three-dimensional content and a respective virtual environment surrounding the video application. When the respective setting is selected to be the first value (e.g., light mode), the selection of the first value changes the visual appearance of the respective virtual environment to correspond to a light mode, however, the visual appearance of the video application is optionally not changed. Displaying the virtual content of the first type independent of whether the respective setting changes to the first value or the second value ensures that the time of day setting is not applied when not appropriate while maintaining the ability to modify the visual appearance of the respective virtual environment, thereby simplifying user interaction with the computer system.

In some embodiments, in response to detecting the first input a physical environment of a user of the computer system is concurrently visible with the first virtual environment (840*a*), such as in FIG. 7B. In some embodiments, in response to detecting the first input (840*b*), in accordance with the determination that the respective setting of the computer system has the first value and the respective virtual environment is the first virtual environment, the computer system reduces (840*c*) a visual prominence of the physical environment of the user in the three-dimensional environment by a first amount (e.g., such as described with reference to step(s) 830), such as reducing the prominence of the physical environment in FIG. 7C. In some embodiments, in accordance with the determination that the respective setting of the computer system has the second value and the respective virtual environment is the first virtual environment, the computer system reduces (840*d*) the visual prominence of the physical environment of the user in the three-dimensional environment by a second amount, different from the first amount (e.g., such as described with reference to step(s) 830), such as reducing the prominence of the physical environment in FIG. 7D. In some embodiments, a computer system with the first value reduces the visual prominence of the physical environment by a first amount and a computer system with the second value reduces the visual prominence of the physical environment by a second amount. Selectively reducing the visual prominence of the physical environment by a first amount or a second amount based on the setting of the computer system reduces the number of inputs required to change the visual prominence of a physical environment to correspond to the visual appearance of the respective virtual environment, and simplifies user interaction with the computer system.

In some embodiments, while displaying, via the display generation component, the first virtual environment, the computer system receives (842*a*), via the one or more input devices, a second input corresponding to a request to change a level of immersion of the first virtual environment from a first level of immersion to a second level of immersion (e.g., a request to change a level of immersion from 25% to 75%), different from the first level of immersion, wherein the second input is directed to a hardware input element (e.g., depression of a physical button on the computer system, or rotation of a physical dial on the computer system) in communication with the computer system, such as a button on computer system 101.

In some embodiments, in response to receiving the second input, the computer system displays (842*b*) the first virtual environment with the second level of immersion, such as shown from FIG. 7D to 7E. In some embodiments, immersion is the immersion described with reference to methods 1400, 1600 and/or 1800. In some embodiments, the amount of virtual environment that is displayed (e.g., the amount of physical environment that is not displayed) is based on the immersion level. For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed. In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. Adjusting the level of immersion using a physical input element provides for quick and efficient method of adjusting immersion, which enhances the operability of the computer system and makes the user-device interface more efficient.

In some embodiments, while displaying, via the display generation component, the first virtual environment, the computer system receives (844), via the one or more input devices, a second input corresponding to a request to change a level of immersion of the first virtual environment from a first level of immersion to a second level of immersion (e.g., a request to change a level of immersion from 25% to 50%), different from the first level of immersion, wherein the second input is directed to control center user interface displayed via the display generation component (e.g., the control center user interface optionally has one or more of the characteristics of the control center user interface described with reference to step(s) 820), such as the input from hand 720 from FIG. 7D to 7E. In some embodiments, the three-dimensional environment includes a control center user interface that optionally includes an element that is selectable to adjust the level of immersion. For example, the control center user interface optionally includes a slider-bar where a finger of the user can contact the slider-bar and manually adjust the immersion level. In another example, attention directed at the slider-bar and an air tap in space followed by movement of the hand of the user causes adjustment of the slider bar for immersion. In another example, attention directed at the slider-bar and an air pinch gesture performed by a hand of the user, followed by movement of the hand while maintaining the air pinch hand shape, causes adjustment of the slider-bar for immersion.

In some embodiments, in response to receiving the second input, the computer system displays (844) the first virtual environment with the second level of immersion (e.g., such as described with reference to step(s) 842), such as shown in FIG. 7E. Adjusting the level of immersion via a control center user interface provides for quick and efficient method of adjusting immersion, which enhances the operability of the computer system and makes the user-device interface more efficient.

In some embodiments, while the first virtual environment is not visible via the display generation component (846*a*), the computer system receives (846*b*), via the one or more input devices, a second input corresponding to a request to change the respective setting from having the first value to having the second value (e.g., as described with reference to step(s) 820, the second input is optionally a selection from the control center user interface), such as setting the setting in FIG. 7B.

In some embodiments, in response to receiving the second input, the computer system changes (846*c*) the respective setting from having the first value to having the second value, such as changing the time of day setting in FIG. 7B. In some embodiments, the first virtual environment is not visible because a user of the computer system ceases to display the first virtual environment and/or has reduced immersion (e.g., as described with reference to step(s) 842) down to 0% immersion. Changing the respective setting while the first virtual environment is not visible simplifies user interaction with the computer system.

In some embodiments, the computer system displays (848*a*), via the display generation component, a selectable element for adjusting a volume of audio generated by the computer system that corresponds to the first virtual environment, such as a volume control in user interface 724 in FIGS. 7A and 7A1 (e.g., the audio portion of the first virtual environment, such as the sounds of waves in a beach virtual environment, or the sounds of birds chirping in a forest virtual environment. As described above with reference to step(s) 820, the selectable element that is interactable to adjust the volume is optionally included in the control center user interface. In some embodiments, the selectable element is a slider-bar and selectable from the control center user interface). In some embodiments, while displaying the selectable element, the computer system receives (848*b*), via the one or more input devices, a second input directed to the selectable element, such as an input directed to the volume control in user interface 724. For example, the control center user interface optionally includes the selectable element that is represented by a slider-bar, which is optionally manipulable similar to manipulation of the immersion slider described with reference to step(s) 844.

In some embodiments, in response to receiving the second input, the computer system adjusts (848*c*) the volume of the audio corresponding to the first virtual environment in accordance with the second input. In some embodiments, the three-dimensional environment includes a selectable element (e.g., located at a position that is within or proximate to a virtual environment selection user interface) that is selectable to adjust a volume generated by the computer system. For example, the selection of the selectable element is optionally used to adjust the volume to a desired level. Adjusting a volume level via a displayed interface provides for quick and efficient method of changing the volume of the audio generated by the computer system, which enhances the operability of the computer system and makes the user-device interface more efficient.

It should be understood that the particular order in which the operations in method 800 have been described is merely exemplary and is not intended to indicate that the described order is the only order in which the operations could be performed. One of ordinary skill in the art would recognize various ways to reorder the operations described herein.

FIGS. 9A-9F illustrate examples of a computer system updating a time of day setting to nighttime for a virtual environment based on detecting an event associated with auto-dimming in accordance with some embodiments.

Figure 9A:
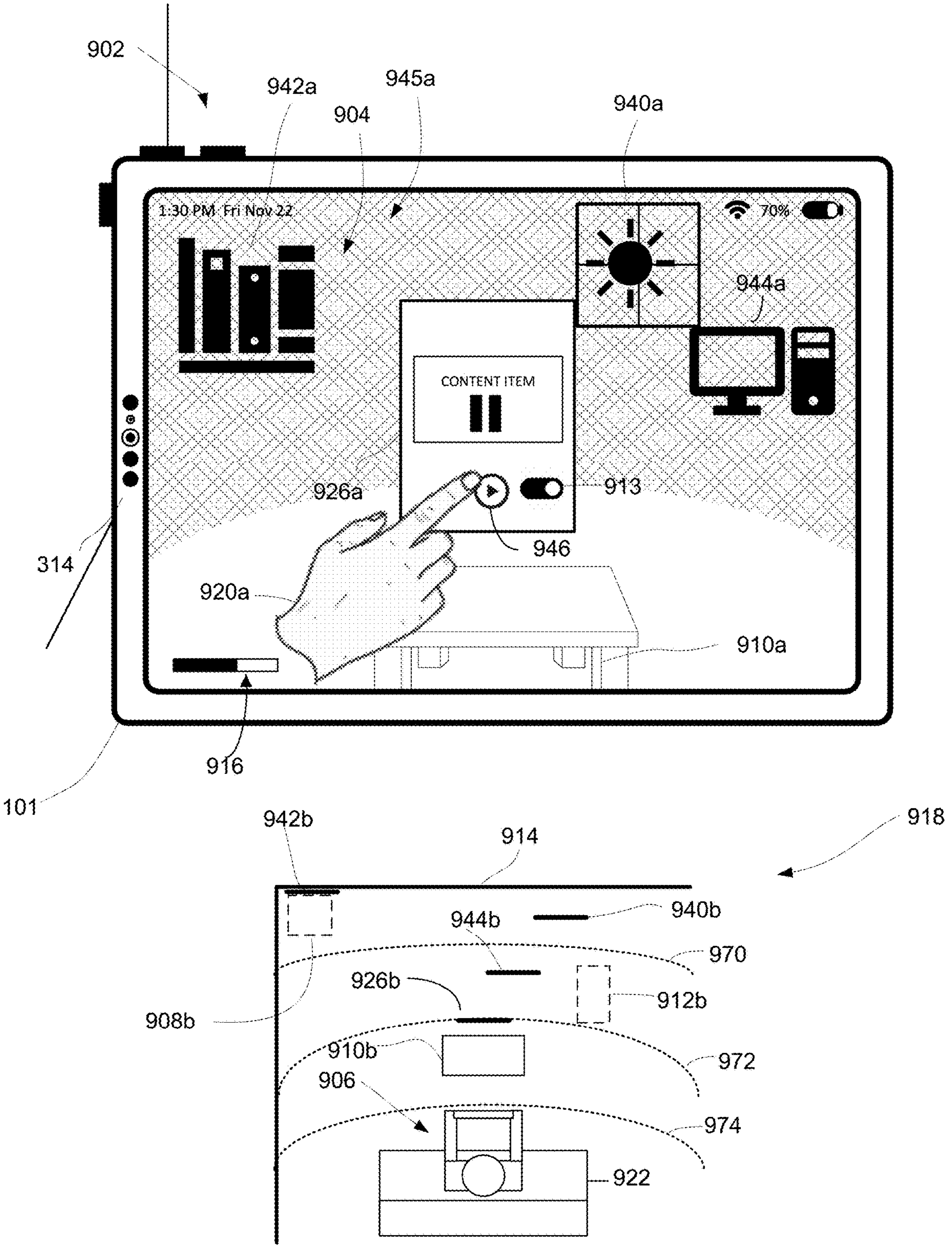
FIGS. 9A-9F illustrate examples of a computer system updating a time of day setting to nighttime for a virtual environment based on detecting an event associated with auto-dimming in accordance with some embodiments.

FIG. 9A illustrates a computer system 101 displaying, via a display generation component (e.g., display generation component 120 of FIG. 1), a three-dimensional environment 904. As described above with reference to FIGS. 1-6, the computer system 101 optionally includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (e.g., and displayed by the display generation component of computer system 101) and an overhead view of the three-dimensional environment associated with computer system 101 (e.g., such as overhead view 918 in FIG. 9A) to illustrate the relative locations of real-world elements from the physical environment and virtual elements (e.g., virtual content, virtual objects, and/or virtual environment) in the three-dimensional environment.

As shown in FIG. 9A, the computer system 101 captures one or more images of a physical environment 902 around computer system 101 (e.g., operating environment 100), including one or more objects (e.g., table 910A) in the physical environment 902 around computer system 101. In some embodiments, the computer system 101 displays representations of the physical environment 902 the in three-dimensional environment 904 or portions of the physical environment 902 are visible via the display generation component 120 of computer system 101. For example, the three-dimensional environment 904 includes table 910A and portions of the floor in the physical environment 902 of a user 906.

In some embodiments, a virtual environment 945A, optionally a simulated three-dimensional environment, is displayed in three-dimensional environment 904, optionally concurrently with the representation of the physical environment 902 (e.g., partial immersion as illustrated in FIG. 9A) or optionally instead of the representations of the physical environment 902 (e.g., full immersion). Some examples of the virtual environment 945A include a classroom background (as illustrated in FIG. 9A), a mountain background, a beach background, a sports event background, and/or other virtual backgrounds. In some embodiments, the virtual environment 945A is based on a physical location. In some embodiments, a virtual environment 945A is an artist-designed location. In some embodiments, virtual environment 945A is a simulated physical space, as described in more detail with reference to method 1000. Thus, displaying a virtual environment 945A in the three-dimensional environment 904 provides the user with a virtual experience as if the user is physically located in the virtual environment 945A. In FIG. 9A, the virtual environment 945A corresponding to the classroom background includes virtual elements such as a virtual bookshelf 942A and a virtual computer 944*a*. As illustrated, the computer system 101 displays the virtual environment 945A according to a first time of day (e.g., daytime) as described with respect to method 1000. Accordingly, the virtual environment 945A includes the classroom scene illuminated by a virtual sun 940*a*.

In FIG. 9A, the three-dimensional environment 904 also includes virtual content, such as virtual content 926A. The virtual content 926A optionally includes a user interface of an application (e.g., content browsing user interface) for playback of content (e.g., movie, television show, and/or photo). In FIG. 9A, the virtual content 926A (e.g., content browsing user interface) for playback of content includes a playback control toggle 946 to play or pause the content, and an auto-dimming toggle 913 (e.g., enable or disable auto-dimming), as described with respect to method 1000. In some embodiments, the three-dimensional environment 904 includes a three-dimensional object (e.g., virtual clock, virtual ball, or virtual car), user interfaces of other application (e.g., messaging user interface), or any other element displayed by computer system 101 that is not included in the physical environment 902 of computer system 101.

As illustrated in the overhead view 918, the user 906 is seated on a couch 922 in the physical environment 902 while interacting with the computer system 101. In the overhead view 918, table 910*b* is a real-world object in the physical environment 902, which has been captured by the one or more sensors of computer system 101, and a representation of table 910A is included in the three-dimensional environment 904 (e.g., photorealistic representation, simplified representation, cartoon, or caricature), or table 910*a* is visible via passive passthrough via display generation component 120. In the overhead view 918, a corner table 908*b* and a side table 912*b* from the physical environment 902 of the user 906 are represented as dashed lines because the corner table 908*b* and side table 912*b* are not visible in the three-dimensional environment 904. That is, the portion of the physical environment 902 which includes the corner table 908*b* and side table 912*b* is not visible to the user 906 because the virtual environment 945*a* has replaced the portion of the physical environment which includes the corner table 908*b* and the side table 912*b*. As shown in the overhead view 1118, at the immersion level for virtual environment 1145*a* displayed in FIG. 9A, the virtual environment 1145*a* optionally extends from the dashed line 970 to a far wall 914 in three-dimensional environment 904.

In FIG. 9A, computer system 101 is displaying an immersion level indicator 916. In some embodiments, the immersion level indicator 916 indicates the current level of immersion (e.g., out of a maximum number of levels of immersion) with which computer system 101 is displaying the three-dimensional environment 904. In some embodiments, a level of immersion includes an amount of view of the physical environment 902 that is obscured (e.g., replaced) by the virtual environment 945*a*. For example, as shown in the overhead view 918, the virtual environment 945*a* extends from the dashed line 970 at a first level of immersion to the far wall 914. While the corner table 908*b* is not visible in the three-dimensional environment 904, portions of the physical environment not obscured by the virtual environment 945*a*, including the side table 912*b* and the table 910*b* are displayed in the three-dimensional environment 904. However, virtual computer 944*b* and virtual content 926*b* (e.g., beyond the dashed line 970) are not displayed in the three-dimensional environment 904 in the first level of immersion.

In FIG. 9A, the computer system 101 optionally displays the three-dimensional environment 904 according to a second level of immersion. For example, as shown in the overhead view 918, the virtual environment 945*a* extends from the dashed line 972 at a second level of immersion to the far wall 914. While the corner table 908*b* and the side table 912*b* are not visible in the three-dimensional environment 904, portions of the physical environment not obscured by the virtual environment 945*a*, including the table 910*b* are displayed in the three-dimensional environment 904.

Further, as shown in the overhead view 918, a third level of immersion is a maximum level of immersion (e.g., full immersion), in which no portion of the physical environment 902 is viewable in three-dimensional environment 904. For example, as shown in the overhead view 918, the virtual environment 945*a* extends from the dashed line 974 at a third level of immersion to the far wall 914. That is, the virtual environment 945*a* (e.g., including the virtual bookshelf 942*b*, the virtual computer 944*b*, virtual sun 940*b*, and virtual content 926*b*) has replaced the physical environment 902. Although FIG. 9A illustrates the three-dimensional environment 904 according to the second level of immersion, the computer system 101 can optionally modify the level of immersion (e.g., to the first level of immersion or the third level of immersion) based on user input.

FIG. 9A1 illustrates similar and/or the same concepts as those shown in FIG. 9A (with many of the same reference numbers). It is understood that unless indicated below, elements shown in FIG. 9A1 that have the same reference numbers as elements shown in FIGS. 9A-9F have one or more or all of the same characteristics. FIG. 9A1 includes computer system 101, which includes (or is the same as) display generation component 120. In some embodiments, computer system 101 and display generation component 120 have one or more of the characteristics of computer system 101 shown in FIGS. 9A-9F and display generation component 120 shown in FIGS. 1 and 3, respectively, and in some embodiments, computer system 101 and display generation component 120 shown in FIGS. 9A-9F have one or more of the characteristics of computer system 101 and display generation component 120 shown in FIG. 9A1.

In FIG. 9A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 9A-9F.

In FIG. 9A1, display generation component 120 is illustrated as displaying content that optionally corresponds to the content that is described as being displayed and/or visible via display generation component 120 with reference to FIGS. 9A-9F. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 9A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 9A1. Because display generation component 120 is optionally a head-mounted device, the field of view of display generation component 120 is optionally the same as or similar to the field of view of the user.

In FIG. 9A1, the user is depicted as performing an air pinch gesture (e.g., with hand 920*a* while attention of the user is directed to option 946, as indicated by gaze point 998) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 9A-9F.

In some embodiments, computer system 101 responds to user inputs as described with reference to FIGS. 9A-9F.

In the example of FIG. 9A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 9A-9F and/or described with reference to the corresponding method(s) are optionally implemented on computer system 101 and display generation unit 120 in a manner similar or analogous to that shown in FIG. 9A1.

In FIG. 9A, the virtual content 926A (e.g., playback of content) is currently paused, and the auto-dimming toggle 913 is enabled. Further, the computer system 101 in FIG. 9A receives input from a hand 920A of the user 906 directed to the playback control toggle 946 corresponding to a request to play the virtual content 926A (e.g., an air pinch gesture performed by hand 920*a* while attention of the user is directed to toggle 946, as described in more detail with reference to method 1000).

Figure 9B:
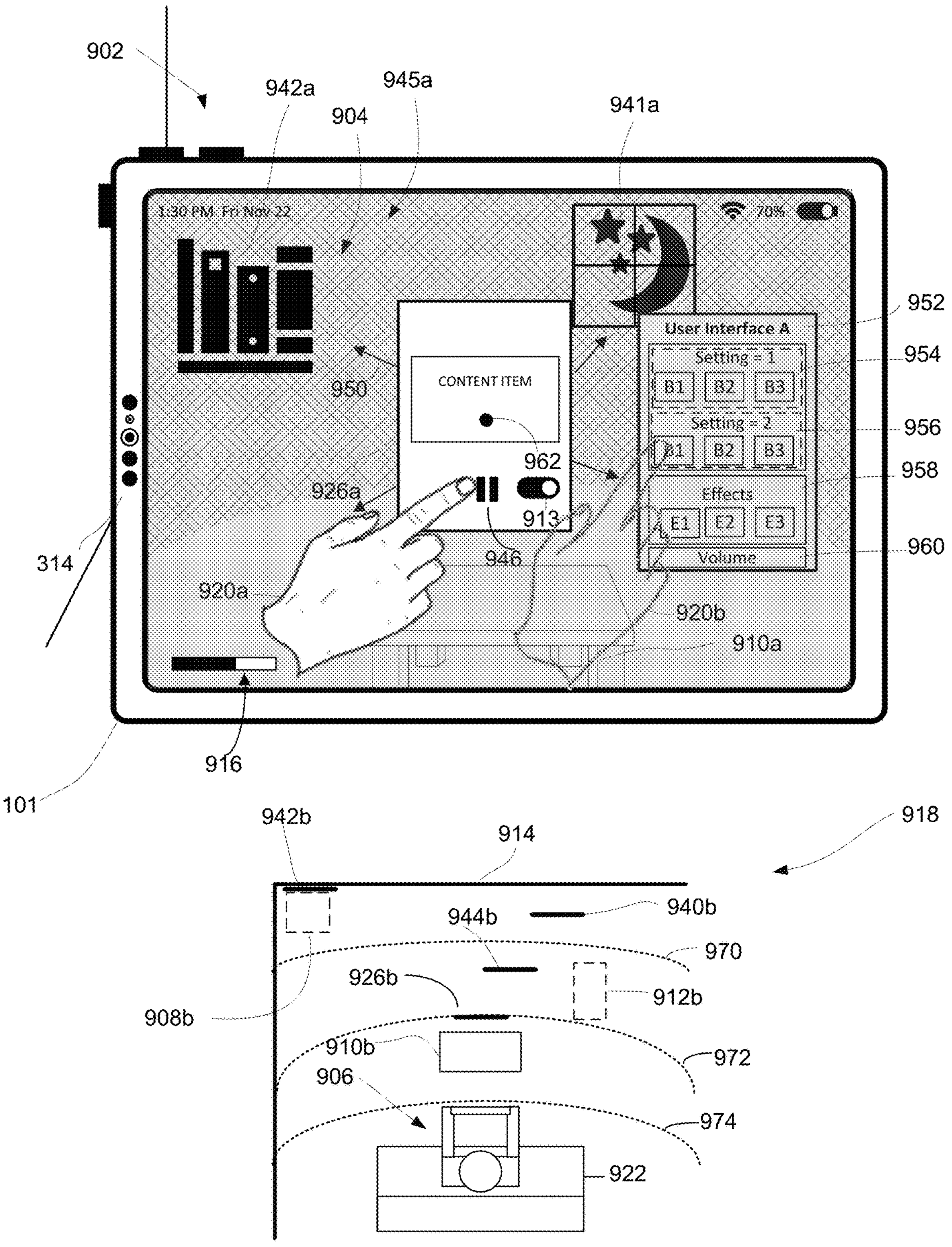

In response to receiving the request to play the virtual content 926A, the computer system 101 plays the virtual content 926A in FIG. 9B. Further, attention 962 of the user 906 is directed towards the virtual content 926A while playing. In response to detecting an event associated with auto-dimming (e.g., auto-dimming toggle 913 is enabled and the virtual content 926A is playing) as described with respect to method 1000, the computer system 101 optionally updates a visual appearance of the virtual environment 945A from the first time of day (e.g., daytime) to a second time of day corresponding to nighttime from FIG. 9A to FIG. 9B. For example, the visual appearance of the virtual environment 945A is darkened and/or includes virtual moon and stars 941*a* corresponding to the second time of day (e.g., nighttime) rather than the virtual sun 940*a*. In particular, the virtual environment 945A is optionally updated to be the same simulated physical space as before, but with a visual appearance corresponding to that physical space during nighttime rather than that physical space during daytime. In some embodiments, the computer system 101 dims (e.g., darkens) portions of the physical environment displayed in the three-dimensional environment 904. That is, the three-dimensional environment 904 outside the virtual content 926*a* is optionally dimmed and/or darkened, as shown in FIG. 9B. In some embodiments, virtual lighting effects 950 (as described with respect to method 1200) generated from the content are applied to portions of the three-dimensional environment 904 outside the virtual content 926*a*. In some embodiments, the virtual lighting effects 950 appear to be virtually cast by the virtual content 926*a* onto portions of the three-dimensional environment 904 outside the virtual content 926*a*. In FIG. 9B, the virtual environment 945*a* occupies the same portion of the three-dimensional environment 904 as described with reference to FIG. 9A.

In FIG. 9B, the computer system displays user interface 952 (e.g., user interface A). In some embodiments, the user interface 952 includes a first set of options 954 for displaying virtual environments (e.g., backgrounds such as a classroom background (B1), a beach background (B2), or a mountain background (B3)) according to the second time of day (e.g., nighttime). In some embodiments, the user interface includes a second set of options 956 for displaying virtual environments (e.g., backgrounds such as a classroom background (B1), a beach background (B2), or a mountain background (B3)) according to the first time of day (e.g., daytime). Further, in some embodiments, the user interface includes a third set of options 958 for displaying atmospheric effects (e.g., E1, E2, or E3) and/or a fourth option 960 corresponding to volume control of the virtual content 926A.

In FIG. 9B, the computer system 101 receives input from the hand 920A of the user 906 directed to the playback control toggle 946 (e.g., an air pinch gesture from hand 920*a* while attention of the user is directed to toggle 946) corresponding to a request to pause the virtual content 926A.

Alternatively, the computer system 101 receives input from the hand 920B of the user 906 corresponding to a selection of displaying the classroom background (B1) according to the first time of day (e.g., daytime) from the user interface 952 (e.g., an air pinch gesture from hand 920B while attention of the user is directed to option B1 in options 956). In FIG. 9B, the faded appearance of the hand 920B indicates an alternative example, in which the computer system 101 receives a selection of B1 from the second set of options 956.

Figure 9C:
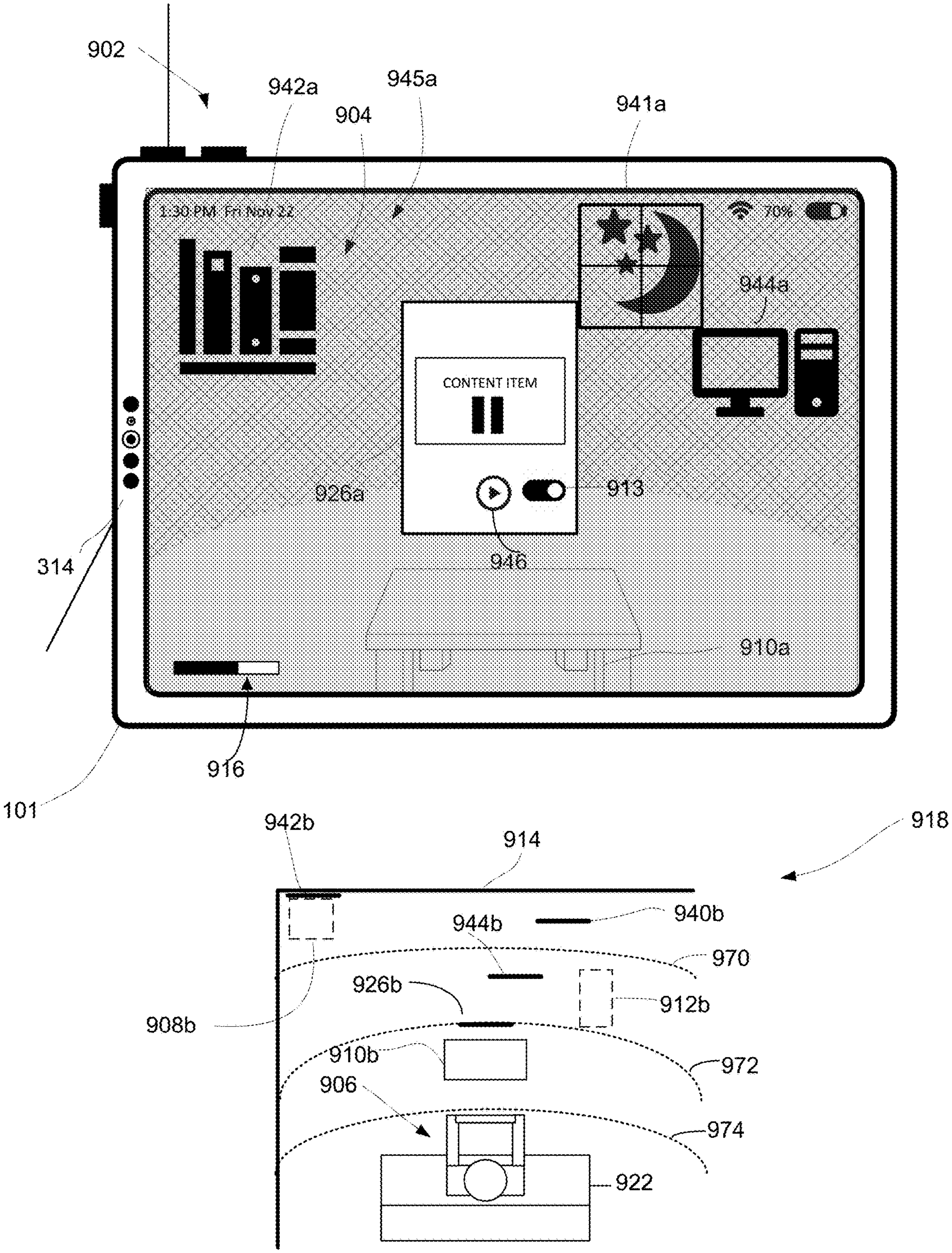

In response to receiving the request to pause the virtual content 926A (as described in FIG. 9B), the computer system 101 pauses the virtual content 926A in FIG. 9C. Further, the computer system 101 maintains the visual appearance of the virtual environment 945A corresponding to the second time of day (e.g., nighttime) because the auto-dimming toggle 913 remains enabled in FIG. 9C. For example, the visual appearance of the virtual environment 945A is darkened and/or includes the virtual moon and stars 941*a* corresponding to the second time of day (e.g., nighttime). The computer system 101 optionally continues to dim (e.g., darken) portions of the physical environment displayed in the three-dimensional environment. That is, the three-dimensional environment 904 outside the virtual content 926*a* is optionally dimmed and/or darkened. In FIG. 9C, the virtual environment 945*a* occupies the same portion of the three-dimensional environment 904 as described with reference to FIG. 9A.

Figure 9D:
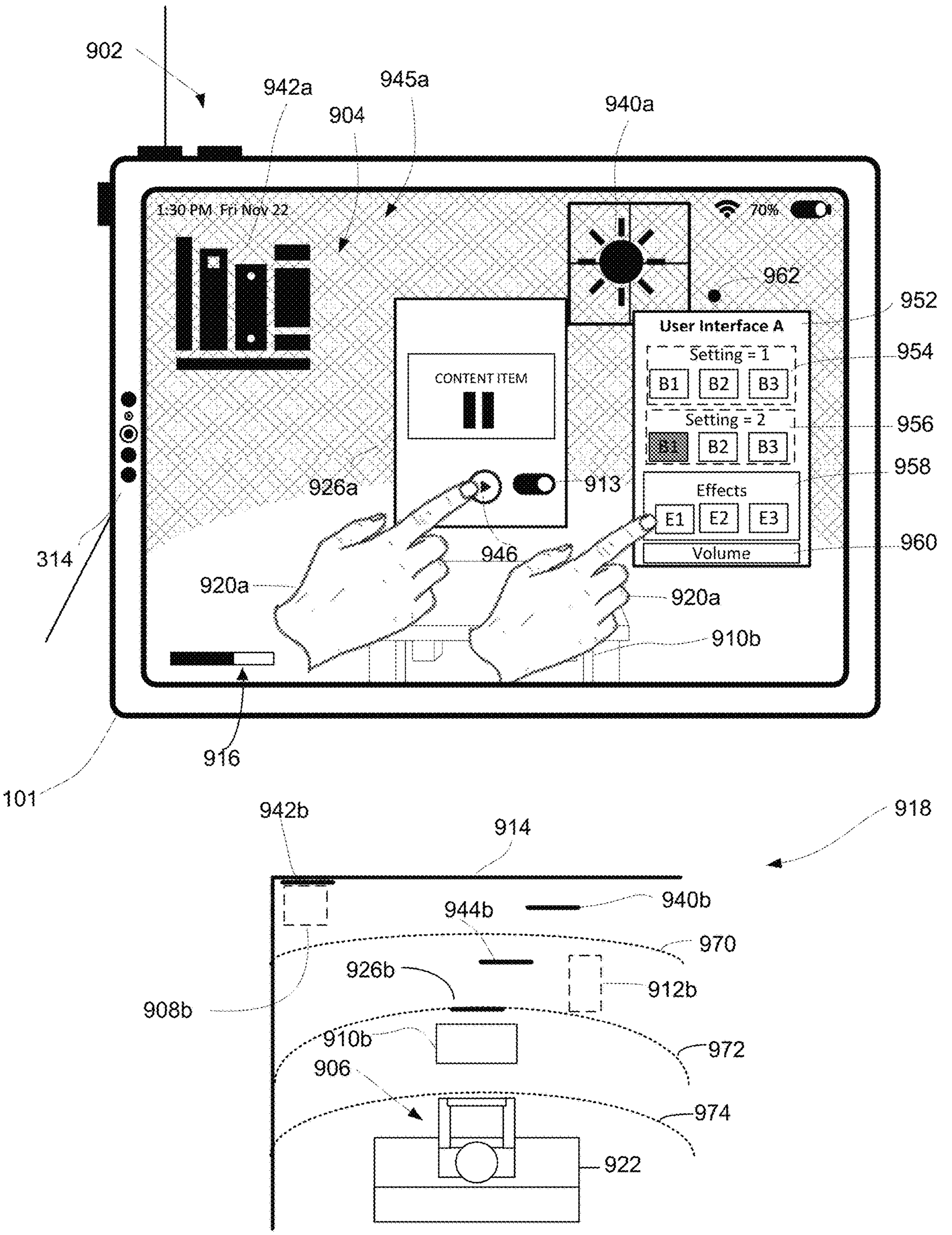

Based on receiving the selection of the option B1 in the second set of options 956 as described with respect to the alternative example in FIG. 9B, the computer system 101 optionally updates the visual appearance of the virtual environment 945A (e.g., classroom background) from the second time of day (e.g., nighttime) to the first time of day (e.g., daytime), as shown in FIG. 9D. For example, the visual appearance of the virtual environment 945A is brighter and/or includes the virtual sun 940*a* corresponding to the first time of day (e.g., daytime). In particular, the virtual environment 945A is optionally updated to be the same simulated physical space as before, but with a visual appearance corresponding to that physical space during daytime rather than that physical space during nighttime. In FIG. 9D, the virtual environment 945*a* occupies the same portion of the three-dimensional environment 904 as described with reference to FIG. 9A. Further, the computer system 101 displays the user interface 952 as described in FIG. 9B based on receiving user input for displaying the user interface 952. To indicate the selection of displaying the classroom background according to the first time of day (e.g., daytime) in FIG. 9D, option B1 in the second set of options 956 is visually distinguished (e.g., different color, different highlighting and/or different fill) from options B2 and B3 in the second set of options 956.

In some embodiments, in response to the attention 962 of the user 906 moving away from the virtual content 926*a* and/or the virtual content 926*a* being paused, the computer system 101 updates the visual appearance of the virtual environment 945A in FIG. 9B from the second time of day (e.g., nighttime) to the first time of day (e.g., daytime), as shown in FIG. 9D.

Further, FIG. 9D illustrates receiving an input from the hand 920*a* of the user 906 directed to the playback control toggle 946 for playing the virtual content 926*a*, and an additional input from the hand 920*a* of the user 906 corresponding to a selection of an atmospheric effect (e.g., E1) from the third set of options 958.

Figure 9E:
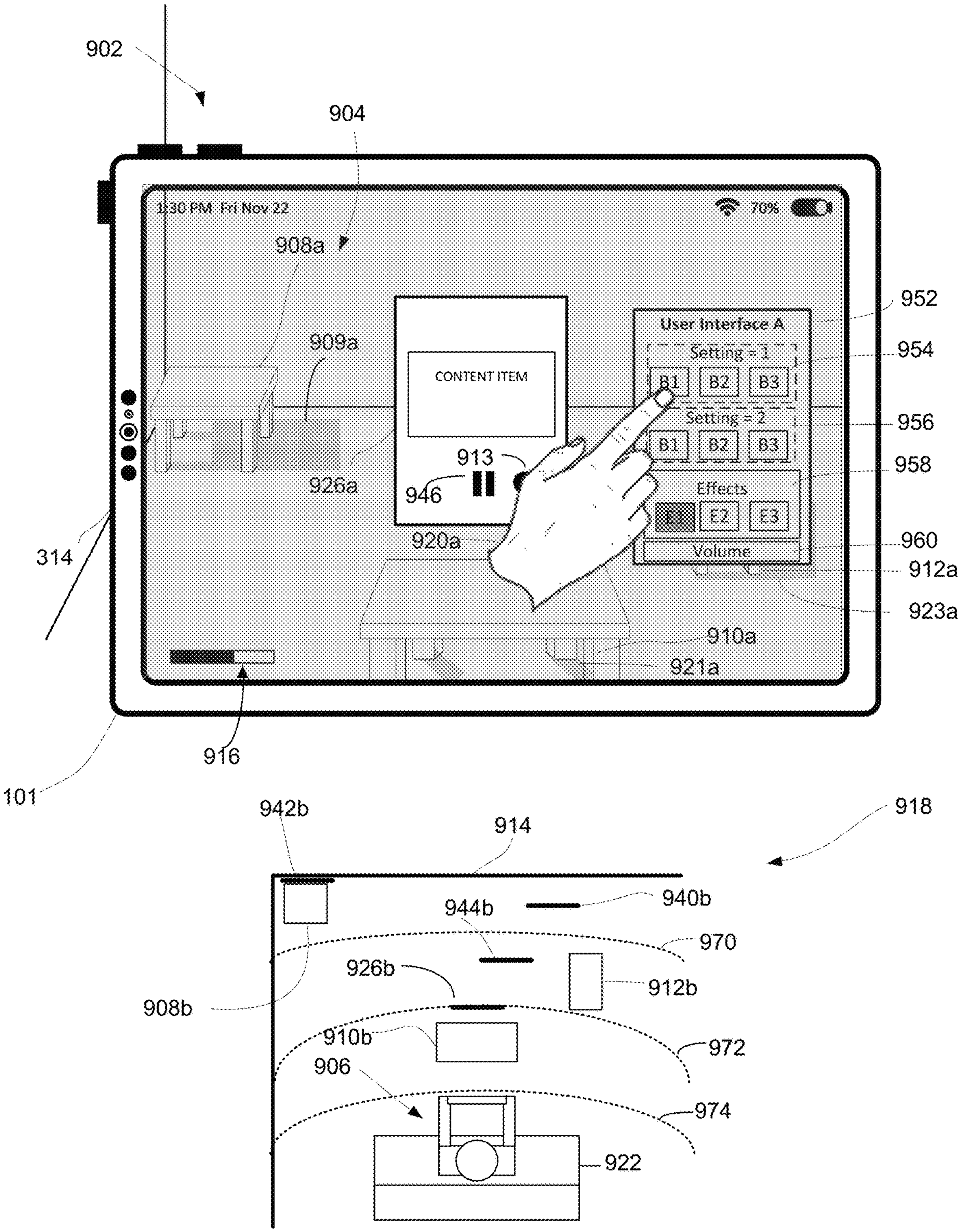

In response to receiving the request to play the virtual content 926*a* and the selection of the atmospheric effect (e.g., E1) in FIG. 9D, the computer system 101 in FIG. 9E plays the virtual content 926*a* and ceases displaying the virtual environment (e.g., virtual environment 945*a* from FIG. 9D). Because the virtual environment is not displayed in FIG. 9E, portions of the physical environment (e.g., the corner table 908*a* and side table 912*a*) previously obscured by the virtual environment are now viewable by the user 906 in the three-dimensional environment 904. Accordingly, the corner table 908*b* and side table 912*b* are represented with solid lines rather than dashed lines in the overhead view 918. To indicate the selection of the atmospheric effect (e.g., E1) in FIG. 9E, option E1 in the third set of options 958 is visually distinguished (e.g., different color, different highlighting and/or different fill) from options E2 and E3 in the third set of options 958. According to the selection of the atmospheric effect (e.g., E1), the computer system 101 in FIG. 9E applies atmospheric effects simulating changes in lighting, simulated particle effects, or other simulated effects that change the appearance of the physical environment of the user, optionally without ceasing or obscuring display of the physical environment 902 of the user 906 (e.g., as described with respect to method 1000). For example in FIG. 9E, the computer system 101 displays shadow 909*a* corresponding to the corner table 908*a*, shadow 923*a* corresponding to the side table 912*a*, and shadow 921*a* corresponding to table 910*a*. Further, because the virtual content 926*a* is playing and the auto-dimming toggle 913 is enabled in FIG. 9E, the computer system 101 reduces the visual prominence of the three-dimensional environment 904 outside of virtual content 926*a* by dimming, decreasing brightness, reducing saturation in color, and/or increasing a blurriness of the environment 904 outside the virtual content 926*a* as described with respect to method 1000.

Further, FIG. 9E illustrates computer system 101 receiving an input from the hand 920*a* of the user 906 corresponding to a selection of the option B1 in the first set of options 954 from the user interface 952.

Figure 9F:
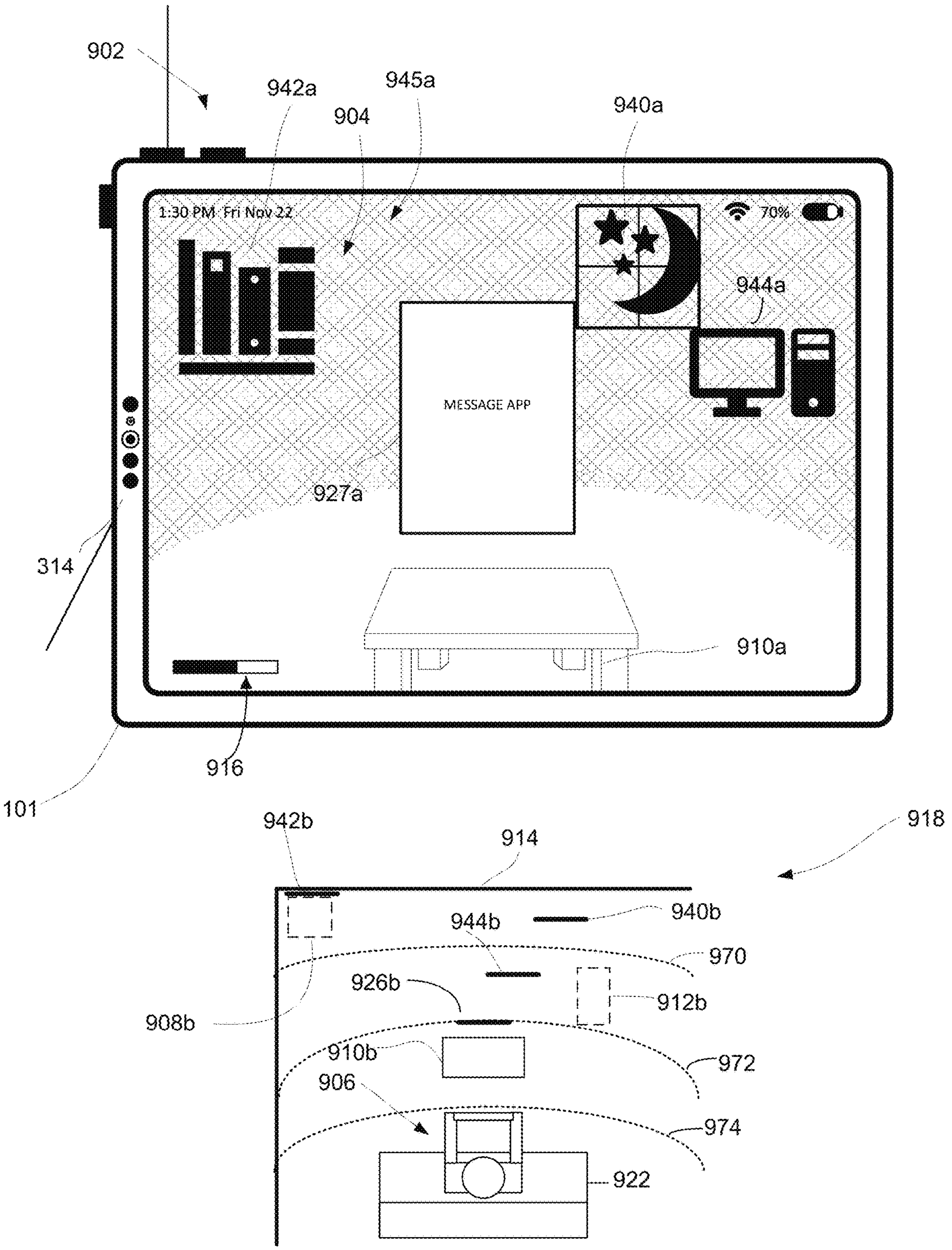
Figure 10A:
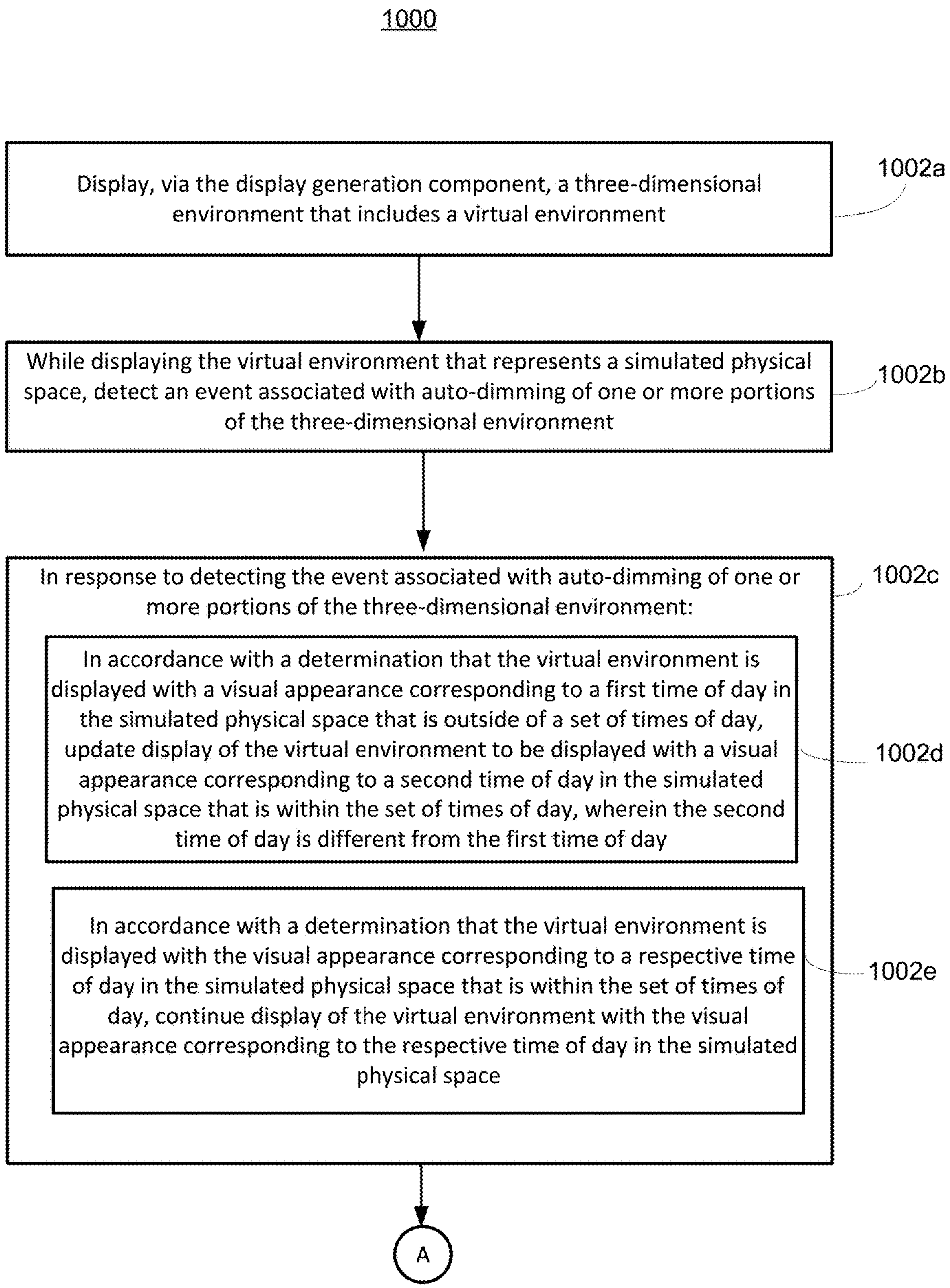
FIGS. 10A-10H is a flowchart illustrating a method of updating a time of day setting to nighttime for a virtual environment based on detecting an event associated with auto-dimming in accordance with some embodiments.
Figure 10B:
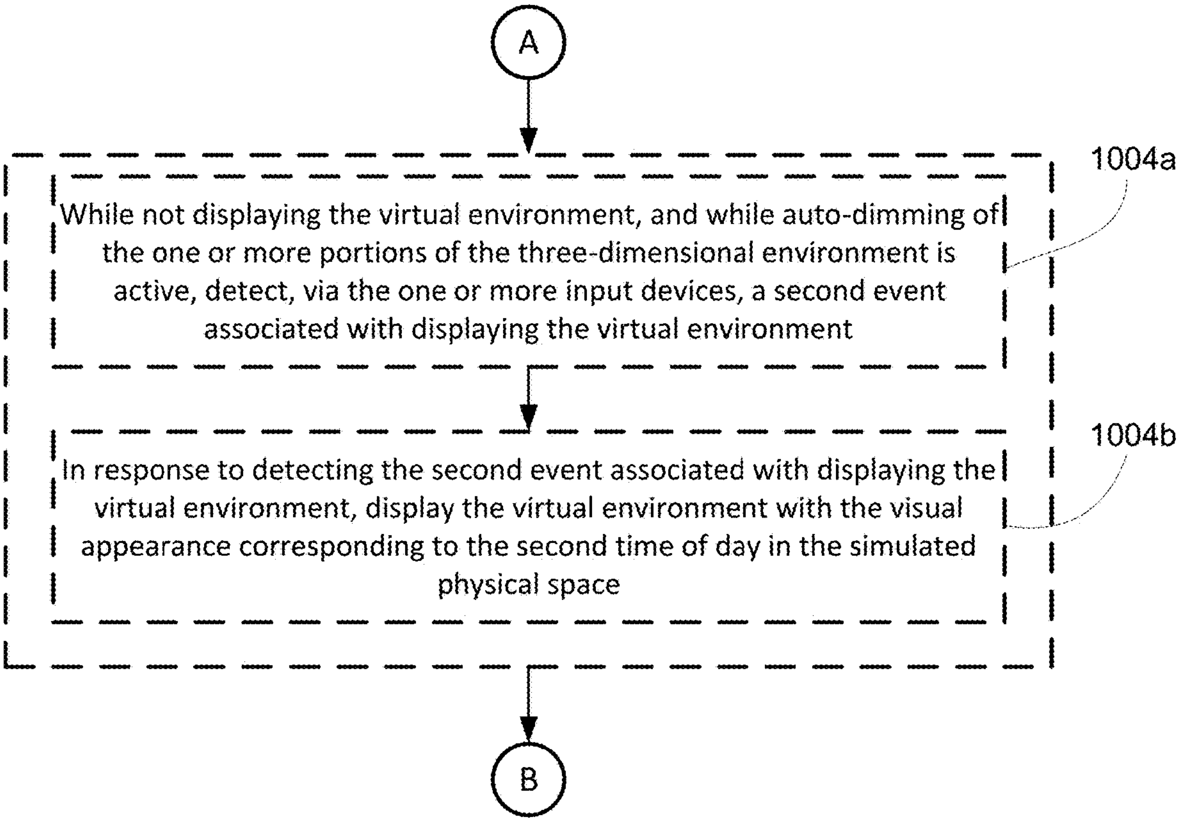
Figure 10C:
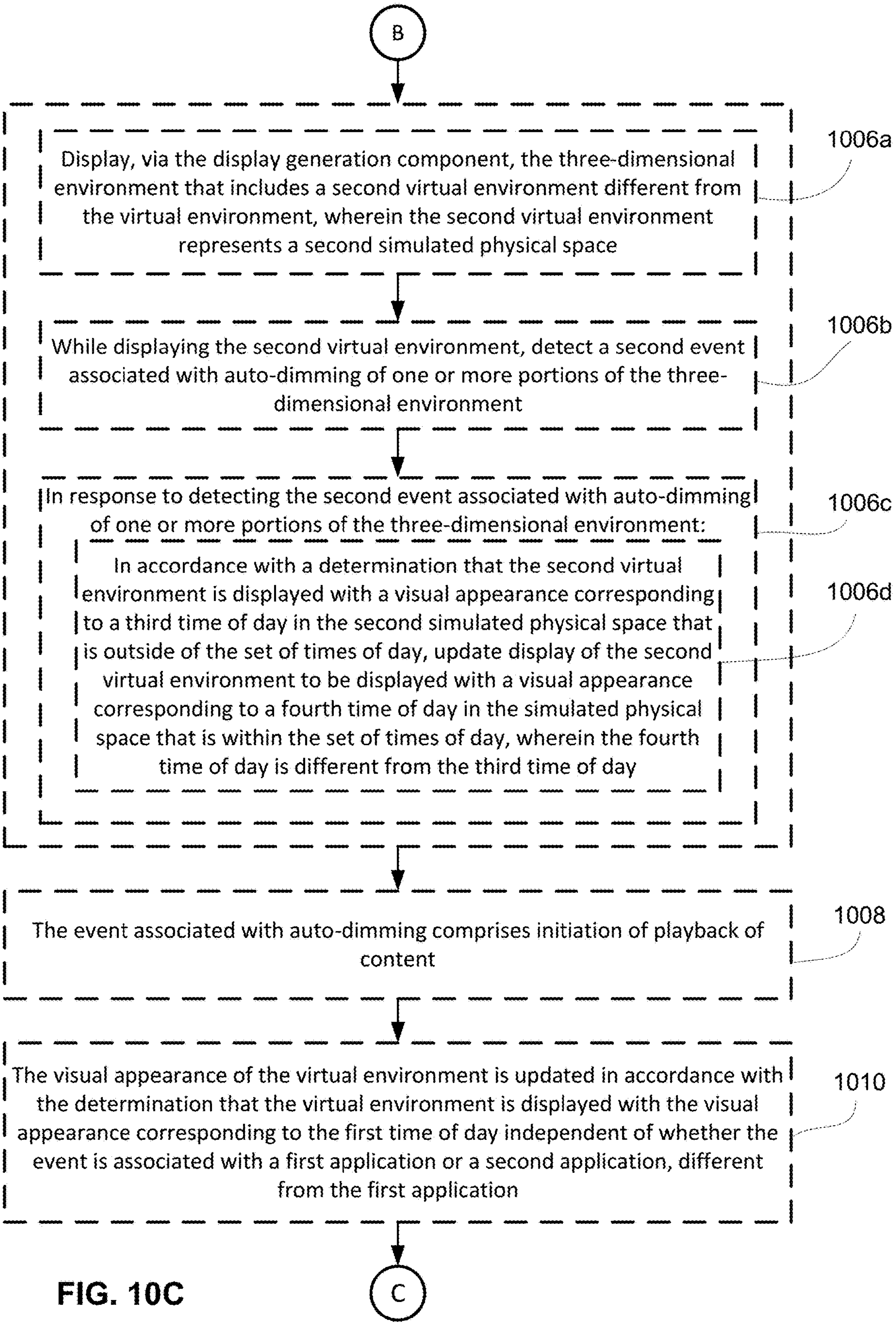
Figure 10D:
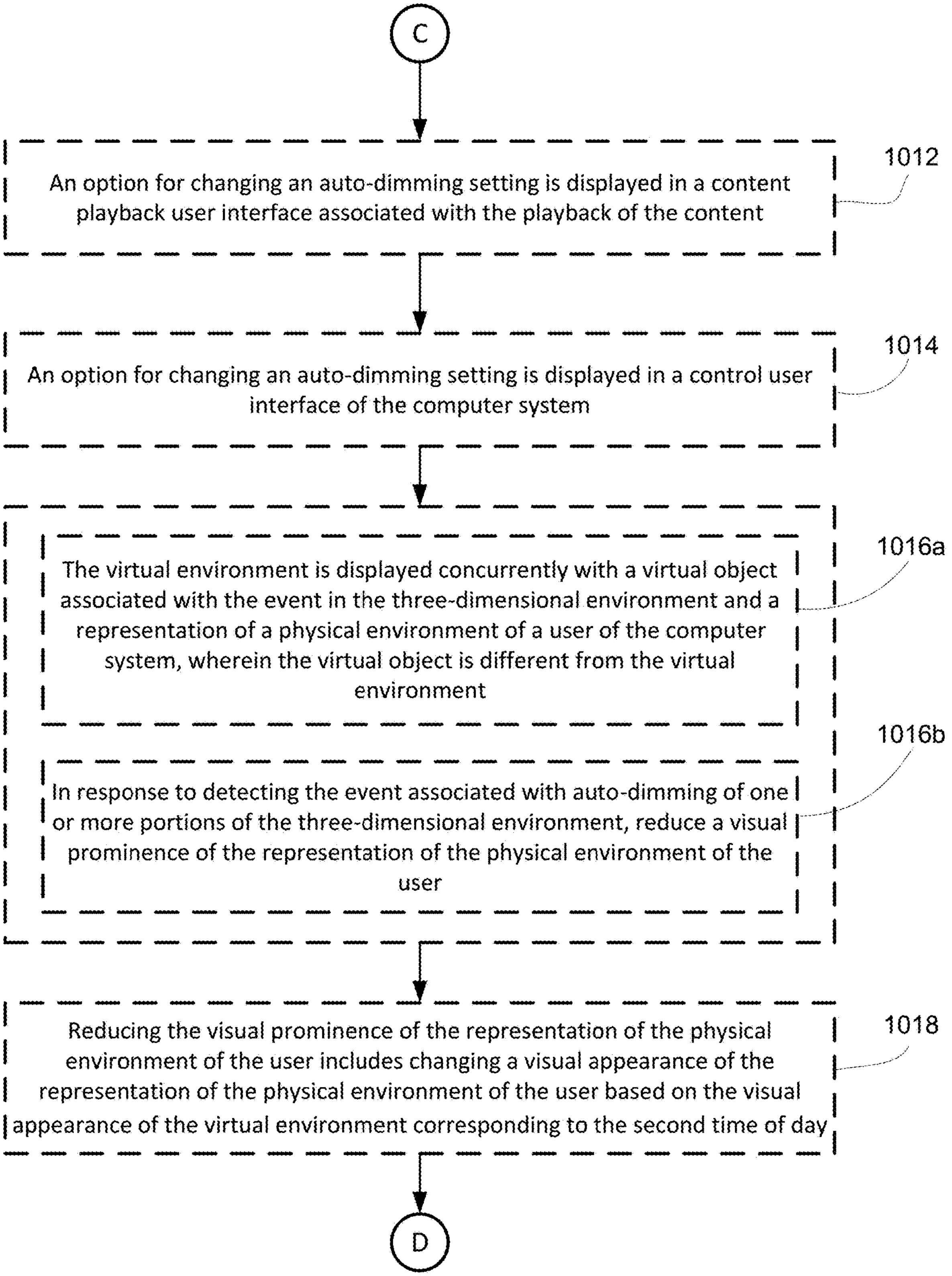
Figure 10E:
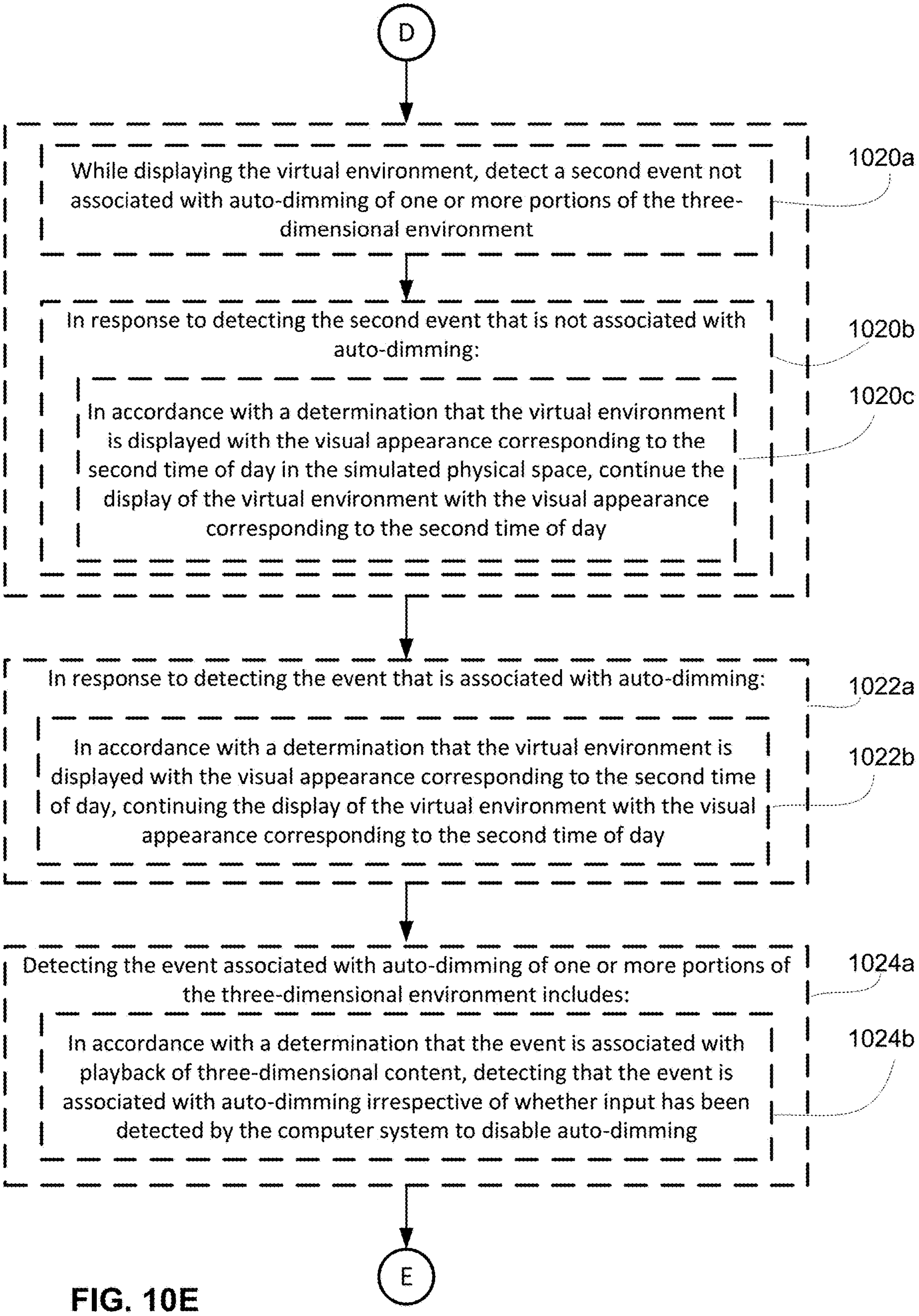
Figure 10F:
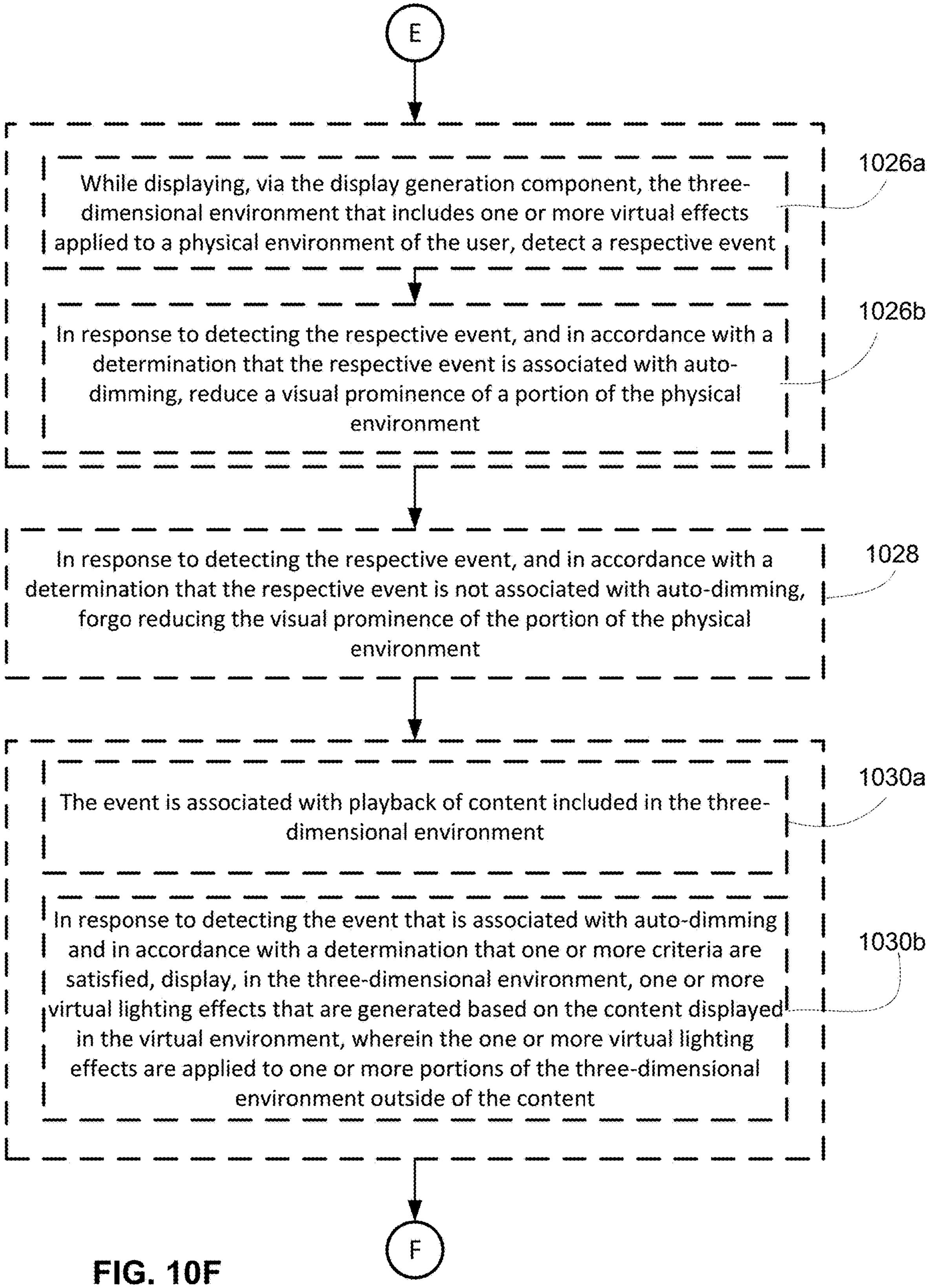
Figure 10G:
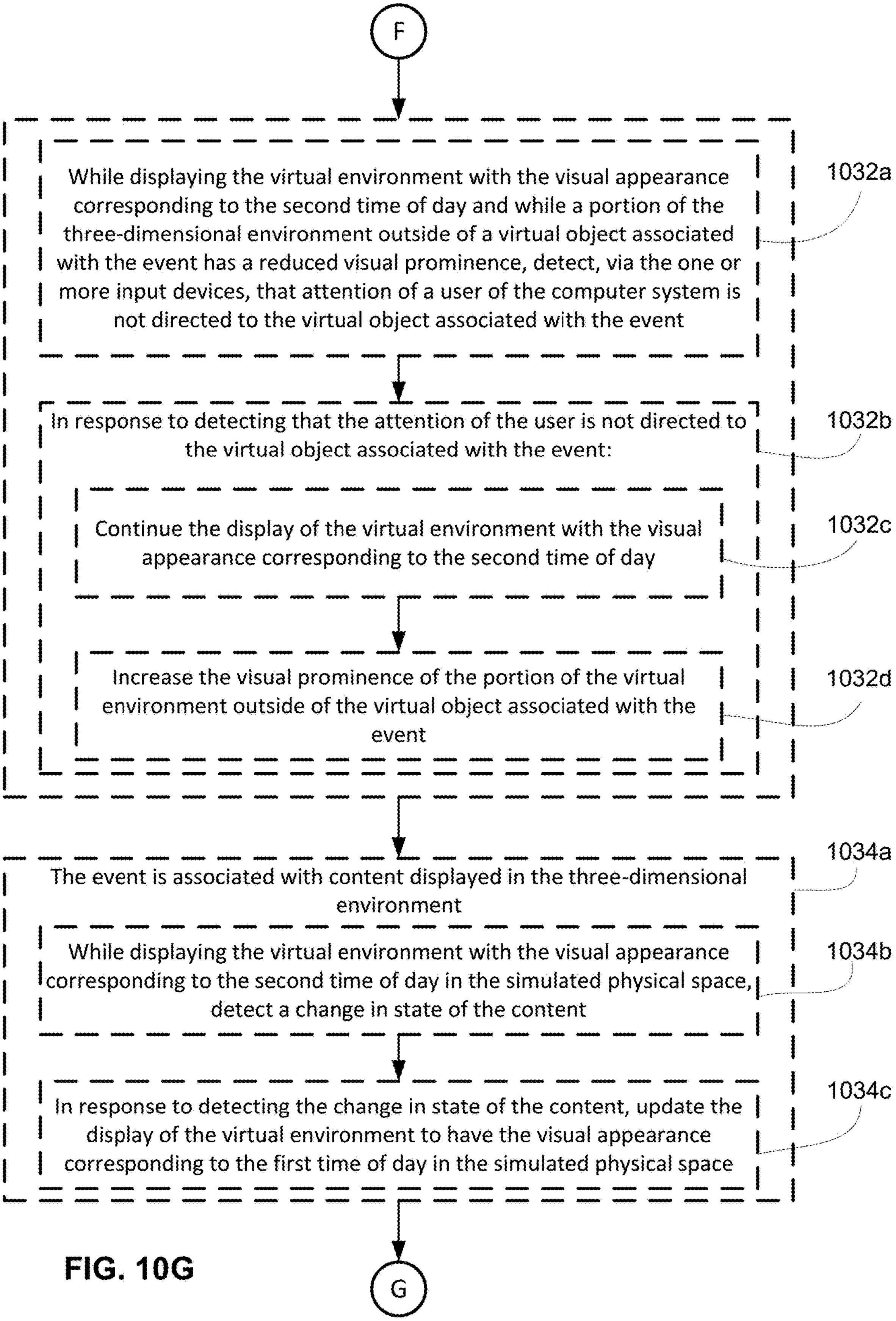
Figure 10H:
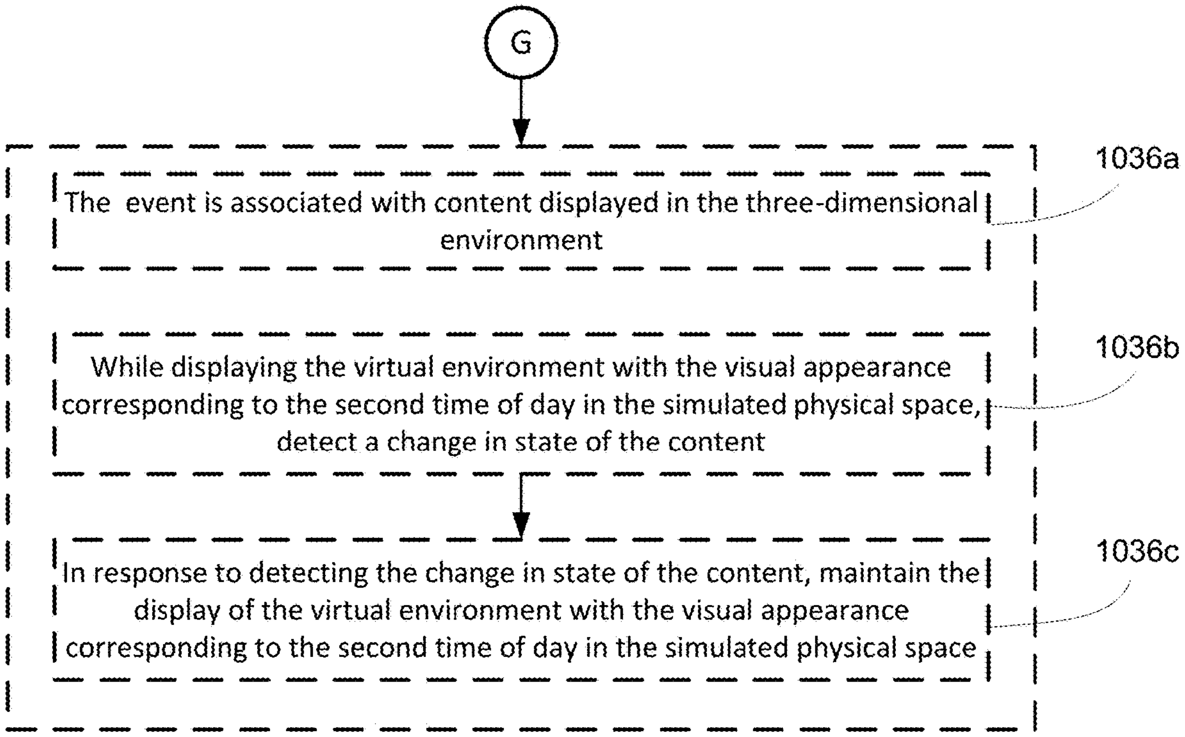

Based on receiving the selection of the option B1 in the first set of options 956, the computer system 101 in FIG. 9F displays a virtual environment 945*a* (e.g., classroom background) corresponding to the second time of day (e.g., nighttime). In FIG. 9F, the virtual environment 945*a* occupies the same portion of the three-dimensional environment 904 as described with reference to FIG. 9A. Accordingly, the virtual environment 945*a* includes the virtual moon and stars 941*a*. In FIG. 9F, the computer system 101 displays virtual content 927*a* corresponding to a messages user interface based on user input. Because the auto-dimming toggle 913 is not available in the virtual content 927*a* (e.g., messages user interface) or the auto-dimming toggle 913 is disabled for the virtual content 927*a* (messages user interface), the computer system 101 maintains display of the virtual environment 945*a* corresponding to the second time of day (e.g., nighttime) without updating (e.g., dimming or darkening) a visual appearance of the physical environment 902 outside the virtual content 927*a* (e.g., messages user interface).

FIGS. 10A-10H is a flowchart illustrating a method 1000 of reducing visual prominence of immersive virtual content and displaying an area of likely interaction in accordance with some embodiments. In some embodiments, the method 1000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1000 are, optionally, combined and/or the order of some operations is, optionally, changed.

In some embodiments, the method 1000 is performed at a computer system, such as computer system 101 in FIG. 1, in communication with a display generation component and one or more input devices. In some embodiments, the computer system has one or more of the characteristics of the computer systems of methods 800, 1200, 1400, 1600, and/or 1800. In some embodiments, the display generation component has one or more of the characteristics of the display generation component of methods 800, 1200, 1400, 1600, and/or 1800. In some embodiments, the one or more input devices have one or more of the characteristics of the one or more input devices of methods 800, 1200, 1400, 1600, and/or 1800.

In some embodiments, the computer system displays (1002*a*), via the display generation component, a three-dimensional environment, such as three-dimensional environment 904 in FIGS. 9A and 9A1, that includes a virtual environment, such as virtual environment 945*a* in FIGS. 9A and 9A1. In some embodiments, the virtual environment is displayed in a three-dimensional environment, such as a virtual reality (VR) environment, a mixed reality (MR) environment, or an augmented reality (AR) environment. In some embodiments, the three-dimensional environment has one or more of the characteristics of the three-dimensional environments of methods 800, 1200, 1400, 1600, and/or 1800.

In some embodiments, while displaying the virtual environment that represents a simulated physical space, the computer system detects (1002*b*) an event, such as playback of virtual content 926*a* in FIGS. 9A and 9A1, associated with auto-dimming of one or more portions of the three-dimensional environment. In some embodiments, the event includes playback of content (e.g., playback of a movie or TV show) via a media application. In some embodiments, the event includes usage of an application such as a messaging application or a photos application with auto-dimming features. In some embodiments, auto-dimming one or more portions of the three-dimensional environment includes reducing a visual prominence of (e.g., reducing a brightness, sharpness and/or color saturation of) or more portions of the three-dimensional environment relative to a different portion of the three-dimensional environment (e.g., a user interface or other portion of the three-dimensional environment with which the event is associated, to which the event corresponds and/or that performed the event). In some embodiments, the one or more portions of the three-dimensional environment for which the visual prominence is reduced include one or more portions of the physical environment of the user/computer system and/or virtual content displayed via the display generation component. In some embodiments, the event is not or does not include an input to change the display mode of the virtual environment, as described below.

In some embodiments, in response to detecting the event associated with auto-dimming of one or more portions of the three-dimensional environment (1002*c*), in accordance with a determination that the virtual environment is displayed (e.g., when the event was detected) with a visual appearance corresponding to a first time of day (e.g., time of day corresponding to light mode or automatic mode during daytime in the physical environment), such as daytime represented by virtual sun 940*a* in FIGS. 9A and 9A1, in the simulated physical space that is outside of a set (or range) of times of day (e.g., times of day associated with dark mode or automatic mode during nighttime in the physical environment such as dusk, midnight, or predawn), the computer system updates (1002*d*) display of the virtual environment to be displayed with a visual appearance corresponding to a second time of day (e.g., time of day corresponding to dark mode or automatic mode during nighttime in the physical environment), such as nighttime represented by virtual moon and stars 941*a* in FIG. 9B, in the simulated physical space that is within the set of times of day (e.g., times of day associated with dark mode or automatic mode during nighttime in the physical environment such as dusk, midnight, or predawn), wherein the second time of day is different from the first time of day. In some embodiments, if the virtual environment is currently displayed with a visual appearance corresponding to first time of day (e.g., an automatic mode during daytime in the physical environment or light mode, such as a virtual scene on a beach that is illuminated by a virtual sun), then the current visual appearance is overridden by the second time of day (e.g., time of day associated with dark mode or automatic mode during nighttime in the physical environment) in response to detection of the event. For example, the computer system optionally overrides a user's selection of the first time of day and displays the virtual environment with a visual appearance that corresponds to the second time of day (e.g., a virtual scene on the beach that is illuminated by a virtual moon). In some embodiments, displaying the virtual environment with the visual appearance corresponding to the first time of day (e.g., light mode or daytime in automatic mode) and/or the second time of day (e.g., dark mode or nighttime in automatic mode) has one or more of the characteristics described with reference to method 800. In some embodiments, displaying the virtual environment with the visual appearance corresponding to the second time of day (e.g., dark mode or nighttime in automatic mode) includes dimming one or more lighting effects associated with the application in which the virtual content is being played (e.g., no glow or light around the virtual content being played) as the virtual environment dims and/or transitions to the second time of day (e.g., dark mode or nighttime in automatic mode). In some embodiments, displaying the virtual environment with the visual appearance corresponding to the second time of day (e.g., dark mode or nighttime in automatic mode) includes dimming one or more lighting effects associated with an application (e.g., messaging application, or photos application) with auto-dimming features as the virtual environment dims. In some embodiments, displaying the virtual environment with the visual appearance corresponding to the second time of day (e.g., dark mode or nighttime in automatic mode) includes simulating a dusk, midnight, or predawn time of day. In some embodiments, the virtual environment is displayed with the visual appearance corresponding to the second time of day (e.g., dark mode or nighttime in automatic mode) for at least a duration of the event (e.g., playback of content with auto-dimming features).

In some embodiments, in accordance with a determination that the virtual environment is displayed (e.g., when the event was detected) with the visual appearance corresponding to a respective time of day, such as nighttime represented by virtual moon and stars 941*a* in FIG. 9B, in the simulated physical space that is within the set (or range) of times of day (e.g., times of day associated with dark mode or automatic mode during nighttime in the physical environment such as dusk, midnight, or predawn), the computer system continues (1002*e*) display of the virtual environment with the visual appearance corresponding to the respective time of day, such as nighttime represented by virtual moon and stars 941*a* in FIG. 9C, in the simulated physical space (e.g., visual appearance is further dimmed or visual appearance remains the same) In some embodiments, the respective time of day is the second time of day (e.g., dark mode or nighttime in automatic mode). In some embodiments, the respective time of day is a third time of day that is different from the second time of day. Adjusting the visual appearance of a virtual environment to nighttime (e.g., dark mode or nighttime in automatic mode) based on events associated with auto-dimming provides a more immersive experience for the user (e.g., during playback of content), reduces the distractions to the user outside of the relevant portion of the three-dimensional environment, and reduces the number of inputs needed to set the appropriate mode for the virtual environment.

In some embodiments, while not displaying the virtual environment, and while auto-dimming of the one or more portions of the three-dimensional environment is active, the computer system detects (1004*a*), via the one or more input devices, a second event associated with displaying the virtual environment, such as a request corresponding to display of virtual environment 945*a* in FIGS. 9A and 9A1. In some embodiments, portions of the three-dimensional environment such as the physical environment are dimmed because auto-dimming is active with respect to the one or more portions of the three-dimensional environment. In some embodiments, the second event is associated with an input for requesting display of the virtual environment. In some embodiments, the second event is associated with an input for requesting display of content in an expanded mode, such as described with reference to method 1200.

In some embodiments, in response to detecting the second event associated with displaying the virtual environment, the computer system displays (1004*b*) the virtual environment with the visual appearance corresponding to the second time of day (e.g., corresponding to a dark mode or nighttime in an automatic mode) in the simulated physical space, such as nighttime represented by virtual moon and stars 941*a* in FIG. 9B. In some embodiments, when auto-dimming is already active in the three-dimensional environment, the virtual environment is displayed with a nighttime visual appearance. In some embodiments, a visual appearance of the virtual environment corresponding to a dark mode or nighttime in an automatic mode is similar to a visual appearance of the three-dimensional environment with active auto-dimming (e.g., dimming physical portions of the three-dimensional environment). Automatically displaying a virtual environment with a nighttime visual appearance (e.g., dark mode or nighttime in an automatic mode) when auto-dimming is already active in a three-dimensional environment reduces the number of inputs needed to set a mode (e.g., time of day) for the virtual environment.

In some embodiments, the computer system displays (1006*a*), via the display generation component, the three-dimensional environment that includes a second virtual environment (e.g., mountain environment), such as B1 in user interface 952 in FIG. 9E, different from the virtual environment (e.g., beach environment), such as B2 in user interface 952 in FIG. 9E, wherein the second virtual environment represents a second simulated physical space (e.g., different than the simulated physical space of the virtual environment); In some embodiments, the second virtual environment is the same as the virtual environment, such that both are beach environments, for example. In some embodiments, the second virtual environment has one or more characteristics of the virtual environment.

In some embodiments, while displaying the second virtual environment, the computer system detects (1006*b*) a second event (e.g., such as described with respect to step(s) 1002) associated with auto-dimming of one or more portions of the three-dimensional environment. In some embodiments, in response to detecting the second event associated with auto-dimming of one or more portions of the three-dimensional environment (1006*c*), in accordance with a determination that the second virtual environment is displayed with a visual appearance corresponding to a third time of day, such as a visual appearance of virtual environment 945*a* corresponding to dawn in FIGS. 9A and 9A1, in the second simulated physical space that is outside of the set of times of day, the computer system updates (1006*d*) display of the second virtual environment to be displayed with a visual appearance corresponding to a fourth time of day, such as a visual appearance of virtual environment 945*a* corresponding to dusk in FIG. 9B, in the simulated physical space that is within the set of times of day, wherein the fourth time of day is different from the third time of day. In some embodiments, the third time of day corresponds to an automatic mode during daytime in the physical environment or a light mode, such as dawn, afternoon, or sunset. In some embodiments, the third time of day is similar to the first time of day described with respect to step(s) 1002. In some embodiments, the third time of day is different than the first time of day described with respect to step(s) 1002. For example, the third time of day optionally includes dawn while the first time of day optionally includes afternoon. In some embodiments, the fourth time of day corresponds to an automatic mode during nighttime in the physical environment or a dark mode, such as dusk, midnight, or predawn. In some embodiments, the fourth time of day is similar to the second time of day described with respect to step(s) 1002. In some embodiments, the fourth time of day is different than the second time of day described with respect to step(s) 1002. For example, the fourth time of day optionally includes dusk while the second time of day optionally includes midnight. In some embodiments, if the virtual environment is displayed with the visual appearance corresponding to a respective time of day in the simulated physical space that is within the set of times of day (e.g., times of day associated with dark mode or automatic mode during nighttime in the physical environment such as dusk, midnight, or predawn), then the virtual environment with the visual appearance corresponding to the respective time of day is maintained. Displaying various virtual environments in their nighttime mode appearances reduces the number of inputs needed to set the appropriate mode (e.g., time of day) for different virtual environments.

In some embodiments, the event associated with auto-dimming comprises initiation of playback of content (e.g., starting media playback, during media playback, or before the end of media playback), such as by hand 920*a* of user requesting playback of content via playback control toggle 946 in FIGS. 9A and 9A1. In some embodiments, pausing of the playback of content is not associated with auto-dimming. In some embodiments, pausing of the playback of content is associated with auto-dimming (1008). Auto-dimming when initiating media playback reduces the distractions to the user outside of the media content, thereby reducing errors in interaction with the computer system.

In some embodiments, the visual appearance of the virtual environment is updated in accordance with the determination that the virtual environment is displayed (e.g., when the event was detected) with the visual appearance corresponding to the first time of day (e.g., time of day corresponding to light mode or automatic mode during daytime in the physical environment) independent of whether the event is associated with a first application, such as virtual content 926*a* in FIG. 9B (e.g., a media (e.g., television or photos, messages application, a health application, or a web browsing application) or a second application, such as messaging application 927*a* in FIG. 9F (e.g., a media (e.g., television or photos, messages application, a health application, or a web browsing application), different from the first application (1010). In some embodiments, the first application and/or the second application are displayed in the virtual environment. In some embodiments, if the first application and/or the second application are associated with auto-dimming (e.g., option for auto-dimming is enabled), then the computer system switches the visual appearance of the virtual environment from the first time of day to the second time of day. In some embodiments, if the first application and/or the second application are not associated with auto-dimming (e.g., option for auto-dimming is not enabled or the applications do not support auto-dimming), then the computer system maintains the visual appearance of the virtual environment corresponding to the first time of day. Adjusting the visual appearance of a virtual environment to nighttime (e.g., dark mode or nighttime in automatic mode) for an application associated with auto-dimming irrespective of the type of application provides a more immersive experience for the user (e.g., during playback of content), reduces the distractions to the user outside of the relevant portion of the three-dimensional environment, and reduces the number of inputs needed to set the appropriate mode for the virtual environment.

In some embodiments, an option for changing an auto-dimming setting, such as auto-dimming toggle 913 in FIGS. 9A and 9A1, is displayed in a content playback user interface, such as virtual content 926*a* in FIGS. 9A and 9A1, associated with the playback of the content (1012). In some embodiments, the content playback user interface includes display of content, an auto-dimming option or toggle, an option to pause the content, an option to play the content, and/or a volume control element. In some embodiments, the auto-dimming option or toggle, the option to pause the content, the option to play the content, and/or the volume control element are overlaid on the content within the content playback user interface. In some embodiments, the auto-dimming option or toggle, the option to pause the content, the option to play the content, and/or the volume control element are displayed at (e.g., outside and adjacent) a top or bottom portion of the content playback user interface. In some embodiments, in accordance with a determination that the option for an auto-dimming setting is enabled (e.g., user interface element, such as a toggle for auto-dimming is on or active) in a content playback user interface, an event such as playback of content or starting playback of content is associated with auto-dimming. In some embodiments, in accordance with a determination that the option for auto-dimming setting is not enabled (e.g., user interface element, such as a toggle for auto-dimming is off or inactive) in a content playback user interface, an event such as playback of content or starting playback of content is not associated with auto-dimming. Auto-dimming when initiating media playback and when an option for auto-dimming is enabled reduces the number of inputs needed to initiate auto-dimming and reduces the distractions to the user outside of the media content, thereby reducing errors in interaction with the computer system.

In some embodiments, an option for changing an auto-dimming setting, such as auto-dimming toggle 913 in FIGS. 9A and 9A1, is displayed in a control user interface, such as user interface 952 in FIG. 9B, of the computer system (1014). In some embodiment, the control user interface includes one or more controls for controlling functionality of the computer system. For example, the control user interface optionally includes the option for auto-dimming, a volume control toggle, options for selecting virtual environments for display, an option corresponding to brightness of the user interface, an option for displaying content in an expanded mode with reference to method 1200, and/or an option for displaying content in a compact mode with reference to method 1200. In some embodiments, the control user interface is displayed in the three-dimensional environment. In some embodiments, the control user interface is displayed in the virtual environment. In some embodiments, in accordance with a determination that the option for an auto-dimming setting is enabled (e.g., user interface element, such as a toggle for auto-dimming is on or active) in a control user interface, the three-dimensional environment (e.g., such as an event such as playback of content or starting playback of content) is associated with auto-dimming. In some embodiments, in accordance with a determination that the option for auto-dimming setting is not enabled (e.g., user interface element, such as a toggle for auto-dimming is off or inactive) in a content playback user interface, the three-dimensional environment (e.g., such as an event such as playback of content or starting playback of content) is not associated with auto-dimming. Displaying the option for auto-dimming in a control user interface ensures efficient access to the options for auto-dimming, thereby improving user-device interaction.

In some embodiments, the virtual environment is displayed concurrently with a virtual object, such as virtual content 926*a* in FIGS. 9A and 9A1 (e.g., a user interface of an application or a representation of content) associated with the event (e.g., such as the event including initiation of content playback as described with respect to step 1008) in the three-dimensional environment and a representation of a physical environment, such as physical environment 902 in FIG. 9E, of a user of the computer system (e.g., portions of the physical environment of the user that are visible via the display generation component), wherein the virtual object is different from the virtual environment (1016*a*). In some embodiments, in response to detecting the event associated with auto-dimming of one or more portions of the three-dimensional environment, the computer system reduces (1016*b*) a visual prominence of the representation of the physical environment of the user, such as dims physical environment 902 in FIG. 9E (e.g., such that the representation of the physical environment appears dimmer, less bright, more blurry, and/or less saturated in color). In some embodiments, while the representation of the physical environment appears dimmer, less bright, more blurry, and/or less saturated in color, a visual appearance of the virtual object is unchanged. Reducing a visual prominence of a physical environment in response to an event associated with auto-dimming reduces distractions to the user outside of the relevant portion of the three-dimensional environment, and reduces the number of inputs needed to set the appropriate visual appearance of the three-dimensional environment.

In some embodiments, reducing the visual prominence of the representation of the physical environment of the user (e.g., such that the representation of the physical environment appears dimmer or less bright) includes changing a visual appearance of the representation of the physical environment of the user based on the visual appearance of the virtual environment corresponding to the second time of day, such as virtual environment 945*a* corresponding to nighttime in FIGS. 9A and 9A1 (1018) (e.g., time of day corresponding to dark mode or automatic mode during nighttime in the physical environment). In some embodiment, the dimmer or less bright representation of the physical environment is similar in visual prominence to the virtual environment in nighttime. In some embodiments, the physical environment is dimmed further if the virtual environment corresponds to a darker visual appearance. In some embodiments, a color, a degree of color saturation, and/or a degree of tinting applied to the physical environment correspond to the color, the degree of color saturation, and/or the degree of tinting of the visual appearance of the virtual environment. Dimming a physical environment based on a visual appearance of the virtual environment reduces distractions to the user outside of the relevant portion of the three-dimensional environment, and reduces the number of inputs needed to set the appropriate visual appearance of the three-dimensional environment.

In some embodiments, while displaying the virtual environment, the computer system detects a second event not associated with auto-dimming of one or more portions of the three-dimensional environment, such as by hand 920*a* of user requesting pausing of content via playback control toggle 946 in FIG. 9B (e.g., based on an option for auto-diming being disabled) (1020*a*). In some embodiments, in response to detecting the second event (e.g., different than the second event described with respect to step(s) 1004-1006) that is not associated with auto-dimming (1020*b*), (e.g., the second event is different than the event associated with auto-dimming of one or more portions of the three-dimensional environment, such as described with respect to step(s) 1002. In some embodiments, the second event has one or more characteristics of the event described with reference to step(s) 1002, except that auto-dimming is disabled.) in accordance with a determination that the virtual environment is displayed with the visual appearance corresponding to the second time of day (e.g., time of day corresponding to dark mode or automatic mode during nighttime in the physical environment) in the simulated physical space, the computer system continues (1020*c*) the display of the virtual environment with the visual appearance corresponding to the second time of day, such as daytime represented by virtual sun 940*a* in FIG. 9D. In some embodiments, when an option for auto-dimming is disabled and the visual appearance of the virtual environment corresponds to nighttime, the visual appearance of the virtual environment corresponding to nighttime is maintained. In some embodiments, when an option for auto-dimming is disabled and the visual appearance of virtual environment corresponds to a first time of day (daytime), the visual appearance of the virtual environment corresponding to daytime is maintained. Continuing display of a virtual environment with a nighttime appearance when the virtual environment already corresponds to the nighttime appearance despite the option for auto dimming being disabled reduces computing resources consumed by the computer system.

In some embodiments, in response to detecting the event (e.g., such as described with respect to step(s) 1002) that is associated with auto-dimming (e.g., based on an option for auto-diming being enabled) (1022*a*), in accordance with a determination that the virtual environment is displayed with the visual appearance corresponding to the second time of day, such as nighttime represented by virtual moon and stars 941*a* in FIG. 9B, (e.g., time of day corresponding to dark mode or automatic mode during nighttime in the physical environment), the computer system continues (1022*b*) the display of the virtual environment with the visual appearance corresponding to the second time of day, such as nighttime represented by virtual moon and stars 941*a* without further dimming virtual environment 945*a* in FIG. 9C. In some embodiments, when an option for auto-dimming is enabled and the visual appearance of the virtual environment corresponds to nighttime, the visual appearance of the virtual environment corresponding to nighttime is maintained (e.g., without further changing the visual appearance of the virtual environment). In some embodiments, when an option for auto-dimming is enabled and the visual appearance of virtual environment corresponds to a first time of day (e.g., daytime), the visual appearance of the virtual environment corresponding to the first time of day (e.g., daytime) is updated to the second time of day (e.g., nighttime) based on the event corresponding to auto-dimming. Continuing display of a virtual environment with a nighttime appearance when the option for auto dimming is enabled and the virtual environment already corresponds to the nighttime appearance reduces computing resources consumed by the computer system.

In some embodiments, detecting the event associated with auto-dimming of one or more portions of the three-dimensional environment includes (1024*a*), in accordance with a determination that the event is associated with playback of three-dimensional content (e.g., only three-dimensional content or a combination of two-dimensional and three-dimensional content), detecting that the event is associated with auto-dimming irrespective of whether auto-dimming is enabled or disabled at the computer system, such as playback of virtual content 926*a* is associated with auto-dimming if the virtual content 926*a* includes playback of three-dimensional content in FIG. 9B (1024*b*). In some embodiment, an option for auto-dimming remains enabled when the event is associated with three-dimensional media playback. In some embodiment, despite receiving user input to disable the option for auto-dimming, the option for auto-dimming remains enabled when the event is associated with three-dimensional media playback. Maintaining auto-dimming for three-dimensional media content regardless of whether input for disabling auto-dimming is received reduces the number of inputs needed to set the appropriate mode for the three-dimensional media content.

In some embodiments, while displaying, via the display generation component, the three-dimensional environment that includes one or more virtual effects (e.g., atmospheric effects), such as shadows 909*a*, 921*a*, and 923*a* in FIG. 9E, applied to a physical environment of the user, the computer system detects (1026*a*) a respective event (e.g., having one or more of the characteristics of the event of step(s) 1002). In some embodiments, the one of more virtual effects include one or more characteristics of the atmospheric effects of method 800. For example, the atmospheric effects optionally include simulating changes in lighting, simulated particle effects, or other simulated effects that change the appearance of the physical environment of the user, optionally without ceasing display of the physical environment of the user.

In some embodiments, in response to detecting the respective event, and in accordance with a determination that the respective event is associated with auto-dimming (option for auto-dimming is enabled (e.g., user interface element, such as a toggle for auto-dimming is on or active)), the computer system reduces (1026*b*) a visual prominence of a portion of the physical environment, such as dimming physical environment 904 in FIG. 9E (optionally surrounding a representation of content corresponding to the event). In some embodiments, reducing the visual appearance includes dimming, decreasing brightness, reducing saturation in color, and/or increasing a blurriness of the portion of the physical environment or of the entirety of the physical environment that is visible via the display generation component. Reducing a visual prominence of a physical environment of a user when an event is associated with auto-dimming reduces the distractions to the user outside of the relevant portion of the three-dimensional environment and the number of inputs needed to set the appropriate mode for the three-dimensional environment.

In some embodiments, in response to detecting the respective event, and in accordance with a determination that the respective event is not associated with auto-dimming, such as messaging application 927*a* without auto-dimming toggle enabled in FIG. 9F (option for auto-dimming is disabled (e.g., user interface element, such as a toggle for auto-dimming is off or inactive)), the computer system forgoes (1028) reducing (e.g., maintaining) the visual prominence of the portion of the physical environment, such as no dimming of virtual environment 945*a* outside of messaging application 927*a* in FIG. 9F (optionally surrounding a representation of content corresponding to the event). Maintaining (e.g., without dimming) a physical environment of a user when an event is not associated with auto-dimming ensures the visibility of the physical environment is not reduced unnecessarily, and therefore reduces the number of inputs needed to correct such errors.

In some embodiments, the event is associated with playback of content included in the three-dimensional environment (1030*a*). In some embodiments, in response to detecting the event that is associated with auto-dimming and in accordance with a determination that one or more criteria are satisfied (e.g., including a criterion that is satisfied when a cinema mode associated with the event is enabled), the computer system displays (1030*b*), in the three-dimensional environment, one or more virtual (e.g., simulated) lighting effects, such as virtual lighting effects 950 in FIG. 9B, that are generated based on the content displayed in the virtual environment, wherein the one or more virtual lighting effects are applied to one or more portions of the three-dimensional environment outside of the content. Because the event is associated with auto-dimming, portions of the three-dimensional environment outside of the content are optionally reduced in visual prominence compared to the content, as described with respect to step(s) 1016. In some embodiments, virtual lighting effects generated from the content are applied to such portions of the three-dimensional environment outside the content. In some embodiments, the virtual lighting effects appear to be virtually cast by the content onto portions of the three-dimensional environment outside the content. In some embodiments, the virtual lighting effects correspond in color, brightness, and/or saturation level with the color, brightness, and/or saturation level of the content. In some embodiments, if the one or more criteria are not satisfied because the cinema mode associated with the event is disabled, the computer system forgoes display of the one or more virtual lighting effects that are generated from the content. Applying virtual lighting effects from content to portions of the three-dimensional environment outside the content reduces distractions from areas of the environment outside of the content.

In some embodiments, while displaying the virtual environment with the visual appearance corresponding to the second time of day (e.g., time of day corresponding to dark mode or automatic mode during nighttime in the physical environment) and while a portion of the three-dimensional environment outside of a virtual object, such as messaging application 927*a* in FIG. 9F (e.g., a user interface of an application or a representation of content) associated with the event (e.g., playback of content) has a reduced visual prominence (e.g., the portion of three-dimensional environment outside of a virtual object is dimmer or less bright to the virtual object, as described with respect to step(s) 1016 compared, when attention of the user is directed to the virtual object), the computer system detects (1032*a*), via the one or more input devices, that attention of a user, such as attention of user 962 in FIG. 9D, of the computer system is not directed to the virtual object associated with the event. In some embodiments, when the attention of the user is away from the virtual object and the event includes playback of content, the computer system pauses the playback of the content. In some embodiments, attention is not directed to the virtual object in response to the playback of the content being paused.

In some embodiments, in response to detecting that the attention of the user is not directed to the virtual object associated with the event (1032*b*), the computer system continues (1032*c*) the display of the virtual environment with the visual appearance corresponding to the second time of day, such as nighttime represented by virtual moon and stars 941*a* in FIG. 9F (e.g., while the playback of content is paused). In some embodiments, the computer system increases (1032*d*) the visual prominence (e.g., brighter, less dim, less blurry, and/or more saturated in color) of the portion of the virtual environment outside of the virtual object associated with the event, such as no dimming of virtual environment 945*a* outside of messaging application 927*a* in FIG. 9F. Ceasing dimming effects when attention of the user is not directed to content (e.g., pausing media playback) saves processing power associated with auto-dimming when not needed, and ensures visibility of the remainder of the user interface when interaction is more likely, thereby reducing errors in usage.

In some embodiments, the event is associated with content displayed in the three-dimensional environment (e.g., option for auto-dimming associated with the content is optionally enabled) (1034*a*). In some embodiments, while displaying the virtual environment with the visual appearance corresponding to the second time of day (e.g., time of day corresponding to dark mode or automatic mode during nighttime in the physical environment) in the simulated physical space, the computer system detects (1034*b*) a change in state of the content, such as by hand 920*a* of user requesting pausing of content via playback control toggle 946 in FIG. 9B or switching to messaging application 927*a* in FIG. 9E (e.g., such closing out of the content, switching from the content to other content, and/or pausing playback of the content).

In some embodiments, in response to detecting the change in state of the content, such as by hand 920*a* of user requesting pausing of content via playback control toggle 946 in FIG. 9B, the computer system updates (1034*c*) the display of the virtual environment to have the visual appearance corresponding to the first time of day, such as daytime represented by virtual sun 940*a* in FIG. 9D, (e.g., time of day corresponding to light mode or automatic mode during daytime in the physical environment) in the simulated physical space. In some embodiments, the virtual environment corresponding to the first time of day is displayed prior to displaying the virtual environment corresponding to the second time of day (e.g., prior to detecting the event associated with content displayed in the three-dimensional environment). Updating a virtual environment to a daytime appearance when the event is no longer associated with auto-dimming reduces the number of inputs needed to revert to an original appearance of the virtual environment prior to detecting the event associated with auto-dimming, thereby improving user-device interaction.

In some embodiments, the event is associated with content displayed in the three-dimensional environment (e.g., option for auto-dimming associated with the content is optionally enabled) (1036*a*). In some embodiments, while displaying the virtual environment with the visual appearance corresponding to the second time of day (e.g., time of day corresponding to dark mode or automatic mode during nighttime in the physical environment) in the simulated physical space, the computer system detects (1036*b*) a change in state of the content, such as by hand 920*a* of user requesting pausing of content via playback control toggle 946 in FIG. 9B (e.g., such closing out of the content, switching from the content to other content, and/or pausing playback of the content). In some embodiments, in response to detecting the change in state of the content, the computer system maintains (1036*c*) the display of the virtual environment with the visual appearance corresponding to the second time of day, such as nighttime represented by virtual moon and stars 941*a* in FIG. 9C, in the simulated physical space. Maintaining a nighttime appearance of a virtual environment despite the event no longer associated with auto-dimming reduces the number of inputs needed to remain in the nighttime appearance, thereby improving user-device interaction.

It should be understood that the particular order in which the operations in method 1000 have been described is merely exemplary and is not intended to indicate that the described order is the only order in which the operations could be performed. One of ordinary skill in the art would recognize various ways to reorder the operations described herein.

FIGS. 11A-11I illustrate examples of a computer system displaying a content item in an expanded display mode (e.g., full screen) in accordance with some embodiments.

Figure 11A:
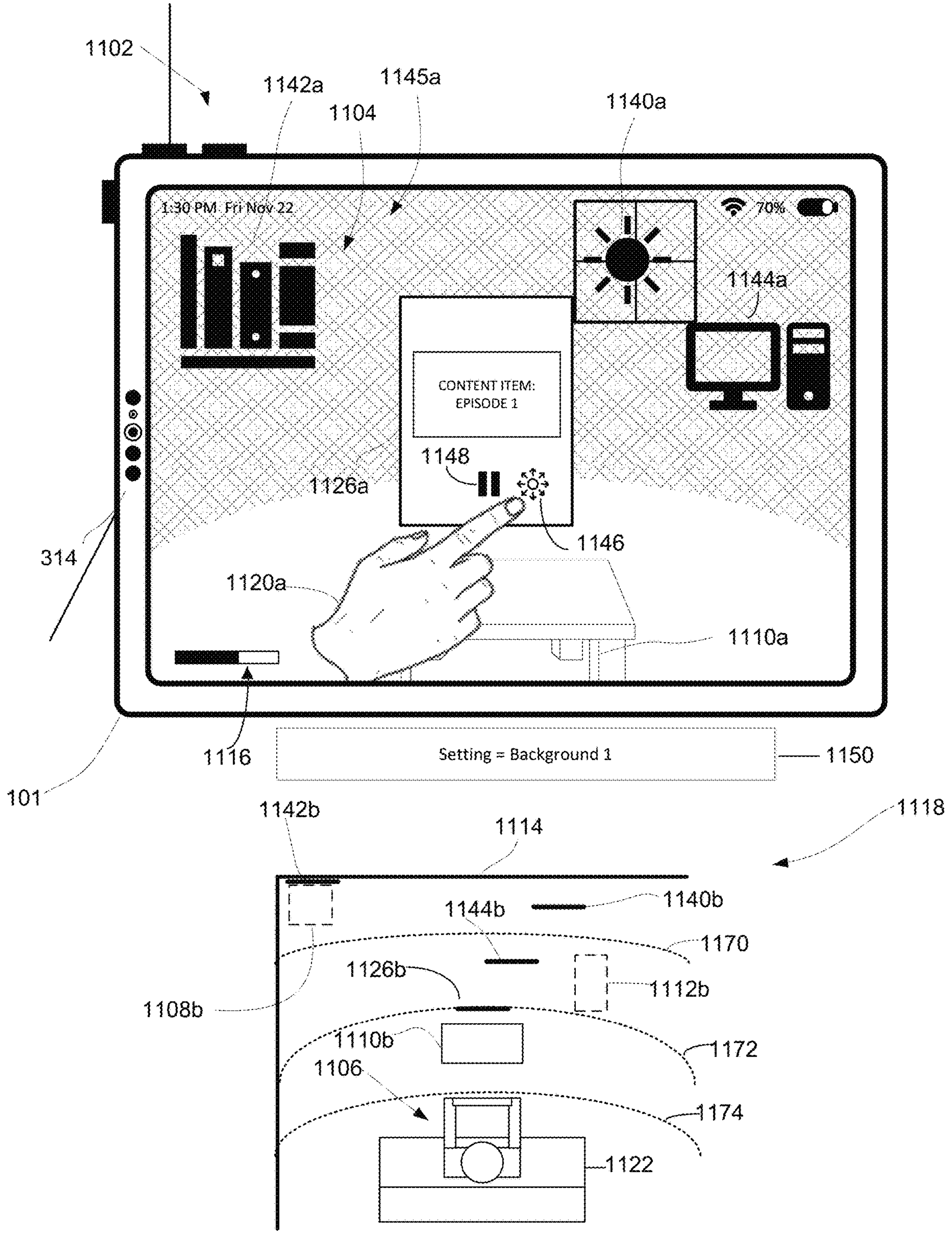
FIGS. 11A-11I illustrate examples of a computer system displaying a content item in an expanded display mode (e.g., full screen) in accordance with some embodiments.

FIG. 11A illustrates a computer system 101 displaying, via a display generation component (e.g., display generation component 120 of FIG. 1), a three-dimensional environment 1104. As described above with reference to FIGS. 1-6, the computer system 101 optionally includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user). The figures herein illustrate a three-dimensional environment that is presented to the user by computer system 101 (e.g., and displayed by the display generation component of computer system 101) and an overhead view of the three-dimensional environment associated with computer system 101 (e.g., such as overhead view 1118 in FIG. 11A) to illustrate the relative locations of real-world elements from the physical environment and virtual elements (e.g., virtual content, virtual objects, and/or virtual environment) in the three-dimensional environment.

As shown in FIG. 11A, the computer system 101 captures one or more images of the physical environment 1102 around computer system 101 (e.g., operating environment 100), including one or more objects (e.g., table 1110A) in the physical environment 1102 around computer system 101. In some embodiments, the computer system 101 displays representations of the physical environment 1102 the in three-dimensional environment 1104 or portions of the physical environment 1102 are visible via the display generation component 120 of computer system 101. For example, the three-dimensional environment 1104 includes table 1110A and portions of the floor in the physical environment 1102 of a user 1106.

In some embodiments, a virtual environment 1145*a*, optionally a simulated three-dimensional environment, is displayed in three-dimensional environment 1104, optionally concurrently with the representation of the physical environment 1102 (e.g., partial immersion as illustrated in FIG. 11A) or optionally instead of the representations of the physical environment 1102 (e.g., full immersion). Some examples of the virtual environment 1145*a* include a classroom background (as illustrated in FIG. 11A), a mountain background, a beach background, a sports event background, and/or other virtual backgrounds. In some embodiments, the virtual environment 1145*a* is based on a physical location. In some embodiments, a virtual environment 1145*a* is an artist-designed location. In some embodiments, virtual environment 1145A is a simulated physical space, as described in more detail with reference to method 1200. Thus, displaying a virtual environment 1145*a* in the three-dimensional environment 1104 provides the user 1106 with a virtual experience as if the user 1106 is physically located in the virtual environment 1145*a*. In FIG. 11A, the virtual environment 1145*a* corresponding to the classroom background includes virtual elements such as a virtual bookshelf 1142*a* and a virtual computer 1144*a*. As illustrated, the computer system 101 displays the virtual environment 1145*a* according to a first time of day (e.g., daytime) as described with respect to method 1200. Accordingly, the virtual environment 1145*a* includes the classroom scene illuminated by a virtual sun 1140*a*.

In FIG. 11A, the three-dimensional environment 1104 also includes virtual content, such as virtual content 1126*a*. The virtual content 1126*a* optionally includes a user interface of an application (e.g., content browsing user interface) for playback of content (e.g., movie, television show, and/or photo). In FIG. 11A, the virtual content 1126*a* (e.g., content browsing user interface) for playback of content includes a playback control toggle 1148 to play or pause the content, and an expanded display mode toggle 1146 (e.g., where content is displayed in an expanded display mode when the expanded display mode toggle 1146 is enabled and content is displayed in a compact display mode when the expanded display mode toggle 1146 is disabled), as described with respect to method 1200. In some embodiments, the three-dimensional environment 1104 includes a three-dimensional object (e.g., virtual clock, virtual ball, or virtual car), user interfaces of other application (e.g., messaging user interface), or any other element displayed by computer system 101 that is not included in the physical environment 1104 of the computer system 101.

As illustrated in the overhead view 1118, the user 1106 is seated on a couch 1122 in the physical environment 1102 while interacting with the computer system 101. In the overhead view 1118, table 1110*b* is a real-world object in the physical environment 1102, which has been captured by the one or more sensors of computer system 101, and a representation of table 1110A is included in the three-dimensional environment 1104 (e.g., photorealistic representation, simplified representation, cartoon, or caricature), or table 1110*a* is visible via passive passthrough via display generation component 120. In the overhead view 1118, a corner table 1108*b* and a side table 1112*b* from the physical environment 1102 of the user 1106 are represented as dashed lines because the corner table 1108*b* and side table 1112*b* are not visible in the three-dimensional environment 1104. That is, the portion of the physical environment 1102 which includes the corner table 1108*b* and side table 1112*b* is not visible to the user 1106 because the virtual environment 1145*a* has replaced the portion of the physical environment which includes the corner table 1108*b* and the side table 1112*b*. As shown in the overhead view 1118, at the immersion level for virtual environment 1145*a* displayed in FIG. 11A, the virtual environment 1145*a* optionally extends from the dashed line 1170 to a far wall 1114 in three-dimensional environment 1104.

In FIG. 11A, computer system 101 is displaying an immersion level indicator 1116. In some embodiments, the immersion level indicator 1116 indicates the current level of immersion (e.g., out of a maximum number of levels of immersion) with which computer system 101 is displaying the three-dimensional environment 1104. In some embodiments, a level of immersion includes an amount of view of the physical environment 1102 that is obscured (e.g., replaced) by the virtual environment 1145*a*. For example, as shown in the overhead view 1118, the virtual environment 1145*a* extends from the dashed line 1170 at a first level of immersion to the far wall 1114. While the corner table 1108*b* is not visible in the three-dimensional environment 1104, portions of the physical environment not obscured by the virtual environment 1145*a*, including the side table 1112*b* and the table 1110*b* are displayed in the three-dimensional environment 1104. However, virtual computer 1144*b* and virtual content 1126*b* (e.g., beyond the dashed line 1170) are not displayed in the three-dimensional environment 1104 in the first level of immersion.

In FIG. 11A, the computer system 101 optionally displays the three-dimensional environment 1104 according to a second level of immersion 1172. For example, as shown in the overhead view 1118, the virtual environment 1145*a* extends from the dashed line 1172 at a second level of immersion to the far wall 1114. While the corner table 1108*b* and the side table 1112*b* are not visible in the three-dimensional environment 1104, portions of the physical environment not obscured by the virtual environment 1145*a*, including the table 1110*b* are displayed in the three-dimensional environment 1104.

Further, as shown in the overhead view 1118, a third level of immersion 1174 is a maximum level of immersion (e.g., full immersion), in which no portion of the physical environment 1102 is viewable in three-dimensional environment 1104. For example, as shown in the overhead view 1118, the virtual environment 1145*a* extends from the dashed line 1174 at a third level of immersion to the far wall 1114. That is, the virtual environment 1145*a* (e.g., including the virtual bookshelf 1142*b*, the virtual computer 1144*b*, virtual sun 1140*b*, and virtual content 1126*b*) has replaced the physical environment 1102. Although FIG. 11A illustrates the three-dimensional environment 1104 according to the second level of immersion, the computer system 101 can optionally modify the level of immersion (e.g., to the first level of immersion or the third level of immersion) based on user input.

In FIG. 11A, the virtual content 1126A (e.g., playback of content) is currently playing a first episode of a television series in a compact display mode as described with reference to method 1200. In FIG. 11A, the playback control toggle 1148 to pause the virtual content 1126A is displayed and available for selection. Further, the computer system 101 in FIG. 11A receives input from a hand 1120*a* of the user 1106 directed to the expanded display mode toggle 1146 (e.g., via an air pinch gesture of hand 1120*a* while attention of the user 1106 is directed to toggle 1146) corresponding to a request to display the virtual content 1126A in an expanded display mode as described with respect to method 1200.

FIG. 11A1 illustrates similar and/or the same concepts as those shown in FIG. 11A (with many of the same reference numbers). It is understood that unless indicated below, elements shown in FIG. 11A1 that have the same reference numbers as elements shown in FIGS. 11A-11E have one or more or all of the same characteristics. FIG. 11A1 includes computer system 101, which includes (or is the same as) display generation component 120. In some embodiments, computer system 101 and display generation component 120 have one or more of the characteristics of computer system 101 shown in FIGS. 11A-11E and display generation component 120 shown in FIGS. 1 and 3, respectively, and in some embodiments, computer system 101 and display generation component 120 shown in FIGS. 11A-11E have one or more of the characteristics of computer system 101 and display generation component 120 shown in FIG. 11A1.

In FIG. 11A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 11A-11E.

In FIG. 11A1, display generation component 120 is illustrated as displaying content that optionally corresponds to the content that is described as being displayed and/or visible via display generation component 120 with reference to FIGS. 11A-11E. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 11A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 11A1. Because display generation component 120 is optionally a head-mounted device, the field of view of display generation component 120 is optionally the same as or similar to the field of view of the user.

In FIG. 11A1, the user is depicted as performing an air pinch gesture (e.g., with hand 1120*a* while attention of the user is directed to option 1146, as indicated by gaze point 1198) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 11A-11E.

In some embodiments, computer system 101 responds to user inputs as described with reference to FIGS. 11A-11E.

In the example of FIG. 11A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 11A-11E and/or described with reference to the corresponding method(s) are optionally implemented on computer system 101 and display generation unit 120 in a manner similar or analogous to that shown in FIG. 11A1.

Figure 11B:
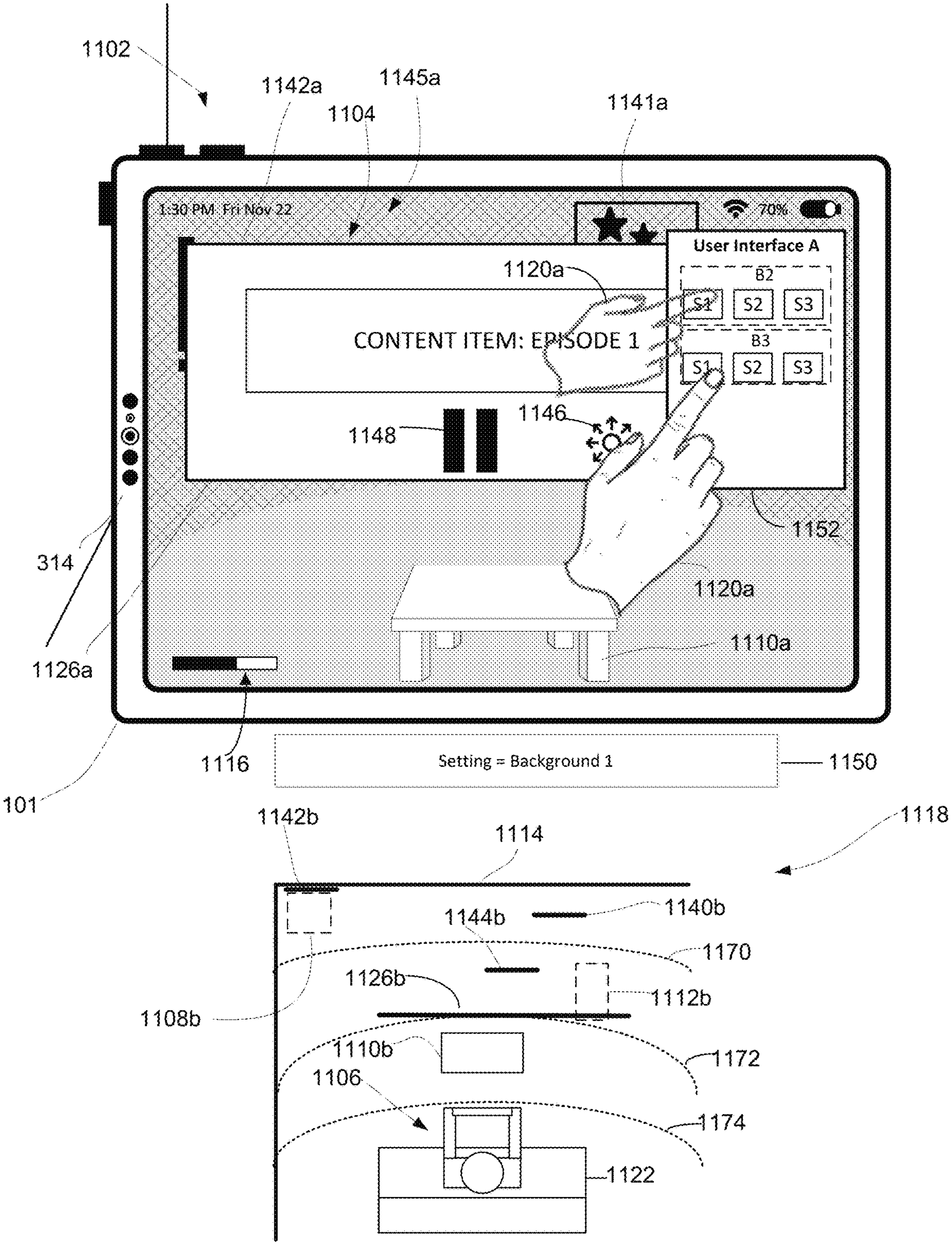

In response to receiving the request to display the virtual content 1126*a* in the expanded display mode in FIG. 11A, the computer system 101 plays the virtual content 1126*a* in the expanded display mode in FIG. 11B. In the expanded display mode of FIG. 11B, the virtual content 1126A takes up a larger portion of a field of view of the user 1106 than in the compact display mode of FIG. 11A. Further, in response to displaying the virtual content 1126*a* in the expanded display mode, the computer system 101 optionally updates a visual appearance of the virtual environment 1145*a* from the first time of day (e.g., daytime) to a second time of day (e.g., nighttime) from FIG. 11A to 11B. For example, the visual appearance of the virtual environment 1145*a* (e.g., corresponding to the classroom background or Background 1) is darkened and/or the virtual sun 1140*a* is replaced with virtual moon and stars 1140*a* corresponding to the second time of day (e.g., nighttime). In particular, the virtual environment 1145A is optionally updated to be the same simulated physical space as before, but with a visual appearance corresponding to that physical space during nighttime rather than that physical space during daytime. Thus, the display of the virtual environment 1145*a* is updated to display the same simulated physical space of the virtual environment 1145*a*, but at a different simulated time of day (e.g., nighttime rather than daytime). In some embodiments, the computer system 101 dims (e.g., darkens) portions of the physical environment 1102 displayed in the three-dimensional environment 1104. That is, portions of the three-dimensional environment 1104 outside the virtual content 1126*a* are optionally dimmed and/or darkened. In FIG. 11B, the virtual environment 1145*a* occupies the same portion of the three-dimensional environment 1104 as described with reference to FIG. 11A.

In FIG. 11B, the computer system displays user interface 1152 (e.g., user interface A) based on receiving user input. In some embodiments, the user interface 1152 includes selectable time of day options (e.g., dark mode (e.g., S1), light mode (e.g., S2), automatic mode (e.g., S3)) corresponding to a beach background (e.g., B2 or Background 2) as described with reference to method 1200. In some embodiments, the user interface 1152 includes selectable time of day options (e.g., dark mode (e.g., S1), light mode (e.g., S2), automatic mode (e.g., S3)) corresponding to a mountain background (e.g., B3 or Background 3). Selecting the dark mode (e.g., S1) optionally causes display of the beach background (e.g., B2 or Background 2) or the mountain background (e.g., B3 or Background 3) with a nighttime visual appearance. Selecting the light mode (e.g., S2) optionally causes display of the beach background (e.g., B2 or Background 2) or the mountain background (e.g., B3 or Background 3) with a daytime visual appearance. Selecting the automatic mode (e.g., S3) optionally causes display of the beach background (e.g., B2 or Background 2) or the mountain background (e.g., B3 or Background 3) based on a current time of day associated with the physical environment 1102 of the user 1106 (e.g., the current time of day at computer system 101). In some embodiments, the user interface 1152 includes a toggle for selecting a nighttime or daytime visual appearance for the virtual environment displayed and/or to be displayed by computer system 101. In response to the nighttime visual appearance being enabled (e.g., toggled on), the computer system 101 optionally displays in user interface 1152 options for selecting respective virtual environments (e.g., B1, B2, B3, B4 and/or options for other virtual environments) according to the nighttime visual appearance. In response to the daytime visual appearance being enabled (e.g., toggled on), the computer system 101 optionally displays in user interface 1152 options for selecting respective virtual environments (e.g., B1, B2, B3 and/or options for other virtual environments) according to the daytime visual appearance.

In FIG. 11B, the computer system 101 receives input from the hand 1120A of the user 1106 corresponding to a selection of the option 51 (e.g. dark mode) in B2 (e.g., beach background). Alternatively, the computer system 101 receives input from the hand 1120A of the user 1106 corresponding to a selection of the option 51 (e.g., dark mode) in B3 (e.g., mountain background). In FIG. 11B, the faded appearance of the hand 1120A indicates an alternative example, in which the computer system 101 receives the selection of the option 51 (e.g., dark mode) in B3 (e.g., mountain background).

Figure 11C:
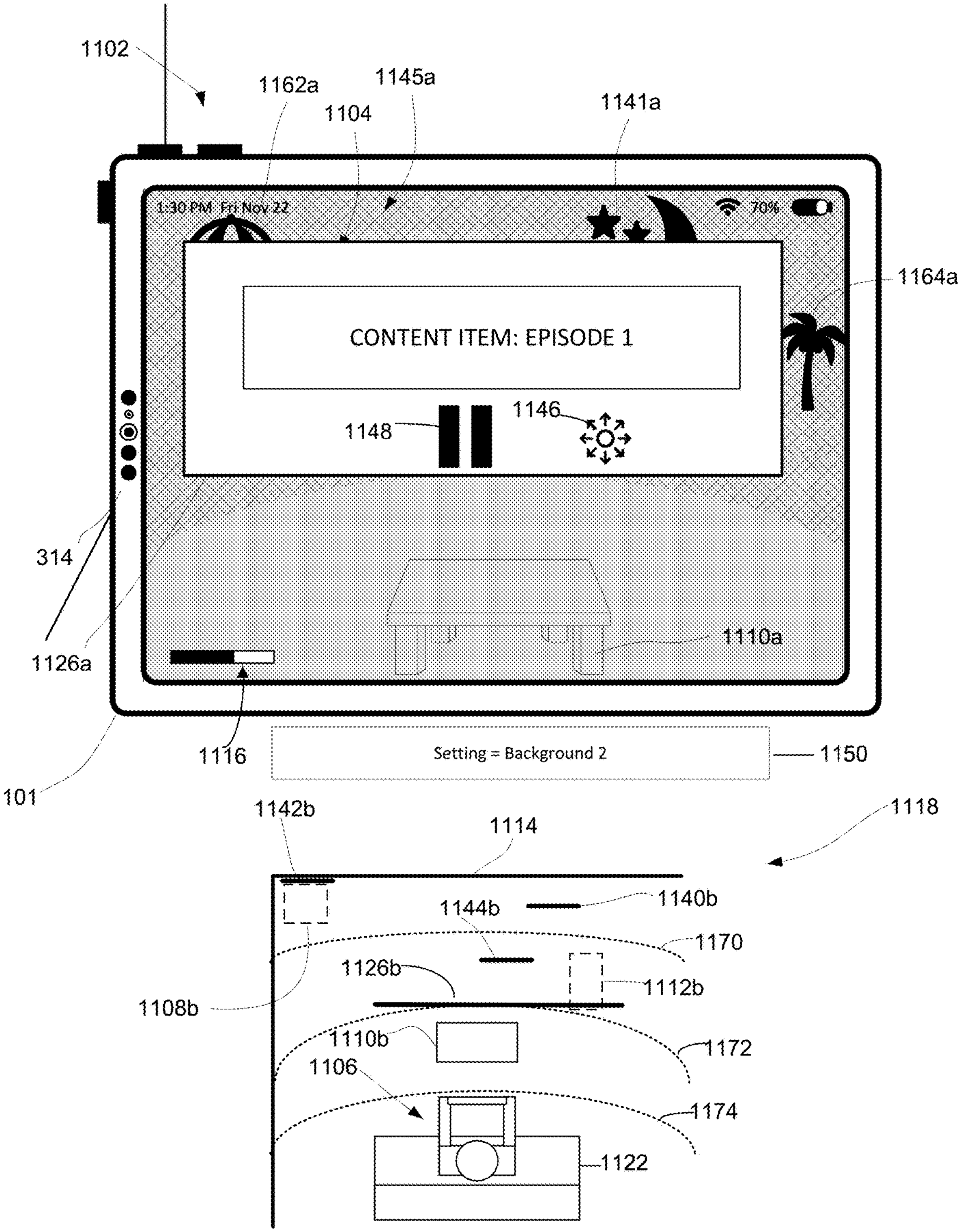

Based on the selection of the option 51 (e.g., dark mode) in B2 (e.g., beach background) in FIG. 11B, computer system 101 displays the virtual environment 1145*a* in FIG. 11C that includes the beach background during nighttime, such that the computer system 101 optionally displays a virtual umbrella 1162*a* and a virtual palm tree 1164*a* in FIG. 11C. In dark mode, the beach background is darkened and/or includes the virtual moon and stars 1140*a* (e.g., corresponding to the simulated physical space of the beach, at nighttime). Further, the computer system 101 optionally dims (e.g., darkens) portions of the physical environment 1102 displayed in the three-dimensional environment 1104. In FIG. 11C, because the beach background (e.g., Background 2) is available as a system virtual environment 1150 for computer system 101 (e.g., as described in more detail with reference to method 1200), the computer system 101 optionally updates the system virtual environment 1150 to be the beach background (e.g., Background 2). In some embodiments, if the beach background (e.g., Background 2) were not available as a system virtual environment 1150, then the computer system 101 would optionally maintain the system virtual environment 1150 as the previously selected system virtual environment (e.g., classroom background or Background 1). In FIG. 11C, the virtual environment 1145*a* occupies the same portion of the three-dimensional environment 1104 as described with reference to FIG. 11A.

Figure 11D:
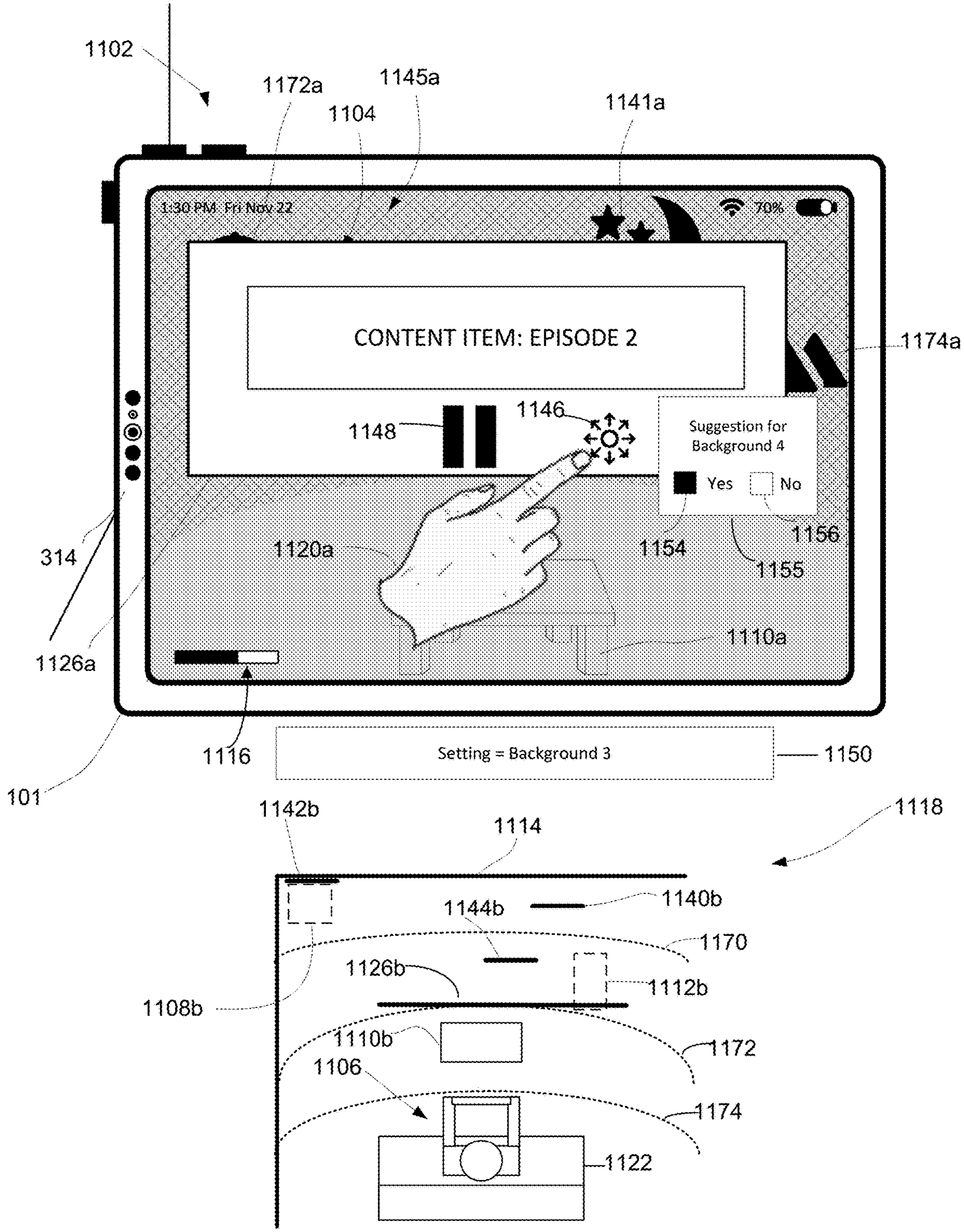

In response to the selection of the option S1 (e.g., dark mode) in B3 (e.g., mountain background) in FIG. 11B, computer system 101 displays the virtual environment 1145*a* in FIG. 11D that includes the mountain background during nighttime, such that the computer system 101 optionally displays a virtual tree 1172*a* and virtual mountains 1174*a* in FIG. 11D. In dark mode, the mountain background is darkened and/or includes the virtual moon and stars 1140*a* (e.g., corresponding to the simulated physical space of the mountain scene, at nighttime). Further, the computer system 101 optionally dims (e.g., darkens) portions of the physical environment 1102 displayed in the three-dimensional environment 1104. In FIG. 11D, because the mountain background (e.g., Background 3) is available as a system virtual environment 1150 for computer system 101, the computer system 101 optionally updates the system virtual environment 1150 to be the mountain background (e.g., Background 3). In FIG. 11D, the virtual environment 1145*a* occupies the same portion of the three-dimensional environment 1104 as described with reference to FIG. 11A.

From FIG. 11C to FIG. 11D, the virtual content 1126*a* switches from a first episode to a second episode of the television series. Based on the second episode starting to play or playing, the computer system 101 optionally displays a prompt 1155 indicating a suggestion to switch to a different virtual environment (e.g., sports event background, Background 4, or B4) based on detecting a different segment (e.g., second episode) of the virtual content 1126*a*. The prompt 1155 includes a yes affordance 1154 and a no affordance 1156. Further, in FIG. 11D, the computer system 101 optionally receives input from a hand 1120A of the user 1106 directed to the expanded display mode toggle 1146 corresponding to a request to exit the expanded display mode (e.g., and instead display the virtual content 1126A in the compact display mode).

Figure 11E:
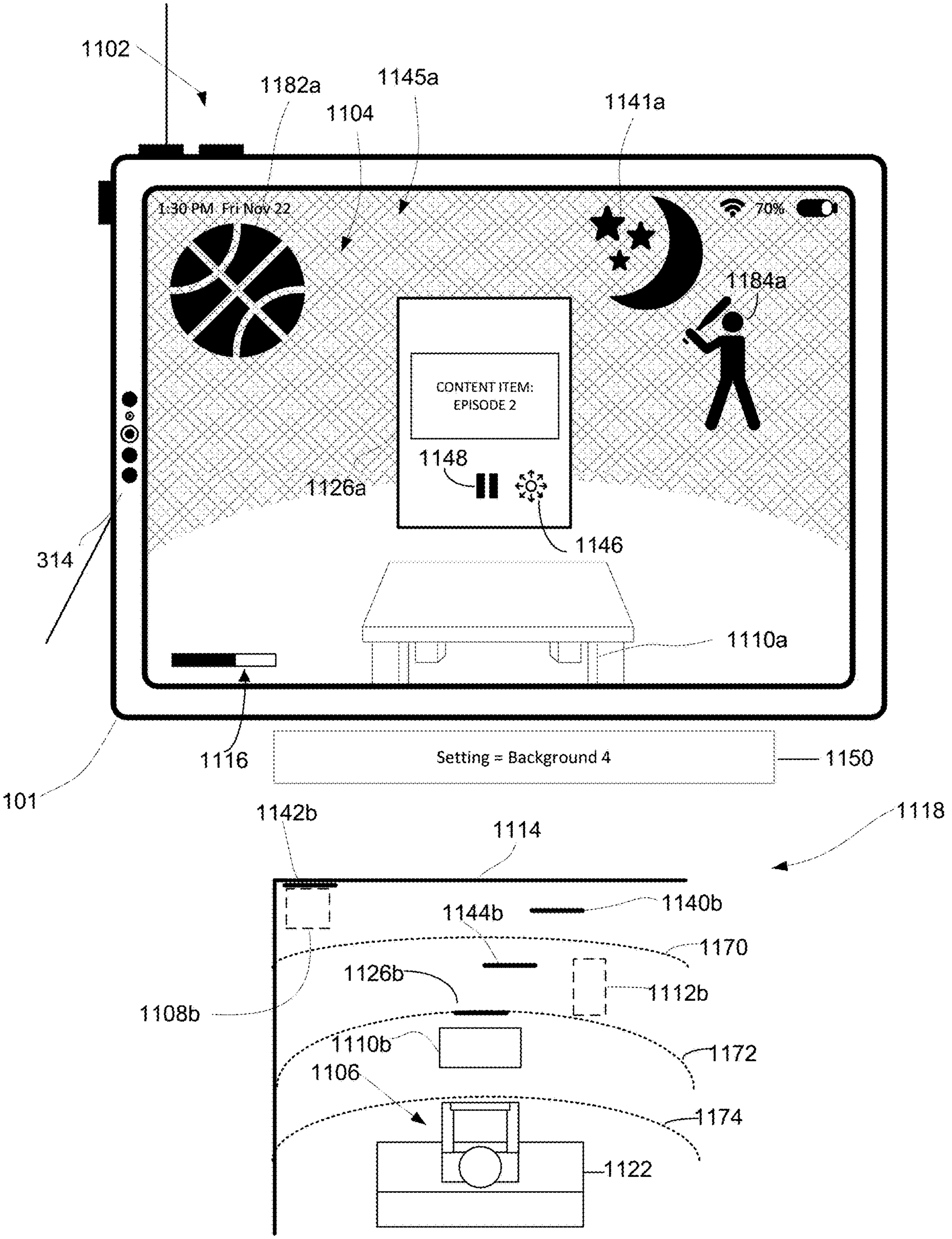

In response to receiving input corresponding to a selection of the yes affordance 1154, the computer system 101 displays the virtual environment 1145*a* as the sports event background (e.g., Background 4) in FIG. 11E. The computer system 101 optionally displays a virtual basketball 1182*a* and a virtual baseball player 1184*a* in FIG. 11E. In FIG. 11E, because the sports event background (e.g., Background 4) is available as a system virtual environment 1150 for computer system 101, the computer system 101 optionally updates the system virtual environment 1150 to be the sports event background (e.g., Background 4). Further, in response to receiving the request to exit the expanded display mode in FIG. 11D, the computer system 101 optionally displays the virtual content 1126*a* (e.g., second episode) in a compact display mode, as shown in FIG. 11E. Because the virtual content is no longer displayed in the expanded display mode in FIG. 11E, the computer system 101 optionally does not dim the physical environment 1102 despite the sports event background (e.g., Background 4) being displayed in the nighttime mode. Further, in FIG. 11B, the virtual environment 1145*a* occupies the same portion of the three-dimensional environment 1104 as described with reference to FIG. 11A.

FIGS. 11F-11I illustrate examples of a computer system that, in response to receiving the request to display the virtual content in the expanded display mode, visually reduces a visual prominence of a three-dimensional environment while a view of the three-dimensional environment is a first view and then visually increases the visual prominence of the three-dimensional environment, with the content in the expanded display mode (e.g., full screen) at a different view of the three-dimensional environment in accordance with some embodiments.

Turning back, in FIG. 11A, computer system 101 receives the request to display the virtual content 1126*a* in the expanded display mode (e.g., described above). When computer system 101 receives the request of FIG. 11A, the viewpoint of the user is a first viewpoint of the user (e.g., the view of three-dimensional environment 1104 is a first view that includes a first set of virtual elements at a first set of locations relative to the first viewpoint of the user). For example, in the view of the three-dimensional environment in FIG. 11A, the virtual window through which the virtual sun 1140*a* is presented is at a first location in the view of three-dimensional environment 1104 and virtual bookshelf 1142*a* is presented at a second location in the view of in three-dimensional environment 1104 relative to the viewpoint of the user in FIG. 11A.

Figure 11F:
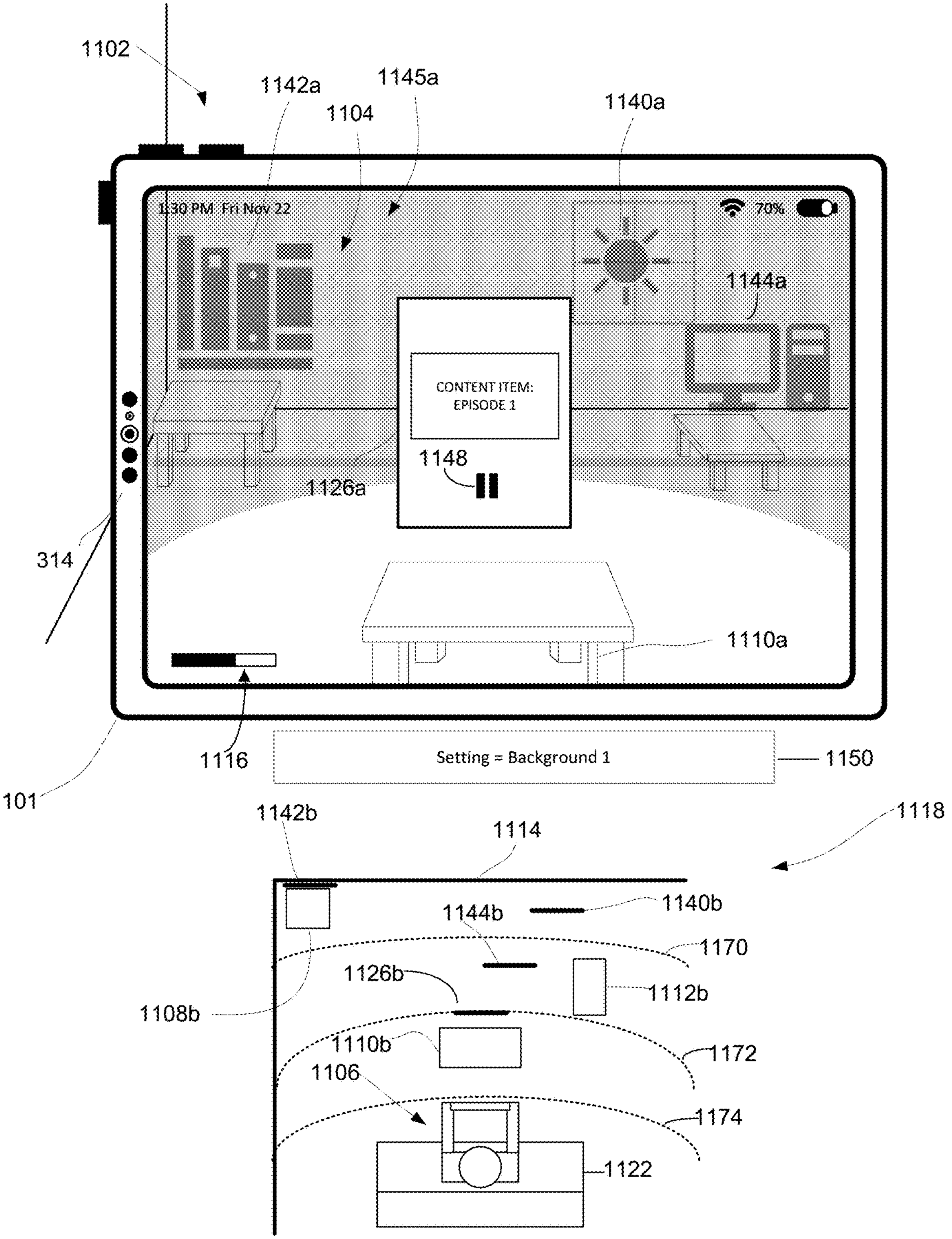

Moving on to FIG. 11F, in response to receiving the request to display the virtual content 1126*a* in the expanded display mode in FIG. 11A, the computer system 101 reduces a visual prominence (e.g., fades out, increases a respective translucency, increases a transparency, decreases a color saturation, and/or decreases a brightness) of the three-dimensional environment 1004 (e.g., of virtual environment 1145*a*) while the viewpoint of the user is the first viewpoint of the user (e.g., as described and illustrated with reference to FIG. 11A), as shown in FIG. 11F. As such, computer system optionally maintains the first viewpoint of the user (e.g., the view of the three-dimensional environment 1104 shown in FIG. 11A) while reducing in visual prominence the three-dimensional environment 1104. For example, in FIG. 11F, at the illustrated level of reduced visual prominence, computer system 101 is displaying the virtual window through which virtual sun 1140*a* is presented and virtual bookshelf 1142*a* at the same location in the view of the three-dimensional environment 1104 as in FIG. 11A.

Further, in FIG. 11F, corner table 1108 and side table 1112 in physical environment 1102 become visible because the portion of three-dimensional environment 1104 that computer system 101 reduces in visual prominence (e.g., three-dimensional environment outside of the virtual content 1126*a*) includes a portion that obscures from visibility the corner table 1108 and side table 1112 in physical environment 1102. Also, in some embodiments, computer system 101 reduces the visual prominence of the virtual content 1126*a* concurrent with the reduction in visual prominence of the three-dimensional environment illustrated in FIGS. 11A and 11I.

Figure 11G:
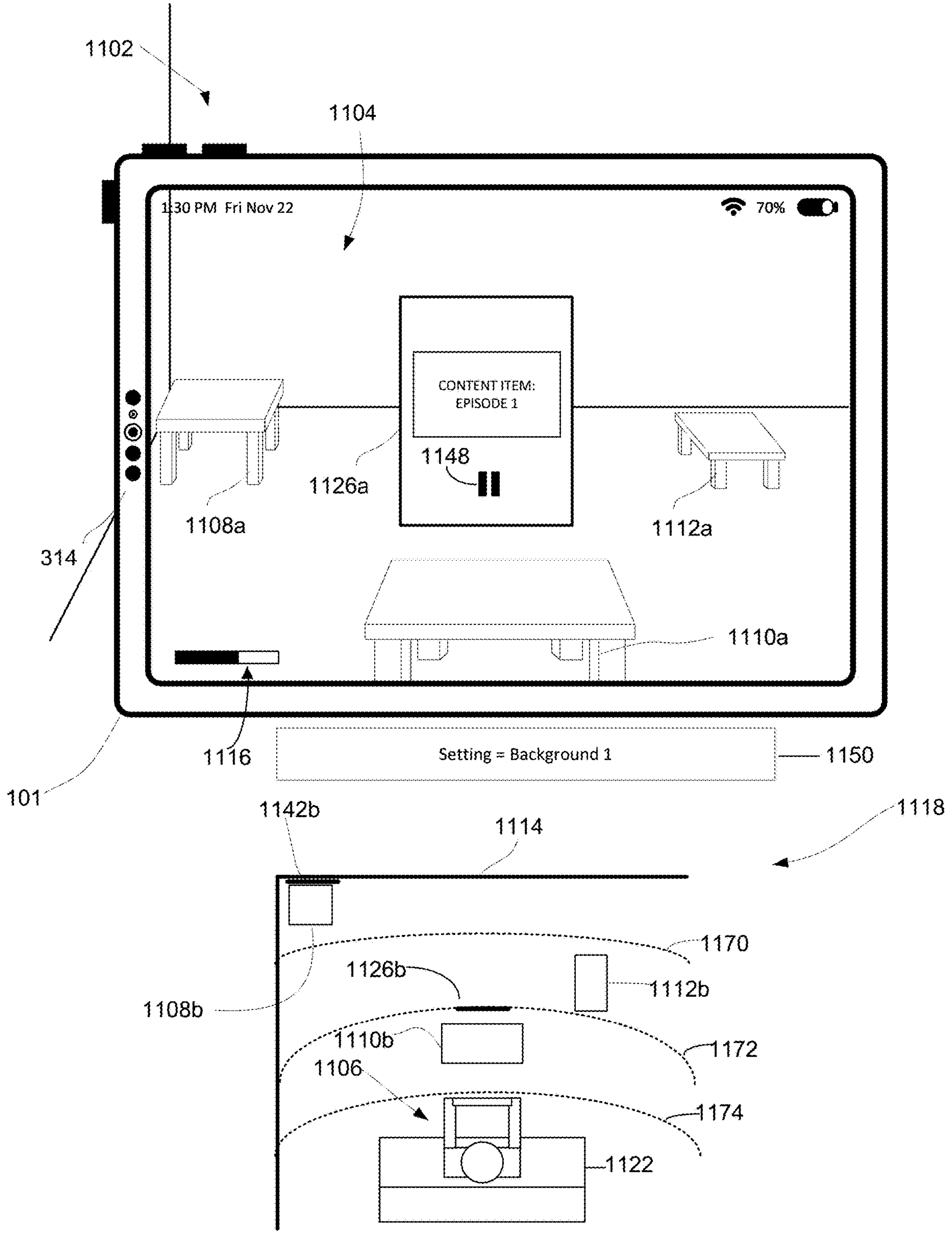

In some embodiments, computer system 101 continues to reduce in visual prominence the three-dimensional environment 1104 until the computer system 101 ceases display of three-dimensional environment 1104, such as shown in FIG. 11G. In FIG. 11G, corner table 1108 and side table 112 are not obscured by any virtual content in the viewpoint of the user of FIG. 11G. In some embodiments, computer system 101 ceases display of virtual content 1126*a* concurrent with the ceasing of display of the three-dimensional environment illustrated in FIGS. 11A and 11I (e.g., computer system 101 fades-out virtual content 1126*a* concurrent with fading-out of the three-dimensional environment 1104 illustrated from FIG. 11A to FIG. 11F, and from FIG. 11F to FIG. 11G). As such, computer system 101 optionally reduces in visual prominence completely (e.g., fades-out completely) three-dimensional environment 1104 (e.g., virtual environment of three-dimensional environment 1104), optionally including reducing in visual prominence completely virtual content 1126*a* along with the reducing of visual prominence of three-dimensional environment 1104, having the first viewpoint of the user (e.g., as illustrated and discussed with reference to FIGS. 11A and 11F) in response to receiving the request to display the virtual content 1126*a* in the expanded display mode (e.g., described above).

Figure 11H:
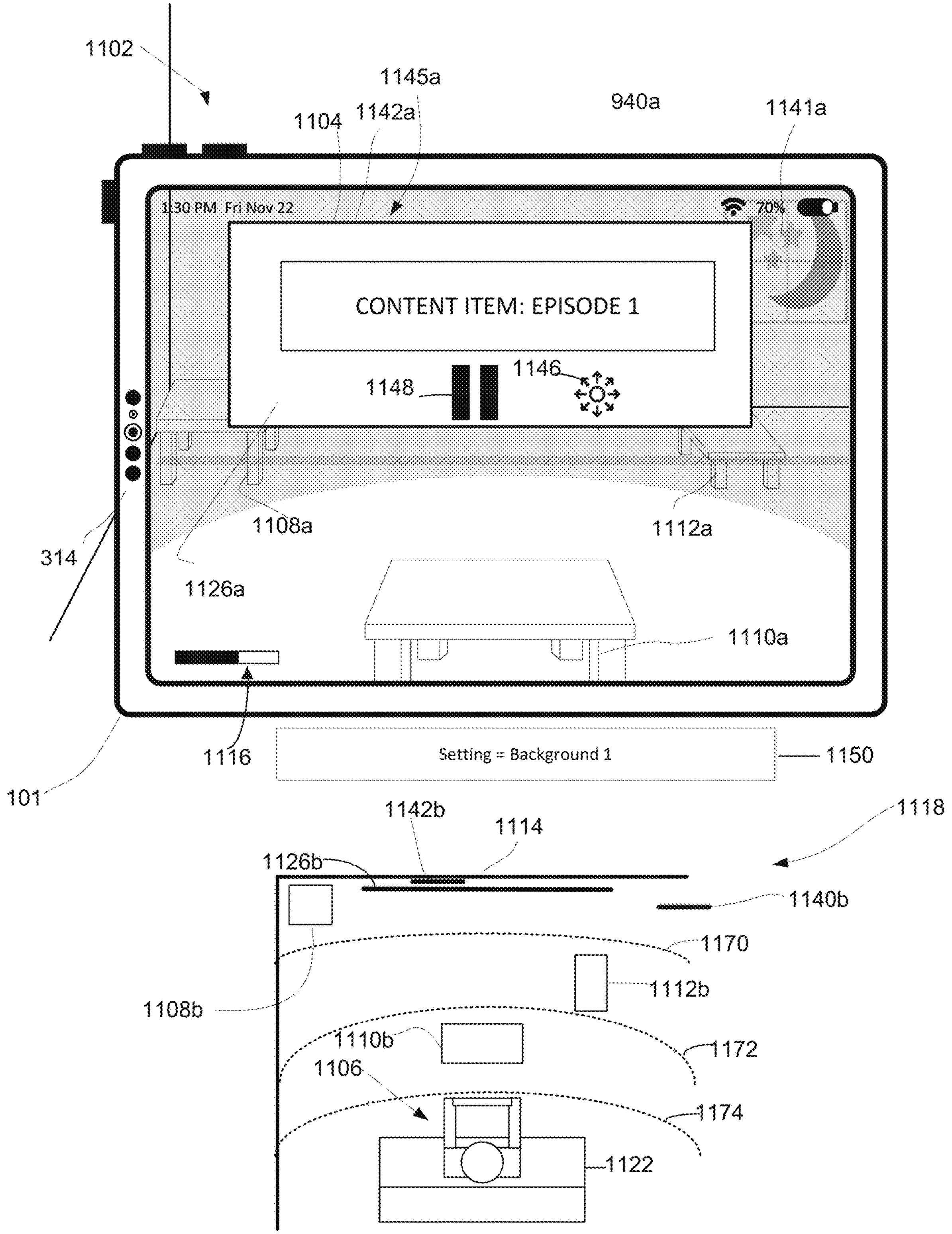

After reducing the visual prominence of three-dimensional environment 1104, optionally including reducing in visual prominence virtual content 1126*a* along with the reducing of visual prominence of three-dimensional environment 1104, while the viewpoint of the user is the first viewpoint of the user, as illustrated and described with reference to FIGS. 11A, 11F, and 11G, computer system 101 increases the visual prominence (e.g., fades in, decreases a respective translucency, decreases a transparency, increases a color saturation, and/or increases a brightness) of three-dimensional environment 1104 at a second viewpoint of the user different from the first viewpoint of the user (e.g., as illustrated and discussed with reference to FIGS. 11A and 11F), including displaying (e.g., increasing a visual prominence of or fading in) virtual content 1126 in the expanded mode, such as shown in FIG. 11H.

In FIG. 11H, computer system 101 displays three-dimensional environment 1104 relative to a second viewpoint of the user different from the first viewpoint of the user described above. For example, in FIG. 11H, at the illustrated level of visual prominence of three-dimensional environment 1104, computer system 101 is displaying the virtual window through which the virtual sun 1140*a* was presented at a different location (e.g., a location that is rightward of the location of the window in FIGS. 11A and 11F). In addition, due to the shift in viewpoint of the user from the first viewpoint of the user to the second viewpoint of the user, from the second viewpoint of the user, virtual bookshelf 1142*a* is not visible (e.g., the location of virtual window in FIG. 11F is rightward of the location of virtual bookshelf 1142*a* in FIG. 11A and FIG. 11F) because of the display of virtual content 1126*a*. In some embodiments, computer system 101 fades-in virtual content 1126*a* in the expanded mode concurrent with the fading-in of three-dimensional environment 1104 of FIGS. 11H and 11I. In some embodiments, computer system 101 visual simulates moving virtual content 1126*a* into the view (e.g., simulating flying-in virtual content 1126*a* to a specific location in the view, such as to the location illustrated in FIG. 11F).

Figure 11I:
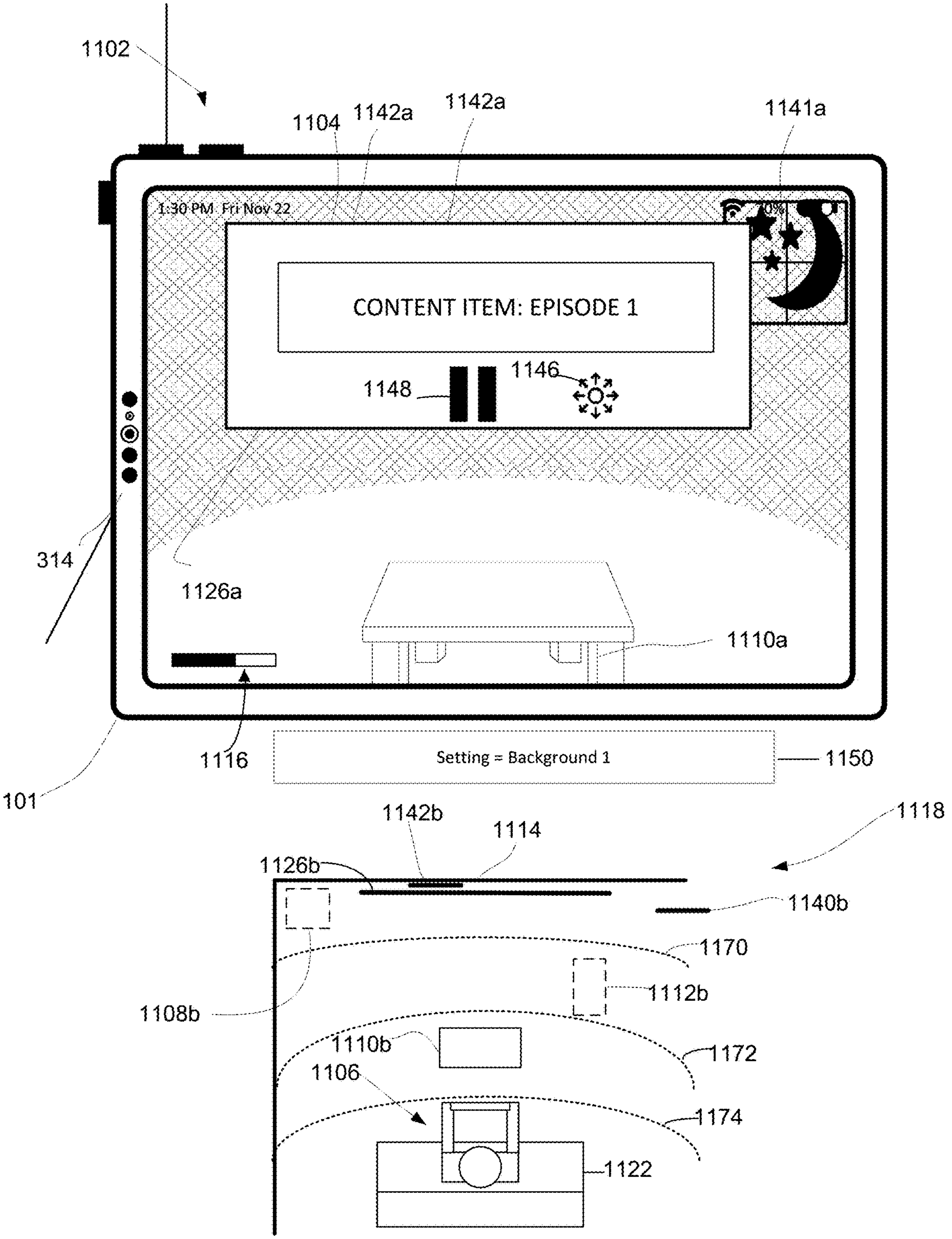
Figure 12A:
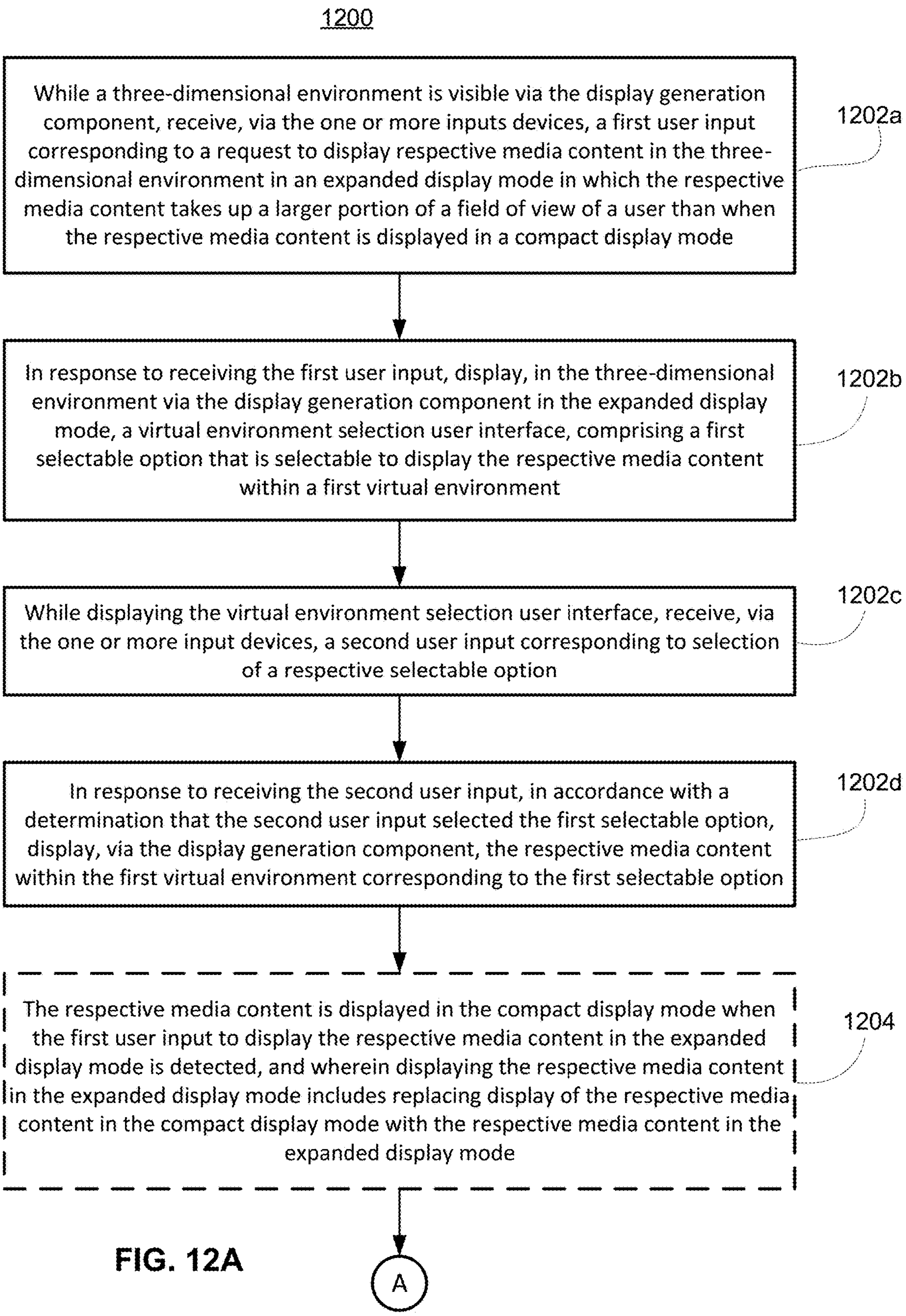
FIGS. 12A-12E is a flowchart illustrating a method of displaying a content item in an expanded display mode (e.g., full screen) in accordance with some embodiments.
Figure 12B:
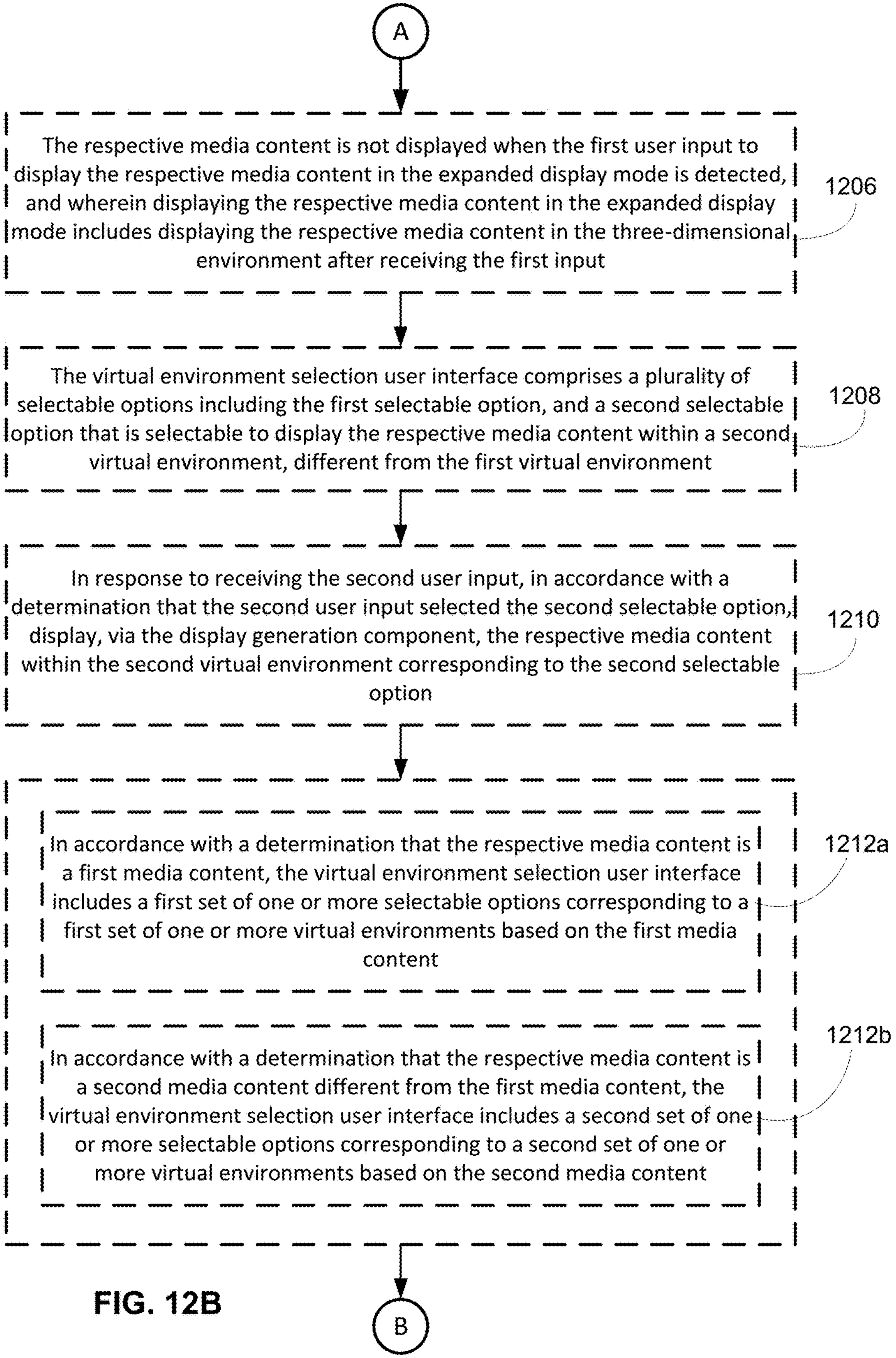
Figure 12C:
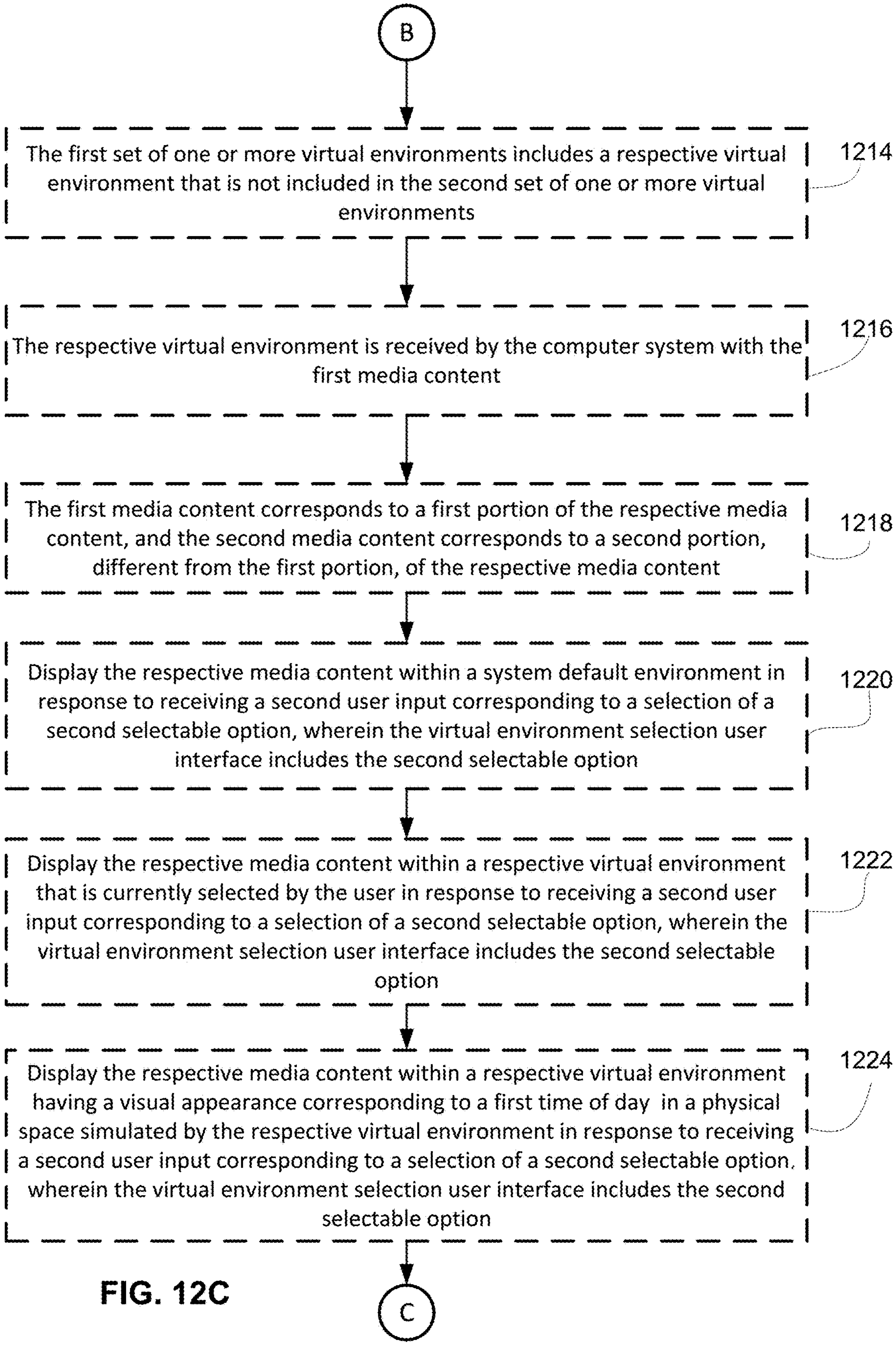
Figure 12D:
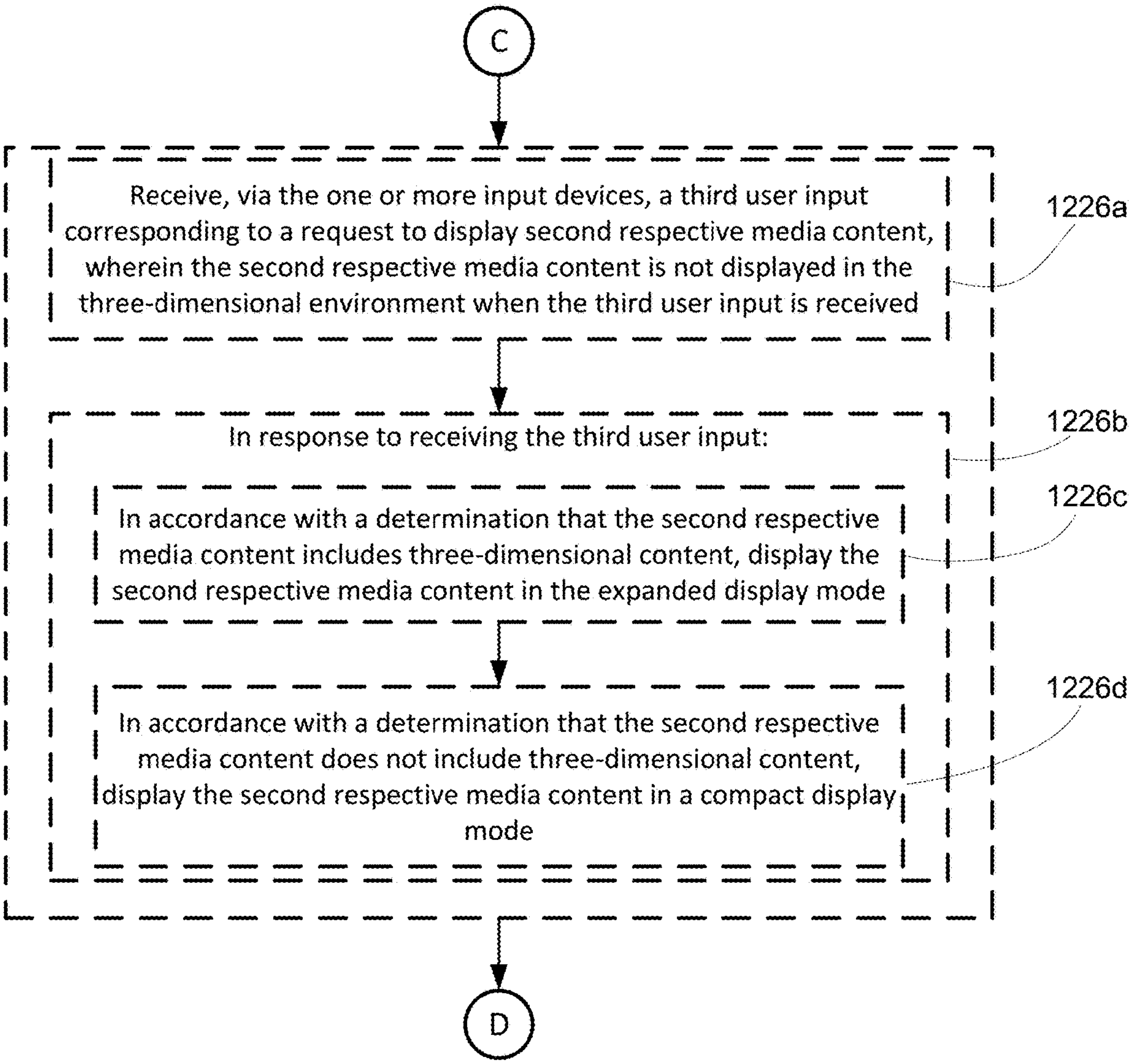
Figure 12E:
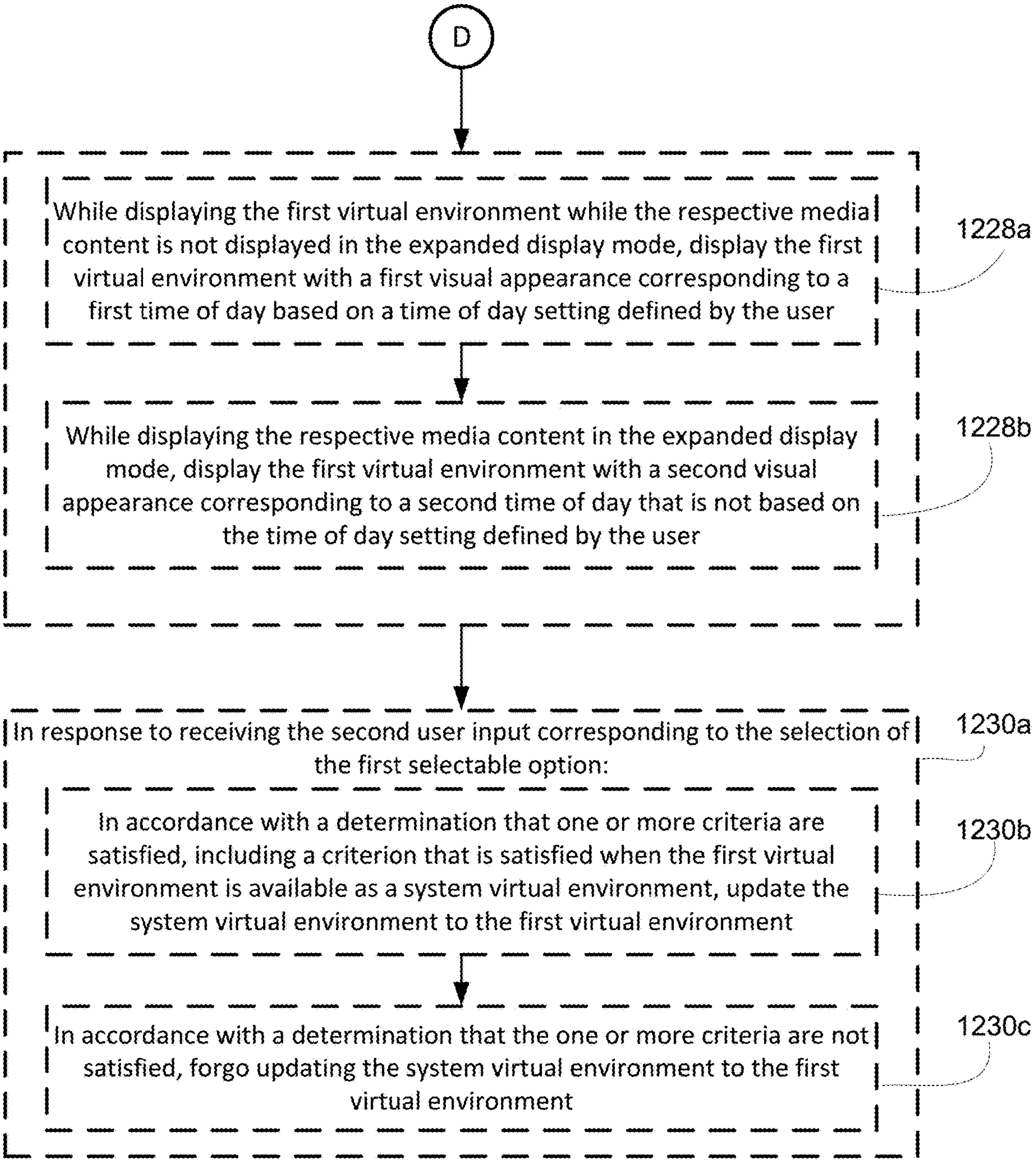

Further, in some embodiments, computer system 101 continues to increase in visual prominence three-dimensional environment 1104 until the visual prominence is the same amount as the amount of visual prominence when the request to display virtual content 1126*a* in expanded mode was received. In some embodiments, computer system 101 continues to increase in visual prominence three-dimensional environment 1104 until the visual prominence is a predefined or preset amount (that, is optionally determined by the three-dimensional environment 1104 and/or computer system 101, or by the user of computer system 101), such as shown in FIG. 11I. Also, in FIG. 11I, just like in FIG. 11A, corner table 1108 and side table 1112 in physical environment 1102 are not visible because of the visual prominence of three-dimensional environment 1104 displayed by computer system 101.

As such, in response to detecting the request to display the virtual content 1126*a* in the expanded display mode in FIG. 11A, computer system 101 optionally reduces in visual prominence the three-dimensional environment 1104 while the viewpoint of the user is the first viewpoint of the user (e.g., as illustrated and discussed with reference to FIGS. 11A and 11F), and increases the visual prominence of three-dimensional environment 1104 at the second viewpoint of the user (e.g., as illustrated and discussed with reference to FIGS. 11H and 11I), including displaying virtual content 1126 in the expanded mode, such as shown in FIG. 11H and described further with reference to method 1200.

FIGS. 11F-11H are described further with reference to method 1200.

FIGS. 12A-12E is a flowchart illustrating a method 1200 of generating alerts associated with physical objects in an environment of a user in accordance with some embodiments. In some embodiments, the method 1200 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1200 are, optionally, combined and/or the order of some operations is, optionally, changed.

In some embodiments, the method 1200 is performed at a computer system, such as computer system 101 in FIG. 1, in communication with a display generation component and one or more input devices. In some embodiments, the computer system has one or more of the characteristics of the computer systems of methods 800, 1000, 1400, 1600 and/or 1800. In some embodiments, the display generation component has one or more of the characteristics of the display generation component of methods 800, 1000, 1400, 1600 and/or 1800. In some embodiments, the one or more input devices have one or more of the characteristics of the one or more input devices of methods 800, 1000, 1400, 1600 and/or 1800.

In some embodiments, while a three-dimensional environment, such as three-dimensional environment 1104 in FIGS. 11A and 11A1, is visible (e.g., in some embodiments, the three-dimensional environment has one or more of the characteristics of the three-dimensional environments of methods 800, 1000, 1400, 1600 and/or 1800) via the display generation component (e.g., the three-dimensional environment includes at least the respective portion of the physical environment of the user of the computer system, and optionally some virtual content displayed by the computer system, where the virtual content is not obscuring the respective portion of the physical environment. In some embodiments, the virtual content includes one or more of user interfaces of applications, content (e.g., photographs, images, videos, movies or TV shows) being played at the computer system in a mode that does not obscure (e.g., is not overlapping with, from the viewpoint of the user) the respective portion of the physical environment (e.g., a non-full screen mode), representations (e.g., avatars) of other users whose computer systems are in a communication session with the computer system and/or three-dimensional representations or models of objects such as a car, a tent, a building or a tree), the computer system receives (1202*a*), via the one or more inputs devices, a first user input corresponding to a request to display respective media content (e.g., image or photograph, video, and/or audio content such as movies, TV shows, or advertisements) in the three-dimensional environment in an expanded display mode, such as by hand 1120 enabling expanded display mode toggle 1146 in FIGS. 11A and 11A1, in which the respective media content takes up a larger portion of a field of view of a user, such as virtual content 926*a* in expanded display mode in FIG. 11B, than when the respective media content is displayed in a compact display mode, such as virtual content 926*a* in compact display mode in FIGS. 11A and 11A1. In some embodiments, the first user input includes an air gesture provided by a hand of a user or a handheld device directed towards a selectable option associated with displaying the respective media content in full screen in the three-dimensional environment (e.g., tapping or pointing with a finger of the hand or the handheld device at the selectable option). In some embodiments, the first user input includes an air pinch gesture performed by a hand of the user while attention of the user is directed to the selectable object. In some embodiments, the first user input is an attention-only and/or gaze-only input (e.g., not including input from one or more portions of the user other than those portions providing the attention input). In some embodiments, displaying the respective media content in full screen in the three-dimensional environment includes replacing display of the respective media content in the compact display mode with the respective media content in the expanded display mode (e.g., full screen). When displaying the respective media content in full screen in the three-dimensional environment, the visibility of the physical environment of the user is optionally reduced or non-existent.

In some embodiments, in response to receiving the first user input, the computer system displays (1202*b*), in the three-dimensional environment via the display generation component in the expanded display mode, a virtual environment selection user interface, such as user interface 1152 in FIG. 11B (e.g., a menu that includes selectable options associated with selection of various virtual environments to display with the respective media content and/or selectable options associated with visual appearances of those various virtual environments, such as dark or light modes described with reference to methods 800 and/or 1000. In some embodiments, the virtual environment selection user interface has one or more of the characteristics of the user interfaces for selecting virtual environments and/or virtual environment appearances described with reference to methods 800, 1000, 1400, 1600 and/or 1800), comprising a first selectable option that is selectable to display the respective media content within a first virtual environment, such as B2 in user interface 1152 in FIG. 11B. In some embodiments, the first virtual environment has one or more of the characteristics of the virtual environments of methods 800, 1000, 1400, 1600, and/or 1800. In some embodiments, when the respective media content is displayed in a "full screen" mode (e.g., corresponding to the first input), the three-dimensional environment replaced or occupied by the first (or other) virtual environment that is selected by the second user input, below. Thus, in some embodiments, the respective media content is displayed at a location within the first (or other) virtual environment. In some embodiments, the first (or other) virtual environments were not displayed prior to receiving the first or second (below) inputs.

In some embodiments, while displaying the virtual environment selection user interface, the computer system receives (1202*c*), via the one or more input devices, a second user input corresponding to selection of a respective selectable option, such as hand 1120*b* directed to option S1 in B2 in FIG. 11B. In some embodiments, the second user input includes an air gesture provided by a hand of a user or a handheld device directed towards the first selectable option associated with displaying the first virtual environment (e.g., tapping or pointing with a finger of the hand or the handheld device at the first selectable option). In some embodiments, the second user input has one or more of the characteristics of the first user input. In some embodiments, in response to receiving the second user input, in accordance with a determination that the second user input selected the first selectable option, the computer system displays (1202*d*), via the display generation component, the respective media content within the first virtual environment, such as Background 2 in FIG. 11C, corresponding to the first selectable option (e.g., the computer system displays the first virtual environment by replacing the three-dimensional environment (e.g., prevents display or reduces visibility of the physical environment) and displays the respective media content within the first virtual environment). In some embodiments, prior to receiving the first and/or second inputs, the respective media content is not displayed in the three-dimensional environment. In some embodiments, prior to receiving the first and/or second inputs, the respective media content is displayed at a smaller size (e.g., occupies a smaller portion of the three-dimensional environment) than the respective media displayed after receiving the first and/or second inputs. In some embodiments, prior to receiving the first and/or second inputs, the respective media content is displayed within the first virtual environment, such that the first virtual environment occupies a smaller portion of the three-dimensional environment than after receiving the first and/or second inputs. Automatically providing various options to select an environment when entering a full screen or expanded display mode during media consumption provides a more immersive experience for the user, reduces the number of inputs needed to select an environment, reduces distractions outside of the respective media content, and improves user-device interactions.

In some embodiments, the respective media content is displayed in the compact display mode when the first user input to display the respective media content in the expanded display mode (e.g., the respective media takes up a smaller space of a user interface in the expanded display mode than in the compact display mode) is detected (e.g., initially or prior to displaying the respective media content in the expanded display mode), and wherein displaying the respective media content in the expanded display mode includes replacing display of the respective media content in the compact display mode with the respective media content in the expanded display mode, such as virtual content 1126*a* in compact display mode in FIGS. 11A and 11A1 is replaced by virtual content 1126*a* in expanded display mode in FIG. 11B (1204) (e.g., the respective media takes up a larger space of the user interface in the expanded display mode than in the compact display mode or the respective media content takes up the entirety of space of the user interface in the expanded display mode). Displaying media content in a compact display mode prior to displaying the media content in the expanded display mode prevents interruption of user consumption of the media content, and maintains consistency in the display of content in the user interface, thereby improving user-device interactions.

In some embodiments, the respective media content is not displayed when the first user input to display the respective media content in the expanded display mode is detected, and wherein displaying the respective media content in the expanded display mode includes displaying the respective media content in the three-dimensional environment after receiving the first input, such as displaying virtual content 1126*a* in three-dimensional environment 1104 after receiving first input in FIGS. 11A and 11A1 (1206). In some embodiments, the respective media content is displayed in the expanded display mode (e.g., full screen) without being displayed in the compact display mode after receiving the first input. When displaying the respective media content in full screen in the three-dimensional environment, the visibility of the physical environment of the user is optionally reduced or non-existent. Allowing for display of the media content in the expanded display mode before first displaying the content in the compact display mode reduces the number of inputs needed to display the media content in the expanded display mode.

In some embodiments, the virtual environment selection user interface comprises a plurality of selectable options including the first selectable option, such as B2 in user interface 1152 in FIG. 11B, and a second selectable option that is selectable to display the respective media content within a second virtual environment, such as B3 in user interface 1152 in FIG. 11B, different from the first virtual environment (1208). In some embodiments, in response to detecting selection of the second selectable option, the respective media content is displayed within the second virtual environment. In some embodiments, the virtual environment selection user interface (e.g., menu) includes a visual representation (e.g., preview) for each selectable option corresponding to a respective virtual environment. In some embodiments, a respective visual representation (e.g., preview) corresponds to respective time of day (e.g., dark mode such as dusk or midnight or light mode such as dawn or afternoon) for a respective virtual environment. For example, the virtual environment selection user interface optionally includes any suitable number of selectable options such as three selectable options corresponding to a beach environment (e.g., the first selectable option), a mountain environment (e.g., the second selectable option), and a library environment (e.g., a third selectable option). In some embodiments, in response to receiving a user input for a selection of a time of day setting (e.g., via a user interface element such as a toggle to select a dark mode, a light mode, or an automatic mode), the respective representation of the respective virtual environment reflect the selected time of day setting. For example, in response to receiving the selection of the dark mode, the virtual environment selection user interface optionally displays (e.g., in the corresponding selectable options) a first visual representation of the beach environment in the dark mode, a second visual representation of the mountain environment in dark mode, and a third visual representation of the library environment in dark mode. In some embodiments, in accordance with the selection of the time of day setting, a portion or the entirety of the three-dimensional environment or a virtual environment behind the virtual environment selection user interface is updated to reflect the selection of the time of day setting. Providing a menu to select from various virtual environments allows a user to efficiently customize a virtual environment experience during media consumption.

In some embodiments, in response to receiving the second user input, in accordance with a determination that the second user input selected the second selectable option, such as B3 in user interface 1152 in FIG. 11B, the computer system displays, via the display generation component, the respective media content within the second virtual environment, such as Background 3 in FIG. 11D, corresponding to the second selectable option (1210). In some embodiments, the second user input includes an air gesture provided by a hand of a user or a handheld device directed towards the second selectable option associated with displaying the second virtual environment (e.g., tapping or pointing with a finger of the hand or the handheld device at the second selectable option). The second virtual environment (e.g., mountain environment) is optionally different than the first virtual environment (e.g., beach environment). In some embodiments, the second virtual environment corresponds to the same time of day setting (e.g., dark mode) as the first virtual environment. In some embodiments, the second virtual environment corresponds to a first time of day setting (e.g., dark mode), and the first virtual environment corresponds to a second time of day setting (e.g., light mode). Providing respective options (e.g., second selectable option) to select different virtual environments (e.g., second virtual environment) allows a user to efficiently customize a virtual environment experience during media consumption.

In some embodiments, in accordance with a determination that the respective media content is a first media content (e.g., a first television series, a first episode of the first television series, a first portion of the first episode, a first movie, or a first portion of the first movie), the virtual environment selection user interface includes (1212*a*) a first set of one or more selectable options corresponding to a first set of one or more virtual environments, such as B2 and B3 in FIG. 11B, based on the first media content (e.g., and not the below-described second set of one or more selectable options). In some embodiments, in accordance with a determination that the respective media content is a second media content (e.g., a second television series, a second episode of the first television series, a second portion of the first episode, a second movie, or a second portion of the first movie) different from the first media content, the virtual environment selection user interface includes (1212*b*) a second set of one or more selectable options corresponding to a second set of one or more virtual environments based on the second media content, such as B4 and B5 in user interface 1152 corresponding if virtual content 1126*a* includes second media in FIG. 11B (e.g., and not the first set of one or more selectable options). In some embodiments, the first set of one or more virtual environments are different than the second set of one or more virtual environments. For example, the first set of one or more virtual environments optionally include a beach environment, a lake environment, and/or a swimming pool environment, and the second set of one or more virtual environments optionally include a mountain environment, a canyon environment, and/or a valley environment. In some embodiments, the first set of one or more virtual environments are similar to the second set of one or more virtual environments. Providing different virtual environment(s) for different types of media content reduces erroneous inputs for displaying media content in erroneous virtual environments.

In some embodiments, the first set of one or more virtual environments includes a respective virtual environment that is not included (or multiple respective virtual environments that are not included) in the second set of one or more virtual environments, such as B2 not included if virtual content 1126*a* includes a second media content in FIG. 11B (1214). In some embodiments, the first set of one or more virtual environments are specific to the first media content, and the second set of one or more virtual environments are specific to the second media content, such that the first media content cannot be displayed within the second set of one or more virtual environments and/or the second media content cannot be displayed within the first set of one or more virtual environments. Providing virtual environment(s) specific to a media content reduces erroneous inputs for displaying media content in erroneous virtual environments.

In some embodiments, the respective virtual environment is received by the computer system with the first media content, such as Background 1 received with virtual content 1126*a* in FIGS. 11A and 11A1 (and the respective virtual environment is optionally not available to be displayed with virtual content other than the first media content) (1216). The respective virtual environment is optionally streamed and/or downloaded with the first media content to the computer system. In some embodiments, the respective virtual environment is displayed as an option in a virtual environment selection user interface if the first media content is not displayed (e.g., but not if a user interface of an application other than a media content playback application is displayed or a different media content than the first media content is displayed). Providing a respective virtual environment along with a respective media content reduces the number of inputs needed to access the respective virtual environment, and avoids resources consumed to download or store erroneous virtual environments.

In some embodiments, the first media content corresponds to a first portion of the respective media content, such as virtual content 1126*a* including a first episode in FIG. 11B (e.g., a first television series, a first episode of the first television series, a first portion of the first episode, or a first portion of the first movie), and the second media content corresponds to a second portion, such as virtual content 1126*a* including a second episode in FIG. 11D (e.g., a second television series, a second episode of the first television series, a second portion of the first episode, a second movie, or a second portion of the first movie), different from the first portion, of the respective media content (1218). In some embodiments, the first portion of the respective media content corresponds to a different virtual environment than the second portion of the respective media content. In some embodiments, the first portion of the respective media content corresponds to the same virtual environment as the second portion of the respective media content. Updating a virtual environment for a respective segment of a media content reduces erroneous inputs for displaying segments of media content in erroneous virtual environments.

In some embodiments, the computer system displays (1220) the respective media content within a system default environment in response to receiving a second user input corresponding to a selection of a second selectable option, such as an option for displaying virtual content 1126*a* in system default environment in user interface 1152 in FIG. 11B, wherein the virtual environment selection user interface includes the second selectable option (e.g., same as or different than the first selectable option described with respect to step(s) 1202). In some embodiments, the computer system receives an input for selecting the second selectable option. In some embodiments, in response to receiving the input for selecting the second selectable option, the computer system displays the respective media content in the system default environment. In some embodiments, the system default environment is the first virtual environment of step(s) 1206 or the second virtual environment of step(s) 1208. In some embodiments, the system default environment is a virtual environment different than the first virtual environment of step(s) 1208 and the second virtual environment of step(s) 1206. In some embodiments, the system default environment is a virtual environment displayed by the computer system in response to an input that causes display of a virtual environment by the computer system, where the input does not define or otherwise indicate what virtual environment to display. Displaying a menu with an option corresponding to the system default virtual environment allows a user to efficiently select displaying media content in the system default virtual environment, thereby reducing additional user input and improving user-device interaction.

In some embodiments, the computer system displays (1222) the respective media content within a respective virtual environment that is currently selected by the user (e.g., displayed by the computer system when and/or before the first user input is detected) in response to receiving a second user input corresponding to a selection of a second selectable option, such as an option for displaying virtual content 1126*a* in currently selected environment in user interface 1152 in FIG. 11B, wherein the virtual environment selection user interface includes the second selectable option (e.g., same as or different than the first selectable option described with respect to step(s) 1202). In some embodiments, the computer system receives an input for selecting the second selectable option. In some embodiments, in response to receiving the input for selecting the second selectable option, the computer system displays the respective media content in the respective virtual environment that is currently selected by the user is a virtual environment. In some embodiments, the respective virtual environment that is currently selected by the user is the first virtual environment of step(s) 1208 or the second virtual environment of step(s) 1208. In some embodiments, respective virtual environment that is currently selected by the user is a virtual environment different than the first virtual environment of step(s) 1208 and the second virtual environment of step(s) 1208. Displaying a menu with an option corresponding to a currently selected virtual environment allows a user to efficiently select displaying media content in the currently selected virtual environment, thereby reducing additional user input and improving user-device interaction.

In some embodiments, the computer system displays (1224) the respective media content within a respective virtual environment (e.g., the first virtual environment, the second virtual environment, or a different virtual environment) having a visual appearance corresponding to a first time of day, such as virtual environment 1145*a* including moon and stars 1141*a* in FIG. 11D (e.g., associated with dark mode corresponding to nighttime in the physical space simulated by the respective virtual environment, such as dusk, midnight, or predawn) in a physical space simulated by the respective virtual environment (wherein the respective virtual environment is also otherwise available for display with a second visual appearance corresponding to a second time of day, different from the first time of day, in the physical space simulated by the respective virtual environment, such as daytime in the physical space simulated by the respective virtual environment) in response to receiving a second user input corresponding to a selection of a second selectable option, such as selecting B3 in user interface 1152 in FIG. 11B, wherein the virtual environment selection user interface includes the second selectable option (e.g., same as or different than the first selectable option described with respect to step(s) 1202). In some embodiments, the computer system receives an input for selecting the second selectable option. In some embodiments, in response to receiving the input for selecting the second selectable option, the computer system displays the respective virtual environment with a visual appearance corresponding to the first time of day. In some embodiments, the first time of day and/or the second time of day have one or more of the characteristics of the first time of day and/or second time of day described with reference to method 1000. In some embodiments, the first selectable option is also selectable to display the respective media content within the first virtual environment having a visual appearance corresponding to the first time of day (e.g., rather than the second time of day). Thus, in some embodiments, the virtual environment selection user interface optionally automatically suggests virtual environments to be displayed with their nighttime visual appearances rather than their daytime visual appearances. Automatically displaying selectable options for virtual environments in their dark mode appearances reduces the distractions to the user outside of the media content, thereby reducing errors in interaction with the computer system and reduces the number of inputs needed to set the appropriate time of day for the virtual environment.

In some embodiments, the respective media content does not include three-dimensional content (e.g., includes two-dimensional content without any three-dimensional content). In some embodiments, the computer system receives (1226*a*), via the one or more input devices, a third user input corresponding to a request to display second respective media content (e.g., the second respective media content optionally has one or more characteristics of the respective media content), wherein the second respective media content is not displayed in the three-dimensional environment when the third user input is received, such as forging display of virtual content 1126*a* when third user input is received in FIGS. 11A and 11A1. In some embodiments, the third user input has one or more of the characteristics of the first user input and/or the second user input.

In some embodiments, in response to receiving the third user input (1226*b*), in accordance with a determination that the second respective media content includes three-dimensional content, the computer system (automatically) displays (1226*c*) the second respective media content in the expanded display mode, such as displaying virtual content 1126*a* in expanded display mode if virtual content 1126*a* includes three-dimensional content in FIG. 11B (e.g., without first displaying the second respective media content in the compact display mode and/or without an input to display the second respective media content in the expanded display mode). In some embodiments, in accordance with a determination that the second respective media content does not include three-dimensional content, the computer system displays (1226*d*) the second respective media content in a compact display mode, such as displaying virtual content 1126*a* in compact display mode if virtual content 1126*a* does not include three-dimensional content in FIG. 11B (e.g., compact display mode of step(s) 1200 and step 1204). In some embodiments, when the second respective media content does not include three-dimensional content, displaying the second respective media content in an expanded display mode requires an input to display the second respective media content in the expanded display mode. Automatically displaying three-dimensional content in an expanded display mode reduces the number of inputs needed to set the appropriate display mode for the three-dimensional content.

In some embodiments, while displaying the first virtual environment while the respective media content is not displayed in the expanded display mode (e.g., in a compact display mode), the computer system displays (1228*a*) the first virtual environment (e.g., beach environment) with a first visual appearance corresponding to a first time of day (e.g., associated with light mode or automatic mode during daytime in the physical environment) based on a time of day setting defined by the user, such as hand 1120*a* selecting Si in B2 in FIG. 11B (e.g., the time of day setting optionally has one or more characteristics of the respective setting of the computer system in method 800). For example, if the user of the computer system has set the time of day setting at the computer system to correspond to a daytime time of day, the first virtual environment is optionally displayed with the daytime visual appearance, and if the user of the computer system has instead set the time of day setting at the computer system to correspond to a nighttime time of day, the first virtual environment is optionally displayed with the nighttime visual appearance.

In some embodiments, while displaying the respective media content in the expanded display mode, the computer system displays (1228*b*) the first virtual environment with a second visual appearance corresponding to a second time of day (e.g., associated with dark mode or automatic mode during nighttime in the physical environment such as dusk, midnight, or predawn) that is not based on the time of day setting defined by the user, such as displaying first virtual environment 1145*a* when virtual content 1126*a* is in an expanded display mode rather than based on time of day setting defined by user 1106 in FIG. 11B. In some embodiments, the first time of day and/or the second time of day have one or more of the characteristics of the first time of day and/or the second time of day of method 1000. In some embodiment, when media content is in an expanded display mode, a user interface element (e.g., toggle or picker) for selecting a time of day setting different than the second time of day is disabled. For example, when media content is in an expanded display mode, a time of day associated with light mode or automatic mode during daytime in the physical environment, such as dawn or afternoon, is not available for selection. Displaying media content in a virtual environment corresponding to a default dark mode when in an expanded display mode reduces the distractions to the user outside of the media content, thereby reducing errors in interaction with the computer system, and reduces the number of inputs needed to set the appropriate time of day for the virtual environment.

In some embodiments, in response to receiving the second user input corresponding to the selection of the first selectable option (1230*a*), in accordance with a determination that one or more criteria are satisfied, including a criterion that is satisfied when the first virtual environment is available as a system virtual environment (e.g., the first virtual environment is not a virtual environment that is specific to the respective media content, such as described with reference to steps 1214-1218), the computer system updates (1230*b*) the system virtual environment to the first virtual environment, such as updating system virtual background 1150 to Background 2 in FIG. 11C. In some embodiments, the system virtual environment has one or more of the characteristics described with reference to step 1220.

In some embodiments, in accordance with a determination that the one or more criteria are not satisfied (e.g., first virtual environment is not available as a system virtual environment), the computer system forgoes (1230*c*) updating the system virtual environment to the first virtual environment, such as forgoing updating system virtual background 1150 to Background 2 in FIG. 11C. In some embodiments, updating the system environment affects which virtual environment is displayed in response to receiving a subsequent user input corresponding to an input causing display of a respective virtual environment. In some embodiments, if the first virtual environment is available as a system virtual environment, then the system environment is updated to the first virtual environment, and in response to the subsequent input to display a respective virtual environment, the computer system displays the first virtual environment. In some embodiments, if the first virtual environment is not available as a system virtual environment, then the system environment is the previously set system virtual environment, other than the first virtual environment, and that previously set virtual environment is displayed by the computer system in response to such subsequent input. Automatically adjusting the system virtual environment according to the selected virtual environment reduces the number of inputs needed to set the system virtual environment.

In some embodiments, a view of the three-dimensional environment that is visible via the display generation component when the first user input is received is a first view corresponding to a first viewpoint of the user, such as the view of three-dimensional environment 1104 in FIGS. 11A and 11A1, and includes a first portion (e.g., virtual and/or physical object or background) of the three-dimensional environment, different from the respective media content, visible via the display generation component at a first location in the first view, such as the location of the virtual window through which virtual sun 1140*a* is displayed in FIGS. 11A and 11A1. For example, in the first view, the computer system optionally presents via the display generation component the first portion at the first location and the respective media content at a second location, such as a location in which the respective media content is not displayed in the respective location for media content in the three-dimensional environment such as described below with reference to method 2500, in the first view.

In some embodiments, in response to receiving the first user input (e.g., input from a hand 1120*a* of the user 1106 directed to the expanded display mode toggle 1146 in FIGS. 11A and 11A1) and optionally while the first view is visible via the display generation component, the computer system reduces a visual prominence (e.g., ceasing display, increasing a respective translucency, increasing a transparency, decreasing a color saturation, and/or decreasing a brightness) of the first portion of the three-dimensional environment that is visible via the display generation component at the first location in the first view, such as shown with the reducing of visual prominence of virtual environment 1145*a* shown from FIGS. 11A and 11A1 to FIG. 11F to FIG. 11G (and optionally reducing a visual prominence of respective media content that is different from the first portion of the three-dimensional environment). For example, the computer system optionally visually fades-out (partially or completely) the first portion of the three-dimensional environment from being visible in the first view at the first location and optionally the respective media content. For example, the computer system optionally increases transparency of the first portion (and the respective media content), and as that transparency is increased, elements that were obscured in view by the first portion (and the respective media content) from the viewpoint of the user before the computer system increased transparency of the first portion (and the respective media content) are becoming more and more visible during the increasing of the transparency of the first portion (and the respective media content).

In some embodiments, after reducing the visual prominence of the first portion of the three-dimensional environment that is visible via the display generation component at the first location in the first view, the computer system presents (e.g., displays), via the display generation component, a second portion of the three-dimensional environment, different from the first portion and different from the respective media content, at the first location in a second view of the three-dimensional environment corresponding to a second viewpoint of the user different from the first viewpoint, wherein the first location in the second view of the three-dimensional environment is the same as the first location in the first view of the three-dimensional environment. For example, in FIGS. 11H and 11I, a different portion of three-dimensional environment occupies the location that the virtual window through which virtual sun 1140*a* was displayed in FIGS. 11A and 11A1 and, as seen in comparing FIGS. 11A and 11F with FIGS. 11H and 11I, the virtual window through which virtual sun 1140*a* was displayed in FIGS. 11A and 11F has shifted to a different location in the view illustrated in FIGS. 11H and 11I. For example, the computer system optionally visually fades-in the second portion of the three-dimensional environment at the first location. After visually fading-in the second portion of the three-dimensional environment, computer system optionally displays the second portion with the same amount of visual prominence that the first portion of the three-dimensional environment had before the computer system reduced the visual prominence of (e.g., faded-out) the first portion of the three-dimensional environment. Thus, when entering the expanded mode, the computer system optionally visually fades-out a portion or all of the three-dimensional environment that was visible when the first user input was received, and then the computer system optionally fades-back-in the three-dimensional environment at a different viewing angle (e.g., a predetermined viewing angle) than the viewing angle of the three-dimensional environment in the first view. For example, the computer system optionally fades-out the three-dimensional environment when the first view is facing west of the three-dimensional environment and fades-back-in the three-dimensional environment with the view facing north. As such, the computer system optionally shifts the viewpoint of the user without user input specifically for shifting the viewpoint of the user. In some embodiments, the second view of the three-dimensional environment is visible after reducing the visual prominence of the first portion of the three-dimensional environment. In some embodiments, the respective media content is displayed at a third location, such as a location in which the respective media content is displayed in the respective location for media content in the three-dimensional environment, such as described below with reference to method 2500, different from the second location of the respective media content in the first view corresponding to the first viewpoint of the user described). Fading a portion or all of the three-dimensional environment that was visible when the first user input for entering the expanded mode was received, and then fading-in a different portion of the three-dimensional environment at the same location in the view permits the computer system to shift the viewpoint of the user without user input specifically for shifting the viewpoint of the user, and reduces visual discontinuity when transitioning to the expanded mode, which may reduce errors in user interaction with the computer system.

It should be understood that the particular order in which the operations in method 1200 have been described is merely exemplary and is not intended to indicate that the described order is the only order in which the operations could be performed. One of ordinary skill in the art would recognize various ways to reorder the operations described herein.

FIGS. 13A-13H illustrate examples of a first computer system 101*a* joining a communication session with a second computer system while maintaining display of their respective virtual environments in accordance with some embodiments.

Figures 13A, 13B:
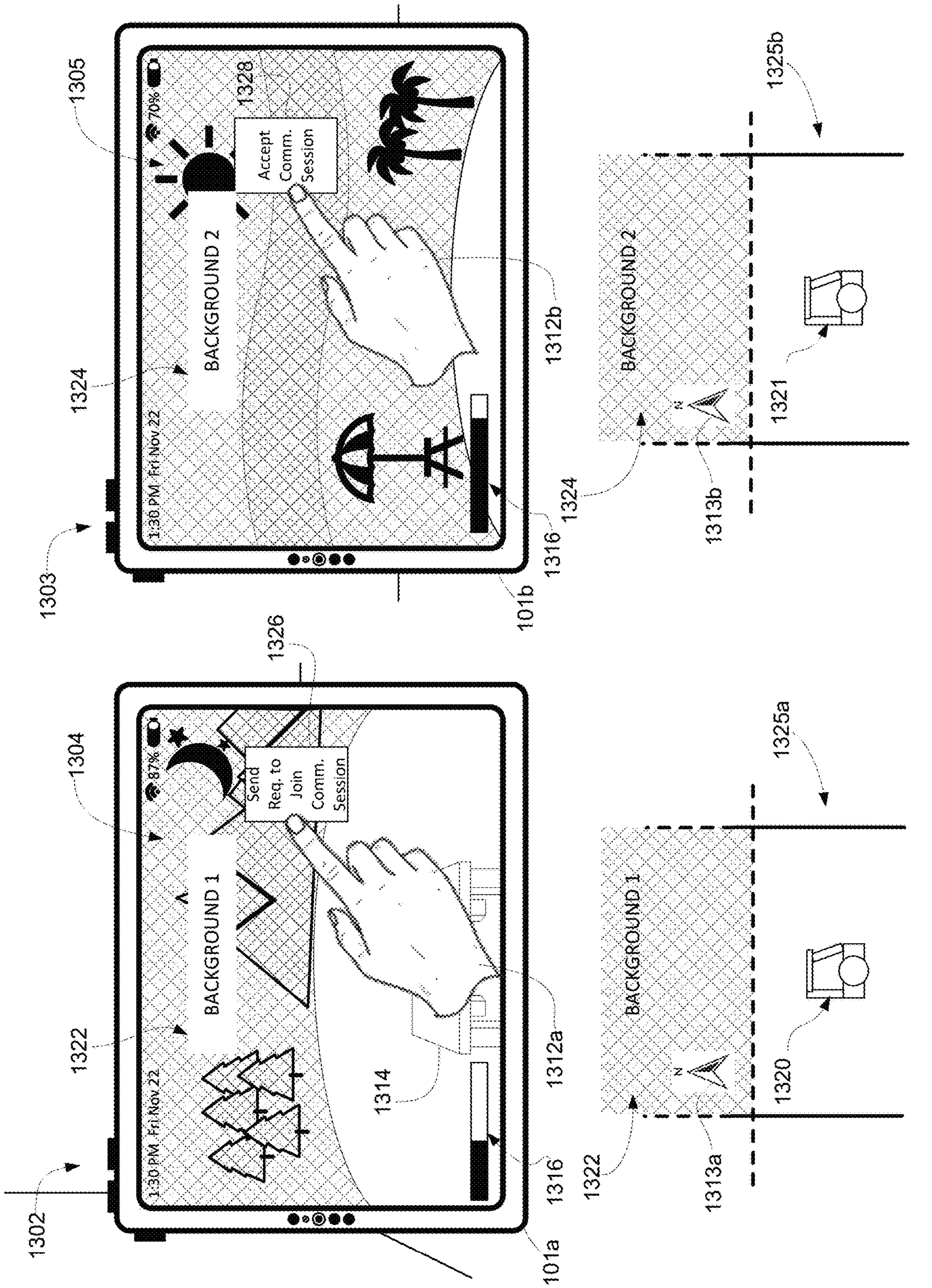
FIGS. 13A-13H illustrate examples of a first computer system joining a communication session with a second computer system while maintaining display of their respective virtual environments in accordance with some embodiments.
Figure 14B:
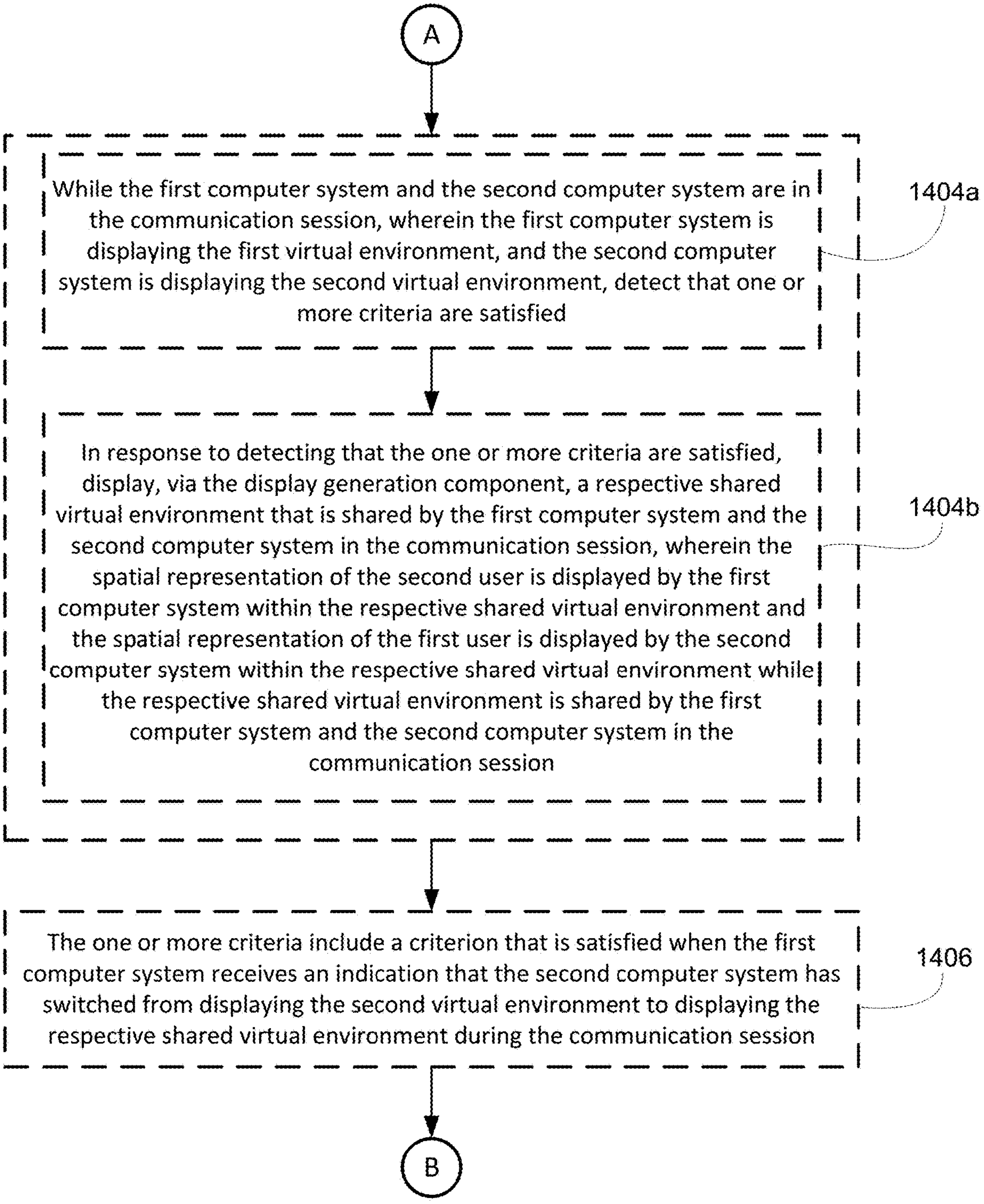
FIGS. 14A-14Q is a flowchart illustrating a method of joining a communication session with a second computer system while maintaining display of their respective virtual environments in accordance with some embodiments.
Figure 14C:
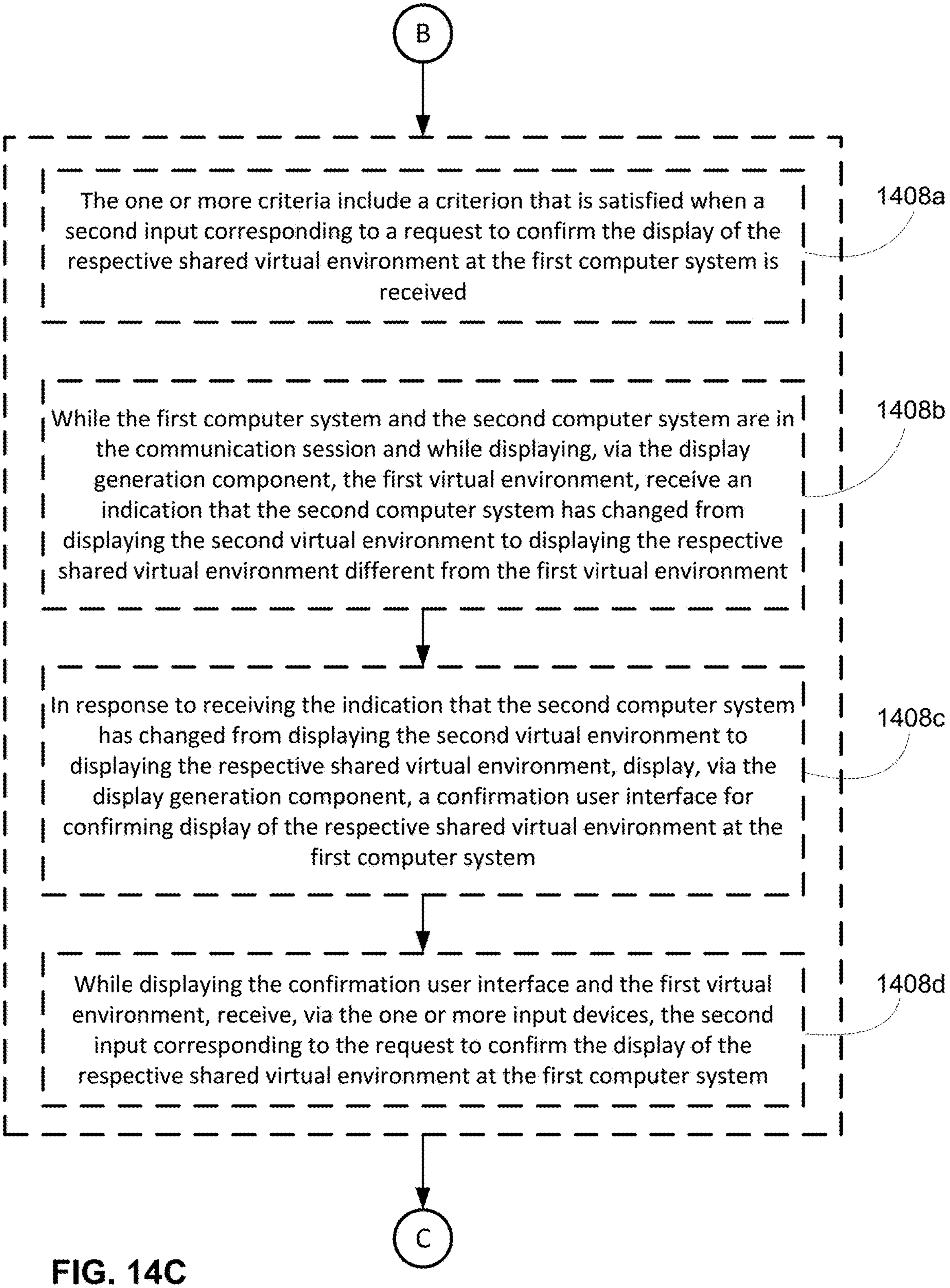
Figure 14D:
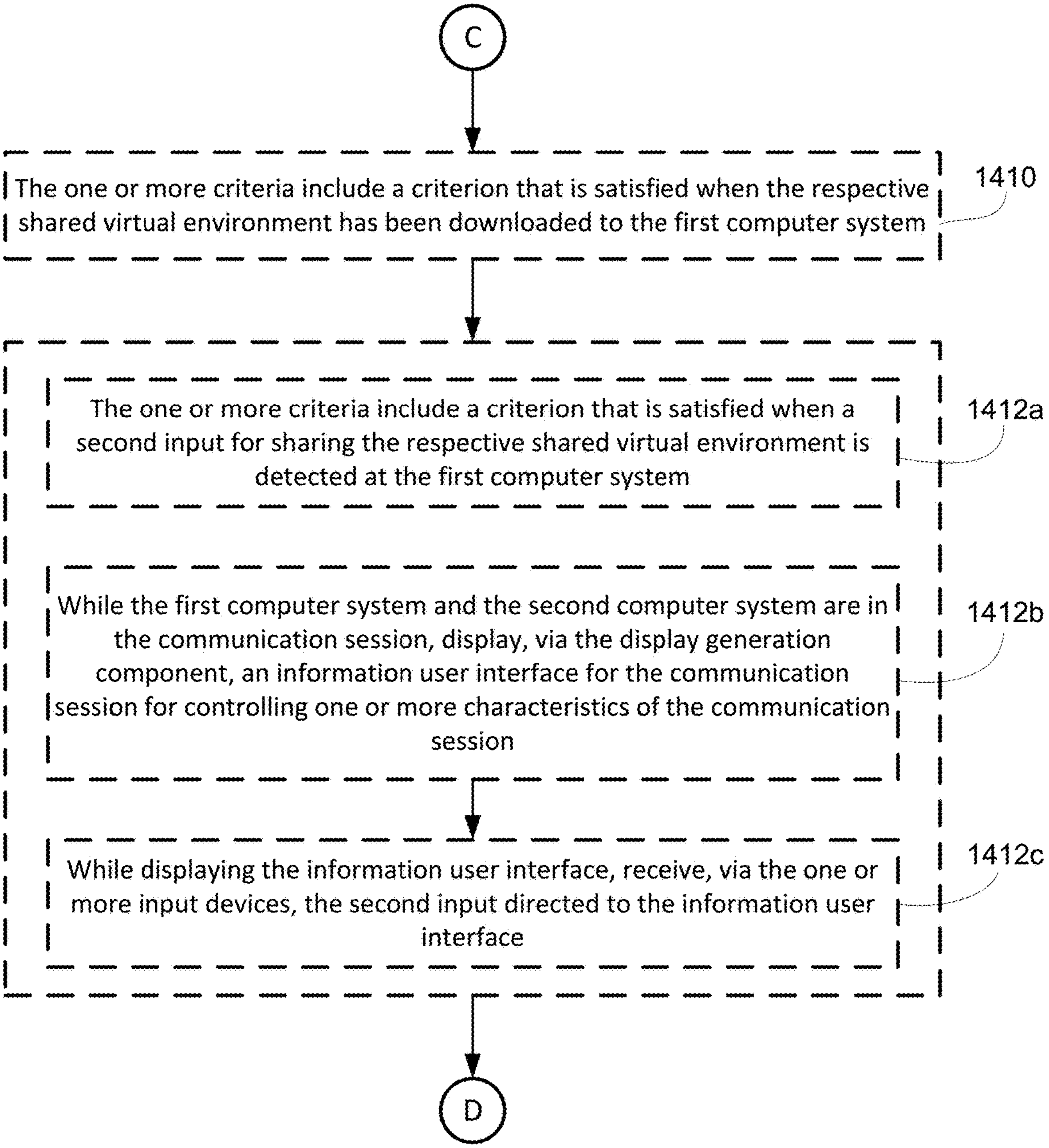
Figure 14E:
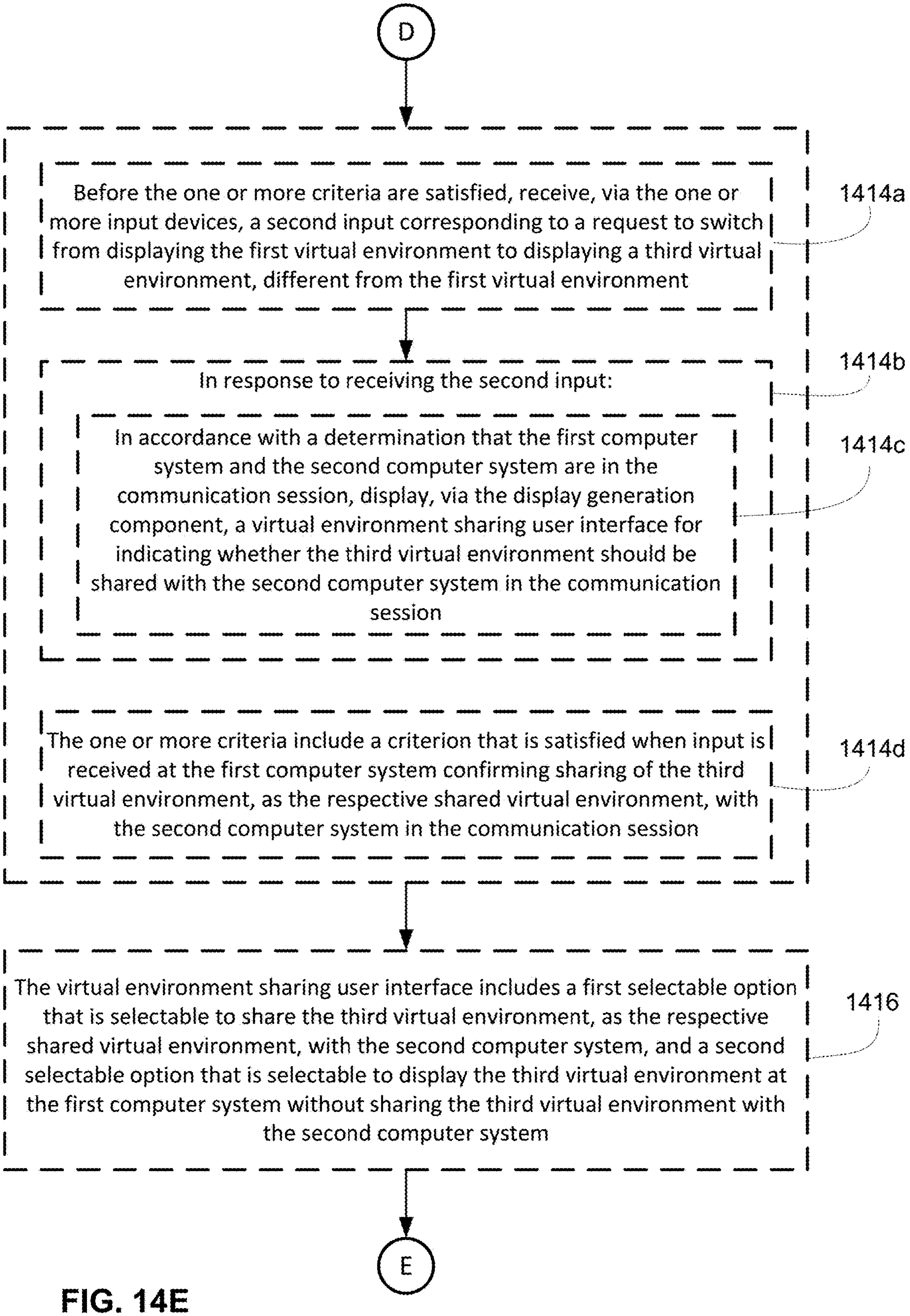
Figure 14F:
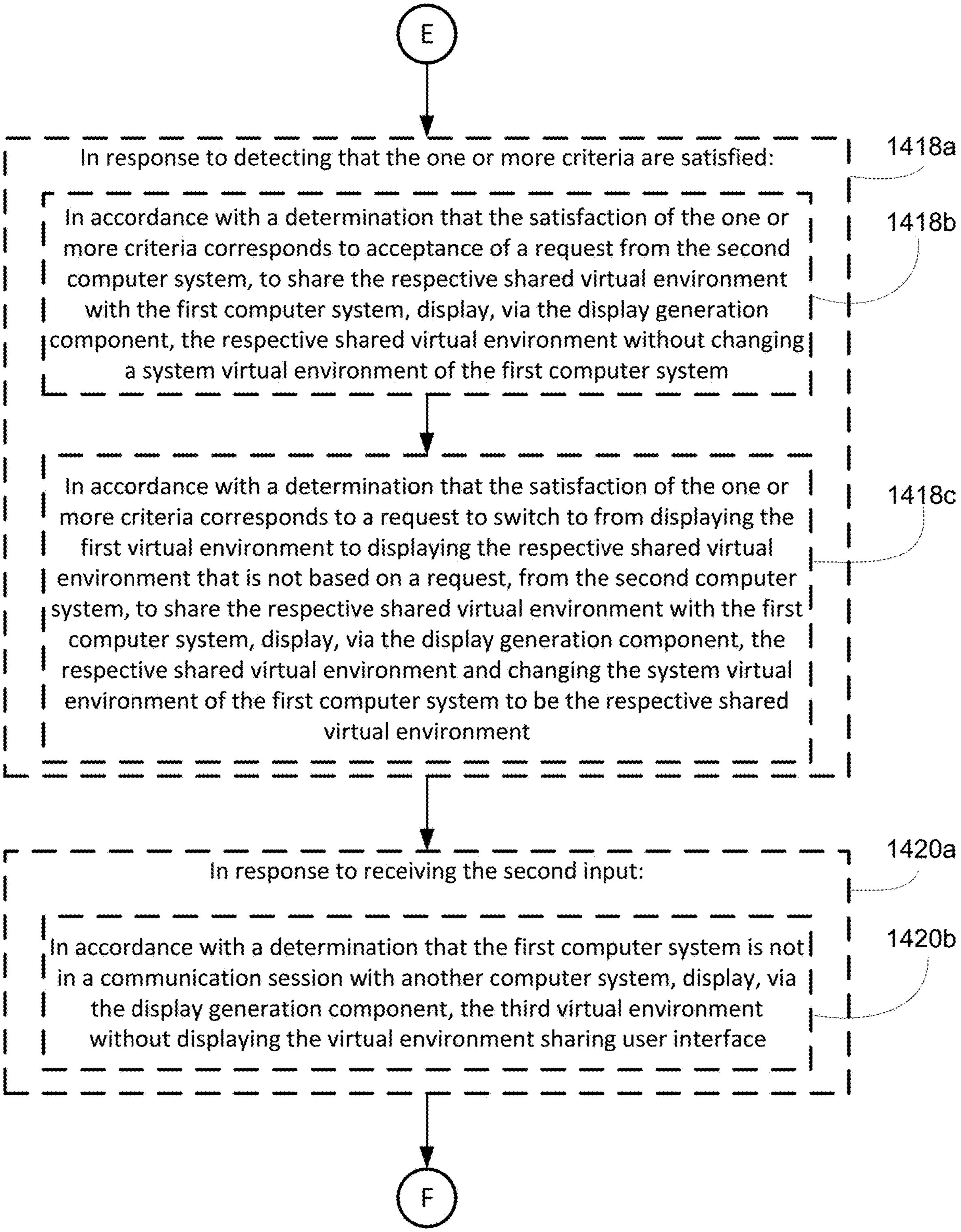
Figure 14H:
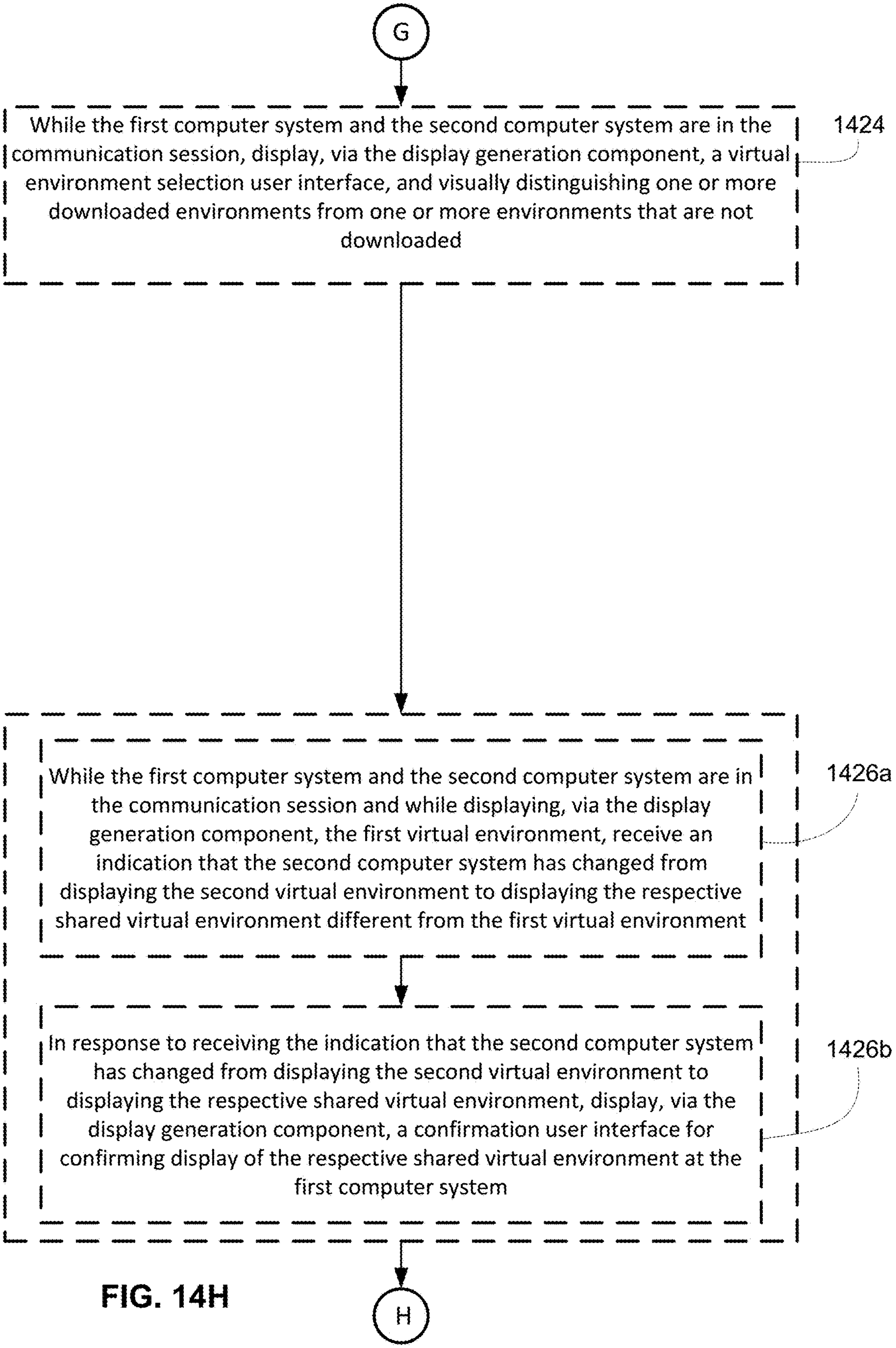
Figure 14M:
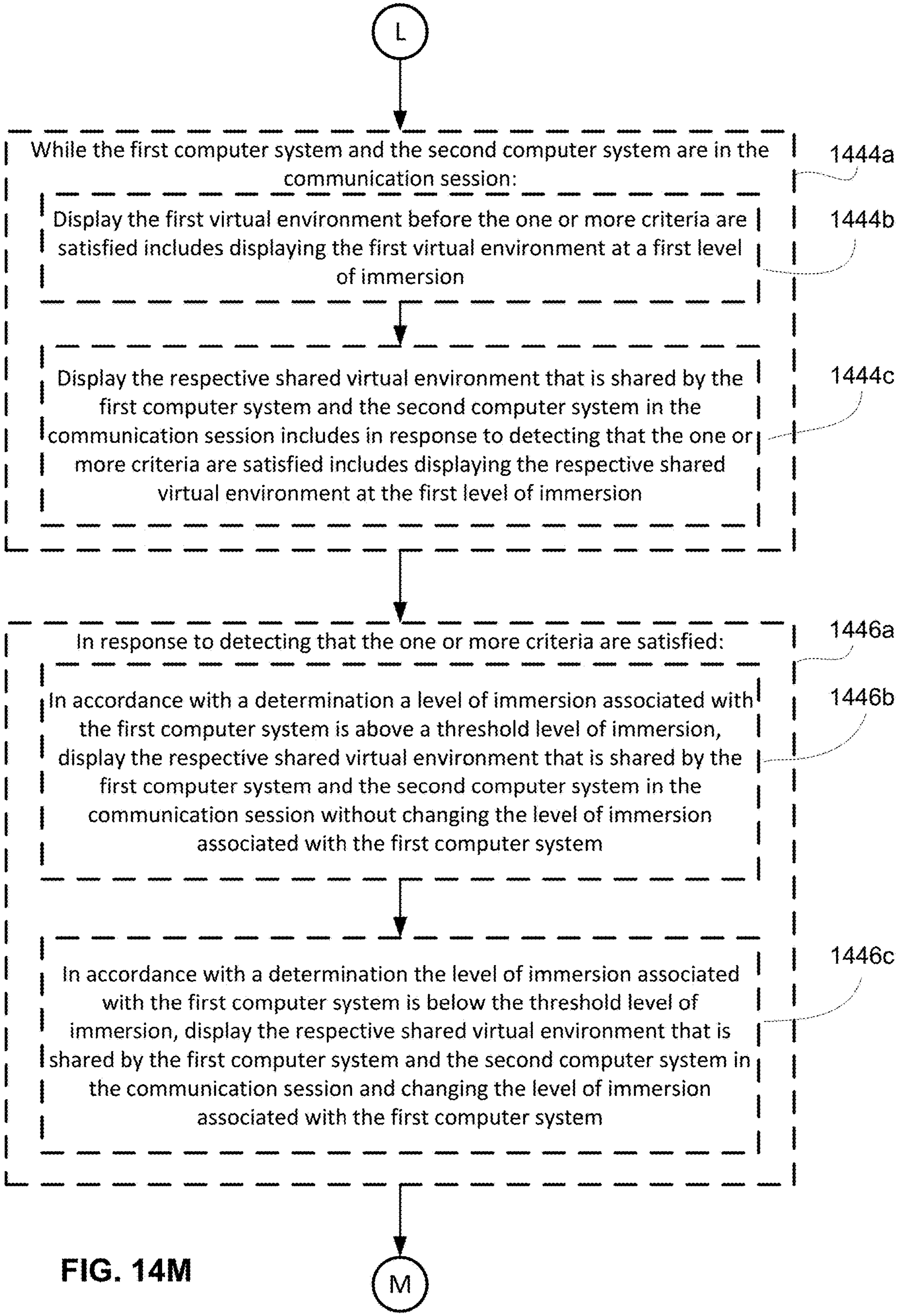
Figure 14O:
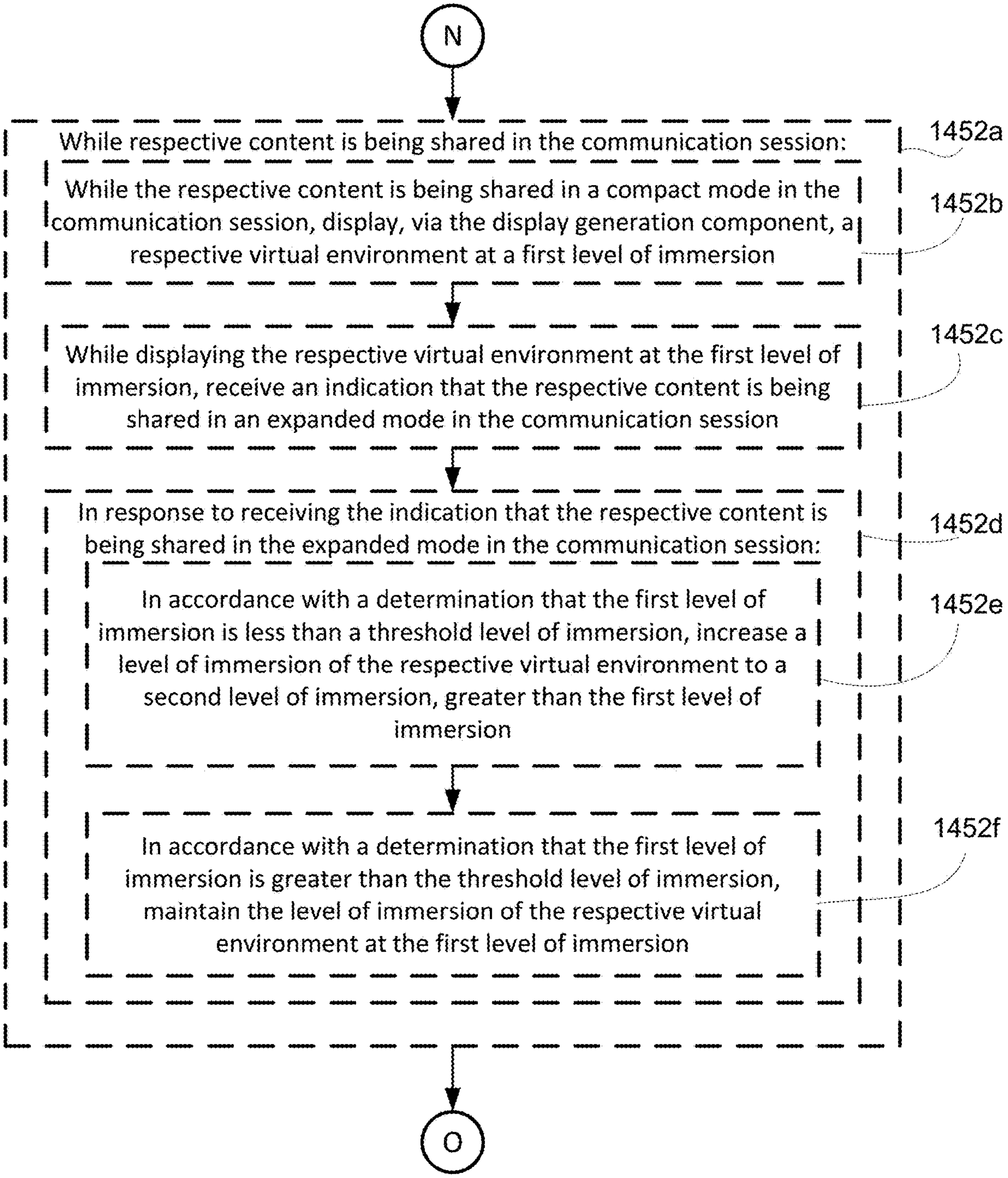
Figure 14P:
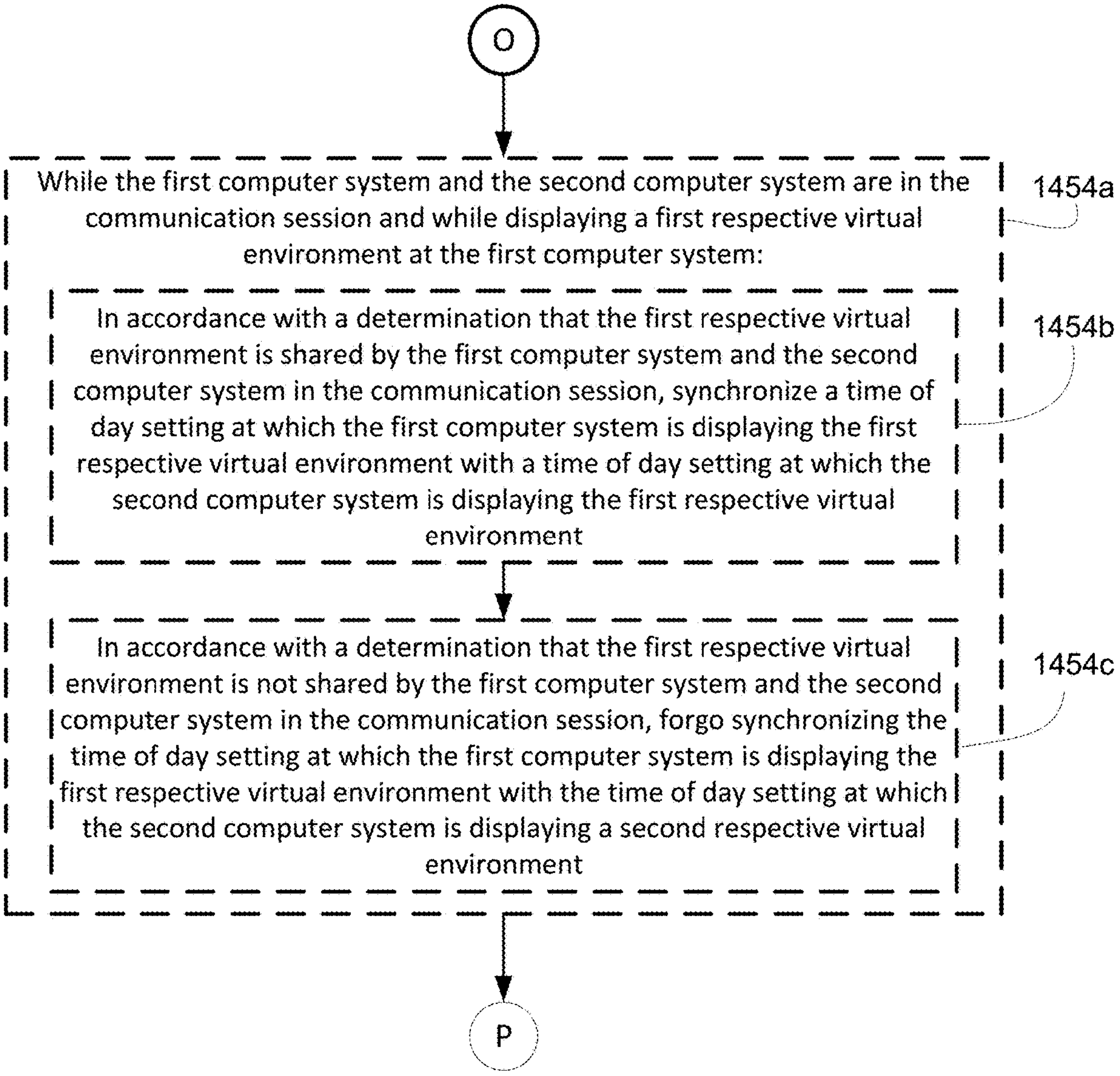
Figure 14Q:
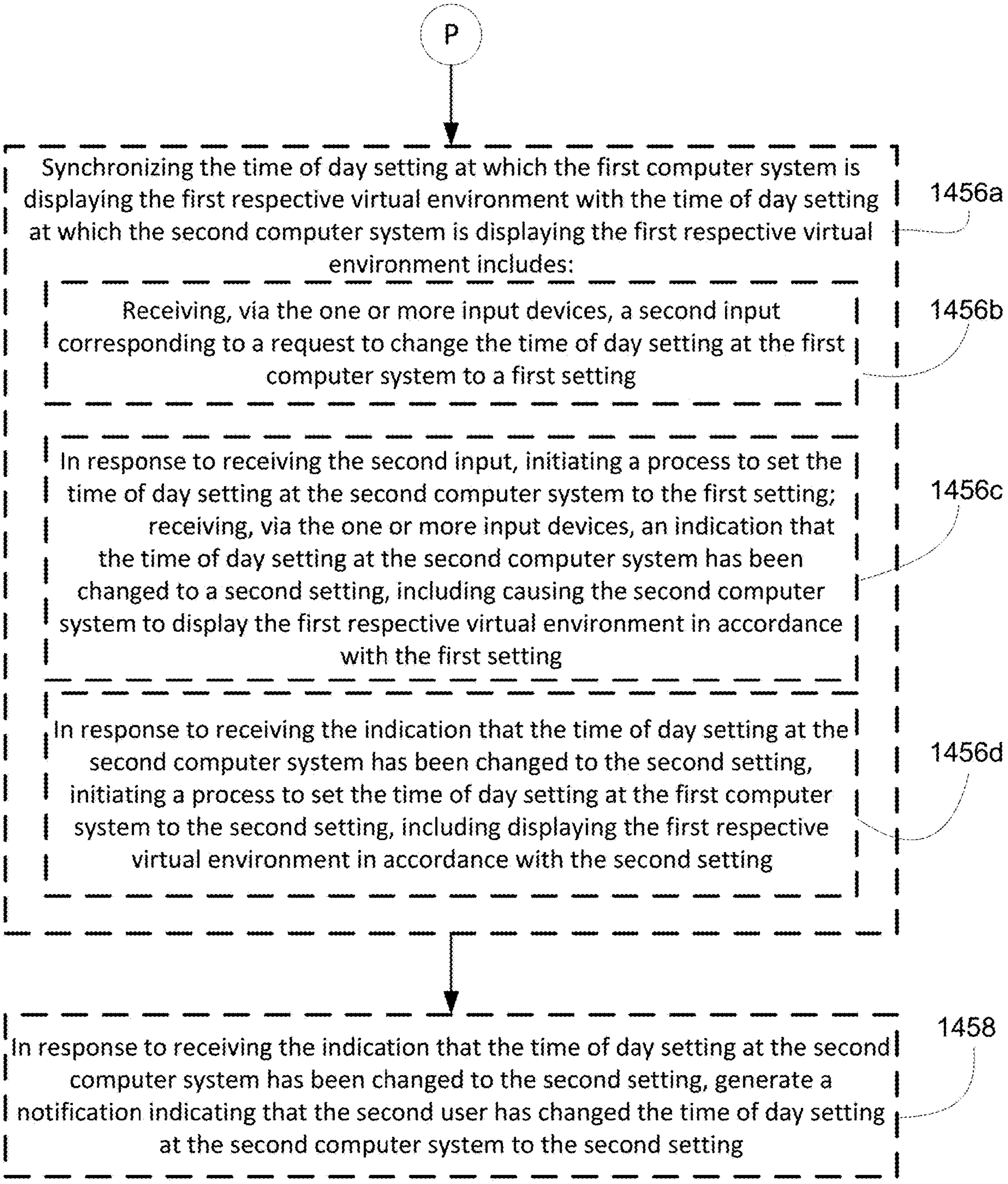

FIG. 13A illustrates a first computer system 101*a* displaying, via a display generation component (e.g., display generation component 120 of FIG. 1), a three-dimensional environment 1304 from a viewpoint of a first user 1320 illustrated in the overhead view 1325*a* (e.g., facing the far wall of the physical environment in which first computer system 101*a* is located).

As described above with reference to FIGS. 1-6, the first computer system 101*a* optionally includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the first computer system 101*a* would be able to use to capture one or more images of a user or a part of the user (e.g., one or more hands of the user) while the user interacts with the first computer system 101*a*. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 13A, the first computer system 101*a* captures one or more images of the physical environment around computer system 101*a* (e.g., operating environment 100), including one or more objects in the physical environment around the first computer system 101*a*. In some embodiments, computer system 101*a* displays a virtual environment and representations of the physical environment in three-dimensional environment 1304 or portions of the physical environment are visible via the display generation component 120 of first computer system 101*a*. In some embodiments, the three-dimensional environment 1304 includes real-world objects that are located in the real-world environment of the user 1320 such as portions of the walls, the ceiling, and the floor that are in the physical environment of the first user 1320. As illustrated in FIG. 13A, three-dimensional environment 1304 includes a coffee table 1314 which is a real-world object that is located in the real-world environment 1302 of the first user 1320 (omitted from the overhead view 1325*a* for clarity).

In FIG. 13A, the three-dimensional environment 1304 also includes a first virtual environment 1322 (e.g., BACKGROUND 1). The first virtual environment 1322 is displayed by the first computer system 101*a* via a display generation component 120. As shown, the first virtual environment 1322 (e.g., BACKGROUND 1) is a virtual environment of a mountain scene which optionally includes virtual elements such as virtual trees, virtual mountain ridges, a virtual moon, and/or virtual stars (e.g., virtual environment 1322 simulates the physical space of the mountain scene). The first virtual environment 1322 (e.g., BACKGROUND 1) in FIG. 13A corresponds to a dark mode corresponding to the visual appearance of the simulated mountain scene during nighttime (e.g., evening time when it is dark, and virtual stars and/or virtual moon are illuminating the scene). Further details about the dark mode of a virtual environment are provided with reference to method 1400.

As further illustrated in the three-dimensional environment 1304, an immersion level indicator 1316 is displayed at the bottom-left portion of the three-dimensional environment 1304. For example, increasing the immersion level optionally causes more of the first virtual environment 1322 to be displayed, replacing and/or obscuring more of the physical environment, and reducing the immersion level optionally causes less of the virtual environment to be displayed, revealing portions of the physical environment that were previously not displayed and/or obscured. Additional details about levels of immersion are described with reference to method 1400. As shown in FIG. 13A, the shading in the immersion level indicator 1316 indicates that the immersion level of the first virtual environment 1322 is approximately at 60% immersion.

As further illustrated in the three-dimensional environment 1304, a selectable option 1326 is displayed in the three-dimensional environment 1304 that is selectable to send a request to a second compute system 101*b* to join the communication session with computer system 101*a*. As illustrated in the overhead view 1325*a*, the first user 1320 is shown interacting with the first computer system 101*a*. As shown, the first computer system 101*a* displays the first virtual environment 1322 (e.g., BACKGROUND 1) in a northbound direction which is indicated by cardinal orientation 1313*a*. While interacting with the first computer system 101*a*, the first computer system 101*a* detects a selection input from hand 1312*a* of the first user 1320 directed to the selectable option 1326 displayed in the three-dimensional environment 1304. In some embodiments, the first computer system 101*a* is configured to detect a selection input via tap or hand air gesture such as pointing or pinching at selectable option 1326 to send the request to join the communication session. In some embodiments, the first computer system 101*a* is configured to detect a selection input via an interface controller in an AR or VR environment.

FIG. 13A1 illustrates similar and/or the same concepts as those shown in FIG. 13A (with many of the same reference numbers). It is understood that unless indicated below, elements shown in FIG. 13A1 that have the same reference numbers as elements shown in FIGS. 13A-13H have one or more or all of the same characteristics. FIG. 13A1 includes computer system 101 (corresponding to computer system 101*a*), which includes (or is the same as) display generation component 120 (corresponding to display generation component 120*a*). In some embodiments, computer system 101 and display generation component 120 have one or more of the characteristics of computer system 101 shown in FIGS. 13A-13H and display generation component 120 shown in FIGS. 1 and 3, respectively, and in some embodiments, computer system 101 and display generation component 120 shown in FIGS. 13A-13H have one or more of the characteristics of computer system 101 and display generation component 120 shown in FIG. 13A1.

In FIG. 13A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 13A-13H.

In FIG. 13A1, display generation component 120 is illustrated as displaying content that optionally corresponds to the content that is described as being displayed and/or visible via display generation component 120 with reference to FIGS. 13A-13H. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 13A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 13A1. Because display generation component 120 is optionally a head-mounted device, the field of view of display generation component 120 is optionally the same as or similar to the field of view of the user.

In FIG. 13A1, the user is depicted as performing an air pinch gesture (e.g., with hand 1312*a* while attention of the user is directed to object 1326, as indicated by gaze point 1398) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 13A-13H.

In some embodiments, computer system 101 responds to user inputs as described with reference to FIGS. 13A-13H.

In the example of FIG. 13A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 13A-13H and/or described with reference to the corresponding method(s) are optionally implemented on computer system 101 and display generation unit 120 in a manner similar or analogous to that shown in FIG. 13A1.

FIG. 13B1 is analogously related to FIG. 13B, as FIG. 13A1 is related to FIG. 13A.

In response to selecting the selectable option 1326, the first computer system 101*a* initiates a process to invite the second computer system 101*b* to the communication session, which optionally causes computer system 101*b* to display selectable option 1328, as shown in FIG. 13B, which is optionally selectable to accept the request to join the communication session with the first computer system 101*a*.

In FIG. 13B, the second computer system 101*b* displays three-dimensional environment 1305 which includes a second virtual environment 1324. In some embodiments, the second computer system 101*b* displays both the virtual environment and representations of the physical environment in three-dimensional environment 1305 (e.g., similar to computer system 101*a*); however, in FIG. 13B, the immersion level for the second virtual environment 1324 is set at a level that obscures real-world objects that may be located in the real-world environment 1303. As shown in FIG. 13B, the second virtual environment 1324 (e.g., BACKGROUND 2) is a virtual environment of a beach scene that optionally includes virtual elements such as a virtual ocean, a virtual sun, virtual trees, a virtual picnic table, and/or a virtual umbrella. The second virtual environment 1324 (e.g., BACKGROUND 2) corresponds to a light mode corresponding to the visual appearance of the simulated beach scene during day time (e.g., morning time when it is partly cloudy and sunny, or afternoon time when it is clear and sunny).

As further illustrated in the three-dimensional environment 1305 in FIG. 13B, an immersion level indicator 1316 is displayed at the bottom-left portion of the three-dimensional environment 1305. As shown in FIG. 13B, the shading in the immersion level indicator 1316 indicates that the immersion level of the second virtual environment 1324 is approximately at 90% immersion. Levels of immersion are described in more detail with reference to method 1400. As further illustrated in FIG. 13B, overhead view 1325*b* illustrates the second user 1321 interacting with the second computer system 101*b*. As shown, the second computer system 101*b* displays the second virtual environment 1324 (e.g., BACKGROUND 2) in a northbound direction which is indicated by cardinal orientation 1313*b*.

In FIG. 13B, the second computer system 101*b* detects a selection input from hand 1312*b* of the second user 1321 directed to the selectable option 1328 displayed in the three-dimensional environment 1305 which corresponds to accepting the request to join the communication session with the first computer system 101*a*. In some embodiments, the second computer system 101*b* is configured to detect a selection input via tap or hand air gesture such as pointing or pinching at selectable option 1328. In response to the selection of the selectable option 1328, the second computer system 101*b* joins the communication session with the first computer system 101*b*, as is shown in FIG. 13C and FIG. 13D.

Figure 13D:
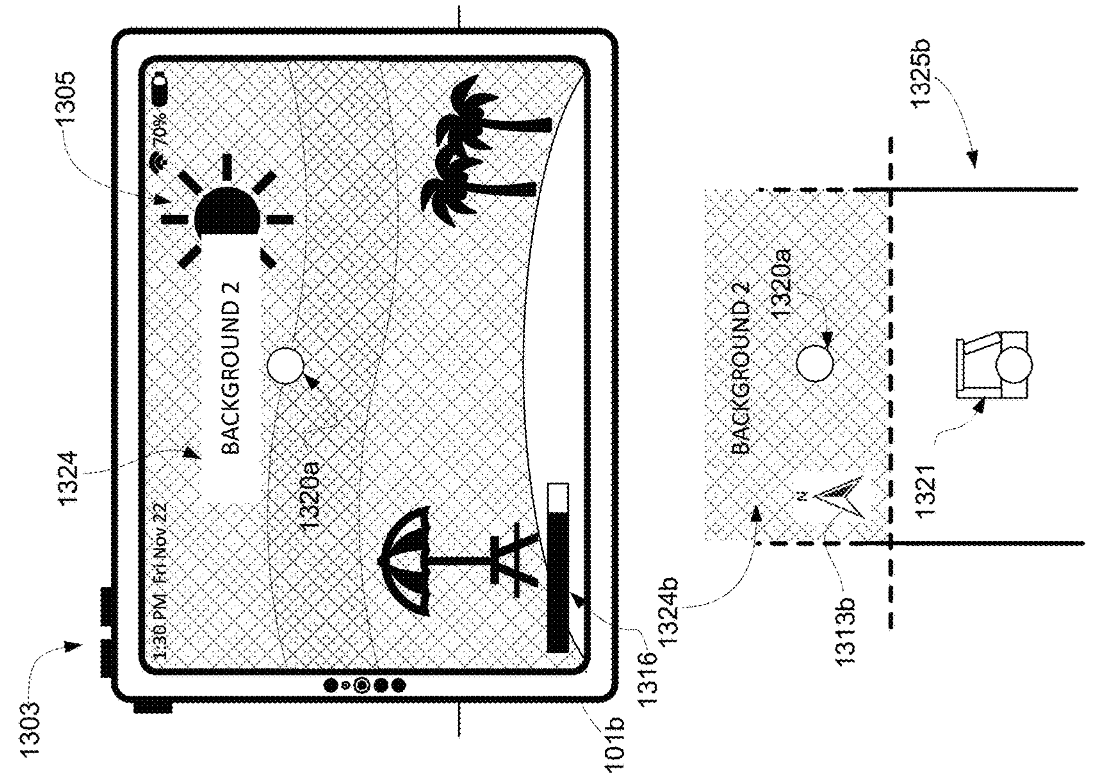
Figure 13C:
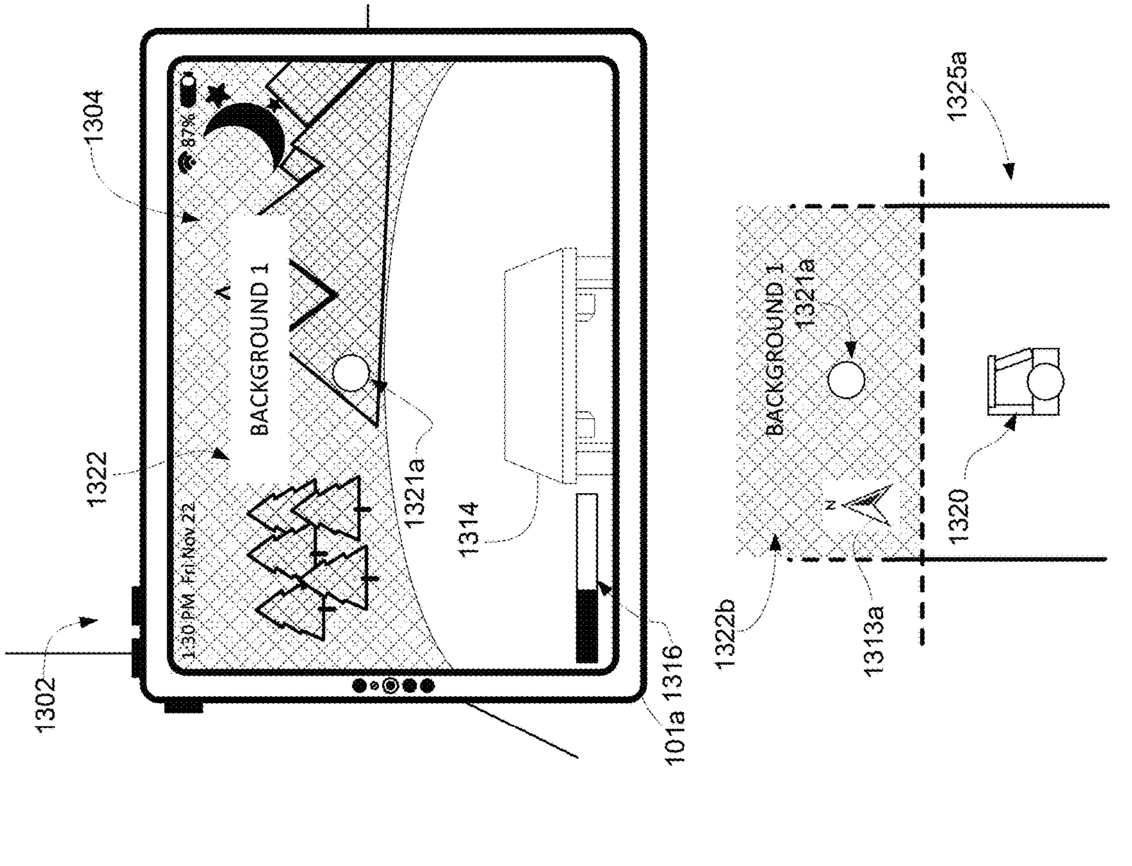

FIG. 13C illustrates the first computer system 101*a* in the same communication session with the second computer system 101*b* while maintaining display of the first virtual environment 1322. As shown, in response to joining the communication with the second computer system 101*b*, the three-dimensional environment 1304 displayed by the first computer system 101*a* maintains the display of the first virtual environment 1322 (e.g., BACKGROUND 1) and includes a spatial representation of the second user (e.g., avatar 1321*a*) located at a respective location within the first virtual environment 1322 with which user 1320 is communicating. In some embodiments, representation 1321*s* is a glowing orb, video chat window, or other representation that has a spatial position within the first virtual environment 1322. In some embodiments, the first user 1320 communicates with avatar 1321*a* that is located in a respective location within the first virtual environment 1322. As illustrated in FIG. 13C, the three-dimensional environment 1304 illustrates avatar 1321*a* as located at a position within the virtual mountain scene. As illustrated in the overhead view 1325*a*, the first user 1320 is shown communicating with avatar 1321*a* located at a position in the first virtual environment 1322 (e.g., BACKGROUND 1). As shown in FIG. 13C, the first computer system 101*a* displays the first virtual environment 1322 in a northbound direction which is indicated by cardinal orientation 1313*a*.

FIG. 13D illustrates the second computer system 101*b* in the same communication session with the first computer system 101*a* while maintaining display of the second virtual environment 1324. As shown in FIG. 13D, in response to joining the communication session with the first computer system 101*a*, the three-dimensional environment 1305 displayed by the second computer system 101*b* maintains the display of the second virtual environment 1324 (e.g., BACKGROUND 2) and includes a spatial representation of the first user (e.g., avatar 1320*a*) located at a respective location within the second virtual environment. In some embodiments, the second user 1321 communicates with avatar 1320*a* that is located in a respective location within the second virtual environment 1324. As illustrated in FIG. 13D, the three-dimensional environment 1305 illustrates avatar 1320*a* located at a position within the virtual beach scene (e.g., within the virtual ocean). As illustrated in the overhead view 1325*b* in FIG. 13D, the second user 1321 is shown communicating with avatar 1320*a* located at a position in the second virtual environment 1324 (e.g., BACKGROUND 2). As shown in FIG. 13D, the second computer system 101*b* displays the second virtual environment 1324 in a northbound direction which is indicated by cardinal orientation 1313*b*.

Figure 13E:
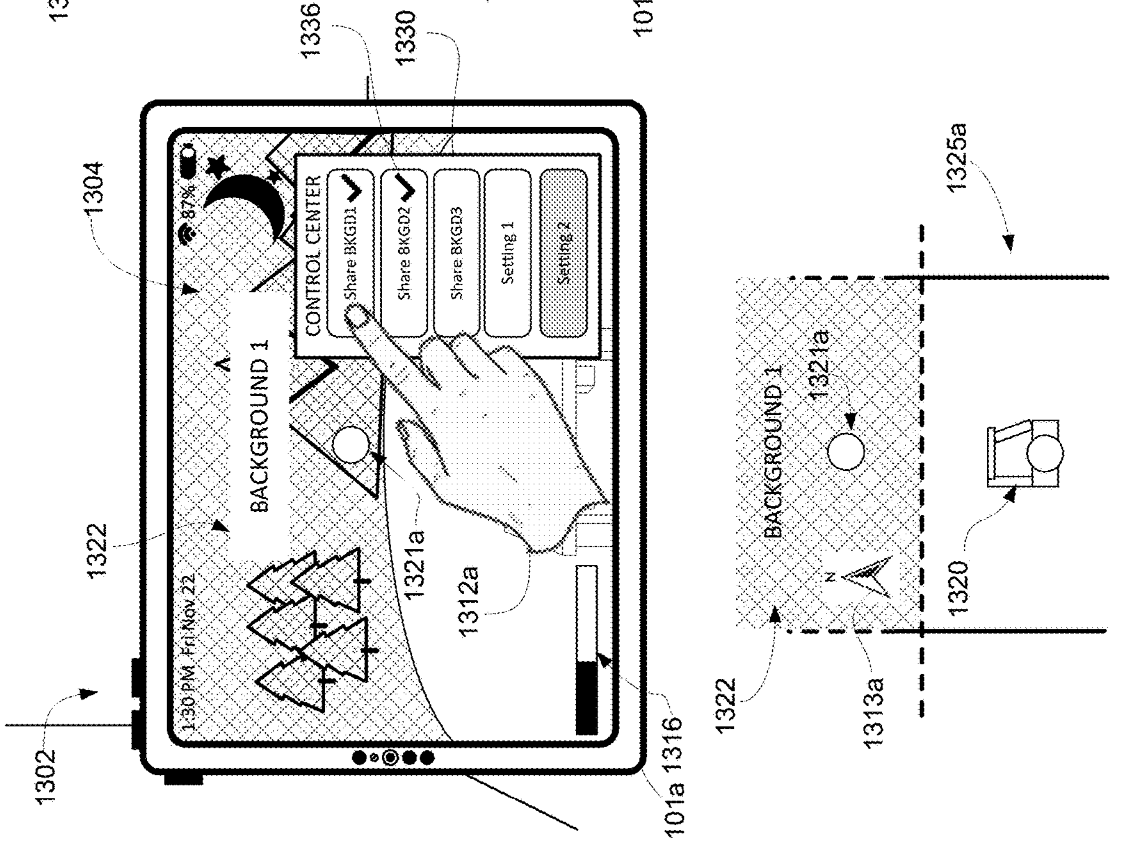

FIG. 13E illustrates three-dimensional environment 1304 that includes a control center interface 1330 (e.g., a system user interface, first user interface of the control center user interface, and/or a virtual environment selection user interface), as described in more detail with reference to method 1400. In some embodiments, the control center interface 1330 includes one or more selectable elements that are selectable to share a respective virtual environment with the second user 1321 of the second computer system 101*b* during the communication session, and one or more selectable options to apply a time of day setting to the respective virtual environment. As illustrated, in some embodiments, the control center interface 1330 includes a first virtual environment share element (illustrated "Share BKGD1"), a second virtual environment share element (illustrated "Share BKGD2"), a third virtual environment share element (illustrated "Share BKGD3"), a first time of day element (illustrated as "Setting 1"), a second time of day element (illustrated as "Setting 2"). For example, BKGD1 corresponds to a virtual environment of a mountain scene which is currently displayed (e.g., first virtual environment 1322) by the first computer system 101*a*. In another example, BKGD2 corresponds to a virtual environment of a park, and BKGD3 corresponds to a virtual environment of a city. In some embodiments, in response to the first computer system 101*a* detecting a selection of the first virtual environment share element, the second virtual environment share element, or the third virtual environment share element, the first computer system 101*a* initiates a process to invite the second user 1321 of the second computer system 101*b* to join in sharing the selected environment in the communication session. In some embodiments, the first computer system 101*a* is configured to detect a selection input via tap or hand air gesture such as pointing or pinching at one of the selectable share elements displayed in the control center interface 1330. As shown, the first computer system 101*a* detects a selection input from hand 1312*a* of the first user 1320 directed to the first virtual environment share element (illustrated "Share BKGD1"). In the illustrated example, the first virtual environment share element corresponds to the first virtual environment 1322 that is displayed by the first computer system 101*a*.

In some embodiments, a respective virtual environment share element (e.g., Share BKGD1, Share BKGD2, or Share BKGD2) includes a corresponding visual indication 1336*a* such as a symbol to indicate that the respective virtual environment is downloaded at the first computer system 101*a*. For example, as illustrated in the control center interface 1330 in FIG. 13E, a check mark symbol is placed at a position proximate to the second virtual environment share element (illustrated "Share BKGD2") to indicate that the virtual environment is downloaded to the first computer system 101*a*, and a check mark symbol is placed at a position proximate to the first virtual environment share element (illustrated "Share BKGD1") to indicate that the virtual environment is downloaded to the first computer system 101*a*.

In some embodiments, setting 1 and setting 2 correspond to a first time of day element and a second time of day element, and are optionally associated with different lighting characteristics for the respective virtual environment such as a light mode or dark mode (e.g., as described in more detail with reference to method 1400). Setting 1 is optionally associated with a daytime appearance for the virtual environment, and setting 2 is optionally associated with a nighttime appearance for the virtual environment. In the illustrated example shown in the control center interface 1330 of FIG. 13E, setting 2 is shaded which indicates that the second time of day setting (illustrated as "Setting 2") is currently selected and applied to the first virtual environment 1322. As illustrated, the first virtual environment 1322 is displayed in a dark mode (e.g., the evening when the sun has set and the virtual moon and virtual stars are shining in the sky).

Figure 13F:
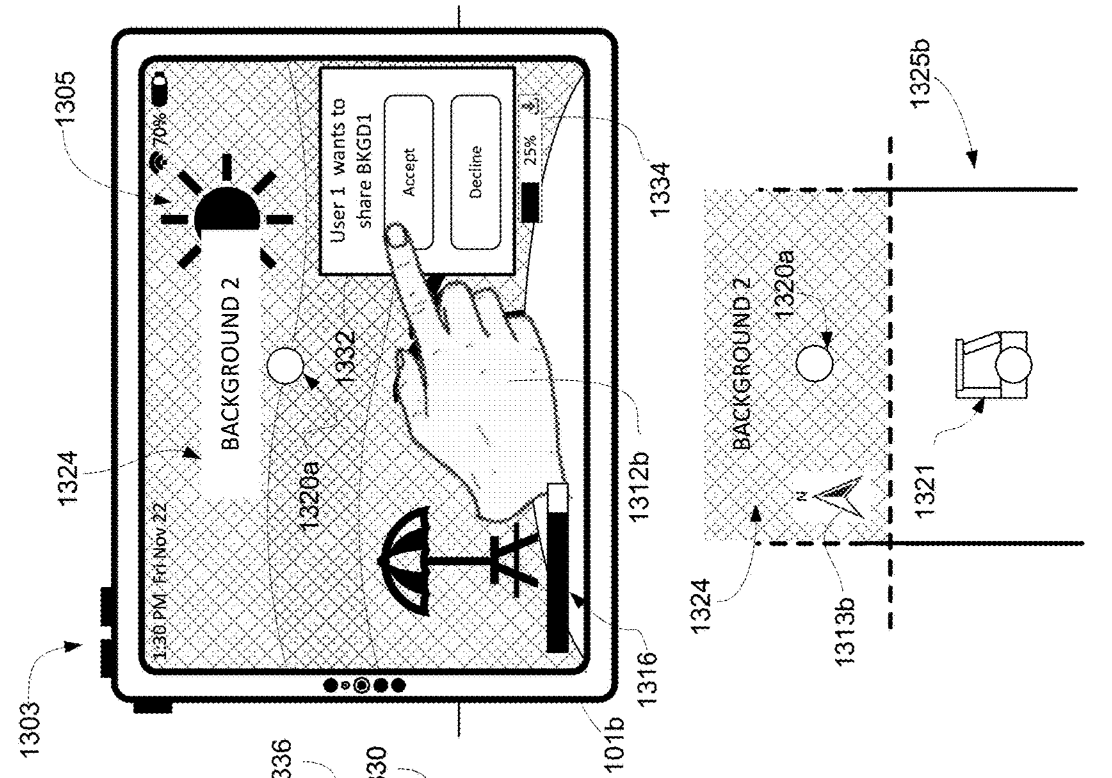

In FIG. 13F, the second computer system 101*b* displays three-dimensional environment 1305 that includes the second virtual environment 1324. Three-dimensional environment 1305 further includes a confirmation user interface 1332 that is displayed in response to the first computer system 101*a* detecting a selection input directed to the first virtual environment share element (illustrated "Share BKGD1") as shown in FIG. 13E. In some examples, the confirmation user interface 1332 (illustrated "User 1 wants to share BKGD1") includes a first selectable option that is selectable to accept the shared virtual environment, and a second selectable option that is selectable to decline the shared virtual environment. As shown, the second computer system 101*b* detects a selection input directed to accepting the shared virtual environment (e.g., via hand 1312*b* selecting the "Accept" option in user interface 1332). In some embodiments, in response to the second computer system 101*b* detecting a selection input to accept the shared virtual entrainment, the second computer system 101*b* switches from displaying the second virtual environment 1324 to displaying the shared virtual environment (e.g., BKGD1) when the shared virtual environment is fully downloaded to the second computer system 101*b*. In some embodiments, a download status indicator 1334 is displayed to indicate that the shared virtual environment (e.g., BKGD1) is being downloaded at the second computer system 101*b*. For example, as illustrated at the download status indicator 1334 in FIG. 13F, 25% of the shared virtual environment (e.g., BKGD1) has been downloaded at the second computer system 101*b*. In some embodiments, if the shared virtual environment has been pre-downloaded and stored at the second computer system 101*b*, the second computer system 101*b* switches to the shared virtual environment after the second computer system 101*b* detects a selection input directed to accepting the shared virtual environment.

Figure 13H:
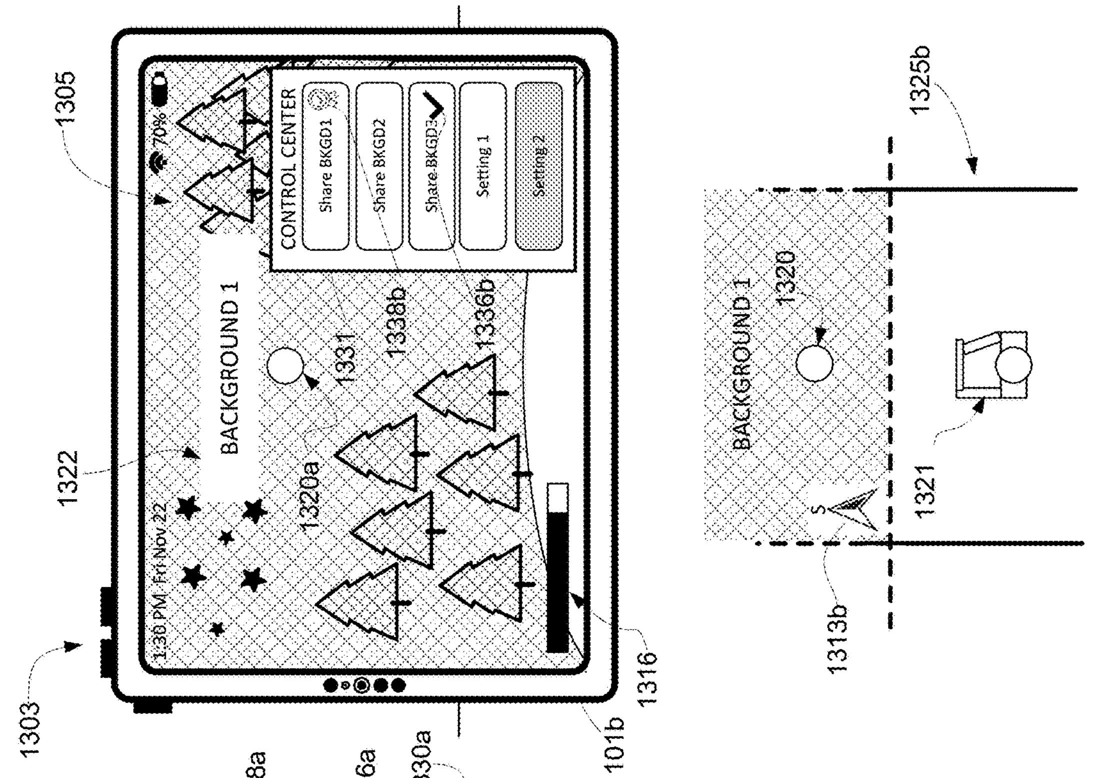
Figure 13G:
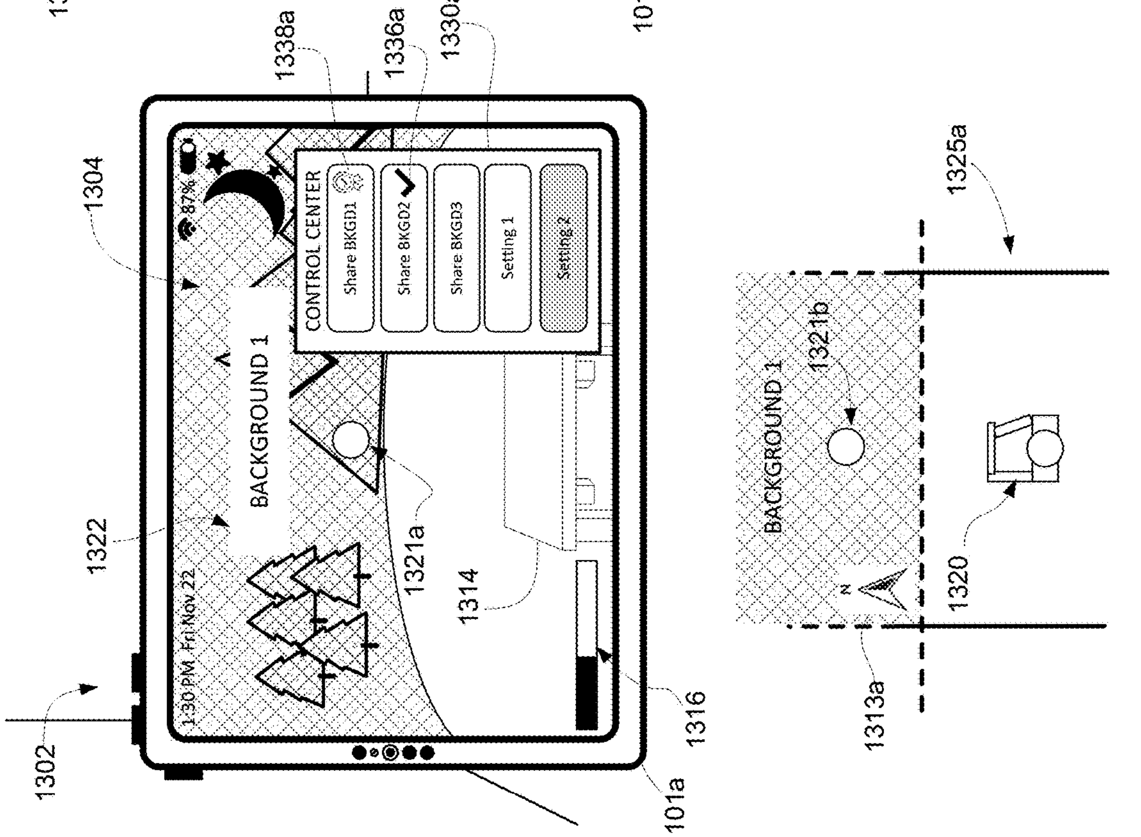

FIG. 13G illustrates three-dimensional environment 1304 that includes an updated view of the control center interface 1330 in response to the second computer system 101*b* switching to the shared virtual environment (e.g., BKGD1). As shown in FIG. 13G, the first virtual environment share element (illustrated "Share BKGD1") includes a respective visual indication 1338*a* (e.g., an icon, a mark, a brand, an emblem, badge, a trophy, a checkmark, or any other symbol), which indicates that the virtual environment is being shared by the first computer system 101*a* and the second computer system 101*b* in the communication session. As shown, in response to sharing the first virtual environment with the second computer system, computer system 101*a* maintains the same display of the first virtual environment 1322 (e.g., BKGD1), such as displaying virtual environment 1322 from a first direction. For example, as illustrated in the overhead view 1325*a*, the first computer system 101*a* displays the first virtual environment 1322 (e.g., BKGD1) in a first direction (e.g., northbound direction) which is indicated by cardinal orientation 1313*a*.

In FIG. 13H, the second computer system 101*b* displays an updated three-dimensional environment 1305 which includes the first virtual environment 1322 (instead of the second virtual environment 1324) in response to the second computer system 101*b* switching to the shared virtual environment (e.g., BKGD1). As shown, the second computer system 101*b* displays the first virtual environment 1322 from a second direction which is different than the first direction that is displayed by the first computer system 101*a*. The respective portion of the first virtual environment 1322 that is displayed by the second computer system 101*b* is different than the respective portion of the first virtual environment 1322 displayed by the first computer system 101*a*. For example, as shown in overhead view 1325*b*, the second computer system 101*b* displays the first virtual environment 1322 (e.g., BKGD1) in a second direction (e.g., southbound) which is indicated by cardinal orientation 1313*b*. As further shown in the updated three-dimensional environment 1305, second computer system 101*b* displays the first virtual environment 1322 with a spatial representation of the first user (e.g., avatar 1320*a*) located at a respective location within the portion of the first virtual environment that is displayed by computer system 101*b*. Thus, in some embodiments, when multiple computer systems share a virtual environment during a communication session, they display the virtual environment in different directions, as described in more detail with reference to method 1400. Further, while sharing a virtual environment during a communication session, the computer systems that are displaying the shared virtual environment optionally display the same portion of the virtual environment (e.g., the same portion of the simulated physical space of the virtual environment) at the same location relative to the shared virtual environment, though optionally from different directions. Additional details about such coordinated display of a shared virtual environment during a communication session are described with reference to method 1400.

As further illustrated in the three-dimensional environment 1305 in FIG. 13H, the three-dimensional environment 1305 includes control center interface 1331 (e.g., such as described above with reference to FIG. 13E). As shown, the first virtual environment share element (illustrated "Share BKGD1") includes a respective visual indication 1338 (e.g., an icon, a mark, a brand, an emblem, badge, a trophy, a checkmark, or any other symbol) that indicates that the virtual environment is being shared by the first computer system 101*a* and the second computer system 101*b* in the communication session. As further shown, the third virtual environment share element (illustrated "Share BKGD3") includes a visual indication 1336*b* such as a symbol to indicate that the third virtual environment is downloaded at the second computer system 101*b*. For example, as illustrated in the control center interface 1331, a check mark symbol is optionally placed at the third virtual environment share element (illustrated "Share BKGD3") to indicate that the virtual environment is downloaded to the second computer system 101*b*.

As further illustrated in the three-dimensional environment 1305 in FIG. 13H, the control center interface 1331 is shown with setting 2 shaded to indicate that the second time of day setting is currently applied to the first virtual environment 1322. In some embodiments, the selection of the time of day setting is based on the respective time of day setting of the computer system that initiated the request to share (e.g., computer system 101*a*). As further illustrated in the three-dimensional environment 1305 in FIG. 13H, the second computer system 101*b* maintains the same level of immersion that it was previously set to. For example, as shown in FIG. 13F, the immersion level of the second virtual environment 1324 is approximately at 90% immersion as indicated by indicator 1316. In response to updating the three-dimensional environment 1305 to display the shared virtual environment in FIG. 13H, the second computer system 101*b* maintains the same level of immersion (e.g., 90% immersion) as shown in the immersion level indicator 1316 in FIG. 13H.

FIGS. 14A-14Q is a flowchart illustrating a method of joining a communication session with a second computer system while maintaining display of their respective virtual environments in accordance with some embodiments. In some embodiments, the method 1400 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1400 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1400 are, optionally, combined and/or the order of some operations is, optionally, changed.

In some embodiments, method 1400 is performed at a first computer system in communication with a display generation component and one or more input devices, such as computer system 101*b* in FIG. 13B. In some embodiments, the first computer system has one or more of the characteristics of the computer systems of methods 800, 1000 and/or 1200. In some embodiments, the display generation component has one or more of the characteristics of the display generation components of methods 800, 1000 and/or 1200. In some embodiments, the one or more input devices have one or more of the characteristics of the one or more input devices of methods 800, 1000 and/or 1200.

In some embodiments, the first computer system displays (1402*a*), via the display generation component, a first virtual environment, such as environment 1324 in FIG. 13B (e.g., the first virtual environment optionally has one or more of the characteristics of the virtual environments of methods 800, 1000, 1200, 1600 and/or 1800). In some embodiments, while displaying the first virtual environment, the first computer system receives (1402*b*), via the one or more input devices, a first input corresponding to a request for the first user of the first computer system to join a communication session including a second user of a second computer system, different from the first computer system, wherein the second computer system is displaying a second virtual environment (e.g., the second virtual environment optionally has one or more characteristics of the first virtual environment), different from the first virtual environment, such as in response to input at computer system 101*a* in FIGS. 13A and 13A1 (e.g., tap or hand air gesture such as pointing or pinching at an icon or other selectable option displayed in the environment to request to join the communication session with a user of a second computer system; or an input using an interface controller in an AR or VR environment to provide input to select an icon or other selectable option to request to join the communication session including the user of the second computer system). In some embodiments, the first user input is an attention-only and/or gaze-only input (e.g., not including input from one or more portions of the user other than those portions providing the attention input). In some embodiments, the first computer system is not participating in a communication session with another user or computer system when the first input is received. In some embodiments, the first computer system is participating in a communication sessions with one or more other users or computer systems—not including the second computer system—when the first input is received.

In some embodiments, in response to receiving the first input, the first computer system joins (1402*c*) the communication session (e.g., a communication session such as described with reference to method 1600) with the user of the second computer system while maintaining display of the first virtual environment via the display generation component, such as shown with computer system 101*b* and environment 1324 in FIG. 13D, where the first user of the first computer system is communicating with a spatial representation of the second user that is located at a respective location within the first virtual environment, such as avatar 1320*a* in FIG. 13D (e.g., the second user is represented by a glowing orb, video chat window, avatar, or other representation that has a spatial position within the first virtual environment). In some embodiments, the spatial representation of the second user has one or more of the characteristics of the spatial representation of the second user described with reference to method 1800.

In some embodiments, the spatial representation of the second user moves within the first virtual environment based on movement of the second user (1402*d*), such as movement of avatar 1320*a* (e.g., portions of an avatar representation of the second user move relative to other portions of the avatar representation of the second user or the spatial representation of the second user moves relative to the first virtual environment. In some embodiments). In some embodiments, the second computer system maintains display of the second virtual environment after the first computer system joins the communication session with the user of the second computer system where the second user of the second computer system is communicating with a spatial representation of the first user that is located within the second virtual environment, such as avatar 1321*a* in FIG. 13C (e.g., the first user is represented by a glowing orb, video chat window, avatar, or other representation that has a spatial position within the first virtual environment, optionally the first user or the second user can change a position and/or orientation of the representation of the second user within the second virtual environment), and the spatial representation of the first user moves within the second virtual environment based on movement of the first user (1402*e*), such as movement of avatar 1321*a* (e.g., portions of an avatar representation of the first user move relative to other portions of the avatar representation of the first user or the spatial representation of the first user moves relative to the second virtual environment). In some embodiments, the spatial representation of the first user has one or more of the characteristics of the spatial representation of the first user described with reference to method 1800. The communication session including the first and second computer systems is optionally a communication session in which audio and/or video of the users of the various computer systems involved are accessible to other computer systems/users in the communication session. In some embodiments, during the communication session, a given computer system participating in the communication session displays one or more avatars of the one or more other users participating in the communication session, where the avatars are optionally animated in a way that corresponds to the audio (e.g., speech audio) transmitted to the communication session by the corresponding computer systems. In some embodiments, during the communication session, the first computer system displays the one or more avatars of the one or more other users participating in the communication session in the virtual environment being displayed by the first computer system, and the second computer system displays the one or more avatars of the one or more other users participating in the communication session in the virtual environment being displayed by the second computer system. When a user of the first computer system joins the communication session with a user of the second computer system, the first computer system optionally maintains display of the first virtual environment (e.g., a view of the mountains) and the second computer system optionally maintains display of the second virtual environment (e.g., view of the beach). Maintaining the first virtual environment (e.g., a view of mountains) and second virtual environment (e.g., a view of the beach) respectively for the different computer systems when joining the communication session reduces potentially jarring changes in context for the users of the computer systems, reduces discomfort in using the computer systems, and improves user-device interaction.

In some embodiments, while the first computer system and the second computer system are in the communication session, wherein the first computer system is displaying the first virtual environment, and the second computer system is displaying the second virtual environment, such as shown in FIGS. 13C and 13D, the first computer system detects (1404*a*) that one or more criteria are satisfied, such as selection of "Accept" in FIG. 13F. In some embodiments, the one or more criteria include a criterion that optionally requires at least two users in the communication session for a respective environment to be shared. For example, if a first user sends a request to a second user to share a respective environment selected for sharing by the first user and the second user denies the prompt to accept, the respective virtual environment will not be shared. In another example, the first user sends a request to the second user, a third user, and a fourth user, to share a respective environment. If the second user accepts and the third user and the fourth user reject the prompt to accept, the respective virtual environment will be shared by the first user and the fourth user.

In some embodiments in response to detecting that the one or more criteria are satisfied (e.g., at least two users required to share a respective virtual environment, when the first computer system receives an indication indicating that the second computer switched to displaying the respective environment, and/or the respective virtual environment is downloaded in the first computer system), the first computer system displays (1404*b*), via the display generation component, a respective shared virtual environment that is shared by the first computer system and the second computer system in the communication session, such as environment 1322 in FIGS. 13G and 13H, wherein the spatial representation of the second user (e.g., a second avatar) is displayed by the first computer system within the respective shared virtual environment (e.g., a mountain scene virtual environment), such as avatar 1320*a*, and the spatial representation of the first user (e.g., a first avatar) is displayed by the second computer system within the respective shared virtual environment while the respective shared virtual environment is shared by the first computer system and the second computer system in the communication session, such as avatar 1321*a*. For example, prior to sharing the respective shared virtual environment, the first computer system displays a virtual mountain range and the second computer system displays a virtual beach environment. The first user optionally sends a request to the second user inviting the second user to share the virtual mountain range environment with the first user. After accepting the invitation, the virtual mountain range is optionally displayed via the respective computer system of the second user which replaces the virtual beach environment. In some embodiments, an avatar corresponding to the second user is displayed in the virtual mountain range environment via the first computer system and an avatar corresponding to the first user is displayed in the virtual mountain range environment via the second computer system. Selectively sharing a respective virtual environment with other users in the communication session based on criteria provides a quick and efficient way to share the respective virtual environment with other users, while avoiding erroneous sharing of virtual environments between users, and simplifies user interaction with the computer system.

In some embodiments, the one or more criteria include a criterion that is satisfied when the first computer system receives an indication that the second computer system has switched from displaying the second virtual environment to displaying the respective shared virtual environment during the communication session (1406), such as computer system 101*a* switching environments in FIG. 13E instead of sharing environment 1322 (e.g., the second user provided input to the second computer system to switch to the shared virtual environment and/or to share the shared virtual environment with the first computer system). In some embodiments, the first computer system receives an indication that the second computer system has switched from displaying the second virtual environment to displaying the respective shared virtual environment when the second user provides an input via an interface displayed via the second computer system to indicate that the second user is accepting the invitation to display the respective virtual environment. Automatically switching to a shared environment in a communication session when one user in the communication session switches to a shared environment provides a quick and efficient way to share the respective virtual environment with other users and simplifies user interaction with the computer system.

In some embodiments, the one or more criteria include a criterion that is satisfied when a second input (e.g., the second input is provided by the first user) corresponding to a request to confirm the display of the respective shared virtual environment at the first computer system is received (1408*a*), such as the input from hand 1312*b* in FIG. 13F. In some embodiments, while the first computer system and the second computer system are in the communication session and while displaying, via the display generation component, the first virtual environment, the first computer system receives (1408*b*) an indication that the second computer system has changed from displaying the second virtual environment to displaying the respective shared virtual environment different from the first virtual environment, such as if computer system 101*a* had switched environments in FIG. 13E. In some embodiments, the indication that the second computer system has changed from displaying the second virtual environment to displaying the respective shared virtual is indicated by an input provided by the second user selecting a selectable element displayed via the second computer system.

In some embodiments, in response to receiving the indication that the second computer system has changed from displaying the second virtual environment to displaying the respective shared virtual environment, the first computer system displays (1408*c*), via the display generation component, a confirmation user interface for confirming display of the respective shared virtual environment at the first computer system, such as confirmation 1332 in FIG. 13F. In some embodiments, the confirmation user interface includes one or more selectable elements corresponding to confirming the display of the respective shared virtual environment and/or rejecting the display of the respective shared virtual environment.

In some embodiments, while displaying the confirmation user interface and the first virtual environment, the first computer system receives (1408*d*), via the one or more input devices, the second input (e.g., the second input optionally includes a hand of a user performing a pinch air gesture, a tap on a touchpad, a click on a touchpad, and/or a selection of one or more buttons on a handheld controller) corresponding to the request to confirm the display of the respective shared virtual environment at the first computer system, such as input from hand 1312*b* in FIG. 13F. For example, the confirmation user interface optionally includes first selectable element indicating "confirm display of beach virtual environment" and/or a second selectable element indicating "reject display of beach virtual environment." If the first user provides input to confirm the display of the beach virtual environment, the beach virtual environment replaces the first virtual environment. If the first user provides input to reject the display of the beach virtual environment, display of the first virtual environment is optionally maintained. Confirming the display of the respective shared virtual environment before it is displayed reducing errors resulting from accidental sharing of respective virtual environments that may have not been intended, thereby reducing the number of inputs need to change the respective virtual environment, and thereby simplifies user interaction with the computer system.

In some embodiments, the one or more criteria include a criterion that is satisfied when the respective shared virtual environment has been downloaded to the first computer system (1410), such as after the download of environment 1322 has completed at computer system 101*b* as indicated by indicator 1334 in FIG. 13F. In some embodiments, the first computer system optionally includes one or more virtual environments that are pre-downloaded and stored in the memory of the first computer system. In some embodiments, when the respective shared virtual environment is not pre-downloaded and stored in the memory of the first computer system, the respective shared virtual environment is optionally downloaded from one or more virtual environment databases located in one or more servers at the time the first computer system needs to display the respective shared virtual environment (e.g., in response to receiving the invitation to share the respective virtual environment). In some embodiments, the first virtual environment gradually fades away as the respective virtual environment gradually appears on the display of the first computer system after the respective shared virtual environment is downloaded. For example, after the respective shared virtual environment has been downloaded, the first virtual environment ceases to be displayed after a specified time threshold (e.g., 0.5 second, 1 second, 3 seconds, 5 seconds, 7 seconds, 15 seconds, or 30 seconds). While or after the first virtual environment ceases to be displayed, the respective shared virtual environment is gradually displayed after a specified threshold (e.g., 0.5 second, 1 second, 3 seconds, 5 seconds, 7 seconds, 15 seconds, or 30 seconds). In some embodiments, the period during which the first virtual environment ceases to be displayed and the displaying of the respective virtual environment overlap. Thus, the first computer system optionally displays a combination or a blended view of the respective virtual environment and the first virtual environment during the transition. Displaying the respective virtual environment based on criteria that the respective shared virtual environment has been downloaded enables a seamless and efficient transition from displaying the first virtual environment to the respective shared virtual environment while preventing delays or lags, thereby improving user-device interaction.

In some embodiments, the one or more criteria include a criterion that is satisfied when a second input (e.g., the second input is provided by the first user; in some embodiments, the second input optionally includes a hand of a user performing a pinch air gesture, a tap on a touchpad, a click on a touchpad, and/or a selection of one or more buttons on a handheld controller) for sharing the respective shared virtual environment is detected at the first computer system (1412*a*), such as input from hand 1312*a* in FIG. 13E. In some embodiments, while the first computer system and the second computer system are in the communication session, the first computer system displays (1412*b*), via the display generation component, an information user interface for the communication session for controlling one or more characteristics of the communication session, such as user interface 1331 (e.g., sharing a respective virtual environment with one or more users, downloading a virtual environment, viewing a thumbnail of a corresponding virtual environment, reading about a respective virtual environment, watching a video related to a respective virtual environment, adding users to the communication session, a current duration of the communication session, adjusting the volume of the communication session, and/or muting the audio of the communication session).

In some embodiments, while displaying the information user interface, the first computer system receives (1412*c*), via the one or more input devices, the second input directed to the information user interface, such as selection of one of the options in user interface 1331 in FIG. 13H. In some embodiments, the information user interface is displayed via the display generation component of the first computer. In some embodiments, the information user interface optionally includes one or more selectable elements corresponding to one or more virtual environments including the respective shared virtual environment. For example, a first selectable element corresponds to a beach virtual environment, a second selectable element corresponds to a park virtual environment, and a third selectable element corresponds to a mountain range virtual environment. In some embodiments, the one or more virtual environments included in the information user interface are stored in the memory of the first computer system. In some embodiments, the one or more virtual environments included in the information user interface are stored in one or more databases on one or more servers and optionally can be downloaded. Displaying the shared virtual environment from the information user interface for controlling one or more characteristics of the communication session provides an efficient manner of displaying the shared virtual environment, thereby improving user-device interaction.

In some embodiments, before the one or more criteria are satisfied, the first computer system receives (1414*a*), via the one or more input devices, a second input (e.g., the second input is provided by the first user) corresponding to a request to switch from displaying the first virtual environment to displaying a third virtual environment, different from the first virtual environment, such as if computer system 101*b* received input to switch environments in FIG. 13F. In some embodiments, an information user interface is displayed via the display generation component of the first computer and optionally includes one or more selectable elements corresponding to one or more virtual environments that are selectable to display the third virtual environment.

In some embodiments, in response to receiving the second input (1414*b*), in accordance with a determination that the first computer system and the second computer system are in the communication session, the first computer system displays (1414*c*), via the display generation component, a virtual environment sharing user interface for indicating whether the third virtual environment should be shared with the second computer system in the communication session, similar to user interface 1332 in FIG. 13F but instead requesting confirmation that the computer system 101*b* should share the switched-to environment with computer system 101*a*. In some embodiments, the virtual environment sharing user interface includes a prompt asking the first user whether the user would like to share the third virtual environment with the second user (e.g., "would you like to share the currently displayed virtual environment (e.g., third virtual environment) with the second user or any of the users?"). In some embodiments, the virtual environment sharing user interface includes a selectable option that is selectable to initiate sharing of the third virtual environment with the communication session.

In some embodiments, the one or more criteria include a criterion that is satisfied when input is received at the first computer system confirming sharing of the third virtual environment, as the respective shared virtual environment, with the second computer system in the communication session (1414*d*), such as if a confirming input were received after computer system 101*b* received input to switch environments in FIG. 13F. For example, the input confirming sharing of the third virtual environment with the second user of the second computer system optionally includes a tap or other selection input on a selectable element displayed in the virtual environment sharing user interface corresponding to sharing the third virtual environment with the second user (e.g., "share third virtual with the second user"). Displaying a virtual environment sharing user interface for confirming whether a virtual environment should be shared with the communication session reduces the likelihood of unintentional sharing of a virtual environment, improving user privacy and thereby improving user-device interaction.

In some embodiments, the virtual environment sharing user interface includes a first selectable option that is selectable to share the third virtual environment, as the respective shared virtual environment, with the second computer system, and a second selectable option that is selectable to display the third virtual environment at the first computer system without sharing the third virtual environment with the second computer system (1416), similar to user interface 1330 in FIG. 13E, but with options to switch environments only for computer system 101*a* or also for computer system 101*b*. In some embodiments, the virtual environment sharing user interface includes the first selectable option that is selectable to share the third virtual environment with the second computer system. For example, first selectable option optionally indicates includes the statement, "click here to share." In some embodiments, the second selectable option is selectable to display the third virtual environment at the first computer system, however, the third virtual environment won't be shared with the second computer system. For example, the second selectable option optionally indicates includes the statement, "don't share." Displaying a virtual environment sharing user interface that includes a selectable option to share a respective virtual environment with other users and a selectable option to display the respective virtual environment at the computer first computer facilitates efficient sharing (or not) of virtual environments, thereby improving user-device interaction.

In some embodiments, in response to detecting that the one or more criteria are satisfied (1418*a*), in accordance with a determination that the satisfaction of the one or more criteria corresponds to acceptance of a request from the second computer system, such as acceptance in user interface 1332 in FIG. 13F (e.g., the first user accepts the request to displayed and/or share the respective shared virtual environment from the second user, such as via a pinch air gesture, a tap on a touchpad, a click on a touchpad, and/or a selection of one or more buttons on a handheld controller), to share the respective shared virtual environment with the first computer system, the first computer system displays (1418*b*), via the display generation component, the respective shared virtual environment without changing a system virtual environment of the first computer system, such as computer system 101*b* displaying environment 1322 in FIG. 13H without changing the system virtual environment for computer system 101*b* (e.g., the first computer system displays the respective shared virtual environment during the communication session while the system virtual environment, after the communication session ends, remains the same as it was before). For example, if the second user initiates a request to share the respective shared virtual environment of a beach scene with the first computer system, the beach scene is displayed by the first computer system during the communication session, however, the system virtual environment of the first computer system is not changed to the beach scene. In some embodiments, the system environment is a default virtual environment displayed by the computer system in response to an input that causes display of a virtual environment by the computer system, where the input does not define or otherwise indicate what virtual environment to display.

In some embodiments, in accordance with a determination that the satisfaction of the one or more criteria corresponds to a request to switch to from displaying the first virtual environment to displaying the respective shared virtual environment that is not based on a request, from the second computer system, to share the respective shared virtual environment with the first computer system (e.g., the request to switch from displaying the first virtual environment is to displaying the respective shared virtual environment is initiated by the first user from the first computer system, such as via a virtual environment selection user interface), the first computer system displays (1418*c*), via the display generation component, the respective shared virtual environment and changing the system virtual environment of the first computer system to be the respective shared virtual environment, such as computer system 101*b* displaying environment 1322 in FIG. 13H and also changing the system virtual environment for computer system 101*b*. For example, if the first user initiates a request to switch from displaying the first virtual environment that includes a mountain scene to displaying the respective shared virtual environment that includes a beach scene, the system virtual environment of the first computer also changes to be the beach scene. Maintaining or changing the system virtual environment of the first computer system based on which user initiates a request to share a respective virtual environment reduces the number of inputs needed to correct undesired or unexpected changes to the system virtual environment, and thereby simplifies user interaction with the computer system.

In some embodiments, in response to receiving the second input (1420*a*), in accordance with a determination that the first computer system is not in a communication session with another computer system, the first computer system displays (1420*b*), via the display generation component, the third virtual environment without displaying the virtual environment sharing user interface, such as if computer system 101*a* were to switch environments in FIGS. 13A and 13A1. In some embodiments, the first user can display or switch from one virtual environment to a different virtual environment independent of whether the first user is in the communication. In some embodiments, when the first user displays or switches virtual environments, neither action causes the display of the virtual environment sharing user interface, because the first computer system is not part of a communication session. Displaying a respective virtual environment while not in a communication session and without displaying the virtual environment sharing user interface reduces the number of inputs needed to display the virtual environment, thereby improving user-device interaction.

In some embodiments, while the first computer system and the second computer system are in the communication session, the first computer system displays (1422*a*), via the display generation component, a virtual environment selection user interface, such as user interface 1331 in FIG. 13H. In some embodiments, the virtual environment selection user interface includes one or more selectable options corresponding to virtual environments that are selectable to display. For example, the virtual environments that are selectable for display optionally include different types of virtual environments such as a beach, a mountain environment, a city environment, and/or an amusement park environment. A selection of a respective icon in the selection user interface optionally causes the first computer system to display a respective virtual environment that corresponds to the respective icon. In some embodiments, the selectable options displayed in the virtual environment selection user interface are displayed with respective visual indications such as an icon that represents the respective virtual environment (e.g., an image of the scene of the virtual environment) and corresponding first time of day and/or the second time of day. In some embodiments, an icon representing a respective virtual environment includes an image of the respective virtual scene. For example, a first icon representing a city environment optionally includes a partial image of the city. In another example, a second icon representing a beach environment optionally includes a partial image of the beach.

In some embodiments, in accordance with a determination that a first respective virtual environment (e.g., a beach environment, a mountain environment, park environment, a city environment, and/or an amusement park environment) is being shared by the first computer system and the second computer system in the communication session, the virtual environment selection user interface includes a first visual indication (e.g., an icon, a mark, a brand, an emblem, badge, a trophy, a checkmark, or any other symbol) indicating that the first respective virtual environment is being shared by the first computer system and the second computer system in the communication session (1422*b*), such as indication 1338*b* in FIG. 13H. In some embodiments, in accordance with a determination that a second respective virtual environment (e.g., a beach environment, a mountain environment, park environment, a city environment, and/or an amusement park environment), different from the first respective virtual environment, is being shared by the first computer system and the second computer system in the communication session, the virtual environment selection user interface includes a second visual indication (e.g., an icon, a mark, a brand, an emblem, badge, a trophy, a checkmark, or any other symbol) indicating that the second respective virtual environment is being shared by the first computer system and the second computer system in the communication session (1422*c*), such as indication 1338*b* in FIG. 13H. In some embodiments, the virtual environment selection user interface includes one or more selectable options corresponding to one or more respective virtual environments that are selectable to display the corresponding virtual environments. For example, the respective virtual environments that are selectable for display optionally include different types of virtual environments such as a beach, a mountain environment, a city environment, and/or an amusement park environment. In some embodiments, the selectable options displayed in the virtual environment selection user interface are displayed with respective visual indications such as an icon, a mark, a brand, an emblem, badge, a trophy, a checkmark, or any other symbol to indicate that the corresponding respective virtual environment is being shared by the first computer system and the second computer system. In some embodiments, the virtual environment selection user interface is displayed via the display generation of the first computer system and/or the second computer system. Displaying a respective visual indication to indicate that the respective virtual environment is being shared in the communication session provides a quick and efficient method of determining the virtual environment that is being shared, which enhances the operability of the computer system and makes the user-device interface more efficient.

In some embodiments, while the first computer system and the second computer system are in the communication session, the first computer system displays (1424), via the display generation component, a virtual environment selection user interface (e.g., as described with reference to step(s) 1422), and visually distinguishes one or more downloaded environments from one or more environments that are not downloaded, such as by indications 1336*a* and 1336*b* in FIGS. 13G and 13H. In some embodiments, in accordance with a determination that a first respective virtual environment is downloaded at the first computer system, the virtual environment selection user interface includes a first representation with a first appearance that visually distinguishes the first representation of the first respective virtual environment from representations of one or more virtual environments that have not been downloaded; in accordance with a determination that the first respective virtual environment is not downloaded at the first computer system, the virtual environment selection user interface includes the first representation with a second appearance that visually distinguishes the first representation of the first respective virtual environment from representations of one or more virtual environments that have been downloaded; in accordance with a determination that a second respective virtual environment is downloaded at the first computer system, the virtual environment selection user interface includes a second representation with the first appearance that visually distinguishes the second representation of the second respective virtual environment from representations of one or more virtual environments that have not been downloaded; in accordance with a determination that the second respective virtual environment is not downloaded at the first computer system, the virtual environment selection user interface includes the second representation with the second appearance that visually distinguishes the second representation of the second respective virtual environment from representations of one or more virtual environments that have been downloaded. In some embodiments, the first computer system includes one or more virtual environments that are stored on local memory and/or have been downloaded from one or more virtual environment databases located on one or more servers. In some embodiments, a respective visual indication such as a checkmark symbol is displayed proximate to one or more selectable options corresponding to one or more respective virtual environments to indicate that the respective virtual environment is downloaded at the first computer system. For example, the check mark symbol is optionally placed at a position proximate to selectable options corresponding to an amusement park virtual environment, a football game virtual environment, and a beach virtual environment if those virtual environments are already downloaded at the first computer system. Displaying a respective visual indication indicating that a respective virtual environment is downloaded provides a quick and efficient method of determining which virtual environments are downloaded at the computer system, which enhances the operability of the computer system and makes the user-device interface more efficient.

In some embodiments, while the first computer system and the second computer system are in the communication session and while displaying, via the display generation component, the first virtual environment, the first computer system receives (1426*a*) an indication that the second computer system has changed from displaying the second virtual environment to displaying the respective shared virtual environment different from the first virtual environment, such as if computer system 101*a* in FIG. 13E had switched to a different environment. For example, while the first computer system displays a first environment that includes a mountain range virtual environment, the first computer system receives an indication that the second user of the second computer system has changed their virtual environment in the communication session from a beach virtual environment to the respective shared virtual environment that corresponds to a football game virtual environment.

In some embodiments, in response to receiving the indication that the second computer system has changed from displaying the second virtual environment (e.g., a beach virtual environment) to displaying the respective shared virtual environment (e.g., football game virtual environment), the first computer system displays (1426*b*), via the display generation component, a confirmation user interface for confirming display of the respective shared virtual environment at the first computer system, such as user interface 1332 in FIG. 13F. In some embodiments, the confirmation user interface is displayed via the display generation component while continuing to display the first virtual environment. Displaying the conformation interface of a respective shared virtual environment provides a quick and efficient way of confirming the respective shared virtual environment initiated by the second user of the second computer system, thus reducing the number of inputs needed to determine which virtual environment is being shared, and thereby simplifies user interaction with the computer system.

In some embodiments, the confirmation user interface includes a first selectable option that is selectable to confirm the display of the respective shared virtual environment, and a second selectable option that is selectable to decline the display of the respective shared virtual environment (1428*a*), such as "Accept" in user interface 1332 in FIG. 13F. In some embodiments, while displaying the confirmation user interface, the first computer system receives (1428*b*), via the one or more input devices, a second input directed to the confirmation user interface, such as "Decline" in user interface 1332 in FIG. 13F. In some embodiments, the second input has one or more of the characteristics of the inputs of step(s) 1402.

In some embodiments, in response to receiving the second input (1428*c*), in accordance with a determination that the second input corresponds to selection of the first selectable option, the first computer system displays (1428*d*), via the display generation component, the respective shared virtual environment (and begin sharing the virtual environment with the communication session), such as shown with computer system 101*b* in FIG. 13H. For example, the first selectable optionally includes the statement, "click here if you would like to confirm a shared football game virtual environment from user 2."

In some embodiments, in accordance with a determination that the third input corresponds to selection of the second selectable option, the first computer system maintains (1428*e*) display of the first virtual environment without displaying, via the display generation component, the respective shared virtual environment, such as if the "Decline" option were selected in FIG. 13F (and without sharing the virtual environment with the communication session). For example, the second selectable optionally includes a statement, "click here if you would like to decline a shared football game virtual environment from user 2." In some embodiments, the confirmation user interface includes information about the respective shared virtual environment (e.g., a description, a summary, types of virtual objects, weather condition, a type of day setting, other users who that are currently in the respective shared virtual environment, a ranking, and/or score). Displaying the conformation interface that includes a first selectable option to confirm and/or to decline the respective shared virtual environment provides a quick and efficient way to join the respective shared virtual environment, thus reducing the number of inputs needed to determine which virtual environment is being shared, and thereby simplifies user interaction with the computer system.

In some embodiments, the indication that the second computer system has changed from displaying the second virtual environment to displaying the respective shard virtual environment is received after the second computer system is displaying the respective shared virtual environment (1430), such as after computer system 101*a* is displaying a switched-to environment in FIG. 13C. For example, after the second computer system changes the display from a beach virtual environment to the respective shared virtual environment that includes a football game virtual environment, the first computer system receives an indication that the computer system has changed to the football game virtual environment and displays the confirmation user interface to confirm the display of the respective shared virtual environment at the first computer system. In some embodiments, the above do not occur until the second computer system is displaying the shared virtual environment—therefore, if the second computer system must first download the shared virtual environment, the first computer system optionally does not receive the above indication until the download has been completed by the second computer system. Displaying the confirmation user interface at the first computer system after the second computer system is displaying the respective shared virtual environment ensures that second user who initiated sharing of the respective shared virtual environment is actually in the shard virtual environment, thus reducing the number of inputs needed to confirm whether the second user will join respective shared virtual environment, and thereby simplifies user interaction with the computer system.

In some embodiments, the one or more criteria are satisfied based on a respective computer system (e.g., the first computer system, the second computer system, or a different computer system) in the communication session switching from displaying a first respective virtual environment to displaying a second respective virtual environment (1432), such as if computer system 101*a* in FIG. 13C switches environments. For example, if the first computer system is displaying a first respective virtual environment that includes a virtual mountain range environment and switches to displaying a second respective virtual environment that includes a virtual park environment, the one or more criteria are satisfied which causes the virtual park environment to be shared with the communication session. In some embodiments, the one or more criteria are not satisfied if the first respective virtual environment is not switched to another virtual environment by a respective computer system in the communication session, and display of the first respective virtual environment is maintained. For example, in some embodiments, the one or more criteria are not satisfied in response to input to change an immersion level, and/or volume level associated with the first respective virtual environment. Therefore, in some embodiments, any user in the communication session is able to change the virtual environment that is being shared in the communication session. Allowing any user in the communication session to share a virtual environment with the communication session reduces the number of inputs needed to share virtual environments, and simplifies user interaction with the computer system.

In some embodiments, the one or more criteria are satisfied based on a respective computer system in the communication session initiating sharing of respective content in the communication session (1434), such as if computer system 101*a* in FIG. 13C starts to share content in the communication session. In some embodiments, the respective content optionally includes audio content, video content, social media content, and/or reading content. For example, if the first computer initiates sharing video content related to a football game in the communication session (e.g., to be displayed within the virtual environment displayed by the first computer system in the communication session), the first computer system optionally initiates sharing of the virtual environment of the first computer system and the video content with the communication session. In some embodiments, the one or more criteria are not satisfied when a respective computer system in the communication session does not initiate sharing of respective content in the communication session, and display of the first respective virtual environment is maintained. For example, in some embodiments, the one or more criteria are not satisfied in response to input to change an immersion level, and/or volume level associated with the first respective virtual environment. Triggering virtual environment sharing based on sharing of content provides a quick and efficient way for the first computer system and the second computer system to display a respective shared virtual environment, reduces the number of inputs required to share the respective virtual environment, and simplifies user interaction with the computer system.

In some embodiments, the one or more criteria include a criterion that is satisfied when second input (e.g., the second input is provided by the first user; in some embodiments, the second input optionally includes a hand of a user performing a pinch air gesture, a tap on a touchpad, a click on a touchpad, and/or a selection of one or more buttons on a handheld controller) is detected confirming sharing of the respective shared virtual environment with the first computer system and the second computer system in the communication session (1436*a*). For example, the second input is a gesture by the hand of the user selecting an element on a confirmation user interface (e.g., as described with reference to step(s) 1408) indicating acceptance of the sharing of the respective shared virtual environment with the second user of the second computer system.

In some embodiments, in response to detecting that the one or more criteria are not satisfied, such as if the "Decline" option is selected in FIG. 13F, the first computer system exits (1436*b*) the communication session with the second computer system. For example, the one or more criteria is not satisfied when input is received indicating that the second user rejects a request to display the respective shared virtual environment which results in the second computer system exiting the communication session. Selectively exiting the communication session based on not accepting a shared virtual environment ensures that the first computer system does not needlessly remain in the communication session, thereby improving user-device interaction.

In some embodiments, while the first computer system and the second computer system are in the communication session (1438*a*), while displaying, via the display generation component, the respective shared virtual environment in response to the second input and while the respective content is being shared in the communication session, such as if computer systems 101*a* and 101*b* were sharing content in FIGS. 13G and 13H, the first computer system receives (1438*b*), via the one or more input devices, an indication that that sharing of the respective content in the communication session has ended. For example, the respective content is video content related to a football game which has ended, or the sharer of the content to the communication session (or a different user) has closed the content or removed the content from the shared virtual environment.

In some embodiments, in response to receiving the indication that the sharing of the respective content in the communication session has ended, the first computer system ceases (1438*c*) display of the respective shared virtual environment (e.g., a football game virtual environment) and displays, via the display generation component, the first virtual environment, such as if computer system 101*b* were to return from the display of environment 1322 in FIG. 13H to displaying environment 1324 in FIG. 13D. For example, after the video content related to the football game ends, the football game virtual environment ceases to display and the first virtual environment that was displayed previously replaces the football game virtual environment. Reverting back to an originally displayed virtual environment after sharing of a respective content ends provides a seamless and efficient way to revert back to an originally displayed virtual environment, thereby improving user-device interaction.

In some embodiments, while the respective shared virtual environment (e.g., mountain range virtual environment) is shared by the first computer system and the second computer system in the communication session (1441*a*), the first computer system displays the respective shared virtual environment from a first direction (e.g., the first computer system is displaying the shared virtual environment in a northbound direction) relative to a reference (e.g., simulated cardinal orientations) in the respective shared virtual environment, such as shown with respect to computer system 101*b* in FIG. 13H, including displaying a respective portion (e.g., the respective portion includes a mountain goat climbing a cliff, or another virtual object or element of the simulated physical space of the shared virtual environment) of the respective shared virtual environment having a respective location relative to the respective shared virtual environment from the first direction relative to the reference (1441*b*). For example, the first computer system displays a respective portion of the shared virtual environment that includes a mountain goat climbing or roaming near the top of a cliff, where the cliff is located at a particular location in the simulated physical space of the shared virtual environment, and the first computer system is displaying that particular location in the simulated physical space from the first direction and/or a first location in the simulated space.

In some embodiments, the second computer system displays the respective shared virtual environment from a second direction, different from the first direction, relative to the reference in the respective shared virtual environment, such as shown with respect to computer system 101*a* in FIG. 13G, including displaying the respective portion of the respective shared virtual environment having the respective location relative to the respective shared virtual environment from the second direction relative to the reference (1441*c*). For example, the second computer system displays the respective portion of the shared virtual environment where the cliff is located at the same particular location in the simulated physical space of the shared virtual environment as displayed by the first computer system, but the second computer system is displaying that particular location in the simulated physical space from the second direction and/or a second location in the simulated space. Displaying respective portions of a shared virtual environment at consistent locations in that shared virtual environment (though optionally from different directions) at the first computer system and the second computer system ensures consistent interaction between users in the communication session and provides feedback that the virtual environment is being shared, thereby improving user-device interaction.

In some embodiments, while the respective shared virtual environment (e.g., mountain range virtual environment) is shared by the first computer system and the second computer system in the communication session (1440*a*), the first computer system displays the respective shared virtual environment from a first direction (e.g., the first computer system is displaying the shared virtual environment in a northbound direction) relative to a reference (e.g., simulated cardinal orientations) in the respective shared virtual environment, corresponding to a first simulated location of the first user in the respective shared virtual environment (e.g., the first computer system is displaying a view of the shared virtual environment from the first simulated location towards the first direction), wherein the spatial representation of the second user (e.g., a second avatar representing the second user) is displayed within the display of the respective shared virtual environment from the first direction (1440*b*), such as shown with respect to computer system 101*b* in FIG. 13H. For example, the respective shared virtual environment from the first direction includes a view of the mountain range which optionally includes a first portion of the mountain range and the second avatar representing the second user at a respective position in the respective virtual environment. In some embodiments, that respective position of the second avatar corresponds to the second simulated location from which the second computer system is displaying the shared virtual environment, as will be described below.

In some embodiments, the second computer system displays the respective shared virtual environment from a second direction (e.g., the second computer system is displaying the shared virtual environment in a southbound direction), different from the first direction, relative to the reference in the respective shared virtual environment, corresponding to a second simulated location of the second user in the respective shared virtual environment (1440*c*), such as shown with respect to computer system 101*a* in FIG. 13G (e.g., the second computer system is displaying a view of the shared virtual environment from the second simulated location towards the second direction). For example, the respective shared virtual environment from the second direction includes a view of the mountain range which includes a second portion of the mountain range and the first avatar representing the first user at a respective position in the respective virtual environment. In some embodiments, the respective shared virtual environment is asymmetric in that the view of the respective shared virtual environment from the second direction is different from the view of the respective shared virtual environment from the first direction (e.g., the respective computer systems display different virtual elements of (e.g., different portions of) the shared virtual environment from their respective directions (e.g., the first computer system displays a virtual tree in the respective shared virtual environment that is not displayed by the second computer system and/or the second computer system displays a virtual house in the respective shared virtual environment that is not displayed by the first computer system). In some embodiments, that respective position of the second avatar corresponds to the first simulated location from which the first computer system is displaying the shared virtual environment, as described above. In some embodiments, the view of the second portion of the mountain range is different than the view of first portion of the mountain range (e.g., they are views of the same shared virtual environment from different directions). Accordingly, the first user and the second user optionally see a different portion of the mountain range. In some embodiments, the spatial representation of the first user (e.g., a first avatar representing the first user) is displayed within the display of the respective shared virtual environment from the second direction, such as shown with respect to computer system 101*b* in FIG. 13H. Displaying the respective shared virtual environment and respective avatars from respective directions at the first computer system and the second computer system in manners that are consistent with each other in a shared virtual environment provides visual feedback about the relative placement of users in the shared virtual environment and provides feedback that the virtual environment is being shared, thereby reducing errors in interaction with the users during the communication session, improving user privacy and improving user-device interaction.

In some embodiments, while a third virtual environment (e.g., the first virtual environment, the second virtual environment, or a different virtual environment) is being displayed by the first computer system and the second computer system during the communication session, wherein the third virtual environment is not shared by the first computer system and the second computer system in the communication session (1442*a*), such as if computer systems 101*a* and 101*b* were both displaying environment 1322 in FIGS. 13C and 13D (e.g., third virtual environment is optionally football game virtual environment that is independently displayed by the first computer system and the second computer system during the communication session), the first computer system displays the third virtual environment from a first direction relative to a reference in the third virtual environment (e.g., as described with reference to step(s) 1438), wherein the spatial representation of the second user is displayed within the display of the third virtual environment from the first direction (1442*b*) (e.g., as described with reference to step(s) 1438), such as shown with respect to computer system 101*b* in FIG. 13D.

In some embodiments, the second computer system displays the third virtual environment from the first direction relative to the reference in the third virtual environment (e.g., the first computer system and the second computer system are displaying the third virtual environment from the same simulated location and towards the same orientation), wherein the spatial representation of the first user is displayed within the display of the third virtual environment from the first direction (1442*c*), such as shown with respect to computer system 101*a* in FIG. 13C. Therefore, when the third virtual environment is not being shared by the computer systems, the computer systems optionally display the third virtual environment in manners independent of how the other computer systems are displaying the third virtual environment. Displaying non-shared virtual environments in manners independent from one another provides feedback that the virtual environment is not being shared, thereby avoiding errors in interaction and improving user-device interaction.

In some embodiments, while the first computer system and the second computer system are in the communication session (1444*a*), displaying the first virtual environment before the one or more criteria are satisfied includes displaying the first virtual environment at a first level of immersion (1444*b*) (e.g., 25%, 50%, or 75% level of immersion), such as the level of immersion of computer system 101*b* in FIG. 13D. In some embodiments, displaying the respective shared virtual environment that is shared by the first computer system and the second computer system in the communication session includes in response to detecting that the one or more criteria are satisfied includes displaying the respective shared virtual environment at the first level of immersion (1444*c*), such as the level of immersion of computer system 101*b* in FIG. 13H. In some embodiments, immersion has one or more of the characteristics of immersion described with reference to methods 800 and/or 1800. In some embodiments, the amount of virtual environment that is displayed (e.g., the amount of physical environment that is not displayed) is based on the immersion level. For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects are visually de-emphasized (e.g., dimmed, blurred, and/or displayed with increased transparency) more than one or more second background objects, and one or more third background objects cease to be displayed. For example, if the first virtual environment is displayed at a 50% level of immersion, when the first user switches to the respective shared virtual environment, the respective shared virtual environment is also displayed at a 25%, 50%, or 75% level of immersion. Maintaining a same level of immersion when switching to a respective shared virtual environment ensures consistent display of the communication session and reduces the number of inputs needed to correct undesired or unexpected changes in immersion.

In some embodiments, in response to detecting that the one or more criteria are satisfied (1446*a*), in accordance with a determination a level of immersion (e.g., such as described with reference to step(s) 1444) associated with the first computer system is above a threshold level of immersion (e.g., for example, 10%, 20%, 30%, 50% or 75% immersion), the first computer system displays (1446*b*) the respective shared virtual environment that is shared by the first computer system and the second computer system in the communication session without changing the level of immersion associated with the first computer system, such as occurred with computer system 101*b* in FIG. 13H. For example, if the first computer system was displaying the first virtual environment at 75% immersion, the 75% of immersion is optionally maintained for displaying the respective shared virtual environment.

In some embodiments, in accordance with a determination the level of immersion associated with the first computer system is below the threshold level of immersion, the first computer system displays (1446*c*) the respective shared virtual environment that is shared by the first computer system and the second computer system in the communication session and changing the level of immersion associated with the first computer system, such as if the immersion of computer system 101*b* in FIG. 13F was less than the threshold level. For example, if the first computer system was displaying the first virtual environment at 25% immersion, when the first computer system switches to displaying the respective shared virtual environment, the first computer system optionally displays the respective shared virtual environment at 50%, 60%, 75%, 90% or 100% immersion. Selectively maintaining or changing a level of immersion based on a threshold level of immersion reduces the number of inputs needed to ensure the level of immersion is appropriate, and simplifies user interaction with the computer system.

In some embodiments, while the first computer system and the second computer system are in the communication session and independent of a level of immersion (e.g., such as described with reference to step(s) 1430) at which the second computer system is displaying a first respective virtual environment (1448*a*) (e.g., beach virtual environment), while displaying a second respective virtual environment (e.g., the first computer system displays a mountain range virtual environment) at a first level of immersion, the first computer system receives (1448*b*), via the one or more input devices, a second input corresponding to a request to change a level of immersion of the second respective virtual environment from the first level of immersion to the second level of immersion, such as an input to change immersion of computer system 101*b* in FIG. 13F. For example, a second input is provided by the first user of the first computer system via a selectable option in a user interface displayed by the first computer system to change the level of immersion from 25% to 75%, or via manipulation of a physical button or dial at the first computer system to change the level of immersion.

In some embodiments, in response to receiving the second input, the first computer system displays (1448*c*), via the display generation component, the second respective virtual environment at the second level of immersion, such as displaying environment 1324 in FIG. 13F at a different level of immersion. For example, the immersion level of the mountain range virtual environment changes from 25% to 75%, which optionally causes display of additional portions of the mountain range virtual environment that optionally include additional trees and a portion of the virtual mountain that was not previously displayed. The modification of the level of immersion at the first computer system optionally does not affect the level of immersion at the second computer system. Further, this independence of levels of immersion at different computer system is optionally true regardless of whether the computer systems are sharing the virtual environment and/or sharing content (e.g., such as described with reference to step(s) 1432 and 1436). Independently adjusting different immersion levels for different computer systems avoids undesired changes in levels of immersion, thereby reducing inputs needed to correct for such changes and improving user-device interaction.

In some embodiments, while the first computer system and the second computer system are in the communication session and independent of a volume level of the second computer system (1450*a*), while a volume level of the first computer system is a first volume level, the first computer system receives (1450*b*), via the one or more input devices, a second input corresponding to a request to change the volume level of the first computer system from the first volume level (e.g., 50% level) to a second volume level (e.g., 85% level), different from the first volume level, such as an input to change the volume of computer system 101*b* in FIG. 13F. For example, a second input is provided by the first user of first computer system via a selectable option in a user interface displayed by the first computer system to change the volume level from 50% to 80%, or via manipulation of a physical button or dial at the first computer system to change the volume level.

In some embodiments, in response to receiving the second input, the first computer system changes (1450*c*) the volume level of the first computer system from the first volume level to the second volume level, such as changing the volume of computer system 101*b* in FIG. 13F. For example, the first user is displaying a virtual environment of a music concert and a favorite song of the first user is being performed and the first computer system receives the second input to increase the volume level from 50% to 80%. Changing the volume level at the first computer system optionally does not affect the volume level at the second computer system. Further, this independence of controlling the volume level at different computer systems is optionally true regardless of whether the computer systems are sharing the virtual environment and/or sharing content (e.g., such as described with reference to step(s) 1432 and 1436). Independently adjusting a volume level of different computer systems avoids undesired changes to a volume level of a respective computer system, thereby reducing inputs needed to correct for such changes and improving user-device interaction.

In some embodiments, while respective content (e.g., such as described with reference to step(s) 1426) is being shared in the communication session (1452*a*), while the respective content is being shared in a compact mode (e.g., such as described with reference to method 1200) in the communication session, the first computer system displays (1452*b*), via the display generation component, a respective virtual environment (e.g., football game virtual environment) at a first level of immersion (e.g., 50% level of immersion). In some embodiments, while displaying the respective virtual environment at the first level of immersion (e.g., such as described with reference to step(s) 1444), the first computer system receives (1452*c*) an indication that the respective content is being shared in an expanded mode (e.g., such as described with reference to method 1200) in the communication session. In some embodiments, the indication is in response to input provided at the first computer system for switching the shared content from the compact mode to the expanded mode. In some embodiments, the indication is in response to input provided at the second computer system for switching the shared content from the compact mode to the expanded mode.

In some embodiments, in response to receiving the indication that the respective content is being shared in the expanded mode in the communication session (1452*d*), in accordance with a determination that the first level of immersion is less than a threshold level of immersion (e.g., such as described with reference to step(s) 1446), the first computer system increases (1452*e*) a level of immersion of the respective virtual environment to a second level of immersion, greater than the first level of immersion (e.g., increased to the threshold level of immersion, or greater than the threshold level of immersion). Increasing the level of immersion has one or more of the characteristics of increasing the level of immersion described with reference to step(s) 1446.

In some embodiments, in accordance with a determination that the first level of immersion is greater than the threshold level of immersion, the first computer system maintains (14520 the level of immersion of the respective virtual environment at the first level of immersion. Selectively maintaining or changing a level of immersion based on a threshold level of immersion based on sharing content in an expanded mode reduces the number of inputs needed to change the level of immersion to an appropriate value, and simplifies user interaction with the computer system.

In some embodiments, while the first computer system and the second computer system are in the communication session and while displaying a first respective virtual environment at the first computer system (1454*a*), in accordance with a determination that the first respective virtual environment is shared by the first computer system and the second computer system in the communication session, the first computer system synchronizes (1454*b*) a time of day setting (e.g., in some embodiments, the time of day setting is the time of day setting described with reference to method 800) at which the first computer system is displaying the first respective virtual environment with a time of day setting at which the second computer system is displaying the first respective virtual environment, such as the synchronized time of day settings in FIGS. 13G and 13H. For example, the first computer system is optionally set to display the first respective virtual environment with a first time of day setting that corresponds to light mode and the second computer system is optionally set to display the first respective virtual environment at a second time of day setting that corresponds to dark mode. In some embodiments, because the first respective virtual environment is shared by the first computer system and the second computer system, synchronizing the time of day setting optionally results in first computer system and the second computer system displaying the first respective virtual environment in the light mode, or alternatively in the dark mode. In some embodiments, the respective computer system that initiated sharing of a respective virtual environment controls the time of day setting. For example, the first computer system and the second computer system have a time of day setting respectively set at light mode and dark mode. If the first computer system initiates sharing of a respective virtual environment, the respective virtual environment is displayed in a light mode by the first computer system and the second computer system. In some embodiments, the first user of the first computer system or the second user of the second computer system can provide input to change the time of day setting with which the respective computer systems are displaying the respective shared virtual environment. In some embodiments, the time of day setting for the first computer system and the second computer system is controlled by the most recent setting applied by the first user or the second user (or other user in the communication session).

In some embodiments, in accordance with a determination that the first respective virtual environment is not shared by the first computer system and the second computer system in the communication session, the first computer system forgoes (1454*c*) synchronizing the time of day setting at which the first computer system is displaying the first respective virtual environment with the time of day setting at which the second computer system is displaying a second respective virtual environment, such as the unsynchronized time of day settings in FIGS. 13E and 13F. For example, because the first respective virtual environment is not shared by the first computer system and the second computer system, the first computer system and the second computer system are able to display their respective virtual environments at their own independent times of day. Therefore, input detected at one computer system to change the time of day setting at that computer system optionally does not change the time of day settings at which other computer systems display their respective virtual environments. Synchronizing a time of day setting for the first computer system and the second computer system reduces the number of inputs needed to adjust the time of day setting to an appropriate value, and simplifies user interaction with the computer system.

In some embodiments, synchronizing the time of day setting (e.g., such as described with reference to step(s) 1454) at which the first computer system is displaying the first respective virtual environment with the time of day setting at which the second computer system is displaying the first respective virtual environment includes (1456*a*) receiving, via the one or more input devices, a second input corresponding to a request to change the time of day setting at the first computer system to a first setting (1456*b*) (e.g., dark mode), such as an input at computer system 101*b* in FIG. 13H to change the time of day setting. In some embodiments, in response to receiving the second input, the first computer system initiates a process to set the time of day setting at the second computer system to the first setting, including causing the second computer system to display the first respective virtual environment in accordance with the first setting (1456*c*), such as causing computer system 101*a* in FIG. 13G to display environment 1322 with the changed time of day setting. For example, a first user of the first computer system, while the first computer system is displaying the first respective virtual environment in a light mode, provides the second input to change the display of the first respective virtual environment to a dark mode (e.g., to change the time of day setting from the light mode to the dark mode), which optionally causes the first computer system to transmit a command to the second computer system to change the setting at which the second computer system is displaying the first respective virtual environment to the dark mode.

In some embodiments, the first computer system receives (1456*c*), via the one or more input devices, an indication that the time of day setting at the second computer system has been changed to a second setting, such as computer system 101*a* in FIG. 13G changing a time of day setting for environment 1322. In some embodiments, in response to receiving the indication that the time of day setting at the second computer system has been changed to the second setting, initiating a process to set the time of day setting at the first computer system to the second setting, including the first computer system displaying (1456*d*) the first respective virtual environment in accordance with the second setting, such as if computer system 101*b* in FIG. 13H were to update the time of day setting at which it is displaying environment 1322. For example, a second user of the second computer system, while the second computer system is displaying the first respective virtual environment in a dark mode, provides input to change the display of the first respective virtual environment to the light mode, which in turn causes the second computer system to transmit a command to the first computer system to change the setting at which the first computer system is displaying the first respective virtual environment to the light mode. Allowing any user in the communication session to change the time of day setting of the virtual environment avoids conflict between the time of day setting and a given user's environment, and simplifies user interaction with the computer system.

In some embodiments, in response to receiving the indication that the time of day setting at the second computer system has been changed to the second setting, the first computer system generates (1458) a notification indicating that the second user has changed the time of day setting at the second computer system to the second setting, such as computer system 101*b* in FIG. 13H generating a notification of such a change initiated by computer system 101*a* in FIG. 13G. In some embodiments, the generated notification is optionally displayed in the user interface displayed by the first computer system. The notification optionally includes an indication of the user who changed the time of day setting, such as an icon, a mark, a brand, an emblem, badge, a trophy, a checkmark, or any other symbol to indicate that the second user has changed the time of day setting. In some embodiments, in response to the first user of the first computer system providing input at the first computer system to change the time of day setting, other computer systems in the communication session optionally display analogous notifications indicating that the first user changed the time of day setting. Notifying users in the communication when the second user changes the time of day setting enables the users in the communication session to quickly identify and determine when the time of day setting was changed, avoiding inputs to mistakenly change the time of day setting back, thereby improving user-device interaction.

FIGS. 15A-15G illustrate examples of a computer system selectively moving a portal into a virtual environment based on user movement in accordance with some embodiments.

Figure 15A:
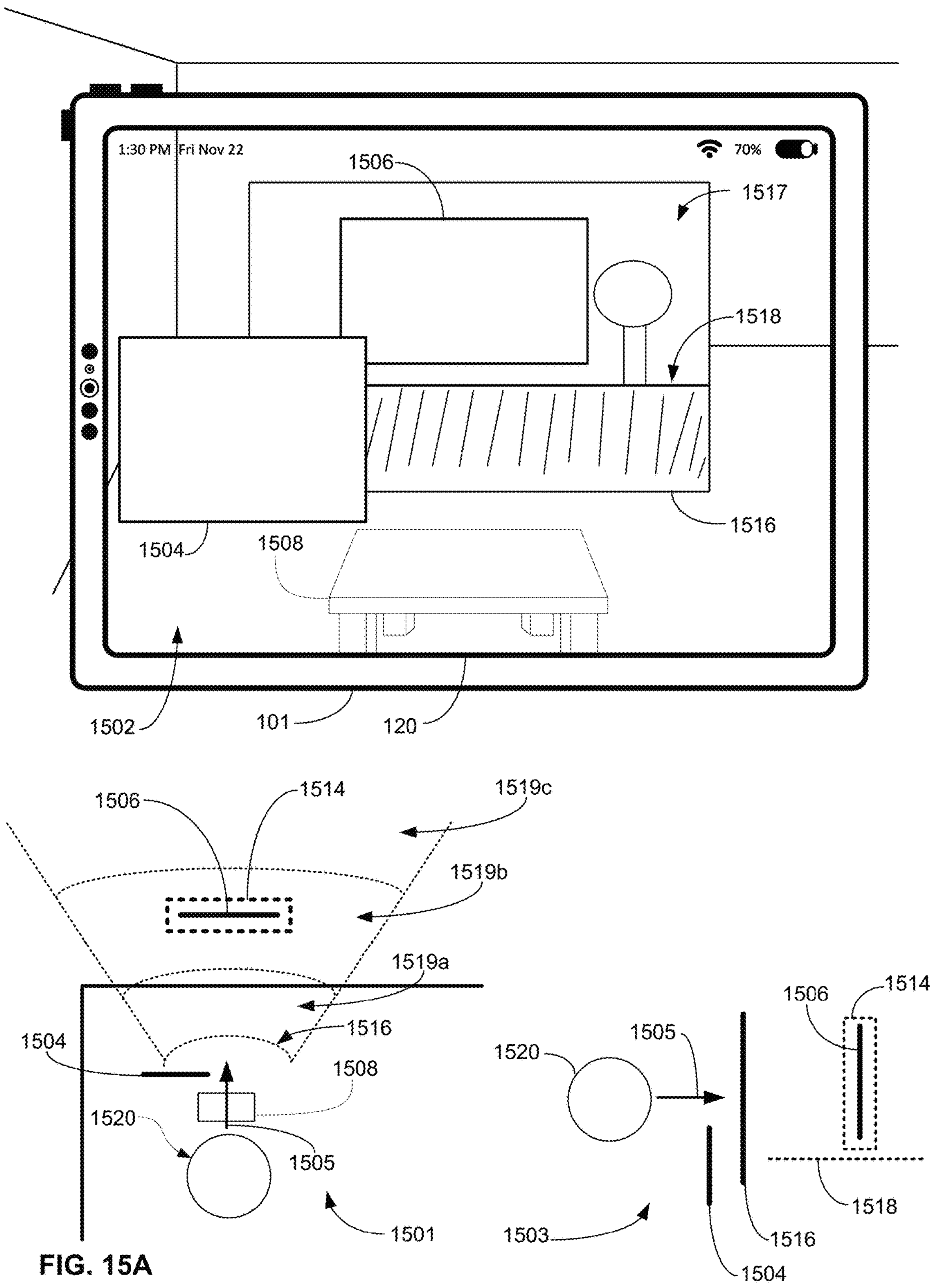
FIGS. 15A-15G illustrate examples of a computer system selectively moving a portal into a virtual environment based on user movement in accordance with some embodiments.

FIG. 15A illustrates a computer system 101 displaying, via a display generation component (e.g., display generation component 120 of FIG. 1), a three-dimensional environment 1502 from a viewpoint of the user 1520 illustrated in the overhead view 1501 (e.g., facing the back wall of the physical environment in which computer system 101 is located). FIG. 15A also include side view 1503, which indicates the placements of various components or features of three-dimensional environment 1502 relative to the viewpoint of user 1520 from the right side of user 1520 (as opposed to from above user 1520 as shown in overhead view 1501).

As described above with reference to FIGS. 1-6, the computer system 101 optionally includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 15A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 1502 or portions of the physical environment are visible via the display generation component 120 of computer system 101. For example, three-dimensional environment 1502 includes portions of the left and right walls, the ceiling, and the floor in the physical environment of user 1520. Three-dimensional environment 1502 also includes table 1508, which is a physical table in the physical environment of user 1520.

In FIG. 15A, three-dimensional environment 1502 also includes virtual content, such as virtual content 1504 and virtual environment 1517. Virtual content 1504 is optionally one or more of a user interface of an application (e.g., messaging user interface, or content browsing user interface), a three-dimensional object (e.g., virtual clock, virtual ball, or virtual car), a virtual environment (e.g., as described with reference to method 1600) or any other element displayed by computer system 101 that is not included in the physical environment of computer system 101. In FIG. 15A, virtual environment 1517 is visible through portal 1516. Portal 1516 is optionally a portal into virtual environment 1517 that is movable in three-dimensional environment 1502, and optionally provides different viewing angles into virtual environment 1517 depending on its position in three-dimensional environment 1502, as will be describe later. In FIGS. 15A-15F, virtual environment 1517 is occupying regions 1519*a*, 1519*b* and 1519*c* of three-dimensional environment 1502, as shown in the overhead view 1501. Further details about virtual environment 1517 and portal 1516 are described with reference to method 1600.

In FIG. 15A, virtual environment 1517 also includes virtual content 1506. Virtual content 1506 optionally has one or more of the characteristics of virtual content 1504, except that whereas virtual content 1504 is positioned outside of virtual environment 1517 in FIG. 15A, virtual content 1506 is positioned inside of virtual environment 1517 in FIG. 15A. In particular, virtual content 1506 in FIG. 15A is positioned at location 1514 in virtual environment 1517, which is optionally a predetermined location in virtual environment 1517 at which virtual content that is placed by the user 1520 in virtual environment 1517 is displayed, as described in more detail with reference to method 1600.

In FIG. 15A, the user 1520 is sitting relatively upright with their face facing the back wall of the physical space in which user 1520 is located. This orientation of the user 1520 is indicated by normal projection 1505 in the overhead view 1501 and the side view 1503, where normal projection 1505 is approximately normal to the head of the user 1520 (e.g., projecting from the face and/or eyes of the user 1520) is approximately parallel to the floor in FIG. 15A. While user 1520 is in this orientation shown in FIG. 15A, and portal 1516 is positioned as shown in FIG. 15A (e.g., perpendicular to normal projection 1505 and/or horizon 1518), the angle into virtual environment 1517 that is displayed via portal 1516 in FIG. 15A relative to the horizon 1518 in virtual environment 1517 is optionally a first angle (e.g., the angle into virtual environment 1517 is approximately parallel to the horizon 1518 in FIG. 15A).

In some embodiments, computer system 101 moves the portal 1516 into virtual environment 1517 in response to detecting a predetermined event, such as a change in orientation of the user 1520 that meets certain requirements. For example, from FIG. 15A to FIG. 15B, user 1520 has changed orientation in the physical environment. In particular, user 1520 has optionally leaned back such that normal projection 1505 is now facing upward in the physical environment of the user 1520. In some embodiments, normal projection 1505 is now at a second angle relative to horizon 1518 (e.g., 15, 30, 45, 60 or 90 degrees). In response to the change in the orientation of user 1520 in FIG. 15B, computer system 101 moves portal 1516 in three-dimensional environment 1502. For example, computer system 101 has moved portal 1516 from being perpendicular to normal projection 1505 in FIG. 15A to being perpendicular to normal projection 1505 in FIG. 15B. As a result, from FIG. 15A to FIG. 15B, portal 1516 has moved vertically relative to the three-dimensional environment 1502, and is oriented towards the floor in three-dimensional environment 1502 (e.g., and is no longer perpendicular to horizon 1518).

FIG. 15A1 illustrates similar and/or the same concepts as those shown in FIG. 15A (with many of the same reference numbers). It is understood that unless indicated below, elements shown in FIG. 15A1 that have the same reference numbers as elements shown in FIGS. 15A-15G have one or more or all of the same characteristics. FIG. 15A1 includes computer system 101, which includes (or is the same as) display generation component 120. In some embodiments, computer system 101 and display generation component 120 have one or more of the characteristics of computer system 101 shown in FIGS. 15A-15G and display generation component 120 shown in FIGS. 1 and 3, respectively, and in some embodiments, computer system 101 and display generation component 120 shown in FIGS. 15A-15G have one or more of the characteristics of computer system 101 and display generation component 120 shown in FIG. 15A1.

In FIG. 15A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 15A-15G.

In FIG. 15A1, display generation component 120 is illustrated as displaying content that optionally corresponds to the content that is described as being displayed and/or visible via display generation component 120 with reference to FIGS. 15A-15G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 15A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 15A1. Because display generation component 120 is optionally a head-mounted device, the field of view of display generation component 120 is optionally the same as or similar to the field of view of the user.

In some embodiments, computer system 101 responds to user inputs as described with reference to FIGS. 15A-15G.

It is understood than one or more or all aspects of the present disclosure as shown in, or described with reference to FIGS. 15A-15G and/or described with reference to the corresponding method(s) are optionally implemented on computer system 101 and display generation unit 120 in a manner similar or analogous to that shown in FIG. 15A1.

Figure 15B:
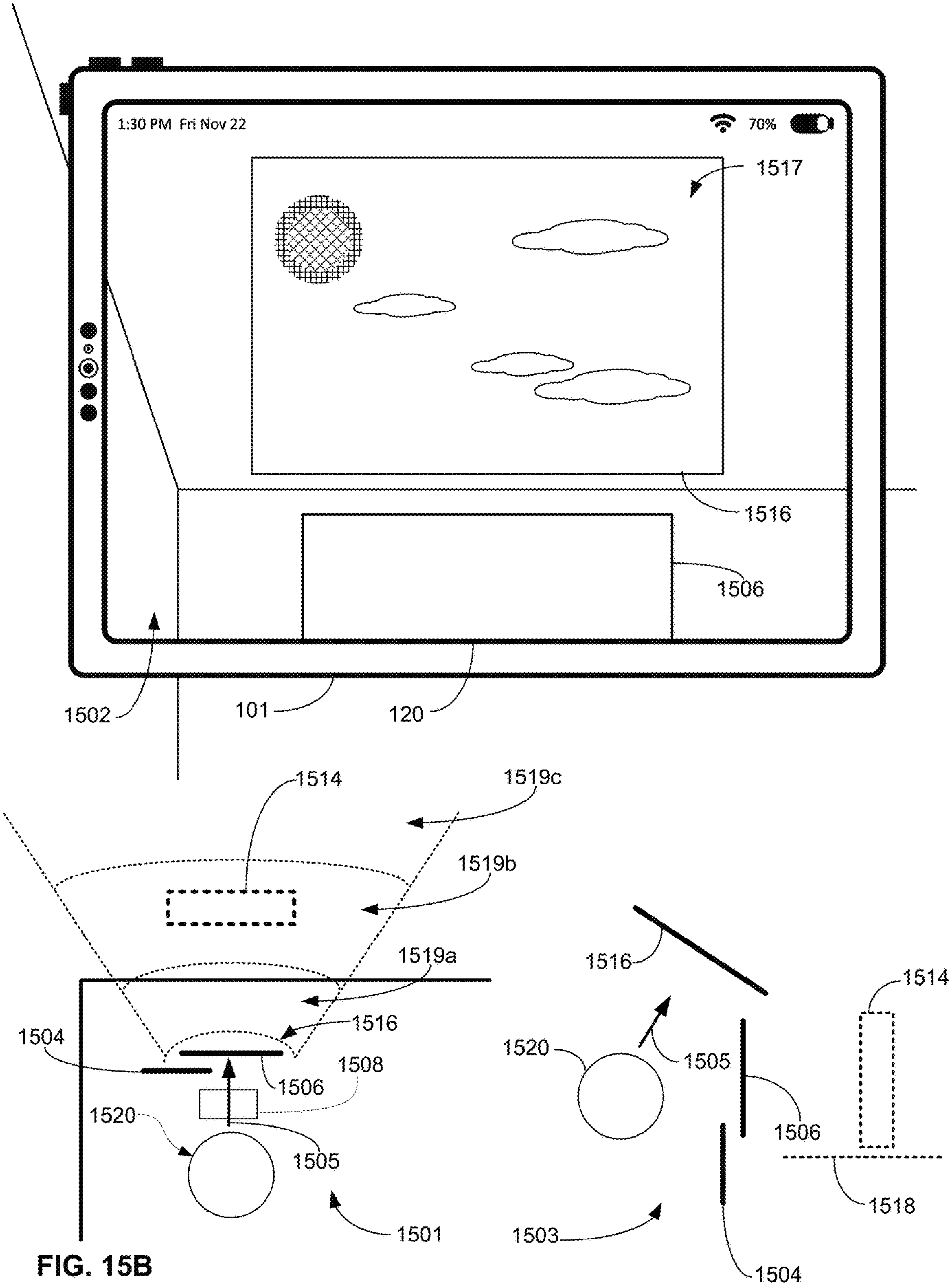

In response to the change in orientation of user 1520 from FIG. 15A to FIG. 15B, the angle into virtual environment 1517 that is displayed via portal 1516 in FIG. 15B relative to the horizon 1518 in virtual environment 1517 has also changed to be a second angle (e.g., the angle into virtual environment 1517 is approximately the same as the change in the angle of normal projection 1505 from FIG. 15A to FIG. 15B and/or the angle of normal projection 1505 relative to horizon 1518). Computer system 101 optionally updates this angle of display into virtual environment 1517 based on whether the orientation and/or viewpoint of user 1520 satisfies one or more criteria, as described in more detail with reference to method 1600. As shown in FIG. 15B, in some embodiments, the location of portal 1516 optionally changes while the location of horizon 1518 of virtual environment 1517 does not; therefore, different placements of portal 1516 optionally result in different angles of virtual environment 1517 being displayed via portal 1516. For example, in FIG. 15B, the sky of virtual environment 1517 (e.g., including simulated sun and clouds) is displayed via portal 1516, whereas in FIG. 15A, the horizon 1518 of virtual environment 1517 (e.g., including a simulated tree and grass) was displayed via portal 1516.

In FIG. 15B, because predefined location 1514 of virtual environment 1517 is no longer displayed via portal 1516, computer system 101 also moves virtual content 1506 out of virtual environment 1517 in response to the change in orientation of user 1520 from FIG. 15A to FIG. 15B. In some embodiments, moving virtual content 1506 out of virtual environment 1517 includes moving virtual content 1506 closer to user 1520, as shown in overhead view 1501 and side view 1503. In FIG. 15B, virtual content 1506 has moved towards user 1520 to a location and/or in a direction that is independent of the orientation of normal projection 1505. Further, because virtual content 1504 was already displayed outside of virtual environment 1517 when the change in orientation of user 1520 from FIG. 15A to FIG. 15B was detected, computer system 101 does not change the location of virtual content 1504 in response to the change in the orientation of user 1520 (e.g., virtual content 1504 is world-locked).

Figure 15C:
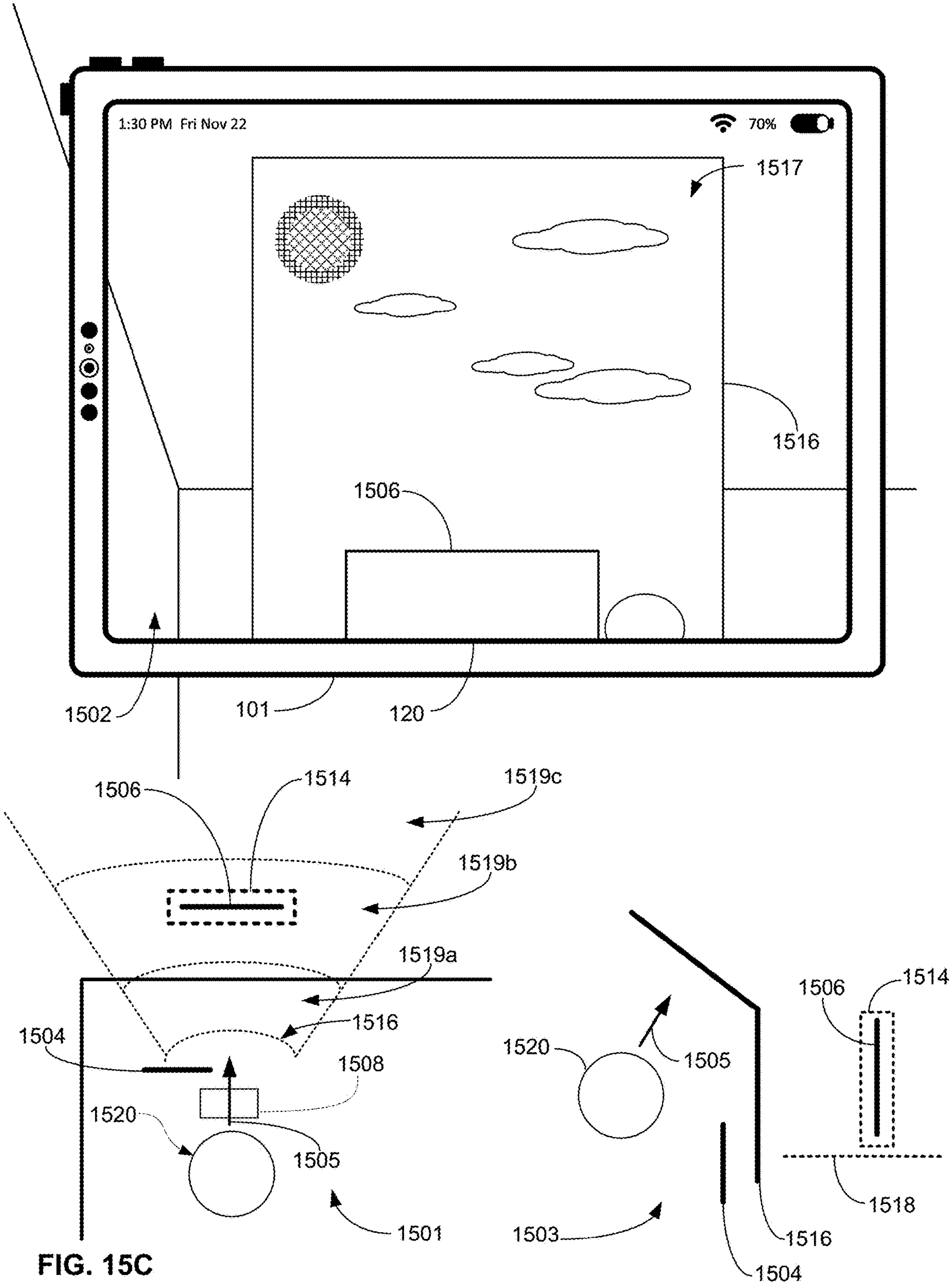

In some embodiments, in response to a change in orientation of user 1520 in which the orientation and/or viewpoint of user 1520 satisfies the one or more criteria, as described in more detail with reference to method 1600, computer system 101 additionally or alternatively expands portal 1516 in the direction of the change in the orientation of user 1520. For example, in FIG. 15C, computer system 101 has detected the same change in orientation of user 1520 as in FIG. 15B, but has, instead of moving portal 1516 in accordance with the change, expanded portal 1516 vertically in three-dimensional environment 1502 in accordance with the change such that the new angle into virtual environment 1517 is displayed via portal 1516 while at least a portion of the original angle into virtual environment 1517 remains displayed via portal 1516. As shown in FIG. 15C, the expanded portion of portal 1516 above the original portion of portal 1516 illustrated in FIG. 15A displays the same angle into virtual environment 1517 as is shown in FIG. 15B. Further, the placement and/or orientation of the expanded portion of portal 1516 in FIG. 15C is optionally the same or similar to the placement and/or orientation of portal 1516 in FIG. 15B. In some embodiments, portal 1516 is expanded along a spherical or sphere-like surface, where a center of the radius of the surface is the head or other portion of user 1520.

As shown in FIG. 15C, computer system 101 has not moved virtual content 1504 in response to the change in the orientation of user 1520, for the same reasons described with reference to FIG. 15B. However, because predefined location 1514 in virtual environment 1517 is still displayed via portal 1516 in FIG. 15C, computer system 101 has not moved virtual content 1506 out of virtual environment 1517—rather, virtual content 1506 remains positioned at predefined location 1514 in FIG. 15C.

Figure 15D:
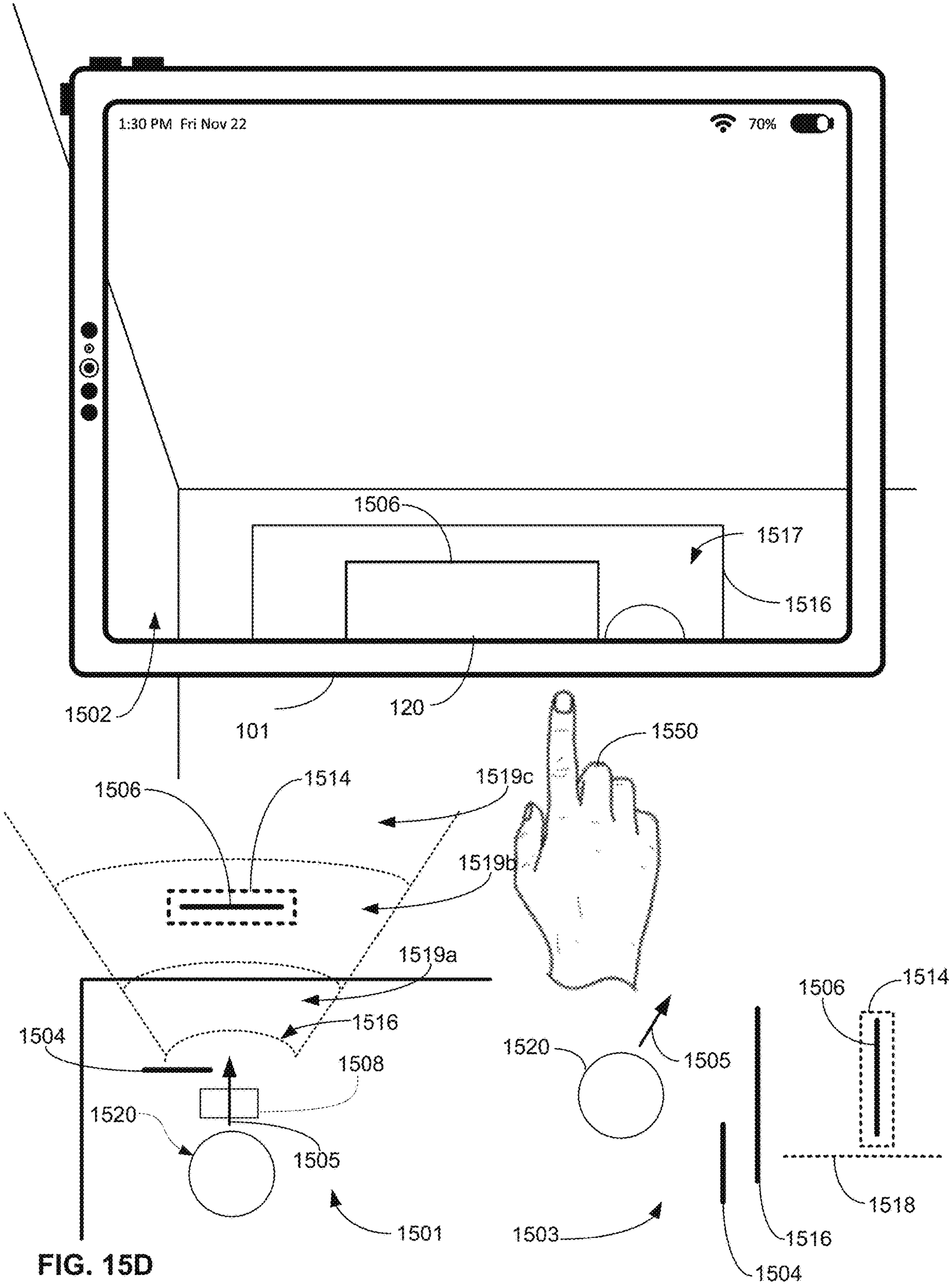

In FIG. 15D, computer system 101 is displaying three-dimensional environment 1502 in response to the change in orientation of the user in the same or similar manner as in FIG. 15B, except in the circumstance where the change in orientation of the user does not or did not satisfy criteria for moving portal 1516 (e.g., as described in more detail with reference to method 1600). In particular, the placement and/or orientation of portal 1516 relative to three-dimensional environment 1502 in FIG. 15D is optionally the same or similar to the placement and/or orientation of portal 1516 in FIG. 15A. Further, the same angle into virtual environment 1517 is displayed via portal 1516 in FIG. 15D as in FIG. 15A, though from the updated orientation of user 1520 in FIG. 15D, less of virtual environment 1517 is displayed by computer system 101 (e.g., because less of portal is visible from the field of view of user 1520 in FIG. 15D). As shown in FIG. 15D, computer system 101 has not moved virtual content 1504 in response to the change in the orientation of user 1520, for the same reasons described with reference to FIG. 15B, and because predefined location 1514 in virtual environment 1517 is still displayed via portal 1516 in FIG. 15D, computer system 101 has not moved virtual content 1506 out of virtual environment 1517—rather, virtual content 1506 remains positioned at predefined location 1514 in FIG. 15D.

Figure 15E:
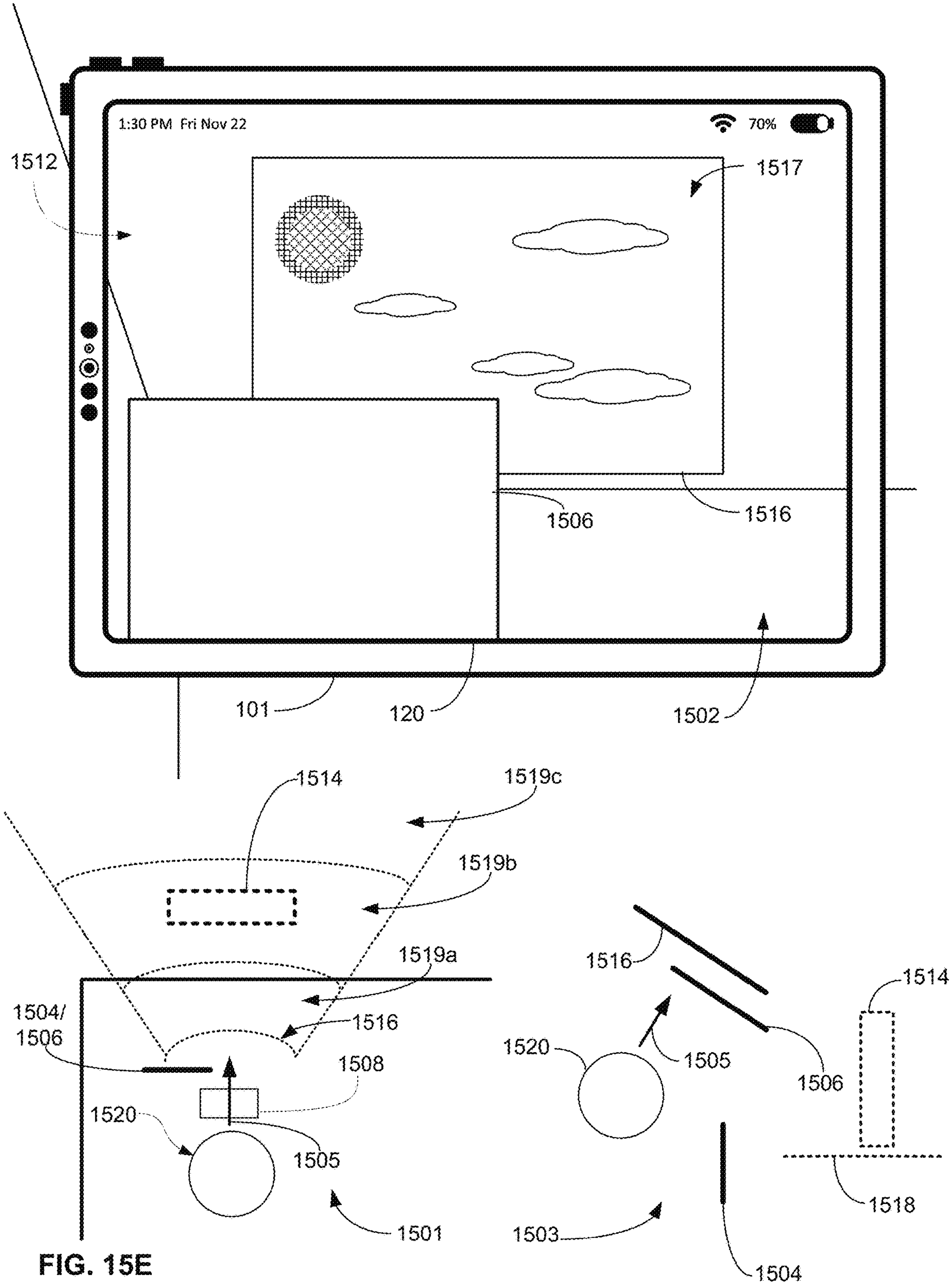

In some embodiments, an input to move content in three-dimensional environment 1502 satisfies the one or more criteria for repositioning portal 1516 in three-dimensional environment 1502, and therefore for displaying an updated angle into virtual environment 1517 in three-dimensional environment. For example, in FIG. 15D, computer system detects an input from hand 1550 of user 1520 corresponding to a request to move virtual content 1506 (e.g., from predefined location 1514) to a different location in three-dimensional environment 1502, optionally outside of virtual environment 1517, as shown in FIG. 15E. The input from hand 1550 optionally includes hand 1550 performing an air pinching gesture while attention of user 1520 is directed to virtual content 1506, followed by movement of hand 1550 in the pinch hand shape, where the direction and/or magnitude of the movement of virtual content 1506 corresponds to the direction and/or magnitude of the movement of virtual content 1506. The input from hand 1550 optionally is a different input, such as a click or tap and hold input on a touch-sensitive surface, followed by movement of hand 1550 on the touch-sensitive surface. Other examples of inputs for moving virtual content are described with reference to method 1600.

In response to the input to move virtual content 1506 in FIG. 15D, in FIG. 15E computer system 101 has moved portal 1516 from not being perpendicular to normal projection 1505 in FIG. 15D to being perpendicular to normal projection 1505 in FIG. 15E, and has therefore also changed the angle into virtual environment 1517 that is displayed via portal 1516 in FIG. 15E relative to the horizon 1518 in virtual environment 1517. Details about three-dimensional environment 1502 in FIG. 15E are optionally the same as described with reference to FIG. 15B, except that virtual content 1506 in FIG. 15E is at a user-selected location in three-dimensional environment 1502 (e.g., as a result of the input from hand 1550 in FIG. 15D) rather than being at a location selected by computer system 101 in FIG. 15B. Further, virtual content 1506 in FIG. 15E is oriented perpendicular to normal projection 1505. In some embodiments, computer system 101 optionally automatically orients virtual content that is moved by user 1520 (e.g., while the virtual content is being moved and/or in response to the virtual content being moved) such that the normal of the virtual content is oriented towards user 1520 and/or the viewpoint of the user 1520, as is shown with respect to virtual content 1506 in FIG. 15E.

In some embodiments, a request at computer system 101 to recenter virtual content to the current viewpoint of the user optionally satisfies the one or more criteria for repositioning portal 1516 in three-dimensional environment 1502, and therefore for displaying an updated angle into virtual environment 1517 in three-dimensional environment 1502. Further, in some embodiments, changes in orientation of user 1520 corresponding to lateral movement and/or rotation of user 1520 optionally do not satisfy the one or more criteria above (as opposed to vertical movement and/or rotation of user 1520, which optionally does satisfy the one or more criteria). For example, from FIG. 15A to FIG. 15F, user 1520 has changed orientation in the physical environment. In particular, user 1520 has optionally turned their head, shoulders, torso and/or body to the left such that normal projection 1505 is now facing the left wall in the physical environment of the user 1520. Side view 1503 in FIG. 15F still represents the relative placements of elements from an orientation directed towards the left wall in the physical environment. In some embodiments, in FIG. 15F normal projection 1505 is still at the same or similar angle (e.g., parallel) relative to horizon 1518 of virtual environment 1517 as in FIG. 15A. In response to the change in the orientation of user 1520 in FIG. 15F, computer system 101 does not move portal 1516 in three-dimensional environment 1502 (e.g., because the change in orientation and/or normal projection 1505 is horizontal as opposed to vertical), and therefore does not change the angle into virtual environment 1517 that visible in three-dimensional environment 1502. Indeed, in FIG. 15F, because of the change in viewpoint of user 1520, portal 1516 and virtual environment 1517 are no longer displayed by computer system 101, and virtual content 1504 and virtual content 1506 are not moved by computer system 101 from FIG. 15A to FIG. 15F.

Figure 15F:
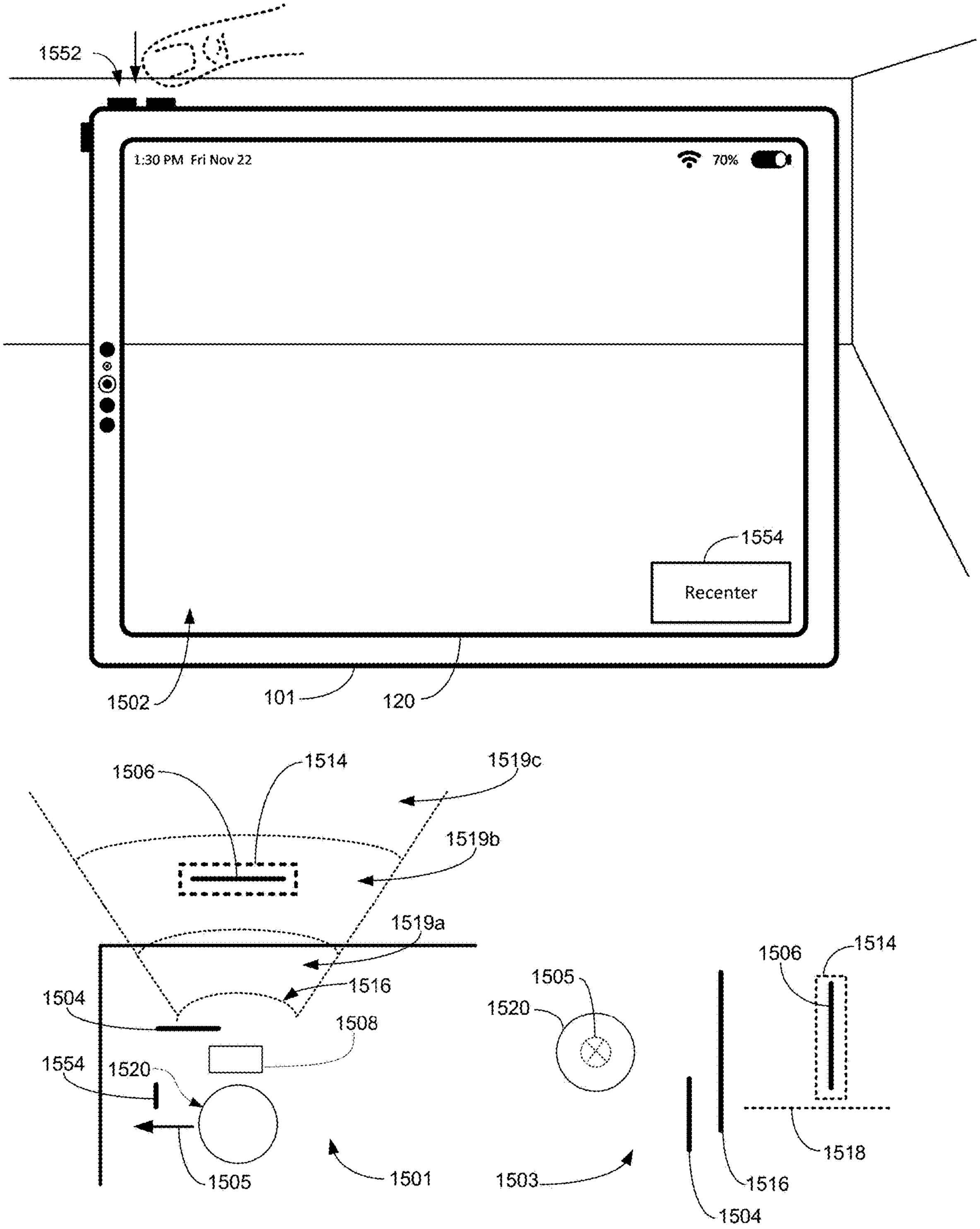

In FIG. 15F, computer system 101 is displaying recenter option 1554 that is selectable to recenter virtual content to the current viewpoint of user 1520. An input to recenter virtual content to the current viewpoint of the user 1520 optionally causes computer system 101 to move virtual content such that it is visible and/or accessible from the current viewpoint of user 1520, as described in more detail with reference to method 1600. An input to recenter virtual content optionally includes selection or interaction with a physical input element (e.g., depression of a button or rotation of a dial) of computer system 101, such as button 1552. An input to recenter virtual content optionally includes selection of recenter option 1554. In FIG. 15F, computer system 101 detects an input to reenter virtual content, either via button 1552 or recenter option 1554.

Figure 15G:
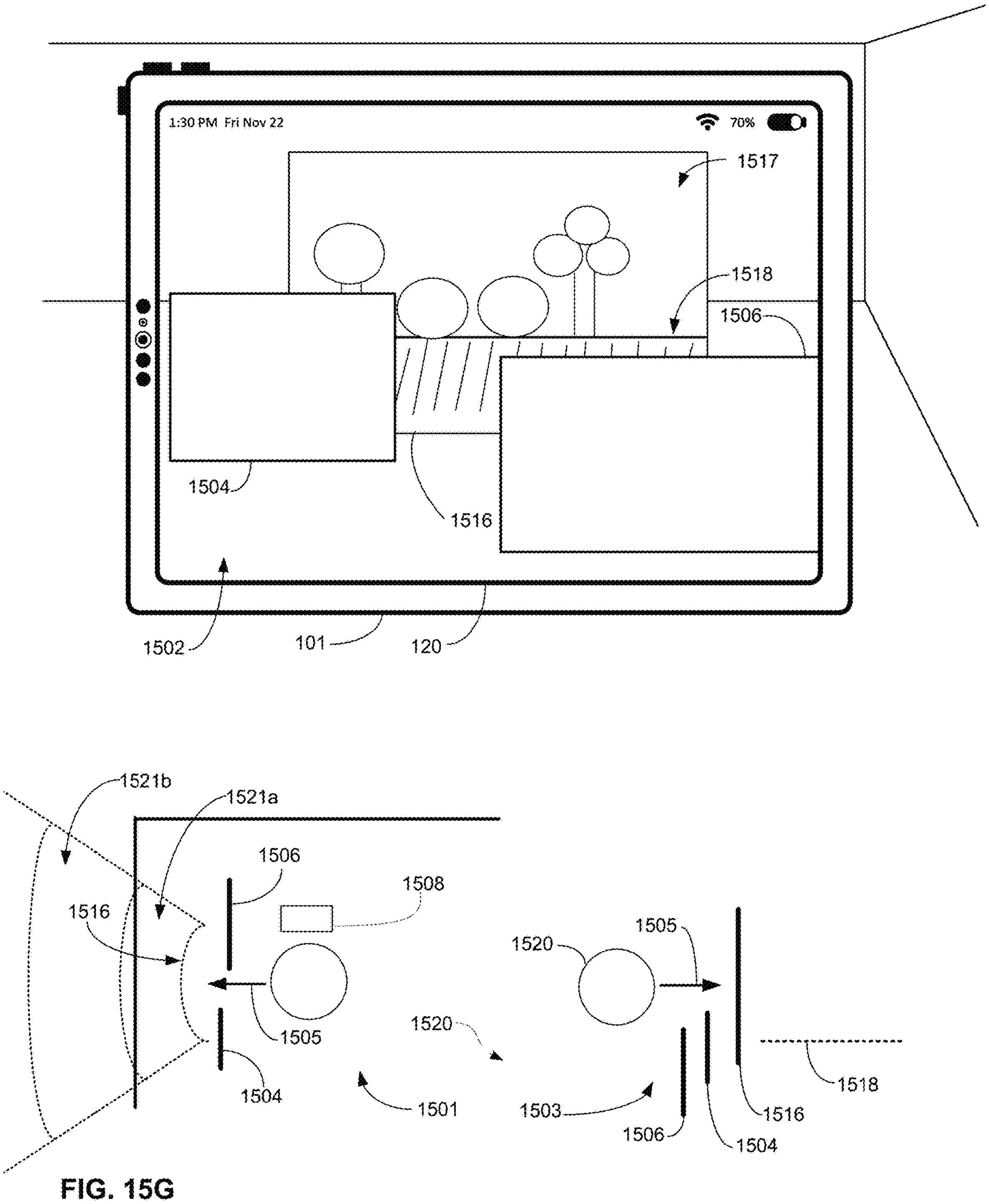
Figure 16B:
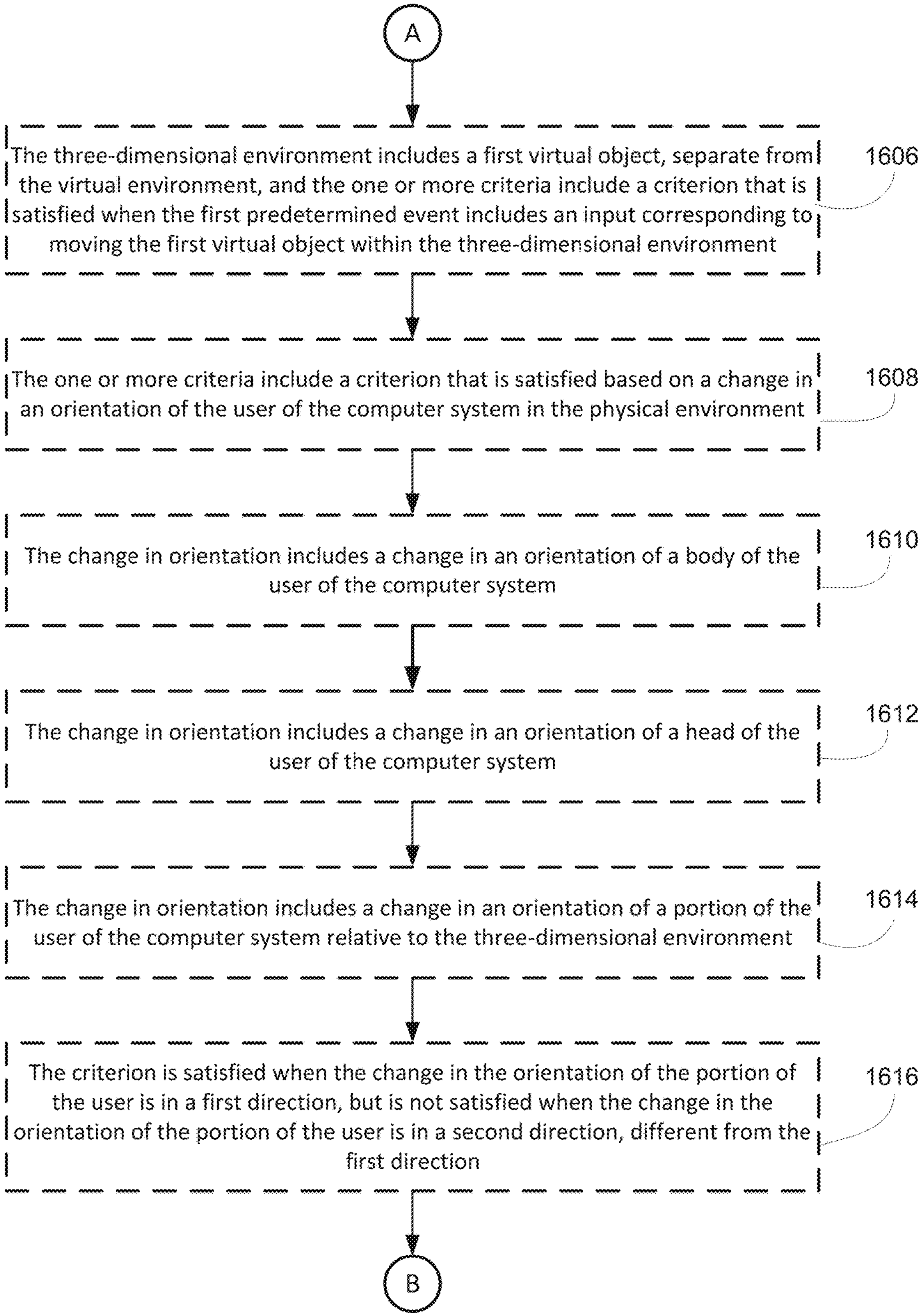
Figure 16C:
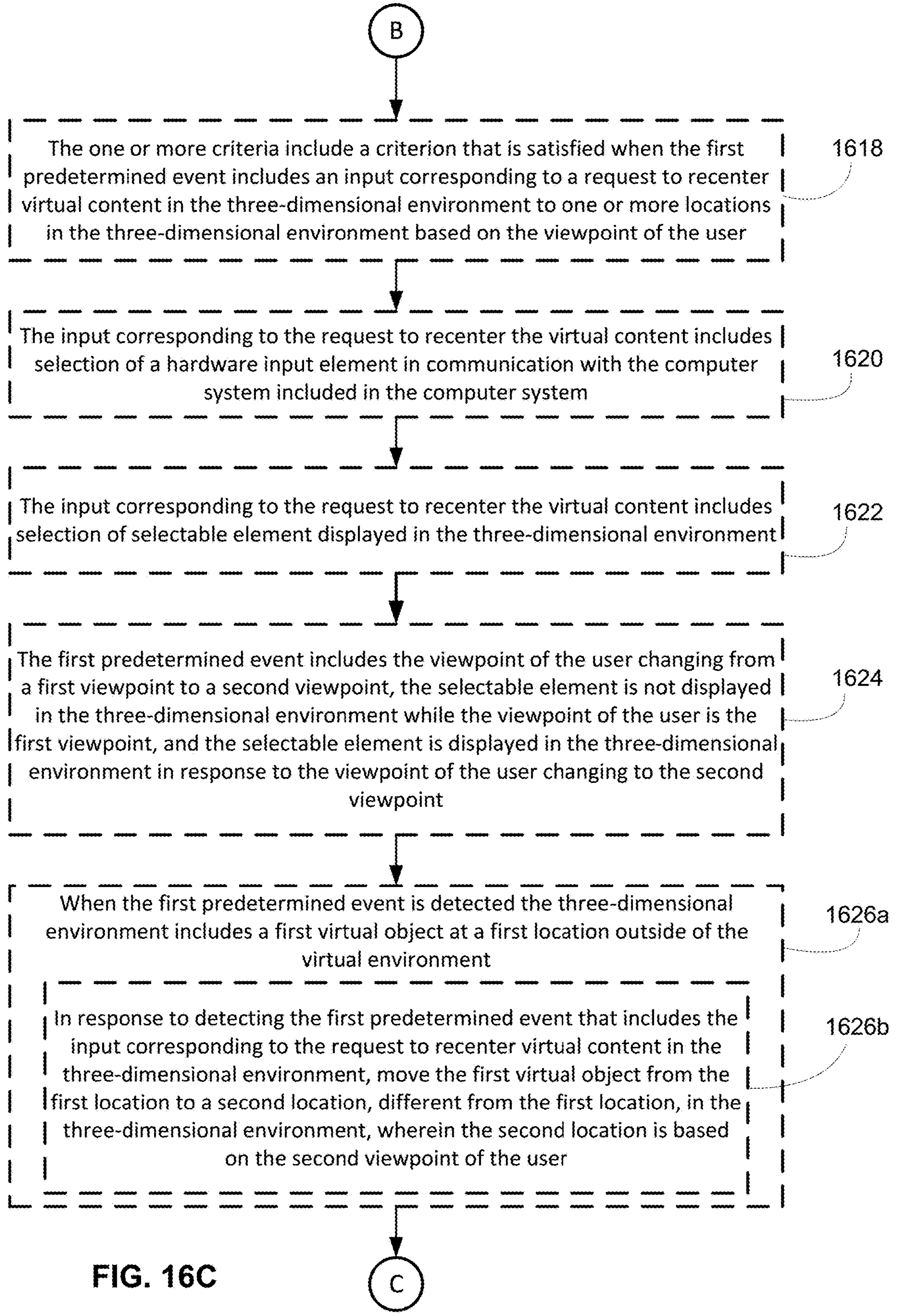
Figure 16F:
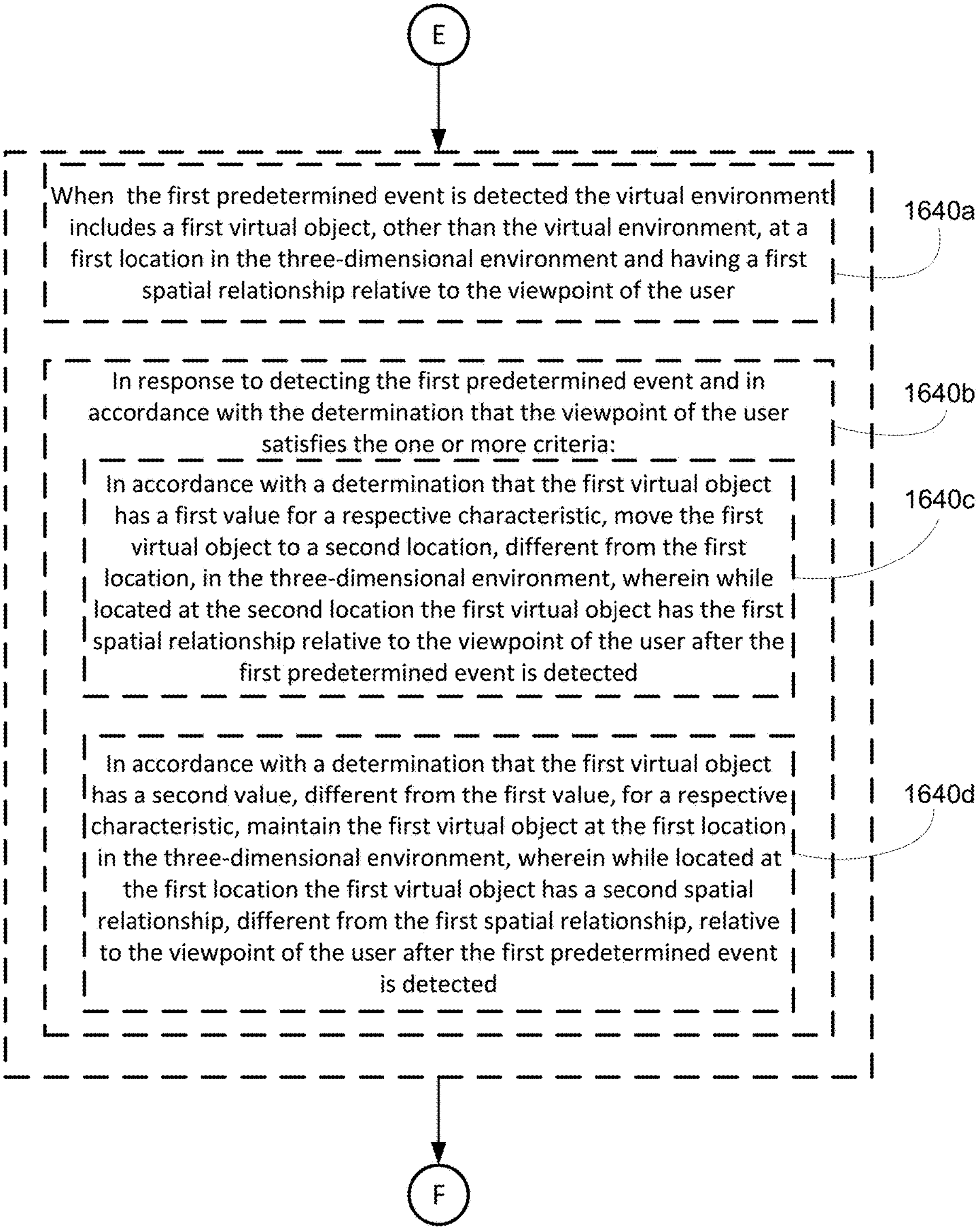

In response, computer system 101 has repositioned virtual content 1504, virtual content 1506, and portal 1516 (and thus the angle into virtual environment 1517 that is displayed in three-dimensional environment 1502) such that they are visible from the viewpoint of user 1520 in FIG. 15G. Side view 1503 in FIG. 15G represents the relative placements of elements from an orientation directed away from the back wall in the physical environment. In FIG. 15G, computer system 101 has moved virtual content 1504 from its location in FIG. 15F outside of virtual environment 1517 to its location in FIG. 15G, which is also outside of virtual environment 1517. Computer system 101 has also moved portal 1516 in three-dimensional environment 1502. For example, computer system 101 has moved portal 1516 from being perpendicular to normal projection 1505 in FIG. 15A and/or perpendicular to horizon 1518 in FIG. 15F to being perpendicular to normal projection 1505 in FIG. 15G. As a result, from FIG. 15F to FIG. 15G, portal 1516 has moved horizontally relative to the three-dimensional environment 1502.

In response to the change in position of portal 1516 from FIG. 15F to FIG. 15G, the angle into virtual environment 1517 that is displayed via portal 1516 in FIG. 15G has also changed to be a second angle (e.g., an angle that is parallel to horizon 1518, but instead of being directed towards the back wall in physical environment, is directed towards the left wall in physical environment). As a result, in FIG. 15G, a different portion of virtual environment 1517 (e.g., including two simulated trees and two simulated bushes, horizon 1518 and simulated grass) is displayed via portal 1516 as compared to FIG. 15A, where a different simulated tree and the simulated grass and horizon 1518 were displayed via portal 1516. In FIG. 15G, virtual environment 1517 is occupying regions 1521*a* and 1521*b* of three-dimensional environment 1502, as shown in the overhead view 1501. In FIG. 15G, because predefined location 1514 of virtual environment 1517 is no longer displayed via portal 1516, computer system 101 has also moved virtual content 1506 out of virtual environment 1517 in response to the input to recenter virtual content in FIG. 15F, and has moved virtual content 1506 to a location outside of virtual environment 1517 such that virtual content 1506 is visible from the viewpoint of user 1520 in FIG. 15G. In some embodiments, moving virtual content 1506 out of virtual environment 1517 includes moving virtual content 1506 closer to user 1520, as shown in overhead view 1501 and side view 1503.

FIGS. 16A-16H is a flowchart illustrating a method 1600 of joining a communication session with a second computer system while maintaining display of their respective virtual environments in accordance with some embodiments. In some embodiments, the method 1600 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, and/or a projector) and one or more cameras (e.g., a camera (e.g., color sensors, infrared sensors, and/or other depth-sensing cameras) that points downward at a user's hand or a camera that points forward from the user's head). In some embodiments, the method 1600 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1600 are, optionally, combined and/or the order of some operations is, optionally, changed.

In some embodiments, method 1600 is performed at a computer system in communication with a display generation component and one or more input devices. In some embodiments, the mobile device has one or more characteristics of the mobile devices in methods 800, 1000, 1200, 1400 and/or 1800.

In some embodiments, while a viewpoint of a user of the computer system relative to a three-dimensional environment, that includes a displayed virtual environment, is a first viewpoint, such as the viewpoint of user 1520 in FIGS. 15A and 15A1 (e.g., In some embodiments, the three-dimensional environment has one or more of the characteristics of the three-dimensional environments in methods 800, 1000, 1200, 1400 and/or 1800. The three-dimensional environment is optionally viewable from a viewpoint of the user that corresponds to a position and/or orientation of the user's eyesight or eyeline, head orientation, shoulder orientation and/or torso orientation. For example, the first viewpoint optionally corresponds to the user sitting or standing in an upright position in the physical environment of the user. The virtual environment is optionally virtual content representative of a simulated location. In some embodiments, the virtual environment includes a user interface of an application on the computer system, such as a content (e.g., movie, television show and/or music) playback application, and the user interface is displaying or otherwise presenting the content, overlaid upon the virtual environment, in front of the virtual environment from the viewpoint of the user and/or within the virtual environment.), wherein the virtual environment is displayed with a first angle relative to a frame of reference based on a physical environment in which the user is located, such as the angle into environment 1517 in FIGS. 15A and 15A1 (e.g., relative to a horizon, a ground/floor plane, and/or a direction of gravity in the physical environment), the computer system detects (1602*a*) a first predetermined event, such as from FIGS. 15A and 15A1 to 15B. In some embodiments, the virtual environment is displayed in the three-dimensional environment from or with a first angle that corresponds to an entry or portal viewing angle into the virtual environment and is relative to a frame of reference in the physical environment and/or virtual environment. For instance, the reference is optionally a predetermined reference or location within the virtual environment or the physical environment such that the entry viewing angle is with respect to the reference. For example, the reference is optionally the horizon in the virtual environment. In some embodiments, the first angle (e.g., the angle at which the normal of the portal into the virtual environment is oriented relative to the reference) is optionally 0, 10, 30, 50, 70, or 90 degrees. In some embodiments, the first predetermined event is an action and/or movement of the user of the computer system, discussed in greater detail later. The first viewpoint of the user is optionally angled relative to the portal and/or a reference in the three-dimensional environment (e.g., the same or different reference as the frame of reference described above) at a particular angle based on the pose of the user in the physical environment, such as at 0, 10, 30, 50, 70 or 90 degrees.

In some embodiments, in response to detecting the first predetermined event (1602*b*), in accordance with a determination that the viewpoint of the user satisfies one or more criteria (e.g., the satisfaction of the one or more criteria is optionally based on the angle of the viewpoint of the user relative to the angle of the portal into the virtual environment, and/or the angle of the viewpoint of the user relative to the reference in the physical environment, discussed in greater detail later), the computer system updates (1602*c*) display of the virtual environment to display the virtual environment with a second angle, different from the first angle, relative to the frame of reference based on the physical environment in which the user is located, such as the updated angle into environment 1517 in FIG. 15B (e.g., changing an orientation and/or placement of the portal into the virtual environment in the three-dimensional environment to have the second angle relative to the reference (e.g., the horizon) in the frame of reference).

In some embodiments, in accordance with a determination that the viewpoint of the user does not satisfy the one or more criteria, the computer system maintains (1602*d*) display of the virtual environment with the first angle relative to the frame of reference based on the physical environment in which the user is located, such as not updating the angle into environment 1517 in FIG. 15D (e.g., not modifying the orientation and/or placement of the portal into the virtual environment in the three-dimensional environment). Adjusting the angle into a virtual environment based on a user's viewpoint allows the user to dynamically view the virtual environment from the correct angle, thus reducing and simplifying user interaction with the computer system.

In some embodiments, displaying the virtual environment with the first angle relative to the frame of reference includes displaying, in the three-dimensional environment, a portal into the virtual environment at a first location in the three-dimensional environment (1604*a*), such as the location of portal 1516 in FIGS. 15A and 15A1 and displaying the virtual environment with the second angle relative to the frame of reference includes displaying, in the three-dimensional environment, the portal into the virtual environment at a second location, different from the first location, in the three-dimensional environment (1604*b*), such as the location of portal 1516 in FIG. 15B. In some embodiments, the angle of the virtual environment visible in the portal corresponds to the location of the portal in the three-dimensional environment. For example, when the portal into the virtual environment is at a first location in the three-dimensional environment, the angle into the virtual environment visible through the portal is a first angle, and when the portal into the virtual environment is at a second location, different from the first location, in the three-dimensional environment, the angle into the virtual environment visible through the portal is a second angle, different from the first angle. In some embodiments, the vertical angle into the virtual environment that is visible through the portal increases vertically relative to the frame of reference as the location of the portal in the three-dimensional environment increases vertically, and/or the horizontal angle into the virtual environment that is visible through the portal increases horizontally relative to the frame of reference as the location of the portal in the three-dimensional environment increases horizontally. Corresponding the location of the portal to the angle into the virtual environment ensures that visibility into the virtual environment changes in an expected manner, thus reducing and simplifying user interaction with the computer system.

In some embodiments, the three-dimensional environment includes a first virtual object (e.g., a three-dimensional model of a real world object, a user interface of an application, and/or a representation of a content item), separate from the virtual environment (e.g., the first virtual object is optionally included in the virtual environment, or is optionally outside of the virtual environment), such as object 1506 in FIGS. 15A and 15A1, and the one or more criteria include a criterion that is satisfied when the first predetermined event includes an input corresponding to moving the first virtual object within the three-dimensional environment (1606), such as the movement of object 1506 in FIG. 15E. In some embodiments, the user of the computer system selects the window with an air pinching hand input, drags the window from an initial location, and releases the window at a subsequent location. In some embodiments, the input is provided via a trackpad or other input device in communication with the computer system. In some embodiments, the input is directed to the first virtual object, or is directed to a displayed element that is displayed concurrently with the first virtual object that is interactable to move the first virtual object in the three-dimensional environment Updating the angle into the virtual environment in response to detecting movement of a virtual object ensures that changing the angle into the virtual environment does not occur unintentionally or unexpectedly, thus reducing and simplifying user interaction with the computer system.

In some embodiments, the one or more criteria include a criterion that is satisfied based on a change in an orientation of the user of the computer system (e.g., as described below with reference to step(s) 1610-1616) in the physical environment (1608), such as the change in orientation of user 1520 from FIGS. 15A and 15A1 to 15B. In some embodiments, the change in the orientation of the user of the compute system is additionally or alternatively relative to a frame of reference in the virtual environment (e.g., the horizon in the virtual environment). Updating the angle into the virtual environment in response to detecting a change in orientation of the user reduces the number of inputs needed to update the angle into the virtual environment, thus reducing and simplifying user interaction with the computer system.

In some embodiments, the change in orientation includes a change in an orientation of a body of the user of the computer system (1610), such as the change in orientation of the body of user 1520 from FIGS. 15A and 15A1 to 15B. In some embodiments, the change is or includes a change in the position and/or orientation of the user such as a change in the orientation of the user's shoulders, torso, and/or hips. For example, the change in orientation optionally corresponds to the user changing from sitting upright to laying down in a reclining chair or on a flat surface such as a bed, or vice versa. In some embodiments, the change in orientation of the body of the user is required to be greater than a threshold angle (e.g., greater than a 5, 10, 20, 30, 45, 60 or 90 degree change in orientation), otherwise the angle into the virtual environment is not updated (e.g., the viewpoint of the user does not satisfy the one or more criteria described with reference to step(s) 1602). Updating the angle into the virtual environment in response to detecting a change in orientation of the user's body reduces the number of inputs needed to update the angle into the virtual environment, thus reducing and simplifying user interaction with the computer system.

In some embodiments, the change in orientation includes a change in an orientation of a head of the user of the computer system (1612), such as the change in orientation of the head of user 1520 from FIGS. 15A and 15A1 to 15B. In some embodiments, the change is or includes a change in the position and/or orientation of the user's head such as movement of the user's head to the left or right, and/or up or down relative to the frame of reference. For example, the change in orientation optionally corresponds to the user changing from looking relatively forward to looking relatively upward, or vice versa. In some embodiments, the change in orientation of the head of the user is required to be greater than a threshold angle (e.g., greater than a 5, 10, 20, 30, 45, 60 or 90 degree change in orientation), otherwise the angle into the virtual environment is not updated (e.g., the viewpoint of the user does not satisfy the one or more criteria described with reference to step(s) 1602). Updating the angle into the virtual environment in response to detecting a change in orientation of the user's head reduces the number of inputs needed to update the angle into the virtual environment, thus reducing and simplifying user interaction with the computer system.

In some embodiments, the change in orientation includes a change in an orientation of a portion of the user of the computer system relative to (e.g., a frame of reference in) the three-dimensional environment (1614), such as the change in orientation of user 1520 from FIGS. 15A and 15A1 to 15B relative to horizon 1518. In some embodiments, the frame of reference in the three-dimensional environment is the horizon (or floor, or sky, or sun) of the physical environment and/or the virtual environment. The horizon is optionally static and does not change as the angle into the virtual environment changes. In some embodiments, the horizon of the virtual environment has the same location and/or orientation relative to the three-dimensional environment as the horizon of the physical environment (e.g., the horizon of the virtual environment corresponds to the horizon of the physical environment). Referencing the change in orientation of the portion of the user to the three-dimensional environment ensures that resulting changes to the angle into the environment are expected and consistent with what is visible via the display generation component, thus reducing and simplifying user interaction with the computer system.

In some embodiments, the criterion is satisfied when the change in the orientation of the portion of the user is in a first direction (e.g., a mostly (e.g., more than 15, 30, 50, 75 or 90%) vertical change in the orientation, such as perpendicularly away from or towards the horizon in the physical and/or virtual environment), such as the change in orientation from FIGS. 15A and 15A1 to 15B, but is not satisfied when the change in the orientation of the portion of the user is in a second direction, different from the first direction (1616) (e.g., a mostly (e.g., more than 15, 30, 50, 75 or 90%) horizontal change in the orientation, such as parallel to the horizon in the physical and/or virtual environment), such as the change in orientation of FIG. 15F. In some embodiments, the change in orientation is in the first direction if the component of the change in the first direction is greater than the component of the change in the second direction, and the change in orientation is in the second direction if the component of the change in the second direction is greater than the component of the change in the first direction. Selectively updating the angle into the virtual environment based on the direction of the change in the orientation reduces the number of inputs needed to update the angle into the virtual environment while allowing for the user to interact with the three-dimensional environment in other ways without updating the angle into the environment, thus reducing and simplifying user interaction with the computer system.

In some embodiments, the one or more criteria include a criterion that is satisfied when the first predetermined event includes an input corresponding to a request to recenter virtual content in the three-dimensional environment to one or more locations in the three-dimensional environment based on the viewpoint of the user (1618), such as the input 1552 or at 1554 in FIG. 15F. In some embodiments, the input to recenter virtual content (e.g., one or more virtual objects) in the three-dimensional environment is an input corresponding to a request to update the spatial arrangement of the objects relative to the viewpoint of the user to satisfy the one or more criteria that specify a range of distances or a range of orientations of the one or more virtual objects relative to the viewpoint of the user. In some embodiments, the input is directed to a hardware button, or switch in communication with (e.g., incorporated with) the computer system. In some embodiments, the input is an input directed to a selectable option displayed via the display generation component. In some embodiments, the one or more criteria include criteria satisfied when an interactive portion of the virtual objects are oriented towards the viewpoint of the user, the virtual objects do not obstruct the view of other virtual objects from the viewpoint of the user, the virtual objects are within a threshold distance (e.g., 10, 20, 30, 40, 50, 100, 200, 300, 400, 500, 1000 or 2000 centimeters) of the viewpoint of the user, and/or the virtual objects are within a threshold distance (e.g., 1, 5, 10, 20, 30, 40, 50, 100, 200, 300, 400, 500, 1000 or 2000 centimeters) of each other. In some embodiments, the input is different from an input requesting to update the positions of one or more objects in the three-dimensional environment (e.g., relative to the viewpoint of the user), such as inputs for manually moving the objects in the three-dimensional environment. Thus, in some embodiments, the angle into the virtual environment is updated concurrently with one or more virtual objects other than the virtual environment being recentered to the viewpoint of the user. Updating the angle into the virtual environment in response to a recentering input reduces the number of inputs needed to update the angle into the virtual environment and recenter objects to the viewpoint of the user, and also avoids unintentional updating of the angle into the virtual environment, thus reducing and simplifying user interaction with the computer system.

In some embodiments, the input corresponding to the request to recenter the virtual content includes selection of a hardware input element in communication with the computer system (e.g., depression of a physical button, sliding of physical slider, rotation of a physical dial and/or toggling of a physical switch) included in the computer system (1620), such as input 1552 in FIG. 15F. In some embodiments the hardware input element is a physical input element (e.g., a physical button or slider) or a solid state input element (e.g., a solid state button or slider). Updating the angle into the virtual environment in response to selection of a hardware input element avoids unintentional updating of the angle into the virtual environment and avoids obstructing the content of the three-dimensional environment, thus reducing and simplifying user interaction with the computer system.

In some embodiments, the input corresponding to the request to recenter the virtual content includes selection of selectable element displayed in the three-dimensional environment (1622), such as selection of option 1554 in FIG. 15F (e.g., selection of a virtual button, sliding of virtual slider, rotation of a virtual dial and/or toggling of a virtual switch). Updating the angle into the virtual environment in response to selection of a virtual input element avoids unintentional updating of the angle into the virtual environment, and makes such inputs more easily accessible, thus reducing and simplifying user interaction with the computer system.

In some embodiments, the first predetermined event includes the viewpoint of the user changing from a first viewpoint to a second viewpoint, the selectable element is not displayed in the three-dimensional environment while the viewpoint of the user is the first viewpoint, and the selectable element is displayed in the three-dimensional environment in response to the viewpoint of the user changing to the second viewpoint (1624), such as the display of option 1554 in FIG. 15F. In some embodiments, the selectable element is only displayed if the change from the first viewpoint to the second viewpoint is sufficiently large such that the second viewpoint of the user satisfies the one or more criteria, such as described with reference to step(s) 1610-1616—otherwise, the selectable element is optionally not displayed in the three-dimensional environment. Selectively displaying the selectable element avoids unintentional inputs directed to the selectable element when such inputs would be inoperative or excessive, and also provides visual feedback to the user that updating of the angle into the virtual environment is possible, thus reducing and simplifying user interaction with the computer system.

In some embodiments, when the first predetermined event is detected the three-dimensional environment includes a first virtual object at a first location outside of the virtual environment (1626*a*) (e.g., the first virtual object is not docked in the virtual environment, such as objects described with reference to step(s) 1618), such as object 1504 in FIG. 15F. In some embodiments, in response to detecting the first predetermined event that includes the input corresponding to the request to recenter virtual content in the three-dimensional environment, the computer system moves (1626*b*) the first virtual object from the first location to a second location, different from the first location, in the three-dimensional environment, wherein the second location is based on the second viewpoint of the user, such as the movement of object 1504 in FIG. 15F (e.g., moving the first virtual object to a location that satisfies the one or more criteria related to recentering described with reference to step(s) 1618). In some embodiments, the second location is also outside of the virtual environment. In some embodiments, if the three-dimensional environment includes additional virtual objects at locations outside of the virtual environment when the input corresponding to the request to recenter virtual content is received, those additional virtual objects are also concurrently moved in the three-dimensional environment to locations—optionally also outside of the virtual environment—that satisfy the one or more criteria related to recentering described with reference to step(s) 1618. Updating the location(s) of virtual object(s) in response to a recentering input reduces the number of inputs needed to update the angle into the virtual environment and recenter objects to the viewpoint of the user, and also avoids unintentional updating of the angle into the virtual environment, thus reducing and simplifying user interaction with the computer system.

In some embodiments, the virtual environment includes a horizon located at a respective location relative to the three-dimensional environment (e.g., at a location corresponding to the horizon in the physical environment and/or perpendicular to the floor in the physical environment and/or parallel to gravity in the physical environment) while the virtual environment is displayed with the first angle relative to the frame of reference and while the virtual environment is displayed with the second angle relative to the frame of reference (1628), such as horizon 1518 in FIGS. 15A and 15B. Thus, in some embodiments, the position and/or orientation of the horizon in the virtual environment does not change as the angle into the virtual environment that is displayed in the three-dimensional environment changes. Maintaining the location and/or orientation of the horizon in the virtual environment ensures that visibility into the virtual environment changes in an expected manner, thus reducing and simplifying user interaction with the computer system.

In some embodiments, the virtual environment is displayed with a respective level of immersion while the virtual environment is displayed with the first angle relative to the frame of reference and while the virtual environment is displayed with the second angle relative to the frame of reference (1630), such as the same immersion level in FIGS. 15A and 15A1 and FIG. 15B. Thus, in some embodiments, the immersion at which the virtual environment is displayed is not changed as the angle into the virtual environment is updated. In some embodiments, if the computer system detects an input to change the level of immersion at which the virtual environment is displayed, then the level of immersion is changed in accordance with the input. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity)

with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed. In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. Maintaining the level of immersion the virtual environment ensures that visibility into the virtual environment changes in an expected manner, thus reducing and simplifying user interaction with the computer system.

In some embodiments, displaying the virtual environment with the first angle relative to the frame of reference includes displaying, in the three-dimensional environment, a portal into the virtual environment at a first location in the three-dimensional environment (e.g., such as a portal as described with reference to step(s) 1604), wherein the portal has a first size along a first dimension (1632*a*) (e.g., the portal has the first size (e.g., length) vertically or horizontally), such as portal 1516 in FIGS. 15A and 15A1. In some embodiments, displaying the virtual environment with the second angle relative to the frame of reference includes displaying, in the three-dimensional environment, the portal into the virtual environment at the first location in the three-dimensional environment, wherein the portal has a second size, different from (e.g., greater than) the first size, along the first dimension (1632*b*), such as expanded portal 1516 in FIG. 15C. For example, rather than the location of the portal changing when the angle into the virtual environment changes, the portal expands to reveal, in the expanded portal, the updated angle into the virtual environment—and the prior angle into the virtual environment optionally remains visible in the originally displayed portion of the portal in the three-dimensional environment. In some embodiments, the portal expands in the same or similar (e.g., within 1, 3, 5, 10, 30 or 45 degrees of being the same) direction as the change in the viewpoint of the user. In some embodiments, the portal is able to expand in one direction (e.g., vertically or perpendicular to the horizon in the virtual environment and/or physical environment) but is not able to expand in another direction (e.g., horizontally or parallel to the horizon in the virtual environment and/or physical environment), such as similarly described with reference to step(s) 1616. In some embodiments, if the viewpoint of the user subsequently changes back to the first viewpoint and/or the computer system detects a subsequent predetermined event such as described with reference to step(s) 1602, the computer system shrinks the size of the portal along the first dimension based corresponding to the updated viewpoint of the user. Expanding (or contracting) the portal into the virtual environment ensures continuity of visibility into the virtual environment as the viewpoint of the user changes, thus reducing and simplifying user interaction with the computer system.

In some embodiments, when the first predetermined event is detected the virtual environment includes a first virtual object (e.g., such as a virtual object as described with reference to step(s) 1606), other than the virtual environment, that is a first distance from the viewpoint of the user (1634*a*), such as object 1506 in FIGS. 15A and 15A1. In some embodiments, the first distance is a distance into the virtual environment (e.g., the first virtual object is included in the virtual environment). In some embodiments, the first distance is closer to the viewpoint of the user than the virtual environment (e.g., the first virtual object is outside of the virtual environment).

In some embodiments, in response to detecting the first predetermined event and in accordance with the determination that the viewpoint of the user satisfies the one or more criteria, the computer system moves (1634*b*) the first virtual object to a second distance, different from the first distance, from the viewpoint of the user, such as the movement of object 1506 in FIG. 15B. In some embodiments, without user input for moving the first virtual object, the computer system moves the first virtual object to a different distance from the viewpoint of the user when the angle into the virtual environment is updated. In some embodiments, if the three-dimensional environment includes more virtual objects when the first predetermined event is detected, the computer system optionally concurrently changes the distances of those objects from the viewpoint of the user when the angle into the virtual environment is updated. Moving the first virtual object in distance from the viewpoint of the user reduces the number of inputs needed to move the first virtual object and ensures that the first virtual object remains at an appropriate distance from the viewpoint of the user, thus reducing and simplifying user interaction with the computer system.

In some embodiments, the second distance is less than the first distance (1636), such as shown with object 1506 in FIG.

15B. Moving the first virtual object closer to the viewpoint of the user reduces the number of inputs needed to move the first virtual object closer and ensures that the first virtual object remains interactable from the viewpoint of the user, thus reducing and simplifying user interaction with the computer system.

In some embodiments, when the first predetermined event was detected, the first virtual object was located at a predefined location in the virtual environment that is defined by the virtual environment, such as with respect to object 1506 in FIGS. 15A and 15A1 (e.g., different virtual environments optionally define different predefined locations at which virtual objects can reside in the virtual environments), and in response to detecting the first predetermined event and in accordance with the determination that the viewpoint of the user satisfies the one or more criteria (e.g., and without detecting user input to move the first virtual object), the first virtual object is displayed at a first location in the three-dimensional environment, different from the predefined location (1638*a*) (e.g., the first location is outside of the virtual environment in the three-dimensional environment), such as shown with object 1506 in FIG. 15B. In some embodiments, the magnitude and/or direction and/or final location of an input to place the first virtual object into the virtual environment is irrelevant to the ultimate placement of the virtual object in the virtual environment—the computer system optionally ultimately displays the virtual object at the predefined location. In some embodiments, the computer system displays the virtual object at a location in the virtual environment that is based on the magnitude and/or direction and/or current location of the input while (e.g., as long as) the input is ongoing (e.g., while the hand of the user remains in a pinch hand shape)—such location optionally being different from the predefined location—but in response to detecting an end of the input (e.g., detecting the hand of the user releasing the pinch hand shape), the computer system displays an animation of the virtual object moving to the predefined location in the virtual environment.

In some embodiments, while displaying the first virtual object at the first location, the computer system receives (1638*b*), via the one or more input devices, an input corresponding to a request to move the first virtual object away from the first location in the three-dimensional environment, such as an input to move object 1506 in FIG. 15B. In some embodiments, the user of the computer system selects the first virtual object with an air pinching hand input, drags the first virtual object from the first location, and releases the first virtual object at a subsequent location. In some embodiments, the input is provided via a trackpad or other input device in communication with the computer system. In some embodiments, the input has one or more of the characteristics of inputs for moving virtual objects described with reference to step(s) 1606.

In some embodiments, in response to receiving the input, the computer system moves (1638*c*) the first virtual object away from the first location in the three-dimensional environment in accordance with the input (e.g., in a direction and/or with a magnitude corresponding to a direction and/or magnitude of the input), such as moving object 1506 in FIG. 15B away from its current location. Thus, in some embodiments, a virtual object that was displayed at a predefined location in the virtual environment prior to the angle into the virtual environment being updated is moved away from the predefined location—optionally without user input for moving the first virtual object away from the predefined location—and to a location at which the first virtual object is freely moved in the three-dimensional environment in response to the angle into the virtual environment being updated. Moving the first virtual object closer away from a predefined location in the virtual environment ensures that the first virtual object remains interactable from the viewpoint of the user when the angle into the virtual environment is changed, thus reducing and simplifying user interaction with the computer system.

In some embodiments, when the first predetermined event is detected the virtual environment includes a first virtual object, other than the virtual environment, at a first location in the three-dimensional environment (e.g., such as described with reference to step(s) 1634-1638) and having a first spatial relationship relative to the viewpoint of the user (1640*a*) (e.g., having a first location, distance and/or orientation relative to the viewpoint of the user).

In some embodiments, in response to detecting the first predetermined event and in accordance with the determination that the viewpoint of the user satisfies the one or more criteria (1640*b*), in accordance with a determination that the first virtual object has a first value for a respective characteristic, such as object 1506 in FIGS. 15A and 15A1 (e.g., the first virtual object is a first type of virtual object, such as a virtual object that was located at a predefined location in the virtual environment when the predetermined event was detected, such as described with reference to step(s) 1634-1638), the computer system moves (1640*c*) the first virtual object to a second location, different from the first location, in the three-dimensional environment, such as object 1506 in FIG. 15B (e.g., maintaining the first virtual object within the virtual environment, or moving the first virtual object outside of the virtual environment), wherein while located at the second location the first virtual object has the first spatial relationship relative to the viewpoint of the user after the first predetermined event is detected (e.g., a location, distance and/or orientation of the first virtual object relative to the viewpoint of the user is maintained in response to the first predetermined event, whether or not the viewpoint of the user has changed).

In some embodiments, in accordance with a determination that the first virtual object has a second value, different from the first value, for a respective characteristic, such as object 1504 in FIGS. 15A and 15A1 (e.g., the first virtual object is a second type of virtual object, different from the first type of virtual object, such as a virtual object that was not located at the predefined location in the virtual environment when the predetermined event was detected, such as described with reference to step(s) 1634-1638), the computer system maintains (1640*d*) the first virtual object at the first location in the three-dimensional environment, such as with respect to object 1504 in FIG. 15B, wherein while located at the first location the first virtual object has a second spatial relationship, different from the first spatial relationship, relative to the viewpoint of the user after the first predetermined event is detected. For example, because the viewpoint of the user has optionally changed during the first predetermined event, the spatial relationship between the viewpoint of the user and the first virtual object has also changed, as the first virtual object has not changed position and/or orientation in response to the first predetermined event. Thus, in some embodiments, the first virtual object is a world-locked virtual object in this example. In some embodiments, the first virtual object is movable in the three-dimensional environment in response to user input such as described with reference to step(s) 1638. Selectively moving the first virtual object depending on the respective characteristic ensures that the first virtual object remains interactable from the viewpoint of the user while also behaving predictably when the angle into the virtual environment is changed, thus reducing and simplifying user interaction with the computer system.

In some embodiments, while displaying the virtual environment with the second angle relative to the frame of reference (e.g., in response to detecting the first predetermined event), such as in FIG. 15B, the computer system detects (1642*a*) a second predetermined event (e.g., having one or more of the characteristics of the first predetermined event), such as a predetermined event while computer system 101 is displaying environment 1517 in FIG. 15B. In some embodiments, in response to detecting the second predetermined event (1642*b*), in accordance with a determination that the viewpoint of the user satisfies the one or more criteria (e.g., such as described with reference to step(s) 1602), the computer system updates (1642*c*) display of the virtual environment to display the virtual environment from a third angle, different from the second angle, relative to the frame of reference, such as shifting portal 1516 again from its location in FIG. 15B (e.g., in one or more of the manners described with reference to updating the display of the virtual environment to display the virtual environment from the second angle). In some embodiments, in response to detecting the second predetermined event and in accordance with a determination that the viewpoint of the user does not satisfy the one or more criteria (e.g., such as described with reference to step(s) 1602), the computer system maintains the display of the virtual environment with the second angle relative to the frame of reference. Adjusting the portal into a virtual environment based on a user's viewpoint allows the user to dynamically view the virtual environment from the correct angle, thus reducing and simplifying user interaction with the computer system.

In some embodiments, the first predetermined event includes the viewpoint of the user changing from a first viewpoint to a second viewpoint (e.g., such as described with reference to step(s) 1602 and 1608-1616), such as from FIGS. 15A and 15A1 to FIG. 15B, and updating display of the virtual environment to display the virtual environment from the third angle includes (1644*a*) in accordance with a determination that the second predetermined event includes the viewpoint of the user changing from the second viewpoint to the first viewpoint, such as the viewpoint of FIGS. 15A and 15A1 (e.g., the perspective of the user has shifted back to—or within a threshold angle such as 1, 3, 5, 10, 20, 30, 45 or 60 degrees of—the perspective of the user when the first predetermined event was detected), displaying the virtual environment from the first angle (1644*b*), such as shown in FIGS. 15A and 15A1 (e.g., the angle into the virtual environment is shifted back to the first angle). Adjusting the angle into a virtual environment back to a prior angle allows the user to easily return to a prior viewing angle into the virtual environment, thus reducing and simplifying user interaction with the computer system.

In some embodiments, the first predetermined event includes the viewpoint of the user changing from a first viewpoint to a second viewpoint (e.g., such as described with reference to step(s) 1602 and 1608-1616), and updating display of the virtual environment to display the virtual environment from the third angle includes (1646*a*) in accordance with a determination that the second predetermined event includes the viewpoint of the user changing from the second viewpoint to a third viewpoint, different from the first viewpoint (e.g., the perspective of the user has shifted to—or more than a threshold angle such as 1, 3, 5, 10, 20, 30, 45 or 60 degrees away from—the perspective of the user when the first predetermined event was detected), displaying the virtual environment from the third angle, different from the first angle (1646*b*) (e.g., the angle into the virtual environment is not shifted back to the first angle, but is rather shifted to an angle corresponding to the different, third viewpoint of the user). Adjusting the angle into a virtual environment based on a user's viewpoint allows the user to dynamically view the virtual environment from the correct angle, thus reducing and simplifying user interaction with the computer system.

In some embodiments, when the first predetermined event was detected, the three-dimensional environment includes a first virtual object located at a predefined location in the virtual environment that is defined by the virtual environment (1648*a*) (e.g., such as described with reference to step(s) 1638), the first predetermined event includes the viewpoint of the user changing from a first viewpoint to a second viewpoint (1648*b*) (e.g., such as described with reference to step(s) 1602 and 1608-1616), such as from FIGS. 15A and 15A1 to 15B, in response to detecting the first predetermined event and in accordance with the determination that the viewpoint of the user satisfies the one or more criteria, the first virtual object is displayed at a first location in the three-dimensional environment, different from the predefined location (1648*c*) (e.g., such as described with reference to step(s) 1638), such as with respect to object 1506 in FIG. 15B, and updating display of the virtual environment to display the virtual environment from the third angle includes (1648*d*) in accordance with a determination that the second predetermined event includes the viewpoint of the user changing from the second viewpoint to the first viewpoint, such as back to the viewpoint of FIGS. 15A and 15A1 (e.g., the perspective of the user has shifted back to—or within a threshold angle such as 1, 3, 5, 10, 20, 30, 45 or 60 degrees of—the perspective of the user when the first predetermined event was detected), moving the first virtual object to the predefined location in the virtual environment that is defined by the virtual environment (1648*e*), such as moving object 1506 back to location 1514 (e.g., automatically moving the first virtual object back to the predefined location in the virtual environment without user input for moving the first virtual object to the predefined location). In some embodiments, in accordance with a determination that the second predetermined event includes the viewpoint of the user changing from the second viewpoint to a third viewpoint different from the first viewpoint (e.g., the perspective of the user has shifted to a perspective that is outside of the threshold angle of the perspective of the user when the first predetermined event was detected), the computer system forgoes moving the first virtual object to the predefined location in the virtual environment (and optionally does not move the first virtual object in the three-dimensional environment at all). Moving the first virtual object back to the predefined location in the virtual environment based on a user's viewpoint reduces the number of inputs needed to revert the positions and/or orientations of objects in the three-dimensional environment to the positions and/or orientations they had before the angle into the virtual environment was updated in response to the first predetermined event, thus reducing and simplifying user interaction with the computer system.

It should be understood that the particular order in which the operations in method 1600 have been described is merely exemplary and is not intended to indicate that the described order is the only order in which the operations could be performed. One of ordinary skill in the art would recognize various ways to reorder the operations described herein.

FIGS. 17A-17G illustrate examples of a first computer system and a second computer system selective sharing a virtual environment during a communication session in accordance with some embodiments.

Figure 17A:
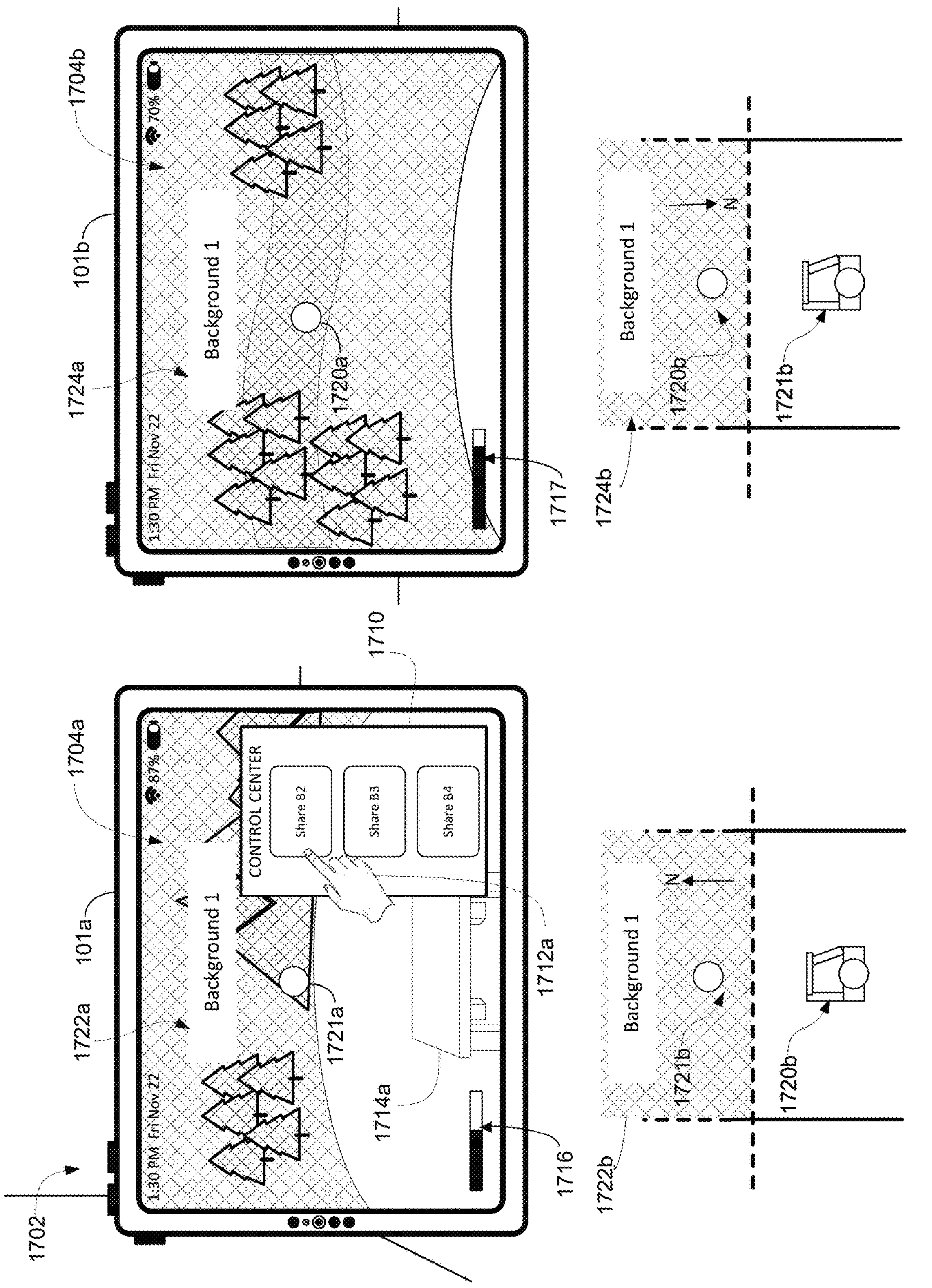
FIGS. 17A-17G illustrate examples of a first computer system and a second computer system selective sharing a virtual environment during a communication session in accordance with some embodiments.

FIG. 17A illustrates a first computer system 101*a* displaying, via a display generation component (e.g., display generation component 120 of FIG. 1), a three-dimensional environment 1704*a* from a viewpoint of a first user 1720*b*, and a second computer system 101*b* displaying, via a display generation component (e.g., display generation component 120 of FIG. 1), a three-dimensional environment 1704*b* from a viewpoint of a first user 1721*b*. As described above with reference to FIGS. 1-6, the computer systems 101*a*, 101*b* optionally include display generation components (e.g., touch screens or other display devices) and a plurality of image sensors (e.g., image sensors 314 of FIG. 3). The image sensors optionally include one or more of a visible light camera, an infrared camera, a depth sensor, or any other sensor the computer systems 101*a*, 101*b* would be able to use to capture one or more images of a user or a part of the user (e.g., one or more hands of the user) while the user interacts with the computer systems 101*a*, 101*b*. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user) such as movements that are interpreted by the computer system as gestures such as air gestures, and/or gaze of the user (e.g., internal sensors facing inwards towards the face of the user).

As shown in FIG. 17A, computer system 101*a* captures one or more images of the physical environment around computer system 101*a* (e.g., operating environment 100), including one or more objects in the physical environment around computer system 101*a*. In some embodiments, computer system 101*a* displays representations of the physical environment in three-dimensional environment 1704*a* or portions of the physical environment are visible via the display generation component of computer system 101*a*. For example, three-dimensional environment 1704*a* includes portions of the floor and includes table 1714*a*, which is a physical table in the physical environment of the user 1720*b*. Computer system 101*b* captures one or more images of the physical environment around computer system 101*b* (e.g., operating environment 100), including one or more objects in the physical environment around computer system 101*b*. In some embodiments, computer system 101*b* displays representations of the physical environment in three-dimensional environment 1704*b* or portions of the physical environment are visible via the display generation component of computer system 101*b*. For example, three-dimensional environment 1704*b* includes portions of the floor.

In FIG. 17A, computer systems 101*a* and 101*b* are in a communication session such that the first user 1720*b* is communicating with an avatar 1721*a* of the second user 1721*b* displayed in three-dimensional environment 1704*a*, and the second user 1721*b* is communicating with an avatar 1720*a* of the first user 1720*b* displayed in three-dimensional environment 1704*b*, as described in more detail with reference to method 1800. Further, computer systems 101*a* and 101*b* are sharing a virtual environment ("Background 1", corresponding to a simulated mountain space) as part of the communication session, as described in more detail with reference to method 1800. When computer systems 101*a* and 101*b* are sharing the virtual environment Background 1, computer system 101*a* displays a view 1722*a* into Background 1 (e.g., looking North into Background 1), and computer system 101*b* displays a view 1724*a* into Background 1 (e.g., looking South into Background 1). Further, in FIG. 17A, computer system 101*a* is displaying avatar 1721*a* of second user 1721*b* inside the view 1722*a* into Background 1, and computer system 101*b* is displaying avatar 1720*a* of first user 1720*b* inside the view 1724*a* into Background 1, as shown in the overhead views under computer system 101*a* and 101*b* (e.g., 1722*b*, 1721*b*, 1724*b* and 1720*b* in the overhead view corresponding to 1722*a*, 1721*a*, 1724*a* and 1720*a*, respectively, in the views displayed by computer systems 101*a*, 101*b*). The location in Background 1 at which computer system 101*a* is displaying avatar 1721*a* optionally corresponds to the location from which computer system 101*b* is displaying Background 1 (e.g., as if computer system 101*b* were located in the simulated physical space of Background 1), and the location in Background 1 at which computer system 101*b* is displaying avatar 1720*a* optionally corresponds to the location from which computer system 101*a* is displaying Background 1 (e.g., as if computer system 101*b* were located in the simulated physical space of Background 1). Further, while sharing a virtual environment during a communication session, the computer systems that are displaying the shared virtual environment optionally display the same portion of the virtual environment (e.g., the same portion of the simulated physical space of the virtual environment) at the same location relative to the shared virtual environment, though optionally from different directions. Additional details about such coordinated display of a shared virtual environment during a communication session are described with reference to method 1800.

In some embodiments, even when computer systems 101*a* and 101*b* are sharing a virtual environment during a communication session, computer systems 101*a* and 101*b* display that virtual environment with independent levels of immersion. Levels of immersion are described in more detail with reference to method 1800. In FIG. 17A, computer system 101*a* is displaying Background 1 with a level of immersion indicated by immersion indicator 1716 that is lower than the level of immersion with which computer system 101*b* is displaying Background 1.

In some embodiments, one computer system in a communication session is able to initiate a process to share a different virtual environment with the other computer system(s) that are in the communication session. For example, in FIG. 17A, computer system 101*a* is displaying control center user interface 1710, which includes a first option ("Share B2") that is selectable to share Background 2 with the communication session, a second option ("Share B3") that is selectable to share Background 3 with the communication session, and a third option ("Share B4") that is selectable to share Background 4 with the communication session. In FIG. 17A, computer system 101*a* detects an input from hand 1712*a* of user 1720*b* corresponding to selection of the first option ("Share B2"), described in more detail with reference to method 1800. In response, in FIG. 17B, computer system 101*a*, while remaining in the communication session, has switched from displaying Background 1 to displaying Background 2, which optionally corresponds to a simulated beach scene. The level of immersion at which computer system 101*a* is displaying Background 2 is optionally the same as the level of immersion at which computer system 101*a* was displaying Background 1 in FIG. 17A, as indicated by immersion indicator 1716 (e.g., the level of immersion does not change in response to the input in FIG.

17A). Further, computer system 101*a* is displaying a view 1722*a* into Background 2 (e.g., looking North into Background 2), and displays avatar 1721*a* in Background 2 (e.g., in the same way computer system 101*a* was displaying avatar 1721*a* in Background 1).

FIG. 17A1 illustrates similar and/or the same concepts as those shown in FIG. 17A (with many of the same reference numbers). It is understood that unless indicated below, elements shown in FIG. 17A1 that have the same reference numbers as elements shown in FIGS. 17A-17G have one or more or all of the same characteristics. FIG. 17A1 includes computer system 101, which includes (or is the same as) display generation component 120. In some embodiments, computer system 101 and display generation component 120 have one or more of the characteristics of computer system 101 shown in FIGS. 17A-17G and display generation component 120 shown in FIGS. 1 and 3, respectively, and in some embodiments, computer system 101 and display generation component 120 shown in FIGS. 17A-17G have one or more of the characteristics of computer system 101 and display generation component 120 shown in FIG. 17A1.

In FIG. 17A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 17A-17G.

In FIG. 17A1, display generation component 120 is illustrated as displaying content that optionally corresponds to the content that is described as being displayed and/or visible via display generation component 120 with reference to FIGS. 17A-17G. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 17A1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 17A1. Because display generation component 120 is optionally a head-mounted device, the field of view of display generation component 120 is optionally the same as or similar to the field of view of the user.

In FIG. 17A1, the user is depicted as performing an air pinch gesture (e.g., with hand 1712*a* while attention of the user is directed to option Share B2, as indicated by gaze point 1798) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 17A-17G.

In some embodiments, computer system 101 responds to user inputs as described with reference to FIGS. 17A-17G.

In the example of FIG. 17A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 17A-17G and/or described with reference to the corresponding method(s) are optionally implemented on computer system 101 and display generation unit 120 in a manner similar or analogous to that shown in FIG. 17A1.

Figure 17B:
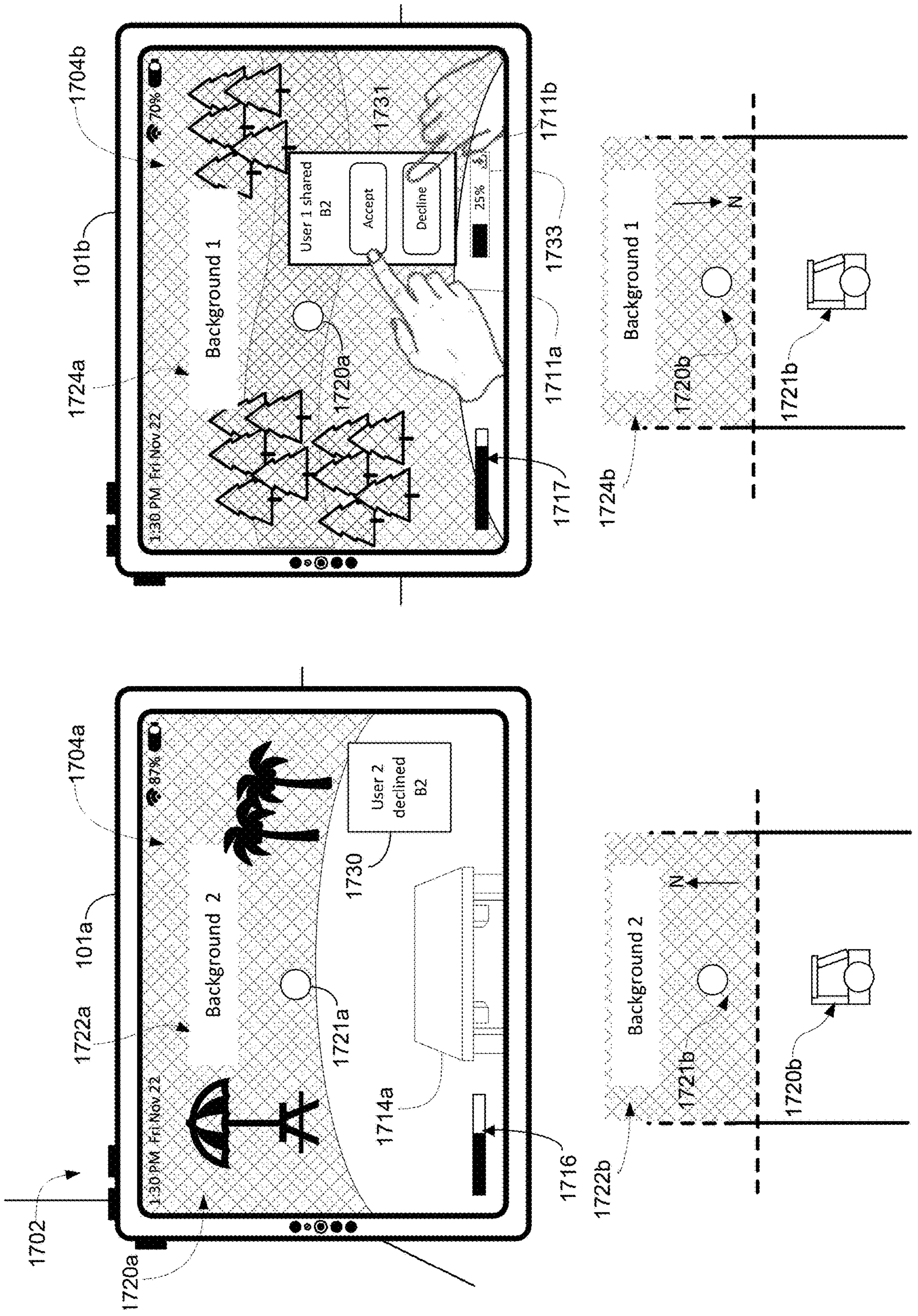

In response to the input in FIG. 17A detected by computer system 101*a*, computer system 101*b* in FIG. 17B displays dialog 1731. Dialog 1731 in FIG. 17B indicates that the first user 1720*b* has shared Background 2 with the second user 1721*b*, and includes an Accept option that is selectable to cause computer system 101*b* to join in the sharing of the shared virtual environment in the communication session, and a Decline option that is selectable to cause computer system 101*b* to instead maintain display of Background 1 while remaining in the communication session. In FIG. 17B, computer system 101*b* is still displaying Background 1, and is displaying avatar 1720*a* within Background 1.

Figure 17C:
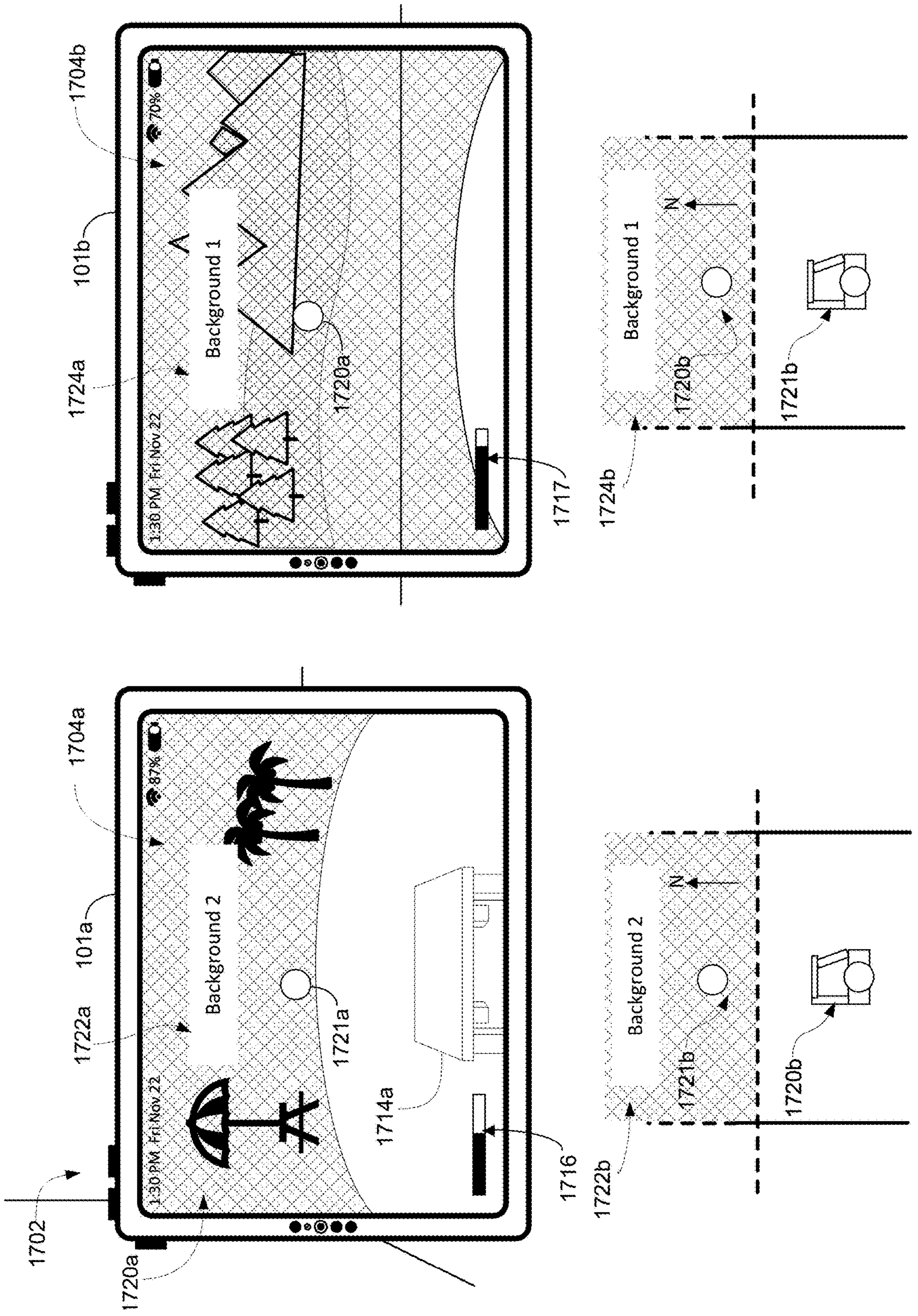

In response to computer system 101*b* detecting an input selecting the Decline option (e.g., via a selection input from hand 1711*b* of second user 1721*b*, described in more detail with reference to method 1800), computer system 101*a* displays indication 1730 indicating that the second user 1721*b* has declined joining in the sharing of Background 2, though computer systems 101*a* and 101*b* optionally remain in the communication session. For example, as shown in FIG. 17C, computer system 101*a* would display avatar 1721*a* in Background 2, and computer system 101*b* would display avatar 1720*a* in Background 1, which remaining in the communication session. Further, the respective levels of immersion with which computer systems 101*a* and 101*b* are displaying their respective virtual environments would optionally not change, as indicated by immersion indicators 1716 and 1717. However, in some embodiments, because computer system 101*b* would no longer be sharing a virtual environment with computer system 101*a* in the communication session, computer system 101*a* would optionally update the view 1724*a* into Background 1 that is it displaying to be toward a principal direction (e.g., looking North into Background 1), as shown in FIG. 17C. As also shown in FIG. 17C, computer system 101*a* is also displaying a view 1722*a* into Background 2 that is toward the same principal direction (e.g., looking North into Background 2). Therefore, when computer systems are not sharing a virtual environment in a communication session, the directions of their respective views into their respective virtual environments are optionally not coordinate with (e.g., are not based on) the directions of the views that other computer systems are displaying into their respective virtual environments.

Figure 17D:
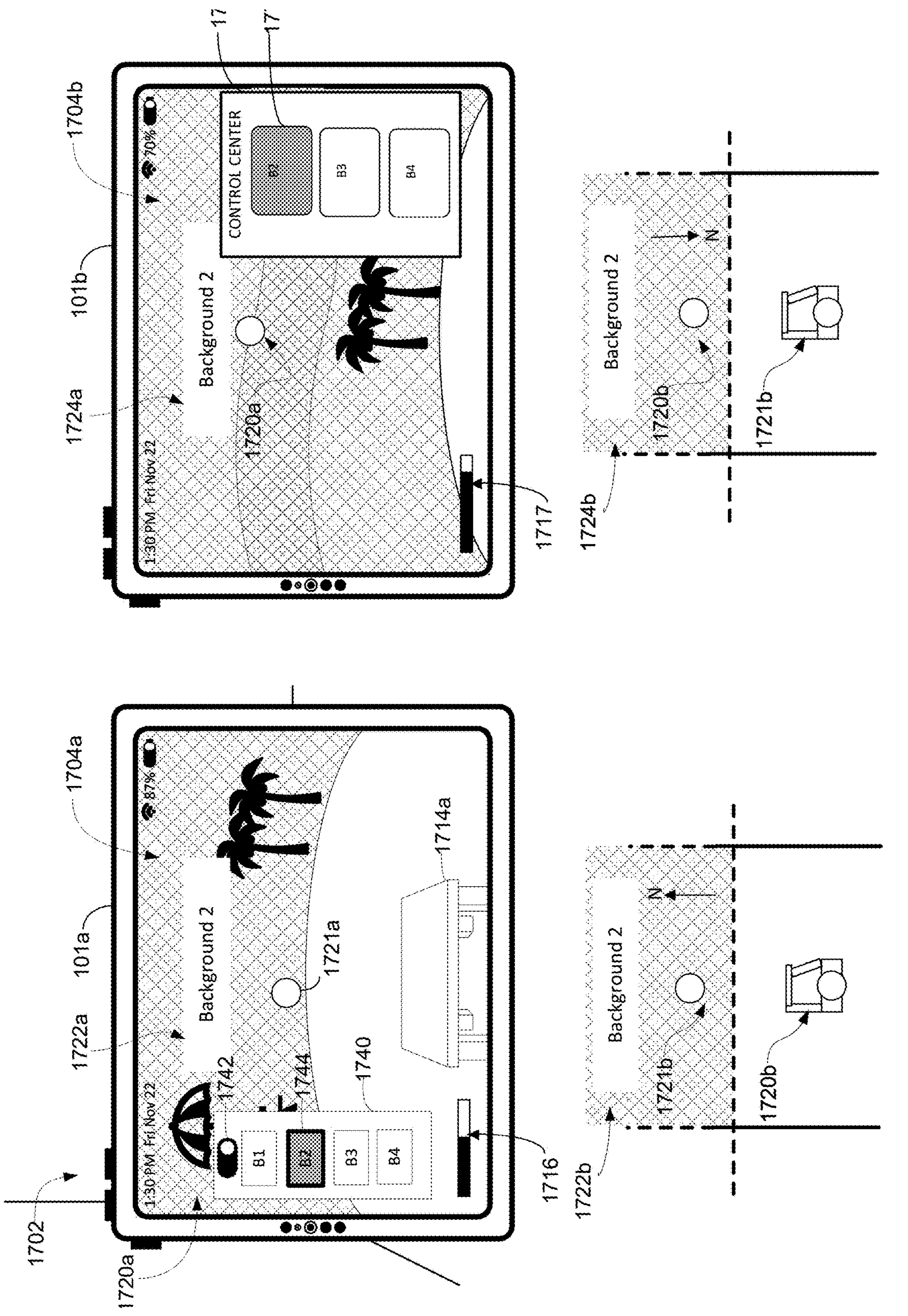

Returning to FIG. 17B, if computer system 101*b* were to instead detect input selecting the Accept option (e.g., via a selection input from hand 1711*a* of second user 1721*b*), computer system 101*b* would optionally initiate a process to download Background 2, and would optionally display download indication 1733 that indicates the progress in downloading Background 2. In response to the download of Background 2 being completed (or in the case that Background 2 was already downloaded), computer system 101*b* optionally displays Background 2 while remaining in the communication session with computer system 101*a*, as shown in FIG. 17D. In FIG. 17D, computer system 101*a* is optionally displaying a view of Background 2 and avatar 1721*a* in the same way as described with reference to FIGS. 17B-17C. However, in contrast to FIG. 17C, in FIG. 17D, computer system 101*b* is displaying avatar 1720*a* inside Background 2. Further, computer system 101*b* is displaying a view 1724*a* into Background 2 that is based on the view 1722*a* into Background 2 that is displayed by computer system 101*a*. For example, computer system 101*a* is displaying a view toward North in Background 2, and computer system 101*b* is displaying a view towards South in Background 2. Further, similar to as described with reference to FIG. 17A, the location in Background 2 at which computer system 101*a* is displaying avatar 1721*a* optionally corresponds to the location from which computer system 101*b* is displaying Background 2 (e.g., as if computer system 101*b* were located in the simulated physical space of Background 2), and the location in Background 2 at which computer system 101*b* is displaying avatar 1720*a* optionally corresponds to the location from which computer system 101*a* is displaying Background 2 (e.g., as if computer system 101*a* were located in the simulated physical space of Background 2). Further, the respective levels of immersion with which computer systems 101*a* and 101*b* are displaying their respective virtual environments would optionally not change, as indicated by immersion indicators 1716 and 1717.

In FIG. 17D, computer system 101*a* is also displaying a home user interface 1740 of computer system 101*a* for accessing one or more functionalities of the communication session, as described in more detail with reference to method 1800. In FIG. 17D, home user interface 1740 includes toggle 1742 for controlling whether a virtual environment selected for display at computer system 101*a* should be displayed in a light mode or a dark mode (e.g., corresponding to light and dark times of day in the simulated physical spaces of the virtual environment, as described in more detail with reference to method 1800), and options B1-B4 that are selectable to initiate display or sharing of corresponding virtual environments. Because Background 2 is currently displayed by computer system 101*a*, option B2 corresponding to Background 2 is visually distinguished from options B1 and B3-B4 (e.g., different color, different shading, and/or different size) to indicate that it is currently displayed. Further, because Background 2 is currently being shared in the communication session, option B2 is further visually distinguished from options B1 and B3-B4 (e.g., via selection ring 1744 or another visual indication) to indicate that it is currently being shared.

In FIG. 17D, computer system 101*b* is displaying a control center user interface 1770 for computer system 101*a*, having one or more or the characteristics of control center user interface 1710 in FIG. 17A. In FIG. 17D, because computer system 101*b* is currently displaying Background 2, option B2 1771 (corresponding to Background 2) is visually distinguished from options B1 and B3 (e.g., different color, different shading, and/or different size) to indicate that it is currently displayed.

Figure 17E:
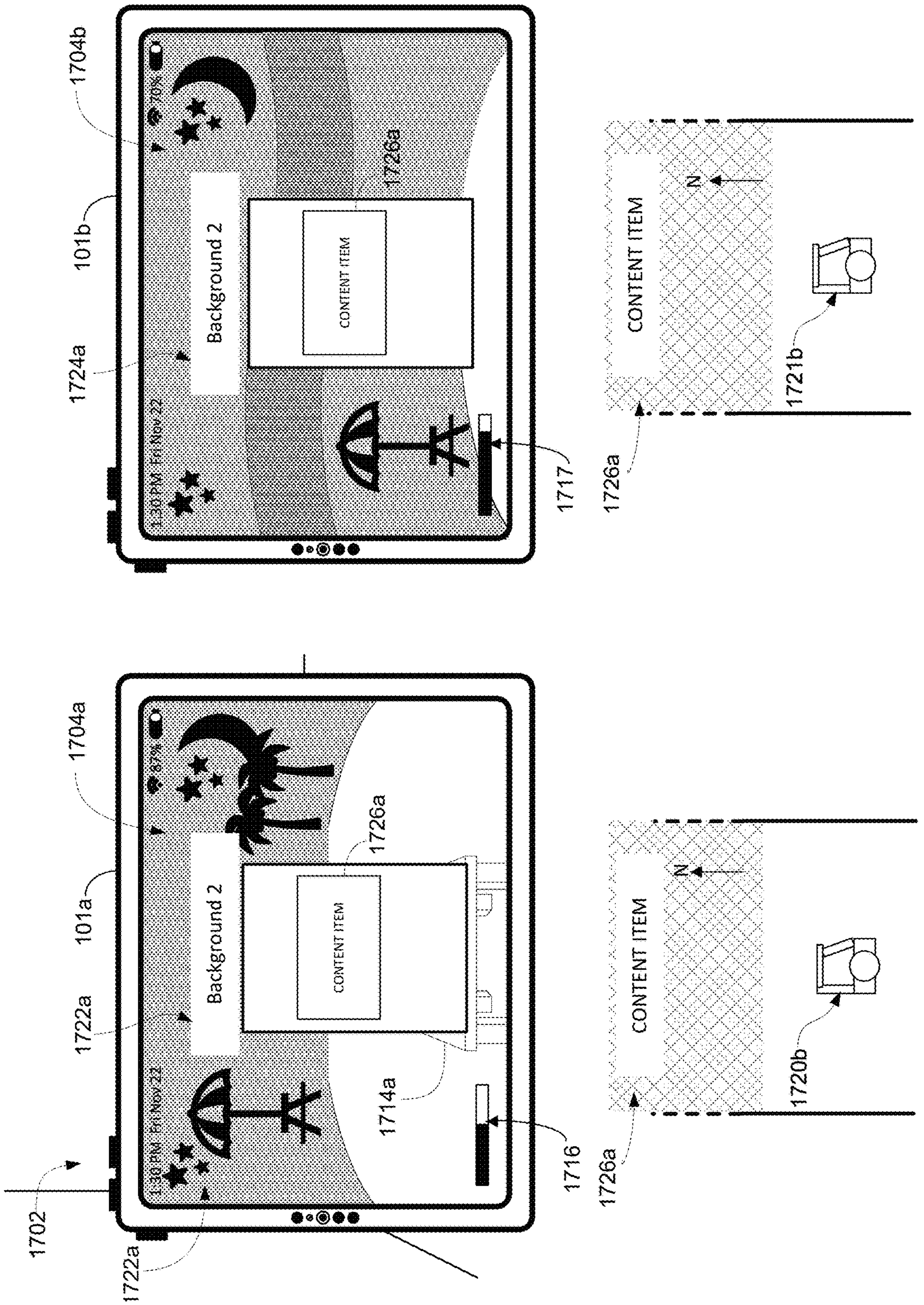

In some embodiments, any computer system in a communication session is able to initiate a change in the time of day at which the virtual environment that is being shred in that communication session is displayed. For example, in response to input selecting toggle 1742 in FIG. 17D (e.g., via a selection input, as described in more detail with reference to method 1800) corresponding to a request to switch from displaying Background 2 with a day time visual appearance to displaying Background 2 with a nighttime visual appearance, computer system 101*a* and computer system 101*b* switch to displaying Background 2 with the nighttime visual appearance, as shown in FIG. 17E. Additional details about day time and nighttime visual appearances for virtual environments are described with reference to method 1800. Changing the time of day appearance for a shared virtual environment during a communication session optionally does not change the respective levels of immersion with which computer systems 101*a* and 101*b* are displaying the shared virtual environment, as indicated by immersion indicators 1716 and 1717 in FIG. 17E.

In some embodiments, when the activity in the communication session changes, computer systems 101*a* and 101*b* change the directions in which they are displaying the shared virtual environment. For example, in FIG. 17E, the activity of the communication session has changed from communicating with avatars of other users (e.g., as shown in FIGS. 17A-17D) to participating in a shared visual experience (e.g., cooperatively and concurrently viewing content item 1726*a* in the communication session, such as video or photograph content). Therefore, computer system 101*b* has updated view 1724*a* of Background 2 to match the direction of view 1722*a* of Background 2 that is being displayed by computer system 101*a*. In particular, both computer systems 101*a* and 101*b* are displaying a view towards North in Background 2 in FIG. 17E. In this way, computer systems 101*a* and 101*b* are both able to display content item 1726*a* from the same direction, where content item 1726*a* is displayed at a location within Background 2.

Figure 17F:
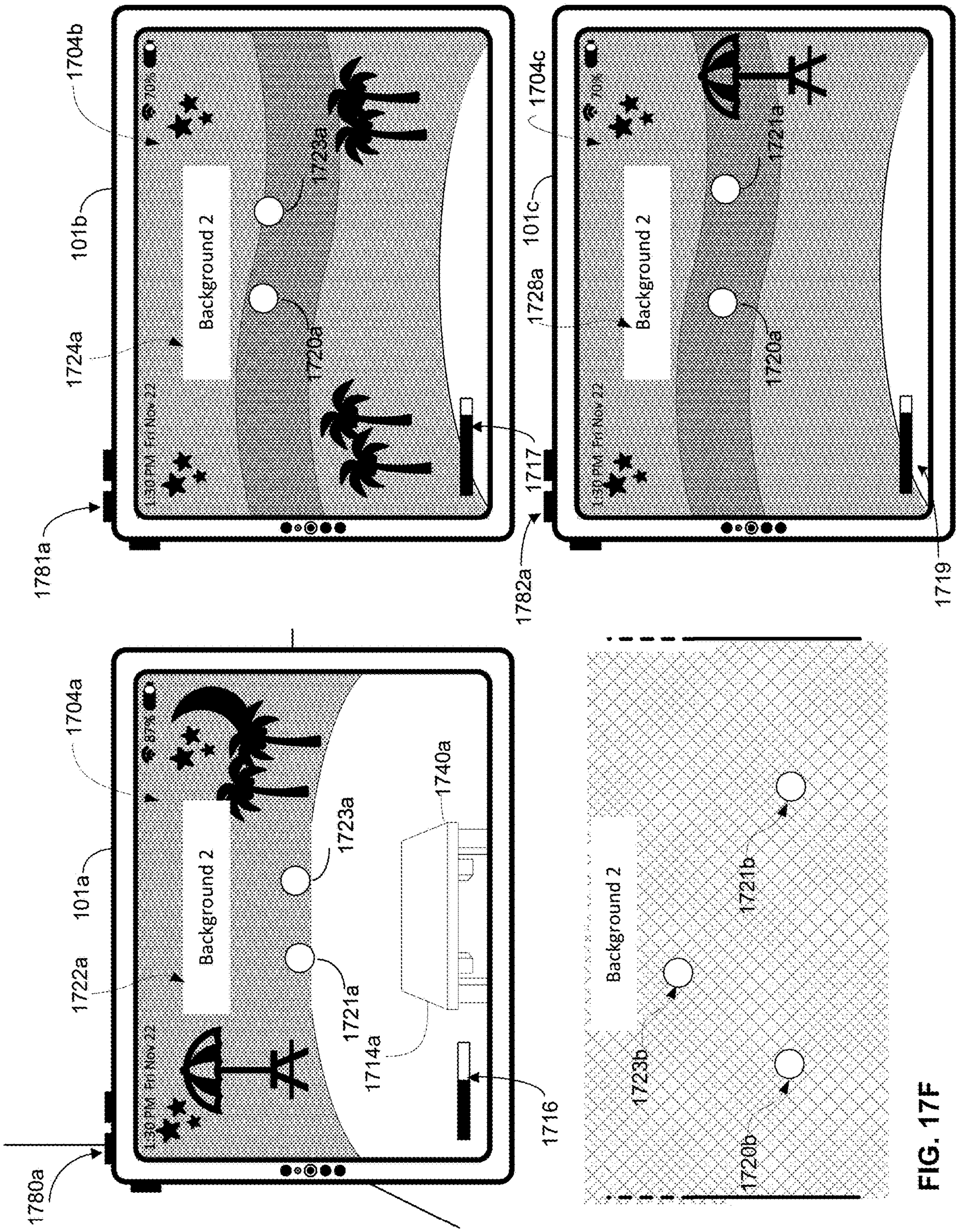

As mentioned previously, in some embodiments, when multiple computer systems are sharing a virtual environment during a communication session, the directions with which the computer systems display the shared virtual environment differ, and optionally depend on the other computer systems. FIG. 17F illustrates a scenario in which computer systems 101*a*, 101*b*, and 101*c* are participating in a communication session, and sharing Background 2 as part of that communication session. FIG. 17F also includes an overhead view that indicates the relative placements of simulated positions for user 1720*b* (user of computer system 101*a*), user 1721*b* (user of computer system 101*b*) and user 1723*b* (user of computer system 101*c*) in Background 2. A simulated position for a user optionally corresponds to the location from which that user's computer system is displaying Background 2 (e.g., as if that computer system were located in the simulated physical space of Background 2).

When more than two computer systems are included in the communication session, the computer systems optionally have simulated positions that fall on a circle or a circular or other shape such that the computer systems are able to display the avatars of the other users in the communication session at their respective simulated positions in the shared virtual environment. For example, in FIG. 17F, computer system 101*a* is displaying avatars 1721*a* and 1723*a* in Background 2 from a first simulated position in Background 2 toward a first direction in Background 2 (e.g., a direction towards the simulated positions of users 1721*b* and 1723*b*), computer system 101*b* is displaying avatars 1720*a* and 1723*a* in Background 2 from a second simulated position in Background 2 toward a second direction in Background 2 (e.g., a direction towards the simulated positions of users 1720*b* and 1723*b*), and computer system 101*b* is displaying avatars 1720*a* and 1721*a* in Background 2 from a third simulated position in Background 2 toward a third direction in Background 2 (e.g., a direction towards the simulated positions of users 1720*b* and 1721*b*). Thus, the directions in which, and the simulated positions from which, the computer systems display the shared virtual environment optionally changes based on the number of participants in the communication session, as described in more detail with reference to method 1800.

The levels of immersion at which computer systems 101*a*, 101*b* and 101*c* are displaying Background 2 optionally continue to be independent of one another. In FIG. 17F, computer system 101*a* is displaying Background 2 at a level of immersion indicated by immersion indicator 1716 that is lower than the level of immersion at which computer system 101*b* is displaying Background 2 and the level of immersion at which computer system 101*c* is displaying Background 2. From FIG. 17F to 17G, computer systems 101*a*, 101*b* and 101*c* have all received inputs to change their respective levels of immersion (e.g., described in more detail with reference to method 1800), but computer systems 101*a*, 101*b* and 101*c* remain in the communication session and remain sharing Background 2 in that communication session. For example, from FIG. 17F to 17G, computer system 101*a* has detected an input to increase the level of immersion at which it is displaying Background 2, and is displaying Background 2 at an increased level of immersion as indicated by immersion indicator 1716 in FIG. 17G. From FIG. 17F to 17G, computer system 101*b* has detected an input to decrease the level of immersion at which it is displaying Background 2, and is displaying Background 2 at a decreased level of immersion as indicated by immersion indicator 1717 in FIG. 17G. From FIG. 17F to 17G, computer system 101*c* has detected an input to increase the level of immersion at which it is displaying Background 2, and is displaying Background 2 at an increased level of immersion as indicated by immersion indicator 1719 in FIG. 17G.

FIGS. 18A-18I is a flowchart illustrating a method 1800 of generating alerts associated with physical objects in an environment of a user in accordance with some embodiments. In some embodiments, the method 1800 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, a projector, etc.) and one or more cameras (e.g., a camera (e.g., color sensors, infrared sensors, and other depth-sensing cameras) that points downward at a user's hand or a camera that points forward from the user's head). In some embodiments, the method 1200 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 1800 are, optionally, combined and/or the order of some operations is, optionally, changed.

In some embodiments, the method 1800 is performed at a first computer system, such as computer system 101 in FIG. 1, in communication with a display generation component and one or more input devices. In some embodiments, the computer system has one or more of the characteristics of the computer systems of methods 800, 1000, 1200, 1400, and/or 1600. In some embodiments, the display generation component has one or more of the characteristics of the display generation component of methods 800, 1000, 1200, 1400, and/or 1600. In some embodiments, the one or more input devices have one or more of the characteristics of the one or more input devices of methods 800, 1000, 1200, 1400, and/or 1600.

In some embodiments, the computer system displays (1802*a*), via the display generation component, a first virtual environment, such as virtual environment 1722*a* corresponding to Background 1 in FIGS. 17A and 17A1, during a communication session (e.g., a communication session such as described with reference to method 1400), wherein the communication session includes the first computer system, such as first computer system of user 1720*b* in FIGS. 17A and 17A1, (e.g., associated with a first user) and a second computer system (e.g., associated with a second user different from the first user), such as second computer system of user 1721*b* in FIGS. 17A and 17A1, different from the first computer system, wherein the first virtual environment is a first simulated physical environment in which a conversation between a first user of the first computer system and a second user of the second computer system is taking place during the communication session (e.g., where a first user of the first second computer system is communicating with a spatial representation of the second user of the second computer system that is located at a respective location within the first virtual environment (e.g., the second user is represented by a glowing orb, video chat window, avatar, or other representation that has a spatial position within the first virtual environment), and the spatial representation of the second user moves within the first virtual environment based on movement of the second user in the second user's physical environment (e.g., portions of an avatar representation of the second user move relative to other portions of the avatar representation of the second user or the spatial representation of the second user moves relative to the first virtual environment)). In some embodiments, the communication session including the first and second computer systems is optionally a communication session in which audio and/or video of the users of the various computer systems involved are accessible to other computer systems/users in the communication session. In some embodiments, during the communication session, a given computer system participating in the communication session displays one or more avatars of the one or more other users participating in the communication session, where the avatars are optionally animated in a way that corresponds to the audio (e.g., speech audio) transmitted to the communication session by the corresponding computer systems. In some embodiments, during the communication session, the first computer system displays the one or more avatars of the one or more other users participating in the communication session in the virtual environment being displayed by the first computer system, and the second computer system displays the one or more avatars of the one or more other users participating in the communication session in the virtual environment being displayed by the second computer system. In some embodiments, the first virtual environment has one or more of the characteristics of the virtual environments of methods 800, 1000, 1200, 1400, and/or 1600.

In some embodiments, while displaying the first virtual environment (e.g., a virtual scene of mountains displayed by the first computer system and optionally, but not necessarily, the second computer system) during the communication session, the computer system receives (1802*b*), via the one or more input devices, a first input corresponding to a request to display a second virtual environment, such as request to display B2 via input from hand 1712*a* in FIGS. 17A and 17A1 (e.g., a virtual scene of a beach), different from the first virtual environment, while remaining in the communication session. The second virtual environment optionally has one or more characteristics of the first virtual environment. In some embodiments, the first input includes an air gesture provided by a hand of a user or a handheld device directed towards a selectable option associated with displaying the second virtual environment (e.g., air tapping or air pointing with a finger of the hand or the handheld device at the selectable option, or performing an air pinch hand gesture in which the tips of the index finger and thumb of the hand of the user come together and touch while attention of the user is directed to the selectable option). In some embodiments, the first input is an attention-only and/or gaze-only input (e.g., not including input from one or more portions of the user other than those portions providing the attention input).

In some embodiments, in response to receiving the first input, the computer system displays (1802*c*), via the display generation component, the second virtual environment, such as virtual environment 1722*a* corresponding to Background 2 in FIG. 17B (e.g., the virtual scene of the beach is displayed by the first computer system) while remaining in the communication session, wherein the second virtual environment is a second simulated physical environment in which a conversation between the first user of the first computer system and the second user of the second computer system is taking place during the communication session (e.g., where a first user of the first computer system is communicating with a spatial representation of the second user of the second computer system that is located at a respective location within the second virtual environment (e.g., the second user is represented by a glowing orb, video chat window, avatar, or other representation that has a spatial position within the second virtual environment), and the spatial representation of the second user moves within the second virtual environment based on movement of the second user in the second user's physical environment (e.g., portions of an avatar representation of the second user move relative to other portions of the avatar representation of the second user or the spatial representation of the second user moves relative to the second virtual environment). For example, the first computer system optionally ceases display of the first virtual environment. In some embodiments, the first computer system continues to display the virtual content and/or elements it was displaying with and/or in the first virtual environment (e.g., avatars of other users of the other computer systems participating in the communication session) with and/or in the second virtual environment.

In some embodiments, in accordance with a determination that one or more first criteria are satisfied (e.g., as will be described in more detail with reference to step(s) 1808, the computer system initiates (1802*d*) a process to display the second virtual environment at the second computer system, such as virtual environment 1724*a* corresponding to Background 2 in FIG. 17D, wherein the second virtual environment is the second simulated physical environment in which the conversation between the first user of the first computer system and the second user of the second computer system is taking place during the communication session (e.g., where the second user of the second computer system is communicating with a spatial representation of the first user of the first computer system that is located at a respective location within the second virtual environment (e.g., the first user is represented by a glowing orb, video chat window, avatar, or other representation that has a spatial position within the second virtual environment), and the spatial representation of the first user moves within the second virtual environment based on movement of the first user in the first user's physical environment (e.g., portions of an avatar representation of the first user move relative to other portions of the avatar representation of the first user or the spatial representation of the first user moves relative to the second virtual environment). In some embodiments, the one or more first criteria include confirmation or input from the first computer system to display (e.g., share) the second virtual environment in the communication session. In some embodiments, the process to display the second virtual environment at the second computer system includes transmission, by the first computer system, of a command to the second computer system—or via a server in communication with the first and second computer systems—to display the second virtual environment. Changing the virtual environment for multiples user to a common virtual environment in a communication session enables the users to have a shared experience, enhances communication amongst the users, reduces the number of inputs needed at the various computer systems to update their respective virtual environments to become shared, reduces errors in setting a shared virtual environment, and improves respective user-device interactions.

In some embodiments, in response to receiving the first input (1804*a*), in accordance with a determination that the one or more first criteria (e.g., as will be described in more detail with reference to step(s) 1808) are not satisfied, the first computer system forgoes (1804*b*) initiating the process to display the second virtual environment at the second computer system while the first computer system and the second computer system remain in the communication session, such as virtual environment 1724*a* corresponding to Background 1 instead in FIG. 11C (e.g., the two computer systems maintain display of their own, different virtual environments during the communication session). The first user of the first computer system is optionally communicating with the spatial representation of the second user of the second computer system that is located at a respective location within the second virtual environment. The second user of the second computer system is optionally communicating with the spatial representation of the first user of the first computer system that is located at a respective location within the first virtual environment. Not changing the virtual environment for multiple users to a common virtual environment in a communication session when requirements for doing so are not met avoids erroneous switching of virtual environments and reduces the need for inputs to correct for such erroneous switching.

In some embodiments, the one or more first criteria include a criterion that is satisfied when the first computer system receives input (e.g., from the first user) corresponding to authorization to share the second virtual environment with the second computer system, such as hand 1712*a* directed towards share B2 in FIGS. 17A and 17A1 (1806). For example, in response to the first input received at the first computer system, the first computer system displays a prompt asking the first user if the newly displayed second virtual environment should be shared with the second computer system (e.g., as described with reference to method 1400). The prompt optionally includes a selectable option to share the second virtual environment with the second computer system, and a selectable option to not share the second virtual environment with the second computer system. In response to receiving selection of the appropriate selectable option, the first computer system optionally initiates or does not initiate the process to display the second virtual environment at the second computer system. In some embodiments, the second computer system receives and/or displays a notification indicating that the first user of the first computer system shared the second virtual environment with the second computer system. Changing the virtual environment for multiple users to a common virtual environment in a communication session when input for doing so is received avoids erroneous switching of virtual environments, increases privacy for the first user, and reduces the need for inputs to correct for such erroneous switching.

In some embodiments, displaying the second virtual environment during the communication session in response to receiving the first input includes displaying, via the display generation component, the second simulated physical environment from a predefined orientation, such as user 1720*b* facing north in FIGS. 17A and 17A1 (e.g., displaying the second virtual environment from a viewpoint facing north, south, east or west in the simulated physical environment) (1808*a*). Thus, the spatial representation of the second user of the second computer system is optionally displayed over or within the view of the second simulated physical environment in the predefined orientation. In some embodiments, the second virtual environment is displayed from the predefined orientation, because the first user-initiated display of the second virtual environment, rather than having joined a shared virtual environment shared by a different user in the communication session.

In some embodiments, displaying the first virtual environment during the communication session includes (1808*b*), in accordance with a determination that the first computer system joined the communication session while the first virtual environment was already being shared in the communication session (e.g., the second user or another user had already shared the first virtual environment in the communication session, and the first user and first computer system joined the communication session while that sharing was occurring—sharing of virtual environments during communication sessions is described in more detail with reference to method 1400), the first computer system displays (1808*c*), via the display generation component, the first simulated physical environment from a second orientation, different from the predefined orientation, such as user 1720*b* facing south if user 1720*b* joined when Background 1 was already being shared in FIGS. 17A and 17A1. The second orientation has one or more of the characteristics described with reference to step(s) 1812-step 1820.

In some embodiments, in accordance with a determination that the first computer system initiated display of the first virtual environment during the communication session (e.g., similar to initiation of display of the second virtual environment based on the first input, as opposed to joining display of the first virtual environment that was initiated by a different user in the communication session), the first computer system displays (1808*d*), via the display generation component, the first simulated physical environment from the predefined orientation, such as user 1720*b* viewing virtual mountains and trees of Background 1 in FIGS. 17A and 17A1. Displaying a virtual environment at different orientations depending on whether the first computer system initiated display of the virtual environment or joined a prior shared virtual environment ensures consistent display across multiple virtual environments, and avoids unexpectedly changing the orientations from which users in the communication session are viewing their respective virtual environments, which reduces errors in interaction with the computer system.

Figure 17G:
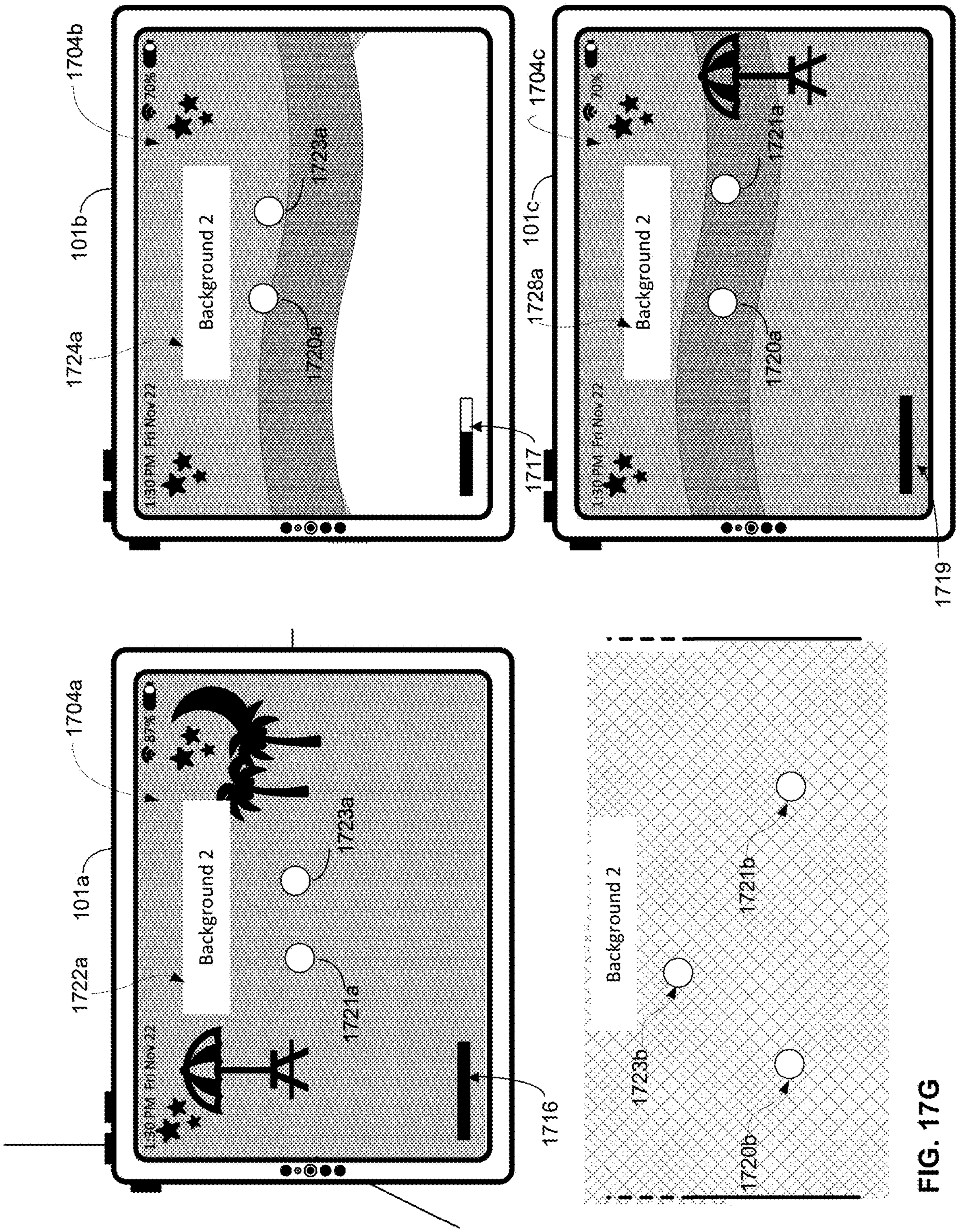
Figure 18C:
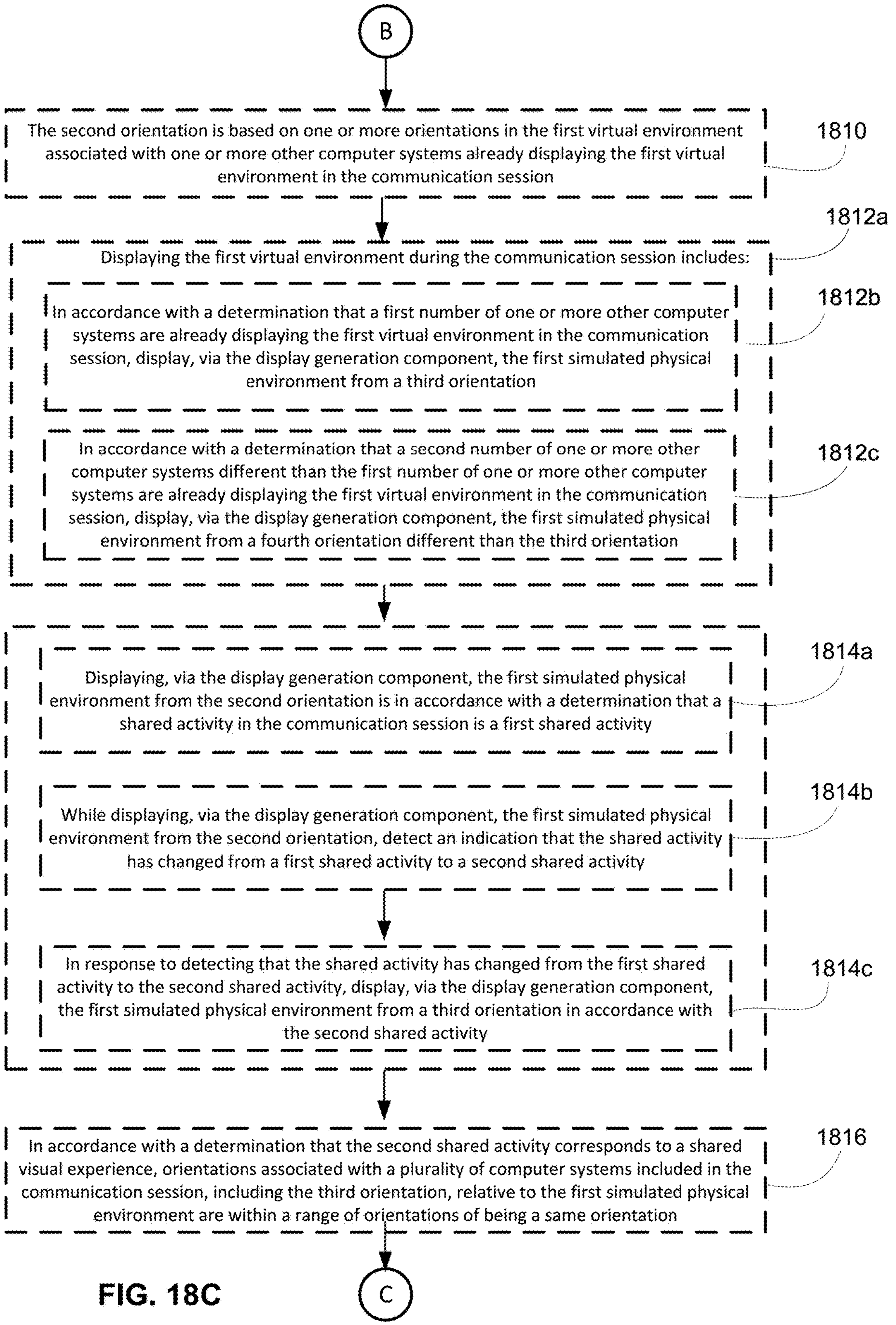
Figure 18D:
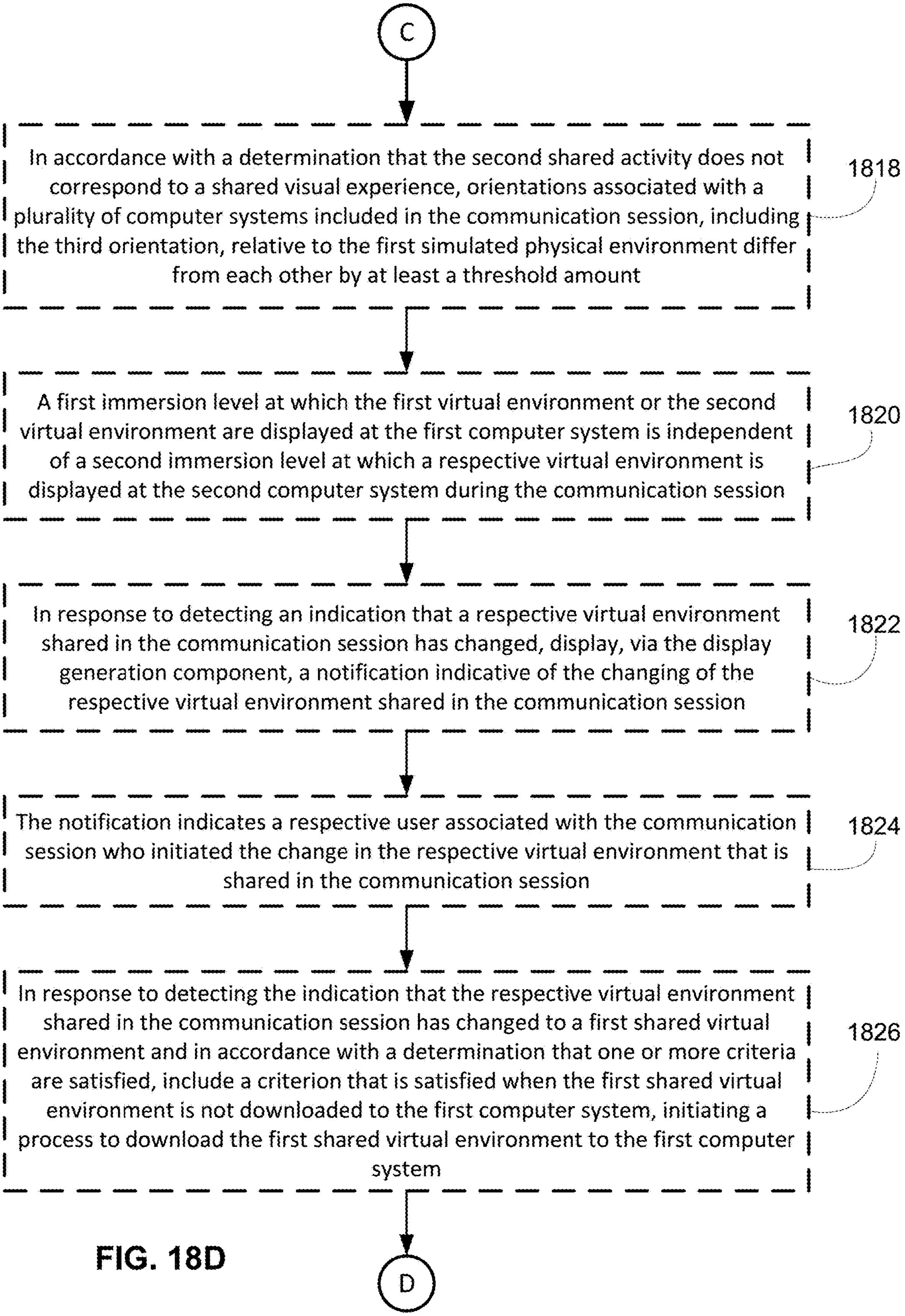
Figure 18E:
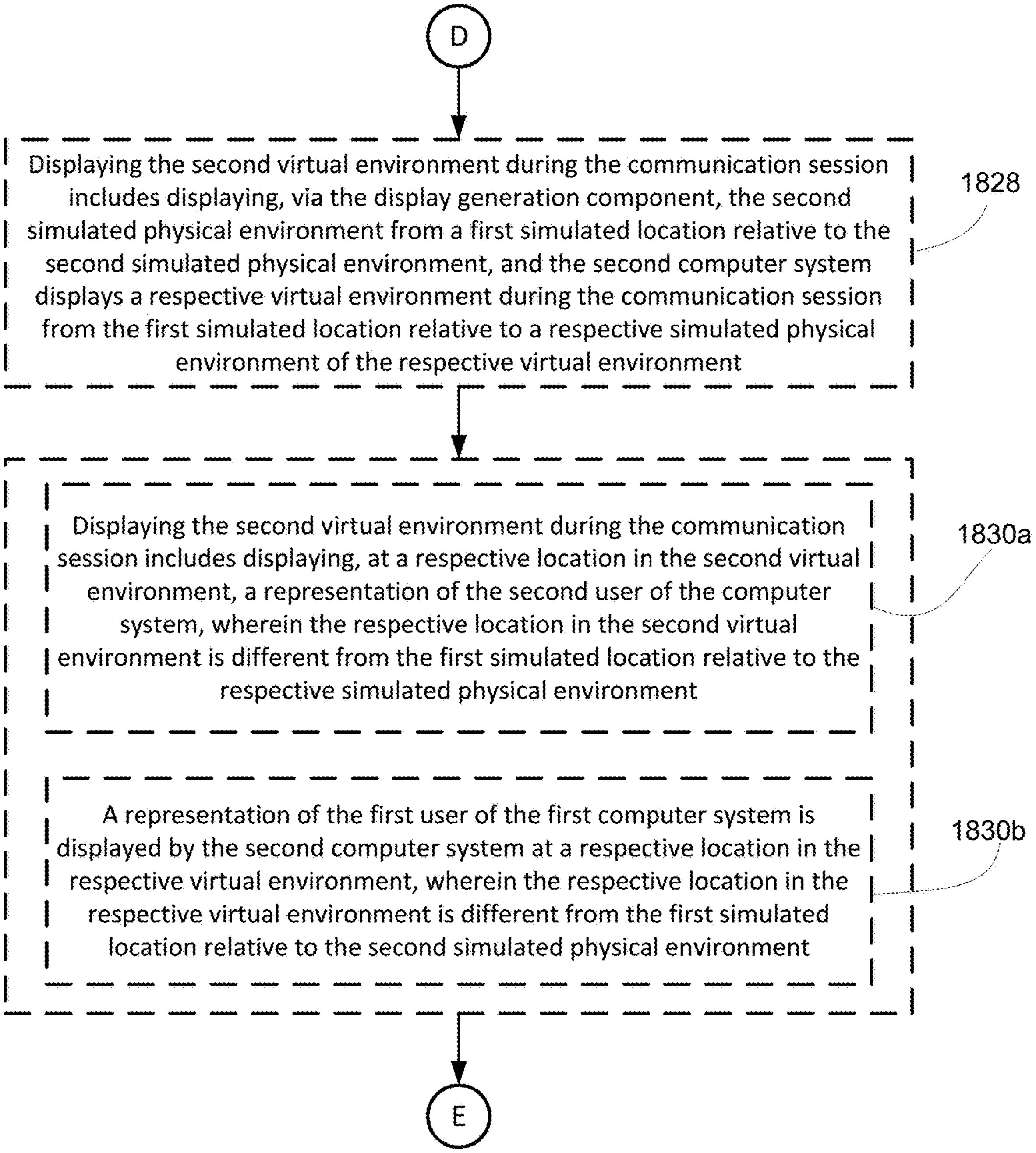
Figure 18G:
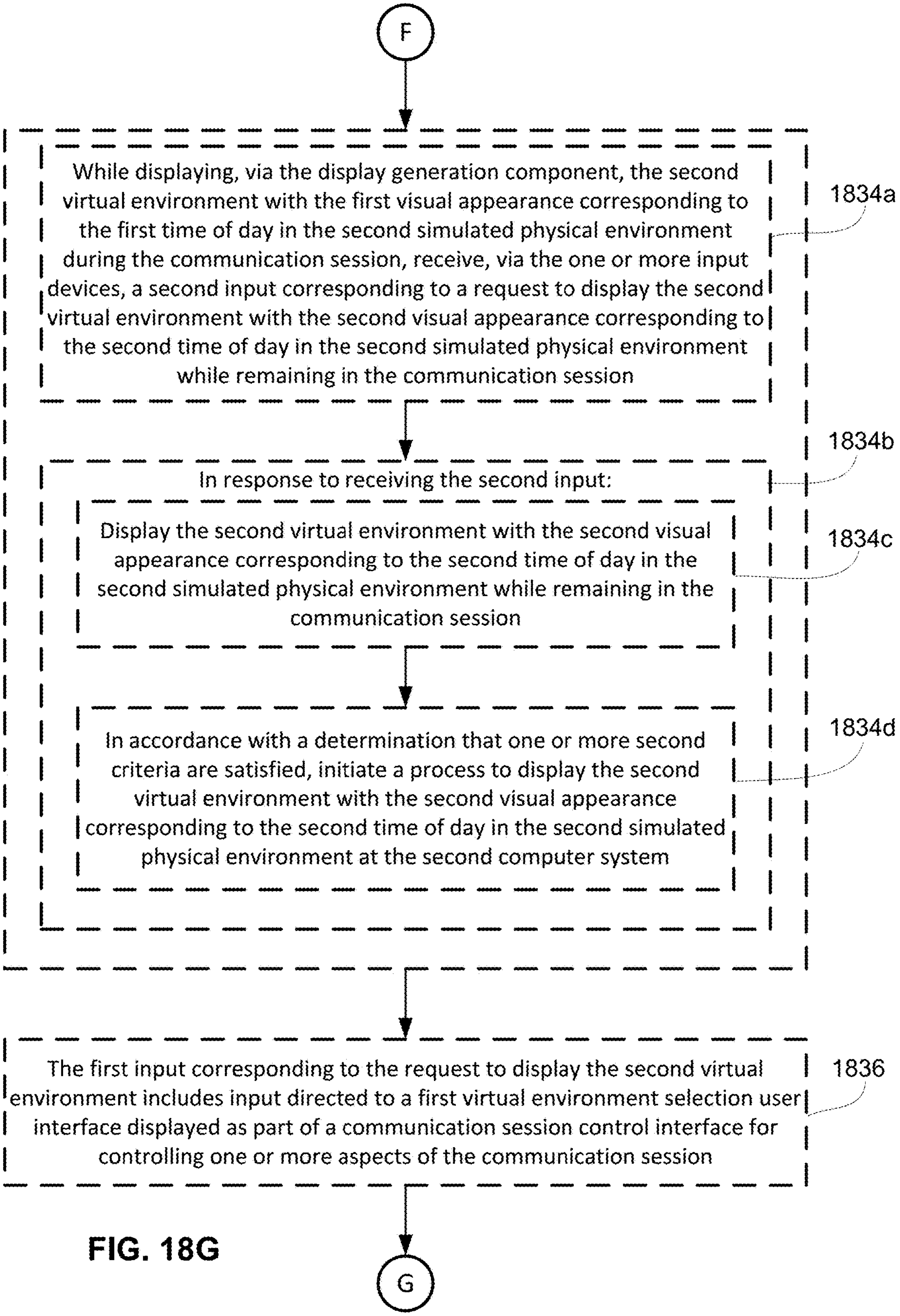
Figure 18I:
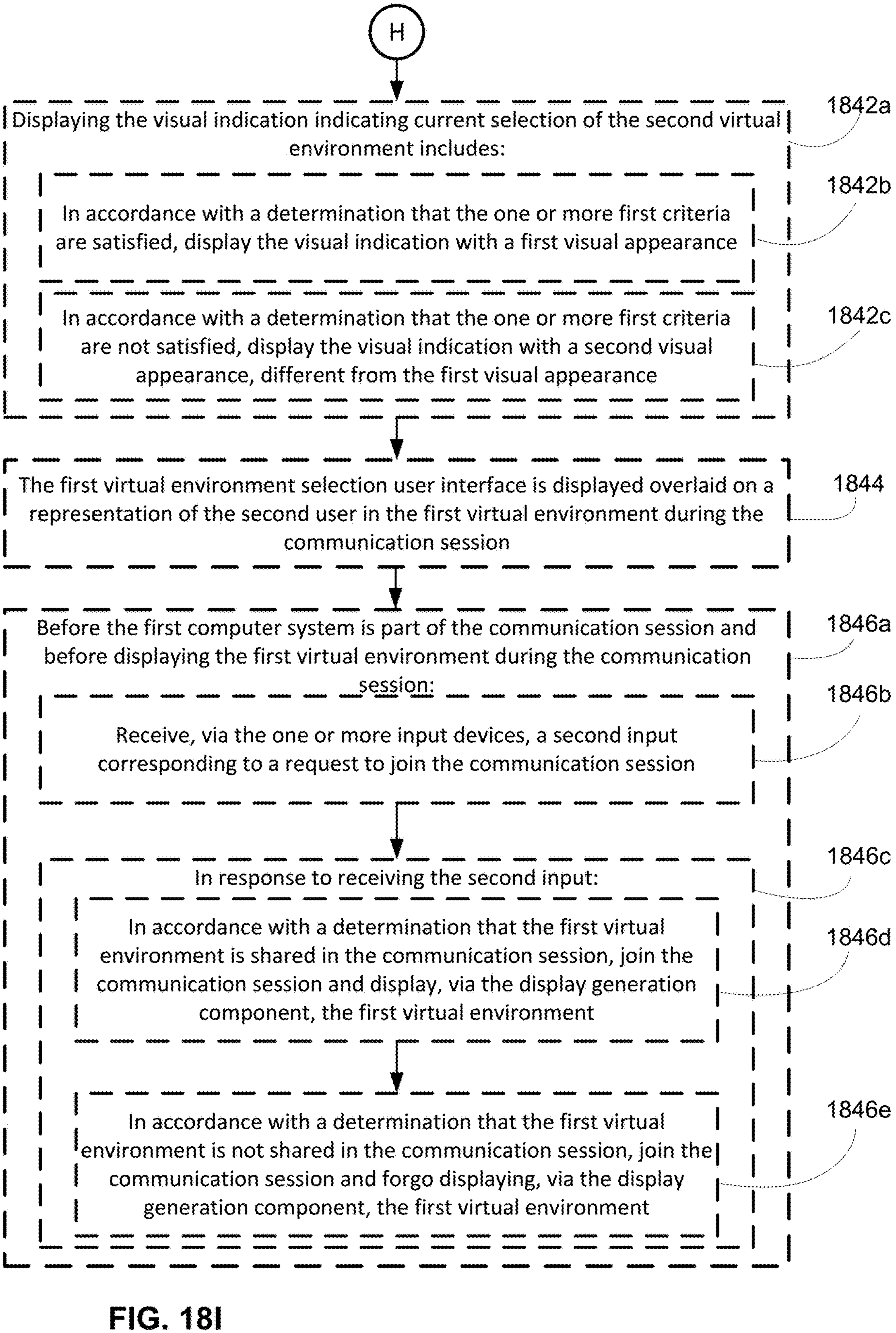

In some embodiments, the second orientation is based on one or more orientations (and/or positions) in the first virtual environment associated with one or more other computer systems, such orientations of respective computer systems of users 1721*b* and 1723*b* in FIG. 17G, already displaying the first virtual environment in the communication session (1810). In some embodiments, when joining a shared virtual environment (e.g., the first virtual environment), the first computer system selects a position and/or an orientation (e.g., the second orientation) from which to display the first virtual environment that is generally directed towards (e.g., within 5, 20, 45, 60, 90 or 180 degrees of being directed towards) the average location of the locations of the spatial representations of the other users (e.g., those users already in the first virtual environment). In this way, the spatial representations of the other users in the first virtual environment are optionally visible when the first computer system displays the first virtual environment from the selected position and/or the second orientation. For example, if only a first other user is already in the first virtual environment and the computer system of the first other user is displaying the first virtual environment from the predefined orientation (e.g., north), the second orientation from which the first computer system displays the first virtual environment is optionally south. As another example, if only a first other user and a second other user are already in the first virtual environment and the computer system of the first other user is displaying the first virtual environment from a first location towards the predefined orientation (e.g., north) and the computer system of the second other user is displaying the first virtual environment from a second location (e.g., north of the first location) towards the south, the second orientation from which the first computer system displays the first virtual environment is optionally towards the west (e.g., from a location east of the first and second locations) or towards the east (e.g., from a location west of the first and second locations). Displaying a virtual environment at different orientations based on the positions and/or orientations of other users in the virtual environment ensures visibility of the other users in the virtual environment and reduces the need for inputs to manually change the orientation to achieve such visibility.

In some embodiments, displaying the first virtual environment during the communication session includes (1812*a*), in accordance with a determination that a first number of one or more other computer systems are already displaying the first virtual environment in the communication session, the first computer system displays (1812*b*), via the display generation component, the first simulated physical environment from a third orientation, such as user 1720*b* facing north and user 1721*b* facing south in FIG. 17D. In some embodiments, in accordance with a determination that a second number of one or more other computer systems different than the first number of one or more other computer systems are already displaying the first virtual environment in the communication session, the computer system displays (1812*c*), via the display generation component, the first simulated physical environment from a fourth orientation, such as spatial template of users 1720*b*, 1721*b*, and 1723*b* corresponding to a circle in FIG. 17G, different than the third orientation. In some embodiments, the spatial template of the different locations from which the different computer systems included in the communication session are displaying the first virtual environment is different depending on the number of participants of the communication session that are sharing the first virtual environment. For example, if the first virtual environment is shared by two participants (e.g., the first number of one or more other computer systems), the spatial template of the two positions associated with the two participants is optionally a line (e.g., with endpoints at the two positions). If, however, the first virtual environment is shared by three or more participants (e.g., the second number of one or more other computer systems), the spatial template of the three or more positions associated with the three or more participants is optionally a circle, a square, a rectangle, a triangle, or other shape (e.g., the positions associated with the participants fall on the border of the spatial template, and the orientation towards which the virtual environment is displayed is towards the positions associated with the other users on the spatial template). Thus, in some embodiments, in accordance with a determination that the first number of one or more other computer systems are already displaying the first virtual environment in the communication session, the positions associated with the participants in the communication session have a first spatial arrangement, and in accordance with a determination that the second number of one or more other computer systems are already displaying the first virtual environment in the communication session, the positions associated with the participants in the communication session have a second spatial arrangement, different from the first spatial arrangement. Displaying a virtual environment at different orientations based on the number of other users in the virtual environment ensures visibility of the other users in the virtual environment and reduces the need for inputs to manually change the orientation to achieve such visibility.

In some embodiments, displaying, via the display generation component, the first simulated physical environment from the second orientation, such as users 1720*b* and 1721*b* facing north in FIG. 17E, is in accordance with a determination that a shared activity in the communication session is a first shared activity, such as viewing virtual content 1726*a* in FIG. 17E (1814*a*) (e.g., the participants of the communication session are communicating with each other via their respective spatial representations, without participating in an additional or a different shared activity in the first virtual environment). In some embodiments, while displaying, via the display generation component, the first simulated physical environment from the second orientation, the first computer system detects (1814*b*) an indication that the shared activity has changed from a first shared activity to a second shared activity. For example, in addition or alternative to communicating with each other via their respective spatial representations, one or more users in the communication session have initiated shared display of content (e.g., a movie or photograph) in the first virtual environment to be displayed from the same orientation (e.g., towards the front surface of the content) by the computer systems of the users in the communication session. As another example, in addition or alternative to communicating with each other via their respective spatial representations, one or more users in the communication session have initiated shared display of content (e.g., a game) in the first virtual environment to be displayed from different orientations (e.g., from different positions towards a center point of the content, such as in the case of a virtual board game) by the computer systems of the users in the communication session.

In some embodiments, in response to detecting that the shared activity has changed from the first shared activity to the second shared activity, the first computer system displays (1814*c*), via the display generation component, the first simulated physical environment from a third orientation (e.g., different from the second orientation) in accordance with the second shared activity, such user 1720*b* facing north and user 1721*b* facing south if shared activity changes in FIG. 11E. In some embodiments, the third orientation is different depending on the second shared activity, as will be described with reference to steps 1818-1820 below. Displaying a virtual environment at different orientations in response to a change in shared activity ensures visibility of and interactability with the shared activity and reduces the need for inputs to manually change the orientation to achieve such visibility.

In some embodiments, in accordance with a determination that the second shared activity corresponds to a shared visual experience (e.g., display of content such as a movie or video that is visible from one direction, such as the front surface of the content), orientations associated with a plurality of computer systems included in the communication session, including the third orientation, relative to the first simulated physical environment (e.g., the orientations from which the different computer systems are displaying the first virtual environment) are (1816) within a range of orientations (e.g., within 1, 5, 10, 30, 45, 60 or 90 degrees) of being a same orientation, such as users 1720*b* and 1721*b* facing north towards virtual content 1726*a* in FIG. 17E, (e.g., towards the front surface of the shared visual experience). Displaying a virtual environment from the same orientation in response to a shared visual experience ensures visibility of and interactability with the shared visual experience and reduces the need for inputs to manually change the orientation to achieve such visibility.

In some embodiments, in accordance with a determination that the second shared activity does not correspond to a shared visual experience (e.g., the second shared activity is a participatory experience, such as interaction, from different orientations, with a virtual board game in the virtual environment), orientations associated with a plurality of computer systems included in the communication session, including the third orientation, such as user 1720*b* facing north and 1721*b* facing south if shared activity does not include a shared visual experience in FIG. 17D, relative to the first simulated physical environment (e.g., the orientations from which the different computer systems are displaying the first virtual environment) differ (1818) from each other by at least a threshold amount (e.g., 5, 10, 30, 45, 60, 90 or 180 degrees). Thus, for example, the orientations displayed by the different computer system are different orientations such that the orientations face each other and/or the positions of the other users in the first virtual environment (e.g., such as described with reference to step(s) 1810-1812). Displaying a virtual environment from different orientations in response to a shared participatory experience ensures visibility of and interactability with the shared participatory experience and reduces the need for inputs to manually change the orientation to achieve such visibility.

In some embodiments, a first immersion level, such as indicated by immersion indicator 1716 in FIG. 17D, at which the first virtual environment or the second virtual environment are displayed at the first computer system is independent of a second immersion level, such as indicated by immersion indicator 1716 in FIG. 17D, at which a respective virtual environment is displayed at the second computer system during the communication session (1820). The level of immersion at which a virtual environment is displayed is described in more detail with reference to methods 800 and/or 1400). Thus, in some embodiments, whether the computer systems are displaying a shared virtual environment or are displaying their own respective virtual environments during the communication session, the computer system are able to set their own levels of immersion that do not affect the levels of immersion of the other computer systems. For example, in response to the first computer system detecting an input to change the level of immersion at which it is displaying a respective virtual environment, the first computer system optionally changes its level of immersion accordingly, without initiating a process to change the level of immersion of other computer systems that are included in the communication session. The same optionally applies to volume levels of the different computer systems as well. Maintaining independent levels of immersion for different computer systems in a communication session avoids erroneous and unexpected switching of immersion and reduces the need for inputs to correct for such erroneous switching.

In some embodiments, in response to detecting an indication that a respective virtual environment shared in the communication session has changed (e.g., a user other than the user of the first computer system has changed the virtual environment that is shared in the communication session), the first computer system displays (1822), via the display generation component, a notification, such as notification 1731 in FIG. 17B, indicative of the changing of the respective virtual environment shared in the communication session. For example, if the second virtual environment was being shared in the communication session and the first computer system was displaying the second virtual environment, and the second user provided input to the second computer system to switch from sharing the second virtual environment to sharing and/or displaying a third virtual environment, the third virtual environment optionally becomes the shared virtual environment in the communication session and the first computer system displays the notification indicating the change in the shared virtual environment to the third virtual environment. Displaying a notification at the computer systems included in a communication session when a shared virtual environment has been switched to a different shared virtual environment avoids unexpected switching of the display of a virtual environment and reduces the need for inputs to correct for such erroneous switching.

In some embodiments, the notification indicates a respective user associated with the communication session who initiated the change in the respective virtual environment that is shared in the communication session, such message indicating "User 1 shared B2" in FIG. 17B (1824). For example, the notification includes the name, avatar, email address and/or other identifying information of the user who initiated the change in the shared virtual environment in the communication session. Displaying an indication of the user who changed a shared virtual environment provides feedback about who will be included in the new shared virtual environment, and avoids the first computer system joining an undesired shared virtual environment and inputs for correct such joining.

In some embodiments, in response to detecting the indication that the respective virtual environment shared in the communication session has changed to a first shared virtual environment and in accordance with a determination that one or more criteria are satisfied, including a criterion that is satisfied when the first shared virtual environment is not downloaded to the first computer system, the first computer system initiates (1826) a process to download the first shared virtual environment, such as indicated by download indication 1733 in FIG. 17B, to the first computer system. In some embodiments, if the first computer system does not have the newly shared environment downloaded, the first computer system starts to download the environment. In some embodiments, the first computer system displays an indication of progress of the download. In some embodiments, the first computer system (or other computer system) transmits a notification to the initiator of the shared virtual environment if a recipient of the sharing declines to download the environment and/or the environment cannot be downloaded on recipient's computer system. In some embodiments, if the first computer system does have the newly shared environment downloaded (e.g., the one or more criteria are not satisfied), then the process to download the first shared virtual environment to the first computer system is not initiated, and the newly shared virtual environment is displayed. Allowing a computer system to ultimately join a shared virtual environment even if it is not initially downloaded, and automatically downloading the shared virtual environment when needed, reduces the number of inputs needed to join the shared environment.

In some embodiments, displaying the second virtual environment during the communication session includes displaying, via the display generation component, the second simulated physical environment from a first simulated location relative to the second simulated physical environment (e.g., such as the center of the second simulated physical environment, such as described with reference to method 1400), such as user 1720*a* viewing virtual umbrella and palm trees in FIG. 17D, and the second computer system displays a respective virtual environment (e.g., the second virtual environment or a different virtual environment, whether shared or not shared) during the communication session from the first simulated location relative to a respective simulated physical environment of the respective virtual environment, such as user 1721*a* viewing virtual palm trees in FIG. 17D (1828). In some embodiments, different computer systems display their respective virtual environments from the same or similar locations in their respective virtual environments. In some embodiments, the different computer systems display their respective virtual environments from that same or similar location, but towards different directions (e.g., such as described with reference to method 1400). Displaying respective virtual environments from the same or similar locations in the virtual environments ensures consistency in presentation of the virtual environments, and reduces errors in interaction with the communication session.

In some embodiments, displaying the second virtual environment during the communication session includes displaying, at a respective location in the second virtual environment, a representation of the second user of the computer system, such as avatar 1721*a* in FIGS. 17A and 17A1 (e.g., an avatar of the second user), wherein the respective location in the second virtual environment is different from the first simulated location relative to the respective simulated physical environment (1830*a*). For example, the location in the second virtual environment at which the avatar of the second user is displayed by the first computer system is optionally different from the location from which the second computer system displays the respective virtual environment.

In some embodiments, a representation of the first user of the first computer system, such as avatar 1720*a* in FIGS. 17A and 17A1 (e.g., an avatar of the first user), is displayed by the second computer system at a respective location in the respective virtual environment, wherein the respective location in the respective virtual environment is different from the first simulated location relative to the second simulated physical environment (1830*b*). For example, the location in the respective virtual environment at which the avatar of the first user is displayed by the second computer system is optionally different from the location from which the first computer system displays the second virtual environment. Displaying representations of other users at locations that are defined by the computer system displaying those representations—rather than by the computer systems of those users—ensures that those users are displayed at expected and logical locations by a given computer system, and reduces inputs needed to change display of the virtual environment to achieve such placement.

In some embodiments, initiating the process to display the second virtual environment at the second computer system includes (1832*a*), in accordance with a determination that the second virtual environment is displayed at the first computer system with a first visual appearance corresponding to a first time of day (e.g., a daytime time of day), such as indicated by toggle 1742 enabled to daytime in FIG. 17D, in the second simulated physical environment (e.g., such as described with reference to method 800), the first computer initiates (1832*b*) the process to display the second virtual environment at the second computer system with the first visual appearance corresponding to the first time of day in the second simulated physical environment; and In some embodiments, in accordance with a determination that the second virtual environment is displayed at the first computer system with a second visual appearance corresponding to a second time of day (e.g., nighttime time of day), such as virtual environment 1722*b* in nighttime in FIG. 17E, different from the first time of day, in the second simulated physical environment (e.g., such as described with reference to method 800), the first computer system initiates (1832*c*) the process to display the second virtual environment at the second computer system with the second visual appearance corresponding to the second time of day in the second simulated physical environment, such as displaying virtual environments 1724*b* in nighttime in FIG. 17E. Thus, in some embodiments, the time of day at which different computer systems display their respective virtual environments during the communication session is synchronized, such as described with reference to method 1400. Synchronizing a time of day setting for the first computer system and the second computer system reduces the number of inputs needed to adjust the time of day setting to an appropriate value, and simplifies user interaction with the computer system.

In some embodiments, while displaying, via the display generation component, the second virtual environment with the first visual appearance corresponding to the first time of day in the second simulated physical environment during the communication session, the first computer system receives (1834*a*), via the one or more input devices, a second input corresponding to a request to display the second virtual environment with the second visual appearance corresponding to the second time of day, such as via toggle 1742 enabled to nighttime in FIG. 17D, in the second simulated physical environment while remaining in the communication session. For example, an input to change from the light mode to the dark mode, or to change from the dark mode to the light mode. In some embodiments, the time of day that is synchronized across the computer systems in the communication session is the time of day setting at the computer system that initiated the sharing of the virtual environment with the communication session. In some embodiments, if that time of day setting is an automatic setting, the time of day that is synchronized is optionally based on the real world time of day at that computer system (e.g., if during the daytime, the daytime time of day setting is synchronized, and if during nighttime, the nighttime time of day setting is synchronized).

In some embodiments, in response to receiving the second input (1834*b*), the first computer system displays (1834*c*) the second virtual environment with the second visual appearance corresponding to the second time of day, such as virtual environment 1722*b* in nighttime in FIG. 17E in the second simulated physical environment while remaining in the communication session. In some embodiments, in accordance with a determination that one or more second criteria are satisfied (e.g., if the second virtual environment is being shared with the second computer system in the communication session), the first computer system initiates (1834*d*) a process to display the second virtual environment with the second visual appearance corresponding to the second time of day in the second simulated physical environment at the second computer system, such as sending a notification indicating sharing of second time of day to the second computer system of user 1721*a* before changing the virtual environment 1724*a* to nighttime in FIG. 17E (e.g., transmitting a command to the second computer system to display the second virtual environment with the second visual appearance). In some embodiments, synchronizing time of day settings across the communication session has one or more of the characteristics of doing so described with reference to method 1400. Therefore, in some embodiments, any user in the communication session is able to change the time of day setting for the computer systems included in the communication session. Allowing any user in the communication session to change the time of day setting of the virtual environment avoids conflict between the time of day setting and a given user's environment, and simplifies user interaction with the computer system.

In some embodiments, the first input corresponding to the request to display the second virtual environment includes input directed to a first virtual environment selection user interface displayed as part of a communication session control interface, such as control center 1770 in FIG. 17D, for controlling one or more aspects of the communication session (1836). In some embodiments, the communication session control interface includes one or more controls for adding or removing participants from the communication session, one or more controls for existing the communication session, one or more indications of information about participants included in the communication session and/or one or more selectable options for displaying and/or sharing different corresponding virtual environments in the communication session. In some embodiments, the first input corresponds to selection of a selectable option for displaying and/or sharing the second virtual environment. In some embodiments, the first input corresponds to selection of a selectable option for displaying and/or sharing a time of day setting in the virtual environment of the communication session, and in response, the first computer system initiates a process to change the time of day setting at the first computer system and/or in the communication session. In some embodiments, the first input corresponds to selection of a selectable option for displaying and/or sharing playback of a content item in the communication session, and in response, the first computer system initiates a process to display the content item at the first computer system and/or in the communication session. Including virtual environment selection options within a communication session control interface reduces the number of inputs needed to display a virtual environment in the communication session.

In some embodiments, the first input corresponding to the request to display the second virtual environment includes input directed to a first virtual environment selection user interface displayed as part of a home user interface, such as home user interface 1740 in FIG. 17D, of the first computer system for accessing one or more functionalities of the first computer system other than the communication session (1838). In some embodiments, the home user interface includes one or more controls for displaying available applications on the first computer system (e.g., displaying application icons for applications available at the first computer system), one or more controls for displaying indications of contacts of the user of the first computer system that are available to be added to the communication session, one or more controls for adjusting system settings (e.g., wireless network settings, privacy settings and/or notification settings) for the first computer system, and/or one or more selectable options for displaying and/or sharing different corresponding virtual environments in the communication session. In some embodiments, the first input corresponds to selection of a selectable option for displaying and/or sharing the second virtual environment. In some embodiments, the first input corresponds to selection of a selectable option for displaying and/or sharing animated visual effects or a text entry in the three-dimensional environment of the communication session, and in response, the first computer system initiates a process to display the animated visual effects or the text entry at the first computer system and/or in the communication session. In some embodiments, the first input corresponds to selection of a selectable option for displaying and/or sharing a document (e.g., via a file sharing application) in the communication session, and in response, the first computer system initiates a process to display the document at the first computer system and/or in the communication session. Including virtual environment selection options within a home user interface reduces the number of inputs needed to display a virtual environment in the communication session.

In some embodiments, the first virtual environment selection user interface includes a first selectable object, such as option 1771 (e.g., B2) in control center 1770 in FIG. 17D, that is selectable to display the first virtual environment during the communication session, and a second selectable object, such as option B3 in control center 1770 in FIG. 17D, that is selectable to display the second virtual environment during the communication session, and displaying the first virtual environment selection user interface includes (1840*a*), in accordance with a determination that the first virtual environment is currently displayed (and/or shared) during the communication session, the first computer displays (1840*b*), via the display generation component, the first selectable object with a visual indication indicating current selection of the first virtual environment, such as option 1771 with a gray fil in FIG. 17D (e.g., a highlighting of, animation, a 3D effect, a ring around, and/or an increased size of the first selectable object). In some embodiments, in accordance with a determination that the second virtual environment is currently displayed (and/or shared) during the communication session, the first computer system displays (1840*c*), via the display generation component, the second selectable object with the visual indication indicating current selection of the second virtual environment, such as option B3 with a gray fil if option B3 was selected in FIG. 17D (e.g., a highlighting of, animation, a 3D effect, a ring around, and/or an increased size of the second selectable object). Providing an indication of a currently displayed virtual environment in the virtual environment selection user interface reduces the number of inputs needed to display such information, and avoids unnecessary input for displaying a virtual environment that is already being displayed.

In some embodiments, displaying the visual indication indicating current selection of the second virtual environment includes (1842*a*), in accordance with a determination that the one or more first criteria are satisfied, wherein the one or more first criteria include a criterion that is met when the first virtual environment is a shared virtual environment, the first computer displays (1842*b*) the visual indication with a first visual appearance, such as black outline around option 1744 in FIG. 17D. In some embodiments, in accordance with a determination that the one or more first criteria are not satisfied (e.g., the first virtual environment is not currently a shared virtual environment in the communication session), the first computer system displays (1842*c*) the visual indication with a second visual appearance, such as option 1744 without black outline if one or more first criteria are not met in FIG. 17D different from the first visual appearance. Thus, in some embodiments, shared virtual environments are visually distinguished from non-shared virtual environment, such as by their corresponding selectable options being displayed with a different color highlighting than for non-shared virtual environments, being displayed with a badge that is not displayed for non-shared virtual environments, and/or being displayed at a different size than for non-shared virtual environments. Providing an indication of a currently shared virtual environment in the virtual environment selection user interface reduces the number of inputs needed to display such information, and avoids unnecessary input for sharing a virtual environment that is already being shared.

In some embodiments, the first virtual environment selection user interface is displayed overlaid on a representation of the second user in the first virtual environment during the communication session, such as home user interface 1740 overlaid on avatar 1721*a* if avatar 1721*a* was behind the home user interface 1740 in FIG. 17D (e.g., from a viewpoint of the user of the first computer system) (1844). In some embodiments, the first virtual environment selection user interface is at least partially transparent so that content behind the first virtual environment selection user interface is visible through it, including the representations of the other users included in the communication session and/or sharing the virtual environment. Displaying the virtual environment selection user interface overlaid on representations of other users in the communication session facilitates continued interaction with the communication session without the need for additional input to first cease display of the virtual environment selection user interface.

In some embodiments, before the first computer system is part of the communication session and before displaying the first virtual environment during the communication session (1846*a*), the first computer system receives (1846*b*), via the one or more input devices, a second input corresponding to a request to join the communication session, such as receiving request to join from user 1723*b* in FIG. 17G. For example, the second computer system has transmitted a request to the first computer system for the first computer system to join the communication session; or the first computer system detects input to join the communication session.

In some embodiments, in response to receiving the second input (1846*c*), in accordance with a determination that the first virtual environment is shared in the communication session (e.g., such as described with reference to step(s) 1812), the first computer system joins (1846*d*) the communication session and displaying, via the display generation component, the first virtual environment, such as user 1723*b* in virtual environment 1728*a* corresponding to Background 2 in FIG. 17G. For example, the first computer system joins a shared virtual environment when joining the communication session if a virtual environment is being shared in the communication session. In some embodiments, after joining the shared virtual environment, the first computer system is sharing the virtual environment with the other computer systems in the communication session.

In some embodiments, in accordance with a determination that the first virtual environment is not shared in the communication session, the first computer system joins (1846*e*) the communication session without displaying, via the display generation component, the first virtual environment, such as user 1723*b* in a virtual environment 1728*a* different than Background 2 if Background 2 is not shared in a communication session in FIG. 17G. In some embodiments, if a different virtual environment is being shared in the communication session when the first computer system joins, it displays and/or shares that different virtual environment. In some embodiments, if no virtual environment is being shared in the communication session when the first computer system joins, the first computer system optionally does not display a virtual environment after joining (e.g., if the first computer system was not displaying a virtual environment when it joined), or it continues to display the same virtual environment it was displaying when it joined the communication session. Automatically joining a shared virtual environment when joining a communication session reduces the number of inputs needed to display the correct virtual environment in the communication session.

It should be understood that the particular order in which the operations in method 1800 have been described is merely exemplary and is not intended to indicate that the described order is the only order in which the operations could be performed. One of ordinary skill in the art would recognize various ways to reorder the operations described herein.

FIGS. 19A-19K illustrate examples of a computer system displaying media in a virtual environment with a simulated lighting effect from viewpoints of a plurality of available viewpoints in the virtual environment in accordance with some embodiments of the disclosure.

Figure 19A:
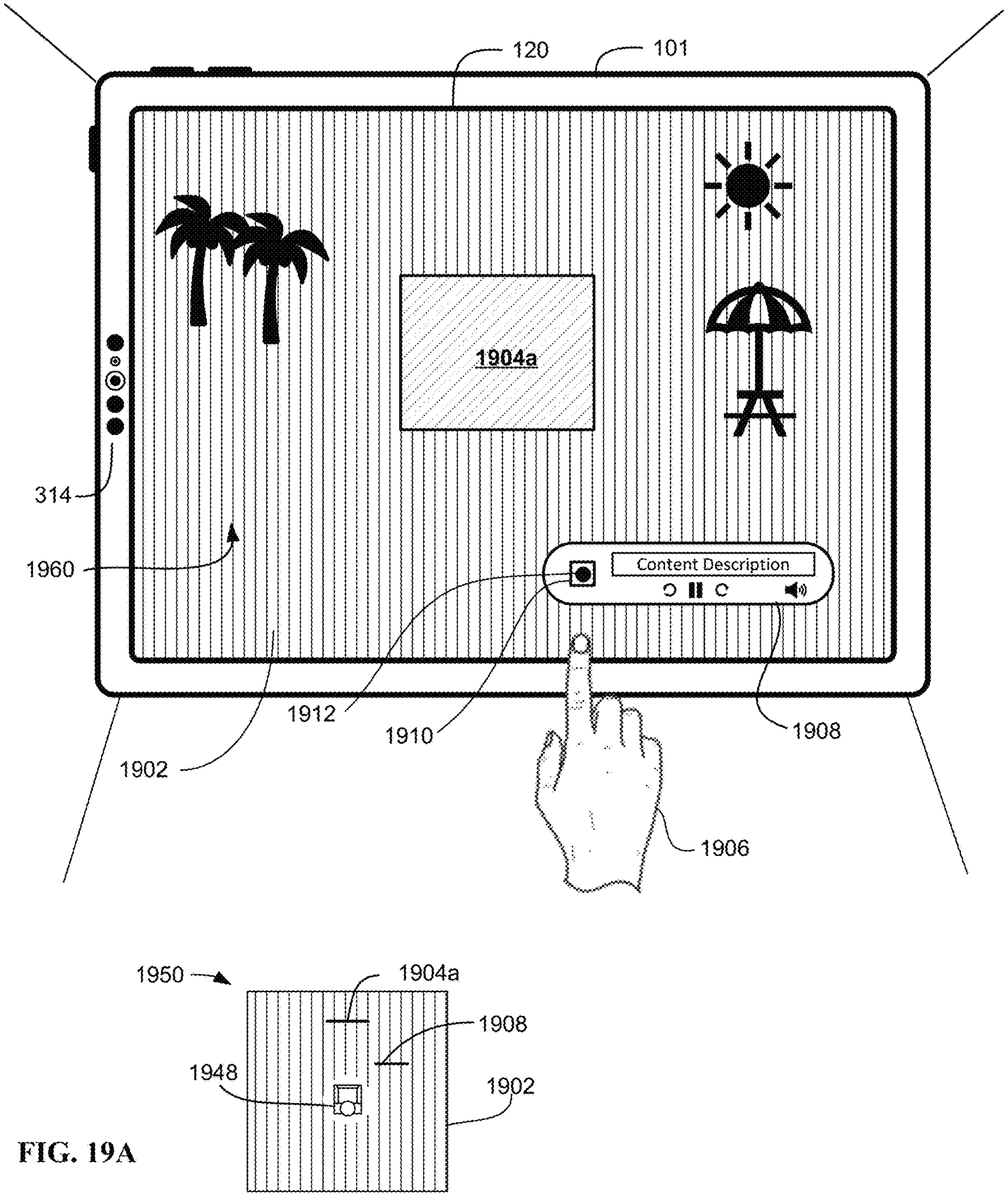

FIG. 19A illustrates a computer system (e.g., an electronic device) 101 displaying, via a display generation component (e.g., display generation component 120 of FIG. 1), a three-dimensional environment 1902 from a viewpoint of a user (e.g., user 1948) of the computer system 101 (e.g., facing the back wall of the physical environment in which computer system 101 is located). In some embodiments, computer system 101 includes a display generation component (e.g., a touch screen or non-touch screen display) and a plurality of image sensors (e.g., image sensors 314 of FIG. 3). The image sensors optionally include one or more of a visible light cameras, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 19A, a virtual environment 1960 is displayed by computer system 101 in three-dimensional environment 1902. In some embodiments, virtual environment 1960 is a fully immersive virtual environment from the current viewpoint of user 1948 (e.g., passthrough of a physical environment of user 1948 is not visible to user 1948 from their current viewpoint). In FIG. 19A, virtual environment 1960 includes the display of a virtual scene, such as a beach scene including simulated sunlight, virtual palm trees and a virtual picnic table including an umbrella. For example, the sunlight, virtual palm trees, picnic table and umbrella are virtual representations created by computer system 101 that are displayed in virtual environment 1960. In some embodiments, virtual environment 1960 is not a fully immersive virtual environment (e.g., virtual environment 1960 is a mixed-reality environment (e.g., user 1948 is partially immersed in virtual environment 1960 from their current viewpoint, and passthrough of the physical environment of user 1948 is optionally displayed in three-dimensional environment 1902 concurrently with virtual environment 1960)).

In FIG. 19A, computer system 101 displays respective media 1904*a* in virtual environment 1960. In some embodiments, respective media 1904*a* is displayed within a virtual object (e.g., a virtual window and/or container associated with a respective application) that is displayed in virtual environment 1960. In some embodiments, respective media 1904*a* includes video content (e.g., such as a movie and/or television show (e.g., from a streaming service application), and/or an online video (e.g., from a video sharing service or social media application)). In some embodiments, respective media 1904*a* includes audio content associated with the video content.

To control playback of respective media 1904*a*, a content control user interface 1908 is displayed in three-dimensional environment 1902 in FIG. 19A. Content control user interface 1908 includes one or more selectable playback controls for controlling the playback and/or volume of the video content associated with respective media 1904*a*. In some embodiments, content control user interface 1908 displays a description of the content associated with respective media 1904*a*. As shown in FIG. 19A, content control user interface 1908 includes a selectable option 1910. In some embodiments, selectable option 1910 is selectable to display respective media 1904*a* in a virtual environment, different from virtual environment 1960, for displaying media (e.g., virtual environment 1918 shown and described with reference to FIGS. 19B-19K). In some embodiments, selectable option 1910 includes an indication representing the current environment that respective media 1904*a* is displayed in (e.g., including one or more characteristics of the one or more visual indications representing the current environment that the respective media is displayed in as described with reference to method 2100). In some embodiments, the indication is displayed in an area of content control user interface 1908 different from selectable option 1910.

In FIG. 19A (and in FIGS. 19B-19K) an overhead view 1950 is shown of three-dimensional environment 1902. As shown in overhead view 1950, user 1948 is shown in three-dimensional environment 1902. In some embodiments, user 1948 represents the location of the viewpoint of user 1948 relative to three-dimensional environment 1902. Overhead view 1950 shows overhead representations of the locations of one or more objects relative to three-dimensional environment 1902. For example, in FIG. 19A, overhead view 1950 shows the relative locations of respective media 1904*a* and content control user interface 1908 in three-dimensional environment 1902.

As shown in FIG. 19A, an input is provided by user 1948 corresponding to a request to display respective media 1904*a* in the virtual environment for displaying media. The input provided by user 1948 includes gaze 1912 directed toward selectable option 1910 (represented in FIG. 19A as a black circle overlaid on selectable option 1910). A hand gesture (e.g., using hand 1906) is performed by user 1948 concurrently with the directed gaze 1912. For example, in some embodiments, the hand gesture includes an air tap, air drag, air pinch (e.g., using a thumb of hand 1906 and a second finger) or an air long pinch (e.g., an air pinch held by user 1948 for a threshold period of time (e.g., 0.1, 0.5, 1, 2, 5 or 10 seconds)).

It should be appreciated that in some embodiments, user 1948 initiates the display of respective media 1904*a* in the virtual environment for displaying media through an alternate means than shown in FIG. 19A. In some embodiments, user 1948 initiates the display of respective media 1904*a* from a different environment from virtual environment 1960. In some embodiments, user 1948 provides an input through a virtual menu displayed in three-dimensional environment 1902 that includes one or more selectable options for displaying media in the virtual environment for displaying media. In some embodiments, user 1948 initiates the display of respective media 1904*a* in the virtual environment for displaying media by selecting a user interface object (e.g., an application icon) displayed in a home user interface of computer system 101 displaying in three-dimensional environment 1902. In some embodiments, user 1948 initiates the display of the virtual environment for displaying media without respective media 1904*a* being displayed in three-dimensional environment 1902 (e.g., respective media 1904*a* is displayed in three-dimensional environment 1902 once the virtual environment for displaying media is displayed in the three-dimensional environment 1902). In some embodiments, media is not displayed in the virtual environment for displaying media when user 1948 initiates the display of the virtual environment for displaying media. For example, while computer system 101 displays the virtual environment for displaying media, user 1948 selects media to be displayed in the virtual environment for displaying media (e.g., through a virtual user interface or menu displayed in the virtual environment), and, after making a selection of the media to be displayed in the virtual environment for displaying media, respective media 1904*a* is displayed.

In some embodiments, in response to the input provided by user 1948 in FIG. 19A, computer system 101 determines whether respective media 1904*a* is permitted and/or configured to be displayed in the virtual environment for displaying media. For example, in response to the input provided by user 1948 in FIG. 19A, computer system 101 does not display respective media 1904*a* in the virtual environment for displaying media because respective media 1904*a* is not associated with content that is permitted to be displayed in the virtual environment for displaying media.

Figure 19B:
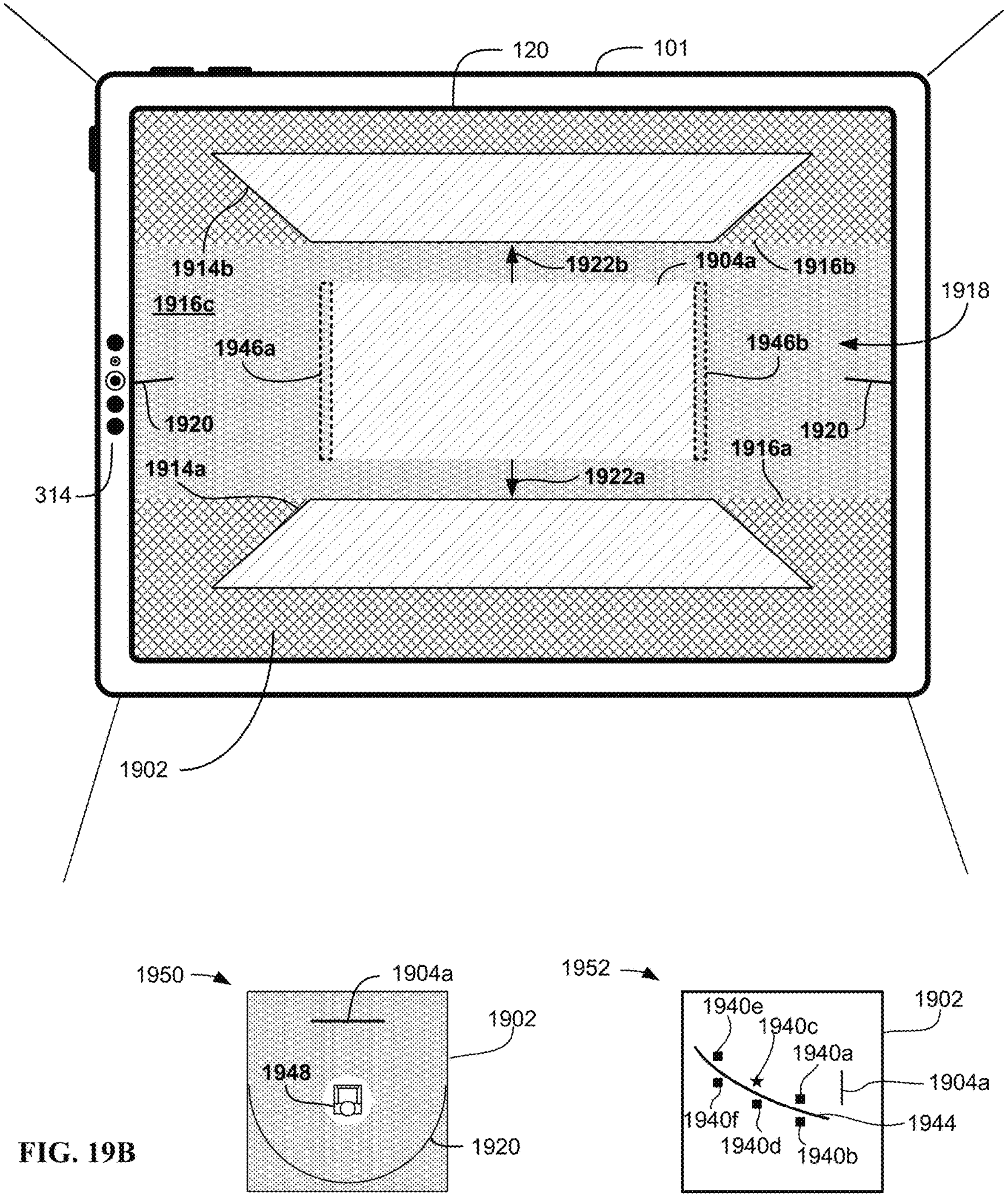

As a result of the input provided by user 1948 in FIG. 19A (e.g., and optionally in accordance with a determination that respective media 1904*a* is permitted and/or configured to be displayed in the virtual environment for displaying media), a virtual environment 1918 for displaying respective media 1904*a* is displayed in three-dimensional environment 1902 in FIG. 19B. Respective media 1904*a* is displayed in virtual environment 1918 (e.g., with different dimensions relative to the current viewpoint of user 1948 and/or relative to three-dimensional environment 1902 compared to as shown in FIG. 19A prior to displaying virtual environment 1918). Respective media 1904*a* is not displayed within a virtual object in virtual environment 1918 (e.g., such that there are no borders displayed surrounding respective media 1904*a* and/or there is no visual distinction visible to user 1948 between respective media 1904*a* and virtual environment 1918). In some embodiments, when displaying respective media 1904*a* in virtual environment 1918 (e.g., which includes expanding and/or reducing the size of respective media 1904*a* compared to the size of respective media 1904*a* displayed in three-dimensional environment 1902 prior to displaying virtual environment 1918 (e.g., in an environment different from virtual environment 1918)), computer system 101 removes one or more artifacts of the video content associated with respective media 1904*a*. In some embodiments, computer system 101 removes (e.g., does not display) artifacts from the left and right side (e.g., relative to the current viewpoint of user 1948 and/or relative to three-dimensional environment 1902) of the video content associated with respective media 1904*a* (e.g., which is schematically represented in FIG. 19B by regions 1946*a* and 1946*b*). In some embodiments, the artifacts of the respective media 1904*a* that are removed by computer system 101 are dark (e.g., black) regions (e.g., arranged longitudinally on the left and right side of respective media 1904*a* relative to the current viewpoint of user 1948 and/or three-dimensional environment 1902) of the respective media 1904*a* that do not include video content.

In some embodiments, displaying respective media 1904*a* in virtual environment 1918 includes displaying respective media 1904*a* concurrently with a simulated lighting effect. In some embodiments, displaying the simulated lighting effect includes displaying virtual environment 1918 with a reduced brightness (e.g., with a darker appearance) compared to respective media 1904*a*. As shown in FIG. 19B, displaying the simulated lighting effect includes displaying different portions of virtual environment 1918 with a different visual appearance (e.g., a first portion 1916*a*, second portion 1916*b* and third portion 1916*c*).

In FIG. 19B, a first portion 1916*a* and a second portion 1916*b* of virtual environment 1918 are displayed. In some embodiments, first portion 1916*a* corresponds to a floor of virtual environment 1918 relative to the viewpoint of user 1948 (e.g., first portion 1916*a* includes one or more characteristics of the first portion of the virtual environment described with reference to method 2000). In some embodiments, second portion 1916*b* corresponds to a ceiling of virtual environment 1918 relative to the viewpoint of user 1948 (e.g., second portion 1916*b* includes one or more characteristics of the second portion of the virtual environment described with reference to method 2100). In some embodiments, the first portion 1916*a* and second portion 1916*b* are displayed to provide spatial perception to user 1948 while displaying virtual environment 1918. In some embodiments, first portion 1916*a* and second portion 1916*b* include textures (e.g., the texture of the first portion 1916*a* and second portion 1916*b* include similar visual features) relative to the viewpoint of user 1948. In some embodiments, the texture of first portion 1916*a* and second portion 1916*b* include one or more characteristics of the texture of the first portion of the virtual environment and the second portion of the virtual environment described with reference to method 2000. For example, the texture includes a plurality of virtual features (e.g., ridges, bumps and/or valleys, optionally of a small size relative to the viewpoint of user 1948) that are arranged uniformly (e.g., in a pattern of varying heights and/or position relative to one another). For example, the plurality of virtual features are arranged laterally relative to the current viewpoint of user 1948 and/or relative to three-dimensional environment 1902. In some embodiments, the first portion 1916*a* and second portion 1916*b* appear as flat and/or partially curved surfaces from the viewpoint of user 1948. In some embodiments, the first portion 1916*a* and second portion 1916*b* include smooth surfaces (e.g., between the one or more virtual features arranged on the first portion 1916*a* and second portion 1916*b*).

In some embodiments, the visual appearance of first portion 1916*a* and second portion 1916*b* from the viewpoint of user 1948 is based on the displayed texture and on the visual appearance of respective media 1904*a*. As shown in FIG. 19B, first portion 1916*a* and second portion 1916*b* include regions of simulated light 1914*a* and 1914*b*. In some embodiments, simulated light 1914*a* and 1914*b* is based on one or more visual characteristics of respective media 1904*a* (e.g., simulated light 1914*a* and 1914*b* and respective media 1904*a* are displayed with the same and/or corresponding brightness, color and/or saturation). In some embodiments, from the viewpoint of user 1948, simulated light 1914*a* and 1914*b* originates from respective media 1904*a*. For example, simulated light 1914*a* and 1914*b* appears as light spill from respective media 1904*a* that reflects on first portion 1916*a* and second portion 1916*b* (e.g., the light spill is schematically represented by arrows 1922*a* and 1922*b* that point from respective media 1904*a* toward first portion 1916*a* and second portion 1916*b*). In some embodiments, as video content associated with respective media 1904*a* is played back in virtual environment 1918, computer system 101 changes the display of one or more visual characteristics (e.g., brightness, color and/or saturation) of simulated light 1914*a* and 1914*b* to reflect one or more changing visual characteristics of respective media 1904*a* as the video content is played back. In some embodiments, the region of first portion 1916*a* and second portion 1916*b* that includes the simulated light 1914*a* and 1914*b* dynamically changes based the video content of the respective media 1904*a* (e.g., if the video content includes higher brightness, the simulated light 1914*a* and 1914*b* appears to reflect in a larger region of the first portion 1916*a* and second portion 1916*b* compared to if the video content includes a lower brightness). In some embodiments, computer system 101 controls the size of the regions of first portion 1916*a* and second portion 1916*b* that include simulated light 1914*a* and 1914*b* (e.g., to prevent the appearance of light flickering). For example, when video content associated with respective media 1904*a* is played back in virtual environment 1918, one or more visual characteristics (e.g., brightness and/or color saturation of the video content) of the video content may change. To avoid the visual appearance of light flickering (e.g., in the dark portions of virtual environment 1918, such as third portion 1916*c* described below) in virtual environment 1918, computer system 101 optionally controls the display of simulated light 1914*a* and 1914*b* on the respective surfaces of first portion 1916*a* and second portion 1916*b* to reflect the change of the one or more visual characteristics of the video content (e.g., to provide an appearance (e.g., from the current viewpoint of user 1948) that light spill from respective media 1904*a* is catered to the first portion 1916*a* and second portion 1916*b* of virtual environment 1918).

In FIG. 19B, a third portion 1916*c* of virtual environment 1918 is displayed with a different visual appearance compared to first portion 1916*a* and second portion 1916*b*. In some embodiments, third portion 1916*c* includes one or more characteristics of the third portion of virtual environment described with reference to method 2000. In some embodiments, third portion 1916*c* includes a portion of virtual environment 1918 that does not correspond to a floor or ceiling relative to the viewpoint of user 1948. For example, third portion 1916*c* appears as simulated empty space in virtual environment 1918 from the current viewpoint of user 1948 (e.g., to provide a visual effect that respective media 1904*a* is floating in virtual the environment). As shown in FIG. 19B, the visual appearance of third portion 1916*c* visually contrasts with the visual appearance of respective media 1904*a*. For example, third portion 1916*c* includes a visual appearance with less brightness (e.g., a darker appearance) compared to respective media 1904*a*. In some embodiments, the visual appearance of third portion 1916*c* is independent of the visual appearance of respective media 1904*a* (e.g., third portion 1916*c* does not include the display of simulated light and/or textures as included in the display of first portion 1916*a* and second portion 1916*b*). In some embodiments, third portion 1916*c* is displayed with a black appearance (e.g., including no brightness and/or color). As shown in FIG. 19B, third portion 1916*c* surrounds the perimeter of respective media 1904*a* in virtual environment 1918. In some embodiments, respective media 1904*a* is displayed in virtual environment 1918 at a closer depth to the current viewpoint of user 1948 compared to third portion 1916*c* (e.g., from the current viewpoint of user 1948, respective media 1904*a* is displayed in front of third portion 1916*c*).

In some embodiments, virtual environment 1918 includes a plurality of available viewpoints that user 1948 is permitted to select as a viewpoint in the virtual environment to view respective media 1904*a* from. In some embodiments, a viewpoint that is different from the plurality of available viewpoints in virtual environment 1918 is not able to be selected (e.g., through an input) by user 1948 to view respective media 1904*a* from. In FIG. 19B, a legend 1952 is shown to schematically represent the viewpoint of the plurality of available viewpoints that is currently selected by user 1948 from which to view respective media 1904*a*, including the pose (e.g., position and/or orientation) of those viewpoints relative to media 1904*a*. Legend 1952 is a side-view of three-dimensional environment 1902 that includes a schematic representation of respective media 1904*a*. Legend 1952 shows that there are six available viewpoints (1940*a*-19400 in virtual environment 1918 that are selectable by user 1948 (e.g., through selection inputs shown and described with reference to FIGS. 19F, 19H and 19J). It should be appreciated that legend 1952 represents an exemplary number of available viewpoints in virtual environment 1918, and in some embodiments, virtual environment 1918 includes greater than or less than six available viewpoints that are selectable by user 1948. In FIGS. 19B-19K, a star is used to represent the current viewpoint of user 1948 of the plurality of available viewpoints 1940*a*-1940*f*. For example, in FIG. 19B, the current viewpoint of user 1948 is viewpoint 1940*c*.

In some embodiments, a respective viewpoint of available viewpoints 1940*a*-1940*f* is defined by one or more spatial arrangement characteristics (e.g., such as the first spatial arrangement characteristic and/or the second spatial arrangement characteristic as described with reference to method 2100). For example, a respective viewpoint corresponds to a value of a first spatial arrangement characteristic and a value of a second spatial arrangement characteristic (e.g., the values are selected by user 1948 through selection inputs such as shown and described with reference to FIGS. 19F, 19H, and 19J). In some embodiments, the first spatial arrangement characteristic corresponds to the distance of a respective viewpoint from respective media 1904*a* in virtual environment 1918. As shown in legend 1952, multiple viewpoints of the plurality of available viewpoints in virtual environment 1918 are arranged at the same distance from respective media 1904*a* (e.g., viewpoints 1940*a* and 1940*b* are associated with a first value of the first spatial arrangement characteristic, viewpoints 1940*c* and 1940*d* are associated with a second value of the first spatial arrangement characteristic, and viewpoints 1940*e* and 1940*f* are associated with a third value of the first spatial arrangement characteristic). A reference line 1944 is shown between the multiple viewpoints arranged at the same distance from respective media 1904*a* (e.g., between viewpoints 1940*a* and 1940*b*, between viewpoints 1940*c* and 1940*d*, and between viewpoints 1940*e* and 19400. As shown by reference line 1944, as the distance of a respective viewpoint of the plurality of available viewpoints increases from respective media 1904*a* in virtual environment 1918, the height (e.g., vertical position in virtual environment 1918) of the respective viewpoint relative to respective media 1904*a* becomes greater (e.g., more positive). For example, viewpoints 1940*e* and 1940*f* include a greater height relative to respective media 1904*a* compared to viewpoints 1940*a* and 1940*b* (e.g., viewpoints 1940*e* and 1940*f* include a viewing angle that is more downward to respective media 1904*a* compared to viewpoints 1940*a* and 1940*b*). In some embodiments, the second spatial arrangement characteristic corresponds to the height (e.g., vertical position) of a respective viewpoint of the multiple viewpoints including the same first spatial arrangement characteristic (e.g., the multiple viewpoints including the same value of the first spatial arrangement characteristic (e.g., distance from respective media 1904*a*) do not include the same value of the second spatial arrangement characteristic (e.g., height relative to respective media 1904*a*)). For example, viewpoints 1940*a* and 1940*b* include the same value of the first spatial arrangement characteristic and different values of the second spatial arrangement characteristic (e.g., viewpoints 1940*a* and 1940*b* are arranged at the same distance from respective media 1904*a*, but do not include the same viewing angle to respective media 1904*a*). In some embodiments, the difference in height (e.g., corresponding to the second spatial arrangement characteristic value) of two available viewpoints that include the same first spatial arrangement characteristic value is 0.05, 0.1, 0.2, 0.5, 0.8, 1, 2 or 5 meters relative to virtual environment 1918 and/or three-dimensional environment 1902. In some embodiments, the difference in viewing angle (e.g., corresponding to the second spatial arrangement characteristic value) of two available viewpoints that are arranged with the same first spatial arrangement characteristic value is 0.5, 1, 2, 5, 10, 20, 30, 40 or 50 degrees relative to respective media 1904*a*. In some embodiments, the plurality of available viewpoints 1940*a*-1940*f* all have the same lateral (e.g., horizontal) pose (e.g., including orientation and/or position) relative to the media displayed in virtual environment 1918 (e.g., respective media 1904*a*, or respective media 1904*b* shown in FIGS. 19D-19K). In some embodiments, one or more of the plurality of available viewpoints have different lateral (e.g., horizontal) pose (e.g., including orientation and/or position) relative to the media displayed in virtual environment 1918.

In some embodiments, the plurality of available viewpoints are arranged to simulate theater seating presented to user 1948 that user 1948 is permitted to select from to view respective media 1904*a* in virtual environment 1918 (e.g., user 1948 is permitted to select a row (e.g., corresponding to a value of the first spatial arrangement characteristic) and/or a seat (e.g., height and/or viewing angle) within a row (e.g., corresponding to a value of the second spatial arrangement characteristic)).

In FIG. 19B, a horizon representation 1920 is displayed in virtual environment 1918. As shown in overhead view 1950, horizon representation 1920 is displayed behind user 1948 (e.g., relative to their current viewpoint that is directed toward respective media 1904*a* in FIG. 19B). Horizon representation 1920 partially surrounds user 1948 relative to their current viewpoint shown in FIG. 19B (e.g., the user's current viewpoint is directed toward respective media 1904*a*). In overhead view 1950, horizon representation 1920 is displayed in a portion of virtual environment (e.g., a fourth portion of virtual environment as shown and described with reference to FIG. 19C) that is not in the current field of view of user 1948 relative to virtual environment 1918 in FIG. 19B. In some embodiments, horizon representation 1920 is displayed with a brighter color (e.g., white) compared to virtual environment 1918 (e.g., compared to the third portion 1916*c* and/or fourth portion 1916*d* (e.g., as shown and described with reference to FIG. 19C) of virtual environment 1918). In some embodiments, horizon representation 1920 is displayed in virtual environment 1918 to provide user 1948 with improved spatial perception in virtual environment 1918 (e.g., in order to prevent motion sickness while displaying a dark virtual reality environment).

In FIG. 19C, user 1948 changes their viewpoint to be directed away from respective media 1904*a*. In some embodiments, the change in viewpoint of user 1948 is caused by movement of a portion of user 1948 (e.g., the user's head and/or torso) relative to three-dimensional environment 1902. As shown in FIG. 19C, a fourth portion 1916*d* of virtual environment 1918 is displayed by display generation component 120. Respective media 1904*a* is no longer displayed by display generation component 120 because the new viewpoint of user 1948 is directed away from respective media 1904*a* such that respective media 1904*a* is not in the field of view of user 1948. In some embodiments, fourth portion 1916*d* includes one or more characteristics described with reference to third portion 1916*c* (e.g., fourth portion 1916*d* appears as simulated empty space in virtual environment 1918). Fourth portion 1916*d* of virtual environment 1918 only includes horizon representation 1920 (e.g., virtual objects and/or representations different from horizon representation 1920 are not displayed within the fourth portion 1916*d*). In some embodiments, fourth portion 1916*d* does not include a visual appearance that is based on the visual appearance of respective media 1904*a* (e.g., a simulated lighting effect is not displayed within the fourth portion 1916*d*).

Figure 19D:
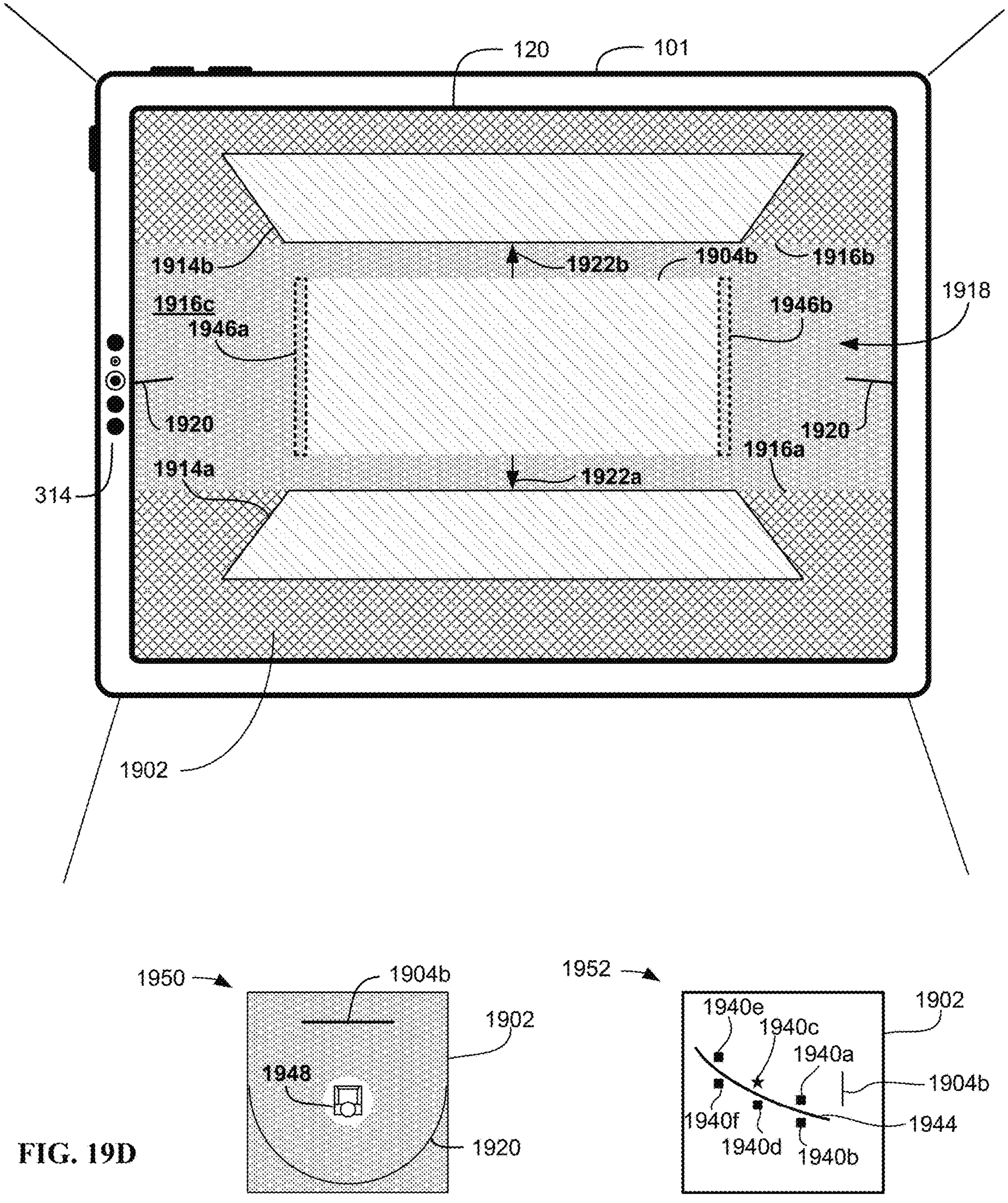

FIG. 19D illustrates media (e.g., respective media 1904*b*) displayed in virtual environment 1918 with a different aspect ratio compared to respective media 1904*a* display in FIG. 19B. For example, the aspect ratio corresponds to a ratio of the height to the width of the video content associated with respective media 1904*a* and 1904*b*. In some embodiments, displaying respective media 1904*b* corresponds to changing the video content displayed in virtual environment 1918 from respective media 1904*a* to respective media 1904*b* (e.g., through an input provided (e.g., through a user interface and/or menu associated with virtual environment 1918) by user 1948 to change the media displayed in virtual environment 1918). As shown in FIG. 19D, computer system 101 displays respective media 1904*b* with the same height and a different width relative to virtual environment 1918 and/or three-dimensional environment 1902 (e.g., to display respective media 1904*b* in the same vertical location and/or position in virtual environment 1918 as respective media 1904*a* despite respective media 1904*b* including a different aspect ratio compared to respective media 1904*b*). In some embodiments, the difference in width between respective media 1904*a* and respective media 1904*b* is based on the difference in aspect ratio associated with respective media 1904*a* and respective media 1904*b* (e.g., and the height of respective media 1904*a* and respective media 1904*b* is not based on the difference in aspect ratio associated with respective media 1904*a* and respective media 1904*b*).

Figure 19E:
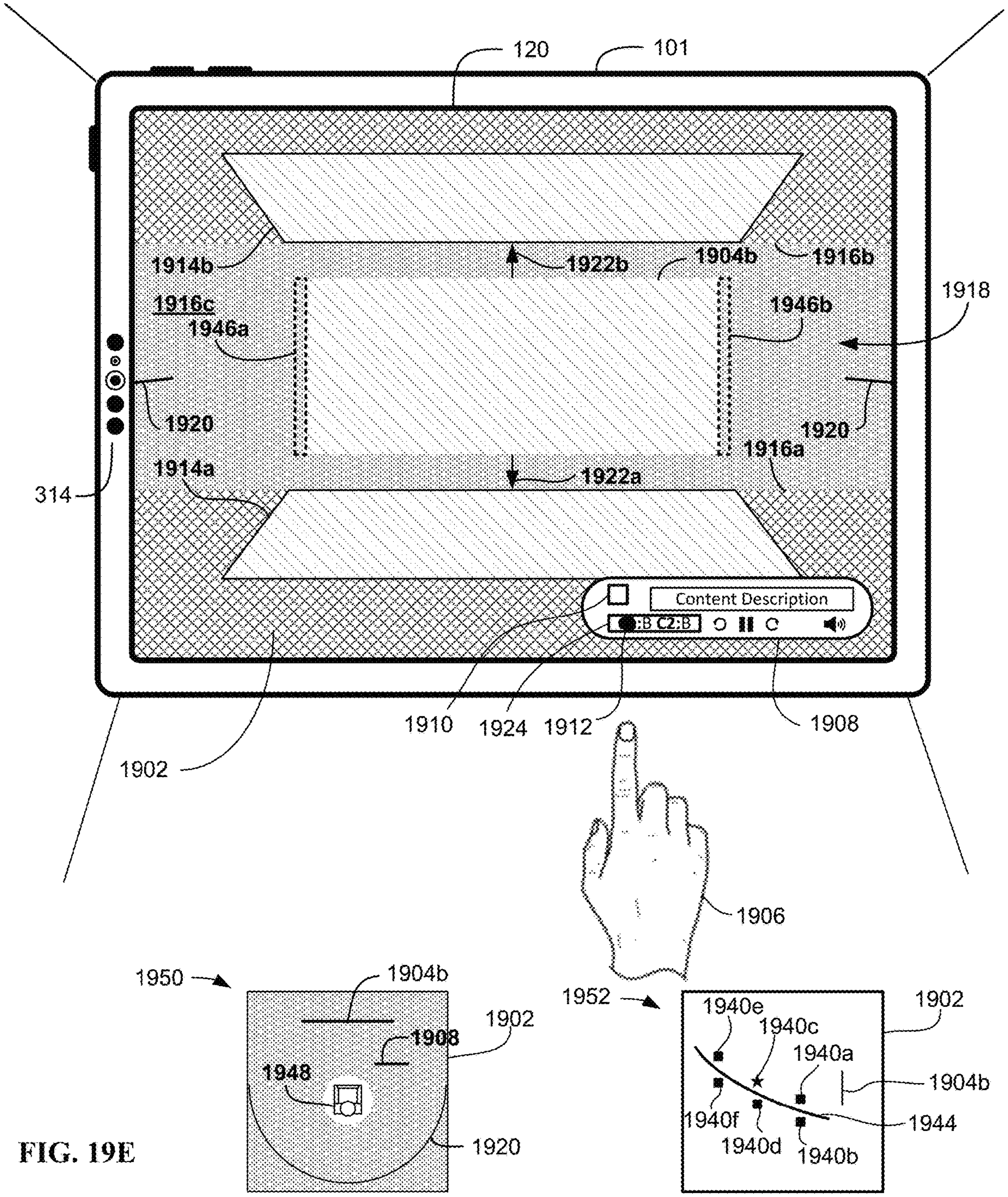

FIG. 19E illustrates user 1948 providing an input corresponding to selection of a selectable option 1910 included in content control user interface 1908. In some embodiments, selectable option 1910 is selectable to display an environment selection user interface (e.g., environment selection user interface 1926 displayed in FIGS. 19F, 19H and 19J). As shown in FIG. 19E, the input provided by user 1948 includes a gesture provided by user's hand 1906. In some embodiments, the gesture provided by hand 1906 includes a hand raise (e.g., while concurrently directing gaze 1912 toward a location in three-dimensional environment 1902 corresponding to a location that computer system 101 displays content control user interface 1908 in). In some embodiments, the input to display content control user interface 1908 includes a verbal input or a touch-input provided on a touch-sensitive surface in communication with computer system 101. In some embodiments, when content control user interface 1908 is displayed in virtual environment 1918, user 1948 selects selectable option 1924 by directing gaze 1912 toward selectable option 1924 (e.g., as shown in FIG. 19E) while concurrently performing a hand gesture (e.g., an air tap, air drag, air pinch (e.g., using a thumb of hand 1906 and a second finger) or an air long pinch (e.g., an air pinch held by user 1948 for a threshold period of time (e.g., 0.1, 0.5, 1, 2, 5 or 10 seconds)). In some embodiments, when displaying virtual environment 1918, selectable option 1910 displays an indication (e.g., an icon) corresponding to virtual environment 1918. In some embodiments, selectable option 1910 is selectable to display an environment different from virtual environment 1918 (e.g., such as virtual environment 1960 shown in FIG. 19A) when virtual environment 1918 is displayed in three-dimensional environment 1902.

FIG. 19E1 illustrates similar and/or the same concepts as those shown in FIG. 19E (with many of the same reference numbers). It is understood that unless indicated below, elements shown in FIG. 19E1 that have the same reference numbers as elements shown in FIGS. 19A-19K have one or more or all of the same characteristics. FIG. 19E1 includes computer system 101, which includes (or is the same as) display generation component 120. In some embodiments, computer system 101 and display generation component 120 have one or more of the characteristics of computer system 101 shown in FIGS. 19A-19K and display generation component 120 shown in FIGS. 1 and 3, respectively, and in some embodiments, computer system 101 and display generation component 120 shown in FIGS. 19A-19K have one or more of the characteristics of computer system 101 and display generation component 120 shown in FIG. 19E1.

In FIG. 19E1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 19A-19K.

In FIG. 19E1, display generation component 120 is illustrated as displaying content that optionally corresponds to the content that is described as being displayed and/or visible via display generation component 120 with reference to FIGS. 19A-19K. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 19E1.

Display generation component 120 has a field of view (e.g., a field of view captured by external image sensors 314*b* and 314*c* and/or visible to the user via display generation component 120, indicated by dashed lines in the overhead view) that corresponds to the content shown in FIG. 19E1. Because display generation component 120 is optionally a head-mounted device, the field of view of display generation component 120 is optionally the same as or similar to the field of view of the user.

In FIG. 19E1, the user is depicted as performing an air pinch gesture (e.g., with hand 1906 while attention of the user is directed to option 1924, as indicated by gaze point 1912) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 19A-19K.

In some embodiments, computer system 101 responds to user inputs as described with reference to FIGS. 19A-19K.

In the example of FIG. 19E1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 19A-19K and/or described with reference to the corresponding method(s) are optionally implemented on computer system 101 and display generation unit 120 in a manner similar or analogous to that shown in FIG. 19E1.

Figure 19F:
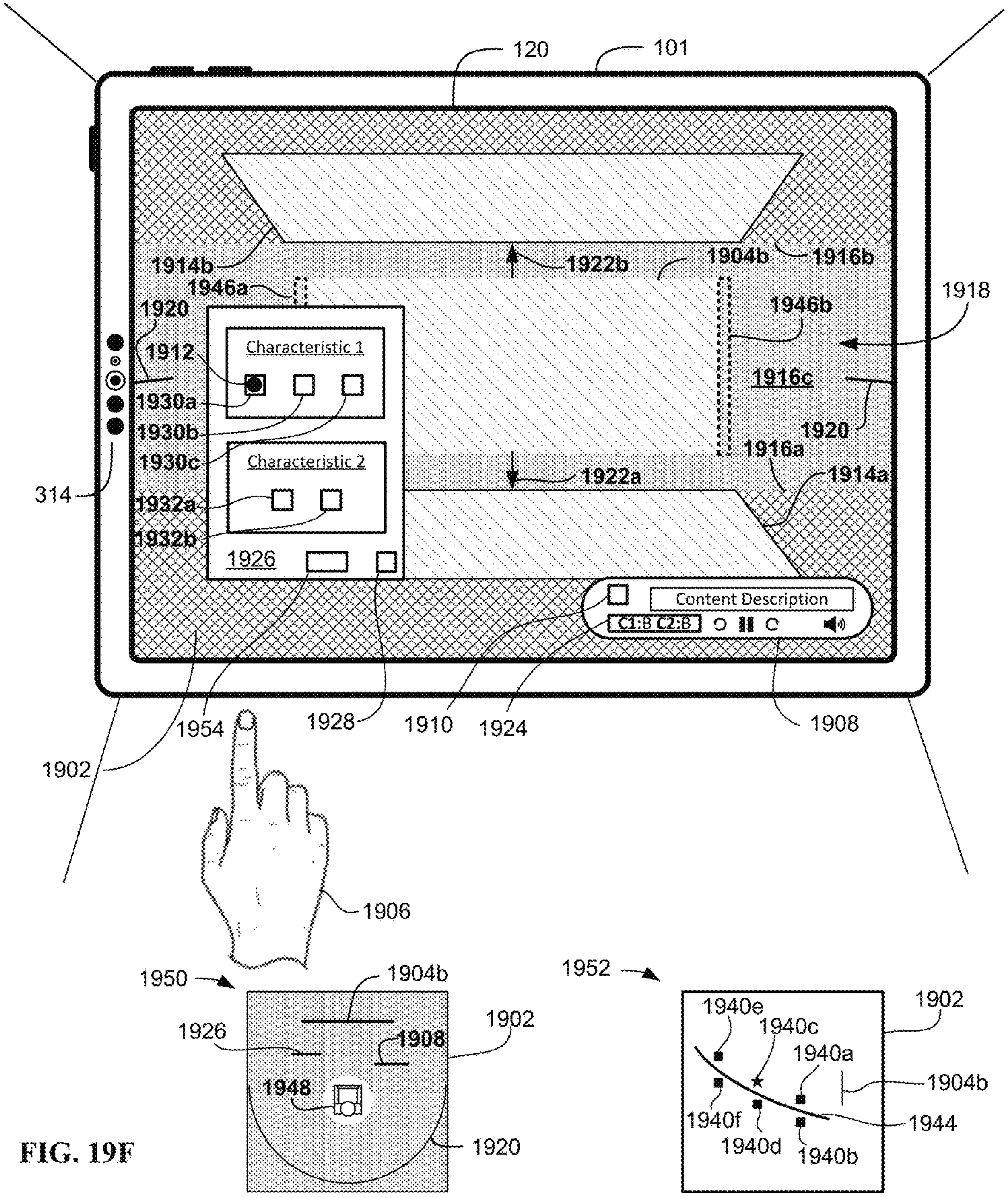

FIG. 19F illustrates environment selection user interface 1926 displayed in virtual environment 1918 in response to the input provided by user 1948 in FIG. 19E. As shown in FIG. 19F, environment selection user interface 1926 displays one or more selectable options (e.g., selectable options 1928, 1930*a*-1930*c*, 1932*a*-1932*b* and 1954). In some embodiments, selectable option 1928 is selectable to cease display of virtual environment 1918 (e.g., and optionally respective media 1904*b*) in three-dimensional environment 1902. In some embodiments, selectable option 1954 is selectable to display an environment different from virtual environment 1918 (e.g., selectable option 1954 optionally includes one or more indications (e.g., icons) representing environments available to be displayed (e.g., optionally with respective media 1904*b*) in three-dimensional environment 1902). In some embodiments, selectable option 1954 is selectable to display respective media 1904*b* in the environment (e.g., of one or more environments represented through indications on environment selection user interface

1926) different from virtual environment 1918. In some embodiments, selectable option 1954 includes one or more characteristics of the one or more visual representations of one or more environments available for display as described with reference to method 2100.

In some embodiments, selectable options 1930*a*-1930*c* and selectable options 1932*a*-1932*b* are selectable to display respective media 1904*b* from different viewpoints of the available viewpoints 1940*a*-1940*f*. In some embodiments, selectable options 1930*a*-1930*c* and 1932*a*-1932*b* include one or more characteristics of the plurality of selectable options that are selectable to initiate display of the media from the plurality of available viewpoints associated with the virtual environment as described with reference to method 2100. In some embodiments, selectable options 1930*a*-1930*c* are associated with values of the first spatial arrangement characteristic (e.g., selectable options 1930*a*-1930*c* are associated with values of distance from respective media 1904*b* in virtual environment 1918). For example, selection of selectable option 1930*a* corresponds to selection of a first value of the first spatial arrangement characteristic (e.g., corresponding to the first spatial arrangement characteristic value of viewpoints 1940*e* and 19400, selectable option 1930*b* corresponds to selection of a second value of the first spatial arrangement characteristic (e.g., corresponding to the first spatial arrangement characteristic value of viewpoints 1940*c* and 1940*d*), and selectable option 1930*c* corresponds to selection of a third value of the first spatial arrangement characteristic (e.g., corresponding to the first spatial arrangement characteristic value of viewpoints 1940*a* and 1940*b*). In some embodiments, selectable options 1932*a* and 1932*b* are associated with values of the second spatial arrangement characteristic (e.g., selectable options 1932*a* and 1932*b* are associated with values of vertical position (e.g., height) relative to virtual environment 1918 (e.g., or optionally three-dimensional environment 1902) and/or viewing angles to respective media 1904*b*). For example, selection of selectable option 1932*a* corresponds to selection of a first value of the second spatial arrangement characteristic (e.g., corresponding to a second spatial arrangement characteristic value of one of the viewpoints shown in legend 1952 above reference line 1944 (e.g., 1940*a*, 1940*c* or 1940*e*)), and selection of selectable option 1932*b* corresponds to selection of a second value of the second spatial arrangement characteristic (e.g., corresponding to a second spatial arrangement characteristic value of one of the viewpoints shown in legend 1952 below reference line 1944 (e.g., 1940*b*, 1940*d* or 1940*f*)). In some embodiments, selectable options 1930*a*-1930*c* are presented to user 1948 as selectable rows from which to view respective media 1904*b* in virtual environment 1918. In some embodiments, selectable options 1932*a* and 1932*b* are presented to user 1948 as selectable seats within a respective selectable row from which to view respective media 1904*b* in virtual environment 1918.

As shown in FIG. 19F, content control user interface 1908 includes a visual indication (e.g., shown on selectable option 1924) of the current viewpoint of the available viewpoints 1942*a*-1942*f* from which respective media 1904*b* is displayed in virtual environment 1918. In some embodiments, the visual indication corresponds to the selected value of the first spatial arrangement characteristic and the selected value of the second spatial arrangement characteristic. In some embodiments, the visual indication is presented to user 1948 as a row (e.g., associated with a value of the first spatial arrangement characteristic) and/or a seat (e.g., height and/or viewing angle) within a row (e.g., associated with a value of the second spatial arrangement characteristic) that is selected by user 1948. In some embodiments, the indication is displayed in another area of content control user interface 1908 that is different from selectable option 1924. In some embodiments, as the selected value of the first spatial arrangement characteristic and/or second spatial arrangement characteristic changes, the visual indication displayed in content control user interface 1908 is updated by computer system 101 accordingly.

In FIG. 19F, user 1948 provides an input corresponding to a selection of selectable option 1930*a*. The input includes user 1948 directing gaze 1912 toward selectable option 1930*a* while concurrently performing a hand gesture (e.g., including one or more characteristics of one or more hand gestures described above). Selectable option 1930*a* corresponds to a value of the first spatial arrangement characteristic that is different from the value of the first spatial arrangement characteristic associated with the current viewpoint (e.g., viewpoint 1940*c*) of user 1948. In some embodiments, selectable option 1930*a* corresponds to the first spatial arrangement characteristic value of available viewpoints 1940*e* and 1940*f* (e.g., the input provided by user 1948 shown in FIG. 19F optionally does not include selection of a new second spatial arrangement characteristic value, so the input shown in FIG. 19F corresponds to selection of available viewpoint 1940*e*).

Figure 19G:
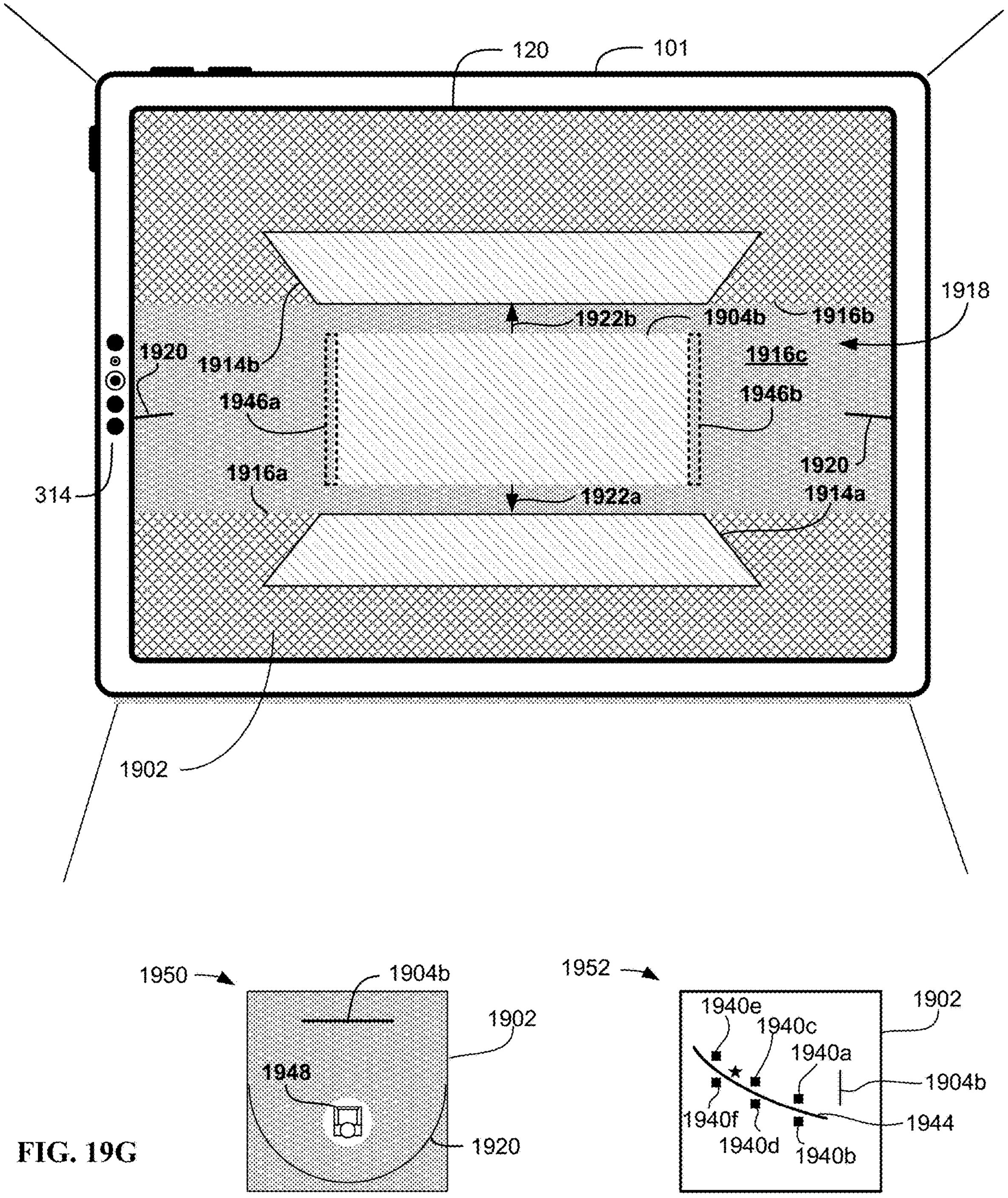

FIG. 19G illustrates computer system 101 transitioning the display of respective media 1904*b* from viewpoint 1940*c* to viewpoint 1940*e* in response to the selection of selectable option 1930*a* (e.g., as shown in FIG. 19F). In some embodiments, the transition from viewpoint 1940*c* to viewpoint 1940*e* includes one or more characteristics of displaying the animated transition from displaying the media at the first location in the virtual environment from the first viewpoint to displaying the media at the first location in the virtual environment from the second viewpoint as described with reference to method 2100. For example, as shown in FIG. 19G, the viewpoint of user 1948 gradually changes from viewpoint 1940*c* to viewpoint 1940*e* (e.g., the star representing the current viewpoint of user 1948 is shown at an intermediate location between viewpoint 1940*c* and viewpoint 1940*e* in legend 1952). As the viewpoint of user 1948 transitions from viewpoint 1940*c* to 1940*e*, computer system 101 maintains display (e.g., and optionally maintains playback) of respective media 1904*b* at the same location in virtual environment 1918 (e.g., as shown in overhead view 1950, the location of respective media 1904*b* is the same compared to the location of respective media 1904*b* in FIGS. 19B-19F). As a result of computer system 101 maintaining display of respective media 1904*b* at the same location in virtual environment 1918 as the current viewpoint of user 1948 transitions from viewpoint 1940*c* to viewpoint 1940*e*, the distance of the current viewpoint of user 1948 from respective media 1904*b* increases (e.g., as shown in overhead view 1950, user 1948 is located at a location relative to three-dimensional environment 1902 farther from respective media 1904*b* compared to as shown in FIGS. 19B-19F), and the viewing angle of the viewpoint of user 1948 to respective media 1904*b* becomes more downward (e.g., as shown by reference line 1944 in legend 1952, the vertical position of an available viewpoint optionally increases relative to respective media 1904*b* as the distance between the viewpoint and the respective media 1904*b* increases). In some embodiments, as the current viewpoint of user 1948 transitions between viewpoint 1940*c* and viewpoint 1940*e*, computer system 101 changes the viewpoint of user 1948 nonlinearly (e.g., with respect to magnitude, velocity and/or acceleration of movement of the current viewpoint of user 1948). For example, computer system 101 gradually accelerates the movement of the current viewpoint of user 1948 when beginning the transition between viewpoint 1940*c* and viewpoint 1940*e*, and gradually decelerates the movement of the current viewpoint of user 1948 when ceasing the transition between viewpoint 1940*c* and viewpoint 1940*e*. In some embodiments, movement of the current viewpoint of user 1948 from viewpoint 1940*c* and viewpoint 1940*e* corresponds to a greater amount of movement than is possible in the physical environment of user 1948 (e.g., due to one or more physical objects (e.g., walls of a room or furniture) that would prevent user 1948 from performing the movement between viewpoint 1940*c* and viewpoint 1940*e*).

Figure 19H:
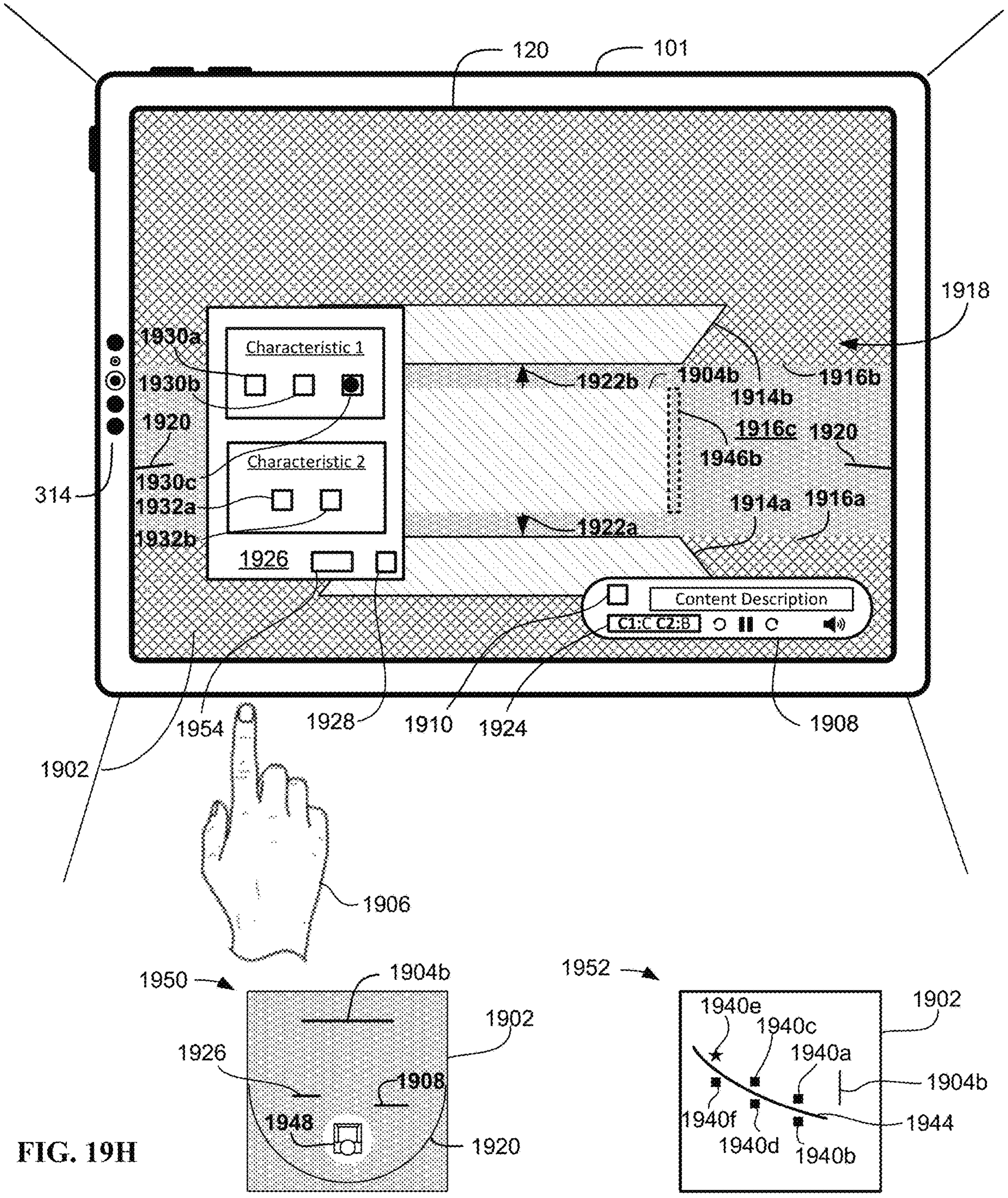

FIG. 19H illustrates respective media 1904*b* displayed from available viewpoint 1940*e* in response to the input provided in FIG. 19F. In some embodiments, respective media 1904*b* is displayed from the current viewpoint shown in FIG. 19H after the transition displayed by computer system 101 shown and described with reference to FIG. 19G. As shown in FIG. 19H, respective media 1904*b* is displayed from a viewpoint that has a greater distance from respective media 1904*b* and a more downward viewing angle to respective media 1904*b* (e.g., as a result of modifying the first spatial arrangement characteristic value of the current viewpoint of user 1948 in response to the input received by user 1948 in FIG. 19F). Computer system 101 maintains display of the first portion 1916*a*, second portion 1916*b*, and third portion 1916*c* of virtual environment 1918 from the new viewpoint (e.g., available viewpoint 1940*e*) of user 1948 (e.g., first portion 1916*a*, second portion 1916*b*, and third portion 1916*c* are displayed at the same location in virtual environment 1918 from a different perspective (e.g., relative to distance and/or viewing angle) compared to as shown in FIG. 19F due to the difference in value of the first spatial arrangement characteristic of available viewpoint 1940*e* compared to available viewpoint 1940*c*). As shown in FIG. 19H, horizon representation 1920 is displayed lower in the user's field of view of virtual environment 1918 from available viewpoint 1940*e* compared to from available viewpoint 1940*c* (e.g., as shown in FIGS. 19D-19F). In some embodiments, computer system 101 maintains display of horizon representation 1920 from the new viewpoint (e.g., available viewpoint 1940*e*) of user 1948 (e.g., horizon representation 1920 is displayed at the same location in virtual environment 1918 from a different perspective (e.g., relative to viewing angle) compared to as shown in FIG. 19F due to the difference in value of the first spatial arrangement characteristic of available viewpoint 1940*e* compared to available viewpoint 1940*c*).

As shown in FIG. 19H, user 1948 provides an input corresponding to selection of selectable option 1930*c*. In some embodiments, selectable option 1930*c* corresponds to the first spatial arrangement characteristic value of available viewpoints 1940*a* and 1940*b* (e.g., the input provided by user 1948 shown in FIG. 19H optionally does not include selection of a new second spatial arrangement characteristic value, which results in the input shown in FIG. 19H corresponding to selection of available viewpoint 1940*a*). In some embodiments, computer system 101 displays content control user interface 1908 and environment selection user interface 1926 in response to one or more inputs shown and described with reference to FIGS. 19E and 19F. In some embodiments, the input shown in FIG. 19H includes one or more characteristic of the input shown and described with reference to FIG. 19F. As shown in FIG. 19H, the indication of the current viewpoint of user 1948 displayed by content control user interface 1908 (e.g., shown on selectable option 1924) is updated to reflect the first spatial arrangement characteristic value and the second spatial arrangement characteristic value associated with viewpoint 1940*e*.

FIG. 19I illustrates computer system 101 transitioning the display of respective media 1904*b* from available viewpoint 1940*e* to available viewpoint 1940*a* in response to the selection of selectable option 1930*c* (e.g., as shown in FIG. 19H). In some embodiments, the transition from available viewpoint 1940*e* to available viewpoint 1940*a* includes one or more characteristics of the transition from available viewpoint 1940*c* to available viewpoint 1940*e* described with reference to FIG. 19G. As shown in FIG. 19I, the current viewpoint of user 1948 gradually changes from available viewpoint 1940*e* to available viewpoint 1940*a* (e.g., the star representing the current viewpoint of user 1948 is shown at an intermediate location between available viewpoint 1940*e* and available viewpoint 1940*a* in legend 1952). As computer system 101 transitions the display of respective media 1904*b* from available viewpoint 1940*e* to available viewpoint 1940*a*, the distance of the current viewpoint of user 1948 from respective media 1904*b* decreases (e.g., as shown in overhead view 1950, user 1948 is located at a location relative to three-dimensional environment 1902 closer to respective media 1904*b* compared to as shown in FIG. 19H), and the viewing angle of the current viewpoint of user 1948 to respective media 1904*b* becomes more upward (e.g., as shown by reference line 1944 in legend 1952, the vertical position of an available viewpoint optionally decreases relative to respective media 1904*b* as the distance between the viewpoint of user 1948 and respective media 1904*b* decreases). As shown in FIG. 19I, horizon representation 1920 is displayed higher in the user's field of view of virtual environment 1918 from the intermediate viewpoint shown in FIG. 19I compared to from available viewpoint 1940*c* shown in FIG. 19H.

Figure 19J:
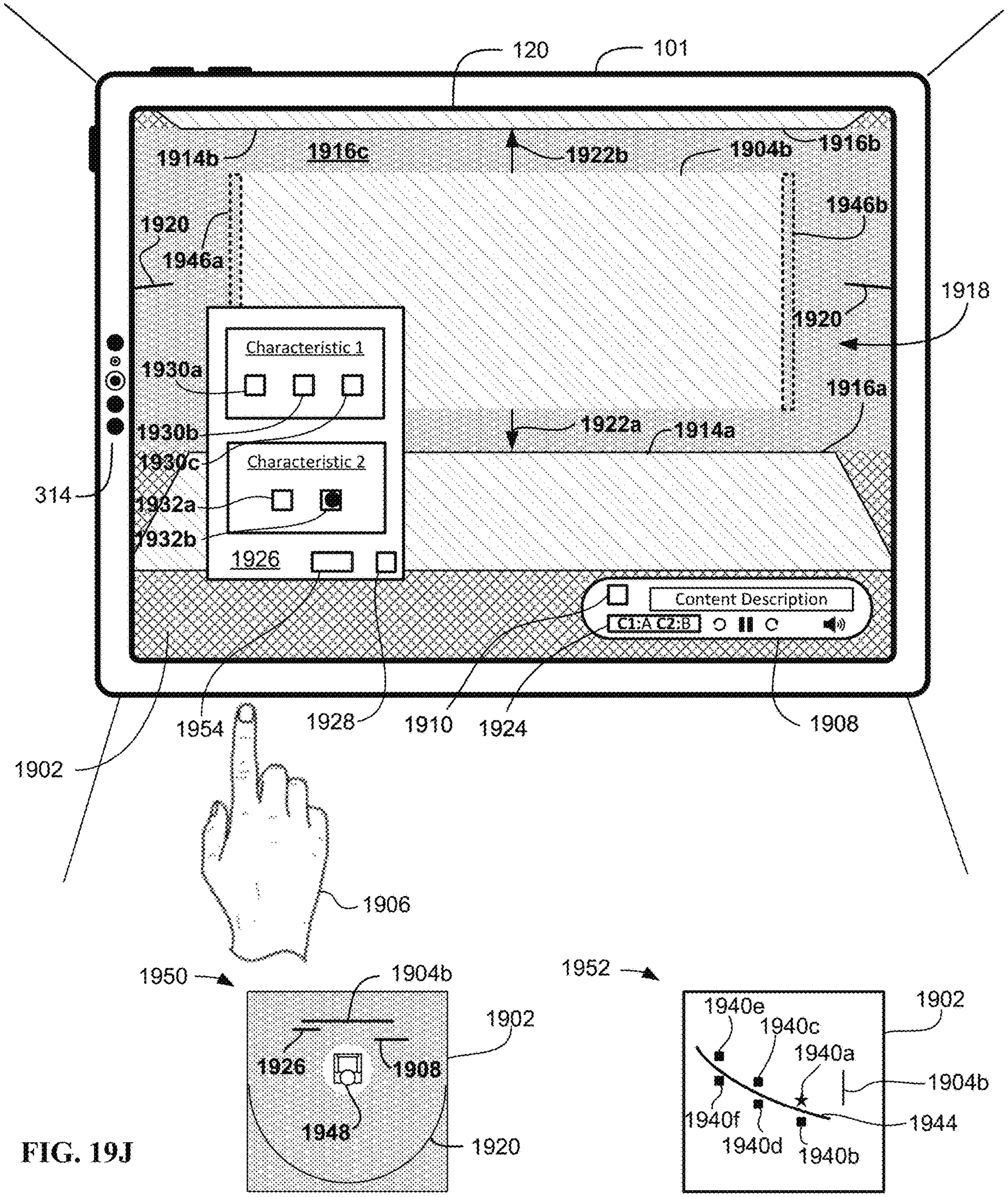

FIG. 19J illustrates respective media 1904*b* displayed from available viewpoint 1940*a* in response to the input provided by user 1948 in FIG. 19H. In some embodiments, respective media 1904*b* is displayed from the current viewpoint shown in FIG. 19J after the transition that is displayed by computer system 101 shown and described with reference to FIG. 19I. As shown in FIG. 19J, respective media 1904*b* is displayed from a viewpoint that has less distance from respective media 1904*b* and a more upward viewing angle to respective media 1904*b* (e.g., as a result of modifying the first spatial arrangement characteristic value of the current viewpoint of user 1948 in response to the input provided by user 1948 in FIG. 19H). Computer system 101 maintains display of first portion 1916*a*, second portion 1916*b*, and third portion 1916*c* of virtual environment 1918 from the new viewpoint (e.g., available viewpoint 1940*a*) of user 1948 (e.g., first portion 1916*a*, second portion 1916*b*, and third portion 1916*c* are displayed at the same location in virtual environment 1918 from a different perspective (e.g., relative to distance and/or viewing angle) compared to as shown in FIG. 19H due to the difference in value of the first spatial arrangement characteristic of available viewpoint 1940*a* compared to available viewpoint 1940*e*). As shown in FIG. 19J, horizon representation 1920 is displayed higher in the user's field of view of virtual environment 1918 from available viewpoint 1940*a* compared to from available viewpoint 1940*c* (e.g., as shown in FIGS. 19D-F) and available viewpoint 1940*e* (e.g., as shown in FIG. 19H). In some embodiments, computer system 101 maintains display of horizon representation 1920 from the new viewpoint (e.g., available viewpoint 1940*a*) of user 1948 (e.g., horizon representation 1930 is displayed at the same location in virtual environment 1918 from a different perspective (e.g., relative to viewing angle) compared to as shown in FIG. 19H due to the difference in value of the first spatial arrangement characteristic of available viewpoint 1940*a* compared to available viewpoint 1940*e*).

As shown in FIG. 19J, user 1948 provides an input corresponding to a selection of selectable option 1932*b*. In some embodiments, selectable option 1932*b* corresponds to the second spatial arrangement characteristic value of available viewpoints 1940*b*, 1940*d* and/or 1940*f* (e.g., the input provided by user 1948 shown in FIG. 19J optionally does not include selection of a new first spatial arrangement characteristic value, which results in the input shown in FIG. 19J corresponding to selection of available viewpoint 1940*b*). As shown in FIG. 19J, the indication of the current viewpoint of user 1948 displayed by content control user interface 1908 (e.g., shown on selectable option 1924) is updated to reflect the first spatial arrangement characteristic value and the second spatial arrangement characteristic value associated with viewpoint 1940*a*.

Figure 19K:
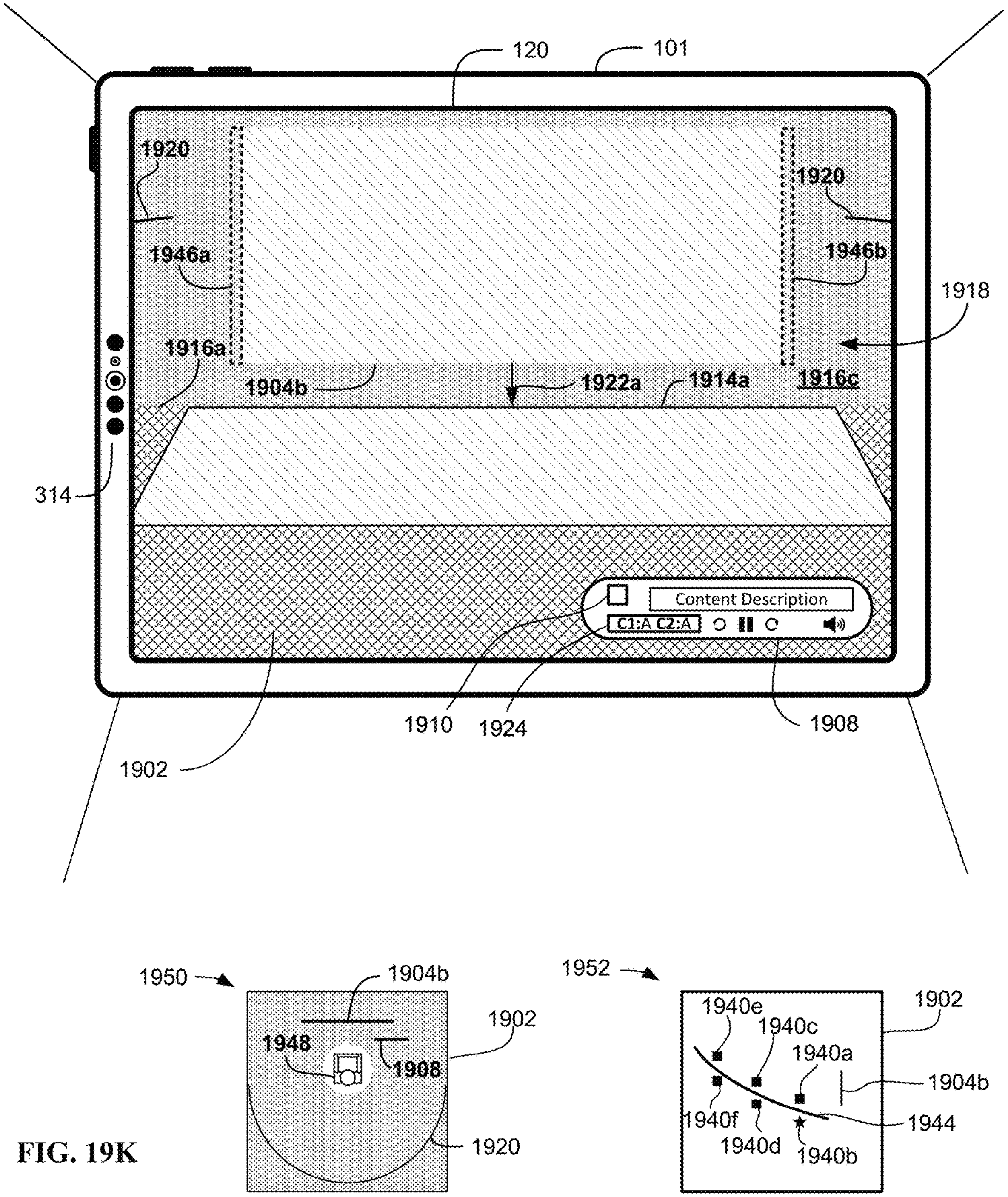
Figure 20A:
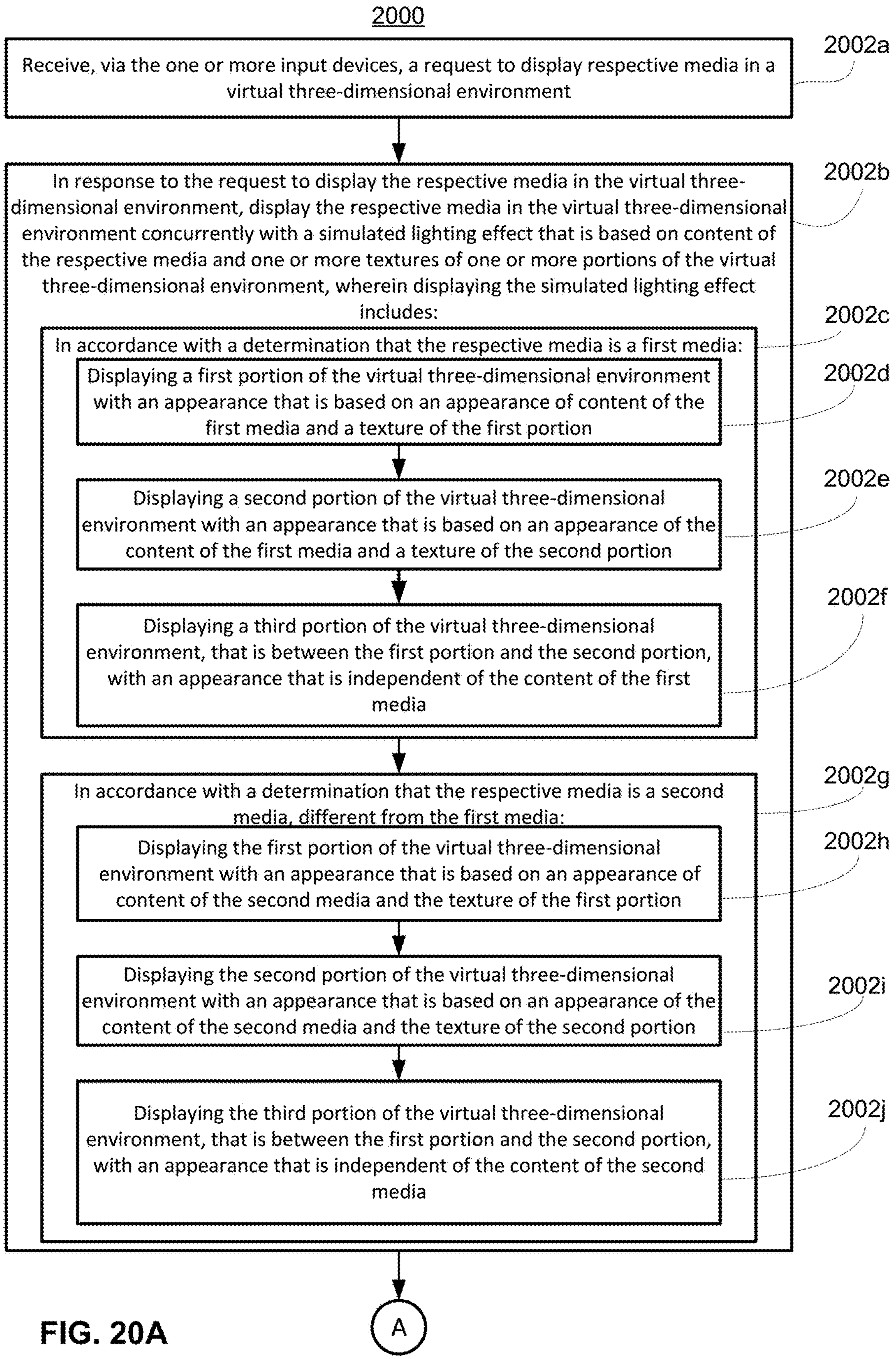
FIGS. 20A-20F is a flowchart illustrating a method of displaying media in a virtual three-dimensional environment with a simulated lighting effect in accordance with some embodiments.
Figure 20B:
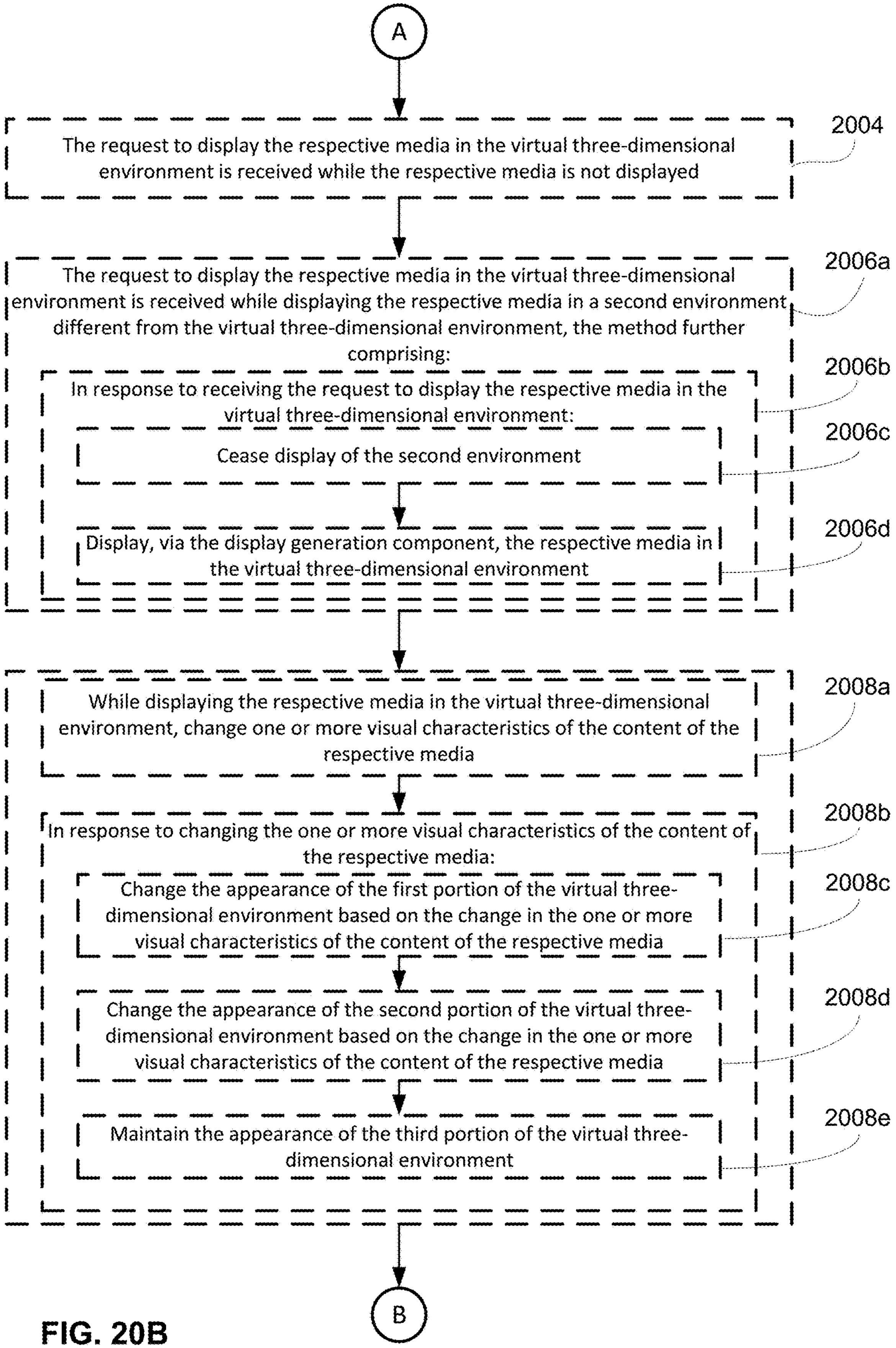
Figure 20C:
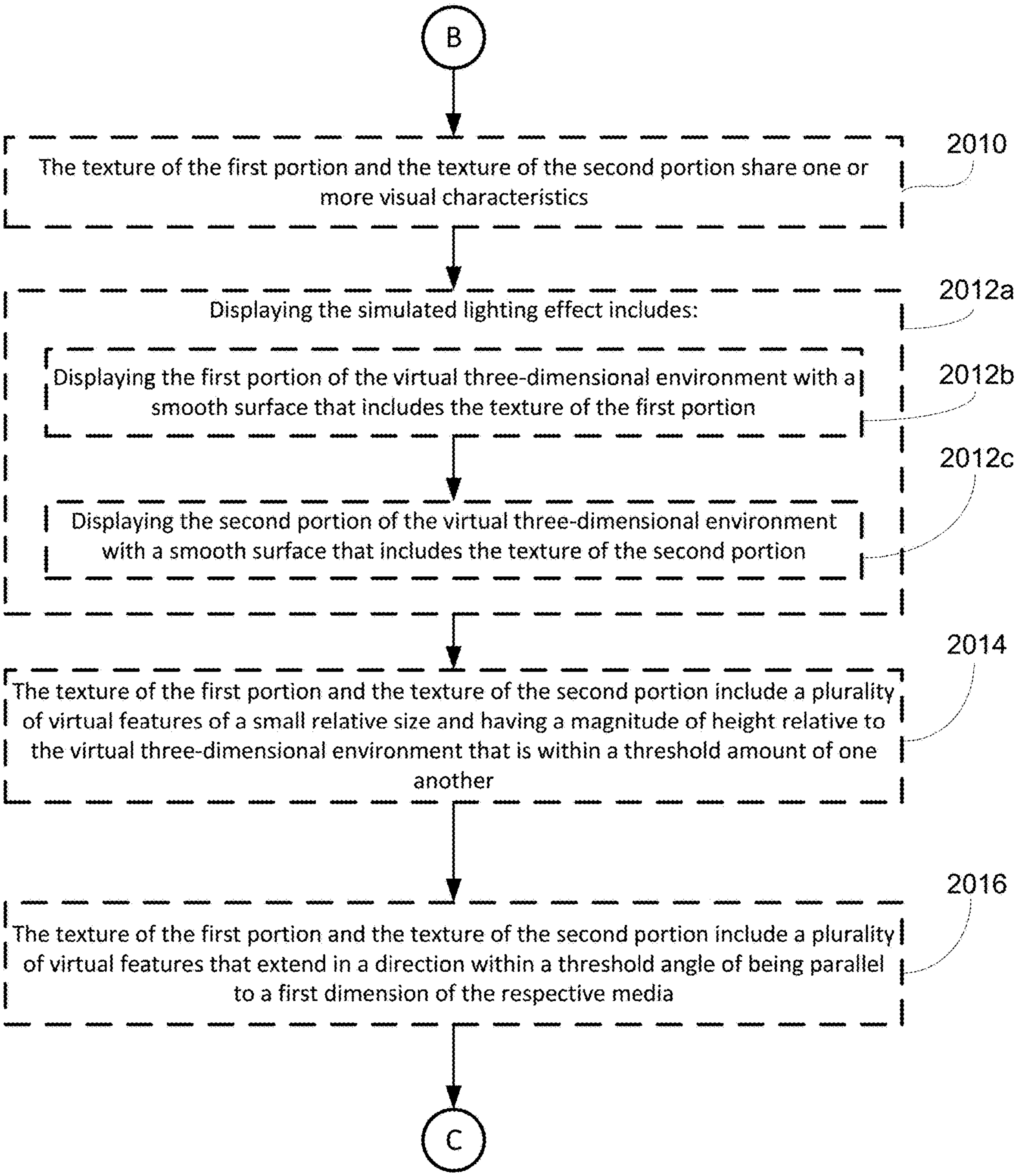
Figure 20D:
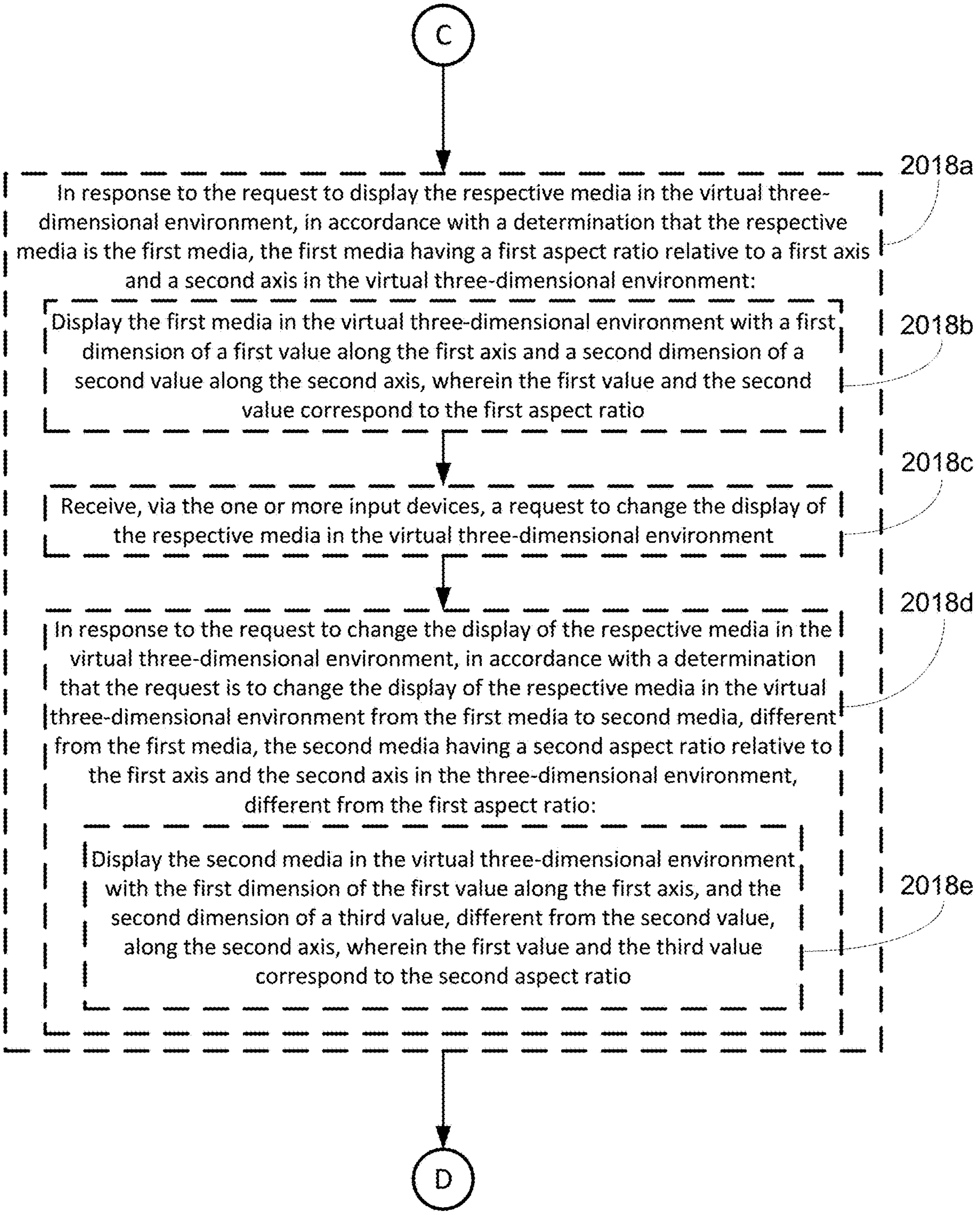
Figure 20E:
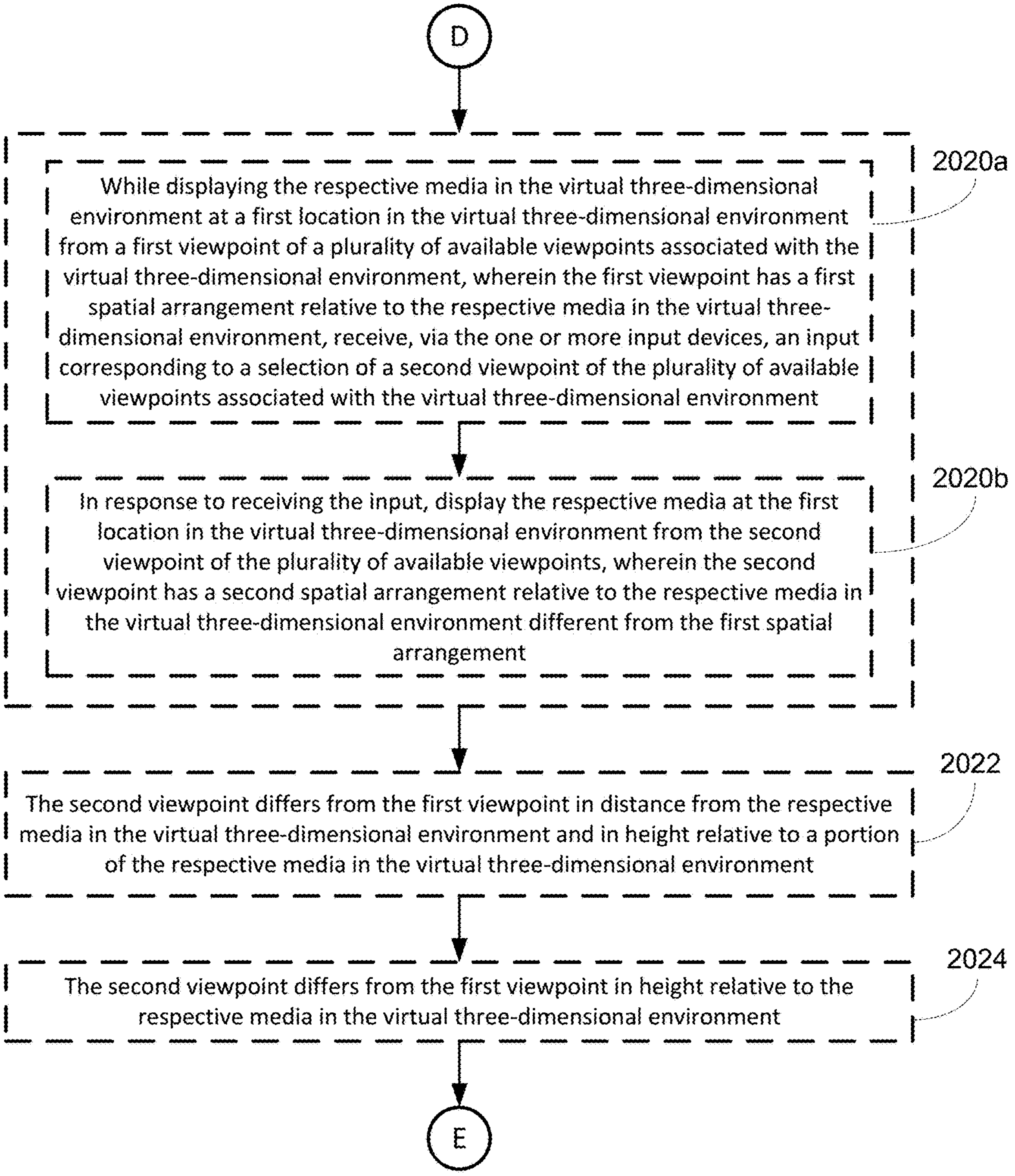
Figure 20F:
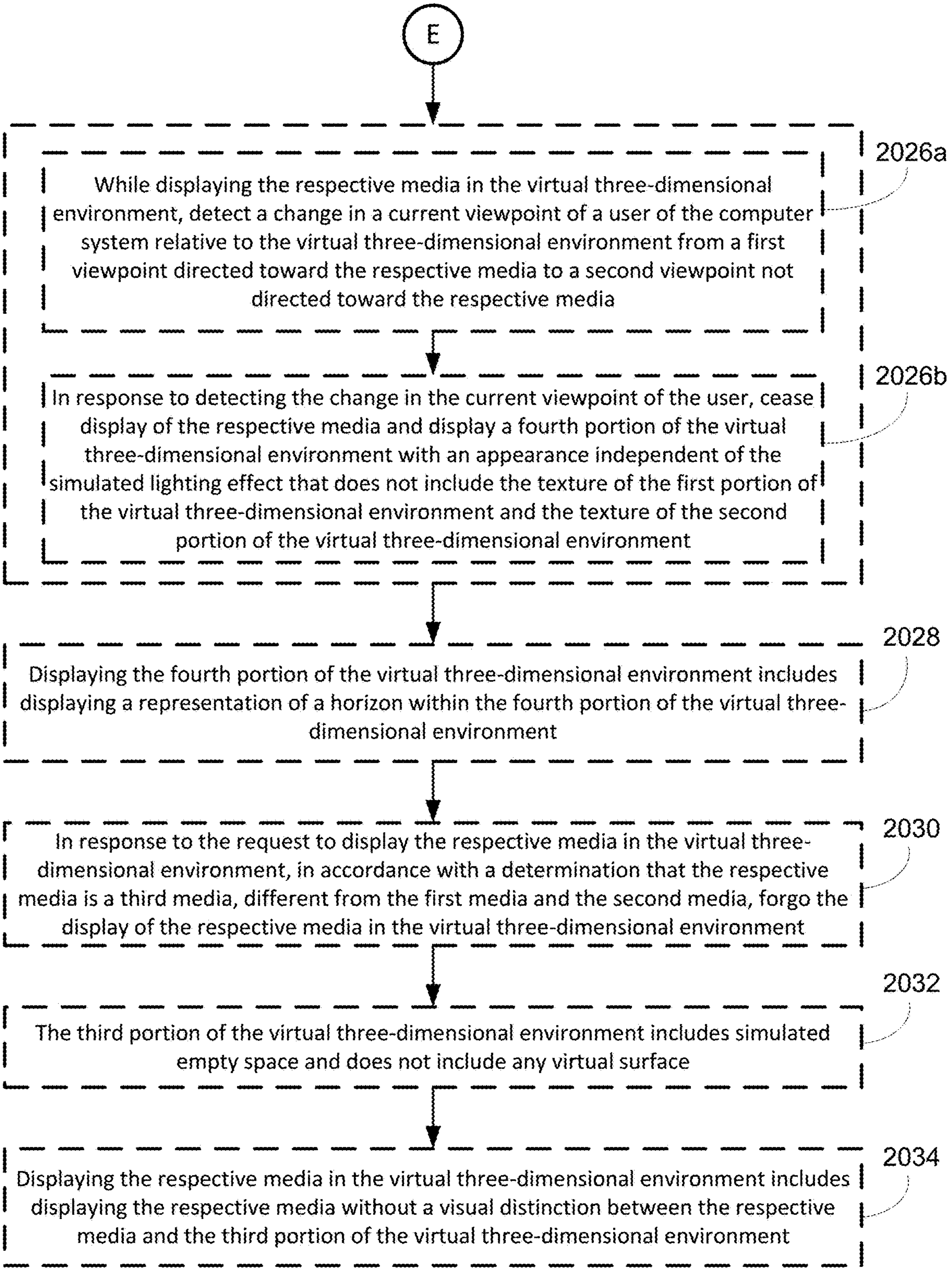
Figure 21B:
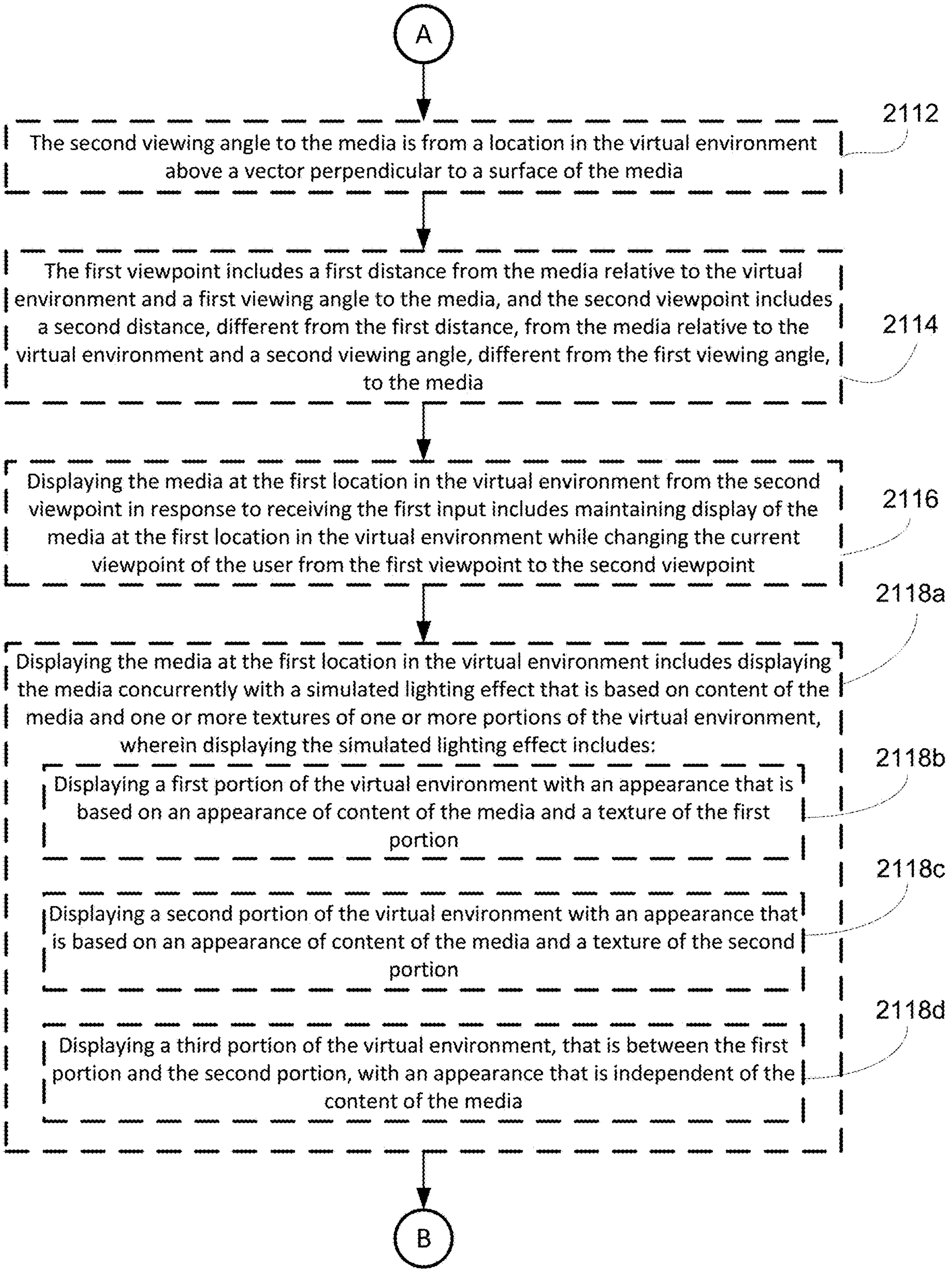
Figure 21D:
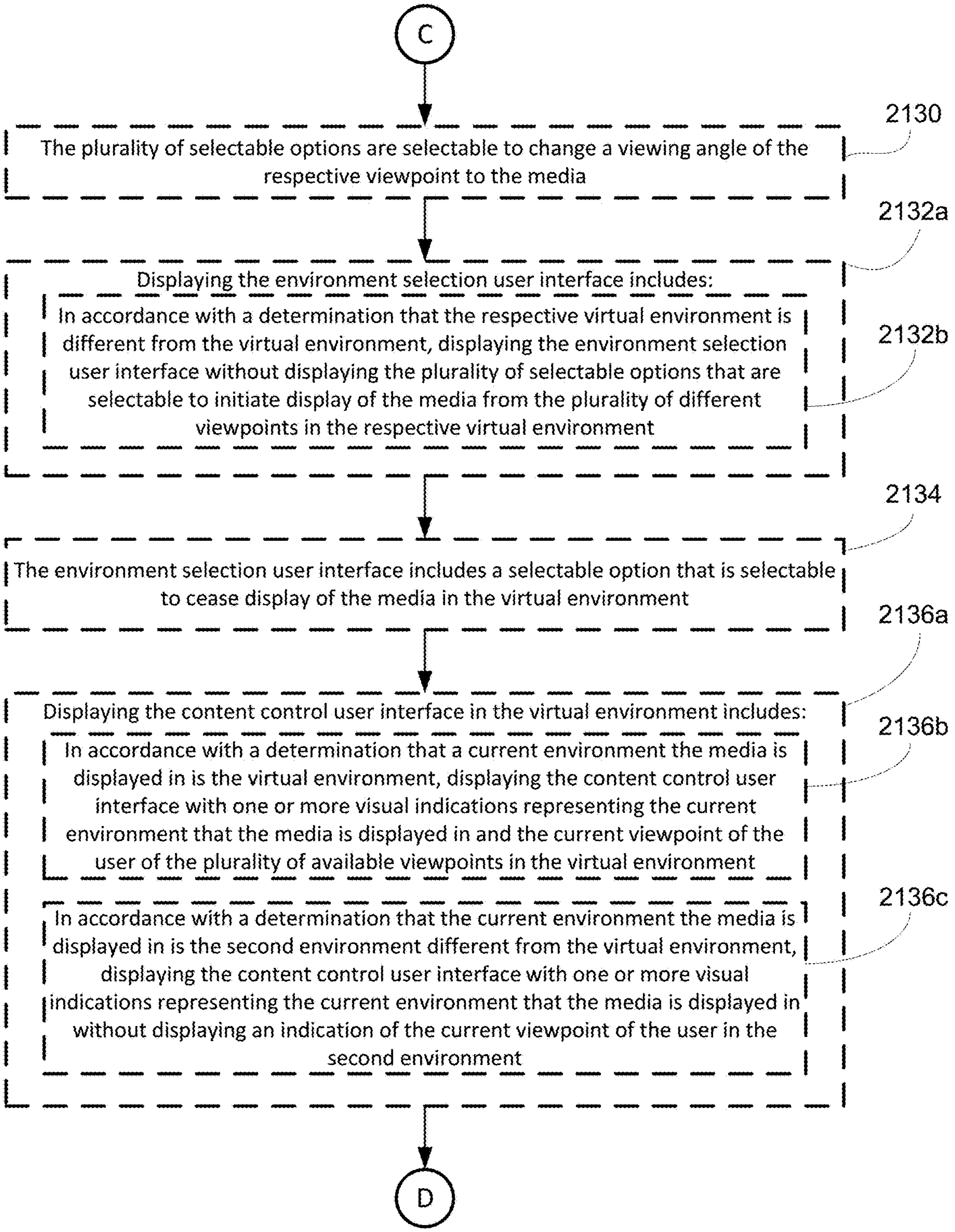
Figure 21E:
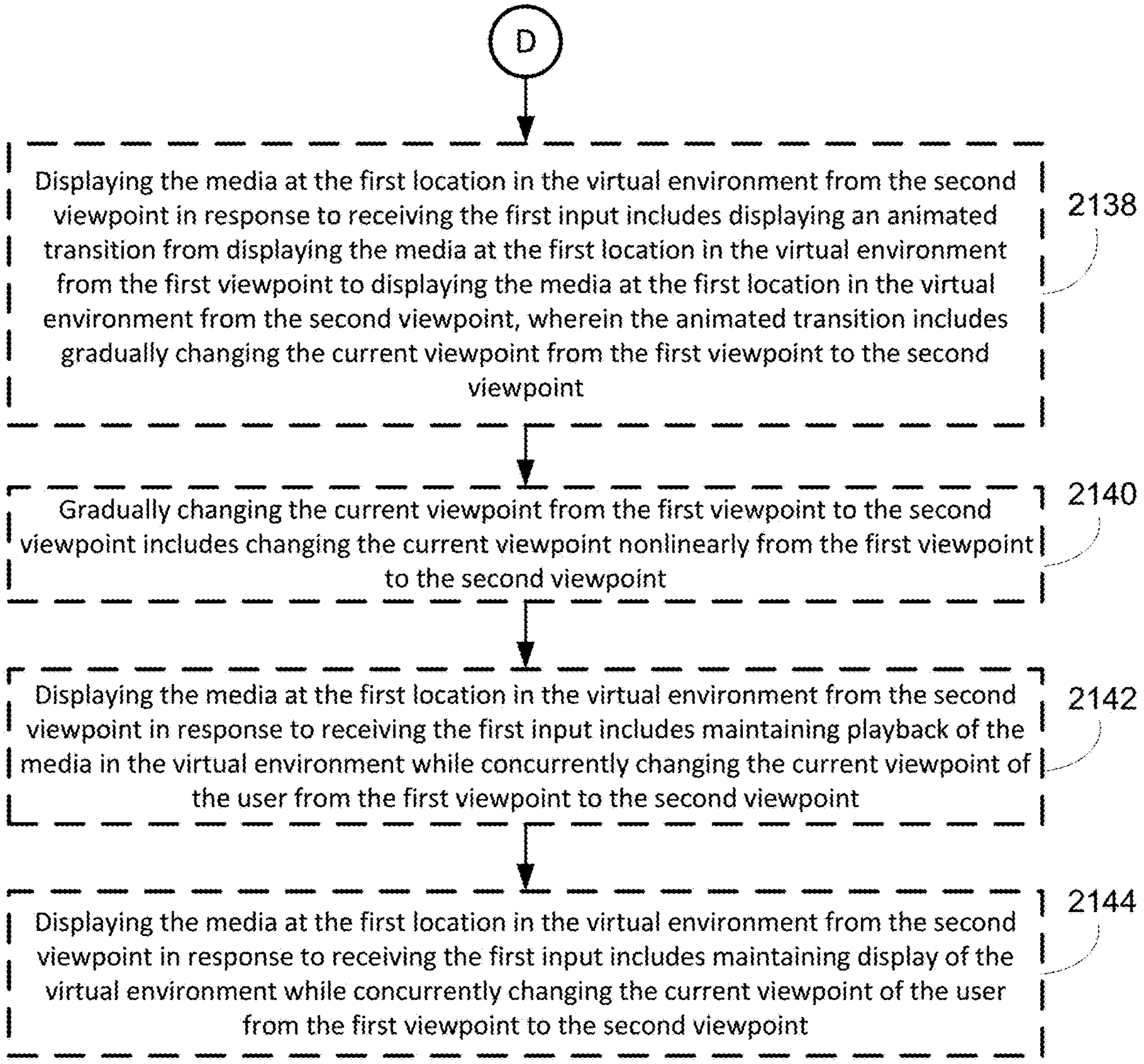

FIG. 19K illustrates respective media 1904*b* displayed from available viewpoint 1940*b* in response to the input provided by user 1948 in FIG. 19J. In some embodiments, displaying respective media 1904*b* from available viewpoint 1940*b* includes displaying a transition from displaying respective media 1904*b* from available viewpoint 1940*a* to displaying respective media 1904*b* from available viewpoint 1940*b* (e.g., including one or more characteristic of the transition displayed by computer system 101 between viewpoints of the available viewpoints previously described). As shown in FIG. 19K, respective media 1904*b* is displayed from a viewpoint that includes a more upward viewing angle to respective media 1904*b* (e.g., as a result of modifying the second spatial arrangement characteristic value of the current viewpoint of user 1948 in response to the input provided by user 1948 in FIG. 19J). Computer system 101 maintains display of first portion 1916*a* and third portion 1916*c* of virtual environment 1918 from the new viewpoint (e.g., available viewpoint 1940*b*) of user 1948 (e.g., first portion 1916*a* and third portion 1916*c* are displayed at the same location in virtual environment 1918 from a different perspective (e.g., based on viewing angle) compared to as shown in FIG. 19J due to the difference in value of the second spatial arrangement characteristic of available viewpoint 1940*b* compared to available viewpoint 1940*a*). In FIG. 19K, computer system 101 does not display second portion 1916*b* from available viewpoint 1940*b* because second portion 1916*b* is not in the field of view of user 1948 when user 1948 is directing attention toward respective media 1904*b* from available viewpoint 1940*b*. In some embodiments, computer system 101 does display second portion 1916*b* from available viewpoint 1940*b* because second portion 1916*b* is in the field of view of user 1948 when user 1948 is directing attention toward respective media 1904*b* from available viewpoint 1940*b*. In some embodiments, if second portion 1916*b* is not in the field of view of user 1948, and user 1948 changes their field of view relative to three-dimensional environment 1902 (e.g., due to movement of one or more portions (e.g., head and/or eyes) of user 1948 relative to three-dimensional environment 1902, such as tilting their head up) such that second portion 1916*b* is within the field of view of user 1948, computer system 101 displays second portion 1916*b* (e.g., from the perspective of available viewpoint 1940*b*). In FIG. 19K, horizon representation 1920 is displayed higher in the user's field of view of virtual environment 1918 from available viewpoint 1940*b* compared to from available viewpoint 1940*a* (e.g., as shown in FIG. 19J). In some embodiments, computer system 101 maintains display of horizon representation 1920 from the new viewpoint (e.g., available viewpoint 1940*b*) of user 1948 (e.g., horizon representation 1920 is displayed at the same location in virtual environment 1918 from a different perspective (e.g., relative to viewing angle) compared to as shown in FIG. 19J due to the difference in value of the second spatial arrangement characteristic of available viewpoint 1940*b* compared to available viewpoint 1940*e*). As shown, the indication of the current viewpoint of user 1948 displayed by content control user interface 1908 (e.g., computer system 101 optionally maintains display of content control user interface 1908 when transitioning between available viewpoints, or redisplays content control user interface 1908 (e.g., and optionally environment selection user interface 1926) in virtual environment 1918 after transitioning to a new available viewpoint) is updated to reflect the first spatial arrangement characteristic value and the second spatial arrangement characteristic value associated with viewpoint 1940*b*.

It should be appreciated that although FIGS. 19D-19K show exemplary embodiments of displaying respective media 1904*b* from the available viewpoints (e.g., particularly available viewpoints 1940*c*, 1940*e*, 1940*a* and 1940*b*) in virtual environment 1918, displaying respective media 1904*b* from other viewpoints of the available viewpoints not shown in FIGS. 19D-19K includes one or more characteristics of displaying respective media 1904*b* from the available viewpoints shown and described with reference to FIGS. 19D-19K.

FIGS. 20A-20F is a flowchart for illustrating a method 2000 for displaying media in a virtual three-dimensional environment with a simulated lighting effect in accordance with some embodiments. In some embodiments, the method 2000 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2000 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2000 are, optionally, combined and/or the order of some operations is, optionally, changed.

In some embodiments, the method 2000 is performed at a computer system (e.g., computer system 101) in communication with a display generation component (e.g., display generation component 120) and one or more input devices (e.g., input devices 314). In some embodiments, the computer system has one or more of the characteristics of the computer systems of methods 800, 1000, 1200, 1400, 1600, 1800 and/or 2100. In some embodiments, the display generation component has one or more of the characteristics of the display generation component of methods 800, 1000, 1200, 1400, 1600, 1800 and/or 2100. In some embodiments, the one or more input devices have one or more of the characteristics of the one or more input devices of methods 800, 1000, 1200, 1400, 1600, 1800 and/or 2100.

In some embodiments, the computer system receives (2002*a*), via the one or more input devices, a request to display respective media in a virtual three-dimensional environment (e.g., a request to display or play media and/or a request to display the virtual three-dimensional environment), such as the input shown corresponding to selection of selectable option 1910 (e.g., the input includes gaze 1912 and an air gesture provided by hand 1906) in FIG. 19A. In some embodiments, the virtual three-dimensional environment is generated, displayed, or otherwise caused to be viewable by the computer system. For example, the virtual three-dimensional environment is an extended reality (XR) environment, such as a virtual reality (VR) environment, a mixed reality (MR) environment, or an augmented reality (AR) environment. In some embodiments, the virtual three-dimensional environment includes one or more virtual objects and/or representations of objects in a physical environment of a user of the computer system. In some embodiments, the virtual three-dimensional environment has one or more of the characteristics of environments described with reference to methods 800, 1000, 1200, 1400, 1600, 1800 and/or 2100. In some embodiments, the respective media includes video content (e.g., such as a movie and/or television show from a streaming service application, and/or an online video from a video sharing service or social media application). In some embodiments, the respective media includes audio content associated with the video content. In some embodiments, the virtual three-dimensional environment includes a playback window or control for controlling the playback of the respective media. In some embodiments, the request to display respective media in the virtual three-dimensional environment includes a selection input directed at a content control user interface object. For example, the selection input includes a user of the computer system directing attention toward a selectable option (e.g., a virtual element that is selectable) included in the content control user interface object (e.g., by gazing at the element for a threshold period of time (e.g., 0.1, 0.2, 0.5, 1, 2, 5, or 10 seconds)) and/or performing a respective air gesture (e.g., an air tap, air drag, air pinch or air long pinch). For example, the request includes an air pinch of the thumb and a finger (for example for a threshold period of time), an input on a touch-sensitive surface (e.g., a touchpad) of the computer system (e.g., a force-sensitive input (e.g., a click of a touchpad) or a capacitive touch input (e.g., a swipe of a finger on a touch-sensitive display)) and/or a verbal input (e.g., a voice command). The content control user interface object optionally includes one or more elements selectable to display one or more virtual environments in the three-dimensional environment. For example, the one or more virtual environments correspond to content presented through virtual scene applications, such as virtual scenes of a simulated physical space and/or object (e.g., such as a mountain scene or a beach scene).

In some embodiments, in response to the request to display the respective media in the virtual three-dimensional environment, the computer system displays (2002*b*) the respective media in the virtual three-dimensional environment concurrently with a simulated lighting effect that is based on content of the respective media and one or more textures of one or more portions of the virtual three-dimensional environment, such as the simulated lighting effect shown in virtual environment 1918 in FIGS. 19B-19K. In some embodiments, displaying the respective media in the virtual three-dimensional environment includes ceasing to display a virtual environment (e.g., different from the virtual three-dimensional environment) currently displayed by the computer system when the request to display the respective media was received. For example, displaying the media in the virtual three-dimensional environment includes ceasing to display one or more objects (e.g., virtual objects (e.g., a virtual window and/or container) and/or representations of physical objects) in the virtual environment. In some embodiments, displaying the respective media in the virtual three-dimensional environment includes displaying a transition from the display of a current virtual environment to the virtual three-dimensional environment for presenting the respective media. For example, displaying the respective media in the virtual three-dimensional environment includes gradually displaying the virtual three-dimensional environment (e.g., by fading out one or more objects and/or a different virtual environment over a period of time (e.g., 0.5, 1, 2, 5, 10, 15 or 20 seconds) while concurrently fading in the virtual three-dimensional environment over the period of time). In some embodiments, a virtual environment different from the virtual three-dimensional environment is not displayed by the computer system prior to receiving the request to display the respective media in the virtual three-dimensional environment. In some embodiments, displaying the simulated lighting effect includes one or more characteristics of the virtual lighting effects described with reference to method 1000. In some embodiments, the simulated lighting effect is associated with the media (e.g., glow or light displayed as if emanating from the respective media in the virtual environment onto one or more portions of the virtual three-dimensional environment displayed outside of the respective media). In some embodiments, the simulated lighting effect corresponds to the color, brightness and/or saturation level of the respective media. In some embodiments, the simulated lighting effect is cast out onto other portions of the virtual three-dimensional environment outside of the respective media (e.g., the color, brightness and/or saturation level of the respective media is expanded out to other areas of the virtual environment outside of the respective media). In some embodiments, the respective media is displayed with a predefined and/or system-defined spatial arrangement relative to a viewpoint of a user of the computer system (e.g., as described with reference to method 2100). In some embodiments, the respective media is displayed at a first location relative to the virtual three-dimensional environment. In some embodiments, portions of the virtual three-dimensional environment outside of the first location do not include the display of the respective media. In some embodiments, the one or more portions of the virtual three-dimensional environment include one or more portions of the virtual three-dimensional environment adjacent to a perimeter of the respective media (e.g., above, below and/or on opposite sides of the respective media). In some embodiments, the one or more textures include a consistency of the one or more portions that are visible to a user of the computer system (e.g., the one or more portions are displayed as one or more virtual surfaces in the virtual three-dimensional environment that include a surface consistency that is visible to the user). In some embodiments, the texture of a respective portion of the one or more portions changes the simulated lighting effect displayed at the respective portion in the virtual three-dimensional environment (e.g., the magnitude of the simulated lighting effect is affected based on the texture of the respective portion). For example, one or more portions with a first texture display a higher magnitude of the simulated lighting effect than one or more portions with a second texture different from the first texture. In some embodiments, one or more portions of the virtual three-dimensional environment that include a first texture displays the simulated lighting effect, and one or more portions of the virtual three-dimensional environment that do not include the first texture do not display the simulated lighting effect.

In some embodiments, displaying the simulated lighting effect includes, in accordance with a determination that the respective media is a first media (2002*c*) (e.g., video content such as a movie, television show, or an online video), such as the respective media 1904*a* shown in FIG. 19B, displaying a first portion of the virtual three-dimensional environment with an appearance that is based on an appearance of content of the first media and a texture of the first portion (2002*d*), such as first portion 1916*a* displayed in virtual environment 1918 in FIG. 19B, displaying a second portion of the virtual three-dimensional environment with an appearance that is based on an appearance of the content of the first media and a texture of the second portion (2002*e*), such as second portion 1916*b* displayed in virtual environment 1918 in FIG. 19B, and displaying a third portion of the virtual three-dimensional environment, that is between the first portion and the second portion, with an appearance that is independent of the content of the first media (20020, such as third portion 1916*c* displayed in virtual environment 1918 in FIG. 19B.

In some embodiments, the first portion is displayed below the first media relative to a current viewpoint of a user of the computer system and/or closer to the current viewpoint of the user than the first media. In some embodiments, the first portion is displayed outside of a perimeter of the first media. In some embodiments, the appearance of the first portion includes the simulated lighting effect. For example, the first portion includes color, brightness and/or saturation characteristics of the first media. In some embodiments, the texture of the first portion is visible concurrently with the simulated lighting effect relative to the viewpoint of the user of the virtual three-dimensional environment. For example, the texture appears on a surface of the first portion, and the simulated lighting effect appearing on the first portion includes reflecting one or more visual characteristics of the first media onto the surface of the first portion. In some embodiments, the texture includes one or more characteristics of the texture as described with reference to step(s) 2012-2016.

In some embodiments, the second portion is displayed above the first media relative to a current viewpoint of the user of the computer system and/or closer to the current viewpoint of the user than the first media. In some embodiments, the second portion is displayed on an opposite side of the first media compared to the first portion. In some embodiments, the second portion is displayed outside of the perimeter of the first media. In some embodiments, the appearance of the second portion includes the simulated lighting effect. For example, the second portion includes color, brightness and/or saturation characteristics of the first media. In some embodiments the texture of the second portion is the same as the texture of the first portion. In some embodiments, the texture of the second portion is different from the texture of the first portion. In some embodiments, the texture of the second portion is visible concurrently with the simulated lighting effect relative to the viewpoint of the user (e.g., including one or more characteristics as described with reference to the first portion).

In some embodiments, the third portion is displayed on the left or right side of the first media relative to the current viewpoint of the user. In some embodiments, the third portion does not include a texture of the first portion and/or second portion. In some embodiments, the appearance of the third portion does not include the simulated lighting effect. In some embodiments, the first media is displayed with a lighter presentation and the third portion is displayed with a darker or black (e.g., fully non-light) presentation compared to the first media. For example, the appearance of the third portion visually contrasts the appearance of the first media and the one or more simulated lighting effects displayed relative to the first portion and the second portion. In some embodiments, the virtual three-dimensional environment includes a fourth portion on an opposite side of the first media from the third portion including one or more characteristics of the third portion.

In some embodiments, displaying the simulated lighting effect includes, in accordance with a determination that the respective media is a second media, different from the first media (e.g., video content that is different from the video content of the first media) (2002*g*), such as respective media 1904*b* displayed in virtual environment shown in FIG. 19D, displaying the first portion of the virtual three-dimensional environment with an appearance that is based on an appearance of content of the second media and the texture of the first portion (2002*h*), such as the first portion 1916*a* that is displayed in virtual environment 1918 in FIG. 19D, displaying the second portion of the virtual three-dimensional environment with an appearance that is based on an appearance of the content of the second media and the texture of the second portion (2002*i*), such as the second portion 1916*b* that is displayed in virtual environment 1918 in FIG. 19D, and displaying the third portion of the virtual three-dimensional environment, that is between the first portion and the second portion, with an appearance that is independent of the content of the second media (2002*j*), such as the third portion 1916*c* displayed in virtual environment 1918 in FIG. 19D.

In some embodiments, the appearance of the first portion based on the appearance of the content of the second media includes one or more characteristics of the appearance of the first portion based on the appearance of the content of the first media. In some embodiments, the appearance of the second portion based on the appearance of the content of the second media includes one or more characteristics of the appearance of the second portion based on the appearance of the first media. In some embodiments, the appearance of the third portion that is independent of the content of the second media includes one or more characteristics of the appearance of the third portion that is independent of the first media. Displaying respective media with a simulated lighting effect in a virtual three-dimensional environment including one or more portions that include an appearance based on a texture and the appearance of the respective media and one or more portions that include an appearance independent of the respective media limits visual distractions (e.g., light flickering) that would otherwise be caused by the appearance of the respective media and provides spatial perception by displaying visual features that help the user feel spatially oriented in the virtual three-dimensional environment, thereby improving user device interaction and reducing user discomfort.

In some embodiments, the request to display the respective media in the virtual three-dimensional environment is received while the respective media is not displayed (2004) (e.g., the request corresponds to a request to display the respective media, which is not displayed when the request is received), such as receiving the first input while displaying virtual environment 1960, as shown in FIG. 19A, without respective media 1904*a*. In some embodiments, the request to display the respective media in the virtual three-dimensional environment is made while not displaying a virtual environment different from the virtual three-dimensional environment (e.g., optical or virtual pass-through of one or more objects in a physical environment of a user of the computer system is displayed through a transparent or translucent portion of the display generation component). In some embodiments, the request to display the respective media in the virtual three-dimensional environment is received while displaying a virtual environment different from the virtual three-dimensional environment, the virtual environment different from the virtual three-dimensional environment optionally including one or more virtual objects (e.g., that include content different from the content of the respective media). Therefore, in some embodiments, in response to the request, the computer system displays the virtual three-dimensional environment and the respective media in the virtual environment. Displaying respective media with a simulated lighting effect in a virtual three-dimensional environment in response to receiving a request to display the respective media reduces the number of user inputs required for displaying the virtual three-dimensional environment and displaying the respective media, thereby providing ease of interaction and improving user device interaction.

In some embodiments, the request to display the respective media in the virtual three-dimensional environment is received while displaying the respective media in a second environment (e.g., a virtual environment, having one or more of the characteristics of the virtual three-dimensional environment and/or the virtual environments described with reference to methods 800, 1000, 1200, 1400, 1600, 1800 and/or 2100) different from the virtual three-dimensional environment (2006*a*), as shown by display of respective media 1904*a* in virtual environment 1960 in FIG. 19A. In some embodiments, displaying the respective media in the second environment does not include concurrently displaying the simulated lighting effect based on the content of the respective media. For example, the second environment does not include the first portion (e.g., including the texture of the first portion), the second portion (e.g., including the texture of the second portion) and/or the third portion of the virtual three-dimensional environment. In some embodiments, one or more objects (e.g., virtual objects) are displayed in the second environment concurrently with the respective media.

In some embodiments, in response to receiving the request to display the respective media in the virtual three-dimensional environment (2006*b*), the computer system ceases (2006*c*) display of the second environment, such as ceasing to display virtual environment 1960 (e.g., as shown in FIG. 19A) in FIG. 19B when displaying virtual environment 1918, and displays (2006*d*), via the display generation component, the respective media in the virtual three-dimensional environment, such as the display of respective media 1904*a* in virtual environment 1918 shown in FIG. 19B. In some embodiments, ceasing to display the second environment includes ceasing to display one or more objects displayed in the second environment. Ceasing display of the second environment optionally includes ceasing display of the respective media. In some embodiments, displaying the respective media in the virtual three-dimensional environment includes one or more characteristics of displaying the respective media in the virtual three-dimensional environment as described with reference to step(s) 2002. In some embodiments, displaying the respective media in the virtual three-dimensional environment includes redisplaying the respective media after ceasing to display the respective media while ceasing to display the second environment. Displaying respective media with a simulated lighting effect in a virtual three-dimensional environment in response to receiving a request to display the respective media in the virtual three-dimensional environment while displaying the respective media in a second environment different from the virtual three-dimensional environment provides the user discretion in displaying the respective media in an environment that includes the simulated lighting effect or in an environment that does not include the simulated lighting effect, thereby improving user device interaction.

In some embodiments, while displaying the respective media in the virtual three-dimensional environment, the computer system changes (2008*a*) one or more visual characteristics (e.g., color, brightness and/or saturation) of the content of the respective media, such as changing one or more visual characteristics of respective media 1904*a*, as shown displayed in virtual environment 1918 in FIG. 19B, during playback of video content associated with respective media 1904*a*. In some embodiments, the content of the respective media is video content that visually changes while the video is played in the virtual three-dimensional environment. For example, as the video content plays in the virtual three-dimensional environment, the color, brightness and/or saturation level of the content changes.

In some embodiments, in response to changing the one or more visual characteristics of the content of the respective media (2008*b*), the computer system changes (2008*c*) the appearance of the first portion of the virtual three-dimensional environment based on the change in the one or more visual characteristics of the content of the respective media, such as changing the appearance of simulated light 1914*a* displayed on first portion 1916*a* in FIG. 19B, changes (2008*d*) the appearance of the second portion of the virtual three-dimensional environment based on the change in the one or more visual characteristics of the content of the respective media, such as changing the appearance of simulated light 1914*b* displayed on second portion 1916*b* in FIG. 19B, and maintains (2008*e*) the appearance of the third portion of the virtual three-dimensional environment, such as maintaining the appearance of third portion 1916*c* in FIG. 19B while concurrently changing the appearance of first portion 1916*a* and second portion 1916*b*.

In some embodiments, changing the appearance of the first portion of the virtual three-dimensional environment includes changing the color, brightness and/or saturation level of the first portion of the virtual three-dimensional environment to be the same and/or a corresponding color brightness and/or saturation level of (e.g., or within a threshold amount of the color, brightness and/or saturation level of (e.g., within 70, 75, 80, 85, 90 or 95 percent of)) the content of the respective media while the appearance of the content of the respective media changes. In some embodiments, while the appearance of the first portion of the virtual three-dimensional environment changes based on the change in the one or more visual characteristics of the content of the respective media, the computer system maintains display of the texture of the first portion of the virtual three-dimensional environment (e.g., and the appearance of the first portion of the virtual three-dimensional environment remains based on the texture of the first portion of the virtual three-dimensional environment).

In some embodiments, changing the appearance of the second portion of the virtual three-dimensional environment includes one or more characteristics of the changing of the first portion of the virtual three-dimensional environment based on the change in the one or more visual characteristics of the content of the respective media. In some embodiments, while the appearance of the second portion of the virtual three-dimensional environment changes based on the change in the one or more visual characteristics of the content of the respective media, the computer system maintains display of the texture of the second portion of the virtual three-dimensional environment (e.g., and the appearance of the second portion of the virtual three-dimensional environment remains based on the texture of the second portion of the virtual three-dimensional environment).

In some embodiments, maintaining the appearance of the third portion of the virtual three-dimensional environment includes one or more characteristics of displaying the third portion of the virtual three-dimensional environment as described with reference to step(s) 2002 (e.g., the computer system maintains display of the appearance independent of the content of the respective media). Displaying respective media with a simulated lighting effect in a virtual three-dimensional environment that includes changing the appearance of one or more portions of the virtual three-dimensional environment that include an appearance based on a change in one or more visual characteristics of content of the respective media and not changing the appearance of one or more portions of the virtual three-dimensional environment that include an appearance independent of the respective media limits visual distractions (e.g., light flickering) that would otherwise be caused by the change in the one or more visual characteristics of the respective media and provides visual indication (e.g., and/or feedback) regarding the playback of the respective media, thereby improving user device interaction.

In some embodiments, the texture of the first portion and the texture of the second portion share one or more visual characteristics (2010), such as shown by the shared one or more visual characteristics of the texture of first portion 1916*a* and second portion 1916*b* in FIG. 19B. In some embodiments, the one or more visual characteristics includes one or more virtual features as described with reference to step(s) 2014. In some embodiments, the one or more visual characteristics include the size of the region occupied by the texture relative to the virtual three-dimensional environment (e.g., the first portion and the second portion include the same (e.g., or within 1, 3, 5, 10 or 30 percent of the same) amount of and/or density of the texture (e.g., relative to surface area occupied of the first and/or second portion)). In some embodiments, the one or more visual characteristics include the visual prominence of the textures relative to a current viewpoint of the user (e.g., the texture of the first portion and the texture of the second portion include the same (e.g., or within 1, 3, 5, 10 or 30 percent of the same) relative size, scale, and/or brightness such that the texture of the first portion and the texture of the second portion are displayed with the same (e.g., or within 1, 3, 5, 10 or 30 percent of the same) level of visual detail relative to a current viewpoint of the user). Displaying respective media with a simulated lighting effect in a virtual three-dimensional environment that includes displaying a first portion and a second portion of the virtual three-dimensional environment with textures that share one or more visual characteristics ensures that a simulated lighting effect displayed concurrently in the virtual three-dimensional environment based on the textures and content of the respective media is consistent across different portions of the virtual three-dimensional environment where the simulated lighting effect is displayed, thereby improving user device interaction.

In some embodiments, displaying the simulated lighting effect includes (2012*a*) displaying the first portion of the virtual three-dimensional environment with a smooth (e.g., flat or slightly curved relative to the virtual three-dimensional environment) surface that includes the texture (e.g., displayed on the surface) of the first portion (2012*b*), such as with the surface of first portion 1916*a* that includes texture shown in FIG. 19B, displaying the second portion of the virtual three-dimensional environment with a smooth (e.g., flat or slightly curved relative to the virtual three-dimensional environment) surface that includes the texture of the second portion, such as with the surface of second portion 1916*b* that includes texture shown in FIG. 19B. In some embodiments, the texture of the first portion includes a pattern that includes a plurality of virtual features (e.g., including one or more characteristics of the plurality of virtual features as described with reference to step(s) 2014) that are spatially distributed across the first portion. In some embodiments, between one or more or each spatially distributed virtual feature of the plurality of virtual features is a smooth surface that does not include the plurality of virtual features. For example, displaying a smooth surface includes displaying a surface that does not include one or more projections from and/or ridges into the surface that are visible to a user from a current viewpoint of the user. In some embodiments, the arrangement of the one or more virtual features is based on the smooth surface. For example, if the smooth surface is a curved surface relative to the virtual three-dimensional environment, the one or more virtual features are arranged in a curved pattern or profile aligned with the curved surface. In some embodiments, the first portion includes a first region that includes the texture (e.g., and optionally not a smooth surface) and a second region that includes the smooth surface (e.g., and optionally not the texture). For example, the textured region of the first portion is a region arranged closer to the respective media and/or further from the viewpoint of the user (e.g., a region of the first portion that is based by a greater amount on the appearance of the content of the respective media (e.g., including a greater percentage of brightness, color and/or saturation less of the respective media)) and the smooth region of the first portion is a region arranged farther from the respective media and/or closer to the viewpoint of the user (e.g., a region of the first portion that is based by a smaller amount on the appearance of the content of the respective media (e.g., including a smaller percentage of brightness, color and/or saturation level of the respective media)). In some embodiments, displaying the second portion with a smooth surface that includes the texture of the second portion includes one or more characteristics of displaying the first portion with a smooth surface that includes the texture of the first portion. Displaying respective media with a simulated lighting effect in a virtual three-dimensional environment including one or more portions that include an appearance based on a smooth surface that includes texture controls the effect of the visual appearance of the respective media on the appearance of the virtual three-dimensional environment, provides consistent visual feedback of the respective media in the one or more portions of the virtual three-dimensional environment, limits visual distractions (e.g., light flickering) that would otherwise be caused by the appearance of the respective media, and provides spatial perception by displaying a surface that helps the user feel spatially oriented in the virtual three-dimensional environment, thereby improving user device interaction and reducing user discomfort.

In some embodiments, the texture of the first portion and the texture of the second portion include a plurality of virtual features (e.g., ridges, bumps and/or valleys) of a small relative size (e.g., relative to a distance between the first portion and/or second portion to a current viewpoint of the user, and/or relative to a size of the first portion and/or second portion, such as being less than 0.1, 0.3, 0.5, 1, 3, 5, 10, 30 or 50% the size of the above) and having a magnitude of height relative to the virtual three-dimensional environment that is within a threshold amount (e.g., within 0.1, 0.3, 0.5, 1, 3, 5, 10, 20, 30 or 50%) of one another (2014) (e.g., including uniform depth and/or height of the virtual features), such as shown by the texture of the first portion 1916*a* and the second portion 1916*b* in FIG. 19B. In some embodiments, the plurality of virtual features includes uniform depth and/or height. In some embodiments, the plurality of virtual features is spatially distributed throughout the first portion and the second portion. In some embodiments, the plane of projection (e.g., extending along a direction of an axis (e.g., an axis parallel to a first dimension of the respective media)) of the plurality of virtual features relative to the virtual three-dimensional environment is uniform throughout the first portion and the second portion. In some embodiments, the size and/or height of the plurality of virtual features relative to the virtual three-dimensional environment is based on a uniform arrangement of the one or more virtual features throughout the first portion and the second portion. For example, the uniform arrangement includes arranging the plurality of virtual features in a pattern of alternating height (e.g., within the threshold amount of one another (e.g., relative to the three-dimensional environment)) relative to the virtual three-dimensional environment (e.g., the pattern includes placement of a first virtual feature of the plurality of virtual features including a first height relative to the virtual three-dimensional environment adjacent to a second virtual feature of the plurality of virtual features including a second height, within the threshold amount of the first height, relative to the virtual three-dimensional environment, and continuing the pattern throughout the first portion and second portion). In some embodiments, the plurality of virtual features is arranged in a pattern relative to a current viewpoint of a user of the computer system. For example, a uniform arrangement of the plurality of virtual features includes arranging the plurality of virtual features in a pattern of alternating depth relative to the current viewpoint of the user (e.g., the pattern includes arranging a first virtual feature (e.g., a bump and/or ridge) of the plurality of virtual features to extend toward the user's viewpoint relative to the virtual three-dimensional environment and arranging a second virtual feature of the plurality of virtual features to extend away from the user's viewpoint relative to the virtual three-dimensional environment and continuing the pattern throughout the first portion and/or second portion). In some embodiments, the plurality of virtual features is more visible (e.g., the ridges, bumps and/or valleys of the texture are more visually prominent from a viewpoint of the user) based on the location of a viewpoint of the user relative to the respective media in the virtual three-dimensional environment. For example, from a first viewpoint (e.g., a viewpoint closer to the respective media relative to the virtual three-dimensional environment), the plurality of virtual features is more visible to the user compared to a second viewpoint (e.g., a viewpoint farther from the respective media relative to the virtual three-dimensional environment) of the plurality of available viewpoints in the virtual three-dimensional environment. Displaying respective media with a simulated lighting effect in a virtual three-dimensional environment including one or more portions that include an appearance based on a texture that includes a plurality of virtual features and the appearance of the respective media provides a more uniformed simulated lighting effect in the virtual three-dimensional environment, thereby limiting distractions in the virtual three-dimensional environment that would otherwise be caused by displaying the respective media and improving user device interaction, and provides spatial perception by displaying a plurality of visual features that help the user feel spatially oriented in the virtual three-dimensional environment, thereby reducing user discomfort.

In some embodiments, the texture of the first portion and the texture of the second portion include a plurality of virtual features that extend in a direction within a threshold angle (e.g., 0, 1, 3, 5, 10, or 15 degrees) of being parallel to a first dimension of the respective media (2016) (e.g., a width of the respective media spanning a lateral/horizontal direction relative to a user's viewpoint of the respective media and/or a plane of the respective media), such as the texture of first portion 1916*a* and second portion 1916*b* being lateral relative to the current viewpoint of user 1948 shown in FIG. 19B. In some embodiments, the plurality of virtual features includes one or more characteristics of the plurality of virtual features as described with reference to step(s) 2014. In some embodiments, the plurality of virtual features includes surfaces that project along the direction (e.g., the plurality of virtual features are ridges and/or valleys elongated in the direction across the first portion and the second portion). In some embodiments, the direction in which the plurality of virtual features elongate is parallel to or within the threshold angle of being parallel to the first dimension of the respective media. In some embodiments, the plurality of virtual features of the texture of the first portion and the texture of the second portion extend laterally (e.g., horizontally) relative to a viewpoint of the user to the respective media. Displaying respective media with a simulated lighting effect in a virtual three-dimensional environment including one or more portions that include an appearance based on a texture that includes a plurality of virtual features extending in a direction parallel (e.g., or within a threshold angle of parallel) to a dimension of the respective media provides a uniform arrangement of the virtual features of the texture that limits distraction from the respective media and provides uniform visual feedback of the respective media, thereby improving user device interaction.

In some embodiments, in response to the request to display the respective media in the virtual three-dimensional environment, in accordance with a determination that the respective media is the first media, the first media having a first aspect ratio (e.g., such as the aspect ratio of respective media 1904*a* shown in FIG. 19B) relative to a first axis and a second axis in the virtual three-dimensional environment (2018*a*), the computer system displays (2018*b*) the first media in the virtual three-dimensional environment with a first dimension (e.g., a height of the first media relative to the virtual three-dimensional environment) of a first value along the first axis, and a second dimension (e.g., a width of the first media relative to the virtual three-dimensional environment) of a second value along the second axis (e.g., such as the value of the length and the width of respective media 1904*a* shown in FIG. 19B), wherein the first value and the second value correspond to the first aspect ratio. In some embodiments, the first aspect ratio is a ratio of the height to the width of the first media. In some embodiments, the first value is a value of the height of the first media relative to the virtual three-dimensional environment. In some embodiments, the second value is a value of the width of the first media relative to the virtual three-dimensional environment.

In some embodiments, the computer system receives (2018*c*), via the one or more input devices, a request to change the display of the respective media in the virtual three-dimensional environment, such as an input provided through a user interface or a menu associated with the virtual three-dimensional environment, such as content control user interface 1908 shown in FIGS. 19E and 19E1. In some embodiments, the request to change the display of the respective media in the virtual three-dimensional environment includes a selection input directed at a selectable option of a content control user interface object (e.g., as described with reference to method 2100). For example, the content control user interface object includes one or more selectable options to display other respective media in the virtual three-dimensional environment. In some embodiments, the request to change the display of the respective media in the virtual three-dimensional environment includes a verbal command and/or a touch input provided on a touch-sensitive display of the computer system.

In some embodiment, in response to the request to change the display of the respective media in the virtual three-dimensional environment, in accordance with a determination that the request is to change the display of the respective media in the virtual three-dimensional environment from the first media to second media (e.g., such as respective media 1904*b* shown in FIG. 19D), different from the first media, the second media having a second aspect ratio relative to the first axis and the second axis in the three-dimensional environment, different from the first aspect ratio (2018*d*), the computer system displays (2018*e*) the second media in the virtual three-dimensional environment with the first dimension of the first value along the first axis, and the second dimension of a third value, different from the second value, along the second axis, wherein the first value and the third value correspond to the second aspect ratio, such as shown by displaying respective media 1904*b* in virtual environment 1918 in FIG. 19D with same height as respective media 1904*a* in FIG. 19B. In some embodiments, the computer system maintains display of the virtual three-dimensional environment while changing the display of the respective media in the virtual three-dimensional environment. In some embodiments, the second aspect ratio is a ratio of the height to the width of the second media. In some embodiments, the third value is a value of the width of the second media relative to the virtual three-dimensional environment that is larger or smaller than the width of the first media relative to the virtual three-dimensional environment. In some embodiments, as the computer system changes the display of the respective media in the virtual three-dimensional environment from the first media to the second media, the computer system displays the second media with the same height as the first media relative to the virtual three-dimensional environment and with different width compared to the first media relative to the virtual three-dimensional environment based on the difference in the aspect ratio of the second media compared to the first media. Changing the display of respective media in a virtual three-dimensional environment from first media that includes a first aspect ratio to second media that includes a second aspect ratio different from the first aspect ratio by displaying the second media with a same first dimension (e.g., height) as the first media and a different second dimension (e.g., width) from the first media based on the difference between the first aspect ratio and the second aspect ratio maintains consistent position of the respective media relative to the virtual three-dimensional environment and does not require the user to modify their current viewpoint relative to the respective media when changing the respective media displayed, thereby limiting the amount of required user inputs and improving user device interaction.

In some embodiments, while displaying the respective media in the virtual three-dimensional environment at a first location in the virtual three-dimensional environment from a first viewpoint of a plurality of available viewpoints associated with the virtual three-dimensional environment (e.g., such as the display of respective media 1904*b* from viewpoint 1940*c* in FIGS. 19E and 19E1, wherein the first viewpoint has a first spatial arrangement relative to the respective media in the virtual three-dimensional environment, the computer system receives (2020*a*), via the one or more input devices, an input corresponding to a selection of a second viewpoint of the plurality of available viewpoints associated with the virtual three-dimensional environment, such as the selection of viewpoint 1940*e* shown in FIG. 19F. In some embodiments, in response to receiving the input, the computer system displays (2020*b*) the respective media at the first location in the virtual three-dimensional environment from the second viewpoint of the plurality of available viewpoints, wherein the second viewpoint has a second spatial arrangement relative to the respective media in the virtual three-dimensional environment different from the first spatial arrangement, such as shown by the different in spatial arrangement of respective media 1904*b* to the current viewpoint of user 1948 from viewpoint 1940*c* in FIG. 19F to viewpoint 1940*e* in FIG. 19H. In some embodiments, the plurality of available viewpoints include one or more characteristics of the plurality of available viewpoints as described with reference to method 2100. In some embodiments, the first spatial arrangement relative to the respective media includes one or more characteristics of the first spatial arrangement relative to the media as described with reference to method 2100. In some embodiments, the input corresponding to a selection of the second viewpoint of the plurality of available viewpoints includes one or more characteristics of the first input as described with reference to method 2100. In some embodiments, displaying the respective media at the first location in the virtual three-dimensional environment from the second viewpoint includes one or more characteristics of displaying the respective media at the first location in the virtual environment from the second viewpoint as described with reference to method 2100. In some embodiments, the second spatial arrangement relative to the media in the virtual three-dimensional environment includes one or more characteristics of the second spatial arrangement relative to the media as described with reference to method 2100. In some embodiments, the computer system maintains display of the virtual three-dimensional environment while changing the display of the respective media from the first viewpoint to the second viewpoint (e.g., the first portion, the second portion and the third portion of the virtual three-dimensional environment continue to be displayed in the virtual three-dimensional environment). In some embodiments, the simulated lighting effect, as described with reference to step(s) 2002, continues to be displayed in the virtual three-dimensional environment when the respective media is displayed from the second viewpoint of the plurality of available viewpoints. In some embodiments, changing the display of the respective media from the first viewpoint to the second viewpoint includes movement of the current viewpoint of the user relative to the virtual three-dimensional environment. In some embodiments, movement of the current viewpoint of the user relative to the virtual three-dimensional environment corresponds to a greater amount of movement (e.g., relative to distance of the movement and/or change in height during the movement) than movement of the current viewpoint of the user relative to the user's physical environment (e.g., because one or more objects of the user's physical environment (e.g., walls of a room and/or furniture in a room) prevents the user from performing the same amount of movement relative to the user's physical environment as the movement of the current viewpoint of the user relative to the virtual three-dimensional environment and/or because the user has not moved at all in their physical environment). In some embodiments, changing the display of the respective media from the first viewpoint to the second viewpoint does not include physical movement of the user relative to the user's physical environment. For example, the second viewpoint of the plurality of available viewpoints includes a distance from the respective media and/or a viewing angle to the respective media that would not be possible to view the respective media from based on physical movement of the user (e.g., one or more objects of the user's physical environment (e.g., walls of a room and/or furniture in a room) would prevent the user from physically changing their viewpoint to include the distance from the respective media and/or viewing angle to the respective media that is associated with the second viewpoint). Changing a current viewpoint of a user relative to respective media in a virtual three-dimensional environment to a viewpoint of a plurality of available viewpoints in response to receiving an input corresponding to selection of the viewpoint of a plurality of available viewpoints provides a user discretion in choosing a preferred spatial arrangement between their current viewpoint and the respective media in the virtual three-dimensional environment (e.g., such that the user can most comfortably view the respective media and a simulated lighting effect displayed in the virtual three-dimensional environment) and reduces the amount of user input needed to change the current viewpoint, thereby improving user device interaction and reducing discomfort.

In some embodiments, the second viewpoint differs from the first viewpoint in distance from the respective media in the virtual three-dimensional environment and in height relative to a portion of the respective media in the virtual three-dimensional environment (2022) (e.g., such as described with reference to method 2100), such as shown by the difference in distance between viewpoint 1940*c* (e.g., as shown in FIG. 19F and viewpoint 1940*e* (e.g., as shown in FIG. 19H) from respective media 1940*b*. In some embodiments, the first viewpoint includes a first distance from the respective media relative to the virtual three-dimensional environment, and the second viewpoint includes a second distance from the respective media relative to the virtual three-dimensional environment that is different from the first distance. In some embodiments, the second viewpoint includes a different viewing angle to the respective media from the first viewpoint. For example, a viewpoint of the plurality of available viewpoint that includes a shorter distance to the respective media includes a viewing angle from a more downward viewpoint (e.g., from a height in the virtual three-dimensional environment below a vector perpendicular to the surface (e.g., at the center) of the respective media), and a viewpoint of the plurality of available viewpoints that includes a longer distance to the respective media that includes a more upward viewpoint (e.g., from a height in the virtual three-dimensional environment above a vector perpendicular to the surface (e.g., at the center) of the respective media). In some embodiments, selecting the second viewpoint of the plurality of available viewpoints in the virtual three-dimensional environment includes selecting a selectable value of a first spatial arrangement characteristic as described with reference to method 2100. In some embodiments, the portion of the respective media is a center portion of the respective media. Changing a distance of a current viewpoint of a user relative to respective media in a virtual three-dimensional in response to receiving an input corresponding to selection of a viewpoint of a plurality of available viewpoints provides a user discretion in choosing a preferred spatial arrangement between their current viewpoint and the media in the virtual three-dimensional environment (e.g., such that the user can most comfortably view the respective media and a simulated lighting effect displayed in the virtual three-dimensional environment) and reduces the amount of user input needed to change the distance of the current viewpoint, thereby improving user device interaction and reducing discomfort.

In some embodiments, the second viewpoint differs from the first viewpoint in height relative to the respective media in the virtual three-dimensional environment (2024) (e.g., as described with reference to method 2100), such as shown by the difference in height between viewpoint 1940*c* (e.g., as shown in FIG. 19F) and viewpoint 1940*e* (e.g., as shown in FIG. 19H) relative to respective media 1904*b*. The second viewpoint and the first viewpoint optionally include the same distance from the respective media in the virtual three-dimensional environment. In some embodiments, selecting the second viewpoint of the plurality of available viewpoints in the virtual three-dimensional environment includes selecting a selectable value of a second spatial arrangement characteristic as described with reference to method 2100. In some embodiments, the second viewpoint includes a different viewing angle to the respective media compared to the first viewpoint. In some embodiments, the difference in height from the first viewpoint to the second viewpoint relative to the media in the virtual three-dimensional environment is 0.1, 0.2, 0.3, 0.4, 0.5, 0.6, 0.7, 0.8, 0.9, 1, 2, 5, 7 or 10 meters. In some embodiments, the height of the second viewpoint is from a location below a vector that is perpendicular to the surface (e.g., at the center of) of the respective media in the virtual three-dimensional environment (e.g., as described with reference to method 2100). In some embodiments, the height of the second viewpoint is from a location perpendicular to the surface (e.g., at the center) of the respective media in the virtual three-dimensional environment (e.g., as described with reference to method 2100). In some embodiments, the height of the second viewpoint is from a location above a vector that is perpendicular to the surface of the respective media in the virtual three-dimensional environment (e.g., a normal vector projected from a center of the surface of the respective media) (e.g., as described with reference to method 2100). Changing a height of a current viewpoint of a user relative to respective media in a virtual three-dimensional in response to receiving an input corresponding to selection of a viewpoint of a plurality of available viewpoints in the virtual three-dimensional environment provides a user discretion in choosing a preferred spatial arrangement between their current viewpoint and the respective media in the virtual three-dimensional environment (e.g., such that the user can most comfortably view the respective media and a simulated lighting effect displayed in the virtual three-dimensional environment) and reduces the amount of user input needed to change the height of the current viewpoint, thereby improving user device interaction and reducing discomfort.

In some embodiments, while displaying the respective media in the virtual three-dimensional environment, the computer system detects (2026*a*) a change in a current viewpoint of a user of the computer system relative to the virtual three-dimensional environment from a first viewpoint directed toward the respective media to a second viewpoint not directed toward the respective media (e.g., directed away from the respective media such that the respective media is no longer within a field of view of the user at the second viewpoint), such as the change in the current viewpoint of the user shown from FIG. 19B (e.g., directed toward respective media 1904*a*) to FIG. 19C (e.g., not directed toward respective media 1904*a*). In some embodiments, the user has a first field of view of the virtual three-dimensional environment from the first viewpoint, the first field of view including a location of the respective media in the virtual three-dimensional environment. In some embodiments, the user has a second field of view of the virtual three-dimensional environment from the second viewpoint, the second field of view not including the location of the respective media in the virtual three-dimensional environment. In some embodiments, the change in the current viewpoint of the user of the computer system relative to the virtual three-dimensional environment includes a change in a spatial arrangement (e.g., position and/or orientation) of a portion of the user (e.g., the user's head) relative to the virtual three-dimensional environment. In some embodiments, the change in the current viewpoint of the user includes physical movement of the user relative to a physical environment of the user (e.g., moving to a different location in a physical environment, and/or movement of the user's body that causes their field of view relative to the virtual three-dimensional environment to change).

In some embodiments, in response to detecting the change in the current viewpoint of the user, the computer system ceases display of the respective media and displays (2026*b*) a fourth portion of the virtual three-dimensional environment with an appearance independent of the simulated lighting effect that does not include the texture of the first portion of the virtual three-dimensional environment and the texture of the second portion of the virtual three-dimensional environment, such as the fourth portion 1916*d* shown in FIG. 19C. In some embodiments, the fourth portion of the virtual three-dimensional environment includes one or more characteristics of the third portion of the virtual three-dimensional environment as described with reference to step(s) 2002. In some embodiments, the fourth portion of the virtual three-dimensional environment includes simulated empty space and does not include any virtual surface, as described with reference to the third portion of the virtual three-dimensional environment in step(s) 2032. Displaying respective media with a simulated lighting effect in a virtual three-dimensional environment including one or more portions that include an appearance based on a texture and the appearance of the respective media, and one or more portions, including a portion that is displayed when a current viewpoint of a user is not directed toward the respective media, that include an appearance independent of the respective media controls the effect of the visual appearance of the respective media on the appearance of the virtual three-dimensional environment and limits visual distractions (e.g., light flickering) that would otherwise be caused by the appearance of the respective media, thereby improving user device interaction.

In some embodiments, displaying the fourth portion of the virtual three-dimensional environment includes displaying a representation of a horizon (e.g., corresponding to the physical horizon of the physical environment of the user and/or a virtual horizon of the virtual three-dimensional environment) within the fourth portion of the virtual three-dimensional environment (2028), such as horizon representation 1920 shown within fourth portion 1916*d* in FIG. 19C. In some embodiments, the horizon is a visual line displayed in the virtual three-dimensional environment that extends across the fourth portion of the virtual three-dimensional environment (e.g., laterally/horizontally relative to the current viewpoint of the user). The visual line of the horizon optionally includes curvature (e.g., the horizon partially surrounds the user relative to the current viewpoint of the user). In some embodiments, as the current viewpoint of the user changes from the first viewpoint to the second viewpoint, the computer system maintains the location of the horizon in the virtual three-dimensional environment. In some embodiments, changing the current viewpoint of the user changes the viewing angle of the current viewpoint of the user to the horizon in the fourth portion of the virtual three-dimensional environment. For example, if the second viewpoint of the user includes a height relative to the respective media (e.g., as described with reference to step(s) 2024) that is higher than the height of the first viewpoint of the user, then the second viewpoint will include a more downward viewing angle to the horizon compared to the first viewpoint. For example, if the second viewpoint of the user includes a height relative to the virtual three-dimensional environment that is lower than a height of the first viewpoint of the user, then the second viewpoint will include a more upward viewing angle to the horizon line compared to the first viewpoint. In some embodiments, the horizon is not within a field of view of the user when the current viewpoint of the user relative to the virtual three-dimensional environment is directed toward the respective media (e.g., because the horizon is not displayed in the same portion of the virtual three-dimensional environment as the respective media). In some embodiments, at least a portion of the horizon line is in the field of view of the user when the current viewpoint of the user relative to the virtual three-dimensional environment is directed toward the respective media. In some embodiments, at least a portion of the respective media is in the field of view of the user when the current viewpoint of the user relative to the virtual three-dimensional environment is directed toward the fourth portion of the virtual three-dimensional environment. In some embodiments, the fourth portion of the virtual three-dimensional environment does not include the display of any virtual objects, content and/or representations (e.g., representations of physical objects in the user's physical environment) except for the representation of the horizon. Displaying a horizon in a portion of a virtual three-dimensional environment that does not include the respective media displayed in the virtual three-dimensional environment provides a user viewing the three-dimensional environment with improved spatial perception, thereby limiting motion sickness and improving user device interaction.

In some embodiments, in response to the request to display the respective media in the virtual three-dimensional environment, in accordance with a determination that the respective media is a third media, different from the first media and the second media, forgoing the display of the respective media in the virtual three-dimensional environment (2030), such as forgoing display of respective media 1904*a* (e.g., shown in FIG. 19A) in virtual environment 1918 (e.g., shown in FIG. 19B) in accordance with a determination that respective media 1904*a* is not permitted and/or configured to be displayed in virtual environment 1918. In some embodiments, the request to display the respective media in the virtual three-dimensional environment includes one or more characteristics of the request to change the display of the respective media in the virtual three-dimensional environment described with reference to step(s) 2018. In some embodiments, the third media is media that is not permitted to be displayed in the virtual three-dimensional environment (e.g., the third media includes content that is not video content, such as an image, a window of an application, or a video game). In some embodiments, the third media is media that is permitted to be displayed in an environment other than the virtual three-dimensional environment (e.g., the environment other than the virtual three-dimensional environment does not include one or more characteristics of the first portion, second portion and/or third portion of the virtual three-dimensional environment). For example, in response to a request to display the third media in an environment other than the virtual three-dimensional environment, the third media is displayed in the environment without the simulated lighting effect. In some embodiments, the computer system notifies a user of the computer system that the third media is not permitted to be displayed in the virtual three-dimensional environment in response to the request to display the third media in the virtual three-dimensional environment. In some embodiments, in response to a determination that the third media is media that is permitted to be displayed in the virtual three-dimensional environment, the computer system displays the third media in the virtual three-dimensional environment. Permitting the display of some media in a virtual three-dimensional environment that includes displaying respective media with a simulated lighting effect and not permitting the display of other media ensures that only media compatible with the simulated lighting effect is displayed in the virtual three-dimensional environment, thereby limiting errors in interaction and improving user device interaction.

In some embodiments, the third portion of the virtual three-dimensional environment includes simulated empty space and does not include any virtual surface (and/or any other virtual content) (2032), such as third portion 1916*c* including simulated empty space and not including a virtual surface (e.g., compared to the virtual surfaces included in first portion 1916*a* and second portion 1916*b*) as shown in FIG. 19B. In some embodiments, displaying the third portion of the virtual three-dimensional environment with the simulated empty space includes not displaying virtual objects and/or virtual features within the third portion of the virtual three-dimensional environment. In some embodiments, the third portion of the virtual three-dimensional environment includes a consistent visual appearance relative to a viewpoint of the user (e.g., the entire third portion includes the same color, shade, tone, saturation and/or brightness relative to a viewpoint of the user). In some embodiments, there is no visual distinction between the third portion of the virtual three-dimensional environment and a fourth portion of the three-dimensional environment (e.g., the fourth portion of the virtual three-dimensional environment described with reference to step(s) 2026). In some embodiments, the third portion does not include a horizon as described with reference to step(s) 2028. In some embodiments, not including any virtual surface in the display of the third portion includes not displaying a smooth surface as described with reference to step(s) 2012. In some embodiments, not including any virtual surface in the display of the third portion includes not displaying the texture of the first portion and/or the second portion within the third portion. In some embodiments, displaying the simulated empty space includes not displaying one or more visual characteristics of the appearance of the respective media within the third portion (e.g., the third portion does not include color, brightness and/or saturation characteristics of the respective media). Displaying respective media with a simulated lighting effect in a virtual three-dimensional environment including one or more portions that include an appearance based on a texture and the appearance of the respective media and one or more portions that include an appearance based on simulated empty space, and not based on texture, limits visual distractions (e.g., light flickering) that would otherwise be caused by the appearance of the respective media and provides spatial perception by displaying texture in only certain portions of the virtual three-dimensional environment, thereby improving user device interaction and reducing user discomfort.

In some embodiments, displaying the respective media in the virtual three-dimensional environment includes displaying the respective media without a visual distinction (and/or demarcation and/or separation) between the respective media and the third portion of the virtual three-dimensional environment (2034), such as displaying respective media 1904*a* with no visual distinction with virtual environment 1918 (e.g., with the third portion 1916*c* of virtual environment 1918) visible to user 1948 as shown in FIG. 19B. In some embodiments, displaying the respective media without a visual distinction between the respective media and the third portion includes not displaying a border around the respective media (e.g., around a perimeter of the respective media) in the virtual three-dimensional environment. For example, the perimeter of the respective media is not displayed with visual prominence (e.g., a border is not displayed along the perimeter of the respective media that visually contrasts the first portion, second portion and/or third portion of the virtual three-dimensional environment) and therefore, from the current viewpoint of the user, the perimeter of the respective media transitions directly (e.g., immediately) into the first, second and/or third portion (e.g., displaying the respective media in the virtual three-dimensional environment does not include displaying one or more visual elements between the respective media and the first portion, second portion and/or third portion). Displaying respective media with a simulated lighting effect in a virtual three-dimensional environment that does not include displaying visual distinction between the respective media and a portion of the virtual three-dimensional environment provides improved simulation of a natural lighting effect (e.g., light spill) and reduces the amount of clutter displayed in the virtual three-dimensional environment, thereby improving user device interaction.

It should be understood that the particular order in which the operations in method 2000 have been described is merely exemplary and is not intended to indicate that the described order is the only order in which the operations could be performed. One of ordinary skill in the art would recognize various ways to reorder the operations described herein.

FIGS. 21A-21E is a flowchart for illustrating a method 2100 for displaying media in a virtual environment from a viewpoint of a plurality of available viewpoints in the virtual environment in accordance with some embodiments. In some embodiments, the method 2100 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2100 are, optionally, combined and/or the order of some operations is, optionally, changed.

In some embodiments, the method 2100 is performed at a computer system (e.g., computer system 101) in communication with a display generation component (e.g., display generation component 120) and one or more input devices (e.g., input device 314). In some embodiments, the computer system has one or more of the characteristics of the computer systems of methods 800, 1000, 1200, 1400, 1600, 1800 and/or 2000. In some embodiments, the display generation component has one or more of the characteristics of the display generation component of methods 800, 1000, 1200, 1400, 1600, 1800 and/or 2000. In some embodiments, the one or more input devices have one or more of the characteristics of the one or more input devices of methods 800, 1000, 1200, 1400, 1600, 1800 and/or 2000.

In some embodiments, the computer system displays (2102*a*), via the display generation component, media at a first location in a virtual environment from a current viewpoint of a user of the computer system, wherein the current viewpoint of the user is a first viewpoint of a plurality of available viewpoints associated with the virtual environment, such as the plurality of available viewpoints 1940*a*-1940*f* shown in FIGS. 19B-19K, and the first viewpoint has a first spatial arrangement relative to the media in the virtual environment, such as the spatial arrangement of viewpoint 1940*c* relative to respective media 1904*b* shown in FIGS. 19E and 19E1. In some embodiments, the virtual environment includes one or more characteristics of the virtual environment for presenting respective media as described with reference to method 2000. In some embodiments, the media includes one or more characteristics of the respective media described with reference to method 2000. In some embodiments, displaying the media at the first location includes displaying the media at a location visible to the user based on the current viewpoint of the user relative to the virtual environment. In some embodiments, the available viewpoints associated with the virtual environment comprise different spatial arrangements relative to the media in the virtual environment. For example, an available viewpoint corresponds to one or more selectable value selected by the user (e.g., such as through an input as described with reference to the first input) that defines the first spatial arrangement of the user's viewpoint relative to the media in the virtual environment. In some embodiments, the one or more selectable values correspond values for one or more spatial arrangement characteristics that define the spatial arrangement of the viewpoint of the user relative to the media in the virtual environment. In some embodiments, selecting a selectable value for a spatial arrangement characteristic includes changing the horizontal and/or vertical viewing angle of the user's viewpoint relative to the media in the virtual environment. In some embodiments, selecting a selectable value for a spatial arrangement characteristic includes changing the spatial distance of the viewpoint of the user from the media relative to the virtual environment (e.g., the media appears farther or closer to the user relative to the user's viewpoint relative to the media in the virtual environment). In some embodiments, changing the spatial distance associated with the user's viewpoint from the media includes changing the viewing angle of the user's viewpoint relative to the media in the virtual environment. For example, increasing the spatial distance between the viewpoint of the user and the media in the virtual environment changes the viewing angle to be more downward to the media (e.g., with respect to a reference viewing angle that is perpendicular to the surface (e.g., at the center of) of the media in the virtual environment) relative to the media. For example, decreasing the spatial distance between the viewpoint of the user and the media in the virtual environment changes the viewing angle to be more upward to the media (e.g., with respect to a reference viewing angle that is perpendicular to the surface (e.g., at the center of) of the media in the virtual environment) relative to the media.

In some embodiments, while displaying the media from the first viewpoint of the plurality of available viewpoints, the computer system receives (2102*b*), via the one or more input devices, a first input corresponding to selection of a second viewpoint in the three-dimensional environment, such as the input provided (e.g., through gaze 1912 and the air gesture provided by hand 1906) on environment selection user interface 1926 shown in FIG. 19F, wherein the second viewpoint has a second spatial arrangement relative to the media in the virtual environment, such as the spatial arrangement relative to respective media 1904*b* associated with viewpoint 1940*e* (e.g., as shown in legend 1952 in FIGS. 19B-19K, and as shown from the display of respective media 1904*b* from viewpoint 1940*e* in FIG. 19H). In some embodiments, the first input includes one or more characteristics of the first input as described with reference to method 2000. The first input optionally does not include movement (e.g., physical movement) detected from a user of the computer system (e.g., movement of a portion of a user (e.g., the user's head and/or eyes) and/or movement of the computer system that moves the viewpoint of the user relative to the virtual environment). In some embodiments, the first input includes a selection input (e.g., including one or more characteristics of a selection input as described with reference to step(s) 2120) directed at a content control user interface and/or environment selection user interface. In some embodiments, the content control user interface and/or environment selection user interface includes a menu including a first group of selectable values corresponding to selectable values for a first spatial arrangement characteristic, and a second group of selectable values corresponding to selectable values for a second spatial arrangement characteristic different from the first spatial arrangement characteristic. For example, a first spatial arrangement characteristic corresponds to a distance of the current viewpoint of the user from the media in the virtual environment. For example, a second spatial arrangement characteristic corresponds to a vertical and/or height position of the viewpoint of the user relative to the media in the virtual environment (e.g., changing the vertical and/or height position of the viewpoint relative to the virtual environment changes the vertical viewing angle of the viewpoint to the media in the virtual environment). In some embodiments, selection of the second viewpoint includes selection of a selectable value from a group of selectable values for the first spatial arrangement characteristic and selection of a selectable value from a group of selectable values for the second spatial arrangement characteristic. In some embodiments, selection of different combinations of the selectable values for the first spatial arrangement characteristic and the second spatial arrangement characteristic correspond to the selection of different viewpoints of the available viewpoints associated with the virtual environment. In some embodiments, the first input includes changing the value of the first spatial arrangement characteristic. In some embodiments, the first input includes changing the value of the second spatial arrangement characteristic. In some embodiments, the first input includes changing the value of the first spatial arrangement characteristic and the second spatial arrangement characteristic. In some embodiments, the selectable values for the first spatial arrangement characteristic are displayed to the user as selectable rows in the virtual environment, and the selectable values for the second spatial arrangement characteristic are displayed to the user as selectable heights within the selectable row in the virtual environment (e.g., two or more of the selectable rows in the virtual environment includes a corresponding plurality of selectable heights (e.g., two selectable heights) of the viewpoint relative to the media). In some embodiments, selecting a row corresponds to selecting a value for the first spatial arrangement characteristic (e.g., the spatial distance of the viewpoint of the user from the media in the virtual environment) and selecting a height corresponds to selecting a value for the second spatial arrangement characteristic (e.g., the vertical viewing angle and/or height of the viewpoint of the user to the media in the virtual environment).

In some embodiments, in response to receiving the first input, the computer system displays (2102*c*), via the display generation component, the media at the first location in the virtual environment from the second viewpoint of the plurality of available viewpoints, such as the display of respective media 1904*b* from viewpoint 1940*e* shown in FIG. 19H. In some embodiments, the second viewpoint of the plurality of available viewpoints includes a different spatial distance and/or orientation (e.g., viewing angle) relative to the media in the virtual environment compared to the first viewpoint of the plurality of available viewpoints. In some embodiments, the second spatial arrangement corresponds to a combination of a selected value of the first spatial arrangement characteristic and a selected value of the second spatial arrangement characteristic. In some embodiments, if the first input is not detected by the computer system, the computer system maintains the current viewpoint of the user relative to the media in the virtual environment at the first viewpoint, and the computer system maintains the first spatial arrangement between the current viewpoint of the user and the media in the virtual environment. In some embodiments, displaying the media at the first location in the virtual environment from the second viewpoint of the plurality of available viewpoints includes movement of the current viewpoint of the user relative to the virtual environment from the first viewpoint of the plurality of available viewpoints to the second viewpoint of the plurality of available viewpoints. In some embodiments, the movement of the current viewpoint of the user relative to the virtual environment corresponds to a greater amount of movement (e.g., relative to distance of the movement and/or change in height during the movement) than movement of the current viewpoint of the user relative to the user's physical environment (e.g., because one or more objects of the user's physical environment (e.g., walls of a room and/or furniture in a room) prevents the user from performing the same amount of movement in the user's physical environment as the movement of the current viewpoint of the user relative to the virtual environment and/or because the user has not moved at all in their physical environment). In some embodiments, movement of the current viewpoint relative to the virtual environment does not include (e.g., or correspond to) movement of the current viewpoint of the user relative to the user's physical environment. Changing the display of a current viewpoint of a user relative to media in a virtual environment from a first viewpoint of a plurality of available viewpoints to a second viewpoint of a plurality of available viewpoints in response to receiving an input corresponding to selection of the second viewpoint of the plurality of available viewpoints provides a user discretion in choosing a preferred spatial arrangement between their current viewpoint and the media in the virtual environment (e.g., such that the user can most comfortably view the media in the virtual environment), and provides viewing options that would otherwise not be available based on the user's physical environment (e.g., due to one or more physical objects in the user's physical environment that would prevent the user from viewing the media from a distance and/or viewing angle associated with the second viewpoint), thereby improving user device interaction and reducing discomfort.

In some embodiments, the first viewpoint includes a first distance from the media relative to the virtual environment and the second viewpoint includes a second distance, different from the first distance, from the media relative to the virtual environment (2104), for example as shown by the distance from respective media when viewing respective media 1904*b* from viewpoint 1940*e* (e.g., shown in FIG. 19H) compared to from viewpoint 1940*c* (e.g., shown in FIG. 19F). In some embodiments, the second distance is a distance that is farther from the media compared to the first distance. In some embodiments, the second distance is a distance that is closer to the media compared to the first distance. In some embodiments, changing a distance of the viewpoint of the user from the media relative to the virtual environment also includes changing a viewing angle of the viewpoint relative to the media. For example, changing a current viewpoint of the user to a viewpoint that is farther from the media includes changing the viewing angle of the current viewpoint to be from a higher viewpoint relative to a vector perpendicular to the content (e.g., at the center of the content) in the virtual environment. For example, changing a current viewpoint of the user to a viewpoint that is closer to the media includes changing the viewing angle of the current viewpoint of the user to be from a lower viewpoint relative to a vector perpendicular to the content (e.g., at the center of the content) in the virtual environment. In some embodiments, displaying the second viewpoint including the second distance includes displaying a transition that includes changing the distance of the current viewpoint of the user from the first distance to the second distance (e.g., as described with reference to the animated transition in step(s) 2138-2140). Changing the display of a current viewpoint of a user relative to media in a virtual environment from a first viewpoint of a plurality of available viewpoints including a first distance from the media to a second viewpoint of a plurality of available viewpoints including a second distance, different from the first distance, from the media in response to receiving an input corresponding to selection of the second viewpoint of the plurality of available viewpoints provides a user discretion in choosing a preferred distance of their current viewpoint from the media in the virtual environment (e.g., such that the user can most comfortably view the media in the virtual environment), permits the user to view the media from the second distance even if viewing the media from the second distance would not be possible based on the user's physical environment (e.g., due to one or more physical objects in the user's physical environment that would prevent the user from viewing the media from the second distance), and does not require a user input to manually define a distance of the current viewpoint from the media, thereby improving user device interaction and reducing discomfort.

In some embodiments, the first viewpoint includes a first viewing angle (e.g., and/or a first height) to the media in the virtual environment and the second viewpoint includes a second viewing angle (e.g., and/or a second height), different from the first viewing angle (e.g., and/or different from the first height), to the media in the virtual environment (2106), such as the difference in viewing angle relative to respective media 1904*b* shown from viewpoint 1940*e* (e.g., shown in FIG. 19H) compared to from viewpoint 1940*c* (e.g., shown in FIG. 19F). In some embodiments, the second viewing angle is a viewing angle from a higher viewpoint relative to the media compared to the first viewing angle (e.g., the second viewing angle is more downward to the media compared to the first viewing angle). In some embodiments, the second viewing angle is a viewing angle from a lower viewpoint relative to the media compared to the first viewing angle (e.g., the second viewing angle is more upward to the media compared to the first viewing angle). In some embodiments, changing the height and/or viewing angle of the current viewpoint of the user does not include changing the distance of the current viewpoint of the user to the media relative to the virtual environment. In some embodiments, changing the height and/or viewing angle to the current viewpoint of the user does include changing the distance of the current viewpoint of the user to the media relative to the virtual environment. In some embodiments, displaying the second viewpoint including the second viewing angle includes displaying a transition that includes changing the viewing angle and/or height of the current viewpoint of the user relative to the media from the first viewing angle and/or height to a second viewing angle and/or height (e.g., as described with reference to the animated transition in step(s) 2138-2140). Changing the display of a current viewpoint of a user relative to media in a virtual environment from a first viewpoint of a plurality of available viewpoints including a first viewing angle to the media to a second viewpoint of a plurality of available viewpoints including a second viewing angle, different from the first viewing angle, to the media in response to receiving an input corresponding to selection of the second viewpoint of the plurality of available viewpoints provides a user discretion in choosing a preferred viewing angle from their current viewpoint to the media in the virtual environment (e.g., such that the user can most comfortably view the media in the virtual environment), permits the user to view the media from the second viewing angle even if viewing the media from the second viewing angle would not be possible based on the user's physical environment (e.g., due to one or more physical objects in the user's physical environment that would prevent the user from viewing the media from the second viewing angle), and does not require a user input to manually define the viewing angle of the current viewpoint to the media, thereby improving user device interaction and reducing discomfort.

In some embodiments, the second viewing angle to the media is from a location in the virtual environment below a vector perpendicular to a surface (e.g., a plane of the media in the virtual environment that the current viewpoint of the user is directed toward) of the media (2108), such as the viewing angle to respective media 1904*b* from viewpoint 1940*b* shown in FIG. 19K. In some embodiments, the second viewpoint is a viewpoint of the plurality of available viewpoints that includes a height relative to the virtual environment that is below the vector perpendicular to the surface (e.g., at the center of) of the media. Changing the display of a current viewpoint of a user relative to media in a virtual environment to a viewpoint of a plurality of available viewpoints, the viewpoint including a viewing angle below a vector perpendicular to a surface of the media, in response to receiving an input corresponding to selection of the viewpoint of the plurality of available viewpoints provides a user discretion in choosing a preferred viewing angle from their current viewpoint to the media in the virtual environment (e.g., such that the user can most comfortably view the media in the virtual environment), permits the user to view the media from the viewing angle even if viewing the media from the viewing angle would not be possible based on the user's physical environment (e.g., due to one or more physical objects in the user's physical environment that would prevent the user from viewing the media from the viewing angle), and does not require a user input to manually define the viewing angle of the current viewpoint to the media, thereby improving user device interaction and reducing discomfort.

In some embodiments, the second viewing angle to the media is from a location in the virtual environment included in a vector perpendicular to a surface of the media (2110), such as the viewing angle to respective media 1904*b* from viewpoint 1940*c* shown in FIGS. 19E and 19E1 (e.g., the first viewpoint is a viewpoint different from viewpoint 1940*c*). In some embodiments, the second viewpoint is a viewpoint of the plurality of available viewpoints that includes a height relative to the virtual environment that is at a location included in a vector perpendicular to the surface (e.g., at the center of) of the media. Changing the display of a current viewpoint of a user relative to media in a virtual environment to a viewpoint of a plurality of available viewpoint, the viewpoint including a viewing angle that is perpendicular to a surface of the media, in response to receiving an input corresponding to selection of the viewpoint of the plurality of available viewpoints provides a user discretion in choosing a preferred viewing angle from their current viewpoint to the media in the virtual environment (e.g., such that the user can most comfortably view the media in the virtual environment), permits the user to view the media from the viewing angle even if viewing the media from the viewing angle would not be possible based on the user's physical environment (e.g., due to one or more physical objects in the user's physical environment that would prevent the user from viewing the media from the viewing angle), and does not require a user input to manually define the viewing angle of the current viewpoint to the media, thereby improving user device interaction and reducing discomfort.

In some embodiments, the second viewing angle to the media is from a location in the virtual environment above a vector perpendicular to a surface of the media (2112), such as the viewing angle to respective media 1904*b* from viewpoint 1940*e* shown in FIG. 19H. In some embodiments, the second viewpoint is a viewpoint of the plurality of available viewpoints that includes a height relative to the virtual environment that is above the vector perpendicular to the surface (e.g., at the center of) of the media. Changing the display of a current viewpoint of a user relative to media in a virtual environment to a viewpoint of a plurality of available viewpoints, the viewpoint including a viewing angle above a vector perpendicular to a surface of the media, in response to receiving an input corresponding to selection of the viewpoint of the plurality of available viewpoints provides a user discretion in choosing a preferred viewing angle from their current viewpoint to the media in the virtual environment (e.g., such that the user can most comfortably view the media in the virtual environment), and permits the user to view the media from the viewing angle even if viewing the media from the viewing angle would not be possible based on the user's physical environment (e.g., due to one or more physical objects in the user's physical environment that would prevent the user from viewing the media from the viewing angle), thereby improving user device interaction and reducing discomfort.

In some embodiments, the first viewpoint includes a first distance from the media relative to the virtual environment and a first viewing angle (e.g., and/or a first height) to the media, and the second viewpoint includes a second distance, different from the first distance, from the media relative to the virtual environment and a second viewing angle (e.g., and/or a second height), different from the first viewing angle, to the media (2114), such as the difference between viewing respective media 1904*b* from viewpoint 1940*c* (e.g., as shown in FIGS. 19E and 19E1) to viewing respective media 1904*b* from viewpoint 1940*a* (e.g., as shown in FIG. 19J). In some embodiments, the first distance of the first viewpoint and the second distance of the second viewpoint include one or more characteristics of the first distance and the second distance described with reference to step(s) 2104. In some embodiments, the first viewing angle and/or first height of the first viewpoint and the second viewing angle and/or second height of the second viewpoint include one or more characteristics of the first viewing angle and/or first height and the second viewing angle and/or second height as described with reference to step(s) 2106. Changing the display of a current viewpoint of a user relative to media in a virtual environment from a first viewpoint of a plurality of available viewpoints including a first distance from the media and a first viewing angle to the media to a second viewpoint of a plurality of available viewpoints including a second distance from the media, different from the first distance, and a second viewing angle to the media, different from the first viewing angle, in response to receiving an input corresponding to selection of the second viewpoint of the plurality of available viewpoints provides a user discretion in choosing a preferred spatial arrangement between their current viewpoint and the media in the virtual environment (e.g., such that the user can most comfortably view the media in the virtual environment), permits the user to view the media from the second distance and second viewing angle even if viewing the media from the second distance and/or second viewing angle would not be possible based on the user's physical environment (e.g., due to one or more physical objects in the user's physical environment that would prevent the user from viewing the media from the second distance and/or second viewing angle), and does not require a user input to manually define the distance of the current viewpoint from the media and/or the viewing angle of the current viewpoint to the media, thereby improving user device interaction and reducing discomfort.

In some embodiments, displaying the media at the first location in the virtual environment from the second viewpoint in response to receiving the first input includes maintaining display of the media at the first location in the virtual environment while changing the current viewpoint of the user from the first viewpoint to the second viewpoint (2116), such as shown by the display of respective media 1904*b* in FIG. 19G while changing the current viewpoint of the user from viewpoint 1940*c* to viewpoint 1940*e*. In some embodiments, maintaining display of the media at the first location in the virtual environment includes maintaining playback of the media (e.g., as described with reference to step(s) 2142). In some embodiments, changing the current viewpoint of the user from the first viewpoint to the second viewpoint includes one or more characteristics of the animated transition from displaying the media at the first location from the first viewpoint to displaying the media at the first location from the second viewpoint as described with reference to step(s) 2138-2140. In some embodiments, the first viewpoint and the second viewpoint are viewpoints directed toward the media at the first location and changing the current viewpoint from the first viewpoint to the second viewpoint includes maintaining the current viewpoint of the user to be directed toward the media while changing the current viewpoint of the user from the first viewpoint to the second viewpoint. In some embodiments, the media maintains at the first location in the virtual environment when the user selects any viewpoint of the plurality of available viewpoints in the virtual environment. Maintaining display of the media at a location in a virtual environment while changing a current viewpoint of a user relative to the media from a first viewpoint of a plurality of available viewpoints in the virtual environment to a second viewpoint of a plurality of available viewpoints in the virtual environment enables the user to continue to interact with the media in the virtual environment while changing the current viewpoint to a preferred viewpoint, maintains consistent interaction of the user with the media, and maintains spatial consistency of the media in the virtual environment, thereby improving user device interaction.

In some embodiments, displaying the media at the first location in the virtual environment includes displaying the media concurrently with a simulated lighting effect that is based on content of the media and one or more textures of one or more portions of the virtual environment, wherein displaying the simulated lighting effect includes (2118*a*), displaying a first portion of the virtual environment with an appearance that is based on an appearance of content of the media and a texture of the first portion (2118*b*), such as the visual appearance of first portion 1916*a* displayed in virtual environment 1918 in FIG. 19B, displaying a second portion of the virtual environment with an appearance that is based on an appearance of content of the media and a texture of the second portion (2118*c*), such as the visual appearance of second portion 1916*b* displayed in virtual environment 1918 in FIG. 19B, and displaying a third portion of the virtual environment, that is between the first portion and the second portion, with an appearance that is independent of the content of the media (2118*d*), such as the position (e.g., between first portion 1916*a* and second portion 1916*b*) and visual appearance of third portion 1916*c* displayed in virtual environment 1918 in FIG. 19B. In some embodiments, displaying the first portion of the virtual environment with the appearance that is based on the appearance of content of the media and the texture of the first portion includes one or more characteristics of displaying the first portion of the virtual three-dimensional environment as described with reference to method 2000. In some embodiments, displaying the second portion of the virtual environment with the appearance that is based on the appearance of content of the media and the texture of the second portion includes one or more characteristics of displaying the second portion of the virtual three-dimensional environment as described with reference to method 2000. In some embodiments, displaying the third portion of the virtual environment with the appearance that is independent of the content of the media includes one or more characteristics of displaying the third portion of the virtual three-dimensional environment as described with reference to method 2000. Displaying media in a virtual environment with a simulated lighting effect that includes one or more portions that include an appearance based on a texture and the appearance of the respective media and one or more portions that include an appearance independent of the respective media controls the effect of the visual appearance of the respective media on the appearance of the virtual three-dimensional environment and limits visual distractions (e.g., light flickering) that would otherwise be caused by the appearance of the respective media and provides spatial perception by displaying visual features that help the user feel spatially oriented in the virtual three-dimensional environment, thereby improving user device interaction and reducing discomfort.

In some embodiments, while displaying the media at the first location in the virtual environment from the second viewpoint, the computer system receives (2120*a*), via the one or more input devices, a second input corresponding to a request to display the media in a second environment different from the virtual environment, such as through an input of a selectable option (e.g., selectable option 1954) shown in environment selection user interface 1926 (e.g., shown in FIG. 19H). In some embodiments, the second input is a selection input corresponding to a selection of a selectable option in a content control user interface (e.g., as described with reference to step(s) 2122). In some embodiments, the selection input includes the user directing attention toward the selectable option (e.g., by gazing at the selectable option for a threshold period of time (e.g., 0.1, 0.2 0.5, 1, 2, or 5 seconds)) and/or performing a respective air gesture. For example, the second input includes an air pinch of the thumb and a finger, an input on a touch-sensitive display (e.g., a touchpad) of the computer system (e.g., a force-sensitive input (e.g., a click of a touchpad) or a capacitive touch input (e.g., a swipe of a finger on a touch-sensitive display)) and/or a verbal input (e.g., a voice command). In some embodiments, the second environment has one or more of the characteristics of the three-dimensional and/or virtual environments described with reference to methods 800, 1000, 1200, 1400, 1600, 1800 and/or 2000.

In some embodiments, in response to receiving the second input, the computer system ceases (2120*b*) display of the media at the first location in the virtual environment and displaying the media in the second environment, such as ceasing display of respective media 1940*b* in virtual environment 1918 and displaying respective media 1940*b* in a virtual environment different from virtual environment 1918 (e.g., such as virtual environment 1960 shown in FIG. 19A). In some embodiments, displaying the media in the second environment does not include one or more characteristics of displaying the media concurrently with the simulated lighting effect as described with reference to step(s) 2118. In some embodiments, ceasing display of the media at the first location in the virtual environment and displaying the media in the second environment includes displaying a transition from the display of the virtual environment to the display of the second environment. For example, ceasing display of the media in the virtual environment and displaying the media in the second environment includes gradually displaying the second environment (e.g., by fading out the virtual environment over a period of time (e.g., 0.5, 1, 2, 5, 10, 15 or 20 seconds) while optionally fading in the second environment over the period of time). In some embodiments, the second environment corresponds to content presented through virtual scene applications, such as virtual scenes of a simulated physical space and/or object (e.g., such as a mountain scene or a beach scene). In some embodiments, the computer system maintains display of the media while ceasing display of the virtual environment and displaying the second environment. In some embodiments, the computer system ceases display of the media when ceasing display of the virtual environment and redisplays the media already placed in the second environment when displaying the second environment (e.g., at a different location relative to the current viewpoint of the user and/or with different dimensions (e.g., with a different width and/or height relative to the current viewpoint of the user)). In some embodiments, the computer system ceases display of the media when ceasing display of the virtual environment and redisplay the media at a same relative location relative to the current viewpoint of the user prior to ceasing display of the media in the virtual environment. In some embodiments, the media is not displayed exclusively while displayed in the second environment (e.g., displaying the second environment includes displaying one or more virtual objects (e.g., application windows) concurrently with the media) and is not displayed exclusively while displayed in the virtual environment (e.g., displaying the virtual environment does not include displaying one or more virtual objects (e.g., application windows) concurrently with the media). In some embodiments, the second environment does not include the plurality of available viewpoints included in the virtual environment to view the media from. For example, the second environment includes different available viewpoints to view the media from (e.g., viewpoints that include different spatial arrangement characteristics (e.g., distance from the media and/or viewing angle to the media) compared to the virtual environment, and/or there are a different number of available viewpoints in the second environment compared to the virtual environment). For example, the second environment does not include a plurality of available viewpoints that are selectable to view the media from. In some embodiments, the second environment displays the content with a different size relative to the three-dimensional environment (e.g., an environment which the virtual environment and/or second environment are displayed in by the computer system) compared to the size of the content displayed in the virtual environment. The content displayed in the second environment optionally has a same angular size relative to the current viewpoint of the user compared to the angular size of the content displayed in the virtual environment relative to the current viewpoint of the user (e.g., the second environment and the virtual environment display the content with different sizes relative to the three-dimensional environment and at different locations relative to the three-dimensional environment such that content is displayed with the same angular size relative to the current viewpoint of the user). Changing the display of media in a virtual environment from the virtual environment to a second environment different from the virtual environment in response to an input corresponding to a request to display the media in the second environment provides the user discretion in choosing a preferred environment to view the media in and maintains interaction with the media while and/or after changing environments, thereby reducing errors in interaction, reducing inputs needed to redisplay the media in the next environment, and reducing discomfort.

In some embodiments, the second input includes selecting a selectable option displayed in a content control user interface displayed in the virtual environment to display the second environment, wherein the content control user interface further includes one or more selectable options for controlling playback of the media (2122), such as selection of selectable option 1910 in content control user interface 1908 (e.g., selectable option 1910 and content control user interface 1908 shown in FIGS. 19E and 19E1). In some embodiments, selecting the selectable option in the content control user interface includes one or more characteristics of the selection input as described with reference to step(s) 2120. In some embodiments, the selectable option is one of a plurality of selectable options included in the content control user interface. For example, the content control user interface includes one or more selectable options for selecting different media to be displayed in the virtual environment. In some embodiments, in response to selecting the selectable option to display the second environment, the computer system ceases display of the media in the virtual environment and displays the media in the second environment (e.g., as described with reference to step(s) 2120). In some embodiments, in response to selecting the selectable option to display the second environment, the computer system ceases display of the media in the virtual environment and displays the second environment without displaying the media in the second environment. In some embodiments, the one or more selectable options for controlling playback including selectable options for playing, pausing, fast-forwarding, rewinding, and/or scrubbing the media (e.g., navigating a current playback position in the media through the timeline of the media based on a direction and/or magnitude of a user input (e.g., the user input controlling a cursor and/or slider on a timeline bar (e.g., optionally displayed with the media) corresponding to the timeline of the video content). In some embodiments, selection of the selectable options causes different corresponding results of playing, pausing, fast forwarding, rewinding and/or scrubbing content of the media displayed in the virtual environment. In some embodiments, the content control user interface includes one or more characteristics of the content control user interface described with reference to step(s) 2102. In some embodiments, the content control user interface is displayed concurrently in the virtual environment with the media (e.g., at a location in the virtual environment different from the first location). In some embodiments, the content control user interface is displayed in response to an input received by the computer system via the one or more input devices. For example, the input includes the user directing their attention (e.g., through gaze) at a location in the virtual environment (e.g., at a location different from the first location, such as to a location above, below, or to a side of the virtual environment relative to the current viewpoint of the user in the virtual environment), a hand gesture (e.g., a hand raise, air pinch, or air tap), a touch input on a touch-sensitive display, and/or a verbal input (e.g., a voice command). In some embodiments, displaying the media in the second environment includes displaying the content control user interface in the second environment concurrently with the media. Changing the display of media in a virtual environment from the virtual environment to a second environment different from the virtual environment in response to an input corresponding to selection of a selectable option to display the second environment within a content control user interface does not require separate user interfaces to be displayed (e.g., in response to separate user inputs) for controlling playback of the media and selection of the second environment and provides ease of access to the selectable option by not requiring additional user inputs, thereby preventing errors in interaction and conserving computing resources.

In some embodiments, in response to receiving the second input, the computer system displays (2124), via the display generation component, an environment selection user interface, wherein the environment selection user interface includes one or more visual representations of one or more environments available for display, including a selectable visual representation that is selectable to display the second environment, such as environment selection user interface 1926 and selectable option 1954 shown in FIG. 19F (e.g., selectable option 1954 optionally includes one or more indications representing environments different from virtual environment 1918 available to be displayed as described with reference to FIG. 19F). In some embodiments, in response to selection of the selectable visual representation (e.g., through a selection input described with reference to step(s) 2120) selectable to display the second environment, the computer system ceases display of the media at the first location in the virtual environment and displays the media in the second environment (e.g., including one or more characteristics of displaying the media in the second environment as described with reference to step(s) 2120). In some embodiments, in response to selection of the one or more visual representations of one or more environments available for display, the computer system ceases display of the media in the virtual environment and displays the media in an environment different from the virtual environment and the second environment (e.g., displaying the media in the environment includes one or more characteristics of displaying the media in the second environment as described with reference to step(s) 2120). In some embodiments, the one or more visual representations include images and/or icons indicating one or more visual characteristics of the one or more environments available for display (e.g., images of portions of the one or more environments). In some embodiments, the environment selection user interface is displayed concurrently with the content control user interface in a location in the virtual environment different from the first location. In some embodiments, displaying the environment selection user interface includes ceasing display of the content control user interface. Displaying an environment selection user interface including one or more visual representations of one or more environments available for display while displaying media in a virtual environment different from the one or more environments available for display provides indication to the user of alternative environments that are permitted to be displayed (e.g., with the media), ease of access to the one or more visual representations that requires minimal user input, and discretion to the user to choose a preferred environment to display, thereby avoiding errors in interaction.

In some embodiments, displaying the environment selection user interface includes, while displaying the media at the first location in a respective virtual environment from a respective viewpoint, in accordance with a determination that the respective virtual environment is the virtual environment, displaying a plurality of selectable options that are selectable to initiate display of the media from the plurality of available viewpoints associated with the virtual environment (2126), such as the plurality of selectable options 1930*a*-1930*c* and 1932*a*-1932*b* included in environment selection user interface 1926 shown in FIG. 19F. In some embodiments, in response to selection of a selectable option of the plurality of selectable options selectable to initiate display of the media from a viewpoint of the plurality of available viewpoints associated with the virtual environment, the computer system displays the media at the first location in the environment from the viewpoint (e.g., including one or more characteristics of displaying the media at the first location from the second viewpoint). In some embodiments, the plurality of selectable options are selectable to display the plurality of available viewpoints in the virtual environment. In some embodiments, the plurality of selectable options corresponds to selectable values of the first spatial arrangement characteristic and the second spatial arrangement characteristic (e.g., as described with reference to step(s) 2102). In some embodiments, the plurality of selectable options are selectable through a selection input as described with reference to step(s) 2120. Displaying an environment selection user interface in a virtual environment including a plurality of selectable options that are selectable to initiate display of media in the virtual environment from a plurality of available viewpoints informs a user of the viewpoints in the virtual environment available different from their current viewpoint in the virtual environment and provides a user discretion in choosing a preferred viewpoint in the virtual environment (e.g., such that the user can most comfortably view the media in the virtual environment) and ease of access to the plurality of selectable options without requiring additional user inputs, thereby reducing errors in interaction and reducing discomfort.

In some embodiments, the plurality of selectable options are selectable to change a spatial distance of the respective viewpoint from the media (2128), such as selectable options 1930*a*-1930*c* shown in FIG. 19F (e.g., selectable options 1930*a*-1930*c* are selectable to select a value of the first spatial arrangement characteristic as described with reference to FIG. 19F). In some embodiments, a first group of selectable options of the plurality of selectable options corresponds to selectable values of the first spatial arrangement characteristic (e.g., as described with reference to step(s) 2102). For example, the first group of selectable options includes one or more selectable values of distance from the media in the virtual environment (e.g., displayed to the user as selectable rows within the virtual environment). In some embodiments, changing the spatial distance of the respective viewpoint from the media includes changing the viewing angle of the respective viewpoint from the media (e.g., as described with reference to step(s) 2104). In some embodiments, selecting a selectable option that is selectable to change the spatial distance includes performing a selection input as described with reference to step(s) 2120. In some embodiments, in response to an input corresponding to selection of a selectable option of the plurality of selectable options to change the spatial distance of the respective viewpoint from the media (e.g., from a first value of distance (e.g., a first row) to a second value of distance (e.g., a second row)), the computer system displays the media at the first location from a respective viewpoint based on a distance value (e.g., the second distance value) corresponding to the selectable option. In some embodiments, selecting a selectable option of the plurality of selectable options to change the spatial distance of the respective viewpoint from the media does not include changing the respective viewing angle to the media and/or height of the viewpoint relative to the media in the virtual environment. Displaying an environment selection user interface in a virtual environment including a plurality of selectable options that are selectable to initiate display of the media from a plurality of available viewpoints that include different spatial distances from the media informs a user of the viewpoints in the virtual environment available including different spatial distances from media compared to the user's current viewpoint, and provides a user discretion in choosing a preferred spatial distance from the media in the virtual environment (e.g., such that the user can most comfortably view the media in the virtual environment) and ease of access to the plurality of selectable options without requiring additional user inputs, thereby reducing errors in interaction and reducing discomfort.

In some embodiments, the plurality of selectable options are selectable to change a viewing angle (e.g., and/or height) of the respective viewpoint to the media (2130), such as selectable options 1932*a*-1932*b* as shown in FIG. 19F (e.g., selectable options 1932*a*-1932*b* are selectable to select a value of the second spatial arrangement characteristic as described with reference to FIG. 19F) and optionally selectable options 1930*a*-1930*c* as shown in FIG. 19F (e.g., selecting a value of the first spatial arrangement characteristic optionally changes the spatial distance of the respective viewpoint from respective media 1904*b* and the viewing angle of the respective viewpoint to respective media 1904*b*). In some embodiments, a second group of selectable options of the plurality of selectable options corresponds to selectable value of the second spatial arrangement characteristic (e.g., as described with reference to step 2102). For example, the second group of selectable options includes one or more selectable values of viewing angle (e.g., and/or height relative) to the media in the virtual environment (e.g., displayed to the user as selectable heights within a selectable row in the virtual environment). In some embodiments, changing the viewing angle of the respective viewpoint to the media includes changing the height of the respective viewpoint relative to the media in the virtual environment. In some embodiments, selecting a selectable option that is selectable to change the viewing angle includes performing a selection input as described with reference to step(s) 2120. In some embodiments, in response to an input corresponding to selection of a selectable option of the plurality of selectable options to change the viewing angle of the respective viewpoint to the media (e.g., from a first viewing angle value (e.g., a first height within a row) to a second viewing angle value (e.g., a second height within a row)), the computer system displays the media at the first location from a respective viewpoint at a viewing angle value (e.g., the second viewing angle value) corresponding to the selectable option. In some embodiments, selecting a selectable option of the plurality of selectable options to change the viewing angle of the respective viewpoint to the media does not include changing the spatial distance of the respective viewpoint from the media. Displaying an environment selection user interface in a virtual environment including a plurality of selectable options that are selectable to initiate display of the media from a plurality of available viewpoints that include different viewing angles to the media informs a user of the viewpoints in the virtual environment available including different viewing angles to the media compared to the user's current viewpoint, and provides a user discretion in choosing a preferred viewing angle to the media in the virtual environment (e.g., such that the user can most comfortably view the media in the virtual environment) and ease of access to the plurality of selectable options without requiring additional user inputs, thereby reducing errors in interaction and reducing discomfort.

In some embodiments, displaying the environment selection user interface includes (2132*a*), in accordance with a determination that the respective virtual environment is different from the virtual environment, displaying the environment selection user interface without displaying the plurality of selectable options that are selectable to initiate display of the media from the plurality of different viewpoints in the respective virtual environment (2132*b*), such as displaying environment selection user interface 1926 (e.g., as shown in FIG. 19F) without selectable options 1930*a*-

1930*c* and selectable options 1932*a*-1932*b* when displaying environment selection user interface 1926 in an environment different from virtual environment 1918 (e.g., such as virtual environment 1960 displayed in FIG. 19A). In some embodiments, the respective virtual environment includes one or more characteristics of the second environment (e.g., including one or more characteristics of the second environment as described with reference to step(s) 2120). In some embodiments, displaying the environment selection user interface includes one or more characteristics of displaying the environment selection user interface as described with reference to step(s) 2124. In some embodiments, displaying the environment selection user interface in the respective virtual environment different from the virtual environment includes displaying the environment selection user interface with one or more visual representations of one or more environment available for display, including a selectable visual representation that is selectable to display the media in the virtual environment. In some embodiments, in response to an input corresponding to selection of the selectable visual representation that is selectable to display the media in the virtual environment, the media is displayed in the virtual environment at the first location (e.g., the media is displayed from a viewpoint of the plurality of available viewpoints that the media was last displayed from prior to ceasing display of the media in the virtual environment). The selection user interface is optionally displayed concurrently with the content control user interface in the respective virtual environment. Displaying an environment selection user interface including a plurality of selectable options that are selectable to initiate display of media in a virtual environment from a plurality of available viewpoints in the virtual environment when displaying the media in the virtual environment and not displaying the plurality of selectable options when a respective virtual environment is displayed different from the virtual environment ensures that the plurality of selectable options are only displayed when they are useful to the user, thereby improving user device interaction and conserving computing resources.

In some embodiments, the environment selection user interface includes a selectable option that is selectable to cease display of the media in the virtual environment (2134), such as selectable option 1928 included in environment selection user interface 1926 shown in FIG. 19F. In some embodiments, in accordance with a determination that a respective environment is displayed different from the virtual environment, the computer system does not display the selectable option that is selectable to cease display of the media in the virtual environment in the environment selection user interface. In some embodiments, in response to an input corresponding to selection of the selectable option that is selectable to cease display of the media in the virtual environment, the computer system ceases display of the media in the virtual environment and displays a respective environment (e.g., including one or more characteristics of the second environment) different from the virtual environment (e.g., optionally with the media). In some embodiments, in response to an input corresponding to selection of the selectable option that is selectable to cease display of the media in the virtual environment, the computer system maintains display of the media and ceases display of the virtual environment. In some embodiments, in response to an input corresponding to selection of the selectable option that is selectable to cease display of the media in the virtual environment, the computer system maintains displays of the media and displays the virtual environment at a lower level of immersion (e.g., a level of immersion as described with reference to methods 800, 1000, 1200, 1400, 1600, and/or 1800). In some embodiments, in response to an input corresponding to selection of the selectable option that is selectable to cease display of the media in the virtual environment, the computer system ceases display of the media and displays the virtual environment at a lower level of immersion (e.g., a level of immersion as described with reference to methods 800, 1000, 1200, 1400, 1600, and/or 1800). Displaying a selectable option to cease display of media in a virtual environment when displaying an environment selection user interface concurrently with the media in the virtual environment provides a user the opportunity to cease displaying the media in the virtual environment without requiring a separate user interface object to be displayed (e.g., requiring a separate user input), thereby improving user device interaction and conserving computing resources.

In some embodiments, displaying the content control user interface in the virtual environment includes (2136*a*), in accordance with a determination that a current environment the media is displayed in is the virtual environment, displaying the content control user interface with one or more visual indications representing the current environment that the media is displayed in and the current viewpoint of the user of the plurality of available viewpoints in the virtual environment (2136*b*), such as the visual indications included in selectable option 1924 in content control user interface 1908 shown in FIG. 19F, and, in accordance with a determination that the current environment the media is displayed in is the second environment different from the virtual environment, displaying the content control user interface with one or more visual indications representing the current environment that the media is displayed in without displaying an indication of the current viewpoint of the user in the second environment (2136*c*), such as content control user interface 1908 not including the indications and selectable option 1924 when displayed in virtual environment 1960 shown in FIG. 19A. In some embodiments, the visual indication representing the current environment that the media is displayed in includes an icon, image, and/or text representing the current environment that the media is displayed in. In some embodiments, the visual indication representing the current viewpoint of the user of the plurality of available viewpoints includes text and/or a virtual representation of the current viewpoint of the user. For example, the visual indication displays the selected value of the first spatial arrangement characteristic (e.g., row) of the current viewpoint of the user in the environment and the second spatial arrangement characteristic (e.g., height and/or viewing angle within the row) of the current viewpoint of the plurality of available viewpoints. In some embodiments, the visual indication representing the current viewpoint of the user of the plurality of available viewpoints is selectable to display the environment selection user interface (e.g., as described in step(s) 2124-2134) in order to change the current viewpoint of the user to one of the plurality of available viewpoints in the virtual environment. Displaying a content control user interface that includes one or more visual indications representing a current environment that media is displayed in and one or more visual indications representing a current viewpoint of a user of a plurality of available viewpoints in a virtual environment when displaying the media in the virtual environment, and displaying the content control user interface with the one or more visual indications representing the current environment and not the one or more indications of the current viewpoint of the user of the plurality of available viewpoints in the virtual environment when displaying the media in a second environment different from the virtual environment prevents displaying one or more indications in the content control user interface that are not relevant to the user, thereby conserving computing resources and improving user device interaction.

In some embodiments, displaying the media at the first location in the virtual environment from the second viewpoint in response to receiving the first input includes displaying an animated transition from displaying the media at the first location in the virtual environment from the first viewpoint to displaying the media at the first location in the virtual environment from the second viewpoint, wherein the animated transition includes gradually changing the current viewpoint from the first viewpoint to the second viewpoint (2138), such as the gradual changing of the current viewpoint of user 1948 from viewpoint 1940*c* to viewpoint 1940*e* shown in FIGS. 19F-19H. In some embodiments, the animated transition includes maintaining display of the media at the first location in the virtual environment while changing the current viewpoint from the first viewpoint to the second viewpoint. In some embodiments, changing the current viewpoint from the first viewpoint to the second viewpoint includes maintaining the media in the user's field of view of the virtual environment while changing the current viewpoint of the user from the first viewpoint to the second viewpoint. In some embodiments, gradually changing the current viewpoint from the first viewpoint to the second viewpoint includes consistently moving the current viewpoint of the user from the first viewpoint to the second viewpoint over a period of time (e.g., 0.1, 0.5, 1, 2, 5 or 10 seconds). In some embodiments, the computer system maintains display of the virtual environment while displaying the animated transition (e.g., including one or more characteristics of the virtual environment described with reference to step(s) 2118). In some embodiments, in response to receiving the first input, the computer system ceases display of a content control user interface (e.g., including one or more characteristics of the content control user interface described with reference to step(s) 2122) and/or environment selection user interface (e.g., including one or more characteristics of the environment selection user interface described with reference to step (2) 2124) while displaying the animation transition. Displaying an animated transition when changing the display of media in a virtual environment from a first viewpoint of a plurality of available viewpoints in the virtual environment to a second viewpoint of a plurality of available viewpoints in the virtual environment in response to a user input corresponding to a request to display the media from the second viewpoint in the virtual environment provides visual feedback to the user that the input was received and that the viewpoint of the user is going to change in response to the user input, thereby reducing errors in user device interaction.

In some embodiments, gradually changing the current viewpoint from the first viewpoint to the second viewpoint includes changing the current viewpoint nonlinearly from the first viewpoint to the second viewpoint (2140), such as the gradual change of the current viewpoint of user 1948 from viewpoint 1940*c* to viewpoint 1940*e* shown in FIGS. 19F-19H. In some embodiments, changing the current viewpoint nonlinearly from the first viewpoint to the second viewpoint includes controlling the movement of the current viewpoint of the user during the animated transition from the first viewpoint to the second viewpoint. For example, the movement of the current viewpoint of the user is controlled using a nonlinear function stored in a memory of the computer system. In some embodiments, changing the current viewpoint nonlinearly from the first viewpoint to the second viewpoint includes changing the viewpoint nonlinearly at the beginning and end of the animated transition. For example, the beginning of the animated transition and the end of the animated transition includes non-linear magnitude of movement, velocity of movement and/or acceleration of the change in the current viewpoint. In some embodiments, changing the current viewpoint nonlinearly includes slowly accelerating the movement of the current viewpoint of the user (e.g., easing into the movement of the viewpoint of the user at the beginning of the animated transition starting at the first viewpoint), and then decelerating the movement of the current viewpoint of the user (e.g., easing out of the movement of the current viewpoint of the user at the end of the animated transition ending at the second viewpoint). Displaying an animated transition when changing the display of media in a virtual environment from a first viewpoint of a plurality of available viewpoints in the virtual environment to a second viewpoint of a plurality of available viewpoints in the virtual environment in response to a user input corresponding to a request to display the media from the second viewpoint in the virtual environment that includes gradually changing the current viewpoint nonlinearly provides visual feedback to the user that the input was received and that the viewpoint of the user is going to change in response to the user input, and prevents motion sickness that would otherwise be caused by movement of a current viewpoint of the user in the virtual environment, thereby reducing errors in interaction and preventing user discomfort.

In some embodiments, displaying the media at the first location in the virtual environment from the second viewpoint in response to receiving the first input includes maintaining playback of the media in the virtual environment while concurrently changing the current viewpoint of the user from the first viewpoint to the second viewpoint (2142), such as continuing playback of respective media 1904*b* displaying in virtual environment 1918 while changing the current viewpoint of user 1948 from viewpoint 1940*c* to viewpoint 1940*e* shown in FIG. 19G. In some embodiments, maintaining playback of the media in the virtual environment includes playing, pausing, fast-forwarding, rewinding or scrubbing the media while concurrently changing the current viewpoint of the media from the first viewpoint to the second viewpoint (e.g., while displaying the animated transition described with reference to step(s) 2138-2140). In some embodiments, maintaining playback of the media in the virtual environment while concurrently changing the current viewpoint of the user includes maintaining a playback selected (e.g., through a content control user interface described with reference to step(s) 2122) by the user (e.g., a playback mode and/or speed) prior to receiving the first input. In some embodiments, playback of the media is configured to be controlled while concurrently changing the current viewpoint. For example, while displaying an animated transition between displaying the media at the first location from the first viewpoint to the second viewpoint, an input is received corresponding to selection of one or more selectable options for controlling playback included in the content control user interface (e.g., as described with reference to step(s) 2122). Maintaining playback of media in a virtual environment while changing a current viewpoint of a user relative to the media from a first viewpoint of a plurality of available viewpoints in the virtual environment to a second viewpoint of a plurality of available viewpoints in the virtual environment enables the user to continue to interact with the media in the virtual environment while changing the current viewpoint to a preferred viewpoint and maintains consistency of interaction with the media, thereby reducing errors in user device interaction.

In some embodiments, displaying the media at the first location in the virtual environment from the second viewpoint in response to receiving the first input includes maintaining display of the virtual environment while concurrently changing the current viewpoint of the user from the first viewpoint to the second viewpoint (2144), such as maintaining display of virtual environment 1918 while changing the current viewpoint of user 1948 from viewpoint 1940*c* to viewpoint 1940*e* shown in FIG. 19G. In some embodiments, maintaining display of the virtual environment includes maintaining display of the first portion, second portion and/or third portion of the virtual environment described with reference to step(s) 2118. In some embodiments, the content control user interface (e.g., described with reference to step(s) 2122) and/or environment selection user interface (e.g., described with reference to step(s) 2124) displayed when displaying the media at the first location from the view viewpoint remain displayed in the virtual environment while concurrently changing the current viewpoint of the user from the first viewpoint to the second viewpoint. In some embodiments, the content control user interface and/or environment selection user interface displayed when displaying the media at the first location from the first viewpoint do not remain displayed in the virtual environment while concurrently changing the current viewpoint of the user from the first viewpoint to the second viewpoint. Maintaining display of a virtual environment while changing a current viewpoint of a user relative to the media from a first viewpoint of a plurality of available viewpoints in the virtual environment to a second viewpoint of a plurality of available viewpoints in the virtual environment enables the user to continue to interact with the virtual environment while changing the current viewpoint to a preferred viewpoint and maintains consistency of display of the media in the virtual environment, thereby reducing errors in user device interaction.

It should be understood that the particular order in which the operations in method 2100 have been described is merely exemplary and is not intended to indicate that the described order is the only order in which the operations could be performed. One of ordinary skill in the art would recognize various ways to reorder the operations described herein.

FIGS. 22A-22L illustrate a method of synchronizing three-dimensional environments between participants of a communication session, in accordance with examples of the disclosure.

Figure 22A:
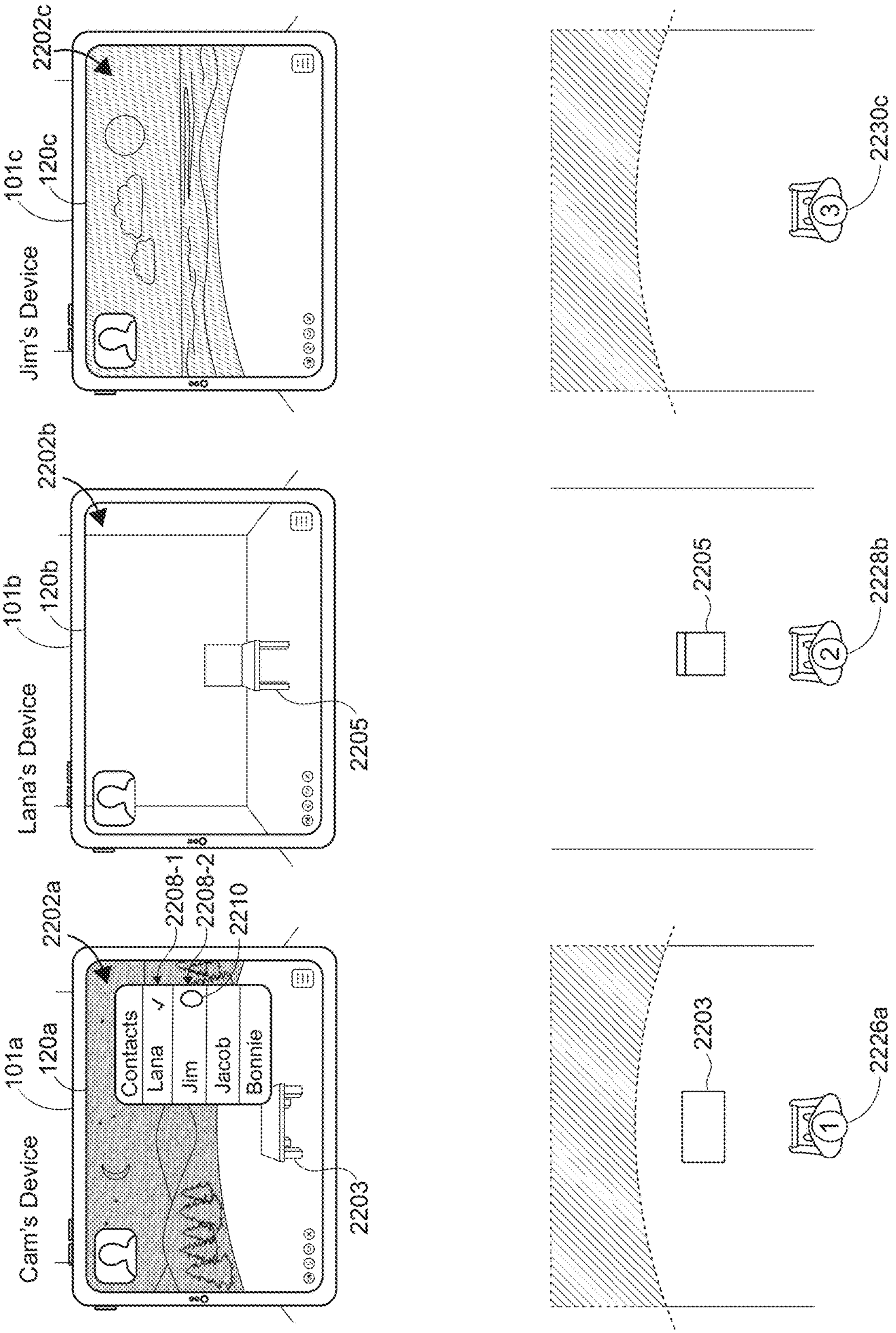
FIGS. 22A-22L illustrate examples of a computer system facilitating sharing of a virtual three-dimensional environment in accordance with some embodiments.

FIG. 22A illustrates a three-dimensional environment 2202*a* visible via a display generation component (e.g., display generation component 120*a* of FIG. 1) of a computer system 101*a*, the three-dimensional environment 2202*a* visible from a viewpoint 2226*a* of a user illustrated in the overhead legend (e.g., facing a back wall of the physical environment in which computer system 101*a* is located). FIG. 22A also illustrates a three-dimensional environment 2202*b* visible via a display generation component (e.g., display generation component 120*b*) of a computer system 101*b*, the three-dimensional environment 2202*b* visible from a viewpoint 2228*b* of a user of computer system 101*b*. FIG. 22A also illustrates a three-dimensional environment 2202*c* visible via a display generation component (e.g., display generation component 120*c*) of a computer system 101*c*, the three-dimensional environment 2202*c* visible from a viewpoint 2230*c* of a user of computer system 101*c*. In FIGS. 22A-22L, computer system 101*a*, computer system 101*b*, and computer system 101*c* are configured to be engaged in a real-time, or nearly real-time communication session. As described above with reference to FIGS. 1-6, the computer systems 101*a/b/c* optionally include a display generation component 120*a/b/c* (e.g., a touch screen or non-touch screen display) and a plurality of image sensors 314*a/b/c* (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface and/or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 22A, computer system 101*a* captures one or more images of the physical environment around computer system 101 (e.g., operating environment 100), including one or more objects in the physical environment around computer system 101. In some embodiments, computer system 101*a* displays representations of the physical environment in three-dimensional environment 2202*a* and/or the physical environment is visible in the three-dimensional environment 2202*a* via the display generation component 120*a*. For example, three-dimensional environment 2202*a* visible via display generation component 120*a* includes representations of the physical floor and back and side walls of the room in which computer system 101*a* is located, and a representation (e.g., via active or passive visual passthrough) of table 2203, which is a physical table. Similarly, three-dimensional environment 2202*b* includes a representation of chair 2205, which corresponds to a view of a physical chair.

In some embodiments, a computer system of a participant presents a user interface for initiating a call between other participants using other computer systems. For example, computer system 101*a* presents user interface 2206 including a list of available contacts. For example, first contact 2208-1 is currently selected, and second contact 2208-2 is being additionally selected to join the call, in response to detecting input 2210. It is understood that the inputs described herein optionally refer to any manner of suitable input. For example, the input optionally includes an air gesture (e.g., an air pinching of two fingers, an air pointing of one or more fingers, and/or and air swiping of one or more fingers of the user's body). In response to detecting one or more inputs such as input 2210 and/or detecting selection of an option that is selectable to initiate the call, computer system 101*a*, computer system 101*b*, and computer system 101*c* initiate respective processes to display a shared three-dimensional environment. As described further with reference to method 2300, in some embodiments, the computer systems optionally initiate process(es) to join the shared three-dimensional environment in response to obtaining information that a participant is and/or will join or leave the call.

Figure 22B:
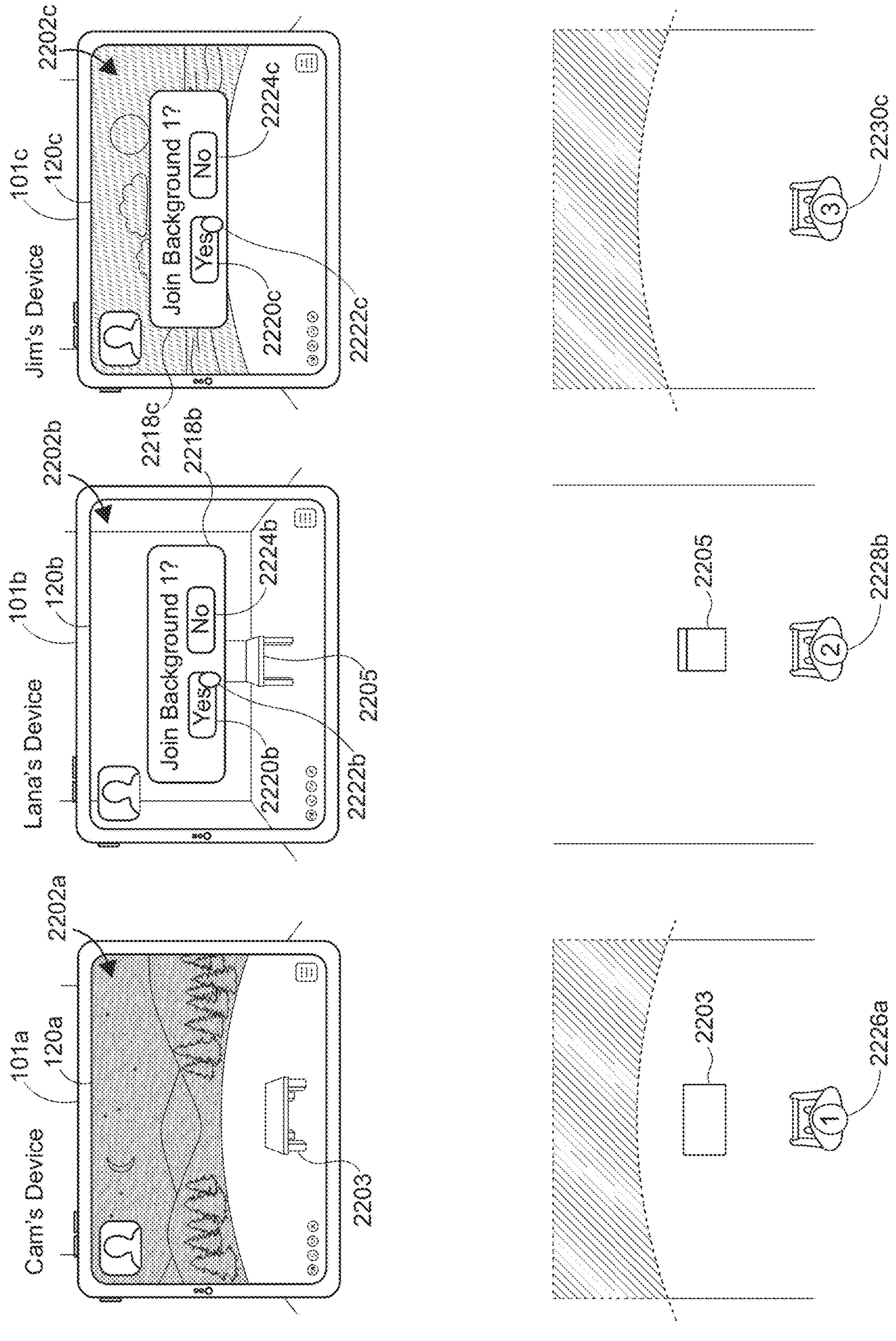

From FIG. 22A to FIG. 22B, computer system 101*b* and computer system 101*c* present user interfaces to display the shared three-dimensional environment. For example, prompt 2218*b* is displayed by computer system 101*b* including a first option 2220*b* that is selectable to join the shared three-dimensional environment, such as will occur in response to detecting input that is indicated by input 2222*b*, and including a second option 2224*b* that is selectable to forego the joining of the shared three-dimensional environment. Prompt 2218*c* is displayed by computer system 101*c* including a first option 2220*c* that is selectable to join the shared three-dimensional environment, such as will occur in response to detecting input that is as indicated by input 2222*c*, and including a second option 2224*c* that is selectable to forego the joining of the shared three-dimensional environment. In response to respectively detecting inputs 2222*b* and 2222*c*, computer system 101*b* and computer system 101*c* respectively continue to perform operations to display join a shared three-dimensional environment.

FIG. 22B1 illustrates similar and/or the same concepts as those shown in FIG. 22B (with many of the same reference numbers). It is understood that unless indicated below, elements shown in FIG. 22B1 that have the same reference numbers as elements shown in FIGS. 22A-22L have one or more or all of the same characteristics. FIG. 22B1 includes computer systems 101*a*, 101*b*, and 101*c* (referred to collectively in the description of FIG. 22B1 as computer system 101), which include (or are the same as) display generation component 120*a*, 120*b*, and 120*c* respectively (referred to collectively in the description of FIG. 22B1 as display generation component 120). In some embodiments, computer systems 101*a*, 101*b*, and/or 101*c* and display generation components 120*a*, 120*b*, and/or 120*c* have one or more of the characteristics of computer system 101 shown in FIGS. 22A-22L and display generation component 120 shown in FIGS. 1 and 3, respectively, and in some embodiments, computer system 101 and display generation component 120 shown in FIGS. 22A-22L have one or more of the characteristics of computer systems 101*a*, 101 b, and/or 101*c* and display generation components 120*a*, 120*b*, and/or 120*c* shown in FIG. 22B1.

In FIG. 22B1, display generation components 120*a*, 120*b*, and 120*c* include one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation components 120*a*, 120*b*, and 120*c* to enable eye tracking of the user's left and right eyes. Display generation components 120*a*, 120*b*, and 120*c* also include external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 22A-22L.

In FIG. 22B1, display generation components 120*a*, 120*b*, and 120*c* are illustrated as displaying content that optionally corresponds to the content that is described as being displayed and/or visible via display generation component 120 with reference to FIGS. 22A-22L. In some embodiments, the content is displayed by a single display (e.g., display 510 of FIG. 5) included in display generation components 120*a*, 120*b*, and 120*c*. In some embodiments, display generation components 120*a*, 120*b*, and 120*c* include two or more displays (e.g., left and right display panels for the left and right eyes of the user, respectively, as described with reference to FIG. 5) having displayed outputs that are merged (e.g., by the user's brain) to create the view of the content shown in FIG. 22B1.

Display generation components 120*a*, 120*b*, and 120*c* have a field of view (e.g., a field of view captured by external image sensors 314*b* and 314*c* and/or visible to the user via display generation component 120) that corresponds to the content shown in FIG. 22B1. Because display generation component 120 is optionally a head-mounted device, the field of view of display generation component 120 is optionally the same as or similar to the field of view of the user.

In FIG. 22B1, the user is depicted as performing an air pinch gesture (e.g., with hands 2298*a* and/or 2298*b* while attention is directed to options 2220*b* and 2220*c*, as indicated by gaze points 2222*b* and 2222*c*) to provide an input to computer systems 101*b* and 101*c* to provide a user input directed to content displayed by computer systems 101*b* and 101*c*. Such depiction is intended to be exemplary rather than limiting; the user optionally provides user inputs using different air gestures and/or using other forms of input as described with reference to FIGS. 22A-22L.

In some embodiments, computer system 101 responds to user inputs as described with reference to FIGS. 22A-22L.

In the example of FIG. 22B1, because the user's hands are within the field of view of display generation components 120*a*, 120*b*, and/or 120*c*, they are visible within the three-dimensional environment. That is, the user can optionally see, in the three-dimensional environment, any portion of their own body that is within the field of view of display generation components 120*a*, 120*b*, and/or 120*c*. It is understood than one or more or all aspects of the present disclosure as shown in, or described with reference to FIGS. 22A-22L and/or described with reference to the corresponding method(s) are optionally implemented on computer system 101*a*, 101*b*, and/or 101*c* and display generation units 120*a*, 120*b*, and/or 120*c* in a manner similar or analogous to that shown in FIG. 22B1.

Figure 22C:
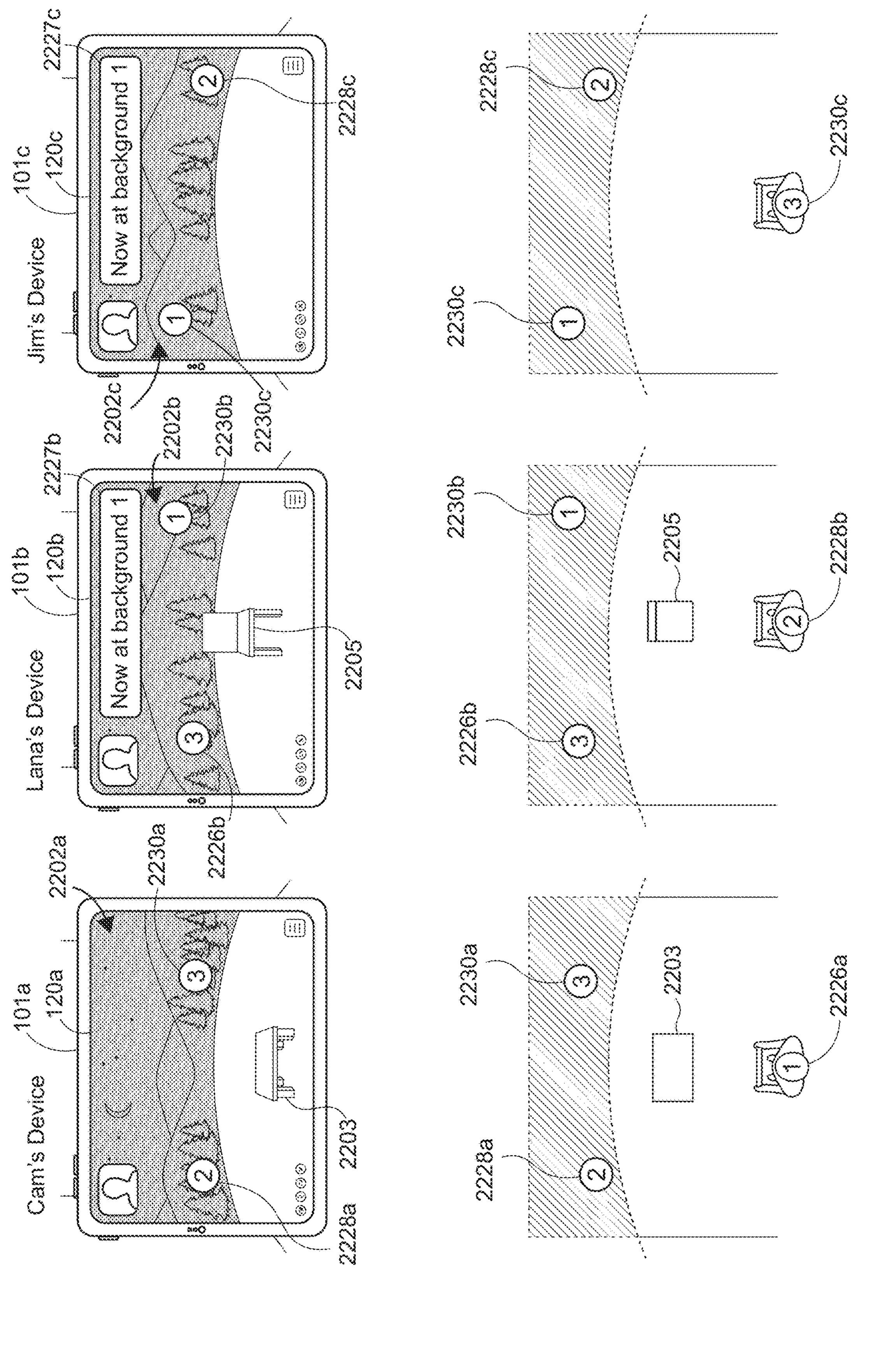

From FIG. 22B to FIG. 22C, the computer systems participating in the call join the shared three-dimensional environment. As indicated previously, the shared three-dimensional environment corresponds to a three-dimensional environment of computer system 101*a*, because in some embodiments, the environment of the participant who initiated the call becomes the shared three-dimensional environment. For example, computer system 101*b* displays a virtual content corresponding to a virtual forest displayed at computer system 101*a* included in three-dimensional environment 2202*b*, and computer system 101*c* similarly displays virtual content corresponding to the virtual forest within three-dimensional environment 2202*c*. Some embodiments of the disclosure are directed to "shared" three-dimensional environments. It is understood that description of the shared three-dimensional environment corresponds to a virtual environment that is linked to the three-dimensional environments displayed by respective computer system participants (e.g., computer system 101*a*, computer system 101*b*, and/or computer system 101*c*, respectively presenting three-dimensional environment 2202*a*, three-dimensional environment 2202*b*, and three-dimensional environment 2202*c*), such that the respective participants are placed within a virtual scene, similar to as if the participants physical were in a same place. Some embodiments of the disclosure are directed to changing the shared three-dimensional environment. It is understood that changes to the shared three-dimensional environment optionally affect changes to respective three-dimensional environments displayed at the respective computer systems, dependent upon the context of description. For example, if computer system 101*a* changes the shared environment from a first scene to a second scene including changing three-dimensional environment 2202*a* to correspond to the second scene, computer system 101*b* optionally updates three-dimensional environment 2202*b* to correspond to the second scene, and computer system 101*c* optionally updates three-dimensional environment 2202*c* to correspond to the second scene.

In some embodiments, the computer systems display an indication that their three-dimensional environment has changed. For example, computer system 101*b* optionally displays notification 2227*b* and computer system 101*c* displays notification 2227*c*, (e.g., "Now at background 1"), notifying the participants that the shared background is "background 1." Additionally or alternatively, in some embodiments, the computer systems display a visual representation of the other participants in the shared three-dimensional environment (e.g., within the respective three-dimensional environment as described above). For example, computer system 101*a* presents representation 2228*a*, corresponding the second participant using computer system 101*b*, and representation 2230*a*, corresponding to the third participant using computer system 101*c*, within three-dimensional environment 2202*a*. At the same time, or nearly at the same time, computer system 101*b* displays representation 2230*b* corresponding to the third participant using computer system 101*c*, and representation 2226*b*, corresponding to the first participant using computer system 101*a*. Similarly, computer system 101*c* displays representation 2226*c*, corresponding to the first participant using computer system 101*a*, and displays representation 2228*c*, corresponding to the second participant using computer system 101*b*. In some embodiments, a computer system displays representations of other participants of the call at positions and/or orientations relative to their three-dimensional environments similar to as if the physical participants were in a same physical environment having different positions and/or orientations relative to the physical environment. For example, in FIG. 22C, current viewpoint 2226*a* is oriented facing the second participant and the third participant. From the perspective of viewpoint 2228*b* at computer system 101*b*, representation 2226*b* is to the right of the current viewpoint and oriented toward the current viewpoint. Similarly, from the perspective of viewpoint 2230*c* at computer system 101*c*, representation is to the left of representation 2226*c*. For example, an additional perspective of the spatial arrangement of participants relative to a current viewpoint of a participant using a respective computer system (e.g., computer system 101*a*, 101*b*, or 101*c*) is illustrated in the overhead views presented beneath the illustrated computer systems, corresponding to an overhead view of the viewpoints of the participants using respective computer systems relative to the other participants of a call.

In some embodiments, in accordance with the determination that a participant requests a transition from an initial three-dimensional environment to a shared three-dimensional environment that is not available to all participants of the call, computer systems transition to a fallback three-dimensional environment, instead of the requested three-dimensional environment. For example, as described further with reference to method 2300, one or more of the participants optionally have not yet downloaded information corresponding to a requested, shared three-dimensional environment, and or have expressed a preference to avoid the requested shared three-dimensional environment. In accordance with a determination that participants included in the call do not have and/or have expressed interest in avoiding the initially requested three-dimensional environment, computer system 101*a* presents notification 2232*a* in FIG. 23D. Notification 2232*a* visually indicates that the first participant's environment is not available to the second participant and/or the third participant, and includes first selectable option 2234*a* that is selectable to initiate a process to join the fallback three-dimensional environment, and includes selectable option 2236*a* that is selectable to initiate a process to forgo joining the fallback three-dimensional environment. At computer system 101*a*, input 2238*a* is detected selecting first selectable option 2234*a*. At computer system 101*b*, notification 2232*b* is presented prompting the second participant to join the fallback three-dimensional environment. In contrast with notification 2232*a*, notification 2232*b* does not include an indication that an initially requested three-dimensional environment is unavailable to participants of the call. Notification 2232*b* includes a first selectable option 2234*b* and a second selectable option 2236*b* that has one or more characteristics of similar selectable options described with reference to notification 2232*a*. At computer system 101*b*, input 2238 is detected corresponding to a selection of the first selectable option 2234*b*. It is understood that notification 2232*c*, first selectable option 2234*c*, second selectable option 2236*c*, and input 2238*c* have one or more characteristics of the notification 2232*b* and/or input directed to notification 2232*b*, and that computer system 101*c* initiates the process to display the fallback environment in response to detecting input 2238*c*.

Figure 22D:
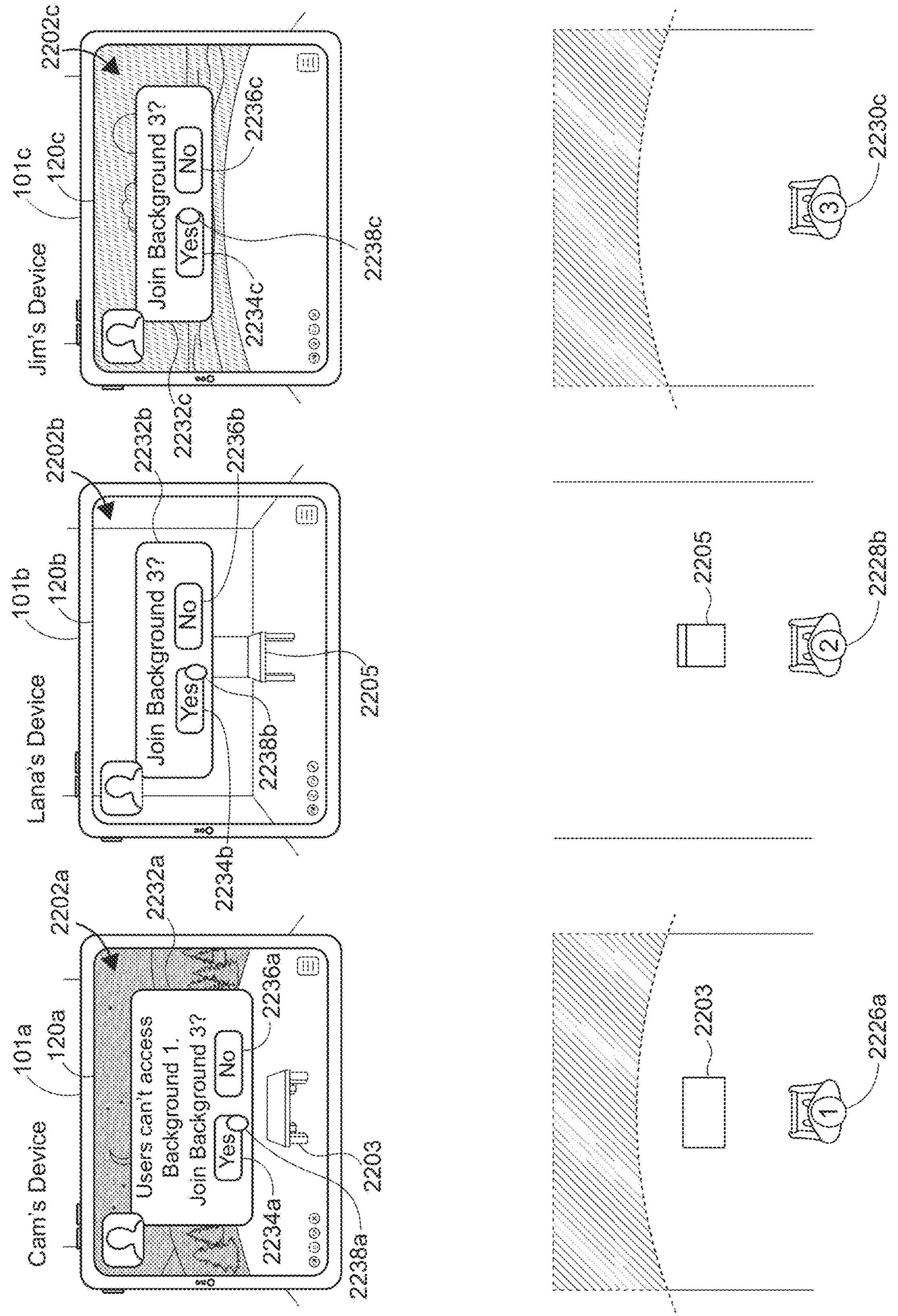
Figure 22E:
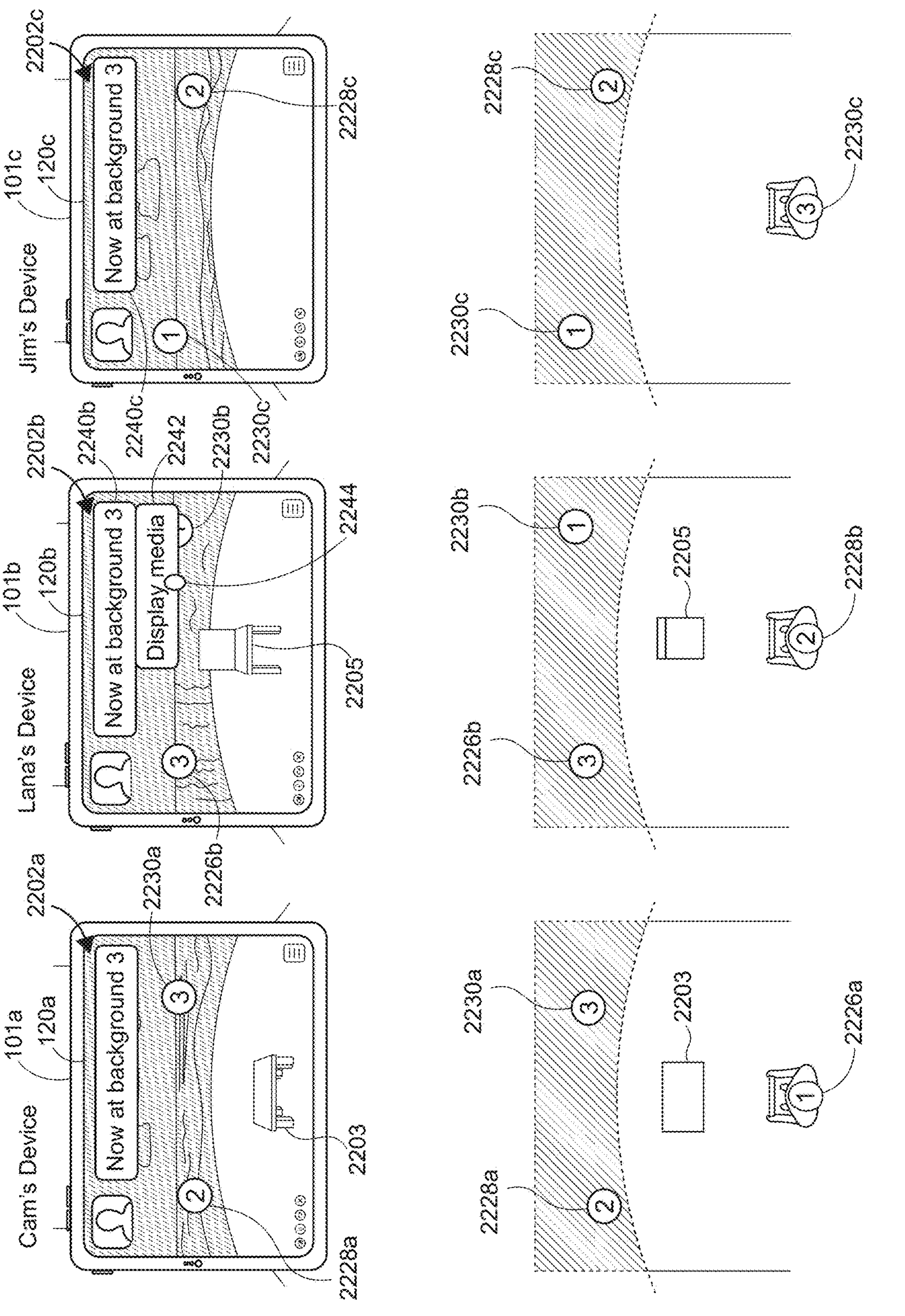

From FIG. 22D to FIG. 22E, the computer systems display the fallback three-dimensional environment in response to inputs detected in FIG. 22D. In some embodiments, the computer systems display visual indications indicating that the users have joined the fallback three-dimensional environment. For example, notification 2240*a* indicates that computer system 101*a* has joined the fallback three-dimensional environment. Similarly, notifications 2240*b* and notification 2240*c* indicate that the computer system 101*b* and computer system 101*c* have joined the fallback three-dimensional environment. In some embodiments, a computer system displays a selectable option that is selectable to initiate a process to display media with participants of the call. For example, computer system 101*b* presents button 2242, and detects input 2244 directed to button 2242. In response to detecting input 2244, computer system 101*b* initiates and/or initiates a process to share content such as media content, virtual objects, and/or text with the participants of the call.

Figure 22F:
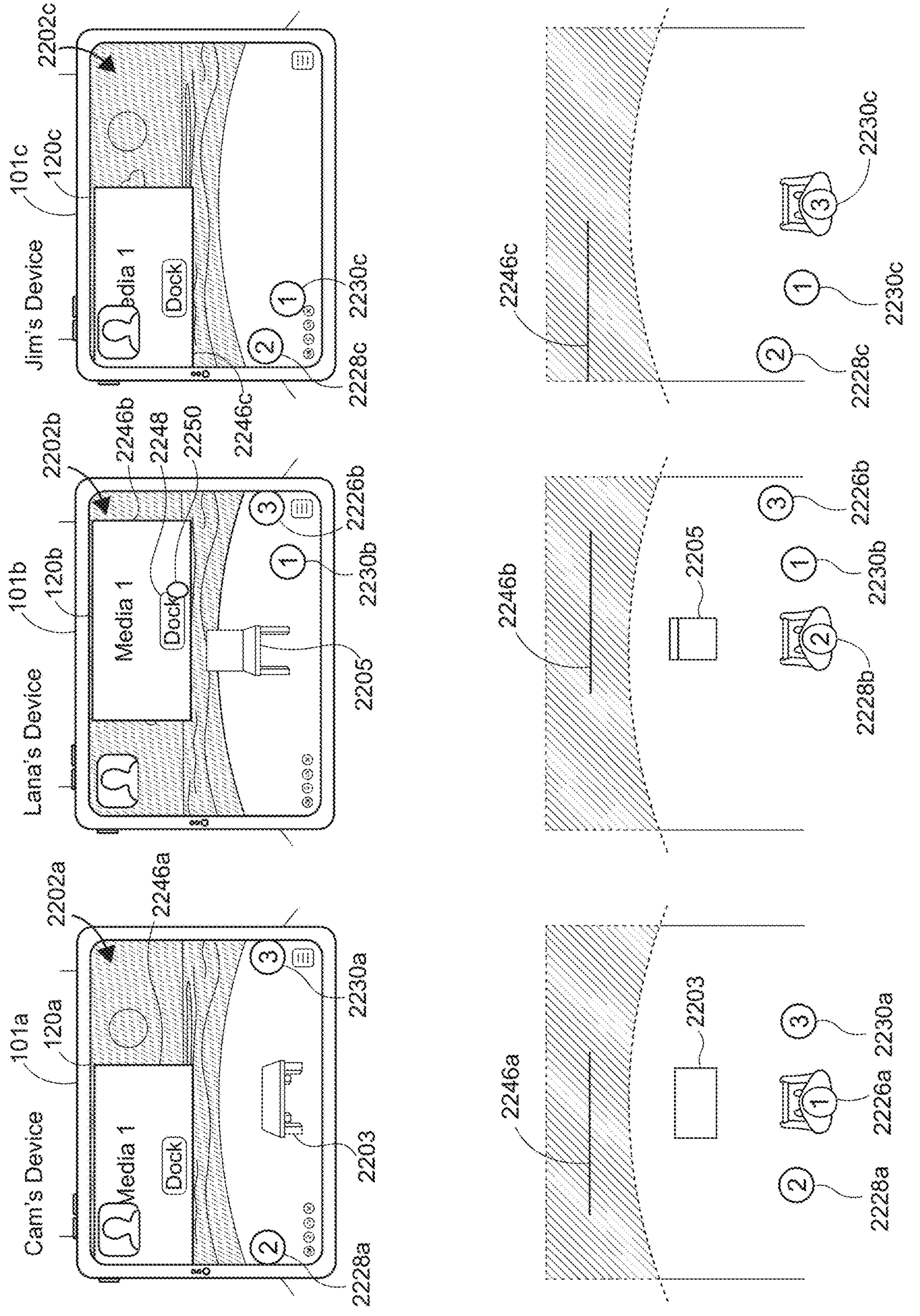

From FIG. 22E to FIG. 22F, the computer systems participating in the call display shared content and change their respective spatial arrangement relative to the fallback three-dimensional environment to view and interact with the shared content. For example, as shown in the overhead views, the current viewpoints of the participants of computer system 101*a*, computer system 101*b*, and computer system 101*c*, are arranged in an arc and oriented toward the shared content. The shared content 2246 optionally corresponds to shared media content such as video, photos, and/or text, that is displayed concurrently at the respective computer systems of participants of the call. In some embodiments, the shared content 2246 is displayed at a position within the shared three-dimensional environment of a respective computer system similar to a physical object having the size and dimensions and position of the shared content 2246 placed at a position within a physical environment including the first, this second, and the third participants. In some embodiments, shared content 2246 can be moved relative to the shared three-dimensional environment, as described further with reference to method 2300. In some embodiments, the shared content 2246 includes one or more selectable options, such as button 2248 that is selectable to display the shared content at a respective position within the shared three-dimensional environment (e.g., a docked position). In some embodiments, the shared content 2246 cannot be moved from the respective position before detecting an express input directed to shared content 2246 requesting display of shared content 2246 at positions other than the respective position (e.g., in response to detecting an input requesting movement of the shared content, the computer system forgoes moving the shared content from the respective position within the fallback environment, until an input requesting an "undocking"—described further with reference to method 2300—of the shared content from the respective position is received, such as a selection of a button). For example, in response to detecting an air gesture (e.g., an air pinch contacting fingers of a hand of the user, an air pointing of a finger, and/or an air swiping of one or more fingers), at computer system 101*a*, computer system 101*b*, and/or computer system 101*c*, respectively directed to representation of shared content 2246 displayed at the respective computer system(s) that detect the air gesture, and while the shared content is displayed at the respective position, the respective computer system(s) forgo moving the representation of shared content 2246 within the respective three-dimensional environment(s) of the respective computer system(s). Computer system 101*b* in FIG. 22F detects input 2250 directed to button 2248, and in response, initiates and/or initiates process to display shared content 2246 at the respective position within the shared three-dimensional environment, and communicates an indication to computer system 101*a* and computer system 101*c* to similarly display the shared content 2246 at the respective position. In some embodiments, displaying shared content 2246 at the respective position includes displaying shared content 2246 with a relatively increased scale relative to the shared three-dimensional environment, such as if the shared content 2246 were displayed at the size of a movie theater screen.

Figure 22G:
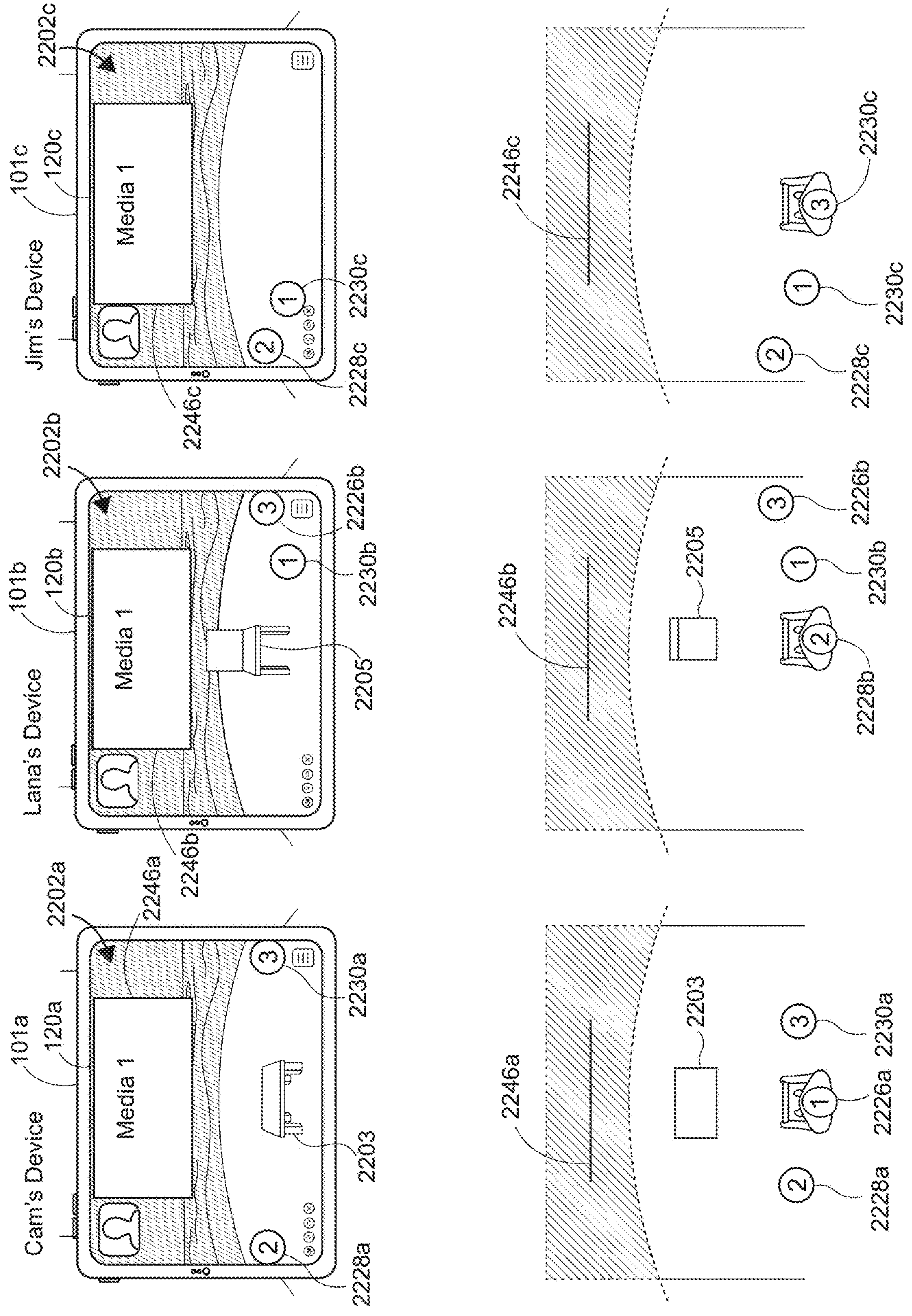

From FIG. 22F to FIG. 22G, the shared content 2246 is displayed at the respective position in response to detecting input 2250 in FIG. 22F. In some embodiments, the respective position corresponds to a position that is relatively far away from the current viewpoints of the participants of the real-time communication session. In some embodiments, the relative spatial arrangement of participants within the shared three-dimensional environment is maintained in response to initiating display of shared content 2246 at the respective position. In some embodiments, the spatial arrangement of the participants is changed in response to initiating display of shared content 2246 at the respective position, such as a spatial arrangement drawing the current viewpoints of the participants closer to the shared content, closer and or further away from one another, and/or rotating the current viewpoints to be directed toward the shared content 2246. In some embodiments, while displaying shared content 2246 at the respective position, a simulated lighting effect emanating from the shared content 2246 is displayed. For example, respective computer systems display regions of the shared three-dimensional environment between shared content 2246 and the current viewpoint of the user of a respective computer system with a simulated light spill effect, as if shared content 2246 were a bright light source virtually casting visible light onto the three-dimensional environment, thus illuminating portions of the shared three-dimensional environment. In some embodiments, the color, brightness, and/or saturation of the portions of the shared three-dimensional environment illuminated by shared content 2246 (e.g., a simulated illumination) correspond to the content that is currently displayed. For example, displaying an Arctic landscape including a bright white color results in a simulated illumination of the three-dimensional environment with a relatively high level of brightness and white light, as if the shared content 2246 were emitting bright white light onto the shared three-dimensional environment. In contrast, if displaying a lush, dark green jungle at nighttime within shared content 2246, the simulated illumination is optionally displayed with a relatively lower brightness of green light, and/or mimics the visual effect of a colored light source such as a green light source shining toward and illuminating the shared three-dimensional environment.

Figure 22H:
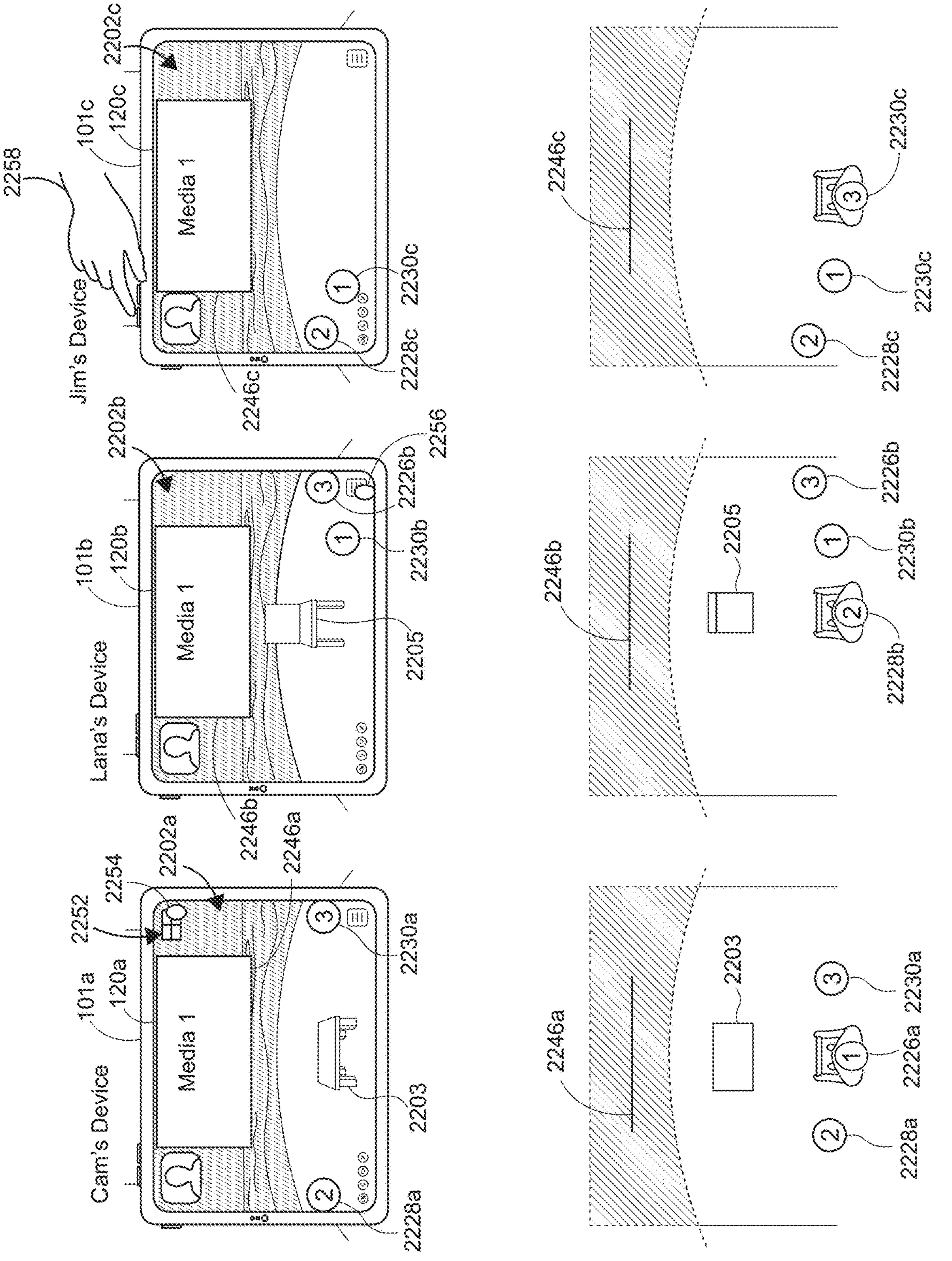

In some embodiments, respective computer systems display one or more selectable options and/or detect input to change the shared three-dimensional environment and/or to change a respective computer system detecting such input, without changing the shared three-dimensional environment. For example, computer system 101*a* displays one or more selectable options 2252 that are respectively selectable to initiate a process to display private content presented to the first participant, and not presented to the second participant and the third participant. In FIG. 22H, computer system 101*a* detects input 2254, corresponding to a request to initiate display of private content that is only presented to the first participant. Computer system 101*b* in FIG. 22H detects input 2256 directed to selectable option 2204*b*, corresponding to input requesting initiation of a process to select and update the shared three-dimensional environment. In FIG. 22H, computer system 101*c* detects user input 2258, such as input directed to hardware control circuitry, such as a rotational crown button, a push button, and or a rotary encoding circuit, corresponding to a request to change a level of immersion of three-dimensional environment 2202*c* described further with reference to method 2300.

Figure 22I:
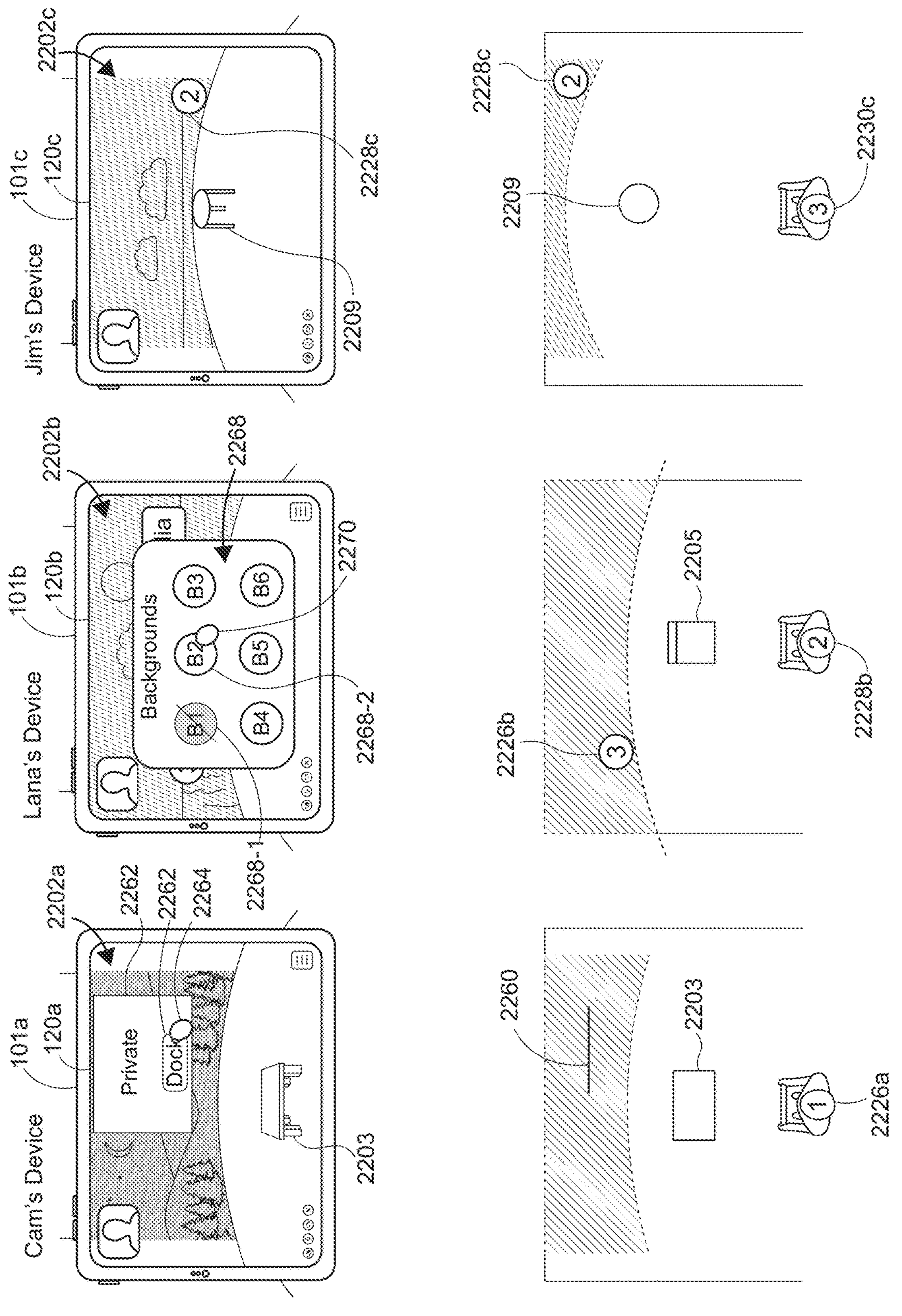

From FIG. 22H to FIG. 22I, computer systems display and perform operations in accordance with inputs directed to respective computer systems in FIG. 22H. For example, computer system 101*a* changes three-dimensional environment 2202*a* to correspond to a private three-dimensional environment different from the shared three-dimensional environment. At times, such a different three-dimensional environment that is displayed while private content is being displayed (e.g., and while the computer system presenting the different three-dimensional environment is participating in a call, and not presenting a shared three-dimensional environment of the call) is referred to herein as a private environment. In some embodiments, one or more characteristics of the private environment are different from the shared environment, and in some embodiments, changes to such one or more characteristics do not affect the shared environment. For example, computer system 101*a* displays a private environment included in three-dimensional environment 2202*a* in FIG. 22I, that is displayed with a time of day setting corresponding to a nighttime setting, described further with reference to method 2300. In FIG. 22I, computer system 101*b* and computer system 101*c* display the shared environment with a daytime time of day setting within three-dimensional environment 2202*b* and 2202*c*, respectively. In some embodiments, the private content corresponds to one or more user interfaces, such as user interfaces of applications like a text messaging application, a photo sharing application, and or private media. In some embodiments, the private content has one or more characteristics of shared content 2246 described previously, however, private content 2260 is not shared and displayed with the other participants of the call. For example, private content 2260 includes selectable option 2262 that is selectable to initiate a process to display the private content at a respective position within the private three-dimensional environment 2202*a*, and not within the shared environment (e.g., three-dimensional environments 2202*b*, and/or 2202*c*). In FIG. 22I, computer system 101*a* detects input 2264 directed to selectable option 2262, requesting a docking of the private content 2260 (e.g., movement of the private content to a respective position within the private three-dimensional environment in FIG. 22I).

In FIG. 22I, at computer system 101*b*, in response to detecting input 2256 in FIG. 22H, computer system 101*b* presents a menu to change the shared three-dimensional environment to correspond to a new virtual environment. For example, menu 2266 includes a plurality of selectable options 2268, including a first selectable option 2268-1 displayed with first visual appearance, corresponding to a first background that is not available to all participants of the call, and is accordingly displayed with the first visual appearance (e.g., a first fill color, opacity, including first visual elements such as the line drawn through selectable option 2268-1). Selectable options 2268 also includes one or more shared environments that are available to the participants of the call, such as selectable option 2268-2 corresponding to an available three-dimensional environment that is not yet displayed, displayed with a second visual appearance, different from the first (e.g., with a second fill color, and/or not including the line drawn through selectable option 2268-2). At computer system 101*b* in FIG. 22I, computer system 101*b* detects input 2270 corresponding to a selection and request to change the shared three-dimensional environment to correspond to a three-dimensional environment associated with selectable option 2268-2.

In FIG. 22I, computer system 101*c* changes the level of immersion of three-dimensional environment 2202*c* in response the user input 2258 detected by computer system 101*c* in FIG. 22H. For example, the relative amount of three-dimensional environment 2202*c* where virtual content is displayed is relatively lesser in FIG. 22I then in FIG. 22H, as shown in the overhead view, and as shown in the retreating of the bottom edge of the virtual content in FIG. 22I, and as emphasized by the visibility of the physical object 2213*c*. In some embodiments in response to such a request, the level of immersion to the shared environment presented at other computer systems, such as at computer system 101*b*, is also changed. In some embodiments, in response to such a request, the level of immersion of a private environment, such as included in the three-dimensional environment 2202*a* of the first participant, is not changed.

Figure 22J:
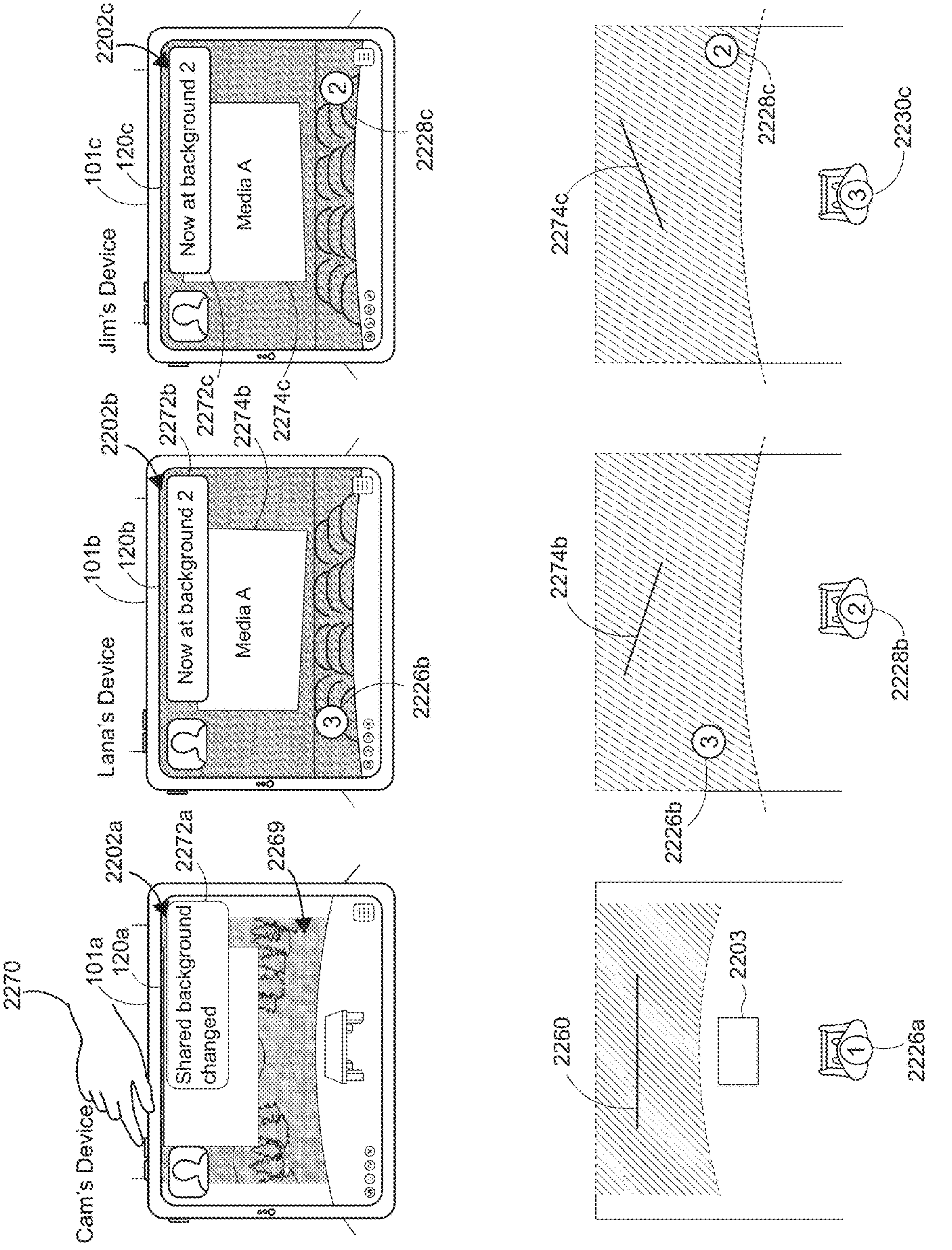

From FIG. 22I to FIG. 22J, computer system 101*a* displays private content 2260 at a respective position within private environment 2269 included in three-dimensional environment 2202*a*. From FIG. 22I to FIG. 22J, in response to input 2270 detected by computer system 101*b* in FIG. 22I, three-dimensional environment 2202*b* and three-dimensional environment 2202*c* are updated to correspond to a new shared environment, and three-dimensional environment 2202*a* is not changed to include the shared environment.

In FIG. 22J, computer system 101*a* changes a level of immersion of the private three-dimensional environment 2269 included in three-dimensional environment 2202*a*, as shown by the modified dimensions of the private environment indicated by the hatched portion of the user's environment illustrated in the overhead view, in response to the input requesting docking of the private content 2260 detected in FIG. 22I. Private environment 2269 is optionally a three-dimensional environment that is different from the shared environment (e.g., a different virtual scene, a different time of day setting, a different level of immersion, and/or including different virtual content).

In FIG. 22J, computer systems displaying the shared environment visually indicate that their shared environment changed. For example, computer system, 101*b* displays notification 2272*b* in FIG. 22J, and computer system 101*c* displays notification 2272*c*, notifying the users that the shared three-dimensional environment has changed to a new three-dimensional environment (e.g., "Now at background 2"). In some embodiments, a level of immersion of the shared three-dimensional environment is changed when displaying a new three-dimensional environment in accordance with a determination that one or more criteria or satisfied. For example, the shared environment included in three-dimensional environments 2202*b* and 2202*c* are relatively increased in a level of visual immersion in FIG. 22J, relative to as shown in FIG. 22I. In some embodiments, the one or more criteria include a criterion that is satisfied when shared content (e.g., shared content 2274*b* at computer system 101*b*, and shared content 2274*c* at computer system 101*c*, such as media content) displayed in the shared environment requires a relatively increased or decreased level of immersion (e.g., an increased level of immersion in FIG. 22J).

In FIG. 22J, computer system 101*b* and computer system 101*c* do not display a representation of the user of computer system 101*a*, due to the user being engaged in private content and/or a private environment. In some embodiments, while computer system 101*a* is displaying private environment 2690, computer system 101*b* and computer system 101*c* display a placeholder representation, that has different characteristics (e.g., spatial profile, color, and/or information) than if computer system 101*a* displayed the shared environment.

It is understood that computer system 101*a* in FIG. 22J continues to participate in the real time communication session, however, presents a view of a private environment 2269 and private content 2060 instead of the shared environment. In some embodiments, to preserve user awareness of changes to the shared environment that are not displayed within a private environment, a computer system displays a visual indication of such changes to the shared environment. For example, computer system 101*a* in FIG. 22J displays visual indication 2272*a* indicating that the shared environment has changed to a new environment, for example, as presented in a computer system 101*b*. In some embodiments, visual indication 2272*a* additionally or alternatively notifies the user of computer system 101*a* that changes in level of immersion of the shared content, a change in mode of the three dimensional environment, and/or changes to shared content, such as an initiation of display, ceasing, and/or one or more change to the characteristics of the shared content, such as brightness, position, and/or a simulated dimming affect, have been applied to the shared content and/or the shared three-dimensional environment.

Figure 22K:
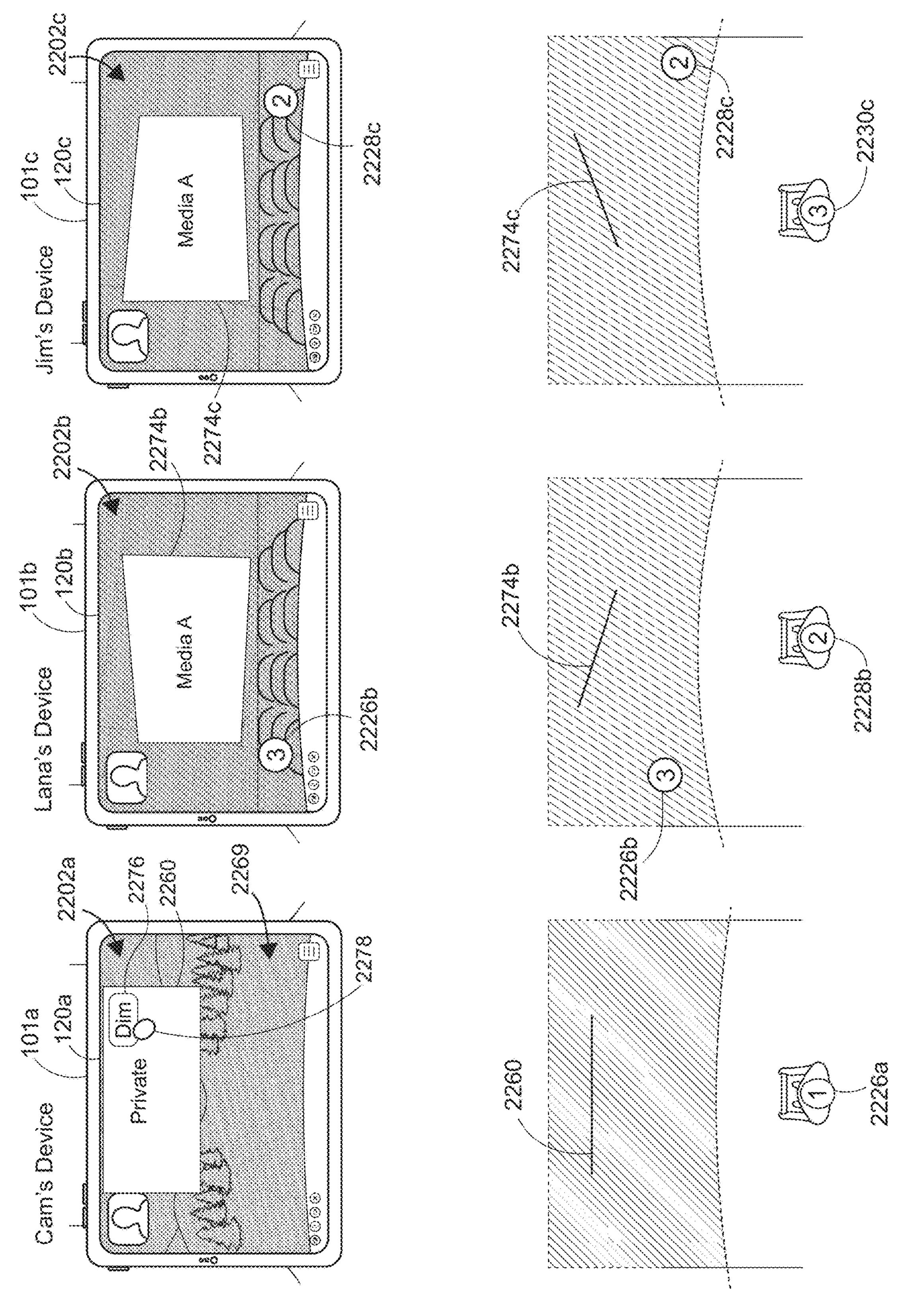
Figure 22L:
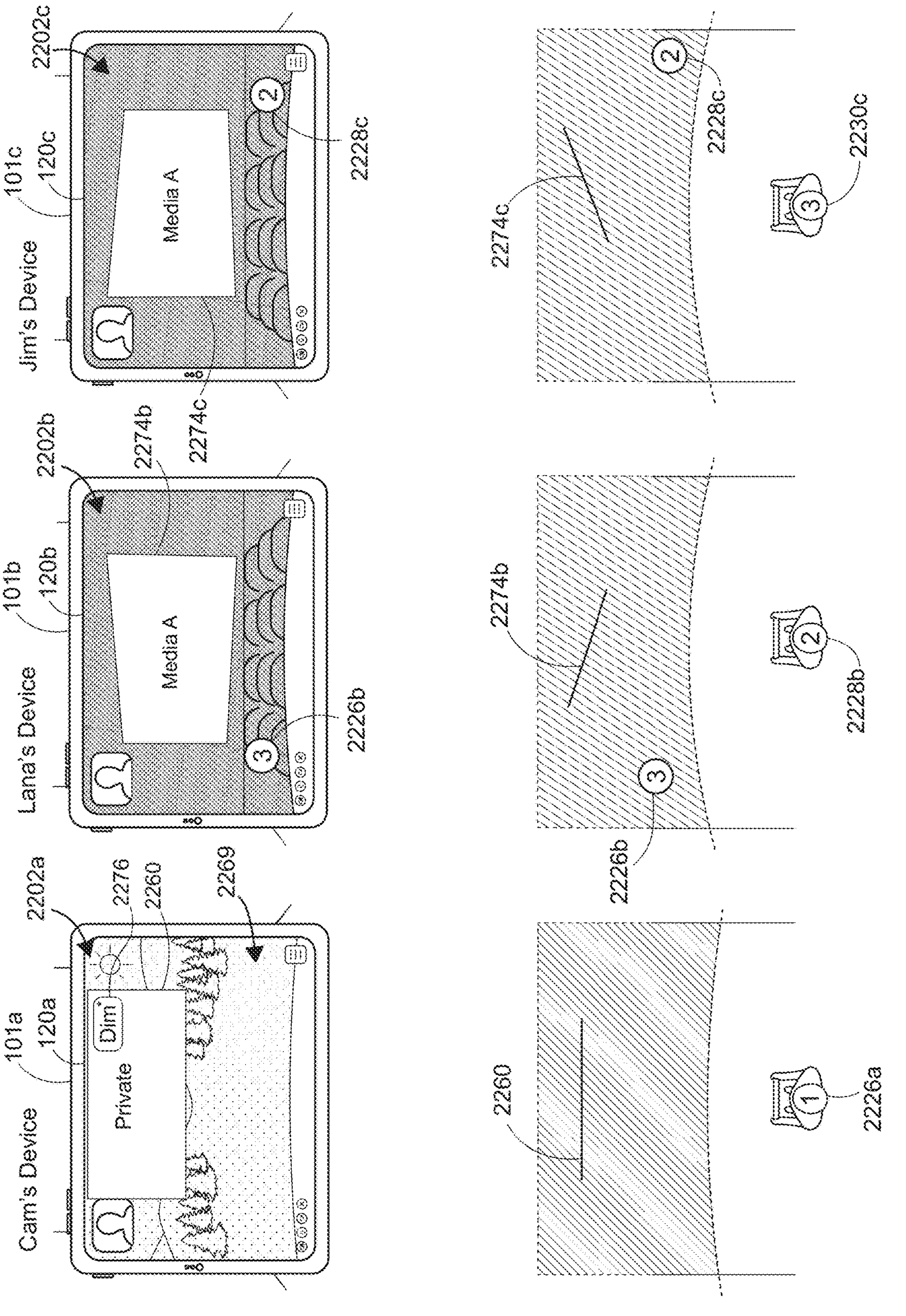

In FIG. 22J, computer system 101*a* detects an input 2275 requesting a change a level of immersion of the private environment included in three-dimensional environment 2202*a*. In FIG. 22K, in response to the input 2275 detected by computer system 101 in FIG. 22J, computer system 101*a* increases the level of immersion of private environment 2269, and computer systems 101*b* and 101*c* maintain the level of immersion of the shared three-dimensional environment. Thus, in some embodiments, computer systems (e.g., computer system 101*a* in FIG. 22J) detect input requesting changes directed to private content and/or environments, and in response, change the private content and/or environments in accordance with the input. In FIG. 22K, private content 2260 includes a selectable option 2276, associated with changing a visual appearance of three-dimensional environment 2202*a*. In FIG. 22K, computer system 101*a* detects input 2278 directed to selectable option 2276. In FIG. 22L, computer system 101*a* toggles a visual appearance mode associated with private content 2260, in response to the input 2278 detected in FIG. 22K, as described further with reference to method 3100. For example, computer system 101*a* in FIG. 22L toggles a diming setting of private environment 2269, to transition from a relatively dimmed appearance—as shown in FIG. 22K—to a relatively less dimmed appearance—as shown in FIG. 22L, or vice versa. In some embodiments, the changing of visual appearance of private environment 2269 in FIG. 22L includes changing a brightness of the private environment 2269, and/or changing visual appearance of virtual content to convey a relatively brighter appearance of private environment 2269 relative to private content 2260. This change in the visual appearance of the three-dimensional environment at computer system 101*a* optionally does not affect the visual appearances of the three-dimensional environments of computer systems 101*b* and 101*c*.

FIG. 23 is a flowchart for illustrating a method 2300 of facilitating sharing of a virtual three-dimensional environment in accordance with some embodiments. In some embodiments, the method 2300 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2300 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2300 are, optionally, combined and/or the order of some operations is, optionally, changed.

In some embodiments, method 2300 is performed at a first computer system, such as computer system 101*a* in FIG. 22A, in communication (e.g., included in and/or communicatively linked) with one or more input devices and a display generation component, such as image sensors 314*a* and display generation component 120*a* in FIG. 22A. For example, the first computer system optionally has one or more characteristics of the computer system(s) described with reference to methods 800, 1000, 1200, 1400, 1600, 1800, 2000, and/or 2100. Additionally or alternatively, the one or more input devices optionally have one or more characteristics of the one or more input devices described with reference to methods 800, 1000, 1200, 1400, 1600, 1800, 2000, and/or 2100, and the display generation component optionally has one or more characteristics of the display generations component(s) described with reference to method 800, 1000, 1200, 1400, 1600, 1800, 2000, and/or 2100.

In some embodiments, while a first three-dimensional environment, such as three-dimensional environment 2202*a*, is visible via the display generation component, the first computer system detects, (2302*a*) via the one or more input devices, a first event, such as input 2210 in FIG. 22A. In some embodiments, the first three-dimensional environment has one or more characteristics of the three-dimensional environment(s) described with reference to methods 800, 1000, 1200, 1400, 1600, 1800, 2000, and/or 2100. In some embodiments, detecting the first event includes detecting one or more user inputs and/or the first event includes satisfaction of one or more criteria with respect to the first three-dimensional environment, the computer system, and/or the user of the computer system. For example, the first event optionally includes detecting an input initiating a real-time communication session between a user of the first computer system and a participant of the real-time communication session (e.g., a second user), optionally of a second computer system different from the first computer system (e.g., the real-time communication session having one or more characteristics of similar communication session(s) described with reference to method 1400, 1800, 2500, and/or 2700). Additionally or alternatively, the first event optionally includes detecting the second user or participant join a current communication session provided by a second computer system, and/or detecting an indication of the second user or participant joining the current communication session provided by another computer system other than the first and/or the second computer systems.

In some embodiments, in response to detecting the first event (2302*b*), in accordance with a determination that the first event satisfies one or more first criteria, including a first criterion that is satisfied when the first event includes an initiation of a first communication session (e.g., a real-time communication session) between a user of the first computer system and a participant in the first communication session, different from the user (e.g., of a second computer system, different from the first computer system), such as initiating a communication session with computer system 101*b* and/or computer 101*c* in FIG. 22A, and a second criterion that is satisfied when the first communication session is associated with a second three-dimensional environment (e.g., as described further, below), different from the first three-dimensional environment (2302*c*) (e.g., the second three-dimensional environment has one or more characteristics of the three-dimensional environment(s) described with reference to methods 800, 1000, 1200, 1400, 1600, 1800, 2000, and/or 2100), such as the three-dimensional environment 2202*a* in FIG. 22E, the first computer system ceases (2302*d*) visibility of the first three-dimensional environment via the display generation component, such as ceasing display of an immersive environment included in three-dimensional environment 2202*a* in FIG. 22A. For example, the first event optionally includes one or more user inputs to initiate the first communication session with the participant and/or one or more user inputs selecting the second three-dimensional environment, such as an input selecting a selectable icon representative of the second three-dimensional environment from a user interface presenting a plurality of three-dimensional environments the user can share with the participant (e.g., a graphic, text, and/or other media corresponding to the second three-dimensional environment). In some embodiments, the first and/or the second three-dimensional environments include a virtual environment and/or immersive virtual content (e.g., having one or more characteristics of similar environments and/or virtual content described with reference to methods 800, 1000, 1200, 1400, 1600, 1800, 2000, and/or 2100) that is displayed at least partially replacing representations of the user's physical environment and/or overlaying virtual content over representations of the user's physical environment. For example, the first three-dimensional environment optionally includes a first immersive scene (e.g., a lake, a beach, a forest, and/or a tundra) and the second three-dimensional environment optionally includes a second, different immersive scene before the first event is detected; in response to detecting the first event and when the first event satisfies the one or more first criteria, the first computer system optionally initiates a process to display a joint three-dimensional environment (e.g., second three-dimensional environment) that is visible at (e.g., displayed by) the first computer system and at the second computer system, described further below.

In some embodiments, the first event includes a request to initiate real-time, or nearly real-time communication between the user and the participant within the joint three-dimensional environment, such as a real-time communication session between computer system 101*a*, computer system 101*b*, and/or computer system 101*c* in FIG. 22A. During the first communication session corresponding to such a real-time communication session, respective representations of the joint three-dimensional environment are optionally visible to (displayed at respective computer systems of) the first and the participant, and the first and/or second computer system optionally display representations of the other users of the other computer systems, and optionally displays and/or conveys communication (e.g., text, media, voice, and/or movement) of the other users throughout the joint three-dimensional environment in real-time, or nearly real-time, as the other users provide such communication. It is understood that description of real-time communication sessions herein optionally applies to nearly real-time communication sessions. In some embodiments, the participant received an invitation to join the real-time communication session (e.g., communicated by the first computer system) from the user, the participant invited the user and/or the first computer system to join the real-time communication session, the user and/or first computer system joins an ongoing communication session that includes the participant, and/or the participant joins an ongoing communication session that included the user of the first computer system.

In some embodiments, the first computer system communicates information to the second computer system in response to the first event, such as information communicated to computer system 101*b* and computer system 101*c* in FIGS. 22B and 22B1. For example, in response to detecting one or more selections inputs (e.g., an air gesture such as an air pinch gesture contacting a thumb and a finger of the user, a contacting of a trackpad in communication with the first computer system while a cursor is directed to a representation of the second three-dimensional environment, and/or a voice command specifying a desired second three-dimensional environment) directed to the previously described selectable option corresponding to the second three-dimensional environment, the first computer system optionally communicates a request to initiate and/or change display of the joint three-dimensional environment to the second computer system. In some embodiments, the first event includes one or more user inputs including a selection of a representation of the participant and/or a computer system associated with the participant, such as a name and/or graphical icon corresponding to the participant.

In some embodiments, the first computer system displays the first and/or second environment with a level of immersion, such as a level of immersion of three-dimensional environment 2202*a* in FIG. 22A and/or in FIG. 22E. For example, a level of immersion includes an associated degree to which the virtual content displayed by the computer system obscures background content (e.g., the three-dimensional environment including the physical environment) around/behind the virtual content, optionally including a number of items of background content displayed and the visual characteristics (e.g., colors, contrast, and/or opacity) with which the background content is displayed, and/or the angular range of the content displayed via the display generation component (e.g., 60 degrees of content displayed at low immersion, 120 degrees of content displayed at medium immersion, and/or 180 degrees of content displayed at high immersion), and/or the proportion of the field of view displayed via the display generation consumed by the virtual content (e.g., 33% of the field of view consumed by the virtual content at low immersion, 66% of the field of view consumed by the virtual environment at medium immersion, and/or 100% of the field of view consumed by the virtual content at high immersion). In some embodiments, at a first (e.g., high) level of immersion, the background, virtual and/or real objects are displayed in an obscured manner. For example, respective virtual content with a high level of immersion is displayed without concurrently displaying the background content (e.g., in a full screen or fully immersive mode). In some embodiments, at a second (e.g., low) level of immersion, the background, virtual and/or real objects are displayed in an obscured manner (e.g., dimmed, blurred, and/or removed from display). For example, virtual content with a low level of immersion is optionally displayed concurrently with the background content, which is optionally displayed with full brightness, color, and/or translucency. As another example, virtual content displayed with a medium level of immersion is optionally displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed.

For example, the first computer system optionally ceases display of virtual content included in the first three-dimensional environment in response to detecting the first event satisfying the one or more criteria, such as ceasing display of virtual content included in three-dimensional environment 2202*a* in FIG. 22A. The ceasing optionally includes changing a visual prominence of the virtual content relative to the user's physical environment (e.g., increasing a translucency of the virtual content and/or optionally animating a gradually increasing of the translucency). In some embodiments, the computer system maintains display of a portion of virtual content (e.g., virtual objects, such as objects including user interfaces for messaging applications, web browsing applications, text editing applications, and/or objects such as a virtual car and/or a virtual barn) that was displayed before the first event was detected, even when visibility of the first three-dimensional environment is ceased. For example, the first computer system optionally maintains display of one or more virtual objects including one or user interfaces of applications (e.g., a messaging application, a media playback application, a web browsing application, and/or a system settings or preferences application) while display of the first three-dimensional environment is ceased and/or reduced in a level of visual prominence (e.g., opacity). In some embodiments, ceasing visibility of the first three-dimensional environment corresponds to an at least partial obscuring of visibility of a representation of the user's physical environment (e.g., a portion of the physical environment that would otherwise be visible via the display generation component via optical or virtual passthrough) with virtual content (e.g., portions of the second three-dimensional environment described further below).

In some embodiments, the first computer system initiates (2302*e*) a process to display, and/or directly displays, via the display generation component, the second three-dimensional environment, wherein an appearance of a portion of the second three-dimensional environment that is visible to the user changes for the user when the viewpoint of the user changes (e.g., moves and/or rotates), such as the three-dimensional environment 2202*a* in FIG. 22E. For example, the computer system optionally initiates a cross-fading animation gradually decreasing a level of visual prominence of first virtual content included in the first three-dimensional environment and concurrently, gradually increasing a level of visual prominence of second respective content included in the second three-dimensional environment, and abruptly and/or gradually displaying the avatar corresponding to the participant at any point during, shortly before, and/or shortly after the changing of the levels of visual prominence of the three-dimensional environments. In some embodiments, the first computer system ceases display of the first three-dimensional environment before initiating display of the second three-dimensional environment. In some embodiments, a displayed portion of the second three-dimensional environment changes in response to detecting movement of a current viewpoint of the user relative to the second three-dimensional environment. For example, while the viewpoint of the user has a first position and/or orientation relative to the second three-dimensional environment, the computer system displays a first portion of virtual content included in the second three-dimensional environment (e.g., a virtual lake, a portion of a virtual sky, a portion of a virtual floor, and/or a virtual table), such as if the user were physically looking positioned and/or oriented toward a first portion of a physical environment (e.g., simulated by the second three-dimensional environment). In response to detecting a change in the current viewpoint to an updated viewpoint (e.g., movement and/or rotation of the user, movement of the computer system, display generation component, and/or one or more inputs devices, and/or input directed toward a peripheral such as a joystick or trackpad corresponding to a request to move the current viewpoint), the computer system optionally changes an appearance of displayed virtual content in accordance with the changing of the current viewpoint (e.g., including ceasing display of virtual content, updating display of virtual content to reflect an updated, simulated viewing angle relative to the virtual content, and/or initiating display of virtual content corresponding to what is newly visible relative to the updated viewpoint within the second three-dimensional environment), similar to if the user physically turned their head and/or moved throughout a physical environment. Thus, in response to detecting a change in viewpoint of the computer system, the computer system updates an appearance of the second three-dimensional environment.

In some embodiments, in accordance with a determination that the first event does not satisfy the one or more first criteria, the first computer system maintains (23020 visibility of the first three-dimensional environment via the display generation component (and, optionally, forgoing initiating the process to display the second three-dimensional environment), such as maintaining display of three-dimensional environment 2202*a* in FIG. 22A. For example, when the first computer system detects and/or receives an indication that the second-three-dimensional is not suitable for the first communication session, the computer system determines the one or more first criteria are not satisfied and forgoes display of the second three-dimensional environment, and optionally maintains display of the representation of the participant in the first three-dimensional environment (e.g., in accordance with a determination that the first criterion is satisfied, but the second criterion is not satisfied). In some embodiments, the first computer system determines the one or more first criteria are not satisfied in accordance with a determination that the second computer system is not configured to display the second three-dimensional environment (e.g., due to hardware limitations, software limitations, and/or because the second computer system has not stored at least a portion of information included in the second-three dimensional environment in its memory). Displaying the second three-dimensional environment in accordance with a determination the one or more first criteria are satisfied facilitates communication between the first and the participant, reducing the need for additional, express input to share the second three-dimensional environment in the communication session.

In some embodiments, initiating the process to display the second three-dimensional environment includes sharing the second three-dimensional environment with the participant, such as sharing three-dimensional environment 2202*a* with computer system 101*b* in FIGS. 22B and 22B1, and includes displaying, via the display generation component, a visual representation of the participant in the second three-dimensional environment, such as representation 2228*a* in FIG. 22C. In some embodiments, the computer system begins to replace display of the first three-dimensional environment with the second three-dimensional environment, and concurrently begins to display a representation of the participant, such as an avatar corresponding to the participant. In some embodiments, the representation of the participant has one or more characteristics of representations of other users of other computer systems described with reference to methods 1400, 1800, 2500, and/or 2700. In some embodiments, the participant's avatar has a spatial profile that is similar to the physical features of the participant. In some embodiments the participant's avatar is displayed at a position within the second three-dimensional environment that is different from the user's position within the second three-dimensional environment (e.g., the viewpoint of the user in the second three-dimensional environment), similar to if the two users were occupying different positions within a same physical room. In some embodiments, the computer system additionally displays representations of one or more other users (e.g., one or more additional avatars) at positions within the three-dimensional environment to reflect the one or more other users' participation in the real-time communication session.

As referred to herein, visual prominence of virtual content optionally refers to display of one or more portions of the virtual content with one or more visual characteristics such that the virtual content is optionally distinct and/or visible relative to a three-dimensional environment as perceived by a user of the computer system. In some embodiments, visual prominence of virtual content has one or more characteristics described with reference to displaying virtual content at a level of immersion greater and/or less than an immersion threshold. For example, the computer system optionally displays respective virtual content with one or more visual characteristics having respective values, such as a virtual content that is displayed with a level of opacity and/or brightness. The level of opacity, for example, optionally is 0% opacity (e.g., corresponding to virtual content that is not visible and/or fully translucent), 100% opacity (e.g., corresponding to virtual content that is fully visible and/or not translucent), and/or other respective percentages of opacity corresponding to a discrete and/or continuous range of opacity levels between 0% and 100%. Reducing visual prominence of a portion of virtual content, for example, optionally includes decreasing an opacity of one or more portions of the portion of virtual content to 0% opacity or to an opacity value that is lower than a current opacity value. Increasing visual prominence of the portion of the virtual content, for example, optionally includes increasing an opacity of the one or more portions of the portion of virtual content to 100% or to an opacity value that is greater than a current opacity value. Similarly, reducing visual prominence of virtual content optionally includes decreasing a level of brightness (e.g., toward a fully dimmed visual appearance at a 0% level of brightness or another brightness value that is lower than a current brightness level), and increasing visual prominence of virtual content optionally includes increasing the level of brightness (e.g., toward a fully brightened visual appearance at a 100% level of brightness or another brightness value that is higher than a current brightness level) of one or more portions of the virtual content. It is understood that additional or alternative visual characteristics optionally are included in modification of visual prominence (e.g., saturation, where increased saturation increases visual prominence and decreased saturation decreases visual prominence; blur radius, where an increased blur radius decreases visual prominence and a decreased blur radius increases visual prominence; contrast, where an increased contrast value increases visual prominence and a decreased contrast value decreases visual prominence). Changing the visual prominence of an object can include changing multiple different visual properties (e.g., opacity, brightness, saturation, blur radius, and/or contrast). Additionally, when visual prominence of a first object is increased relative to visual prominence of a second object, the change in visual prominence could be generated by increasing the visual prominence of the first object, or decreasing the visual prominence of the second object, increasing the visual prominence of both objects with the first object increasing more than the second object, or decreasing the visual prominence of both objects with the first object decreasing less than the second object. Sharing a three-dimensional environment with a real-time communication session and displaying a visual representation of a participant facilitates simulated verbal communication and non-verbal communication between the user and the participant, thus improving efficiency of communication and reducing cognitive burden of the user.

In some embodiments, the second three-dimensional environment is displayed in conjunction with (e.g., concurrently with, just before, just after, or in response to detecting that) a start of the first communication session, such as the start of the communication session between computer systems 101*a-c* as shown in FIG. 22A and FIGS. 22B and 22B1. In some embodiments the first communication session is initiated in response to obtaining an indication that a second computer system associated with the participant has requested an initiation of the first communication session. In some embodiments the first communication session is initiated by the user of the first computer system in response to detecting one or more user inputs at the first computer system. In some embodiments, the information about the first event includes one or more characteristics of the shared three-dimensional environment that participants of the real-time communication session will enter. For example, one or more characteristics include metadata describing virtual objects inserted into the shared three-dimensional environments, and/or background virtual content, such as a virtual sky and/or a virtual ground without included in the shared three-dimensional environment. In some embodiments, before detecting the first event, the computer system maintains visibility of a currently visible three-dimensional environment. Changing the visible three-dimensional environment in response to obtaining information about an event reduces the need for manual user input to request visibility of an updated three-dimensional environment associated with the first communication session, thereby reducing processing required to handle such user inputs.

In some embodiments, while the first three-dimensional environment is visible via the display generation component, the first computer system detects, via the one or more input devices, a second event, different from the first event, such as computer system 101*b* joining the real-time communication session, optionally without computer system 101*a* inviting computer system 101*b* to join the real-time communication session in FIG. 22A. For example, the second event has one or more characteristics of second events described herein.

In some embodiments, in response to detecting the second event, in accordance with a determination that the second event satisfies one or more second criteria, different from the one or more first criteria, including a criterion that is satisfied when the second event includes detecting an indication that a second participant has joined the first communication session, the first computer system ceases visibility of the first three-dimensional environment via the display generation component, such as computer system 101*a* ceasing display of the three-dimensional environment 2202*a* in FIGS. 22B and 22B1. For example, the computer system optionally changes a visible three-dimensional environment in response to detecting a second event associated with the second participant and/or one or more additional participants joining the first communication session. In some embodiments, the second event includes detecting an indication that the second participant has accepted an invitation to join the first communication session. In some embodiments the second event includes an indication that the user of the first computer system and/or the participant has approved a request provided by the second participant to join the first communication session. In some embodiments, the one or more second criteria additionally or alternatively include a criterion that is satisfied when the second event includes detecting a request to merge the first communication session with another communication session that the second participant is currently participating in. In some embodiments, the first computer system initiates a process to display a third three-dimensional environment replacing visibility of a current three-dimensional environment, in response to detecting and/or obtaining information indicating that the respective participant will join the first communication session and in accordance with a determination that the one or more second criteria are satisfied. Additionally or alternatively, if the second three-dimensional environment is currently visible, the computer system optionally ceases visibility of the second three-dimensional environment in accordance with a determination that the one or more criteria are satisfied.

In some embodiments, the first computer system initiates a process to display, via the display generation component, a third three-dimensional environment, different from the first three-dimensional environment, wherein an appearance of a portion of the third three-dimensional environment that is visible to the user changes for the user when the viewpoint of the user changes, such as a three-dimensional environment at computer system 101*a* that is different from the three-dimensional environment 2202*a* in FIG. 22A and/or FIG. 22E. For example, the process to display the third three-dimensional environment optionally has one or more characteristics of the process to display the second three-dimensional environment described herein. In some embodiments, the third three-dimensional environment has one or more characteristics of the first three-dimensional environment and/or the second three-dimensional environment. In some embodiments, the process to display the third three-dimensional environment includes displaying one or more visual representations of other participants that are participating in the first communication session.

In some embodiments, in accordance with a determination that the second event does not satisfy the one or more second criteria, the first computer system maintains visibility of the first three-dimensional environment via the display generation component, for example, maintains visibility of three-dimensional environment 2202*a* in FIG. 22A. For example, the first computer system, optionally does not display the third three-dimensional environment in accordance with a determination that the one or more second criteria are not satisfied. Causing visibility of a third three-dimensional environment in response to detecting an event associated with a second participant joining the first communication session reduces the need for user input required to manually change to the third three-dimensional environment, thereby reducing processing and power consumption of the first computer system.

In some embodiments, while the first three-dimensional environment is visible via the display generation component, the first computer system detects, via the one or more input devices, a second event, different from the first event, such as computer system 101*b* detecting information from computer system 101*a* in FIGS. 22B and 22B1. In some embodiments, the second event is detected while the second three-dimensional environment described herein is visible and/or displayed.

In some embodiments, in response to detecting the second event, and in accordance with a determination that the second event is an event that will cause a change in a three-dimensional environment that is visible via the display generation component, such as an event including computer system 101*a* calling computer system 101*b* in FIG. 22A, the first computer system displays, via the display generation component, a visual indication, such as prompt 2218 in FIGS. 22B and 22B1, that indicates the change in the three-dimensional environment that is visible via the display generation component before initiating the change in the three-dimensional environment that is visible via the display generation component. For example, in response to the second event, and in accordance with a determination that the second event satisfies one or more criteria, the computer system initiates a process to cease display of a currently visible three-dimensional environment and initiates a process to display a replacement three-dimensional environment (similar or the same as described with respect to various embodiments herein). In some embodiments, the event that will cause the change in the three-dimensional environment has one or more characteristics of events described herein, with reference to participants of the call requesting a changing of the three-dimensional environment (e.g., a time of day, a change in environment, and/or a changing of a level of immersion), a participant joining the call, and/or a participant leaving the call. In some embodiments, the computer system displays a notification included in or corresponding to the visual indication that indicates an upcoming change in a currently visible three-dimensional environment at the first computer system. For example, the information optionally includes a general disclaimer that the current environment will change, optionally includes an identifier of the replacement environment, optionally includes a description of the replacement environment, optionally includes a description and/or identifier of a changing one or more characteristics of a currently visible environment, and/or optionally includes a graphic and/or animation drawing the user's attention to the information. In some embodiments, the visual indication is displayed overlaid over a current three-dimensional environment before transitioning to the replacement three-dimensional environment. In some embodiments, the visual indication continues to be displayed for a threshold period of time (e.g., 0.05, 0.1, 0.5, 1, 5, or 10 seconds) after transitioning to the replacement three-dimensional environment. Displaying a visual indication indicative of a change in a currently visible three-dimensional environment notifies the user of upcoming changes to their three-dimensional environment, thus reducing the likelihood that erroneous user input will be provided caused by confusion about the change in the three-dimensional environment, thereby reducing processing required to handle such erroneous inputs.

In some embodiments, the change in the three-dimensional environment that is visible via the display generation component includes changing from the first three-dimensional environment being visible via the display generation component to the second three-dimensional environment being visible via the display generation component, such as the changing of three-dimensional environment 2202*b* from as shown in FIGS. 22B and 22B1 to as shown in FIG. 22C. For example, the visual indication optionally includes information identifying the replacement three-dimensional environment (e.g., second three-dimensional environment), as described herein. Displaying a visual indication based on a change in a currently visible three-dimensional environment reduces the likelihood that erroneous user input will be provided caused by confusion about the change in the three-dimensional environment, thereby reducing processing required to handle such erroneous inputs.

In some embodiments, the change in the three-dimensional environment that is visible via the display generation component includes changing a time of day setting for the three-dimensional environment, such as a time of day setting associated with three-dimensional environment 2202*a* and/or computer system 101*a* in FIG. 22A. For example, as described further with reference to method 800, 1000, and/or 3100, the computer system optionally includes one or more user settings including a setting to modify a simulated time of day setting of a current three-dimensional environment. In response to detecting an event, such as one or more inputs detected at the first computer system, and/or obtaining information communicated from another computer system participating in the first communication session, that satisfies one or more criteria, including a criterion that is satisfied when the event includes a request to change the time of day setting, the computer system optionally displays the visual indication including information that the time of day setting will be changed and/or changes the simulated time of day of the current three-dimensional environment. In some embodiments, the simulated time of day setting is shared between participants of the first communication session. In some embodiments, the visual appearance of the three-dimensional environment changes in accordance with the simulated time of day setting. For example, first virtual content is displayed in accordance with a determination the time of day setting is a first setting (e.g., a day time setting, the virtual content including a virtual sun, one or more virtual birds, and "Open" sign on a virtual shop, and/or a vacant fire pit at a virtual campground), and second virtual content is displayed in accordance with a determination that the time of day setting is a second setting (e.g., a night time setting, the virtual content including a virtual moon and not the virtual sun, not including the one or more virtual birds, including virtual stars, a "Closed" sign on a virtual shop, and/or a virtual fire lit in the virtual fire pit). In some embodiments, the visual indication describes the change and/or identifies a name of the updated setting. Displaying a visual indication based on a change in a currently visible three-dimensional environment reduces the likelihood that erroneous user input will be directed to virtual content that is no longer displayed in view of the updated time of day setting and/or virtual content that is relatively harder to interact with in view of the updated time of day setting, thereby reducing processing required to handle such erroneous inputs.

In some embodiments, the visual indication includes an identification of a respective participant of the first communication session that initiated the change in the three-dimensional environment that is visible via the display generation component such as an identifier included in prompt 2218*b* in FIGS. 22B and 22B1. For example, the visual indication includes the identification of a participant that caused the change in the environment. The information optionally identifies a device and/or a name registered with a user account registered with the device that requested the change in the three-dimensional environment. Additionally or alternatively, the information includes an avatar corresponding to the device and/or the user account. In some embodiments, the visual indication additionally or alternatively includes information and/or elements of the visual indication described herein, such as a time of day setting and/or information describing a replacement environment. In some embodiments, in accordance with a determination that the user of the computer system provided one or more inputs causing the change in the three-dimensional environment, the computer system forgoes display of the visual indication or modifies what respective information is included in the visual indication, such as forgoing display of information identifying the participant who changed the three-dimensional environment. Displaying a visual indication including an identifier corresponding to the participant that changed the three-dimensional environment reduces the likelihood that the user of the first computer system is disoriented by the change in three-dimensional environment, due to their notification that an individual changed their three-dimensional environment, thereby reducing cognitive burden of the user.

In some embodiments, the process to display the second three-dimensional environment includes displaying, via the display generation component, a visual indication associated with changing of a currently visible three-dimensional environment, such as displaying prompt 2218*b* in FIGS. 22B and 22B1. For example, the visual indication includes information such as a notification, a graphic, and/or text describing that the visible three-dimensional environment of the user will change. In some embodiments, the visual indication has one or more characteristics of previously described visual indications providing information associated with changing of the user's visible three-dimensional environment.

In some embodiments, in response to detecting the first event, and in accordance with the determination that the first event does not satisfy the one or more first criteria and that first event satisfies one or more second criteria, different from the one or more first criteria, including a criterion that is satisfied when the first event includes a request to share the first three-dimensional environment with the first communication session, such as a criterion satisfied when computer system 101*a* invites computer systems 101*b* and/or 101*c* to join a real-time communication session in FIG. 22A, the first computer system forgoes display of the visual indication associated with the changing of the currently visible three-dimensional environment (and optionally maintaining visibility of the first three-dimensional environment via the display generation component), such as computer system 101*a* not displaying a prompt similar to prompt 2218*b* in FIGS. 22B and 22B1. For example, the first computer system optionally detects one or more inputs provided by the user requesting a changing of the user's currently visible three-dimensional environment and/or of other three-dimensional environments visible at other computer systems of participants of the first communication session. In some embodiments, the one or more inputs include an input to display one or more menus, to navigate one or more menus, and/or to select a selectable option corresponding to a proposed environment for the first communication session; thus, at least a portion of the one or more inputs optionally satisfy a criterion that is satisfied when the first event includes a request to share the first three-dimensional environment with the first communication session. In response to detecting the first event, such as including the input selecting the proposed environment, the computer system optionally communicates a request to share the selected, proposed environment (e.g., the first environment that is already visible when the first event is detected), and/or forgoes display of the visual indication associated with the changing of the user's visible three-dimensional environment (e.g., when the one or more second criteria are satisfied). In some embodiments, in response to the first event and in accordance with a determination that the first event satisfies the one or more second criteria, the computer system displays an alternative visual indication, indicating that the user's first three-dimensional environment has been shared with other participants of the first communication session. Forgoing display of a visual indication of changing of the user's three-dimensional environment when the three-dimensional environment will not change reduces processing required to display such a superfluous visual indication.

In some embodiments, in response to detecting the first event, and in accordance with the determination that the first event does not satisfy the one or more first criteria and (e.g., the first event and/or one or more first criteria described herein) satisfies one or more second criteria, different from the one or more first criteria, including a criterion that is satisfied when the second event corresponds to a request that is provided by the participant to display a third three-dimensional environment in the first communication session, such as a request sent in response to detecting input 2270 in FIG. 22I, the first computer system ceases visibility of the first three-dimensional environment via the display generation component (e.g., as described herein), such as computer system 101*c* ceasing display of its three-dimensional environment 2202*c* from FIG. 22I to FIG. 22J. For example, the second event corresponds to and/or includes a request detected by a second computer system that the participant uses to access the first communication session, such as one or more user inputs, to display a third three-dimensional environment, optionally different from the second three-dimensional environment described herein. In some embodiments, the request includes one or more characteristics of the request to share the first three-dimensional environment with other participants of the first communication session described herein. In some embodiments, the third three-dimensional environment is currently displayed at the second computer system when the one or more inputs are received. In response to detecting the one or more user inputs, including the request to display the third three-dimensional environment, the second computer system communicates the request to the first computer system and/or other computer systems participating in the first communication session.

In some embodiments, in response to detecting the first event, the first computer system initiates a process to display and/or displays, via the display generation component, the third three-dimensional environment, wherein an appearance of a portion of the third three-dimensional environment that is visible to the user changes for the user when the viewpoint of the user changes, such as the three-dimensional environment 2202*c* in FIG. 22J. For example, the third three-dimensional environment has one or more characteristics of the second three-dimensional environment and/or similar to the second three-dimensional environment. Replacing visibility of the first three-dimensional environment with display of the third three-dimensional environment reduces user input required to manually select display of the third three-dimensional environment, thereby reducing processing required to handle the user input.

In some embodiments, while the first three-dimensional environment is visible via the display generation component, the first computer system detects, via the one or more input devices, a second event, different from the first event, such as an event including input 2270 in FIG. 22I. In some embodiments, in response to detecting the second event, and in accordance with a determination that the second event includes a request to change a respective three-dimensional environment displayed in the first communication session (and/or at a second computer system associated with the participant), such as the request corresponding to input 2270 in FIG. 22I, the first computer system displays, via the generation component, information notifying the user of the first computer system that a respective three-dimensional environment displayed at a second computer system associated with the participant will change, such as information including but not limited to notification in response to detecting input 2270 in FIG. 22I. For example, similar to as described herein with reference to the "alternative visual indication," the first computer system optionally displays an indication notifying the user that the user's actions will impact three-dimensional environments displayed at other computer systems participating in the first communication session. In some embodiments, the second event has one or more characteristics of previously described second events, such a detecting of one or more inputs to call other participants, and/or detecting a selection of a selectable option that is selectable to initiate the sharing of the user's currently visible three-dimensional environment. In some embodiments, the changing of the respective three-dimensional environment displayed at the second computer system, and of other respective three-dimensional environment displayed at other computer systems, have one or more characteristics similar or the same as described with reference to changing display and/or visibility of the three-dimensional environment visible at the first computer system. In some embodiments, the information notifying the user is displayed in response to detecting the second event, and in accordance with a determination that one or more criteria are satisfied, including a criterion that is satisfied when the first computer system has not detected an event requesting the sharing of the user's three-dimensional environment while the first communication session has been ongoing. Displaying a visual indication notifying the user that respective three-dimensional environment(s) of other participants of the first communication session will change reduces the likelihood the user erroneously provides a subsequent request to share a three-dimensional environment, thereby reducing processing required to handle the erroneous sharing input.

In some embodiments, while the first three-dimensional environment is visible via the display generation component and while the user of the first computer system is in the first communication session with the participant, the first computer system detects, via the one or more input devices, a first input corresponding to a request to display one or more visual representations of one or more three-dimensional environments that can be shared with participants of the first communication session, such as input 2256 as shown in FIG. 22H. For example, the first input and/or one or more inputs are detected by the first computer system. Embodiments referencing the first input are understood as applying to one or more suitable inputs additionally or alternatively. In some embodiments, the first input includes detecting attention of the user (e.g., gaze of the user) dwell upon a portion of the three-dimensional environment (e.g., a top portion, a center portion, a corner, and/or a user interface element) for a period of time greater than a threshold amount of time (e.g., 0.05, 0.1, 0.5, 1, 2.5, or 5 seconds). In some embodiments, the first input additionally or alternatively includes detecting an air gesture (e.g., an air pinch including contacting of two fingers of a hand, an air pointing of a finger and/or hand, and/or an air swiping moving finger(s) and/or a hand). In some embodiments, the first input includes selection of a menu user interface button. In response to the first input, the computer system optionally displays a menu, including one or more visual representation of three-dimensional environments available for sharing with participants of the first communication session.

In some embodiments, in response to receiving the first input, the first computer system displays, via the display generation component, a three-dimensional environment selection user interface including a visual indication indicating which three-dimensional environments can be shared with participants of the first communication session, such as included in selectable options 2268. For example, the first input optionally includes a selection of a selectable option displayed in a menu displayed via the display generation component, initially displayed in response to detecting a respective input at the first computer system. The menu, for example, optionally includes graphics corresponding to the available three-dimensional environments and/or text identifying and/or describing the available three-dimensional environment. In some embodiments, the selectable options include and/or correspond to the graphics and/or text. In some embodiments, in accordance with a determination that a respective three-dimensional environment does not satisfy one or more criteria, including a criterion that is satisfied when the respective three-dimensional environment is not available to one or more participants of the first communication session, the computer system visually distinguishes a selectable option corresponding to the respective three-dimensional environment (e.g., with a change (e.g., decrease or increase) in a level of opacity, saturation, brightness, and/or blurring effect applied to the selectable option and/or information associated with the selectable option). In some embodiments, a plurality of representations of respective environments are concurrently displayed indicating availability, and in some embodiments, a plurality of representations of respective environments are concurrently displayed indicating a lack of availability. In some embodiments, when the one or more criteria are satisfied, the first computer system forgoes display of the representation corresponding to the respective three-dimensional environment. Displaying a user interface illustrating which three-dimensional environments can be shared with the first communication session reduces user input required to manually browse and/or switch between various three-dimensional environments, thereby reducing processing required to handle such user input and display changes to the visible three-dimensional environment.

In some embodiments, the three-dimensional environment selection user interface includes a representation of a respective three-dimensional environment, such as a selectable option 2268-2 in FIG. 22I, and wherein, in accordance with a determination that the respective three-dimensional environment is available to the participants in the first communication session, the representation of the respective three-dimensional environment is selectable to initiate a process to share the respective three-dimensional environment with the first communication session, such as a selectable option 2268-2 in FIG. 22I. In some embodiments, the respective three-dimensional environment as described herein is displayed in a menu by the first computer system. In some embodiments, when the selectable option corresponding to the respective three-dimensional environment is available, the computer system initiates a process to share the respective three-dimensional environment, such as communicating a request to other computer systems participating in the first communication session to display respective three-dimensional environments corresponding to the selected three-dimensional environment. For example, the computer system optionally detects an input directed to, and selecting the selectable option, and in response to detecting the input, the computer system initiates a process to display the respective three-dimensional environment and communicates an indication of such a selection with participants of the first communication session. In some embodiments, an availability status of a respective three-dimensional environment is displayed. For example, a respective selectable option (e.g., the representation) corresponding to a respective three-dimensional environment is optionally displayed with visual characteristic(s) such as a first color, with a first fill pattern, a first level of a background fill (e.g., a matte fill having a first color), a first lighting effect, a first level of opacity, and/or including lines and/or text of a first color. In accordance with a determination that the respective three-dimensional environment is not available, as described further below, the computer system optionally displays the respective selectable option with a second color, with a second fill pattern, with a second level of background fill, a second lighting effect, a second level of opacity, and/or including lines and/or text of a second color, respectively different from the "first" visual characteristics of the available selectable option described herein. For example, the selectable option corresponding to an available three-dimensional environment is optionally displayed with black font and/or lines, predominantly opaque, and/or including a simulated background lighting effect, mimicking the appearance of a light source glowing behind the selectable option. When the corresponding three-dimensional environment is not available, the same selectable icon is optionally displayed with gray font and/or lines, with a relatively lower level of opacity (e.g., 30, 50, or 70% opacity), and/or without the simulated background lighting effect. In some embodiments, similar representations and/or selectable options corresponding to respective three-dimensional environment are displayed with one or more characteristics of the representations and/or selectable options described herein, such as similar representations included in different menus of the computer system.

In some embodiments, in accordance with a determination that the respective three-dimensional environment is not available to one or more participants in the first communication session, the representation of the respective three-dimensional environment is not selectable to initiate the process to share the respective three-dimensional environment with the first communication session, such as a selectable option 2268-1 in FIG. 22I. As described herein, in some embodiments, the respective three-dimensional environment is not available. For example, at least one computer system participating in the first computer system does not store data required to display the respective three-dimensional environment in memory, does not have sufficient internet access to obtain such data, is not configured (e.g., in user settings and/or in an operating system version) to support the environment, and/or has indicated a preference to not enter the respective three-dimensional environment selected. In some embodiments, in response to detecting selection of such a representation corresponding to the respective three-dimensional environment, the first computer system forgoes initiating the process to share the respective three-dimensional environment. Displaying a visual indication that a respective three-dimensional environment is not available reduces user input erroneously attempting to share the respective three-dimensional environment, thereby reducing user input and processing required to perform the attempt to share.

In some embodiments, the first event includes detecting a request to perform the initiation of the first communication session received from a second computer system associated with the participant, different from the first computer system, such as a request communicated by computer system 101*a* in FIG. 22*a*. For example, as described herein, in some embodiments, the initiation of the first communication is initiated when a request from the second computer system the participant uses to access the first communication session is received.

In some embodiments, the second three-dimensional environment corresponds to a respective three-dimensional environment displayed at the second computer system when the request to perform the initiation of the first communication session is detected (e.g., communicated to the first computer system and/or detected by the second computer system), such as the three-dimensional environment 2202*a* of computer system 101*a* in FIG. 22A. For example, the second three-dimensional environment optionally is a same three-dimensional environment (in terms of virtual content and/or spatial understanding) that the second computer system has visible when an input requesting sharing of its three-dimensional environment is detected. In some embodiments, the second computer system displays the respective environment corresponding to the second three-dimensional environment before communicating the request to initiate the first communication session, and/or when an input to initiate a process to communicate the request is detected. In some embodiments, the respective three-dimensional environment corresponds to the second three-dimensional environment by virtue of sharing virtual content and/or and understanding of spatial elements (e.g., virtual objects, representations of participants, and/or shared content) relative a shared three-dimensional environment. For example, the respective three-dimensional environment and second three-dimensional environment optionally both include a virtual campsite, a virtual car, and/or a virtual fire pit, similar to as if the second computer system and first computer system shared a physical environment including a campsite, car and/or fire pit. In some embodiments, in accordance with a determination that the computer system is displaying a respective second three-dimensional environment (e.g., a different immersive scene) when the input to initiate the process to communicate the request to display the second three-dimensional environment is detected, the first computer system displays, via the display generation component, a third three-dimensional environment, different from the three-dimensional environment, corresponding to what environment was visible at the second computer system. Displaying a second three-dimensional environment that is a three-dimensional environment that was displayed at a second computer system that requested initiation of the first communication reduces user input, and therefore processing, required to manually display the second three-dimensional environment.

In some embodiments, while a first three-dimensional environment is visible via the display generation component, such as the three-dimensional environment 2202*a* of computer system 101*a* in FIG. 22A, the first computer system detects, via the one or more input devices, a second event, different from the first event, wherein the second event includes a first participant joining the first communication session and a second participant joining the first communication session, such as an event including computer system 101*b* in FIG. 22A joining the real-time communication session. For example, the event including obtaining information that one or more participants will join the first communication session.

In some embodiments, in response to detecting the second event, in accordance with a determination that the first participant joined the first communication session before the second participant, and that a respective computer system associated with the first participant is associated with a first respective three-dimensional environment, the first computer system displays, via the display generation component, a third three-dimensional environment corresponding to the first respective three-dimensional environment in the first communication session, such as a three-dimensional environment 2202*b* of computer system 101*b* in FIG. 22D. In some embodiments, the first computer system changes its visible environment to correspond to a shared environment that is indicated by a computer system that satisfies one or more criteria. For example, in accordance with a determination that the first participant satisfies one or more criteria, including a criterion satisfied when its respective computer system used to access the first communication session has one or more characteristics, the first computer system optionally replaces visibility of the first three-dimensional environment with the shared three-dimensional environment request by the first participant. In some embodiments, the one or more criteria include a criterion that is satisfied when the respective computer system associated with the first participant is capable of and/or configured to display a three-dimensional environment. For example, if the respective computer system is a mobile phone not including circuitry configured to present the three-dimensional environment, the criterion is not satisfied, and/or if the respective computer system is a head-worn wearable device having one or more characteristics of the first computer system, the criterion is satisfied. In some embodiments, the one or more characteristics include characteristic(s) indicating that the computer system of the first participant is included in and/or corresponds to a wearable device, such as a head-mounted device, the computer system has enabled an environment sharing setting, and/or the computer system is currently displaying or has requested display of a three-dimensional environment including virtual content. In some embodiments, the first computer system displays a respective three-dimensional environment corresponding to that of the most-recent participant that has joined the first communication session. In some embodiments, when a participant joins the first communication, and the one or more characteristics of the participant joining do not have the one or more characteristics (e.g., are not a wearable device, has not enabled environment sharing, and/or is not currently displaying a three-dimensional environment including virtual content), the first computer system does not display a respective three-dimensional environment associated with (e.g., previously displayed by) the participant. In such embodiments, the computer system of the joining participant displays a current, shared three-dimensional environment of the first communication (e.g., a three-dimensional environment displayed at the first computer system when the participant joins).

In some embodiments, in accordance with a determination that the second participant joined the first communication session before the first participant, and that a respective computer system associated with the second participant is associated with a second respective three-dimensional environment, the first computer system displays, via the display generation component, a fourth three-dimensional environment corresponding to the second respective three-dimensional environment in the first communication session, such as a three-dimensional environment 2202*c* of computer system 101*c* in FIG. 22J. For example, as described herein, the computer system optionally displays a three-dimensional environment corresponding to a respective three-dimensional environment that is displayed and/or requested by a respective computer system that satisfies one or more criteria. For example, as described herein, the correspondence between the three-dimensional environment that the computer system displays and the respective three-dimensional environment optionally refers to environments that share a spatial understanding of virtual content and/or elements of the real-time communication session, displayed at respective computer systems. In accordance with a determination that respective computer system was displaying a fifth three-dimensional environment different from the fourth three-dimensional environment (e.g., a different immersive scene), the first computer system optionally displays a three-dimensional environment corresponding to the fifth three-dimensional environment. Displaying a respective three-dimensional environment corresponding to a three-dimensional environment of a participant that has joined the communication session reduces user input, and therefore processing, required to display such a requested three-dimensional environment.

In some embodiments, the one or more first criteria include a third criterion that is satisfied when all participants in the first communication session have access to the second three-dimensional environment, such as when computer systems 101*a*, 101*b*, and 101*c* have access to an environment corresponding to selectable option 2268-2 in FIG. 22I. For example, as described herein, the computer system optionally does not display a respective three-dimensional environment that is not available to one or more participants of the first communication session. Forgoing display of a three-dimensional environment that is not available for all participants of the first communication reduces user input and display of an environment that is not shared by all participants, thereby reducing user inputs required to navigate to a universally available three-dimensional environment.

In some embodiments, in response to detecting the first event, and in accordance with the determination that the one or more first criteria are not satisfied, in accordance with a determination that one or more second criteria are satisfied, including a criterion that is satisfied when all participants in the first communication session do not have access to the second three-dimensional environment, such as indicated by computer system 101*a* in FIG. 22D, the first computer system initiates a process to display, via the display generation component, a third three-dimensional environment, different from the first three-dimensional environment and the second three-dimensional environment, wherein the third three-dimensional environment is a default three-dimensional environment available to all the participants in the first communication session, such as the three-dimensional environment displayed at computer system 101*a* in FIG. 22E. For example, the first computer system and/or other computer systems of the first communication session optionally share an understanding of a default, three-dimensional environment within which the first communication session will steer all participants to in accordance with a determination that the one or more first criteria are not satisfied, and in accordance with a determination that the one or more second criteria are satisfied. For example, the default three-dimensional environment is optionally an immersive scene having one or more characteristics of immersive scene(s) described herein. In some embodiments, respective computer systems are programmed to store the default three-dimensional environment (e.g., before a user receives the respective computer system). In some embodiments, the default three-dimensional environment has one or more characteristics similar or the same as the first and the second three-dimensional environment. In some embodiments, the default three-dimensional environment is included in memory of respective computer systems sharing one or more characteristics with the first computer system, such as a default three-dimensional environment programmed to be stored in memory of the respective computer systems at a facility producing the respective computer systems. In some embodiments, computer systems such as the first computer system are capable of obtaining (e.g., requesting, downloading, and/or storing in memory) information corresponding to and/or related to a three-dimensional environment, such as an immersive scene. In some embodiments, the one or more second criteria include a criterion that is satisfied when a respective computer system participating in the real-time communication session have not yet downloaded the information, and/or downloading the information would require undue delay in a changing of a shared three-dimensional environment. Displaying a default three-dimensional environment in accordance with a determination that one or more second criteria are satisfied reduces user inputs required to coordinate and display a universally available environment, thereby reducing processing required to handle the user inputs and/or display of not universally available environments.

In some embodiments, the process to display the third three-dimensional environment includes displaying information indicating that the third three-dimensional environment will be displayed in the first communication session (e.g., before and/or while replacing display of the first three-dimensional environment with the second three-dimensional environment), such as indicated by computer system 101*a* in FIG. 22D. For example, similar to as previously described with reference to "visual indication(s)" the first computer system optionally displays a visual indication notifying the participants of the first communication session that their currently visible environments will change. In some embodiments, the visual indication identifies and/or describes the default three-dimensional environment (e.g., the third three-dimensional environment). In some embodiments, the information and/or visual indication are displayed before the default three-dimensional environment is displayed. Displaying information indicating that the third three-dimensional environment will be displayed prevents disorienting the user, thereby reducing the cognitive burden of the user and reducing the likelihood that erroneous user input is detected, thus reducing power consumption of the device.

In some embodiments, the one or more first criteria include a criterion that is satisfied when the participant initiated the first communication session with the user of the first computer system, a criterion that is satisfied when the second three-dimensional environment was being displayed by a second computer system associated with the participant in the first communication session when the participant initiated the first communication session with the user, and a criterion that is satisfied when all participants in the first communication session have access to the second three-dimensional environment, such as criteria satisfied in FIG. 22C, such that computer systems 101*a*, 101*b*, and 101*c* display three-dimensional environment environments 2202*a*, 2202*b*, and 2202*c* corresponding to a shared three-dimensional environment in FIG. 22C. For example, the computer system optionally detects and/or obtain information that a respective participant of the first communication session initiated the first communication session, that the participant that is using the second computer system was displayed a three-dimensional environment corresponding to the second three-dimensional environment, and/or that all participants of the first communication session are able to access a requested, shared three-dimensional environment.

In some embodiments, in response to detecting the first event, in accordance with the determination that the first event does not satisfy the one or more first criteria, and in accordance with a determination that the first event satisfies one or more second criteria, including a criterion that is satisfied when the second three-dimensional environment is unavailable to one or more participants of the first communication session, the first computer system ceases visibility of the first three-dimensional environment via the display generation component, such as criteria that are satisfied in FIG. 22D, where computer system 101*b* and computer system 101*c* do not have access to "background 1," and the computer systems 101*a*, 101*b*, and 101*c* have access to the three-dimensional environments 2202*a*, 2202*b*, and 2202*c* displayed in FIG. 22E (e.g., "background 3"). For example, when the first event includes a request to display a three-dimensional environment that is not available to all participants of the communication session (e.g., a request to display the second three-dimensional environment when it is not available to all participants), the computer system optionally initiates a process to cease visibility of the user's current three-dimensional environment (e.g., the first three-dimensional environment) and a process to display, via the display generation component, a replacement three-dimensional environment, such as the default three-dimensional environment described herein.

In some embodiments, the first computer system initiates a process to display, via the display generation component, a third three-dimensional environment, different from the first three-dimensional environment and the second three-dimensional environment, wherein an appearance of a portion of the third three-dimensional environment that is visible to the user changes for the user when the viewpoint of the user changes, and wherein the third three-dimensional environment is a default three-dimensional environment that is available to all participants in the first communication session, such as the three dimensional environment 2202*a* displayed in FIG. 22D at computer system 101*a*. For example, the third three-dimensional environment has one or more characteristics of similar third three-dimensional environments (e.g., default environments) described herein. Displaying the default three-dimensional environment instead of a not available, and requested three-dimensional environment reduces user input to provide and/or request display of a replacement three-dimensional environment in lieu of the requested, unavailable three-dimensional environment, thus reducing user input and thereby processing required to handle such user input.

In some embodiments, after (e.g., in response to) detecting the first event and in accordance with the determination that the first event satisfies the one or more first criteria (e.g., while displaying a respective three-dimensional environment including virtual content (e.g., the second three-dimensional environment), the second three-dimensional environment is displayed with a first level of immersion, such as three-dimensional environment 2202*b* in FIG. 22H. For example, as described herein, immersion includes an associated degree to which virtual content displayed in the user's three-dimensional environment apparently obscures background content (e.g., representations of the user's physical environment, and/or virtual content that is displayed and not included in the second three-dimensional environment). In some embodiments, a level of immersion of a shared environment displayed at a respective computer system of the first communication session is independent of a level of immersion displayed at another computer system of the first communication session. For example, the first computer system optionally displays the second three-dimensional environment with a first, relatively high level of immersion. In some embodiments, the first computer system detects one or more inputs to change the level of immersion of a visible three-dimensional environment (e.g., the second) while participating in the first communication session, and in response, the first computer system changes the level of immersion in accordance with the one or more inputs, and forgoes communicating a request to change a level of immersion presented in a view of the first communication session (e.g., at a second computer system of the participant).

In some embodiments, in a view of the first communication session from a perspective of the participant that includes a respective three-dimensional environment, such as the view of the three-dimensional environment 2202*c* in FIG. 22I, the respective three-dimensional environment is displayed at a second level of immersion, different from the first level of immersion, such as the three-dimensional environment 2202*c* in FIG. 22I having a level of immersion different from three-dimensional environment 2202*b* in FIG. 22I. For example, the level of immersion of the shared environment displayed by a second computer system (e.g., via a second display generation component) of the participant optionally is different from (e.g., greater, or lesser) than the first level of immersion. In some embodiments, in response to detecting user input changing the level of immersion (e.g., at the first computer system or at the second computer system), the respective computer system that detected the user input changes the level of immersion of its currently displayed three-dimensional environment (e.g., at the first computer system or the second computer system), and the other computer system(s) that did not detect the user input (e.g., the second computer system or the first computer system) maintains its level of immersion. Thus, in some embodiments, respective three-dimensional environment corresponding to a shared three-dimensional environment displayed at respective computer systems have independence of immersion levels, with respect to other computer systems participating in the first communication session. In some embodiments, the second computer system detects one or more inputs to change the level of immersion of a visible three-dimensional environment (e.g., the respective three-dimensional environment) while participating in the first communication session, and in response, the second computer system changes the level of immersion in accordance with the one or more inputs, and forgoes communicating a request to change a level of immersion of a visible three-dimensional environment of the first three-dimensional environment (e.g., the second three-dimensional environment). Preserving independence of immersion levels at respective computer systems reduces the likelihood that another participant undesirably changes immersion level of the first computer system, thus reducing user input required to correct for such undesired changes and thereby reducing processing required to process such user input.

In some embodiments, before detecting the first event, the first three-dimensional environment is visible at a first level of immersion, such as the three-dimensional environment 2202*c* in FIG. 22I. For example, as described herein, the first three-dimensional environment is optionally visible at a first level of immersion. In some embodiments, another three-dimensional environment is visible at the first level of immersion or another level of immersion before the event is detected, and/or when the event is detected.

In some embodiments, in response to detecting the first event and in accordance with the determination that the one or more first criteria are satisfied, the process to display the second three-dimensional environment includes displaying the second three-dimensional environment with a second level of immersion, different from the first level of immersion, wherein the second level of immersion is a default level of immersion, such as the level of immersion of three-dimensional environment 2202*c* in FIG. 22H. For example, the first computer system optionally displays the replacement, second three-dimensional environment with a default level of immersion and/or a level of immersion requested by the participant that requested sharing of a shared environment corresponding to the replacement, second three-dimensional environment. In some embodiments, while displaying another environment other than the first environment, and in response to detecting an event, such as obtaining information that a shared environment has changed, the first computer system optionally displays a third three-dimensional environment, corresponding to the changed and shared three-dimensional environment, with a level of immersion in accordance with a request to display the third three-dimensional environment (e.g., at the default level of immersion or at a requested level of immersion). In some embodiments, the default level of immersion is associated with the particular immersive scene, such as an immersive scene that requires a threshold level of immersion (e.g., 10, 25, 40, 50, 60, 75, or 90% immersion). In some embodiments, the default level is a system default level that is the same as other computer systems having a same operating system and/or version of the operating system. In some embodiments, respective three-dimensional environments are associated with respective default levels of immersion. In some embodiments, after respective computer systems participating in the first communication display the respective three-dimensional environment at the default level of immersion, the respective computer systems are configured to detect input(s) changing the displayed level of immersion, an in response to detecting the input(s), change the level of immersion in accordance with input(s). Displaying the second three-dimensional environment with a default level of immersion reduces user input required to adjust the level of immersion manually, thereby reducing processing required to process such inputs.

In some embodiments, before detecting the first event, the first three-dimensional environment had a first level of immersion (e.g., as described herein), such as the three-dimensional environment 2202*c* in FIG. 22I.

In some embodiments, the process to display the second three-dimensional environment includes, in accordance with a determination that shared content, such as shared content 2246*a* in FIG. 22F, is being displayed in the first communication session and that the shared content requires a second level of immersion greater than the first level of immersion, such as the level of immersion in FIG. 22J, displaying the second three-dimensional environment at the second level of immersion, such as displaying three-dimensional environment 2202*c* with an increased level of immersion in FIG. 22J. For example, as described herein with reference to a "threshold level of immersion." The shared content optionally is or includes one or more virtual objects, such as those including user interface(s) of media playback applications, media browsing applications, text entry and/or reading applications, and/or standalone virtual objects (e.g., virtual cars, tables, and/or benches). In some embodiments, the shared content is visible at respective computer systems of the first communication session at a position within the shared three-dimensional environment that is common to the respective computer systems. In some embodiments, different types and/or pieces of shared content are associated with different threshold levels of immersion, such as a first threshold level associated with media content that is relatively higher than a second threshold level associated with a virtual ball, toy, or car. In some embodiments, in accordance with a determination that the respective computer systems are already displaying virtual content with a level of immersion greater than the threshold level, the respective computer systems of the first communication session forgo modification of the displayed level of immersion. In some embodiments, after the respective computer system of the first communication session display respective virtual content (e.g., environments) with the threshold level of immersion, the respective computer systems modify the displayed level of immersion in accordance with one or more inputs detected at the respective computer system requesting a changing of the level of immersion.

In some embodiments, in accordance with a determination that shared content that requires the second level of immersion is not being displayed in the first communication session, displaying the second three-dimensional environment at the first level of immersion, such as displaying shared content 2246*c* in FIG. 22F. For example, in accordance with a determination that the first level of immersion is sufficient to display the shared content, the first computer system optionally forgoes changing of the level of immersion from the first to the second level of immersion. Displaying the second three-dimensional environment with a level of immersion that is great enough to accommodate display of the shared content reduces user input required to manually change the level of immersion, thereby reducing processing required to process such user input.

In some embodiments, displaying the second three-dimensional environment includes displaying the second three-dimensional environment with a first visual appearance based on a simulated time of day setting corresponding to a simulated time of day setting of a respective three-dimensional environment displayed at a second computer system associated with the participant in the first communication session, such as the time of day and visual appearance of three-dimensional environment 2202*b* as shown in FIG. 22C. For example, as described with reference to methods 800, 1000 and/or 3100, the first computer system optionally maintains a simulated time of day setting, and changes a visual appearance of a respective, visible three-dimensional environment in accordance with the simulated time of day setting. In some embodiments, the setting is shared between participants of the first communication. For example, in response to obtaining information that a participant has changed the time of day settings, the first computer system optionally changes the visual appearance (e.g., from day time appearance to night time appearance or vice-versa) in accordance with the obtained information. In some embodiments, in response to detecting the user provide one or more inputs to change the time of day setting, the first computer system communicates a request to change the time of day settings at respective computer systems of participants of the first communication session, and in response to obtaining information corresponding to the request, the respective computer systems change the visual appearance to conform with the changed time of day setting. Displaying the second three-dimensional environment with a visual appearance based on the simulated time of day setting ensures that the participants of the first communication session are viewing similar three-dimensional environment, therefore reducing user inputs caused by an erroneous understanding of what is visible at another computer system of the first communication session, and thereby reducing processing required to handle such erroneous user input.

In some embodiments, while displaying the second three-dimensional environment with the first visual appearance, the first computer system obtains information corresponding to a request by the participant to modify the simulated time of day setting of the respective three-dimensional environment, such as a request detected at computer system 101*a* in FIG. 22C to change the visual appearance. For example, as described herein, while the first computer system displays the second three-dimensional environment with a first visual appearance, and in response obtaining information requesting a modification of a time of day setting associated with a shared environment of the first communication session, the first computer system optionally initiates a process to change the simulated time of day for all of the participants of the first communication session.

In some embodiments, in response to obtaining the information corresponding to the request by the participant to modify the simulated time of day setting of the respective three-dimensional environment, the first computer system changes a visual appearance of the second three-dimensional environment to be a second visual appearance, different from the first visual appearance, corresponding to the modified simulated time of day setting, such as a changing of the time of day and/or visual appearance of three-dimensional environment 2202*a* in FIG. 22C to an updated time of day and/or visual appearance. For example, as described herein, the first computer system optionally conforms with the modified simulated time of day setting, such as switching from a night time environment to a day time environment (or vice versa), and/or initiating display and/or ceasing display of virtual content associated with the respective times of day, described further with reference to methods 800, 1000, and/or 3100. Displaying the second three-dimensional environment with a visual appearance based on the simulated time of day setting ensures that the participants of the first communication session are viewing similar three-dimensional environment, therefore reducing user inputs caused by an erroneous understanding of what is visible at another computer system of the first communication session, and thereby reducing processing required to handle such erroneous user input.

In some embodiments, the request by the participant to modify the simulated time of day setting of the respective three-dimensional environment corresponds to an express input to change the time of day setting, such as an air gesture detected by computer system 101*a* in FIG. 22C. For example, the first computer system and/or another computer system detects input including a selection of a selectable option included in a menu configured to change the simulated time of day setting for the first communication session. In some embodiments, the express input includes selection of a time of day setting represented by a button that is displayed without displaying a menu user interface. In some embodiments, the express input is a voice command that is detected. In some embodiments, the express input is a changing of a time associated with a shared three-dimensional environment of the first communication session. Modifying the simulated time of day setting in accordance with an express input reduces the likelihood that the user erroneously changes the time of day when interacting with other portions of the user's three-dimensional environment, thereby reducing user input and processing required to handle erroneous user input.

In some embodiments, the request by the participant to modify the simulated time of day setting of the respective three-dimensional environment corresponds to a request to modify display of media content within the respective three-dimensional environment, such as a request including input 2250 in FIG. 22F detected by computer system 101*b*. For example, the request by the participant optionally does not include an express input (e.g., a selection of a button that is selectable to change a time of day), such as a request to display media and/or change playback of currently playing media. The media, for example, optionally requires or is more easily viewable and/or interactable when displayed within a relatively darker three-dimensional environment, such as a night-time three-dimensional environment. Accordingly, in some embodiments, the first computer system changes the visual appearance of its visible three-dimensional environment to change to a night time three-dimensional environment. In some embodiments, the request includes a request to display shared content (e.g., media) with participants of the first communication session. In some embodiments, the request includes detecting one or more user inputs requesting display of media content, and/or sharing of such media content. In some embodiments, the request includes a request to modify the playback of media content, such as a request to initiate playback (e.g., transitioning from a day time environment to a night time environment), a request to pause the playback (e.g., transitioning from a night time environment to a day time environment), a request to display the media at a respective (e.g., predetermined and/or world-locked) position relative to the three-dimensional environment (e.g., transitioning from day time environment to a night time environment), and/or a request to cease display at the respective position in favor of displaying the media at another position (e.g., that is not world-locked, and/or is different from the respective position, transitioning from the night time environment to the day time environment). In some embodiments, the request includes initiating display of a three-dimensional environment that includes embedded media content. It is understood that embodiments described herein with reference to media content additionally or alternatively apply to other embodiments, such as text-based content, graphics, and/or representations of other users (e.g., live video of participants) displayed in a three-dimensional environment. It is further understood references to an "express request" optionally corresponds to a direct input (e.g., a toggling of a setting, a selection of a button that is selectable to change a time of day, a voice command requesting a changing to a time of day, and/or typing of a time of day) requesting a change in the time of day setting, and optionally does not refer to requests that additionally include other requests, such as requests to display media, requests to share content, requests to change a real time-of day setting of a respective computer system, and/or a passage of real-world time without detecting direct user input. Changing the time of day in response to a request to modify display of media content reduces user input required to directly request such a change to accommodate the media content, thereby reducing processing required to handle such user input.

In some embodiments, while displaying the second three-dimensional environment, the first computer system detects, via the one or more input devices, a second event, different from the first event, including a request to modify the second three-dimensional environment based on a modification of virtual content displayed within the second three-dimensional environment, such as a request to display media shared content 2274*b* and/or change shared content 2274*b* in FIG. 22J. For example, the request to modify the three-dimensional environment has one or more characteristics of the request to display media content described herein. In some embodiments, the modification of the virtual content includes a request to display virtual content, and/or change a visual appearance and/or state of the virtual content. In some embodiments, the virtual content is associated with a preferred minimum level of immersion, and the first computer system changes the immersion of a visible three-dimensional environment (e.g., the second three-dimensional environment) in accordance with a determination that one or more criteria are satisfied.

In some embodiments, in response to detecting the second event, in accordance with a determination that the virtual content is shared virtual content with the first communication session, the first computer system initiates a process to modify a respective three-dimensional environment displayed at a second computer system associated with the participant based on the modification of the virtual content displayed within the second three-dimensional environment, such as increasing a level of immersion of three-dimensional environment 2202*c* to display shared content 2274C in FIG. 22J. For example, when the virtual content is displayed (or respective virtual content corresponding to the virtual content displayed by the first computer system is displayed) by another computer system participating in the first communication session, such as the second computer system, the first computer system optionally communicates information and/or a request to modify the respective three-dimensional environment visible to the participant presented using the second computer system (e.g., via a second display generation component), such as a request to modify a visual appearance including but not limited to modifying a simulated time of day setting, as described herein, a level of immersion, as described herein, and/or a dimming mode, described further with reference to methods 2900 and/or 3100. The shared virtual content, for example, is or includes media content, text, user interface(s) (e.g., of gaming applications, of media playback applications, and/or media browsing application), and/or virtual objects. In some embodiments, the second event includes display of the shared content, to scale the shared content, to move the shared content, to re-display the shared content (after previously displaying the shared content), and/or to display a plurality of representations of shared content. In some to accommodate the request(s) to modify and/or manipulate the shared content, the first computer system modifies the visual appearance of a currently visible three-dimensional environment and communicates a request to other computer systems to similarly change their visible three-dimensional environments, such as increasing a level of immersion of the three-dimensional environment, transitioning to a night time mode of a visible three-dimensional environment, and/or dimming (e.g., decreasing a level of brightness and/or saturation) of the three-dimensional environment.

In some embodiments, in accordance with a determination that the virtual content is private virtual content, the first computer system forgoes initiating the process to modify the respective three-dimensional environment displayed at the second computer system, such as forgoing changing of three-dimensional environment 2202*b* in response to detecting input requesting changing of private content 2262 in FIG. 22I. For example, the private content is displayed at the first computer system, and not visible to other participants of the first communication session. In some embodiments, the private content is and/or includes media, text, user interface(s) of applications, and/or virtual objects that are displayed by the first computer system. The second event optionally includes one or more inputs to initiate display of the private content, to move the private content, to scale the private content, to replace display of a visible environment at least partially with private content and/or an environment associated with the private content, and/or to re-display previously hidden private content, and forgoes communicating a request to other computer system(s) to change their respective three-dimensional environment(s). In some embodiments, if the same one or more inputs were directed to shared content that is not private content, the first computer system communicates a request to the other computer systems of the first communication session to modify the visual appearance of their visible three-dimensional environments. Initiating process to modify a respective three-dimensional environment available at a second computer system based on modification of shared content—or forgoing the initiating if the modification is directed to private content—reduces the likelihood that requests for environmental modifications that are irrelevant to other computer systems of the first communication session are not communicated, thereby reducing power consumption and processing of the first computer system.

In some embodiments, while displaying the private virtual content, the first computer system obtains information that a respective three-dimensional environment shared with the first communication session has been modified, such as information that three-dimensional environment 2202*b* has changed, obtained by computer system 101 in FIG. 22J. For example, while displaying a private virtual object including or corresponding to media, text, user interface(s) of applications, and/or private virtual objects described herein, the first computer system optionally obtains information, such as a request to change a shared three-dimensional environment, and optionally forgoes performing a change to a visible three-dimensional environment including the private content. In some embodiments, the information is obtained while displaying a shared three-dimensional environment. In some embodiments, the information is obtained while displaying a three-dimensional environment that is not shared with participants of the first communication session. In some embodiments, the modifications to the respective three-dimensional environment include one or more modifications described herein, such as changing of a level of immersion, changing a time of day setting, and/or otherwise changing a visual appearance of the three-dimensional environment.

In some embodiments, in response to obtaining the information that the respective three-dimensional environment has been modified, the first computer system displays, via the display generation component, information associated with the modification of the respective three-dimensional environment, such as shown by visual indication 2272*a* in FIG. 22J. In some embodiments, the first computer system displays a visual indication and/or information indicating that the shared three-dimensional environment has and/or will be changed. In some embodiments, the first computer system forgoes display of the changed three-dimensional environment while the private content continues to be displayed. In some embodiments, the first computer system displays a notification of a changed immersive scene (e.g., identifying a new scene and/or describing the new scene), displays an indication that a level of immersion has changed, displays an indication that a time of day setting has changed, and/or display an indication that shared content is being displayed. In some embodiments, while displaying the private virtual content and after the respective three-dimensional environment has been modified, the first computer system detects one or more inputs corresponding to a request to cease display of the private content and/or reenter the respective three-dimensional environment, and in response to the one or more inputs, the computer system displays the respective three-dimensional environment having the modification that the information associated with modification of the respective three-dimensional environment described. Notifying the user of the first computer system that the respective three-dimensional environment has been modified reduces the likelihood that upon reentry into the respective three-dimensional environment, the user provides erroneous input caused by an unexpected state of the respective three-dimensional environment, thereby reducing processing required to handle such erroneous input.

It should be understood that the particular order in which the operations in method 2300 have been described is merely exemplary and is not intended to indicate that the described order is the only order in which the operations could be performed. One of ordinary skill in the art would recognize various ways to reorder the operations described herein.

Figure 24B:
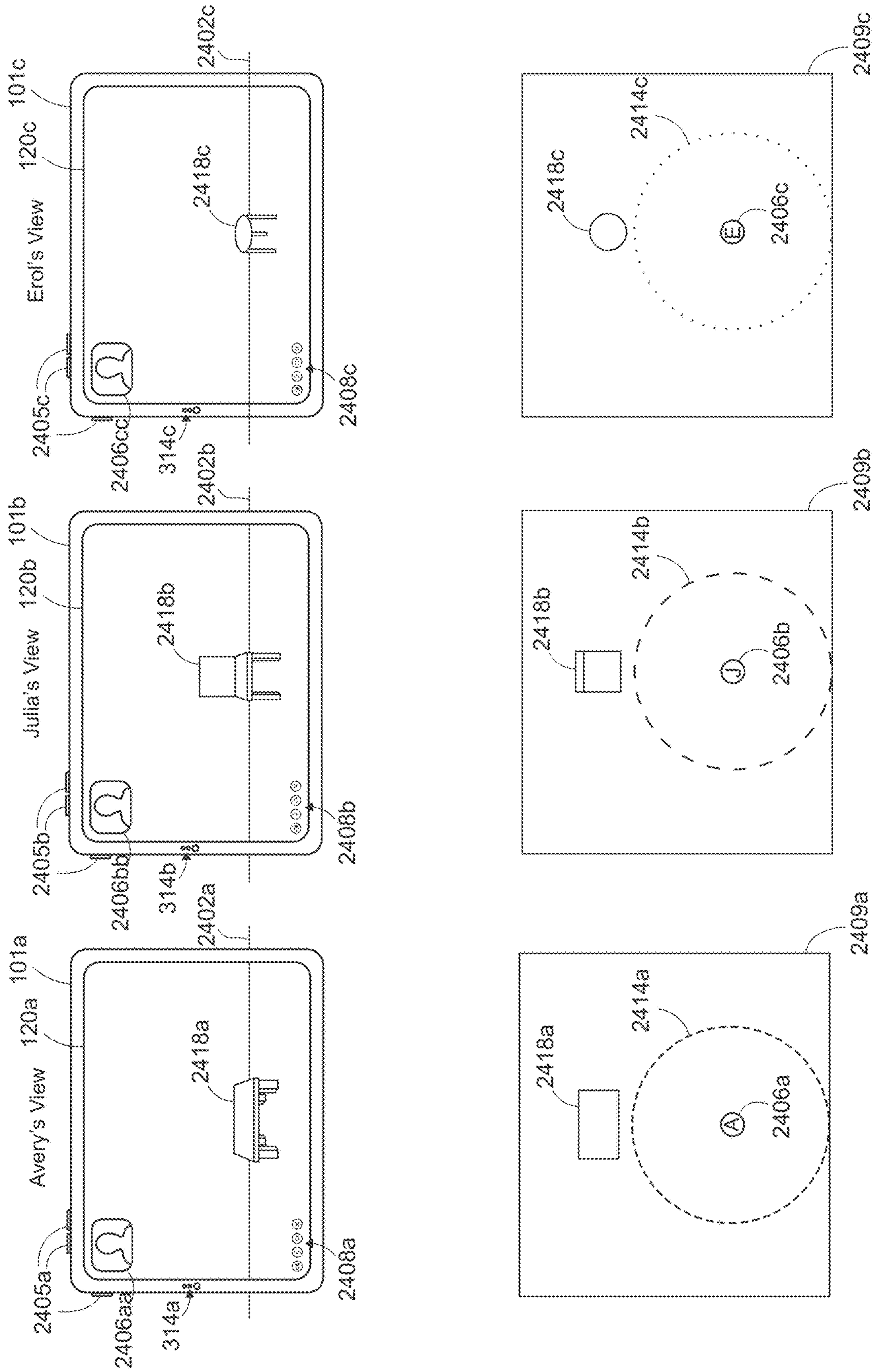
Figure 24C:
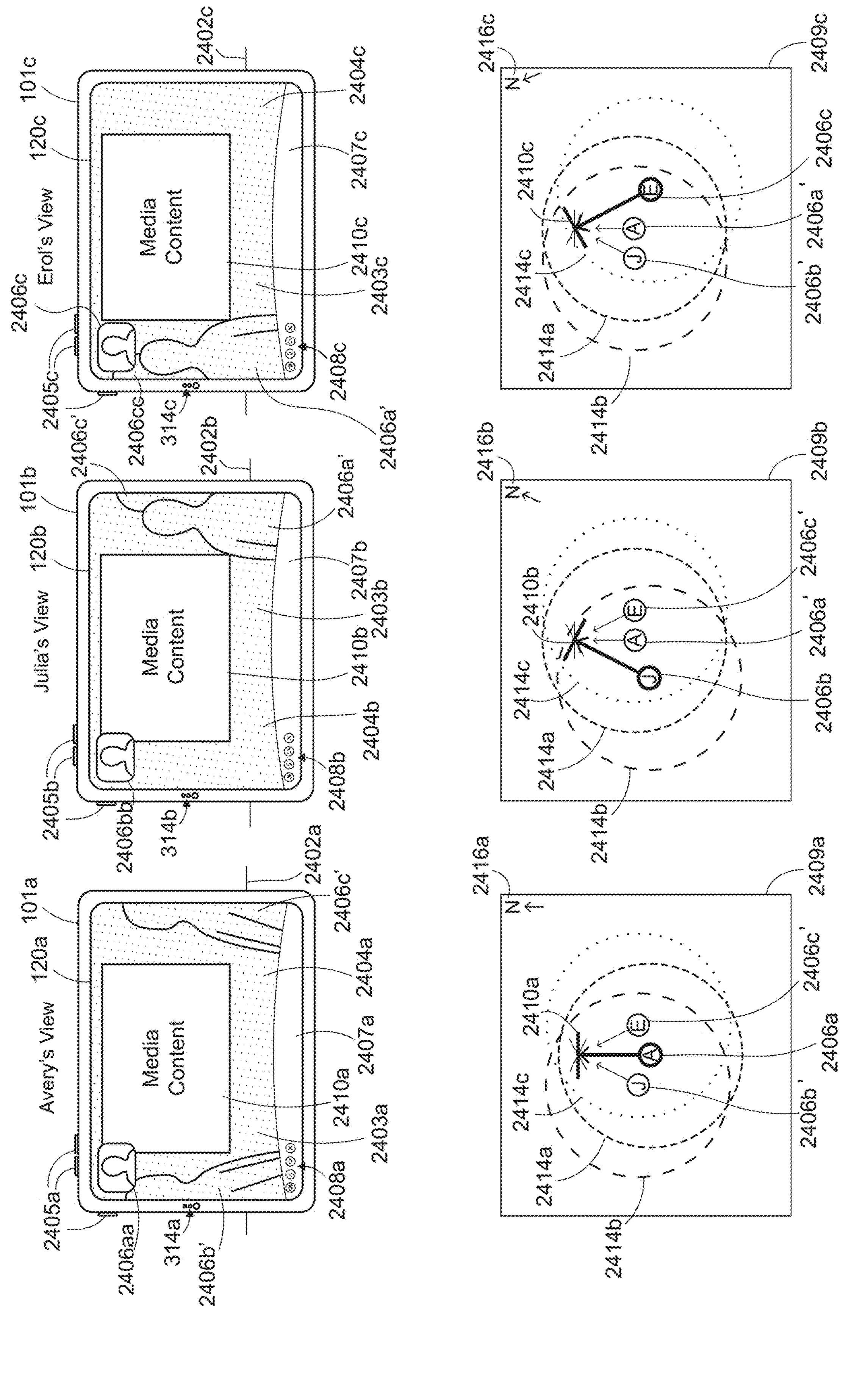

FIGS. 24A-24C illustrate examples of computer systems that, while in a communication session that includes media content, in response to detecting a user input for displaying media content in a respective location for media content in their corresponding three-dimensional environments of the communication session, display media content at the respective location for media content in the three-dimensional environments and optionally position the participants differently in the different three-dimensional environments depending on various factors, as will be described below.

FIG. 24A illustrates computer systems involved in a real-time communication session that includes three participants—Avery, Julia, and Erol. In FIG. 24A, computer system 101*a* (e.g., Avery's computer system), computer system 101*b* (e.g., *Julia* computer system), and computer system 101*c* (e.g., Erol's computer system) include, respectively, display generation components 120*a*-120*c*, image sensors 314*a*-314*c*, and physical buttons 2405*a-c*. The computer system 101*a-c*, display generation components 120*a*-120*c*, and image sensors 314*a*-314*c* are each optionally as described with reference to computer system 101, display generation component 120, and image sensors 314 of any one or more or all of FIGS. 1-6. The image sensors 314*a*-314*c* optionally include one or more of a visible light camera, an infrared camera, a depth sensor, or any other sensor computer systems 101*a-c* would be able to use to capture one or more images of a user or a part of the user (e.g., one or more hands of the user) while the user interacts with the computer system 101*a-c*. In some embodiments, the user interfaces illustrated and described below could also be implemented on a head-mounted display that includes a display generation component that displays the user interface and/or three-dimensional environment to the user, and sensors to detect the physical environment and/or movements of the user's hands (e.g., external sensors facing outwards from the user), and/or gaze of the user (e.g., internal sensors facing inwards towards the face of the user).

As shown in FIG. 24A, computer systems 101*a-c* each optionally captures one or more images of their corresponding physical environments 2402*a-c* around computer systems 101*a-c* (e.g., operating environments 100), including one or more objects in the physical environments 2402*a-c* around computer system 101*a-c*. In some embodiments, computer systems 101*a-c* display representations of their respective physical environment 2402*a-c* in the respective three-dimensional environment 2404*a-c* and/or the respective physical environment 2402*a-c* is visible in the three-dimensional environment 2404*a-c* via the respective display generation components 120*a-c*.

As described above, computer system 101*a-c* are involved a real-time communication session. The communication session includes shared content and a shared environment. As such, computer systems 101*a-c* display, respectively, media content 2410*a-c* and shared environments 2403*a-c*. Media content 2410*a-c* are the same content and shared virtual environments 2403*a-c* are the same environment. Thus, the three-dimensional environments 2404*a-c* include, respectively, media content 2410*a-c* and shared virtual environments 2403*a-c*. Three-dimensional environments 2404*a-c* also include, respectively, passthrough portions 2407*a-c* (e.g., in which optical passthrough is visible or in which virtual passthrough content is displayed) in which a portion of physical environments 2402*a-c* is visible via display generation components 120*a-c*, which are optionally not part of the communication session (e.g., are not shared). As such, computer system 101*a* displays three-dimensional environment 2404*a*, optionally including a shared virtual environment 2404*a* and shared media content 2410*a*, and a non-shared portion, computer system 101*b* displays three-dimensional environment 2404*b*, optionally includes a shared virtual environment 2404*b* and shared media content 2410*b*, and a non-shared portion, and computer system 101*c* displays three-dimensional environment 2404*c*, optionally including a shared virtual environment 2404*c* and shared media content 2410*c*, and a non-shared portion.

In FIG. 24A, computer systems 101*a-c* display a respective representation of the respective user of the respective computer system 101*a-c* (e.g., computer system 101*a*, in display generation component 120*a*, displays representation 2406*aa* of participant 2406*a*, computer system 101*b*, in display generation component 120*b*, displays representation 2406*bb* of participant 2406*b*, and computer system 101*c* displays representation 2406*cc* of participant 2406*c*). It should be noted that representations 2406*aa-cc* are optionally not displayed and the systems and processes disclosed herein optionally operate without displaying representations 2406*aa-cc*. In some embodiments, computer system 101*a-c*, respectively, forgoes displaying representation 2406*aa* of participant 2406*a*, representation 2406*bb* of participant 2406*b*, and representation 2406*cc* of participant 2406*c*, respectively. In FIG. 24A, computer systems 101*a-c* respectively display virtual buttons 2408*a-c* that optionally are configured to control aspects of the communication session and/or of the computer systems 101*a-c* respectively. It should be noted that virtual buttons 2408*a-c* are optionally not displayed and the systems and processes disclosed herein optionally operate without displaying virtual buttons 2408*a-c*.

As shown in overhead views 2409*a-c* of FIG. 24A (which are respectively top down views of the communication session of participants 2406*a-c*, respectively), participant 2406*a* is facing the media content head-on (e.g., has a middle seat such that a normal of the media content 2410*a-c* that passes through a center of the media content extends through the viewpoint of participant 2406*a*), and, in the communication session, is in between representation 2406*b*' of participant 2406*b* and representation 2406*c*' of participant 2406*c*. Overhead views 2409*a-c* of FIG. 24A (which are respectively top down views of the communication session of participants 2406*a-c*, respectively), shows participant 2406*b* is closer to a left side of the media content (e.g., a normal of the media content 2410*a-c* that passes through a center of the media content 2410*a-c* is to the right of participant 2406*b*), and, in the communication session, is to the left of both participant 2406*a* and 2406*c*. Overhead views 2409*a-c* of FIG. 24A (which are respectively top down views of the communication session of participants 2406*a-c*, respectively), shows participant 2406*b* is closer to a right side of the media content (e.g., a normal of the media content 2410*a-c* that passes through a center of the media content 2410*a-c* is to the left of participant 2406*c*), and, in the communication session, is to the right of both participant 2406*a* and 2406*b*. In FIG. 24A, as shown in the overhead views 2409*a-c*, the representations of other participants are directionality aligned (e.g., the pose (e.g., the position and orientation relative to media content) of the representation of the respective participant in the three-dimensional environments 2403*a-c* is the same as the pose of the participant 2406*a-c* (e.g., the pose of representation 2406*a*' of participant 2606*a* relative to media content 2410*b/c*, respectively, in overhead views 2409*b/c*, respectively, is the same as the pose of participant 2606*a* (relative to media content 2410*a*) in overhead view 2409*a*, the pose of representation 2406*b*' of participant 2606*b* relative to media content 2410*a/c*, respectively, in overhead views 2409*a/c*, respectively, is the same as the pose of participant 2606*b* relative to media content 2410*b* in overhead view 2409*b*, the pose of representation 2406*a*' of participant 2606*c* relative to media content 2410*b/c*, respectively, in overhead views 2409*a/b*, respectively, is the same as the pose of participant 2606*c* in overhead view 2409*c*). In FIG. 24A, representations 2406*a*'-c' include spatial representations (optionally in addition to audio corresponding to the particular participant that corresponds to the representation); as such, if a respective participant looks toward another representation of a participant; the respective participant optionally observes a spatial representation of the participant. In FIG. 24A, though the representations of other participants are not displayed via display generation components 120*a-c* due to the position and orientation of the participants in the three-dimensional environment 2404*a-c* relative to media content 2410*a-c*, computer system 101*a-c* optionally presents audio corresponding to the other participants. The audio corresponds to the other participants is optionally spatially true. For example, computer system 101*a* optionally presents audio corresponding to participant 2406*b* as if participant 2406*a* is located to the left of participant 2406*a*, which is spatially true in shared virtual environments 2403*a-c*. As another example, computer system 101*c* optionally presents audio corresponding to participant 2406*a* and 2406*b* as if participants 2406*a* and 2406*b* were located to the left of participant 2406*c* (e.g., the computer system 101*c* generates audio corresponding to participant 2406*a* and 2406*b* such that the volume level of the audio corresponding to participant 2406*a* and 2406*b* at the left ear of participant 2406*c* is louder than or greater than the volume level of audio corresponding to participant 2406*a* and 2406*b* at the right ear of participant 2406*c* (if any)). In addition, as shown in overhead views 2409*a-c* of FIG. 24A, the locations of the participants in the shared environments 2403*a-c* are offset from each other. The amount of offset is optionally 0.3 m, 0.5 m, 0.7 m, 1 m, 2 m, 5 m, 9 m, or another distance. For example, shared virtual environment 2403*a-c* are optionally the same virtual environment and participant 2606*a-c* of the communication session in FIG. 24A occupy different locations in the same virtual environment), while each participant 2406*a-c* occupies a center location in their respective shared virtual environments 2403*a-c* as shown by overhead views 2409*a-c* (e.g., computer system 101*a* displays shared virtual environment 2304*a* relative to viewpoint of participant 2406*a* in overhead view 2409*a* (e.g., relative to the center of circle 2414*a*, which is optionally a viewpoint for viewing shared virtual environment 2304*a* that maintains the offset of the participants in shared environments 2403*a-c*), computer system 101*b* displays shared virtual environment 2304*b* relative to viewpoint of participant 2406*b* in overhead view 2409*b* (e.g., relative to the center of circle 2414*b*, which is optionally a viewpoint for viewing shared virtual environment 2304*b* that maintains the offset of the participants in shared environments 2403*a-c*), and computer system 101*c* displays shared virtual environment 2304*c* relative to viewpoint of participant 2406*a* in overhead view 2409*c* (e.g., relative to the center of circle 2414*c*, which is optionally a viewpoint for viewing shared virtual environment 2304*c* that maintains the offset of the participants in shared environments 2403*a-c*). Participant 2406*a* is in the center of circle 2414*a*, which is a center location in virtual environment 2403*a* (relative to viewpoint of participant 2406*a*), participant 2406*b* is in the center of circle 2414*b*, which is a center location in virtual environment 2403*b* (relative to viewpoint of participant 2406*b*), and participant 2406*c* is in the center of circle 2414*c*, which is a center location in virtual environment 2403*c* (relative to viewpoint of participant 2406*c*)). In FIG. 24A, circles 2414*a-c* optionally correspond to viewing volumes (e.g., areas/volumes of participants' environments within which they are able to move/rotate while remaining in the shared virtual environment 2606*a-c*). For example, viewing volume 2414*a* optionally corresponds to a viewing volume of participant 2406*a* relative to shared virtual environment 2403*a*, viewing volume 2414*b* optionally corresponds to a viewing volume of participant 2403*b* relative to shared virtual environment 2606*b*, and viewing volume 2414*c* optionally corresponds to a viewing volume of participant 2406*c* relative to shared virtual environment 2403*c*. Viewing volumes 2414*a-c* are optionally equal in size.

Computer systems 101*a-c* display, via display generation component 120*a-c*, respectively, views of media content 2410*a-c* and of the shared virtual environment 2403*a-c*, respectively, that correspond to the poses (e.g., position and orientation relative to the media content 2410*a-c*) of the participants 2604*a-c*, respectively, shown in overhead views 2409*a-c*, respectively. For example, computer system 101*a* displays via display generation component 120*a*, a view of media content 2410*a* in shared virtual environment 2403*a* that correspond to the pose of participant 2604*a* shown in overhead view 2409*a*; computer system 101*b* displays via display generation component 120*b*, a view of media content 2410*b* in shared virtual environment 2403*b* that correspond to the pose of participant 2604*b* shown in overhead view 2409*b*; computer system 101*c* displays via display generation component 120*c*, a view of media content 2410*c* in shared virtual environment 2403*a* that correspond to the pose of participant 2604*c* shown in overhead view 2409*c*.

As shown in the overhead views 2409*a-c* of FIG. 24A, the shared virtual environment 2403*a-c* of the communication session share directional truth, as described further in method 2500.

In FIG. 24A, computer system 101*a* detects an input from hand 2412*a* (e.g., an air pinch gesture such as described herein) of participant 2406*a* requesting to display media content 2410*a* in a respective location for media content (e.g., as described below with reference to method 2500) in shared environment 2403*a*. In response to detecting the input, computer system 101*a* initiates a process to display media content 2410*a* in the respective location for media content (e.g., as described below with reference to method 2500) in the shared environment, as shown in FIGS. 24B and 24C.

The process to display the media content 2410*a* in the respective location for media content in shared environment 2403*a* optionally includes reducing a visual prominence of shared environment 2403*a* and media content 2410*a*, as shown in FIG. 24B. Also, as shown in FIG. 24B, in response to computer system 101*a* detecting the input of FIG. 24A, computer system 101*a* causes computer systems 101*b/c*, respectively, to reduce in visual prominence the shared environments 2403*b/c* and media content 2410*b/c* respectively. As such, in response to computer system 101*a* detecting the input requesting to display media content 2410*a* in the respective location for media content (e.g., as described below with reference to method 2500) in shared environment 2403*a*, computer system 101*a* optionally reduces in visual prominence shared environment 2403*a* and shared media content 2410*a* and initiates a process to reduce in visual prominence shared environment 2403*b/c* and shared media content 2410*b/c*. In FIG. 24B, computer systems 101*a-c* have ceased displaying shared environments 2403*a-c* and media content 2410*a-c* in response to computer system 101*a* detecting the input of FIG. 24A. In FIG. 24B, portions of the respective physical environment 2402*a-c* are now visible (e.g., via passthrough in which optical passthrough is visible or in which virtual passthrough content is displayed) in respective three-dimensional environments 2404*a-c* (e.g., computer system 101*a* presents (e.g., via passthrough) physical table 2418*a* corresponding to a physical object in the physical environment 2402*a* of computer system 101*a*, computer system 101*b* presents (e.g., via passthrough) chair 2418*b* which is in the physical environment 2402*b* of computer system 101*b*, and computer system 101*c* presents (e.g., via passthrough) physical table 2418*c* which is in the physical environment 2402*c* of computer system 101*c*).

After reducing the visual prominence of shared environments 2403*a-c* and media content 2410*a-c*, respectively, computer systems 101*a-c* optionally display media content 2410*a-c* in the respective location for media content (e.g., as described below with reference to method 2500) in shared virtual environments 2403*a-c*, respectively, as shown in FIG. 24C. In addition, in FIG. 24C, the poses of participants 2406*a-c* of the communication session relative to the media content 2410*a-c*, respectively, are the same pose relative to media content 2410*a-c*, respectively (e.g., the same position and orientation in shared environment 2404*a-c*, respectively, relative to media content 2410*a-c*); however, the poses of representations 2406*a*'-c' of participants 2406*a-c* relative to the media content 2410*a-c*, respectively, are different from the poses of participant 2406*a-c* relative to the media content 2410*a-c*, respectively. As such, in response to the input of FIG. 24A, participants of the communication share poses while representations of participants do not share poses, as described further below.

In FIG. 24C, participants 2406*a-c* respectively share the same view of media content 2410*a-c*, as shown in the positioning of media content 2410*a-c* in display generation component 120*a-c* and in the relative positioning and orientation of participants 2406*a-c* to media content 2410*a-c* in overhead views 2409*a-c*. In FIG. 24C, participants 2406*a-c* have an ideal pose (e.g., an ideal position and orientation and/or an ideal viewing location for viewing media content 2410*a-c*) relative to media content 2410*a-c* in their respective three-dimensional environment (e.g., the pose of participant 2406*a* relative to media content 2410*a* is an ideal pose relative to media content 2410*a*, the pose of participant 2406*a* relative to media content 2410*a* is an ideal pose relative to media content 2410*b*, and the pose of participant 2406*a* relative to media content 2410*a* is an ideal pose relative to media content 2410*c*). In FIG. 24C, the poses of participants 2406*a-c* relative to media content 24010*a-c* are optionally the same pose relative to media content 2410*a-c*. Computer systems 101*a-c* display, via display generation component 120*a-c*, respectively, views of media content 2410*a-c* and of the shared virtual environment 2403*a-c*, respectively, that correspond to the poses (e.g., position and orientation relative to the media content 2410*a-c*) of the participants 2604*a-c*, respectively, shown in overhead views 2409*a-c*, respectively. For example, computer system 101*a* displays via display generation component 120*a*, a view of media content 2410*a* in shared virtual environment 2403*a* that correspond to the pose of participant 2604*a* shown in overhead view 2409*a*; computer system 101*b* displays via display generation component 120*b*, a view of media content 2410*b* in shared virtual environment 2403*b* that correspond to the pose of participant 2604*b* shown in overhead view 2409*b*; computer system 101*c* displays via display generation component 120*c*, a view of media content 2410*c* in shared virtual environment 2403*a* that correspond to the pose of participant 2604*c* shown in overhead view 2409*c*. As shown in display generation components 120*a-c*, media content 2410*a-c* is displayed in the same location of the view of three-dimensional environments 2403*a-c* that is displayed respectively in display generation components 120*a-c*. Also, as shown in overhead views 2409*a-c*, participants 2406*a-c*, are the same distance away from media content 2410*a-c*, respectively, and have the same view of media content (e.g., they are each facing the media content head-on from the same position in the shared environment). However, as shown in FIG. 24C, in both overhead views 2409*a-c* and display generation component 120*a-c*, the poses of representations 2406*a*'-c' of participants 2406*a-c*, respectively, are different from the poses of participants 2406*a-c*, respectively. For example, in the view of the communication session from the perspective of participant 2406*b*, representation 2406*a*' of participant 2406*a* and representation 2406*b*' of participant 2406*b* have a pose that is different positionally and orientationally in relative to media content 2410*c* in shared virtual environment 2403*c* than the pose of the participant 2406*a* and participant 2406*b* in relative to media content 2410*a/b* in shared virtual environment 2403*a/b*, respectively. As such, in some embodiments, participants, and their respective representations do not share the same pose in the communication session. In some embodiments, participants and representations of participants do not share the same pose in the communication when the communication session meets one or more criteria described with reference to method 2500.

Figure 24D:
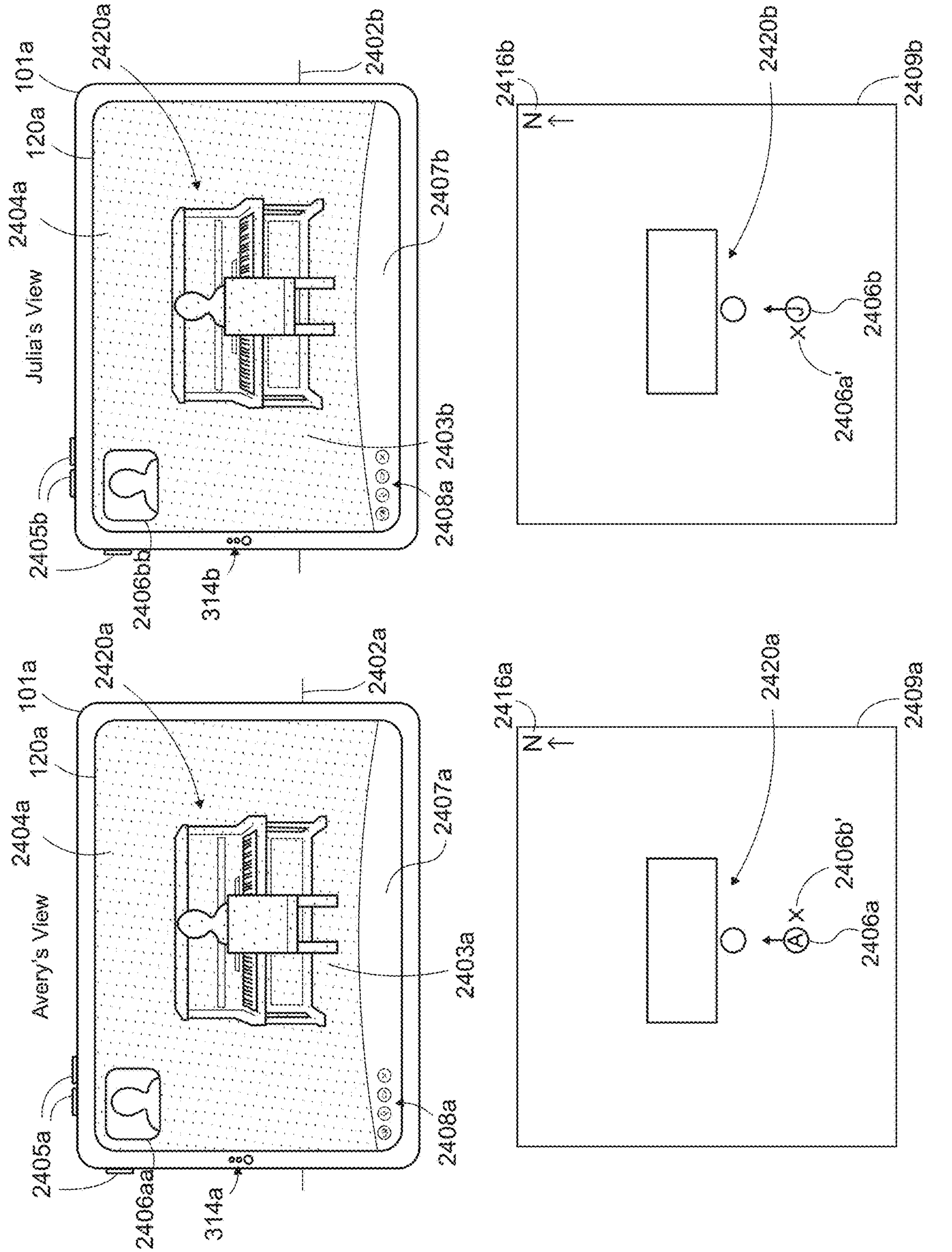
Figure 24F:
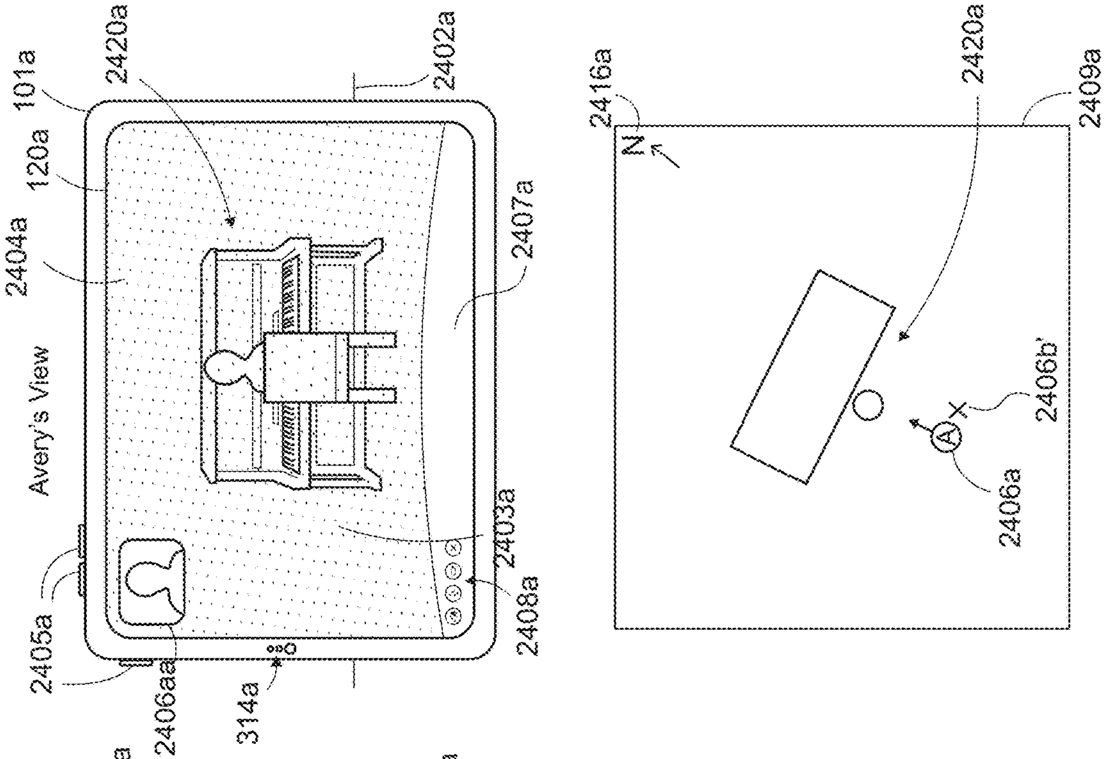
Figure 24E:
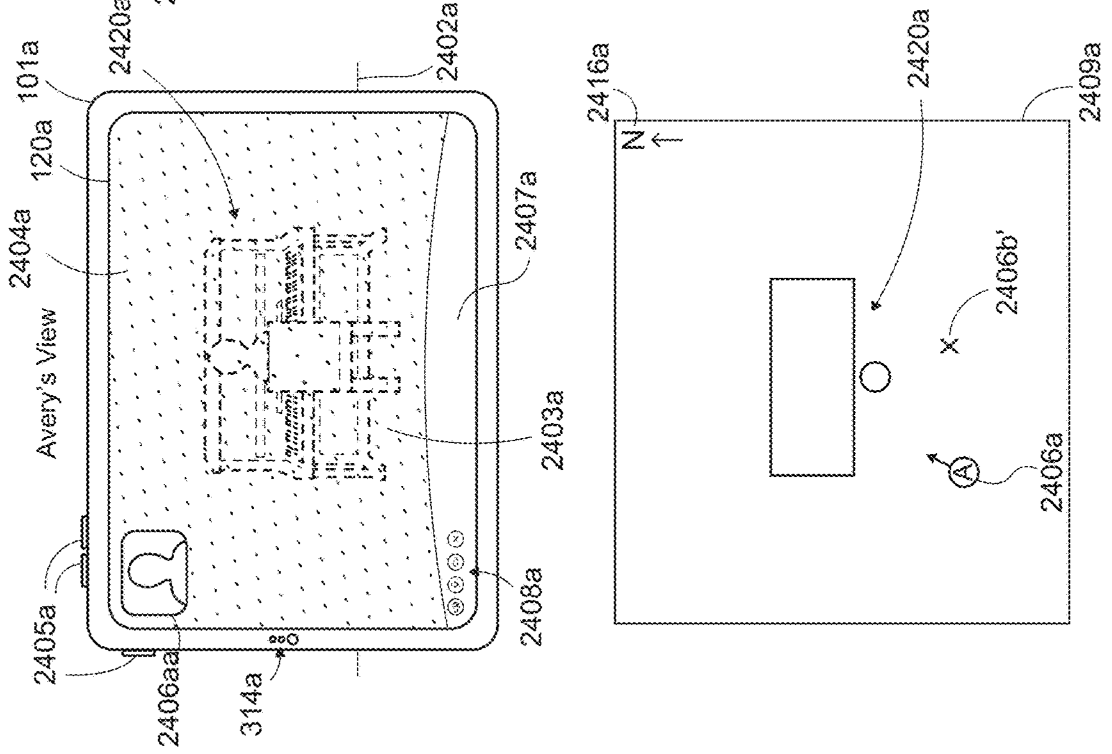
Figure 25:
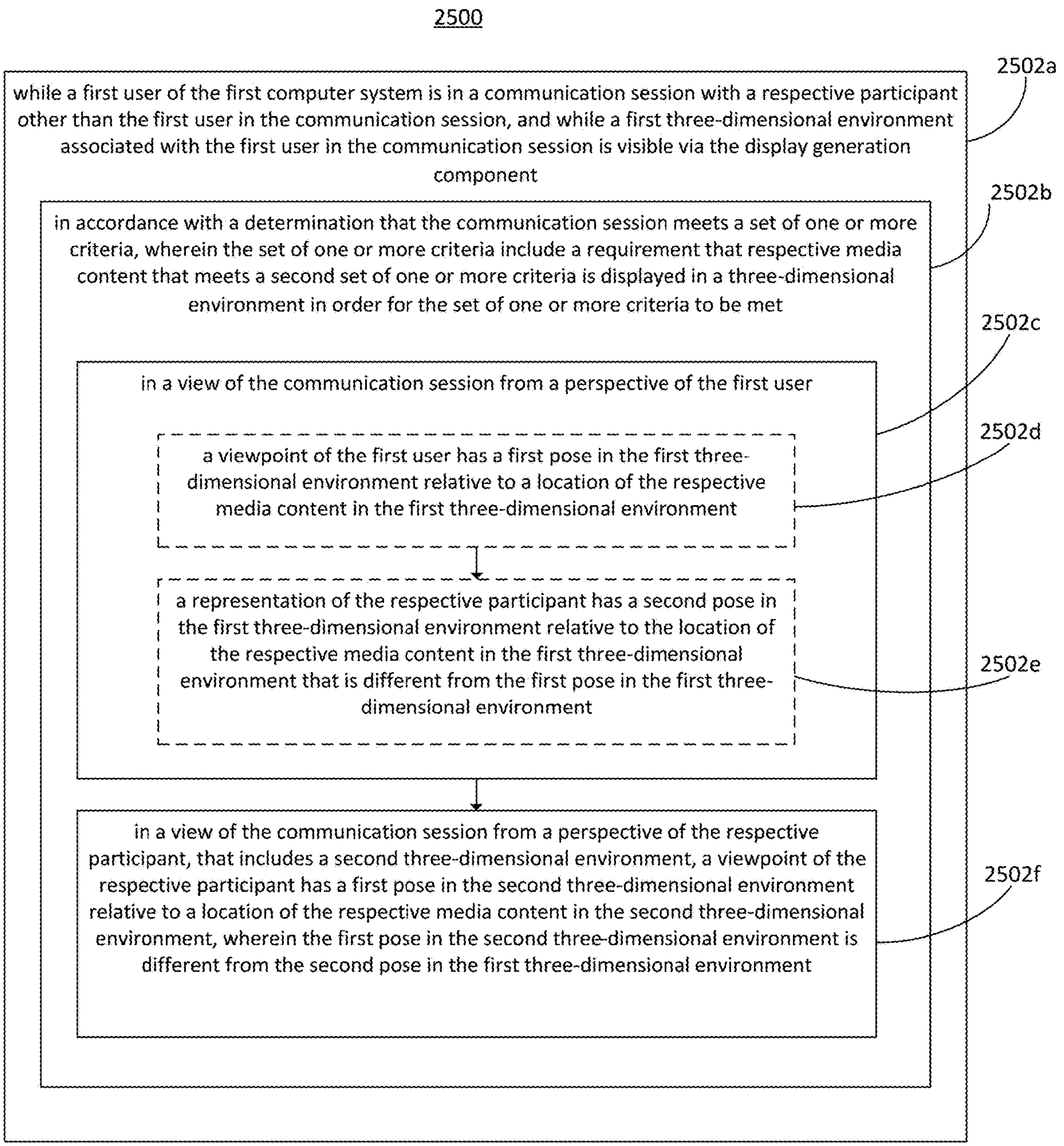
FIG. 25 is a flowchart for illustrating a method of positioning viewpoints of communication session participants relative to shared content in accordance with some embodiments.

FIGS. 24D-24F generally illustrate examples of computer systems that, while in a communication session that includes immersive media content (e.g., when entering a communication session that includes immersive media content), display the immersive media content, without displaying representations of other participants in the communication session, as described further below.

In FIG. 24D, computer systems 101*a/b* display shared immersive media content 2420*a/b* (e.g., three-dimensional content that surrounds the respective user of the computer system 101*a/b* in a view of the three-dimensional environment and/or three-dimensional content for which the computer system simulates depth effect(s) optionally relative to a viewpoint(s) of the user, such that the user visually experiences the three-dimensional content as three-dimensional content as described further with reference to method 2500). In FIG. 24D, immersive media content 2420*a/b* includes a piano concert scene. In some examples, computer system 101*b* of participant 2606*b* is displaying immersive media content 2420*b* before computer system 101*a* displays the immersive media content 2420*a*, and participant 2606*b* requests that participant 2406*a* join the communication session. In response to detecting and accepting the request (e.g., such as described below with reference to method 2700), computer system 101*a* optionally enters the communication session with participant 2606*b* and displays the shared immersive media content 2420*a* in three-dimensional environment 2404*a*, as shown in FIG. 24D.

In FIG. 24D, participants 2406*a/b* share the same view of the shared immersive media content 2420*a/b*. As such, the poses of participants 2406*a/b*, respectively relative to the shared immersive media content 2420*a/b*, respectively, are the same (e.g., the locations of participants 2406*a/b*, respectively, relative to immersive media content 2420*a/b*, respectively, are the same). In some embodiments, the poses of the participants are the same because the communication session meets the one or more criteria described with reference to method 2500 (e.g., the communication session includes immersive media content).

In FIG. 24D, computer system 101*a/b* present a respective audio representation (e.g., audio-only representation) of the other respective participant of the communication session, without displaying a representation of the other participant. For example, in FIG. 24D, in overhead view 2409*a*, representation 2406*b*' of participant 2406*b* is an audio representation corresponding to real time audio from participant 2406*b*, and in overhead view 2409*b*, representation 2406*a*' of participant 2406*a* is an audio representation corresponding to real time audio from participant 2406*a*. Spatially, the audio representations of the other participants are optionally presented as if the other participant was on a side (e.g., a left side or a right side) of the participant or as if the other participant was at the same location at the participant (or on top of the participant). Further details regarding the audio representations are described with reference to method 2500.

In some embodiments, while displaying immersive media content, when a participant moves outside of a viewing location for viewing the immersive media content (e.g., a system preferred viewing location, a preset or predefined viewing location) relative to the immersive media content), a computer system resets the immersive media content before the participant, as shown in FIGS. 24D-24F.

In FIG. 24D, participant 2406*a* is located at a preferred viewing location for viewing the immersive media content 2420*a* (e.g., immersive media content 2420*a* and/or computer system 101*a* has one or more preset views of immersive media content 2420*a* and the viewpoint of participant 2406*a* of FIG. 24D is within the set of one or more viewpoints (e.g., content and/or system determined viewpoints) for viewing immersive media content 2420*a*). In FIG. 24E, participant 2406*a* performs a head rotation and/or movement that corresponds to a change of viewpoint of the user (e.g., away from the viewpoint of the user illustrated in display generation component 120*a* of FIG. 24D) to a viewpoint of the user that is outside of a threshold range of viewpoints of the user for viewing the immersive media content 2420*a* (e.g., to a second viewpoint of the user that is outside of the threshold range of viewpoints of the user for viewing the immersive media content 2420*a*). For example, the position an orientation of participant 2406*a* would correspond to a different view of piano concert scene 2420*a* as shown by the relative location of participant 2406*a* in overhead view 2409*a* in FIG. 24E compared to the relative location of participant 2406*a* in overhead view 2409*a* of FIG. 24D. In response to detecting this movement and/or rotation that corresponds to the second viewpoint of the user that is outside of the threshold range of viewpoints of the user for viewing the immersive media content 2420*a*, computer system 101*a* resets the immersive media content displayed to participant 2406*a*, including reducing a visual prominence of the immersive media content 2420*a*, as shown in FIG. 24E, and then increasing a visual prominence of the immersive media content 2420*a*, as shown in FIG. 24F, such that immersive media content 2420*a* is displayed in front of the user relative to the second viewpoint of the user, just like the immersive media content was displayed in front of the user relative to the first viewpoint of the user in FIG. 24D (e.g., such as position of immersive media content 2420*a* relative to the viewpoint of participant 2406*a* in FIG. 24D).

FIG. 24F1 illustrates similar and/or the same concepts as those shown in FIG. 24F (with many of the same reference numbers). It is understood that unless indicated below, elements shown in FIG. 24F1 that have the same reference numbers as elements shown in FIGS. 24A-24F have one or more or all of the same characteristics. FIG. 24F1 includes computer system 101*a*, which includes (or is the same as) display generation component 120*a*. In some embodiments, computer system 101*a* and display generation component 120*a* have one or more of the characteristics of computer system 101 shown in FIGS. 24A-24F and display generation component 120 shown in FIGS. 1 and 3, respectively, and in some embodiments, computer system 101 and display generation component 120 shown in FIGS. 24A-24F have one or more of the characteristics of computer system 101*a* and display generation component 120*a* shown in FIG. 24F1.

In FIG. 24F1, display generation component 120*a* includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120*a* to enable eye tracking of the user's left and right eyes. Display generation component 120*a* also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 24A-24F.

In FIG. 24F1, display generation component 120*a* is illustrated as displaying content that optionally corresponds to the content that is described as being displayed and/or visible via display generation component 120 with reference to FIGS. 24A-24F. In some embodiments, the content is displayed by a single display (e.g., display 510 of FIG. 5) included in display generation component 120*a*. In some embodiments, display generation component 120*a* includes two or more displays (e.g., left and right display panels for the left and right eyes of the user, respectively, as described with reference to FIG. 5) having displayed outputs that are merged (e.g., by the user's brain) to create the view of the content shown in FIG. 24F1.

Display generation component 120*a* has a field of view (e.g., a field of view captured by external image sensors 314*b* and 314*c* and/or visible to the user via display generation component 120*a*) that corresponds to the content shown in FIG. 24F1. Because display generation component 120*a* is optionally a head-mounted device, the field of view of display generation component 120*a* is optionally the same as or similar to the field of view of the user.

In some embodiments, computer system 101*a* responds to user inputs as described with reference to FIGS. 24A-24F.

It is understood than one or more or all aspects of the present disclosure as shown in, or described with reference to FIGS. 24A-24F and/or described with reference to the corresponding method(s) are optionally implemented on computer system 101*a* and display generation unit 120*a* in a manner similar or analogous to that shown in FIG. 24F1.

FIGS. 24A-24F1 are further described with reference to method 2500.

FIG. 25 is a flowchart for illustrating a method 2500 of positioning viewpoints of communication session participants relative to media content in accordance with some embodiments. In some embodiments, the method 2500 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2500 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2500 are, optionally, combined and/or the order of some operations is, optionally, changed.

In some embodiments, method 2500 is performed at a first computer system in communication with one or more input devices and a display generation component: The first computer system optionally has one or more characteristics of the computer system(s) described with reference to method(s) 800-2300. The one or more input devices optionally have one or more characteristics of the one or more input devices described with reference to method(s) 800-2300. The display generation component optionally has one or more characteristics of the display generations component(s) described with reference to method(s) 800-2300.

In some embodiments, while a first user of the first computer system, such as participant 2406*a* of FIG. 24C, is in a communication session with a respective participant other than the first user in the communication session (e.g., a real-time communication session, which optionally includes), such as participant 2406*b* of FIG. 24C, and while a first three-dimensional environment associated with the first user in the communication session is visible via the display generation component (2502*a*), such as three-dimensional environment 2404*a* of participant 2406*a* visible via display generation component 120*a* of FIG. 24C, in accordance with a determination that the communication session meets a set of one or more criteria, wherein the set of one or more criteria include a requirement that respective media content (e.g., image, video, and/or audio content such as a photo, movie, TV show, or advertisement) that meets a second set of one or more criteria is displayed in a three-dimensional environment (e.g., in the first three-dimensional environment or second three-dimensional environment discussed below) in order for the set of one or more criteria to be met (2502*b*), such as shared media content 2410*b* meeting the second set of one or more criteria, in a view of the communication session from a perspective of the first user (that optionally includes the first three-dimensional environment) (2502*c*), such as participant 2406*a* of FIG. 24C, a viewpoint of the first user has a first pose in the first three-dimensional environment (e.g., position and/or orientation) relative to a location of the respective media content in the first three-dimensional environment, such as the pose of participant 2406*a* relative to shared media content 2610*a* in FIG. 24C (2502*d*). In some embodiments, the communication session has one or more characteristics of the communication session(s) discussed throughout this disclosure, such as the communication sessions described with reference to method(s) 1200-1800, and/or 2700. In some embodiments, the first three-dimensional environment has one or more of the characteristics of the virtual environments and/or three-dimensional environments described in method(s) 800-2300 and/or 2700. In some embodiments, the first user initiates a request for the second user to join the communication session. The first computer system optionally displays the first three-dimensional environment from a viewpoint corresponding to the first user of the first computer system in the first three-dimensional environment.

In some embodiments, in accordance with a determination that the communication session meets a set of one or more criteria, wherein the set of one or more criteria include a requirement that respective media content (e.g., image, video, and/or audio content such as a photo, movie, TV show, or advertisement) that meets a second set of one or more criteria is displayed in a three-dimensional environment (e.g., in the first three-dimensional environment or second three-dimensional environment discussed below) in order for the set of one or more criteria to be met, such as shared media content 2410*b* meeting the second set of one or more criteria, in a view of the communication session from a perspective of the first user (that optionally includes the first three-dimensional environment), such as participant 2406*a* of FIG. 24C, a representation of the respective participant (e.g., avatar and/or another type of virtual object) has a second pose in the first three-dimensional environment (e.g., an apparent viewpoint of the respective participant) relative to the location of the respective media content in the first three-dimensional environment that is different from the first pose in the first three-dimensional environment (2502*e*), such as the pose of representation 2406*b*' of participant 2406*b* relative to shared media content 2610*a* in three-dimensional environment 2404*a* in FIG. 24C. For example, in the first three-dimensional environment that is visible via the first computer system, a (hypothetical) vector or axis originating at (or passing through) a center of the respective media content and terminating at (or passing through) a location corresponding to the viewpoint of the first user, optionally is associated with (e.g., has and/or is defined by) a first direction relative to a directional reference of the respective media content, such as relative to a normal of the respective media content that extends from the center of the respective media content. Continuing with this example, in the first three-dimensional environment that is visible via the first computer system, a (hypothetical) vector or axis originating at (or passing through) a center of the respective media content and terminating at (or passing through) a location corresponding to the representation of the respective participant, optionally is associated with (e.g., has and/or is defined by) a second direction, different from the first direction, relative to the directional reference of the respective media content, such as relative to the normal of the respective media content that extends from the center of the respective media content.

The second set of one or more criteria optionally includes a requirement that the respective media content is displayed at a respective (e.g., predefined or preset) location for media content (e.g., a docked location or a predetermined location that the three-dimensional environment or computer system optionally defines, at which the respective media content optionally resides and/or is not movable, optionally during a full-screen or docked mode of the respective media content or another mode) in a three-dimensional environment (e.g., in the first three-dimensional environment or second three-dimensional environment discussed herein) in order for the second set of one or more criteria to be met. The second set of one or more criteria optionally includes a requirement that the respective media content is immersive media content (e.g., three-dimensional content that surrounds the user of the computer system in a view of the three-dimensional environment and/or three-dimensional content for which the computer system simulates depth effect(s) optionally relative to a viewpoint(s) of the user, such that the user visually experiences the three-dimensional content as three-dimensional content) in order for the second set of one or more criteria to be met, such as immersive media content discussed below. The second set of one or more criteria optionally includes a requirement that the respective media content is any media with a depth effect, such as media with a depth effect that is perspective specific, such as stereoscopic media (e.g., media where the 3D effect is based on two separate images for different eyes that were captured from different perspectives to create a 3D effect) in order for the second set of one or more criteria to be met.

In some embodiments, in accordance with a determination that the communication session meets a set of one or more criteria, wherein the set of one or more criteria include a requirement that respective media content (e.g., image, video, and/or audio content such as a photo, movie, TV show, or advertisement) that meets a second set of one or more criteria is displayed in a three-dimensional environment (e.g., in the first three-dimensional environment or second three-dimensional environment discussed below) in order for the set of one or more criteria to be met, such as shared media content 2410*b* meeting the second set of one or more criteria, in a view of the communication session from a perspective of the first user (that optionally includes the first three-dimensional environment), such as participant 2406*a* of FIG. 24C, in a view of the communication session from a perspective of the respective participant, such as participant 2406*b* of FIG. 24C, that includes a second three-dimensional environment, a viewpoint of the respective participant has a first pose in the second three-dimensional environment (e.g., position and/or orientation) relative to a location of the respective media content in the second three-dimensional environment, wherein the first pose in the second three-dimensional environment (e.g., relative to the location of the respective media content in the second three-dimensional environment) is different from the second pose in the first three-dimensional environment (2502*f*) (e.g., relative to the location of the respective media content in the first three-dimensional environment (and is optionally, the same as the first pose in the first three-dimensional environment)), such as the pose of participant 2406*b* relative to shared media content 2610*b* in three-dimensional environment 2404*b* in FIG. 24C. For example, in the second three-dimensional environment that is visible via a second display generation component of a second computer system for the respective participant, the (hypothetical) vector or axis originating at (or passing through) a center of the respective media content and terminating at (or passing through) a location corresponding to the viewpoint of the respective participant is optionally associated with (e.g., has and/or is defined by) a second direction relative to the center of the respective media content, different from the first direction relative to the center of the respective media content that the representation of the respective participant has in the first three-dimensional environment; as such, the pose of the respective participant (e.g., location of the respective participant and/or direction at which the respective participant faces the respective media content) in the second three-dimensional environment) is different from a pose of the respective participant (e.g., location of the respective participant and/or direction at which the representation of the respective participant faces the respective media content) observed by another participant of the communication session, optionally regardless of whether the other participant is in the same environment or in a different environment than that of the respective participant (e.g., regardless of whether the second three-dimensional environment that is visible via the second computer system for the respective participant is the same as or different from the three-dimensional environment of the other participant). As such, the location and/or orientation of the respective participant relative to the respective media content is optionally not aligned between views of the communication session corresponding to different participants of the communication session. Accordingly, the location and/or orientation of a viewpoint of a respective participant relative to the respective media content in the first three-dimensional environment visible via the first computer system is optionally different from the location and/or orientation of the viewpoint of the respective participant relative to the respective media content in the second three-dimensional environment visible via the second computer system. Thus, the first computer system optionally actively displays a representation of a respective participant with a location, orientation, and/or direction relative to the respective media content that is different from the location, orientation, and/or direction relative to the respective media content of the respective participant in the context of the environments visible for the respective participant. Accordingly, participants of the communication session optionally do not share directional alignment (e.g., directional truth) relative to the respective media content between different views of the communication session. Actively placing, in a first environment, one or more representations of participants with poses (e.g., locations, orientations, and/or directions) relative to the respective media content that are different from the poses of the one or more participants relative to the respective media content in the contexts of the environments simulated for the one or more participants facilitates a continued human-machine interaction by resolving conflicting technical aspects that could result if more than one participant occupies the same location relative to the respective media content during the communication session.

In some embodiments, the respective participant is a first participant, such as participant 2406*b* of FIG. 24C, and the communication session further includes a second participant (that is different from the first participant and different from the first user), such as participant 2406*c* of FIG. 24C. Thus, the features discussed with reference to step(s) 2502 optionally extend to communication sessions with more than two participants, such that a location and/or orientation of a viewpoint of a second respective participant in a first respective participant's environment that is visible via the first computer system (and in a third respective participant's environment visible via a third computer system for the third user) is optionally different from the location and/or orientation of the viewpoint of the second respective participant in the second respective participant's environment visible via the second computer system for the second respective participant. Actively placing, in a first environment, representations of participants with poses (e.g., locations, orientations, and/or directions) relative to the respective media content that are different from the poses of the participants relative to the respective media content in the contexts of the environments simulated for the one or more participants facilitates a continued human-machine interaction by resolving conflicting technical aspects that could result if more than one participant occupies the same location relative to the respective media content during the communication session and ensures that different participants have the same position relative to the content in their own environments for consistency of interaction with the respective media content from participant to participant.

In some embodiments, the set of one or more criteria (e.g., discussed with reference to step(s) 2502) include a requirement that respective media content is in playback in order for the set of one or more criteria to be met. For example, the set of one or more criteria is optionally met when shared media content 2410*a-c* of FIG. 24C is in playback. Requiring playback of the respective media content in order for the set of one or more criteria to be met corresponds specific pose configuration(s) of the representations of participants to be specifically for during playback of the respective media content, which resolves conflicting technical aspects that could result if more than one participant occupies the same (ideal) location relative to the respective media content during playback of the respective media content in the communication session and ensures that different participants have the same position relative to the content in their own environments for consistency of interaction with the respective media content from participant to participant.

In some embodiments, while the first user of the first computer system is in the communication session with the respective participant other than the first user in the communication session, and while the first three-dimensional environment associated with the first user in the communication session is visible via the display generation component, in accordance with a determination that (1) the communication session does not meet the set of one or more criteria (e.g., the second set of one or more criteria described above optionally including a requirement that the respective media content is displayed at a respective (e.g., predefined or preset) location for media content and the requirement not being met), and/or (2) media content is not in playback in the three-dimensional environment (e.g., in the first three-dimensional environment or second three-dimensional environment)), in the view of the communication session from the perspective of the first user (that, optionally includes the first three-dimensional environment), the viewpoint of the first user has a third pose (same as or different from the first pose) in the first three-dimensional environment (e.g., position and/or orientation) relative to the location of the respective media content in the first three-dimensional environment, such as the pose of participant 2406*a* relative to the location of shared media content 2410*a* in three-dimensional environment 2404*a* in FIG. 24A.

In some embodiments, the representation of the respective participant (e.g., avatar and/or another type of virtual object) has a fourth pose in the first three-dimensional environment (e.g., an apparent viewpoint of the respective participant) relative to the location of the respective media content in the first three-dimensional environment, such as the pose of representation 2406*b*' of participant 2406*b* in FIG. 24A. For example, if participant 2406*a* were to face representation 2406*b*', display generation component 120*a* would optionally show the pose of representation 2406*b*' in FIG. 24A.

In some embodiments, in the view of the communication session from the perspective of the respective participant, that includes the second three-dimensional environment, the viewpoint of the respective participant has the fourth pose in the second three-dimensional environment (e.g., position and/or orientation) relative to the location of the respective media content in the second three-dimensional environment, wherein the fourth pose in the second three-dimensional environment and the fourth pose in the first three-dimensional environment are the same pose (e.g., position and/or orientation) relative to the respective location for media content. For example, the pose of representation 2406*b*' and of participant 2406*b* are the same pose in FIG. 24A. For example, if participant 2406*a* were to face representation 2406*b*', display generation component 120*a* would optionally show the pose of representation 2406*b*' in FIG. 24A, which is optionally the same pose as the pose of participant 2406 in FIG. 24A. Thus, if (1) the communication session does not meet the set of one or more criteria (e.g., the second set of one or more criteria described above optionally including a requirement that the respective media content is displayed at a respective (e.g., predefined or preset) location for media content and the requirement not being met), and/or (2) media content is not in playback in the three-dimensional environment (e.g., in the first three-dimensional environment or second three-dimensional environment), views of the communication session from the perspective of different participants of the communication share directional alignment (relative to the respective media content and/or different participants of the communication session). For example, if a first and second participant share the same environment and the first participant looks south in the environment to face the second participant head on, the second participant looks north in the environment to face the first participant head on. Actively placing, in a first environment, representations of participants with poses (e.g., locations, orientations, and/or directions) relative to the respective media content that are aligned with the poses of the participants relative to the respective media content in the contexts of the environments simulated for the one or more participants facilitates a continued human-machine interaction by tracking poses of participants relative to the respective media content such that in other views of the communication session, participants observe the same pose of the participants relative to the respective media content during the communication session and ensures that different participants have directional/orientational truth relative to the content and/or relative to each other in their own environments for consistency of interaction with the respective media content and with other participants.

In some embodiments, in accordance with the determination that (1) the communication session does not met the set of one or more criteria, and/or (2) media content is not in playback in the three-dimensional environment, in the view of the communication session from the perspective of the first user, that includes the first three-dimensional environment, the fourth pose of the representation of the respective participant is spatially offset (e.g., 0.2 cm, 0.5 cm, 1 cm, 2 cm, 3 cm, 5 cm, 10 cm, 20 cm, 40 cm, 80 cm, 1 meter, 2 meters, 3 meters, 5 meters, or another distance) from a predefined viewing location of the first three-dimensional environment, such as the pose of representation 2406*b*' being spatially offset from a predefined viewing location of three-dimensional environment 2404*a* in FIG. 24A, which is optionally occupied by participant 2406*a* in three-dimensional environment 2404*a* in FIG. 24A. For example, the predefined viewing location of the first three-dimensional environment is optionally a location within the first three-dimensional environment from which the computer system corresponds the view of the communication session from the perspective of the first user.

In some embodiments, in the view of the communication session from the perspective of the respective participant, a representation of the first user is spatially offset from a predefined viewing location of the second three-dimensional environment. For example, computer system 101 optionally displays representation 2406*a*' of participant 2406*a* offset from a predefined viewing location of three-dimensional environment 2404*b* in FIG. 24A, which is optionally occupied by participant 2406*b* in three-dimensional environment 2404*b* in FIG. 24A The predefined viewing location of the second three-dimensional environment is optionally a location within the second three-dimensional environment from which the computer system corresponds the view of the communication session from the perspective of the respective participant. As such, the first three-dimensional environment optionally does not completely overlap with the second three-dimensional environment. Spatially offsetting environments while the environments are directionally aligned allows for a participant to occupy an ideal viewing location in the communication session from their respective perspective of the communication session.

In some embodiments, the first three-dimensional environment and the second three-dimensional environment are a same three-dimensional environment (e.g., as described with reference to method 2300), such as shared virtual environments 2403*a/b* being the same virtual environment. For example, the first three-dimensional environment is optionally or optionally includes a virtual environment that is the same as the virtual environment of the second three-dimensional environment. In some embodiments, the virtual environments of three-dimensional environments 2403*a-c* are different. Sharing three-dimensional environments between participants of the communication session further orients participants of the communication session in a particular three-dimensional environment and permits further environmental truth between participants of the communication session than if environments were not shared by participants.

In some embodiments, in accordance with the determination that the communication session meets the set of one or more criteria (e.g., described with reference to step(s) 2502 above), in the view of the communication session from the perspective of the first user (e.g., described with reference to step(s) 2502 above), the first pose in the first three-dimensional environment relative to the location of the respective media content in the first three-dimensional environment (e.g., the respective location for media content in the first three-dimensional environment) is within a threshold range of one or more poses (e.g., a threshold range of one or more positions and/or orientations, such as 0, 1, 2, 3, 7, 10, degrees, or another angular distance, from a normal of/perpendicular line from the respective media content in the first three-dimensional environment, such as from the normal of the respective media content passing through the center of the respective media content) relative to the location of the respective media content in the first three-dimensional environment (e.g., the respective location for media content in the first three-dimensional environment). For example, the threshold range of one or more poses optionally includes a range in which the one or more poses corresponds to an ideal viewing angle of viewing the respective media content. Since the first pose is within the threshold range of one or more poses, in the view of the communication session from the perspective of the first user, the computer system optionally displays the respective media content with an ideal viewing angle (e.g., the first user can see the respective media content from an ideal viewing angle), such as with an angular distance between the first pose and the normal of the respective media content being 0 degrees. For example, the pose of participant 2406*a* relative to shared media content 2610*a* in FIG. 24C is within the threshold range of poses relative to the location of shared media content 2410*a* in three-dimensional environment 2404*a* in FIG. 24C.

In some embodiments, in the view of the communication session from the perspective of the respective participant, that includes the second three-dimensional environment, the first pose in the second three-dimensional environment relative to the location of the respective media content in the first three-dimensional environment (e.g., the respective location for media content in the second three-dimensional environment) is within the threshold range of one or more poses (e.g., the threshold range of one or more positions and/or orientations) relative to the respective location for media content in the second three-dimensional environment. For example, the pose of participant 2406*b* relative to shared media content 2610*b* in FIG. 24C is within the threshold range of poses relative to the location of shared media content 2410*b* in three-dimensional environment 2404*b* in FIG. 24C. As such, participants of the communication session optionally have the same viewing angle relative to the respective media content. Actively placing, in a first environment, one or more representations of participants with poses (e.g., locations, orientations, and/or directions) relative to the respective media content that are different from the poses of the one or more participants relative to the respective media content in the contexts of the environments simulated for the one or more participants facilitates a continued human-machine interaction by resolving conflicting technical aspects that could result if more than one participant occupies the same location relative to the respective media content during the communication session and ensures that different participants have the same position relative to the content in their own environments for consistency of interaction with the respective media content from participant to participant.

In some embodiments, in accordance with the determination that the communication session meets the set of one or more criteria (e.g., described with reference to step(s) 2502), in the view of the communication session from the perspective of the first user (e.g., that optionally includes the first three-dimensional environment), the first pose that the viewpoint of the first user has corresponds to a first viewing angle relative to the respective media content, such as the pose of participant 2406*a* relative to shared media content 2610*a* in FIG. 24C. The first viewing angle is optionally 0, 1, 2, 3, 7, 10 degrees, or another angular distance, from a normal of the respective media content in the first three-dimensional environment, such as from the normal of the respective media content passing through the center of the respective media content.

In some embodiments, the second pose that the representation of the respective participant has corresponds to a second viewing angle, different from the first viewing angle, relative to the respective media content such as the pose of representation 2406*b*' of participant 2406*b* relative to shared media content 2610*a* in FIG. 24C. The second viewing angle optionally has a greater angular distance from the normal of the respective media content in the first three-dimensional environment than the first viewing angle. For example, the second viewing angle is optionally 11, 15, 20, 45, 60, 85, degrees, or another angular distance, from the normal of the respective media content in the first three-dimensional environment. As such, when the set of one or more criteria are met, representations of participants of the communication session optionally appear to be viewing the respective media content from a skewed angle relative to the respective media content, even though in the views of the communication session from the perspectives of the respective participants, the pose of the respective participants are oriented at an ideal viewing angel of the respective media content. Actively placing, in a first environment, one or more representations of participants with poses (e.g., locations, orientations, and/or directions) relative to the respective media content that are different from the poses of the one or more participants relative to the respective media content in the contexts of the environments simulated for the one or more participants facilitates a continued human-machine interaction by resolving conflicting technical aspects that could result if more than one participant occupies the same location relative to the respective media content during the communication session and ensures that different participants have the same position relative to the content in their own environments for consistency of interaction with the respective media content from participant to participant.

In some embodiments, while the first user of the first computer system is in the communication session with the respective participant other than the first user in the communication session, and while the first three-dimensional environment associated with the first user in the communication session is visible via the display generation component, in accordance with the determination that the communication session meets the set of one or more criteria, wherein the set of criteria includes a requirement that the respective media content that is displayed in a three-dimensional environment is non-immersive (e.g., is optionally displayed and/or bounded within a planar or curved plane from the perspective of the first user and/or in which elements of the media content optionally do not include depth dimensions), such as shared media content 2410*a-c* of FIG. 24C, in order for the second set of criteria to be met, in a view of the communication session from the perspective of the first user, (that, optionally, includes the first three-dimensional environment), the first three-dimensional environment includes a respective representation of the respective participant, the pose of representation 2406*b*' of participant 2406*b* relative to shared media content 2610*a* in three-dimensional environment 2404*a* in FIG. 24C. Thus, when the respective media content that is displayed in the three-dimensional environment is non-immersive, the computer system optionally displays a representation of the respective participant in the three-dimensional environment. Further, the representation of the respective participant optionally occupies a position in the three-dimensional environment that is different from the pose of the user in the three-dimensional environment.

In some embodiments, in accordance with a determination that the communication session meets a second set of one or more criteria, different from the set of criteria wherein the second set of one or more criteria include a requirement that the respective media content that is displayed in a three-dimensional environment (e.g., in the first three-dimensional environment and/or in the second three-dimensional environment) is immersive content (e.g., three-dimensional content that at least partially surrounds the user of the computer system in a view of the three-dimensional environment and/or three-dimensional content for which the computer system simulates depth effect(s) optionally relative to a viewpoint(s) of the user, such that the user visually experiences the three-dimensional content as three-dimensional content), such as shared media content 2420*a* in FIG. 24D, in order for the second set of one or more criteria to be met, a view of the communication session from the perspective of the first user (that, optionally includes the first three-dimensional environment that includes the immersive content) does not include a representation (e.g., a spatial representation) of the respective participant, such as shown with three-dimensional environment 2404*a* in FIG. 24D not displaying representation of participant 2406*b*.

In some embodiments, a view of the communication session from the perspective of the respective participant that includes the second three-dimensional environment (that, optionally, includes the same immersive content as the first three-dimensional environment) does not include a representation (e.g., a spatial representation) of the first user such as shown with three-dimensional environment 2404*b* in FIG. 24D not displaying representation of participant 2406*a*. Thus, when the respective media content that is displayed in the three-dimensional environment is immersive content, the computer system optionally forgoes displaying a representation of the respective participant in the three-dimensional environment. Further, when the respective media content that is displayed in the three-dimensional environment is immersive content, in the view of the communication session from the perspective of the first user, the viewpoint of the first user has a first pose in the first three-dimensional environment relative to the location of the respective media content in the first three-dimensional environment, and in the view of the communication session from the perspective of the respective participant, the viewpoint of the respective participant optionally has the first pose relative to the location of the respective media content in the second three-dimensional environment, wherein the first pose in the first three-dimensional environment is optionally the same as the first pose in the second three-dimensional environment. Displaying a representation of a respective participant in a three-dimensional environment when the communication session includes respective media content that is non-immersive and forgoing displaying a representation of a respective participant in the three-dimensional environment when the communication session includes respective media content that is immersive content resolves conflicting technical aspects that could result if more than one participant occupies the same location relative to the respective media content during the communication session, based on a type of the respective media content, and ensures that different participants have the same position relative to the content in their own environments for consistency of interaction with the respective media content from participant to participant.

In some embodiments, while the first user of the first computer system is in the communication session with the respective participant other than the first user in the communication session, while the first three-dimensional environment associated with the first user in the communication session is visible via the display generation component, and in accordance with the determination that the second set of one or more criteria is met, presenting audio corresponding to audio of the respective participant (e.g., real-time voice audio communication of the respective participant) in the communication session, such as shown in overhead view 2409*a/b* including representations 2406*a*'/b' which are audio representations in FIG. 24D. Thus, the computer system optionally presents audio of the respective participant of the communication session while the communication session includes the respective media content that is immersive content, even though in the views of the communication, the communication session does not include a spatial representation of the respective participant. In some embodiments, the audio corresponding to the respective participant is generated as if emanating from a location at which a representation of the respective participant would be displayed if the content were non-immersive (e.g., the relative spatial arrangement of the audio relative to the viewpoint of the user is the same as or corresponds to the relative spatial arrangement of the hypothetical representation of the respective participant relative to the viewpoint of the user). In some embodiments, the audio corresponding to the respective participant is generated as if emanating from a different location (e.g., a location in the environment that does not change based on relative placements of participants). In some embodiments, the audio corresponding to the respective participant is generated as non-spatial audio (e.g., audio that is not generated as if emanating from a particular location in the environment). Presenting audio corresponding to audio of the respective participant in the communication session without displaying a representation of the respective participant in the first three-dimensional environment maintains consistency of interaction among participants with fellow participants of the communication session even when the views of the communication session does not include a spatial representation of a participant and provides feedback that the other participant(s) are still in the communication session.

In some embodiments, while the first user of the first computer system is in the communication session with the respective participant other than the first user in the communication session, while the first three-dimensional environment associated with the first user in the communication session is visible via the display generation component, and in accordance with a determination that a second set of one or more criteria is met, wherein the second set of one or more criteria include a requirement that respective media content that is immersive content (e.g., three-dimensional content that surrounds the user of the computer system in a view of the three-dimensional environment and/or three-dimensional content for which the computer system simulates depth effect(s) optionally relative to a viewpoint(s) of the user, such that the user visually experiences the three-dimensional content as three-dimensional content) is displayed in a three-dimensional environment (e.g., in the first three-dimensional environment and/or in the second three-dimensional environment) in order for the second set of one or more criteria to be met, the first computer system detects, via the one or more input devices, an event corresponding to a change of viewpoint of the first user, such as computer system 101*a* detecting head rotation and/or movement of participant 2406*a* in FIG. 24D away from shared media content 2420*a* in FIG. 24D. For example, the event optionally includes detection of a portion of the user's body (and/or specific body part(s)) moving outside of a physical zone (e.g., 1, 2, 5, 10, 25 square feet, or another physical zone) in a physical environment from which a predefined viewing location (e.g., viewing region) for viewing the immersive content is defined (by the computer system or the immersive content).

In some embodiments, in response to detecting the event corresponding to the change of viewpoint of the first user, in accordance with a determination the event corresponds to a change of viewpoint from a first viewpoint to a second viewpoint (e.g., a restricted viewpoint or a blank viewpoint), wherein the second viewpoint is outside of a threshold range of viewpoints of the first viewpoint (e.g., a portion of the user's body (and/or specific body part(s)) is detected to be outside of the physical zone (e.g., 1, 2, 5, 10, 25 square feet, or another physical zone) in a physical environment from which a predefined viewing location (e.g., viewing region) for viewing the immersive content is defined (by the computer system or the immersive content), the first computer system resets the respective media content in the first three-dimensional environment relative to the second viewpoint of the first user, such as shown with the resetting of shared media content 2420*a* from FIG. 24E to FIGS. 24F and 24F1 (e.g., updating a spatial arrangement of one or more virtual objects relative to the current viewpoint of the user to satisfy the second viewpoint being inside the threshold range of viewpoints of the first viewpoint). In some embodiments, resetting the respective media content causes the respective media content in the first three-dimensional environment relative to the second viewpoint of the first to be displayed at an ideal viewing angle (e.g., 0, 1, 2, 3, 7, or 10 degrees, or another angular distance, from a normal of the respective media content in the first three-dimensional environment, such as from the normal of the respective media content passing through the center of the respective media content) and/or displayed at an ideal viewing distance (e.g., 30 cm, 40 cm, 50 cm, 3 m, 4 m, 10 cm, 15 m, 20 m, 25 m, or another distance) of the viewpoint of the user. Automatically recentering the respective media content when the respective media content is immersive and when the event corresponding to a change of viewpoint of the first user corresponds to a change of viewpoint from a first viewpoint to a second viewpoint that is outside of a threshold range of viewpoints of the first viewpoint permits the computer system to shift the viewpoint of the user to an ideal viewpoint without user input specifically for shifting the viewpoint of the user, and avoids displaying viewpoints of the user that corresponds to improper viewing angles for viewing the immerse content because the immersive content may not be confirmed to be displayed from those improper viewing angles and/or positions, which may reduce errors in user interaction with the computer system.

In some embodiments, the set of one or more criteria (e.g., described with reference to step(s) 2502) includes a requirement that respective media content is displayed at a respective (e.g., predefined or preset) location for media content in the three-dimensional environment in order for the set of one or more criteria to be met, such as the location of shared media content 2410*a-c* in three-dimensional environment 2404*a-c*, respectively in FIG. 24C (e.g., a docked location or a predetermined location that the three-dimensional environment or computer system optionally defines, at which the respective media content optionally resides and/or is not movable during a full-screen or docked mode of the respective media content or another mode).

In some embodiments, while the first user of the first computer system is in the communication session with the respective participant other than the first user in the communication session, while the first three-dimensional environment associated with the first user in the communication session is visible via the display generation component, and in accordance with a determination that the set of one or more criteria is not met (and, optionally while the respective media content is visible in a view of the communication session from the perspective of the first user), in the view of the communication session from the perspective of the first user (that, optionally includes the first three-dimensional environment), the viewpoint of the first user has a third pose (that is optionally the same as or different from the first pose) in the first three-dimensional environment (e.g., position and/or orientation) relative to the location of the respective media content in the first three-dimensional environment (that is optionally not the respective location for media content in the first three-dimensional environment), such as the pose of participant 2406*a* relative to the location of shared media content 2410*a* in three-dimensional environment 2404*a* in FIG. 24A.

In some embodiments, while the first user of the first computer system is in the communication session with the respective participant other than the first user in the communication session, while the first three-dimensional environment associated with the first user in the communication session is visible via the display generation component, and in accordance with a determination that the set of one or more criteria is not met (and, optionally while the respective media content is visible in a view of the communication session from the perspective of the first user), in the view of the communication session from the perspective of the first user (that, optionally includes the first three-dimensional environment), the representation of the respective participant (e.g., avatar and/or another type of virtual object) has a fourth pose in the first three-dimensional environment (e.g., an apparent viewpoint of the respective participant) relative to the location of the respective media content in the first three-dimensional environment, such as the pose of representation 2406*b*' of participant 2406*b* in FIG. 24A. For example, if participant 2406*a* were to face representation 2406*b*', display generation component 120*a* would optionally show the pose of representation 2406*b*' in FIG. 24A.

In some embodiments, in the view of the communication session from the perspective of the respective participant, that includes the second three-dimensional environment, the viewpoint of the respective participant has the fourth pose in the second three-dimensional environment (e.g., position and/or orientation) relative to the location of the respective media content in the second three-dimensional environment. In some embodiments, the fourth pose in the second three-dimensional environment and the fourth pose in the first three-dimensional environment are the same pose (e.g., position and/or orientation) relative to the respective location for media content. For example, the pose of representation 2406*b*' and of participant 2406*b* are the same pose in FIG. 24A. For example, if participant 2406*a* were to face representation 2406*b*', display generation component 120*a* would optionally show the pose of representation 2406*b*' in FIG. 24A, which is optionally the same pose as the pose of participant 2406 in FIG. 24A. The location of the respective media content in the second three-dimensional environment is optionally different from the respective location for media content in the second three-dimensional environment, In some embodiments, while the first user of the first computer system is in the communication session with the respective participant other than the first user in the communication session, while the first three-dimensional environment associated with the first user in the communication session is visible via the display generation component, and in accordance with the determination that the set of one or more criteria is not met (and, optionally while the respective media content is visible in a view of the communication session from the perspective of the first user), the first computer system obtains information corresponding to a request to display the respective media content at the respective (e.g., predefined or preset) location for media content (e.g., a docked location or a predetermined location that the three-dimensional environment or computer system optionally defines, at which the respective media content optionally resides and/or is not movable, optionally during a full-screen or docked mode of the respective media content or another mode) in the first three-dimensional environment, such as input from hand 2412*a* in FIG. 24A corresponding to a request to display shared media content 2410*a* in the respective location for media content in shared virtual environment 2403*a*. The information optionally includes one or more characteristics of inputs discussed herein such as third input corresponding to a request to display the first shared content at the respective location for media content in the three-dimensional environment discussed below with reference to method 2700. For example, the information optionally includes detection of selection of a user interface element in a system user interface or a content playback user interface corresponding to the first shared content to display the respective media content at the respective location for media content in the first three-dimensional environment. In some embodiments, before obtaining the information, the poses of the representations of participants relative to the respective media content in the first three-dimensional environment are aligned with the poses of the participants relative to the respective media content in the contexts of the environments simulated for the one or more participants. In some embodiments, the information is received from a second computer system of a participant that provided input to the second computer system to dock the content (e.g., display the respective media content at a respective location for media content in the second three-dimensional environment visible via a second display generation component in communication with the second computer system) in the communication session.

In some embodiments, in response to obtaining the information corresponding to the request to display the respective media content at the respective location for media content in the first three-dimensional environment, the set of one or more criteria is met (e.g., the computer system displays, via the display generation component, the respective media content at the respective location for media content in the first three-dimensional environment), and in a view of the communication session from the perspective of the first user, that includes the first three-dimensional environment, the viewpoint of the first user has the first pose in the first three-dimensional environment (e.g., position and/or orientation) relative to a location of the respective media content in the first three-dimensional environment, such as the pose of participant 2406*a* relative to shared media content 2610*a* in FIG. 24C.

In some embodiments, the representation of the respective participant (e.g., avatar and/or another type of virtual object) has a second pose in the first three-dimensional environment (e.g., an apparent viewpoint of the respective participant) relative to the location of the respective media content in the first three-dimensional environment that is different from the first pose in the first three-dimensional environment, such as the pose of representation 2406*b*' of participant 2406*b* relative to shared media content 2610*a* in three-dimensional environment 2404*a* in FIG. 24C.

In some embodiments, in a view of the communication session from the perspective of the respective participant, that includes the second three-dimensional environment, the viewpoint of the respective participant has the first pose in the second three-dimensional environment (e.g., position and/or orientation) relative to the location of the respective media content in the second three-dimensional environment—such as the pose of participant 2406*b* relative to shared media content 2610*b* in three-dimensional environment 2404*b* in FIG. 24C, wherein the first pose in the second three-dimensional environment (e.g., relative to the location of the respective media content in the second three-dimensional environment) is different from the second pose in the first three-dimensional environment (e.g., relative to the location of the respective media content in the first three-dimensional environment (and is, optionally, the same as the first pose in the first three-dimensional environment), such as described above). In response to obtaining the information, the computer system optionally displays the poses of the representations of participants relative to the respective media content different from (e.g., not aligned with) the poses of the participants relative to the respective media content in the contexts of the environments simulated for the one or more participants, such as described above. In response to obtaining the information, the computer system optionally initiates a process to shift the viewpoint of the first user and/or initiates a process to shift the viewpoint of the respective participant (or of all viewpoints of all participants of the communication session) such that the first user and the respective participant (and/or the other participants of the communication session) can view the respective media content at an ideal viewing angle when the respective media content is displayed at the respective location for media content, independent of the viewpoint of the user and/or of the viewpoint of the respective participant (or of the other viewpoints of participants of the communication session) when the information was detected. Transitioning poses (e.g., locations, orientations, and/or directions) of the one or more representations of participants of the communication session relative to the respective media content in response to detecting the information corresponding to the request to display the respective media content at the respective location for media permits consistency of interaction with the respective media content and with the other participants when the respective media content moves to the respective location for media content in the first three-dimensional environment, which reduces errors in interaction with the computer system.

In some embodiments, in response to obtaining the information corresponding to the request to display the respective media content at the respective location for media content in the first three-dimensional environment, the first computer system reduces a visual prominence (e.g., fading out, ceasing display, increasing a respective translucency, increasing a transparency, decreasing a color saturation, and/or decreasing a brightness) of the first three-dimensional environment including reducing a visual prominence of the representation of the respective participant (e.g., avatar and/or another type of virtual object), wherein while reducing the visual prominence of the first three-dimensional environment, in the view of the communication session from the perspective of the first user (that, optionally includes the first three-dimensional environment), the viewpoint of the first user has a third pose (that, optionally is the same as or different from the first pose) in the first three-dimensional environment (e.g., position and/or orientation) relative to the location of the respective media content in the first three-dimensional environment, such as computer system 101*a* reducing visual prominence of shared virtual environment 2403*a* from FIG. 24A to FIG. 24B. The location of the respective media content in the first three-dimensional environment is optionally different from the respective location for media content in the first three-dimensional environment.

In some embodiments, the representation of the respective participant (e.g., avatar and/or another type of virtual object) has a fourth pose in the first three-dimensional environment (e.g., an apparent viewpoint of the respective participant) relative to the location of the respective media content in the first three-dimensional environment, such as the pose of representation 2406*b*' of participant 2406*b* in FIG. 24A. For example, if participant 2406*a* were to face representation 2406*b*', display generation component 120*a* would optionally show the pose of representation 2406*b*' in FIG. 24A. In some embodiments, in the view of the communication session from the perspective of the respective participant, that includes the second three-dimensional environment, the viewpoint of the respective participant has the fourth pose in the second three-dimensional environment (e.g., position and/or orientation) relative to the location of the respective media content in the second three-dimensional environment, wherein the fourth pose in the second three-dimensional environment and the fourth pose in the first three-dimensional environment are the same pose (e.g., position and/or orientation) relative to the respective location for media content. For example, the pose of representation 2406*b*' and of participant 2406*b* are the same pose in FIG. 24A. For example, if participant 2406*a* were to face representation 2406*b*', display generation component 120*a* would optionally show the pose of representation 2406*b*' in FIG. 24A, which is optionally the same pose as the pose of participant 2406 in FIG. 24A.

In some embodiments, after reducing the visual prominence of the first three-dimensional environment including reducing the visual prominence of the representation of the respective participant (e.g., avatar and/or another type of virtual object) that has the fourth pose in the first three-dimensional environment, the first computer system increases the visual prominence (e.g., fading-in, displaying, decreasing a respective translucency, decreasing a transparency, increasing a color saturation, and/or increasing a brightness) of the first three-dimensional environment, including increasing a visual prominence of the representation of the respective participant, wherein while increasing the visual prominence of the first three-dimensional environment, including increasing the visual prominence of the representation of the respective participant, the set of one or more criteria is met (e.g., the computer system displays, via the display generation component, the respective media content at the respective location for media content in the first three-dimensional environment), such as shown in FIG. 24C with representation 2406*b*' of participant 2406*b* relative to shared media content 2610*a* in three-dimensional environment 2404*a* in FIG. 24C.

In some embodiments, in a view of the communication session from the perspective of the first user, (e.g., that includes the first three-dimensional environment), the viewpoint of the first user has the first pose in the first three-dimensional environment (e.g., position and/or orientation) relative to a location of the respective media content in the first three-dimensional environment, such as the pose of participant 2406*a* relative to shared media content 2610*a* in FIG. 24C, and the representation of the respective participant (e.g., avatar and/or another type of virtual object) has a second pose in the first three-dimensional environment (e.g., an apparent viewpoint of the respective participant) relative to the location of the respective media content in the first three-dimensional environment that is different from the first pose in the first three-dimensional environment, such as the pose of representation 2406*b*' of participant 2406*b* relative to shared media content 2610*a* in three-dimensional environment 2404*a* in FIG. 24C.

In some embodiments, in a view of the communication session from the perspective of the respective participant, that includes the second three-dimensional environment, the viewpoint of the respective participant has the first pose in the second three-dimensional environment (e.g., position and/or orientation) relative to the location of the respective media content in the second three-dimensional environment, such as the pose of participant 2406*b* relative to shared media content 2610*b* in three-dimensional environment 2404*b* in FIG. 24C, wherein the first pose in the second three-dimensional environment (e.g., relative to the location of the respective media content in the second three-dimensional environment) is different from the second pose in the first three-dimensional environment (e.g., relative to the location of the respective media content in the first three-dimensional environment (and is optionally, the same as the first pose in the first three-dimensional environment), such as described above). For example, the first computer system optionally visually fades-out (partially or completely) the first three-dimensional environment including fading-out the poses of the representations of participants in the first three-dimensional environment, and then visually fades-in the first three-dimensional environment, including fading-in the first three-dimensional environment with a different viewpoint of the user, such that the first computer system displays the respective media content at the respective location for media content in the first three-dimensional environment, and fading-in the representation of the respective participant with the first pose. In some embodiments, the representation of the respective participant that the first computer system fades-out has different visual characteristics than the representation of the respective participant that the first computer system fades-in, such as the representation of the respective participant being of the first one or more representations, discussed below with reference to method 2700, when the first computer system reduces the visual prominence of the first three-dimensional environment including the representation of the respective participant, and then the representation of the respective participant being of the second one or more representations, discussed below with reference to method 2700, when the first computer system increases the visual prominence of the three-dimensional environment including the representation of the respective participant. As such, in response to obtaining the information, the computer system optionally shifts the viewpoint of the user without user input specifically for shifting the viewpoint of the user. The operations performed in response to obtaining the information corresponding to the request to display the respective media content at the respective location for media content in the first three-dimensional environment are optionally similar to the operations performed with reference to receiving the first user input corresponding to a request to display respective media content in the three-dimensional environment in an expanded display mode in which the respective media content takes up a larger portion of a field of view of a user than when the respective media content is displayed in a compact display mode discussed with reference to method 1200. Fading a portion or all of the three-dimensional environment that was visible when the corresponding to the request to display the respective media content at the respective location for media content in the first three-dimensional environment was received, and then fading-in a different portion of the three-dimensional environment that includes the respective media content being displayed at the respective location for media content in the three-dimensional environment permits the computer system to shift the viewpoint of the user (and the location of the representation of the respective participant) without user input specifically for shifting the viewpoint of the user, which may reduce errors in user interaction with the computer system.

It should be understood that the particular order in which the operations in method 2500 have been described is merely exemplary and is not intended to indicate that the described order is the only order in which the operations could be performed. One of ordinary skill in the art would recognize various ways to reorder the operations described herein.

FIGS. 26A-26G illustrate examples of computer systems that, while in a communication session that includes media content, presents representations of other participants differently based on one or more parameters of the media content, as will be described below.

Figure 26A:
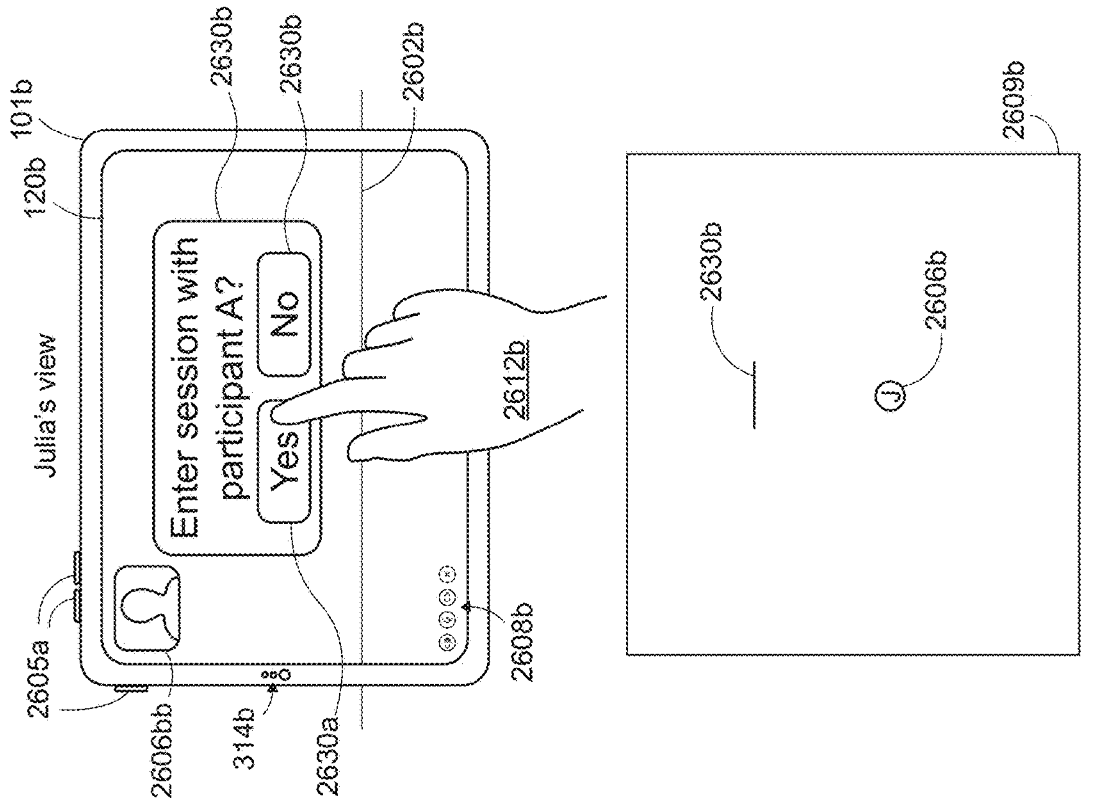
FIGS. 26A-26G illustrate examples of a computer system presenting representations of participants of a real-time communication session based on parameters associated with shared content in accordance with some embodiments.
Figure 26B:
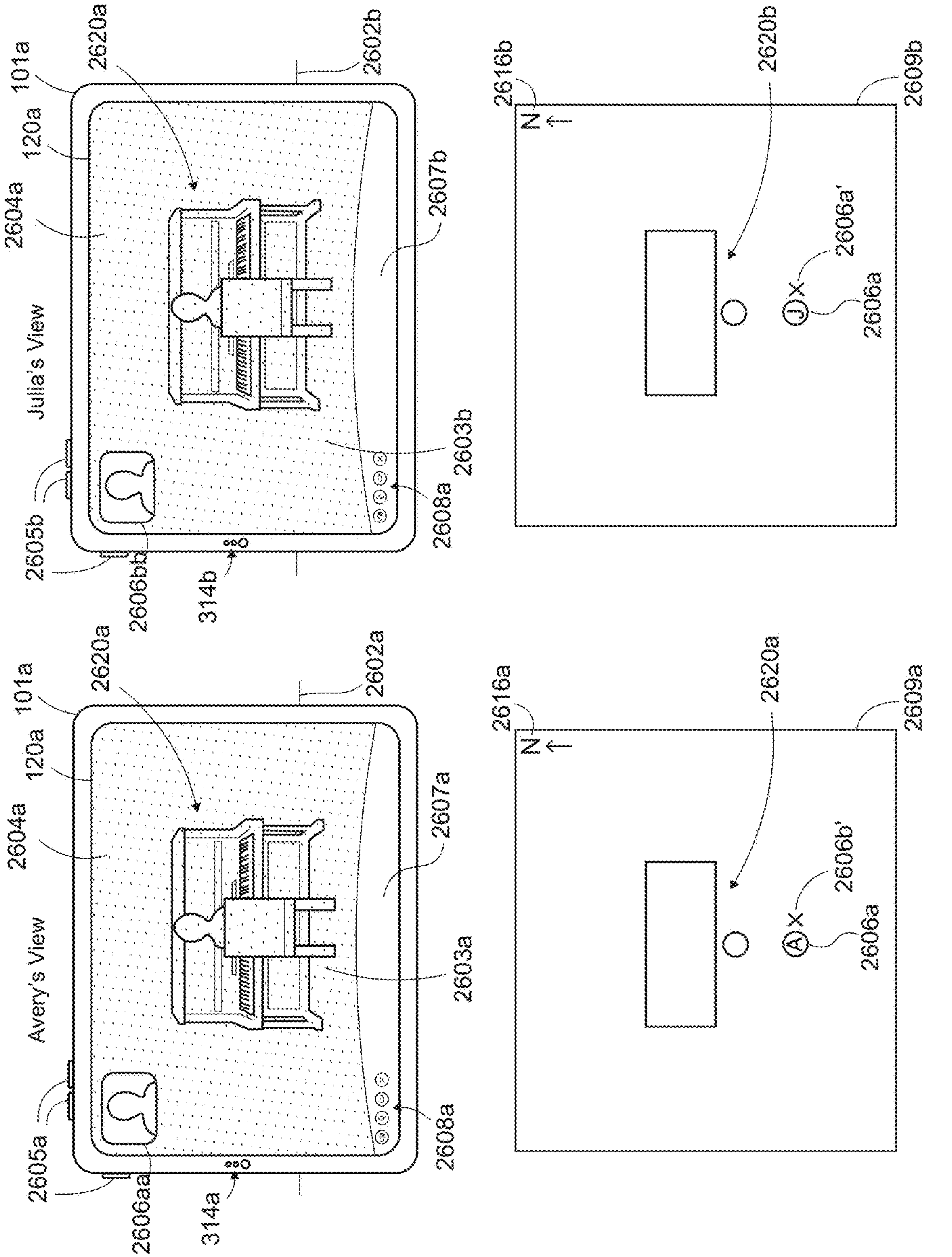

FIG. 26A illustrates computer system 101*b* (e.g., Julia's computer system) detecting a request to enter a communication session with a participant. FIG. 26B illustrates computer systems 101*a/b* (e.g., Avery's computer system and Julia's computer system, respectively) in a communication session. FIGS. 26C-26G illustrate computer systems 101*a*-101*c* (e.g., Avery's computer system, Julia's computer system, and Erol's computer system) involved in a communication session that includes three participants—Avery, Julia, and Erol. Computer system 101*a-c* and the communication session(s) described with reference to FIGS. 26A-26G (e.g., processes for docking content, participants, shared media content, and poses relative to shared media content) optionally includes similar features as computer systems 101*a-c* and the communication session(s) with reference to FIGS. 24A-24F1 and method 2500.

Throughout FIGS. 26A-26G, computer system 101*a* (e.g., of FIGS. 26B-26G), computer system 101*b* (e.g., of FIGS. 26A-26G), and computer system 101*c* (e.g., of FIGS. 26C-26G) include, respectively, display generation components 120*a*-120*c*, image sensors 314*a*-314*c*, and physical buttons 2605*a-c*. The computer system 101*a-c*, display generation components 120*a*-120*c*, and image sensors 314*a*-314*c* are each optionally as described with reference to computer system 101, display generation component 120, and image sensors 314 of any one or more or all of FIGS. 1-6. The image sensors 314*a*-314*c* optionally include one or more of a visible light camera, an infrared camera, a depth sensor, or any other sensor computer systems 101*a-c* would be able to use to capture one or more images of a user or a part of the user (e.g., one or more hands of the user) while the user interacts with the computer system 101*a-c*. In some embodiments, the user interfaces illustrated and described below could also be implemented on a head-mounted display that includes a display generation component that displays the user interface and/or three-dimensional environment to the user, and sensors to detect the physical environment and/or movements of the user's hands (e.g., external sensors facing outwards from the user), and/or gaze of the user (e.g., internal sensors facing inwards towards the face of the user). Computer systems 101*a-c* each optionally captures one or more images of their corresponding physical environments 2602*a-c* around computer systems 101*a-c* (e.g., operating environments 100), including one or more objects in the physical environments 2402*a-c* around computer system 101*a-c*. In some embodiments, computer systems 101*a-c* display representations of their respective physical environment 2602*a-c* in the respective three-dimensional environment 2604*a-c* and/or the respective physical environment 2602*a-c* is visible in the three-dimensional environment 2604*a-c* via the respective display generation components 120*a-c*. Throughout FIGS. 26A-26G, three-dimensional environments 2604*a-c* include, respectively, passthrough portions 2607*a-c* (e.g., in which optical passthrough is visible or in which virtual passthrough content is displayed) in which a portion of physical environments 2602*a-c*, respectively, is visible via the respective display generation components 120*a-c*. portions 2607*a-c* are optionally not part of the communication session (e.g., are not shared). As such, computer system 101*a* presents three-dimensional environment 2604*a*, optionally including a shared virtual environment 2604*a* and shared media content, and a non-shared portion, computer system 101*b* presents three-dimensional environment 2604*b*, optionally including a shared virtual environment 2604*b* (and optionally) shared media content, and a non-shared portion, and computer system 101*c* presents three-dimensional environment 2604*c*, optionally including a shared virtual environment 2604*c* (and optionally) shared media content, and a non-shared portion. Thus, three-dimensional environments 2604*a-c* are not necessarily the same three-dimensional environment.

Also, throughout FIGS. 26A-26G, computer system 101*a* (e.g., of FIGS. 26B-26G), computer system 101*b* (e.g., of FIGS. 26A-26G), and computer system 101*c* (e.g., of FIGS. 26C-26G) display, respectively, a respective representation of the respective user of the respective computer system 101*a-c* (e.g., computer system 101*a*, in display generation component 120*a*, displays representation 2606*aa* of participant 2606*a*, computer system 101*b*, in display generation component 120*b*, displays representation 2606*bb* of participant 2606*b*, and computer system 101*c* displays representation 2606*cc* of participant 2606*c*). It should be noted that representations 2606*aa-cc* are optionally not displayed and the systems and processes disclosed herein optionally operate without displaying representations 2606*aa-cc*. In some embodiments, computer system 101*a-c*, respectively, forgoes displaying representation 2606*aa* of participant 2606*a*, representation 2606*bb* of participant 2606*b*, and representation 2606*cc* of participant 2606*c*, respectively. Further, throughout FIGS. 26A-26G, computer system 101*a* (e.g., of FIGS. 26B-26G), computer system 101*b* (e.g., of FIGS. 26A-26G), and computer system 101*c* (e.g., of FIGS. 26C-26G) display, respectively, virtual buttons 2608*a-c* that optionally are configured to control aspects of the communication session and/or of the computer systems 101*a-c*, respectively. It should be noted that virtual buttons 2608*a-c* are optionally not displayed and the systems and processes disclosed herein optionally operate without displaying virtual buttons 2608*a-c*.

Also, throughout FIGS. 26A-26G, overhead views 2609*a-c* (e.g. overhead view 2609*a* of FIG. 26B, overhead view 2609*b* of FIG. 26A, and overhead view 2609*c* of FIG. 26C), respectively, provide simplified top-down views of three-dimensional environments 2604*a-c*, respectively, corresponding to participant 2606*a-c* respectively, in the illustrated figure (e.g., overhead view 2609*a* of FIG. 26B provides a top-down view of three-dimensional environment 2604*a* of participant 2606*a* of FIG. 26B, overhead view 2609*b* of FIG. 26A provides a top-down view of three-dimensional environment 2604*b* of participant 2606*b* of FIG. 26A, and overhead view 2609*c* provides a top-down view of three-dimensional environment 2604*c* of participant 2606*c*). Circles 2614*a-c* (e.g., of FIGS. 26A and 26C-26G) are optionally as described with reference to circles 2614*a-c* of FIGS. 24A-24C, respectively.

In FIG. 26A, computer system 101*b* displays a user interface 2630*b* for accepting (e.g., via selection of user interface element 2630*a*) or denying (e.g., via selection of user interface element 2630*b*) a request for participant 2606*b* to enter a communication session that includes participant A (e.g., participant 2606*a* of FIG. 26B). In FIG. 26A, computer system 101*b* detects input from hand 2612*b* of participant 2606*b* (e.g., an air pinch gesture as described herein) corresponding to a request to enter the communication session.

FIG. 26A1 illustrates similar and/or the same concepts as those shown in FIG. 26A (with many of the same reference numbers). It is understood that unless indicated below, elements shown in FIG. 26A1 that have the same reference numbers as elements shown in FIGS. 26A-26G have one or more or all of the same characteristics. FIG. 26A1 includes computer system 101*b*, which includes (or is the same as) display generation component 120*b*. In some embodiments, computer system 101*b* and display generation component 120*b* have one or more of the characteristics of computer system 101 shown in FIGS. 26A-26G and display generation component 120 shown in FIGS. 1 and 3, respectively, and in some embodiments, computer system 101 and display generation component 120 shown in FIGS. 26A-26G have one or more of the characteristics of computer system 101*b* and display generation component 120*b* shown in FIG. 26A1.

In FIG. 26A1, display generation component 120*b* includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120*b* to enable eye tracking of the user's left and right eyes. Display generation component 120*b* also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 26A-26G.

In FIG. 26A1, display generation component 120*b* is illustrated as displaying content that optionally corresponds to the content that is described as being displayed and/or visible via display generation component 120 with reference to FIGS. 26A-26G. In some embodiments, the content is displayed by a single display (e.g., display 510 of FIG. 5) included in display generation component 120*b*. In some embodiments, display generation component 120*b* includes two or more displays (e.g., left and right display panels for the left and right eyes of the user, respectively, as described with reference to FIG. 5) having displayed outputs that are merged (e.g., by the user's brain) to create the view of the content shown in FIG. 26A1.

Display generation component 120*b* has a field of view (e.g., a field of view captured by external image sensors 314*b* and 314*c* and/or visible to the user via display generation component 120*b*) that corresponds to the content shown in FIG. 26A1. Because display generation component 120*b* is optionally a head-mounted device, the field of view of display generation component 120*b* is optionally the same as or similar to the field of view of the user.

In FIG. 26A1, the user is depicted as performing an air pinch gesture (e.g., with hand 2612*b* while attention of the user is directed to option 2630*a*, as indicated by gaze point 2698) to provide an input to computer system 101*b* to provide a user input directed to content displayed by computer system 101*b*. Such depiction is intended to be exemplary rather than limiting; the user optionally provides user inputs using different air gestures and/or using other forms of input as described with reference to FIGS. 26A-26G.

In some embodiments, computer system 101*b* responds to user inputs as described with reference to FIGS. 26A-26G.

In the example of FIG. 26A1, because the user's hand is within the field of view of display generation component 120*b*, it is visible within the three-dimensional environment. That is, the user can optionally see, in the three-dimensional environment, any portion of their own body that is within the field of view of display generation component 120*b*. It is understood than one or more or all aspects of the present disclosure as shown in, or described with reference to FIGS. 26A-26G and/or described with reference to the corresponding method(s) are optionally implemented on computer system 101*b* and display generation unit 120*b* in a manner similar or analogous to that shown in FIG. 26A1.

FIG. 26B illustrates an example of representations of other participants that are presented in response to the detection of the input of FIG. 26A corresponding to the request to enter the communication session when the communication session includes immersive media content.

In FIG. 26B, computer systems 101a/b display shared immersive media content 2620a/b (e.g., three-dimensional content that surrounds the respective user of the respective computer system 101a/b in a view of the three-dimensional environment and/or three-dimensional content for which the respective computer system 101a/b simulates depth effect(s) optionally relative to a viewpoint(s) of the user, such that the user visually experiences the three-dimensional content as three-dimensional content as described further with reference to methods 2500/2700). In FIG. 26B, immersive media content 2620a/b includes a piano concert scene. In some examples, computer system 101a of participant 2606a is displaying immersive media content 2620a before computer system 101b displays immersive media content 2620b, and participant 2606a requests that participant 2606b join the communication session. In response to detecting and accepting the request (e.g., such as described below with reference to method 2700) from participant 2606a, computer system 101b optionally enters the communication session with participant 2606a and displays the shared immersive media content 2620b in three-dimensional environment 2604a, as shown in FIG. 26B.

In FIG. 26B, participants 2606a/b share the same view of the shared immersive media content 2620a/b. As such, the poses of participants 2606a/b, relative to the shared immersive media content 2620a/b, are the same (e.g., the locations of participants 2606a/b relative to immersive media content 2620a/b are the same, respectively). In some embodiments, the poses of the participants are the same because the communication session meets the one or more criteria described with reference to method 2500 (e.g., the communication session includes immersive media content).

In FIG. 26B, computer system 101a/b present a respective audio representation (e.g., audio-only representation) of the other respective participant of the communication session, without displaying a representation of the other participant. For example, in FIG. 26D, in overhead view 2609a, representation 2606b' of participant 2606b is an audio representation corresponding to real time audio from participant 2606b, and in overhead view 2609b, representation 2606a' of participant 2606a is an audio representation corresponding to real time audio from participant 2606a. Spatially, the audio representations of the other participants are optionally presented as if the other participant were on a side (e.g., a left side or a right side) of the participant or as if the other participant were at the same location at the participant (or on top of the participant). Further details regarding the audio representations are described with reference to methods 2500/2700.

Figure 26C:
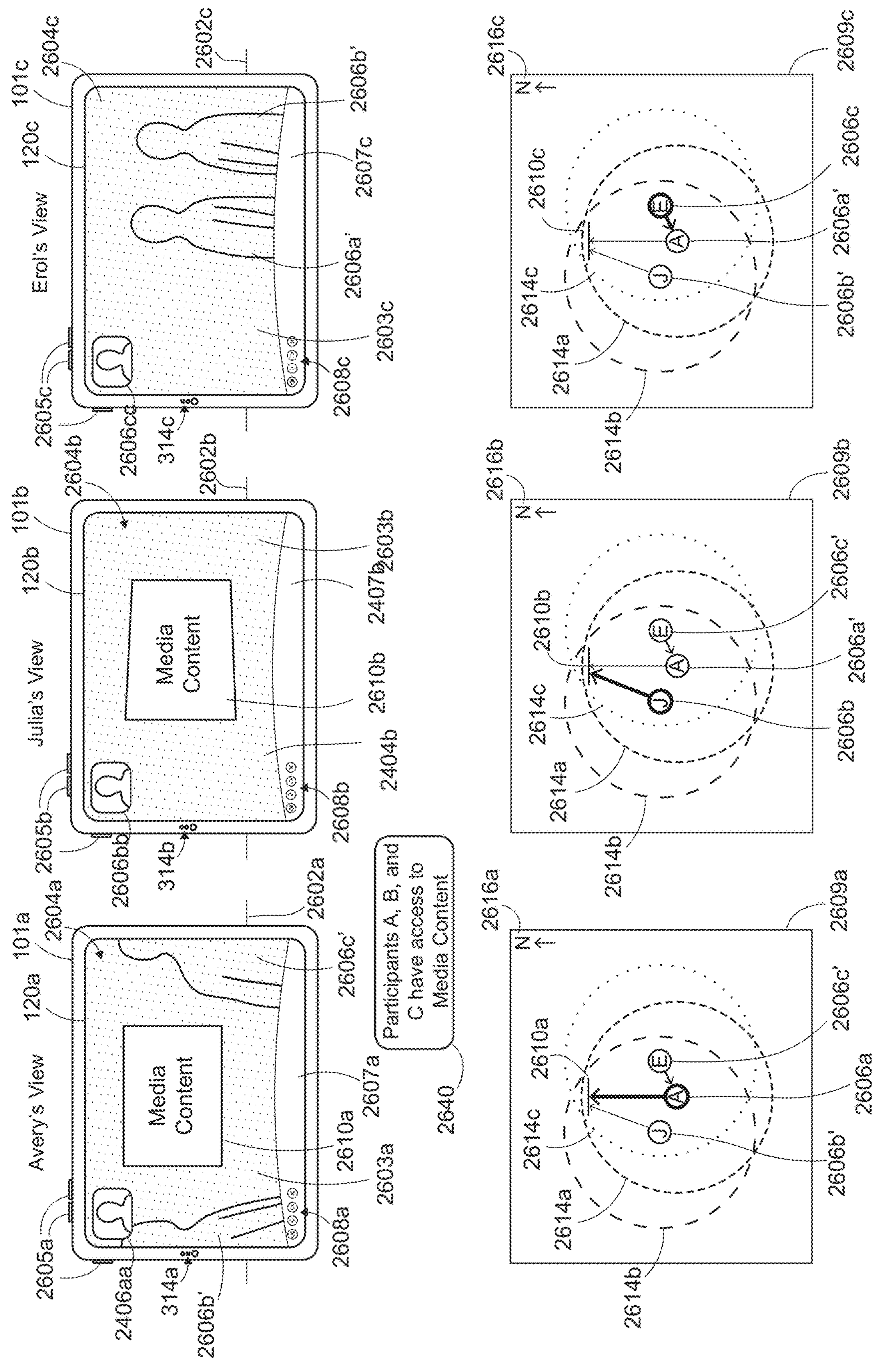

FIG. 26C illustrates an example of representations of other participants that are presented in response to the detection of the input of FIG. 26A corresponding to the request to enter the communication session when the communication session includes media content (e.g., non-immersive media content) that is not docked (e.g., media content that is not displayed at the respective location for media content in a three-dimensional environment (e.g., in a virtual environment), such as described with reference to method 2700).

In FIG. 26C, the communication session includes three participants, Avery (e.g., participant 2606a through computer system 101a), Julia (e.g., participant 2606b through computer system 101b, and Erol (e.g., participant 2606c through computer system 101c), all of which have access to shared media content 2610a-c, as shown by glyph 2640). As shown in FIG. 26C, participants 2606a-c are represented spatially in the three-dimensional environments of other participants. For example, in FIG. 26C in display generation component 120a, computer system 101a displays a representation 2606b' of participant 2606b that includes a head, neck, torso, shoulder, and arm, and a representation 2606c' of participant 2606c that includes a head, neck, torso, shoulder, and arm. Also, in FIG. 26C, in display generation component 120c, computer system 101c displays a representation 2606b' of participant 2606b that includes a head, neck, torso, shoulder, and arm and a representation 2606c' of participant 2606c that includes a head, neck, torso, shoulder, and arm. These representations have poses (e.g., positions and orientations) that are based on the poses of respective participant associated with the representation. For example, as shown in overhead views 2609a-c, representation 2606b' has the same pose relative to media content 2610a/c that participant 2606b has relative to media content 2610b, representation 2606a' has the same pose relative to media content 2610b/c that participant 2606a has relative to media content 2610a, and representation 2606c' has the same pose relative to media content 2610a/b that participant 2606c has relative to media content 2610c. Also, in overhead view 2609a-c, the arrows associated with the participants optionally show a forward facing direction of the participants/representations. For example, in overhead views 2609a-c in FIG. 26C, the poses of participants 2606a/b and their representations (e.g., representations 2606a'/b' face media content 2610a/b, while the pose of participant 2606c and representation 2606c' face participant 2606a and representation 2606a', respectively. Also, as shown in overhead view 2609a, representation 2606c' faces the location of participant 2606a in three-dimensional environment 2603a while representation 2606b' faces media content 2610a.

Figure 26D:
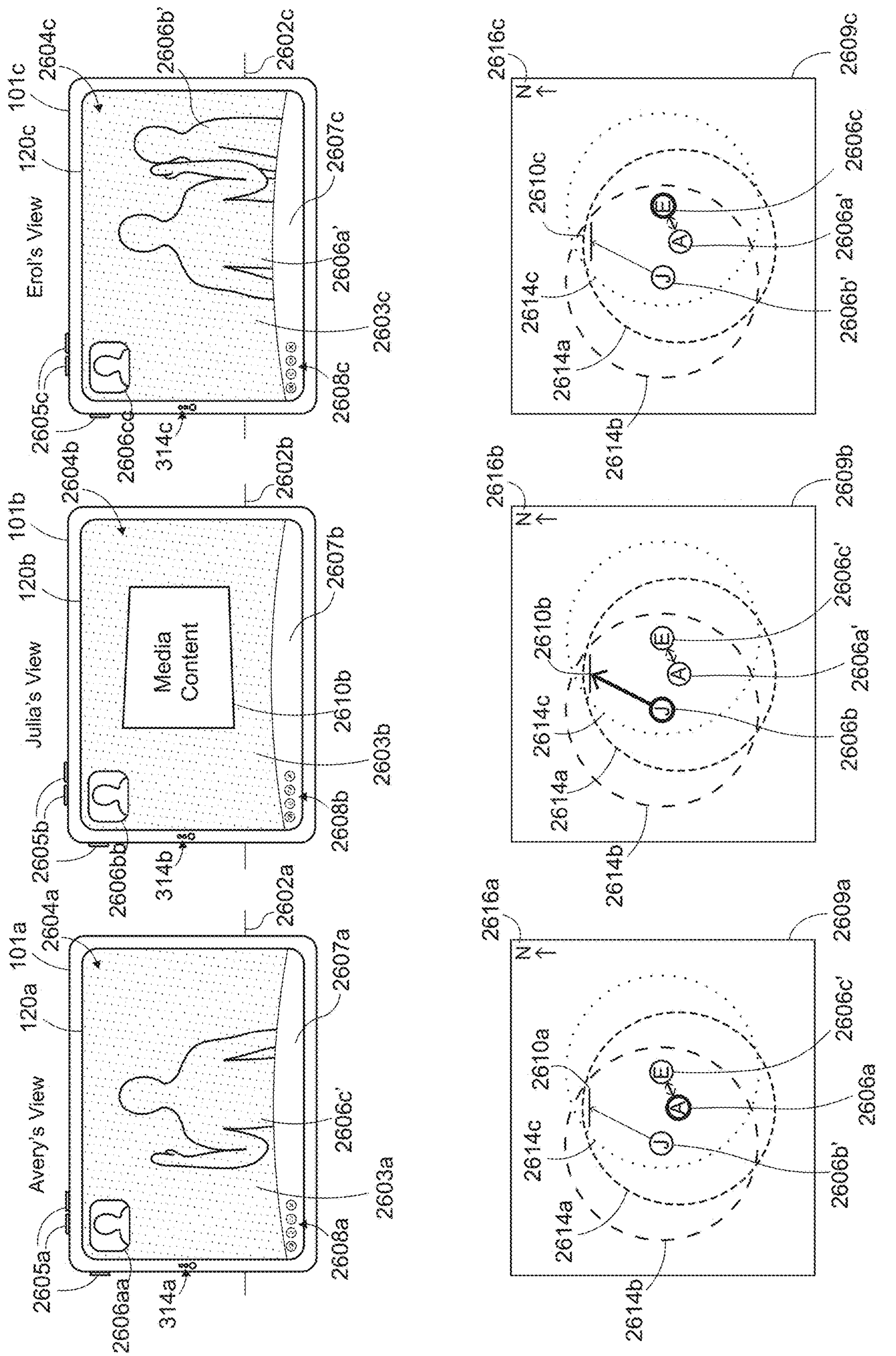

FIGS. 26C to 26D illustrate movement of representations of other participants. For example, from FIGS. 26C-26D, participant 2606a has performed an event (e.g., a head and/or body rotation) that shifts his/her viewpoint toward representation 2606c' in three-dimensional environment 2603a. This event likewise updates the pose of representation 2606a' in three-dimensional environment 2603c of participant 2606c, who was already facing representation 2606a as shown in overhead views 2609a-c and display generation component 120c of FIG. 26C. In addition, in FIG. 26D, participants 2606a/c have performed an event (e.g., an air gesture, or a hand gesture) that corresponds to waving, and their corresponding representations are displayed in the other participant's view of the communication session as performing the gesture (e.g., the waving) as shown by display generation components 120a/b.

Figure 26E:
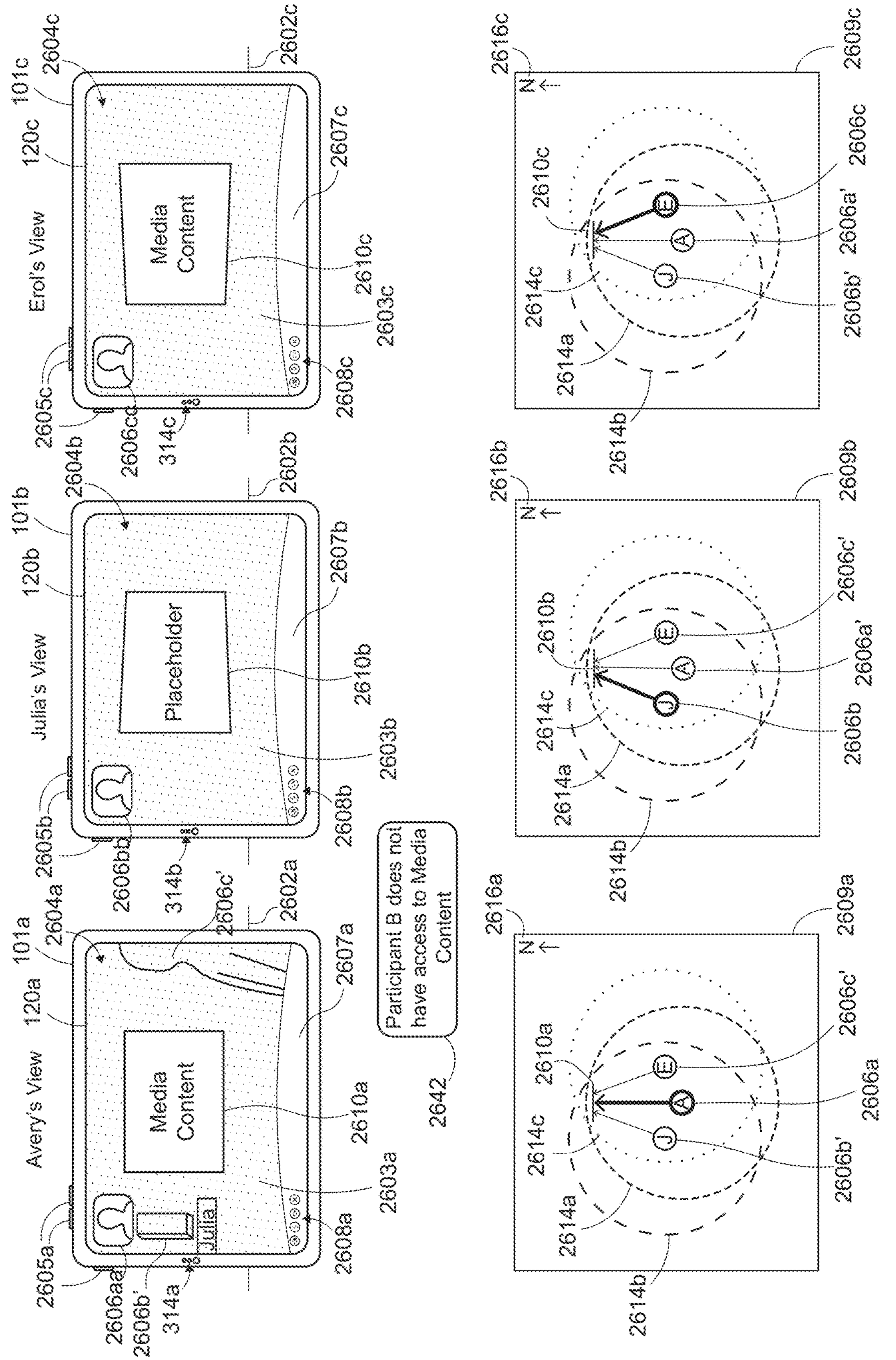

FIG. 26E illustrates an example of representations of other participants that are presented in response to the detection of the input of FIG. 26A corresponding to the request to enter the communication session when the communication session includes media content (e.g., non-immersive media content) that is not docked and that participant 2606b does not have access to view, as shown by glyph 2642.

In FIG. 26E, computer system 101a displays representation 2606c' (e.g., a more detailed representation) of participant 2606c that is similar in amount of detail as representation 2606c' of participant 2606c in FIG. 26C and displays representation 2606b' of participant 2606b that is less detailed than representation 2606b' of participant 2606b in FIG. 26C. In FIG. 26E, computer system 101b optionally displays representation 2606b' of participant 2606b that is less detailed than representation 2606b' of participant 2606b in FIG. 26C because in FIG. 26E, participant 2606*b* does not have access to view shared media content 2610*b*. In FIG. 26E, computer system 101*b* optionally displays representation 2606*c*' (e.g., a more detailed representation) of participant 2606*c* that is similar in amount of detail as representation 2606*c*' of participant 2606*c* in FIG. 26C because in FIG. 26E, participant 2606*c* has access to view shared media content 2610*c*. In FIG. 26E, representation 2606*b*' includes a shape that indicates a location of the participant relative to shared virtual environment 2603*a* and includes a monogram that includes the participant's name. The orientation of the shape of representation 2606*b*' also indicates a pose of the participant 2606*b* in shared virtual environment 2603*b*. For example, in FIG. 26E, as shown in overhead view 2609*b*, participant 2606*b* faces media content 2610*b*, and corresponding, representation 2606*b*' in shared virtual environment 2603*a* faces media content 2610*a*. Representations 2606*a*'-2606*c*', including the more detailed representations and less detailed representations of participants, are described further with reference to method 2700.

In FIG. 26E, since participant 2606*b* does not have access to view the shared media content of the communication session, computer system 101*b* displays, via display generation component 120*b*, placeholder content 2610*b* (e.g., a sign-in user interface for authenticating a subscription to the streaming service that provides shared media content 2610*a*/*c*) at a location in shared virtual environment 2603*a* that corresponds to the location of the shared media content 2610*a*/*c* of the communication in the other participants view of the communication session that have access to the shared media content 2610*a*/*c*. In FIG. 26E, placeholder content 2610*b* is optionally a geometric shape and/or size of the shared media content 2610*a*/*c* (e.g., is or includes an outline, border, or silhouette of shared media content 2610*a*/*c*).

Figure 26F:
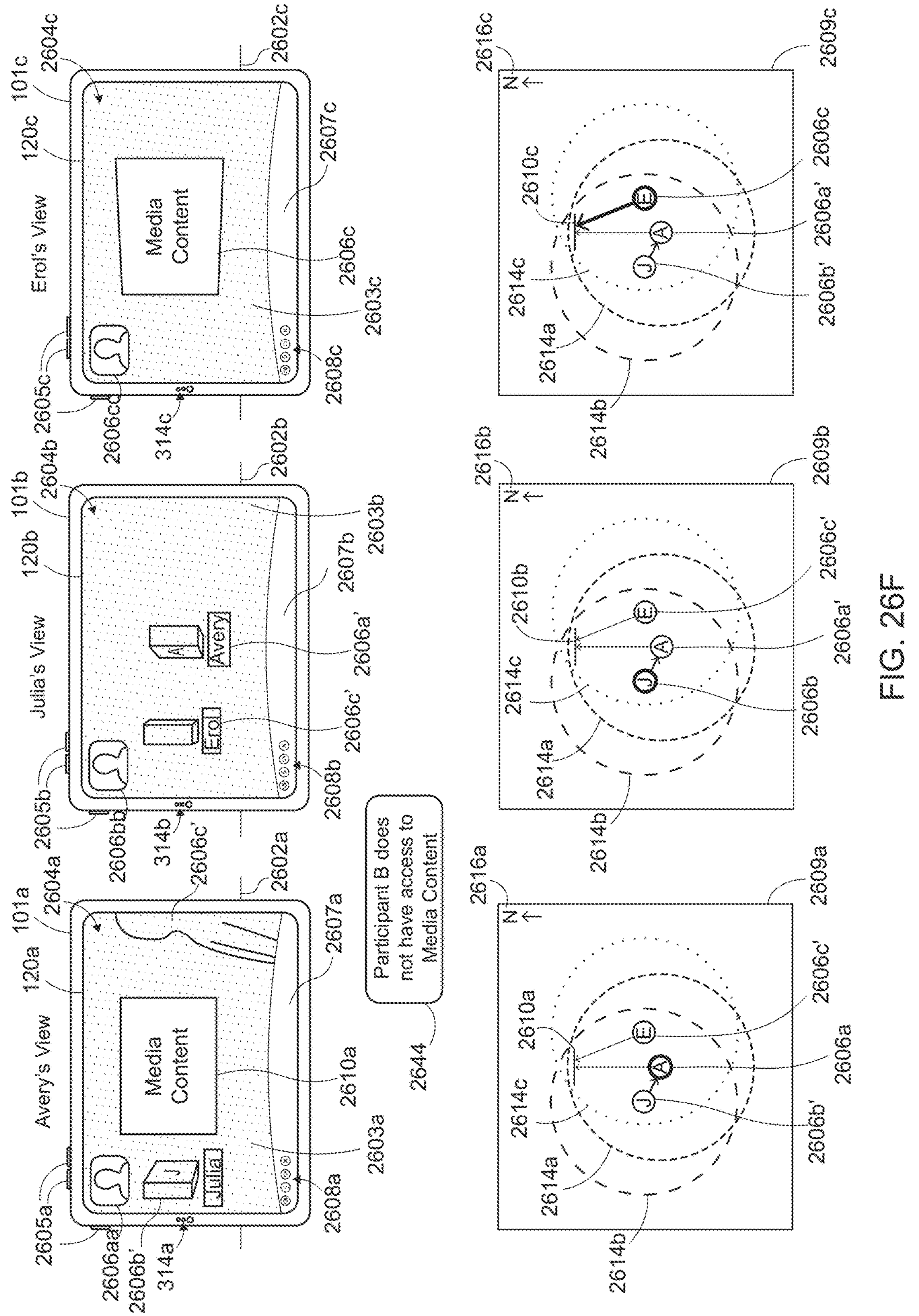

From FIG. 26E to FIG. 26F, participant 2606*b* has performed an event (e.g., a head rotation) that causes display generation component 120*b* to display representations 2606*a*'/c', which is shown in FIG. 26F. Participant's 2606*b* performance of the event has caused the pose of representation 2606*b*' of participant 2606*b* to face participant 2606*a*, as shown in the rotation of representation 2606*b*' in display generation component 120*a* and overhead view 2609*a* from FIGS. 26E to 26F. In FIG. 26F, participant 2606*b* does not have access to the shared media content, and participants 2606*a*/*b* are facing each other shared virtual environment 2603*a*/*b* (e.g., participant 2606*a* is facing representation 2606*b*' in shared virtual environment 2603*a* and participant 2606*b* is facing representation 2606*a*' in shared virtual environment 2603*b*). Representation 2606*b*' of FIG. 26F is similar to representation 2606*b*' of FIG. 26E (e.g., is less detailed). Also, in FIG. 26F, though participant 2606*a* has access to shared media content 2610*a*, representation 2606*a*' of participant 2606*a* in shared virtual environment 2603*b* is less detailed, as shown in display generation component 120*b*. In FIG. 24F, display generation component 120*b* of participant 2606*b* shows less detailed representations 2606*a*'/c' optionally because display generation component 120*b* of participant 2606*a* shows a less detailed representation 2606*b*' of participant 2606*b*. As such, in some embodiments, while a less detailed representation of another participant is displayed to a participant, a less detailed representation of the participant is displayed to the other participant.

Figure 26G:
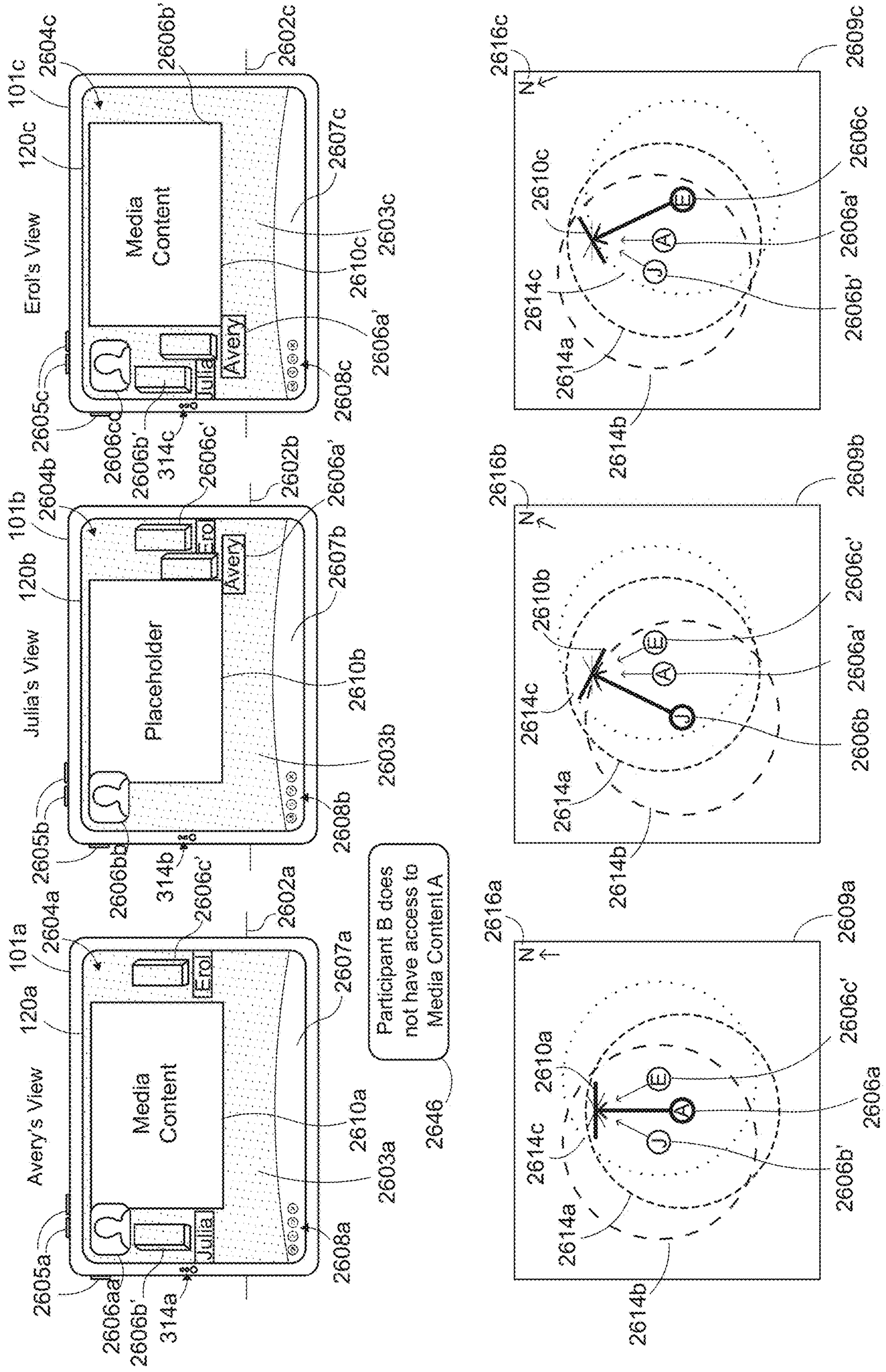

FIG. 26G illustrates an example of representations of other participants that are presented in response to the detection of the input of FIG. 26A corresponding to the request to enter the communication session when the communication session includes media content (e.g., non-immersive media content, such as described with reference to method 2700) that is docked (e.g., displayed in the respective location for media content as described with reference to method 2700 and that participant 2606*b* does not have access to view, as shown by glyph 2646. As shown in the display generation components 120*a*-*c*, computer systems 101*a*-*c* display representations of participants of the communication in a less detailed manner (e.g., less detailed compared to representations 2606*a*'-c' in FIG. 26C). In FIG. 26G, computer systems 101*a*/*b* optionally display representations 2606*a*/*c* with less detail because shared media content 2610*a* of the communication session is docked; computer system 101*b* optionally displays representations 2606*a*/*c* with less detail because shared media content 2610*a*/*c* of the communication session is docked and/or because placeholder content 2610*b* is docked, or because participant 2606*b* does not have access to view shared media content 2610*b*.

FIGS. 26A-26G are further described with reference to method 2700.

FIG. 27 is a flowchart for illustrating a method of presenting representations of participants of a real-time communication session based on parameters associated with shared content in accordance with some embodiments.

In some embodiments, the method 2700 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2700 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2700 are, optionally, combined and/or the order of some operations is, optionally, changed.

In some embodiments, method 2700 is performed at a computer system in communication with one or more input devices and a display generation component. The first computer system optionally has one or more characteristics of the computer system(s) described with reference to method(s) 800-2500. The one or more input devices optionally have one or more characteristics of the one or more input devices described with reference to method(s) 800-2500. The display generation component optionally has one or more characteristics of the display generations component(s) described with reference to method(s) 800-2500.

In some embodiments, the computer system receives (2702*a*), via the one or more input devices, a first input corresponding to a request for a user of the computer system to join a communication session that includes first shared content accessible to one or more participants (e.g., other participants) in the communication session other than the user of the computer system, such as input from hand 2612*b* in FIGS. 26A and 26A1. For example, the first input optionally includes a tap or hand air gesture such as air pointing or air pinching at an icon, a UI element, or other selectable option displayed by the display generation component to request to join the communication session. The first input optionally includes an input using an interface controller in an augmented reality or virtual reality environment to provide input to select an icon or other selectable option to request to join the communication session. In some embodiments, the first input is an attention-only and/or gaze-only input (e.g., not including input from one or more portions of the user other than those portions providing the attention input). In some embodiments, the computer system is not participating in a communication session with another user or computer system when the first input is received. In some embodiments, the computer system is participating in a communication session with one or more other users or computer systems when the first input is received). In some embodiments, the communication session has one or more characteristics of the communication sessions discussed throughout this disclosure, such as the communication sessions described with reference to method(s) 1200-1800, 2300, and/or 2500. In some embodiments, the first shared content is audio, photo, video (e.g., a movie), and/or spatial content. In some embodiments, the first shared content is a user interface of an application such as a messaging application, an Internet application, an audio and/or video content playback application, an application that requires a subscription to view content, and/or an application that does not require a subscription to view content. In some embodiments, the first shared content accessible to the first one or more users includes content that the first one or more users are entitled to watch and/or hear, such as content that the one or more users are subscribed to, and/or content for which the one or more first users meet an age requirement, a location requirement, a system requirement, or another type of requirement. In some embodiments, the first shared content accessible to the first one or more users includes content that is being viewed and/or heard by the first one or more users without visual and/or audio obscuring of the content. In some embodiments, the first shared content accessible to the first one or more users includes content that is not currently being viewed and/or heard by the first one or more users, though the one or more first users are entitled to view or hear the content. The first one or more users are optionally each associated with a different computer system, and different computer systems are optionally presenting (displaying or otherwise presenting) the shared content concurrently during the communication session. For example, a first user of the first one or more users is optionally in the communication session via a first computer system, a second user of the first one or more users is optionally in the communication session via a second computer system different from the first computer system, and a third user of the first one or more users is optionally in the communication session via a third computer system different from the first computer system and different from the second computer system.

In some embodiments, in response to receiving the first input, the computer system joins (2702*b*) the communication session, including, in accordance with a determination that a first set of one or more criteria is met wherein the first set of one or more criteria include a requirement that a first parameter of the first shared content has a first value in order for the first set of one or more criteria to be met, displaying, in a three-dimensional environment and via the display generation component, first one or more representations (which, optionally include a first amount of visual detail, visual sophistication, complexity, and/or characteristics (e.g., parts, limbs, and/or objects)), of the one or more participants (e.g., other participants) in the communication session (2702*c*), such as representation 2606*c*' of participant 2606*c* in FIG. 26C. The first parameter optionally include a type of the first shared content and/or user entitlement to the first shared content, and the values optionally correspond to specific types of content and/or user entitlement to the content. The first parameter and values thereof are discussed in more detail below.

In some embodiments, in accordance with a determination that a second set of one or more criteria are met, wherein the one or more criteria include a requirement that the first parameter of the first shared content has a second value, different from the first value in order for the second set of one or more criteria to be met, the computer system displays in the three-dimensional environment and via the display generation component, second one or more representations (which, optionally include a second amount of visual detail, visual sophistication, complexity, and/or characteristics (e.g., parts, limbs, and/or objects) that is different from the first amount) of the one or more participants (e.g., other participants) in the communication session, such as representation 2606*c*' of participant 2606*c* in FIG. 26G, wherein the second one or more representations are different from the first one or more representations (2702*d*). As such, the computer system optionally displays the representations of users in the communication session differently based on specific parameters and/or values thereof associated with the shared content. In some embodiments, the first three-dimensional environment has one or more of the characteristics of the virtual environments and/or three-dimensional environments described in method(s) 800-2500. In some embodiments, the computer system displays the first one or more representations and/or the second one or more representations at locations corresponding to the first one or more users in the three-dimensional environment, such as described with reference to method 2500. In some embodiments, the computer system displays the first one or more representations and/or the second one or more representations, despite being different representations, at the same locations in the three-dimensional environment, such as described in method 2500. Displaying representations of users differently based on parameters of shared content visually indicates to the user of the computer system one or more characteristics of the shared content, thereby reducing errors in interaction between the user and the computer system and/or the shared content.

In some embodiments, the first value of the first parameter of the first shared content indicates that the first shared content includes an application window (e.g., is windowed content). For example, shared media content 2610*a* in FIG. 26C optionally includes an application window. In some embodiments, the application window surrounds the first shared content. In some embodiments, the computer system displays the first shared content in an application window that can be positioned (e.g., repositioned) to different locations within the three-dimensional environment in accordance with input from the user (e.g., attention of the user, attention-only input, and/or air gesture(s), such as described above, that optionally cause the application window (and first shared content) to be positioned at a particular location within the three-dimensional environment). In some embodiments, when the first shared content is windowed, the first shared content is non-immersive (such as described above with reference to method 2500) and is not displayed at a respective (e.g., predefined or preset) location for media content in the three-dimensional environment (e.g., a docked location or a predetermined location that the three-dimensional environment or computer system optionally defines, at which the first shared content optionally resides and/or is not movable during a full-screen or docked mode of the first shared content or another mode.

In some embodiments, in response to receiving the first input, the computer system joins the communication session, including, in accordance with a determination that a third set of one or more criteria is met, wherein the third set of one or more criteria includes a requirement that the first parameter of the first shared content has a third value in order for the third set of one or more criteria to be met, wherein the third value indicates that the first shared content is immersive content (e.g., three-dimensional content that surrounds the user of the computer system in a view of the three-dimensional environment and/or three-dimensional content for which the computer system simulates depth effect(s) optionally relative to a viewpoint(s) of the user, such that the user visually experiences the three-dimensional content as three-dimensional content, such as described above with reference to method 2500), such as shared media content 2620*a* in FIG. 26B, presenting third one or more representations of the one or more participants (e.g., generating audio (e.g., real-time audio) corresponding to audio of the one or more participants (e.g., voice audio), such as the presentation of audio described above with reference to method 2500), such as representation 2406*b*' in FIG. 26B, without displaying representations of the one or more participants in the three-dimensional environment. In some embodiments, the audio corresponding to audio of the one or more participants is generated as if emanating from a location at which a representation of the respective participant would be displayed if the content were non-immersive (e.g., the relative spatial arrangement of the audio relative to the viewpoint of the user is the same as or corresponds to the relative spatial arrangement of the hypothetical representation of the respective participant relative to the viewpoint of the user). In some embodiments, the audio corresponding to audio of the one or more participants is generated as if emanating from a different location (e.g., a location in the environment that does not change based on relative placements of participants). In some embodiments, the audio corresponding to the respective participant is generated as non-spatial audio (e.g., audio that is not generated as if emanating from a particular location in the environment) Presenting audio representations (e.g., audio-only representations) of participants in the communication session without displaying representations of the one or more participants resolves conflicting technical aspects of immersing a user in a communication session that includes immersive content while maintaining communication with the participants in the communication session; displaying visual (e.g., spatial) representations of participants in the communication session when the first shared content is windowed provides spatial truth of the representation of participants in the communication session relative to the first shared content and relative to the view of the three-dimensional environment from the perspective of the user of the computer system and provides feedback that the other participant(s) are still in the communication session, which reduces errors in interaction between the user and the computer system and/or the shared content.

In some embodiments, the first value of the first parameter of the first shared content indicates that the computer system is entitled to view the first shared content (e.g., the user of the computer system is entitled to view the first shared content), such as glyph 2640 in FIG. 26C, the first one or more representations of the one or more participants in the communication session include a first representation of a first participant of the one or more participants having a first amount of visual detail, such as representation 2606*b*' in three-dimensional environment 2604*c* in FIG. 26D, the second value of the first parameter of the first shared content indicates that the computer system is not entitled to view the first shared content (e.g., the user of the computer system is not entitled to view the first shared content), such as glyph 2642 in FIG. 26E, and the second one or more representations of the one or more participants in the communication session includes a second representation of the first participant of the one or more participants having a second amount of visual detail that is less than the first amount of visual detail, such as representation 2606*b*' in three-dimensional environment 2604*a* in FIG. 26E. In some embodiments, entitlement to content includes being subscribed to content, and/or content for which the one or more first users meet an age requirement, a location requirement, a system requirement, or another type of requirement, such as described above with reference to step(s) 2702. In accordance with a determination that the first value of the first parameter indicates that the computer system is entitled to view the first shared content, the computer system optionally displays, in the three-dimensional environment and via the display generation component, the first one or more representations of the one or more participants in the communication session, and in accordance with a determination that the computer system is not entitled to view the first shared content, the computer system optionally displays, in the three-dimensional environment and via the display generation component, the second one or more representations of the one or more participants in the communication session. Displaying a more detailed representation of other participants in the communication session when the user of the computer system has access to the first shared content in the communication session and displaying a less detailed representation of other participants in the communication session when the user of the computer system does not have access to the first shared content in the communication session visually indicates to the user the user's status of entitlement to the shared content, which reduces errors in interaction between the user and the computer system, the first participant, and/or the shared content.

In some embodiments, the first representation of the first participant of the one or more participants includes a first visual element having an appearance of a representation of a head corresponding to the first participant and/or a second visual element having an appearance of a representation of a hand corresponding to the first participant (e.g., one or more hands), such as representation 2606*b*' in three-dimensional environment 2604*c* in FIG. 26D. In some embodiments, the first representation of the first participant is a human-like or animal-like avatar that includes a head, hands, feet, arms, torso, hair, fur, and/or other characteristics. In some embodiments, the participant corresponding to the avatar can customize the above visual elements of the avatar. Displaying a more detailed representation including a representation of a head corresponding to the first participant and/or a representation of a hand corresponding to the first participant when the user is entitled to the view the shared content visually indicates to the user that the user is entitled to view the shared content, which reduces errors in interaction between the user and the computer system, the first participant, and/or the shared content.

In some embodiments, the first visual element that has the appearance of the representation of the head corresponding to the first participant moves relative to the second visual element having the appearance of the representation of the hand (or, optionally, multiple hands) corresponding to the first participant, such as the movement of representation of hand and body of representation 2606*a*' in three-dimensional environment 2604*b* from FIG. 26C to FIG. 26D. Thus, while the computer system displays the more detailed representation of the first participant, the computer system optionally displays in the three-dimensional environment movement of the representation of the body part(s) corresponding to the first participant, such as movement of a left hand relative to a right hand, movement of head relative to torso/shoulders, movement of one leg relative to another leg, or relative to a representation of the head of the first participant, so as to convey gestures, such as hello, welcome, and/or goodbye gestures, optionally directed to the user or another participant of the communication session, and/or to convey corresponding movement of the participant corresponding to the avatar in their physical space and/or to convey movement of corresponding portions of the participant in their physical space (e.g., the participant walking, jumping, turning their head but not their torso, moving their arm(s) independently, moving their hand(s) independently, or sitting). Such features optionally provide a more realistic immersive experience of participants in the communication session. Displaying a more detailed representation including a representation of a head corresponding to the first participant and/or a representation of a hand corresponding to the first participant when the user is entitled to the view the shared content visually indicates that the user is entitled to view the shared content, which reduces errors in interaction between the user and the computer system, the first participant, and/or the shared content.

In some embodiments, the second representation of the first participant of the one or more participants in the communication session does not include a visual element having an appearance of a representation of a head corresponding to the first participant and/or a visual element having an appearance of a representation of a hand corresponding to the first participant. For example, the less detailed representation optionally includes fewer representations of body parts than representation 2606*b*' in three-dimensional environment 2604*c* in FIG. 26D (e.g., includes a head without including hands). Thus, the second representation is less detailed than the first representation of the first participant (e.g., in that the second representation of the first participant excludes the first visual element and/or the second visual element that the computer system displays when the computer system displays the first representation of the first participant). As such, when the user does not have entitlement to view the first shared content, the computer system displays a less detailed representation of the first participant in the communication session. Displaying a less detailed representation including a representation of the first participant that excludes features of the first representation of the first participant when the user is not entitled to the view the shared content visually indicates that the user is not entitled to view the shared content, which reduces errors in interaction between the user and the computer system, the first participant, and/or the shared content and may reduce computing resources used in displaying a representation of the first participant.

In some embodiments, the second representation of the first participant of the one or more participants in the communication session is a representation of a geometric shape (e.g., a spatial platter, a three-dimensional object, and/or a placeholder representation that indicates a location of a participant in a three-dimensional environment) and/or monogram (e.g., including letters and/or symbols that optionally correspond to one or more letters or symbols in a name of the participant being represented by the monogram), such as representation 2606*b*' in three-dimensional environment 2604*a* in FIG. 26E. In some embodiments, the second representation includes a representation of a geometric shape and a monogram. The representation of the geometric shape or monogram optionally includes one or more identifiers associated with the first participant (e.g., a face of an avatar of the first participant, a name and/or a username of the first participant). In some embodiments, the monogram includes the first participant's initials. In some embodiments, the shape and/or size of the geometric shape is not customizable by the first participant. In some embodiments, the geometric shape has or is in a shape of an inanimate object. In some embodiments, an orientation of the representation of the geometric shape and/or monogram in the viewpoint of the user is based on the orientation of the viewpoint of the first participant (e.g., has a pose relative to respective media content in the three-dimensional environment, such as described above with reference to method 2500). In some embodiments, when the viewpoint of the first participant changes, such as in response to detecting a head rotation of the first participant (or positional movement), an orientation of the representation of the geometric shape and/or monogram (and/or position) in the viewpoint of the user changes in accordance with the change of viewpoint of the first participant (e.g., the geometric shape and/or monogram rotates and/or translates in accordance with the changes of the viewpoint of the first participant. Displaying a less detailed representation including a representation of the first participant that includes a representation of a geometric shape or monogram when the user is not entitled to the view the shared content visually indicates that the user is not entitled to view the shared content, which reduces errors in interaction between the user and the computer system, the first participant, and/or the shared content, and also may reduce consumption of computing resources used in displaying a representation of the first participant.

In some embodiments, the first one or more representations of the one or more participants in the communication session includes a first representation of a first participant of the one or more participants having a first amount of visual detail, such as representation 2606*b*' in three-dimensional environment 2604*a* in FIG. 26C. In some embodiments, the second one or more representations of the one or more participants in the communication session includes a second representation of the first participant of the one or more participants having a second amount of visual detail that is less than the first amount of visual detail, such as representation 2606*b*' in three-dimensional environment 2604*a* in FIG. 26E. In some embodiments, the second amount of visual detail that is less than the first amount of visual detail includes less color, less body parts, more transparency, less defined, less resolution than the first amount of visual detail.

In some embodiments, the second value of the first parameter of the first shared content indicates that the first shared content is displayed at a respective (e.g., predefined or preset) location for media content in the three-dimensional environment (e.g., a docked location or a predetermined location that the three-dimensional environment or computer system optionally defines, at which the first shared content optionally resides and/or is not movable during a full-screen or docked mode of the first shared content or another mode), such as the location of shared media content 2610*a/b* in shared virtual environments 2603*a/b* in FIG. 26G. In accordance with a determination that the second value of the first parameter of the first shared content indicates that the first shared content is displayed at the respective location for media content in the three-dimensional environment, the computer system optionally displays the second one or more representations of the one or more participants (e.g., other participants) in the communication session, which are less detailed that the first one or more representations of the one or more participants (e.g., other participants) in the communication session. Displaying a less detailed representation of other participants in the communication session when the computer system displays the first shared content in the respective location for media content in the three-dimensional environment visually indicates that the first shared content is being displayed at the respective location for media content in the three-dimensional environment visible to the user and reduces errors in interaction between the user and the computer system, the first participant, and/or the shared content, and also may reduce consumption of computing resources used by the computer system for displaying representations of other participants.

In some embodiments, while displaying the first shared content at the respective location for media content in the three-dimensional environment, the computer system receives, via the one or more input devices, a second input corresponding to a request to cease displaying the first shared content at the respective location for media content in the three-dimensional environment, wherein the second one or more representations of the one or more participants in the communication session, including the second representation of the first participant, is displayed when the second input is received. For example, the second input optionally includes input from hand 2612*b* in FIGS. 26A and 26A1, but corresponding to a request to cease displaying shared media content at the respective location for media content in the three-dimensional environment, such as to cease displaying shared media content 2610*a/c* in FIG. 26E at the location of shared media content 2610*a/c* in FIG. 26E. The second input optionally includes one or more characteristics of the first input or another input discussed herein, but corresponds to the request to cease displaying the first shared content at the respective location for media content in the three-dimensional environment. In some embodiments, receiving the second input includes detecting selection of a user interface element in a system user interface or a content playback user interface corresponding to the first shared content.

In some embodiments, in response to receiving the second input via the one or more input devices, the computer system ceases display of the first shared content at the respective location for media content in the three-dimensional environment (optionally, after, while, or before ceasing display of the first shared content at the respective location for media content in the three-dimensional environment). For example, computer system 101*a* ceasing displaying shared media content 2610*a*. In some embodiments, displaying, via the display generation component, the first shared content at a location in the three-dimensional environment that is different from the respective location for media content in the three-dimensional environment, such as at the location of shared media content 2610*a-c* in FIG. 26C (optionally, after, while, or before ceasing display of the first shared content at the respective location for media content in the three-dimensional environment and/or after, while, or before displaying, via the display generation component, the first shared content at the location in the three-dimensional environment that is different from the respective location for media content in the three-dimensional environment).

In some embodiments, the computer system displays, via the display generation component, the first one or more representations of the one or more participants in the communication session, including the first representation of the first participant of the one or more participants, such as representation 2606*b*' in three-dimensional environment 2604*a* in FIG. 26C. In some embodiments, while displaying the first shared content at a location in the three-dimensional environment visible via the display generation component that is not the respective location for media content in the three-dimensional environment, the computer system receives, via the one or more input devices, a third input corresponding to a request to display the first shared content at the respective location for media content in the three-dimensional environment, wherein the first one or more representations of the one or more participants in the communication session, including the first representation of the first participant, is displayed when the third input is received. The third input optionally includes one or more characteristics of the first input, the second input, or another input discussed herein, but corresponding to the request to display the first shared content at the respective location for media content in the three-dimensional environment. In some embodiments, receiving the third input includes detecting selection of a user interface element in a system user interface or a content playback user interface corresponding to the first shared content, such as a user interface element overlaid on the first shared content while the first shared content is at the location in the three-dimensional environment that is not the respective location for media content in the three-dimensional environment. In some embodiments, the third input includes an input corresponding to a request to move the content to a virtual environment (e.g., away from being displayed in an passthrough setting (e.g., in which optical passthrough is visible or in which virtual passthrough content is displayed)). In some embodiments, in response to receiving the third input via the one or more input devices, the computer system ceases display of the first shared content at the location in the three-dimensional environment visible via the display generation component that is not the respective location for media content in the three-dimensional environment. In some embodiments, in response to receiving the third input via the one or more input devices, and after, while, or before ceasing display of the first shared content at the location in the three-dimensional environment visible via the display generation component that is not the respective location for media content in the three-dimensional environment, the computer system displays, via the display generation component, the first shared content at the respective location for media content in the three-dimensional environment that is different from the location of the first shared content when the third input was received. In some embodiments, in response to receiving the third input via the one or more input devices, and after, while, or before ceasing display of the first shared content at the location of the first shared content in the three-dimensional environment visible via the display generation component that is not the respective location for media content in the three-dimensional environment and/or after, while, or before displaying, via the display generation component, the first shared content at the respective location for media content in the three-dimensional environment that is different from the location of the first shared content when the third input was received, the computer system, displays, via the display generation component, the second one or more representations of the one or more participants in the communication session, including the second representation of the first participant of the one or more participants. In some embodiments, in response to detecting the second input or the third input, the computer system initiates a process to cause the status of the first shared content in the three-dimensional environments of the views of the other participants to change location in accordance with the change of location in the three-dimensional environment of the user. For example, when the computer system of the user receives the second input, the computer system optionally initiates a process to cause the computer systems of the other participants to automatically perform the above-recited operations that the computer system of the user performs in response to receiving the second input, in the three-dimensional environments of the other participants (which are optionally similar to or different from the three-dimensional environment of the user of the computer system). Similarly, when the computer system of the user receives the third input, the computer system optionally initiates a process to cause the computer systems of the other participants to automatically perform the above-recited operations that the computer system of the user performs in response to receiving the third input, in the three-dimensional environments of the other participants (which are optionally similar to or different from the three-dimensional environment of the user of the computer system). In some embodiments, while the computer system displays the first shared content in a docked mode (e.g., at the respective location for media content in the three-dimensional environment, such as described above) the first shared content is not movable from the respective location for media content in the three-dimensional environment while the first shared content is in the docked mode (e.g., docked mode is optionally maintained while the first shared content is at the respective location for media content in the three-dimensional environment and is optionally not maintained while the first shared content is not at the respective location for media content in the three-dimensional environment). In some embodiments, while the computer system displays the first shared content at a location in the three-dimensional environment different from the respective location for media content in the three-dimensional environment, the computer system detects movement input for moving the first shared content, and in response, the computer system moves the first shared content to a different location in the three-dimensional environment in accordance with the movement input for moving the first shared content. Changing display of the representations of the other participants of the computer system from the less detailed representations of other participants to the more detailed representations of the other participants in response to receiving the second input increases a prominence of the representations of the other participants, visually indicates to the user that the first shared content is no longer being displayed at the respective location for media content in the three-dimensional environment visible to the user, and reduces errors in interaction between the user and the computer system, the first participant, and/or the shared content.

In some embodiments, in response to receiving the first input, the computer system joins the communication session, including, in accordance with a determination that a third set of one or more criteria are met, wherein the third set of one or more criteria include a requirement that the first parameter of the first shared content has a third value, different from the first value and the second value, forgoing displaying representations of the one or more participants in the communication session, wherein the third value indicates that the first shared content is immersive content (e.g., three-dimensional content that surrounds the user of the computer system in a view of the three-dimensional environment and/or three-dimensional content for which the computer system simulates depth effect(s) optionally relative to a viewpoint(s) of the user, such that the user visually experiences the three-dimensional content as three-dimensional content), such as shared media content 2620*a* in FIG. 26B, such as immersive content discussed with reference to method 2500 and/or above with reference to method 2700. For example, in FIG. 26B, computer system 101*b* presents representation 2406*a*' in FIG. 26B (e.g., an audio representation) without display a representation of participant 2406*a*. Forgoing displaying representations of the one or more participants in the communication when the first shared content is immersive permits consistency of interaction with the first shared content without representations of participants obscuring the content, which may reduce errors in user interaction with the first shared content, the computer system, and/or the other participants of the communication session.

In some embodiments, the first one or more representations of the one or more participants in the communication session includes a first representation of a first participant of the one or more participants having a first amount of visual detail such as representation 2606*b*' in three-dimensional environment 2604*c* in FIG. 26D. In some embodiments, the second one or more representations of the one or more participants in the communication session includes a second representation of the first participant of the one or more having a second amount of visual detail that is less than the first amount of visual detail, such as representation 2606*b*' in three-dimensional environment 2604*a* in FIG. 26E.

In some embodiments, when (e.g., in accordance with a determination that) the first representation of the first participant of the one or more participants in the communication session is displayed with the first amount of visual detail in a view of the communication session from a perspective of the user of the computer system, in a view of the communication session from a perspective of the first participant, a representation of the user of the computer system is displayed having the first amount of visual detail. For example, in FIG. 26D, representation 2606*c*' in three-dimensional environment 2604*a* is displayed optionally because representation 2606*a*' in three-dimensional environment 2604*c* is displayed. As such, while the computer system of the user displays a more detailed representation of other participants (in a view of the three-dimensional environment of the user from the perspective of the user), the computer systems of other participants optionally display a more detailed representation of the user (in the views of the three-dimensional environments of other participants from the perspectives of the other participants). In some embodiments, when the computer system of the user displays a more detailed representation of other participants, the computer system of the user optionally initiates a process to cause the computer systems of other participants display a more detailed representation of the user. In some embodiments, the representations of other participants that are visible in a view of the three-dimensional environment visible in a view of the communication session from a perspective of a respective participant are optionally based on the same triggering condition(s) (e.g., the conditions that cause display of the one or more first representations of the one or more participants and the conditions that cause displays of the one or more second representations of the one or more participants described above with reference to step(s) 2702).

In some embodiments, when (e.g., in accordance with a determination that) the first representation of the first participant of the one or more participants in the communication session is displayed with the second amount of visual detail in the view of the communication session from the perspective of the user of the computer system, in a view of the communication session from the perspective of the first participant, a representation of the user of the computer system is displayed having the second amount of visual detail. For example, in FIG. 24F, display generation component 120*b* of participant 2606*b* shows less detailed representations 2606*a*'/c' optionally because display generation component 120*b* of participant 2606*a* shows a less detailed representation 2606*b*' of participant 2606*b*. As such while the computer system of the user displays a less detailed representation of other participants (in a view of the three-dimensional environment of the user from the perspective of the user), the computer systems of other participants optionally display a less detailed representation of the user in their respective three-dimensional environments (in the views of the three-dimensional environments of other participants from the perspectives of the other participants). In some embodiments, when the computer system of the user displays a less detailed representation of other participants, the computer system of the user optionally initiates a process to cause the computer systems of other participants to display a less detailed representation of the user. The features (e.g., states) of computer systems of other participants displaying a more detailed representation of the user when the computer system of the user displays a more detailed representation of other participants, and of computer systems of other participants displaying a less detailed representation of the user when the computer system of the user displays a less detailed representation of other participants provides visual consistency of interaction between participants of the communication session in their respective three-dimensional environments and reduces errors in interaction between the user and the computer system, the first participant, and/or the shared content.

In some embodiments, when (e.g., in accordance with a determination that) the first shared content is displayed in a window that can be positioned at multiple different locations within the three-dimensional environment based on user input (e.g., such as the application window described above), the first set of one or more criteria and/or the second set of one or more criteria is met independent of whether the computer system is entitled to display the first shared content, such as independent of the entitlement described above. For example, shared media content 2610*a* in FIG. 26C optionally includes an application window and computer system 101*a* displays representation 2606*b*' in FIG. 26C and shared media content 2610*a* in FIG. 26F optionally includes an application window and computer system 101*a* displays representation 2606*b*' in FIG. 26F. As such, when the first shared content is windowed, the first set of one or more criteria and/or the second set of one or more criteria can be met (and the step(s) 2702 performed) independent of whether the user of the computer system is entitled to view the first shared content. Displaying spatial representation of other participants in the communication session independent of whether the computer system is entitled to display the first shared content when the first shared content includes an application window provides spatial truth of the representation of participants in the communication session relative to the first shared content and relative to the view of the three-dimensional environment from the perspective of the user of the computer system, which reduces errors in interaction between the user and the computer system and/or the shared content.

In some embodiments, in response to receiving the first input, the computer system joins the communication session, including in accordance with a determination that the computer system is entitled to display the first shared content (e.g., the entitlement discussed above), displaying, in the three-dimensional environment and via the display generation component, the first shared content, and in accordance with a determination that the computer system is not entitled to view the first shared content, such as shown by glyph 2644 in FIG. 26F, displaying a representation of a location of the first shared content without fully displaying the first shared content (e.g., displaying an obscured version of the first content by blurring, increasing a transparency, and/or decreasing an opacity of the first content or displaying a placeholder object that does not include any of the first content), in the three-dimensional environment and via the display generation component, display of the first shared content, such as placeholder content 2610*b* in FIG. 26G. In some embodiments, the computer system displays content (e.g., placeholder content optionally including symbols or words indicating that the user is not entitled to view the first shared content) different from the first shared content to indicate to the user that the user is not entitled to view the first shared content. The placeholder content is optionally displayed instead of the first shared content at the location in the communication session that the first shared content would be displayed if the user was entitled to view the first shared content (e.g., such as only displaying an outline of the first shared content at the location/orientation that the first shared content has or would have if displayed in an unobscured manner). As such, when the user of the computer system is not entitled to view the first shared content in the computer system, computer system optionally obscures the first shared content (e.g., from display) and when the user of the computer system is entitled to view the first shared content, the computer system optionally displays the first shared content. Displaying the first shared content when the user of the computer system has access to view the first shared content and obscuring display of the first shared content when the user of the computer system does not have access to the first shared content visually indicates to the user the user's status of entitlement to the shared content, and can protect confidential shared content, which may reduce errors in interaction between the user and the computer system and/or the shared content.

It should be understood that the particular order in which the operations in method 2700 have been described is merely exemplary and is not intended to indicate that the described order is the only order in which the operations could be performed. One of ordinary skill in the art would recognize various ways to reorder the operations described herein.

FIGS. 28A-28U illustrate examples of a computer system presenting media content and associated user interfaces within a three-dimensional environment in accordance with some embodiments.

FIG. 28A illustrates a computer system 101 (e.g., an electronic device) displaying, via a display generation component (e.g., display generation component 120 of FIG. 1), a three-dimensional environment 2802 from a viewpoint of a user 2826 (e.g., facing the back wall of the physical environment in which computer system 101 is located), and as illustrated in the overhead view. In some embodiments, computer system 101 includes a display generation component (e.g., a touch screen or non-touch screen display) and a plurality of image sensors (e.g., image sensors 314 of FIG. 3). The image sensors optionally include one or more of a visible light camera, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., including gaze) of the user (e.g., internal sensors facing inwards towards the face of the user).

As shown in FIG. 28A, computer system 101 captures one or more images of the physical environment around computer system 101 (e.g., operating environment 100), including one or more objects in the physical environment around computer system 101. In some embodiments, computer system 101 displays representations of the physical environment in three-dimensional environment 2802. For example, three-dimensional environment 702 includes a representation of a coffee table, which is optionally a representation of a physical coffee table in the physical environment.

In FIG. 28A, three-dimensional environment 2802 also includes a virtual object, such as a virtual object including a user interface displaying media 2834. In some embodiments, the virtual object is optionally a user interface of an application containing content (e.g., a plurality of selectable options), three-dimensional objects (e.g., virtual clocks, virtual balls, virtual cars, etc.) or any other element displayed by computer system 101 that is not included in the physical environment of display generation component 120. For example, in FIG. 28A, the virtual object is optionally a user interface of a web-browsing application containing website content, such as text, images, video, hyperlinks, and/or audio content, from the website, or a user interface of an audio and/or video playback application including a list of selectable categories of music and a plurality of selectable user interface objects corresponding to a plurality of albums of music. It should be understood that the content discussed above is exemplary and that, in some embodiments, additional and/or alternative content and/or user interfaces are provided in the three-dimensional environment 2802, such as the content described below with reference to method 2900.

In FIG. 28A, computer system 101 displays a virtual environment within three-dimensional environment 2802, including virtual content that is displayed occupying portions of the user's field-of-view (e.g., via a viewport), and optionally replacing representations of the user's physical environment, as indicated fill pattern applied up to the curve boundary in the overhead view. The virtual environment optionally is displayed with virtual content (e.g., trees, lakes, skies, and/or virtual objects) to emulate the appearance of physical environment different from the user's true physical environment. In some embodiments, the virtual environment is displayed with a level of immersion (e.g., illustrated by the curved boundary). In some embodiments, as the level increases, the virtual environment replaces a greater portion of the representation of the user's physical environment with greater portions of a currently displayed virtual scene, and as the level decreases, the virtual environment replaces a smaller portion of the representation of the physical environment.

In FIG. 28A, computer system 101 detects input corresponding to a request to display system user interface of a first type, such as input 2804. In some embodiments, input 2804 is representative of an air gesture, performed by hand 2801, such as an air pinching, including contact between a plurality of figures of a hand of a user, an air swiping of one or more fingers and/or a hand of the user, and/or an air pointing of one or more fingers of a hand of the users, directed to a portion of a viewport of computer system 101, such as input generally directed toward a centered and/or top portion of three-dimensional environment 2802. In some embodiments, computer system 101 detects such input, and in response, displays a system user interface, as shown in FIG. 28B. It is understood that input 2804 is representative of any manner of suitable input to request display of a system user interface. For example, input 2804 is optionally representative of contact of a trackpad while a cursor, a selection of an input device in communication with computer system 101, and/or a voice command. The embodiments of the disclosure described with reference to FIGS. 28A-28U are understood as illustrating operations, and detecting inputs, based on the inputs and/or portions of the user's body described with reference to FIG. 28A. It is understood that additional or alterative manners of inputs can be detected, and perform operations similar or the same to those shown in FIGS. 28A-28U than inputs expressly described herein.

FIG. 28A1 illustrates similar and/or the same concepts as those shown in FIG. 28A (with many of the same reference numbers). It is understood that unless indicated below, elements shown in FIG. 28A1 that have the same reference numbers as elements shown in FIGS. 28A-28U have one or more or all of the same characteristics. FIG. 28A1 includes computer system 101, which includes (or is the same as) display generation component 120. In some embodiments, computer system 101 and display generation component 120 have one or more of the characteristics of computer system 101 shown in FIGS. 28A-28U and display generation component 120 shown in FIGS. 1 and 3, respectively, and in some embodiments, computer system 101 and display generation component 120 shown in FIGS. 28A-28U have one or more of the characteristics of computer system 101 and display generation component 120 shown in FIG. 28A1.

In FIG. 28A1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 28A-28U.

In FIG. 28A1, display generation component 120 is illustrated as displaying content that optionally corresponds to the content that is described as being displayed and/or visible via display generation component 120 with reference to FIGS. 28A-28U. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 28A1.

Display generation component 120 has a field of view (e.g., a field of view captured by external image sensors 314*b* and 314*c* and/or visible to the user via display generation component 120) that corresponds to the content shown in FIG. 28A1. Because display generation component 120 is optionally a head-mounted device, the field of view of display generation component 120 is optionally the same as or similar to the field of view of the user.

In FIG. 28A1, the user is depicted as performing an air pinch gesture (e.g., with hand 2801 while attention of the user is directed to a portion of the three-dimensional environment, corresponding to gaze point 2804) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 28A-28U.

In some embodiments, computer system 101 responds to user inputs as described with reference to FIGS. 28A-28U.

In the example of FIG. 28A1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 28A-28U and/or described with reference to the corresponding method(s) are optionally implemented on computer system 101 and display generation unit 120 in a manner similar or analogous to that shown in FIG. 28A1.

In FIG. 28B, computer system 101 displays a system user interface of a first type in accordance with a determination the input 2804 satisfies one or more criteria, described further with reference to method 2900. It is understood that input 2804 is representative of any suitable manner of input. For example, input 2804 optionally corresponds to an air gesture (e.g., performed by a hand of a user of the computer system 101, optionally while attention (e.g., gaze) of the user is directed to an element and/or region within three-dimensional environment 2802 that is the target of input, (e.g., an air pinching contacting fingers of the hand, an air swiping of one or more fingers of the hand, and/or an air pointing of one or more of the hand)), an input from an input device such as a stylus or cursor, a voice command, attention (e.g., gaze) of the user dwelling on a position within three-dimensional environment 2802 for a period of time greater than a threshold amount of time (e.g., 0.5, 0.75, 1, 1.25, 1.5, 2, or 3 seconds) and/or a pressing of a button (e.g., a pushbutton, a mechanical and rotational crown button). In some embodiments, computer system 101 is configured to display a plurality of types of system user interface, such as user interfaces associated with an operating system (e.g., and including settings and/or controls that affect one or more applications and/or virtual environments). For example, interface 2806 corresponds to a first type of system user interface, that is displayed at a relatively close simulated position relative to viewpoint 2826 to the user's viewpoint. The simulated position of interface 2806, and additional virtual content (e.g., applications, media, and/or notifications) relative to viewpoint 2826 are described further with reference to FIG. 28U.

In FIG. 28B, interface 2806 includes information and a plurality of selectable options associated with computer system 101. For example, the first selectable option 2808 is selectable to change a visual appearance of three-dimensional environment 2802, including changing visual characteristics of the three-dimensional environment 2802 (described further with reference to FIG. 28C, method 2900, method 3100, and its associated figures that are prefixed with "30" such as FIG. 30A). Interface 2806 also includes selectable option 2810, which when selected, causes computer system 101 to display a user interface associated with a plurality of selectable options corresponding to virtual environments that computer system 101 is able to display (e.g., replacing the virtual environment shown in FIG. 28B). In some embodiments, interface 2806 includes a plurality of system controls. For example, slider 2812 provides visual feedback concerning a level of audio of sound effects presented by computer system 101, such as notification sounds, sounds associated with movement of virtual objects, and/or inbound communication session requests (e.g., virtual calls). In some embodiments, interface 2806 includes one or more selectable options to display additional system user interfaces. For example, interface 2806 includes icon 2803, which corresponds to a home user interface described further with reference to FIGS. 28R-28T. In FIG. 28B, computer system 101 detects input 2805, selecting icon 2803, and causes display of the system interface(s) similar or the same to as shown in FIG. 28S.

Figure 28C:
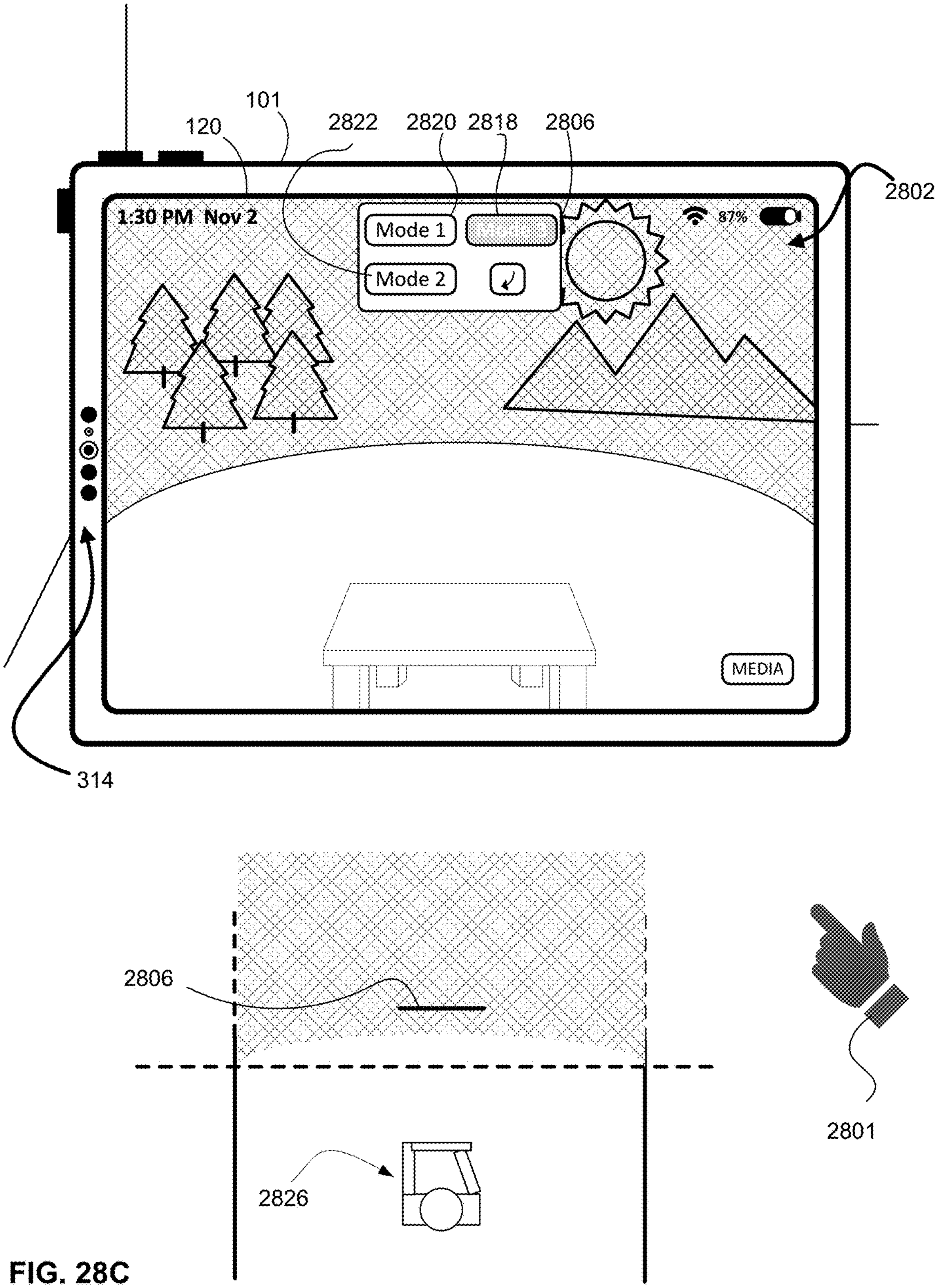
Figure 28D:
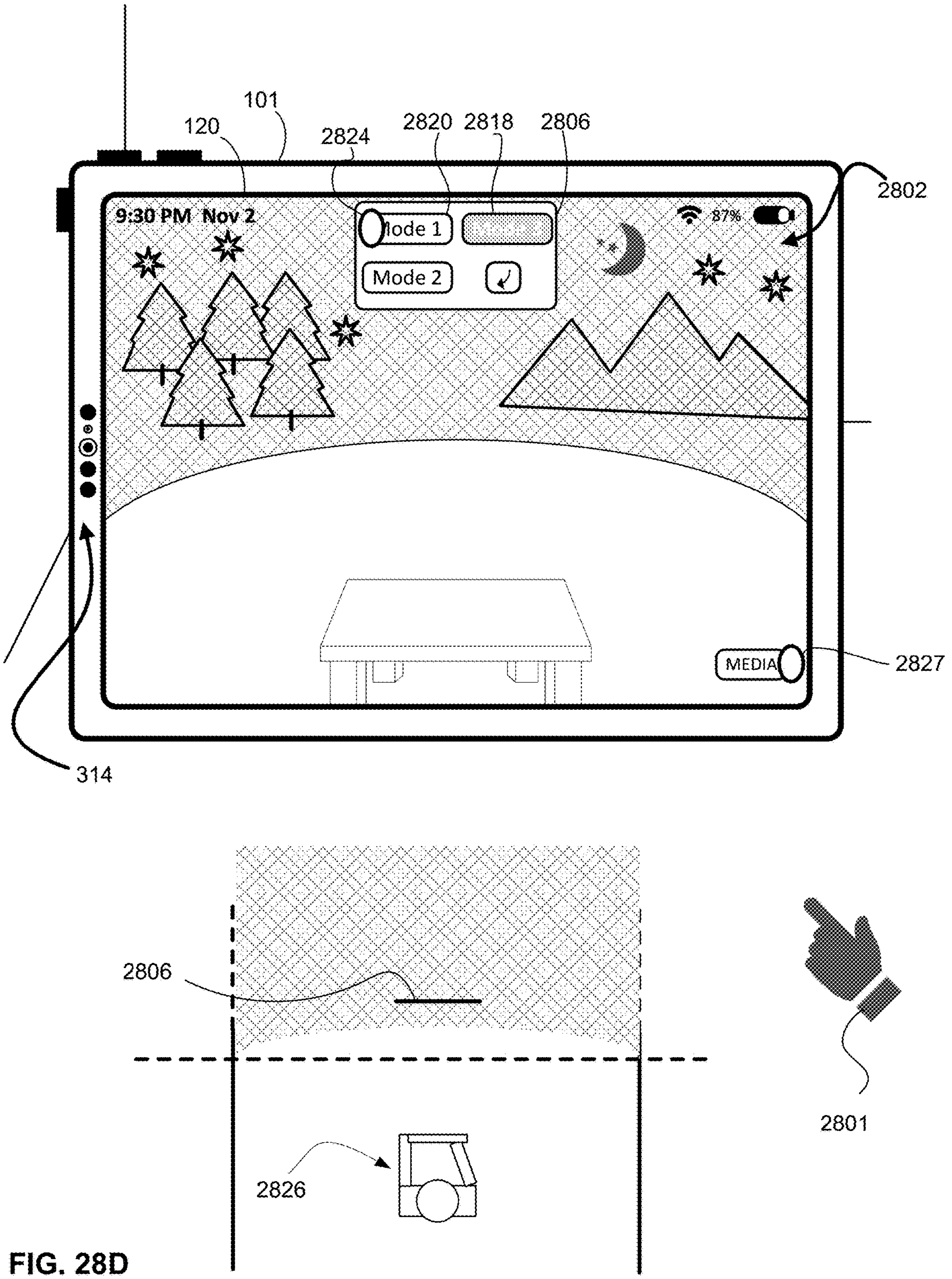
Figure 28E:
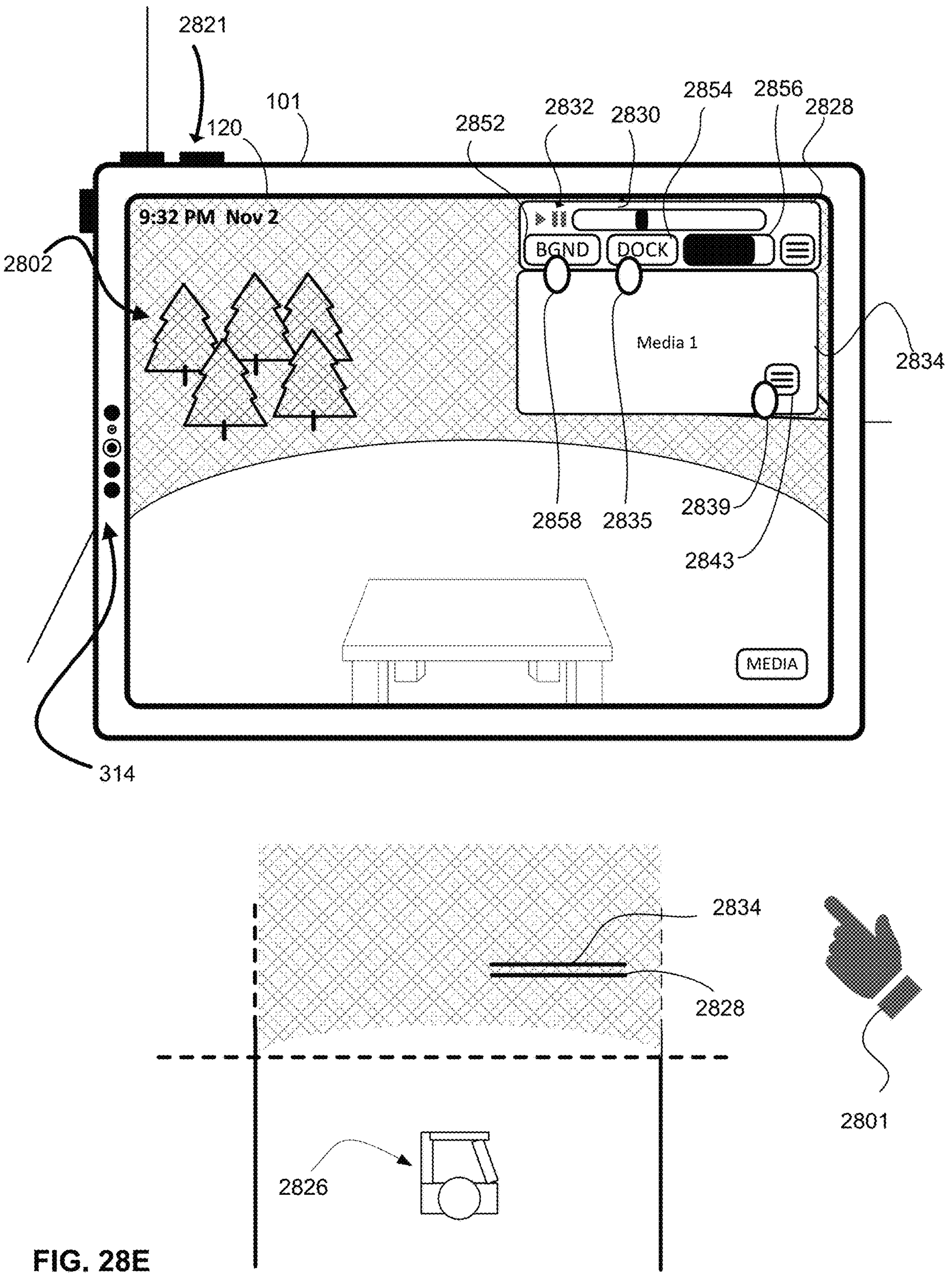
Figure 28F:
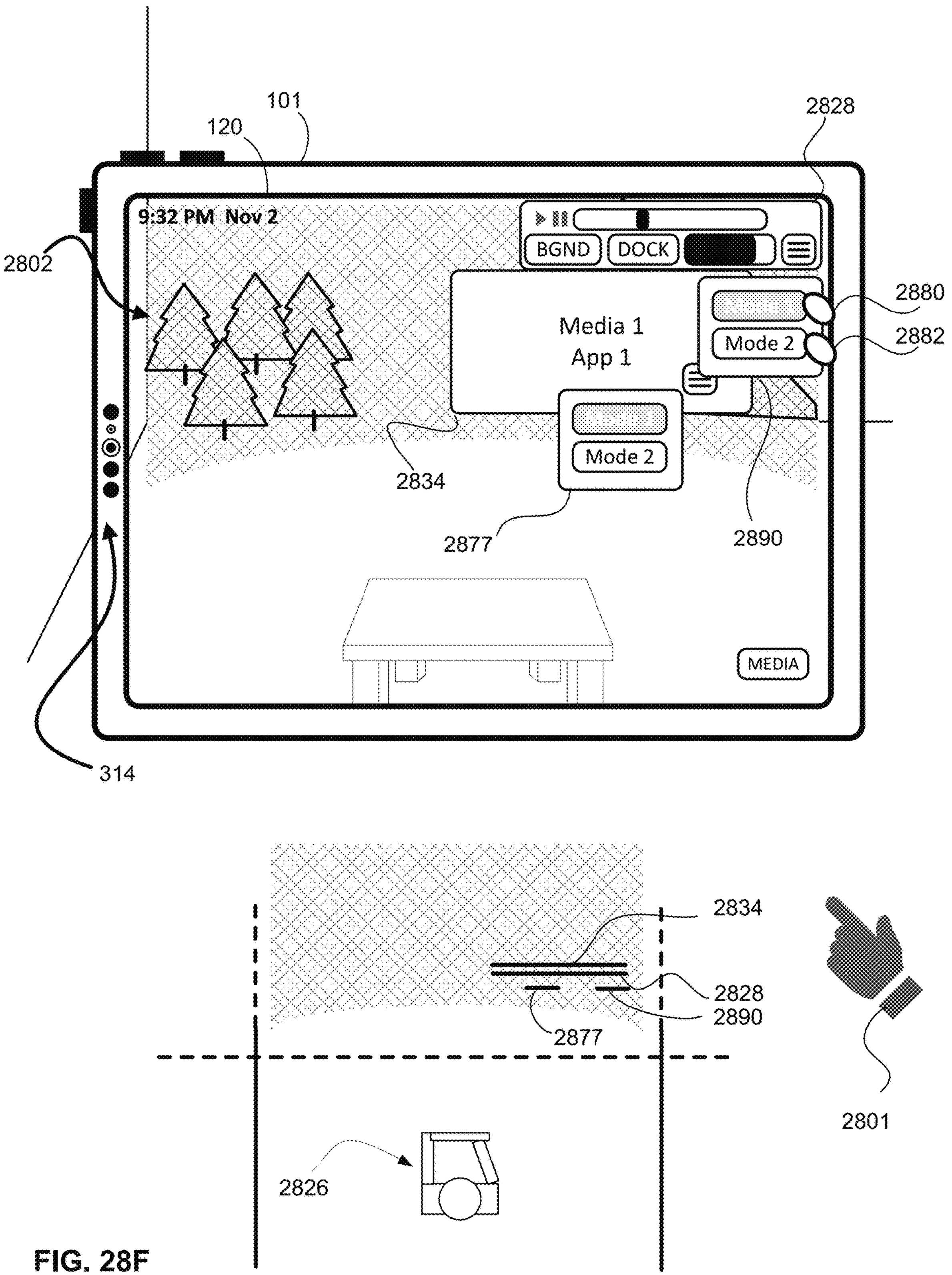

In FIG. 28C, computer system 101 updates interface 2806 to include selectable options 2818-2822 in response to detecting input 2814, such as a selection input including an air gesture (e.g., air pinching, swiping, and/or pointing) directed to selectable option 2808 in FIG. 28B. In FIG. 28C, selectable option 2818 is displayed with a first visual appearance to indicate that "Mode 3" is currently selected. In some embodiments, three-dimensional environment 2802 is displayed in accordance with a mode, such as a time of day-based mode described further with reference to method 2900. In some embodiments, while Mode 3 is selected, the computer system 101 displays the three-dimensional environment 2802 with a visual appearance (e.g., a time of day based appearance) based on a current time (e.g., "1:30 PM") in FIG. 28C. For example, three-dimensional environment 2802 includes a daytime forest and mountain virtual scene in FIG. 28C. Selectable option 2820 optionally corresponds to a different mode (e.g., "mode 1") corresponding to an overriding of the current time of day, where three-dimensional environment 2802 is displayed with a visual appearance corresponding to a daytime visual appearance described further herein. Selectable option 2822 optionally corresponds to another mode (e.g., "mode 2"), corresponding to an overriding of the current time of day, where three-dimensional environment 2802 is displayed with a visual appearance corresponding to a nighttime visual appearance, described further herein. In FIG. 28D, time elapse such that the time of day detected by the computer system corresponds to a time in the evening (e.g., "9:30 PM"). In accordance with a determination that the time of day corresponds to the evening (e.g., after sunset), the computer system 101 displays three-dimensional environment 2802 including an evening version of the immersive scene described with reference to FIG. 28C. For example, three-dimensional environment includes virtual stars and a virtual moon in FIG. 28D, and does not include a virtual sun displayed in FIG. 28C while the time of day corresponded to the daytime. In FIG. 28D, input 2824 is detected (e.g., by detecting an air gesture of hand 2801) that is directed to selectable option 2820, changing the current mode associated with three-dimensional environment 2802 to correspond to a daytime override mode. Also in FIG. 28D, input 2827 is directed to a "media" selectable option, corresponding to a request to display media. It is understood that input 2827 is representative of any manner of input, and/or interacting with computer system 101 to display media content, such as a voice command requesting the media content, a selecting of a media playback application that displays such media content, and/or a transitioning to an environment that includes media content. In FIG. 28E, computer system 101 displays media 2834 within three-dimensional environment 2802 in response to input 2827 detected in FIG. 28D, and transitions three-dimensional environment 2802 to correspond to a daytime visual appearance in response to detecting input 2824 in FIG. 28D. In FIG. 28E, computer system 101 ceases display of the virtual moon and stars, despite the current time of day corresponding to the evening, in accordance with a determination that "mode 1" is currently selected (consequentially, de-selecting "mode 3"). FIG. 28E, in the overhead view and as displayed via display generation component 120, computer system 101 displays media 2834 and controls 2828 In some embodiments, computer system 101 displays a virtual object, such as a virtual object including one or more user interfaces of a media playback application, and including media 2834. It is understood that description of media 2834 therefore optionally applies to virtual objects, and that media 2834 optionally is a virtual object that includes media content. In FIG. 28E, controls 2828 is a virtual object displayed near (e.g., above, below, and/or adjacent to) media 2834 relative to viewpoint 2826 of the user. It is understood that the relative depth of controls 2828 relative to viewpoint 2826 is merely depicted in FIG. 28E as exemplary; further description of simulated depth of virtual content is described further with reference to FIG. 28U. In FIG. 28E, controls 2828 include a scrubber bar 2830, corresponding to an interactive timeline of media playback progress relative to a duration of media 2834. Controls 2828 also includes playback controls 2832, such as one or more selectable options to play, pause, fast-forward, rewind, and/or stop display of media 2834. In FIG. 28E, controls 2828 include slider 2856, optionally corresponding to a control to modify a level of media volume (optionally independently of a system volume level and/or an environmental volume level associated with three-dimensional environment 2802). In FIG. 28E, controls 2828 include a selectable option 2852 that is selectable to cause display of a menu of available three-dimensional environment that are able to be displayed computer system 101. In FIG. 28E, controls 2828 include selectable option 2854, that is selectable to cause display of media content 2834 at a position configured for the media 2834, and/or to change a scale and/or position of media 2834. In some embodiments, controls 2828 include additional, alternative, and/or a subset of controls 2828 shown in FIG. 28E. In some embodiments, one or more of the information and/or controls included in controls 2828 in FIG. 28 are included in media 2834, in FIG. 28E and throughout FIG. 28.

In FIG. 28E, computer system detects input 2858 selecting selectable option 2852, input 2835 (causing display of virtual content shown in FIG. 28H), directed to selectable option 2854, and input 2839 directed to selectable option 2843. In FIG. 28E, computer system 101 detects input 2821 changing a level of immersion of three-dimensional environment 2802.

In response to input 2858 and input 2839 in FIG. 28E, computer system 101 display menu 2890 and menu 2877, respectively. In some embodiments, menu 2890 and menu 2877 include selectable options that are selectable to change the simulated time of day override setting associated with three-dimensional environment (currently, "mode 1" is active). In some embodiments, the selectable options included in menu 2890 and menu 2877 are based on an application that is presenting media 2834 (e.g., "App 1") in FIG. 28F. For example, in contrast with FIG. 28G, menu 2890 and menu 2877 do not include a selectable option to display media in a media playback environment (described further with reference to method 2900), and do include selectable options to display the three-dimensional environment 2802 with a daytime visual appearance or a nighttime visual appearance. In FIG. 28F, input 2880 and input 2882 are directed to respective selectable options included in menu 2890; in response to detecting the selection inputs, computer system 101 optionally changes the visual appearance (e.g., time of day setting) associated with three-dimensional environment 2202, described with reference to FIG. 28B. It is understood that menu 2890 and menu 2877 are not necessarily concurrently displayed, and are illustrated as shown in FIG. 28F for convenience and to emphasize the similar virtual content and/or operations that are performed in response to input directed to the respective menus. As shown in the overhead view, menus 2877 and 2890 optionally are displayed at respective depths relative to viewpoint 2826, described further with reference to FIG. 28U.

Figure 28G:
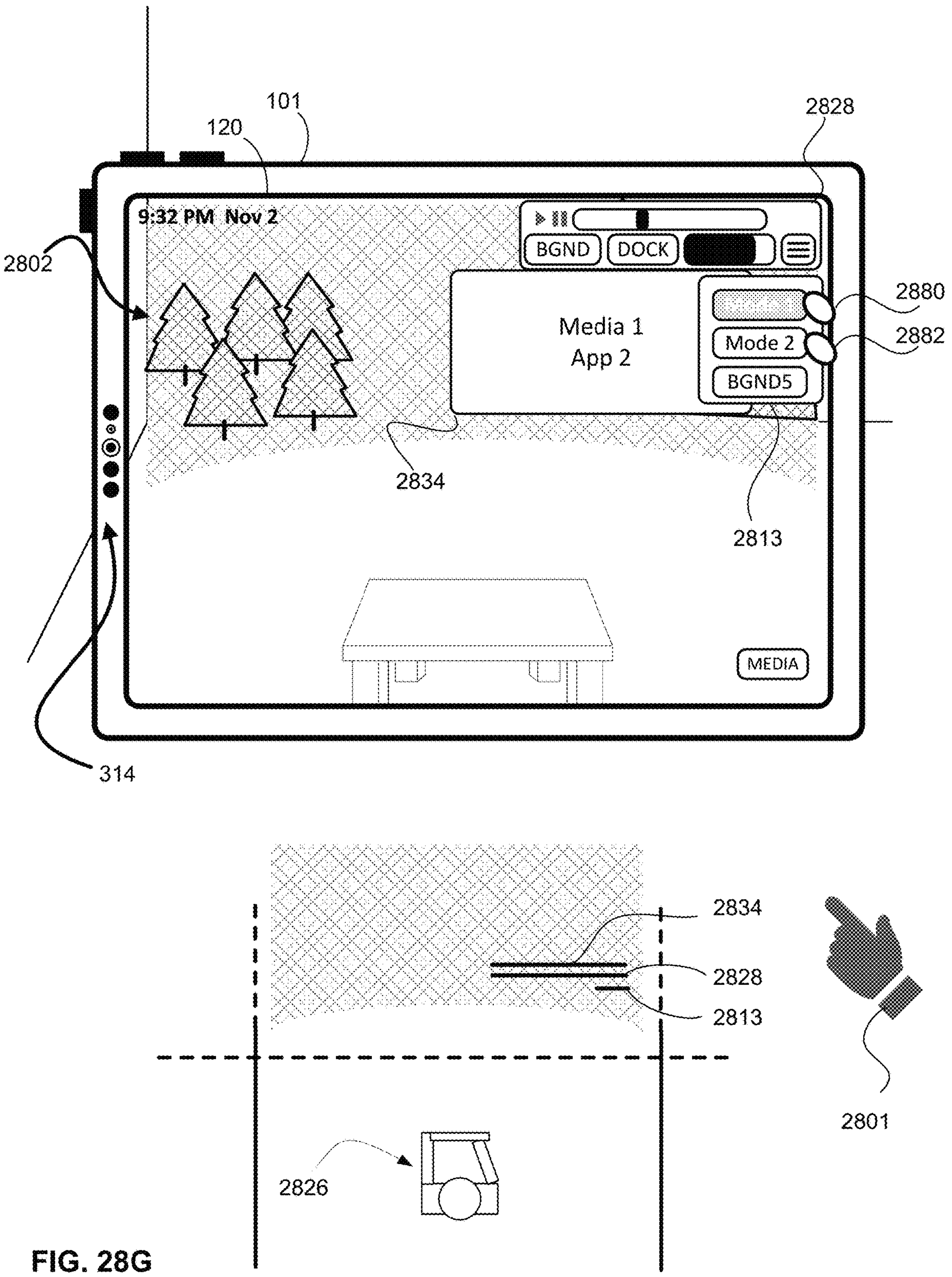
Figure 28H:
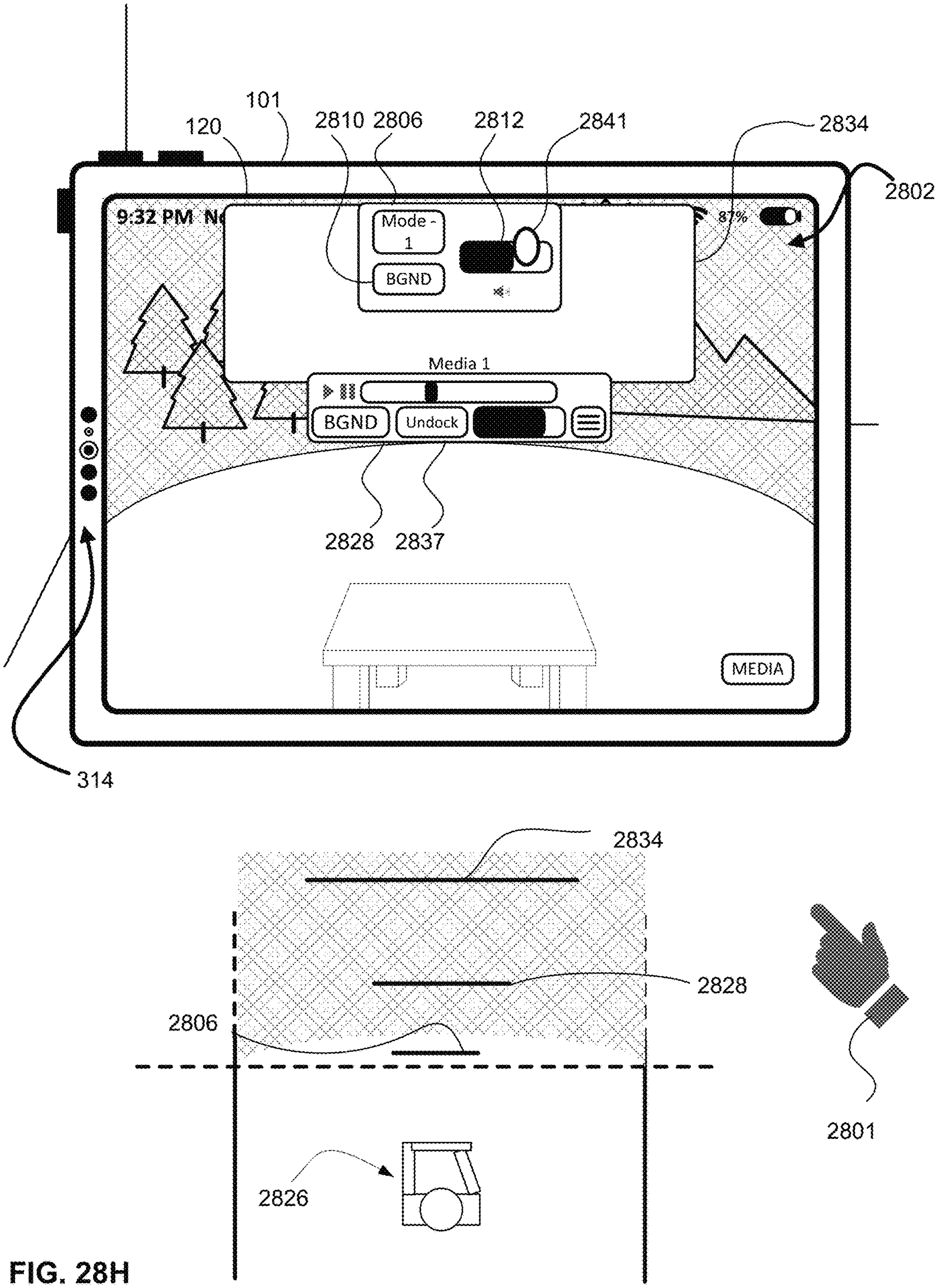

FIG. 28G illustrates an alternative embodiment of FIG. 28F. In FIG. 28G, media 2834 is associated with a second application, different from the first application (e.g., "App 2"). The second application is optionally associated with computer system 101 (e.g., is configured to present media in an immersive environment, optionally unlike the first application described previously); accordingly, menu 2813 in FIG. 28G includes the selectable options described with reference to menu 2890, and further includes a selectable option (e.g., "BGND 5") to cause display of media 2834 in a media playback environment. Inputs 2880 and 2882 are optionally representative of selection inputs, as described in with reference to FIG. 28F, but directed to menu 2813 in FIG. 28G. In FIGS. 28G to 28H, menus 2877 and 2890 optionally do not include a selectable options that are selectable to change an immersive virtual environment included in three-dimensional environment 2802 in such figures to correspond to a different immersive virtual environment, because menus 2877 and 2890 are optionally directed toward improving visibility of media content in a current environment or displaying the media in a dedicated media playback environment.

In FIG. 28H, in response to the input 2835 in FIG. 28E, computer system 101 displays media 2834 at a docked position within three-dimensional environment 2802. As shown in the overhead view, media 2834 is optionally displayed with an updated position and scale (described further with reference to method 2900), relatively larger (e.g., 500 m, 1 km, 2 km, 3 km, 5 km, 10 km, 25 km, 50 km, or 100 km) and relatively further away (e.g., 500 m, 1 km, 2 km, 3 km, 5 km, 10 km, 25 km, 50 km, or 100 km) from viewpoint 2826. In some embodiments, the scale of media 2834 at the docked position is based on a relative field of view of a viewport of computer system 101, and/or a simulated depth of a currently displayed virtual scene. For example, in accordance with a determination that the media 2834 is docked within a virtual desert scene that spans one (simulated) square km, computer system 101 displays media 2834 at a first scale. In accordance with a determination that the media 2834 is docked within a virtual jungle that spans 10 (simulated) square km, computer system 101 displays media 2834 with a second scale, optionally larger than the first. In some embodiments, the relative scale of media 2834 displayed at the docked position is proportional, and/or otherwise based on the scale of an immersive virtual environment in which media 2834 is docked.

In FIG. 28H, computer system 101 displays controls 2828 at an updated position (e.g., centered) relative to viewpoint 2826, and at a respective depth that is relatively closer to viewpoint 2826 than media 2834 as shown in the overhead view. In FIG. 28H, controls 2828 include a selectable option 2837 to undock or de-dock. media 2834, returning media 2834 to its previous position illustrated in FIG. 28G. In FIG. 28H, computer system 101 displays interface 2806—the system user interface of the first type—and detects input 2841 directed to slider 2812. In some embodiments, controls 2828 in FIG. 28H include one or more same and/or different controls than controls 2828 in FIG. 28G (e.g., controls related to media 2834 optionally are similar, different, or the same while media 2834 is docked versus undocked). In FIG. 28H, in response to docking media 2834, computer system 101 increases the level of immersion of three-dimensional environment 2802 to accommodate the increased scale of media 2834. In FIG. 28H, computer system 101 detects input 2841 directed to slider 2812, such as a selection input air gesture performed with hand 2801, different from a respective input (e.g., a moving of the slider 2812) to change a system audio level.

Figure 28I:
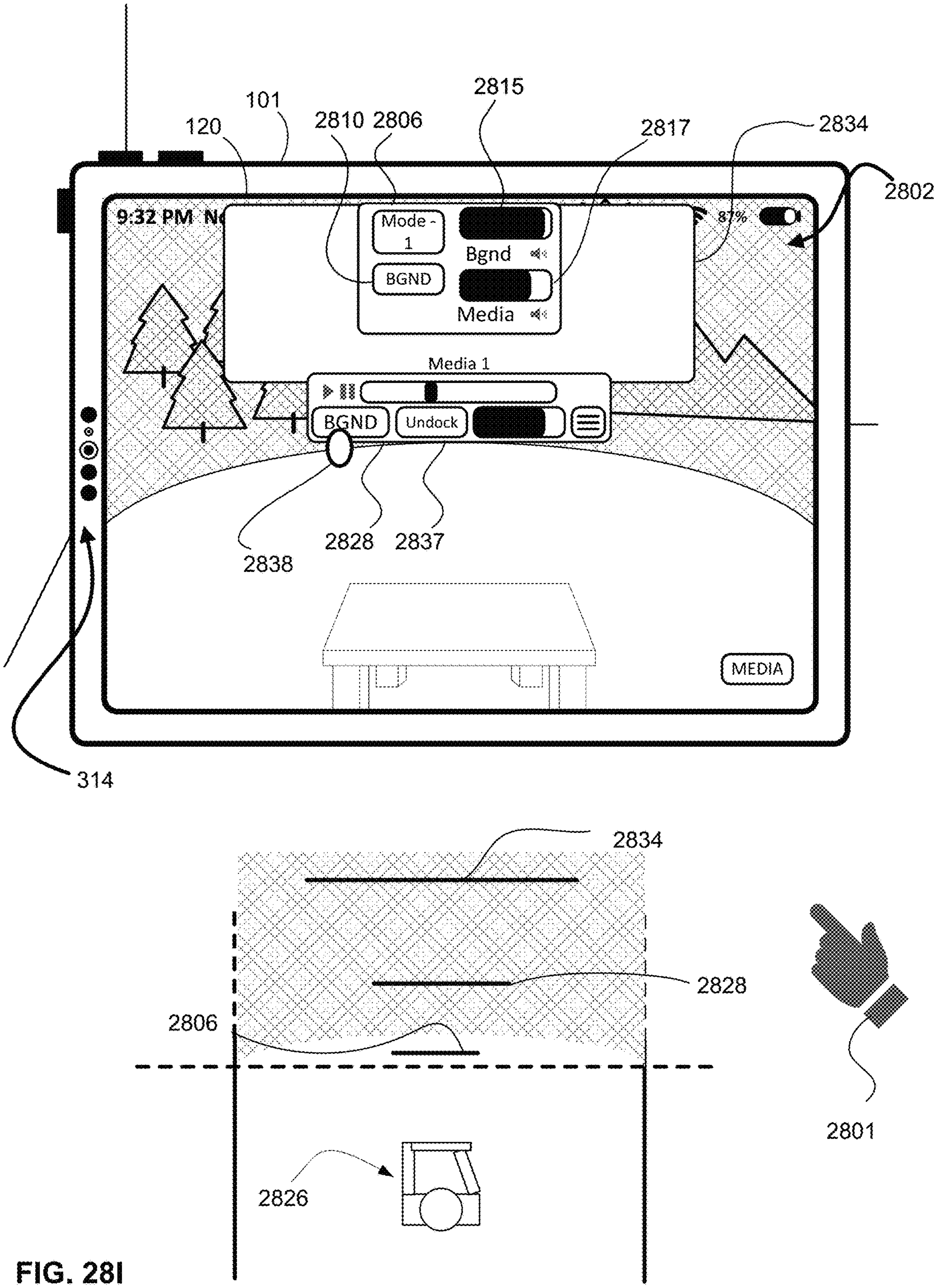

In FIG. 28I, in response to input 2841 detected in FIG. 28H, computer system 101 displays slider 2815—corresponding to a control for controlling a level of audio associated with three-dimensional environment 2802—and slider 2817—corresponding to a control for controlling a level of audio associated with media 2834 (the same audio level represented in controls 2828 in FIG. 28I). In some embodiments, in response to detecting input directed to a respective slider, computer system 101 changes the level of volume (e.g., of an environment and/or of media content) independently of the level of another volume level (e.g., of media content, and/or the environment). In FIG. 28I, computer system 101 detects input 2838 directed to a selectable option in controls 2828 that corresponds to displaying a menu of three-dimensional environments available to display via display generation component 120.

Figure 28J:
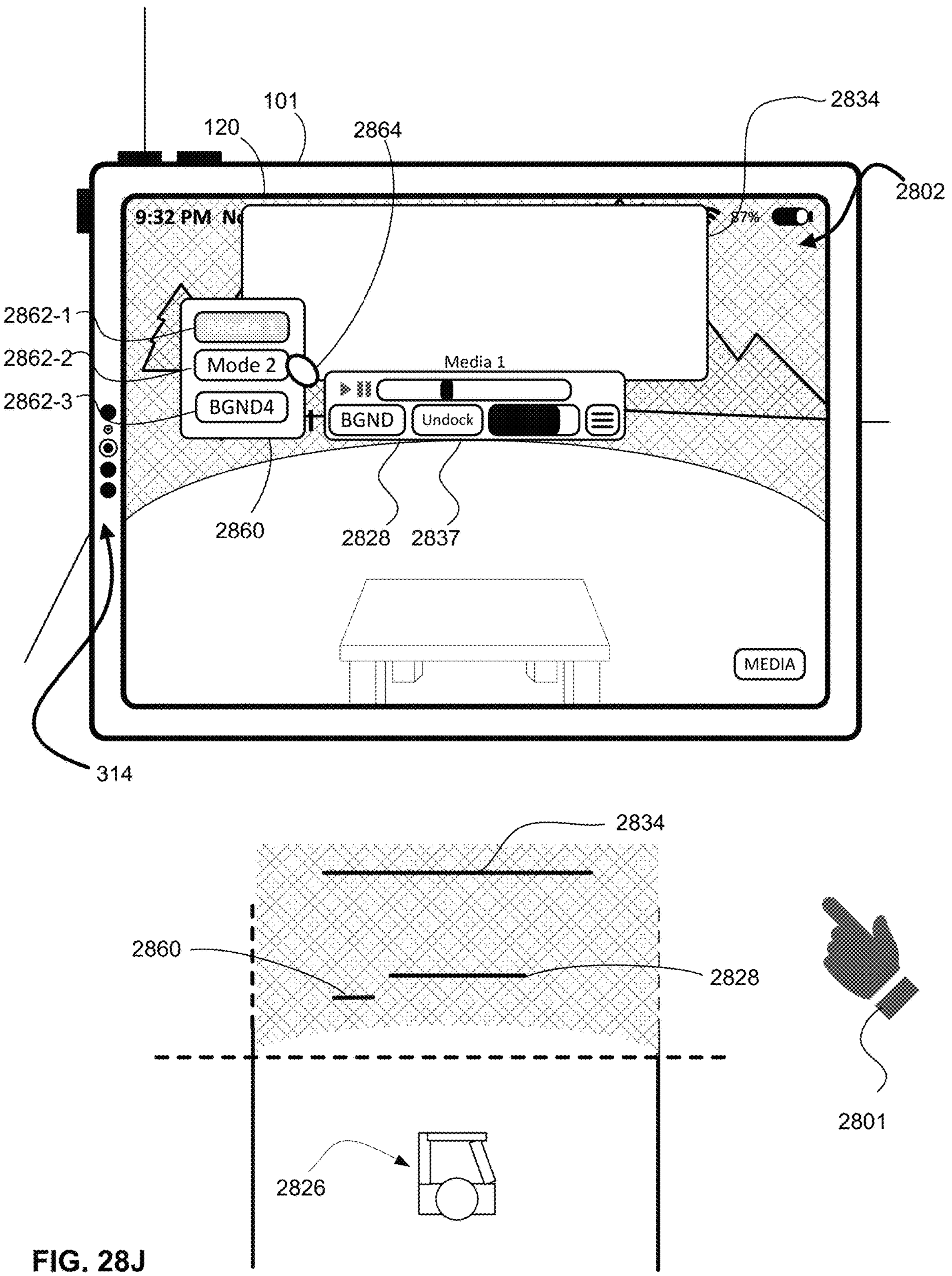
Figure 28K:
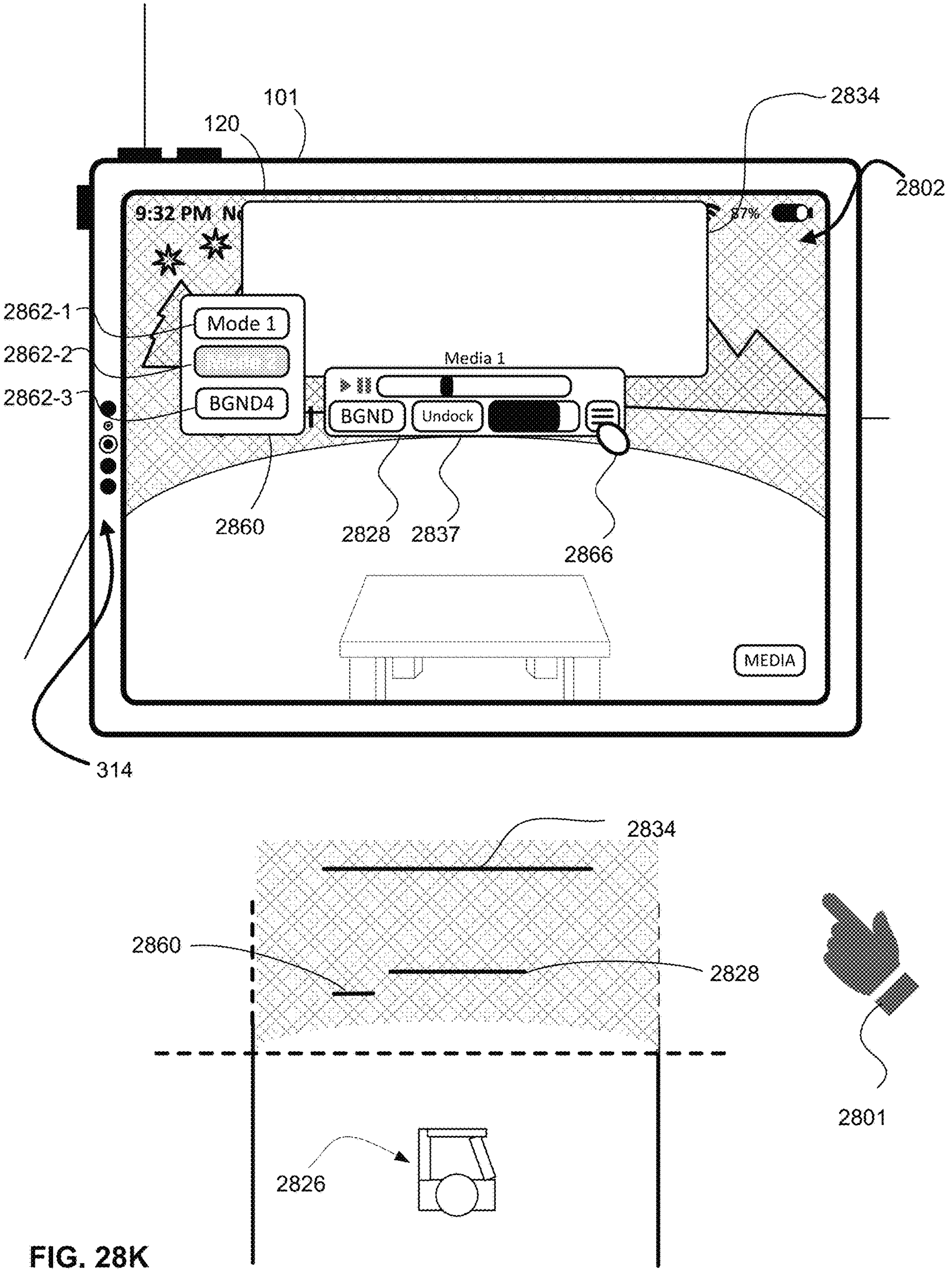

In FIG. 28J, computer system 101 displays a menu 2860 in response to input 2838 in FIG. 28I associated with available visual appearance changes of three-dimensional environment 2802. For example, menu 2860 has one or more characteristics of menu 2813 described with reference to FIG. 28G. Selectable option 2868-1, for example, is selectable to cause display of three-dimensional environment 2802 in the first mode, selectable option 2868-2, for example, is selectable to cause display of three-dimensional environment 2802 in the second mode, and selectable option 2868-3, for example, is selectable to cause display of media 2834 in a media playback environment. In FIG. 28J, computer system 101 detects input 2864 directed to selectable option 2862-2, and in FIG. 28K, computer system 101 updates three-dimensional environment 2802 to assume an updated visual appearance, such as in accordance with a nighttime override setting. In FIG. 28K, computer system 101 detects an input 2866 directed to a selectable option included in controls 2828, that is selectable to display additional controls associated with media 2834.

Figure 28L:
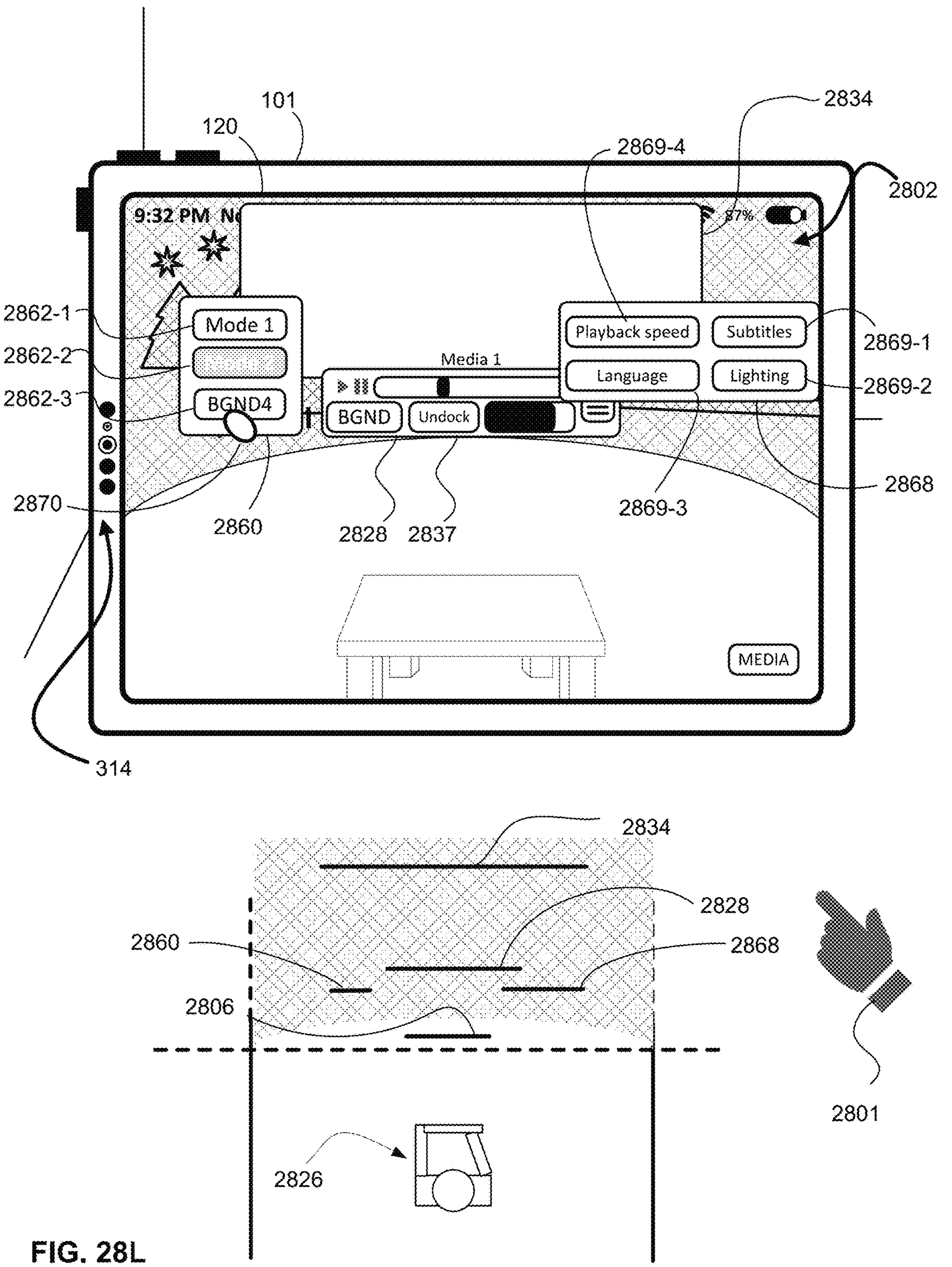

In FIG. 28L, in response to input 2866 detected in FIG. 28K, computer system 101 displays menu 2868. Menu 2868 includes additional controls associated with media 2834, and is displayed relative to viewpoint 2826 closer than media 2834. Menu 2868, for example, includes selectable options that are selectable to display additional menus and/or perform functions, such as selectable option 2869-1 corresponding to a subtitles menu, selectable option 2869-2 corresponding to a simulated lighting menu associated with three-dimensional environment 2802, selectable option 2869-3 corresponding to a menu associated with language of media 2834, and selectable option 2869-4 corresponding to a menu associated with playback speed of media 2834. It is understood that additional or alternative selectable options are optionally included in menu 2868. In FIG. 28L, computer system 101 detects input 2870 provided by hand 2801, corresponding to a request to display media 2834 in a media playback environment.

Figure 28M:
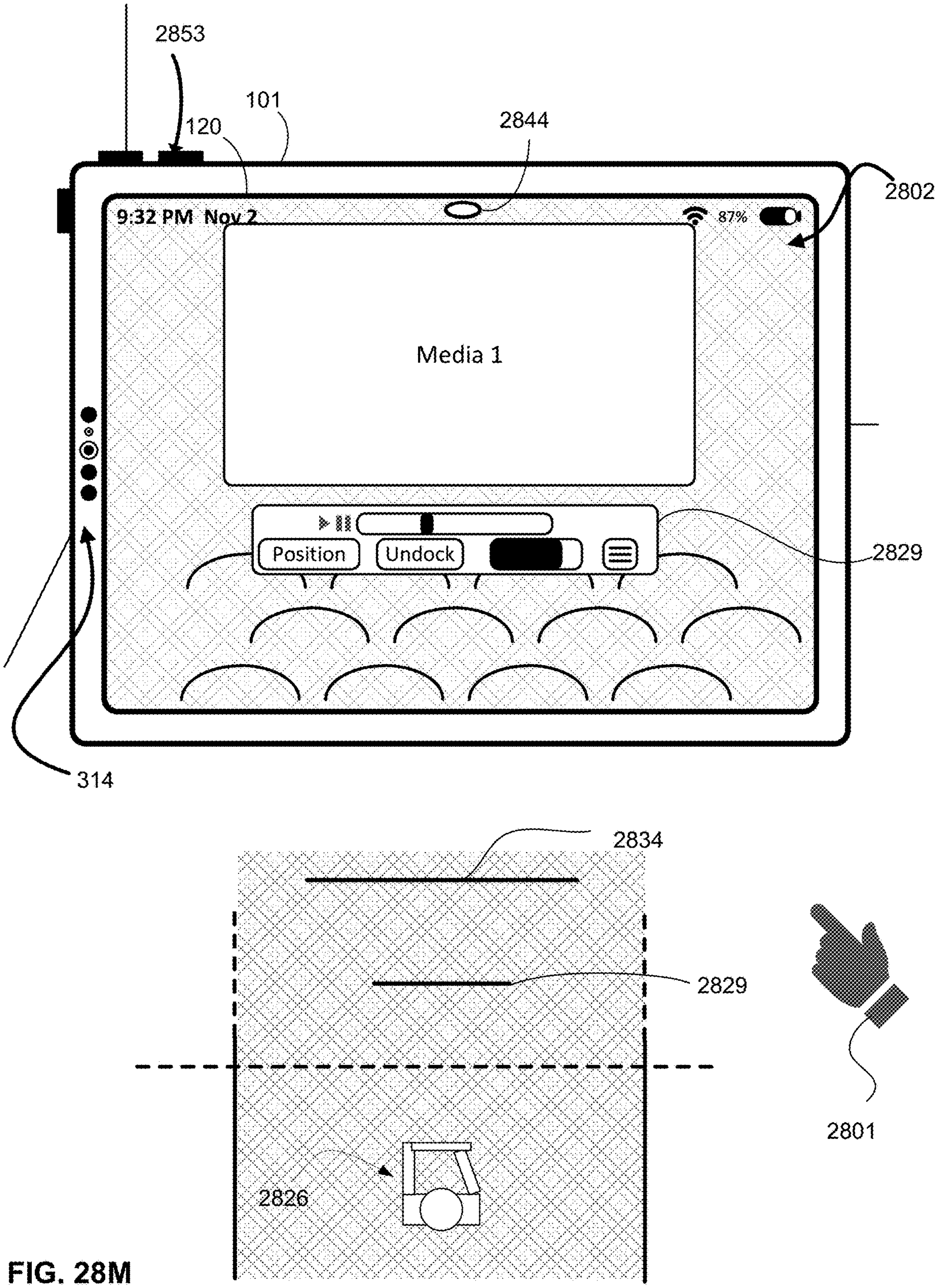

In FIG. 28M, computer system 101 displays media 2834 in a media playback environment. It is understood that displaying, and/or changing display of media 2834 as described in FIGS. 28M-28O optionally refer to display of media 2834 in three-dimensional environment 2802 that includes or corresponds to the media playback environment. Likewise, description of the media playback environment at times refers to the media playback environment displayed and/or included in three-dimensional environment 2802. In FIG. 28M, the media playback environment includes an immersive virtual scene, as illustrated by the shading surrounding viewpoint 2826 in the overhead view, such that in response to detecting changes in user viewpoint 2826 relative to three-dimensional environment 2802, computer system 101 displays a corresponding portion of the media playback environment. In some embodiments, the media 2834 is displayed at the respective (e.g., docked) position within the media playback environment. In FIG. 28M, media 2834 displayed with an updated scale (e.g., bigger than when media 2834 is not docked, and optionally bigger than when docked in FIG. 28L). In FIG. 28M, media 2834 is displayed concurrently with controls 2829, similar to controls 2828 in FIG. 28L, including additional, or alternative, and/or some combination of controls 2828. For example, in FIG. 28M, controls 2829 includes a selectable option to change a spatial arrangement between viewpoint 2826 media 2834, described further with reference to methods 2000 and/or 2100. Additionally or alternatively, controls 2829 include playback controls, a scrubber bar, and/or a volume slider. In FIG. 28M, input 2844 is detected—having one or more characteristics of input 2804—requesting display of the first type of user interface. In FIG. 28M, input 2853 (e.g., a rotating of a rotational button such as a mechanical crown that is configured to change environmental immersion, a pressing of a button, and/or a voice command) requesting a changing of a level of environmental immersion is detected.

Figure 28N:
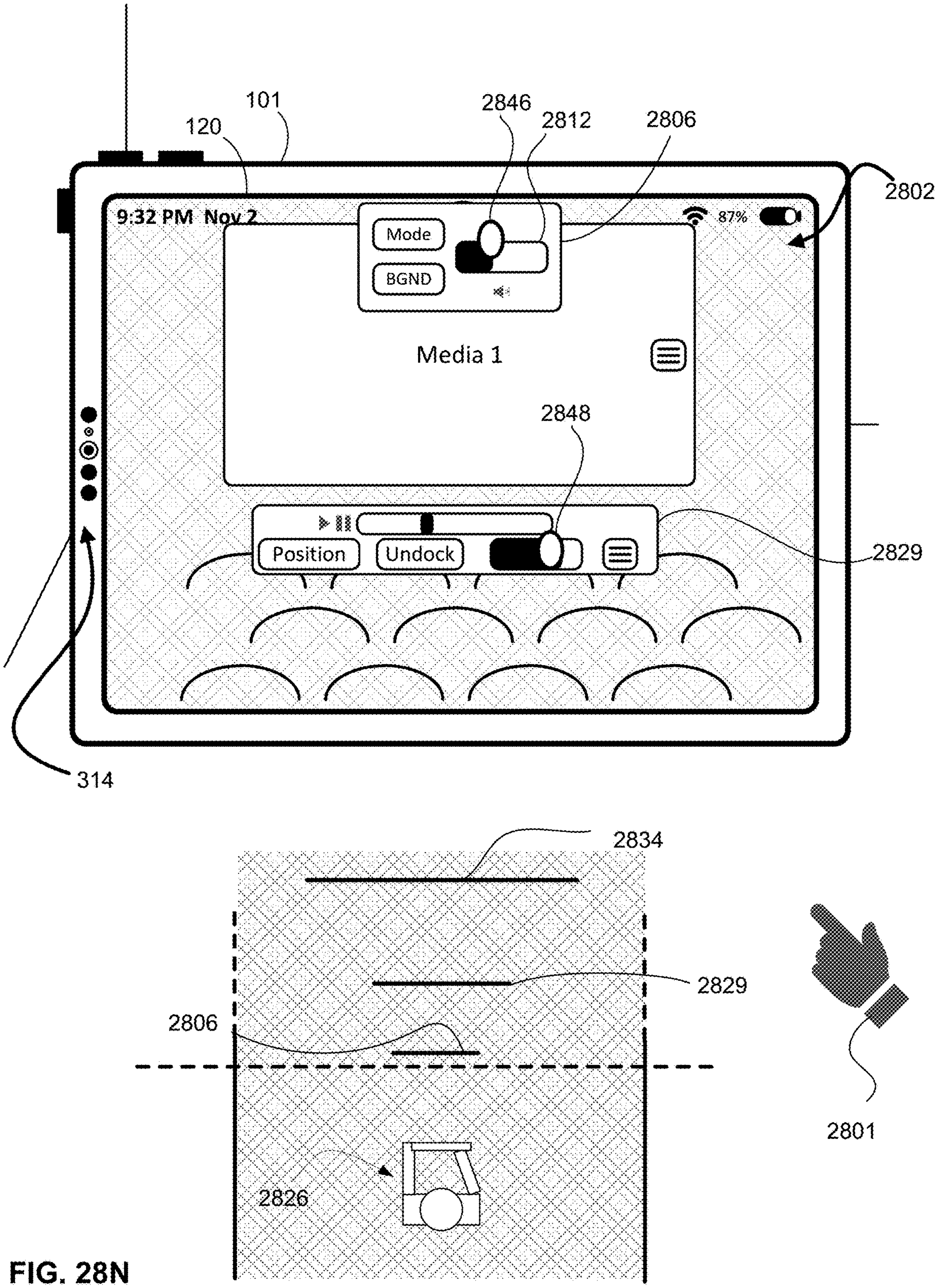
Figure 28O:
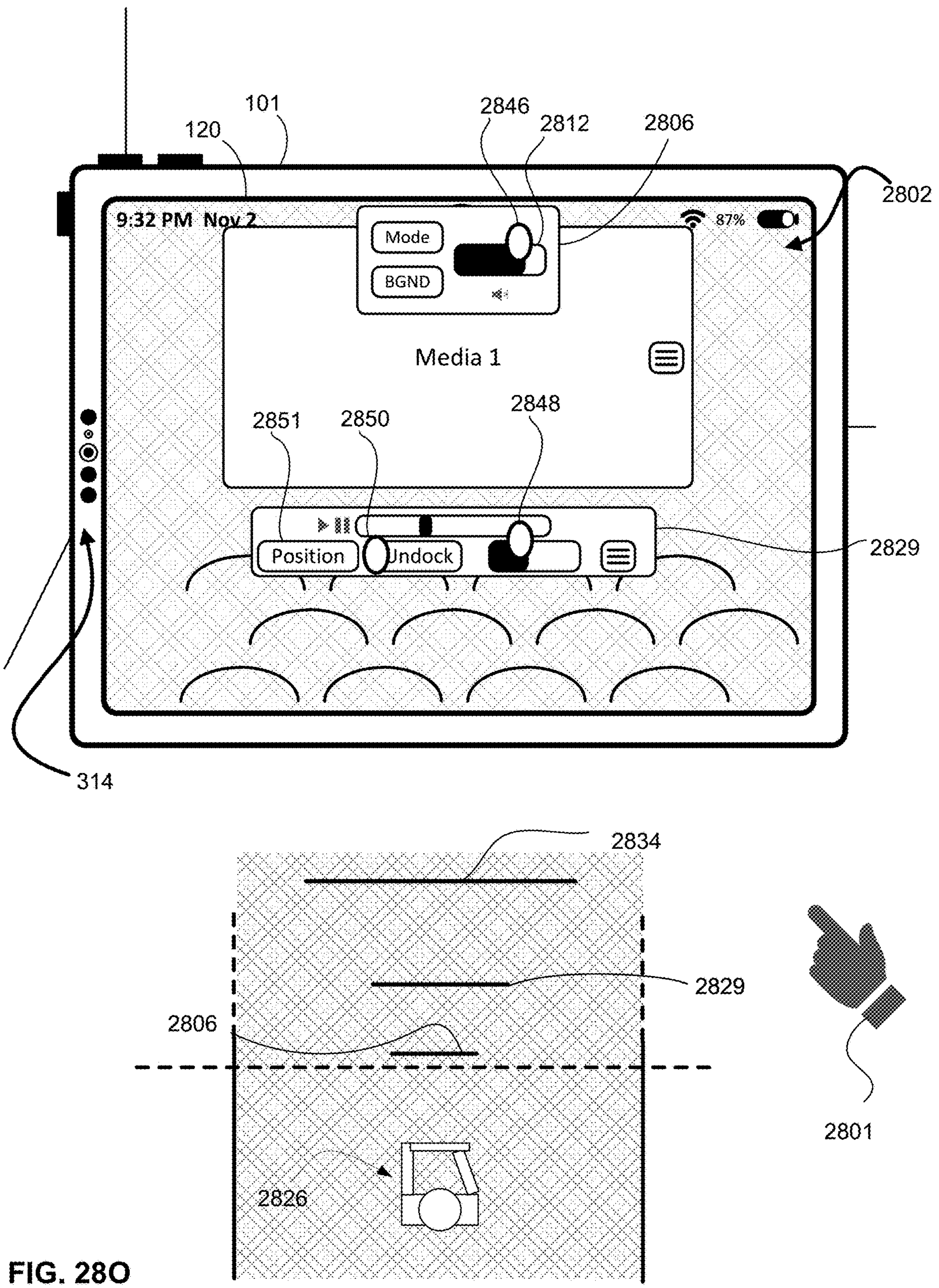

In FIG. 28N, interface 2806 is displayed in response to detecting input 2844 in FIG. 28M, and environmental immersion of the media playback environment is maintained (despite detecting input 2853 in FIG. 28M). As described previously interface 2806 includes slider 2812, corresponding to a control for controlling a system level of system audio. It is understood, however, that slider 2812 is merely representative of a control for changing a level of audio (e.g., environmental audio, instead of system audio levels). Accordingly, in FIG. 28N, slider 2812 corresponds to a control for adjusting a level of environmental audio. In FIG. 28N, computer system 101 detects input 2846 changing the environmental audio level, and detects input 2848 directed to a slider included in controls 2829, corresponding to an audio level of media 2834. In FIG. 28P, in response to the inputs detected in FIG. 28N, the slider 2812 is changed, increasing the level of audio of the three-dimensional environment 2802, and the slider included in controls 2829 is changed, decreasing the level of audio of media 2834. Thus, in some embodiments, media volume levels are different from environmental audio levels. In FIG. 28O, input 2850 is detected directed to a selectable option included in controls 2829, that is selectable to undock media 2834 from the docked position shown in FIG. 28O.

In FIG. 28P, in response to input 2850, computer system 101 undocks media 2834, and reverts three-dimensional environment 2802 to assume its visual appearance—including a previous time of day setting—that computer system 101 displayed before the media playback environment was displayed. For example, the visual appearance of three-dimensional environment 2802 in FIG. 28P is similar or the same as shown in FIG. 28L, such that three-dimensional environment 2802 is displayed with a nighttime visual appearance. Additionally, when undocking media 2834 and ceasing display of the media playback environment, computer system 101 displays menu 2860 in FIG. 28P, including a plurality of selectable options (e.g., 2862-1, 2862-2-2, and 2862-3) described previously with reference to FIG. 28J.

Figure 28Q:
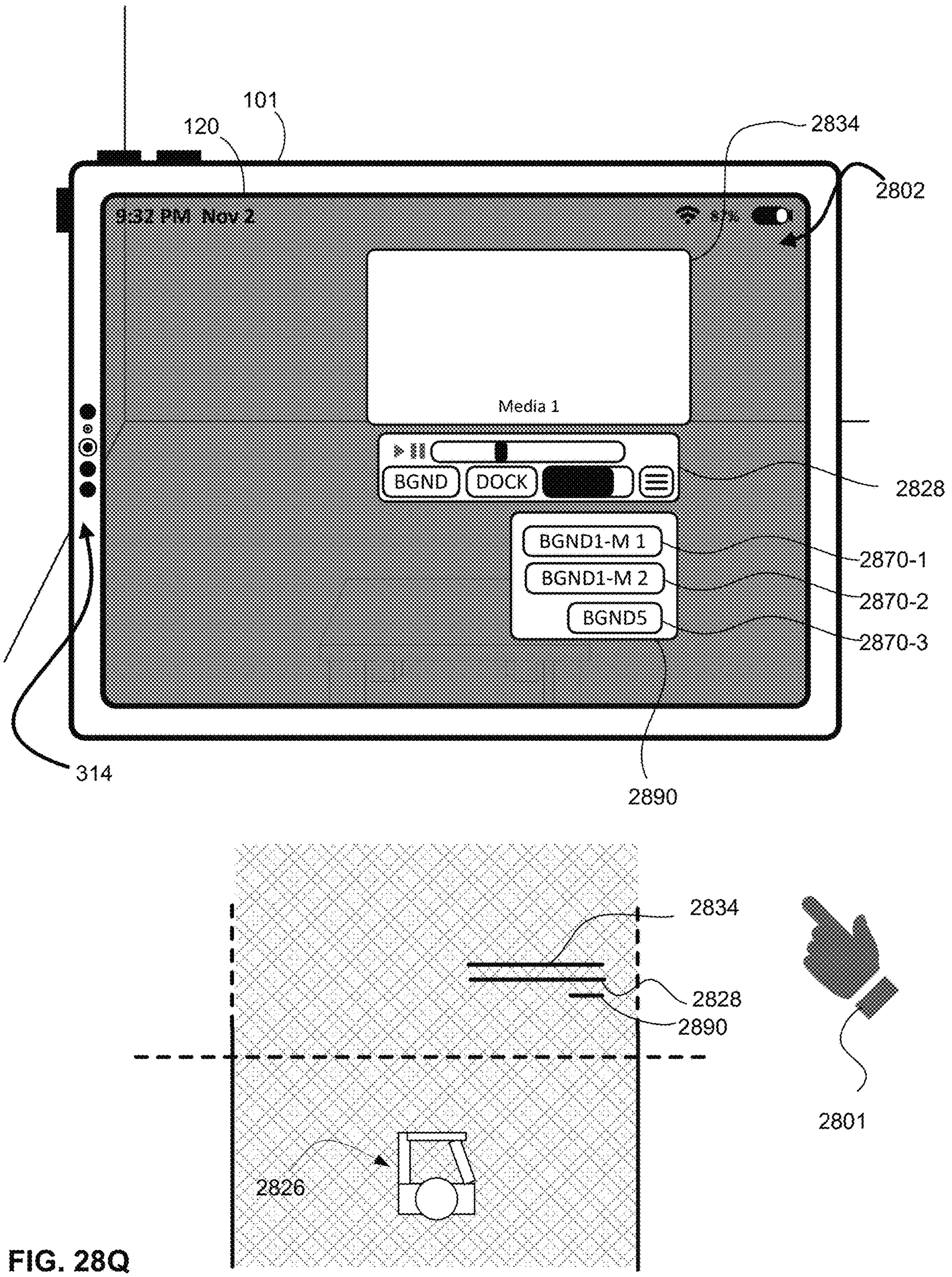

In FIG. 28Q, computer system 101 displays three-dimensional environment 2802 without displaying an immersive visual scene. For example, display generation component 120 is displayed with a fill pattern overlaying representations of the user's physical environment (e.g., with a relatively high degree of opacity, and/or a color) in FIG. 28Q, and entirely surrounding viewpoint 2826 of the user as shown in the overhead view. In FIG. 28Q, computer system 101 displays media 2834 and accompanying controls 2828, as described further herein. In FIG. 28Q, computer system 101 displays a menu 2890, including selectable options that are selectable to change visual appearance of three-dimensional environment 2802. Menu 2890 optionally includes selectable option 2870-1, corresponding to a first system environment (e.g., the virtual mountain and forest scene illustrated in FIG. 28A) displayed with a first time of day setting (e.g., daytime), selectable option 2870-2, corresponding to the first system environment displayed with a second time of day setting (e.g., nighttime), and selectable option 2870-3, corresponding to the media playback environment. In FIG. 28Q, menu 2890 includes such options in accordance with a determination that the computer system 101 is displaying menu 2890 associated with media 2834, rather than a system user interface of the first type (or another type of system user interface). It is understood that in response to detecting input directed to such selectable options, computer system 101 ceases display of the fill displayed in FIG. 28Q, and initiates display of a system environment (e.g., the mountain and forest, or the media playback environment) based on the selected selectable option.

Figure 28R:
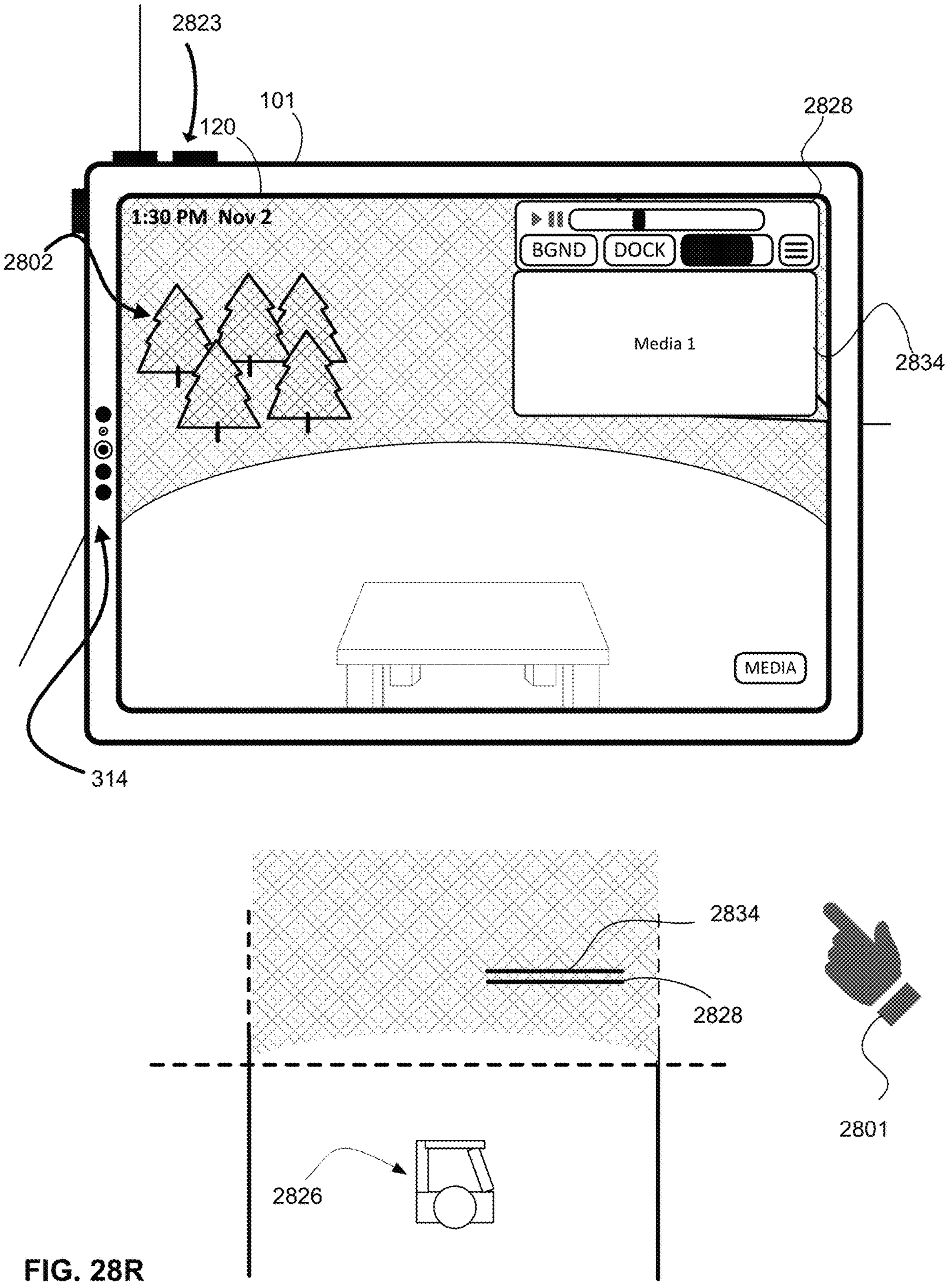
Figure 28S:
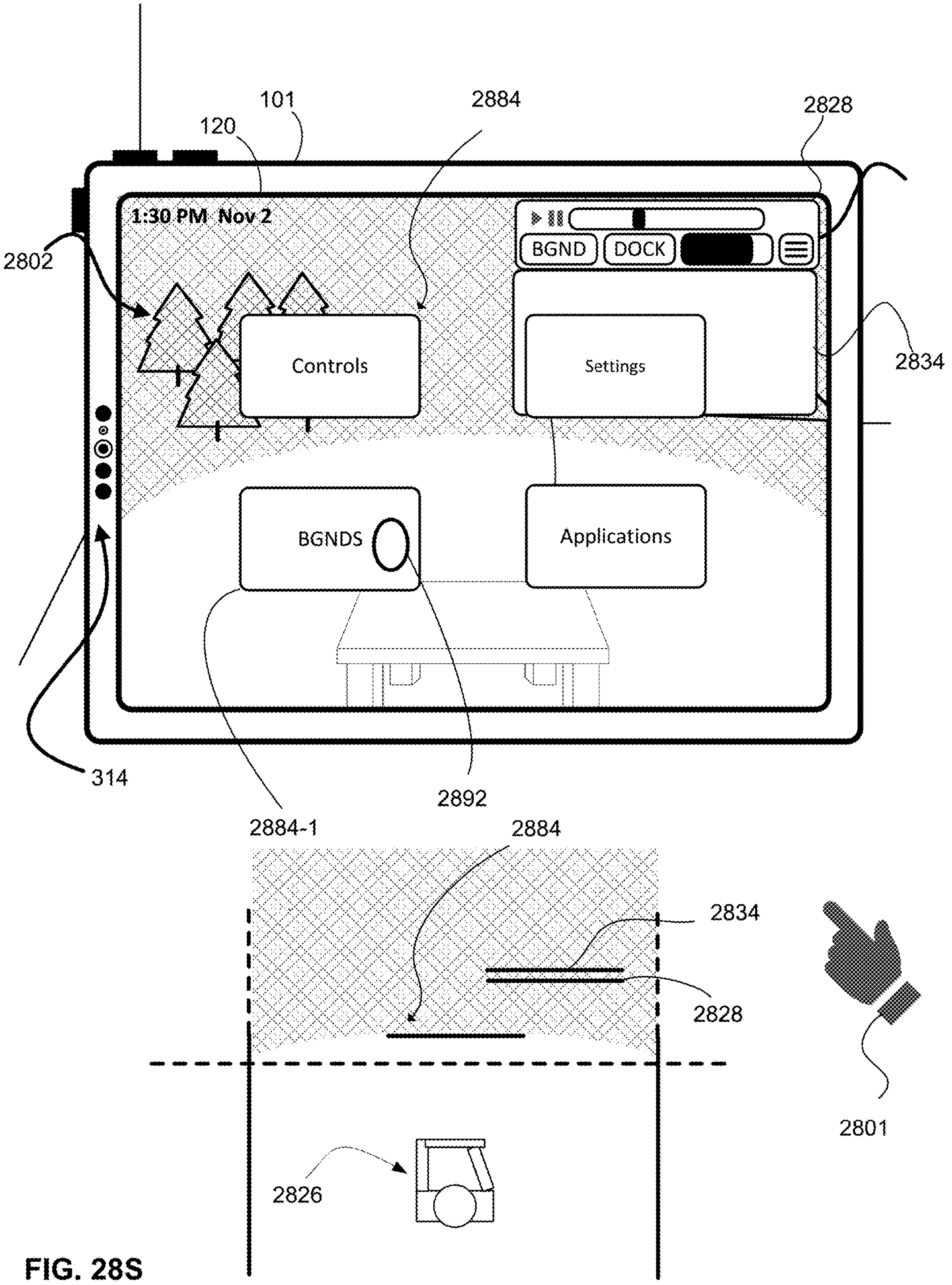
Figure 28T:
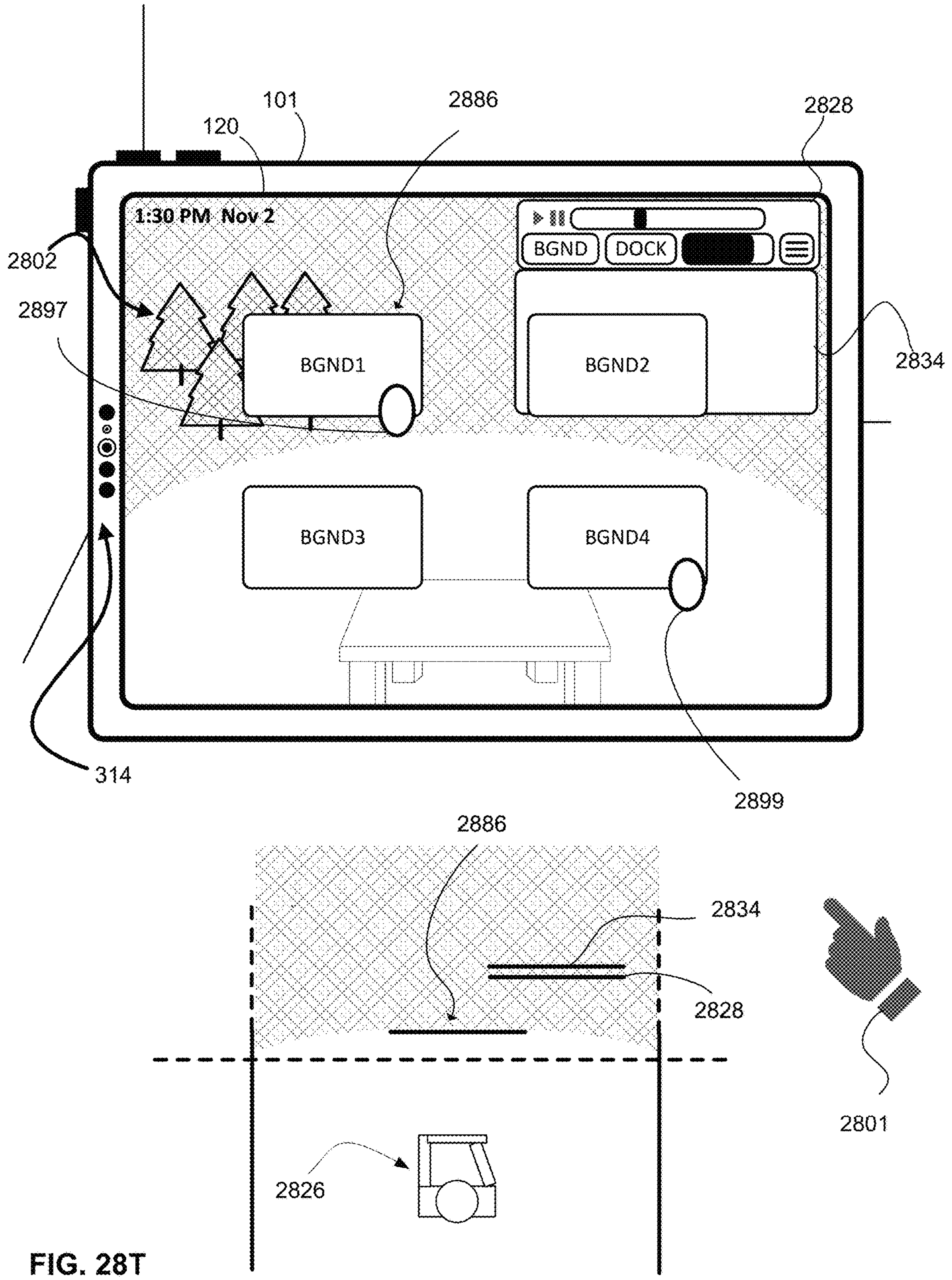
Figure 28U:
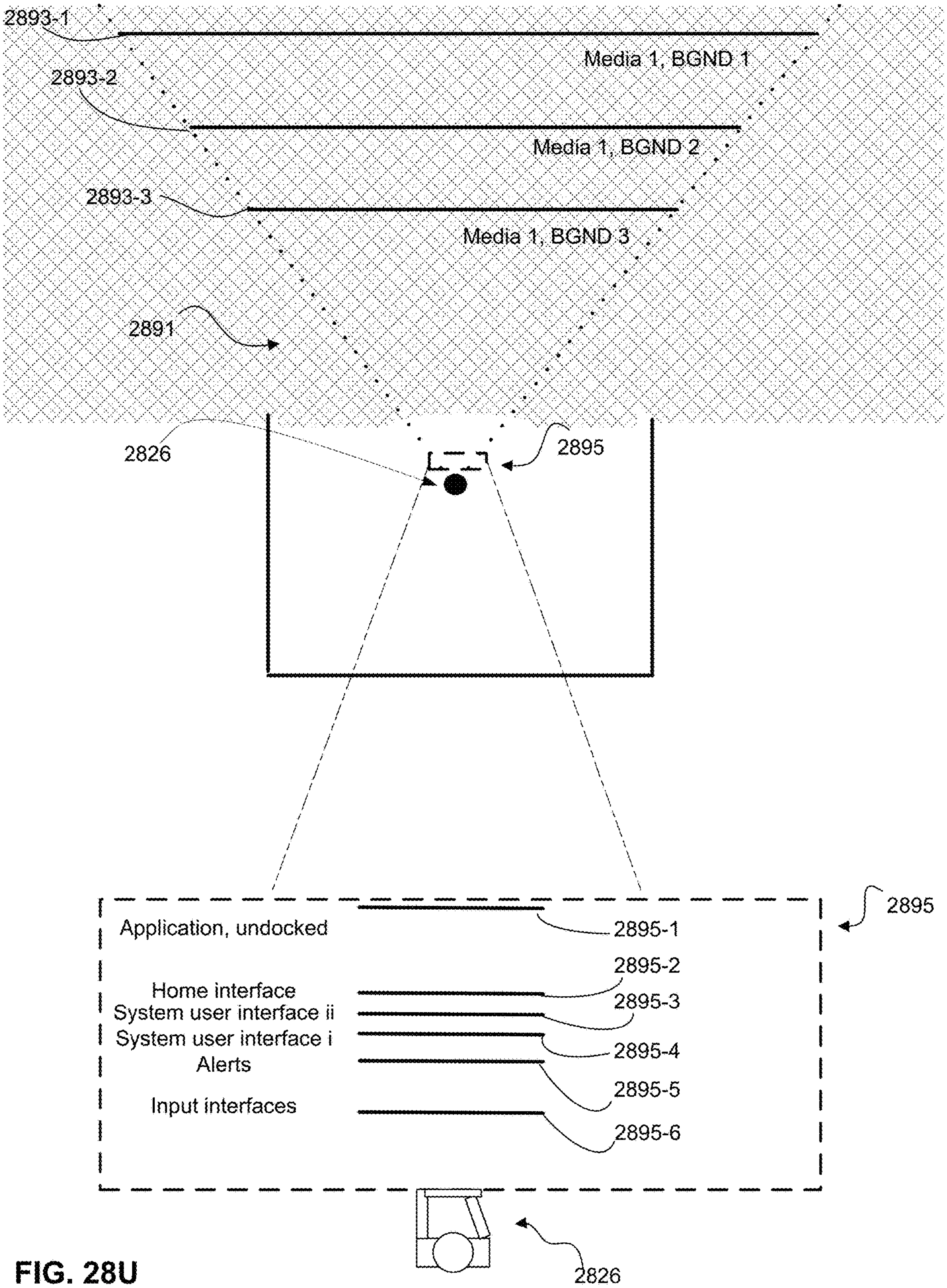

FIGS. 28R-28T illustrate embodiments of computer system 101 displaying a system user interface of a second type.

In FIG. 28R, computer system 101 detects input 2823, such as input including a voice command, a pressing of a mechanical crown button, and/or sequence of pressing one or more pushbuttons, requesting display of a home user interface. In FIG. 28S, in response to input 2805 detected in FIG. 28B and/or in response to input 2823 in FIG. 28R, computer system 101 displays interface 2884. Interface 2884 is optionally a system user interface of a second type, that optionally is displayed relatively close to viewpoint 2826 of the user (e.g., as shown in the overhead view) in FIG. 28S. In some embodiments, interface 2884 includes one or more selectable options, such as selectable option 2884-1 in FIG. 28S—selectable to display representations and/or buttons corresponding to one or more virtual environments. The selectable options additionally or alternatively are selectable to cause display of a controls associated with computer system 101, settings associated with a user account and/or computer system 101, and/or a menu of applications available to be displayed by computer system 101. In FIG. 28S, computer system 101 detects input 2892 directed to selectable option 2884-1.

In FIG. 28T, computer system 101 displays interface 2886, including selectable options that are respectively selectable to display three-dimensional environments (e.g., immersive virtual scenes). For example, interface 2886 includes four selectable options, respectively selectable to cause display of a first, second, third, or fourth three-dimensional environment. In some embodiments, interface 2886 includes respective selectable options such that the user can access three-dimensional environments that are not accessible via menus associated with media 2834, such as described with reference to menu 2890 and/or 2877 described herein. In FIG. 28T, computer system 101 detects input 2897 directed to a first selectable option, and in response, replaces a current immersive scene with a first immersive scene and/or initiates display of the first immersive scene. Alternatively, in FIG. 28T, computer system 101 detects input 2899 directed to a second selectable option, and in response, replaces the current immersive scene with a second immersive scene, different from the first immersive scene.

FIG. 28U illustrates an exemplary diagram, indicating simulated depths of various user interfaces and/or information that are displayed by computer system 101 (discussed with reference to FIGS. 28A-28T) relative to viewpoint 2826. It can be appreciated that the depths of the user interfaces and/or information are optionally simulated depths, determined relative to a simulated coordinate and/or placement scheme that are determined relative to viewpoint 2826.

In some embodiments, computer system 101 changes a relative scale of docked media content in accordance with a currently displayed virtual scene. For example, the dashed lines included in view 2891 indicate a simulated field-of-view (e.g., via a viewport, via a passive or active pass-through) of a virtual three-dimensional environment (e.g., 30, 45, 60, or 75 degrees from a vector extending through a center of viewpoint 2826) that docked media content will occupy. For example, representation 2893-1 through 2893-3 represent a width of first media content (e.g., media 2834) will occupy, and a relative depth at which media content will be displayed relative to viewpoint 2826. Representation 2893-1, for example, is displayed within a first and largest three-dimensional environment (e.g., having a greatest simulated area). Accordingly, the media content is displayed at a largest width and at a furthest depth, compared to representation 2893-2 and representation 2893-3. Representation 2893-2 corresponds to a width and distance of the same media content, docked in a second three-dimensional environment that is different from and smaller (e.g., having a smaller simulated area) than the first three-dimensional environment; accordingly, the width and depth of representation 2893-2 is less than representation 2893-1. Representation 2893-3 corresponds to an even yet smaller, third three-dimensional environment; accordingly, representation 2893-3 is displayed at a smallest relative scale and/or depth relative to viewpoint 2826. It is understood that the aspect ratio of the media content is optionally fixed, or variable, relative to the width of the docked media content. It is further understood that the width, depth, and/or scale of the docked media content scales in accordance with characteristics of the three-dimensional environment, such as the simulated area of the three-dimensional environment. In some embodiments, the depth of the docked media content is 10 m, 100 m, 1 km, 2 km, 3 km, 5 km, 10 km, 25 km, 50 km, or 100 km relative to viewpoint 2826.

In FIG. 28U, a computer system (e.g., computer system 101 described at length herein) displays virtual content at different relative depths, such as system user interfaces and/or visual indications, and/or undocked content. For example, relative to the viewpoint 2826, an expanded view of a portion of the user's three-dimensional environment is enclosed in by a dashed region 2895. Region 2895 of the user's three-dimensional environment optionally is relatively closer to the viewpoint 2826 (e.g., 0.5, 1, 2.5, or 5 m), than docked media content. For example, in region 2895, representation 2895-1 represents a first depth of virtual objects (e.g., including user interfaces of application and/or media content, optionally 2 m) from the user's viewpoint 2826, such as media 2834 in FIG. 28E. Representation 2895-2 optionally corresponds to a second type of system user interface, such as the home user interface illustrated in FIG. 28S, displayed at a second depth (e.g., 1.2 m) relative to the viewpoint of the user. Representation 2895-3 optionally corresponds to a third type of user interface, such as menus associated with (e.g., displayed from) the first type of system user interface illustrated in FIG. 28B, displayed at a third depth (e.g., 1.1 m) relative to the viewpoint of the user. Representation 2895-4 optionally corresponds to a fourth type of user interface, such as the first type of user interface illustrated in FIG. 28S, displayed at a fourth depth (e.g., 1 m) relative to the viewpoint of the user. Representation 2895-5 optionally corresponds to a virtual object, such as notification or alert presented by the computer system, displayed at a fifth depth (e.g., 0.9 m) relative to the viewpoint of the user. Representation 2895-6 optionally corresponds to a fifth type of user interface, such as an input user interface (e.g., virtual keyboards, trackpads, simulated handwriting fields, and/or number pads), displayed at a sixth depth (e.g., 0.5) relative to the viewpoint of the user. It is understood that the relative depths, hierarchy of the depths, and/or the dimensions of the representation depicted within region 2895 are optionally different from as expressly disclosed and illustrated, without departing from the scope of the disclosure. For example, system user interface are optionally different relative widths, relatively closer to viewpoint 2826, and/or relatively further away from viewpoint 2826 than illustrated in FIG. 28U.

FIG. 29 is a flowchart for illustrating a method 2900 of presenting user interfaces and controls associated with media content displayed within three-dimensional environments in accordance with some embodiments. In some embodiments, the method 2900 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 2900 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 2900 are, optionally, combined and/or the order of some operations is, optionally, changed.

In some embodiments, method 2900 is performed at a computer system in communication with one or more input devices and a display generation component, such as computer system 101 in communication with image sensors 314 and display generation component 120. For example, the computer system, one or more input devices, and/or display generation component have one or more characteristics of computer system(s), one or more input device(s), and/or display generation component(s) described with reference to methods 800, 1000, 1200, 1400, 1600, 1800, 2000, 2100, 2300, 2500, and/or 2700.

In some embodiments, while displaying, via the display generation component, media content (e.g., media content having one or more characteristics of media content described with reference to methods 1200, 2000, 2100, 2500, and/or 2700) in a three-dimensional environment, such as media 2834 in FIG. 28E, the computer system detects (2902*a*), via the one or more input devices, a first input corresponding to a request to display one or more first selectable options that are selectable to modify an appearance of the three-dimensional environment, such as input 2858 in FIG. 28E. For example, the computer system optionally displays media content such as one or more images, such as static images and/or videos, via a media playback user interface included in a virtual object that is displayed within the three-dimensional environment (e.g., of the computer system). In some embodiments, the three-dimensional environment is a currently visible three-dimensional environment that includes at least a portion of a virtual environment, a representation of the physical environment of the user (e.g., via a passthrough), virtual content (e.g., additional virtual objects, virtual environments, and/or immersive virtual content, described with reference to method 2300), and/or has one or more characteristics of three-dimensional environments described with reference to methods 800, 1000, 1200, 1400, 1600, 1800, 2000, 2100, 2300, 2500, and/or 2700. In some embodiments, the computer system detects one or more inputs such as the first input, requesting display of one or more menus and/or virtual buttons to modify the appearance of the three-dimensional environment (e.g., to initiate and/or modify display of an immersive virtual scene), and/or to modify a level of visual prominence of the three-dimensional environment (e.g., described with reference to method 2300). For example, in response to detecting an air gesture (e.g., an air pinch including a contacting of fingers of a hand of a user of the computer system, an air spreading of one or more fingers, an air first including curling of one or more fingers, and/or an air swiping including movement of the hand of the user), a selection input detected via an input device of the one or more input devices (e.g., a clicking of a mouse while a cursor is directed to a portion of the three-dimensional environment and/or a selectable option (e.g., labeled "environments"), a contacting of a housing of the input device (e.g., on a touch-sensitive surface of the input device), a voice command detected by the computer system, and/or in accordance with a determination that attention of the user of the computer system (e.g., gaze of the user) dwells on a portion of the three-dimensional environment for a period of time greater than a threshold amount of time (e.g., 0.05, 0.01, 0.5, 0.1, 1, 3, 5, 10, 15, or 30 seconds)), the computer system optionally displays a menu (e.g., a control user interface, having one or more characteristics described further with reference to methods 800, 1000, and/or 1200) including one or more virtual buttons (e.g., the one or more selectable options) to modify one or more portions of the three-dimensional environment (e.g., partially or entirely). In some embodiments, the menu and/or one or more inputs to interact with (e.g., select, initiate display of, cease display of, and/or otherwise direct input toward) the menu have one or more characteristics of similar user interface(s) and/or input(s) described with reference to methods 800, 1000 and/or 1200.

In some embodiments, in response to detecting the first input, the computer system displays (2902*b*), via the display generation component, the one or more selectable options. For example, in response to detecting the first input, the computer system optionally displays the menu and/or displays one or more standalone virtual buttons. In some embodiments, the menu and/or one or more options are displayed overlaid over the media content, and/or in proximity (e.g., arranged around a border) of the media content. In some embodiments, the menu and/or one or more of the selectable options are displayed separately from the media content, such as in a control user interface displayed concurrently while the three-dimensional environment is visible.

In some embodiments, the one or more selectable options include a first selectable option that is selectable to initiate a process to display the media content in a system environment associated with an operating system of the computer system, wherein the system environment is configured to be displayed by the computer system for a plurality of different types of virtual content (2902*c*) (e.g., application windows, three-dimensional objects, system user interfaces and/or representations of other participants in a real-time communication session) (e.g., independent of whether the computer system is displaying media content and/or when the computer system is not displaying media content), such as selectable option 2862-1 in FIG. 28J. For example, the first selectable option optionally is selectable to initiate display of a system virtual environment (e.g., having one or more characteristics of virtual environment(s), system environment(s), and/or system virtual environment(s) described with reference to methods 800, 1000, 1200, 1400, 1600, 1800, 2300, 2500, and/or 3100). In some embodiments, a system environment is a three-dimensional environment that includes representations of a physical environment of the computer system (e.g., via a passthrough) and/or virtual content (e.g., one or more virtual objects, selectable options, menus, and/or at least a portion of a virtual scene (e.g., a virtual beach, a virtual lake, or a virtual forest)), where the system environment is associated with an operating system of the computer system. In some embodiments, the system environment comprises or consists of a virtual environment and/or scene, and/or does not comprise a representation of the physical environment of the computer system. For example, the system environment is optionally a virtual scene that is associated with a time-of-day setting included in one or more user settings of the operating system (e.g., a time of day described with reference to method 1000), where the time-of-day setting affects a visual appearance of the environment (e.g., a brightness and/or darkness of the environment, virtual content included in the environment, simulated line-of-sight relative to a viewpoint of the user of the computer system, and/or one or more characteristics of a visual appearance of environments described further with reference to methods 800, 1000, 1200, 1400, 1600, 1800, 2300, 2500, and/or 3100). In some embodiments, an appearance and/or the display of the system virtual environment is independent of whether or not the computer system is currently displaying media content (e.g., photos, video, and/or virtual objects including user interfaces including such media content, and/or media content having one or more characteristics of media content described with reference to methods 1200, 2000, 2100, 2500, and/or 2700). For example, while displaying a menu corresponding to a control user interface including one or more selectable options (e.g., initially invoked in response to detecting a request, described further below and with reference to method 3100), including the first selectable option, the computer system optionally detects a selection of the first selectable option (e.g., an air gesture directed to the first selectable option (e.g., an air pinching contacting several fingers, an air pointing of a finger of the user, and/or an air squeezing of one or more fingers), a clicking of a button (included in the computer system and/or in a device in communication with the computer system) and/or a contacting of a trackpad while a cursor is directed to the first selectable option, and/or a voice command specifying selection of the first selectable option), while media content is displayed (or is not displayed). In response to detecting the selection, the computer system optionally displays the system environment in accordance with a determination that media content is currently displayed and/or in accordance with a determination that media content is not being displayed. In some embodiments, if media content is displayed when the selection is detected, the computer system maintains display of the media content, ceases display of the media content, and/or displays the media content at an updated position within the three-dimensional environment. In some embodiments, when media content is not displayed when the selection of the first selectable optional is detected, the computer system displays the system user environment without media content. Thus, the computer system optionally displays the system user environment regardless of whether or not media content is displayed when one or more inputs are detected requesting display of the system user environment, and optionally continues to display (or does not display) media content concurrently with the requested system user environment in response to detecting the one or more inputs.

In some embodiments, the one or more selectable options include a second selectable option, different from the first selectable option, that is selectable to initiate a process to display the media content in a media playback environment (e.g., an environment having one or more characteristics of environment(s) described with reference to methods 2000 and/or 2100), different from the system environment, wherein the media playback environment is restricted to being displayed by the computer system when the computer system is displaying media content (2902*d*) (e.g., the media playback environment is not available to be used when the computer system is not displaying media content), such as selectable option 2862-3 in FIG. 28J. For example, the second selectable option is included in the control user interface and/or menu, and is optionally displayed concurrently with the first selectable option. In some embodiments, in response to detecting selection of the second selectable option, the computer system ceases display of a currently displayed environment (e.g., the system user environment, and/or a representation of the physical environment of the computer system), and/or initiates display of an environment for presenting media content (e.g., the media playback environment). In some embodiments, the media playback environment and/or initiating display of the media playback environment have one or more characteristics of similar environment(s) and/or display of the similar environment(s)

described with reference to methods 2000 and/or 2100. In some embodiments, in response to detecting selection of the second selectable option while media content is not currently displayed, the computer system forgoes display of the media playback environment and/or displays information indicating that media content must be displayed to initiate the media playback environment; thus the media playback environment is optionally restricted to being displayed when the computer system is displaying media content. In some embodiments, when media content is not currently displayed, the computer system forgoes display of the second selectable option. In some embodiments, in response to detecting selection of the second selectable option, the computer system initiates display of media content that was not displayed before the selection was detected (e.g., media content that is currently playing audio, but is minimized such that the media content is not being displayed, and/or media content that is currently playing but is outside a field-of-view of what is visible via the display generation component at a current viewpoint of the user relative to the three-dimensional environment). In some embodiments, in response to detecting the selection and while media content is not displayed, the computer system initiates display of media content and/or initiates one or more operations to initiate display of the media content. For example, the compute system optionally displays default or last-played media content. As an additional example, the computer system optionally displays the media playback environment including one or more selectable options included in a user interface to browse and/or search for media content, to select a source of media content (e.g., television providers, streaming providers, and/or media stored in memory at the computer system), and/or initiate playback of the media content. In some embodiments, when media content is not currently playing (e.g., being displayed), the computer system forgoes display of the media playback environment, irrespective of what one or more inputs are provided requesting display of the media playback environment. In some embodiments, the first selectable option and/or the second selectable option are respectively selectable, and in response to detecting a respective selection input directed to the first and/or the second selectable option, the computer system optionally displays a sub-menu including one or more additional selectable options, different from the one or more first selectable options. In some embodiments, the additional selectable options are respectively selectable to initiate display of the system environment, initiate display of the media playback environment, and/or perform one or more operations to modify a visual appearance of the three-dimensional environment. Displaying a plurality of selectable options that are selectable to initiate processes to display a system user environment and/or a media playback environment provides a convenient mechanism to modify a current environment of the user, thereby reducing user input required to browse for and cause display of such environments, thus saving on power and/or processing required to handle such user input.

In some embodiments, while displaying the one or more selectable options, the computer system detects, via the one or more input devices, a selection input directed to a respective selectable option of the one or more selectable options, such as input 2870 in FIG. 28L. For example, the computer system optionally detects a selection input (e.g., as described with reference to step(s) 2902) directed to a first selectable option. In some embodiments, the selection input has one or more characteristics of the inputs described with reference to step(s) 2902.

In some embodiments, in response to detecting the selection input, in accordance with a determination that the respective selectable option is the first selectable option, the computer system displays, via the display generation component, the media content in the system environment, such as media 2834 displayed in FIG. 28F in response to input 2880. For example, as described with reference to step(s) 2902, in response to detecting selection of the first selectable option, the computer system optionally initiates a process to display the media content in the system environment, including displaying the media content in the system environment. In some embodiments, the media content is displayed at a same position and/or orientation relative to the viewpoint of the user when the selection input was received. In some embodiments, the media content is displayed at a default position within the system environment. In some embodiments, in response to detecting one or more inputs moving the media content (e.g., one or more inputs having characteristics of the first input, and/or including movement of an air gesture, movement of an object contacting a touch-sensitive surface, and/or movement of a pointing device), the computer system moves the media content in accordance with the one or more inputs to an updated position relative to the current viewpoint and the system environment. For example, the computer system optionally moves the media content in a direction and magnitude that is based on a direction and/or magnitude of the one or more inputs. In some embodiments, in response to detecting the selection input, in accordance with a determination that the respective selectable option is the second selectable option, the computer system displays, via the display generation component, the media content in the media playback environment, such as media 2834 displayed within three-dimensional environment 2802 in FIG. 28M. In some embodiments, in response to detecting selection of the first selectable option, the computer system optionally initiates a process to display the media content in the media playback environment, including displaying the media content in the system environment. In some embodiments, displaying the media content in the media playback environment includes displaying the media content at a respective position with the media playback environment (e.g., a default position) and/or with a respective orientation relative to the current viewpoint of the user, such as an orientation where a vector extending from a portion of the media content (e.g., a center of the media content, and/or normal to a portion of a face of the media content) intersects with the current viewpoint. In some embodiments, the displaying includes displaying the media content with an updated scale, such as with a relatively increased scale relative to the three-dimensional environment of the user. In some embodiments, in response to detecting one or more inputs moving the media content in the media playback environment, the computer system moves the media content in accordance with the one or more inputs to an updated position relative to the current viewpoint and the system environment, as described further with reference to methods 2000 and/or 2100. Displaying the media content in the system environment or the media playback environment in accordance with a determination that the user selected a corresponding selectable option from the one or more selectable options reduces user input required to traverse other user interface(s) and/or menus, thus decreasing processing required to detect and perform operations associated with such user input.

In some embodiments, before displaying the media content in the three-dimensional environment, the computer system detects, via the one or more input devices, a second input (e.g., an air gesture, an interaction with a hardware control of the device, an interaction with a portion of a housing of the device, a voice command detected by the computer system, and/or another input as described further with step(s) 2902 of the present method) corresponding to a request to display one or more second selectable options associated with modifying the appearance of the three-dimensional environment, such as an input 2804 detected in FIGS. 28A and 28A1 before media content is displayed. For example, the electronic device optionally detects an input requesting display of one or more selectable options, such as a user interface and/or menu including such one or more options. In some embodiments, the second input has one or more characteristics of the inputs as described with reference to step(s) 2902. In some embodiments, the one or more selectable options are respectively selectable to initiate process to modify a visual appearance of the three-dimensional environment of the user, such as in a manner similar or the same to as the process initiated in response to detecting selection of the first selectable option. In some embodiments, the second one or more second selectable options are included in a second menu that is different from a first menu that includes the first one or more second selectable options. For example, the first menu is displayed in response to the computer system detecting input (e.g., that optionally has one or more characteristics of invoking a system user interface described with reference below, and/or with reference to method 3100) directed toward a region of the three-dimensional environment (e.g., towards an upper, and/or central portion of the current viewpoint of the user), and/or is displayed in response to detecting selection of a selectable icon corresponding to menu of available three-dimensional environments, such as a selectable icon included in a system user interface (e.g., described further below and with reference to method 3100). In some embodiments, the first menu corresponds to and/or is associated with a system user interface, such as the system user interface of the first type interface described herein and/or the home user interface described further herein. In some embodiments, the first menu does not include the respective selectable option, independent of whether media is currently displayed in the three-dimensional environment. In some embodiments, the computer system displays the second menu in response to the computer system detecting input directed to a region of the three-dimensional environment corresponding to the media content (e.g., an edge of currently displayed media content, a body of a virtual object including the media content, and/or near a region of the three-dimensional environment associated with summoning the second menu where media content is not displayed).

In some embodiments, in response to detecting the second input, in accordance with a determination that one or more criteria are satisfied, including a criterion that is satisfied when media content is not being displayed in the three-dimensional environment when the second input is detected, the computer system displays, via the display generation component, one or more second selectable options that are selectable to initiate a process to modify a visual appearance of the three-dimensional environment, not including a respective selectable option that is selectable to initiate the process to display the media playback environment, such as options included in interface 2806 in FIG. 28B. In some embodiments, in accordance with a determination that media content is not being displayed when the second input is detected, the computer system displays the second one or more selectable options, not including a respective selectable option that is selectable to initiate a process including displaying the media content in the media playback environment. Thus, in some embodiments, in accordance with a determination that media content is not being displayed, the computer system forgoes display of a selectable option to transition the three-dimensional environment to include the media playback environment. In some embodiments, the respective selectable option has one or more characteristics of the second selectable option. In some embodiments, the computer system displays the respective selectable option included in a user interface corresponding to one or more selectable options that are associated with changing the visual appearance of the three-dimensional environment, where the user interface is associated with the media content (e.g., the second menu described herein and displayed overlaid and/or near the media content). In some embodiments, the current viewpoint of the user is not oriented toward the media content when the second input is detected while the media content is currently playing (e.g., only the audio component of a video), and the computer system displays the one or more second selectable options including the respective selectable option. For example, the current viewpoint of the user does not correspond to a range of positions that currently playing media content occupies before displaying the media playback environment; thus the computer system forgoes display of video included in the media content while presenting audio included in the media content. In response to detecting the second input while the current viewpoint does not correspond to the range of positions, the computer system optionally forgoes display of the respective selectable option. Forgoing display of the respective selectable options reduces the likelihood that the user attempts to display the media playback environment without currently playing media content, thus preventing the user from erroneously attempting to transition to the media playback when such a transition is not possible, and thereby reducing user input required to detect and perform erroneous operations in accordance with such attempts.

In some embodiments, the one or more selectable options are displayed in a virtual object including the media content, such as menu 2980 in FIG. 28F. For example, the media content is optionally displayed in a virtual object (e.g., a virtual window, and/or a virtual polygon) and the one or more selectable options are optionally overlaid and/or adjacent to the virtual object. In some embodiments, in response to detecting one or more inputs selecting a selectable option, and/or requesting ceasing of display of the one or more selectable options, the computer system ceases display of the one or more selectable options while maintaining display of the virtual object including the media content. Displaying the one or more selectable options in a virtual object including the media content places related selectable options near the media content, and reduces cognitive burden of the user.

In some embodiments, the process to display the media content in the system environment in response to selecting the first selectable option includes displaying the system environment with a first visual appearance corresponding to a first time of day setting of the system environment, such as the visual appearance of three-dimensional environment 2802 in FIG. 28C. For example, as described further with reference to methods 800, 1000, and/or 3100, the computer system optionally presents one or more selectable options to change a time of day setting to correspond to a first visual appearance corresponding to a first time of day setting, such as a daytime environment. In some embodiments, displaying the system environment (and/or another system environment) with a respective visual appearance corresponding to a time of day setting includes displaying virtual content (e.g., a virtual sun, stars, a moon, a campfire, a tent, and/or a beach umbrella) and/or ceasing display of such virtual content corresponding to the time of day (e.g., ceasing display of the sun at night, and initiating display of the moon at night). In some embodiments, the first selectable option, first visual appearance, and first time of day settings have one or more characteristics of similar or the same elements presented to the user to change a visual appearance of a three-dimensional environment as described further with reference to methods 800, 1000, and/or 3100. In some embodiments, the one or more first selectable items include a third selectable option, different from the first selectable option and the second selectable option, that is selectable to initiate a process to display the media content in the system environment with a second visual appearance, different from the first visual appearance, corresponding to a second time of day setting of the system environment, such as selectable option 2862-2 in FIG. 28K. In some embodiments, in response to detecting a selection input directed toward the third selectable option, the computer system displays the system environment with a second visual appearance that is different from the first visual appearance, such as with a nighttime appearance. In some embodiments, the third selectable option and the first selectable option are associated with a currently visible environment. For example, the first and third selectable options are selectable to initiates processes to change visual appearances of a first system environment, a second system environment, and/or other system environment(s) in similar manners (e.g., to correspond to different time of day settings). Displaying a first and third selectable option that are selectable to change a visual appearance corresponding to a respective time of day setting provides flexibility to change the three-dimensional environment to the user's preferences, and reduces user input required to further navigate other user interface(s) and/or menus, thereby reducing processing required to detect and perform operations associated with the user input.

In some embodiments, before detecting the first input, the computer system detects, via the one or more input devices, a second input, different from the input, corresponding to a request to display the three-dimensional environment with a first visual appearance corresponding to a first time of day setting of the three-dimensional environment, such as input 2824 detected in FIG. 28D. In some embodiments, before the first input is detected, the computer system detects a second input (e.g., an air gesture, an interaction with a hardware control of the device, an interaction with a portion of a housing of the device, a voice command detected by the computer system, and/or another input as described further with step(s) 2902 of the present method) including a selection of a button, a request to display media content, a voice command, and/or an air gesture (as described with reference to step(s) 2902), the second input corresponding to a request to display the three-dimensional environment with the first visual appearance, such as a daytime visual of a three-dimensional environment (e.g., described further with reference to methods 800, 1000, and/or 3100). In some embodiments, the second input is directed to a selectable option included in a system user interface as described further below, and in some embodiments, the second input is directed to a selectable option in a menu associated with the media content, the menu also described further herein.

In some embodiments, in response to detecting the second input, the computer system displays, via the display generation component, the media content in the three-dimensional environment with the first visual appearance corresponding to a first time of day setting of the three-dimensional environment, such as three-dimensional environment 2802 in FIG. 28D, wherein the first input is detected while the three-dimensional environment has the first visual appearance in response to detecting the second input, such as the visual appearance of three-dimensional environment 2802 in FIG. 28D. For example, the computer system optionally displays a daytime three-dimensional environment, such as including a virtual sun, a virtual beach umbrella, and/or including a blue virtual sky before the first input is detected. In some embodiments, while displaying the daytime three-dimensional environment, the computer system detects the second input.

In some embodiments, while displaying the media content in a second three-dimensional environment that has a respective first visual appearance corresponding to the first time of day setting of the second three-dimensional environment, such as a second three-dimensional environment that is able to be displayed similar to as shown in the three-dimensional environment 2802 of FIG. 28D, the computer system detects, via the one or more input devices, a third input, different from the first input and the second input, corresponding to a request to initiate a process to display the second three-dimensional environment with a respective second visual appearance, different from the respective first visual appearance, corresponding to a second time of day setting of the second three-dimensional environment, such as an input 2880 in FIG. 28G. In some embodiments, the third input has one or more characteristics of the first input (e.g., e.g., an air gesture, an interaction with a hardware control of the device, an interaction with a portion of a housing of the device, a voice command detected by the computer system, and/or another input as described further with step(s) 2902 of the present method). For example, in response to detecting the third input, the computer system displays the first selectable option and the second selectable option (e.g., or selectable options that are selectable to initiate similar or the same operations as operations initiated in response to selecting the first and the second selectable options), and/or displays a menu including a selectable option that is selectable to cause the computer system to display the first and the second selectable options. In some embodiments, the third input includes a selection of the first selectable option and/or another selectable option that is selectable to change the time of day setting of the second three-dimensional environment (e.g., from a daytime to a nighttime environment, and/or vice-versa). In response to detecting such a selection, the computer system optionally displays the second three-dimensional environment with the respective second visual appearance (e.g., ceases display of virtual content included when displaying the second three-dimensional environment with the first time of day setting, and/or initiating display of virtual content corresponding to the second time of day setting, described further with reference to methods 800, 1000, and/or 3100). In some embodiments, the third input is directed to a selectable option included in a system user interface, described further above and below. In some embodiments, the third input is directed to a selection option included in a menu that is associated with the media content, different a menu included in the system user interface. In some embodiments, the system user interface corresponds to a system user interface of a first type, described further below. In some embodiments, the system user interface corresponds to a home user interface. In some embodiments, the home user interface is displayed in response to detecting an input (e.g., a selection of a physical button, such as a push button or an electromechanical crown button, and/or a virtual button), and/or in response to detecting an air gesture. In some embodiments, in response to detect such input, the computer system ceases display and/or visibility of other virtual content, other than the home user interface. In some embodiments, the home user interface includes a plurality of representations of applications and/or settings, respectively selectable to display additional information, launch applications, and/or change a state of user settings of the computer system, the plurality of representations including a selectable option and/or representation corresponding to a menu to change a visual appearance of the user's three-dimensional environment. The menu optionally includes one or more selectable options, such as selectable options that are selectable to cause the computer system to display a corresponding virtual environment to be displayed, and/or selectable to cause the computer system to change a time of day setting of a virtual three-dimensional environment (e.g., that is not displayed while the home user interface is displayed). In some embodiments, after detecting such a selection, and in response detecting an input to cease display of the home user interface (e.g., the selection itself, and/or a second pressing of a button and/or a second air gesture, the same or different as the other air gesture invoking the home user interface), the computer system optionally displays the three-dimensional environment not including the home user interface, and with a visual appearance based on the selection input directed toward the menu.

In some embodiments, in response to detecting the third input, the computer system initiates a process to display, via the display generation component, the media content in the second three-dimensional environment with the respective second visual appearance, such as a process to change the visual appearance of three-dimensional environment 2802 in FIG. 28G. For example, the computer system optionally displays the media content in the second three-dimensional environment in response to detecting the third input.

In some embodiments, while displaying the media content in the second three-dimensional environment with the respective second visual appearance, the computer system detects, via the one or more input devices, a fourth input, different from the first input, the second input, and the third input, corresponding to a request to change display of the media content in the second three-dimensional environment (e.g., exit docked mode, exit environment), such as input 2864 in FIG. 28J, and/or a similar input directed to a selectable option shown in FIG. 28J. For example, the fourth input includes a request to disable a mode associated with the media content, enable the mode, cease display of the second three-dimensional environment and/or initiate display of a replacement environment, and/or includes a selection of a button that is selectable to cause the computer system to change the display of the media content. In some embodiments, the fourth input has one or more characteristics of the inputs as described with reference to step(s) 2902 and/or herein. In some embodiments, the computer system displays media content in accordance with a currently enabled mode. The currently enabled mode optionally corresponds to a mode that dictates a scale of the media content relative to the three-dimensional environment of the user, a position and/or orientation of the media content relative to the three-dimensional environment, and/or whether the computer system is responsive to movement inputs requesting movement to updated positions within the three-dimensional environment. For example, the computer system optionally displays the media content while a "docked mode" is enabled (e.g., described further with reference to methods 2000, 2100, 2300, 2500, 2700, and/or 3100), such that the computer system displays the media content at a respective position within the three-dimensional environment, and forgoes moving the media content in response to detecting inputs requesting such movement. As another example, in accordance with a determination that the docked mode is not enabled, and the computer system detects input requesting movement of the media content, the computer system optionally moves the media content in accordance with the input requesting the movement. In some embodiments, the docked mode is entered in response to detecting a selection of a button that is selectable to cause the computer system to display a respective three-dimensional environment (e.g., with a particular time of day setting, and/or in the media playback environment).

In some embodiments, in response to detecting the fourth input, in accordance with a determination that the third input satisfies one or more criteria, including a criterion that is satisfied when the third input was directed to a user interface that is displayed in response to input directed to a region of the second three-dimensional environment corresponding to the media content, such as input 2880 in FIG. 28G, the computer system displays, via the display generation component, the media content in a third three-dimensional environment with a respective first visual appearance corresponding to the first time of day setting of the third three-dimensional environment, such as a different three-dimensional environment than as illustrated in FIG. 28B. For example, in response to detecting input directed to the media content (e.g., air gesture(s), attention of the user, a pressing of a button, and/or a voice command), and in accordance with a determination that the input is directed to the media content (e.g., including the body of the media content, a corner, an edge, and/or a position within a threshold distance of the media content (e.g., 0.01, 0.05, 0.1, 0.25, 0.5, or 0.75 m)), the computer system displays a menu associated with the media content. It is understood that input being "directed" to a region and/or media content optionally includes user voice commands requesting display of the menu, includes air gestures such as an air pointing of a finger to positions occupied by the media content, includes air gestures detected while attention of the user dwells on region of the second three-dimensional environment corresponding to the media content, and/or includes input detected while a displayed cursor is moved to the region of the second three-dimensional environment corresponding to the media content. In some embodiments, while displaying the menu, the computer system detects the third input that is directed to a selectable option included in the menu, and in response, the computer system displays the third three-dimensional environment in accordance with a selected time of day setting corresponding to the selected option (e.g., a daytime or a nighttime environment).

In some embodiments, in response to detecting the fourth input, in accordance with a determination that the third input does not satisfy the one or more criteria, because the third input was directed to a system user interface associated with controlling one or more system functions of the computer system, such as input 2824 directed to interface 2806 in FIG. 28D, the computer system displays, via the display generation component, the media content in the third three-dimensional environment with a respective second visual appearance corresponding to the second time of day setting of the third three-dimensional environment, such as the visual appearance of three-dimensional environment 2802 in FIG. 28E. In some embodiments, as described further with reference to method 2700 and/or method 3100, the computer system displays a system user interface associated with an operating system of the computer system. In some embodiments, the system user interface is displayed in response to detecting input, such as a selection of a button that is selectable to launch the system user interface, and/or selectable to display further selectable option(s) that are respectively selectable to launch the system user interface. In some embodiments, the system user interface is additionally or alternatively displayed in response detecting input directed to a predefined region, such as a region that is toward a center of the current viewpoint of the user, and/or toward a top edge of the user's viewpoint (e.g., within a threshold distance (e.g., 0.01, 0.05, 0.1, 0.5, 0.75, 1, or 1.5 m) of a top edge of the user's field of view and/or within the threshold distance of a center of the user's field of view at the current viewpoint). For example, in response to detecting attention dwell on positions within the region for a period of time greater than a threshold period of time (e.g., 0.1, 0.25, 0.5, 0.75, 1, 1.25, 1.5, or 2 seconds) and/or detects air gestures while attention is directed to the region, the computer system displays the system user interface. In some embodiments, the system user interface includes a volume control (e.g., "slider"), associated with controlling a volume level of environmental audio, content audio, and/or system audio (e.g., audio played as and/or corresponding to notifications, audio played when interacting with virtual objects and/or controls, audio played when typing input is detected. In some embodiments, the system user interface includes one or more selectable options, such as buttons, that are respectively selectable to display one or more menus, a respective menu including a selectable option selectable to change the visible three-dimensional environment to correspond to an updated three-dimensional environment (e.g., from a first virtual scene to another virtual scene, optionally shared with participants of the communication session), and/or that is selectable to change the visual appearance of the three-dimensional environment, such as a selectable option that is selectable to display a current three-dimensional environment with a respective second visual appearance corresponding to a second time of day setting, and/or a selectable option (e.g., in a same or different menu). In response to detecting the selection of such a selectable option, the computer system initiates display and/or initiates a process to display the third three-dimensional environment with the respective second visual appearance. Preserving or changing a visual appearance of a three-dimensional environment in accordance with a determination that the visual appearance was previously displayed based on respective input directed to a region of the three-dimensional environment associated with the media content or directed a system user interface provides a hierarchy associated with persistence of the three-dimensional environment, thus reducing the likelihood that the user is required to request display of the three-dimensional environment with the visual appearance, and thereby processing required to detect and/or perform operations in accordance with the user input.

In some embodiments, the system user interface includes a visual indication of a currently active time of day setting, such as included in selectable option 2808 in FIG. 28B. For example, the system user interface includes selectable option(s) with reference to step(s) 2902. At times herein, reference is made to a first type of system user interface that is one example of a system user interface, optionally different from another system user interface that is associated with additional or alternative operations related to the computer system. In some embodiments, the computer system displays the first type of system user interface in response to detecting an input direction to a respective portion of a viewport into the three-dimensional environment of the user (e.g., attention of the user directed to the respective portion), such as toward a relative middle of the viewport, and/or a relative center of the viewport. It is understood that description with reference to a system user interface optionally apply to the first type of system user interface, and additionally or alternatively another system user interface, and vice-versa. It is also understood that one or more elements included in a first type of system user interface are optionally included in a system user interface, and that one or more elements included in a first type of system user interface are optionally not included in the system user interface, and vice-versa. In some embodiments, the selectable option(s) include one or more buttons that are respectively selectable to initiate display of a respective menu. In some embodiments, a respective menu includes a plurality of representations of three-dimensional environments that are available (or unavailable) to be shared with the communication session. In some embodiments, the respective menu additionally or alternatively includes one or more selectable options to change a time of day setting of a current three-dimensional environment. In some embodiments, the selectable options embedded in menus are displayed when initially displaying the system user interface, without detecting user input requesting display of a respective menu. In some embodiments, a visual indication (e.g., included in a selectable option, and/or separate from a selectable option) is displayed notifying the user of a currently active time of day setting. For example, in accordance with a determination that the three-dimensional environment is displayed with a first visual appearance corresponding to a first time of day, the visual indication includes text and/or graphics that correspond to the first time of day (e.g., "day time," a light colored shape, an icon of a sun, and/or an indication of a "light mode" environment). In accordance with a determination that the three-dimensional environment is displayed with a second visual appearance corresponding to a second time of day, the visual indication includes text and/or graphics that correspond to the second time of day (e.g., "night time," a dark colored shape, an icon of a moon, and/or an indication of a "dark mode" environment). In some embodiments, the visual indication additionally or alternatively identifies a virtual scene included in the current three-dimensional environment (e.g., a beach, a desert, a forest, and/or a theater).

In some embodiments, in response to detecting the third input that satisfies the one or more criteria, and before detecting the fourth input, the computer system displays the second three-dimensional environment with the second visual appearance, wherein the displaying of the media content in response to the third input in the second three-dimensional environment with the second visual appearance is performed in accordance with a determination that the third input satisfied the one or more criteria, such as a visual appearance of three-dimensional environment 2802 in FIG. 28L, in response to undocking media 2834 in FIG. 28L. For example, in accordance with a determination that the third input satisfies the one or more criteria (e.g., in accordance with a determination that the third input was directed to a menu associated with the media content, and not directed to the system user interface), the computer system displays the second three-dimensional environment with the second visual appearance. In some embodiments, the computer system maintains display of the three-dimensional environment (e.g., the second three-dimensional environment or another three-dimensional environment) with a respective visual appearance until an input requesting a changing of the three-dimensional environment and/or display of the media content is detected, described further below.

In some embodiments, while displaying the second three-dimensional environment with the second visual appearance, the computer system displays the system user interface that includes a visual indication indicating that the second time of day setting corresponding to the second visual appearance is currently active, such as information included in selectable option 2808 in FIG. 28B, corresponding to a different time of day setting than in FIG. 28B. For example, in accordance with a determination that the currently active time of day setting is a first setting, the visual indication provides visual feedback such as text and/or graphics that the first time of day setting is active. In accordance with a determination that the currently active time of day setting is a second setting (e.g., in response to detecting input changing the time of day setting from the first to the second time of day setting), the computer system optionally displays the visual indicating providing visual feedback that the second time of day setting is active. In some embodiments, the system user interface includes an indication of the time of day setting, independent of whether or not the time of day setting is temporarily set (e.g., in accordance with a determination that the time of day setting was selected from a menu associated with the media content). Displaying a visual indication of the current time of day setting heightens user awareness concerning a configuration of the three-dimensional environment, thus reducing the likelihood that the user provides erroneous inputs to change the configuration when such the three-dimensional environment is already configured to the user's preferences, and thereby reducing processing required to detect and perform operations associated with the user input.

In some embodiments, while displaying the one or more selectable options, the computer system detects, via the one or more input devices, a second input, different from the first input, including a first selection of the first selectable option, such as input 2835 in FIG. 28E. For example, the system user interface (as described with reference to step(s) 2902) and/or the menu associated with the media content optionally include one or more selectable options to enable the docked mode, as described further at least with reference to methods 1600 and/or 3100. In some embodiments, the second input has one or more characteristics of the inputs as described with reference to step(s) 2902 (e.g., an air gesture, an interaction with a hardware control of the device, an interaction with a portion of a housing of the device, a voice command detected by the computer system, and/or another input as described further with step(s) 2902 of the present method). In some embodiments, the first selectable option is further selectable to initiate a process to change the visual appearance of the three-dimensional environment (e.g., concurrently with the displaying of media content at the respective position described below), such as a time of day setting of a currently visible three-dimensional environment, and/or to transition the currently visible three-dimensional environment to correspond to another three-dimensional environment (e.g., to a not yet displayed immersive scene). In some embodiments, the first selectable option is selectable to enable the docked mode of the media content, without otherwise changing the three-dimensional environment.

In some embodiments, in response to detecting the second input, the computer system initiates the process to display the media content in the system environment, wherein the process includes displaying the media content at a respective position for media content in the system environment, such as displaying media 2834 as shown in FIG. 28H. For example, in response to detecting the second input, the computer system displays the media content in the system environment (e.g., that is currently displayed before the second input is received or was not yet displayed). In some embodiments, the computer system displays the media content at the respective position (e.g., a "docked" position). In some embodiments, the respective position is beyond a physical boundary (e.g., created by a physical wall, a physical door, and/or a large physical object) within the system and/or physical environment. For example, the respective position optionally corresponds to a simulated position that is effectively behind (e.g., further than) a position corresponding to the physical object relative to the viewpoint of the user when the second input is detected. In some embodiments, the respective position is further than the physical boundary in a direction parallel a vector that is optionally not displayed, extending from the center of the user's viewpoint relative to the system three-dimensional environment to the physical boundary. In some embodiments, as described further with reference to methods 1600 and/or 3100 and previously, the computer system forgoes moving of the media content in response to detecting input requesting such movement from the respective position until the docked mode is disabled. Displaying the media content in response to detecting selection of a selectable option reduces user input required to manually arrange the media content in scale, position, and/or orientation relative to the current viewpoint of the user and/or the three-dimensional environment, thereby reducing processing required to detect and perform operations associated with the user input.

In some embodiments, while displaying the one or more selectable options and the media content at the respective position for media content in the system environment, the computer system detects, via the one or more input devices, a third input (e.g., an air gesture, an interaction with a hardware control of the device, an interaction with a portion of a housing of the device, a voice command detected by the computer system, and/or another input as described further with step(s) 2902 of the present method), different from the first input and the second input, including a second selection of the first selectable option, such as a selection of selectable option 2837 in FIG. 28H. For example, while displaying the media content at the respective position and/or while the docked mode is enabled, the computer system optionally detects a selection input directed toward the first selectable option. In some embodiments, the third input has one or more characteristics of the inputs as described with reference to step(s) 2902. In some embodiments, the third input is directed to a selectable option that is selectable to de-dock the media content displayed in a menu associated with the media content.

In some embodiments, in response to detecting the third input, the computer system initiates a process to display the media content in the system environment at an updated position that is different from the respective position for media content, such as the position of media 2834 as shown in FIG. 28E. For example, in response to detecting the third input, the computer system optionally displays the media content in the system environment at the updated position. In some embodiments, the first selectable option is selectable to dock the media content at the respective position in accordance with a determination that the media content is not yet docked and/or the docked mode is disabled, and/or is additionally selectable to de-dock the media content from the respective position, thus disabling the docked mode. In some embodiments, in response to detecting the second selection of the first selectable option, the computer system displays the media content at an updated position relative to the three-dimensional environment. In some embodiments, the computer system displays the media content at a same position as the respective position in response to detecting the second selection of the first selectable option. In some embodiments, the computer system additionally or alternatively reduces a scale of the media content in response to detecting the second selection, to a scale that the media content was displayed with prior to detecting the initial selection of the first selectable option; thus, the computer system reverts a scale of the media content in response to detecting de-docking of the media content. In some embodiments, the scale of the media content is reduced to a default scale in response to the second selection of the first selectable option. In some embodiments, in response to detecting the second selection of the first selectable option, the computer system changes a visual appearance of the system environment, similar or the same to as described with reference to method 3100. Displaying the media content at an updated position in response to detecting a second selection of the first selectable option reduces a number of selectable option that the computer system displays, thus reducing processing and power required to present superfluous selectable options.

In some embodiments, before displaying the media content and while displaying a first system environment associated with the operating system of the computer system, the computer system detects, via the one or more inputs devices, first one or more inputs including a request to initiate display of the media content, such as input 2827 in FIG. 28D. For example, the first system environment is an at least partially or entirely virtual scene, such as a virtual beach, a virtual desert, a virtual board room, a virtual forest, and/or a virtual campground. In some embodiments, the computer system displays the first system environment in response to detecting a selection of a representation of the first system environment, such as from a system user interface as described herein. In some embodiments, the first system environment is included in memory of the computer system, and thus is associated with the operating system of the computer system that uses the memory. In some embodiments, the computer system displays respective content (e.g., such as media content, virtual objects corresponding to applications included in the memory, and/or representations of participants and/or shared content) within the first system environment. For example, the first one or more inputs optionally include a voice command requesting display of media, a selection of a representation of content included in a media playback user interface, such as a streaming platform including icons representing content shows, and/or a request to display a television channel and/or media platform providing a stream of real-time media content, and/or recently broadcast or streamed media content.

In some embodiments, in response to detecting the first one or more inputs including the request, the computer system displays the media content in the first system environment such as media 2834 in FIG. 28E. For example, the computer system displays the media content concurrently with the first system environment. In some embodiments, before displaying the media content (and optionally when the first one or more inputs were detected), the computer system displays a user interface corresponding to an application other than a media playback application (e.g., a photos application, a gaming application, and/or a document editing application) with or in the first system environment. In response to detecting the first one or more inputs, the computer system optionally displays the media content with or in the first system environment. Displaying the media content concurrently with displaying a system environment allows the user to interact with the media content and the system environment at the same time, thus reducing user input required to toggle between visibility of the media content and the system environment, and thereby reducing processing required to detect and perform operations associated with the media content.

In some embodiments, before detecting the first input, and while displaying the media content in the system environment, the computer system displays, via the display generation component, a system user interface associated with the operating system of the computer system, such as the interface 2886 in FIG. 28T, wherein the system user interface includes one or more second selectable options, different from the one or more first selectable options, including a third selectable option, different from the first selectable option and the second selectable option, that is selectable to initiate a process to display the media content in an alternative system environment that is associated with the operating system of the computer system, such as the selectable options included in interface 2886 in FIG. 28T. For example, the computer system optionally detects one or more inputs requesting display of the system user interface. Such one or more inputs optionally include a selection of the buttons representative of the system user interface (e.g., a home user interface and/or a first type of system user interface), a voice command requesting display of the system user interface, and/or a detection of an air gesture as described with reference to step(s) 2902, optionally while attention of the user is directed to a predefined region of the three-dimensional environment associated with display of the system user interface (e.g., a corner, an edge, a center, and/or away from such a region). In some embodiments, the system user interface includes one or more selectable options such as one or more buttons, the one or more buttons selectable to initiate a change in the three-dimensional environment, initiate a change in one or more settings of the computer system, and/or display a respective user interface including additional controls and or buttons to perform similar operations as, such as one or more representations of different available three-dimensional environments that the computer system is able to display.

In some embodiments, while displaying the one or more second selectable options including the third selectable option, the computer system detects, via the one or more input devices, a respective input selecting the third selectable option, such as input 2897 in FIG. 28T. For example, the computer system optionally detects a selection input that corresponds to the respective input directed toward the third selectable option. In some embodiments, the third selectable option included in the system user interface is our first representation of a respective first three-dimensional environment. Additionally or alternatively, one or more additional representation of respective three-dimensional environment are displayed concurrently with the third selectable option.

In some embodiments, in response to detecting the respective input, the computer system displays, via the display generation component, the media content in the alternative system environment, such as a system environment included in three-dimensional environment 2802 in FIGS. 28A and 28A1. For example, the computer system displays the media content at a similar or same position in the alternative system environment as was displayed in the system environment when the respective input was detected.

In some embodiments, the computer system ceases display of the system environment in favor of displaying the alternative system environment. In some embodiments, the displaying of the alternative system environment includes an animation, such as a gradual decreasing in level of opacity of the system environment, optionally concurrent with an increasing in level of opacity of the alternative system environment. In some embodiments, the animation includes a directional animation, such as progressively ceasing display of the system environment starting from a first edge of the current viewpoint and moving toward an opposing edge of the current viewpoint (e.g., left to right, and/or top two bottom), gradually replacing display of a portion of the system environment with display of the alternative system environment. Changing a visible system environment from an initial system environment to an alternative system environment via a system user interface provides additional flexibility to change the system user interface, thus reducing the likelihood that the user must traverse alternative user interfaces to change the system environment, and thereby reducing processing required to detect such inputs, and perform operations associated with the input.

In some embodiments, the system user interface includes a fourth selectable option, different from the first selectable option, the second selectable option, and the third selectable option, that is selectable to set a visual appearance of a visible three-dimensional environment to correspond to a current time of day at the computer system, such as selectable option 2818 in FIG. 28D and the first one or more selectable options do not include a respective selectable option that is selectable to set the visual appearance of the three-dimensional environment to correspond to the current time of day at the computer system, such as menu 2813 in FIG. 28G. For example, as described further with reference to method 3100, the computer system optionally presents a selectable option that is selectable to configure the computer system to modify a visual appearance of the users three-dimensional environment in accordance with a current time, such as a time determined by the computer system, and slash or a time provided by a time keeping authority, such as one or more servers in communication with the computer system. As an additional example, in accordance with the determination that the time of day is in the morning (e.g., after sunrise) or the afternoon (e.g., before sunset), the computer system optionally displays invisible three-dimensional environment with a daytime visual appearance, similar to if the computer system configured the three-dimensional environment in accordance with a daytime time of day setting. Additionally or alternatively, in accordance with a determination that the current time of day is in the evening or the early hours (e.g., before sunrise) of the morning, the computer system optionally displays the three-dimensional environment with a night time visual appearance, similar to if the computer system configured the three-dimensional environment in accordance with a night time of day setting. In some embodiments, the respective selectable option is included in a system user interface. In some embodiments, the respective selectable option is not included in a menu including representations of three-dimensional environments that the user is able to display. For example, the menu associated with the media content optionally includes one or more selectable options to expressly set a time of day-based visual appearance of the user's three-dimensional environment, and optionally does not include the respective selectable option to automatically change the visual appearance in accordance with the computer systems understanding of a time of day (e.g., a system time of day, not a time of day setting configured by the user). In some embodiments, in accordance with a determination that a currently displayed three-dimensional environment corresponds to a respective system environment, the fourth selectable option corresponds to a first visual appearance of the respective system environment or a second visual appearance of the respective system environment (e.g., a time of day-based appearance). In some embodiments, in accordance with a determination that the currently displayed three-dimensional environment does not correspond to the respective system environment (e.g., because the current three-dimensional environment is displaying an atmosphere, such as described with reference to methods 800 and/or 1000, rather than a virtual environment), the fourth selectable option is selectable to display a suggested or recommended three-dimensional environment (e.g., with the first visual appearance or the second visual appearance). In response to detecting the selection of the fourth selectable option, and in accordance with the determination that the currently displayed three-dimensional environment does not correspond to the respective system environment, the computer system optionally replaces the currently visible three-dimensional environment with the suggested or recommended three-dimensional environment. Including the fourth selectable option in the system user interface reduces the likelihood that the user erroneously configures the visual appearance of a visible three-dimensional environment to change with a system time of day, thus reducing user input required to change the visual appearance of the three-dimensional environment that undesirably changed based on such a configuration, and thereby reducing processing required to detect such user input and perform one or more operations based on such input.

In some embodiments, the computer system detects, via the one or more input devices, a first selection input directed toward the second selectable option, such as input 2870 in FIG. 28L.

In some embodiments, in response to detecting the first selection input, the computer system displays, via the display generation component, the media content in the media playback environment, such as media displayed as shown in FIG. 28M. For example, the media playback environment has one or more characteristics of similar environments described with reference to method 2000.

In some embodiments, while displaying the media content in the media playback environment, the computer system displays, via the display generation component, a media control user interface including a third selectable option, such as controls 2829 in FIG. 28O, different from the first selectable option and the second selectable option, that is selectable to initiate a process to change a spatial relationship between a viewpoint of the user and the media content in the media playback environment, such as directed to the selectable option 2851 in FIG. 28M. For example, the media control user interface and/or the third selectable option have one or more characteristics of user interfaces and selectable options described with reference to methods 2000 and/or 2100. Providing a selectable option to change a spatial relationship between the viewpoint of the user and the media content reduces manual user inputs required to improve a viewing and interacting orientation of the current viewpoint relative to the media contents, thereby reducing processing required to detect and perform operations in accordance with the user inputs.

In some embodiments, while displaying, via the display generation component, the media content in the three-dimensional environment before the first input is detected, the computer system detects, via the one or more input devices, a second input, different from the first input, such as input 2839 in FIG. 28E. For example, the second input (e.g., an air gesture, an interaction with a hardware control of the device, an interaction with a portion of a housing of the device, a voice command detected by the computer system, and/or another input as described further with step (s) 2902 of the present method) includes a request to display selectable options associated with the media content, such as the menu associated with the media content.

In some embodiments, in response to detecting the second input, the computer system displays, via the display generation component, one or more second selectable options, different from the one or more first selectable options, such as included in menu 2890 in FIG. 28F, and/or another menu able to be displayed in FIG. 28F while media 2834 is not docked. For example, the one or more selectable options optionally include one or more buttons, one or more visual representations of time of day settings (e.g., of a currently displayed three-dimensional environment or of a respective three-dimensional environment associated with a time of day setting), and/or one or more visual representations of available three-dimensional environments.

In some embodiments, the one or more second selectable options include, in accordance with a determination that the second input is detected while the media content is not displayed at a respective position for media content in the three-dimensional environment, such as a position of media 2834 as shown in FIG. 28H, (e.g., the respective position for media content has one or more characteristics of similar or same positions described herein, and/or with reference to methods identified herein, and/or as described with reference to an enabled or disabled docked mode of the media content), wherein the media content cannot be moved from the respective position in the three-dimensional environment, a third selectable option that is selectable to initiate a process to display a respective three-dimensional environment. For example, the three-dimensional environment optionally includes a selectable icon that is selectable to initiate display of an environments menu, presenting potential three-dimensional environment that the computer system is able to display. In response to detecting the selection of the selectable icon, the computer system optionally displays a plurality of representations of available three-dimensional environments, respectively selectable to cause display of the selected three-dimensional environment.

In some embodiments, in accordance with a determination that the second input is detected while the media content is displayed at the respective position, the second one or more selectable options do not include the third selectable option, that is selectable to initiate a process to present one or more alternative three-dimensional environments, such as a selectable option that is included in media 2834 and/or a menu associated with media 2834 as shown in FIG. 28F, and not included in media 2834 and/or a menu associated with media 2834 while displayed as shown in in FIG. 28K. For example, in response to detecting one or more inputs requesting movement of the media content from the respective position and/or while a docked mode is enabled, the computer system forgoes movement of the media content. When the media content is displayed and the docked mode is enabled, the computer system optionally forgoes presenting a selectable option that is selectable to present the potential three-dimensional environments. Forgoing display of a selectable option selectable to cause display of an environments menu reduces the likelihood that the user attempts to transition docked media content from being displayed in a first environment to being displayed in a second environment, thus reducing the likelihood that the computer system detects non-functional user inputs, and thereby reduces processing required to detect and perform operations in accordance with such user input.

In some embodiments, while the media content is displayed at the respective position for media content, the computer system detects, via the one or more input devices, a third input, different from the first input and the second input, corresponding to a request to cease displaying the media content at the respective position for media content such as input 2850 as shown in FIG. 28O. For example, an input requesting a disabling of the docked mode (e.g., an air gesture, an interaction with a hardware control of the device, an interaction with a portion of a housing of the device, a voice command detected by the computer system, and/or another input as described further with step(s) 2902 of the present method), such as a selection of a selectable option to un-dock the media content, such as a minimizing button, and/or a selection input directed to a button in a menu associated with the media content.

In some embodiments, in response to the third input, the computer system displays, via the display generation component, the media content at an updated position in the three-dimensional environment, such as media 2834 as shown in FIG. 28P. For example, the updated position that is optionally the same or different from the respective position.

In some embodiments, while displaying the media content at the updated position, the computer system detects, via the one or more input devices, a fourth input, different from the first, second, and third inputs, corresponding to a request to display the one or more first selectable options that are selectable to modify an appearance of the three-dimensional environment. For example, such as with reference to the first type of system user interface. In some embodiments, the fourth input includes an air gesture, an interaction with a hardware control of the device, an interaction with a portion of a housing of the device, a voice command detected by the computer system, and/or another input as described further with step(s) 2902 of the present method.

In some embodiments, in response to detecting the fourth input, the computer system displays, via the display generation component, the one or more second selectable options including the third selectable option, such as menu 2860 in FIG. 28P. For example, as described previously with reference to the third selectable option displayed in accordance with a determination that media is displayed at the respective position when input requesting display of the one or more second selectable options was received. Displaying a selectable option selectable to cause display of an environments menu reduces user input required to transition to a new three-dimensional environment, thus reducing the likelihood that the computer system detects excess user input traversing other user interfaces attempting to cause such a transition, and thereby reduces processing required to detect and perform operations in accordance with such user input.

In some embodiments, while displaying the media content in the system environment, the computer system detects, via the one or more input devices, a second input, different from the first input, corresponding to a request to modify a level of immersion of the system environment, such as input 2821 in FIG. 28E. For example, the computer system optionally detects an input to modify a level of immersion, such as a rotating of an electromechanical crown button, a voice command, an air gesture, and/or manipulation of a virtual control such as a selection of a virtual button and/or movement of a virtual slider. In some embodiments, the second input and/or the request to modify the level of immersion has one or more characteristics of similar input(s) and/or request (s) described with reference to method 800 and/or method 1400.

In some embodiments, in response to detecting the second input, the computer system modifies the level of immersion of the system environment in accordance with the second input, such as the modified immersion level of three-dimensional environment 2802 in FIG. 28F. For example, the second input optionally has a magnitude and/or direction (e.g., a distance and direction of movement of an air gesture, a distance and direction of movement of a contact on a touch-sensitive surface, an express specification of an immersion level in a voice command, and/or an amount of rotation of the crown button in a clockwise or counterclockwise direction), and the computer system optionally changes the level of immersion in accordance with the magnitude and direction of the second input. For example, the level of immersion is decreased from a first level to a second, lesser level in accordance with a determination that the second input has a first magnitude, and a first direction, is increased from the first level to a third, greater level in accordance with a determination that the second input has the first magnitude and a second direction different from the first, and/or is increased from the first level to a fourth level, greater than the first and third levels, in accordance with a determination that the second input has the a second magnitude, greater than the first magnitude, and a second magnitude. In response to detecting the second input, the computer system optionally changes the level of immersion. In some embodiments, the modification of the level of immersion has one or more characteristics of similar modifications described with reference to method 800 and/or method 1400. In some embodiments, the computer system changes the level of immersion in accordance with the second input while a docked mode is enabled and/or disabled, such as while the media content is displayed—or not displayed—at a respective position configured for presenting media content.

In some embodiments, while displaying the media content in the media playback environment, the computer system detects, via the one or more input devices, a third input, different from the first input and the second input, corresponding to a request to modify a level of immersion of the media playback environment, such as input 2853 in FIG. 28M. For example, the third input has one or more characteristics the same as or different as the second input (e.g., direction and/or magnitude (e.g., and includes an air gesture, an interaction with a hardware control of the device, an interaction with a portion of a housing of the device, a voice command detected by the computer system, and/or another input as described further with step(s) 2902 of the present method)), and is received while the media playback environment is being displayed.

In some embodiments, in response to detecting the third input, forgoing modification of the level of immersion of the media playback environment in accordance with the second input, such as the level of immersion of three-dimensional environment 2802 in FIG. 28N. For example, in accordance with a determination that the media playback environment is displayed when input requesting modification of immersion level is detected, the computer system optionally forgoes changing of the immersion level of the media playback environment. In some embodiments, while displaying the media content in the media playback environment the computer system detects one or more inputs including a request to display selectable options associated with the media content (e.g., a menu associated with the media content, as described further herein). In some embodiments, in response to one or more user input(s) directed to selectable options included in the menu, the computer system forgoes display of a selectable option that is selectable to change the media playback environment to correspond to the system environment, aside from a respective selectable option that is selectable to cause display of the media content at a position other than the respective position and within a system environment that the computer system displayed when inputs initiating display of the media playback environment were received. Forgoing modification of a level of immersion of the media playback environment improves visual focus on the media content, thus reducing the likelihood that the user provides input that is not directed to the media content, and optionally not function within the media playback environment, thereby reducing processing required to detect and perform operations in accordance with such input.

In some embodiments, while the media content is displayed at a respective position for media content in a respective three-dimensional environment, such as media 2834 in FIG. 28S, the computer system detects, via the one or more input devices, a second input, different from the first input, corresponding to a request to display a home user interface associated with the computer system such as input 2823 in FIG. 28R. For example, the media content is optionally displayed at the respective position in response to the second input (e.g., an air gesture, an interaction with a hardware control of the device, an interaction with a portion of a housing of the device, a voice command detected by the computer system, and/or another input as described further with step(s) 2902 of the present method) that is configured for media playback such as when a docked mode of the media content is enabled. In some embodiments, the second input requesting display of the home user interface has one or more characteristics of the inputs described herein, such as a selection input directed to a selectable icon corresponding to the home user interface and/or input directed to a button, such as an electromechanical crown button.

In some embodiments, in response to detecting the second input, the computer system ceases display of the media content and the respective three-dimensional environment, and displaying, via the display generation component, the home user interface, including a respective selectable option associated with a plurality of system environments, such as ceasing display of media 2834 in FIG. 28S. For example, the computer system optionally ceases display of the media content and/or the respective three-dimensional environment such as a system environment, and displays the home user interface as described further herein. In some embodiments, the home user interface includes a selectable option such as in icon representative of three-dimensional environments such as system environments the computer system is able to display.

In some embodiments, while displaying the respective selectable option in the home user interface, the computer system detects, via the one or more input devices, a third input, different from the first input and the second input, corresponding to a selection of the respective selectable option, such as input 2897 directed to the interface 2886 in FIG. 28T. For example, a selection input as described further herein (e.g., including an air gesture, an interaction with a hardware control of the device, an interaction with a portion of a housing of the device, a voice command detected by the computer system, and/or another input as described further with step(s) 2902 of the present method).

In some embodiments, in response to detecting the third input, the computer system displays, via the display generation component, a plurality of selectable representations corresponding to the plurality of system environments that are selectable to initiate a process to display the media content in a corresponding system environment, wherein the processes to display the media content in the system environments could not be initiated while the media content was displayed at the respective position for media content in the respective three-dimensional environment, such as the selectable options included in interface 2886 in FIG. 28T. For example, the home user interface is updated to include the plurality of selectable representations, replaces display of first content including the respective selectable option in the home user interface with the plurality of selectable representations, and/or displays an additional container such as a menu displayed concurrently with the first content of the home user interface. In some embodiments, the selectable representations are respectively selectable to initiate display of first system environments, where at least a subset of such system environments cannot be displayed in response to detecting a selection of a respective selectable option that is included in the menu associated with the media content (e.g., the menu including one or more selectable options to change a visual appearance of the user's visible three-dimensional environment), because the at least the subset of the system environments are not accessible from the menu associated with the media content. In some embodiments, the plurality of selectable representations include graphics, text, and/or media corresponding to virtual scenes, such as a virtual beach, a virtual jungle, and/or a virtual boardroom. In some embodiments, in response to detecting a selection input directed to a respective representation of the plurality of selectable representations, the computer system initiates a process to cease display of the home user interface, initiate display of a system environment corresponding to the selected representation, and/or display the media content within the system environment. In some embodiments, in accordance with a determination that the selection input is directed to a first representation that corresponds to a first system environment, the computer system ceases display of the home user interface and/or the plurality of selectable options and initiates display of the media content concurrently with the first system environment. In accordance with a determination that the select input is directed to a second representation, different from the first representation, corresponding to a second system environment that is different from the first system environment, the computer system optionally ceases display of the home user interface and/or the plurality of selectable options and initiates display of the media content concurrently with the second system environment. In some embodiments, while displaying the media content at the respective position (e.g., while the docked mode is enabled), the computer system detects one or more inputs requesting display of a menu including one or more selectable options to change a visual appearance of a visible three-dimensional environment of the user. In some embodiments, the first representation and the second representation are not included in the menu, and are not included in a respective sub-menus of the menu, such that the computer system is unable to initiate display of the first system environment and/or the second system environment in response to one or more inputs directed to the menu, instead of the home user interface. Presenting a plurality of selectable representations of environments in a home user interface provides user flexibility to change their visible three-dimensional environment, thus reducing user inputs required to individually browse for a plurality of available system environments, and thereby reducing processing required to detect and perform operations in accordance with the user inputs.

In some embodiments, while displaying the media content in the system environment, wherein the system environment is displayed with a respective level of immersion, such as three-dimensional environment 2802 in FIG. 28L, the computer system detects, via the one or more input devices, second one or more inputs, different from the first input, including a request to display the media playback environment, such as input 2870 in FIG. 28L. For example, the computer system displays the system environment with a level of immersion, and while displaying the system environment with the level of immersion, optionally detects a request to display the media playback environment, such as one or more of the manners of providing input to display the media playback environment described herein (e.g., including an air gesture, an interaction with a hardware control of the device, an interaction with a portion of a housing of the device, a voice command detected by the computer system, and/or another input as described further with step(s) 2902 of the present method).

In some embodiments, in response to detecting the second one or more inputs the computer system ceases display of the system environment and the computer system initiates display of the media playback environment, including the media content, at a first level of immersion different from the respective level of immersion, such as displaying media 2834 in three-dimensional environment 2802 I FIG. 28M. For example, the level of immersion optionally corresponds to a full (e.g., 100%) level of immersion. In some embodiments, the level media content is a level of immersion less than a full level of immersion, and greater than a threshold level of immersion (e.g., 50, 60, 70, 80, or 90%) to accommodate display of media content in the media playback environment. Thus, the computer system optionally changes (e.g., increases) the level of immersion of the media playback environment relative to the level of immersion of the system environment.

In some embodiments, while displaying the media playback environment including the media content at the first level of immersion, the computer system detects, via the one or more input devices, third one or more inputs (e.g., an air gesture, an interaction with a hardware control of the device, an interaction with a portion of a housing of the device, a voice command detected by the computer system, and/or another input as described further with step(s) 2902 of the present method), different from the first input and the second one or more inputs, including a request to display the system environment, such as input 2850 in FIG. 28O. For example, the computer system optionally detects a selection input directed to a selectable option that corresponds to the system environment (e.g., a selectable option that is selectable to display the system environment and/or change a visual appearance of the system environment) while displaying the media content, and in response to detecting the selection input, displays the media content in the system environment. In some embodiments, the third one or more inputs include an input directed to a selectable option that is associated with a disabling of a docked mode associated with the media content, optionally included in a menu associated with the media content.

In some embodiments, in response to the third one or more inputs, in accordance with a determination that the respective level of immersion was a second level of immersion, displaying, via the display generation component, the system environment including the media content with the second level of immersion, such as displaying three-dimensional environment 2802 in FIG. 28P with a first level of immersion. For example, the computer system ceases display of the media playback environment, maintains display of the media content (optionally at a same position, or at an updated position), and initiates display of the system environment with the second level of immersion in response to detecting the third input. In some embodiments, the third input(s) have one or more characteristics of inputs described further with reference to step(s) 2902.

In some embodiments, in response to the third one or more inputs, in accordance with a determination that the respective level of immersion was a third level of immersion, different from the second level of immersion, displaying, via the display generation component, the system environment including the media content with the third level of immersion, such as displaying three-dimensional environment 2802 in FIG. 28P with a second level of immersion. For example, the computer system ceases display of the media playback environment, maintains display of the media content (optionally at a same position, or at an updated position), and initiates display of the system environment with the third level of immersion in response to detecting the third input. Thus, the computer system optionally stores a state of the system environment before input requesting display of the media content in the media playback environment is detected, and when transitioning from the media playback environment to the system environment, displays the system environment to correspond to a same state of the system environment (e.g., a same level of immersion). Displaying the system environment with a level of immersion that the system environment was displayed with prior to replacing the system environment with a media playback environment reduces the likelihood that the system environment is displayed in a configuration that is not preferred by the user, thus reducing the need for user input to change the system environment immersion level, and thereby reducing processing to detect such user input and perform operations in accordance with such user input.

In some embodiments, while displaying the first one or more selectable options and the media content at a location in the three-dimensional environment other than a respective position for media content in the three-dimensional environment (e.g., while displaying the media content at a position that is not the respective position, and/or while a docked mode of the media content is not enabled), such as media 2834 as shown in FIG. 28G, the computer system detects, via the one or more input devices, a second input (e.g., an air gesture, an interaction with a hardware control of the device, an interaction with a portion of a housing of the device, a voice command detected by the computer system, and/or another input as described further with step (s) 2902 of the present method), different from the first input, corresponding to a selection of the second selectable option, wherein the process to display the media content in the media playback environment includes displaying the media content at a respective position for media content in the media playback environment such as selection input directed to selectable option "BGND5" included in menu 2813 in FIG. 28G. For example, while the computer system displays the media content and the docked mode is not enabled, the computer system detects a second input (e.g., an air gesture, an interaction with a hardware control of the device, an interaction with a portion of a housing of the device, a voice command detected by the computer system, and/or another input as described further with step(s) 2902 of the present method) directed to the second selectable option of the first one or more selectable options, and in response to the detecting, optionally enables the docked mode and/or optionally displays the media content at the respective position. In some embodiments, displaying the media content at the respective position and/or enabling the docked mode includes displaying the media content with a relatively increased scale, and/or displaying the media content with a simulated lighting effect, optionally presenting a simulated illumination of the three-dimensional environment based on simulated light emanating from the media content. In some embodiments, the second input has one or more characteristics of inputs described with reference to step(s) 2902. Displaying the media content at the respective location in response to detecting a selection of the second selectable option reduces the likelihood that the media content is displayed at a suboptimal viewing and/or interacting position, thus reducing the need for user input manually moving the media content, and thereby reducing processing required to detect and perform operations in accordance with the user input.

In some embodiments while displaying the media content in the three-dimensional environment with a visual appearance corresponding to a first time of day setting for the three-dimensional environment, such as three-dimensional environment 2802 in FIGS. 28A and 28A1. For example, as described with reference to method 1000.

In some embodiments, the computer system detects, via the one or more input devices, a second input, different from the first input, such as input 2804 in FIG. 28A. For example, the second input includes an air gesture (optionally while attention of the user is directed to a visual element, such as a virtual button, an icon, and/or a predefined region of the three-dimensional environment), a voice command, a contacting of a physical button, and/or one or more contacts of an object with a touch sensitive surface that is in communication with the computer system. In some embodiments, the second input includes attention of the user directed to a region of the three-dimensional environment (e.g., a region that is relatively central and/or toward a top edge of the user's current viewpoint).

In some embodiments, in response to detecting the second input, the computer system displays, via the display generation component, a system user interface associated with an operating system of the computer system, such as interface 2806 in FIG. 28C, wherein the system user interface includes one or more second selectable options, such as selectable option 2820, different from the one or more first selectable options, including a third selectable option, different from the first selectable option and the second selectable option, that is selectable to initiate a process to change a time of day setting of the three-dimensional environment from the first time of day setting to a second time of day setting, different from the first time of day setting, such as selectable option 2820 in FIG. 28C. For example, the system user interface optionally has one or more characteristics of the system user interfaces described herein and/or with reference to method 3100, such as a first type of system user interface, described with reference to the present method. In some embodiments, the first type of system user interface includes one or more selectable options that are selectable to change the visual appearance of the three-dimensional environment, such as from a first time of day setting to a second time of day setting. In some embodiments, such one or more selectable options are displayed in response to detecting the second input. In some embodiments, the computer system detects a third input directed toward the third selectable option (e.g., an air gesture, an interaction with a hardware control of the device, an interaction with a portion of a housing of the device, a voice command detected by the computer system, and/or another input as described further with step(s) 2902 of the present method).

In some embodiments, while displaying the second one or more selectable options including the third selectable option, the computer system detects, via the one or more input devices, a third input (e.g., as described above with reference to inputs described with reference to step(s) 2902 of the present method), different from the first input and the second input directed toward the third selectable option, such as an input directed toward selectable option 2822 in FIG. 28C.

In some embodiments, in response to detecting the third input, the computer system changes the visual appearance of the three-dimensional environment to correspond to a second time of day setting, different from the first time of day setting, such as visual appearance corresponding to the setting associated with selectable option 2822 in FIG. 28C. For example, optionally while maintaining display of the media content in the three-dimensional environment. Including selectable option to change the time of day setting associated with a visible three-dimensional environment in a system user interface reduces user input required to traverse additional user interfaces and/or menus, thereby reducing processing required to detect such input and operations performed in accordance with such input.

In some embodiments, the second input includes an air gesture associated with a system function of the computer system, such as an air gesture performed by hand 2801 in FIGS. 28A and 28A1. For example, the second input optionally includes an air gesture performed by a portion of the user's body, such as one or more fingers, hands, forearms, and/or arms, and/or optionally includes attention (or is an attention-only input) of the user. Displaying the system user interface in response to an input including an air gesture reduces communication required with additional input devices other than those used to detect air gestures, thereby reducing power consumption of the computer system.

In some embodiments, the third selectable option is displayed in the system user interface when the system user interface is displayed, without requiring additional user input, such as selectable option 2808 or selectable 2810 in FIG. 28B. For example, the computer system optionally displays the system user interface (e.g., first type of system user interface) in response to the second input, optionally including the third selectable option. Thus, in a hierarchy of the system user interface, the third selectable option is optionally displayed at a first or top level of the system user interface (e.g., where a second level of the system user interface is accessed in response to detecting a selection of a selectable option that is displayed in the first level of the system user interface, a third level of the system user interface is accessed in response to detecting a selection of a selectable option displayed in the second user interface, and so on). Including the third selectable option in the system user interface without requiring additional user input reduces user input required to access the third selectable option, thus reducing processing required to detect and perform operations in accordance with such user input.

In some embodiments, the system user interface includes a control element corresponding to an environmental audio volume control for the three-dimensional environment, such as slider 2815 in FIG. 28I. For example, the first type of system user interface and/or the home interface optionally include a volume control, that can be modified to change a level of environmental audio presented by the computer system based on sounds associated with the three-dimensional environment, such as prerecorded sounds of a forest, a lake, and/or sounds associated with providing non-visual feedback when interacting with virtual objects in the three-dimensional environment. In some embodiments, the first type of system user interface is updated to include the volume control in response to detecting a selection of a selection option that is displayed when the first type of system user interface is initially displayed. The control element optionally includes a volume slider. In some embodiments, the computer system detects an input selecting and moving a current position of the volume slider (e.g., an air gesture including an air pinch and movement of the air pinch, a movement of contact on a touch-sensitive surface, a voice command requesting a setting of a volume level, and/or movement of a pointing device such as a mouse or a stylus while a cursor is directed to the slider). In some embodiments, the computer system increases or decreases the level of environmental audio in accordance with a magnitude of the moving and/or a direction of the moving (e.g., upwards movement of the slider to increase volume, downwards to decrease volume, leftward to decrease volume, rightward to increase volume, and/or vice-versa). In some embodiments, when the computer system initially displays the first type of system user interface, the computer system displays a first volume slider corresponding to a system audio level. In some embodiments, in response to detecting input, such as a selection input, directed to the first volume slider, the computer system displays a second and/or a third volume slider, respectively corresponding to an environmental volume level slider and a media content volume level slider. In some embodiments, the second and the third volume sliders are independent of one another. In some embodiments, the computer system changes the second and the third volume sliders in accordance with detected changes to the first volume slider.

In some embodiments, the computer system detects, via the one or more input devices, a third input, different from the first input and the second input, directed to the control element and corresponding to a request to change a level of environmental audio volume for the three-dimensional environment, such as directed to slider 2815 in FIG. 28I. For example, the third input (e.g., an air gesture, an interaction with a hardware control of the device, an interaction with a portion of a housing of the device, a voice command detected by the computer system, and/or another input as described further with step(s) 2902 of the present method) includes the input directed to the volume slider. In some embodiments, the third input has one or more characteristics of inputs described above or below.

In some embodiments, in response to detecting the third input, the computer system changes the level of environmental audio volume for the three-dimensional environment from a first level to a second level without changing an audio volume for the media content such as a changing of slider 2815 without a changing of slider 2817 in FIG. 28I. For example, the computer system optionally changes the environmental volume level separately from changing media content volume levels. In some embodiments, in response to the third input, the computer system forgoes changing of the audio volume level from a respective first level to a respective second level. Changing the environmental audio volume while maintaining the audio volume for media content improves user awareness of the user's environment, thus reducing the likelihood that the user is unable to discern environmental sounds that are masked by audio of the media content, thereby reducing cognitive burden of the user.

In some embodiments, the system user interface includes a control element corresponding to a system audio volume control for the three-dimensional environment, such as slider 2812 in FIG. 28H. For example, the system user interface (e.g., the first type of system user interface and/or the home interface) optionally includes a control element that has one or more characteristics of the audio-related control element. For example, the system user interface optionally includes a first volume slider, that the user is able to change to cause changes in the system audio volume levels (e.g., a volume of notifications provided by the computer system, a volume of sound effects providing non-visual feedback when moving virtual objects and/or navigating the system user interface, and/or when providing non-visual feedback about a status of the computer system such as a status of battery and/or wireless connectivity). In some embodiments, the system audio volume control is displayed without displaying one or more selectable options and/or audio volume level control elements directed to changing the level of environmental audio.

In some embodiments, the computer system detects, via the one or more input devices, a third input, different from the first input and the second input, directed to the control element and corresponding to a request to change a level of the system audio volume such as input 2841 directed to slider 2812 in FIG. 28H. For example, the third input has one or more characteristics of the third input described previously with reference to changing the environmental audio volume level (e.g., includes an air gesture, an interaction with a hardware control of the device, an interaction with a portion of a housing of the device, a voice command detected by the computer system, and/or another input as described further with step(s) 2902 of the present method), directed instead to the system audio volume control. In some embodiments, the third input has one or more characteristics of inputs described above or below.

In some embodiments, in response to detecting the third input, the computer system changes a level of environmental audio volume for the three-dimensional environment from a first level to a second level and changing an audio volume for the media content from a third level to a fourth level, such as change to sliders 2815 and 2817 in FIG. 28I. For example, the computer system optionally changes the environmental audio level and/or the audio volume for the media content, optionally concurrently, and/or optionally by a magnitude and/or in a direction based on (e.g., the same as, and/or proportional to) the manipulation of the system audio level in response to detecting the third input (and/or optionally without detecting one or more inputs directly changing the environmental audio level and/or the audio volume for the media content). Changing levels of environmental audio and of media content volume in response to detecting input changing a system volume reduces user input required to individually change the various volume levels, thereby reducing processing required to detect and perform operations in accordance with such user input.

It should be understood that the particular order in which the operations in method 2900 have been described is merely exemplary and is not intended to indicate that the described order is the only order in which the operations could be performed. One of ordinary skill in the art would recognize various ways to reorder the operations described herein.

FIGS. 30A-30O generally illustrate examples of a computer system that maintains or changes characteristics of a three-dimensional environment in response to detecting user input to enter different viewing modes of the content.

FIG. 30A illustrates a computer system (e.g., an electronic device) 101 displaying, via display generation component 120 (e.g., display generation component 120 of FIG. 1), a three-dimensional environment 3002 from a viewpoint of a user (e.g., user 3026) of the computer system 101. In some embodiments, computer system 101 includes a display generation component (e.g., a touch screen or non-touch screen display) and a plurality of image sensors (e.g., image sensors 314 of FIG. 3). The image sensors optionally include one or more of a visible light cameras, an infrared camera, a depth sensor, or any other sensor the computer system 101 would be able to use to capture one or more images of a user or a part of the user (e.g., one or more hands of the user) while the user interacts with the computer system 101. In some embodiments, the user interfaces illustrated and described below could also be implemented on a head-mounted display that includes a display generation component that displays the user interface or three-dimensional environment to the user, and sensors to detect the physical environment and/or movements of the user's hands (e.g., external sensors facing outwards from the user), and/or attention (e.g., gaze) of the user (e.g., internal sensors facing inwards towards the face of the user).

As shown in FIG. 30A, a virtual environment 3003 is displayed by computer system 101 in three-dimensional environment 3002. In some embodiments, virtual environment 3003 is a fully immersive virtual environment from the current viewpoint of user 3026 (e.g., passthrough of a physical environment of user 3026 is not visible to user 3026 from their current viewpoint). In FIG. 30A, virtual environment 3003 includes the display of a virtual scene, such as a beach scene including simulated sunlight from virtual sun 3040 and including trees. For example, the sunlight and trees are virtual representations created by computer system 101 that are displayed in virtual environment 3003. In some embodiments, virtual environment 3003 is not a fully immersive virtual environment (e.g., virtual environment 3003 is a mixed-reality environment (e.g., user 3026 is partially immersed in virtual environment 3003 from their current viewpoint, and passthrough of the physical environment of user 3026 is optionally displayed in three-dimensional environment 3002 concurrently with virtual environment 3003)).

In FIG. 30A, computer system 101 displays media 3033 in virtual environment 3003. In some embodiments, media 3033 is displayed within a virtual object (e.g., a virtual window and/or container associated with a respective application) that is displayed in virtual environment 3003. In some embodiments, respective media 3033 includes video content (e.g., such as a movie and/or television show (e.g., from a streaming service application), and/or an online video (e.g., from a video sharing service or social media application)). In some embodiments, respective media 3033 includes audio content associated with the video content. In FIG. 30A, media 3033 is optionally a video that is not in playback. In FIG. 30A, playback control user interface 3034 is associated with media 3033 and includes selectable user interface elements for playing the media (e.g., control 3034*a*), pausing the media (e.g., control 3034*b*), rewinding the media (e.g., control 3034*c*), fast forwarding the media (e.g., control 3034*d*), displaying the media at a respective location for media content in virtual environment 3003 (e.g., control 3034*e*), and a "more options" user interface element (e.g., control 3034*f*) for displaying more controls. In FIG. 30A, media 3033 includes a selectable user interface element 3037 that is selectable to display additional media controls. Also, in FIG. 30A, playback control user interface 3034 is closer to the viewpoint of user 3026 than content 3033.

In FIG. 30A, computer system 101 displays virtual environment 3003 with a light mode appearance (e.g., a daytime appearance). FIG. 30A includes a user interface 3016 that includes selectable user interface elements for controlling the appearance of virtual environment 3003, in addition to includes a selectable user interface element 3017 for displaying a different user interface of controls. For example, control 3020 (e.g., Mode 1) optionally corresponds to a light environmental mode, in which virtual environment 3003 has a daytime appearance, control 3022 (e.g., Mode 2) optionally corresponds to a dark environmental mode, in which virtual environment 3003 has a nighttime appearance, and control 3018 optionally corresponds to an automatic environmental mode, in which virtual environment 3003 has an appearance that is optionally based on the current time of day at computer system 101 (e.g., when the current time of day at computer system 101 corresponds to daytime, virtual environment 3003 has a daytime appearance and when the current time of day at computer system 101 corresponds to nighttime, virtual environment 3003 has a nighttime appearance). In FIG. 30A, control 3018 is currently selected; as such, computer system 101 is in the automatic environmental appearance mode and is displaying the light mode appearance of virtual environment 3003. In FIG. 30A, virtual environment optionally has the light mode appearance because as shown in the display generation component 120 (for ease of description purposes), a time of day at the physical location of computer system 101 is 9:32 AM, and at the physical location of computer system, at that time of day, it is optionally daytime. It should be noted that user interface 3016 is optionally not displayed, and is sometimes illustrated in FIGS. 30A-30L to indicate certain status information for ease of description, such as to indicate which environmental appearance mode in which computer system 101 is operating.

In FIG. 30A, computer system 101 detects input **3036*a* (e.g., attention of the user and/or input from hand 3001 of user 3026, such as an air pinch gesture) requesting to play media 3033. In response to detecting input 3036*a*, computer system 101 plays media 3033 and switches the appearance of virtual environment 3003 from the light mode appearance (e.g., daytime appearance) to the dark mode appearance (e.g., nighttime appearance), as shown in FIG. 30**B.

As shown in FIG. 30B, the simulated physical space of virtual environment 3003 is in the night mode appearance. For example, virtual environment 3003 now includes virtual light from virtual moon 3042 and stars in the sky, instead of virtual sun 3040. As such, when computer system is in the automatic environmental mode and displaying light mode appearance of a virtual environment, input directed to media (e.g., input to play media) optionally switches appearance of the virtual environment from the light mode appearance to the dark mode appearance, thus optionally overriding the correspondence of automatic environmental mode showing light mode appearance during daytime at the computer system.

FIGS. 30B-1- and 30B-2 illustrate an example of computer system 101 detecting input for displaying additional media controls and displaying additional media controls in response to the input.

In FIG. 30B-1, computer system 101 alternatively detects input (e.g., attention of the user and/or input from hand 3001 of user 3026, such as an air pinch gesture) directed to selectable user interface element 3037 that is selectable to display additional media controls or control **3034*f* of playback control user interface for displaying more controls. In response, computer system 101 displays user interface 3044 which includes controls 3044*a-d*, which correspond to a playback speed controller, language controller for selecting a language of presentation of content 3033, a subtitles controller for enabling or disabling display of subtitles, and a dimming control for dimming (e.g., a mode for reducing a visual prominence of three-dimensional environment outside of content 3033, as described with reference to method 3100) three-dimensional environment 3002, respectively, as shown in FIG. 30B-2. Also, user interface 3044 is closer to the viewpoint of the user than playback control user interface 3034 and content 3033 as shown in overhead view 3027 of FIG. 30B-2**.

Figure 30C:
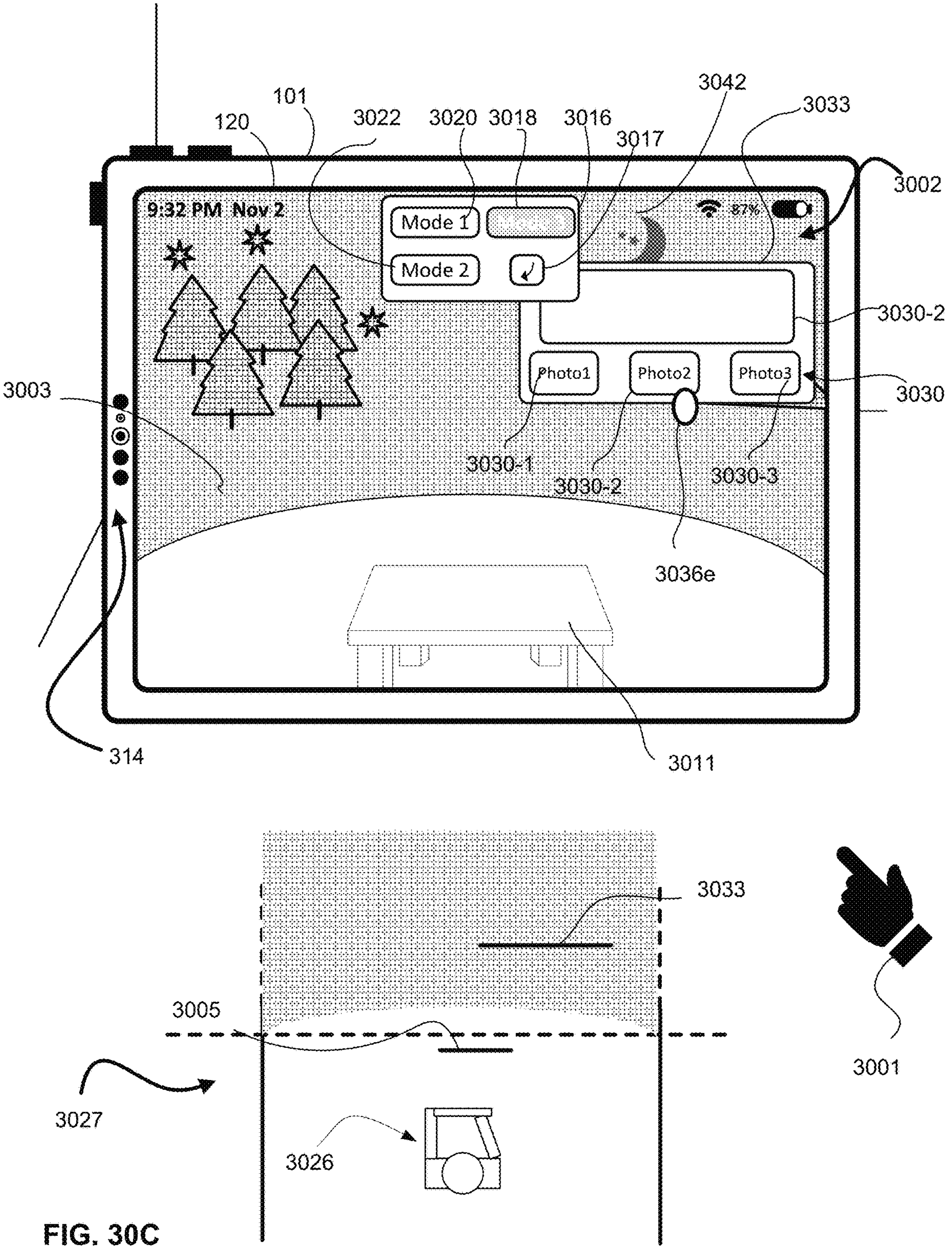
Figure 30D:
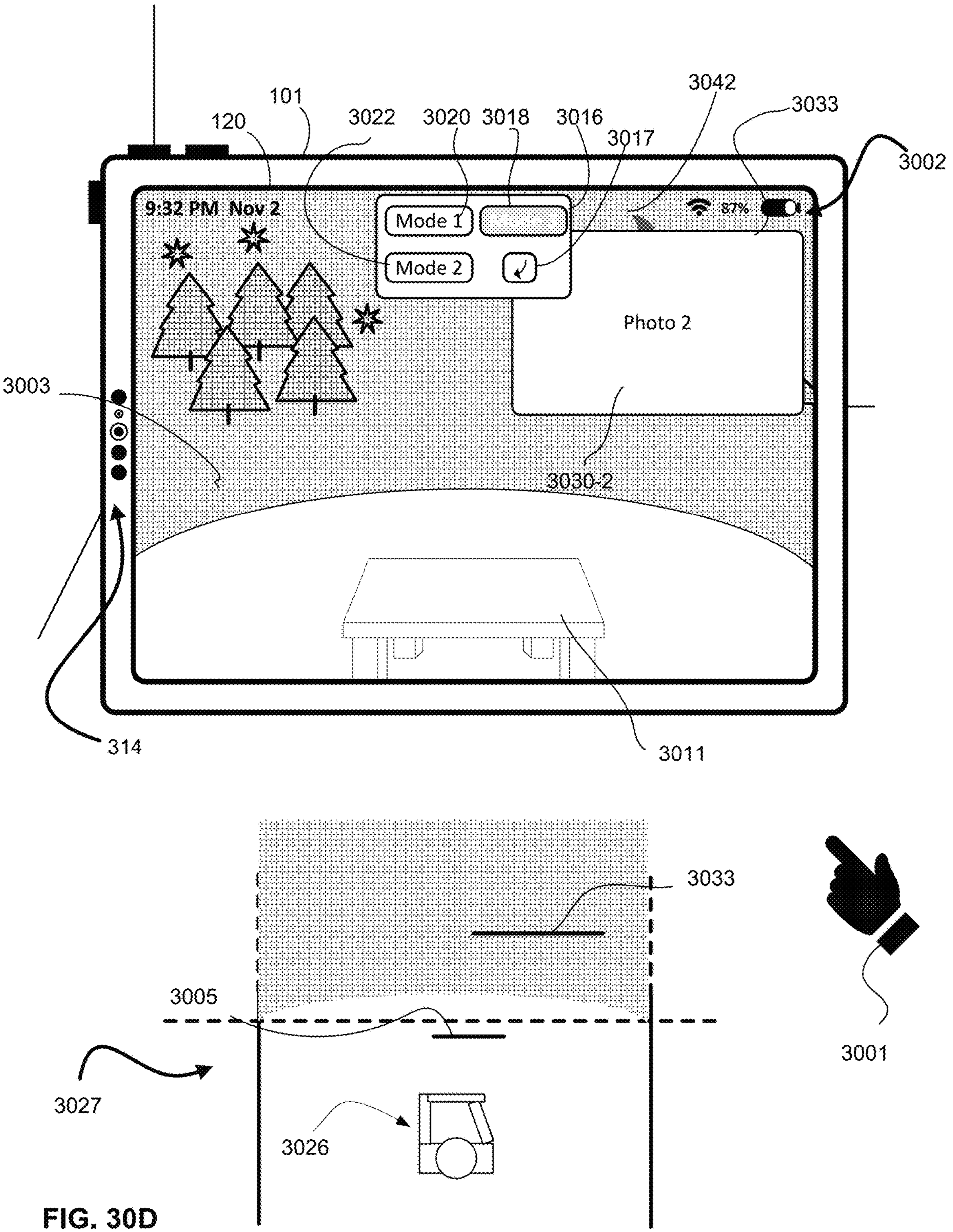

Moving on, in FIG. 30C, computer system 101 shows dark mode appearance of virtual environment 3003 because computer system 101 is operating in the automatic environment mode and the time of day at computer system 101 is 9:32 AM, which corresponds to daytime at the physical location of computer system 101. Media 3033 in FIG. 30C includes a photo array including photos 3030-1 through 3030-3 and element 3030-2, which is optionally includes metadata (e.g., date of capture and location capture) associated with photos 3030-1 through 3030-3. In FIG. 30C, computer system 101 detects input **3036*e* (e.g., attention of the user and/or input from hand 3001 of user 3026, such as an air pinch gesture) requesting to view a particular photo, photo 3030-2, in focus. In response to detecting input 3036*e* of FIG. 30C, computer system 101 displays photo 3030-2 in focus and maintains the appearance of virtual environment 3003 in dark mode appearance (e.g., nighttime appearance), as shown in FIG. 30**D.

Figure 30E:
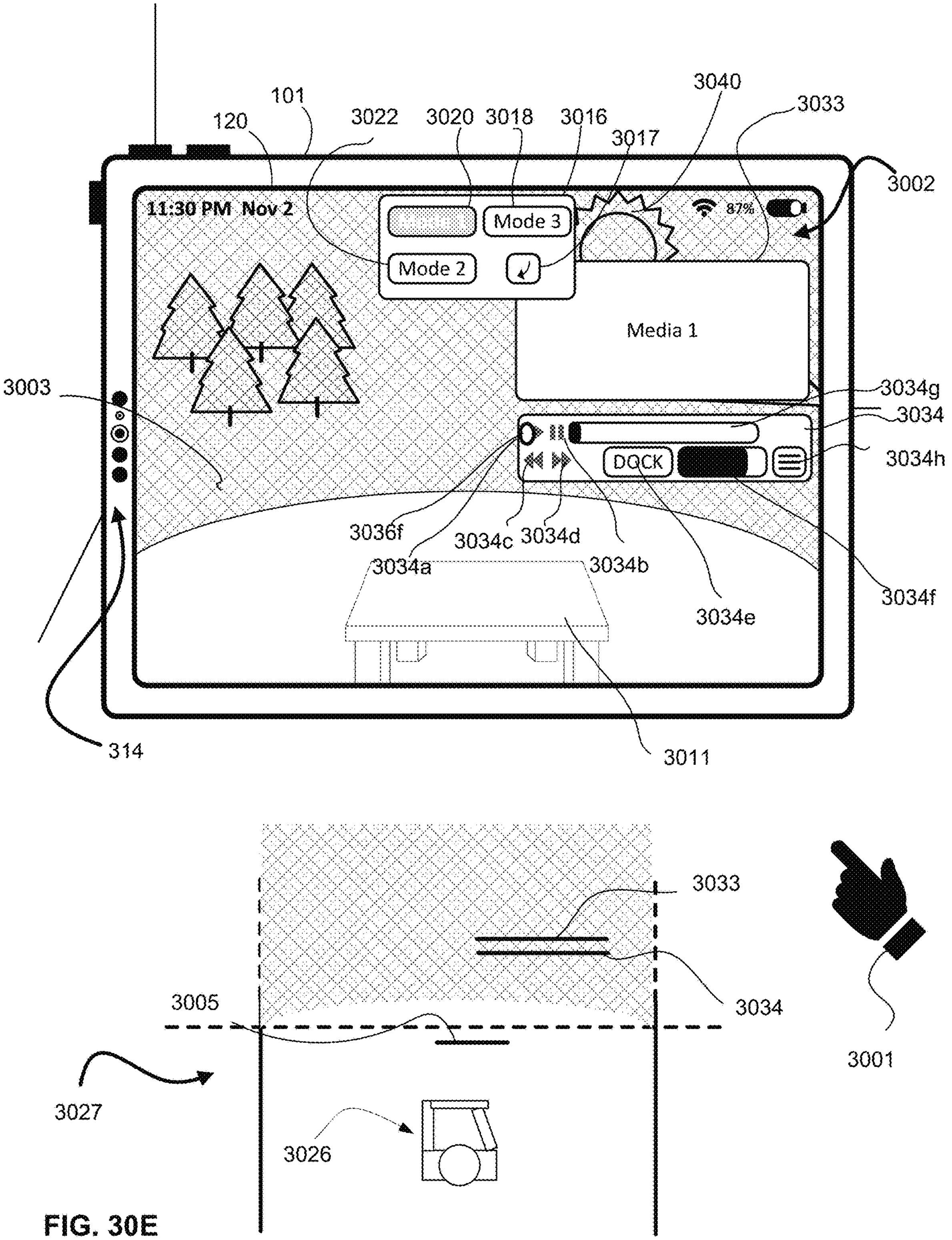

FIG. 30E illustrates an example of computer system 101 operating in the light environmental mode (e.g., mode 3020 as shown in user interface 3016) and showing appearance of virtual environment 3003 in light mode appearance (e.g., a daytime appearance) as a result of operating in light environment mode. In FIG. 30E, media 3033 is optionally a video that is not in playback. A current time of day at computer system 101 indicates 11:30 PM, which if computer system was operating in automatic environmental mode (e.g., mode 3018), would have resulted in computer system displaying night mode appearance. In FIG. 30E, computer system 101 detects input **3036*f* (e.g., attention of the user and/or input from hand 3001 of user 3026, such as an air pinch gesture) requesting to play media 3033. In response to detecting input 3036*f*, computer system 101 plays media 3033 and maintains the light mode appearance of virtual environment 3003, as shown in FIG. 30**F.

Figure 30F:
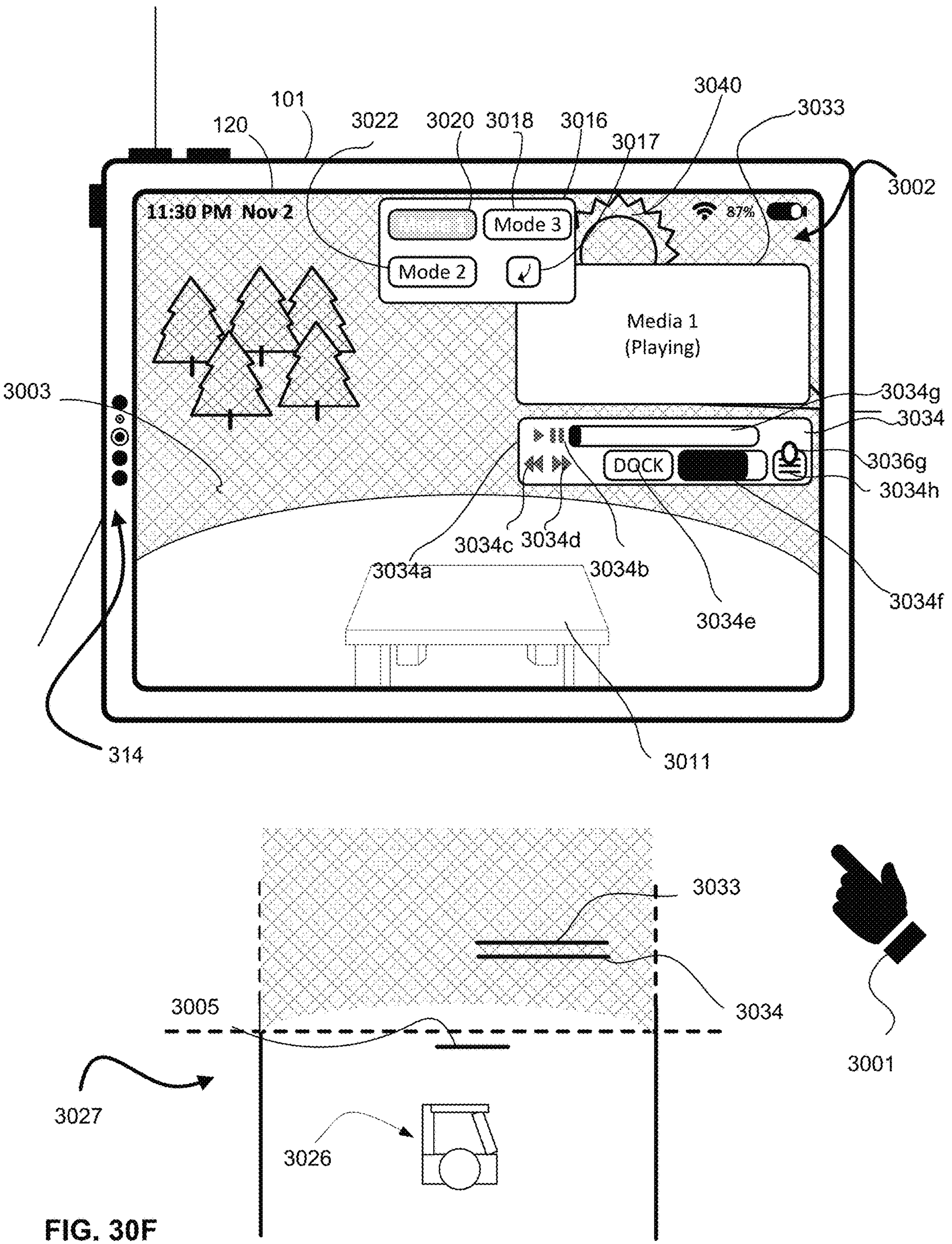
Figures 1, 30F:
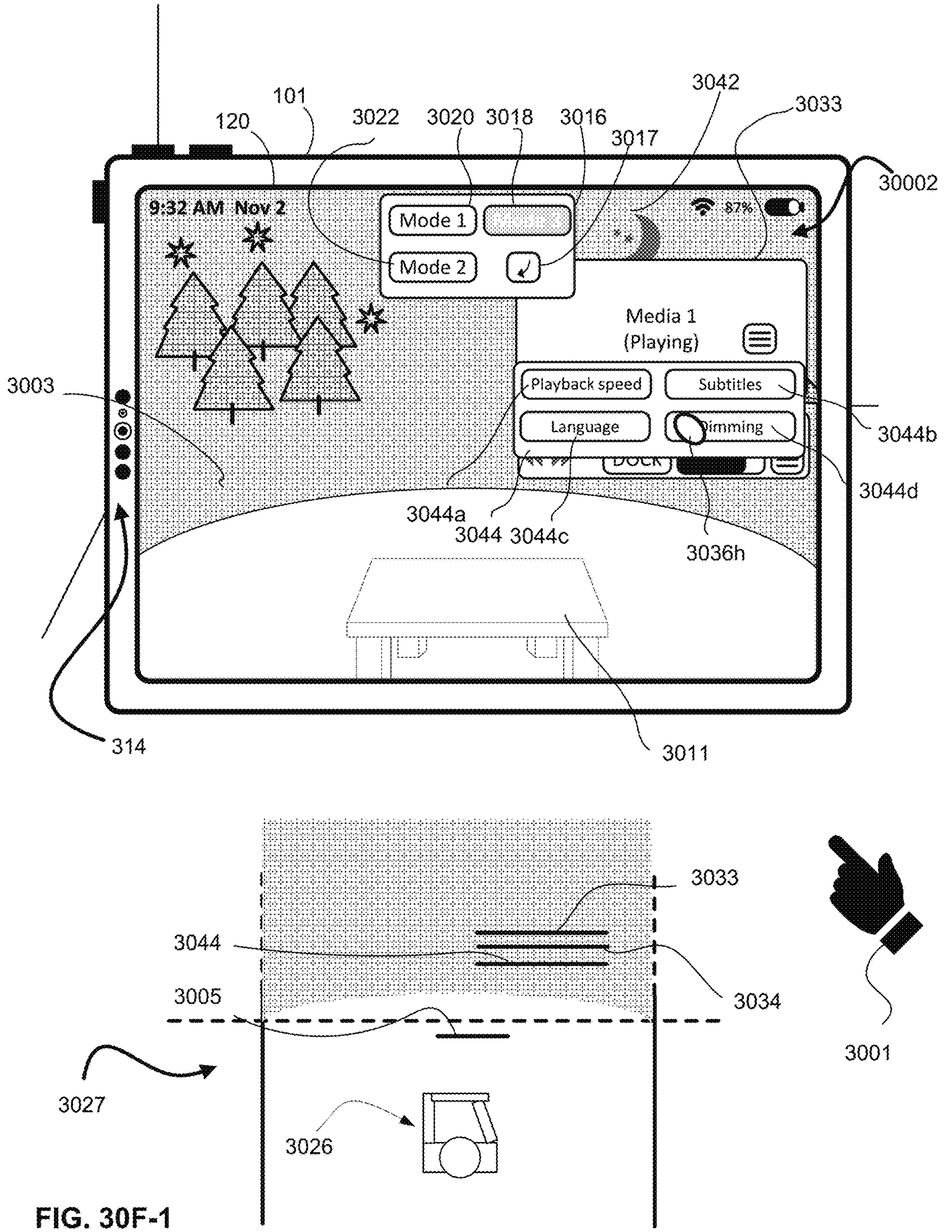

In FIG. 30F, computer system 101 is operating in the light environmental mode (e.g., mode 3020) while showing media 3033 in playback. In FIG. 30F, input **3036*g* (e.g., attention of the user and/or input from hand 3001 of user 3026, such as an air pinch gesture) is directed to playback control user interface 3034, and specifically to option 3034*h*** (e.g., a "more options" user interface element) for displaying additional controls.

In response to computer system 101 detecting input **3036*g*, computer system 101 displays user interface 3044, as shown in FIG. 30E-1. User interface 3044 of FIG. 30E-1 is optionally as described with reference to user interface 3044 of FIG. 30B-2. In FIG. 30E-1, input 3036*h* (e.g., attention of the user and/or input from hand 3001 of user 3026, such as an air pinch gesture) is directed to user interface 3044, and specifically to option 3044*d* for dimming three-dimensional environment 3002**.

Figure 30G:
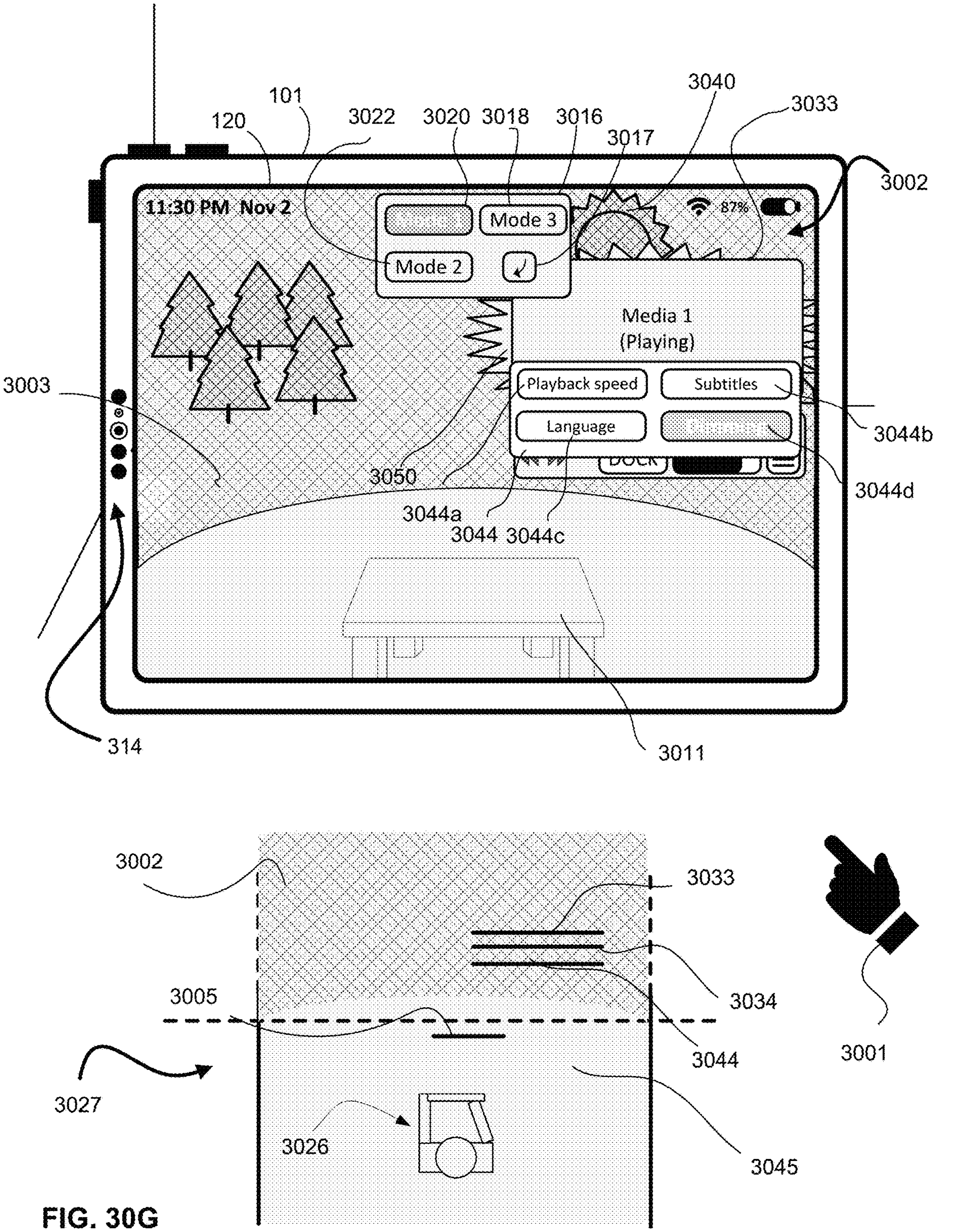

In response to computer system 101 detecting input 3036*h*, computer system 101 dims three-dimensional environment 3002, including dimming virtual environment 3003 in the light mode appearance and dimming passthrough portion (e.g., in which optical passthrough is visible or in which virtual passthrough content is displayed) (e.g., in which table 3011 is visible in display generation component 120), as shown in FIG. 30G. As shown in overhead view 3027 of FIG. 30G, computer system 101 optionally dims three-dimensional environment 3002 including portions of three-dimensional environment 3002 that are not part of virtual environment 3003 (e.g., computer system 101 applies dimming (e.g., tints) portions of physical environment of computer system 101 that are visible via display generation component 120). In FIG. 30G, computer system 101, while remaining in the light mode appearance of virtual environment 3003 (e.g., while virtual sun 3040 is displayed) reduces a visual prominence of three-dimensional environment 3002 outside of media 3033 and displays a simulated emissive effect surrounding media 3033 to increase an immersive experience of the user with the media 3033 and reduce lighting distraction away from media 3033.

FIG. 30G1 illustrates similar and/or the same concepts as those shown in FIG. 30G (with many of the same reference numbers). It is understood that unless indicated below, elements shown in FIG. 30G1 that have the same reference numbers as elements shown in FIGS. 30A-30O have one or more or all of the same characteristics. FIG. 30G1 includes computer system 101, which includes (or is the same as) display generation component 120. In some embodiments, computer system 101 and display generation component 120 have one or more of the characteristics of computer system 101 shown in FIGS. 30A-30O and display generation component 120 shown in FIGS. 1 and 3, respectively, and in some embodiments, computer system 101 and display generation component 120 shown in FIGS. 30A-30O have one or more of the characteristics of computer system 101 and display generation component 120 shown in FIG. 30G1.

In FIG. 30G1, display generation component 120 includes one or more internal image sensors 314*a* oriented towards the face of the user (e.g., eye tracking cameras 540 described with reference to FIG. 5). In some embodiments, internal image sensors 314*a* are used for eye tracking (e.g., detecting a gaze of the user). Internal image sensors 314*a* are optionally arranged on the left and right portions of display generation component 120 to enable eye tracking of the user's left and right eyes. Display generation component 120 also includes external image sensors 314*b* and 314*c* facing outwards from the user to detect and/or capture the physical environment and/or movements of the user's hands. In some embodiments, image sensors 314*a*, 314*b*, and 314*c* have one or more of the characteristics of image sensors 314 described with reference to FIGS. 30A-30O.

In FIG. 30G1, display generation component 120 is illustrated as displaying content that optionally corresponds to the content that is described as being displayed and/or visible via display generation component 120 with reference to FIGS. 30A-30O. In some embodiments, the content is displayed by a single display (e.g., display 510 of FIG. 5) included in display generation component 120. In some embodiments, display generation component 120 includes two or more displays (e.g., left and right display panels for the left and right eyes of the user, respectively, as described with reference to FIG. 5) having displayed outputs that are merged (e.g., by the user's brain) to create the view of the content shown in FIG. 30G1.

Display generation component 120 has a field of view (e.g., a field of view captured by external image sensors 314*b* and 314*c* and/or visible to the user via display generation component 120) that corresponds to the content shown in FIG. 30G1. Because display generation component 120 is optionally a head-mounted device, the field of view of display generation component 120 is optionally the same as or similar to the field of view of the user.

In FIG. 30G1, the user is depicted as performing an air pinch gesture (e.g., with hand 3001 while attention of the user is directed to the Mode 1 option, as indicated by gaze point 3098) to provide an input to computer system 101 to provide a user input directed to content displayed by computer system 101. Such depiction is intended to be exemplary rather than limiting; the user optionally provides user inputs using different air gestures and/or using other forms of input as described with reference to FIGS. 30A-30O.

In some embodiments, computer system 101 responds to user inputs as described with reference to FIGS. 30A-30O.

In the example of FIG. 30G1, because the user's hand is within the field of view of display generation component 120, it is visible within the three-dimensional environment. That is, the user can optionally see, in the three-dimensional environment, any portion of their own body that is within the field of view of display generation component 120. It is understood than one or more or all aspects of the present disclosure as shown in, or described with reference to FIGS. 30A-30O and/or described with reference to the corresponding method(s) are optionally implemented on computer system 101 and display generation unit 120 in a manner similar or analogous to that shown in FIG. 30G1.

Figure 30H:
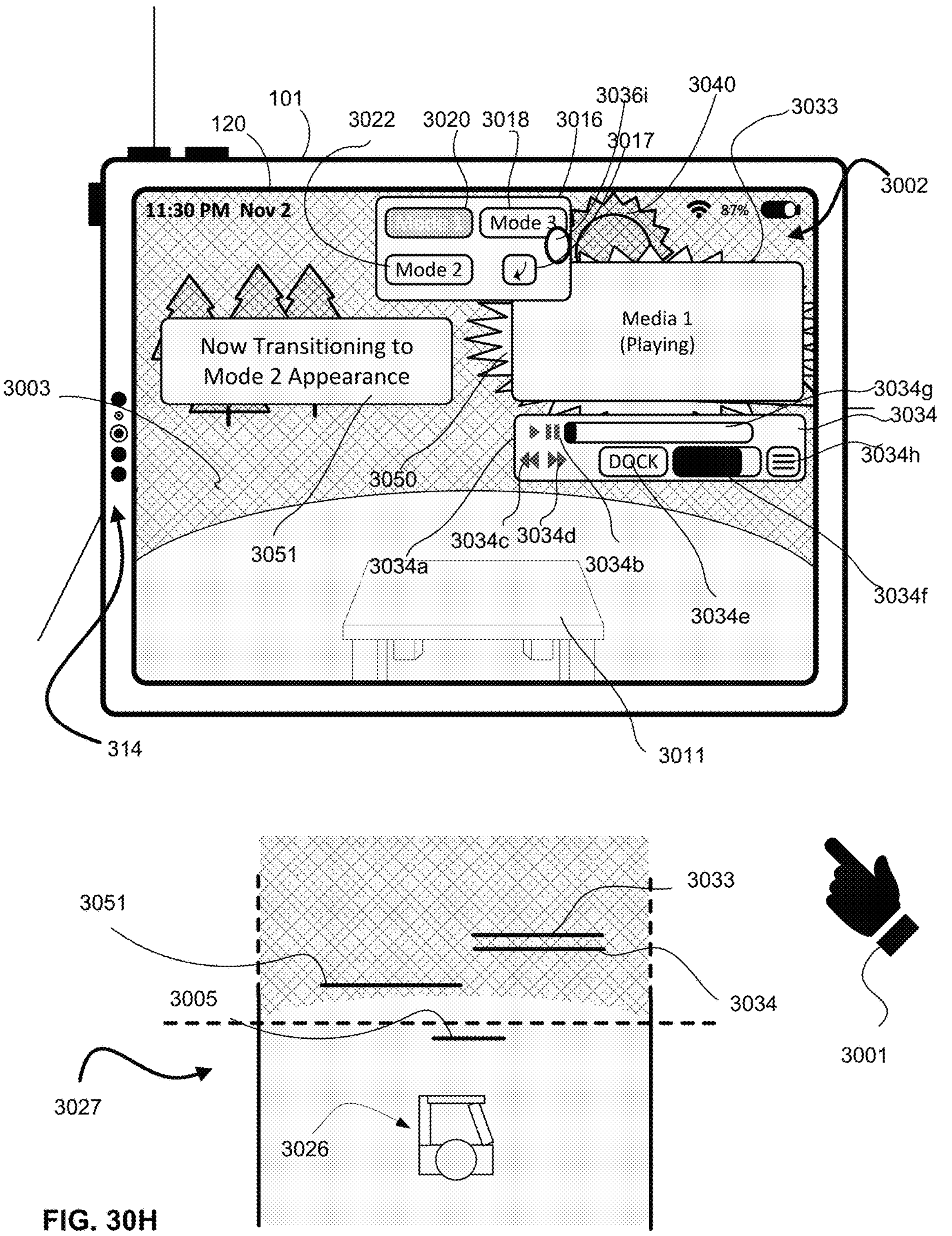

Sometimes, a user will use the computer system to switch the environmental mode of three-dimensional environment 3002. In FIG. 30H, input 3036*i* (e.g., attention of the user) is directed to system user interface 3016 for switching the current environmental mode of three-dimensional environment 3002. In particular, in FIG. 30H, input 3036*i* is directed to mode 3018 which corresponds to the automatic environmental mode. As described above, when computer system operates in mode 3018, computer system optionally displays virtual environment 3003 with light mode appearance if a current time of day at the computer system 101 corresponds to daytime and optionally displays virtual environment 3003 with dark mode appearance if a current time of day at computer system 101 corresponds to nighttime. In FIG. 30H, the current time of day at computer system 101 (e.g., as indicated in the top right portion of display generation component 120) is 11:30 PM, which optionally, at the physical location of computer system 101 corresponds to nighttime. However, when input 3036*i* is detected, computer system is displaying virtual environment 3003 in light mode appearance (e.g., as shown with highlight of mode 3020 in FIG. 30H). Thus, if computer system 101 switches to automatic environmental mode, which optionally results in displaying a dark mode appearance of virtual environment 3003 if automatic environmental mode is selected at the illustrated current time of day (e.g., 11:30 PM) at the physical location of computer system 101, computer system 101 would have to switch the visual appearance of three-dimensional environment 3003 from light mode appearance to dark mode appearance. When input 3036*i* is detected, computer system 101 optionally displays user interface 3051 of FIG. 30H, which includes a notification that switching from environmental mode 3020 (e.g., light environmental mode) to mode 3018 (e.g., automatic environmental mode) would cause the visual appearance of three-dimensional environment 3002 (e.g., outside of media 3033) to switch from light mode appearance (e.g., showing light from virtual sun 3040 and a daytime appearance at the simulated physical location of virtual environment 3003) to dark mode appearance (e.g., showing light from virtual moon 3042 and a nighttime appearance at the simulated physical location of virtual environment 3003).

Figure 30I:
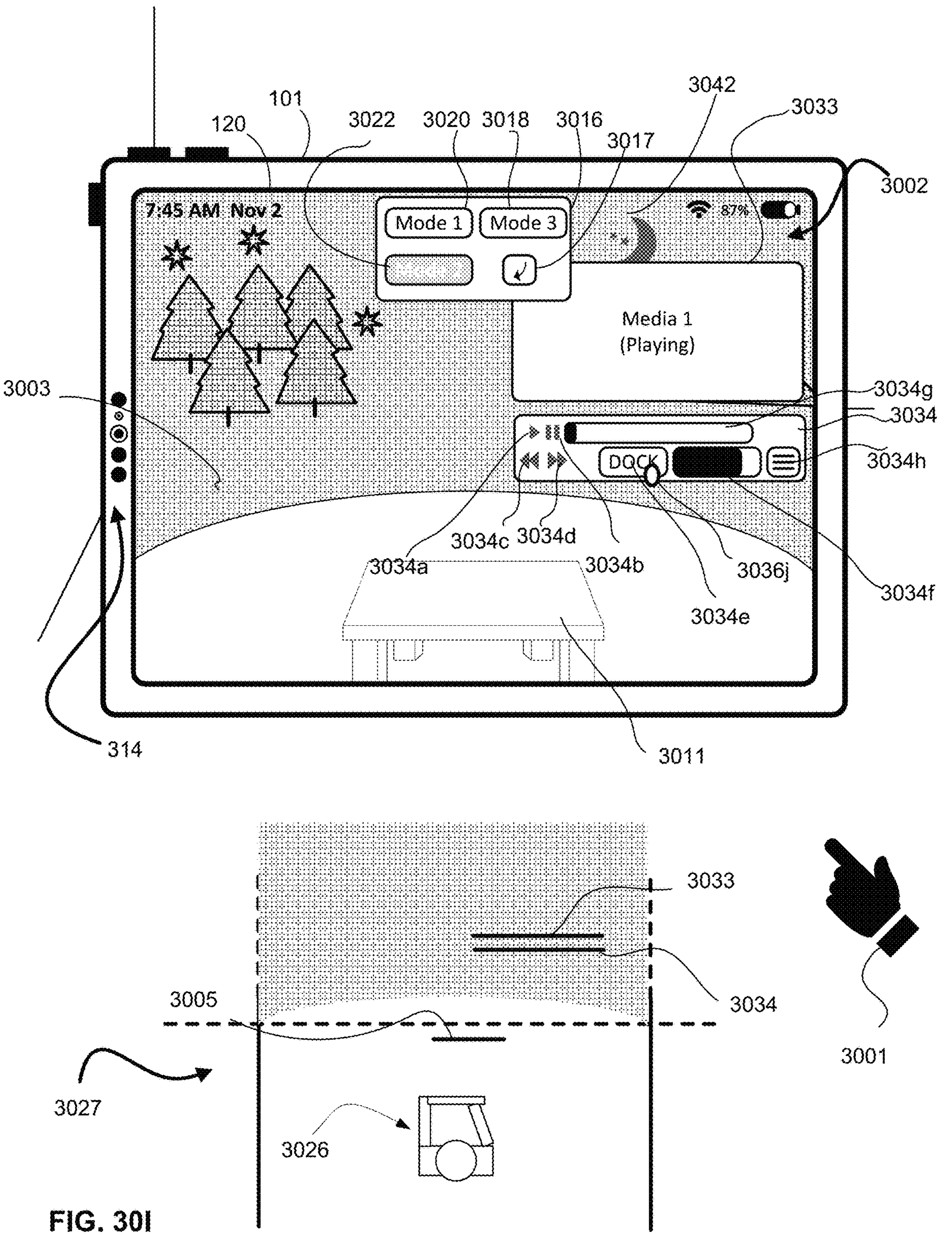

In FIG. 30I, computer system 101 is operating in environmental mode 3022 (e.g., dark environment mode, which optionally causes computer system 101 to show virtual environment 3003 in dark mode appearance (e.g., nighttime) while displaying media 3033 in playback. In FIG. 30I, input 3036*j* (e.g., attention of the user and/or input from hand 3001 of user 3026, such as an air pinch gesture) is directed to playback control user interface 3034, and specifically to option 3034*e* for displaying media at a respective location for media content in virtual environment 3003 (e.g., respective location for media content, such as a "docked" location, as described with reference to method 3100). In response to detecting input 3036*j*, computer system 101 displays media 3033 at the respective location for media content in virtual environment 3003 and maintains the dark mode appearance, as shown in FIG. 30J.

Figure 30J:
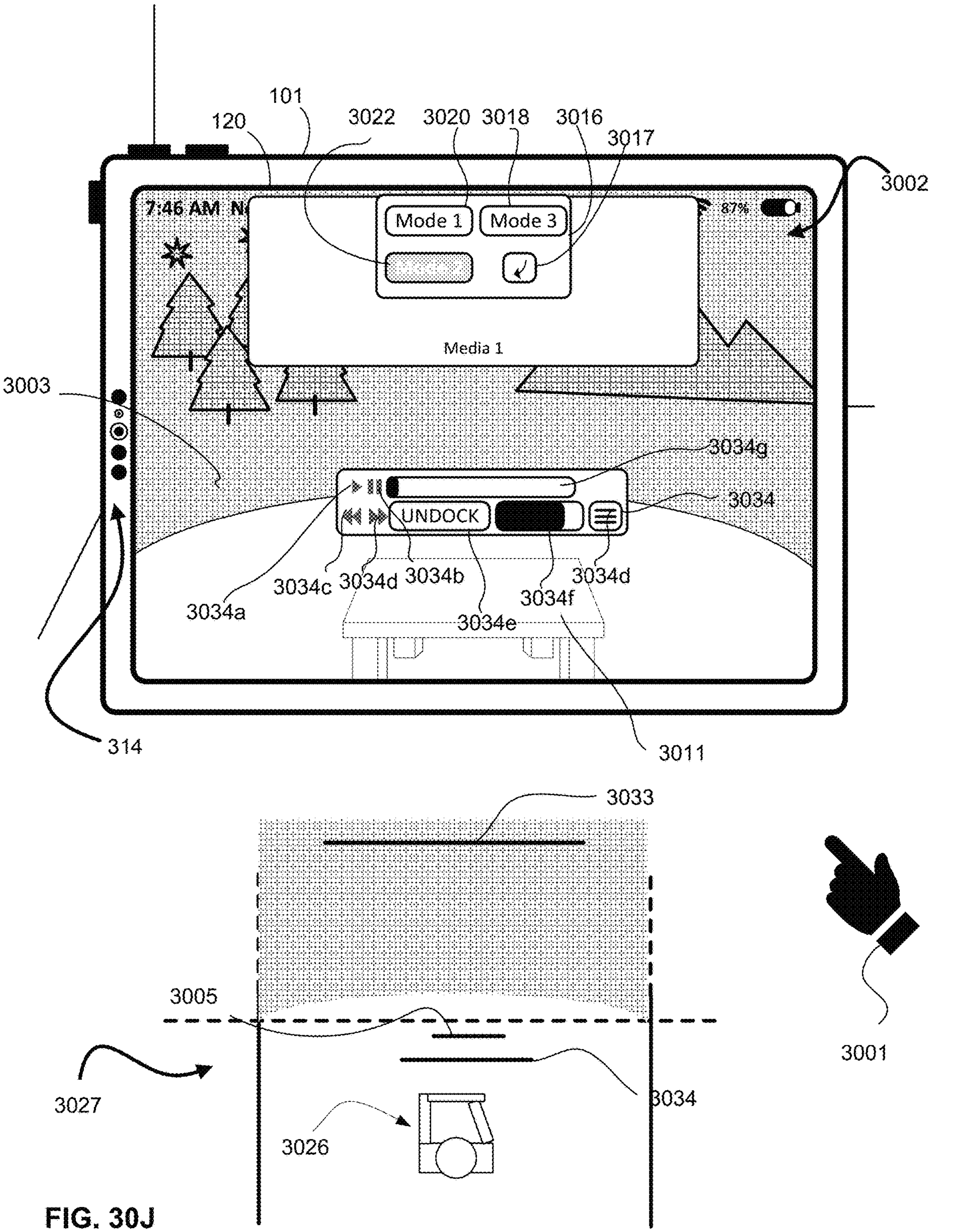

In FIG. 30J in response to detecting input 3036*j* of FIG. 30I, computer system 101 has moved media 3033 to the respective location for media content in virtual environment 3003, enlarged media 3033 (e.g., as shown by the increased size of media 3033 in display generation component 120 and in overhead view 3027 in FIG. 30J compared to size of media 3033 in display generation component 120 and in overhead view 3027 in FIG. 30I), and has moved playback control user interface 3034 closer to viewpoint of user 3026 (and increased a distance between playback control user interface 3034 and media 3033). Also, in FIG. 30J, in playback control user interface 3034, option 3034*e* shows an option to undock media 3033, which upon selection, optionally causes computer system 101 to display media 3033 in virtual environment 3003 at the location of media 3033 when input for displaying media 3033 at the respective location for media 3033 in virtual environment 3003 was received (e.g., when input 3036*j* was received in FIG. 30I).

Figure 30K:
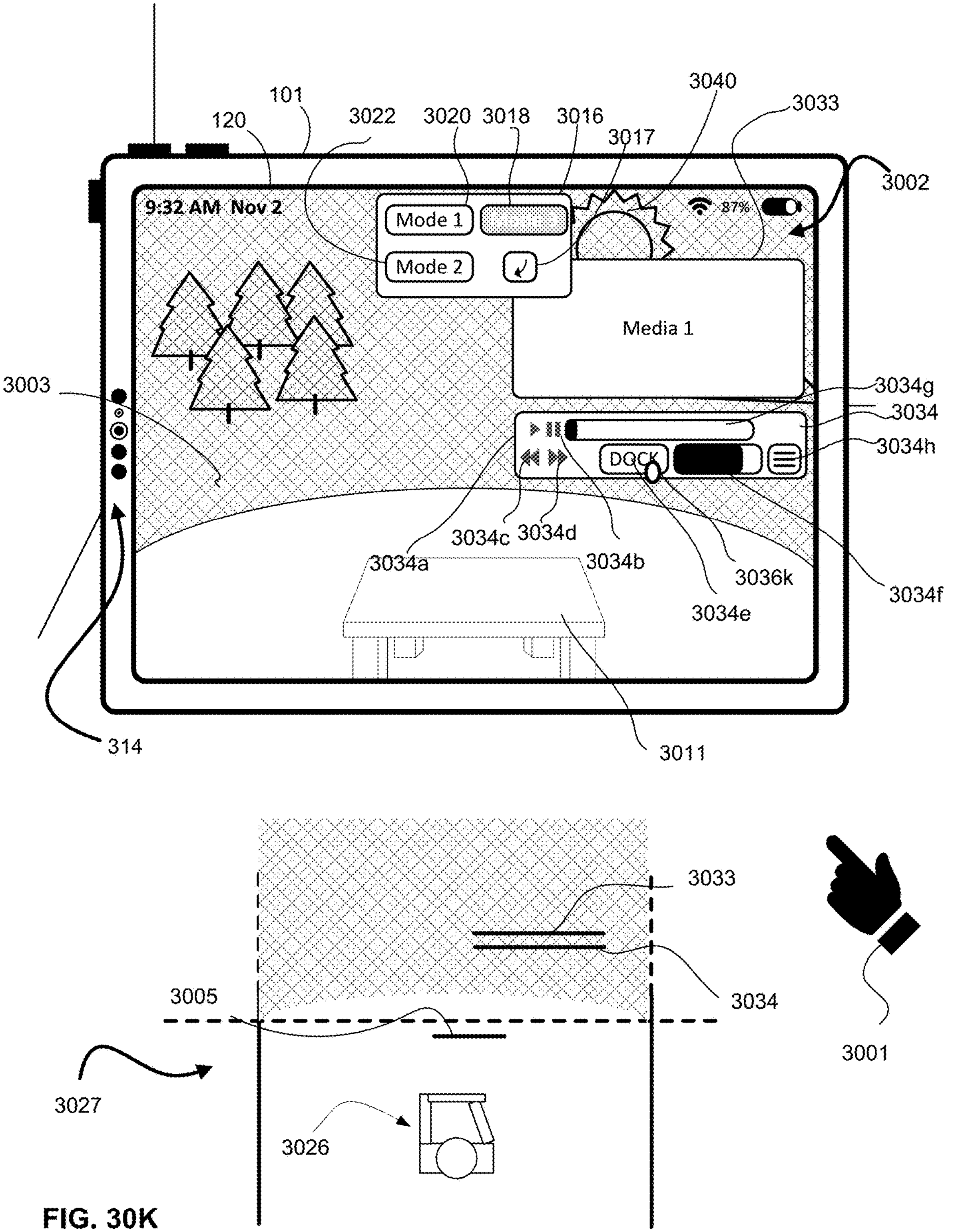
Figure 30L:
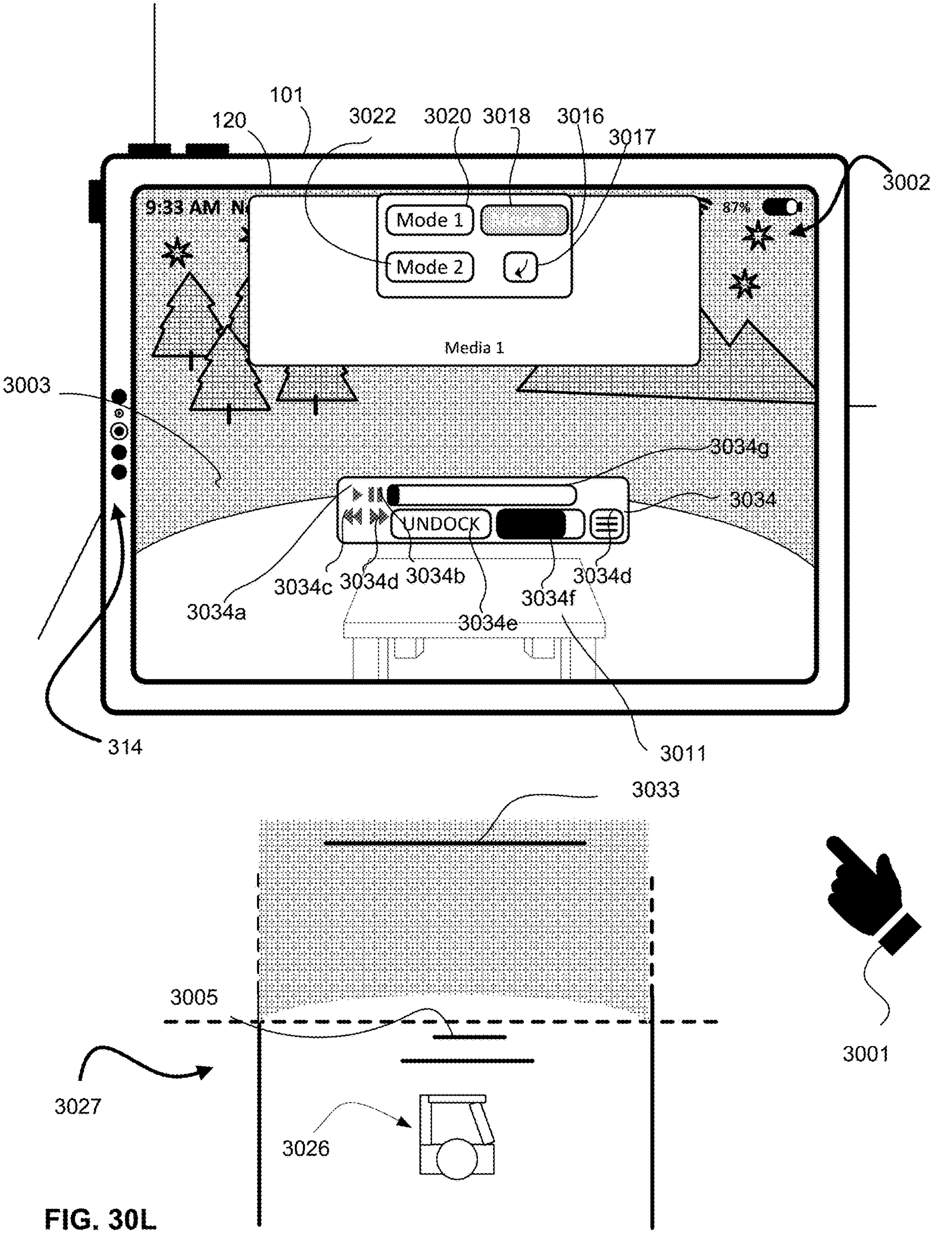

FIG. 30K illustrates computer system 101 operating in mode 3018 (e.g., the automatic environmental mode) and showing virtual environment 3003 with light mode appearance (e.g., as shown by virtual sun 3040 lighting virtual environment 3003 outside of media 3033). In FIG. 30K, input 3036*k* (e.g., attention of the user and/or input from hand 3001 of user 3026, such as an air pinch gesture) is directed to playback control user interface 3034, and specifically to option 3034*e* for displaying media at a respective location for media content in virtual environment 3003 (e.g., respective location for media content as described with reference to method 3100). In response to detecting input 3036*k*, computer system 101 displays media 3033 at the respective location for media content in virtual environment 3003 and switches to showing virtual environment 3003 in dark mode appearance, as shown in FIG. 30L. Computer system 101 optionally switches to showing virtual environment 3003 in dark mode appearance in FIG. 30K because the viewing mode of media 3033 has changed to viewing the media 3033 docked (e.g., at the respective location for media content in virtual environment 3003).

Figure 30M:
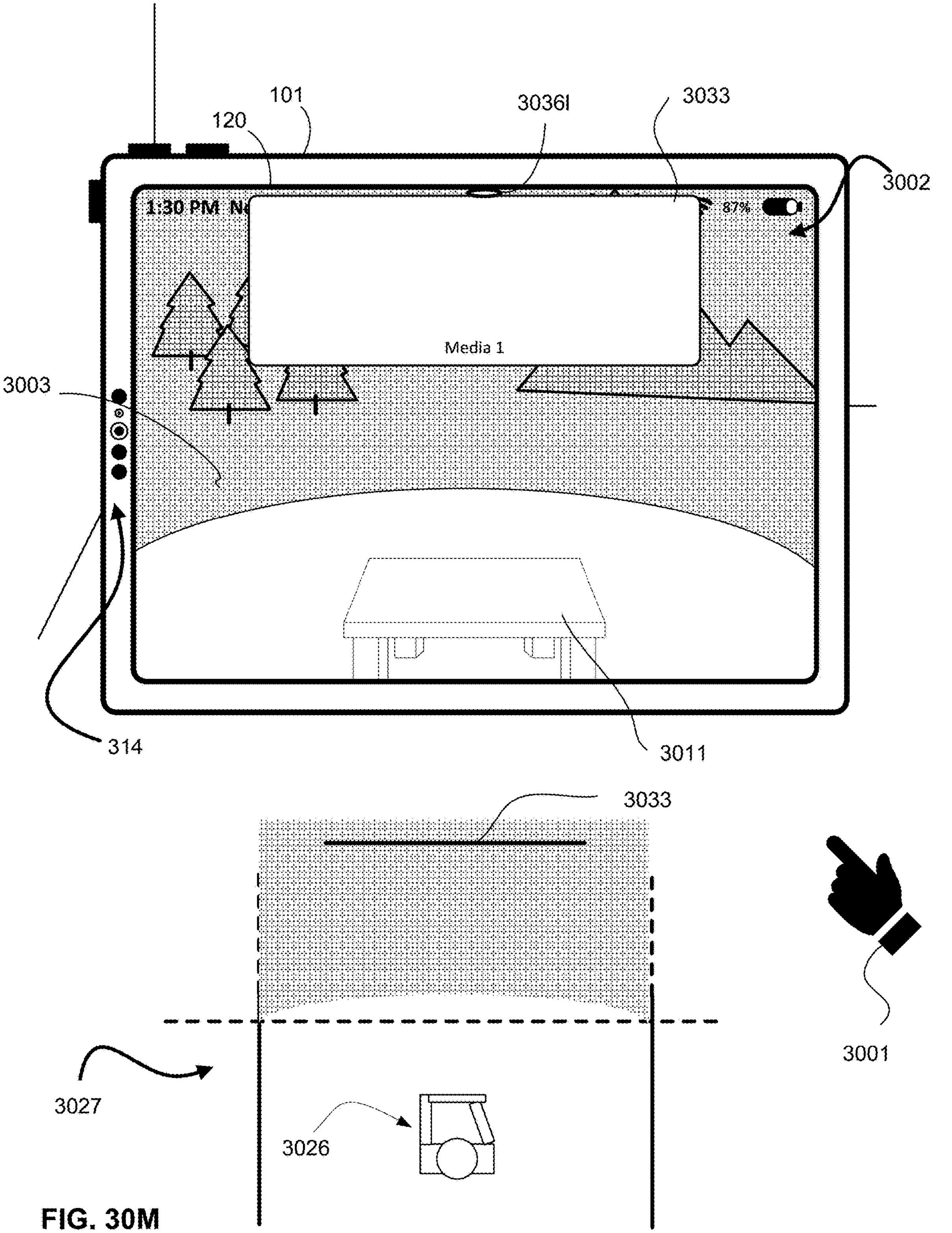
Figure 30N:
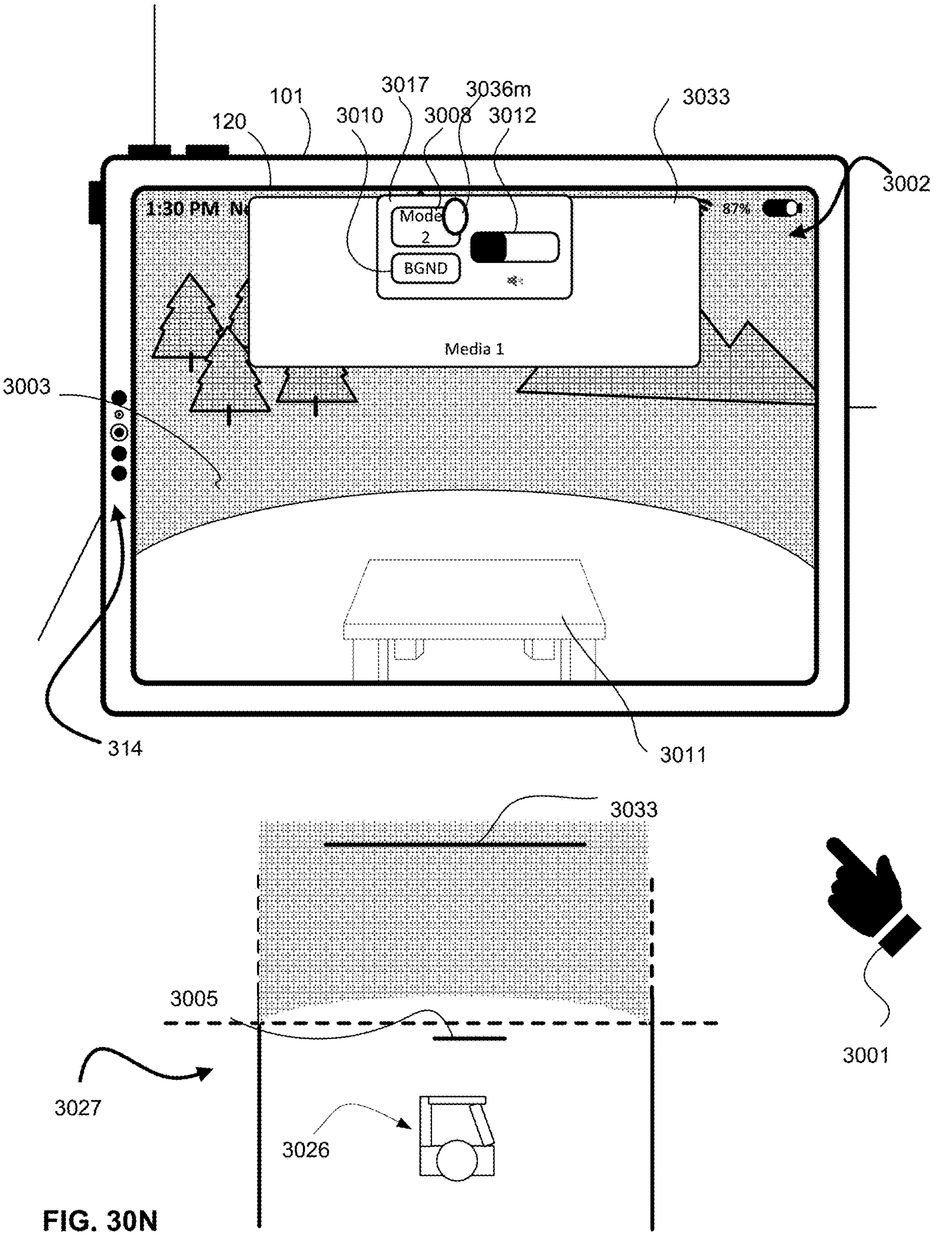

FIG. 30M illustrates computer system 101 displaying media 3033 at the respective location for media content in virtual environment 3003 and displaying virtual environment 3003 in dark mode appearance (e.g., nighttime appearance). In FIG. 30M, virtual environment 3003 optionally has dark appearance optionally because computer system is optionally operating in mode 3022 (e.g., dark environmental mode, which optionally results in virtual environment 3003 having dark mode appearance (e.g., nighttime appearance)) or mode 3018 (e.g., the automatic environmental mode). In FIG. 30M, input 3036*l* (e.g., attention of the user) is directed to a portion of three-dimensional environment 3002 (e.g., an upper middle portion of three-dimensional environment 3002 visible via display generation component 120). In response to detecting input 3036*l*, computer system display system user interface 3017 (e.g., a first level user interface of system user interface 3014), as shown in FIG. 30N. In FIG. 30N, system user interface 3017 includes a user interface element 3008 that is selectable to change the environmental mode at which computer system operates virtual environment 3003, a user interface element 3010 that is selectable to change virtual environment 3003 (e.g., change the simulated physical space, such as from a beach to a mountain top), and a system volume slider 3012 that is selectable to control a system volume level (e.g., modifying system volume slider 3012 changes volume level of environment and media 3033, and optionally, other volumes of other elements for which computer system generates audio). In FIG. 30N, input 3036*m* (e.g., attention of the user and/or input from hand 3001 of user 3026, such as an air pinch gesture) is directed to change the environmental mode at which computer system 101 operates virtual environment 3003. In response to detecting input 3036*m*, computer system displays a second level user interface of system user interface 3017, which includes modes 3018-3022 and an environment volume slider 2023 that is selectable to control a volume level of virtual environment 3003, without modifying a volume level of media 3033.

FIGS. 30A-30O, including elements illustrated in FIGS. 30A-30O and/or described with reference to FIGS. 30A-30O, are further described with reference to method 3100.

FIG. 31 is a flowchart for illustrating a method 3100 of changing a visual appearance of a three-dimensional environment in accordance with an environmental mode associated with media content in accordance with some embodiments. In some embodiments, the method 3100 is performed at a computer system (e.g., computer system 101 in FIG. 1 such as a tablet, smartphone, wearable computer, or head mounted device) including a display generation component (e.g., display generation component 120 in FIGS. 1, 3, and 4) (e.g., a heads-up display, a display, a touchscreen, or a projector) and one or more cameras (e.g., a camera (e.g., color sensors, infrared sensors, and other depth-sensing cameras) that points downward at a user's hand or a camera that points forward from the user's head). In some embodiments, the method 3100 is governed by instructions that are stored in a non-transitory computer-readable storage medium and that are executed by one or more processors of a computer system, such as the one or more processors 202 of computer system 101 (e.g., control unit 110 in FIG. 1A). Some operations in method 3100 are, optionally, combined and/or the order of some operations is, optionally, changed.

In some embodiments, method 3100 is performed at a computer system in communication with one or more input devices and a display generation component: For example, the computer system, one or more input devices, and display generation component optionally includes one or more characteristics of computer system(s), one or more input devices, and/or display generation component(s) respectively described with reference to methods 800-2900.

In some embodiments, the computer system displays (3102*a*), via the display generation component, a three-dimensional environment including (optionally a virtual environment that represents a simulated physical space and) content (e.g., image, video, and/or audio content such as movies, TV shows, or advertisements) in a first presentation mode, such as media 3033 in FIG. 30A. In some embodiments, the three-dimensional environment has one or more of the characteristics of any of the three-dimensional environments of methods 800-2900. For example, the three-dimensional environment is optionally a three-dimensional environment that includes a virtual environment that represents a simulated physical space, such as described with reference to methods 800 and 1000 and/or another method(s) described herein. Some examples of a simulated space include a lake environment, a mountain environment, a sunset scene, a sunrise scene, a nighttime environment, a grassland environment, and/or a concert scene (e.g., optionally based on images of a physical environment that has a similar appearance to the simulated space). In some embodiments, a virtual environment is based on a real physical location, such as a museum and/or an aquarium, or is based on an artist-designed location. Thus, displaying the three-dimensional environment optionally provides the user with a virtual experience as if the user is physically located in the simulated space. In some embodiments, the first presentation mode is a presentation of the content while the content is (optionally visible in the three-dimensional environment) but not in playback, is (optionally visible in the three-dimensional environment) but not docked (e.g., in a predefined or preset location in the three-dimensional environment), is (optionally visible in the three-dimensional environment) but not in a focus mode, and/or while attention of the user is not directed to the content (for a threshold period of time). In some embodiments, when the computer system presents the content in the first presentation mode, the contents is not visually emphasized and/or is not fully visible (e.g., an outline of a user interface that includes the content is visible in the three-dimensional environment but not other parts of the content). In some embodiments, while displaying the three-dimensional environment including the content, an environmental mode of the three-dimensional environment for controlling a visual appearance of the three-dimensional environment outside of the content is a respective environmental mode (3102*b*), such as environmental mode 3018 in FIG. 30A, and the three-dimensional environment outside of the content has a respective visual appearance based on the respective environmental mode (3102*c*), such as light mode appearance of virtual environment 3003 in FIG. 30A. In some embodiments, the respective environment mode corresponds to the automatic mode, light mode, and/or dark mode discussed throughout this disclosure such as with reference to method 800, 1000, 2900, and/or other method(s) described herein. In some embodiments, the respective environmental mode corresponds to and/or defines a time of day (or visual appearance) of the simulated physical environment discussed throughout this disclosure, such as with reference to method 800, 1000, 2900, and/or other method(s) described herein. In some embodiments, the respective visual appearance corresponds to any of the visual appearance(s) described with reference to method(s) 800-1200 and/or other method(s) described herein, such as visual appearance(s) of virtual environment(s) corresponding to particular time(s) of day.

In some embodiments, while displaying, via the display generation component, the three-dimensional environment outside of the content in the respective environmental mode having the respective visual appearance that is based on the respective environmental mode, the computer system detects (3102*d*), via the one or more input devices, a first input for displaying the content in a second presentation mode, different from the first presentation mode, such as input 3036*a* in FIG. 30A. In some embodiments, the first input includes one or more characteristics of the user input(s) described throughout this disclosure, such as with reference to method(s) 800-2900 (but for displaying the content in the second presentation mode), such as air gestures, gaze gestures, and/or touch(es) and/or press(es) on a touch sensitive surface or a remote controller. For example, the first input is optionally a gaze-only input or a gaze input and air gesture(s) (e.g., pinch input(s)) and/or movement input(s) (e.g., hand movements, finger movements, and/or movement of another portion of the user). The computer system optionally detects any of the disclosed inputs and corresponds it to a request to display the content in the second presentation mode, in which the content is optionally visually emphasized in the three-dimensional environment compared to other portions of the three-dimensional environment and/or is fully visible in the three-dimensional environment. Further examples of the second presentation mode are described below.

In some embodiments, in response to detecting the first input via the one or more input devices (3102*e*), the computer system displays (3102*f*), via the display generation component, the content in the second presentation mode that is different from the first presentation mode, such as media 3033 in playback in FIG. 30B. In some embodiments, when the computer system presents the content in the second presentation mode, the content is optionally visually emphasized in the three-dimensional environment compared to other portions of the three-dimensional environment and/or is fully visible in the three-dimensional environment. Further examples of the second presentation mode are described below. In some embodiments, in accordance with a determination that the respective environmental mode is a first environmental mode, such as environmental mode 3018 in FIG. 30A, (e.g., the automatic environmental mode or automatic mode described below) and the respective visual appearance is a first visual appearance (e.g., showing a daytime version of a simulated physical space or a light mode appearance as described below) when the first input is detected, the computer system displays (3102*g*), via the display generation component, the three-dimensional environment including the content, wherein while displaying the three-dimensional environment including the content, the three-dimensional environment outside of the content is displayed with a second visual appearance (e.g., showing a nighttime version of the simulated physical space or a dark mode appearance as described below) that is based on the first environmental mode, different from the first visual appearance, such as the dark mode appearance of virtual environment 3003 in FIG. 30B. The first environmental mode optionally is an automatic environmental mode, such as the automatic mode described with method 800, 1000, 2900, and/or other method(s) described herein. The automatic environmental mode optionally corresponds the visual appearance of the virtual environment to a lighting setting that is based on a current time of day in a physical environment of the user of the computer system. For example, if it is sunny during the current time of day in the physical environment of the user of the computer system, and the computer system displays the three-dimensional environment in the first environmental mode (e.g., the automatic mode), the computer system optionally displays the three-dimensional environment with a visual appearance that corresponds to daytime. Continuing with this example, if it is nighttime during the current time of day in the physical environment of the user of the computer system, and the computer system displays the three-dimensional environment in the first environmental mode (e.g., the automatic mode), the computer system optionally displays the three-dimensional environment with a visual appearance that corresponds to nighttime. In an example, while in the automatic mode, if the time of day at the computer system is daytime (e.g., 7 am-7 pm), the computer system optionally displays the three-dimensional environment in the light mode, and if the time of day at the computer system is nighttime (e.g., 7 pm-7 am), the computer system optionally displays the three-dimensional environment in the dark mode. In an example, in response to detecting the input, and in accordance with the above recited determination in which the first environmental mode is the automatic mode and the first visual appearance is light mode, the computer system optionally overrides the visual appearance that corresponds to automatic mode (e.g., optionally determined when the first input is detected), which in this example is light mode, and displays the virtual environment with a visual appearance that corresponds to dark mode (e.g., a virtual scene on the beach at a simulated dark time of day and that is illuminated by a virtual moon). In some embodiments, in accordance with a determination that the respective environmental mode is a second environmental mode, such as environmental mode 3020 in FIG. 30A, different from the first environmental mode, and the respective visual appearance is the first visual appearance when the first input is detected, the computer system continues display, via the display generation component, of the three-dimensional environment including the content, wherein while displaying the three-dimensional environment including the content, the three-dimensional environment outside of the content is displayed with the first visual appearance (3102*h*), such as light mode appearance of virtual environment 3003 in FIG. 30A. The second environmental mode is optionally light mode, such as the light mode described with method 800, 1000, 2900, and/or other method(s) described herein. In an example, in response to detecting the input, and in accordance with the above recited determination in which the first environmental mode is the light mode and the first visual appearance is showing light mode appearance (e.g., a daytime version of a simulated physical space), the computer system optionally continues to display the three-dimensional environment with the visual appearance showing light mode and maintains the second environmental mode. Changing the visual appearance of a three-dimensional environment that simulates a physical space in response to detecting input requesting to present content differently in the three-dimensional environment, based on the visual settings of the three-dimensional environment when the input is received results in a technical effect of displaying the content in the three-dimensional environment with the appropriate visual appearance without inputs specifically directed to changing or controlling the visual appearance of the three-dimensional environment.

In some embodiments, in response to detecting the first input via the one or more input devices, in accordance with a determination that the respective environmental mode is a third environmental mode, such as environmental mode 3022 in FIG. 30I (e.g., dark mode described with reference to step(s) 3102, method 800, 1000, 2900, and/or other method(s) described herein), different from the first environmental mode and the second environmental mode, and the respective visual appearance of the three-dimensional environment outside of the content is the second visual appearance (e.g., showing a nighttime version of a simulated physical space or a dark mode appearance) when the first input is detected, the computer system continues display, via the display generation component, of the three-dimensional environment including the content, with the three-dimensional environment outside of the content having the second visual appearance, such as dark mode appearance of virtual environment 3003 in FIG. 30A. As such, when the computer system detects the first input while in the dark mode, the computer system optionally maintains the dark mode appearance of the three-dimensional environment outside of the content. Maintaining the respective visual appearance as the dark mode appearance in response to detecting the first input smoothly transitions the content to the second presentation mode without changing the respective visual appearance, which reduces computing power that could have resulted from the computer system changing the visual appearance.

In some embodiments, in response to detecting the first input via the one or more input devices, in accordance with a determination that the respective environmental mode is the first environmental mode (e.g., the automatic mode) and the respective visual appearance of the three-dimensional environment outside of the content is the second visual appearance (e.g., showing a nighttime version of a simulated physical space or a dark mode appearance) when the first input is detected, the computer system continues display, via the display generation component, of the three-dimensional environment including the content, with the three-dimensional environment outside of the content having the second visual appearance, such as dark mode appearance of virtual environment 3003 in FIGS. 30C and 30D. As such, when the computer system detects the first input while the three-dimensional environment outside of the content is presented in the dark mode appearance in the automatic mode, the computer system optionally maintains the dark mode appearance of the three-dimensional environment outside of the content (while presenting the content in the second presentation mode. Maintaining the dark mode appearance while the respective environmental mode is the automatic mode in response to detecting the first input smoothly transitions the content to the second presentation mode without changing the respective visual appearance, which reduces computing power that could have resulted from the computer system changing the visual appearance.

In some embodiments, in response to detecting the first input via the one or more input devices, in accordance with a determination that the respective visual appearance of the three-dimensional environment outside of the content is the first visual appearance (e.g., daytime version of the simulated physical space or the light mode appearance described above) and a mode for reducing a visual prominence of the three-dimensional environment outside of the content is active, such as user interface element 3044*d* in FIGS. 30G and 30G1 being active, (and optionally, in accordance with a determination that the respective environmental mode is the first environmental mode (e.g., the automatic mode) or the second environmental mode (e.g., the light mode) described above with reference to step(s) 3102), the computer system reduces a visual prominence (e.g., darkening and/or decreasing a brightness) of the first visual appearance (e.g., daytime version of the simulated physical space or the light mode appearance described above) with which the three-dimensional environment outside of the content is displayed (e.g., dimming the appearance of the three-dimensional environment outside of the content while in the first visual appearance described above), such as shown with dimming of three-dimensional environment 3002 in FIGS.

30G and 30G1. In some embodiments, in response to detecting the first input via the one or more input devices, in accordance with a determination that the respective visual appearance of the three-dimensional environment outside of the content is the second visual appearance (e.g., showing the nighttime version of the simulated physical space or the dark mode appearance, such as the dark mode described with reference to step(s) 3102, method 800, 1000, 2900 and/or other method(s) described herein), the computer system forgoes reducing the visual prominence of the second visual appearance with which the three-dimensional environment outside of the content is displayed. For example, the computer system would optionally forgo reducing the visual prominence of three-dimensional environment 3002 because virtual environment 3003 has the dark mode appearance in FIG. 30I. For example, when the computer system detects the first input while the three-dimensional environment outside of the content is presented in the light mode appearance and the mode for reducing the visual prominence of the three-dimensional environment outside of the content is active, the computer system optionally darkens the three-dimensional environment outside of the content (while presenting the content in the second presentation mode); when the computer system detects the first input while the three-dimensional environment outside of the content is presented in the dark mode appearance and the mode for reducing the visual prominence of the three-dimensional environment outside of the content is active, the computer system optionally forgoes darkening the three-dimensional environment outside of the content (while presenting the content in the second presentation mode) and maintains the visual prominence of the dark mode appearance. In some embodiments, when the computer system detects the first input while the three-dimensional environment outside of the content is presented in the dark mode appearance and the mode for reducing the visual prominence of the three-dimensional environment outside of the content is active, the computer system optionally darkens the three-dimensional environment outside of the content (while presenting the content in the second presentation mode) by a first amount that is less than an amount of darkening applied to the three-dimensional environment outside of the content when the computer system detects the first input while the three-dimensional environment outside of the content is presented in the light mode appearance and the mode for reducing the visual prominence of the three-dimensional environment outside of the content is active described above. Darkening the light mode appearance of the three-dimensional environment outside of the content when the three-dimensional environment outside of the content is presented in the light mode appearance and the mode for reducing the visual prominence of the three-dimensional environment outside of the content is active facilitates continued human-machine interaction by visually notifying the user that a specific mode is active, which reduces errors in interaction with the computer system and/or the content.

In some embodiments, while displaying the three-dimensional environment including the content, in accordance with a determination that a current time of day at the computer system (e.g., at the current location of the computer system) is a first time of day (e.g., 7 am, 9 am, 12 pm, 3 pm, or another time of day) while the respective environmental mode is the first environmental mode (e.g., the automatic mode described above with reference to step(s) 3102, method 800, 1000, 2900 and/or other method(s) described herein), the respective visual appearance of the three-dimensional environment outside of the content is the first visual appearance, such as the light mode appearance of virtual environment 3003 in FIG. 30A (e.g., showing a daytime version of a simulated physical space or a light mode appearance as described above with reference to step(s) 3102, method 800, 1000, 2900 and/or other method(s) described herein). For example, when the time of day corresponds to sunrise at the current location of the computer system, and the computer system is in the automatic mode, the computer system optionally displays the light mode appearance at that time and/or initiates a process to change the visual appearance to the light mode appearance. In addition, the computer system optionally corresponds the first time of day to sunrise at the current location of the computer system based on weather data that predicts (e.g., estimates or determines) the sunrise time for the date that is associated with the current time, which optionally varies throughout the year (e.g., the time of day at which sunrise occurs at the location of the computer system optionally varies throughout the year). As such, the correspondence of the first time of day to the light mode appearance optionally varies based on sunset and/or sunrise times and thus optionally varies based on the time of year and/or the physical location of the computer system when the determination that the current time of day is the first time of day is made, optionally with a light or daytime mode displayed during daytime (e.g., after sunrise and before sunset) and with a dark or night time mode displayed during night time (e.g., after sunset and before sunrise).

In some embodiments, while displaying the three-dimensional environment including the content, in accordance with a determination that the current time of day at the computer system (e.g., at the current location of the computer system) is a second time of day (e.g., 5 pm, 7 pm, 10 pm, lam, or another time of day), different from the first time of day, while the respective environmental mode is the first environmental mode (e.g., the automatic mode described above with reference to step(s) 3102, method 800, 1000, 2900 and/or other method(s) described herein), the respective visual appearance of the three-dimensional environment outside of the content is the second visual appearance, such as the dark mode appearance of virtual environment 3003 in FIG. 30C (e.g., showing a nighttime version of the simulated physical space or a dark mode appearance as described above with reference to method 800, 1000, 2900, 3100 and/or other method(s) described herein). For example, when the time of day corresponds to sunset at the current location of the computer system, and the computer system is in the automatic mode, the computer system optionally displays the dark mode appearance and/or initiates a process to change the visual appearance to the dark mode appearance. In addition, the computer system optionally corresponds the second time of day to sunset at the current location of the computer system based on weather data that predicts (e.g., estimates or determines) the sunset time for the date that is associated with the current time, which optionally varies throughout the year (e.g., the time of day at which sunset occurs at the location of the computer system optionally varies throughout the year). As such, the correspondence of the second time of day to the dark mode appearance optionally varies based on sunset and/or sunrise times and thus optionally varies based on the time of year and/or the physical location of the computer system when the determination that the current time of day is the second time of day is made, optionally with a light or daytime mode displayed during daytime (e.g., after sunrise and before sunset) and with a dark or night time mode displayed during night time (e.g., after sunset and before sunrise). As such, when in the automatic environmental mode, the computer system optionally automatically displays the light mode appearance when the time of day at the computer system (e.g., at the current location of the computer system) corresponds to a time of day that is daytime (e.g., sunny or bright), and the computer system optionally automatically displays the dark mode appearance when the time of day at the computer system (e.g., at the current location of the computer system) corresponds to a time of day that is nighttime (e.g., primarily moonlit, star lit, or lit, if any, by artificial lighting (e.g., street lights and building lights). Changing the visual appearance based on a current time of day at the current location of the computer system, optionally such that the visual appearance mode of the computer system is synchronized with natural lighting in the current location of the computer results in a technical effect of corresponding the displaying the content in the three-dimensional environment with the appropriate visual appearance without inputs specifically directed to changing or controlling the visual appearance of the three-dimensional environment, and notifies the user of a lighting at the current location of the computer system without the user leaving the computer system environment (e.g., without the user donning off the computer system and/or display generation component).

In some embodiments, in response to detecting the first input (described above with reference to step(s) 3102) via the one or more input devices, in accordance with a determination that the respective visual appearance of the three-dimensional environment outside of the content is the first visual appearance (e.g., showing a daytime version of a simulated physical space or a light mode appearance as described above with reference to step(s) 3102, method 800, 1000, 2900 and/or other method(s) described herein) and in accordance with a determination that a mode for reducing the visual prominence of the first visual appearance with which the three-dimensional environment outside of the content is displayed (e.g., a dimming mode that, when active, is configured to dim or reduce a brightness of the three-dimensional environment (optionally regardless of whether that three-dimensional environment outside of the content includes optical passthrough or virtual objects) is active, the computer system reduces a visual prominence (e.g., dimming, darkening, or reducing a brightness) of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content is displayed (e.g., presented), such as shown with dimming of three-dimensional environment 3002 in FIGS. 30G and 30G1. Reducing the visual prominence of the light mode appearance with which the three-dimensional environment outside of the content is presented provides an appropriate lighting setting for the second presentation mode of the content and reduces errors in interaction with the computer system and/or the content.

In some embodiments, the mode for reducing the visual prominence of the first visual appearance with which the three-dimensional environment outside of the content is displayed (e.g., the mode for reducing the visual prominence of the first visual appearance with which the three-dimensional environment outside of the content is displayed described above) is active, such as user interface element 3044*d* in FIG. 30E-1. In some embodiments, the computer system displays a user interface element (e.g., a control element object, such as a button, a toggle, a dial or a slider, or another type of user interface element) that is selectable to change an activation status (e.g., to activate or deactivate) of the mode for reducing the visual prominence of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content is displayed, such as user interface element 3044*d* in FIG. 30E-1 (e.g., the mode for reducing the visual prominence of the first visual appearance with which the three-dimensional environment outside of the content is displayed described above).

In some embodiments, while displaying the user interface element that is selectable to change the activation status of the mode for reducing the visual prominence of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content is displayed, the computer system detects, via the one or more input devices, an input directed to the user interface element, such as input 3036*h* in FIG. 30E-1. For example, detecting the input directed to the user interface element optionally includes detecting clicking on a touch-sensitive surface such as a trackpad, detecting attention of a user, and/or detecting an air gesture described within this disclosure (e.g., air pinch inputs (e.g., an air gesture that includes movement of two or more fingers of a hand to make contact with one another, that is, optionally, followed by an immediate (e.g., within 0-1 seconds) break in contact from each other), or another type of air pinch, air tap inputs ((e.g., directed to the user interface element) performed as an air gesture that includes movement of a user's finger(s) toward the user interface element, movement of the user's hand toward the user interface element optionally with the user's finger(s) extended toward the user interface element, a motion of a user's finger (e.g., mimicking a tap on a screen), or another predefined movement of the user's hand)), air pinch and drag gestures (e.g., an air gesture includes an air pinch gesture (e.g., an air pinch gesture or a long air pinch gesture) performed in conjunction with (e.g., followed by) a drag input that changes a position of the user's hand from a first position (e.g., a start position of the drag) to a second position (e.g., an end position of the drag)), or another type of air gesture).

In some embodiments, in response to detecting, via the one or more input devices, the input directed to the user interface element, the computer system changes the activation status of the mode for reducing the visual prominence of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content is displayed, such as shown with dimming of three-dimensional environment 3002 in FIG. 30G and 30G1. For example, if the mode is inactive when the input directed to the user interface element is detected, the computer system optionally activates the mode (e.g., reduces the visual prominence of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content is presented), and if the mode is active when the input directed to the user interface element is detected, the computer system optionally deactivates the mode (e.g., increases the visual prominence of the first visual appearance (e.g., that shows the daytime version of the simulated physical space or the light mode appearance as described above with reference to step(s) 3102, method 800, 1000, 2900 and/or other method(s) described herein) with which the three-dimensional environment outside of the content was presented when the mode was active). The user interface element is optionally included in a playback control user interface that optionally includes a selectable option for controlling a playback speed of the content, a selectable option for controlling a language of the content, a selectable option for enabling/disabling display of subtitles, along with the user interface element that is selectable to change the activation status of the mode for reducing the visual prominence of the first visual appearance with which the three-dimensional environment outside of the content is presented (e.g., a toggle for reducing the visual prominence of the first visual appearance with which the three-dimensional environment outside of the content is displayed). Displaying a user interface element that is selectable to change the activation status of the mode for reducing the visual prominence of the light mode appearance with which the three-dimensional environment outside of the content is displayed permits the user to change the lighting setting of the three-dimensional environment, which reduces errors in interaction with the computer system and/or the content.

In some embodiments, the second presentation mode includes playback of the content, such as media 3033 in playback in FIG. 30B. For example, when the computer system displays the content in the first presentation mode, the content is optionally not in playback, and in response to detecting the first input (described with reference to step(s) 3102), which is optionally an input to initiate playback of the content, the computer system optionally initiates playback of the content. Playing the content in response to detecting the first input corresponds specific visual appearances of the three-dimensional environment outside of the content to playback of the content results in a technical effect of displaying the content in the three-dimensional environment with the appropriate visual appearance without inputs specifically directed to changing or controlling the visual appearance of the three-dimensional environment.

In some embodiments, the second presentation mode includes a presentation of the content at a respective (e.g., predefined or preset) location for media content (e.g., a docked location or a predetermined location that the three-dimensional environment or computer system optionally defines, at which the respective media content optionally resides and/or is not movable, optionally during a full-screen or docked mode of the respective media content or another mode) in the three-dimensional environment, such as media 3033 at the respective location for media content in virtual environment 3003 in FIG. 30L (such as the respective location for media content in the three-dimensional environment described with reference to method 2400, 2600, and/or other method(s) described herein. For example, when the computer system displays the content in the first presentation mode, the content is optionally not displayed at the respective location for media content in the three-dimensional environment, and in response to detecting the first input (described with reference to step(s) 3102), which is optionally an input to display the content the respective location for media content in the three-dimensional environment, the computer system optionally displays the content at the respective location for media content in the three-dimensional environment. Docking the content in response to detecting the first input corresponds specific visual appearances of the three-dimensional environment outside of the content to the three-dimensional environment outside of the docked content and results in a technical effect of displaying docked content in the three-dimensional environment with the appropriate visual appearance without inputs specifically directed to changing or controlling the visual appearance of the three-dimensional environment.

In some embodiments, the first input for displaying the content in the second presentation mode includes attention of the user directed to the content that is displayed in the first presentation mode. For example, input 3036*f* in FIG. 30E is optionally directed to media 3033. In some embodiments, user attention corresponds to user gaze as described in more detail with reference to FIG. 6. In some embodiments, when user attention corresponds to gaze, a gaze tracking device optionally captures one or more images of the user's eyes and detects the pupils and glints in the one or more captured images to track the user's gaze, as described in more detail with reference to FIG. 6. In some embodiments, the computer system detects the gaze of the user directed to the content for a first period of time greater than a first time threshold (e.g., 0.02, 0.05, 0.1, 0.2, 0.25, 0.3, 0.5, 1, 2, 3, or 5 seconds). For example, when the computer system displays the content in the first presentation mode, the computer system optionally has not detected that attention of the user has been directed to the content for at least the first time threshold described above, and when the computer system detects that attention of the user has been directed to the content for at least the first time threshold described above, the computer system optionally displays the content in the second presentation mode, which optionally includes increasing a visual prominence (e.g., fading-in, displaying, decreasing a respective translucency, decreasing a transparency, increasing a color saturation, and/or increasing a brightness of) of the content that was presented in the first presentation mode. Displaying the content in the second presentation mode in response to detecting the first input that includes attention of the user directed to the content that was displayed in the first presentation mode corresponds specific visual appearances of the three-dimensional environment outside of the content to the second presentation mode of the content and results in a technical effect of displaying content in the second presentation mode with the appropriate visual appearance without inputs specifically directed to changing or controlling the visual appearance of the three-dimensional environment.

In some embodiments, while displaying the content in the first presentation mode, the content has a first size (e.g., first height and/or width in the three-dimensional environment) and/or visual prominence (e.g., a first amount of visual prominence (e.g., a first amount of contrast, a first amount of brightness, a first amount of visual emphasis relative to other parts of the three-dimensional environment, a first amount of saturation, or a first amount of opacity) in the three-dimensional environment and the three-dimensional environment outside of the content has a first amount of visual prominence, such as the size and visual prominence of photo 3030-2 in FIG. 30C (e.g., a first amount of visual prominence (e.g., a first amount of contrast, a first amount of brightness, a first amount of visual emphasis relative to other parts of the three-dimensional environment, a first amount of saturation, or a first amount of opacity), In some embodiments, while displaying the content in the second presentation mode, the content has a second size (e.g., second height and/or width in the three-dimensional environment) and/or visual prominence (e.g., a second amount of visual prominence (e.g., a second amount of contrast, a second amount of brightness, a second amount of visual emphasis relative to other parts of the three-dimensional environment, a second amount of saturation, or a second amount of opacity) in the three-dimensional environment, greater than the first size and/or visual prominence of the content while the content was displayed in the first presentation mode, and the three-dimensional environment outside of the content has a second amount of visual prominence (e.g., a second amount of visual prominence (e.g., a second amount of contrast, a second amount of brightness, a second amount of visual emphasis relative to other parts of the three-dimensional environment, a second amount of saturation, or a second amount of opacity) that is less than the first amount of visual prominence that the three-dimensional environment outside of the content has while the content was displayed in the first presentation mode, such as the size and visual prominence of photo 3030-2 in FIG. 30D. For example, the content is optionally a photo, image, or video that optionally, in the first presentation mode, is displayed in a roll (e.g., a camera roll) of photos, images, and/or videos and with the first size and/or visual prominence in the three-dimensional environment described above, along with the computer system presenting the three-dimensional environment outside of the content with the first size and/or visual prominence of the three-dimensional environment outside of the content described above; when the computer system displays the content in the second presentation mode, the content is optionally enlarged to the second size and/or the visual prominence of the content in the three-dimensional environment is increased to the second visual prominence described above, along with the computer system presenting the three-dimensional environment outside of the content with the second size and/or visual prominence of the three-dimensional environment outside of the content described above. The first presentation mode is optionally a presentation of the content as non-focused content and the second presentation mode is optionally a presentation of the content as focused content. For example, in the first presentation mode, the content is optionally included in a photo array (e.g., the computer system displays a bunch of non-focus items (e.g., photos)), and in response to detecting attention of the user (e.g., gaze) and an air gesture (e.g., an air pinch gesture described above) or just attention of the user for a threshold period of time (e.g., 0.1 s, 0.2 s, 0.5 s, 1 s, 5 s, 10 s, or another time threshold) at a photo of the photo array, the computer system optionally enlarges and/or brings forward the photo that was selected (e.g., selected via the gaze and air pinch gesture described above), signifying the presentation of the photo as focused content, and reduces the visual prominence (e.g., dims) of everything (e.g., the three-dimensional environment outside of the content) around the focused content. Displaying the content in the second presentation mode with a size and/or prominence that is greater than a size and/or prominence of the content in the first presentation mode, and presenting the three-dimensional environment outside of the content with a size and/or prominence that is less than a size and/or prominence of the three-dimensional environment outside of the content that the three-dimensional environment outside of the content had when the content was presented in the first presentation mode in response to detecting the first input corresponds specific visual appearances of content and of the three-dimensional environment outside of the content to the presentation modes of the content and results in a technical effect of displaying content in the second presentation mode with the appropriate visual appearance of the content (and of the three-dimensional environment outside of the content) without inputs specifically directed to changing or controlling the visual appearance of the three-dimensional environment.

In some embodiments, while the environmental mode is the respective environmental mode (described above with reference to step(s) 3102 and optionally while displaying the three-dimensional environment including the content), the computer system detects, via the one or more input devices, a second input for displaying a system user interface associated with an operating system of the computer system, such as input 3036*l* in FIG. 30M. For example, the input optionally includes an air gesture (optionally while attention of the user is directed to a visual element, such as a virtual button, an icon, and/or a predefined region of the three-dimensional environment such as an upper middle portion of the three-dimensional environment presented via the display generation component), a voice command, a contacting of a physical button, and/or one or more contacts of an object with a touch sensitive surface that is in communication with the computer system. In some embodiments, the second input includes attention of the user directed to a region of the three-dimensional environment (e.g., a region that is relatively central and/or toward a top edge of the user's current viewpoint). In some embodiments, the second input includes one or more characteristics of the first input described above with reference to method 2900, step(s) 3102, and/or one or more characteristics of any other input described throughout this disclosure, but for displaying the system user interface associated with the operating system of the computer system.

In some embodiments, while the environmental mode is the respective environmental mode (described above with reference to step(s) 3102 and optionally while displaying the three-dimensional environment including the content), in response to detecting the second input for displaying the system user interface associated with the operating system of the computer system (e.g., the second input for displaying the system user interface associated with the operating system of the computer system described above), the computer system displays, via the display generation component, the system user interface associated with the operating system of the computer system, wherein the system user interface includes one or more first selectable options, including a first selectable option that is selectable to initiate a process to change the environmental mode (e.g., the current environmental mode) from the respective environmental mode to an environmental mode that is different from the respective environmental mode, such as system user interface 3017 in FIG. 30N (e.g., change from a current environmental mode of either the automatic environmental mode, light environmental mode, or dark environmental mode to a different environmental mode (e.g., to the automatic environmental mode, light environmental mode, or dark environmental mode that is not the current environmental mode at the computer system); The system user interface optionally has one or more characteristics of the system user interfaces described herein and/or with reference to method 2900, such as a HUD interface, described with reference to method 2900. In some embodiments, the HUD interface includes one or more selectable options that are selectable to change the environmental mode of the three-dimensional environment, such as from a current environmental mode of either the automatic environmental mode, light environmental mode, or dark environmental mode to a different environmental mode (e.g., to the automatic environmental mode, light environmental mode, or dark environmental mode that is not the current environmental mode at the computer system. In some embodiments, such one or more selectable options are displayed in response to detecting the second input. In some embodiments, while displaying the one or more first selectable options including the first selectable option, the computer system detects, via the one or more input devices, a third input requesting to change the environmental mode (e.g., the current environmental mode) from the respective environmental mode to the environmental mode that is different from the respective environmental mode. For example, the computer system optionally detects input (e.g., attention of the user and/or an air pinch gesture) selecting environmental mode 3020 in FIG. 30O. In some embodiments, the third input includes one or more characteristics of the first input described above with reference to method 2900, step(s) 3102, the second input for displaying the system user interface associated with the operating system of the computer system, and/or one or more characteristics of any other input described throughout this disclosure, but for requesting to change the environmental mode from the respective environmental mode to the environmental mode that is different from the respective environmental mode. In some embodiments, the computer system detects the third input as being directed toward the first selectable option described above. In some embodiments, in response to detecting the third input requesting to change the environmental mode (e.g., the current environmental mode) from the respective environmental mode to the environmental mode that is different from the respective environmental mode, the computer system initiates the process to change the environmental mode (e.g., the current environmental mode) from the respective environmental mode to the environmental mode that is different from the respective environmental mode (e.g., as described above optionally while maintaining display of the content in first presentation mode or the second presentation mode). For example, in response to detecting input (e.g., attention of the user and/or an air pinch gesture) selecting environmental mode 3020 in FIG. 30O, computer system optionally display virtual environment 3003 in the light mode appearance and operates in the environmental mode 3020, such as shown in FIG. 30E. Including, in a system user interface, a selectable option to change the environmental mode of the three-dimensional environment for controlling the visual appearance of the three-dimensional environment outside of the content reduces user input involved with changing the environmental mode and reduces computing resources involved with detecting and processing inputs for changing the environmental mode.

In some embodiments, the system user interface is displayed in response to detecting attention of the user (e.g., attention of the user described above, such as gaze of the user and/or an attention-only input) directed to a respective portion (e.g., an upper portion, an upper middle portion, or another potion) of a viewport through which the three-dimensional environment is being viewed, such as input **3036*l* in FIG. 30M that is directed to an upper middle portion of the viewpoint through which three-dimensional environment 3002** is being viewed (that, optionally, is outside of the content). In some embodiments, the second input for displaying the system user interface associated with the operating system of the computer system (e.g., the second input for displaying the system user interface associated with the operating system of the computer system described above) includes an air gesture performed by a portion of the user's body, such as one or more fingers, hands, forearms, and/or arms, as described previously, and/or optionally includes attention (or is an attention-only input) of the user (as described previously). Displaying the system user interface in response to detecting an input including attention of the user directed to a respective portion of the three-dimensional environment corresponds attention of the user directed to the respective portion to a specific input and enables more accurate recognition of inputs since the computer system corresponds attention of the user directed to the respective portion of the three-dimensional environment to a request to display the system user interface.

In some embodiments, while displaying a first user interface of a first application (e.g., the content described with reference to step(s) 3102 includes a first user interface of a first application), the computer system detects via the one or more input devices, a third input for displaying the system user interface associated with the operating system of the computer system, such as input **3036*l* in FIG. 30**M. The third input optionally includes one or more characteristics of the second input for displaying the system user interface associated with the operating system of the computer system described above.

In some embodiments, in response to detecting via the one or more input devices, the third input for displaying the system user interface associated with the operating system of the computer system while displaying the first user interface of the application, the computer system displays, via the display generation component, the system user interface associated with the operating system of the computer system (e.g., the system user interface associated with the operating system of the computer system described above), such as shown from FIG. 30M to FIG. 30N with the system user interface 3017 being displayed when displaying media 3033 which is optionally a video.. In some embodiments, while displaying a first user interface of a second application (e.g., the content described with reference to step(s) 3102 includes a second user interface of a second application), different from the first application, (and optionally, while not displaying the first user interface of the first application described above) computer system detects via the one or more input devices, a fourth input for displaying the system user interface associated with the operating system of the computer system. For example, when displaying media 3033 in FIG. 30D, computer system **101*a* optionally detect input 3036*l* of FIG. 30M. The fourth input optionally includes one or more characteristics of the second input for displaying the system user interface associated with the operating system of the computer system described above. In some embodiments, in response to detecting via the one or more input devices, the fourth input for displaying the system user interface associated with the operating system of the computer system while displaying the first user interface of the second application, computer system displays, via the display generation component, the system user interface associated with the operating system of the computer system (e.g., the system user interface associated with the operating system of the computer system described above). For example, just like shown from FIG. 30M to FIG. 30N with the system user interface 3017 being displayed while displaying media 3033 which is optionally a video, computer system optionally displays system user interface 3017 while displaying media 3033 of FIG. 30D which is a photo. In some embodiments, a three-dimensional environment that does not include the content described above with reference to step(s) 3102 is optionally presented when the above recited operations are performed. For example, a three-dimensional environment that includes content that is different from the content described above with reference to step(s) 3102** is optionally presented when the above recited operations are performed. In some embodiments, the system user interface is accessible in the same way described above even when different application content is displayed. For example, if the computer system is displaying a first user interface of a first application (e.g., a first application is controlling the content of the three-dimensional environment), the system user interface is optionally accessible in the same way described above, and if the computer system is displaying a second user interface of a second application (e.g., a second application is controlling the content of the three-dimensional environment), different from the first application, the system user interface is optionally accessible in the same way described above. As such, the computer system optionally displays the system user interface described above in response to specific input regardless of features of or presence of any specific types of virtual elements included in the three-dimensional environment. Displaying the system user interface in response to detecting an input for displaying the system user interface independent of features of or presence of any specific types of virtual elements (or any specific active applications) in the three-dimensional environment provides consistency of interaction with the computer system and user input and reduces errors in interaction with the computer system since the system user interface is able to be displayed in response to the same input regardless of what the three-dimensional environment includes.

In some embodiments, the three-dimensional environment includes a portion different from the content (e.g., the portion optionally includes the simulated physical space of the three-dimensional environment (outside of the content) described above with reference to step(s) 3102).

In some embodiments, while displaying the three-dimensional environment including the content, computer system detects, via the one or more input devices, an input corresponding to a request to display a system user interface associated with an operation system of the computer system (e.g., the system user interface described above), the system user interface including at least a control element (e.g., a slider, a dial, a toggle, a segmented control, or another type of control element) for controlling an environmental audio volume level corresponding to the portion of the three-dimensional environment (e.g., a volume control user interface element), such as input **3036*l* in FIG. 30M. The volume control element is optionally a user interface element for controlling the environmental audio volume level corresponding to the portion of the three-dimensional environment and is optionally specific to the environmental audio volume level corresponding to the portion of the three-dimensional environment. In some embodiments, the volume control element is a slider bar (e.g., a horizontal or vertical slider bar), in which a slider control element of the slider bar is at a first position that corresponds to an initial volume level of the environmental audio volume level corresponding to the portion of the three-dimensional environment. For example, the initial volume level of the computer system optionally is a first volume level of a virtual environment (e.g., the simulated physical space of the three-dimensional environment (outside of the content) described above with reference to step(s) 3102). Also, the volume control element optionally includes a visual indicator that indicates to a user of the computer system that the volume control element is configured to control an environmental audio volume level corresponding to the portion of the three-dimensional environment. The input corresponding to the request to display the system user interface including at least the volume control element optionally includes one or more characteristics of the first input described above with reference to method 2900 or step(s) 3102**, the second input for displaying the system user interface associated with the operating system of the computer system, the third input requesting to change the environmental mode to the environmental mode that is different from the respective environmental mode and/or one or more characteristics of any other input described throughout this disclosure, but corresponding to the request to display the system user interface including at least the volume control element.

In some embodiments, in response to detecting the input corresponding to the request to display the system user interface associated with the operation system of the computer system, the computer system displays, via the display generation component, the system user interface, including displaying at least the control element for controlling the environmental audio volume level corresponding to the portion of the three-dimensional environment (e.g., the system user interface, including at least the control element for controlling the environmental audio volume level corresponding to the portion of the three-dimensional environment described above), such as environmental volume slider 3023 in FIG. 30O.

In some embodiments, the computer system detects, via the one or more input devices, an input corresponding to a request to change a level of environmental audio volume level corresponding to the portion of the three-dimensional environment. For example, computer system 101 optionally detects input directed to environmental volume slider 3023 in FIG. 30O. The input corresponding to the request to change the environmental audio volume level corresponding to the portion of the three-dimensional environment optionally includes one or more characteristics of the input corresponding to the request to display the system user interface including at least the volume control element described above, but corresponding to the request to change the level of environmental audio volume level corresponding to the portion of the three-dimensional environment. In some embodiments, the input corresponding to the request to change the environmental audio volume level corresponding to the portion of the three-dimensional environment includes (e.g., air gestures such as a user's hand in a pinch hand shape and attention of the user (and/or a dwell thereof) directed to the volume control element, followed by movement of the hand of the user while in the pinch hand shape). In some embodiments, the input directed to the volume control element includes or is an air gesture or a gaze of a user. In some embodiments, the input directed to the volume control element includes user attention directed to the volume control element (e.g., gaze or attention directed to the volume control element), a hand of a user in a particular pose (e.g., raised at a position in front of the user, in a pre-pinch hand shape, or the hand of the user in a pinch hand shape for a time period such as 0.01, 0.05, 0.1, 0.5, 1, 3, 5 or 10 seconds) at greater than a threshold hand distance (e.g., 0.2 cm, 0.5 cm, 1 cm, 2 cm, 3 cm, 5 cm, 10 cm, 20 cm, 40 cm, 100 cm, 200 cm or 500 cm) from the volume control element, or any combination of the user attention, the hand of the user in the particular pose, and/or the hand of the user greater the threshold hand distance. For example, the volume control element is optionally a slider bar (e.g., a vertical or horizontal slider bar) that, while the computer system presents the audio at an initial volume level, displays an indication or control element of the slider at a first position on the slider bar that corresponds to the initial volume level. The volume control element is optionally configured to be modified in response to the input directed to the volume control element. In some embodiments, the input directed to the volume control element includes vector data corresponding to data of movement of a user's hand in a particular pose in a particular direction and/or from a first location to a second location and/or movement of the user's attention in a particular direction from a first location to a second location, so as to correspond to a request to move the position of the slider to a position and/or in a direction corresponding to the vector data (e.g., move the slider control element rightward, optionally corresponding to increased volume (e.g., increased audio output), in accordance with rightward movement of the hand of the user, and move the slider control element leftward, optionally corresponding to reduced volume (e.g., reduced audio output), in accordance with leftward movement of the hand of the user). As another example, in some embodiments, the input directed to the volume control element includes an attention of a user directed to the slider control element, a user's hand in a particular pose such as a pinch hand shape, and movement of the user's hand while in the particular pose involving the pinch hand shape in a direction. In some embodiments, the direction and/or magnitude of the change in the volume/volume control element is based on the direction and/or magnitude of the hand movement. In some embodiments, the input directed to the volume control element includes touch inputs detected on a touch-sensitive surface (e.g., a touch screen or a non-display touch sensitive surface). In some embodiments, the input directed to the volume control element includes a user pressing down on a control element on a mouse (e.g., a left-click). In some embodiments, the input directed to the volume control element is a gaze input without including other inputs such as an air gesture.

In some embodiments, in response to detecting the input corresponding to the request to change the level of environmental audio volume level corresponding to the portion of the three-dimensional environment, the computer system changes the environmental audio volume level corresponding to the portion of the three-dimensional environment from a first level to a second level, different from the first level, without changing an audio volume level of the content. For example, in response to computer system 101 detecting input directed to environmental volume slider 3023 in FIG. 30O for changing the environmental volume level, computer system 101 optionally changes the environmental volume level, without changing an audio volume of media 3033. When the request to change the level of the environmental audio volume corresponds to a request to increase the environmental audio volume level, the second level is higher in volume level than the first volume level; when the request to change the level of the environmental audio volume corresponds to a request to decrease the environmental audio volume level, the second volume level is lower in volume than the first volume level. In some embodiments, the portion of the three-dimensional environment includes a virtual environment that includes virtual audio elements, optionally in addition to virtual visual elements. In some embodiments, the audio elements correspond to the virtual visual elements. For example, the virtual audio elements optionally include sound of wind, sound of rain, sound of birds, sound of wind in trees, crickets chirping, and/or waves crashing on a beach. For example, the virtual environment is optionally a simulated sunny day at a dog park that includes twenty dogs barking and roaming around the dog park. The computer system optionally audibly and/or visually simulates the barking of the dogs such that a user can hear (and/or see) the (virtual) dogs barking. The audio from the barking of the virtual dogs is optionally at the first volume level when the input directed to the volume control element is received. In response to receiving input directed to the volume control element, the volume level of the audio from the barking of the virtual dogs optionally adjusts to become the adjusted first volume level of the virtual environment. The adjusted first volume level is optionally a lower volume level (optionally down to a muted volume level) or a higher volume level than the first volume level. In some embodiments, the environmental audio volume level is associated with a first part of audio (e.g., audio associated with a number of virtual objects displayed (or not displayed) in the three-dimensional corresponding to point sources of audio in the three-dimensional environment) from the virtual environment and/or a second part of audio (e.g., audio that optionally is not associated with the number of virtual objects) from the virtual environment). For example, the point sources of audio optionally correspond to virtual crickets in a pile of virtual tall grass in the three-dimensional environment. When the request to change the level of the environmental audio volume corresponds to a request to increase the environmental audio volume level, the computer system optionally increases the number of point sources of audio that are displayed and/or the number of point sources of audio for which the computer system generates audio, optionally, in addition to increasing the volume of the point sources of audio; when the request to change the level of the environmental audio volume corresponds to a request to decrease the environmental audio volume level, the computer system optionally decreases the number of point sources of audio that are displayed and/or the number of point sources of audio for which the computer system generates audio, optionally, in addition to decreasing the volume of the point sources of audio. In some embodiments, the type of audio changes when switching between different environmental modes that correspond to different times of day. For example, in an environment in the light mode appearance, first audio corresponding to birds that emit sounds in the morning after sunrise are optionally presented, and in the dark mode appearance, second audio corresponding to crickets are optionally presented. As such, the computer system is optionally configured to actively change a volume level output corresponding to the virtual environment, different from a volume level of the content) such that a user can hear the volume changing (e.g., a continuous rate of change of volume) in accordance with the input. In some embodiments, the audio, different from the content, associated with the virtual environment includes the audio track (e.g., a background audio track such as a "white noise" audio track) that is played back by the computer system during the duration of the display of the virtual environment. The audio track is optionally a loopable audio track (e.g., able to be repeatedly played) that is associated with the virtual environment, and the volume control element is selectable to modify the volume level of the audio track without modifying a volume level of the content in the three-dimensional environment. Adjusting a volume level of associated with a virtual environment separately from adjusting a volume level associated with the content increases user control of the computer system via reduction of inputs involved with accessing different types of volume controls and avoids errors in usage of the computer system.

In some embodiments, while displaying the three-dimensional environment outside of the content in the second environmental mode (e.g., the light mode described with reference to step(s) 3102) with the first visual appearance (e.g., daytime version of the simulated physical space or the light mode appearance described above), the computer system receives, via the one or more input devices, an input corresponding to a request to change the environmental mode with which the three-dimensional environment outside of the content is displayed (e.g., presented) from the second environmental mode (e.g., the light mode described with reference to step(s) 3102) to the first environmental mode (e.g., the automatic mode described with reference to step(s) 3102), such as input **3036*i* in FIG. 30H. The input corresponding to a request to change the environmental mode with which the three-dimensional environment outside of the content is displayed (e.g., presented) from the second environmental mode (e.g., the light mode described with reference to step(s) 3102) to the first environmental mode (e.g., the automatic mode described with reference to step(s) 3102**) optionally is same as or similar to the third input requesting to change the environmental mode (e.g., the current environmental mode) from the respective environmental mode to the environmental mode that is different from the respective environmental mode described above.

In some embodiments, in response to receiving the input corresponding to the request to change the environmental mode with which the three-dimensional environment outside of the content is displayed (e.g., presented) from the second environmental mode (e.g., the light mode described with reference to step(s) 3102) to the first environmental mode (e.g., the automatic mode described above), before displaying the three-dimensional environment outside of the content with the second visual appearance (e.g., showing the nighttime version of the simulated physical space or the dark mode appearance as described above with reference to method 800, 1000, 2900, 3100 and/or other method(s) described herein), and in accordance with a determination that the computer system satisfies one or more criteria, wherein the one or more criteria are satisfied when displaying the three-dimensional environment in the first environmental mode (e.g., the automatic mode described above) at the computer system requires displaying the three-dimensional environment with the second visual appearance (e.g., showing the nighttime version of the simulated physical space or the dark mode appearance as described above with reference to method 800, 1000, 2900, 3100 and/or other method(s) described herein) in response to receiving the input corresponding to the selection of the first environmental mode (e.g., the automatic mode described above), the computer system presents a notification (e.g., an audio, visual, and/or haptic notification) indicating that the three-dimensional environment outside of the content will be displayed with the second visual appearance, such as notification 3051 in FIG. 30H (e.g., showing the nighttime version of the simulated physical space or the dark mode appearance as described above with reference to method 800, 1000, 2900, 3100 and/or other method(s) described herein). In some embodiments, in response to receiving the input corresponding to the request to change the environmental mode with which the three-dimensional environment outside of the content is displayed (e.g., presented) from the second environmental mode (e.g., the light mode described with reference to step(s) 3102) to the first environmental mode (e.g., the automatic mode described above), in accordance with a determination that the computer system does not satisfy the one or more criteria, wherein the one or more criteria are satisfied when displaying the three-dimensional environment in the first environmental mode (e.g., the automatic mode described above) at the computer system requires displaying the three-dimensional environment with the second visual appearance (e.g., showing the nighttime version of the simulated physical space or the dark mode appearance as described above with reference to method 800, 1000, 2900, 3100 and/or other method(s) described herein) in response to receiving the input corresponding to the selection of the first environmental mode (e.g., the automatic mode described above), the computer system forgoes presenting the notification (e.g., the audio, visual, and/or haptic notification) indicating that the three-dimensional environment outside of the content will be displayed with the second visual appearance (e.g., showing the nighttime version of the simulated physical space or the dark mode appearance as described above with reference to method 800, 1000, 2900, 3100 and/or other method(s) described herein) described above. As described above with reference to step(s) 3102, when in the automatic environmental mode, the computer system optionally automatically displays the light mode appearance when the time of day at the computer system (e.g., at the current location of the computer system) corresponds to a time of day that is daytime (e.g., sunny or bright), and the computer system optionally automatically displays the dark mode appearance when the time of day at the computer system (e.g., at the current location of the computer system) corresponds to a time of day that is nighttime (e.g., primarily moonlit, star lit, or lit, if any, by artificial lighting (e.g., street lights and building lights). As such, when the computer system detects a request to enter the automatic mode, and the automatic mode, based on the current time of day at the computer system (e.g., at the current location of the computer system) will cause the visual appearance to change from the light mode appearance to the dark mode appearance, the computer system optionally presents the notification (e.g., an audio, visual, and/or haptic notification described above) to the user that the visual appearance will change to the dark mode appearance (and then displays the dark mode appearance (described above) after presenting the notification. In some embodiments, the notification is a visual notification (e.g., a user interface) that includes a “confirm” user interface element for confirming that the user wants to enter the automatic environment mode, which will cause entry into the dark mode appearance as described above and a “cancel” user interface element for canceling the switch to the automatic environmental mode (and remaining in the light mode appearance). Presenting a notification that the visual appearance will change to the dark mode appearance before changing the visual appearance to the dark mode appearance in response to detecting selection of the automatic environmental mode confirms the user’s selection of the automatic environmental mode, and reduces errors in interaction with the computer system and/or the three-dimensional environment.

In some embodiments, while displaying the content in the second presentation mode, the computer system displays, via the display generation component, the content with a simulated emissive light effect (e.g., a highlighting effect or a brightening effect) surrounding the content, such as simulated emissive lighting effect 3050 in FIGS. 30G and 30G1, in the three-dimensional environment (optionally having the second visual appearance (e.g., showing the nighttime version of the simulated physical space or the dark mode appearance as described above with reference to method 800, 1000, 2900, 3100 and/or other method(s) described herein)). In some embodiments, the computer system changes the emissive light effect as the content changes (e.g., as the content (e.g., video content) plays or as different still images are displayed). In some embodiments, the simulated emissive effect has one or more visual characteristics, such as brightness (e.g., intensity), color, size (e.g., diameter), and/or saturation. In some embodiments, the color and/or brightness of the simulated emissive light effect depends on a color and/or brightness of the content and optionally varies spatially as the color and/or brightness of the content varies spatially. For example, when the simulated emissive light surrounds the content and a first side of the content present primarily red light and a second side of the content, opposite the first side of the content (e.g., left side opposite right side), presents primarily white light, the simulated emissive light closer to the first side of the content (e.g., surrounded the content at the first side) is primarily red simulated light and the simulated emissive light closer to the second side of the content (e.g., surrounding the content at the second side) is primarily white simulated light. In some embodiments, the computer system displays the simulated emissive effect surrounding the content when the content is non-immersive content (e.g., is optionally displayed and/or bounded within a planar or curved plane from the perspective of the first user and/or in which elements of the media content optionally do not include user perceivable depth dimensions) while the three-dimensional environment outside of the content has the dark mode appearance described above. In some embodiments, the computer system forgoes displaying the simulated emissive effect surrounding the content, such as when the content is non-immersive while the three-dimensional environment outside of the content has the light mode appearance described above, or when the computer system displays the content at the respective location for media content described above. In some embodiments, when the computer system displays the content at the respective location for media content (e.g., the respective location for media content described above), the computer system displays a simulated lighting effect, different from the simulated emissive effect surrounding the content described above. The simulated lighting effect is optionally a simulation of light associated with the content being virtually cast by the content onto one or more virtual objects or representations of physical objects. In some embodiments, the simulated lighting effect includes simulating the divergence of light of the content outside of the content into other parts of the three-dimensional environment, such that the computer system simulates light of the content polluting one or more areas beyond the content in the three-dimensional environment, such as with a glare. Displaying a simulated glowing effect surrounding the content when the content is presented in the second presentation mode corresponds a specific simulated lighting effect configurations to specific modes of presentation of the content, and reduces involvement of user inputs for controlling simulated lighting effects differently for different presentation modes.

In some embodiments, while displaying the content in the second presentation mode and while the environmental mode of the three-dimensional environment for controlling the visual appearance of the three-dimensional environment outside of the content is the respective environmental mode, in accordance with a determination that a mode for reducing a visual prominence of the three-dimensional environment outside of the content (e.g., the mode for reducing a visual prominence of the three-dimensional environment outside of the content described above) is active, the computer system displays, via the display generation component, the content with a simulated emissive light effect surrounding the content in the three-dimensional environment (e.g., the simulated emissive effect described above), such as simulated emissive lighting effect 3050 in FIGS. 30G and 30G1. In some embodiments, in accordance with a determination that the mode for reducing the visual prominence of the three-dimensional environment outside of the content (e.g., the mode for reducing a visual prominence of the three-dimensional environment outside of the content described above) is inactive, the computer system displays, via the display generation component, the content without displaying the simulated emissive light effect surrounding the content in the three-dimensional environment (e.g., the simulated emissive light effect described above). For example, the computer system optionally forgoes displaying simulated emissive lighting effect 3050 in FIGS. 30G and 30G1 when user interface element 3044*d* is inactive, such as shown in FIG. 30E-1. Displaying a simulated glowing effect surrounding the content when the content based on whether the mode for reducing the visual prominence of the three-dimensional environment outside of the content is active corresponds a specific simulated lighting effect configuration to specific modes of presentation of the content, and reduces involvement of user inputs for controlling simulated lighting effects differently for different presentation modes.

It should be understood that the particular order in which the operations in method 3100 have been described is merely exemplary and is not intended to indicate that the described order is the only order in which the operations could be performed. One of ordinary skill in the art would recognize various ways to reorder the operations described herein.

In some embodiments, aspects/operations of methods 800, 1000, 1200, 1400, 1600, 1800, 2000 2100, 2300, 2500, 2700, 2900, and/or 3100 may be interchanged, substituted, and/or added between these methods. For example, the time of day settings in methods 800, 1000, 1200, 1400, 1600, 1800, 2000, 2100, 2300, 2500, 2700, 2900, and/or 3100 the virtual environments in methods 800, 1000, 1200, 1400, 1600, 1800, 2000, 2100, 2300, 2500, 2700, 2900, and/or 3100, the communication sessions in methods 800, 1000, 1200, 1400, 1600, 1800, 2000, 2100, 2300, 2500, 2700, 2900, and/or 3100, the shared virtual environments in methods 800, 1000, 1200, 1400, 1600, 1800, 2300, 2500, 2700, 2900, and/or 3100, content (e.g., associated with respective media) playback in methods 800, 1000, 1200, 1400, 1600, 1800, 2000, 2100, 2300, 2500, 2700, 2900, and/or 3100, and/or lighting effects (e.g., virtual lighting effects and/or simulated lighting effects) in methods 800, 1000, 1200, 1400, 1600, 1800, 2000, a 2100, 2300, 2500, 2700, 2900, and/or 3100 are optionally interchanged, substituted, and/or added between these methods. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can be generated by inferring preferences based on non-personal information data or a bare minimum amount of personal information, such as the content being requested by the device associated with a user, other non-personal information available to the service, or publicly available information.

The invention claimed is:

1. A method comprising:
- at a computer system in communication with a display generation component and one or more input devices:
  - receiving, via the one or more input devices, a request to display respective media in a virtual three-dimensional environment; and
  - in response to the request to display the respective media in the virtual three-dimensional environment, displaying the respective media in the virtual three-dimensional environment concurrently with a simulated lighting effect that is based on content of the respective media and one or more textures of one or more portions of the virtual three-dimensional environment, wherein displaying the simulated lighting effect includes:
    - in accordance with a determination that the respective media is a first media:
      - displaying a first portion of the virtual three-dimensional environment with an appearance that is based on an appearance of content of the first media and a texture of the first portion;
      - displaying a second portion of the virtual three-dimensional environment with an appearance that is based on the appearance of the content of the first media and a texture of the second portion; and
      - displaying a third portion of the virtual three-dimensional environment, that is between the first portion and the second portion, with an appearance that is independent of the content of the first media; and
    - in accordance with a determination that the respective media is a second media, different from the first media:

displaying the first portion of the virtual three-dimensional environment with an appearance that is based on an appearance of content of the second media and the texture of the first portion;

displaying the second portion of the virtual three-dimensional environment with an appearance that is based on the appearance of the content of the second media and the texture of the second portion; and displaying the third portion of the virtual three-dimensional environment, that is between the first portion and the second portion, with an appearance that is independent of the content of the second media.

2. The method of claim 1, wherein the request to display the respective media in the virtual three-dimensional environment is received while the respective media is not displayed.

3. The method of claim 1, wherein the request to display the respective media in the virtual three-dimensional environment is received while displaying the respective media in a second environment different from the virtual three-dimensional environment, the method further comprising:

in response to receiving the request to display the respective media in the virtual three-dimensional environment:

ceasing display of the second environment; and displaying, via the display generation component, the respective media in the virtual three-dimensional environment.

4. The method of claim 1, further comprising:

while displaying the respective media in the virtual three-dimensional environment, changing one or more visual characteristics of the content of the respective media; and in response to changing the one or more visual characteristics of the content of the respective media:

changing the appearance of the first portion of the virtual three-dimensional environment based on the change in the one or more visual characteristics of the content of the respective media;

changing the appearance of the second portion of the virtual three-dimensional environment based on the change in the one or more visual characteristics of the content of the respective media; and maintaining the appearance of the third portion of the virtual three-dimensional environment.

5. The method of claim 1, wherein the texture of the first portion and the texture of the second portion share one or more visual characteristics.

6. The method of claim 1, wherein displaying the simulated lighting effect includes:

displaying the first portion of the virtual three-dimensional environment with a smooth surface that includes the texture of the first portion; and displaying the second portion of the virtual three-dimensional environment with a smooth surface that includes the texture of the second portion.

7. The method of claim 1, wherein the texture of the first portion and the texture of the second portion include a plurality of virtual features of a small relative size and having a magnitude of height relative to the virtual three-dimensional environment that is within a threshold amount of one another.

8. The method of claim 1, wherein the texture of the first portion and the texture of the second portion include a plurality of virtual features that extend in a direction within a threshold angle, of being parallel to a first dimension of the respective media.

9. The method of claim 1, further comprising:

in response to the request to display the respective media in the virtual three-dimensional environment, in accordance with a determination that the respective media is the first media, the first media having a first aspect ratio relative to a first axis and a second axis in the virtual three-dimensional environment:

displaying the first media in the virtual three-dimensional environment with a first dimension of a first value along the first axis and a second dimension of a second value along the second axis, wherein the first value and the second value correspond to the first aspect ratio;

receiving, via the one or more input devices, a request to change the display of the respective media in the virtual three-dimensional environment; and in response to the request to change the display of the respective media in the virtual three-dimensional environment, in accordance with a determination that the request is to change the display of the respective media in the virtual three-dimensional environment from the first media to second media, different from the first media, the second media having a second aspect ratio relative to the first axis and the second axis in the virtual three-dimensional environment, different from the first aspect ratio:

displaying the second media in the virtual three-dimensional environment with the first dimension of the first value along the first axis, and the second dimension of a third value, different from the second value, along the second axis, wherein the first value and the third value correspond to the second aspect ratio.

10. The method of claim 1, further comprising:

while displaying the respective media in the virtual three-dimensional environment at a first location in the virtual three-dimensional environment from a first viewpoint of a plurality of available viewpoints associated with the virtual three-dimensional environment, wherein the first viewpoint has a first spatial arrangement relative to the respective media in the virtual three-dimensional environment, receiving, via the one or more input devices, an input corresponding to a selection of a second viewpoint of the plurality of available viewpoints associated with the virtual three-dimensional environment; and in response to receiving the input, displaying the respective media at the first location in the virtual three-dimensional environment from the second viewpoint of the plurality of available viewpoints, wherein the second viewpoint has a second spatial arrangement relative to the respective media in the virtual three-dimensional environment different from the first spatial arrangement.

11. The method of claim 10, wherein the second viewpoint differs from the first viewpoint in distance from the respective media in the virtual three-dimensional environment and in height relative to a portion of the respective media in the virtual three-dimensional environment.

12. The method of claim 11, wherein the second viewpoint differs from the first viewpoint in height relative to the respective media in the virtual three-dimensional environment.

13. The method of claim 11, further comprising:

while displaying the respective media in the virtual three-dimensional environment, detecting a change in a current viewpoint of a user of the computer system relative to the virtual three-dimensional environment from a first viewpoint directed toward the respective media to a second viewpoint not directed toward the respective media; and in response to detecting the change in the current viewpoint of the user, ceasing display of the respective media and displaying a fourth portion of the virtual three-dimensional environment with an appearance independent of the simulated lighting effect that does not include the texture of the first portion of the virtual three-dimensional environment and the texture of the second portion of the virtual three-dimensional environment.

14. The method of claim 13, wherein displaying the fourth portion of the virtual three-dimensional environment includes displaying a representation of a horizon within the fourth portion of the virtual three-dimensional environment.

15. The method of claim 1, further comprising:

in response to the request to display the respective media in the virtual three-dimensional environment, in accordance with a determination that the respective media is a third media, different from the first media and the second media, forgoing the display of the respective media in the virtual three-dimensional environment.

16. The method of claim 1, wherein the third portion of the virtual three-dimensional environment includes simulated empty space and does not include any virtual surface.

17. The method of claim 1, wherein displaying the respective media in the virtual three-dimensional environment includes displaying the respective media without a visual distinction between the respective media and the third portion of the virtual three-dimensional environment.

18. The method of claim 1, wherein:

in accordance with the determination that the respective media is the first media, the third portion at least partially surrounds the displayed first media, and in accordance with the determination that the respective media is the second media, the third portion at least partially surrounds the displayed second media.

19. The method of claim 1, wherein:

in accordance with the determination that the respective media is the first media, the third portion is at least partially between the first portion of the virtual three-dimensional environment and the first media, and in accordance with the determination that the respective media is the second media, the third portion is at least partially between the first portion of the virtual three-dimensional environment and the second media.

20. A computer system that is in communication with a display generation component and one or more input devices, the computer system comprising:

one or more processors;

memory; and one or more programs, wherein the one or more programs are stored in the memory and configured to be executed by the one or more processors, the one or more programs including instructions for:

receiving, via the one or more input devices, a request to display respective media in a virtual three-dimensional environment; and in response to the request to display the respective media in the virtual three-dimensional environment, displaying the respective media in the virtual three-dimensional environment concurrently with a simulated lighting effect that is based on content of the respective media and one or more textures of one or more portions of the virtual three-dimensional environment, wherein displaying the simulated lighting effect includes:

in accordance with a determination that the respective media is a first media:

displaying a first portion of the virtual three-dimensional environment with an appearance that is based on an appearance of content of the first media and a texture of the first portion;

displaying a second portion of the virtual three-dimensional environment with an appearance that is based on the appearance of the content of the first media and a texture of the second portion; and displaying a third portion of the virtual three-dimensional environment, that is between the first portion and the second portion, with an appearance that is independent of the content of the first media; and in accordance with a determination that the respective media is second media, different from the first media:

displaying the first portion of the virtual three-dimensional environment with an appearance that is based on an appearance of content of the second media and the texture of the first portion;

displaying the second portion of the virtual three-dimensional environment with an appearance that is based on the appearance of the content of the second media and the texture of the second portion; and displaying the third portion of the virtual three-dimensional environment, that is between the first portion and the second portion, with an appearance that is independent of the content of the second media.

21. The computer system of claim 20, wherein the request to display the respective media in the virtual three-dimensional environment is received while the respective media is not displayed.

22. The computer system of claim 20, wherein the request to display the respective media in the virtual three-dimensional environment is received while displaying the respective media in a second environment different from the virtual three-dimensional environment, the one or more programs further including instructions for:

in response to receiving the request to display the respective media in the virtual three-dimensional environment:

ceasing display of the second environment; and displaying, via the display generation component, the respective media in the virtual three-dimensional environment.

23. The computer system of claim 20, the one or more programs further including instructions for:

while displaying the respective media in the virtual three-dimensional environment, changing one or more visual characteristics of the content of the respective media; and in response to changing the one or more visual characteristics of the content of the respective media:

changing the appearance of the first portion of the virtual three-dimensional environment based on the change in the one or more visual characteristics of the content of the respective media;

changing the appearance of the second portion of the virtual three-dimensional environment based on the change in the one or more visual characteristics of the content of the respective media; and maintaining the appearance of the third portion of the virtual three-dimensional environment.

24. The computer system of claim 20, wherein the texture of the first portion and the texture of the second portion share one or more visual characteristics.

25. The computer system of claim 20, wherein displaying the simulated lighting effect includes:

displaying the first portion of the virtual three-dimensional environment with a smooth surface that includes the texture of the first portion; and displaying the second portion of the virtual three-dimensional environment with a smooth surface that includes the texture of the second portion.

26. The computer system of claim 20, wherein the texture of the first portion and the texture of the second portion include a plurality of virtual features of a small relative size and having a magnitude of height relative to the virtual three-dimensional environment that is within a threshold amount of one another.

27. The computer system of claim 20, wherein the texture of the first portion and the texture of the second portion include a plurality of virtual features that extend in a direction within a threshold angle, of being parallel to a first dimension of the respective media.

28. The computer system of claim 20, the one or more programs further including instructions for:

in response to the request to display the respective media in the virtual three-dimensional environment, in accordance with a determination that the respective media is the first media, the first media having a first aspect ratio relative to a first axis and a second axis in the virtual three-dimensional environment:

displaying the first media in the virtual three-dimensional environment with a first dimension of a first value along the first axis and a second dimension of a second value along the second axis, wherein the first value and the second value correspond to the first aspect ratio;

receiving, via the one or more input devices, a request to change the display of the respective media in the virtual three-dimensional environment; and in response to the request to change the display of the respective media in the virtual three-dimensional environment, in accordance with a determination that the request is to change the display of the respective media in the virtual three-dimensional environment from the first media to second media, different from the first media, the second media having a second aspect ratio relative to the first axis and the second axis in the virtual three-dimensional environment, different from the first aspect ratio:

displaying the second media in the virtual three-dimensional environment with the first dimension of the first value along the first axis, and the second dimension of a third value, different from the second value, along the second axis, wherein the first value and the third value correspond to the second aspect ratio.

29. The computer system of claim 20, the one or more programs further including instructions for:

while displaying the respective media in the virtual three-dimensional environment at a first location in the virtual three-dimensional environment from a first viewpoint of a plurality of available viewpoints associated with the virtual three-dimensional environment, wherein the first viewpoint has a first spatial arrangement relative to the respective media in the virtual three-dimensional environment, receiving, via the one or more input devices, an input corresponding to a selection of a second viewpoint of the plurality of available viewpoints associated with the virtual three-dimensional environment; and in response to receiving the input, displaying the respective media at the first location in the virtual three-dimensional environment from the second viewpoint of the plurality of available viewpoints, wherein the second viewpoint has a second spatial arrangement relative to the respective media in the virtual three-dimensional environment different from the first spatial arrangement.

30. The computer system of claim 29, wherein the second viewpoint differs from the first viewpoint in distance from the respective media in the virtual three-dimensional environment and in height relative to a portion of the respective media in the virtual three-dimensional environment.

31. The computer system of claim 30, wherein the second viewpoint differs from the first viewpoint in height relative to the respective media in the virtual three-dimensional environment.

32. The computer system of claim 30, the one or more programs further including instructions for:

while displaying the respective media in the virtual three-dimensional environment, detecting a change in a current viewpoint of a user of the computer system relative to the virtual three-dimensional environment from a first viewpoint directed toward the respective media to a second viewpoint not directed toward the respective media; and in response to detecting the change in the current viewpoint of the user, ceasing display of the respective media and displaying a fourth portion of the virtual three-dimensional environment with an appearance independent of the simulated lighting effect that does not include the texture of the first portion of the virtual three-dimensional environment and the texture of the second portion of the virtual three-dimensional environment.

33. The computer system of claim 32, wherein displaying the fourth portion of the virtual three-dimensional environment includes displaying a representation of a horizon within the fourth portion of the virtual three-dimensional environment.

34. The computer system of claim 20, the one or more programs further including instructions for:

in response to the request to display the respective media in the virtual three-dimensional environment, in accordance with a determination that the respective media is a third media, different from the first media and the second media, forgoing the display of the respective media in the virtual three-dimensional environment.

35. The computer system of claim 20, wherein the third portion of the virtual three-dimensional environment includes simulated empty space and does not include any virtual surface.

36. The computer system of claim 20, wherein displaying the respective media in the virtual three-dimensional environment includes displaying the respective media without a visual distinction between the respective media and the third portion of the virtual three-dimensional environment.

37. The computer system of claim 20, wherein:

in accordance with the determination that the respective media is the first media, the third portion at least partially surrounds the displayed first media, and in accordance with the determination that the respective media is the second media, the third portion at least partially surrounds the displayed second media.

38. The computer system of claim 20, wherein:

in accordance with the determination that the respective media is the first media, the third portion is at least partially between the first portion of the virtual three-dimensional environment and the first media, and in accordance with the determination that the respective media is the second media, the third portion is at least partially between the first portion of the virtual three-dimensional environment and the second media.

39. A non-transitory computer readable storage medium storing one or more programs, the one or more programs comprising instructions, which when executed by one or more processors of a computer system that is in communication with a display generation component and one or more input devices, cause the computer system to perform a method comprising:

receiving, via the one or more input devices, a request to display respective media in a virtual three-dimensional environment; and in response to the request to display the respective media in the virtual three-dimensional environment, displaying the respective media in the virtual three-dimensional environment concurrently with a simulated lighting effect that is based on content of the respective media and one or more textures of one or more portions of the virtual three-dimensional environment, wherein displaying the simulated lighting effect includes:

in accordance with a determination that the respective media is a first media:

displaying a first portion of the virtual three-dimensional environment with an appearance that is based on an appearance of content of the first media and a texture of the first portion;

displaying a second portion of the virtual three-dimensional environment with an appearance that is based on an appearance of the content of the first media and a texture of the second portion; and displaying a third portion of the virtual three-dimensional environment, that is between the first portion and the second portion, with an appearance that is independent of the content of the first media; and in accordance with a determination that the respective media is second media, different from the first media:

displaying the first portion of the virtual three-dimensional environment with an appearance that is based on an appearance of content of the second media and the texture of the first portion;

displaying the second portion of the virtual three-dimensional environment with an appearance that is based on an appearance of the content of the second media and the texture of the second portion; and displaying the third portion of the virtual three-dimensional environment, that is between the first portion and the second portion, with an appearance that is independent of the content of the second media.

40. The non-transitory computer readable storage medium of claim 39, wherein the request to display the respective media in the virtual three-dimensional environment is received while the respective media is not displayed.

41. The non-transitory computer readable storage medium of claim 39, wherein the request to display the respective media in the virtual three-dimensional environment is received while displaying the respective media in a second environment different from the virtual three-dimensional environment, the method further comprising:

in response to receiving the request to display the respective media in the virtual three-dimensional environment:

ceasing display of the second environment; and displaying, via the display generation component, the respective media in the virtual three-dimensional environment.

42. The non-transitory computer readable storage medium of claim 39, the method further comprising:

while displaying the respective media in the virtual three-dimensional environment, changing one or more visual characteristics of the content of the respective media; and in response to changing the one or more visual characteristics of the content of the respective media:

changing the appearance of the first portion of the virtual three-dimensional environment based on the change in the one or more visual characteristics of the content of the respective media;

changing the appearance of the second portion of the virtual three-dimensional environment based on the change in the one or more visual characteristics of the content of the respective media; and maintaining the appearance of the third portion of the virtual three-dimensional environment.

43. The non-transitory computer readable storage medium of claim 39, wherein the texture of the first portion and the texture of the second portion share one or more visual characteristics.

44. The non-transitory computer readable storage medium of claim 39, wherein displaying the simulated lighting effect includes:

displaying the first portion of the virtual three-dimensional environment with a smooth surface that includes the texture of the first portion; and displaying the second portion of the virtual three-dimensional environment with a smooth surface that includes the texture of the second portion.

45. The non-transitory computer readable storage medium of claim 39, wherein the texture of the first portion and the texture of the second portion include a plurality of virtual features of a small relative size and having a magnitude of height relative to the virtual three-dimensional environment that is within a threshold amount of one another.

46. The non-transitory computer readable storage medium of claim 39, wherein the texture of the first portion and the texture of the second portion include a plurality of virtual features that extend in a direction within a threshold angle, of being parallel to a first dimension of the respective media.

47. The non-transitory computer readable storage medium of claim 39, the method further comprising:

in response to the request to display the respective media in the virtual three-dimensional environment, in accordance with a determination that the respective media is the first media, the first media having a first aspect ratio relative to a first axis and a second axis in the virtual three-dimensional environment:

displaying the first media in the virtual three-dimensional environment with a first dimension of a first value along the first axis and a second dimension of a second value along the second axis, wherein the first value and the second value correspond to the first aspect ratio;

receiving, via the one or more input devices, a request to change the display of the respective media in the virtual three-dimensional environment; and in response to the request to change the display of the respective media in the virtual three-dimensional environment, in accordance with a determination that the request is to change the display of the respective media in the virtual three-dimensional environment from the first media to second media, different from the first media, the second media having a second aspect ratio relative to the first axis and the second axis in the virtual three-dimensional environment, different from the first aspect ratio:

displaying the second media in the virtual three-dimensional environment with the first dimension of the first value along the first axis, and the second dimension of a third value, different from the second value, along the second axis, wherein the first value and the third value correspond to the second aspect ratio.

48. The non-transitory computer readable storage medium of claim 39, the method further comprising:

while displaying the respective media in the virtual three-dimensional environment at a first location in the virtual three-dimensional environment from a first viewpoint of a plurality of available viewpoints associated with the virtual three-dimensional environment, wherein the first viewpoint has a first spatial arrangement relative to the respective media in the virtual three-dimensional environment, receiving, via the one or more input devices, an input corresponding to a selection of a second viewpoint of the plurality of available viewpoints associated with the virtual three-dimensional environment; and in response to receiving the input, displaying the respective media at the first location in the virtual three-dimensional environment from the second viewpoint of the plurality of available viewpoints, wherein the second viewpoint has a second spatial arrangement relative to the respective media in the virtual three-dimensional environment different from the first spatial arrangement.

49. The non-transitory computer readable storage medium of claim 48, wherein the second viewpoint differs from the first viewpoint in distance from the respective media in the virtual three-dimensional environment and in height relative to a portion of the respective media in the virtual three-dimensional environment.

50. The non-transitory computer readable storage medium of claim 49, wherein the second viewpoint differs from the first viewpoint in height relative to the respective media in the virtual three-dimensional environment.

51. The non-transitory computer readable storage medium of claim 49, the method further comprising:

while displaying the respective media in the virtual three-dimensional environment, detecting a change in a current viewpoint of a user of the non-transitory computer readable storage medium relative to the virtual three-dimensional environment from a first viewpoint directed toward the respective media to a second viewpoint not directed toward the respective media; and in response to detecting the change in the current viewpoint of the user, ceasing display of the respective media and displaying a fourth portion of the virtual three-dimensional environment with an appearance independent of the simulated lighting effect that does not include the texture of the first portion of the virtual three-dimensional environment and the texture of the second portion of the virtual three-dimensional environment.

52. The non-transitory computer readable storage medium of claim 51, wherein displaying the fourth portion of the virtual three-dimensional environment includes displaying a representation of a horizon within the fourth portion of the virtual three-dimensional environment.

53. The non-transitory computer readable storage medium of claim 39, the method further comprising:

in response to the request to display the respective media in the virtual three-dimensional environment, in accordance with a determination that the respective media is a third media, different from the first media and the second media, forgoing the display of the respective media in the virtual three-dimensional environment.

54. The non-transitory computer readable storage medium of claim 39, wherein the third portion of the virtual three-dimensional environment includes simulated empty space and does not include any virtual surface.

55. The non-transitory computer readable storage medium of claim 39, wherein displaying the respective media in the virtual three-dimensional environment includes displaying the respective media without a visual distinction between the respective media and the third portion of the virtual three-dimensional environment.

56. The non-transitory computer readable storage medium of claim 39, wherein:

in accordance with the determination that the respective media is the first media, the third portion at least partially surrounds the displayed first media, and in accordance with the determination that the respective media is the second media, the third portion at least partially surrounds the displayed second media.

57. The non-transitory computer readable storage medium of claim 39, wherein:

in accordance with the determination that the respective media is the first media, the third portion is at least partially between the first portion of the virtual three-dimensional environment and the first media, and in accordance with the determination that the respective media is the second media, the third portion is at least partially between the first portion of the virtual three-dimensional environment and the second media.

* * * * *